US008010157B1

(12) United States Patent
Fujisaki

(10) Patent No.: US 8,010,157 B1
(45) Date of Patent: Aug. 30, 2011

(54) COMMUNICATION DEVICE

(76) Inventor: Iwao Fujisaki, Tokyo (JP)

( * ) Notice: Subject to any disclaimer, the term of this patent is extended or adjusted under 35 U.S.C. 154(b) by 0 days.

(21) Appl. No.: 12/972,441

(22) Filed: Dec. 18, 2010

Related U.S. Application Data

(63) Continuation of application No. 11/688,901, filed on Mar. 21, 2007, now Pat. No. 7,890,136, which is a continuation of application No. 10/710,600, filed on Jul. 23, 2004.

(60) Provisional application No. 60/481,426, filed on Sep. 26, 2003.

(51) Int. Cl.
*H04M 1/00* (2006.01)

(52) U.S. Cl. .................... 455/556.1; 455/431; 455/12.1; 455/13.2; 455/41.2

(58) Field of Classification Search ............... 455/556.1, 455/431, 12.1, 13.2, 41.2
See application file for complete search history.

(56) References Cited

U.S. PATENT DOCUMENTS 4,934,773 A 6/1990 Becker
4,937,570 A 6/1990 Matsukawa et al.
5,113,427 A 5/1992 Ryoichi et al.
5,272,638 A 12/1993 Martin et al.
5,353,376 A 10/1994 Oh et al.
5,388,147 A 2/1995 Grimes
5,404,579 A 4/1995 Obayashi et al.
5,405,152 A 4/1995 Katanics et al.
5,414,461 A 5/1995 Kishi et al.
5,446,904 A 8/1995 Belt et al.
5,532,741 A 7/1996 Tsutsumi
5,542,557 A 8/1996 Koyama et al.
5,543,789 A 8/1996 Behr et al.
5,559,554 A 9/1996 Uekane et al.
5,648,768 A 7/1997 Bouve
5,675,630 A 10/1997 Beatty
5,687,331 A 11/1997 Volk et al.
5,732,383 A 3/1998 Foladare et al.
5,758,280 A 5/1998 Kimura
5,772,586 A 6/1998 Heinonen et al.
5,778,304 A 7/1998 Grube et al.
5,802,460 A 9/1998 Parvulescu et al.
5,805,672 A 9/1998 Barkat et al.
5,812,930 A 9/1998 Zavrel
5,844,824 A 12/1998 Newman et al.
5,902,349 A 5/1999 Endo et al.
5,916,024 A 6/1999 Von Kohorn
5,918,180 A 6/1999 Dimino
5,959,661 A 9/1999 Isono
6,009,336 A 12/1999 Harris et al.
6,011,973 A 1/2000 Valentine et al.
6,043,752 A 3/2000 Hisada et al.
6,081,265 A 6/2000 Nakayama et al.
6,115,597 A 9/2000 Kroll et al.
6,128,594 A 10/2000 Gulli et al.
6,144,848 A 11/2000 Walsh et al.
6,148,212 A 11/2000 Park et al.
6,198,942 B1 3/2001 Hayashi et al.
6,202,060 B1 3/2001 Tran (Continued)

*Primary Examiner* — David Q Nguyen

(57) ABSTRACT

A communication device which implements a voice communicating function, a OS updating function, a voice recognition system, a tag function, a voice recognition noise filtering function, a sound/beep auto off function, a voice recognition system auto off function, a voice recognition email function, a voice communication text converting function, a target device location indicating function, an audio/video data capturing system, a caller ID function, a call blocking function, a navigation system, an auto emergency calling system, a cellular TV function, a GPS search engine function, a mobile ignition key function, a word processing function, a start up software function, and a stereo audio data output function.

3 Claims, 398 Drawing Sheets

U.S. PATENT DOCUMENTS

| | | | |
|---|---|---|---|
| 6,216,013 | B1 | 4/2001 | Moore et al. |
| 6,216,158 | B1 | 4/2001 | Luo et al. |
| 6,223,029 | B1 | 4/2001 | Stenman et al. |
| 6,225,944 | B1 | 5/2001 | Hayes |
| 6,236,832 | B1 | 5/2001 | Ito |
| 6,243,039 | B1 | 6/2001 | Elliot |
| 6,249,720 | B1 | 6/2001 | Kubota et al. |
| 6,253,075 | B1 | 6/2001 | Beghtol et al. |
| 6,265,988 | B1 | 7/2001 | LeMense et al. |
| 6,285,317 | B1 | 9/2001 | Ong |
| 6,292,666 | B1 | 9/2001 | Siddiqui et al. |
| 6,292,747 | B1 | 9/2001 | Amro et al. |
| 6,311,011 | B1 | 10/2001 | Kuroda |
| 6,311,077 | B1 | 10/2001 | Bien |
| 6,332,122 | B1 | 12/2001 | Ortega et al. |
| 6,333,684 | B1 | 12/2001 | Kang |
| 6,363,320 | B1 | 3/2002 | Chou |
| 6,366,651 | B1 | 4/2002 | Griffith et al. |
| 6,366,782 | B1 | 4/2002 | Fumarolo et al. |
| 6,374,221 | B1 | 4/2002 | Haimi-Cohen |
| 6,385,466 | B1 | 5/2002 | Hirai et al. |
| 6,385,541 | B1 | 5/2002 | Blumberg et al. |
| 6,405,033 | B1 | 6/2002 | Kennedy, III et al. |
| 6,411,198 | B1 | 6/2002 | Hirai et al. |
| 6,411,822 | B1 | 6/2002 | Kraft |
| 6,415,138 | B2 | 7/2002 | Sirola et al. |
| 6,421,470 | B1 | 7/2002 | Nozaki et al. |
| 6,421,602 | B1 | 7/2002 | Bullock et al. |
| 6,430,498 | B1 | 8/2002 | Maruyama et al. |
| 6,442,404 | B1 | 8/2002 | Sakajiri |
| 6,445,802 | B1 | 9/2002 | Dan |
| 6,477,387 | B1 | 11/2002 | Jackson et al. |
| 6,486,867 | B1 | 11/2002 | Kopp et al. |
| 6,487,422 | B1 | 11/2002 | Lee |
| 6,512,919 | B2 | 1/2003 | Ogasawara |
| 6,519,566 | B1 | 2/2003 | Boyer et al. |
| 6,526,293 | B1 | 2/2003 | Matsuo |
| 6,529,742 | B1 | 3/2003 | Yang |
| 6,532,035 | B1 | 3/2003 | Saari et al. |
| 6,538,558 | B2 | 3/2003 | Sakazume et al. |
| 6,542,750 | B2 | 4/2003 | Hendrey et al. |
| 6,542,814 | B2 | 4/2003 | Polidi et al. |
| 6,553,310 | B1 | 4/2003 | Lopke |
| 6,567,745 | B2 | 5/2003 | Fuchs et al. |
| 6,567,984 | B1 | 5/2003 | Allport |
| 6,600,975 | B2 | 7/2003 | Moriguchi et al. |
| 6,606,504 | B1 | 8/2003 | Mooney et al. |
| 6,611,753 | B1 | 8/2003 | Millington |
| 6,615,186 | B1 | 9/2003 | Kolls |
| 6,618,704 | B2 | 9/2003 | Kanevsky et al. |
| 6,622,018 | B1 | 9/2003 | Erekson |
| 6,631,271 | B1 | 10/2003 | Logan |
| 6,647,251 | B1 | 11/2003 | Siegle et al. |
| 6,650,877 | B1 | 11/2003 | Tarbouriech et al. |
| 6,650,894 | B1 | 11/2003 | Berstis et al. |
| 6,658,272 | B1 | 12/2003 | Lenchik et al. |
| 6,658,461 | B1 | 12/2003 | Mazo |
| 6,662,023 | B1 | 12/2003 | Helle |
| 6,681,120 | B1 | 1/2004 | Kim |
| 6,690,932 | B1 | 2/2004 | Barnier et al. |
| 6,701,148 | B1 | 3/2004 | Wilson et al. |
| 6,707,942 | B1 | 3/2004 | Cortopassi et al. |
| 6,711,399 | B1 | 3/2004 | Granier |
| 6,725,022 | B1 | 4/2004 | Clayton et al. |
| 6,728,531 | B1 | 4/2004 | Lee et al. |
| 6,738,643 | B1 | 5/2004 | Harris |
| 6,738,711 | B2 | 5/2004 | Ohmura et al. |
| 6,763,226 | B1 | 7/2004 | McZeal, Jr. |
| 6,772,174 | B1 | 8/2004 | Pettersson |
| 6,779,030 | B1 | 8/2004 | Dugan et al. |
| 6,788,928 | B2 | 9/2004 | Kohinata et al. |
| 6,795,715 | B1 | 9/2004 | Kubo et al. |
| 6,812,954 | B1 | 11/2004 | Priestman et al. |
| 6,819,939 | B2 | 11/2004 | Masamura |
| 6,820,055 | B2 | 11/2004 | Saindon et al. |
| 6,836,654 | B2 | 12/2004 | Decotignie |
| 6,865,372 | B2 | 3/2005 | Mauney et al. |
| 6,883,000 | B1 | 4/2005 | Gropper |
| 6,891,525 | B2 | 5/2005 | Ogoro |
| 6,895,084 | B1 | 5/2005 | Saylor et al. |
| 6,895,256 | B2 | 5/2005 | Harma et al. |
| 6,895,259 | B1 | 5/2005 | Blank nee Keller et al. |
| 6,898,321 | B1 | 5/2005 | Knee et al. |
| 6,898,765 | B2 | 5/2005 | Matthews, III et al. |
| 6,901,383 | B1 | 5/2005 | Ricketts et al. |
| 6,904,298 | B2 | 6/2005 | Arai et al. |
| 6,912,544 | B1 | 6/2005 | Weiner |
| 6,922,630 | B2 | 7/2005 | Maruyama et al. |
| 6,937,868 | B2 | 8/2005 | Himmel et al. |
| 6,947,728 | B2 | 9/2005 | Tagawa et al. |
| 6,954,645 | B2 | 10/2005 | Tsai et al. |
| 6,958,675 | B2 | 10/2005 | Maeda et al. |
| 6,961,559 | B1 | 11/2005 | Chow et al. |
| 6,968,184 | B2 | 11/2005 | Criss et al. |
| 6,968,206 | B1 | 11/2005 | Whitsey-Anderson |
| 6,992,699 | B1 | 1/2006 | Vance et al. |
| 6,999,802 | B2 | 2/2006 | Kim |
| 7,003,598 | B2 | 2/2006 | Kavanagh |
| 7,007,239 | B1 | 2/2006 | Hawkins et al. |
| 7,012,999 | B2 | 3/2006 | Ruckart |
| 7,028,077 | B2 | 4/2006 | Toshimitsu et al. |
| 7,035,666 | B2 | 4/2006 | Silberfenig |
| 7,058,356 | B2 | 6/2006 | Slotznick |
| 7,076,052 | B2 | 7/2006 | Yoshimura |
| 7,081,832 | B2 | 7/2006 | Nelson et al. |
| 7,085,739 | B1 | 8/2006 | Winter et al. |
| 7,089,298 | B2 | 8/2006 | Nyman et al. |
| 7,106,846 | B2 | 9/2006 | Nguyen et al. |
| 7,117,152 | B1 | 10/2006 | Mukherji et al. |
| 7,117,504 | B2 | 10/2006 | Smith et al. |
| 7,126,951 | B2 | 10/2006 | Belcea et al. |
| 7,127,238 | B2 | 10/2006 | Vandermeijden et al. |
| 7,127,271 | B1 | 10/2006 | Fujisaki |
| 7,130,630 | B1 | 10/2006 | Enzmann et al. |
| 7,142,810 | B2 | 11/2006 | Oesterling |
| 7,142,890 | B2 | 11/2006 | Irimajiri et al. |
| 7,190,880 | B2 | 3/2007 | Cookson et al. |
| 7,218,916 | B2 | 5/2007 | Nonami |
| 7,224,851 | B2 | 5/2007 | Kinjo |
| 7,233,795 | B1 | 6/2007 | Ryden |
| 7,239,742 | B2 | 7/2007 | Ohtani et al. |
| 7,251,255 | B1 | 7/2007 | Young |
| 7,260,416 | B2 | 8/2007 | Shippee |
| 7,266,186 | B1 | 9/2007 | Henderson |
| 7,274,952 | B2 | 9/2007 | Hayashi |
| 7,346,373 | B2 | 3/2008 | Kim |
| 7,426,264 | B1 | 9/2008 | Henderson |
| 7,489,768 | B1 | 2/2009 | Strietzel |
| 7,551,899 | B1 | 6/2009 | Nicolas et al. |
| 2001/0000249 | A1 | 4/2001 | Oba et al. |
| 2001/0005826 | A1 | 6/2001 | Shibuya |
| 2001/0011293 | A1 | 8/2001 | Murakami et al. |
| 2001/0029425 | A1 | 10/2001 | Myr |
| 2001/0035829 | A1 | 11/2001 | Yu et al. |
| 2001/0037191 | A1 | 11/2001 | Furuta et al. |
| 2001/0041590 | A1 | 11/2001 | Silberfenig et al. |
| 2002/0002705 | A1* | 1/2002 | Byrnes et al. .................. 725/14 |
| 2002/0004701 | A1 | 1/2002 | Nakano |
| 2002/0006804 | A1 | 1/2002 | Mukai et al. |
| 2002/0016724 | A1 | 2/2002 | Yang et al. |
| 2002/0019225 | A1 | 2/2002 | Miyashita |
| 2002/0026348 | A1 | 2/2002 | Fowler et al. |
| 2002/0028690 | A1 | 3/2002 | McKenna et al. |
| 2002/0031120 | A1 | 3/2002 | Rakib |
| 2002/0034292 | A1 | 3/2002 | Tuoriniemi et al. |
| 2002/0036642 | A1 | 3/2002 | Kwon et al. |
| 2002/0038219 | A1 | 3/2002 | Yanay et al. |
| 2002/0039914 | A1 | 4/2002 | Hama et al. |
| 2002/0047787 | A1 | 4/2002 | Mikkola et al. |
| 2002/0049742 | A1 | 4/2002 | Chan et al. |
| 2002/0055350 | A1 | 5/2002 | Gupte et al. |
| 2002/0058497 | A1 | 5/2002 | Jeong |
| 2002/0058531 | A1 | 5/2002 | Terasaki et al. |
| 2002/0065037 | A1 | 5/2002 | Messina et al. |
| 2002/0065604 | A1 | 5/2002 | Sekiyama |
| 2002/0066115 | A1 | 5/2002 | Wendelrup |
| 2002/0068585 | A1 | 6/2002 | Chan et al. |

2002/0068599 A1 6/2002 Rodriguez et al.
2002/0082059 A1 6/2002 Nariai et al.
2002/0085700 A1 7/2002 Metcalf
2002/0094806 A1 7/2002 Kamimura
2002/0098857 A1 7/2002 Ishii
2002/0102960 A1 8/2002 Lechner
2002/0103872 A1 8/2002 Watanabe
2002/0110246 A1 8/2002 Gosior et al.
2002/0115469 A1 8/2002 Rekimoto et al.
2002/0120589 A1 8/2002 Aoki
2002/0120718 A1 8/2002 Lee
2002/0123336 A1 9/2002 Kamada
2002/0127997 A1 9/2002 Karlstedt et al.
2002/0133342 A1 9/2002 McKenna
2002/0137470 A1 9/2002 Baron et al.
2002/0137526 A1 9/2002 Shinohara
2002/0142763 A1 10/2002 Kolsky
2002/0147645 A1 10/2002 Alao et al.
2002/0151326 A1 10/2002 Awada et al.
2002/0151327 A1 10/2002 Levitt
2002/0154632 A1 10/2002 Wang et al.
2002/0157101 A1 10/2002 Schrader et al.
2002/0164996 A1 11/2002 Dorenbosch
2002/0165850 A1 11/2002 Roberts et al.
2002/0168959 A1 11/2002 Noguchi et al.
2002/0173344 A1 11/2002 Cupps et al.
2002/0177407 A1 11/2002 Mitsumoto
2002/0178009 A1 11/2002 Firman
2002/0178225 A1 11/2002 Madenberg et al.
2002/0183045 A1 12/2002 Emmerson et al.
2002/0191951 A1 12/2002 Sodeyama et al.
2002/0196378 A1 12/2002 Slobodin et al.
2002/0198813 A1 12/2002 Patterson, Jr. et al.
2002/0198936 A1 12/2002 McIntyre et al.
2003/0003967 A1 1/2003 Ito
2003/0007556 A1 1/2003 Oura et al.
2003/0013483 A1 1/2003 Ausems et al.
2003/0014286 A1 1/2003 Cappellini
2003/0017857 A1 1/2003 Kitson et al.
2003/0018744 A1 1/2003 Johanson et al.
2003/0018748 A1 1/2003 McKenna
2003/0032389 A1 2/2003 Kim et al.
2003/0032406 A1 2/2003 Minear et al.
2003/0033214 A1 2/2003 Mikkelsen et al.
2003/0038800 A1 2/2003 Kawahara
2003/0045301 A1 3/2003 Wollrab
2003/0045311 A1 3/2003 Larikka et al.
2003/0045329 A1 3/2003 Kinoshita
2003/0045996 A1 3/2003 Yamazaki et al.
2003/0050776 A1 3/2003 Blair
2003/0052964 A1 3/2003 Priestman et al.
2003/0055994 A1 3/2003 Herrmann et al.
2003/0061606 A1 3/2003 Hartwig et al.
2003/0063732 A1 4/2003 Mcknight
2003/0065784 A1 4/2003 Herrod
2003/0065805 A1 4/2003 Barnes, Jr.
2003/0069693 A1 4/2003 Snapp et al.
2003/0073432 A1 4/2003 Meade, II
2003/0083055 A1 5/2003 Riordan et al.
2003/0083873 A1 5/2003 Ross et al.
2003/0084121 A1 5/2003 De Boor et al.
2003/0093503 A1 5/2003 Yamaki et al.
2003/0093790 A1 5/2003 Logan et al.
2003/0099367 A1* 5/2003 Okamura ........................ 381/77
2003/0100326 A1 5/2003 Grube et al.
2003/0107580 A1 6/2003 Egawa et al.
2003/0109251 A1 6/2003 Fujito et al.
2003/0114191 A1 6/2003 Nishimura
2003/0115240 A1 6/2003 Cho
2003/0117316 A1 6/2003 Tischer
2003/0119479 A1 6/2003 Arima et al.
2003/0119485 A1 6/2003 Ogasawara
2003/0119562 A1 6/2003 Kokubo
2003/0122779 A1 7/2003 Martin et al.
2003/0132928 A1 7/2003 Kori
2003/0135563 A1 7/2003 Bodin et al.
2003/0142957 A1 7/2003 Young et al.
2003/0148772 A1 8/2003 Ben-Ari
2003/0153364 A1 8/2003 Osann, Jr.
2003/0155413 A1 8/2003 Kovesdi et al.
2003/0157929 A1 8/2003 Janssen et al.
2003/0166399 A1 9/2003 Tokkonen et al.
2003/0171113 A1 9/2003 Choi
2003/0174685 A1 9/2003 Hasebe
2003/0181201 A1 9/2003 Bomze et al.
2003/0204562 A1 10/2003 Hwang
2003/0220835 A1 11/2003 Barnes, Jr.
2003/0222762 A1 12/2003 Beigl et al.
2003/0224760 A1 12/2003 Day
2003/0227570 A1 12/2003 Kim et al.
2003/0229900 A1 12/2003 Reisman
2003/0236866 A1 12/2003 Light
2004/0003307 A1 1/2004 Tsuji
2004/0029640 A1 2/2004 Masuyama et al.
2004/0033795 A1 2/2004 Walsh et al.
2004/0034692 A1 2/2004 Eguchi et al.
2004/0082321 A1 4/2004 Kontianinen
2004/0103303 A1 5/2004 Yamauchi et al.
2004/0107072 A1 6/2004 Dietrich et al.
2004/0114732 A1 6/2004 Choe et al.
2004/0117108 A1 6/2004 Nemeth
2004/0137893 A1 7/2004 Muthuswamy et al.
2004/0137983 A1 7/2004 Kerr et al.
2004/0142678 A1 7/2004 Krasner
2004/0157664 A1 8/2004 Link
2004/0166832 A1 8/2004 Portman et al.
2004/0166879 A1 8/2004 Meadows et al.
2004/0174863 A1 9/2004 Caspi et al.
2004/0183937 A1 9/2004 Viinikanoja et al.
2004/0203490 A1 10/2004 Kaplan
2004/0203520 A1 10/2004 Schirtzinger et al.
2004/0203577 A1 10/2004 Forman et al.
2004/0203904 A1 10/2004 Gwon et al.
2004/0203909 A1 10/2004 Koster
2004/0204035 A1 10/2004 Raghuram et al.
2004/0204126 A1 10/2004 Reyes et al.
2004/0204821 A1 10/2004 Tu
2004/0204848 A1 10/2004 Matsuo et al.
2004/0209649 A1 10/2004 Lord
2004/0216037 A1 10/2004 Hishida et al.
2004/0218738 A1 11/2004 Arai et al.
2004/0219951 A1 11/2004 Holder
2004/0222988 A1 11/2004 Donnelly
2004/0235513 A1 11/2004 O'Connell
2004/0235520 A1 11/2004 Cadiz et al.
2004/0242269 A1 12/2004 Fadell
2004/0248586 A1 12/2004 Patel et al.
2004/0252197 A1 12/2004 Fraley et al.
2004/0257208 A1 12/2004 Huang et al.
2005/0004749 A1 1/2005 Park
2005/0020301 A1 1/2005 Lee
2005/0026629 A1 2/2005 Contractor
2005/0036509 A1 2/2005 Acharya et al.
2005/0048987 A1 3/2005 Glass
2005/0070257 A1 3/2005 Saarinen et al.
2005/0090768 A1 4/2005 Brattesani et al.
2005/0097038 A1 5/2005 Yu et al.
2005/0107119 A1 5/2005 Lee et al.
2005/0113080 A1 5/2005 Nishimura
2005/0120225 A1 6/2005 Kirsch et al.
2005/0136949 A1 6/2005 Barnes et al.
2005/0153681 A1 7/2005 Hanson
2005/0153745 A1 7/2005 Smethers
2005/0164684 A1 7/2005 Chen et al.
2005/0165871 A1 7/2005 Barrs, II et al.
2005/0166242 A1 7/2005 Matsumoto et al.
2005/0186954 A1 8/2005 Kenney
2005/0191969 A1 9/2005 Mousseau
2005/0235312 A1 10/2005 Karaguz et al.
2005/0257149 A1 11/2005 Kamiya et al.
2005/0261945 A1 11/2005 Mougin et al.
2006/0015819 A1 1/2006 Hawkins et al.
2006/0031407 A1 2/2006 Dispensa et al.
2006/0041923 A1 2/2006 McQuaide, Jr.
2006/0052100 A1 3/2006 Almgren
2006/0073820 A1 4/2006 Craswell et al.
2006/0133590 A1 6/2006 Jiang
2006/0140387 A1 6/2006 Boldt

| | | | |
|---|---|---|---|
| 2006/0143655 | A1 | 6/2006 | Ellis et al. |
| 2006/0166650 | A1 | 7/2006 | Berger et al. |
| 2006/0206913 | A1 | 9/2006 | Jerding et al. |
| 2006/0234758 | A1 | 10/2006 | Parupudi et al. |
| 2006/0284732 | A1 | 12/2006 | Brock-Fisher |
| 2007/0061845 | A1 | 3/2007 | Barnes, Jr. |
| 2007/0109262 | A1 | 5/2007 | Oshima et al. |
| 2007/0135145 | A1 | 6/2007 | Lee et al. |
| 2007/0142047 | A1 | 6/2007 | Heeschen |
| 2007/0190944 | A1 | 8/2007 | Doan et al. |
| 2007/0204014 | A1 | 8/2007 | Greer et al. |
| 2007/0218891 | A1 | 9/2007 | Cox |
| 2007/0260456 | A1 | 11/2007 | Proux et al. |
| 2007/0262848 | A1 | 11/2007 | Berstis et al. |
| 2008/0014917 | A1 | 1/2008 | Rhoads et al. |
| 2008/0016526 | A1 | 1/2008 | Asmussen |
| 2008/0016534 | A1 | 1/2008 | Ortiz et al. |
| 2008/0058005 | A1 | 3/2008 | Zicker et al. |
| 2008/0194273 | A1 | 8/2008 | Kansal et al. |
| 2008/0242283 | A1 | 10/2008 | Ruckart |
| 2008/0250459 | A1 | 10/2008 | Roman |
| 2009/0197641 | A1 | 8/2009 | Rofougaran et al. |
| 2010/0030557 | A1 | 2/2010 | Molloy et al. |
| 2010/0099457 | A1 | 4/2010 | Kim |

* cited by examiner

Fig. 11

Table #1

| | |
|---|---|
| Audio Info #1 | Scott |
| Audio Info #2 | Carol |
| Audio Info #3 | Peter |
| Audio Info #4 | Amy |
| Audio Info #5 | Brian |

Fig. 12

Table #2

| | |
|---|---|
| Scott | (916) 411-2526 |
| Carol | (418) 675-6566 |
| Peter | (220) 890-1567 |
| Amy | (615) 125-3411 |
| Brian | (042) 645-2097 |

Table #A

| | |
|---|---|
| Audio Info #1 | (916) 411-2526 |
| Audio Info #2 | (418) 675-6566 |
| Audio Info #3 | (220) 890-1567 |
| Audio Info #4 | (615) 125-3411 |
| Audio Info #5 | (042) 645-2097 |

Fig. 119

Database Hd

| <Type> | <Keyword> | Tel | <Loc> | Att.Inf |
|---|---|---|---|---|
| Store St1 | clean, big,... | xxxx | (x,y,z) | xxxx |
| Store St2 | cheap, ... | xxxx | (x,y,z) | xxxx |
| Rest. Rt1 | Chinese... | xxxx | (x,y,z) | xxxx |
| Rest. Rt2 | cheap, ... | xxxx | (x,y,z) | xxxx |
| Theater Th1 | SF, big,... | xxxx | (x,y,z) | xxxx |
| Theater Th2 | romance,... | xxxx | (x,y,z) | xxxx |
| Lodge Lg1 | xxx, xxx,... | xxxx | (x,y,z) | xxxx |
| Lodge Lg2 | xxx, xxx,... | xxxx | (x,y,z) | xxxx |
| Railway St. | | | | |
| Rst1 | xxx, xxx,... | xxxx | (x,y,z) | xxxx |
| Rst2 | xxx, xxx,... | xxxx | (x,y,z) | xxxx |
| Rst3 | xxx, xxx,... | xxxx | (x,y,z) | xxxx |
| Rst4 | xxx, xxx,... | xxxx | (x,y,z) | xxxx |
| Gas St. | | | | |
| Gst1 | xxx, xxx,... | xxxx | (x,y,z) | xxxx |
| Gst2 | xxx, xxx,... | xxxx | (x,y,z) | xxxx |

3D Map Storage Area
Hd1

Fig. 120

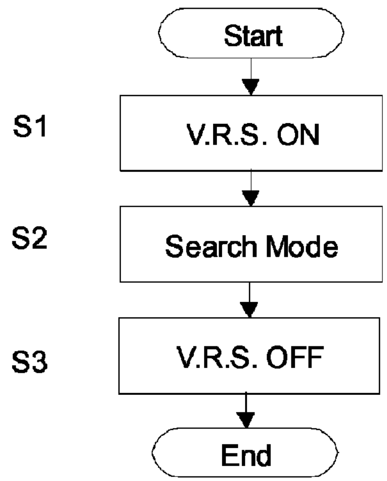

Fig. 139

Customers' Ignition Key Code Storage Area Hh

| | |
|---|---|
| Automobile AM1 | Ignition Key Code IKC1 |
| Automobile AM2 | Ignition Key Code IKC2 |
| Automobile AM3 | Ignition Key Code IKC3 |
| Automobile AM4 | Ignition Key Code IKC4 |
| Automobile AM5 | Ignition Key Code IKC5 |
| Automobile AM6 | Ignition Key Code IKC6 |
| Automobile AM7 | Ignition Key Code IKC7 |
| Automobile AM8 | Ignition Key Code IKC8 |
| Automobile AM9 | Ignition Key Code IKC9 |

Fig. 140

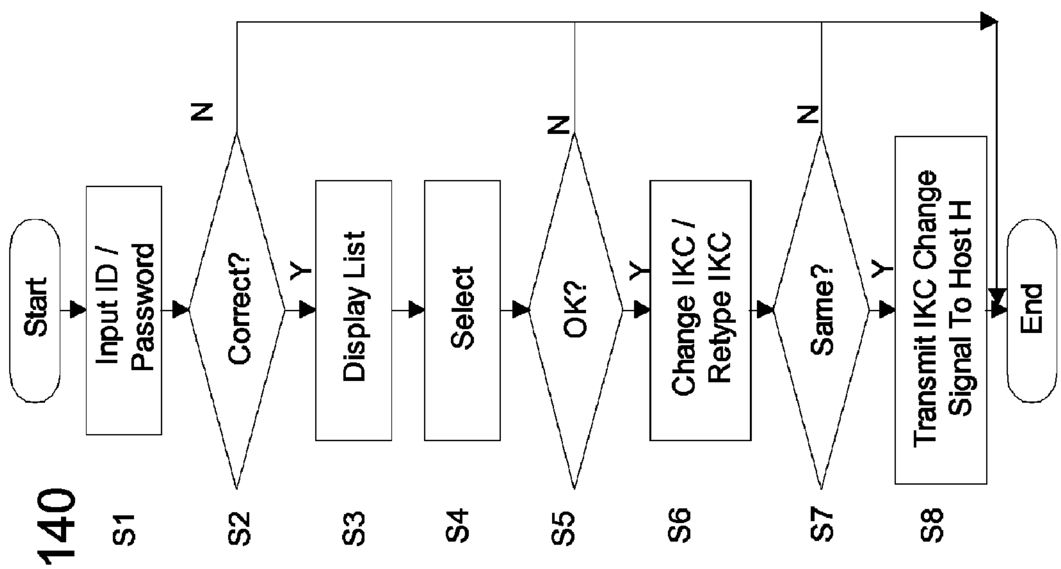

Ignition Key Code Storage Area 2066c

| | |
|---|---|
| Automobile AMa | Ignition Key Code IKCa |
| Automobile AMb | Ignition Key Code IKCb |
| Automobile AMc | Ignition Key Code IKCc |

Fig. 145

Ignition Key Code Storage Area 2066c

| | |
|---|---|
| Automobile AMa | Ignition Key Code IKCa |
| Automobile AMb | Ignition Key Code IKCb |
| Automobile AMc | Ignition Key Code IKCc |
| Automobile AMd | Ignition Key Code IKCd |
| Automobile AMe | Ignition Key Code IKCe |
| Motorcycle MCa | Ignition Key Code IKCf |
| Motorcycle MCb | Ignition Key Code IKCg |
| Motorcycle MCc | Ignition Key Code IKCh |
| Entrance Dr ED | Key Code KCa |
| Back Door BD | Key Code KCb |
| Side Door SD | Key Code KCc |

Fig. 146

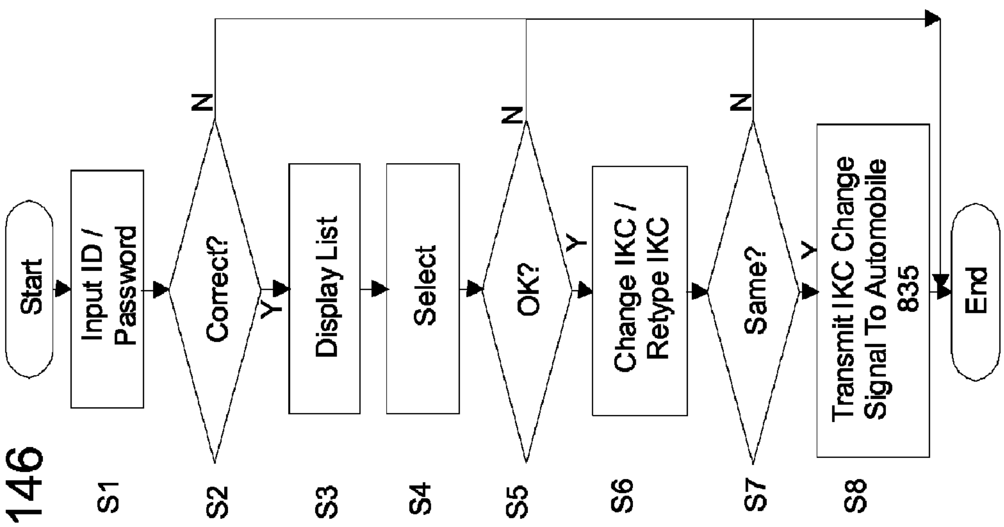

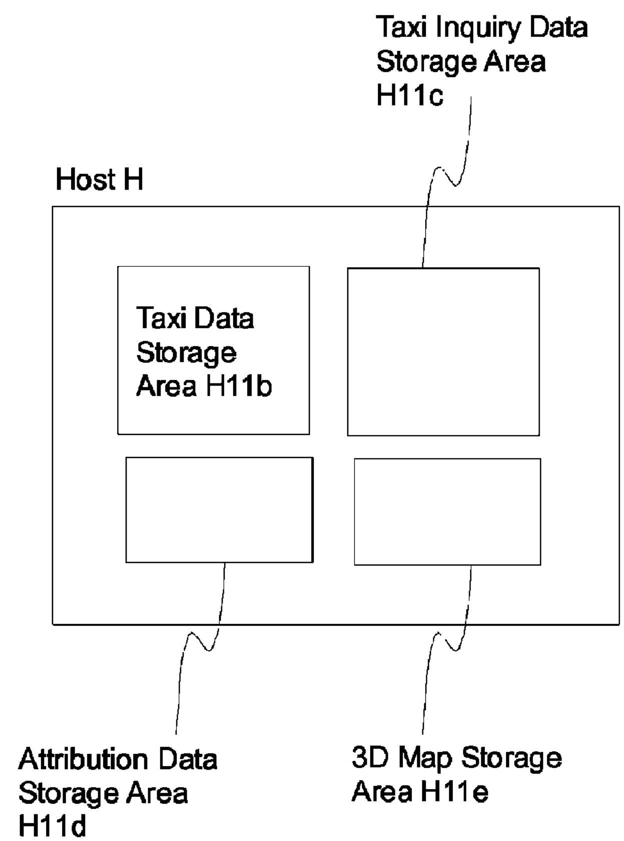

Fig. 220

Taxi Data Storage Area H11b

| Taxi ID | Current Location | Status | Destination | Max Passenger # | Company | Rate |
|---|---|---|---|---|---|---|
| Taxi #1 | x1, y1, z1 | Occupied | x9, y9, z9 | 4 | A Taxi Corp. | $2/mile |
| Taxi #2 | x2, y2, z2 | Occupied | x10, y10, z10 | 4 | A Taxi Corp. | $2/mile |
| Taxi #3 | x3, y3, z3 | Vacant | Null | 4 | A Taxi Corp. | $2/mile |
| Taxi #4 | x4, y4, z4 | Vacant | Null | 4 | A Taxi Corp. | $2/mile |
| Taxi #5 | x5, y5, z5 | Occupied | x11, y11, z11 | 8 | B Taxi Corp. | $3/mile |
| Taxi #6 | x6, y6, z6 | Occupied | x12, y12, z12 | 8 | B Taxi Corp. | $3/mile |
| Taxi #7 | x7, y7, z7 | Vacant | Null | 4 | B Taxi Corp. | $3/mile |
| Taxi #8 | x8, y8, z8 | Vacant | Null | 4 | B Taxi Corp. | $3/mile |

Fig. 247

Users' Address Book Data Storage Area H12a

| | |
|---|---|
| User A | Address Book Data ABDa |
| User B | Address Book Data ABDb |
| User C | Address Book Data ABDc |
| User D | Address Book Data ABDd |
| User E | Address Book Data ABDe |

Fig. 248

Address Book Data ABDa

| | |
|---|---|
| User F | Address Data ADf |
| User G | Address Data ADg |
| User H | Address Data ADh |
| User I | Address Data ADi |
| User J | Address Data ADj |

Address Book Data ABDa

| | |
|---|---|
| User F | Address Data ADf |
| User G | Address Data ADg |
| User H | Address Data ADh |
| User I | Address Data ADi |
| User J | Address Data ADj |
| User K | Address Data ADk (New Address) |

Address Book Data Storage Area 20612c

| | |
|---|---|
| User F | Address Data ADf |
| User G | Address Data ADg |
| User H | Address Data ADh |
| User I | Address Data ADi |
| User J | Address Data ADj |
| User K | Address Data ADk (New Address) |

Fig. 257

Address Book Data ABDa

| | |
|---|---|
| User F | Address Data ADf |
| User G | Address Data ADg |
| User H | Address Data ADh |
| User I | Address Data ADi |
| User J | Address Data ADj (Modified) |

Fig. 258

Address Book Data Storage Area 20612c

| | |
|---|---|
| User F | Address Data ADf |
| User G | Address Data ADg |
| User H | Address Data ADh |
| User I | Address Data ADi |
| User J | Address Data ADj (Modified) |

Fig. 271

Address Book Data Storage Area 20613c

| | |
|---|---|
| User A | Address Data ADa |
| User B | Address Data ADb |
| User C | Address Data ADc |
| User D | Address Data ADd |
| User E | Address Data ADe |
| User F | Address Data ADf (New Address) |

Fig. 272

Users' Address Book Data Storage Area H13a

| | |
|---|---|
| User A | Address Data ADa |
| User B | Address Data ADb |
| User C | Address Data ADc |
| User D | Address Data ADd |
| User E | Address Data ADe (Modified) |

Other Users' Business Card Data Storage Area 20636b2

| User ID | Business Card Data |
| --- | --- |
| 20636UI1 | 20636CD1 |
| 20636UI2 | 20636CD2 |
| 20636UI3 | 20636CD3 |
| 20636UI4 | 20636CD4 |

Business Card Software Storage Area 20636c

Fig. 361

TV Program Data Storage Area H52b1

| TV Program ID | TV Program Data |
|---|---|
| TV Program #1 | TV Program Data #1 |
| TV Program #2 | TV Program Data #2 |
| TV Program #3 | TV Program Data #3 |
| TV Program #4 | TV Program Data #4 |
| TV Program #5 | TV Program Data #5 |
| TV Program #6 | TV Program Data #6 |

Fig. 362

TV Program Time Frame Data Storage Area H52b2

| TV Program ID | TV Program Time Frame Data #1 | TV Program Time Frame Data #2 |
|---|---|---|
| TV Program #1 | 19:00 - 19:30 | 20:30 - 21:00 |
| TV Program #2 | 19:30 - 20:30 | Null |
| TV Program #3 | 21:30 - 22:00 | Null |
| TV Program #4 | 21:00 - 22:00 | Null |
| TV Program #5 | 19:00 - 20:00 | 20:30 - 21:30 |
| TV Program #6 | 20:00 - 20:30 | Null |

Fig. 363

TV Program Time Frame Data Storage Area H52b2

| TV Program ID | TV Program Time Frame Data #1 | Re-run Flag |
|---|---|---|
| TV Program #1 | 19:00 - 19:30 | 0 |
| TV Program #2 | 19:30 - 20:30 | 0 |
| TV Program #3 | 21:30 - 22:00 | 0 |
| TV Program #4 | 21:00 - 22:00 | 0 |
| TV Program #5 | 19:00 - 20:00 | 0 |
| TV Program #6 | 20:00 - 20:30 | 0 |
| TV Program #1 | 20:30 - 21:00 | 1 |
| TV Program #5 | 20:30 - 21:30 | 1 |

Fig. 364

TV Program Channel Data Storage Area H52b3

| TV Program ID | TV Program Channel Data |
|---|---|
| TV Program #1 | Ch 1 |
| TV Program #2 | Ch 1 |
| TV Program #3 | Ch 2 |
| TV Program #4 | Ch 1 |
| TV Program #5 | Ch 2 |
| TV Program #6 | Ch 2 |

Fig. 365

TV Program Actors/Actresses Data Storage Area H52b4

| TV Program ID | Actors/Actresses Data |
|---|---|
| TV Program #1 | Actor #1, Actress #2 |
| TV Program #2 | Actor #3, Actress #3, Actress #4 |
| TV Program #3 | Actress #5, Actress #6 |
| TV Program #4 | Actor #7, Actor #8 |
| TV Program #5 | Actress #9 |
| TV Program #6 | Actor #10, Actor #11, Actress #12 |

Fig. 366

TV Program Category Data Storage Area H52b5

| TV Program ID | Category Data |
|---|---|
| TV Program #1 | Science Fiction |
| TV Program #2 | Situation Comedy |
| TV Program #3 | News |
| TV Program #4 | Documentary |
| TV Program #5 | Science Fiction |
| TV Program #6 | Situation Comedy |

Fig. 367

TV Program Summary Data Storage Area H52b6

| TV Program ID | Summary Data |
|---|---|
| TV Program #1 | Summary #1 |
| TV Program #2 | Summary #2 |
| TV Program #3 | Summary #3 |
| TV Program #4 | Summary #4 |
| TV Program #5 | Summary #5 |
| TV Program #6 | Summary #6 |

Fig. 368

Timer Recording TV Program Relating Data Storage Area H52b7

User #1

| TV Program ID | TV Program Channel Data | TV Program Time Frame Data #1 | Record Completed Flag Data | TV Program Data |
|---|---|---|---|---|
| | | | | |
| | | | | |

User #2

| TV Program ID | TV Program Channel Data | TV Program Time Frame Data #1 | Record Completed Flag Data | TV Program Data |
|---|---|---|---|---|
| | | | | |
| | | | | |

User #3

| TV Program ID | TV Program Channel Data | TV Program Time Frame Data #1 | Record Completed Flag Data | TV Program Data |
|---|---|---|---|---|
| | | | | |
| | | | | |

Fig. 373

TV Program Time Frame Data Storage Area 20652b2

| TV Program ID | TV Program Time Frame Data #1 | TV Program Time Frame Data #2 |
|---|---|---|
| TV Program #1 | 19:00 - 19:30 | 20:30 - 21:00 |
| TV Program #2 | 19:30 - 20:30 | Null |
| TV Program #3 | 21:30 - 22:00 | Null |
| TV Program #4 | 21:00 - 22:00 | Null |
| TV Program #5 | 19:00 - 20:00 | 20:30 - 21:30 |
| TV Program #6 | 20:00 - 20:30 | Null |

Fig. 374

TV Program Time Frame Data Storage Area 20652b2

| TV Program ID | TV Program Time Frame Data #1 | Re-run Flag Data |
|---|---|---|
| TV Program #1 | 19:00 - 19:30 | 0 |
| TV Program #2 | 19:30 - 20:30 | 0 |
| TV Program #3 | 21:30 - 22:00 | 0 |
| TV Program #4 | 21:00 - 22:00 | 0 |
| TV Program #5 | 19:00 - 20:00 | 0 |
| TV Program #6 | 20:00 - 20:30 | 0 |
| TV Program #1 | 20:30 - 21:00 | 1 |
| TV Program #5 | 20:30 - 21:30 | 1 |

TV Program Channel Data Storage Area 20652b3

| **TV Program ID** | **TV Program Channel Data** |
|---|---|
| TV Program #1 | Ch 1 |
| TV Program #2 | Ch 1 |
| TV Program #3 | Ch 2 |
| TV Program #4 | Ch 1 |
| TV Program #5 | Ch 2 |
| TV Program #6 | Ch 2 |

Fig. 377

TV Program Actors/Actresses Data Storage Area 20652b4

| TV Program ID | Actors/Actresses Data |
|---|---|
| TV Program #1 | Actor #1, Actress #2 |
| TV Program #2 | Actor #3, Actress #3, Actress #4 |
| TV Program #3 | Actress #5, Actress #6 |
| TV Program #4 | Actor #7, Actor #8 |
| TV Program #5 | Actress #9 |
| TV Program #6 | Actor #10, Actor #11, Actress #12 |

Fig. 378

TV Program Category Data Storage Area 20652b5

| TV Program ID | Category Data |
|---|---|
| TV Program #1 | Science Fiction |
| TV Program #2 | Situation Comedy |
| TV Program #3 | News |
| TV Program #4 | Documentary |
| TV Program #5 | Science Fiction |
| TV Program #6 | Situation Comedy |

Fig. 379

TV Program Summary Data Storage
Area 20652b6

| TV Program ID | Summary Data |
|---|---|
| TV Program #1 | Summary #1 |
| TV Program #2 | Summary #2 |
| TV Program #3 | Summary #3 |
| TV Program #4 | Summary #4 |
| TV Program #5 | Summary #5 |
| TV Program #6 | Summary #6 |

Fig. 380

Timer Recording TV Program Relating
Data Storage Area 20652b7

User #1

| TV Progra m ID | TV Program Channel Data | TV Program Time Frame Data #1 | Record Complete d Flag Data | TV Program Data |
|---|---|---|---|---|
| | | | | |
| | | | | |

Keyword Search Timer Recording Data Storage Area PC52b

Timer Recording TV Program Relating Data Storage Area PC52b7

| TV Program ID | TV Program Channel Data | TV Program Time Frame Data #1 | Record Completed Flag Data | TV Program Data |
|---|---|---|---|---|
| | | | | |
| | | | | |

Fig. 437

Geographic Area Data Storage Area
H53b1

| **Location ID** | **Geographic Area Data** |
| --- | --- |
| Location #1 | Geographic Area Data#1 |
| Location #2 | Geographic Area Data#2 |
| Location #3 | Geographic Area Data#3 |
| Location #4 | Geographic Area Data#4 |

Fig. 438

Weather Forecast Data Storage Area
H53b2

| **Location ID** | **Weather Forecast Data** |
| --- | --- |
| Location #1 | Sunny |
| Location #2 | Sunny |
| Location #3 | Cloudy |
| Location #4 | Cloudy |

Fig. 439

Location Name Data Storage Area
H53b3

| Location ID | Location Name Data |
|---|---|
| Location #1 | Sacramento, CA |
| Location #2 | San Jose, CA |
| Location #3 | San Francisco, CA |
| Location #4 | San Mateo, CA |

Fig. 440

Calculated GPS Data Storage Area
H53b4

| User ID | Calculated GPS Data |
|---|---|
| User #1 | x1, y1, z1 |
| User #2 | x2, y2, z2 |
| User #3 | x3, y3, z3 |

Fig. 445

Geographic Area Data Storage Area 20653b1

| Location ID | Geographic Area Data |
|---|---|
| Location #1 | Geographic Area Data#1 |
| Location #2 | Geographic Area Data#2 |
| Location #3 | Geographic Area Data#3 |
| Location #4 | Geographic Area Data#4 |

Fig. 446

Weather Forecast Data Storage Area 20653b2

| Location ID | Weather Forecast Data |
|---|---|
| Location #1 | Sunny |
| Location #2 | Sunny |
| Location #3 | Cloudy |
| Location #4 | Cloudy |

Fig. 447

Location Name Data Storage Area 20653b3

| Location ID | Location Name Data |
|---|---|
| Location #1 | Sacramento, CA |
| Location #2 | San Jose, CA |
| Location #3 | San Francisco, CA |
| Location #4 | San Mateo, CA |

Fig. 448

Calculated GPS Data Storage Area 20653b4

| User ID | Calculated GPS Data |
|---|---|
| User #1 | x1, y1, z1 |

Fig. 471

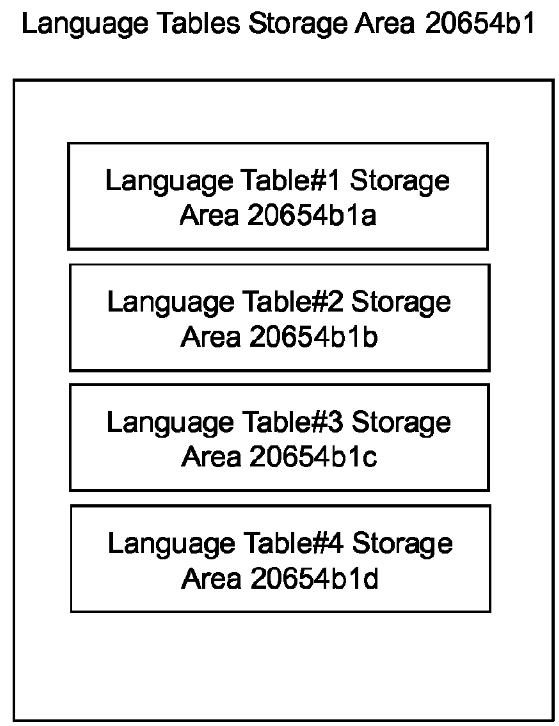

Fig. 472

Language Table#1 Storage Area 20654b1a

| Language Item ID | Language Text |
|---|---|
| Language Item#1 | Open file |
| Language Item#2 | Close file |
| Language Item#3 | Delete |
| Language Item#4 | Copy |
| Language Item#5 | Cut |
| Language Item#6 | Paste |
| Language Item#7 | Insert |
| Language Item#8 | File |
| Language Item#9 | Edit |
| Language Item#10 | View |
| Language Item#11 | Format |
| Language Item#12 | Tools |
| Language Item#13 | Window |
| Language Item#14 | Help |
| Language Item#15 | My Network |
| Language Item#16 | Trash |
| Language Item#17 | Local Disk |
| Language Item#18 | Save |
| Language Item#19 | Yes |
| Language Item#20 | No |
| Language Item#21 | Cancel |

Fig. 473

Language Table#2 Storage Area
20654b1b

| Language Item ID | Language Text |
|---|---|
| Language Item#1 | 開く |
| Language Item#2 | 閉じる |
| Language Item#3 | 削除 |
| Language Item#4 | コピー |
| Language Item#5 | 切り取り |
| Language Item#6 | 貼り付け |
| Language Item#7 | 挿入 |
| Language Item#8 | ファイル |
| Language Item#9 | 編集 |
| Language Item#10 | 表示 |
| Language Item#11 | 書式 |
| Language Item#12 | ツール |
| Language Item#13 | ウィンドウ |
| Language Item#14 | ヘルプ |
| Language Item#15 | マイ ネットワーク |
| Language Item#16 | ごみ箱 |
| Language Item#17 | ローカル ディスク |
| Language Item#18 | 保存 |
| Language Item#19 | はい |
| Language Item#20 | いいえ |
| Language Item#21 | キャンセル |

Fig. 474

Language Table#3 Storage Area
20654b1c

| Language Item ID | Language Text |
|---|---|
| Language Item#1 | French#1 |
| Language Item#2 | French#2 |
| Language Item#3 | French#3 |
| Language Item#4 | French#4 |
| Language Item#5 | French#5 |
| Language Item#6 | French#6 |
| Language Item#7 | French#7 |
| Language Item#8 | French#8 |
| Language Item#9 | French#9 |
| Language Item#10 | French#10 |
| Language Item#11 | French#11 |
| Language Item#12 | French#12 |
| Language Item#13 | French#13 |
| Language Item#14 | French#14 |
| Language Item#15 | French#15 |
| Language Item#16 | French#16 |
| Language Item#17 | French#17 |
| Language Item#18 | French#18 |
| Language Item#19 | French#19 |
| Language Item#20 | French#20 |
| Language Item#21 | French#21 |

Fig. 475

Language Table#4 Storage Area
20654b1d

| Language Item ID | Language Text |
|---|---|
| Language Item#1 | German#1 |
| Language Item#2 | German#2 |
| Language Item#3 | German#3 |
| Language Item#4 | German#4 |
| Language Item#5 | German#5 |
| Language Item#6 | German#6 |
| Language Item#7 | German#7 |
| Language Item#8 | German#8 |
| Language Item#9 | German#9 |
| Language Item#10 | German#10 |
| Language Item#11 | German#11 |
| Language Item#12 | German#12 |
| Language Item#13 | German#13 |
| Language Item#14 | German#14 |
| Language Item#15 | German#15 |
| Language Item#16 | German#16 |
| Language Item#17 | German#17 |
| Language Item#18 | German#18 |
| Language Item#19 | German#19 |
| Language Item#20 | German#20 |
| Language Item#21 | German#21 |

Fig. 476

Language Type Data Storage Area
20654b2

| Language Table ID | Language Type |
|---|---|
| Language Table#1 | English |
| Language Table#2 | Japanese |
| Language Table#3 | French |
| Language Table#4 | German |

Fig. 477

Language Item Data Storage Area 20654b3

| **Language Item ID** | **Language Item** |
|---|---|
| Language Item#1 | Open file |
| Language Item#2 | Close file |
| Language Item#3 | Delete |
| Language Item#4 | Copy |
| Language Item#5 | Cut |
| Language Item#6 | Paste |
| Language Item#7 | Insert |
| Language Item#8 | File |
| Language Item#9 | Edit |
| Language Item#10 | View |
| Language Item#11 | Format |
| Language Item#12 | Tools |
| Language Item#13 | Window |
| Language Item#14 | Help |
| Language Item#15 | My Network |
| Language Item#16 | Trash |
| Language Item#17 | Local Disk |
| Language Item#18 | Save |
| Language Item#19 | Yes |
| Language Item#20 | No |
| Language Item#21 | Cancel |

Fig. 478

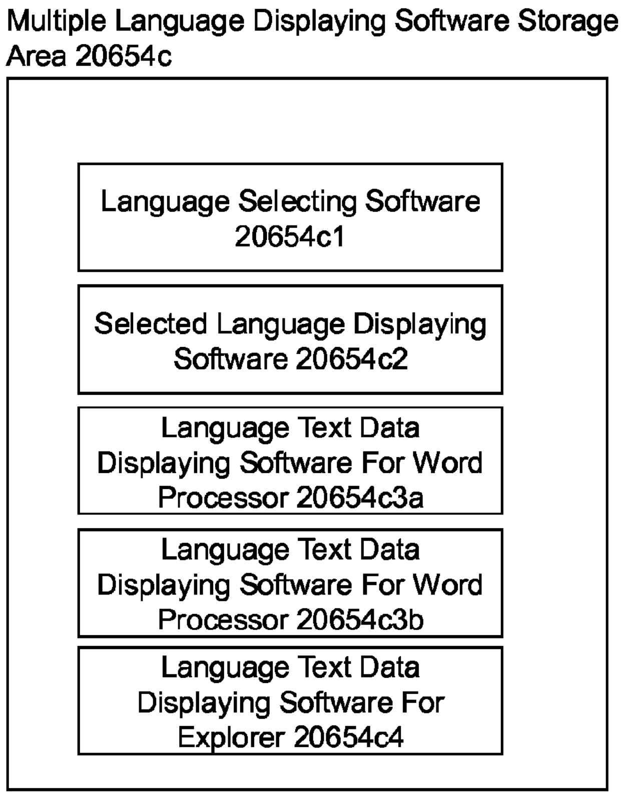

Caller's Personal Data Storage Area
20655b3

| Caller's Personal Data | Permitted Caller's Personal Data Flag |
|---|---|
| Caller's Name | 1 |
| Caller's Phone Number | 1 |
| Caller's Email Address | 1 |
| Caller's Home Address | 1 |
| Caller's Business Address | 0 |
| Caller's Title | 0 |
| Caller's Hobby | 0 |
| Caller's Blood Type | 0 |
| Caller's Gender | 0 |
| Caller's Age | 0 |
| Caller's Date Of Birth | 0 |

Fig. 501

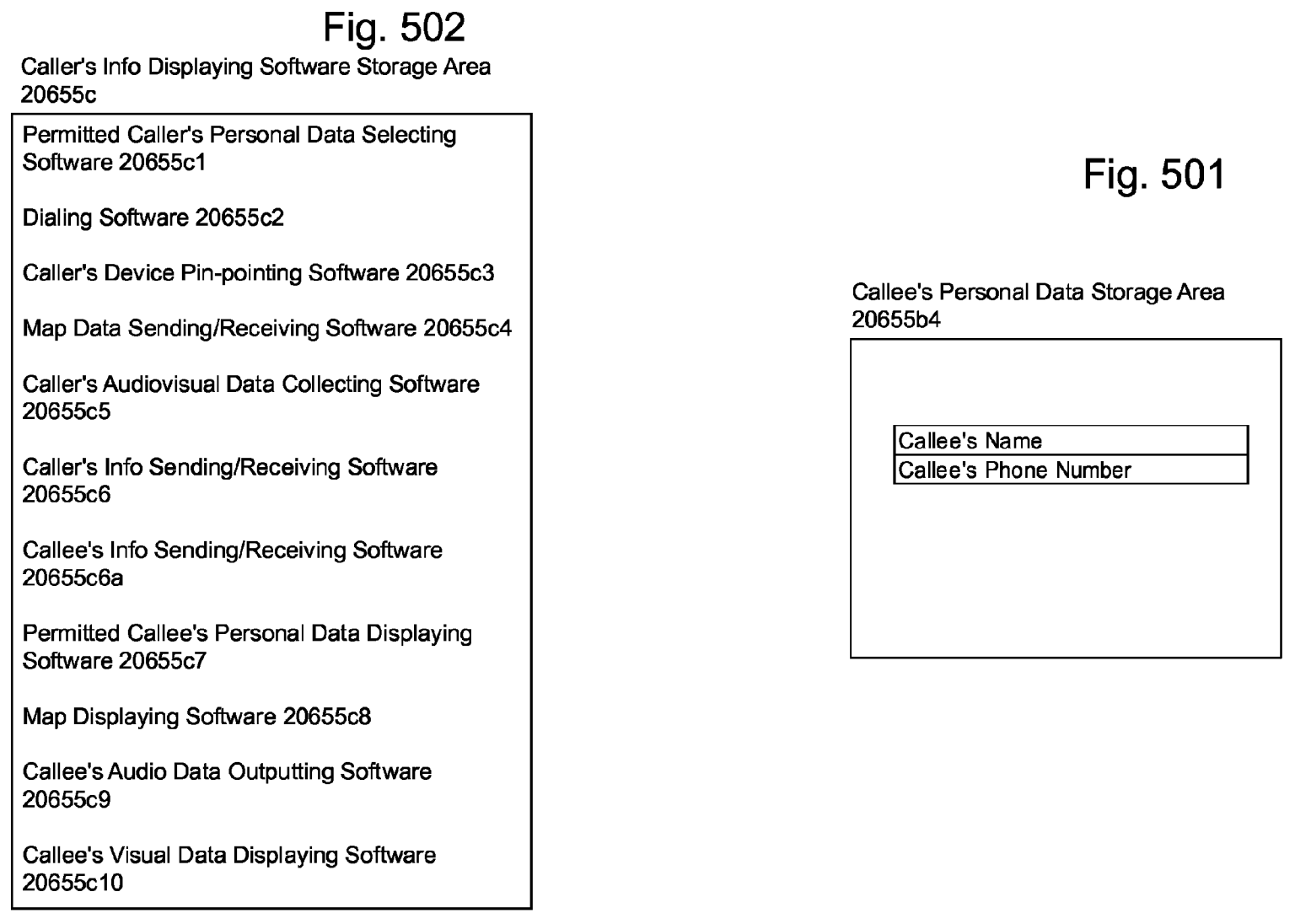

Callee's Personal Data Storage Area 20655b4

| |
|---|
| Callee's Name |
| Callee's Phone Number |

Fig. 502

Caller's Info Displaying Software Storage Area 20655c

Permitted Caller's Personal Data Selecting Software 20655c1

Dialing Software 20655c2

Caller's Device Pin-pointing Software 20655c3

Map Data Sending/Receiving Software 20655c4

Caller's Audiovisual Data Collecting Software 20655c5

Caller's Info Sending/Receiving Software 20655c6

Callee's Info Sending/Receiving Software 20655c6a

Permitted Callee's Personal Data Displaying Software 20655c7

Map Displaying Software 20655c8

Callee's Audio Data Outputting Software 20655c9

Callee's Visual Data Displaying Software 20655c10

Fig. 509

Callee's Personal Data Storage Area 20655b4A

| Callee's Personal Data | Permitted Callee's Personal Data Flag |
|---|---|
| Callee's Name | 1 |
| Callee's Phone Number | 1 |
| Callee's Email Address | 0 |
| Callee's Home Address | 0 |
| Callee's Business Address | 0 |
| Callee's Title | 0 |
| Callee's Hobby | 0 |
| Callee's Blood Type | 0 |
| Callee's Gender | 0 |
| Callee's Age | 0 |
| Callee's Date Of Birth | 0 |

Fig. 510

Callee's Info Displaying Software Storage Area 20655cA

Permitted Callee's Personal Data Selecting Software 20655c1A

Dialing Software 20655c2A

Callee's Device Pin-pointing Software 20655c3A

Map Data Sending/Receiving Software 20655c4A

Callee's Audiovisual Data Collecting Software 20655c5A

Callee's Info Sending/Receiving Software 20655c6A

Caller's Info Sending/Receiving Software 20655c6aA

Permitted Caller's Personal Data Displaying Software 20655c7A

Map Displaying Software 20655c8A

Caller's Audio Data Outputting Software 20655c9A

Caller's Visual Data Displaying Software 20655c10A

Password Data Storage Area H57b1

| **User ID** | **Password Data** |
|---|---|
| User#1 | Password Data#1 |
| User#2 | Password Data#2 |
| User#3 | Password Data#3 |
| User#4 | Password Data#4 |
| User#5 | Password Data#5 |

Fig. 543

Phone Number Data Storage Area H57b2

| User ID | Phone Number Data |
|---|---|
| User#1 | Phone Number Data#1 |
| User#2 | Phone Number Data#2 |
| User#3 | Phone Number Data#3 |
| User#4 | Phone Number Data#4 |
| User#5 | Phone Number Data#5 |

Fig. 544

Audio Data Storage Area H57b3

| Audio ID | Audio Data |
|---|---|
| Audio#0 | Audio Data#0 |
| Audio#1 | Audio Data#1 |
| Audio#2 | Audio Data#2 |
| Audio#3 | Audio Data#3 |
| Audio#4 | Audio Data#4 |
| Audio#5 | Audio Data#5 |
| Audio#6 | Audio Data#6 |

Password Data Storage Area H58b1

| **User ID** | **Password Data** |
| --- | --- |
| User#1 | Password Data#1 |
| User#2 | Password Data#2 |
| User#3 | Password Data#3 |
| User#4 | Password Data#4 |
| User#5 | Password Data#5 |

Fig. 565

Phone Number Data Storage Area H58b2

| User ID | Phone Number Data |
|---|---|
| User#1 | Phone Number Data#1 |
| User#2 | Phone Number Data#2 |
| User#3 | Phone Number Data#3 |
| User#4 | Phone Number Data#4 |
| User#5 | Phone Number Data#5 |

Fig. 566

Web Display Data Storage Area H58b3

| Web Display ID | Web Display Data |
|---|---|
| Web Display#0 | Web Display Data#0 |
| Web Display#1 | Web Display Data#1 |
| Web Display#2 | Web Display Data#2 |
| Web Display#3 | Web Display Data#3 |
| Web Display#4 | Web Display Data#4 |
| Web Display#5 | Web Display Data#5 |
| Web Display#6 | Web Display Data#6 |

Fig. 573

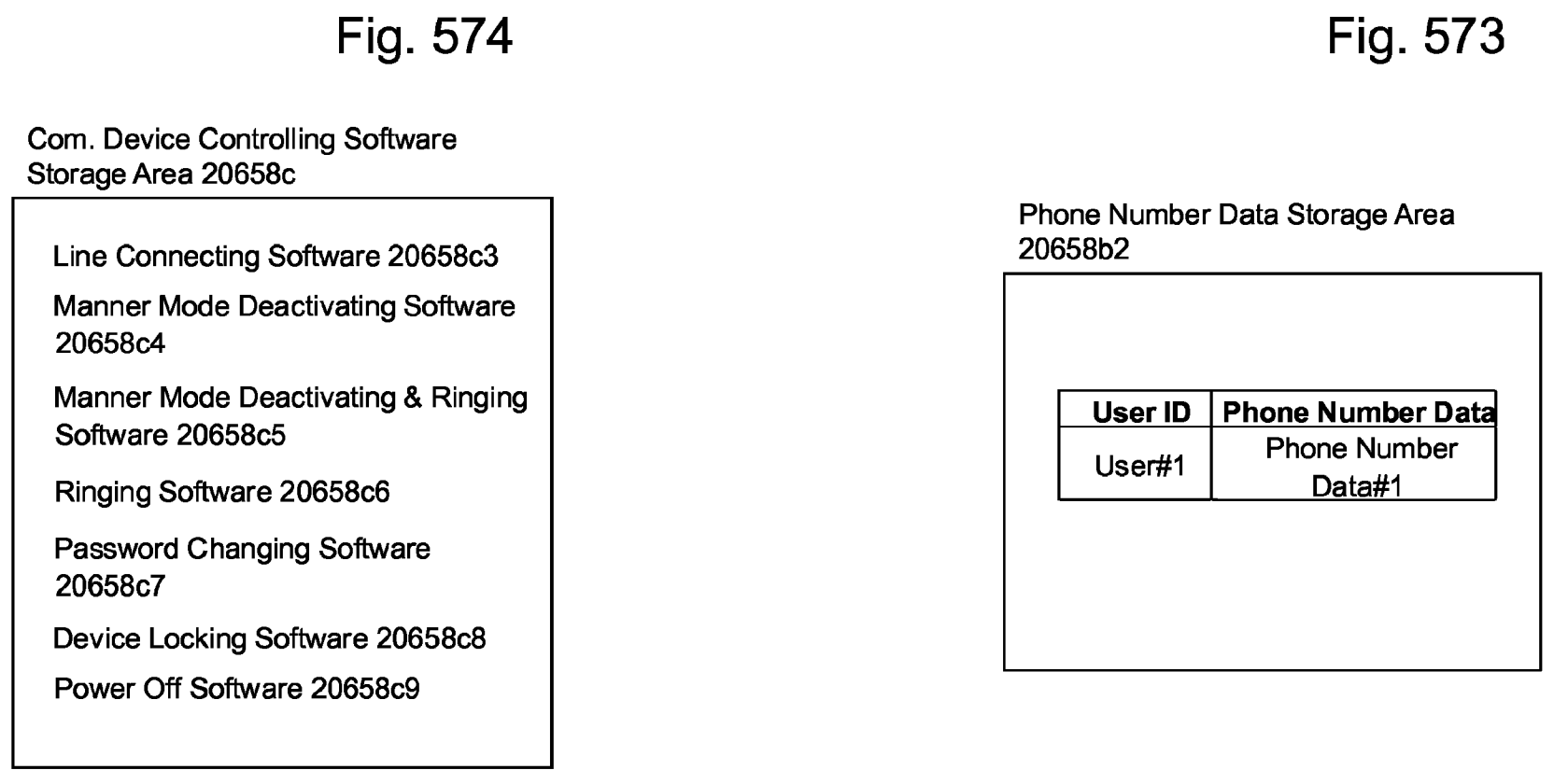

Phone Number Data Storage Area 20658b2

| User ID | Phone Number Data |
|---|---|
| User#1 | Phone Number Data#1 |

Fig. 574

Com. Device Controlling Software Storage Area 20658c

Line Connecting Software 20658c3

Manner Mode Deactivating Software 20658c4

Manner Mode Deactivating & Ringing Software 20658c5

Ringing Software 20658c6

Password Changing Software 20658c7

Device Locking Software 20658c8

Power Off Software 20658c9

Shortcut Icon Displaying Data Storage Area 20659b

Shortcut Icon Image Data Storage Area 20659b1

| **Shortcut Icon ID** | **Shortcut Icon Image Data** |
|---|---|
| Shortcut Icon#1 | Shortcut Icon Image Data#1 |
| Shortcut Icon#2 | Shortcut Icon Image Data#2 |
| Shortcut Icon#3 | Shortcut Icon Image Data#3 |
| Shortcut Icon#4 | Shortcut Icon Image Data#4 |

Fig. 589

Shortcut Icon Location Data Storage Area 20659b2

| **Shortcut Icon ID** | **Shortcut Icon Location Data** |
|---|---|
| Shortcut Icon#1 | Shortcut Icon Location Data#1 |
| Shortcut Icon#2 | Shortcut Icon Location Data#2 |
| Shortcut Icon#3 | Shortcut Icon Location Data#3 |
| Shortcut Icon#4 | Shortcut Icon Location Data#4 |

Fig. 590

Shortcut Icon Link Data Storage Area 20659b3

| **Shortcut Icon ID** | **Shortcut Icon Link Data** |
|---|---|
| Shortcut Icon#1 | Shortcut Icon Link Data#1 |
| Shortcut Icon#2 | Shortcut Icon Link Data#2 |
| Shortcut Icon#3 | Shortcut Icon Link Data#3 |
| Shortcut Icon#4 | Shortcut Icon Link Data#4 |

Fig. 593

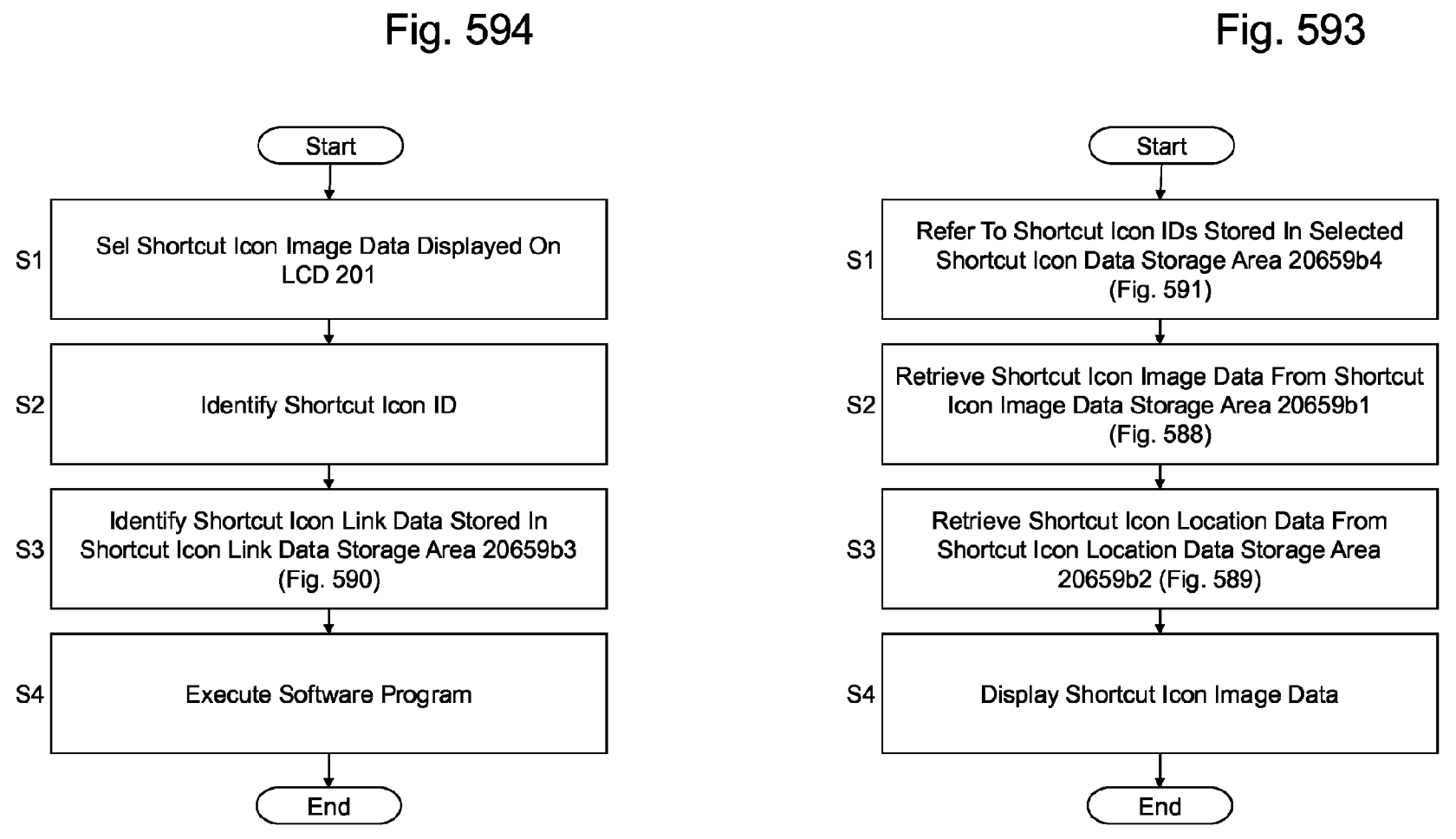

Start

S1 — Refer To Shortcut Icon IDs Stored In Selected Shortcut Icon Data Storage Area 20659b4 (Fig. 591)

S2 — Retrieve Shortcut Icon Image Data From Shortcut Icon Image Data Storage Area 20659b1 (Fig. 588)

S3 — Retrieve Shortcut Icon Location Data From Shortcut Icon Location Data Storage Area 20659b2 (Fig. 589)

S4 — Display Shortcut Icon Image Data

End

Fig. 594

Start

S1 — Sel Shortcut Icon Image Data Displayed On LCD 201

S2 — Identify Shortcut Icon ID

S3 — Identify Shortcut Icon Link Data Stored In Shortcut Icon Link Data Storage Area 20659b3 (Fig. 590)

S4 — Execute Software Program

End

Software Programs Storage Area H59b1

| Software ID | Software Program |
|---|---|
| Software#3 | Software Program#3 |
| Software#4 | Software Program#4 |
| Software#5 | Software Program#5 |
| Software#6 | Software Program#6 |

Task Tray Displaying Data Storage Area 20660b

Task Tray Icon Image Data Storage Area 20660b1

| **Task Tray Icon ID** | **Task Tray Icon Image Data** |
|---|---|
| Task Tray Icon#1 | Task Tray Icon Image Data#1 |
| Task Tray Icon#2 | Task Tray Icon Image Data#2 |
| Task Tray Icon#3 | Task Tray Icon Image Data#3 |
| Task Tray Icon#4 | Task Tray Icon Image Data#4 |

Fig. 607

Task Tray Icon Link Data Storage Area 20660b3

| **Task Tray Icon ID** | **Task Tray Icon Link Data** |
|---|---|
| Task Tray Icon#1 | Task Tray Icon Link Data#1 |
| Task Tray Icon#2 | Task Tray Icon Link Data#2 |
| Task Tray Icon#3 | Task Tray Icon Link Data#3 |
| Task Tray Icon#4 | Task Tray Icon Link Data#4 |

Fig. 608

Selected Task Tray Icon Data Storage Area 20660b4

| |
|---|
| Task Tray Icon#1 |
| Task Tray Icon#2 |
| Task Tray Icon#3 |

Software Programs Storage Area H59b1

| **Software ID** | **Software Program** |
| --- | --- |
| Software#3 | Software Program#3 |
| Software#4 | Software Program#4 |
| Software#5 | Software Program#5 |
| Software#6 | Software Program#6 |

Task Tray Displaying Data Storage Area H59b

| User ID | User Data |
|---|---|
| User#1 | User Data#1 |
| User#2 | User Data#2 |
| User#3 | User Data#3 |
| User#4 | User Data#4 |

Fig. 621

Channel Number Storage Area H61b2

| Channel ID | User ID |
|---|---|
| Channel#1 | User#1 |
| Channel#2 | |
| Channel#3 | User#3 |
| Channel#4 | User#4 |

Fig. 622

Channel Number Storage Area H61b2

| Channel ID | User ID |
|---|---|
| Channel#1 | User#1 |
| Channel#2 | User#1 |
| Channel#3 | User#3 |
| Channel#4 | User#4 |

Fig. 623

Signal Type Data Storage Area H61b3

| Channel ID | Signal Type Data |
|---|---|
| Channel#1 | cdma2000 |
| Channel#2 | cdma2000 |
| Channel#3 | W-CDMA |
| Channel#4 | cdma2000 |

Fig. 624

Signal Type Data Storage Area H61b3

| Channel ID | Signal Type Data |
|---|---|
| Channel#1 | cdma2000 |
| Channel#2 | W-CDMA |
| Channel#3 | W-CDMA |
| Channel#4 | cdma2000 |

Fig. 629

User Data Storage Area 20661b1

| **User ID** | **User Data** |
|---|---|
| User#1 | User Data#1 |

Fig. 630

Channel Number Storage Area 20661b2

| **Channel ID** | **User ID** |
|---|---|
| Channel#1 | User#1 |

Fig. 631

Channel Number Storage Area 20661b2

| Channel ID | User ID |
|---|---|
| Channel#1 | User#1 |
| Channel#2 | User#1 |

Fig. 632

Signal Type Data Storage Area 20661b3

| Channel ID | Signal Type Data |
|---|---|
| Channel#1 | cdma2000 |
| Channel#2 | cdma2000 |

Signal Type Data Storage Area 20661b3

| Channel ID | Signal Type Data |
|---|---|
| Channel#1 | cdma2000 |
| Channel#2 | W-CDMA |

Multiple Channel Processing Software Storage Area 20661c

Fig. 647

Operating System 20663OS

Battery Controller 20663OSa
CCD Unit Controller 20663OSb
Flash Light Unit Controller 20663OSc
Indicator Controller 20663OSd
Input Device Controller 20663OSe
LCD Controller 20663OSf
LED Controller 20663OSg
Memory Card Interface Controller 20663OSh
Microphone Controller 20663OSi
Photometer Controller 20663OSj
RAM Controller 20663OSk
ROM Controller 20663OSl

Fig. 648

Operating System 20663OS (cont.)

Signal Processor Controller 20663OSm
Signal Processor Controller 20663OSn
Solar Panel Controller 20663OSo
Speaker Controller 20663OSp
Vibrator Controller 20663OSq
Video Processor Controller 20663OSr
Wireless Receiver Controller 20663OSs
Wireless Receiver Controller 20663OSt
Wireless Receiver Controller 20663OSu
Wireless Transmitter Controller 20663OSv
Wireless Transmitter Controller 20663OSw
Wireless Transmitter Controller 20663OSx

Fig. 651

OS Version Data Storage Area 20663b1

Battery Controller Version Data 20663b1a
CCD Unit Controller Version Data 20663b1b
Flash Light Unit Controller Version Data 20663b1c
Indicator Controller Version Data 20663b1d
Input Device Controller Version Data 20663b1e
LCD Controller Version Data 20663b1f
LED Controller Version Data 20663b1g
Memory Card Interface Controller Version Data 20663b1h
Microphone Controller Version Data 20663b1i
Photometer Controller Version Data 20663b1j
RAM Controller Version Data 20663b1k
ROM Controller Version Data 20663b1l

Fig. 652

OS Version Data Storage Area 20663b1 (cont.)

Signal Processor Controller Version Data 20663b1m
Signal Processor Controller Version Data 20663b1n
Solar Panel Controller Version Data 20663b1o
Speaker Controller Version Data 20663b1p
Vibrator Controller Version Data 20663b1q
Video Processor Controller Version Data 20663b1r
Wireless Receiver Controller Version Data 20663b1s
Wireless Receiver Controller Version Data 20663b1t
Wireless Receiver Controller Version Data 20663b1u
Wireless Transmitter Controller Version Data 20663b1v
Wireless Transmitter Controller Version Data 20663b1w
Wireless Transmitter Controller Version Data 20663b1x

Fig. 653

OS Updating Software Storage Area
20663c

Battery Controller Updating Software 20663c1a
CCD Unit Controller Updating Software 20663c1b
Flash Light Unit Controller Updating Software 20663c1c
Indicator Controller Updating Software 20663c1d
Input Device Controller Updating Software 20663c1e
LCD Controller Updating Software 20663c1f
LED Controller Updating Software 20663c1g
Memory Card Interface Controller Updating Software 20663c1h
Microphone Controller Updating Software 20663c1i
Photometer Controller Updating Software 20663c1j
RAM Controller Updating Software 20663c1k
ROM Controller Updating Software 20663c1l

Fig. 654

OS Updating Software Storage Area
20663c (cont.)

Signal Processor Controller Updating Software 20663c1m
Signal Processor Controller Updating Software 20663c1n
Solar Panel Controller Updating Software 20663c1o
Speaker Controller Updating Software 20663c1p
Vibrator Controller Updating Software 20663c1q
Video Processor Controller Updating Software 20663c1r
Wireless Receiver Controller Updating Software 20663c1s
Wireless Receiver Controller Updating Software 20663c1t
Wireless Receiver Controller Updating Software 20663c1u
Wireless Transmitter Controller Updating Software 20663c1v
Wireless Transmitter Controller Updating Software 20663c1w
Wireless Transmitter Controller Updating Software 20663c1x

Fig. 661

OS Version Data Storage Area H63b1 (cont.)

Signal Processor Controller Version Data H63b1m
Signal Processor Controller Version Data H63b1n
Solar Panel Controller Version Data H63b1o
Speaker Controller Version Data H63b1p
Vibrator Controller Version Data H63b1q
Video Processor Controller Version Data H63b1r
Wireless Receiver Controller Version Data H63b1s
Wireless Receiver Controller Version Data H63b1t
Wireless Receiver Controller Version Data H63b1u
Wireless Transmitter Controller Version Data H63b1v
Wireless Transmitter Controller Version Data H63b1w
Wireless Transmitter Controller Version Data H63b1x

Fig. 662

OS Updating Software Storage Area H63c

Battery Controller Updating Software H63c1a
CCD Unit Controller Updating Software H63c1b
Flash Light Unit Controller Updating Software H63c1c
Indicator Controller Updating Software H63c1d
Input Device Controller Updating Software H63c1e
LCD Controller Updating Software H63c1f
LED Controller Updating Software H63c1g
Memory Card Interface Controller Updating Software H63c1h
Microphone Controller Updating Software H63c1i
Photometer Controller Updating Software H63c1j
RAM Controller Updating Software H63c1k
ROM Controller Updating Software H63c1l

Fig. 715

Device Controller Data Storage Area
20664b1

| Device Controller ID | Device Controller Data |
|---|---|
| Device Controller#1 | Device Controller Data#1 |
| Device Controller#2 | Device Controller Data#2 |
| Device Controller#3 | Device Controller Data#3 |
| Device Controller#4 | Device Controller Data#4 |
| Device Controller#5 | Device Controller Data#5 |

Fig. 716

Device Image Data Storage Area
20664b2

| Device Controller ID | Device Image Data |
|---|---|
| Device Controller#1 | Device Image Data#1 |
| Device Controller#2 | Device Image Data#2 |
| Device Controller#3 | Device Image Data#3 |
| Device Controller#4 | Device Image Data#4 |
| Device Controller#5 | Device Image Data#5 |

Fig. 717

Device Image Location Data Storage Area 20664b3

| Device Controller ID | Device Image Location Data |
|---|---|
| Device Controller#1 | Device Image Location Data#1 |
| Device Controller#2 | Device Image Location Data#2 |
| Device Controller#3 | Device Image Location Data#3 |
| Device Controller#4 | Device Image Location Data#4 |
| Device Controller#5 | Device Image Location Data#5 |

Fig. 718

Device Managing Software Storage Area 20664c

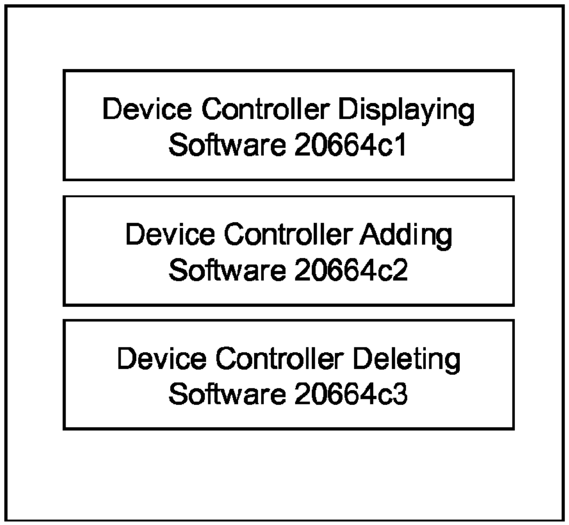

Fig. 727

User Access Data Storage Area 83565b1

| **User ID** | **Password Data** |
| --- | --- |
| User#1 | Password Data#1 |
| User#2 | Password Data#2 |
| User#3 | Password Data#3 |
| User#4 | Password Data#4 |

Fig. 728

Window Data Storage Area 83565b2

| **Window ID** | **Window Data** |
| --- | --- |
| Window#1 | Window Data#1 |
| Window#2 | Window Data#2 |
| Window#3 | Window Data#3 |
| Window#4 | Window Data#4 |

Fig. 729

Door Data Storage Area 83565b3

| Door ID | Door Data |
|---|---|
| Door#1 | Door Data#1 |
| Door#2 | Door Data#2 |
| Door#3 | Door Data#3 |
| Door#4 | Door Data#4 |

Fig. 730

Radio Channel Data Storage Area 83565b4

| Radio Channel ID | Radio Channel Data |
|---|---|
| Radio Channel#1 | Radio Channel Data#1 |
| Radio Channel#2 | Radio Channel Data#2 |
| Radio Channel#3 | Radio Channel Data#3 |
| Radio Channel#4 | Radio Channel Data#4 |

Fig. 731

TV Channel Data Storage Area 83565b5

| **TV Channel ID** | **TV Channel Data** |
|---|---|
| TV Channel#1 | TV Channel Data#1 |
| TV Channel#2 | TV Channel Data#2 |
| TV Channel#3 | TV Channel Data#3 |
| TV Channel#4 | TV Channel Data#4 |

Fig. 732

Blinker Data Storage Area 83565b6

| **Blinker ID** | **Blinker Data** |
|---|---|
| Blinker#1 | Blinker Data#1 |
| Blinker#2 | Blinker Data#2 |

Fig. 739

User Access Data Storage Area 20665b1

| User ID | Password Data |
|---|---|
| User#1 | Password Data#1 |

Fig. 740

Window Data Storage Area 20665b2

| Window ID | Window Data |
|---|---|
| Window#1 | Window Data#1 |
| Window#2 | Window Data#2 |
| Window#3 | Window Data#3 |
| Window#4 | Window Data#4 |

Fig. 741

Door Data Storage Area 20665b3

| Door ID | Door Data |
|---|---|
| Door#1 | Door Data#1 |
| Door#2 | Door Data#2 |
| Door#3 | Door Data#3 |
| Door#4 | Door Data#4 |

Fig. 742

Radio Channel Data Storage Area 20665b4

| Radio Channel ID | Radio Channel Data |
|---|---|
| Radio Channel#1 | Radio Channel Data#1 |
| Radio Channel#2 | Radio Channel Data#2 |
| Radio Channel#3 | Radio Channel Data#3 |
| Radio Channel#4 | Radio Channel Data#4 |

Fig. 743

TV Channel Data Storage Area 20665b5

| **TV Channel ID** | **TV Channel Data** |
|---|---|
| TV Channel#1 | TV Channel Data#1 |
| TV Channel#2 | TV Channel Data#2 |
| TV Channel#3 | TV Channel Data#3 |
| TV Channel#4 | TV Channel Data#4 |

Fig. 744

Blinker Data Storage Area 20665b6

| **Blinker ID** | **Blinker Data** |
|---|---|
| Blinker#1 | Blinker Data#1 |
| Blinker#2 | Blinker Data#2 |

Fig. 767

Web Address Data Storage Area
20666b1

| Web Address ID | Web Address Data |
|---|---|
| Web Address#1 | Web Address Data #1 |
| Web Address#2 | Web Address Data #2 |
| Web Address#3 | Web Address Data #3 |
| Web Address#4 | Web Address Data #4 |

Fig. 768

Email Address Data Storage Area
20666b2

| Email Address ID | Email Address Data |
|---|---|
| Email Address#1 | Email Address Data#1 |
| Email Address#2 | Email Address Data#2 |
| Email Address#3 | Email Address Data#3 |
| Email Address#4 | Email Address Data#4 |

Fig. 769

Phone Data Storage Area 20666b3

| Phone ID | Phone Data |
|---|---|
| Phone#1 | Phone Data#1 |
| Phone#2 | Phone Data#2 |
| Phone#3 | Phone Data#3 |
| Phone#4 | Phone Data#4 |

Fig. 770

Alphanumeric Data Storage Area 20666b4

| Alphanumeric ID | Alphanumeric Data |
|---|---|
| Alphanumeric#1 | Alphanumeric Data #1 |
| Alphanumeric#2 | Alphanumeric Data #2 |
| Alphanumeric#3 | Alphanumeric Data #3 |
| Alphanumeric#4 | Alphanumeric Data #4 |

Fig. 771

Image Data Storage Area 20666b5

| Image ID | Image Data |
|---|---|
| Image#1 | Image Data#1 |
| Image#2 | Image Data#2 |
| Image#3 | Image Data#3 |
| Image#4 | Image Data#4 |

Fig. 772

OCR Software Storage Area 20666c

Image Data Scanning Software 20666c1
Image Data Storing Software 20666c2
OCR Software 20666c3
Alphanumeric Data Storing Software 20666c4
Web Address Data Identifying Software 20666c5a
Web Address Data Correcting Software 20666c5b
Web Address Data Storing Software 20666c5c
Web Address Accessing Software 20666c5d OCR Software Storage Area 20666c (cont.)

Email Address Data Identifying Software 20666c6a
Email Address Data Correcting Software 20666c6b
Email Address Data Storing Software 20666c6c
Email Editing Software 20666c6d
Phone Data Identifying Software 20666c7a
Phone Data Correcting Software 20666c7b
Phone Data Storing Software 20666c7c
Dialing Software 20666c7d

COMMUNICATION DEVICE

CROSS REFERENCE TO RELATED APPLICATIONS

This application is a continuation of U.S. Ser. No. 11/688,901, filed 21 Mar. 2007, which is a continuation of U.S. Ser. No. 10/710,600, filed 23 Jul. 2004, which claims the benefit of U.S. Provisional Application No. 60/481,426, filed 26 Sep. 2003, both of which are hereby incorporated herein by reference in their entirety.

BACKGROUND OF INVENTION

The invention relates to a communication device and more particularly to the communication device which has a capability to communicate with another communication device in a wireless fashion.

U.S. Patent Publication No 20030119562 is introduced as a prior art of the present invention of which the summary is the following: "There are provided a task display switching method, a portable apparatus and a portable communications apparatus which, when a plurality of application software are activated and processed in parallel, make it possible to switch a display between each of the application software with ease. According to the task display switching method, the portable apparatus and the portable communications apparatus of the present invention, in a portable apparatus capable of processing a plurality of tasks in parallel and of displaying a plurality of display regions for displaying data, an icon associated with a task displayed on a first display region is generated automatically or manually, and the generated icon is displayed in a second display region. When any icon thus generated is selected from a plurality of icons displayed on the second display region, the task associated with the selected icon is restored and displayed in the first display region," However, the foregoing prior art does not disclose the communication device which implements a voice communicating function, a OS updating function, a voice recognition system, a tag function, a voice recognition noise filtering function, a sound/beep auto off function, a voice recognition system auto off function, a voice recognition email function, a voice communication text converting function, a target device location indicating function, an audio/video data capturing system, a caller ID function, a call blocking function, a navigation system, an auto emergency calling system, a cellular TV function, a GPS search engine function, a mobile ignition key function, a word processing function, a start up software function, and a stereo audio data output function.

For the avoidance of doubt, the number of the prior arts introduced herein (and/or in IDS) may be of a large one, however, applicant has no intent to hide the more relevant prior art(s) in the less relevant ones.

SUMMARY OF INVENTION

It is an object of the present invention to provide a device capable to implement a plurality of functions.

It is another object of the present invention to provide merchandise to merchants attractive to the customers in the U.S.

It is another object of the present invention to provide mobility to the users of communication device.

It is another object of the present invention to provide more convenience to the customers in the U.S.

It is another object of the present invention to provide more convenience to the users of communication device or any tangible thing in which the communication device is fixedly or detachably (i.e., removably) installed.

It is another object of the present invention to overcome the shortcomings associated with the foregoing prior art.

The present invention introduces the communication device which implements a voice communicating function, a OS updating function, a voice recognition system, a tag function, a voice recognition noise filtering function, a sound/beep auto off function, a voice recognition system auto off function, a voice recognition email function, a voice communication text converting function, a target device location indicating function, an audio/video data capturing system, a caller ID function, a call blocking function, a navigation system, an auto emergency calling system, a cellular TV function, a GPS search engine function, a mobile ignition key function, a word processing function a start up software function, and a stereo audio data output function.

BRIEF DESCRIPTION OF DRAWINGS

The above and other aspects, features, and advantages of the invention will be better understood by reading the following more particular description of the invention, presented in conjunction with the following drawing(s), wherein:

FIG. 11 is a simplified illustration illustrating an exemplary embodiment of the present invention.

FIG. 12 is a simplified illustration illustrating an exemplary embodiment of the present invention.

FIG. 119 is a block diagram illustrating an exemplary embodiment of the present invention.

FIG. 120 is a flowchart illustrating an exemplary embodiment of the present invention.

FIG. 121 is a flowchart illustrating an exemplary embodiment of the present invention.

FIG. 122 is a flowchart illustrating an exemplary embodiment of the present invention.

FIG. 123 is a flowchart illustrating an exemplary embodiment of the present invention.

FIG. 124 is a flowchart illustrating an exemplary embodiment of the present invention.

FIG. 125 is a flowchart illustrating an exemplary embodiment of the present invention.

FIG. 126 is a flowchart illustrating an exemplary embodiment of the present invention.

FIG. 127 is a flowchart illustrating an exemplary embodiment of the present invention.

FIG. 128 is a block diagram illustrating an exemplary embodiment of the present invention.

FIG. 129 is a block diagram illustrating an exemplary embodiment of the present invention.

FIG. 130 is a flowchart illustrating an exemplary embodiment of the present invention.

Figure 131:
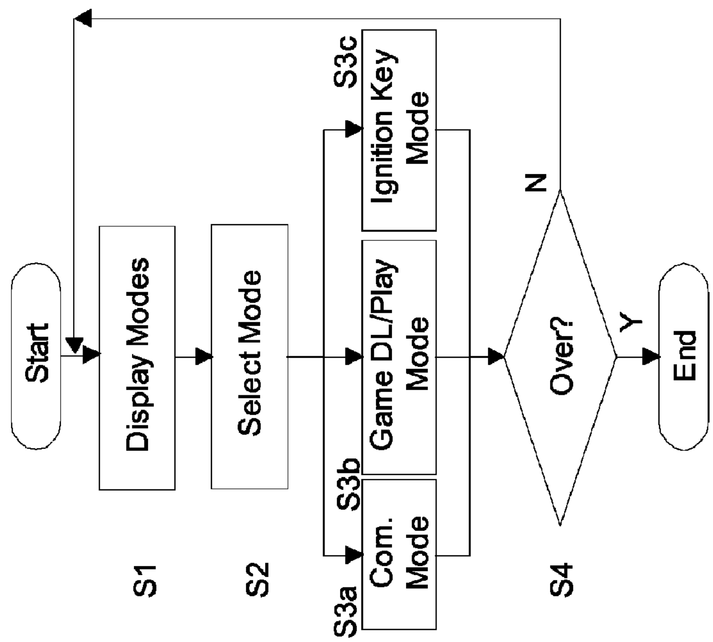

FIG. 131 is a flowchart illustrating an exemplary embodiment of the present invention.

Figure 132:
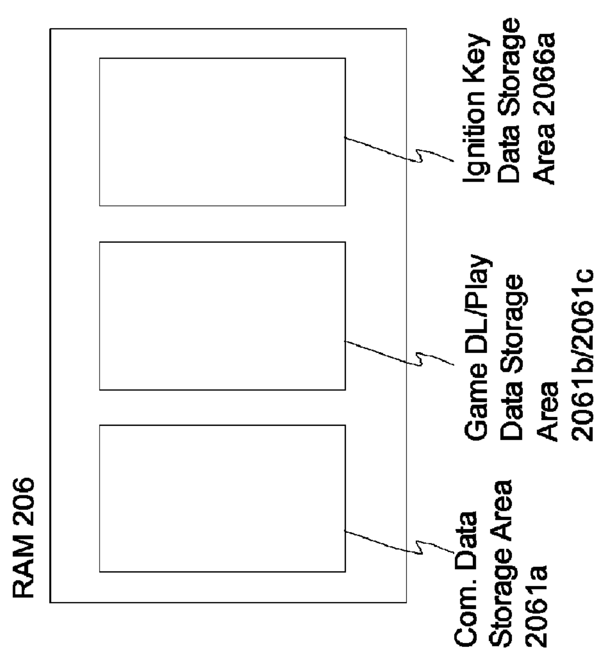

FIG. 132 is a block diagram illustrating an exemplary embodiment of the present invention.

Figure 133:
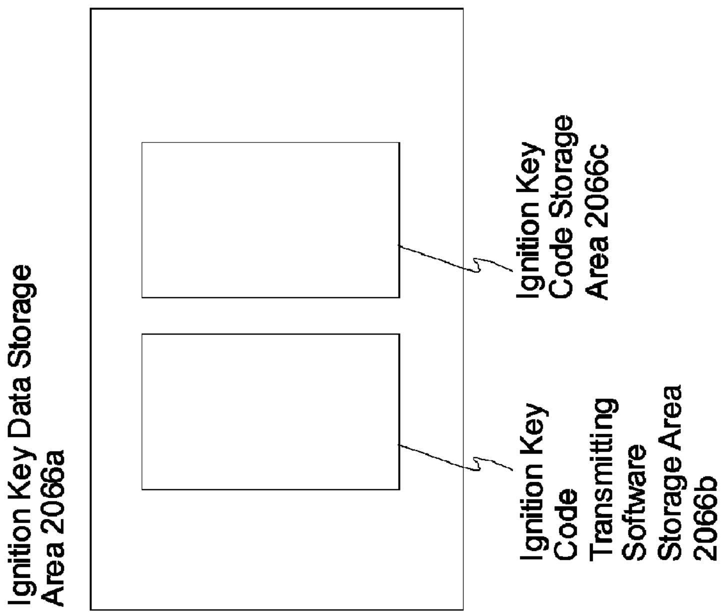

FIG. 133 is a block diagram illustrating an exemplary embodiment of the present invention.

Figure 134:
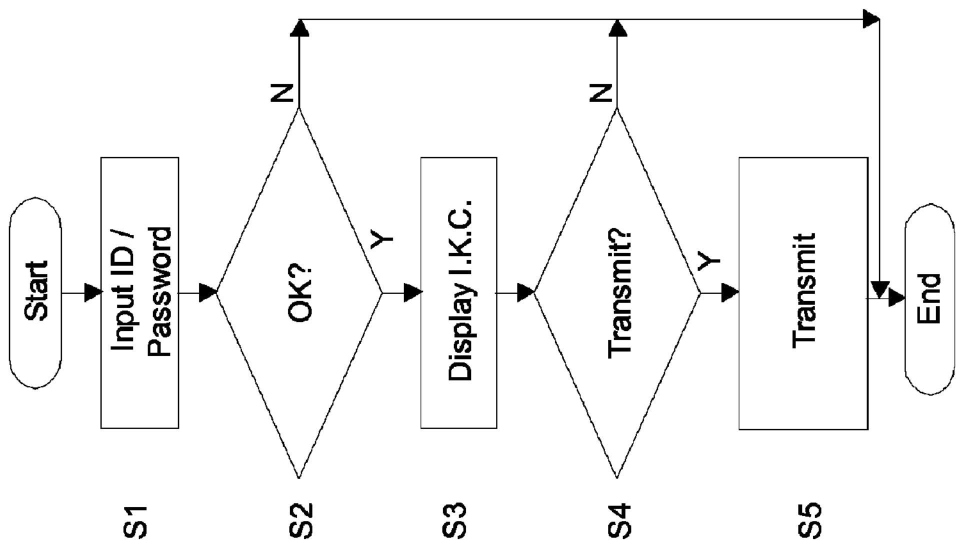

FIG. 134 is a flowchart illustrating an exemplary embodiment of the present invention.

Figure 135:
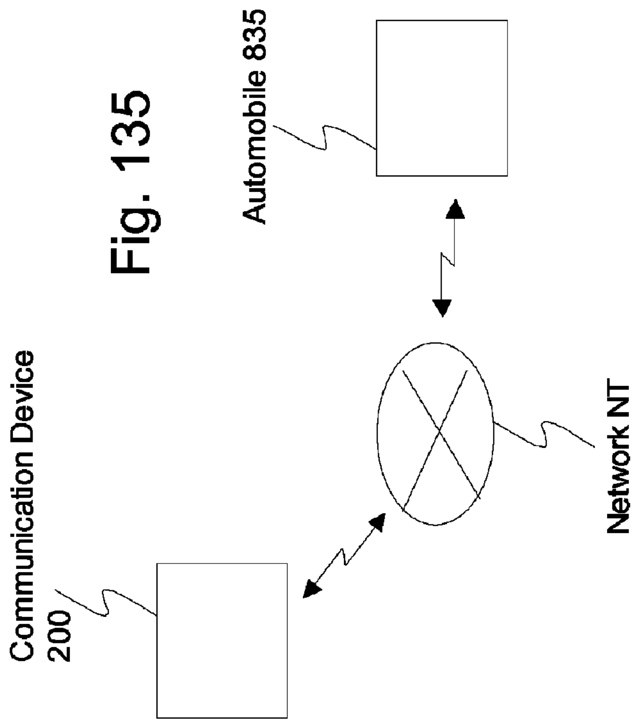

FIG. 135 is a simplified illustration illustrating an exemplary embodiment of the present invention.

Figure 136:
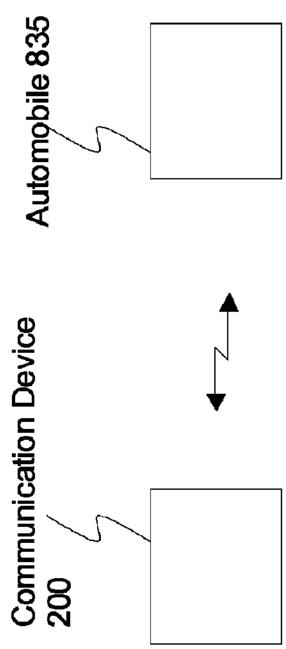

FIG. 136 is a simplified illustration illustrating an exemplary embodiment of the present invention.

Figure 137:
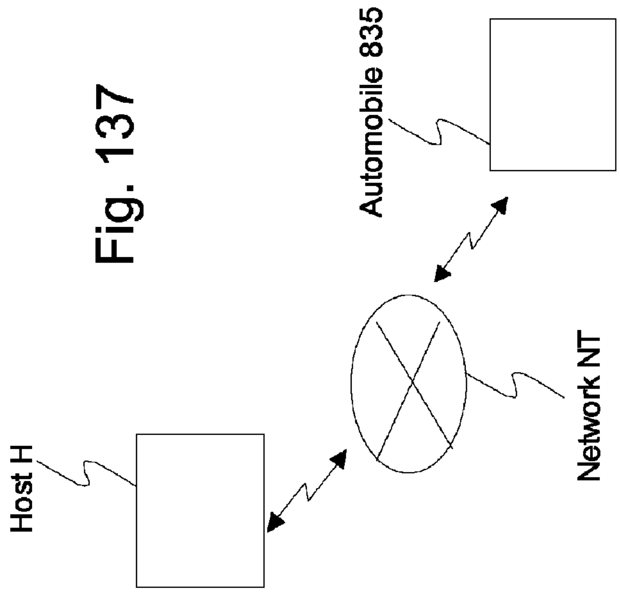

FIG. 137 is a simplified illustration illustrating an exemplary embodiment of the present invention.

Figure 138:
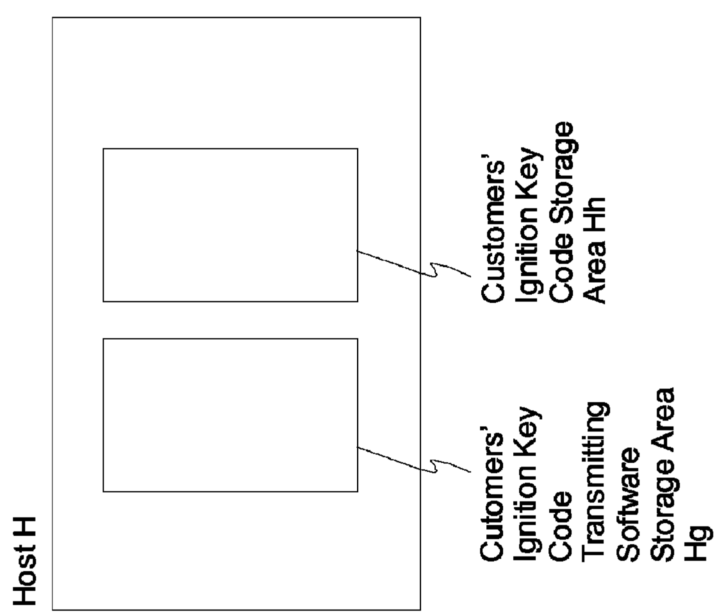

FIG. 138 is a block diagram illustrating an exemplary embodiment of the present invention.

FIG. 139 is a block diagram illustrating an exemplary embodiment of the present invention.

FIG. 140 is a flowchart illustrating an exemplary embodiment of the present invention.

Figure 141:
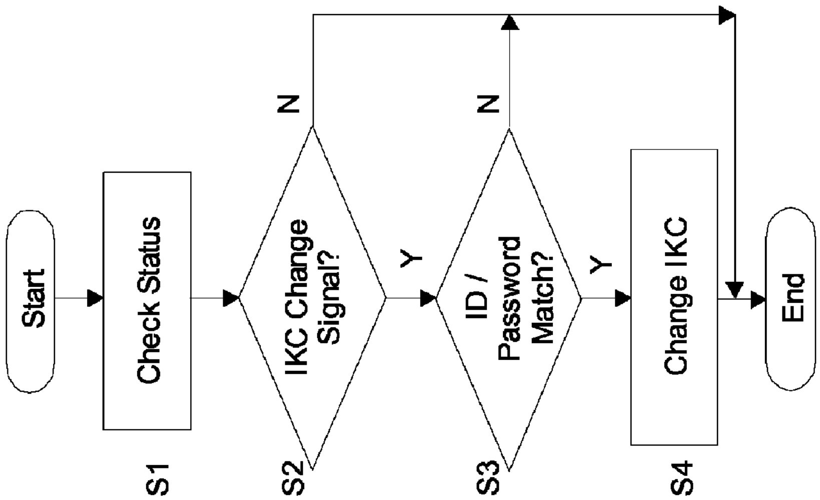

FIG. 141 is a flowchart illustrating an exemplary embodiment of the present invention.

Figure 142:
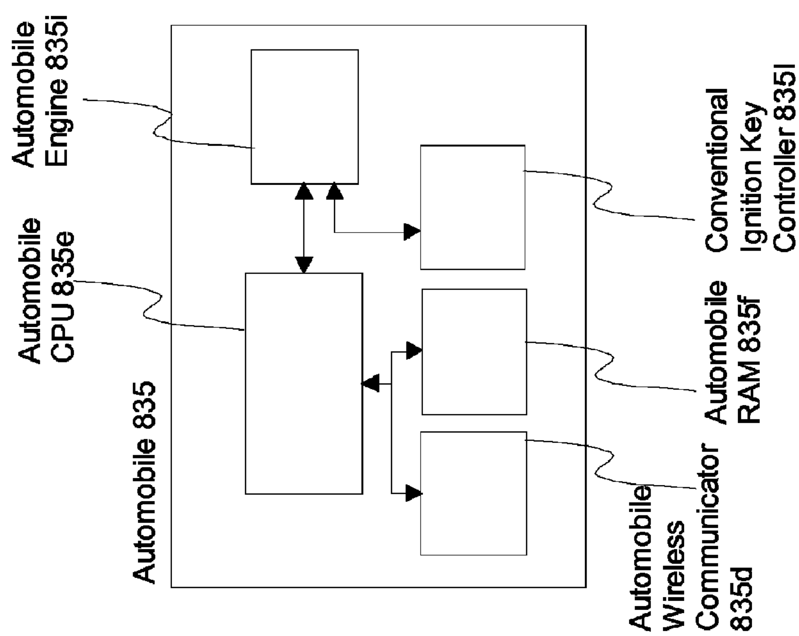

FIG. 142 is a block diagram illustrating an exemplary embodiment of the present invention.

Figures 143, 144:
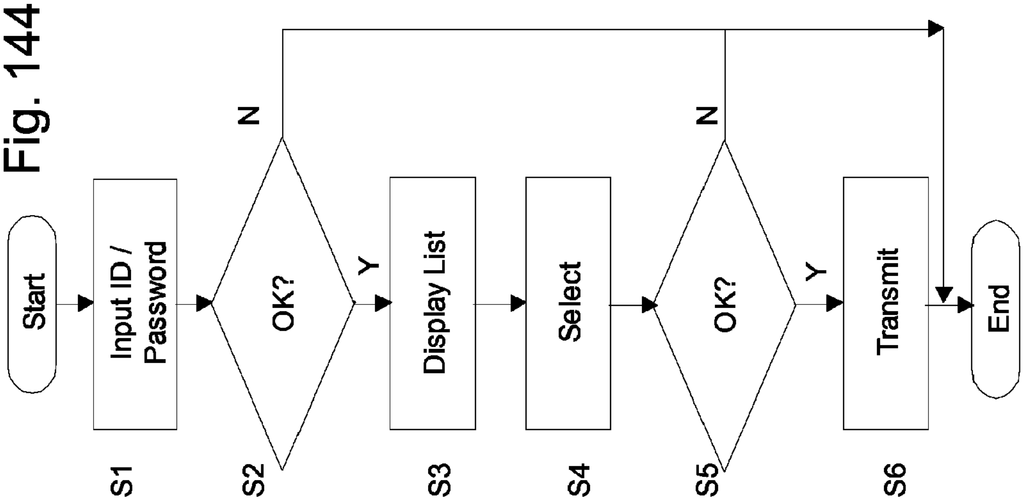

FIG. 143 is a block diagram illustrating an exemplary embodiment of the present invention.

FIG. 144 is a flowchart illustrating an exemplary embodiment of the present invention.

FIG. 145 is a block diagram illustrating an exemplary embodiment of the present invention.

FIG. 146 is a flowchart illustrating an exemplary embodiment of the present invention.

Figure 147:
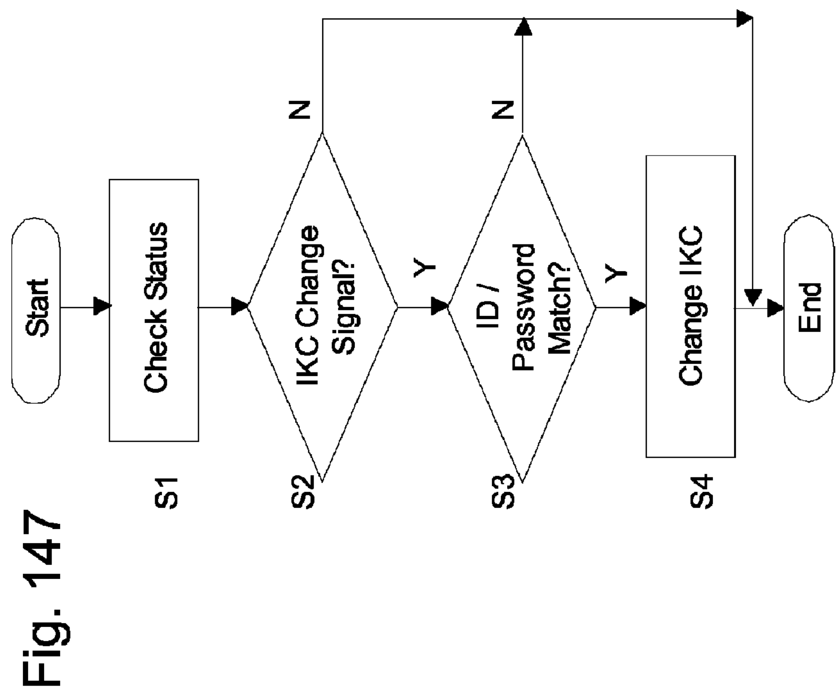

FIG. 147 is a flowchart illustrating an exemplary embodiment of the present invention.

Figure 148:
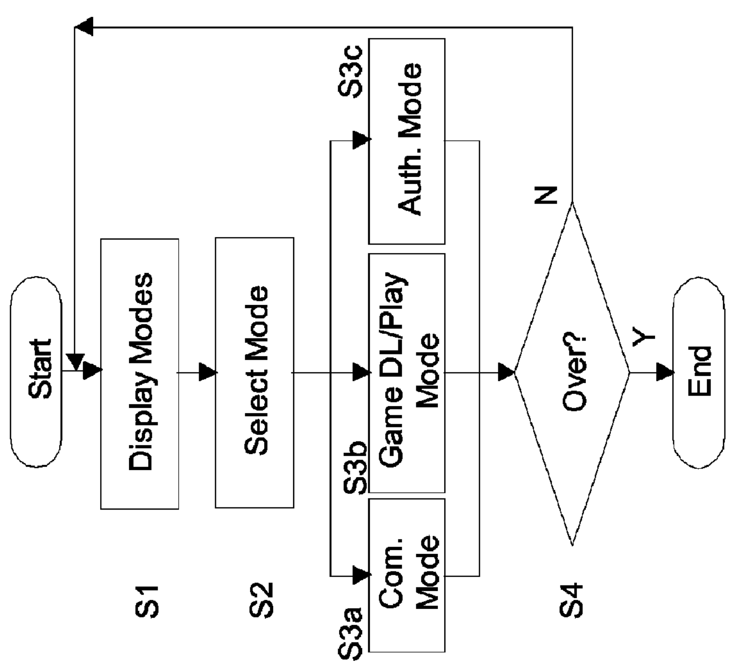

FIG. 148 is a block diagram illustrating an exemplary embodiment of the present invention.

Figure 149:
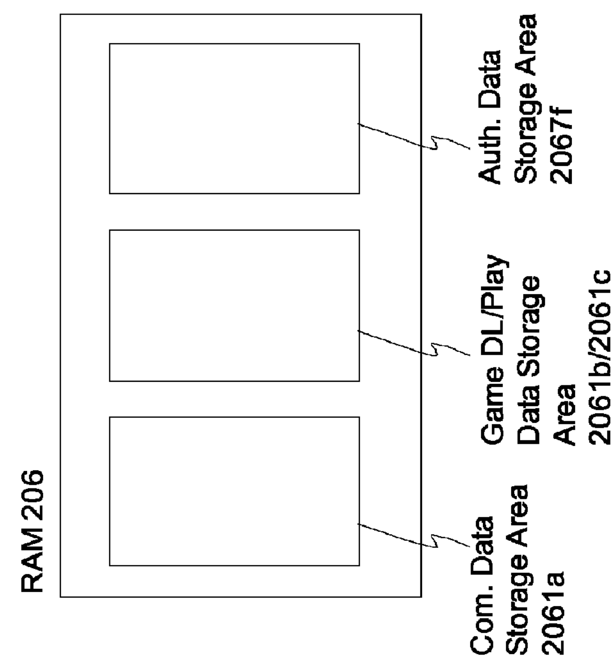

FIG. 149 is a flowchart illustrating an exemplary embodiment of the present invention.

Figure 150:
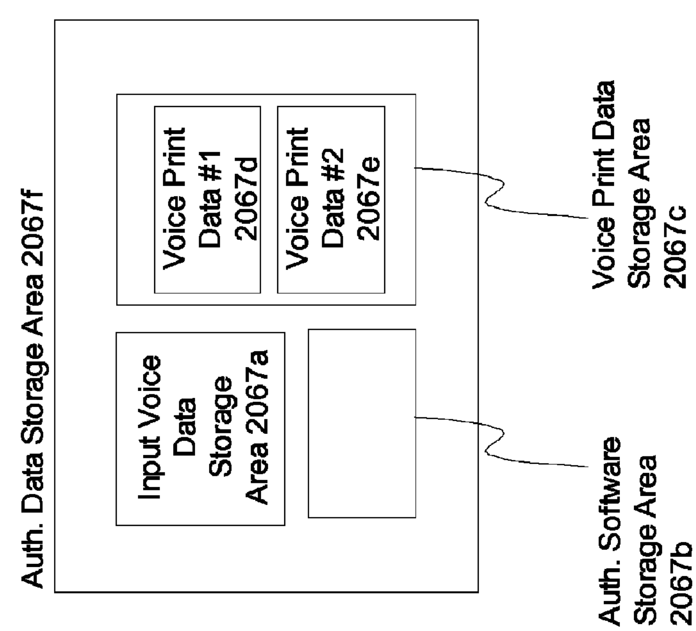

FIG. 150 is a flowchart illustrating an exemplary embodiment of the present invention.

Figure 151:
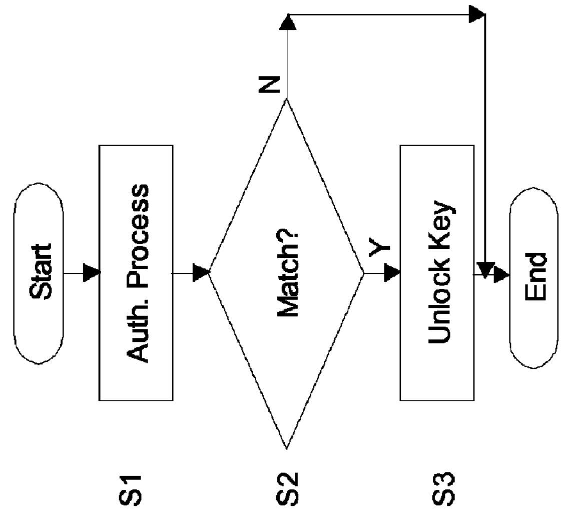

FIG. 151 is a flowchart illustrating an exemplary embodiment of the present invention.

Figure 152:
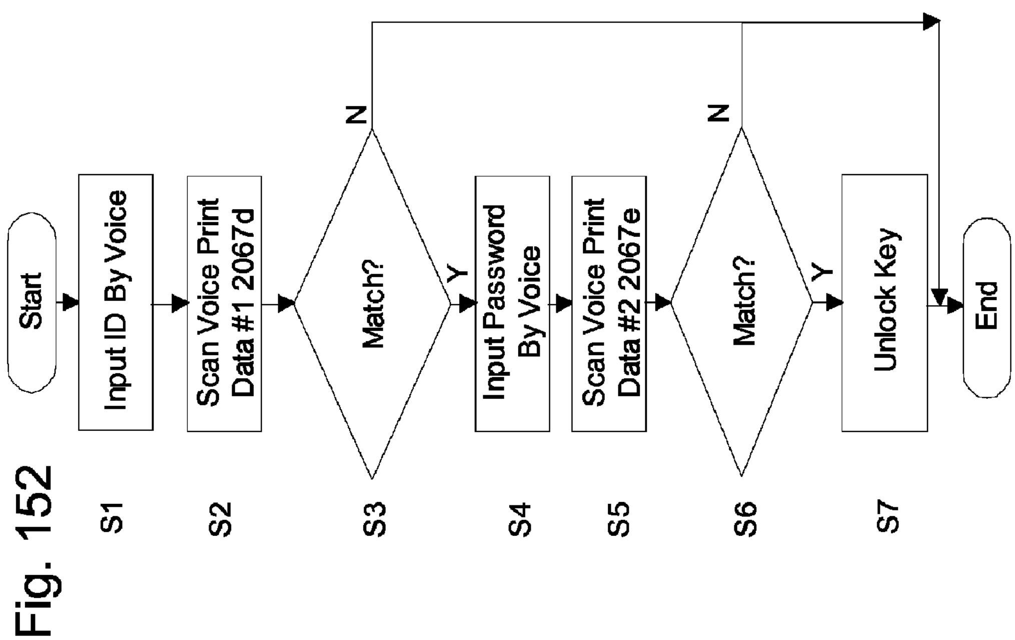

FIG. 152 is a block diagram illustrating an exemplary embodiment of the present invention.

Figure 153:
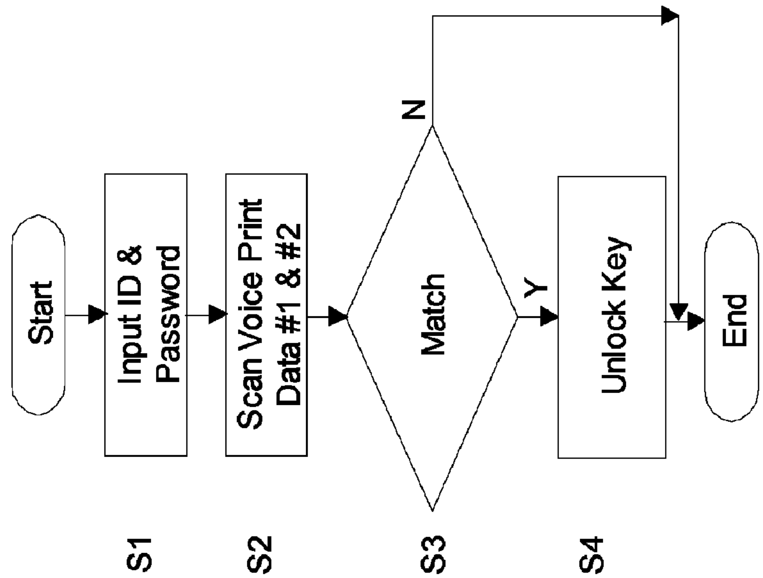

FIG. 153 is a flowchart illustrating an exemplary embodiment of the present invention.

Figure 154:
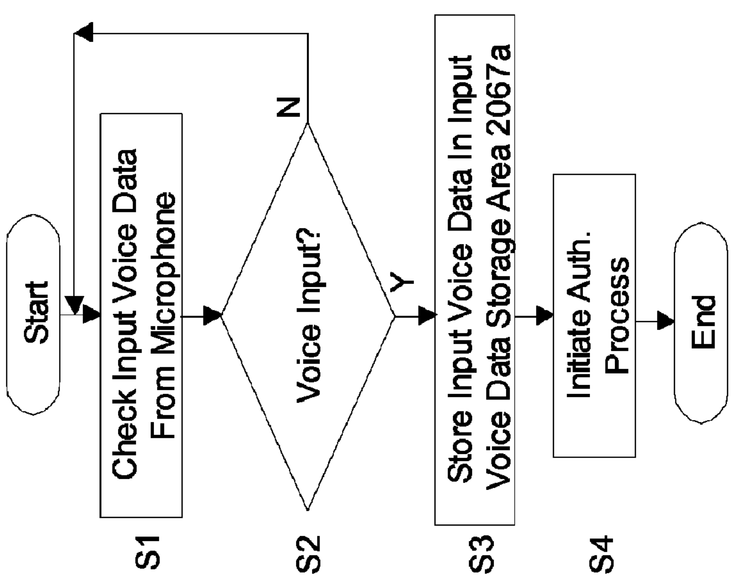

FIG. 154 is a flowchart illustrating an exemplary embodiment of the present invention.

Figure 155:
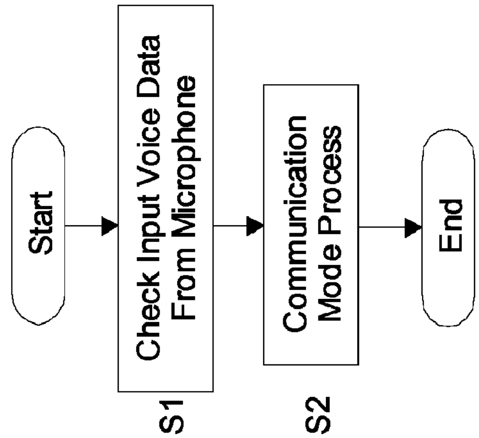

FIG. 155 is a flowchart illustrating an exemplary embodiment of the present invention.

Figure 156:
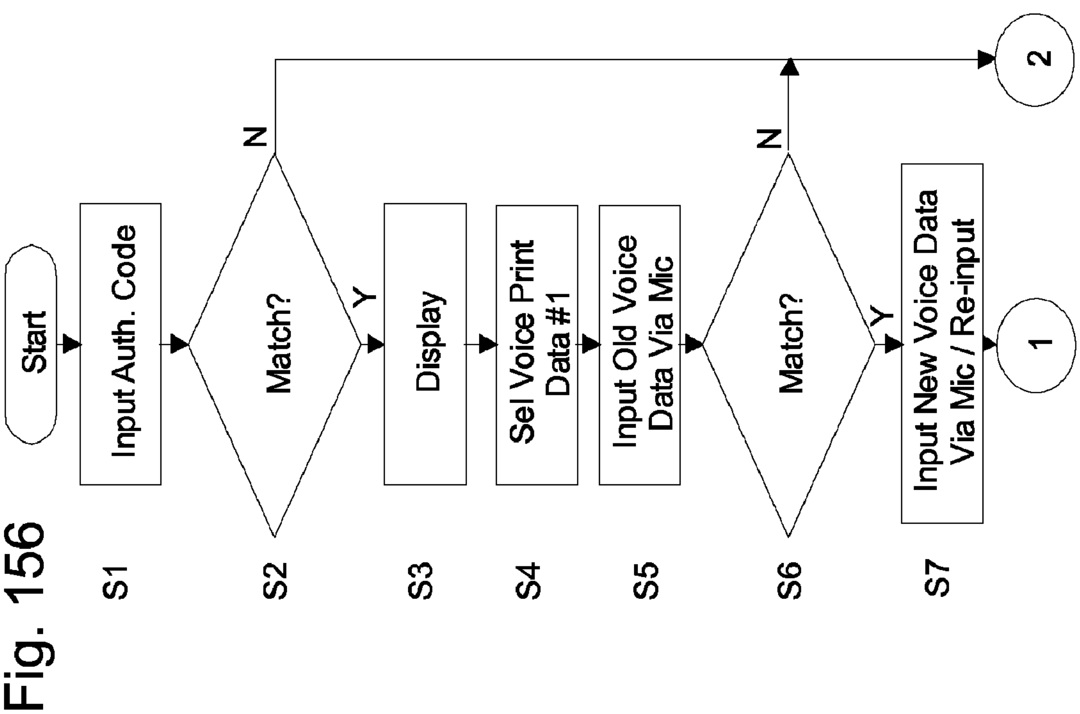

FIG. 156 is a flowchart illustrating an exemplary embodiment of the present invention.

Figure 157:
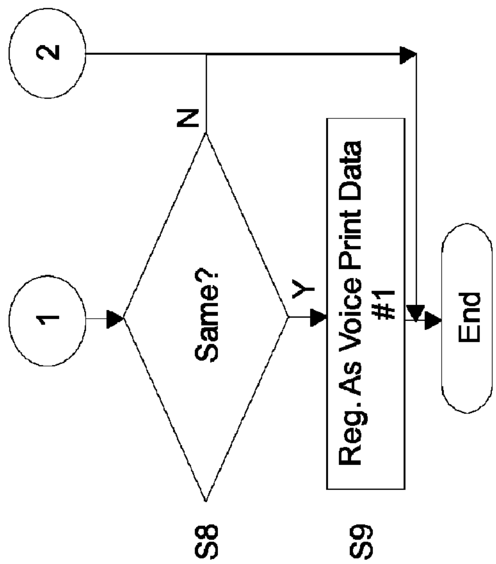

FIG. 157 is a flowchart illustrating an exemplary embodiment of the present invention.

Figure 158:
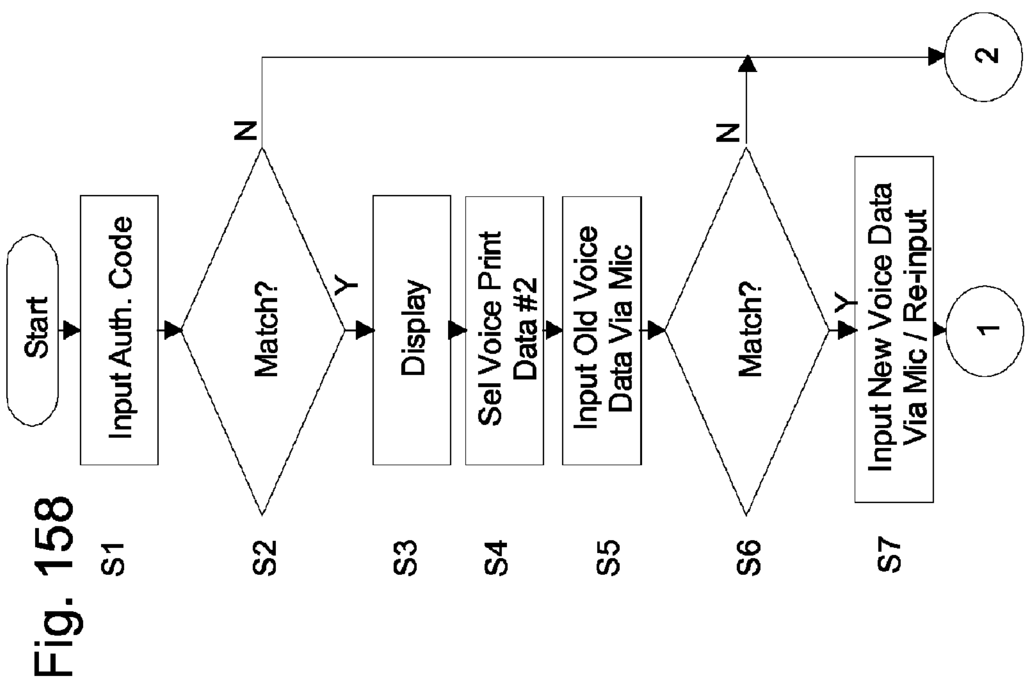

FIG. 158 is a flowchart illustrating an exemplary embodiment of the present invention.

Figure 159:
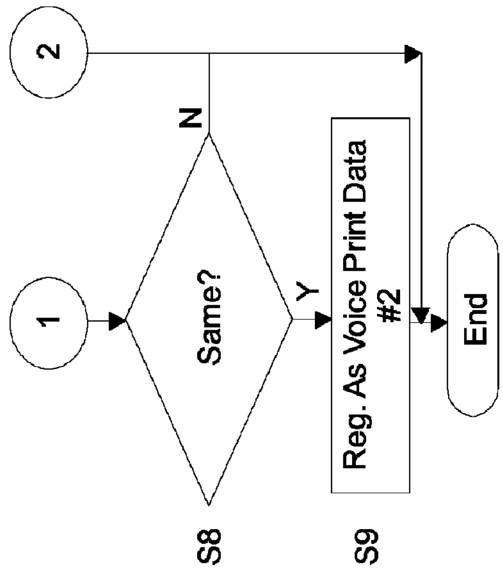

FIG. 159 is a flowchart illustrating an exemplary embodiment of the present invention.

Figure 160:
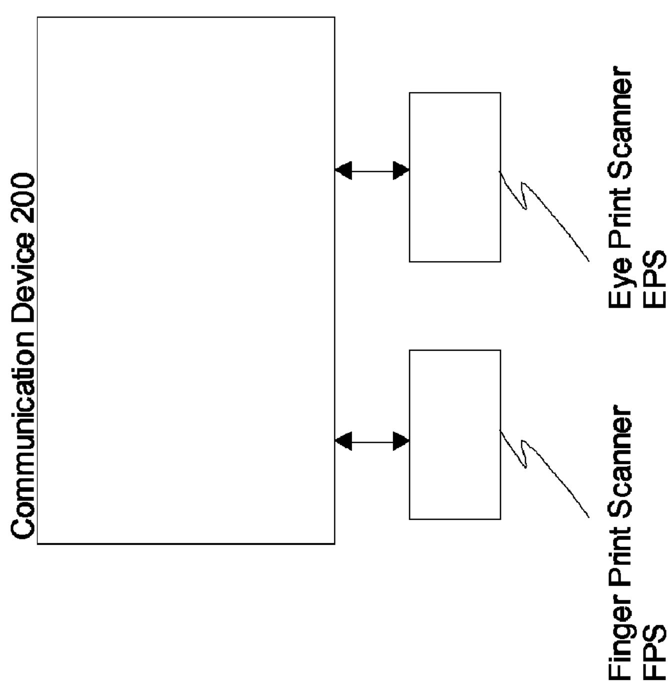

FIG. 160 is a block diagram illustrating an exemplary embodiment of the present invention.

Figure 161:
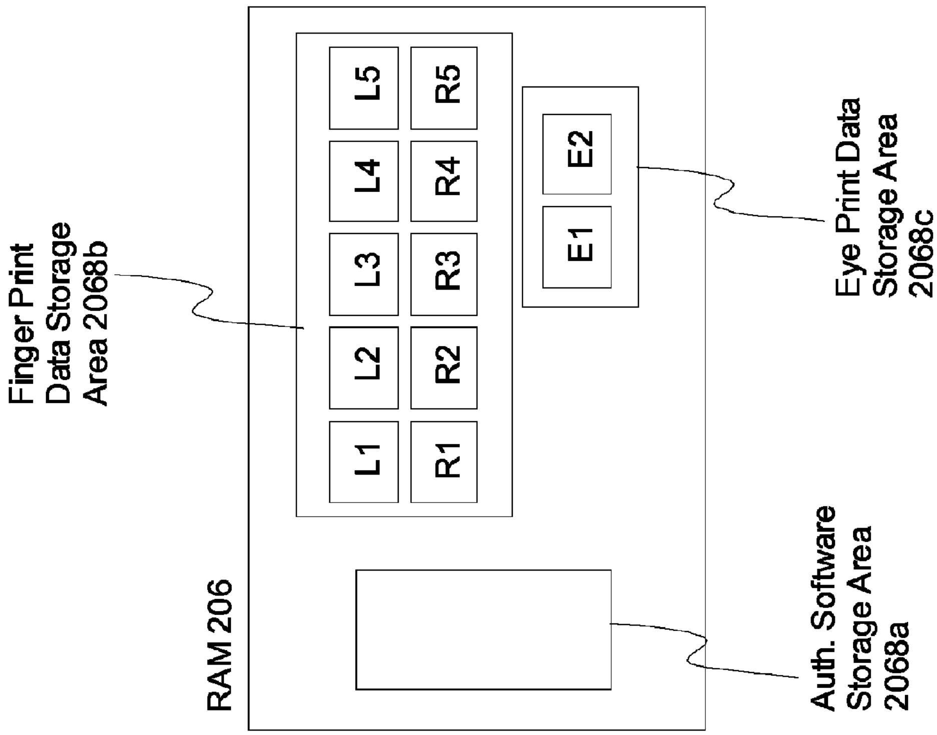

FIG. 161 is a block diagram illustrating an exemplary embodiment of the present invention.

Figure 162:
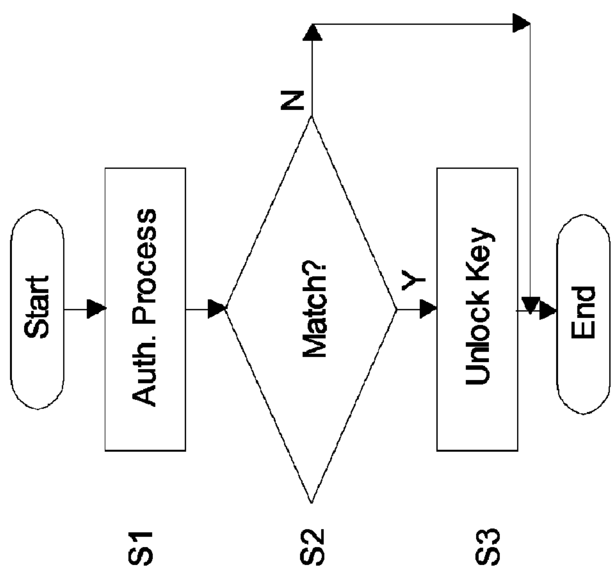

FIG. 162 is a flowchart illustrating an exemplary embodiment of the present invention.

Figure 163:
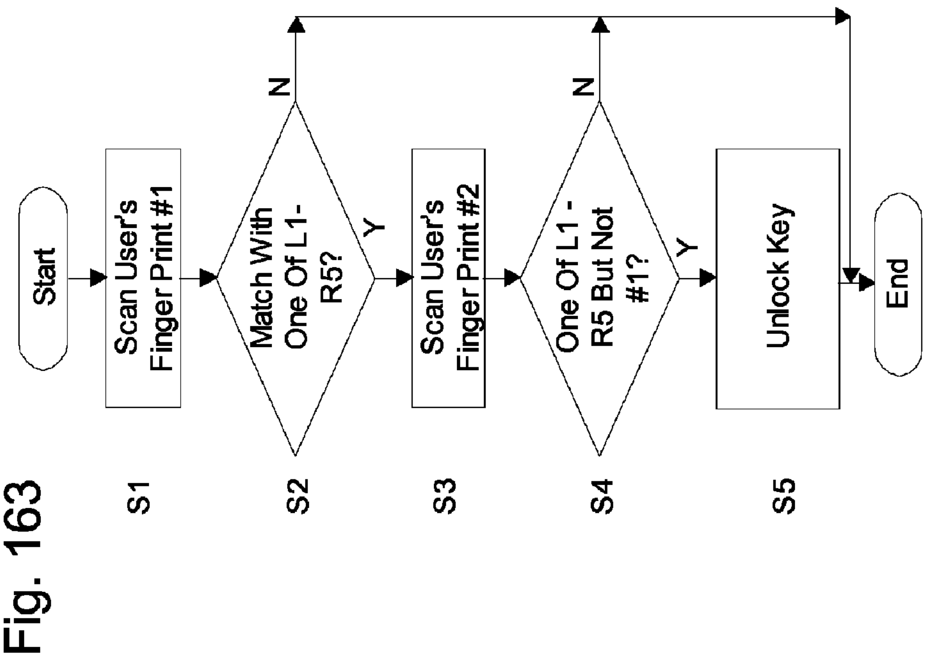

FIG. 163 is a flowchart illustrating an exemplary embodiment of the present invention.

Figure 164:
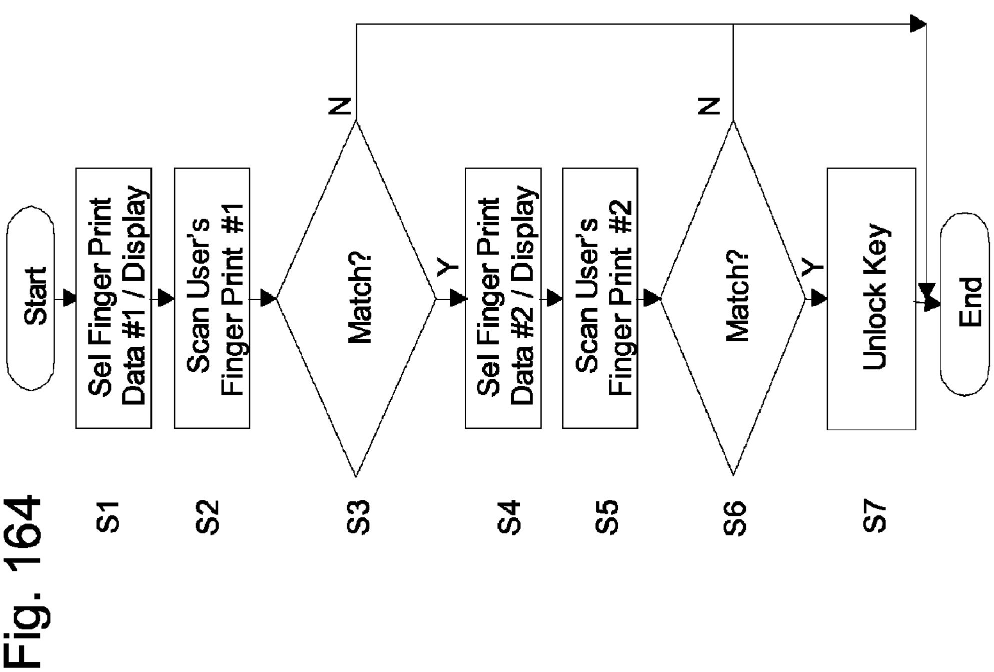

FIG. 164 is a flowchart illustrating an exemplary embodiment of the present invention.

Figure 165:
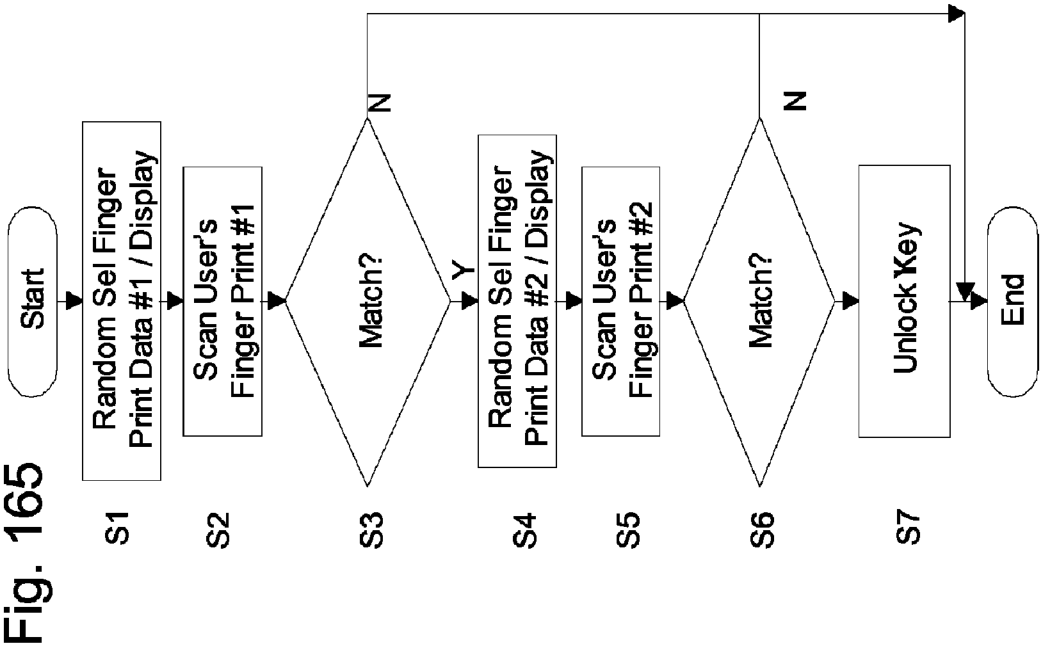

FIG. 165 is a flowchart illustrating an exemplary embodiment of the present invention.

Figure 166:
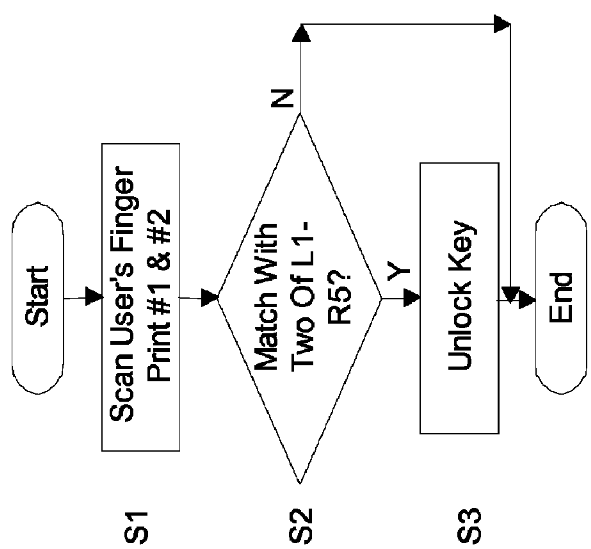

FIG. 166 is a flowchart illustrating an exemplary embodiment of the present invention.

Figure 167:
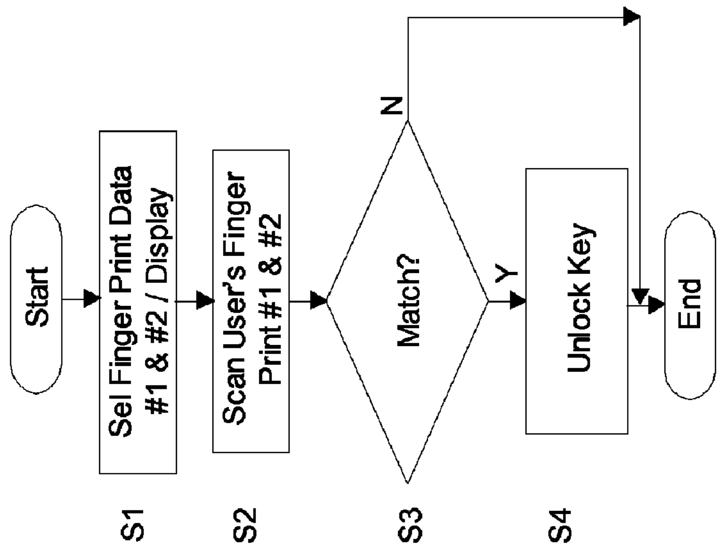

FIG. 167 is a flowchart illustrating an exemplary embodiment of the present invention.

Figure 168:
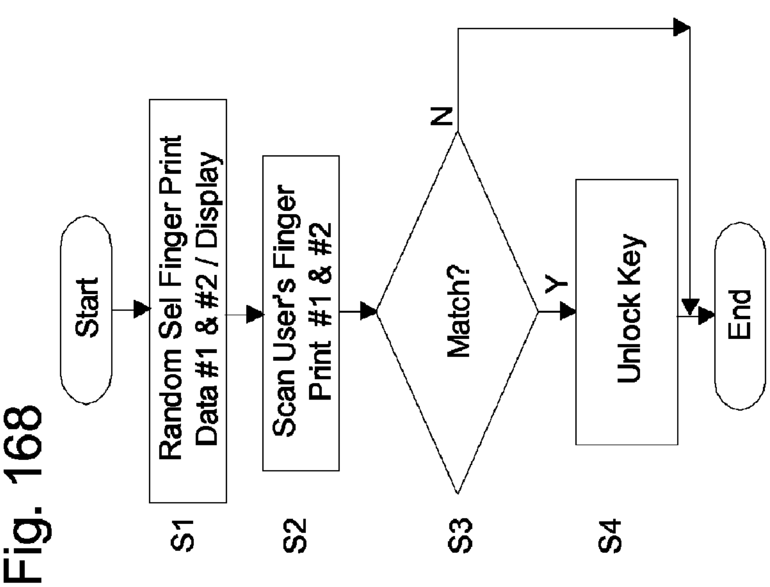

FIG. 168 is a flowchart illustrating an exemplary embodiment of the present invention.

Figure 169:
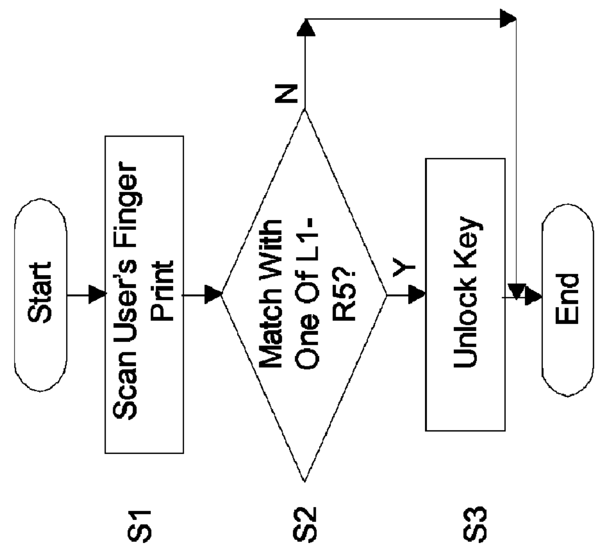

FIG. 169 is a flowchart illustrating an exemplary embodiment of the present invention.

Figure 170:
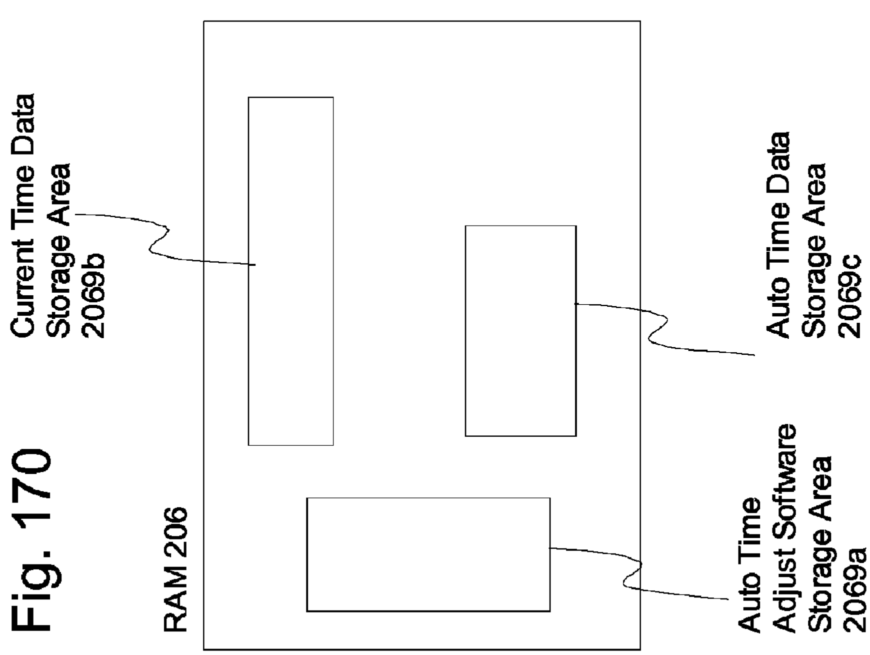

FIG. 170 is a block diagram illustrating an exemplary embodiment of the present invention.

Figure 171:
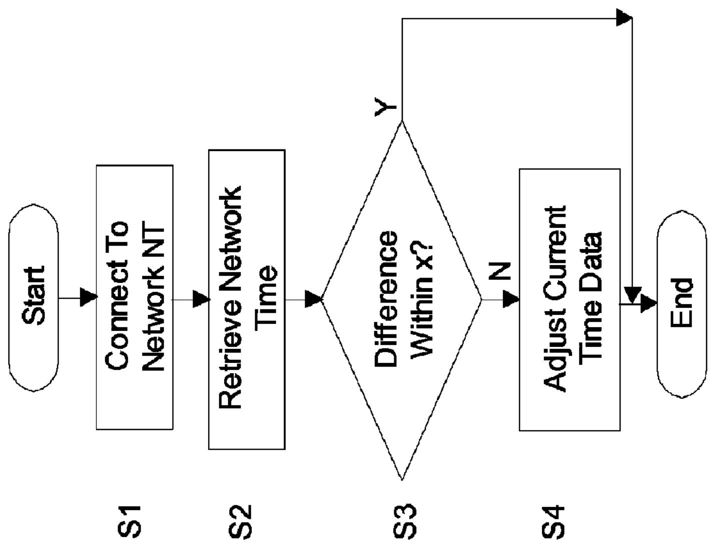

FIG. 171 is a flowchart illustrating an exemplary embodiment of the present invention.

Figure 172:
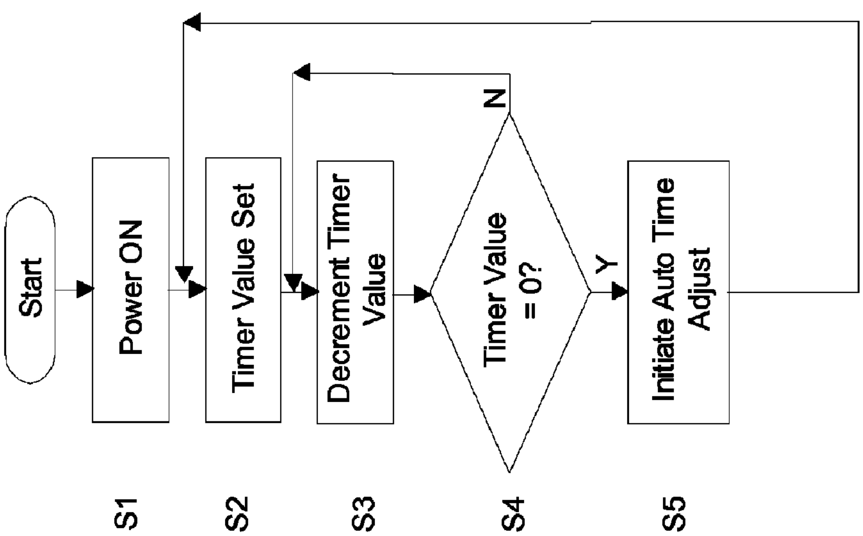

FIG. 172 is a flowchart illustrating an exemplary embodiment of the present invention.

Figure 173:
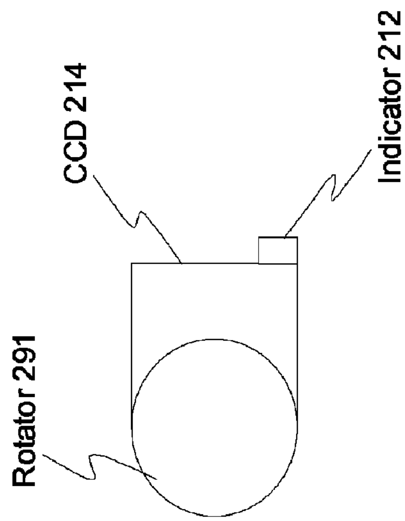

FIG. 173 is a simplified illustration illustrating an exemplary embodiment of the present invention.

Figure 174:
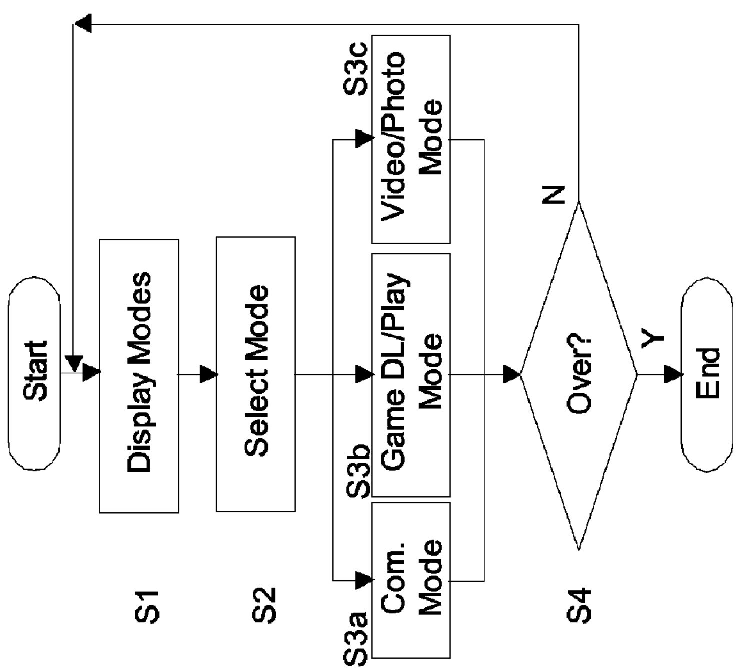

FIG. 174 is a flowchart illustrating an exemplary embodiment of the present invention.

Figure 175:
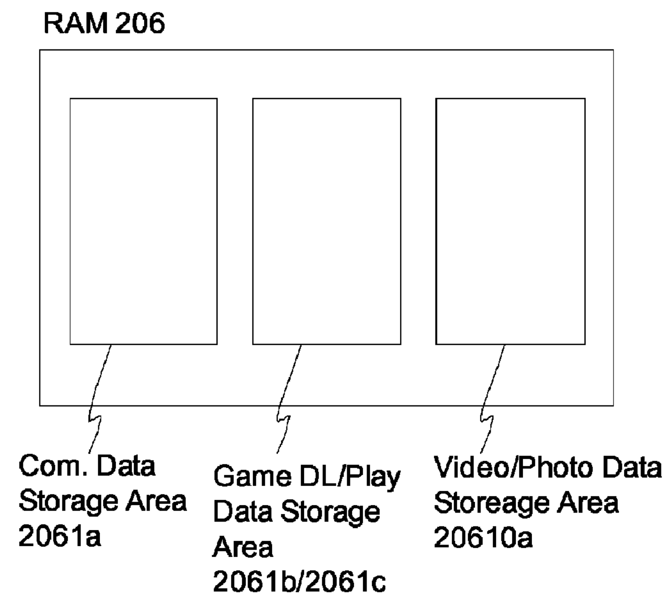

FIG. 175 is a block diagram illustrating an exemplary embodiment of the present invention.

Figure 176:
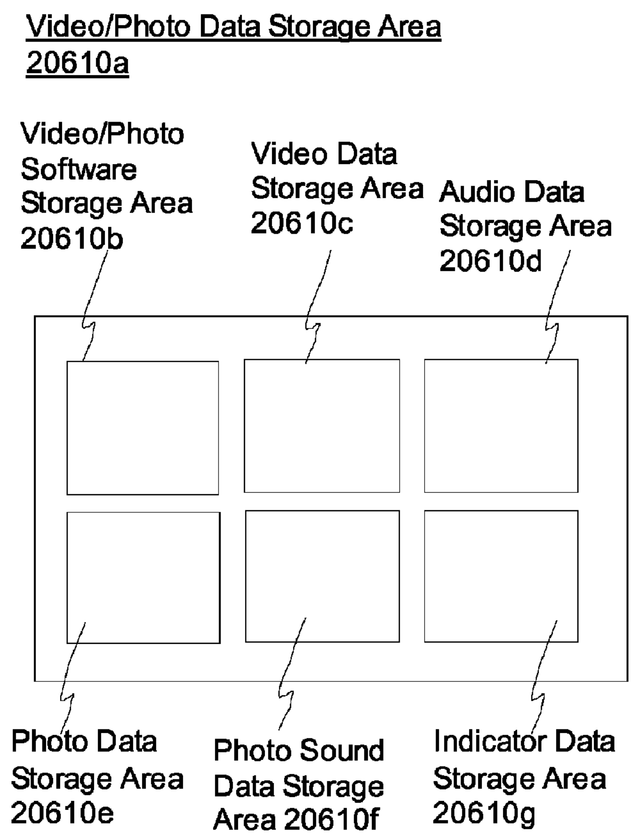

FIG. 176 is a block diagram illustrating an exemplary embodiment of the present invention.

Figure 177:
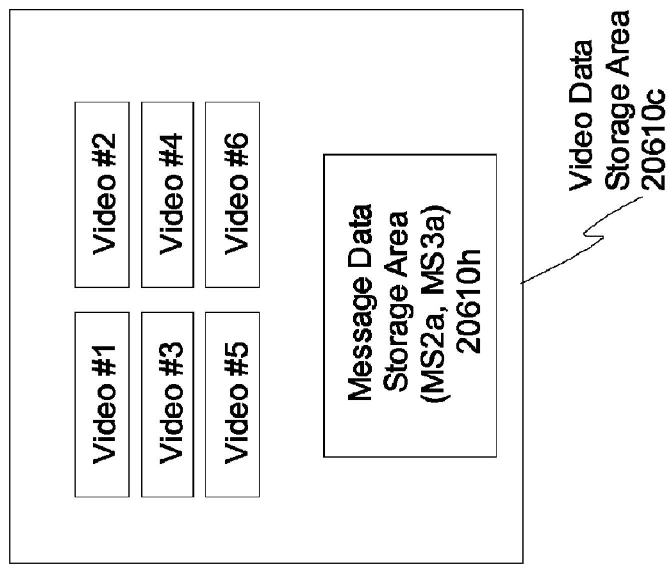

FIG. 177 is a block diagram illustrating an exemplary embodiment of the present invention.

Figure 178:
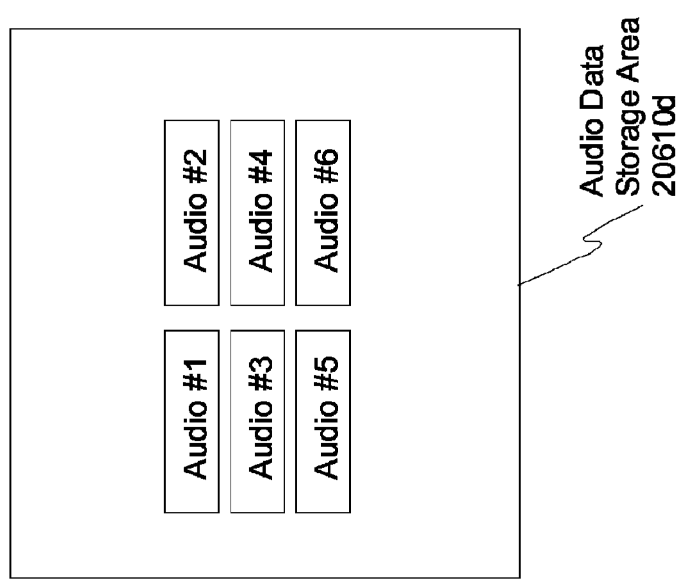

FIG. 178 is a block diagram illustrating an exemplary embodiment of the present invention.

Figure 179:
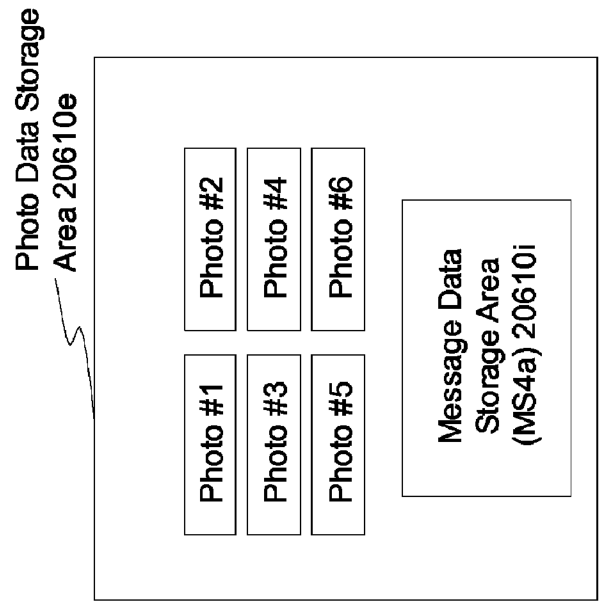

FIG. 179 is a block diagram illustrating an exemplary embodiment of the present invention.

Figure 180:
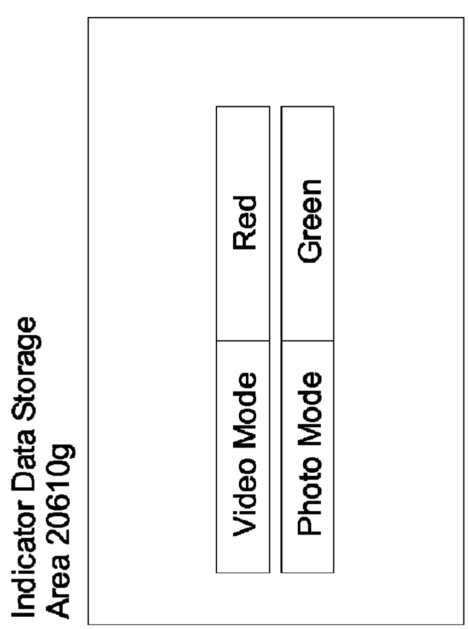

FIG. 180 is a block diagram illustrating an exemplary embodiment of the present invention.

Figure 181:
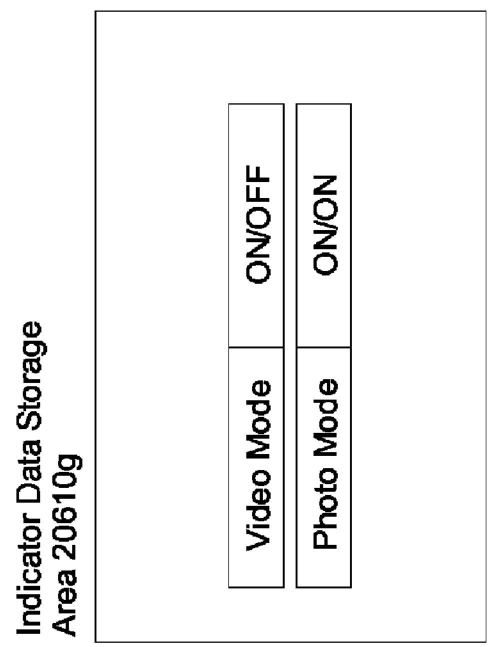

FIG. 181 is a block diagram illustrating an exemplary embodiment of the present invention.

Figure 182:
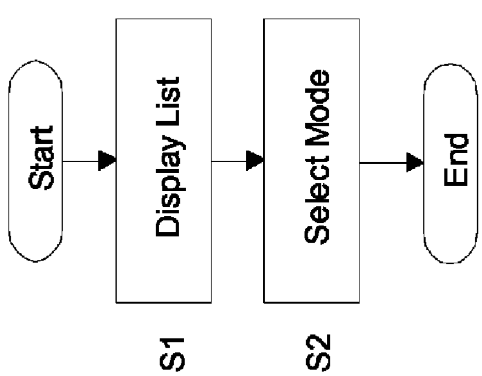

FIG. 182 is a flowchart illustrating an exemplary embodiment of the present invention.

Figure 183:
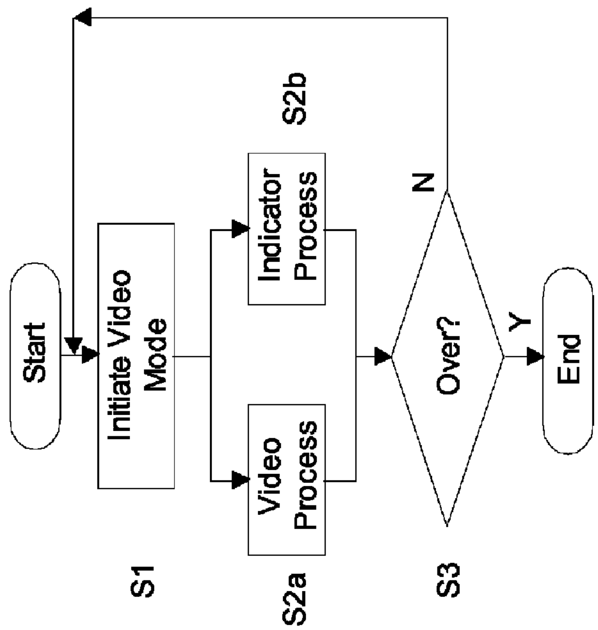

FIG. 183 is a flowchart illustrating an exemplary embodiment of the present invention.

Figure 184:
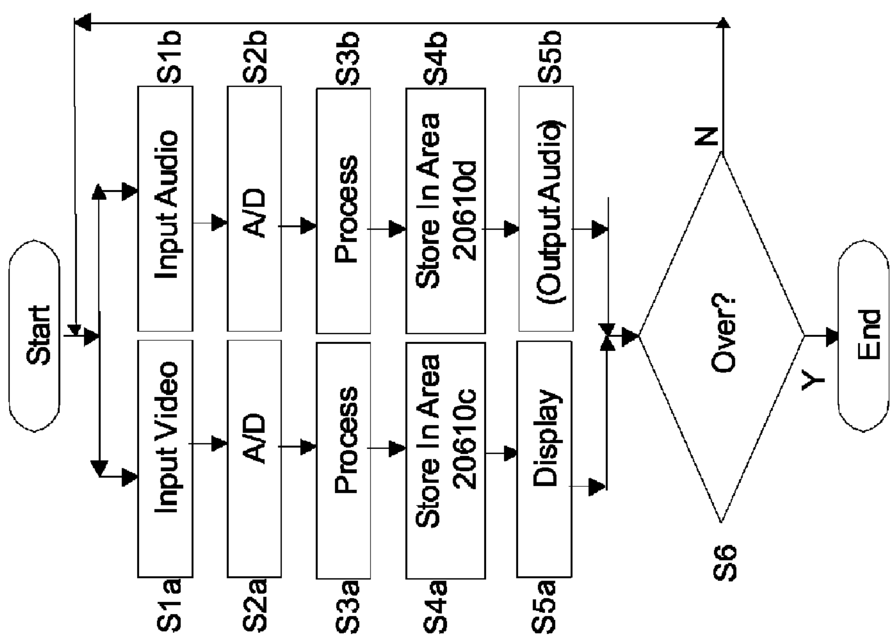

FIG. 184 is a flowchart illustrating an exemplary embodiment of the present invention.

Figure 185:
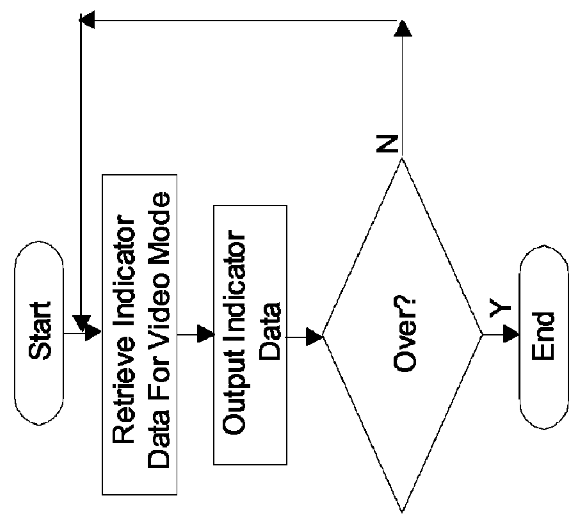

FIG. 185 is a flowchart illustrating an exemplary embodiment of the present invention.

Figure 186:
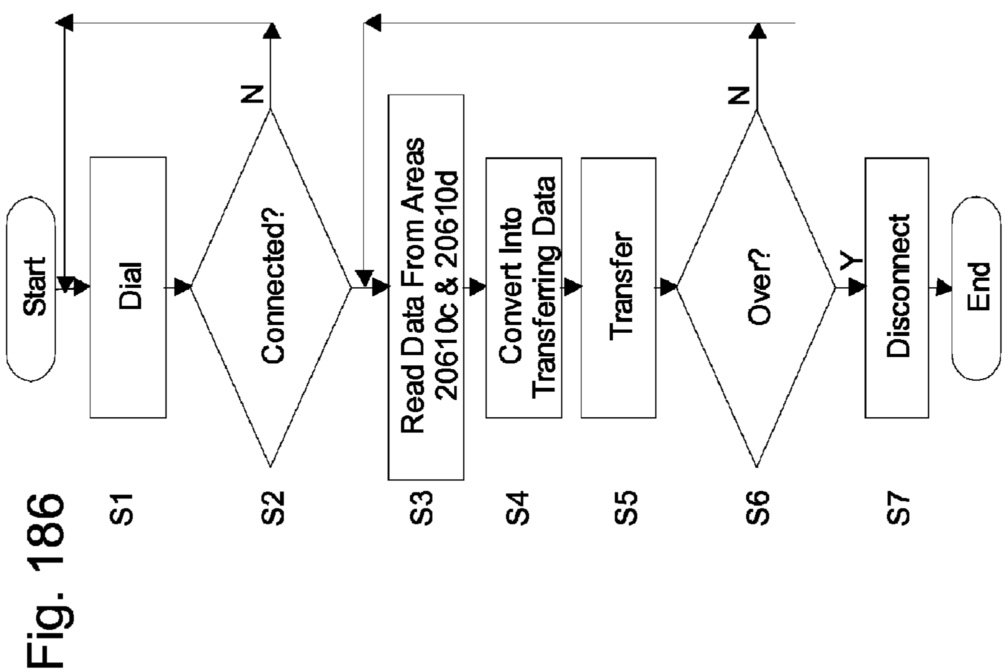

FIG. 186 is a flowchart illustrating an exemplary embodiment of the present invention.

Figure 187:
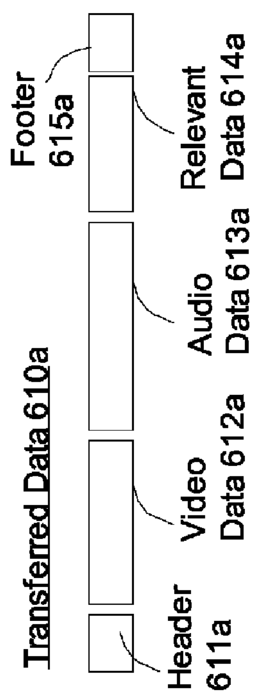

FIG. 187 is a simplified illustration illustrating an exemplary embodiment of the present invention.

Figure 188:
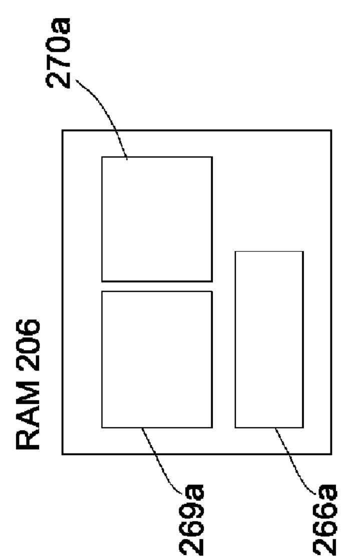

FIG. 188 is a block diagram illustrating an exemplary embodiment of the present invention.

Figure 189:
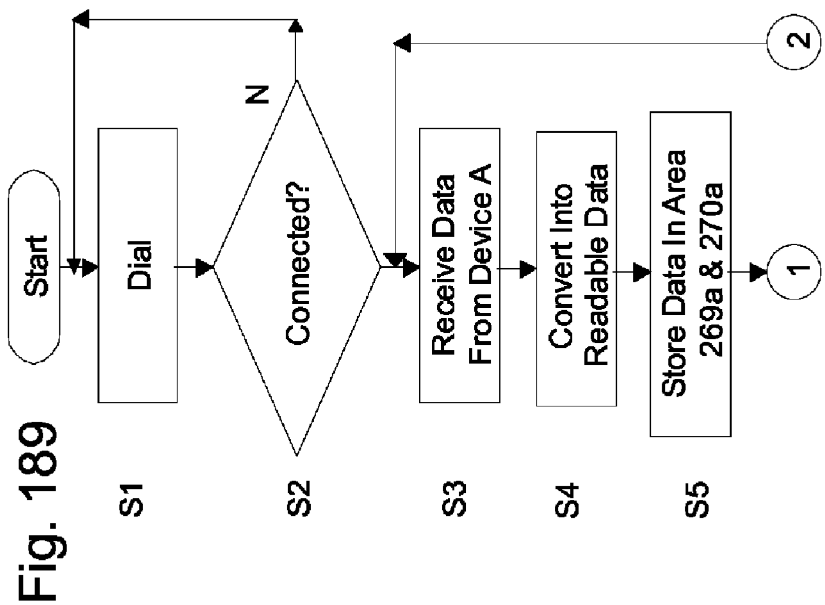

FIG. 189 is a flowchart illustrating an exemplary embodiment of the present invention.

Figure 190:
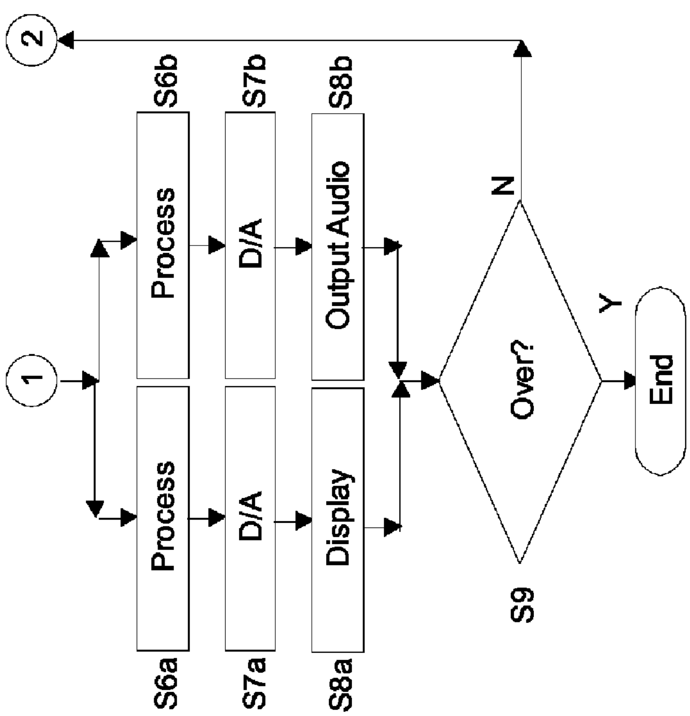

FIG. 190 is a flowchart illustrating an exemplary embodiment of the present invention.

Figure 191:
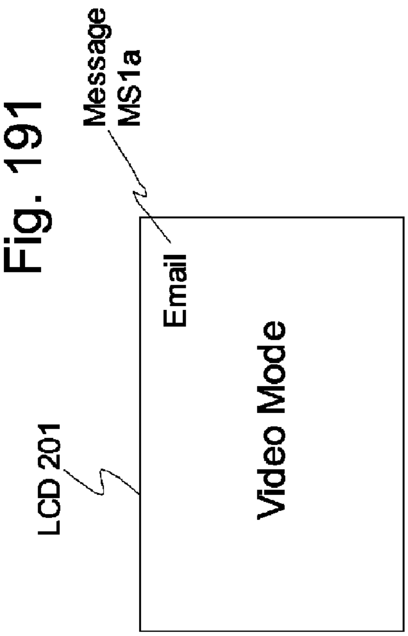

FIG. 191 is a simplified illustration illustrating an exemplary embodiment of the present invention.

Figure 192:
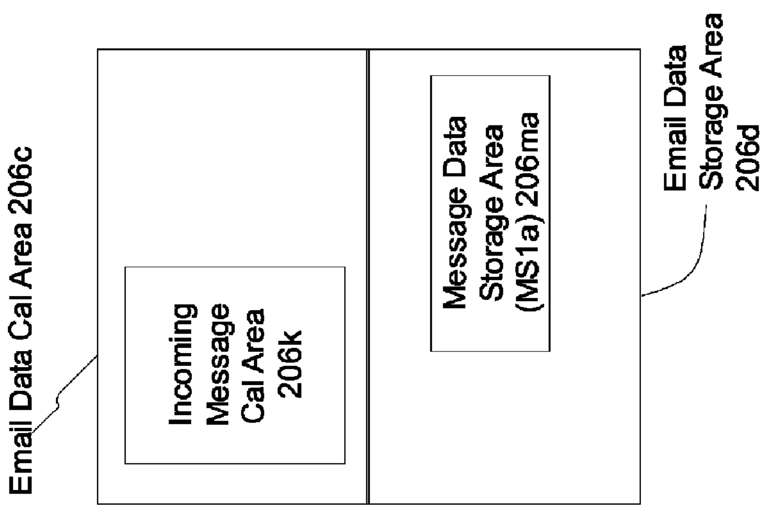

FIG. 192 is a block diagram illustrating an exemplary embodiment of the present invention.

Figure 193:
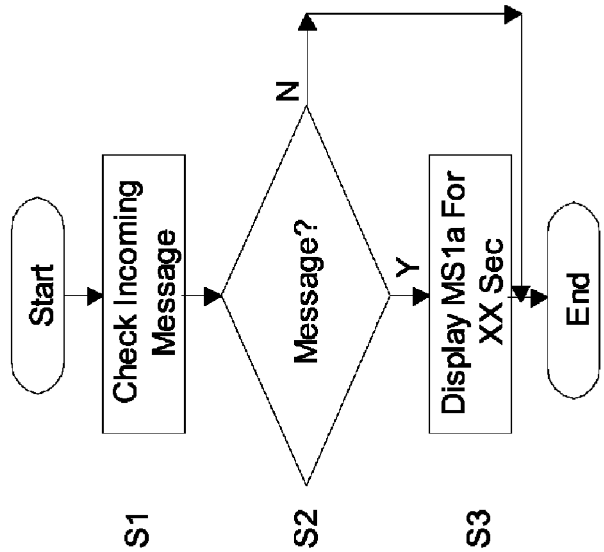

FIG. 193 is a flowchart illustrating an exemplary embodiment of the present invention.

Figure 194:
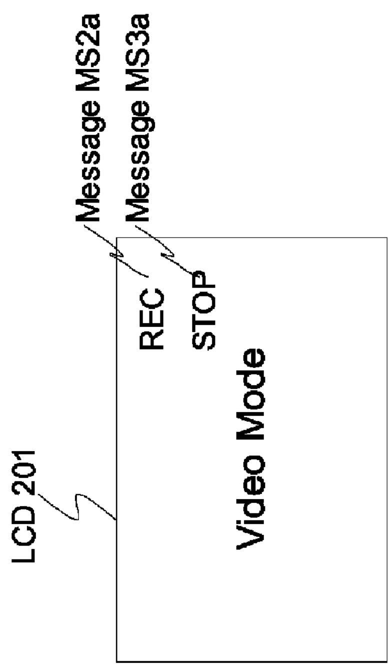

FIG. 194 is a simplified illustration illustrating an exemplary embodiment of the present invention.

Figure 195:
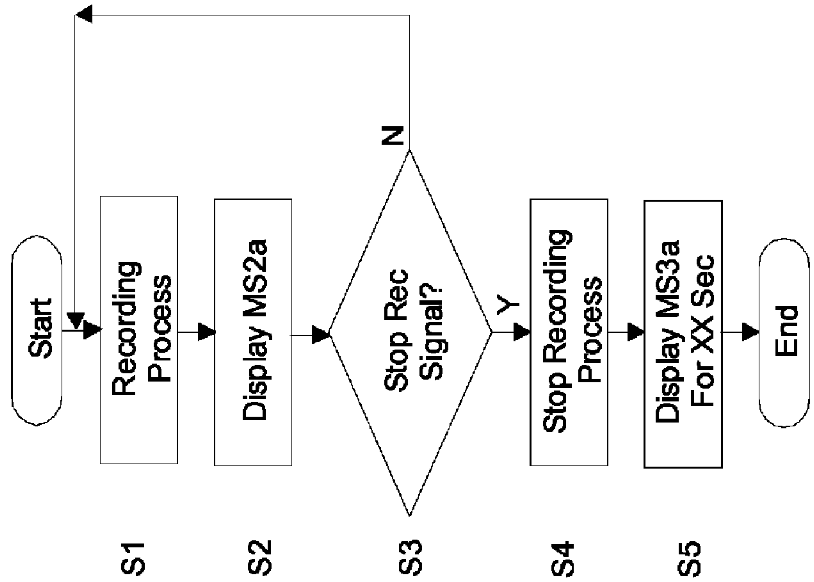

FIG. 195 is a flowchart illustrating an exemplary embodiment of the present invention.

Figure 196:
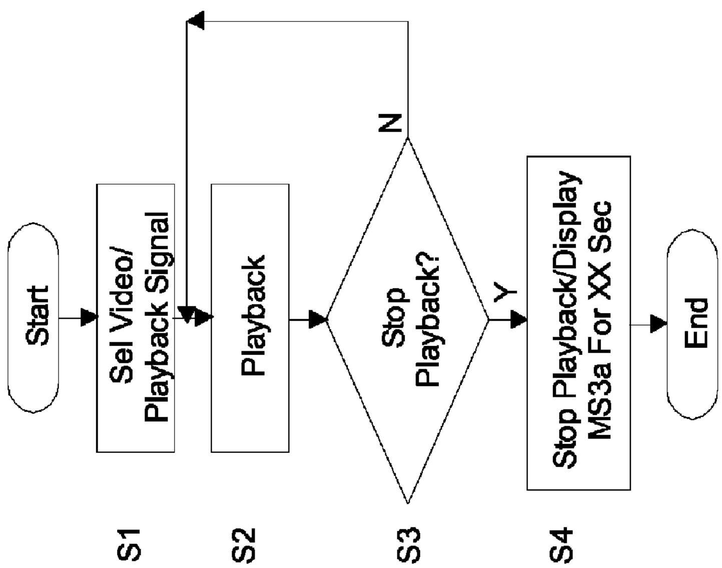

FIG. 196 is a flowchart illustrating an exemplary embodiment of the present invention.

Figure 197:
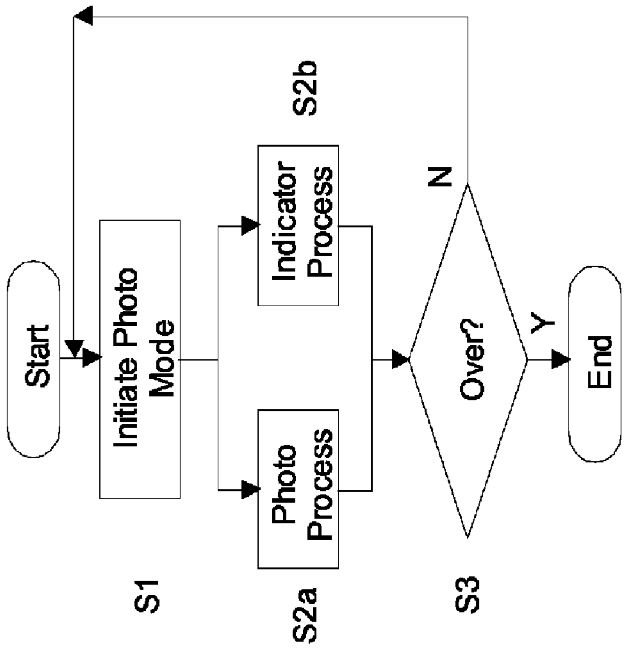

FIG. 197 is a flowchart illustrating an exemplary embodiment of the present invention.

Figure 198:
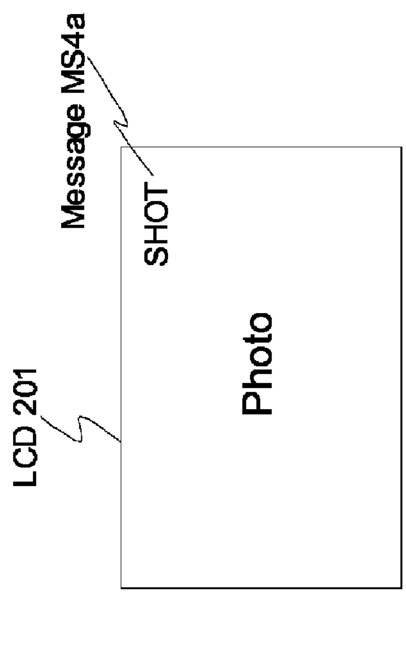

FIG. 198 is a simplified illustration illustrating an exemplary embodiment of the present invention.

Figure 199:
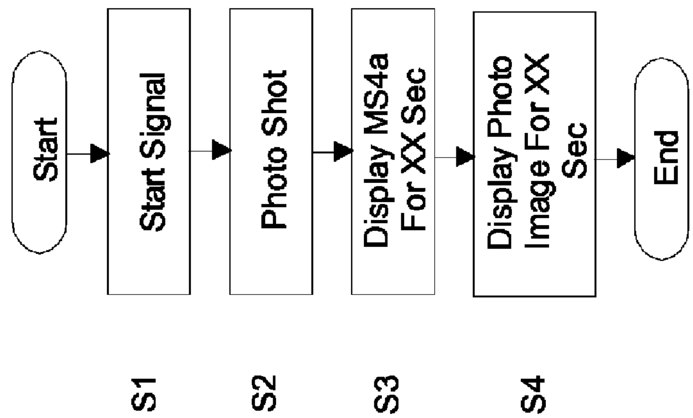

FIG. 199 is a flowchart illustrating an exemplary embodiment of the present invention.

Figure 200:
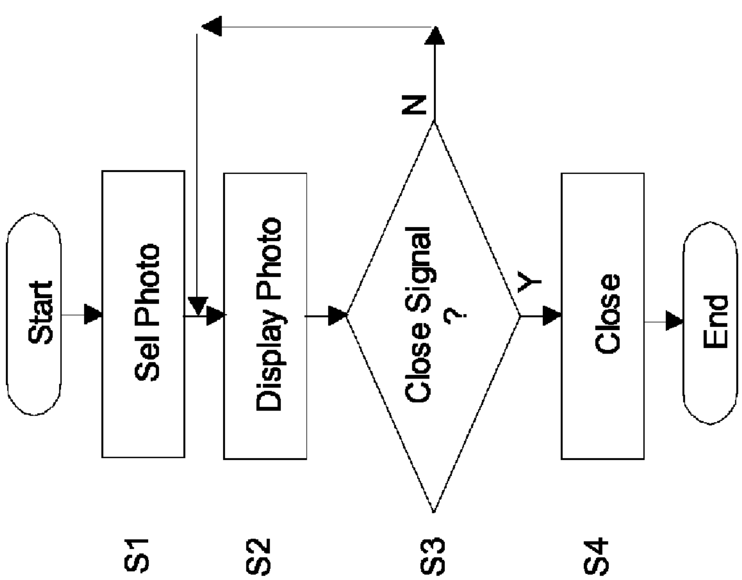

FIG. 200 is a flowchart illustrating an exemplary embodiment of the present invention.

Figure 201:
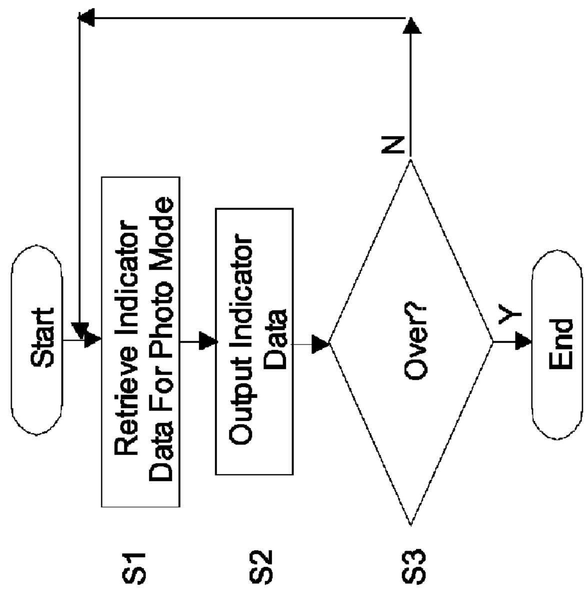

FIG. 201 is a flowchart illustrating an exemplary embodiment of the present invention.

Figure 202:
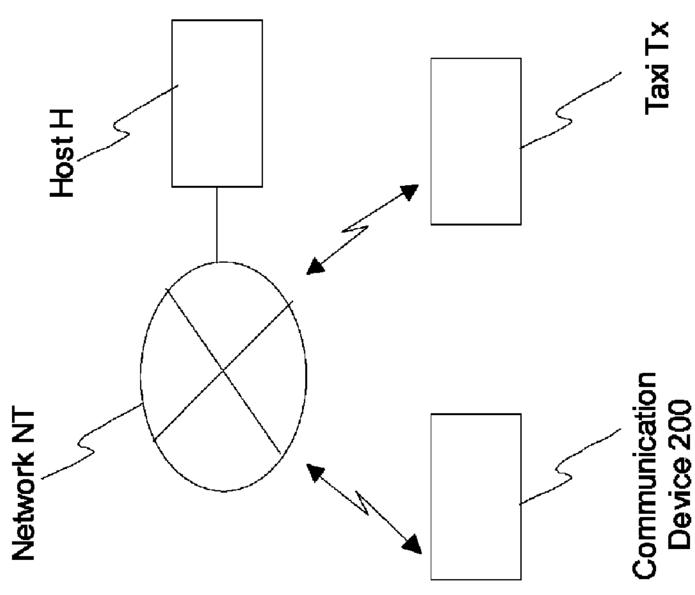

FIG. 202 is a simplified illustration illustrating an exemplary embodiment of the present invention.

Figure 203:
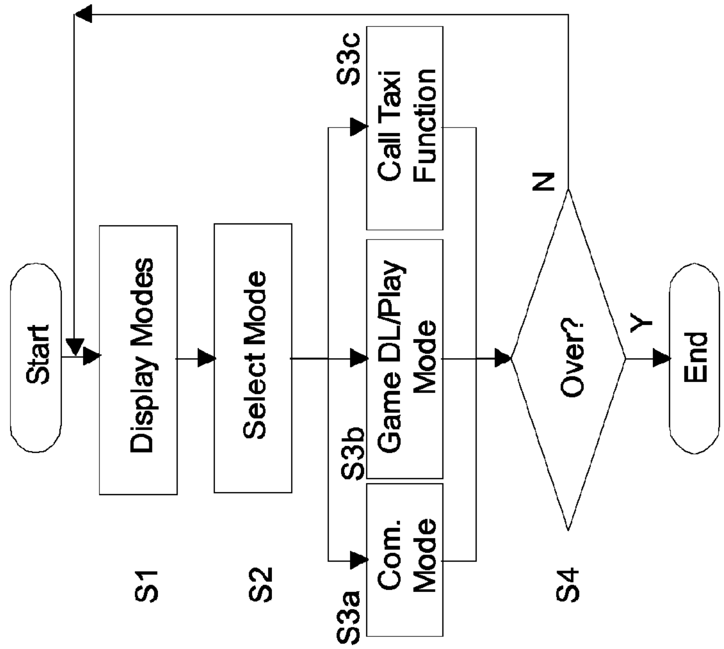

FIG. 203 is a flowchart illustrating an exemplary embodiment of the present invention.

Figure 204:
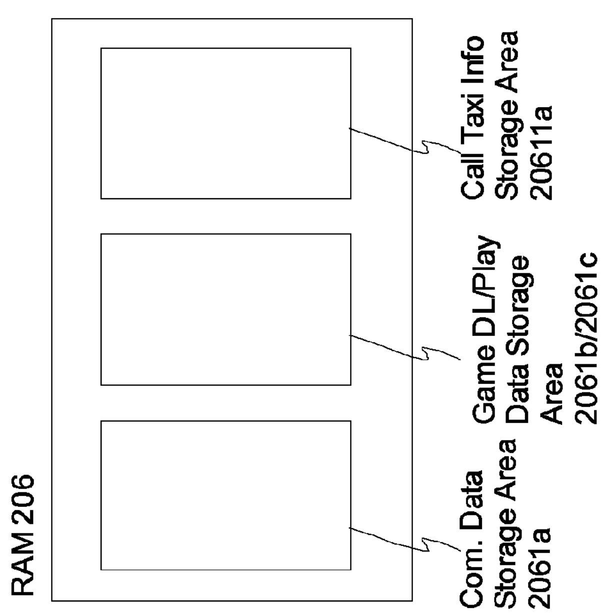

FIG. 204 is a block diagram illustrating an exemplary embodiment of the present invention.

Figure 205:
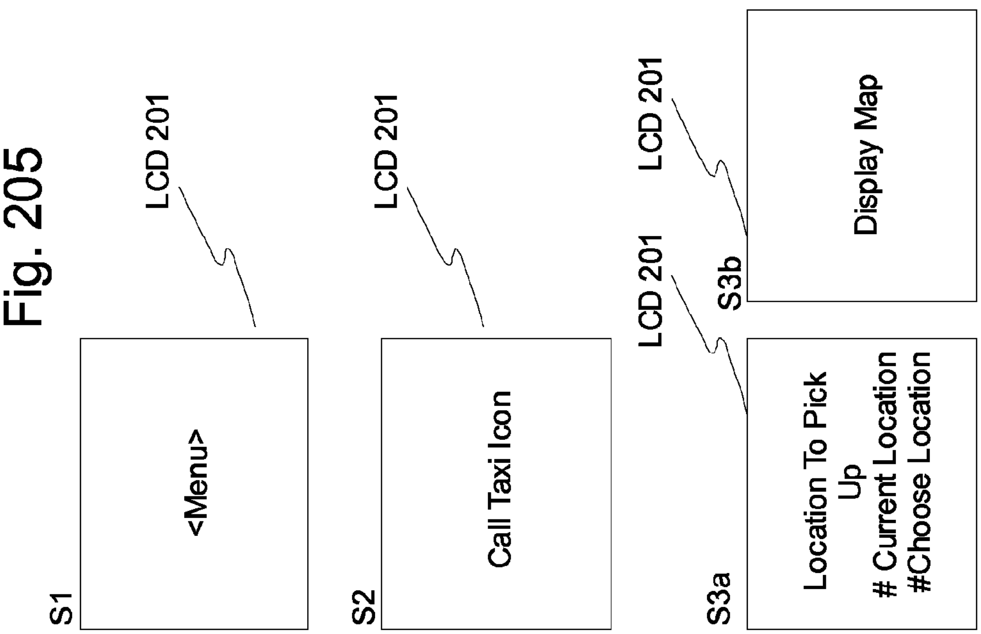

FIG. 205 is a simplified illustration illustrating an exemplary embodiment of the present invention.

Figure 206:
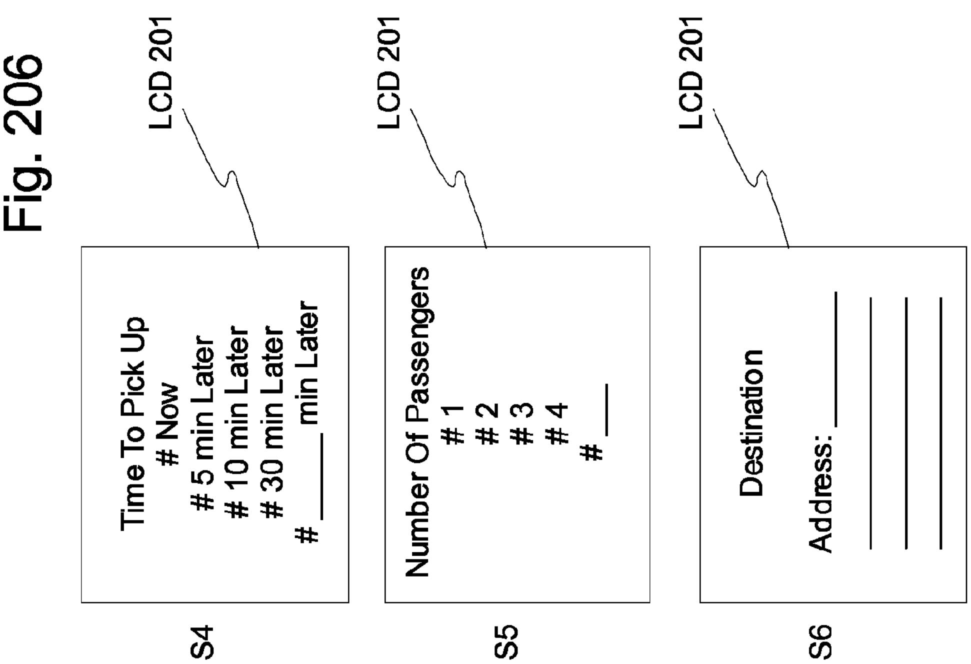

FIG. 206 is a simplified illustration illustrating an exemplary embodiment of the present invention.

Figure 207:
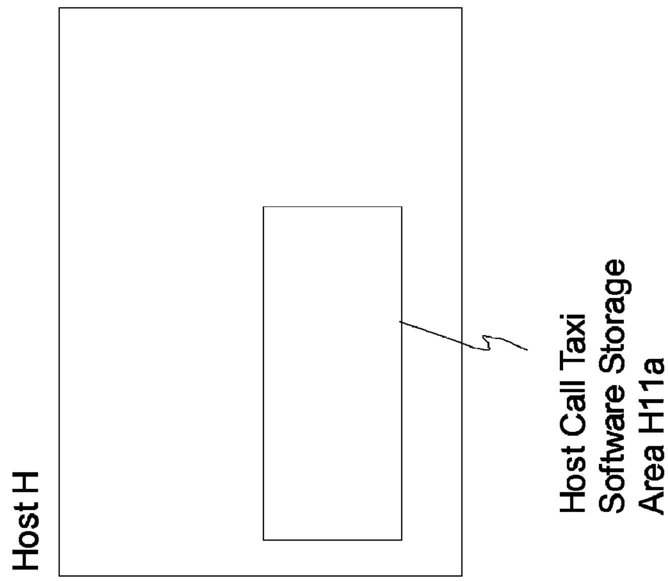

FIG. 207 is a block diagram illustrating an exemplary embodiment of the present invention.

Figure 208:
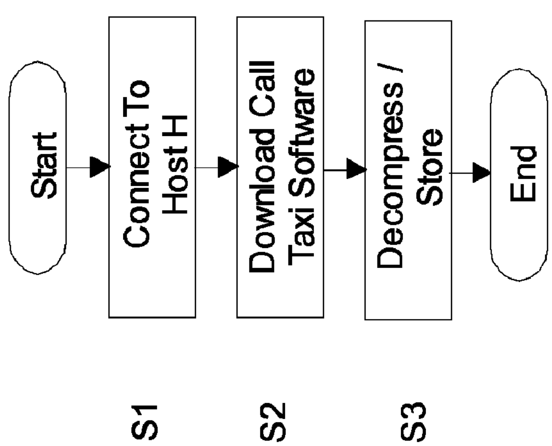

FIG. 208 is a flowchart illustrating an exemplary embodiment of the present invention.

Figure 209:
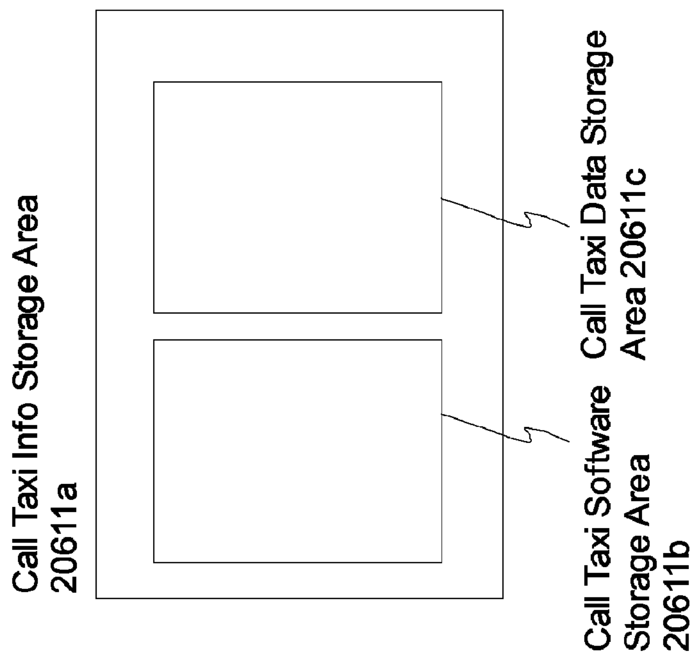

FIG. 209 is a block diagram illustrating an exemplary embodiment of the present invention.

Figure 210:
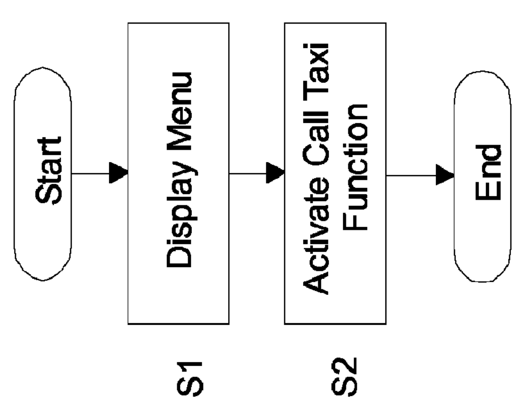

FIG. 210 is a flowchart illustrating an exemplary embodiment of the present invention.

Figure 211:
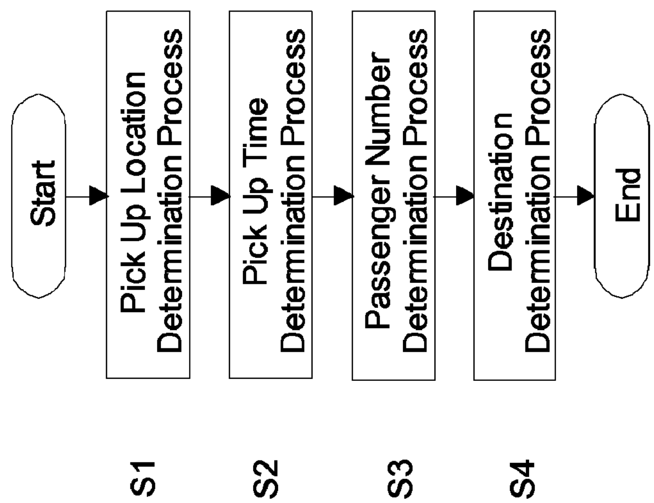

FIG. 211 is a flowchart illustrating an exemplary embodiment of the present invention.

Figure 212:
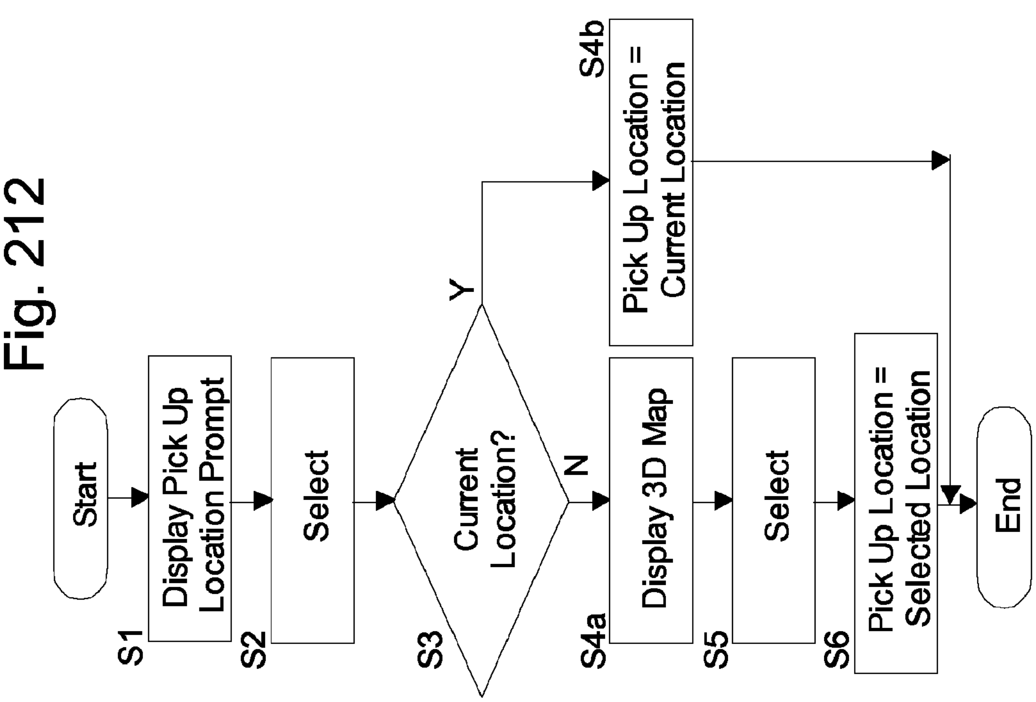

FIG. 212 is a flowchart illustrating an exemplary embodiment of the present invention.

Figure 213:
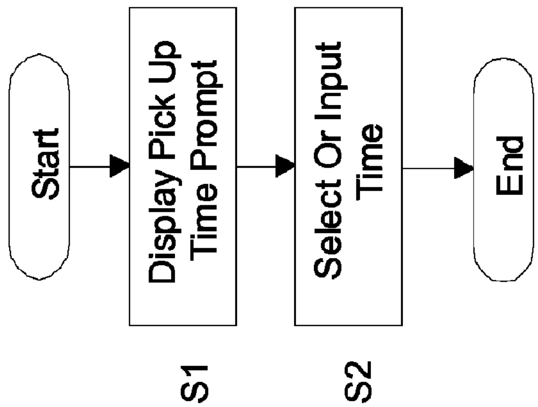

FIG. 213 is a flowchart illustrating an exemplary embodiment of the present invention.

Figure 214:
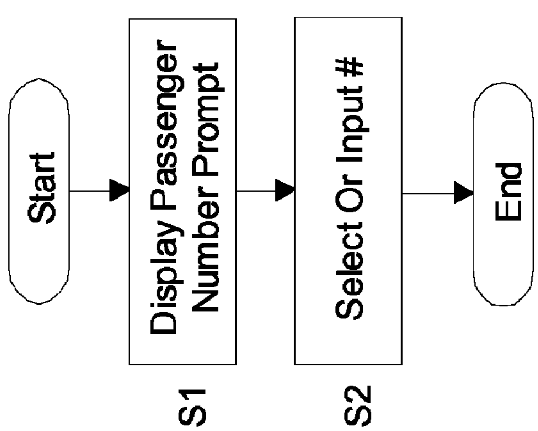

FIG. 214 is a flowchart illustrating an exemplary embodiment of the present invention.

Figure 215:
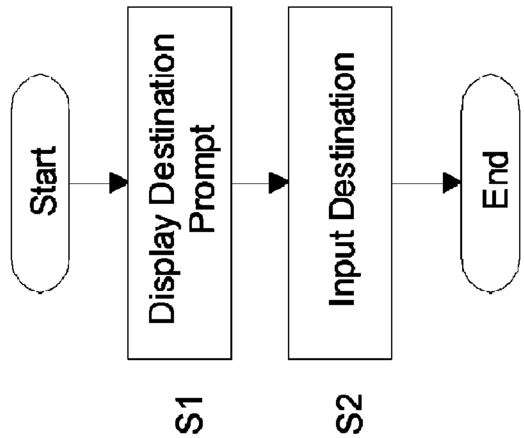

FIG. 215 is a flowchart illustrating an exemplary embodiment of the present invention.

Figure 216:
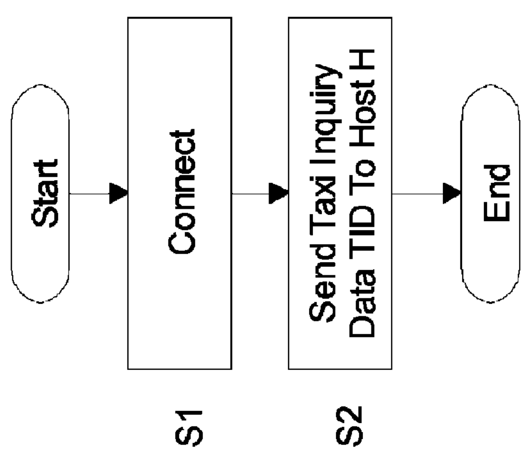

FIG. 216 is a flowchart illustrating an exemplary embodiment of the present invention.

Figure 217:
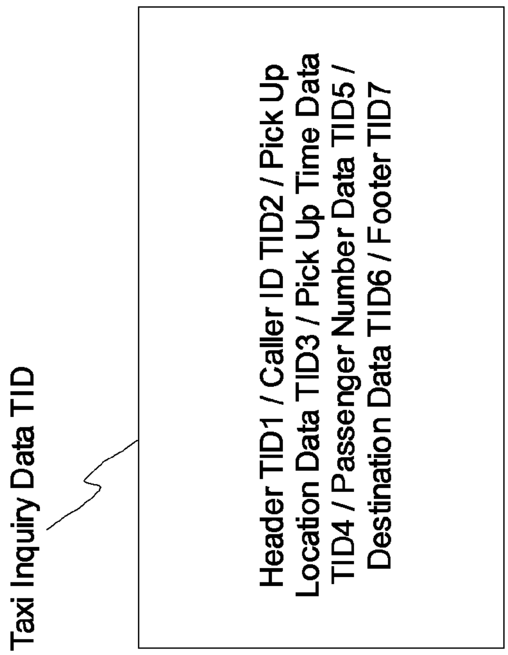

FIG. 217 is a simplified illustration illustrating an exemplary embodiment of the present invention.

Figure 218:
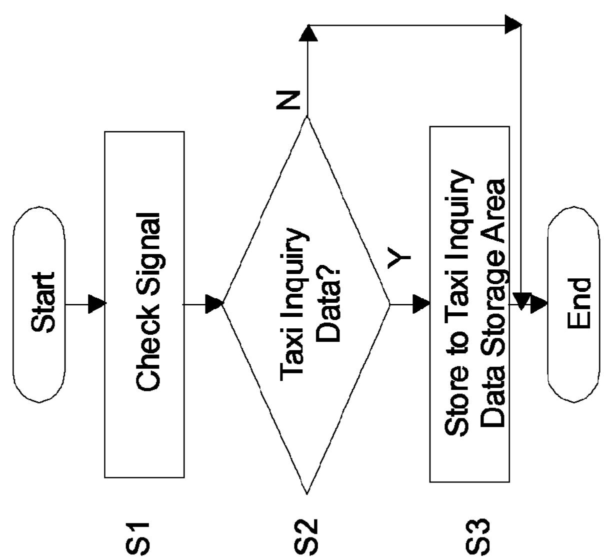

FIG. 218 is a flowchart illustrating an exemplary embodiment of the present invention.

FIG. 219 is a block diagram illustrating an exemplary embodiment of the present invention.

FIG. 220 is a block diagram illustrating an exemplary embodiment of the present invention.

Figure 221:
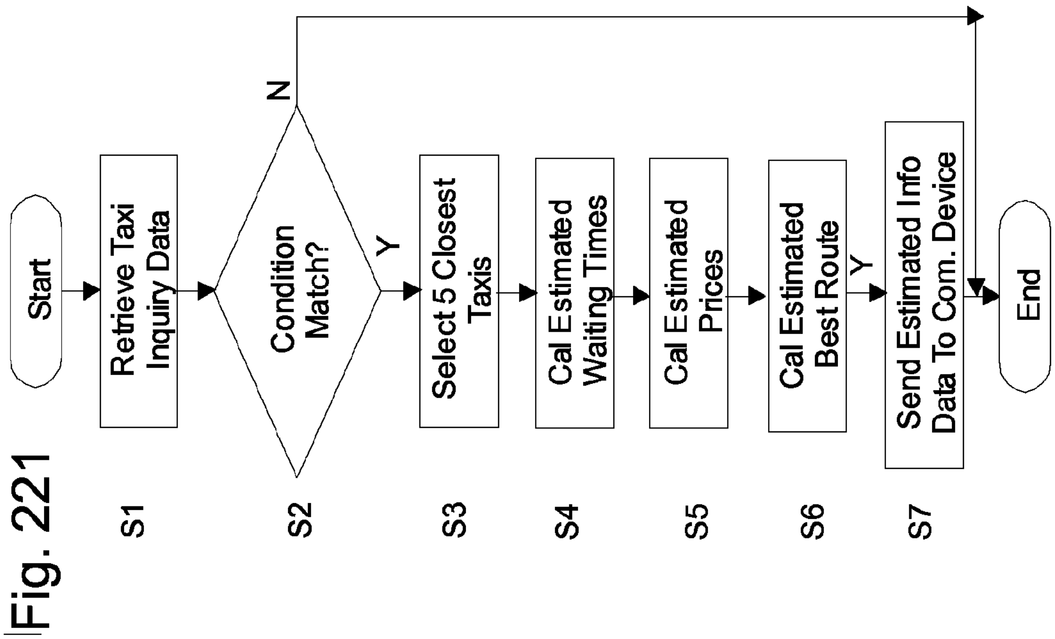

FIG. 221 is a flowchart illustrating an exemplary embodiment of the present invention.

Figure 222:
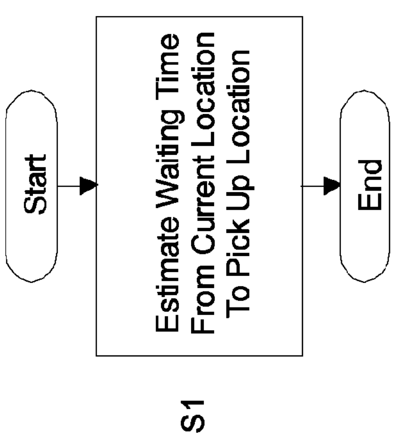

FIG. 222 is a flowchart illustrating an exemplary embodiment of the present invention.

Figure 223:
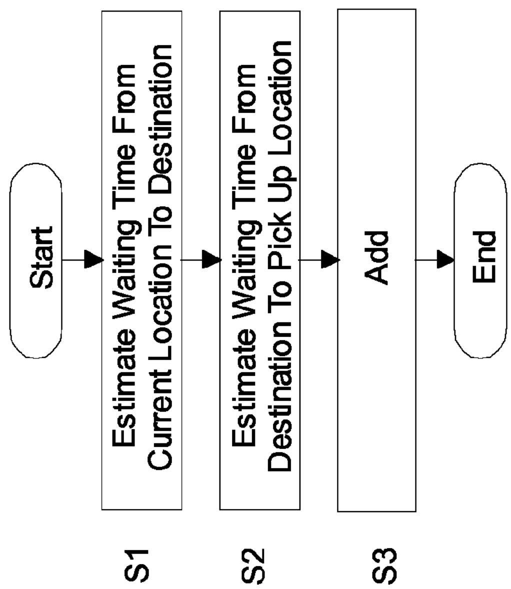

FIG. 223 is a flowchart illustrating an exemplary embodiment of the present invention.

Figure 224:
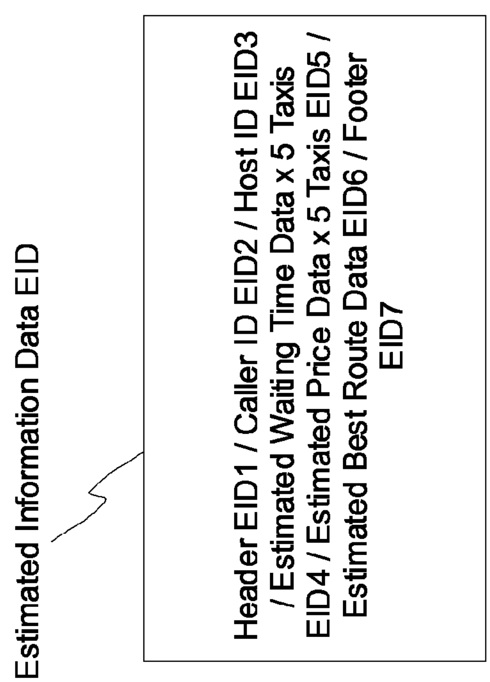

FIG. 224 is a simplified illustration illustrating an exemplary embodiment of the present invention.

Figure 225:
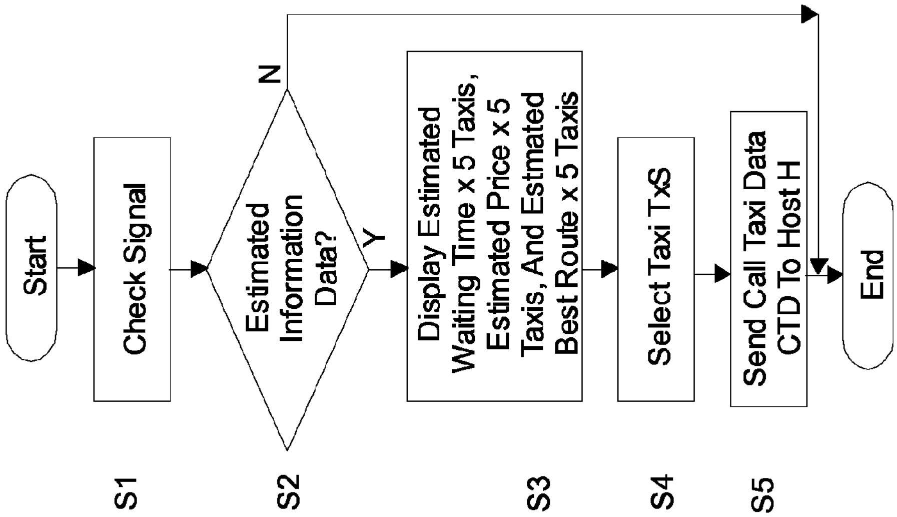

FIG. 225 is a flowchart illustrating an exemplary embodiment of the present invention.

Figure 226:
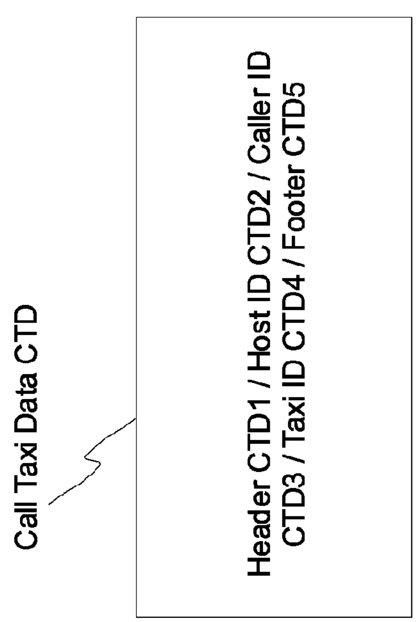

FIG. 226 is a simplified illustration illustrating an exemplary embodiment of the present invention.

Figure 227:
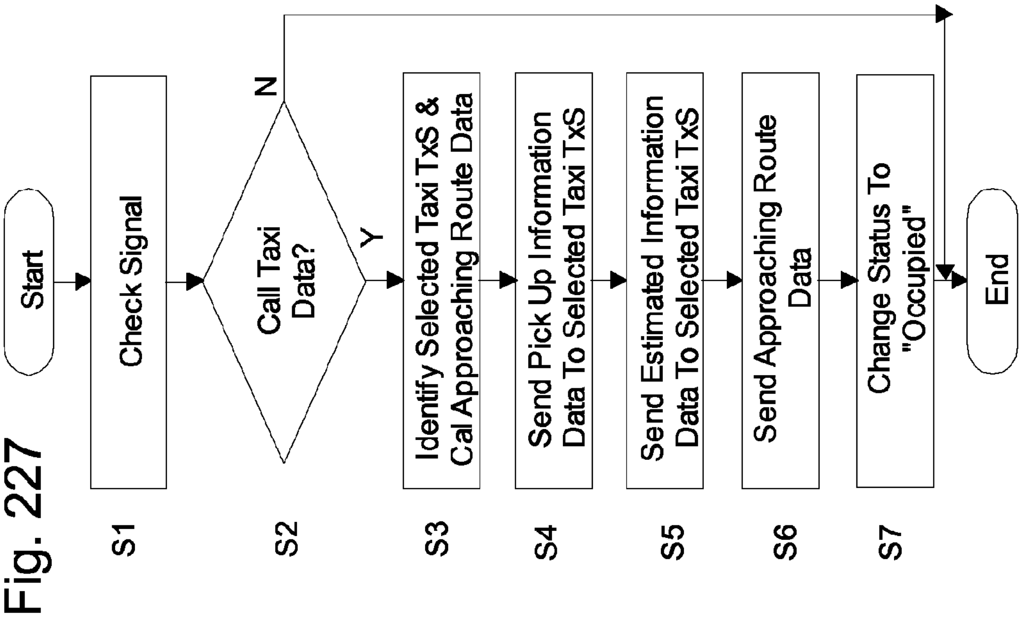

FIG. 227 is a flowchart illustrating an exemplary embodiment of the present invention.

Figure 228:
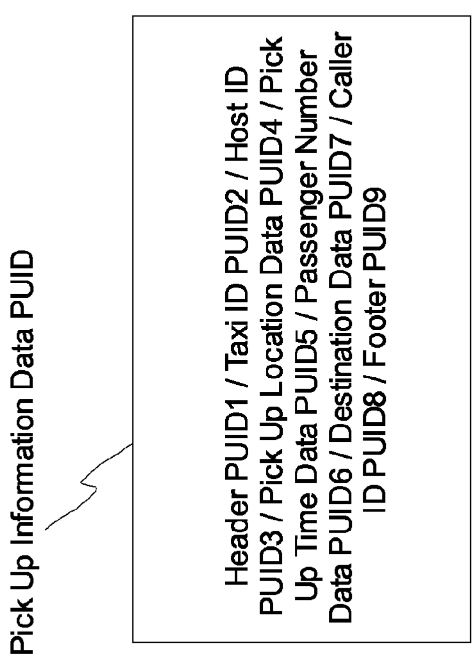

FIG. 228 is a simplified illustration illustrating an exemplary embodiment of the present invention.

Figure 229:
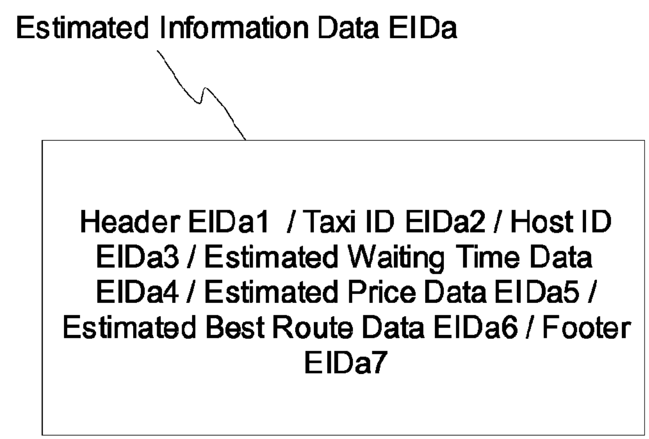

FIG. 229 is a simplified illustration illustrating an exemplary embodiment of the present invention.

Figure 230:
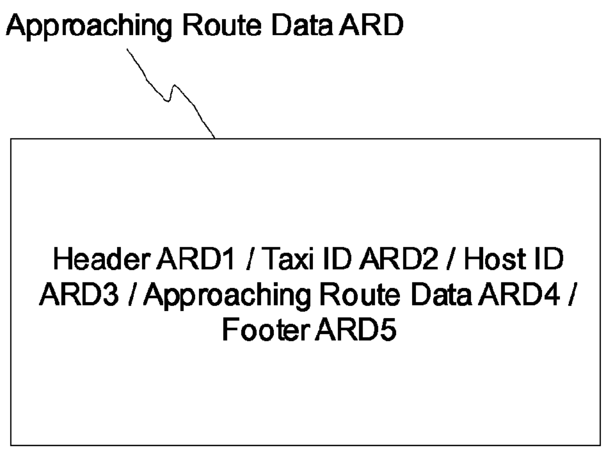

FIG. 230 is a simplified illustration illustrating an exemplary embodiment of the present invention.

Figure 231:
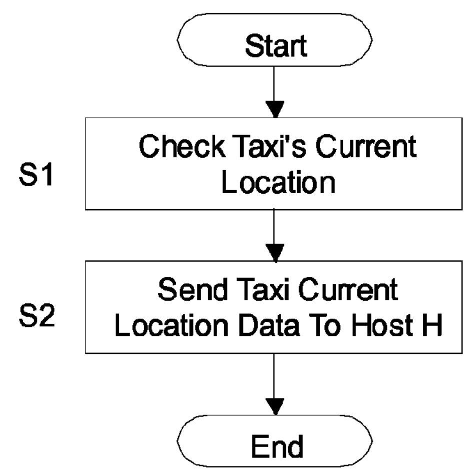

FIG. 231 is a flowchart illustrating an exemplary embodiment of the present invention.

Figure 232:
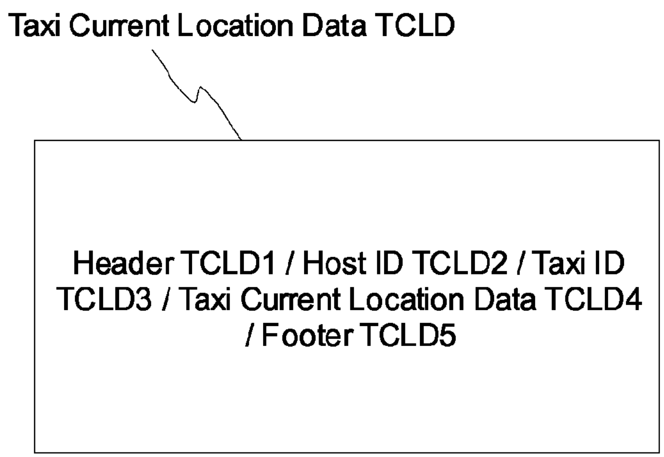

FIG. 232 is a simplified illustration illustrating an exemplary embodiment of the present invention.

Figure 233:
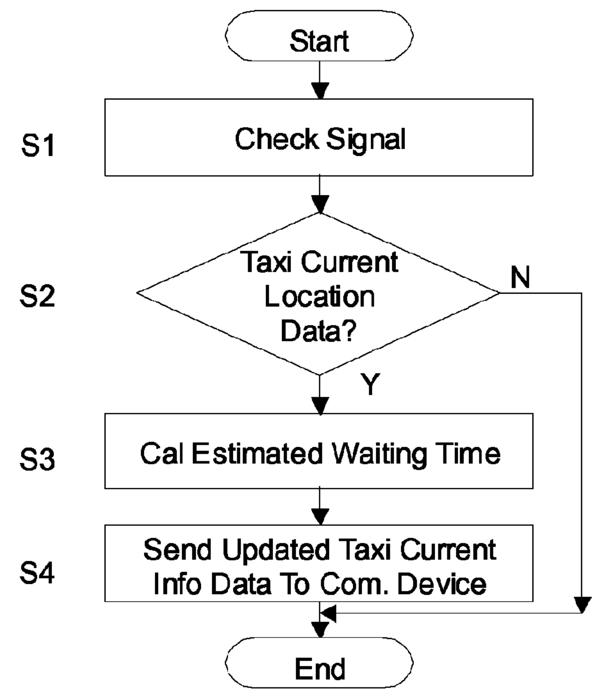

FIG. 233 is a flowchart illustrating an exemplary embodiment of the present invention.

Figure 234:
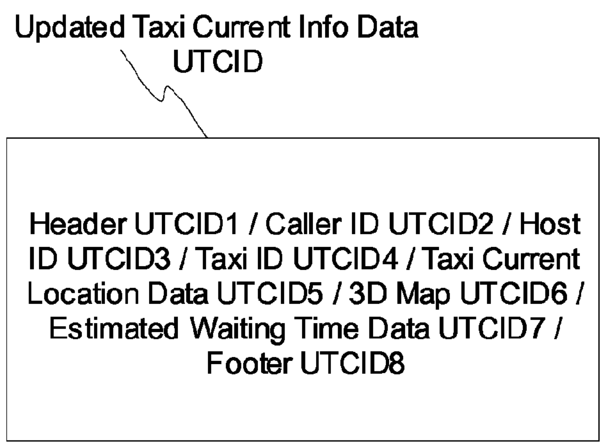

FIG. 234 is a simplified illustration illustrating an exemplary embodiment of the present invention.

Figure 235:
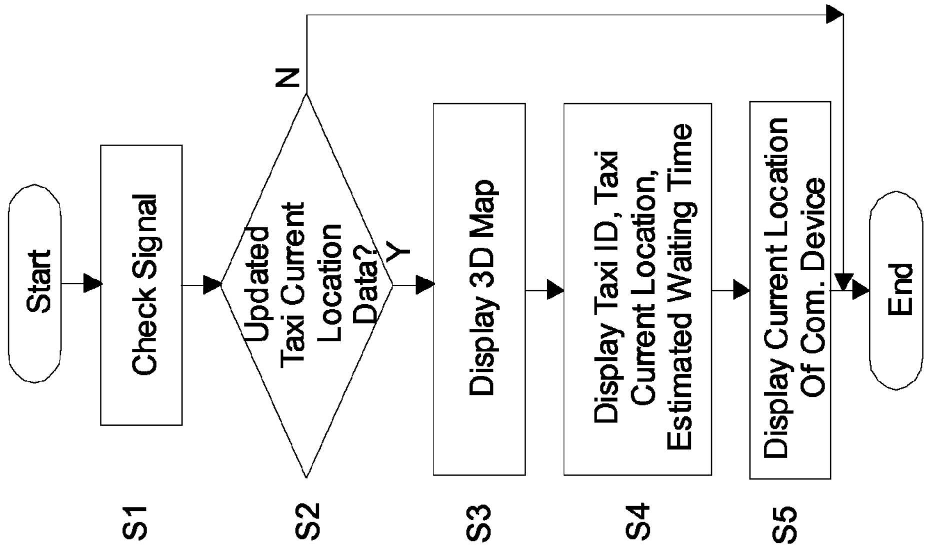

FIG. 235 is a flowchart illustrating an exemplary embodiment of the present invention.

Figure 236:
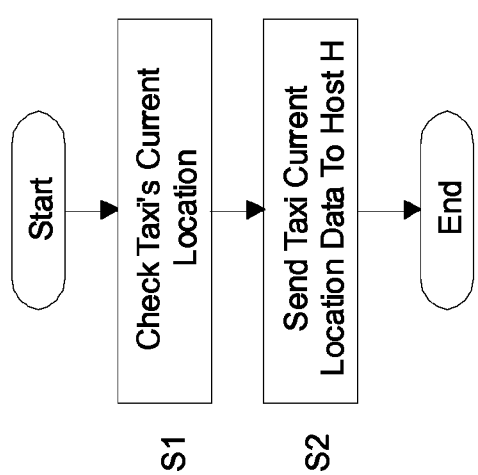

FIG. 236 is a flowchart illustrating an exemplary embodiment of the present invention.

Figure 237:
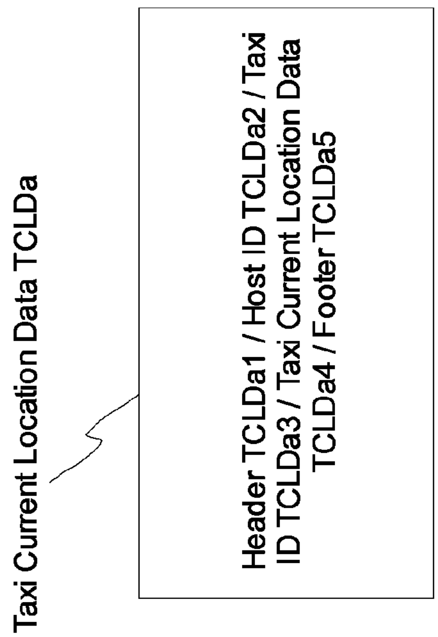

FIG. 237 is a simplified illustration illustrating an exemplary embodiment of the present invention.

Figure 238:
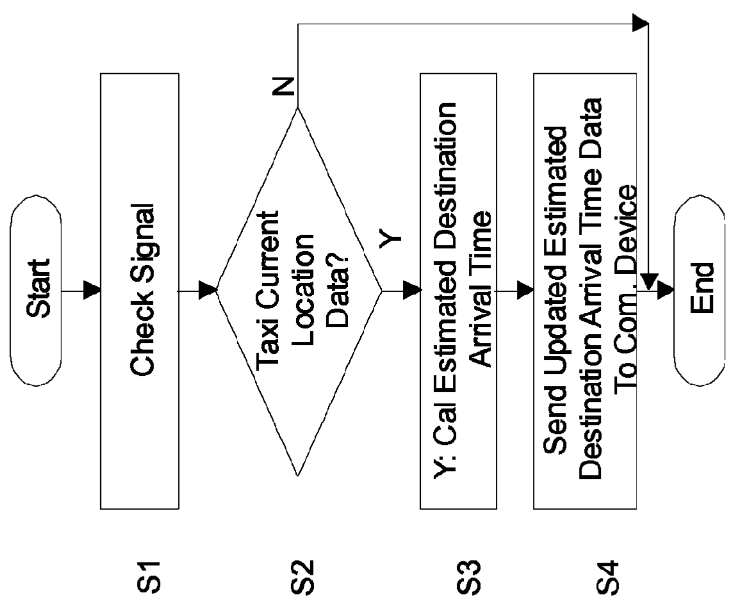

FIG. 238 is a flowchart illustrating an exemplary embodiment of the present invention.

Figure 239:
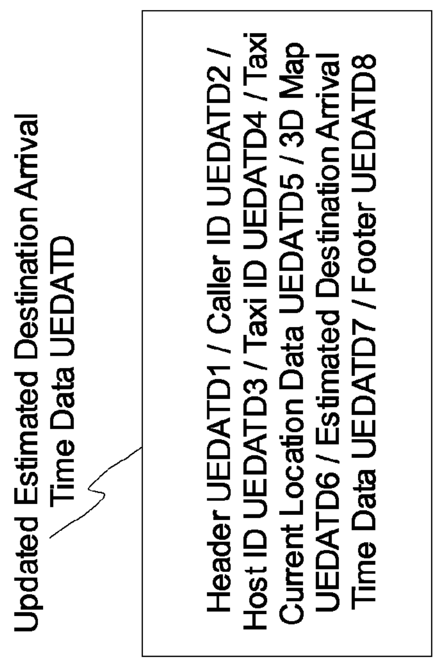

FIG. 239 is a simplified illustration illustrating an exemplary embodiment of the present invention.

Figure 240:
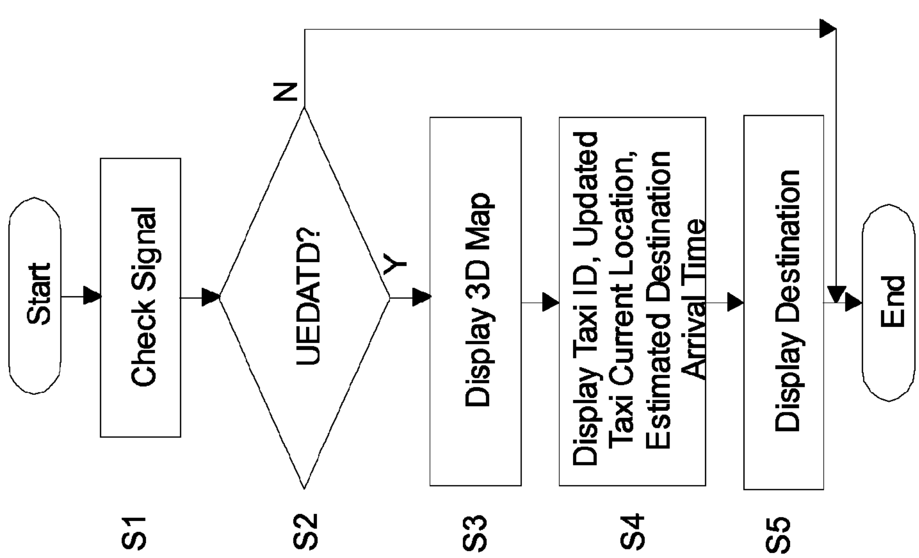

FIG. 240 is a flowchart illustrating an exemplary embodiment of the present invention.

Figure 241:
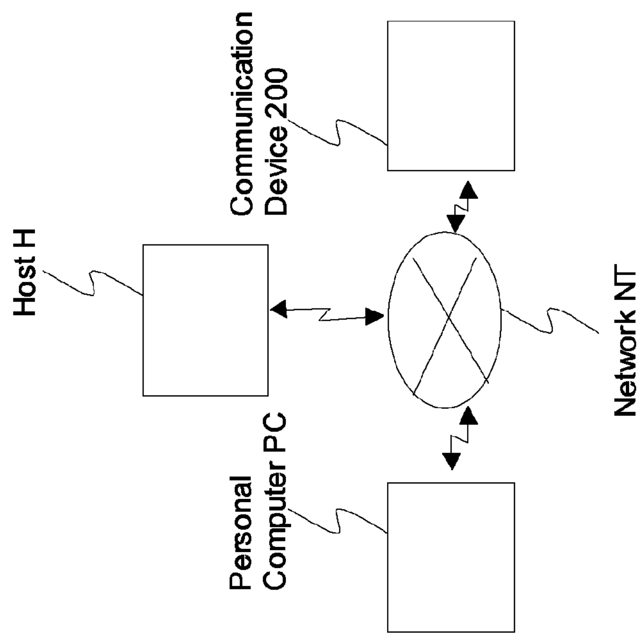

FIG. 241 is a simplified illustration illustrating an exemplary embodiment of the present invention.

Figure 242:
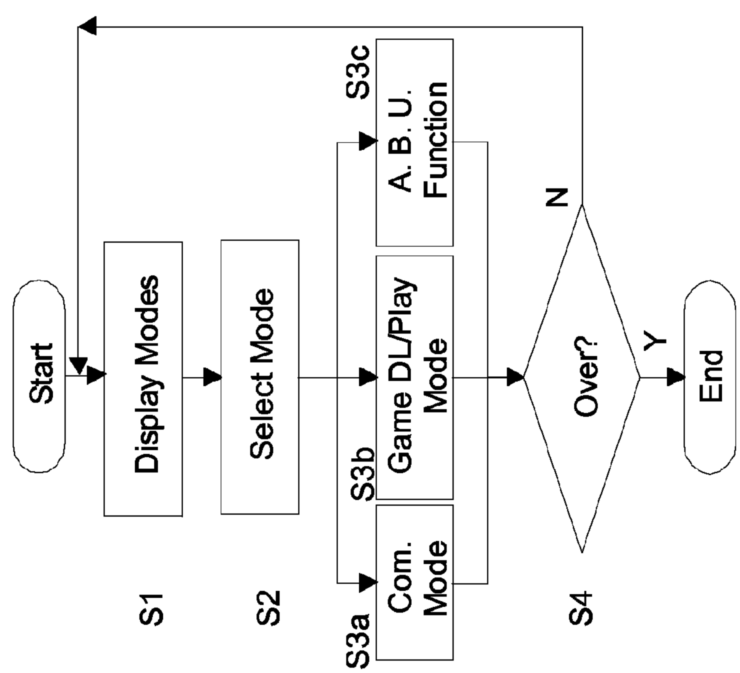

FIG. 242 is a flowchart illustrating an exemplary embodiment of the present invention.

Figure 243:
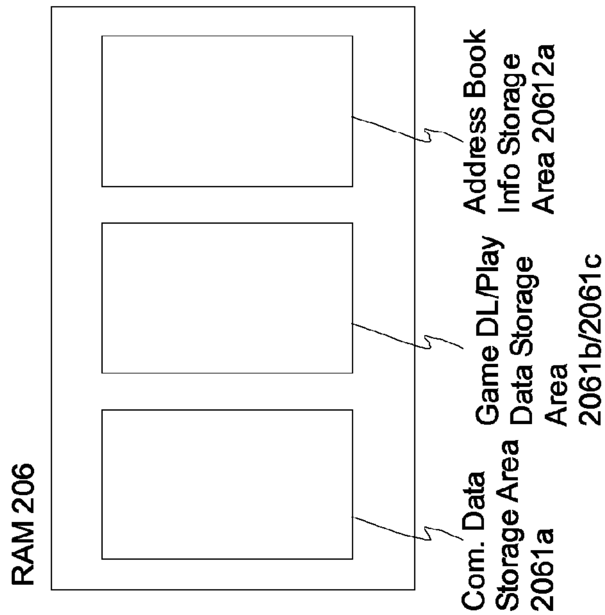

FIG. 243 is a block diagram illustrating an exemplary embodiment of the present invention.

Figure 244:
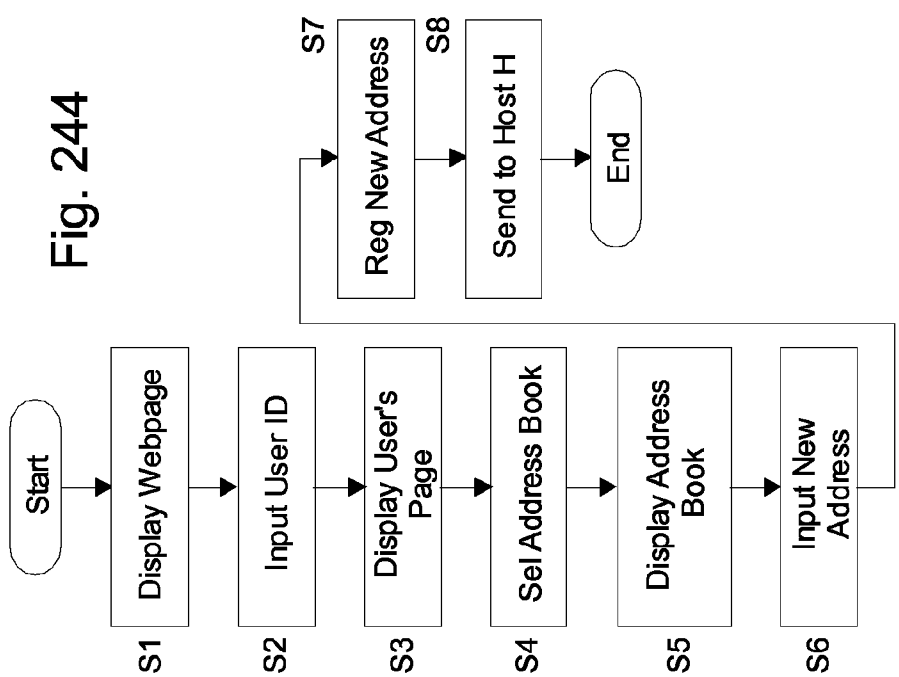

FIG. 244 is a flowchart illustrating an exemplary embodiment of the present invention.

Figure 245:
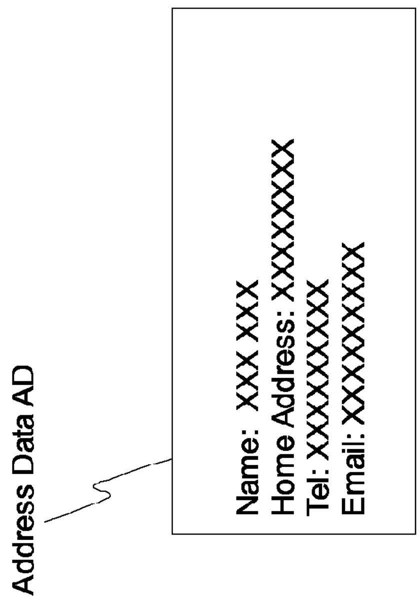

FIG. 245 is a simplified illustration illustrating an exemplary embodiment of the present invention.

Figure 246:
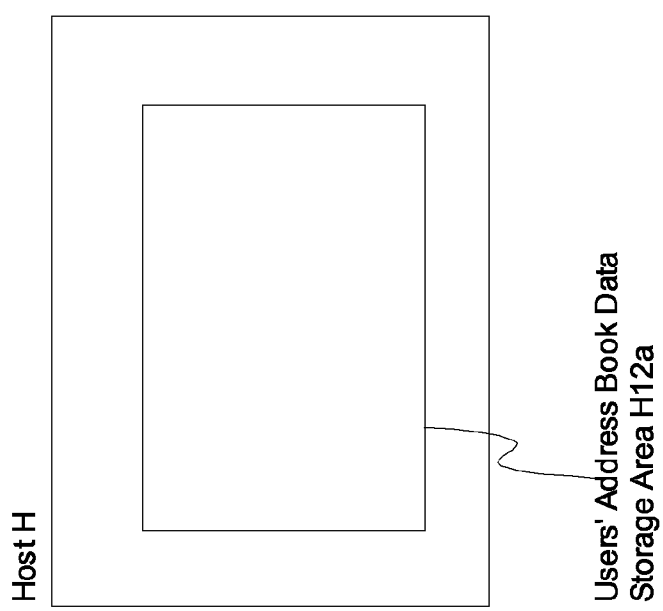

FIG. 246 is a block diagram illustrating an exemplary embodiment of the present invention.

FIG. 247 is a block diagram illustrating an exemplary embodiment of the present invention.

FIG. 248 is a block diagram illustrating an exemplary embodiment of the present invention.

Figures 249, 250:
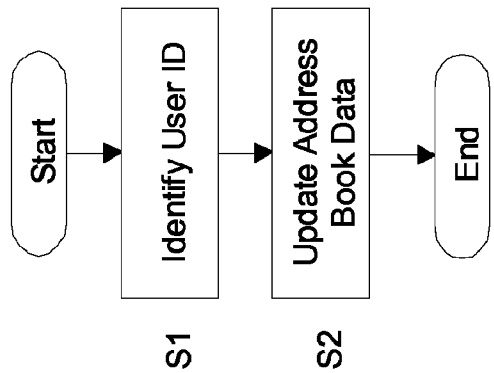

FIG. 249 is a flowchart illustrating an exemplary embodiment of the present invention.

FIG. 250 is a block diagram illustrating an exemplary embodiment of the present invention.

Figure 251:
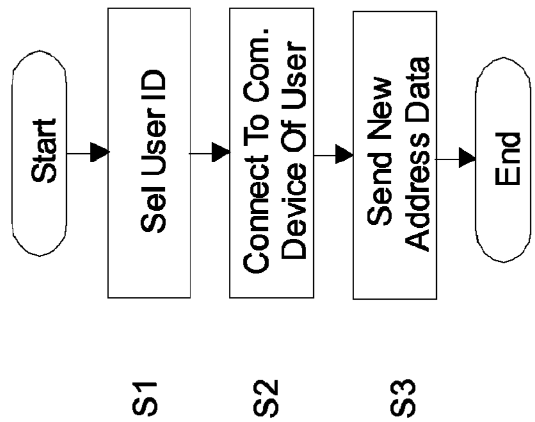

FIG. 251 is a flowchart illustrating an exemplary embodiment of the present invention.

Figure 252:
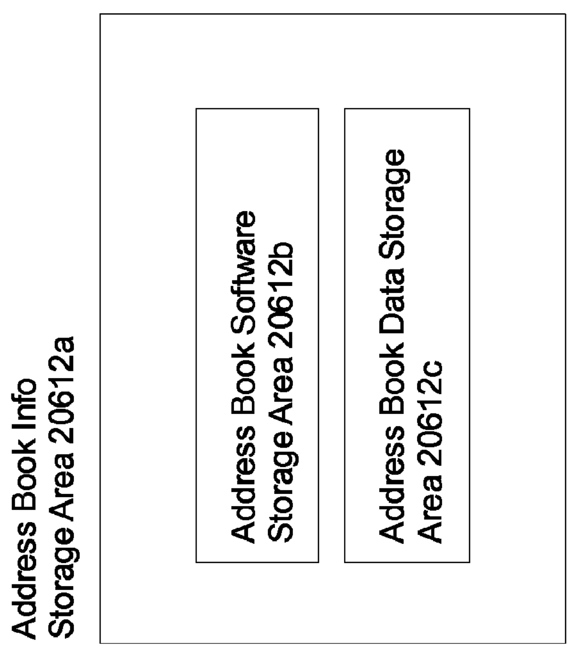

FIG. 252 is a block diagram illustrating an exemplary embodiment of the present invention.

Figure 253:
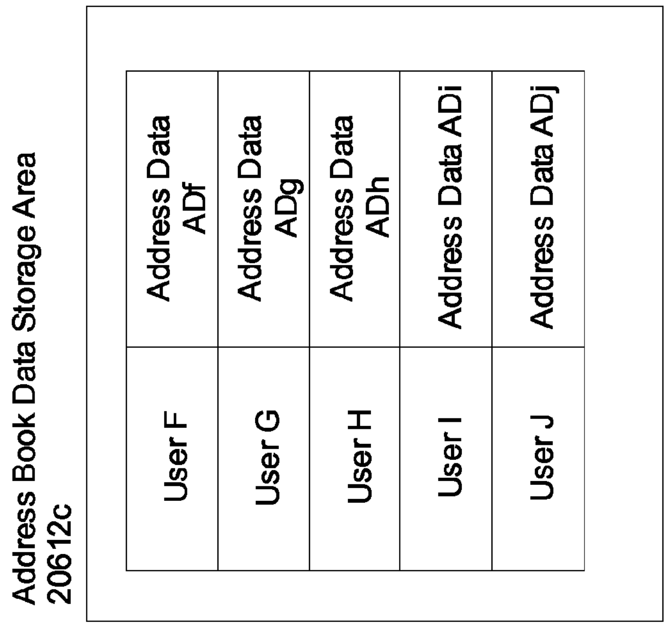

FIG. 253 is a block diagram illustrating an exemplary embodiment of the present invention.

Figure 254:
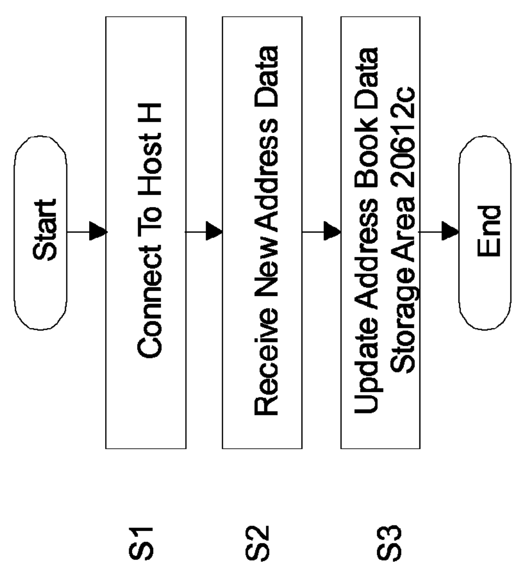

FIG. 254 is a flowchart illustrating an exemplary embodiment of the present invention.

Figures 255, 256:
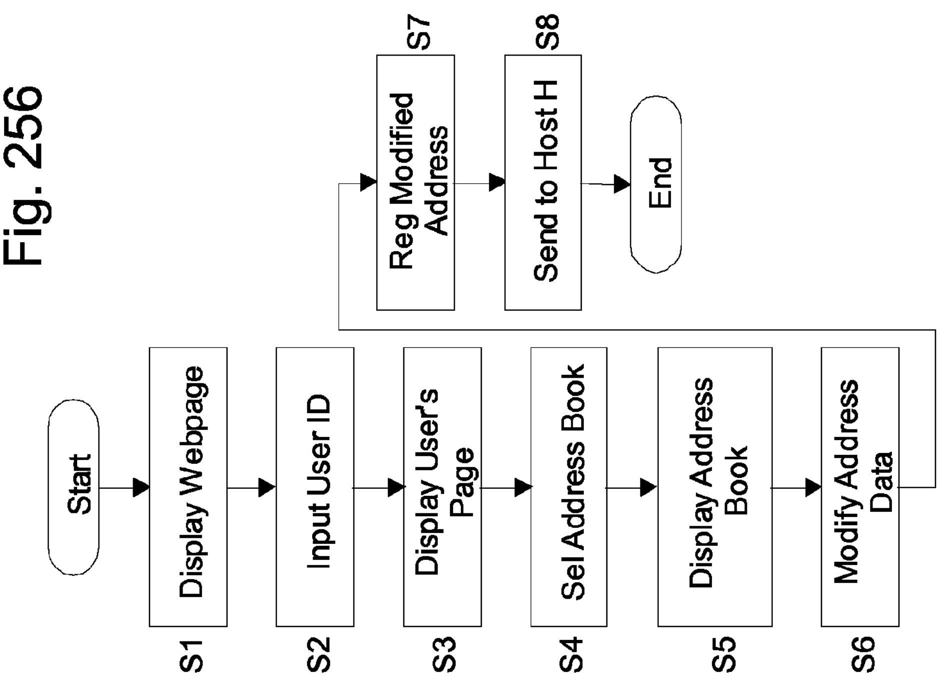

FIG. 255 is a block diagram illustrating an exemplary embodiment of the present invention.

FIG. 256 is a flowchart illustrating an exemplary embodiment of the present invention.

FIG. 257 is a block diagram illustrating an exemplary embodiment of the present invention.

FIG. 258 is a block diagram illustrating an exemplary embodiment of the present invention.

Figure 259:
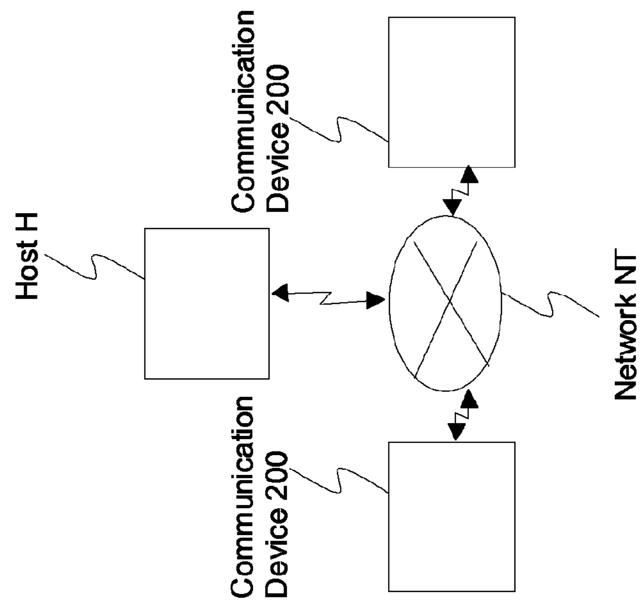

FIG. 259 is a simplified illustration illustrating an exemplary embodiment of the present invention.

Figure 260:
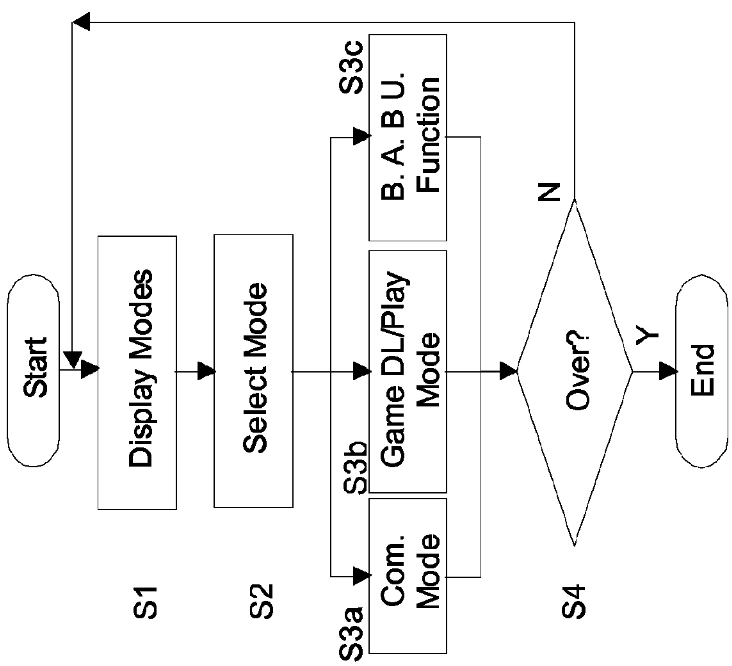

FIG. 260 is a flowchart illustrating an exemplary embodiment of the present invention.

Figure 261:
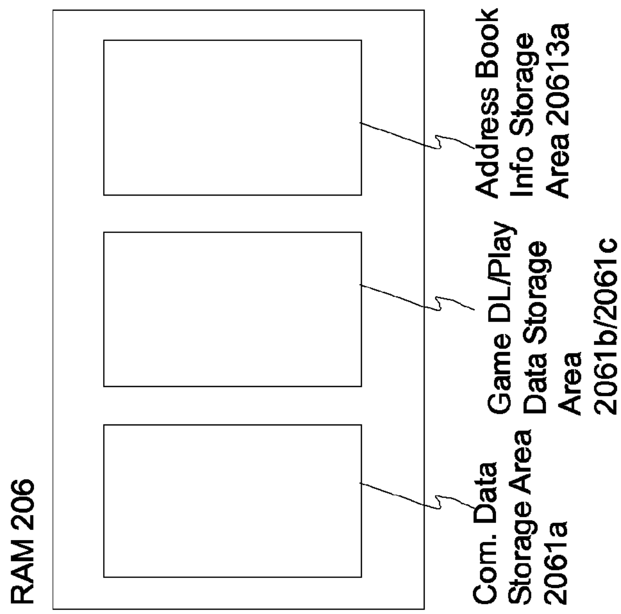

FIG. 261 is a block diagram illustrating an exemplary embodiment of the present invention.

Figure 262:
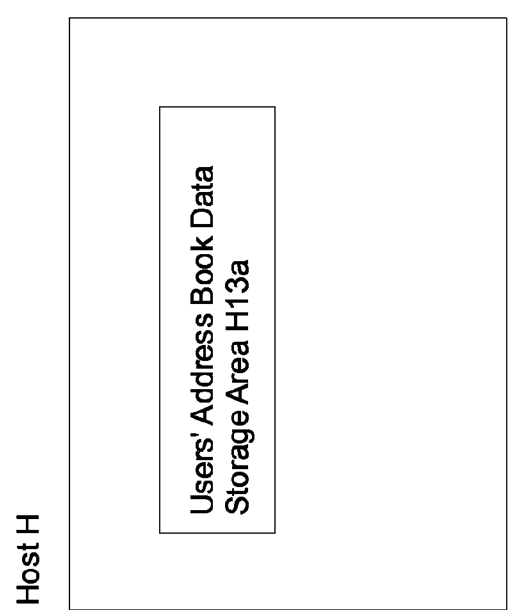

FIG. 262 is a block diagram illustrating an exemplary embodiment of the present invention.

Figure 263:
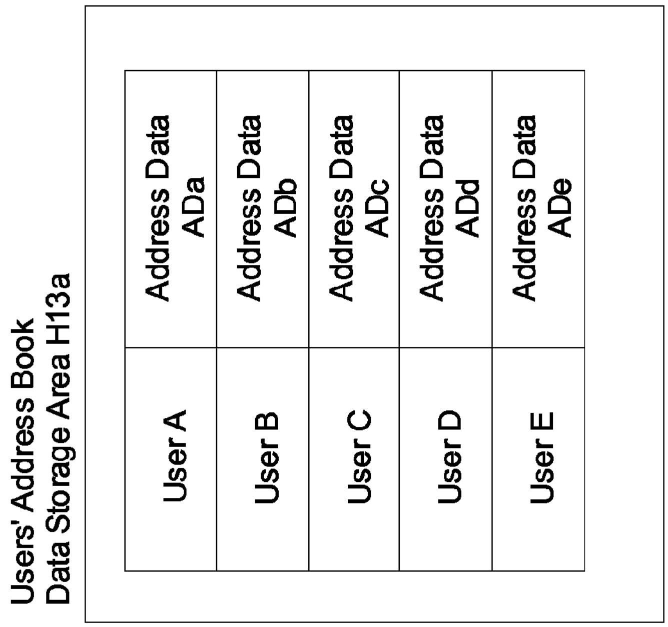

FIG. 263 is a block diagram illustrating an exemplary embodiment of the present invention.

Figure 264:
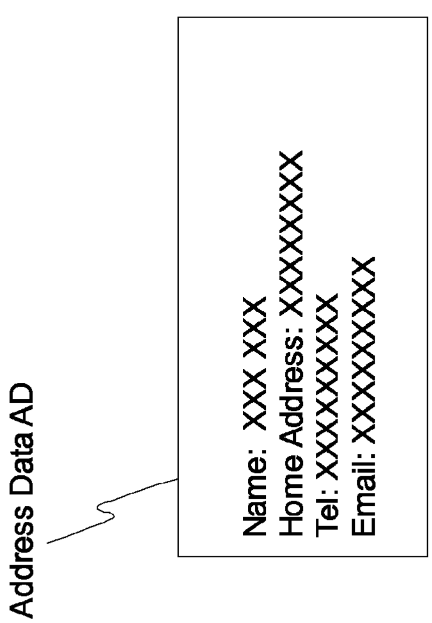

FIG. 264 is a simplified illustration illustrating an exemplary embodiment of the present invention.

Figure 265:
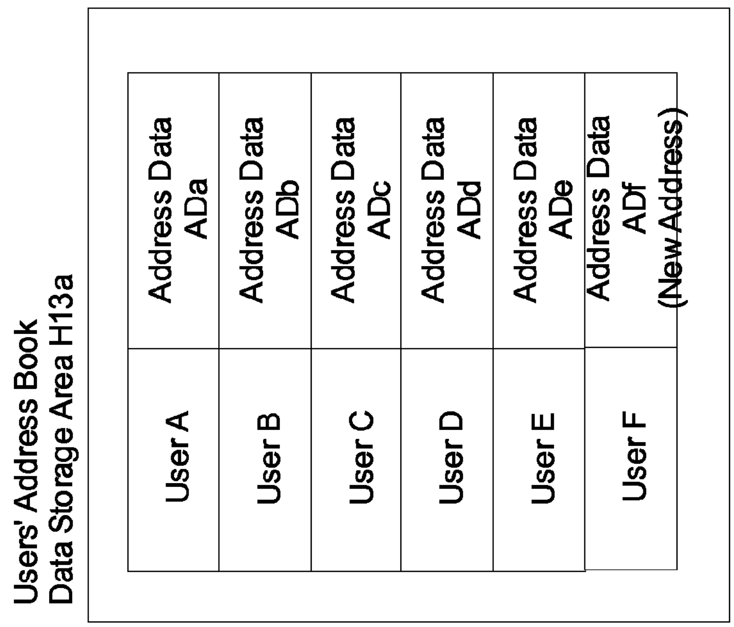

FIG. 265 is a block diagram illustrating an exemplary embodiment of the present invention.

Figure 266:
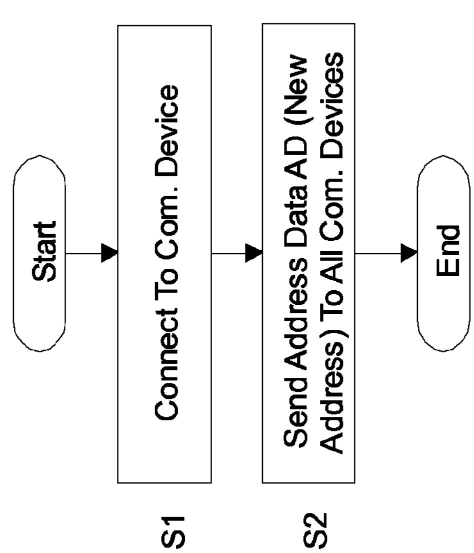

FIG. 266 is a flowchart illustrating an exemplary embodiment of the present invention.

Figure 267:
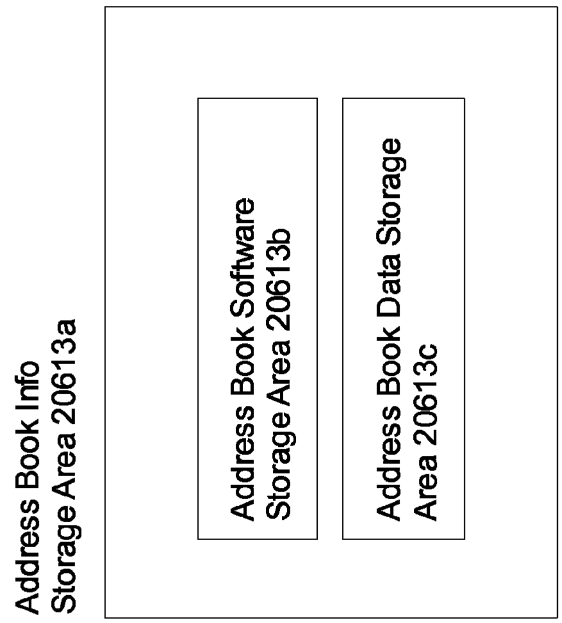

FIG. 267 is a block diagram illustrating an exemplary embodiment of the present invention.

Figure 268:
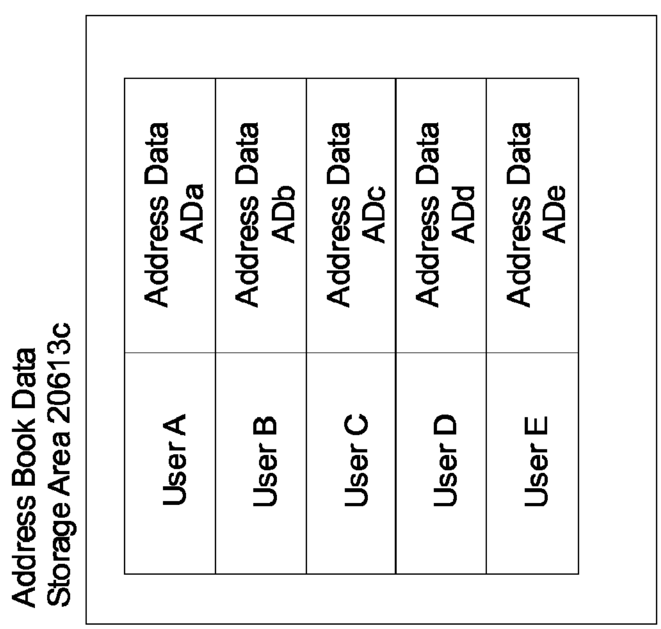

FIG. 268 is a block diagram illustrating an exemplary embodiment of the present invention.

Figure 269:
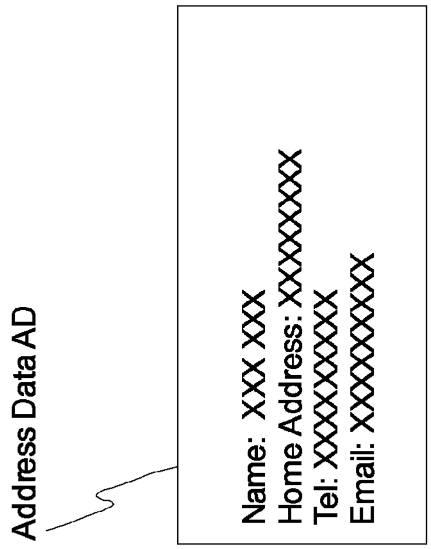

FIG. 269 is a simplified illustration illustrating an exemplary embodiment of the present invention.

Figure 270:
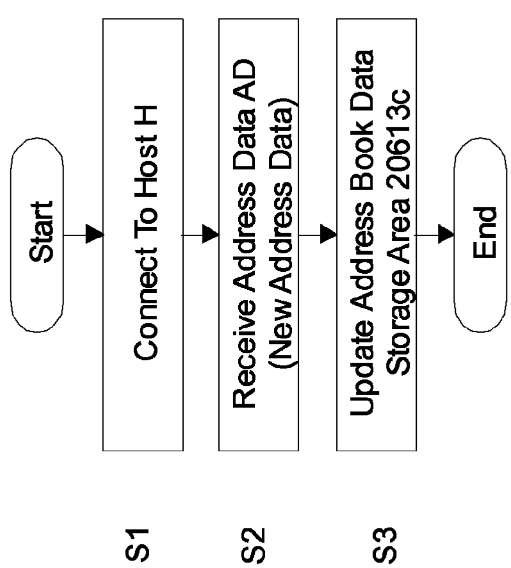

FIG. 270 is a flowchart illustrating an exemplary embodiment of the present invention.

FIG. 271 is a block diagram illustrating an exemplary embodiment of the present invention.

FIG. 272 is a block diagram illustrating an exemplary embodiment of the present invention.

Figure 273:
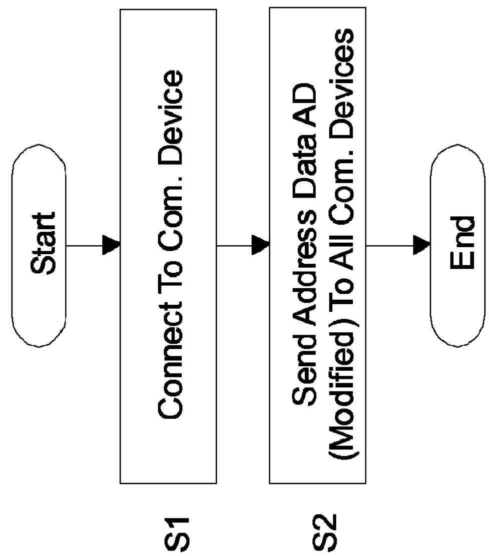

FIG. 273 is a flowchart illustrating an exemplary embodiment of the present invention.

Figure 274:
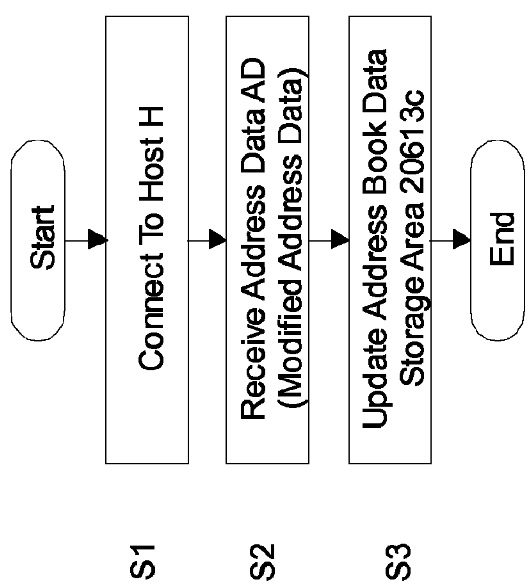

FIG. 274 is a flowchart illustrating an exemplary embodiment of the present invention.

Figure 275:
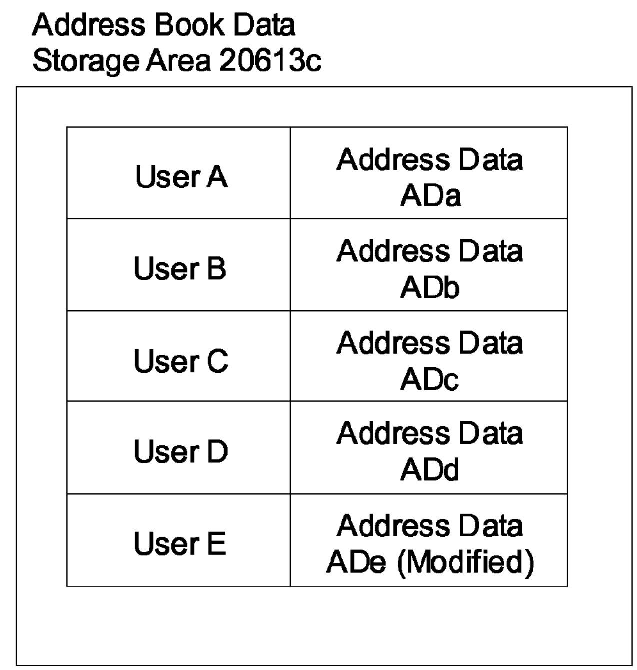

FIG. 275 is a block diagram illustrating an exemplary embodiment of the present invention.

Figure 276:
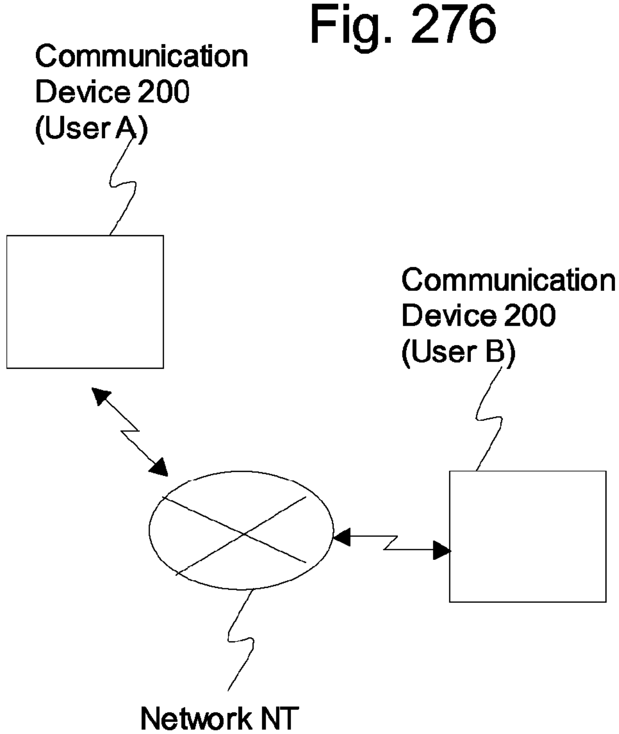

FIG. 276 is a simplified illustration illustrating an exemplary embodiment of the present invention.

Figure 277:
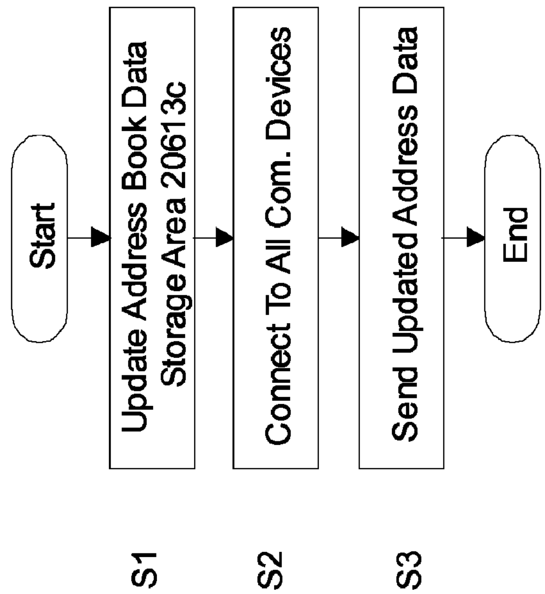

FIG. 277 is a flowchart illustrating an exemplary embodiment of the present invention.

Figure 278:
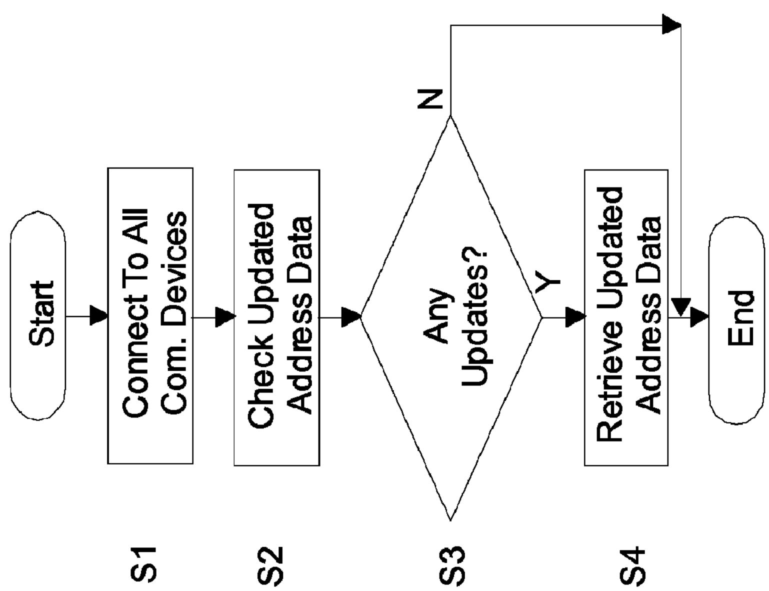

FIG. 278 is a flowchart illustrating an exemplary embodiment of the present invention.

Figure 279:
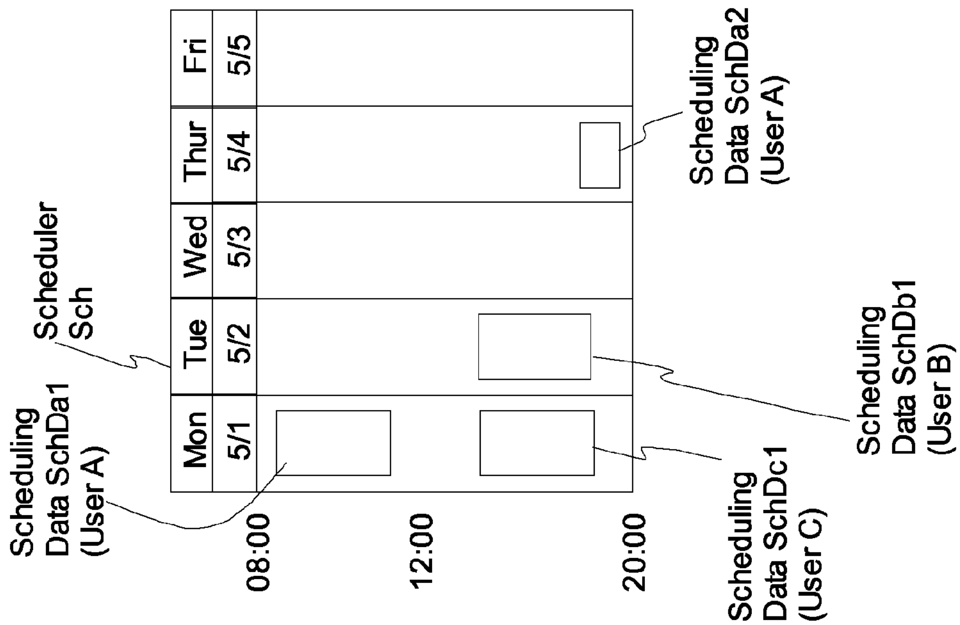

FIG. 279 is a simplified illustration illustrating an exemplary embodiment of the present invention.

Figure 280:
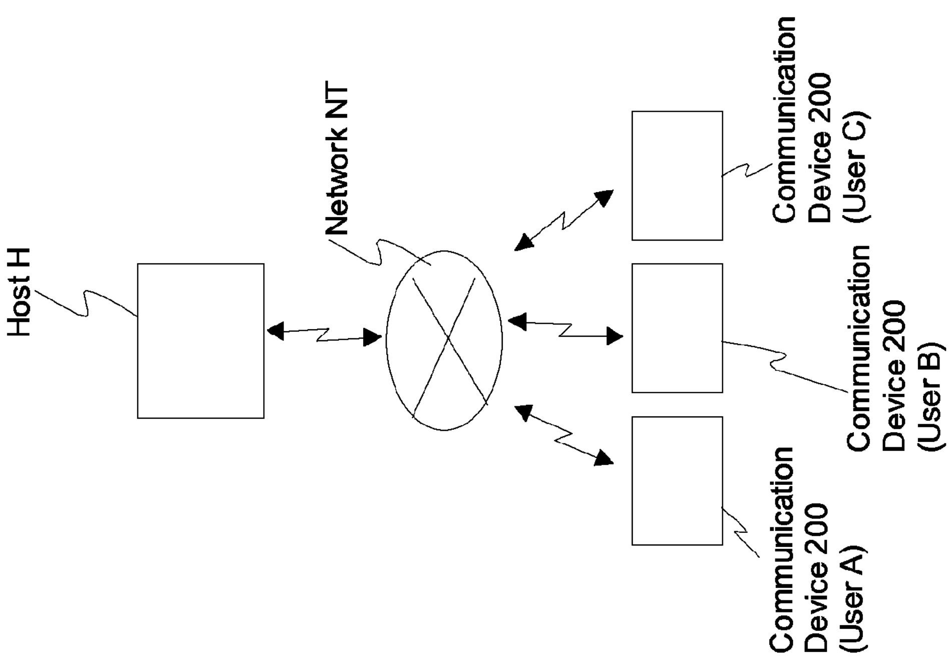

FIG. 280 is a simplified illustration illustrating an exemplary embodiment of the present invention.

Figure 281:
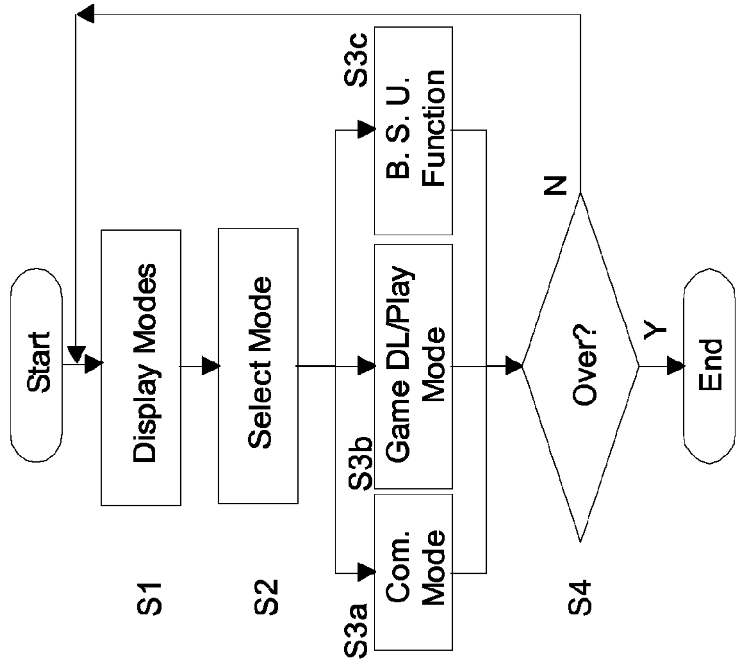

FIG. 281 is a flowchart illustrating an exemplary embodiment of the present invention.

Figure 282:
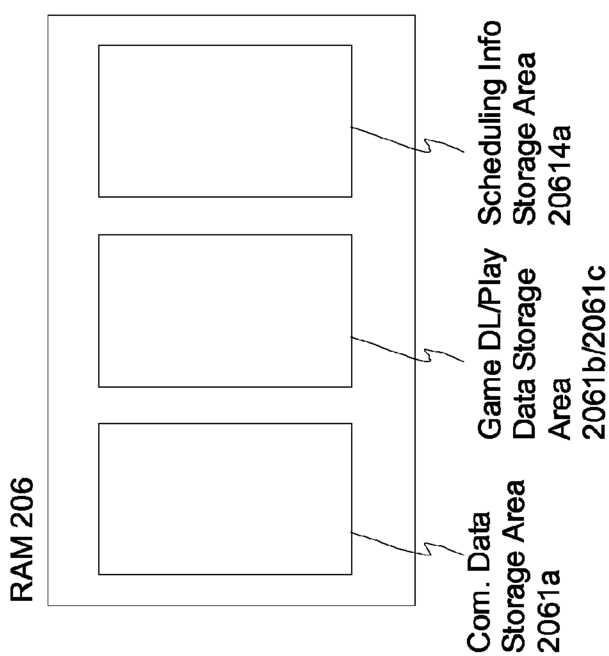

FIG. 282 is a block diagram illustrating an exemplary embodiment of the present invention.

Figure 283:
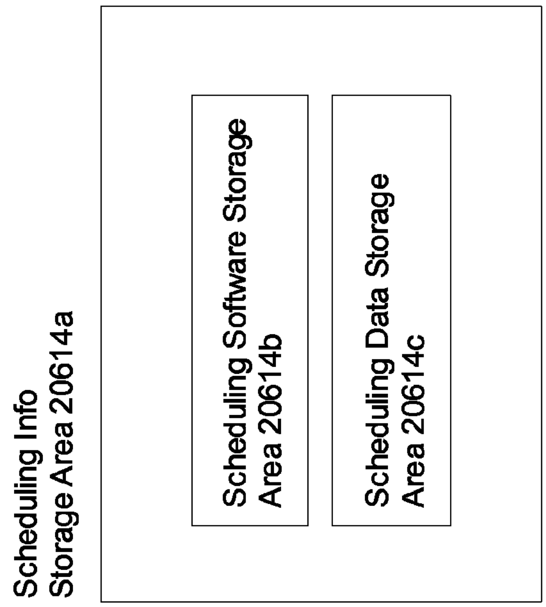

FIG. 283 is a block diagram illustrating an exemplary embodiment of the present invention.

Figure 284:
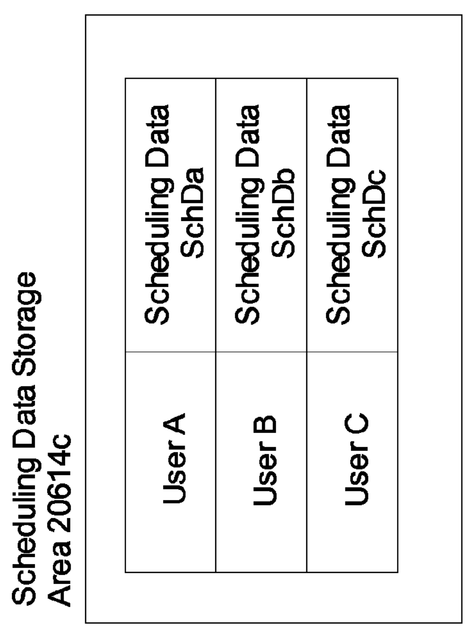

FIG. 284 is a block diagram illustrating an exemplary embodiment of the present invention.

Figure 285:
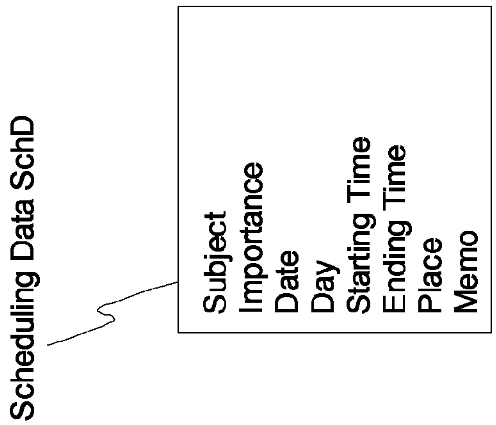

FIG. 285 is a simplified illustration illustrating an exemplary embodiment of the present invention.

Figure 286:
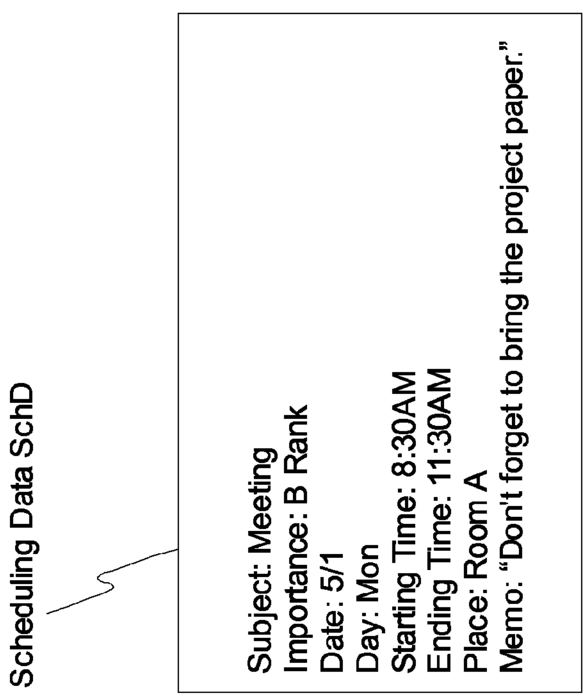

FIG. 286 is a simplified illustration illustrating an exemplary embodiment of the present invention.

Figure 287:
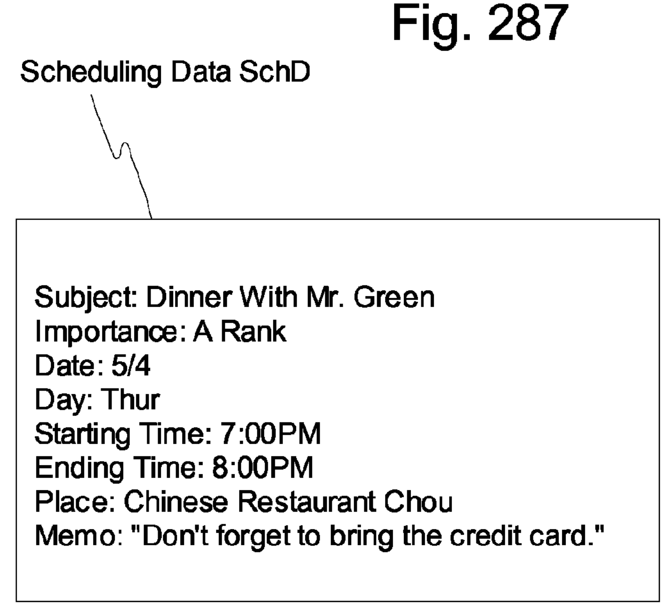

FIG. 287 is a simplified illustration illustrating an exemplary embodiment of the present invention.

Figure 288:
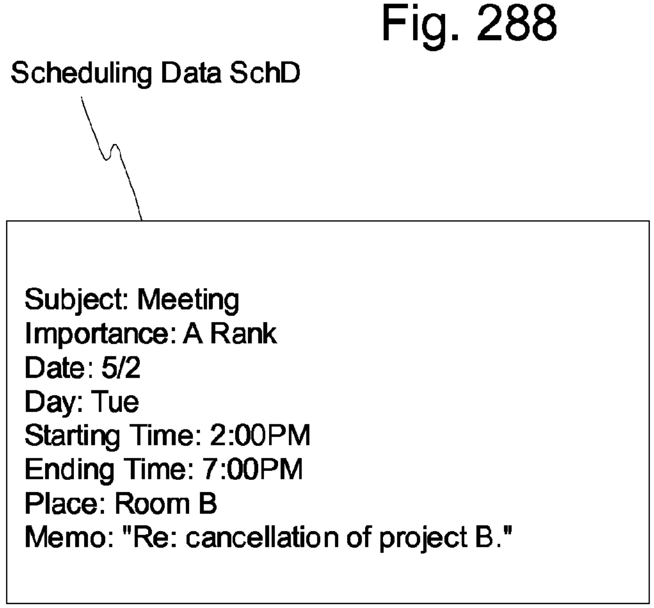

FIG. 288 is a simplified illustration illustrating an exemplary embodiment of the present invention.

Figure 289:
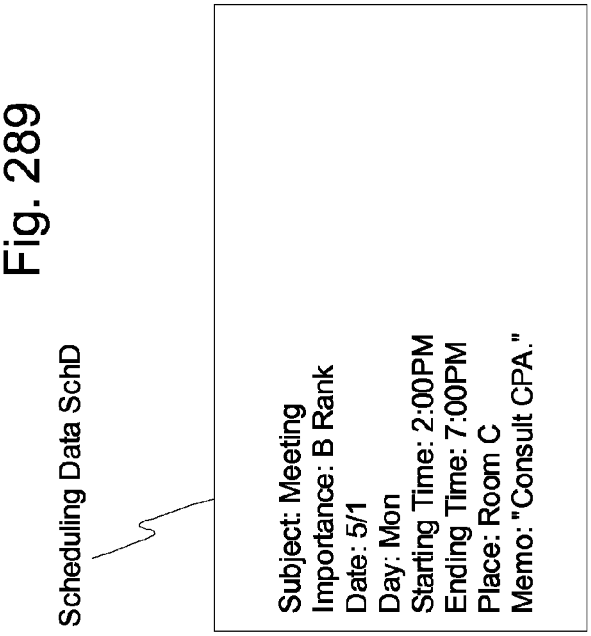

FIG. 289 is a simplified illustration illustrating an exemplary embodiment of the present invention.

Figure 290:
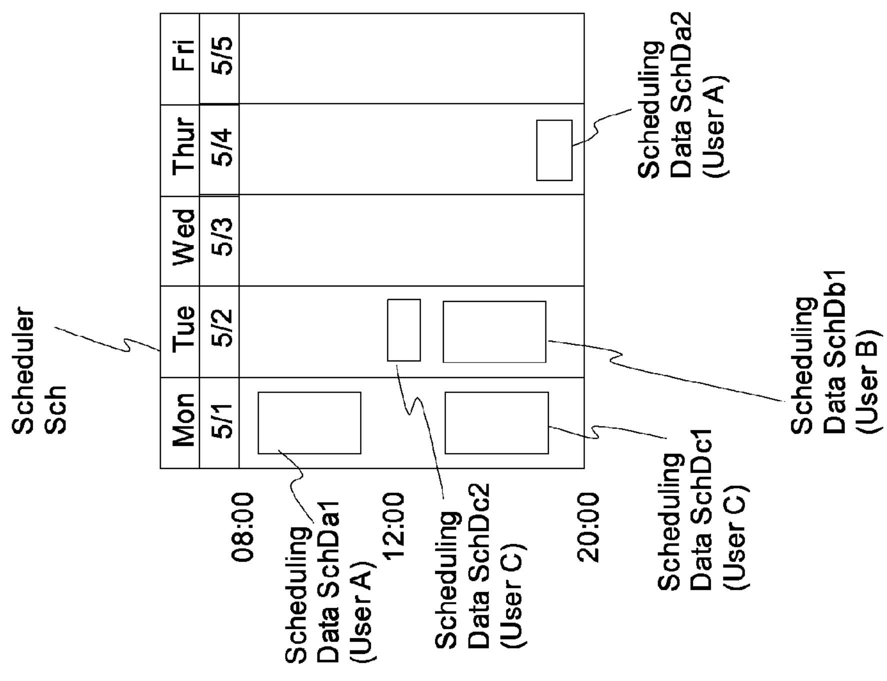

FIG. 290 is a simplified illustration illustrating an exemplary embodiment of the present invention.

Figure 291:
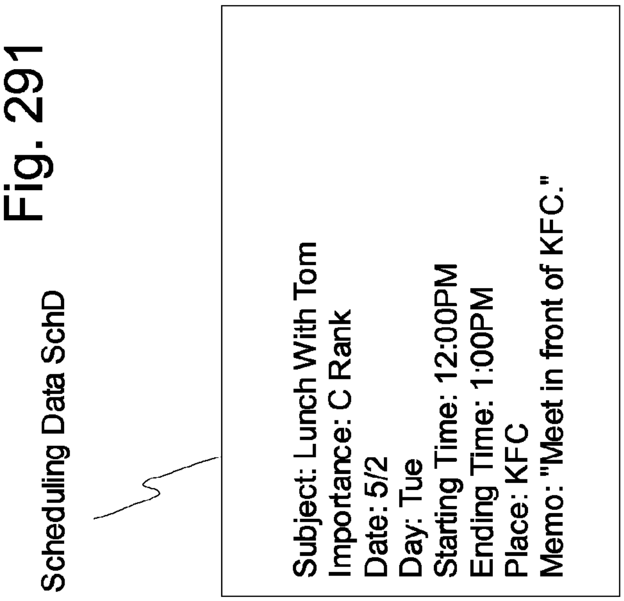

FIG. 291 is a simplified illustration illustrating an exemplary embodiment of the present invention.

Figure 292:
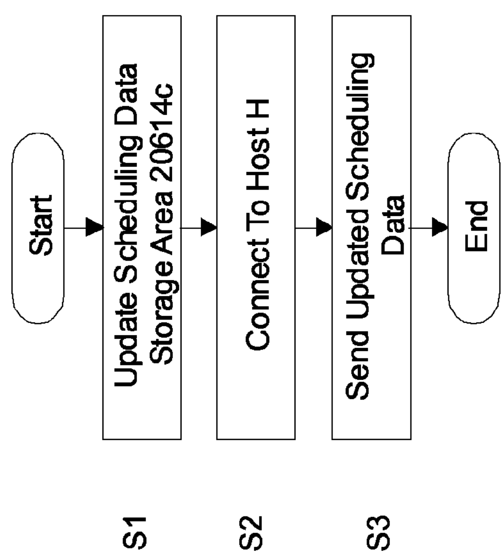

FIG. 292 is a flowchart illustrating an exemplary embodiment of the present invention.

Figure 293:
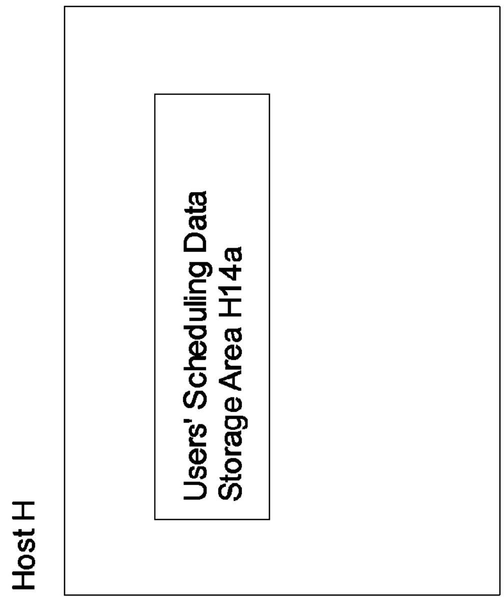

FIG. 293 is a block diagram illustrating an exemplary embodiment of the present invention.

Figure 294:
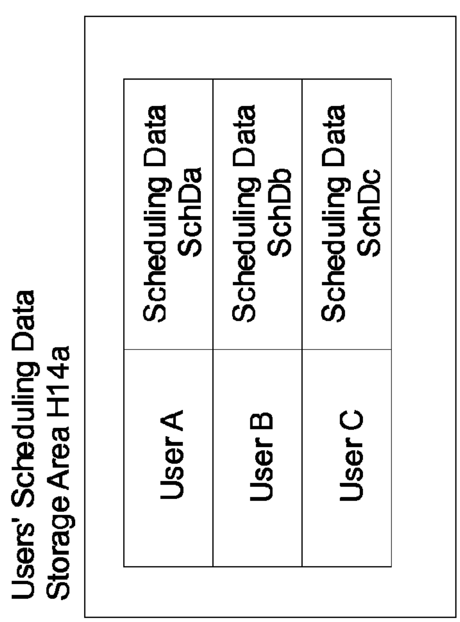

FIG. 294 is a block diagram illustrating an exemplary embodiment of the present invention.

Figure 295:
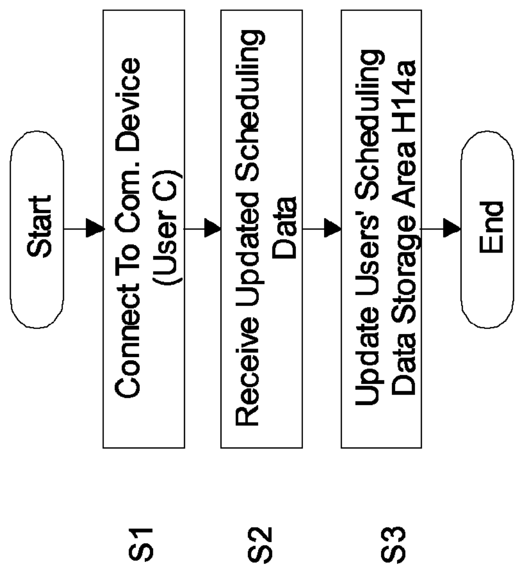

FIG. 295 is a flowchart illustrating an exemplary embodiment of the present invention.

Figure 296:
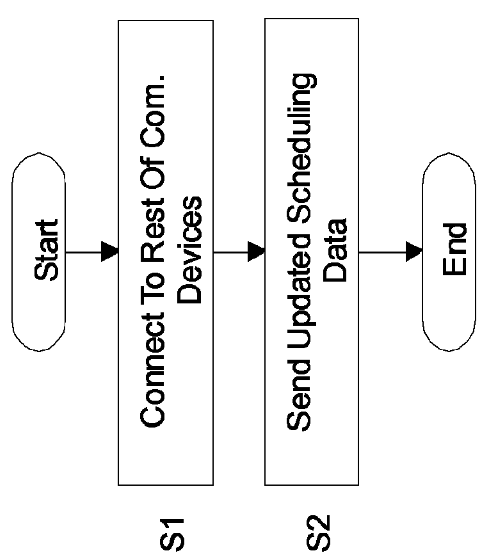

FIG. 296 is a flowchart illustrating an exemplary embodiment of the present invention.

Figure 297:
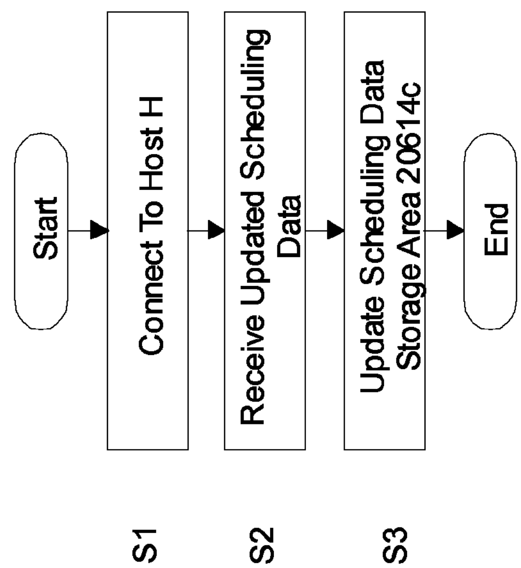

FIG. 297 is a flowchart illustrating an exemplary embodiment of the present invention.

Figure 298:
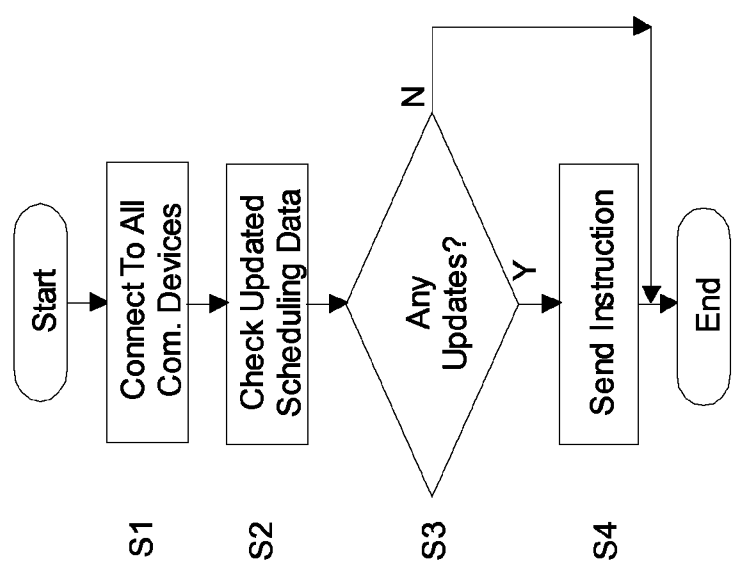

FIG. 298 is a flowchart illustrating an exemplary embodiment of the present invention.

Figure 299:
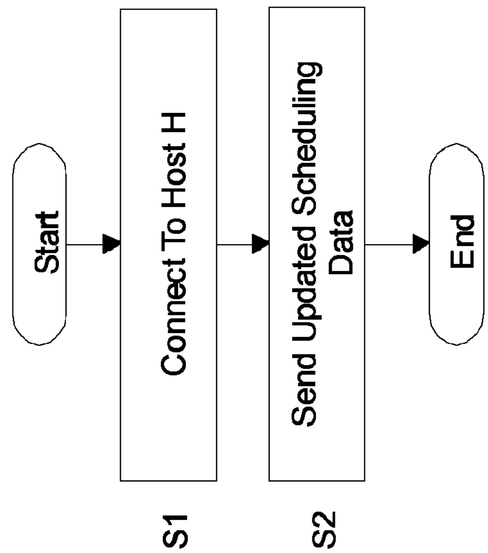

FIG. 299 is a flowchart illustrating an exemplary embodiment of the present invention.

Figure 300:
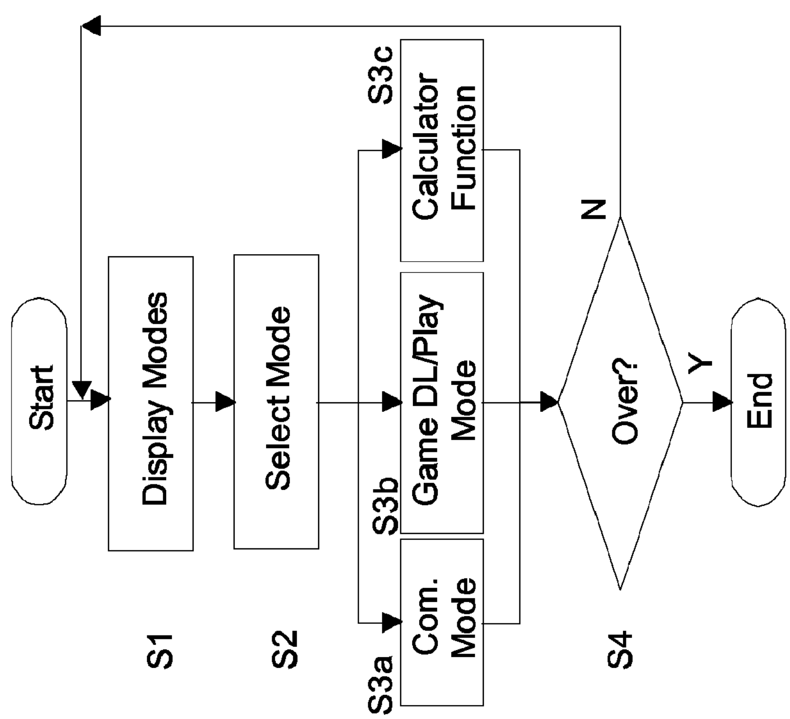

FIG. 300 is a flowchart illustrating an exemplary embodiment of the present invention.

Figure 301:
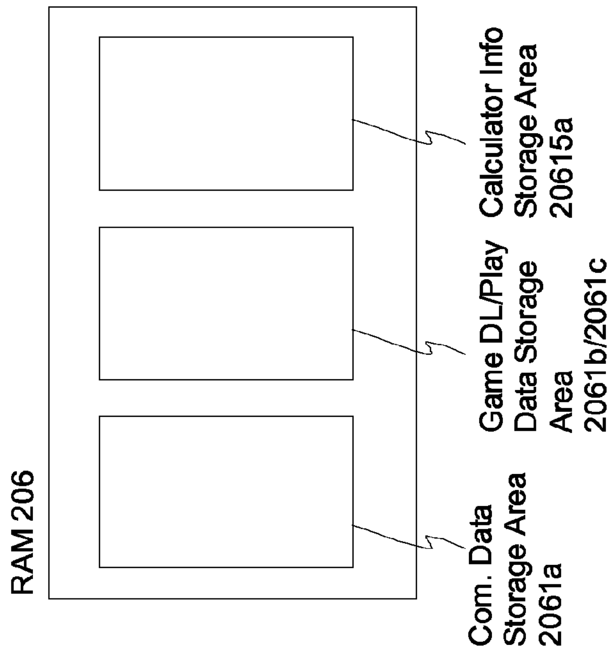

FIG. 301 is a block diagram illustrating an exemplary embodiment of the present invention.

Figure 302:
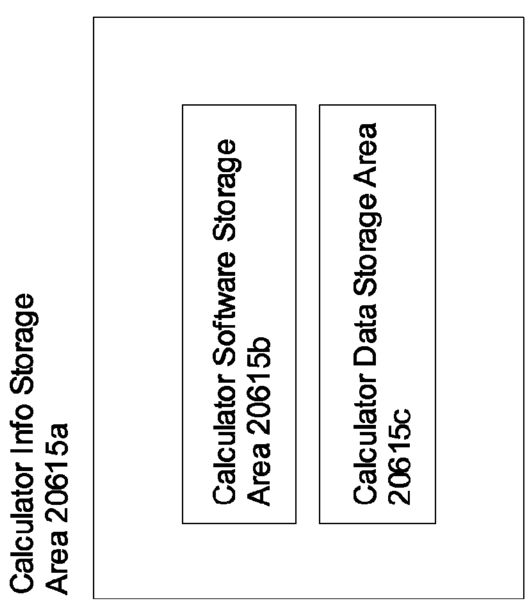

FIG. 302 is a block diagram illustrating an exemplary embodiment of the present invention.

Figure 303:
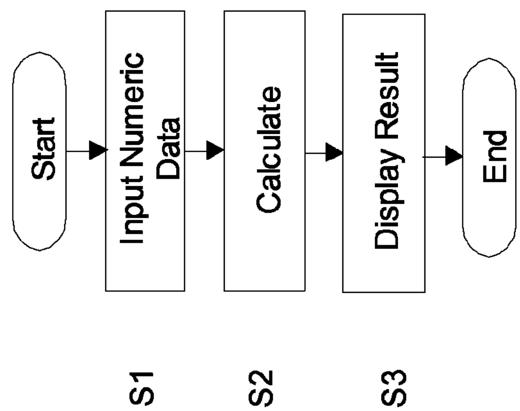

FIG. 303 is a flowchart illustrating an exemplary embodiment of the present invention.

Figure 304:
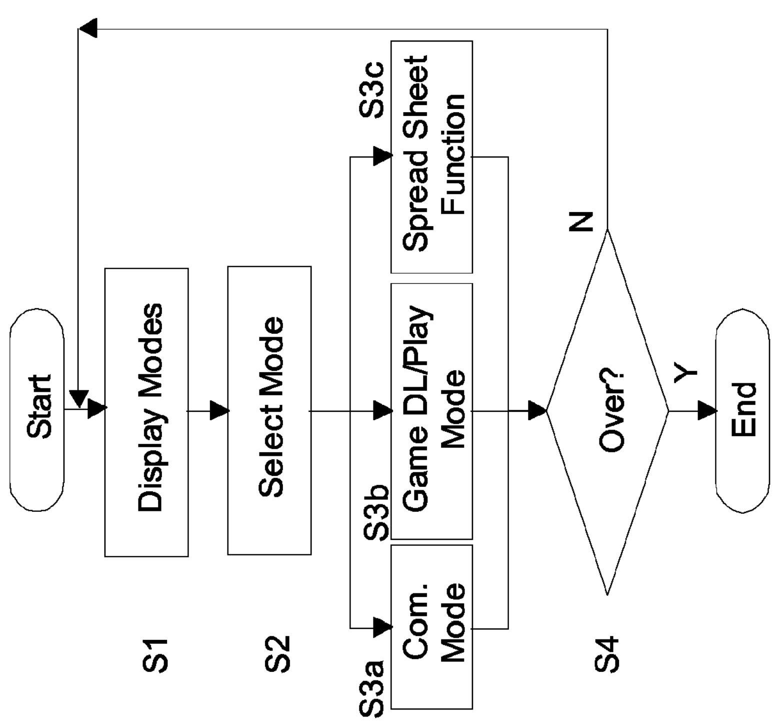

FIG. 304 is a flowchart illustrating an exemplary embodiment of the present invention.

Figure 305:
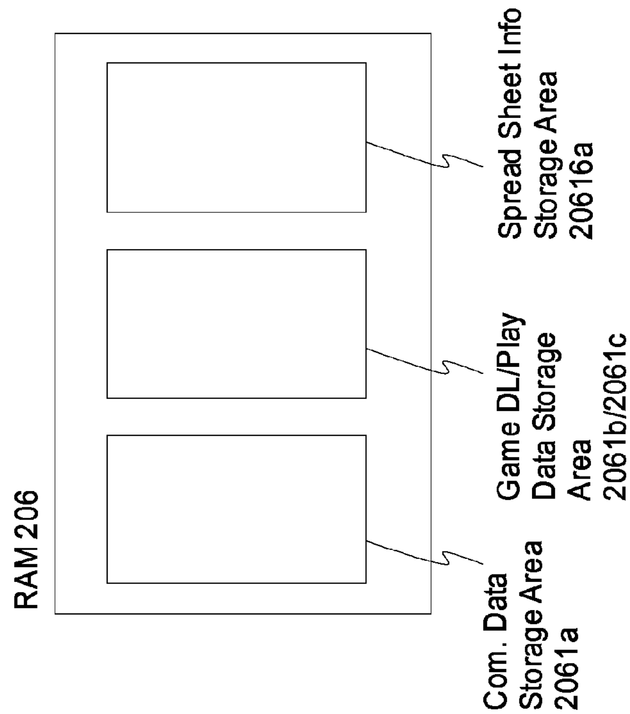

FIG. 305 is a block diagram illustrating an exemplary embodiment of the present invention.

Figure 306:
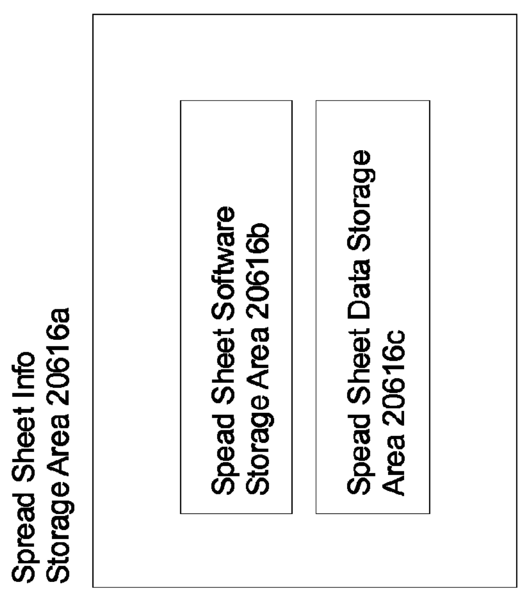

FIG. 306 is a block diagram illustrating an exemplary embodiment of the present invention.

Figure 307:
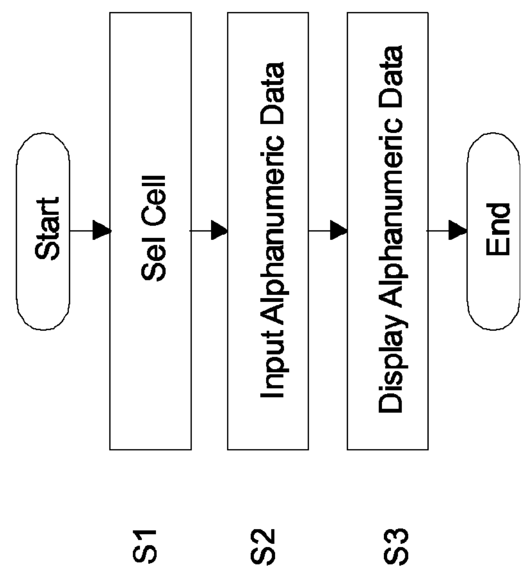

FIG. 307 is a flowchart illustrating an exemplary embodiment of the present invention.

Figure 308:
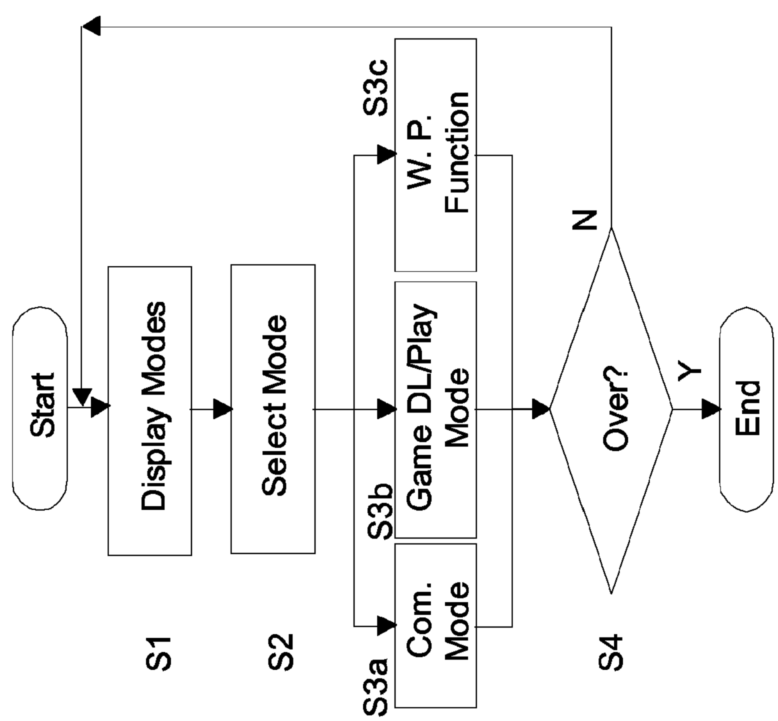

FIG. 308 is a flowchart illustrating an exemplary embodiment of the present invention.

Figure 309:
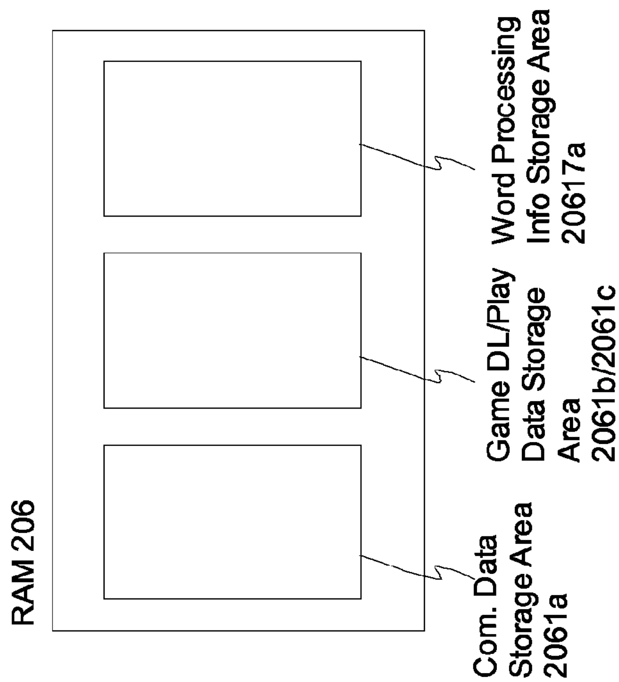

FIG. 309 is a block diagram illustrating an exemplary embodiment of the present invention.

Figure 310:
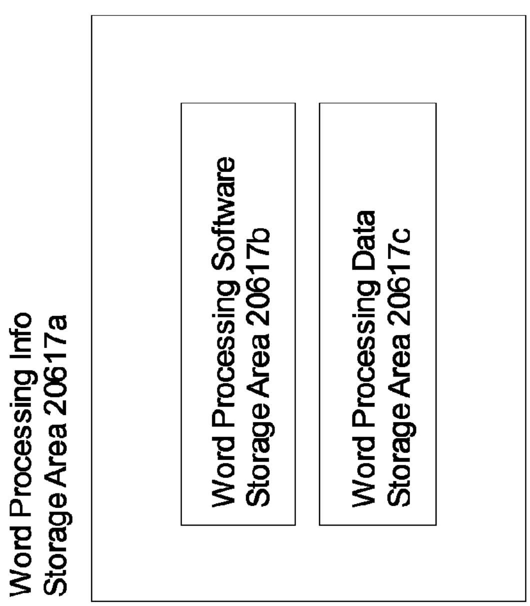

FIG. 310 is a block diagram illustrating an exemplary embodiment of the present invention.

Figure 311:
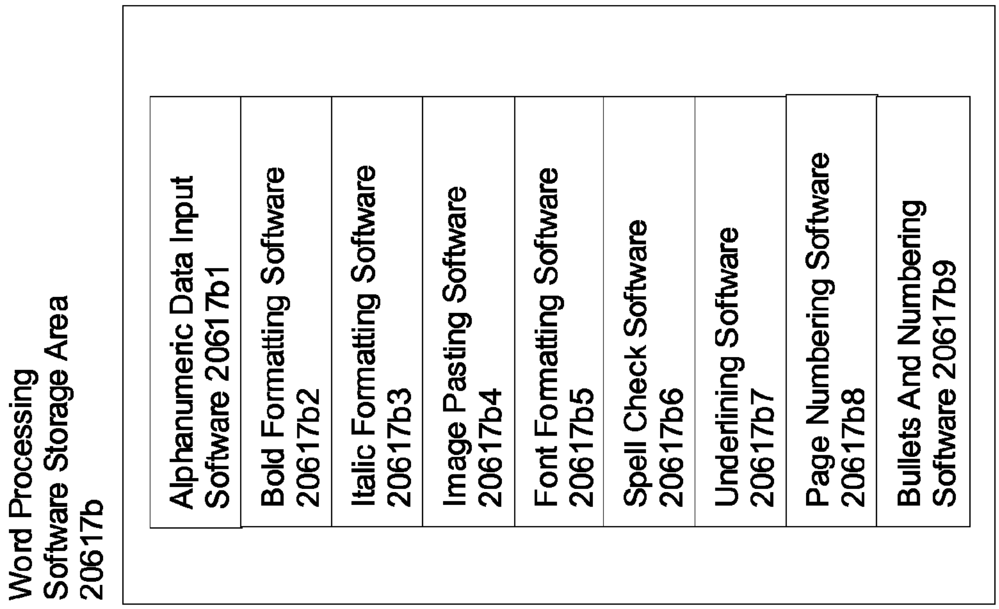

FIG. 311 is a block diagram illustrating an exemplary embodiment of the present invention.

Figure 312:
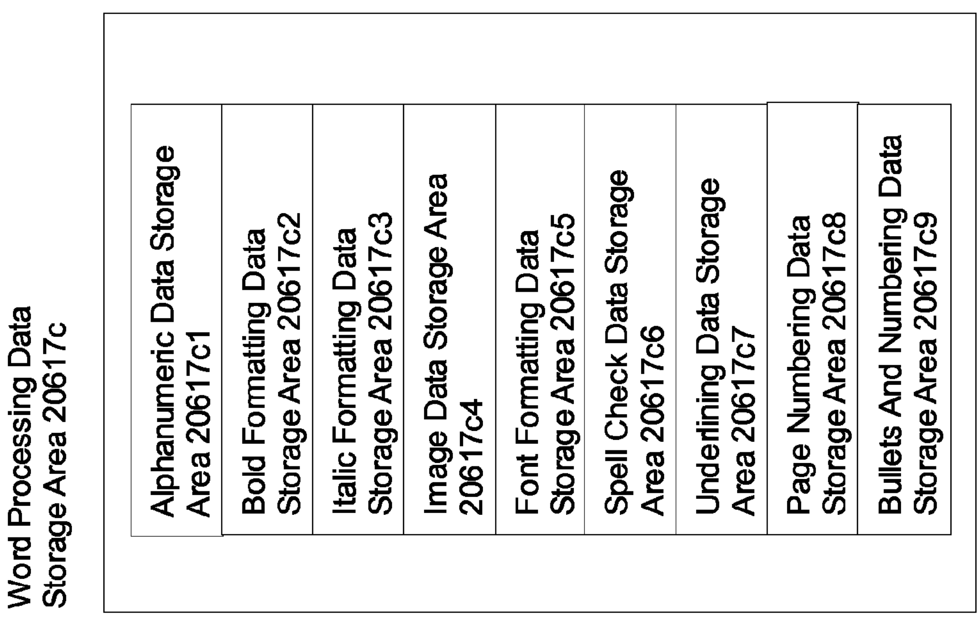

FIG. 312 is a block diagram illustrating an exemplary embodiment of the present invention.

Figure 313:
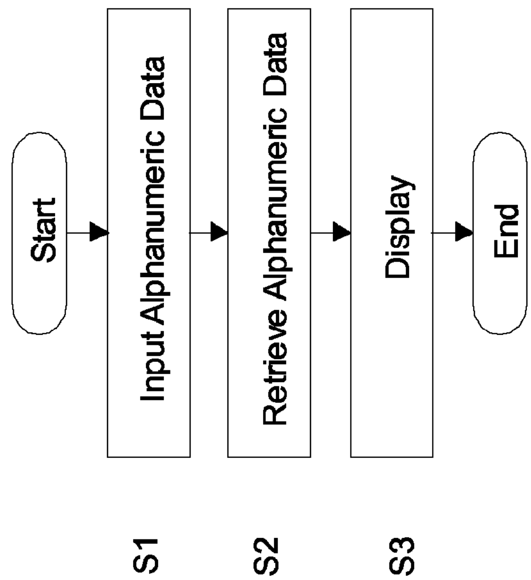

FIG. 313 is a flowchart illustrating an exemplary embodiment of the present invention.

Figure 314:
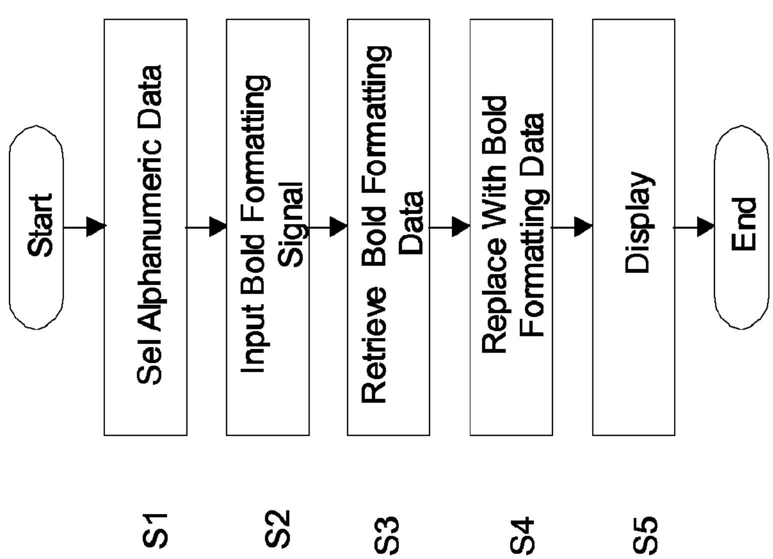

FIG. 314 is a flowchart illustrating an exemplary embodiment of the present invention.

Figure 315:
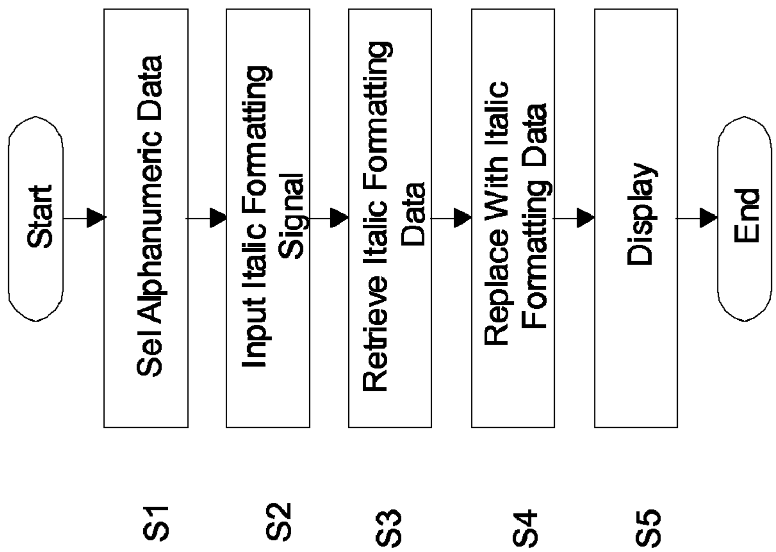

FIG. 315 is a flowchart illustrating an exemplary embodiment of the present invention.

Figure 316:
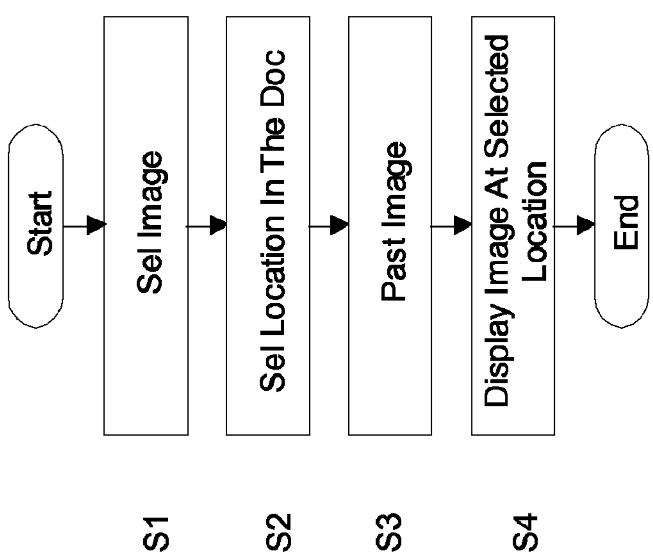

FIG. 316 is a flowchart illustrating an exemplary embodiment of the present invention.

Figure 317:
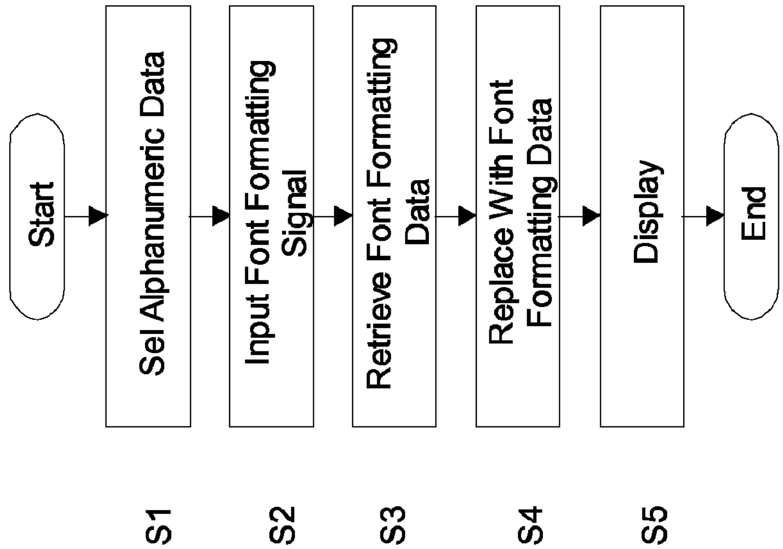

FIG. 317 is a flowchart illustrating an exemplary embodiment of the present invention.

Figure 318:
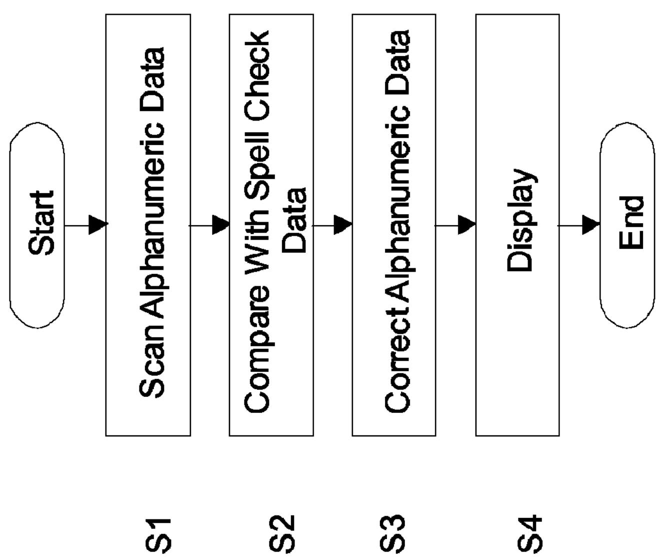

FIG. 318 is a flowchart illustrating an exemplary embodiment of the present invention.

Figure 319:
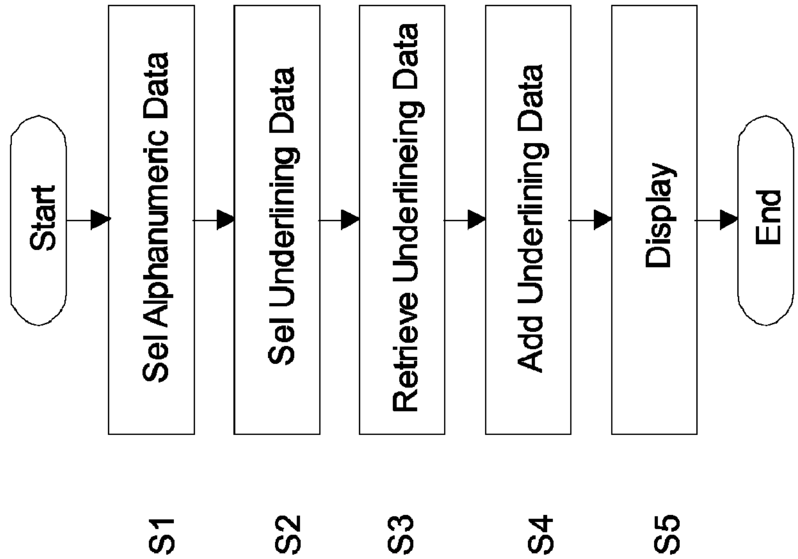

FIG. 319 is a flowchart illustrating an exemplary embodiment of the present invention.

Figure 320:
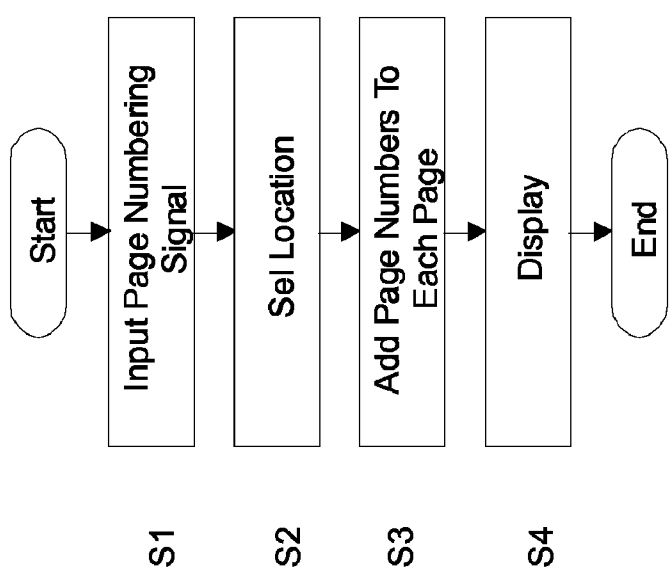

FIG. 320 is a flowchart illustrating an exemplary embodiment of the present invention.

Figure 321:
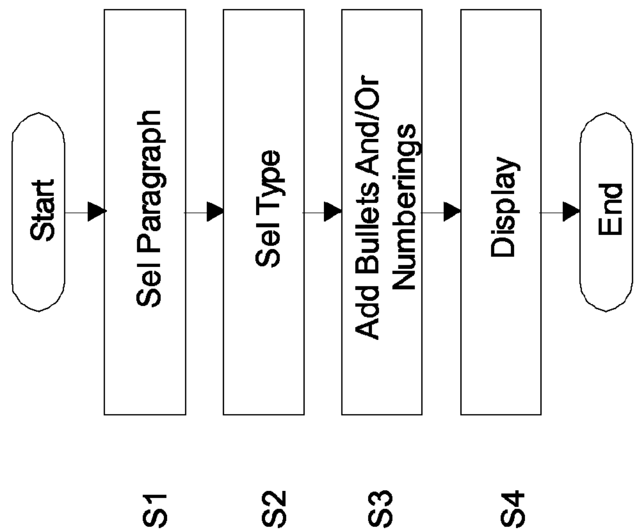

FIG. 321 is a flowchart illustrating an exemplary embodiment of the present invention.

Figure 322:
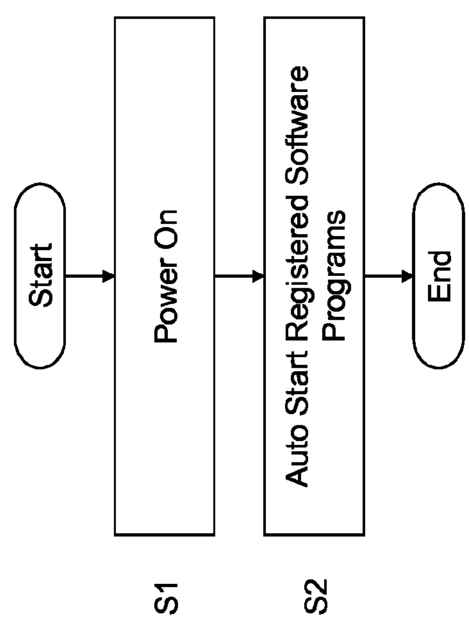

FIG. 322 is a simplified illustration illustrating an exemplary embodiment of the present invention.

Figure 323:
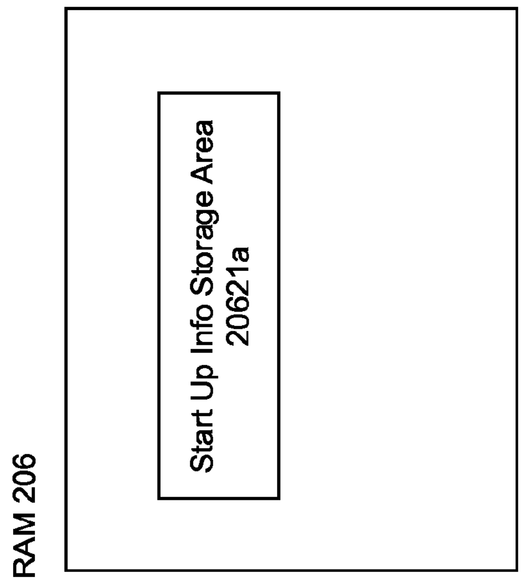

FIG. 323 is a block diagram illustrating an exemplary embodiment of the present invention.

Figure 324:
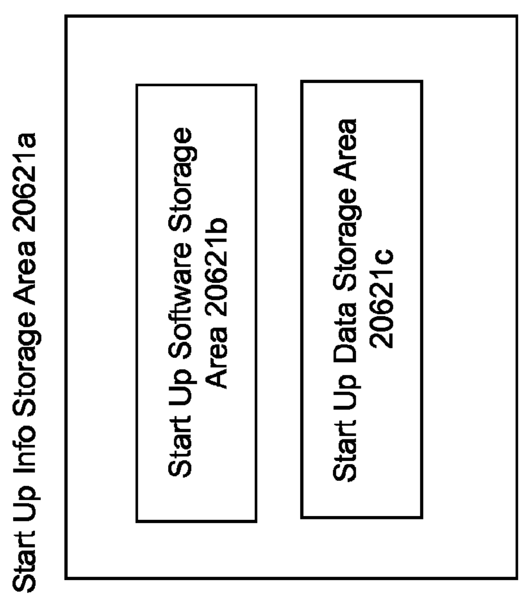

FIG. 324 is a block diagram illustrating an exemplary embodiment of the present invention.

Figure 325:
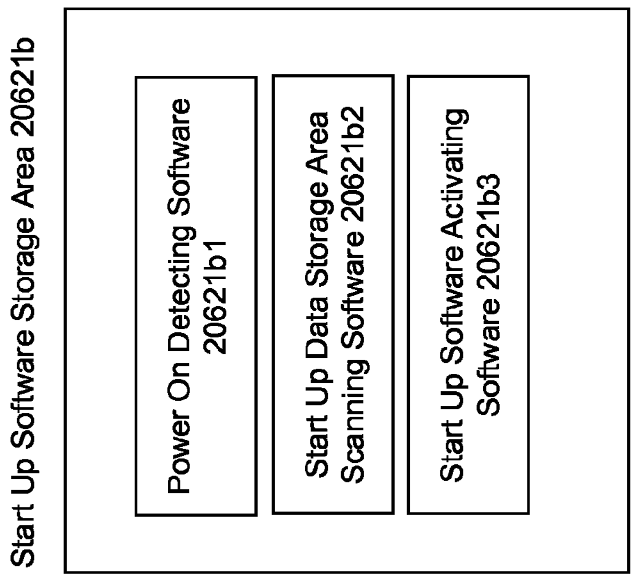

FIG. 325 is a block diagram illustrating an exemplary embodiment of the present invention.

Figure 326:
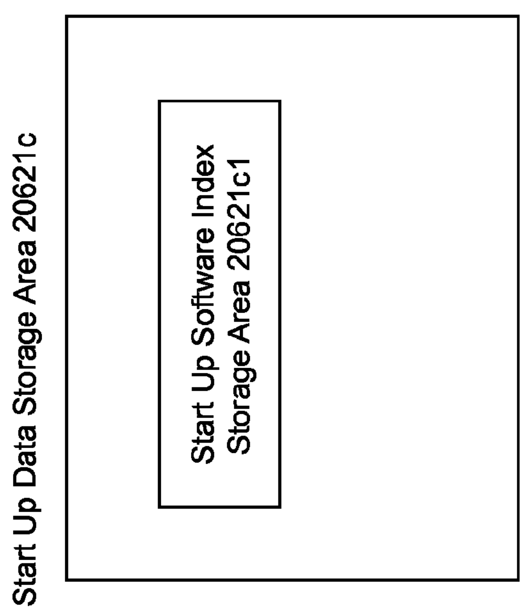

FIG. 326 is a block diagram illustrating an exemplary embodiment of the present invention.

Figure 327:
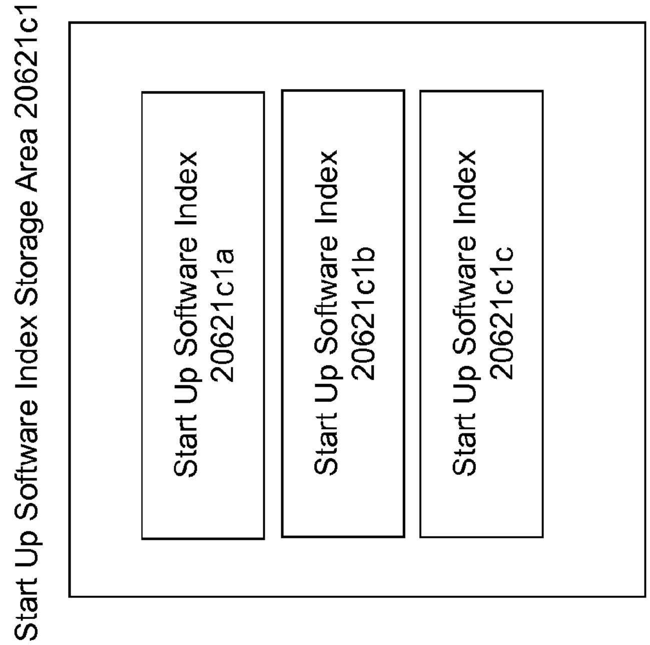

FIG. 327 is a block diagram illustrating an exemplary embodiment of the present invention.

Figure 328:
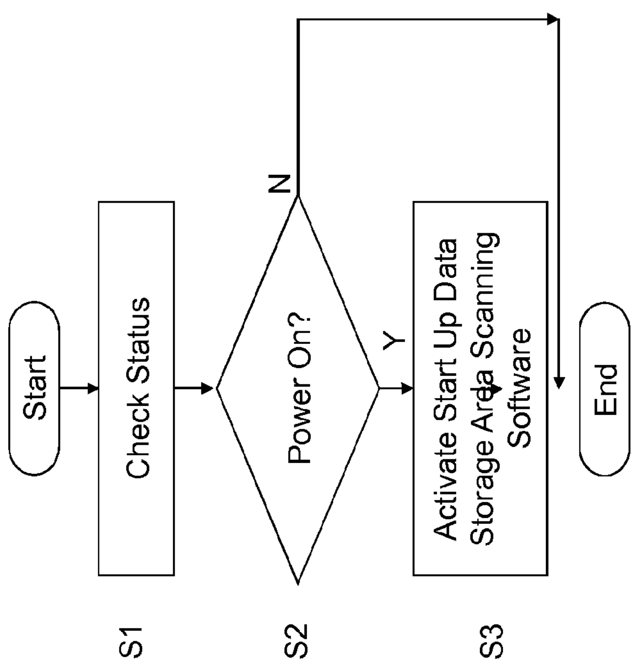

FIG. 328 is a flowchart illustrating an exemplary embodiment of the present invention.

Figure 329:
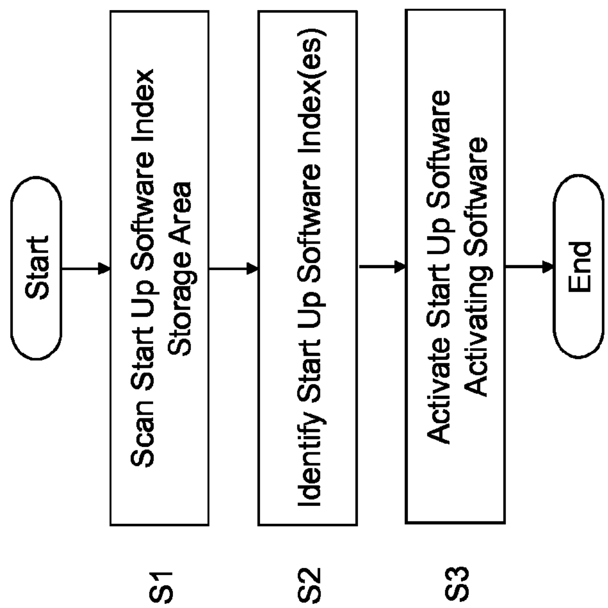

FIG. 329 is a flowchart illustrating an exemplary embodiment of the present invention.

Figure 330:
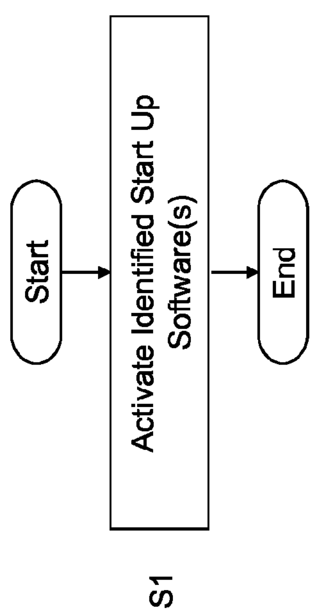

FIG. 330 is a flowchart illustrating an exemplary embodiment of the present invention.

Figure 331:
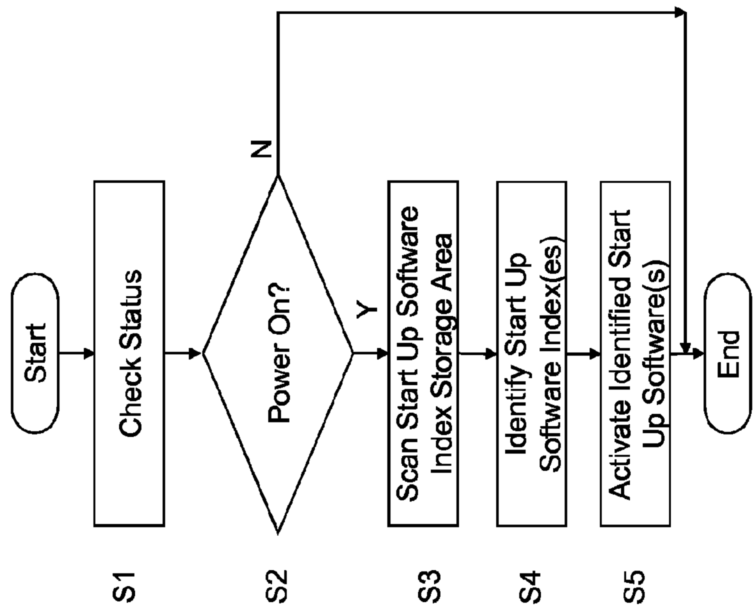

FIG. 331 is a flowchart illustrating an exemplary embodiment of the present invention.

Figure 332:
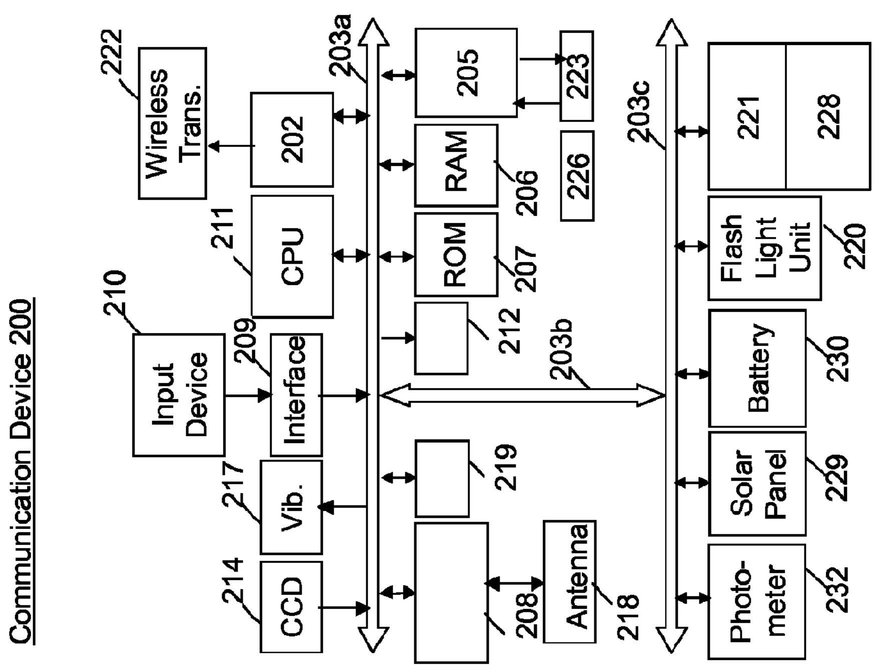

FIG. 332 is a block diagram illustrating an exemplary embodiment of the present invention.

Figure 333:
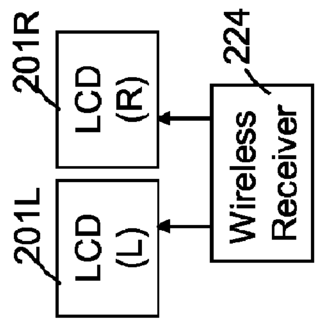

FIG. 333 is a block diagram illustrating an exemplary embodiment of the present invention.

Figure 334:
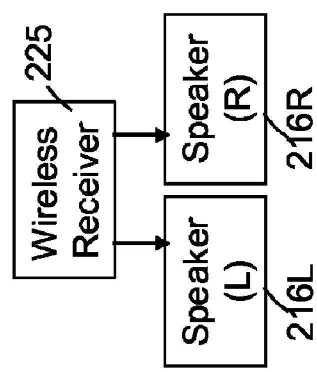

FIG. 334 is a block diagram illustrating an exemplary embodiment of the present invention.

Figure 335:
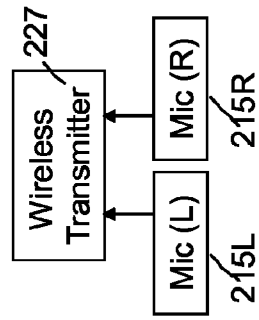

FIG. 335 is a block diagram illustrating an exemplary embodiment of the present invention.

Figure 336:
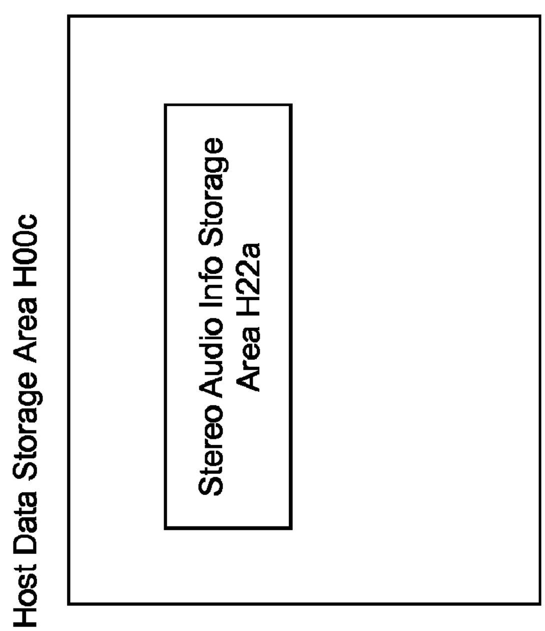

FIG. 336 is a block diagram illustrating an exemplary embodiment of the present invention.

Figure 337:
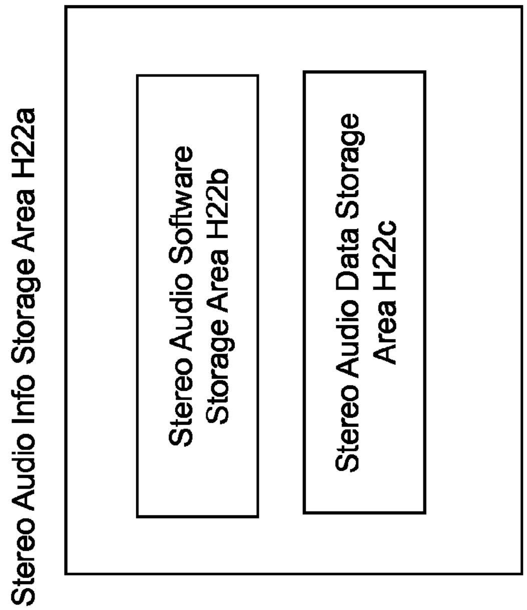

FIG. 337 is a block diagram illustrating an exemplary embodiment of the present invention.

Figure 338:
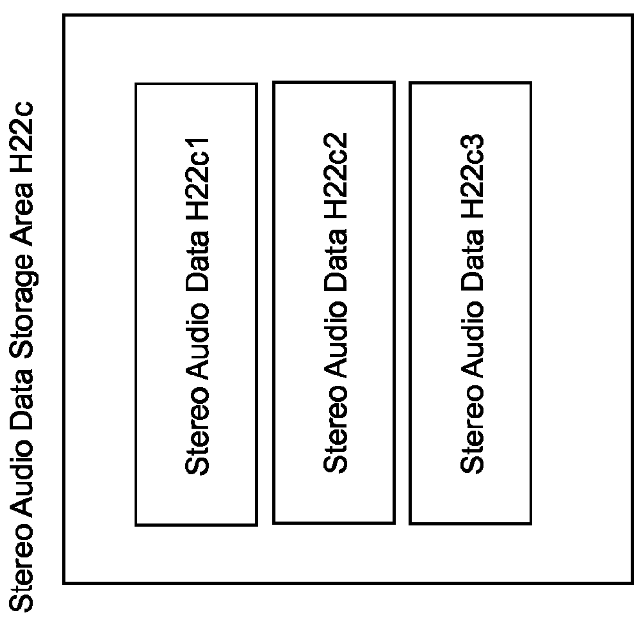

FIG. 338 is a block diagram illustrating an exemplary embodiment of the present invention.

Figure 339:
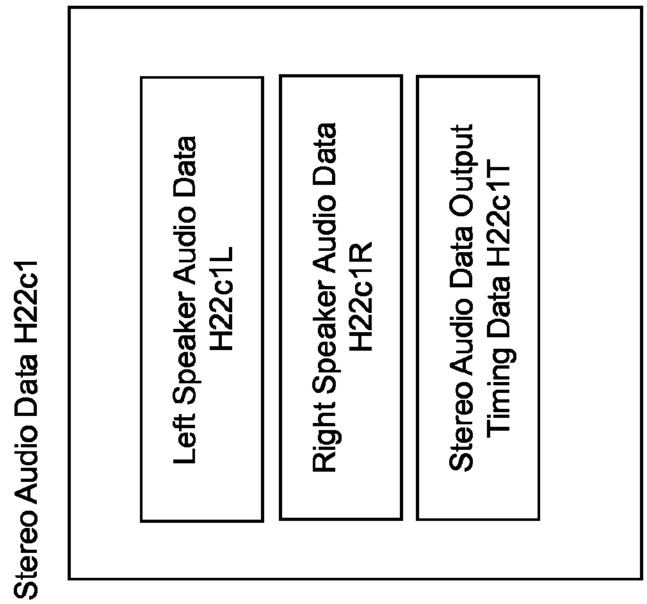

FIG. 339 is a block diagram illustrating an exemplary embodiment of the present invention.

Figure 340:
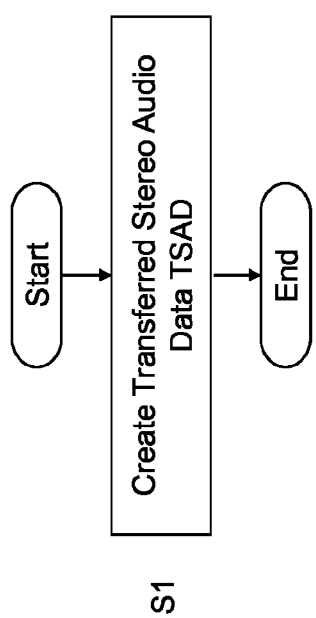

FIG. 340 is a flowchart illustrating an exemplary embodiment of the present invention.

Figure 341:
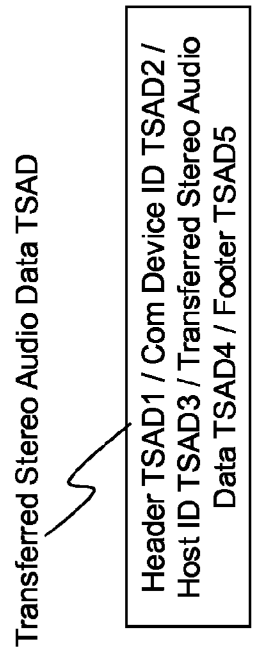

FIG. 341 is a simplified illustration illustrating an exemplary embodiment of the present invention.

Figure 342:
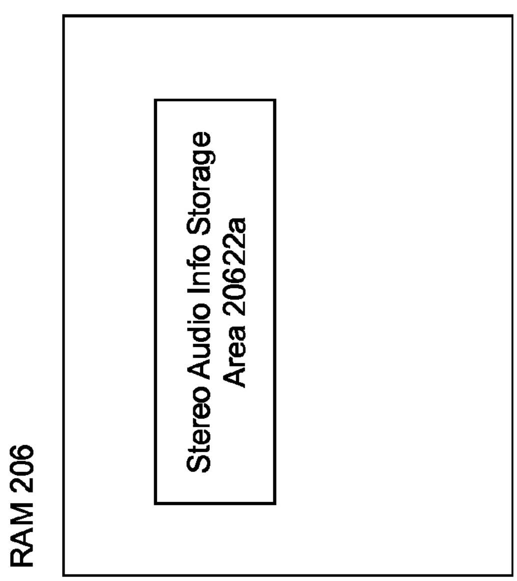

FIG. 342 is a block diagram illustrating an exemplary embodiment of the present invention.

Figure 343:
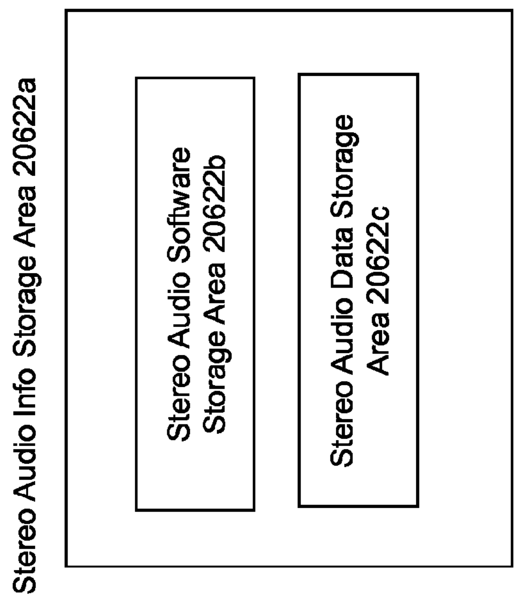

FIG. 343 is a block diagram illustrating an exemplary embodiment of the present invention.

Figure 344:
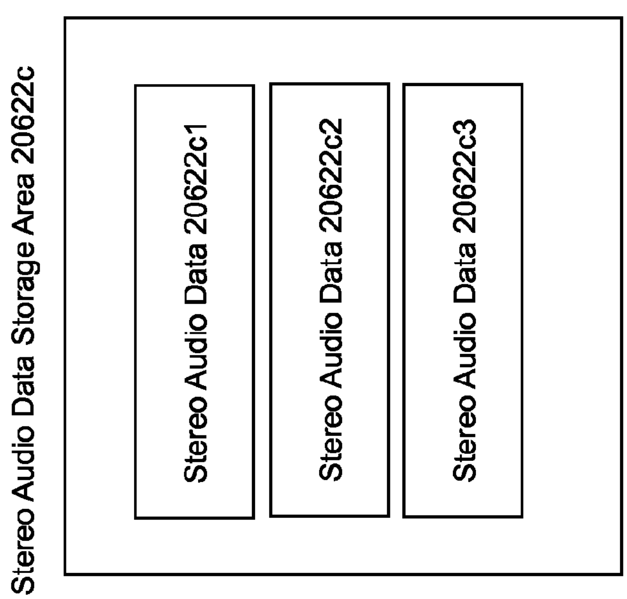

FIG. 344 is a block diagram illustrating an exemplary embodiment of the present invention.

Figure 345:
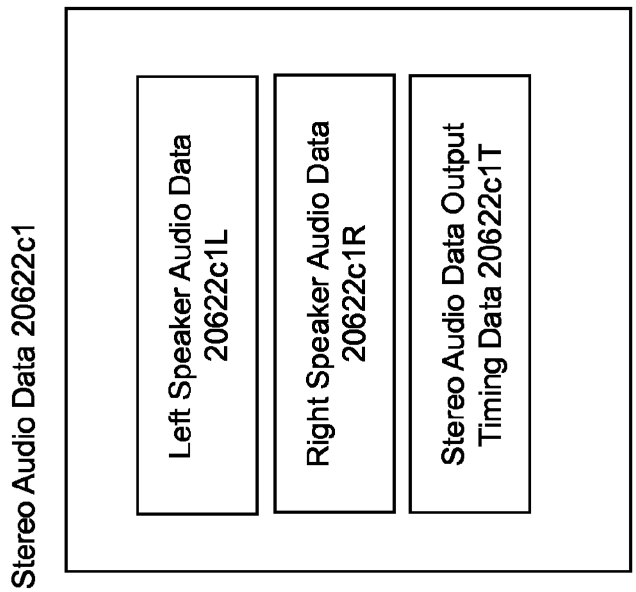

FIG. 345 is a block diagram illustrating an exemplary embodiment of the present invention.

Figure 346:
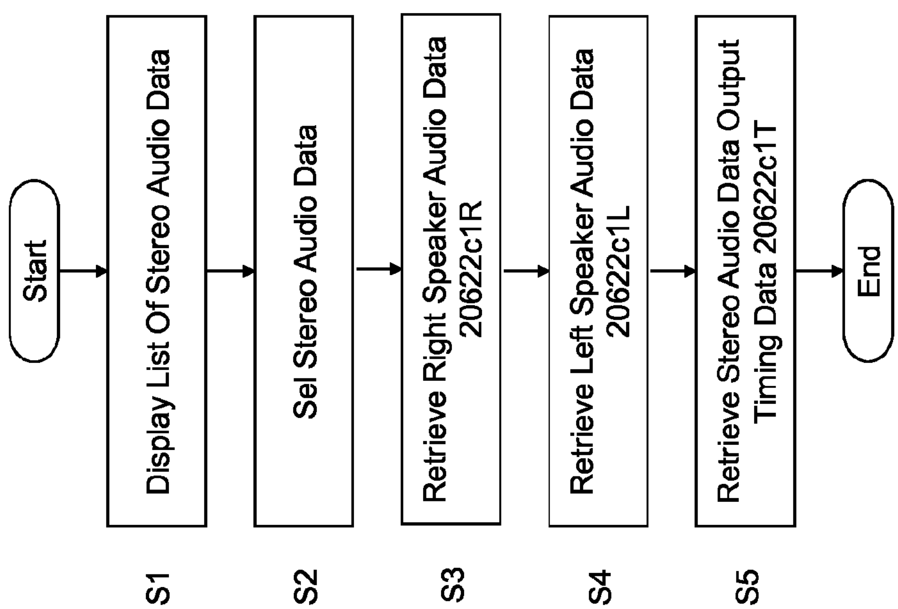

FIG. 346 is a flowchart illustrating an exemplary embodiment of the present invention.

Figure 347:
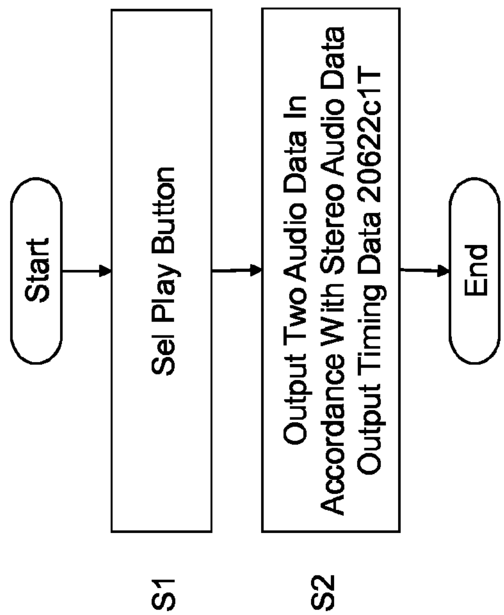

FIG. 347 is a flowchart illustrating an exemplary embodiment of the present invention.

Figure 348:
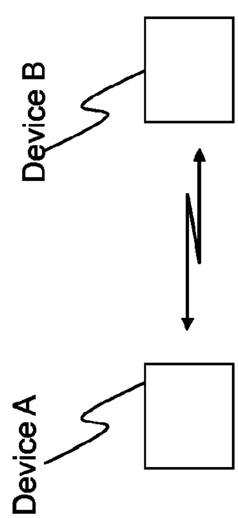

FIG. 348 is a simplified illustration illustrating an exemplary embodiment of the present invention.

Figure 349:
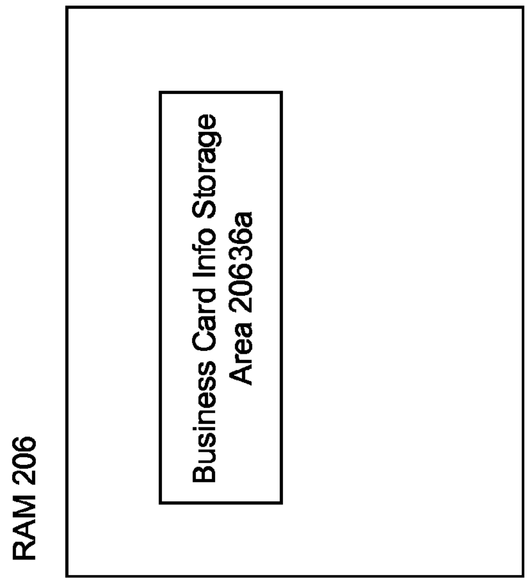

FIG. 349 is a block diagram illustrating an exemplary embodiment of the present invention.

Figure 350:
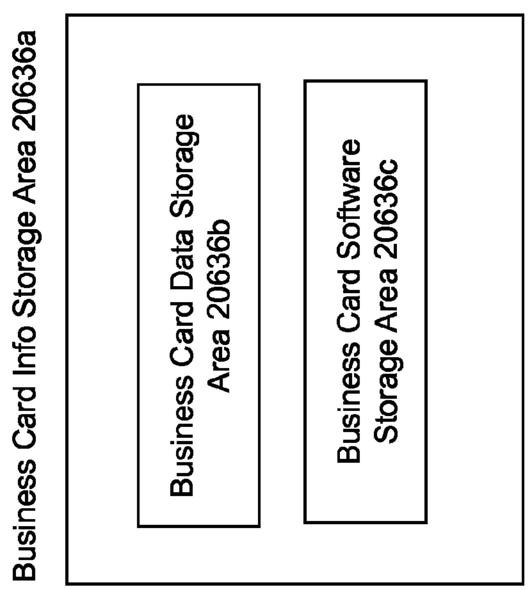

FIG. 350 is a block diagram illustrating an exemplary embodiment of the present invention.

Figure 351:
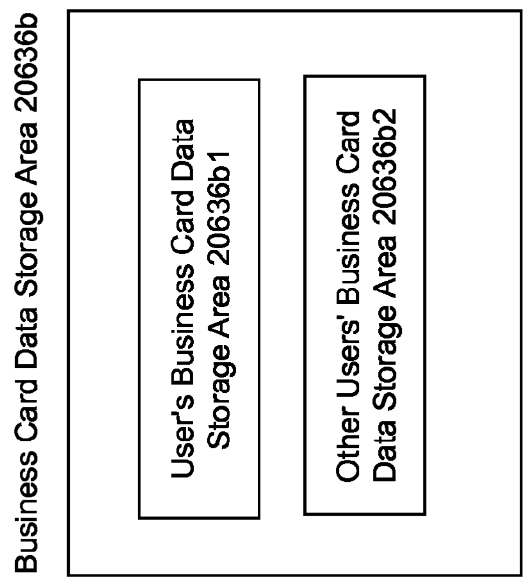

FIG. 351 is a block diagram illustrating an exemplary embodiment of the present invention.

Figure 352:
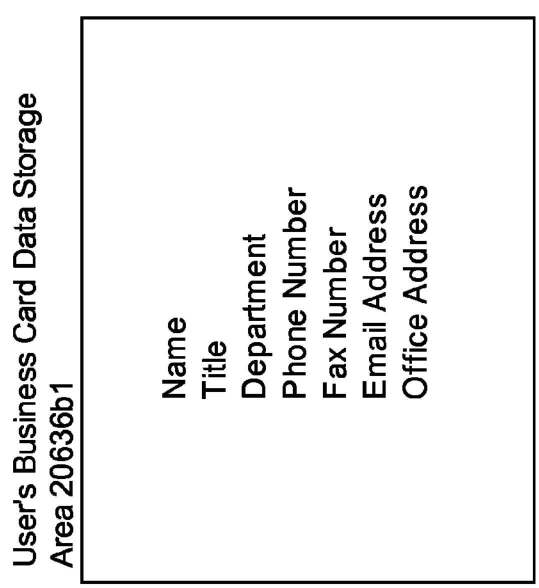

FIG. 352 is a block diagram illustrating an exemplary embodiment of the present invention.

Figures 353, 354:
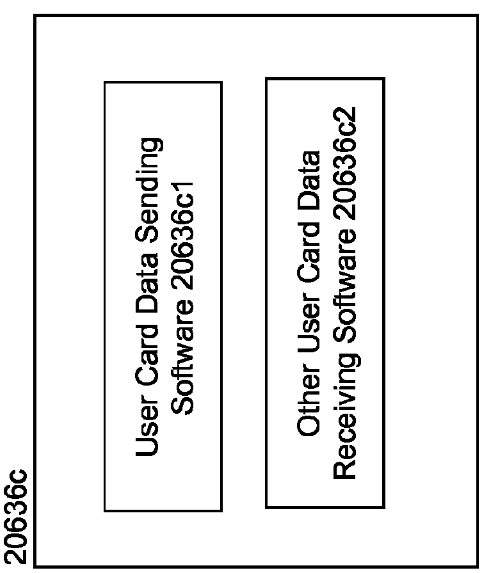

FIG. 353 is a block diagram illustrating an exemplary embodiment of the present invention.

FIG. 354 is a block diagram illustrating an exemplary embodiment of the present invention.

Figure 355:
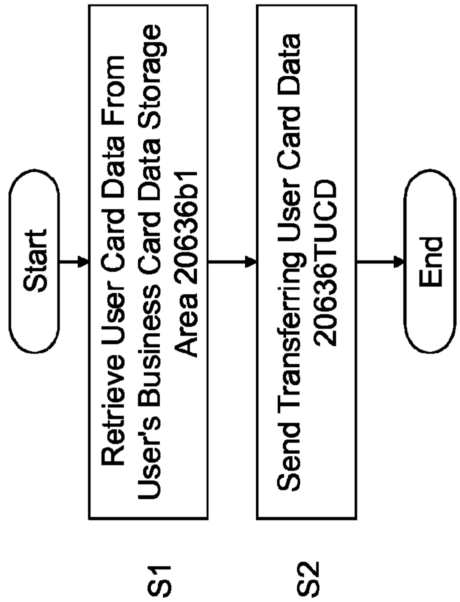

FIG. 355 is a flowchart illustrating an exemplary embodiment of the present invention.

Figure 356:
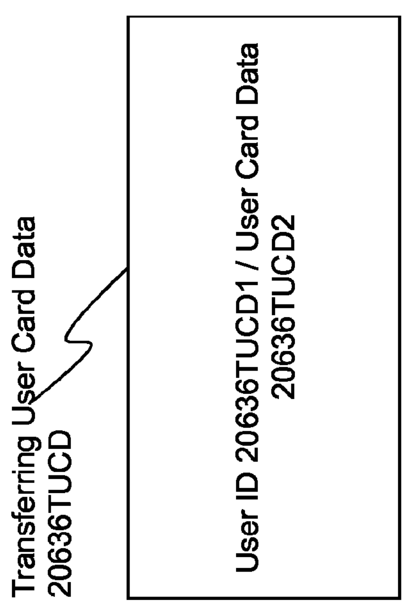

FIG. 356 is a simplified illustration illustrating an exemplary embodiment of the present invention.

Figure 357:
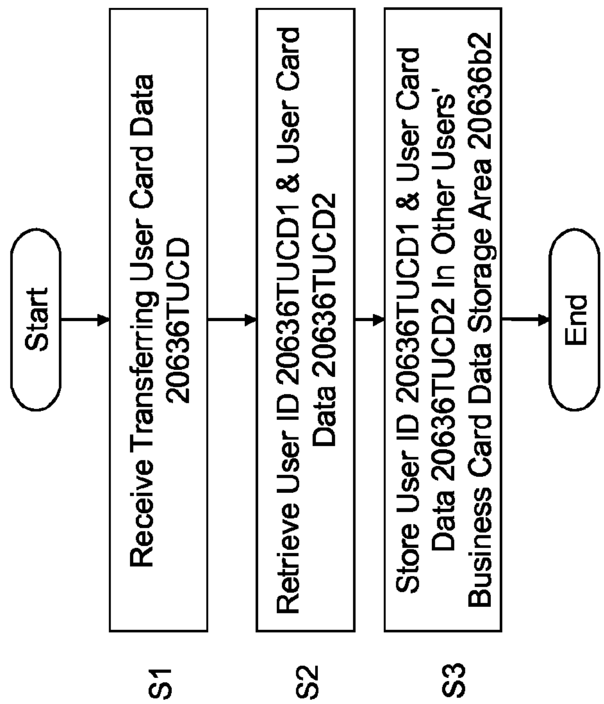

FIG. 357 is a flowchart illustrating an exemplary embodiment of the present invention.

Figure 358:
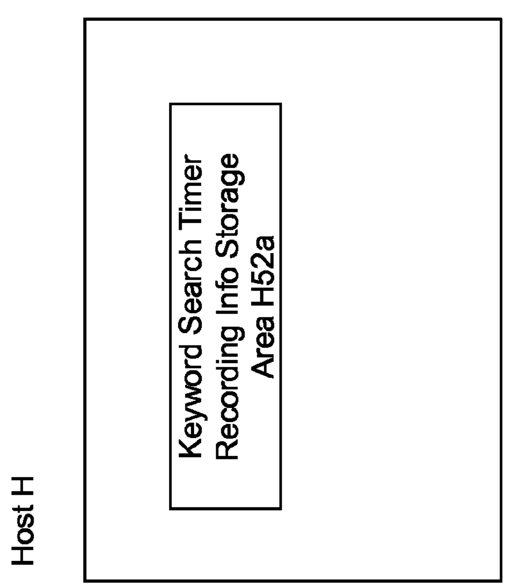

FIG. 358 is a block diagram illustrating an exemplary embodiment of the present invention.

Figure 359:
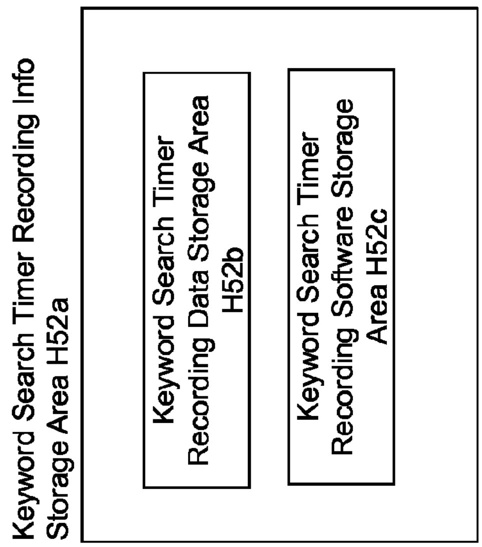

FIG. 359 is a block diagram illustrating an exemplary embodiment of the present invention.

Figure 360:
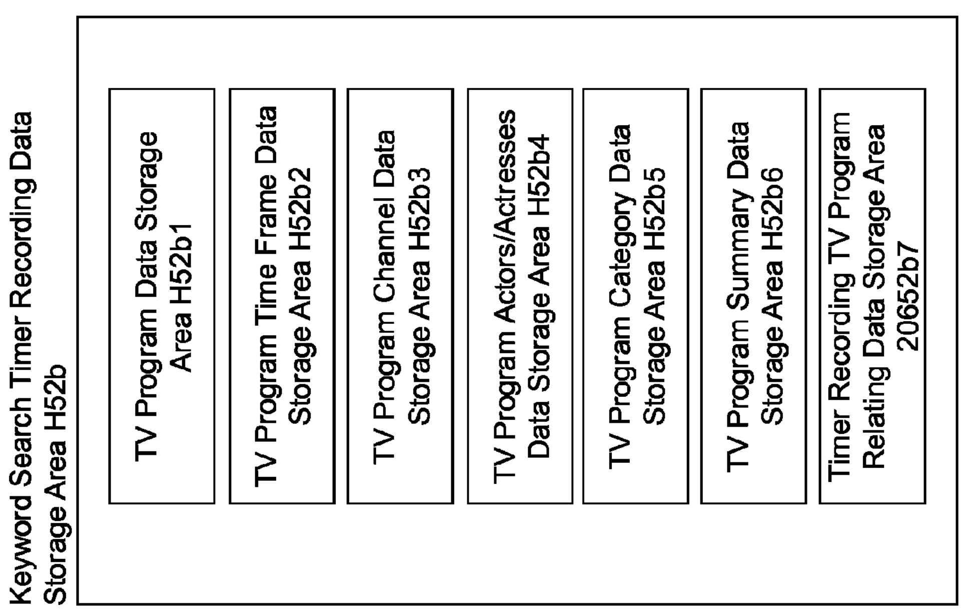

FIG. 360 is a block diagram illustrating an exemplary embodiment of the present invention.

FIG. 361 is a block diagram illustrating an exemplary embodiment of the present invention.

FIG. 362 is a block diagram illustrating an exemplary embodiment of the present invention.

FIG. 363 is a block diagram illustrating an exemplary embodiment of the present invention.

FIG. 364 is a block diagram illustrating an exemplary embodiment of the present invention.

FIG. 365 is a block diagram illustrating an exemplary embodiment of the present invention.

FIG. 366 is a block diagram illustrating an exemplary embodiment of the present invention.

FIG. 367 is a block diagram illustrating an exemplary embodiment of the present invention.

FIG. 368 is a block diagram illustrating an exemplary embodiment of the present invention.

Figure 369:
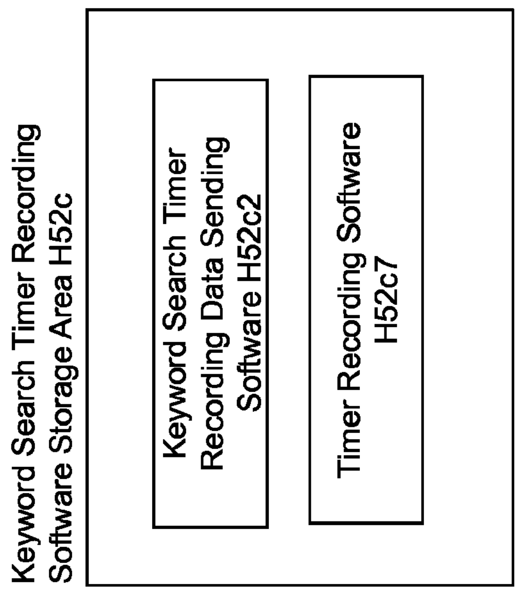

FIG. 369 is a block diagram illustrating an exemplary embodiment of the present invention.

Figure 370:
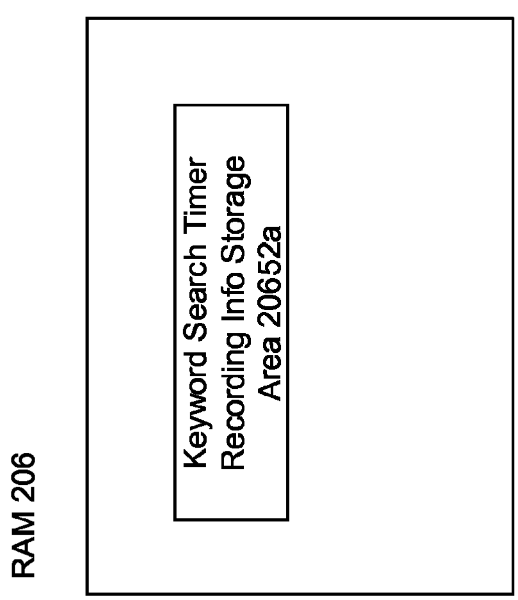

FIG. 370 is a block diagram illustrating an exemplary embodiment of the present invention.

Figure 371:
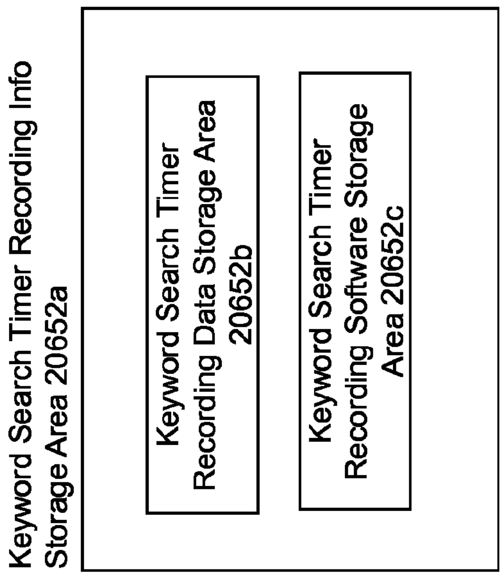

FIG. 371 is a block diagram illustrating an exemplary embodiment of the present invention.

Figure 372:
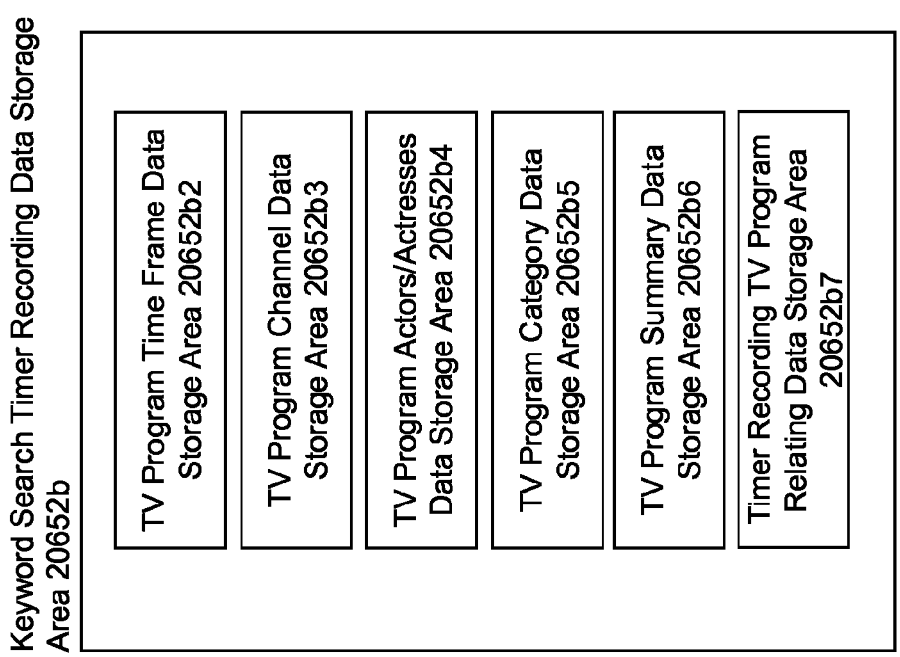

FIG. 372 is a block diagram illustrating an exemplary embodiment of the present invention.

FIG. 373 is a block diagram illustrating an exemplary embodiment of the present invention.

FIG. 374 is a block diagram illustrating an exemplary embodiment of the present invention.

Figures 375, 376:
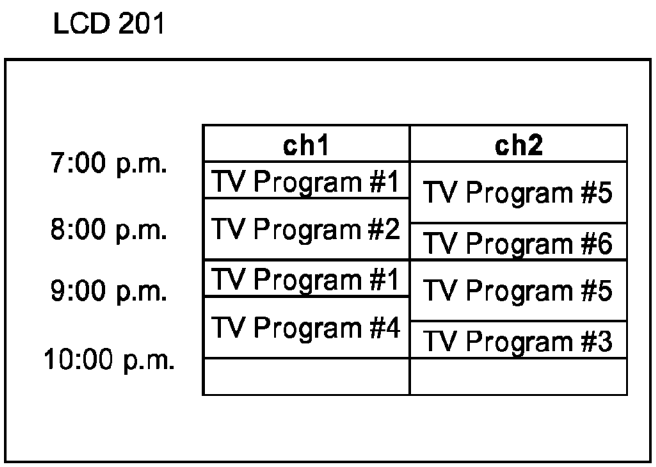

FIG. 375 is a block diagram illustrating an exemplary embodiment of the present invention.

FIG. 376 is a simplified illustration illustrating an exemplary embodiment of the present invention.

FIG. 377 is a block diagram illustrating an exemplary embodiment of the present invention.

FIG. 378 is a block diagram illustrating an exemplary embodiment of the present invention.

FIG. 379 is a block diagram illustrating an exemplary embodiment of the present invention.

FIG. 380 is a block diagram illustrating an exemplary embodiment of the present invention.

Figure 381:

FIG. 381 is a block diagram illustrating an exemplary embodiment of the present invention.

Figure 382:
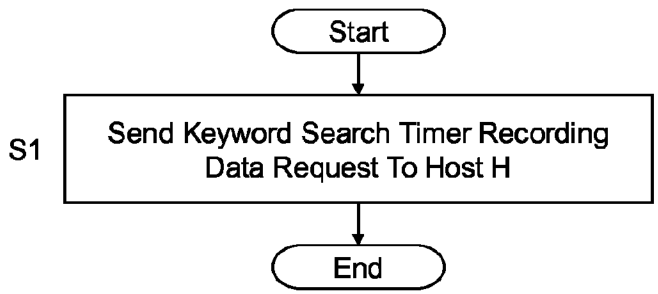

FIG. 382 is a flowchart illustrating an exemplary embodiment of the present invention.

Figure 383:
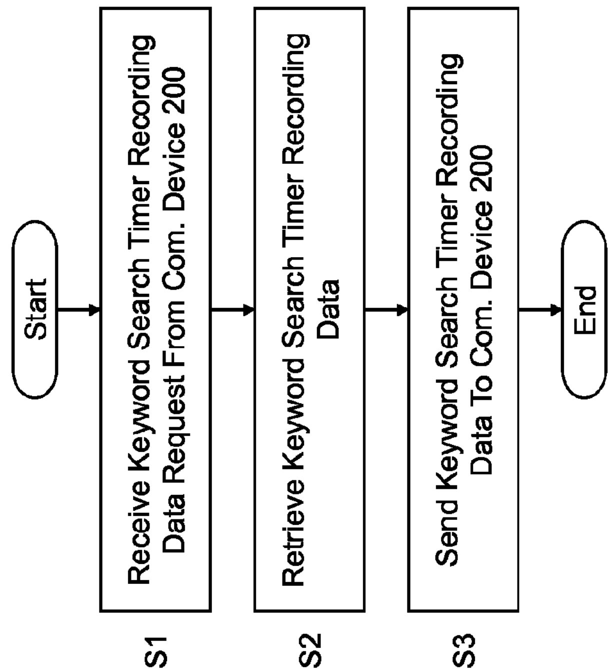

FIG. 383 is a flowchart illustrating an exemplary embodiment of the present invention.

Figure 384:
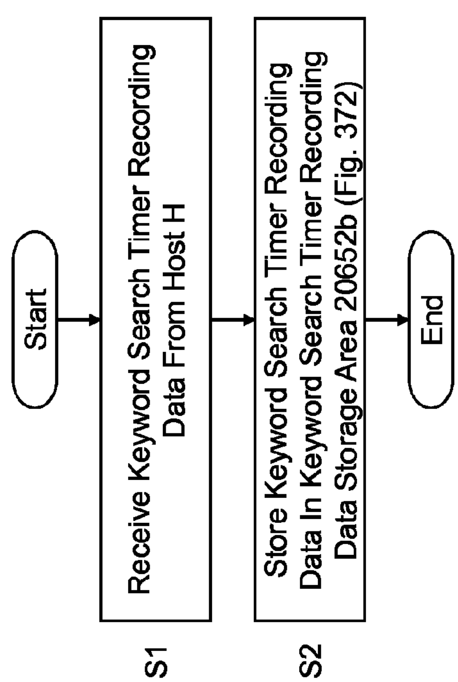

FIG. 384 is a flowchart illustrating an exemplary embodiment of the present invention.

Figure 385:
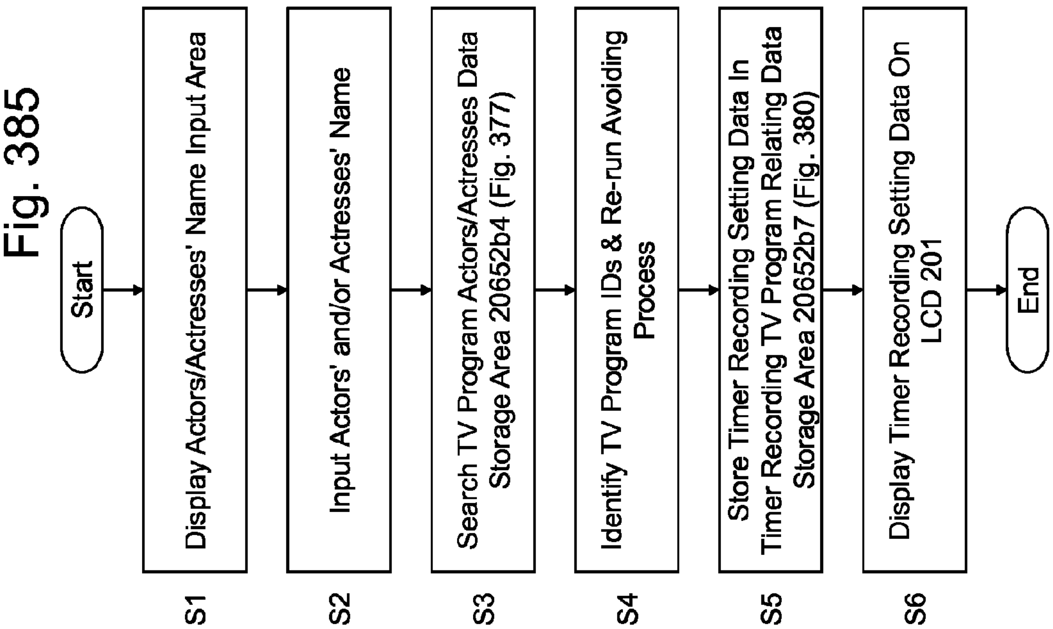

FIG. 385 is a flowchart illustrating an exemplary embodiment of the present invention.

Figure 386:
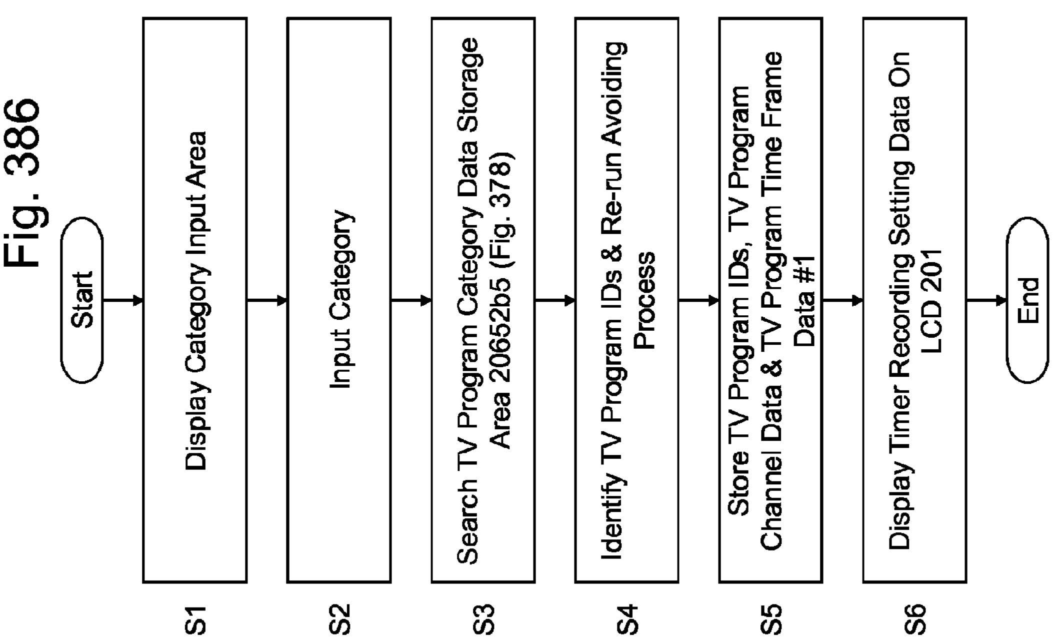

FIG. 386 is a flowchart illustrating an exemplary embodiment of the present invention.

Figure 387:
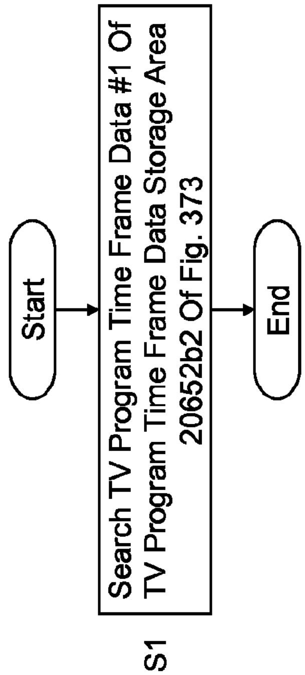

FIG. 387 is a flowchart illustrating an exemplary embodiment of the present invention.

Figure 388:
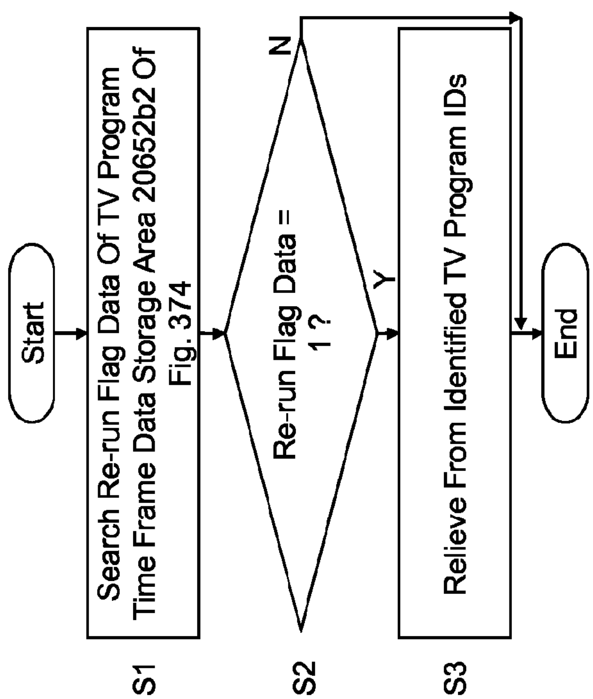

FIG. 388 is a flowchart illustrating an exemplary embodiment of the present invention.

Figure 389:
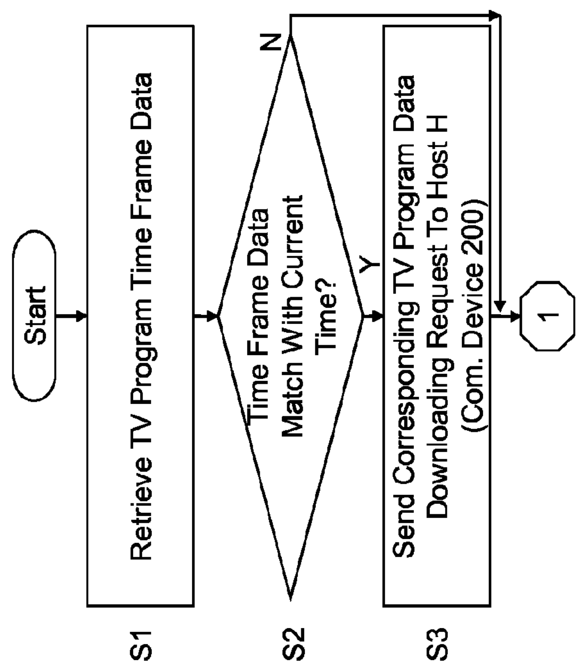

FIG. 389 is a flowchart illustrating an exemplary embodiment of the present invention.

Figure 390:
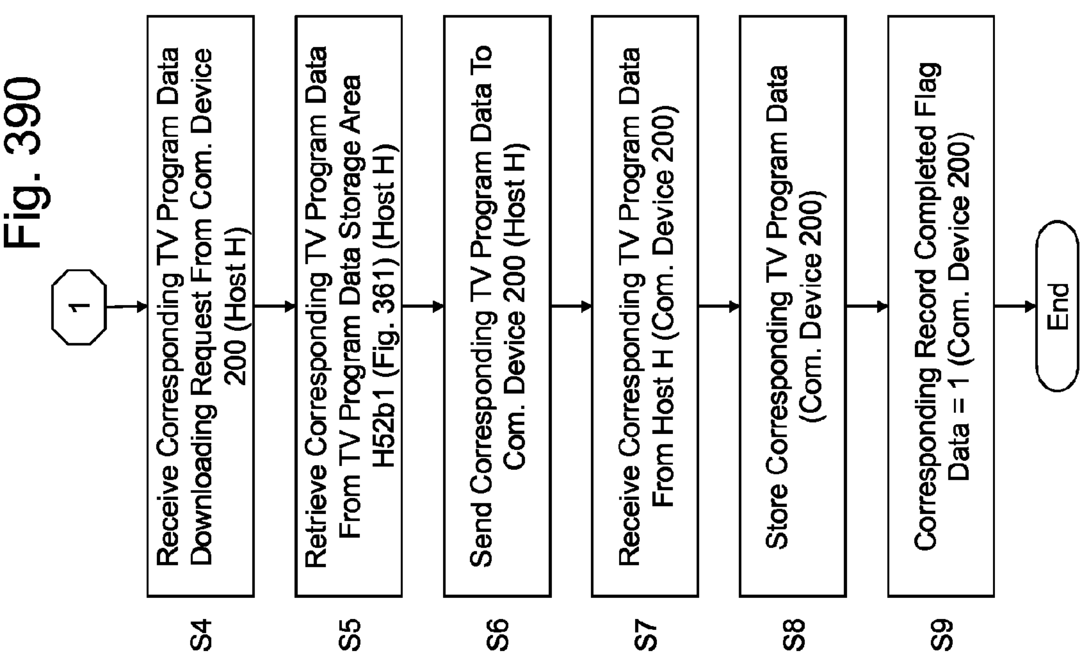

FIG. 390 is a flowchart illustrating an exemplary embodiment of the present invention.

Figure 391:
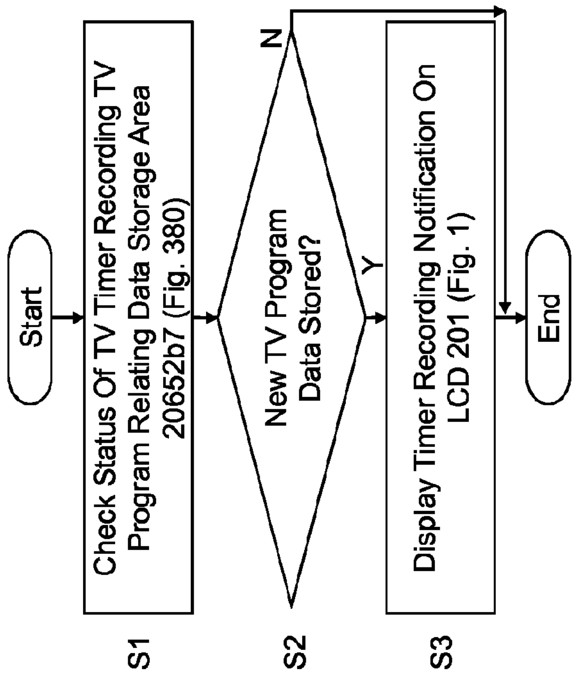

FIG. 391 is a flowchart illustrating an exemplary embodiment of the present invention.

Figure 392:
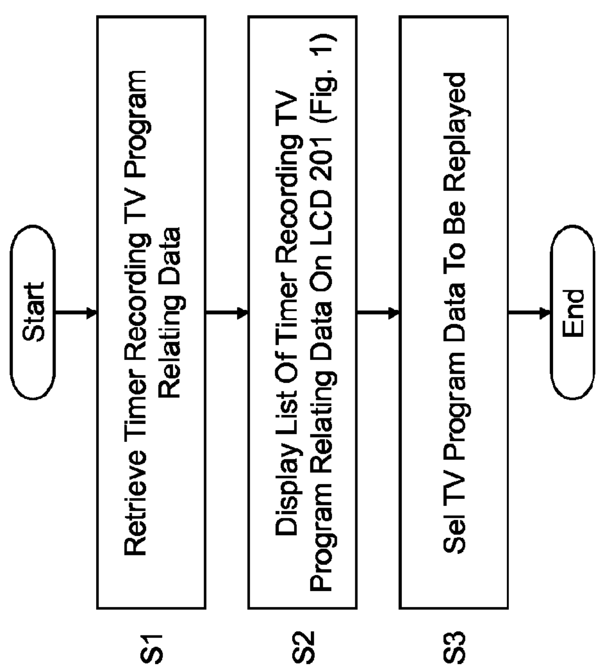

FIG. 392 is a flowchart illustrating an exemplary embodiment of the present invention.

Figure 393:
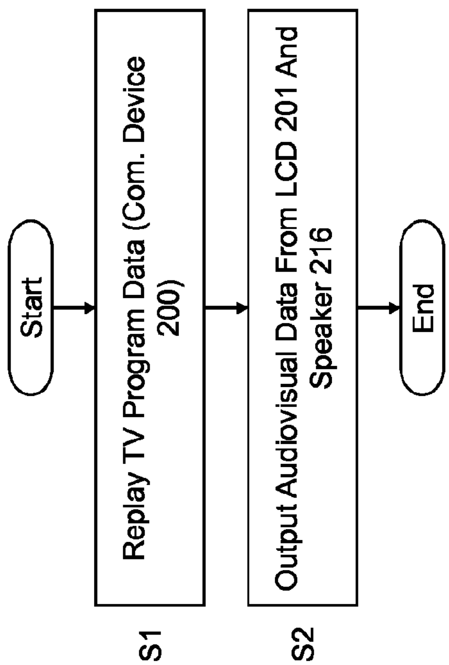

FIG. 393 is a flowchart illustrating an exemplary embodiment of the present invention.

Figure 394:
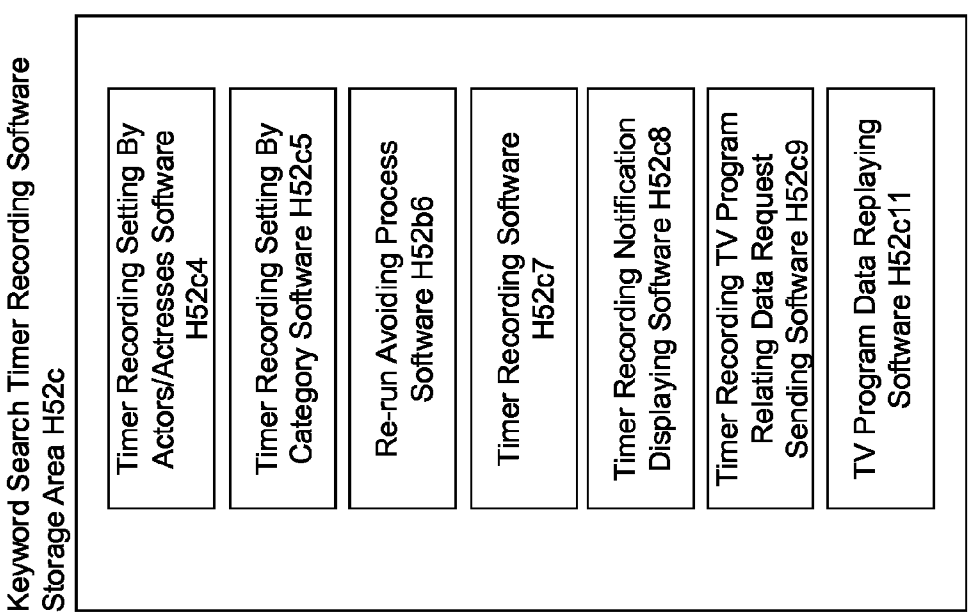

FIG. 394 is a block diagram illustrating an exemplary embodiment of the present invention.

Figure 395:
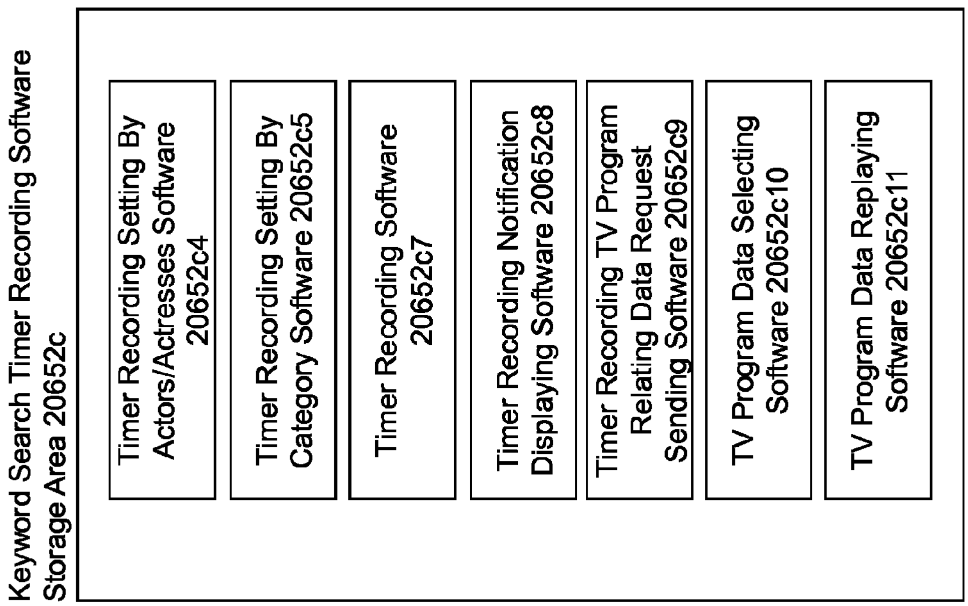

FIG. 395 is a block diagram illustrating an exemplary embodiment of the present invention.

Figure 396:
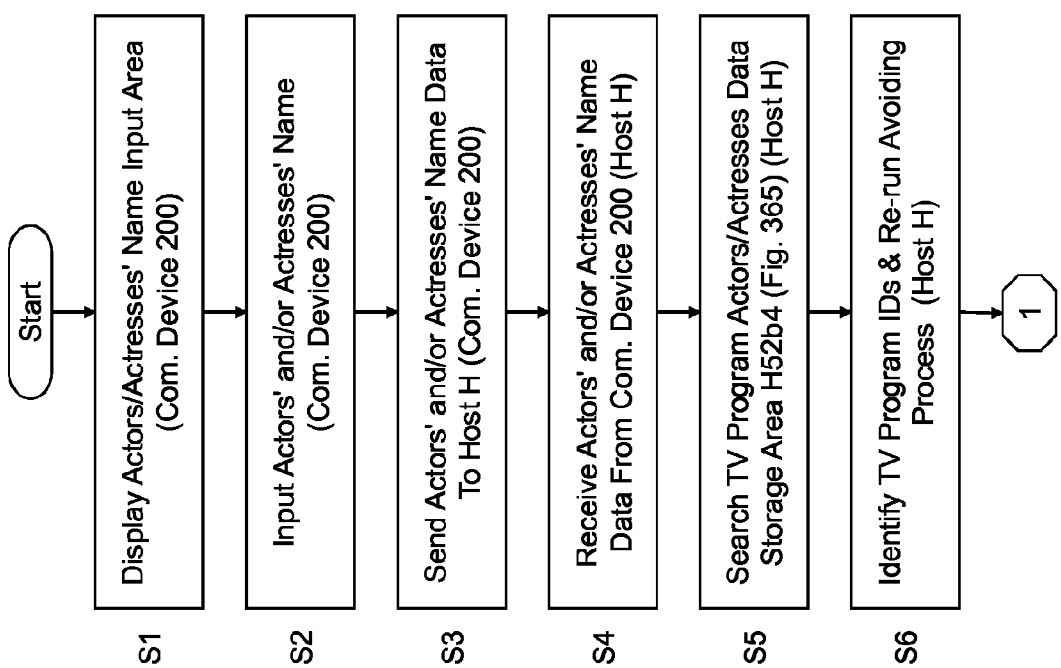

FIG. 396 is a flowchart illustrating an exemplary embodiment of the present invention.

Figure 397:
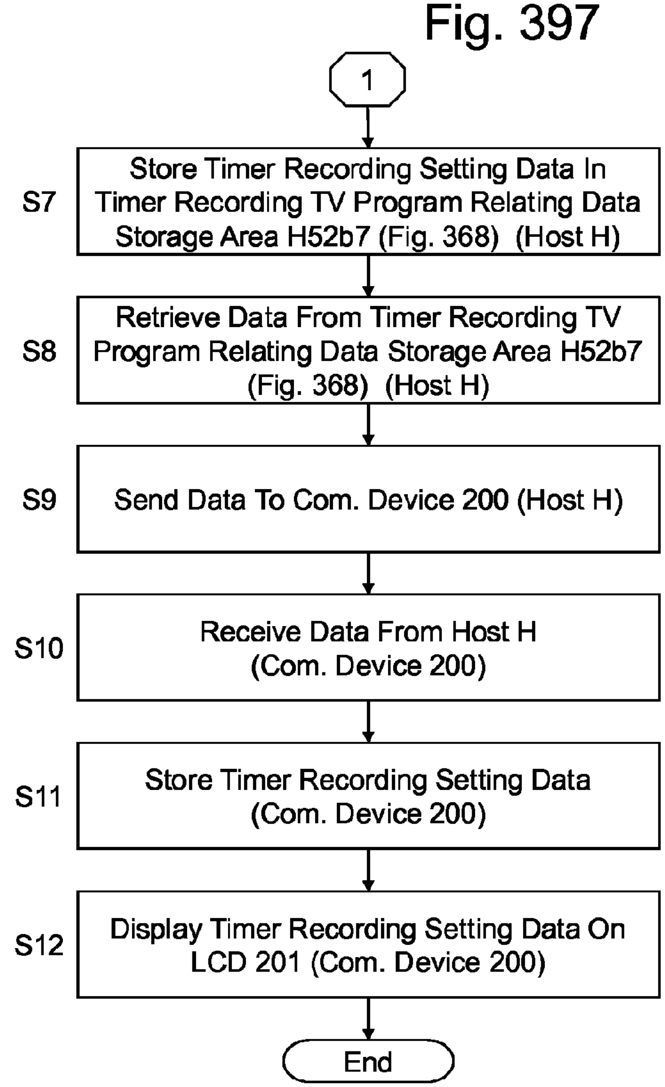

FIG. 397 is a flowchart illustrating an exemplary embodiment of the present invention.

Figure 398:
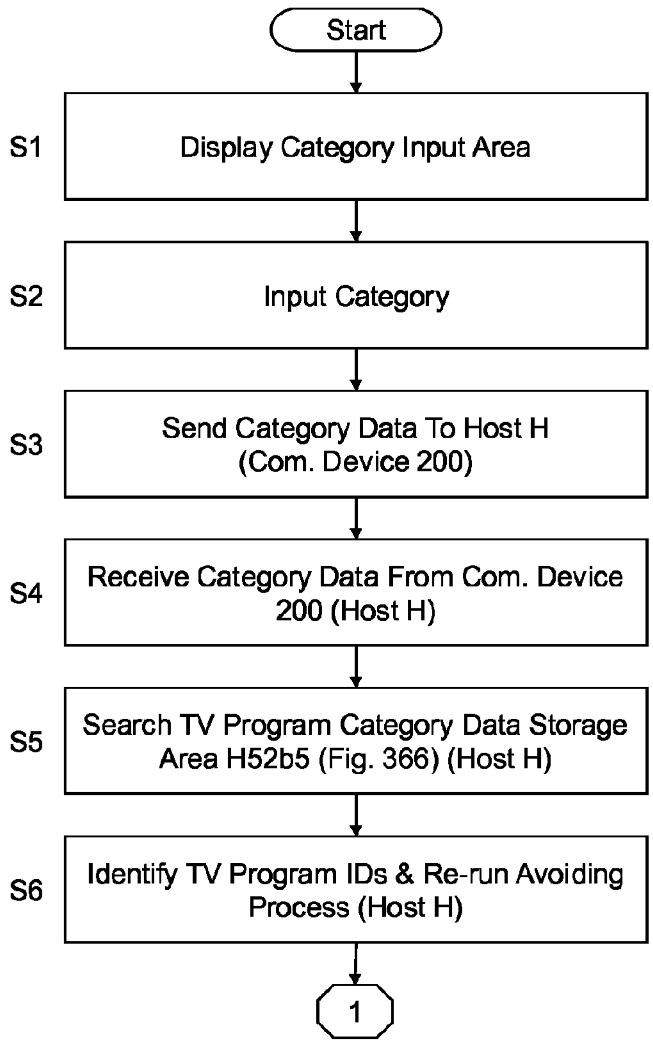

FIG. 398 is a flowchart illustrating an exemplary embodiment of the present invention.

Figure 399:
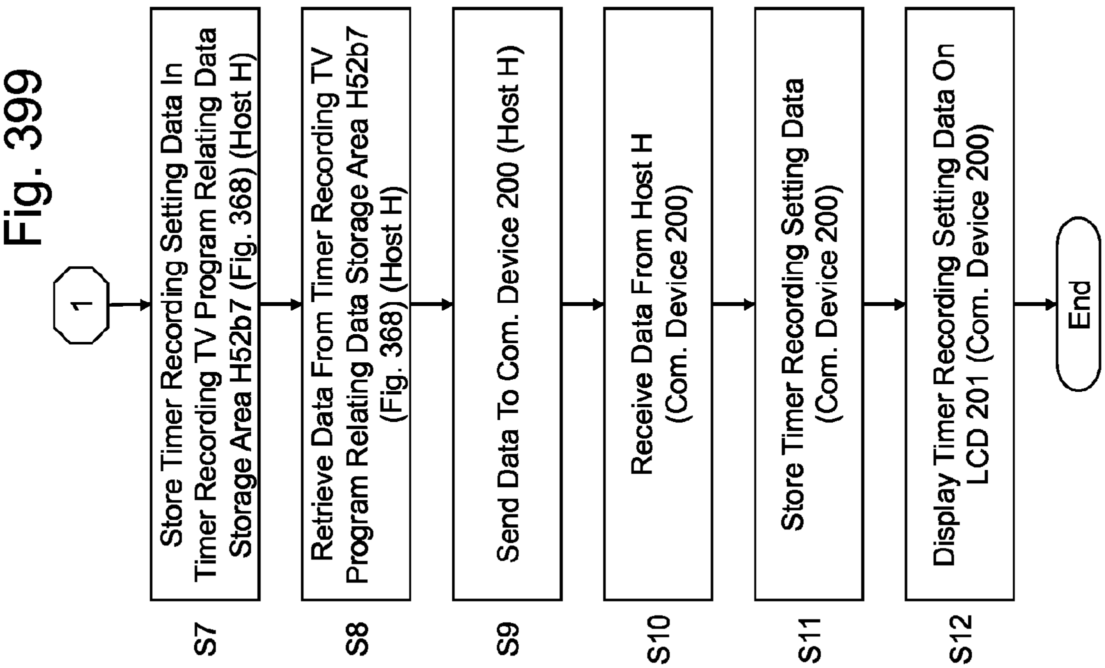

FIG. 399 is a flowchart illustrating an exemplary embodiment of the present invention.

Figure 400:
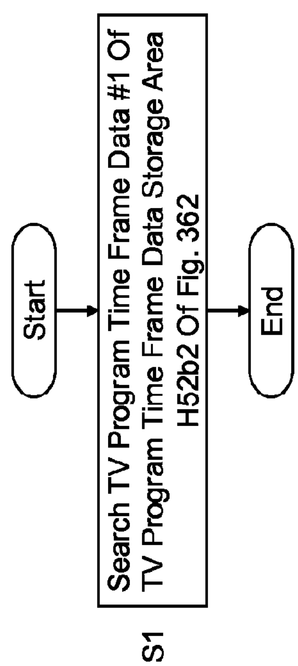

FIG. 400 is a flowchart illustrating an exemplary embodiment of the present invention.

Figure 401:
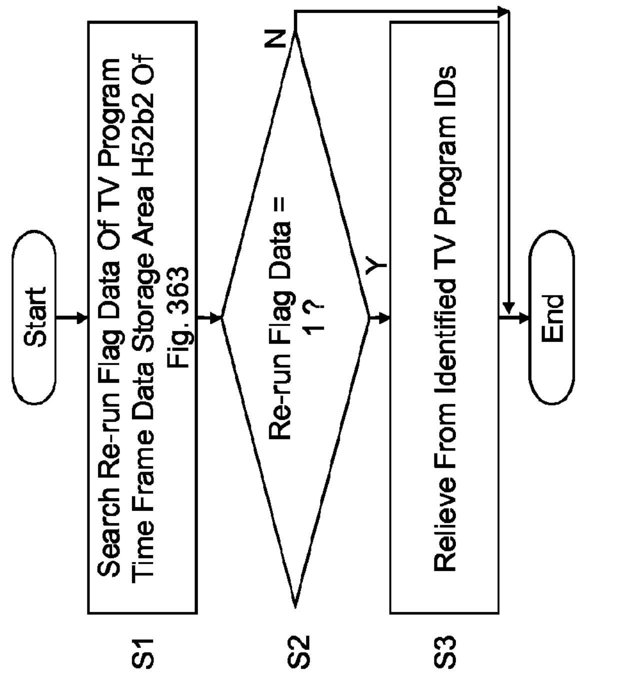

FIG. 401 is a flowchart illustrating an exemplary embodiment of the present invention.

Figure 402:
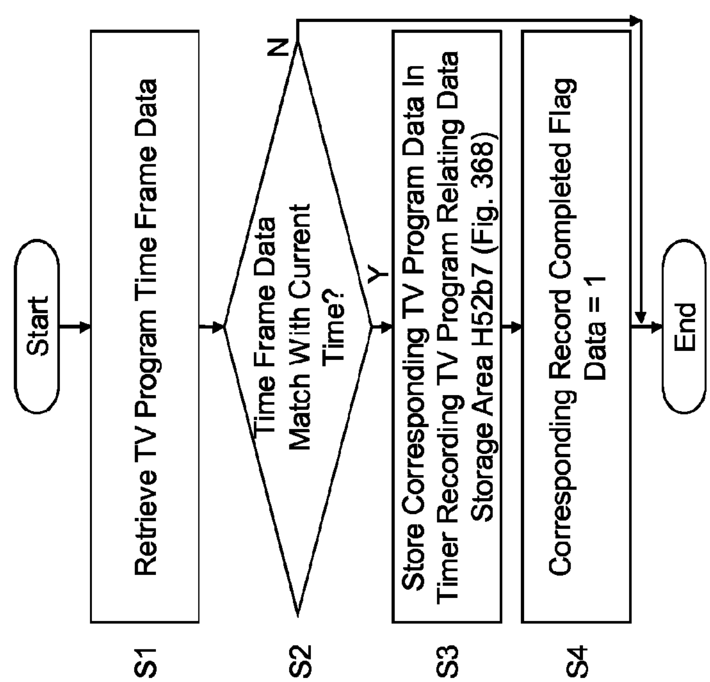

FIG. 402 is a flowchart illustrating an exemplary embodiment of the present invention.

Figure 403:
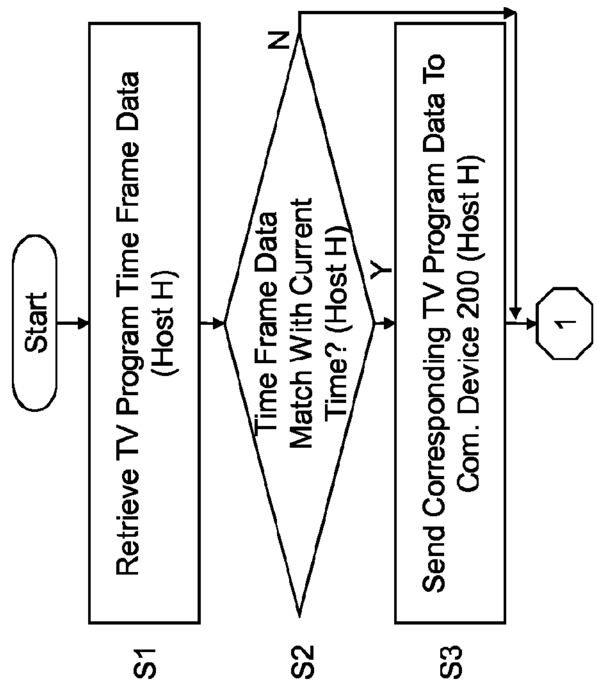

FIG. 403 is a flowchart illustrating an exemplary embodiment of the present invention.

Figure 404:
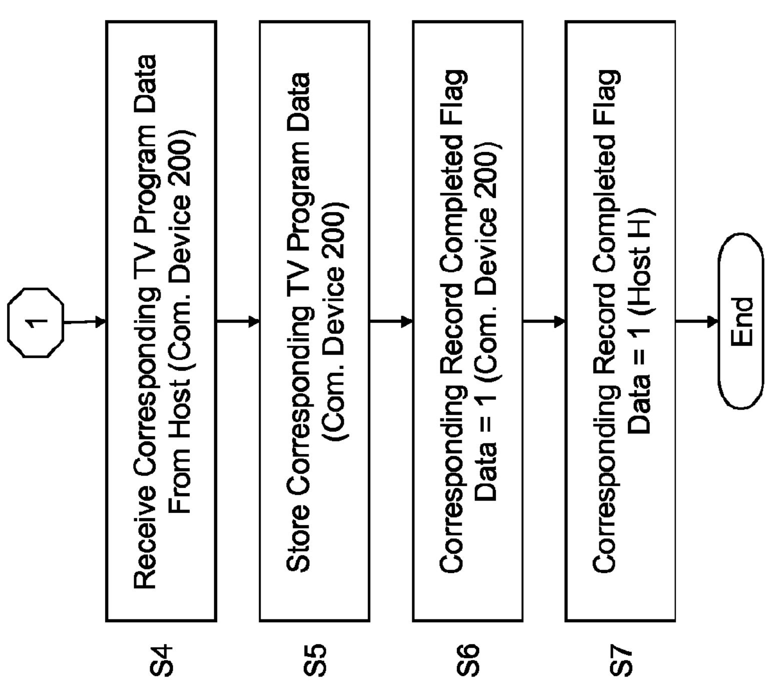

FIG. 404 is a flowchart illustrating an exemplary embodiment of the present invention.

Figure 405:
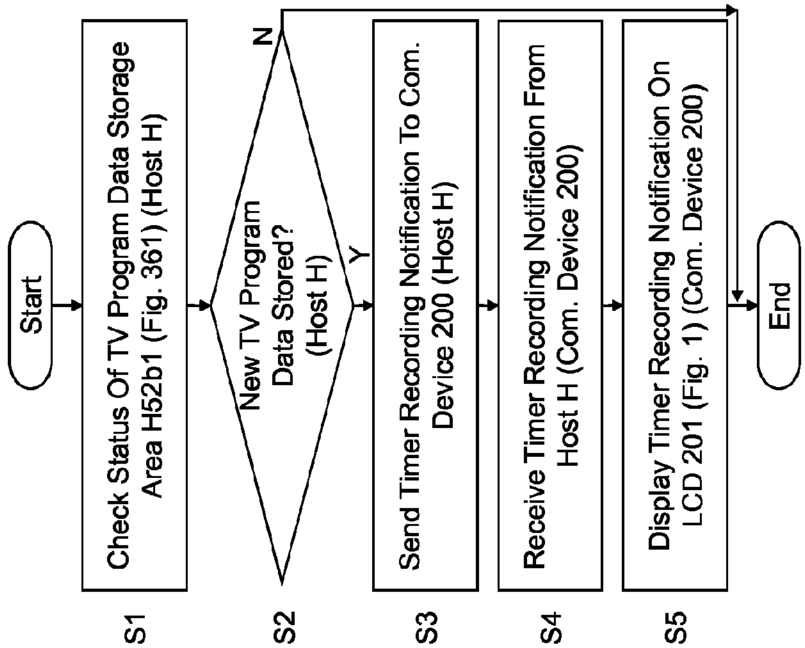

FIG. 405 is a flowchart illustrating an exemplary embodiment of the present invention.

Figure 406:
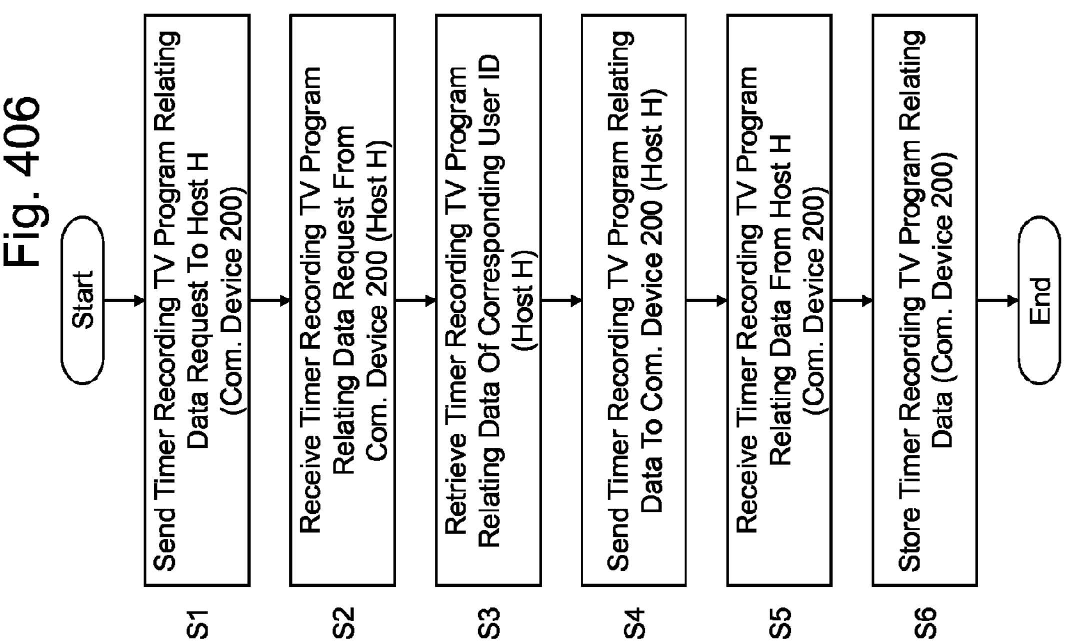

FIG. 406 is a flowchart illustrating an exemplary embodiment of the present invention.

Figure 407:
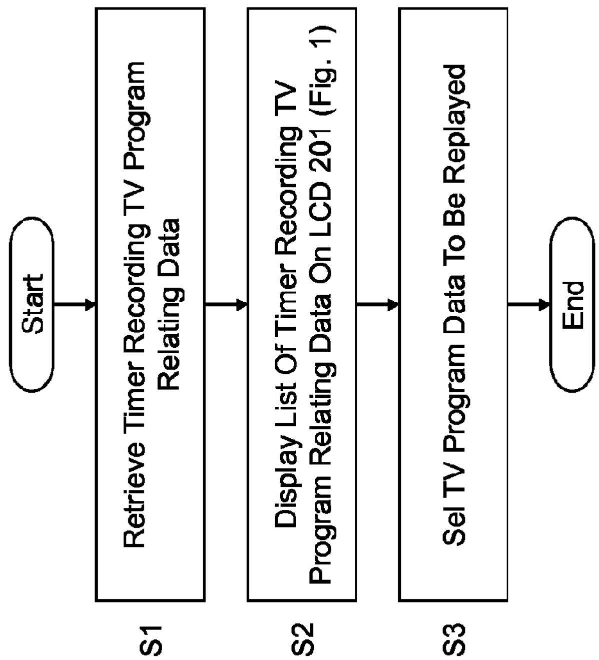

FIG. 407 is a flowchart illustrating an exemplary embodiment of the present invention.

Figure 408:
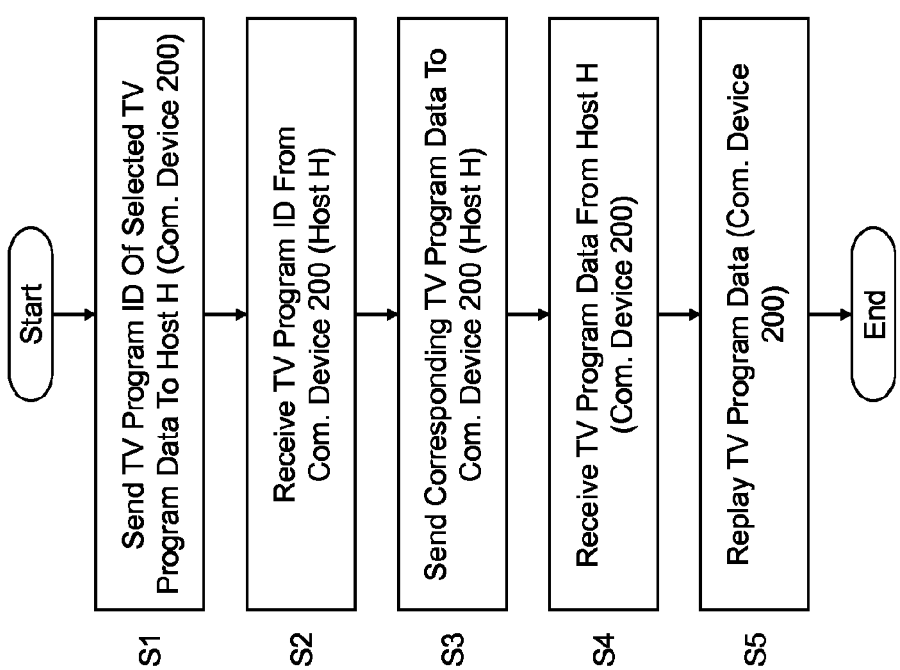

FIG. 408 is a flowchart illustrating an exemplary embodiment of the present invention.

Figure 409:
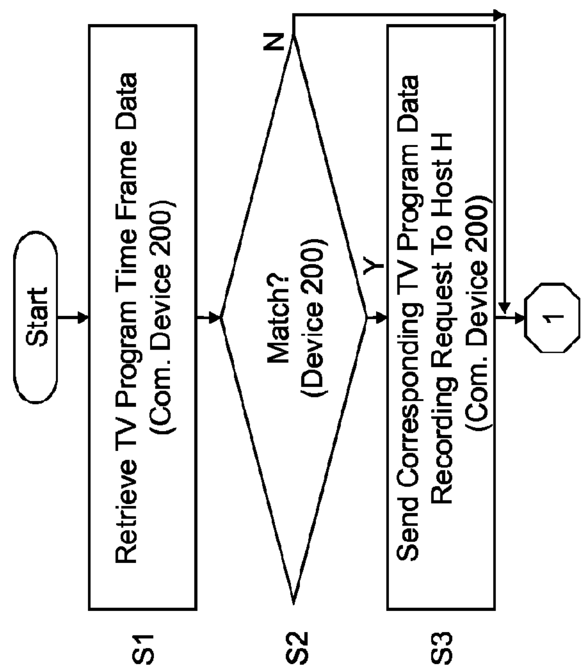

FIG. 409 is a flowchart illustrating an exemplary embodiment of the present invention.

Figure 410:
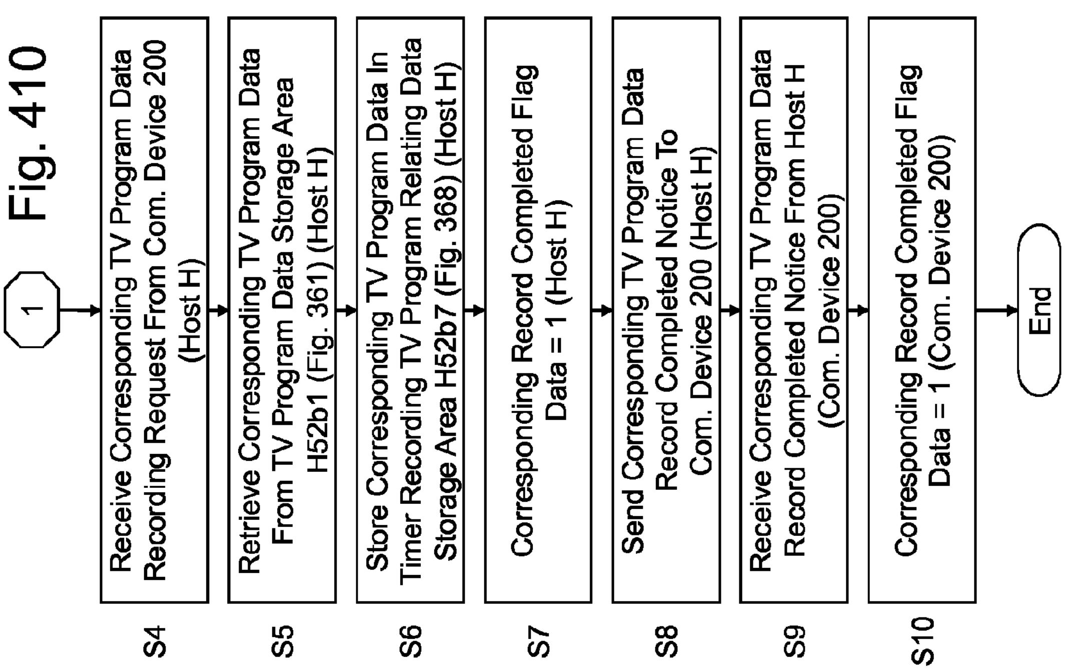

FIG. 410 is a flowchart illustrating an exemplary embodiment of the present invention.

Figure 411:
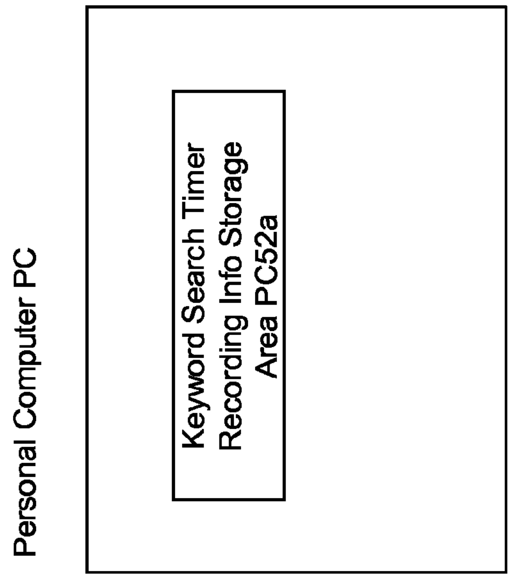

FIG. 411 is a block diagram illustrating an exemplary embodiment of the present invention.

Figure 412:
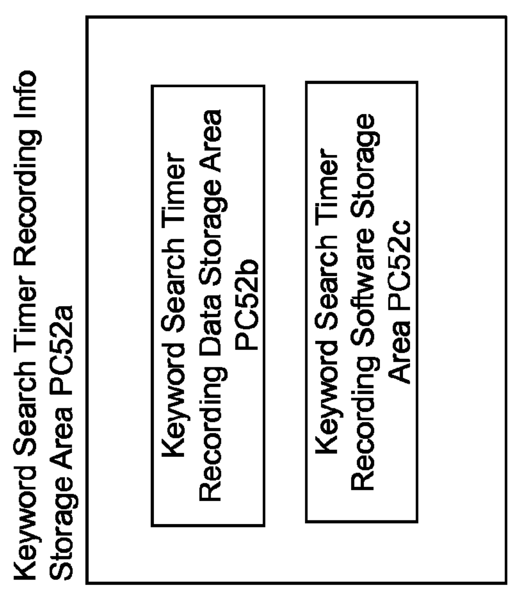

FIG. 412 is a block diagram illustrating an exemplary embodiment of the present invention.

Figures 413, 414:
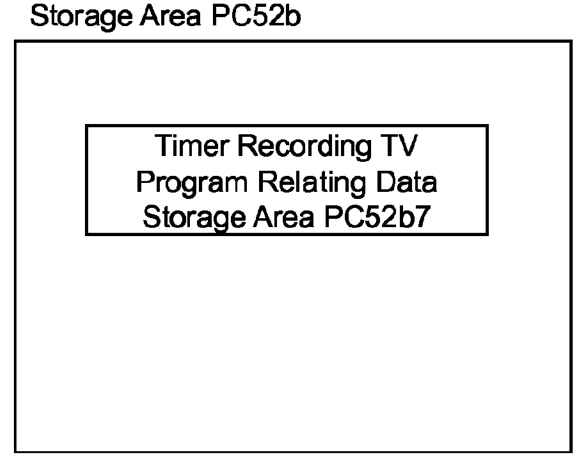

FIG. 413 is a block diagram illustrating an exemplary embodiment of the present invention.

FIG. 414 is a block diagram illustrating an exemplary embodiment of the present invention.

Figure 415:
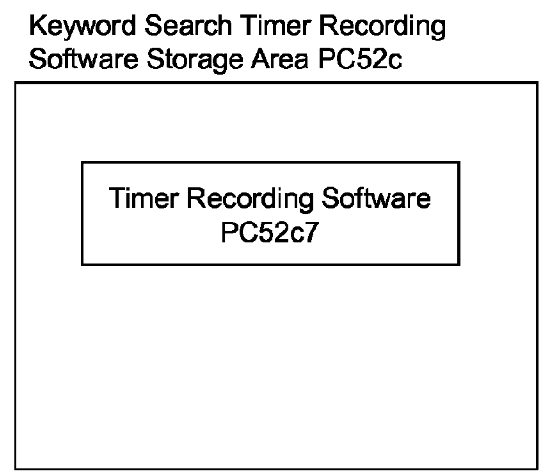

FIG. 415 is a block diagram illustrating an exemplary embodiment of the present invention.

Figure 416:
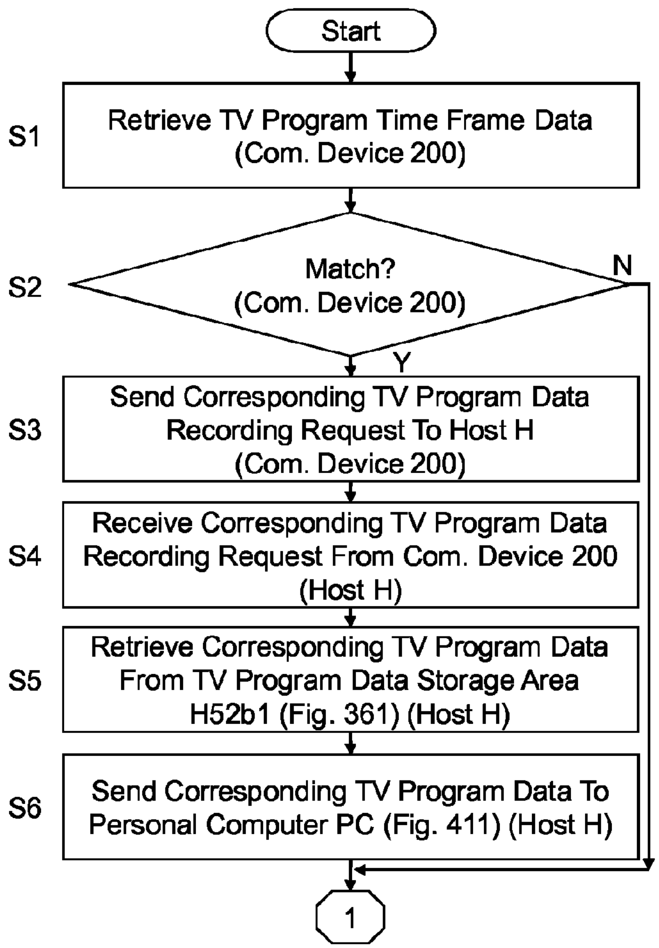

FIG. 416 is a flowchart illustrating an exemplary embodiment of the present invention.

Figure 417:
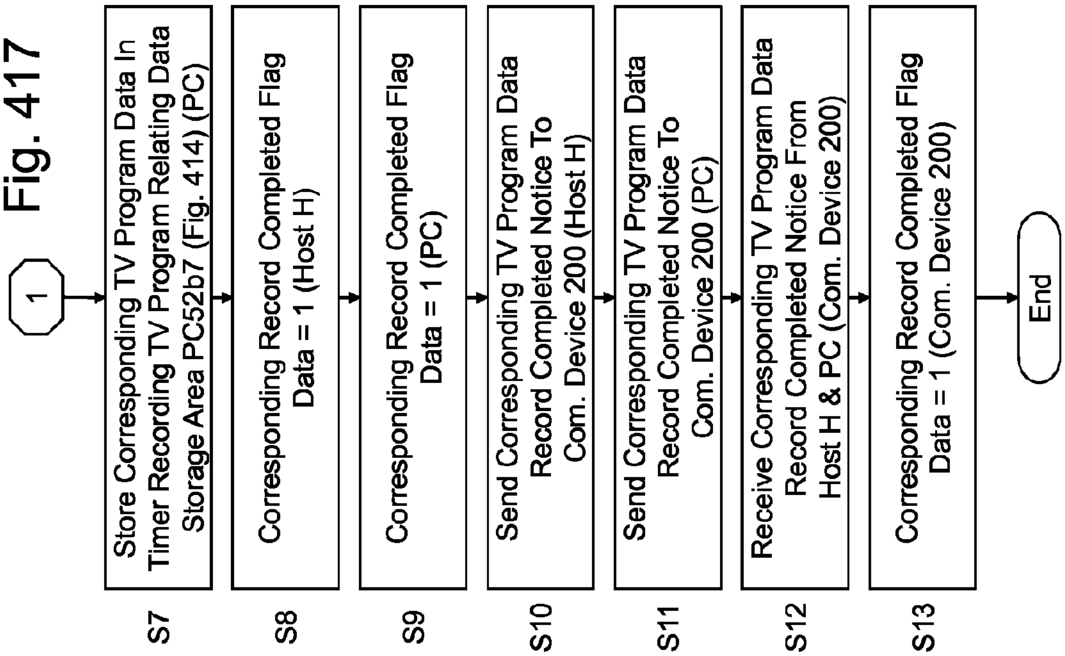

FIG. 417 is a flowchart illustrating an exemplary embodiment of the present invention.

Figure 418:
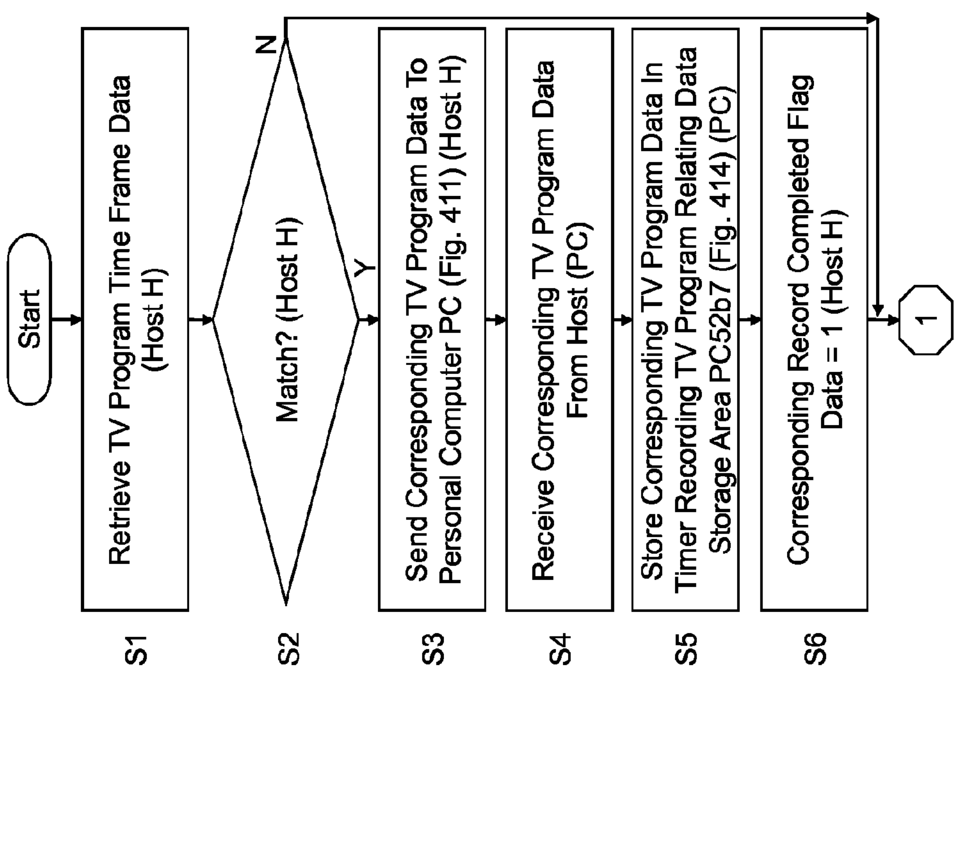

FIG. 418 is a flowchart illustrating an exemplary embodiment of the present invention.

Figure 419:
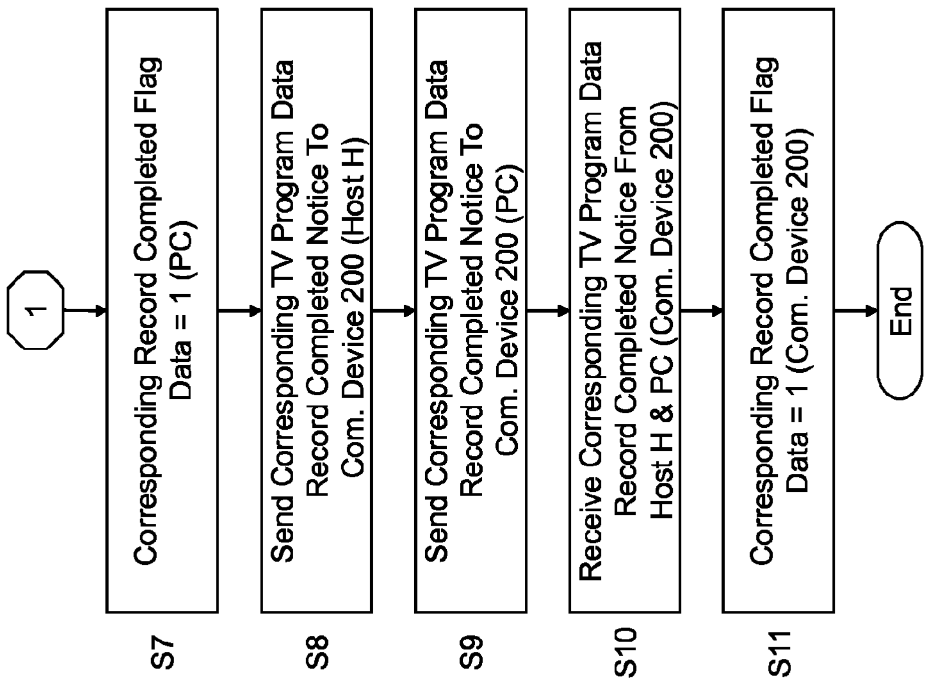

FIG. 419 is a flowchart illustrating an exemplary embodiment of the present invention.

Figure 420:
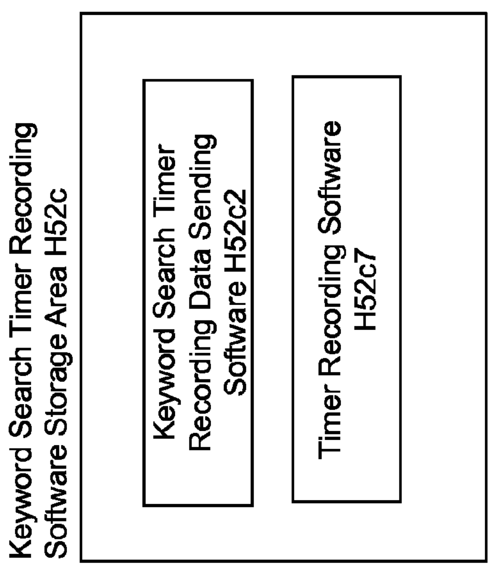

FIG. 420 is a block diagram illustrating an exemplary embodiment of the present invention.

Figure 421:
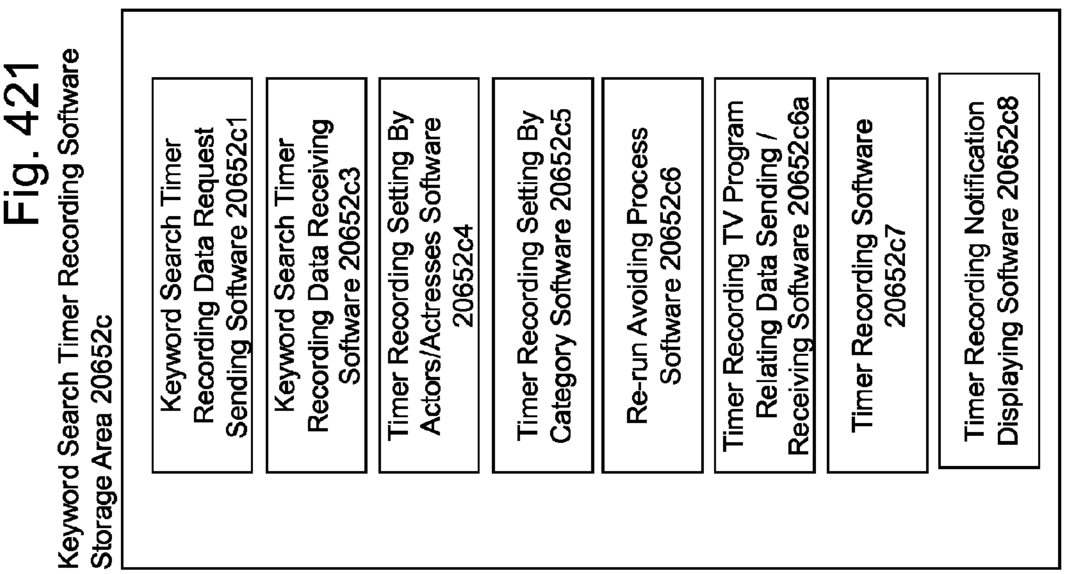

FIG. 421 is a block diagram illustrating an exemplary embodiment of the present invention.

Figure 422:
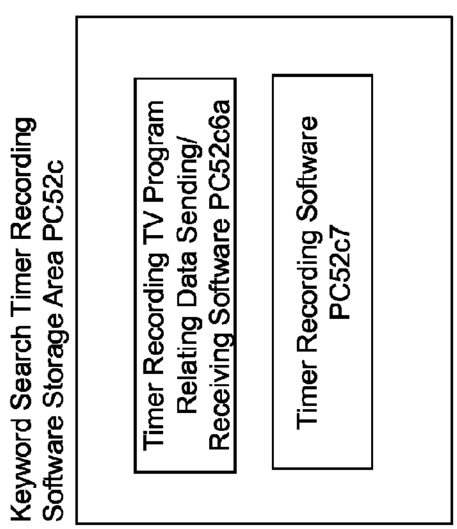

FIG. 422 is a block diagram illustrating an exemplary embodiment of the present invention.

Figure 423:
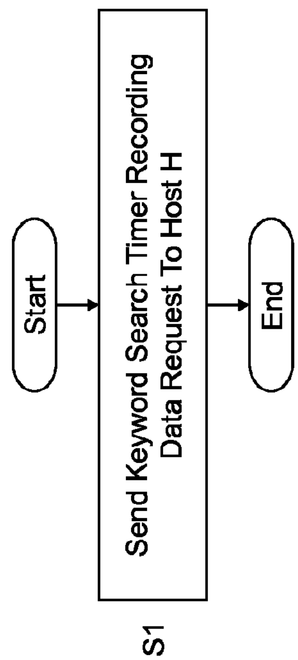

FIG. 423 is a flowchart illustrating an exemplary embodiment of the present invention.

Figure 424:
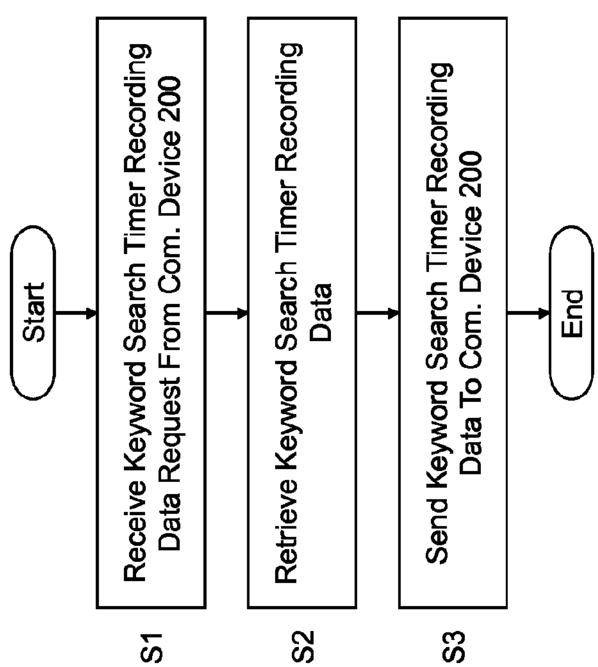

FIG. 424 is a flowchart illustrating an exemplary embodiment of the present invention.

Figure 425:
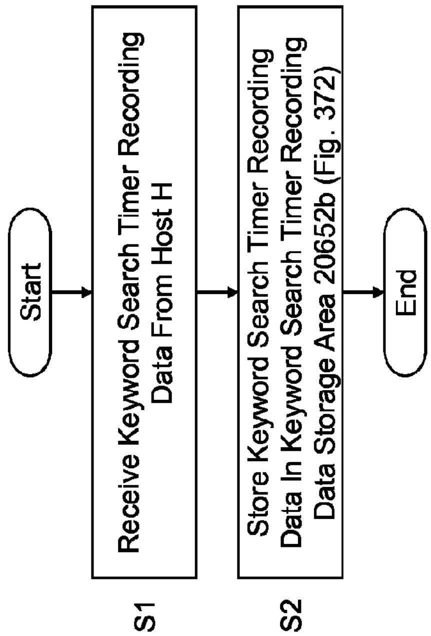

FIG. 425 is a flowchart illustrating an exemplary embodiment of the present invention.

Figure 426:
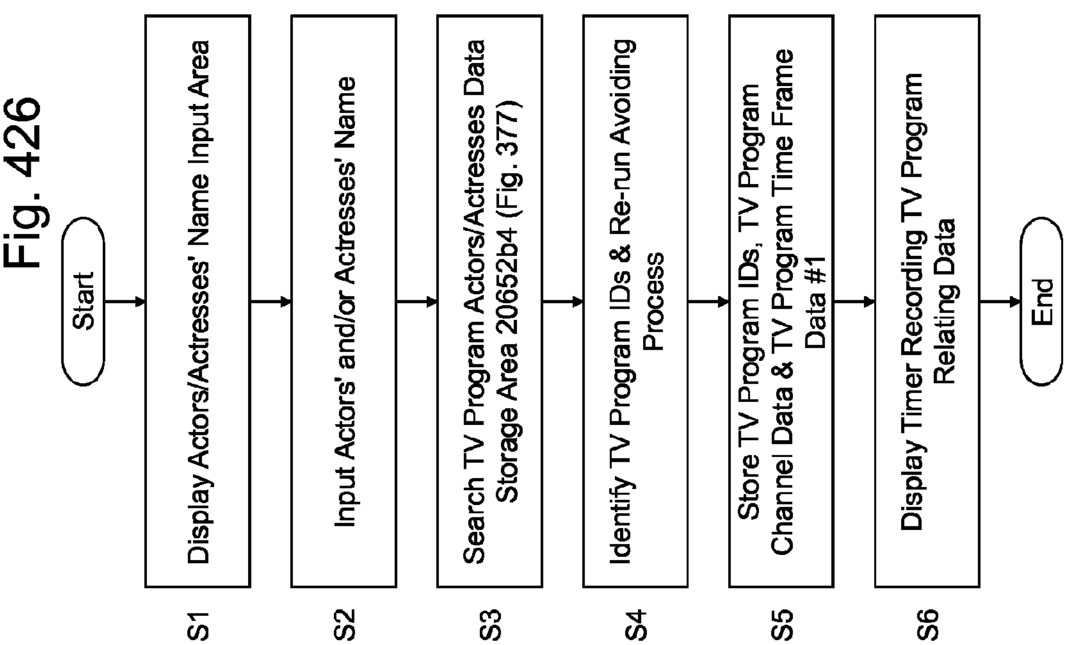

FIG. 426 is a flowchart illustrating an exemplary embodiment of the present invention.

Figure 427:
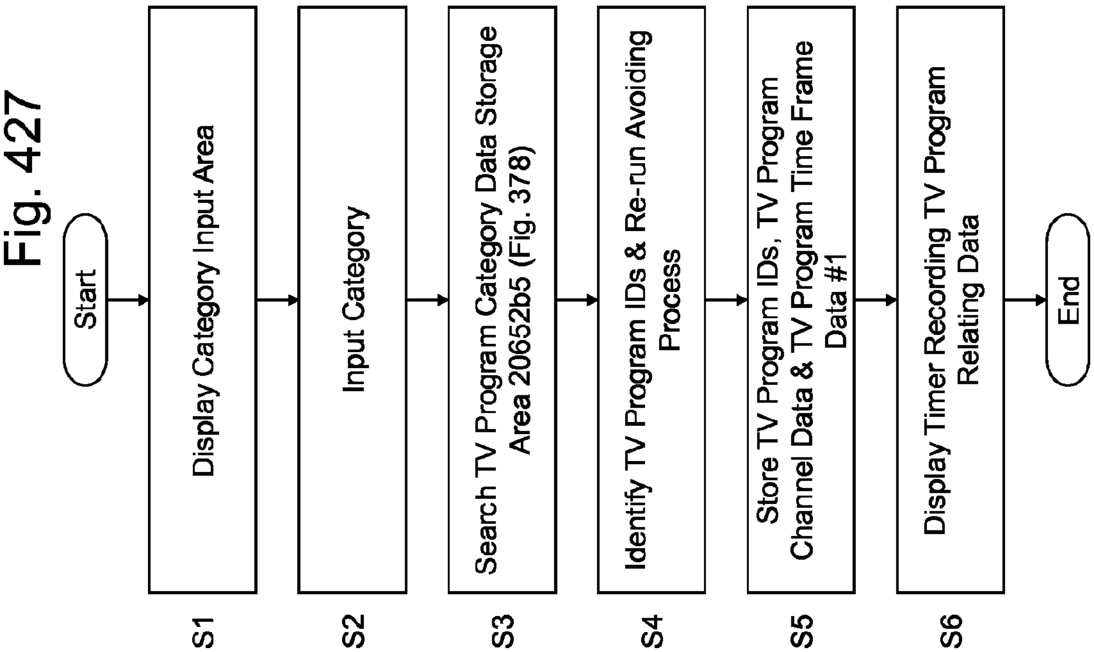

FIG. 427 is a flowchart illustrating an exemplary embodiment of the present invention.

Figure 428:
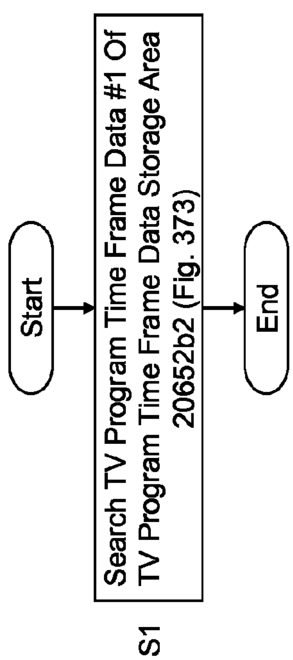

FIG. 428 is a flowchart illustrating an exemplary embodiment of the present invention.

Figure 429:
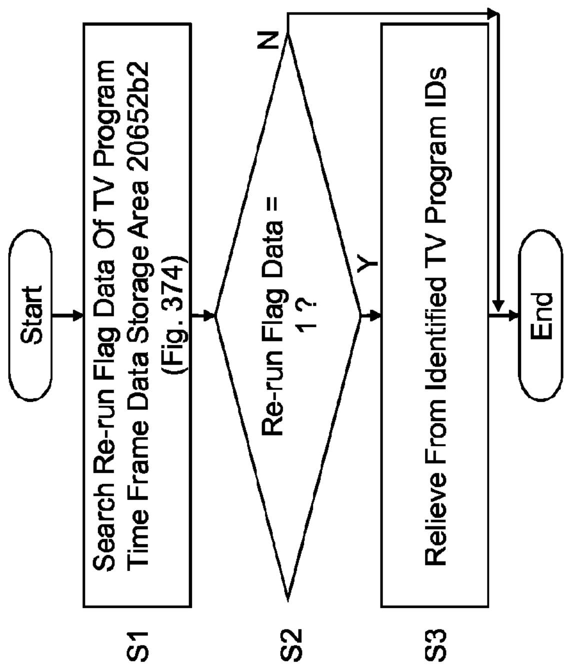

FIG. 429 is a flowchart illustrating an exemplary embodiment of the present invention.

Figure 430:
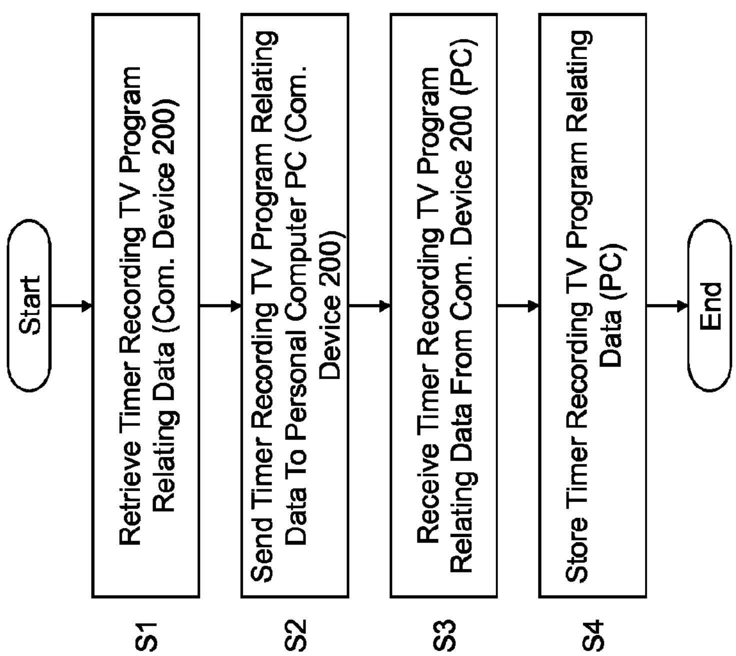

FIG. 430 is a flowchart illustrating an exemplary embodiment of the present invention.

Figure 431:
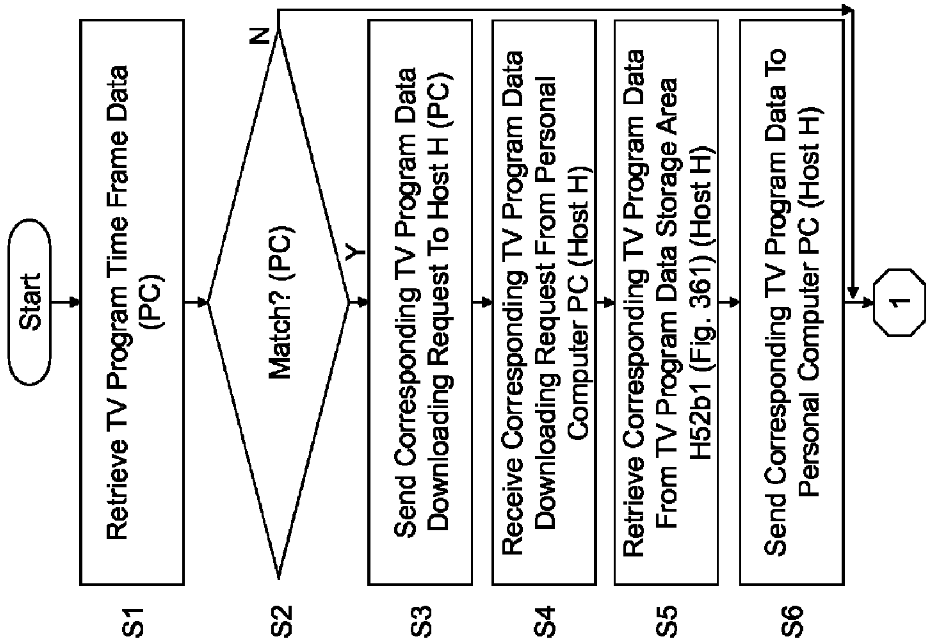

FIG. 431 is a flowchart illustrating an exemplary embodiment of the present invention.

Figure 432:
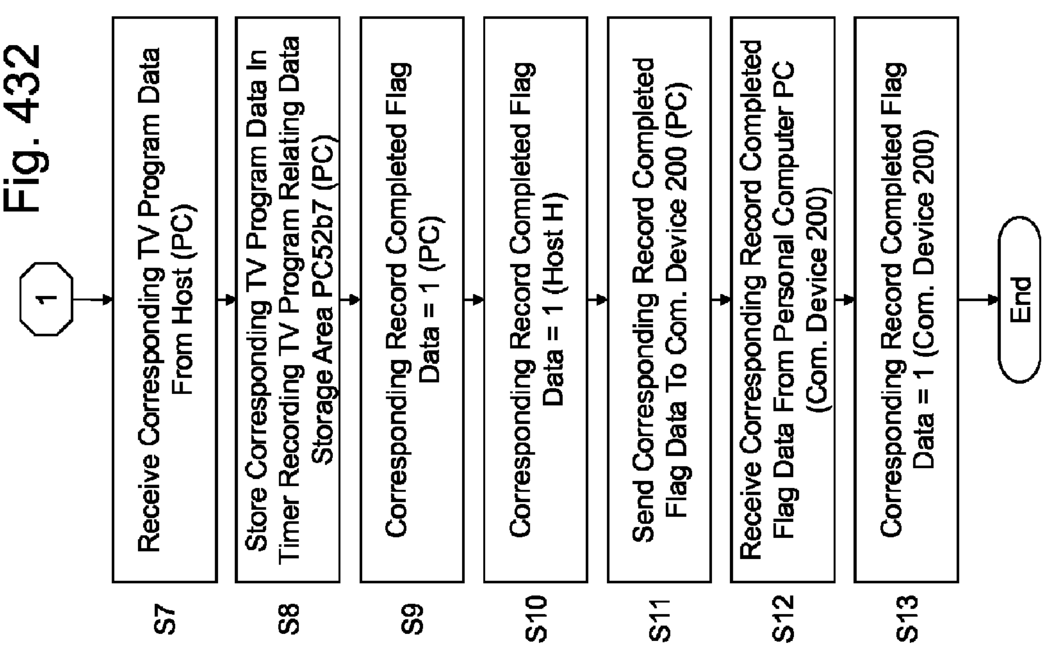

FIG. 432 is a flowchart illustrating an exemplary embodiment of the present invention.

Figure 433:
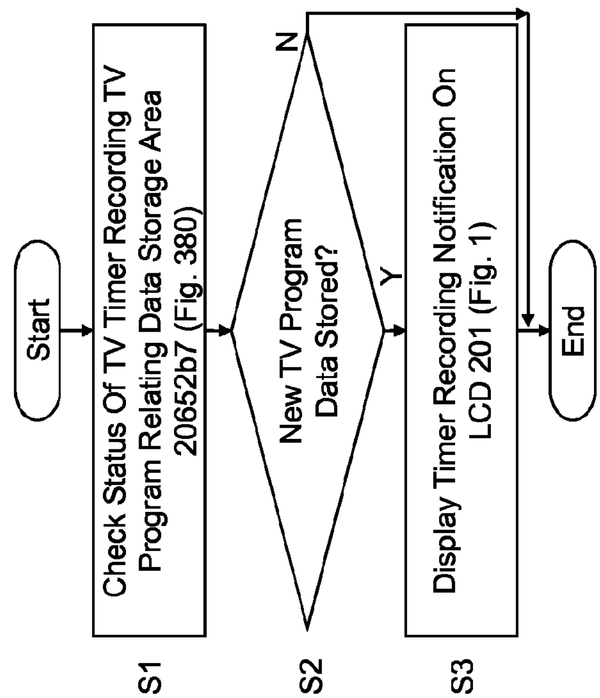

FIG. 433 is a flowchart illustrating an exemplary embodiment of the present invention.

Figure 434:
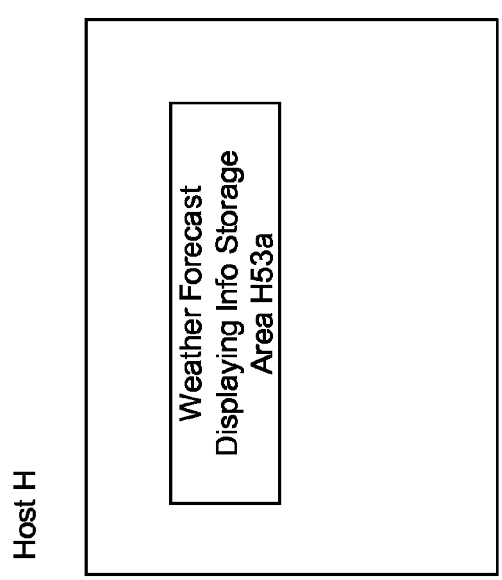

FIG. 434 is a block diagram illustrating an exemplary embodiment of the present invention.

Figure 435:
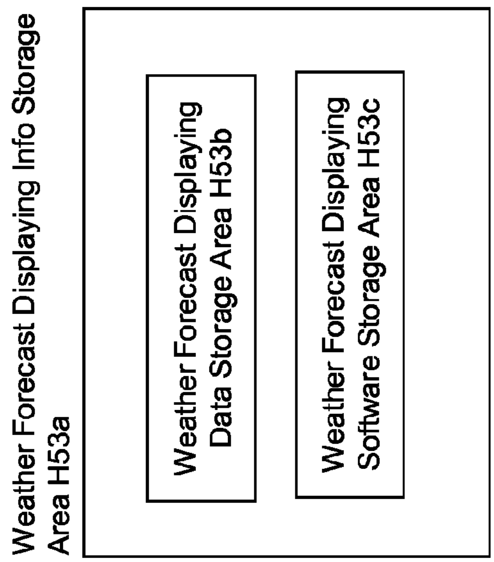

FIG. 435 is a block diagram illustrating an exemplary embodiment of the present invention.

Figure 436:
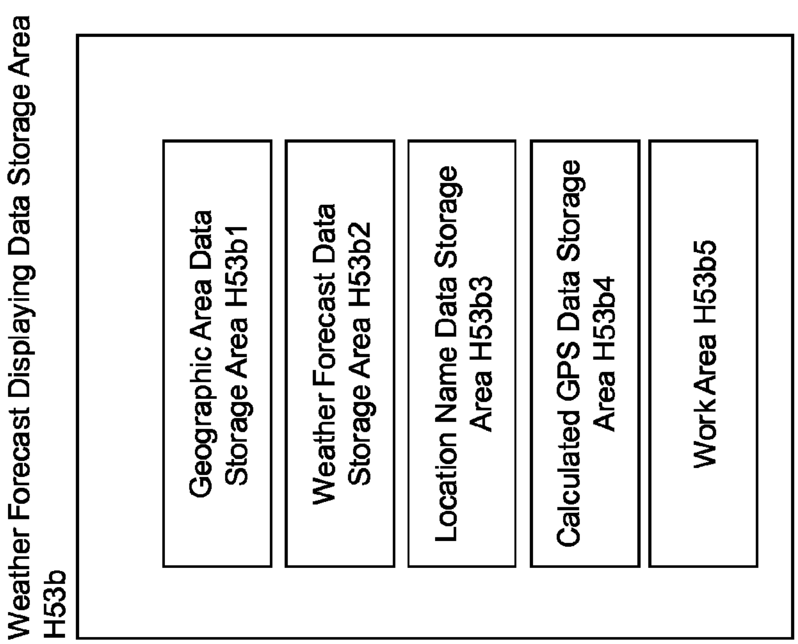

FIG. 436 is a block diagram illustrating an exemplary embodiment of the present invention.

FIG. 437 is a block diagram illustrating an exemplary embodiment of the present invention.

FIG. 438 is a block diagram illustrating an exemplary embodiment of the present invention.

FIG. 439 is a block diagram illustrating an exemplary embodiment of the present invention.

FIG. 440 is a block diagram illustrating an exemplary embodiment of the present invention.

Figure 441:
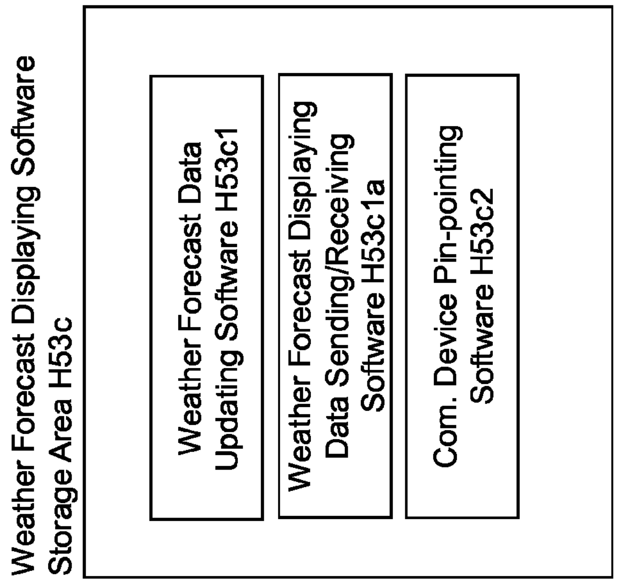

FIG. 441 is a block diagram illustrating an exemplary embodiment of the present invention.

Figure 442:
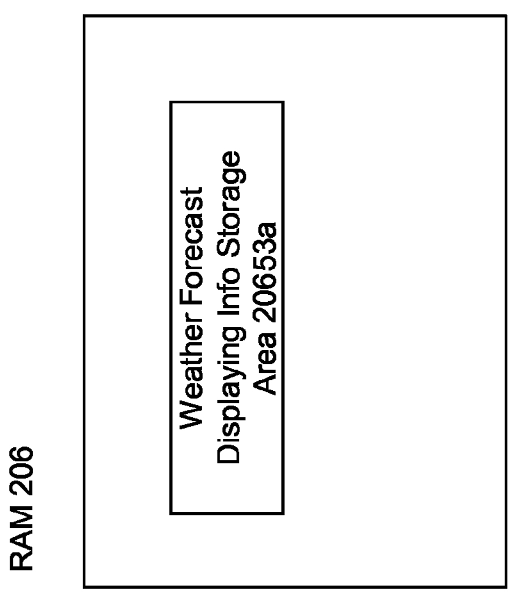

FIG. 442 is a block diagram illustrating an exemplary embodiment of the present invention.

Figure 443:
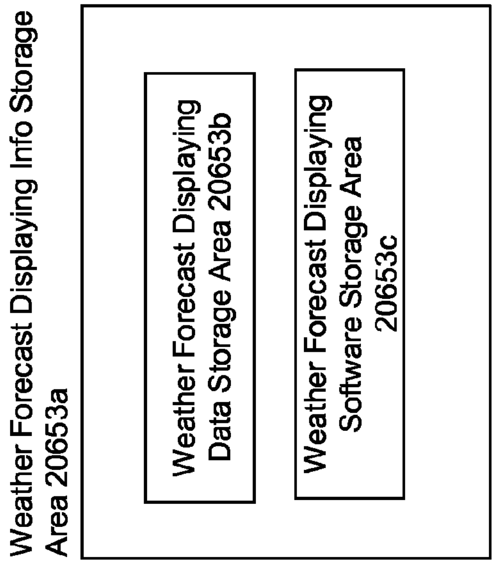

FIG. 443 is a block diagram illustrating an exemplary embodiment of the present invention.

Figure 444:
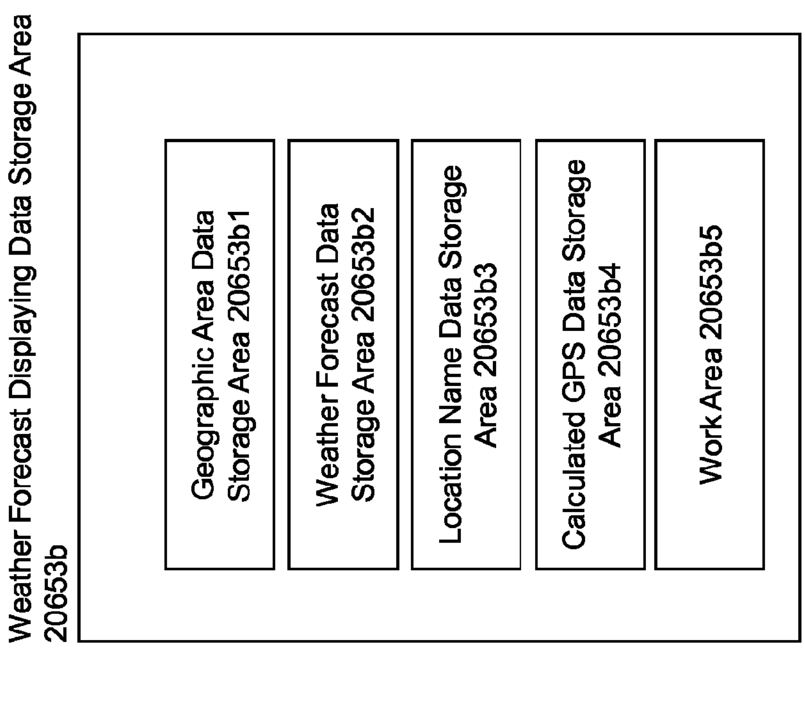

FIG. 444 is a block diagram illustrating an exemplary embodiment of the present invention.

FIG. 445 is a block diagram illustrating an exemplary embodiment of the present invention.

FIG. 446 is a block diagram illustrating an exemplary embodiment of the present invention.

FIG. 447 is a block diagram illustrating an exemplary embodiment of the present invention.

FIG. 448 is a block diagram illustrating an exemplary embodiment of the present invention.

Figure 449:
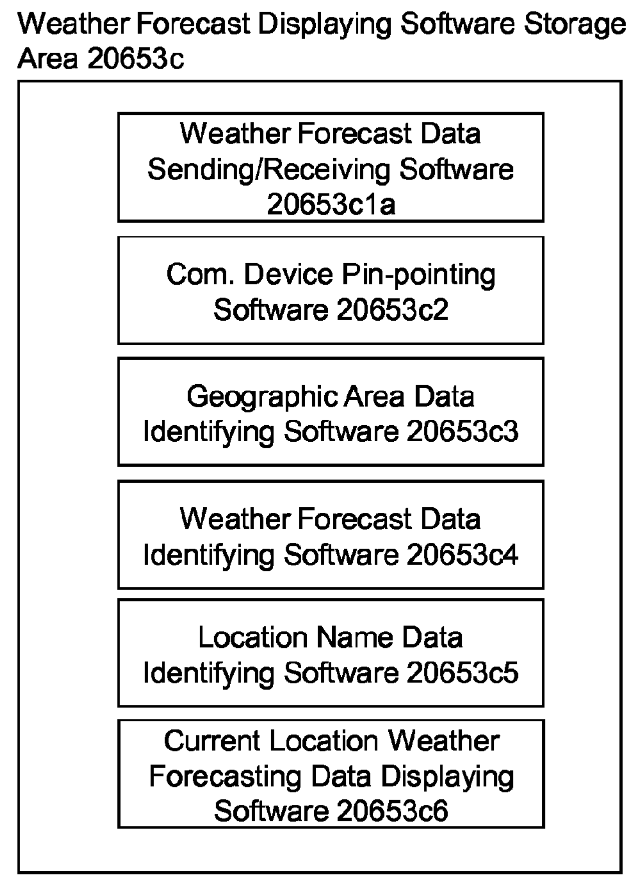

FIG. 449 is a block diagram illustrating an exemplary embodiment of the present invention.

Figure 450:
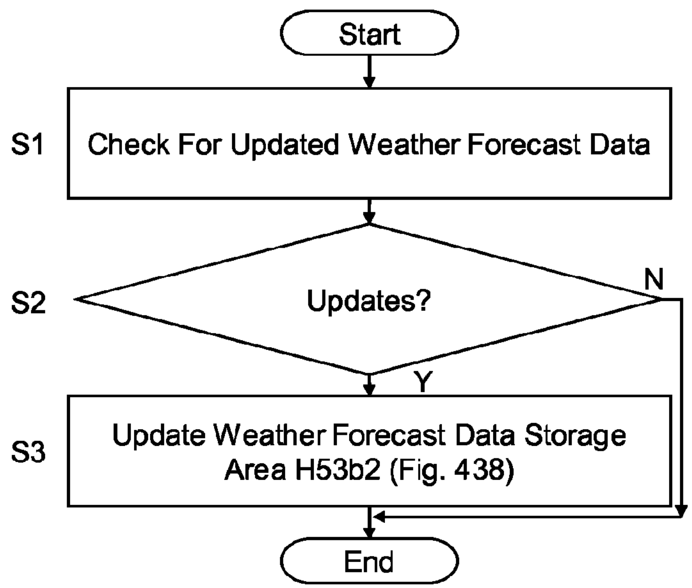

FIG. 450 is a flowchart illustrating an exemplary embodiment of the present invention.

Figure 451:
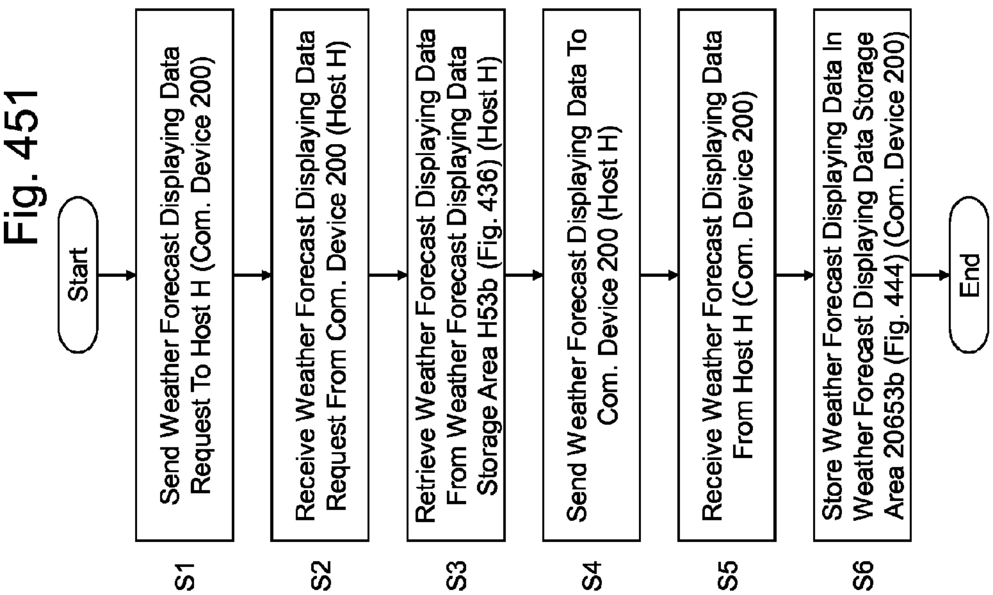

FIG. 451 is a flowchart illustrating an exemplary embodiment of the present invention.

Figure 452:
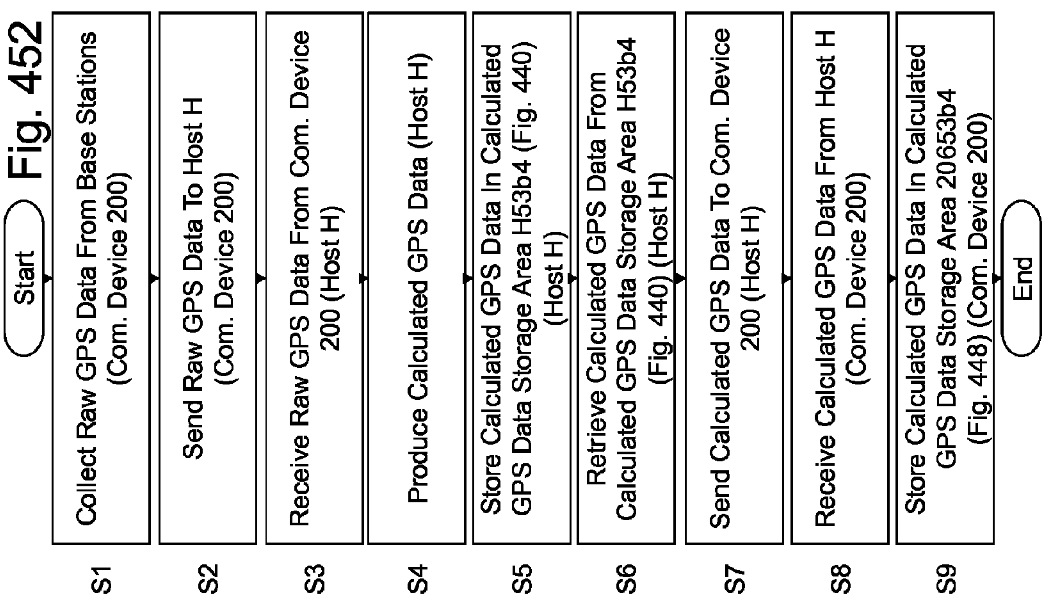

FIG. 452 is a flowchart illustrating an exemplary embodiment of the present invention.

Figure 453:
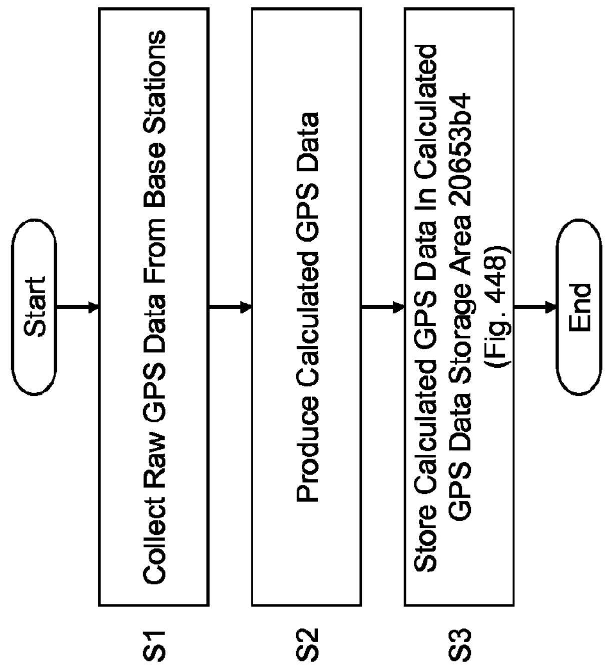

FIG. 453 is a flowchart illustrating an exemplary embodiment of the present invention.

Figure 454:
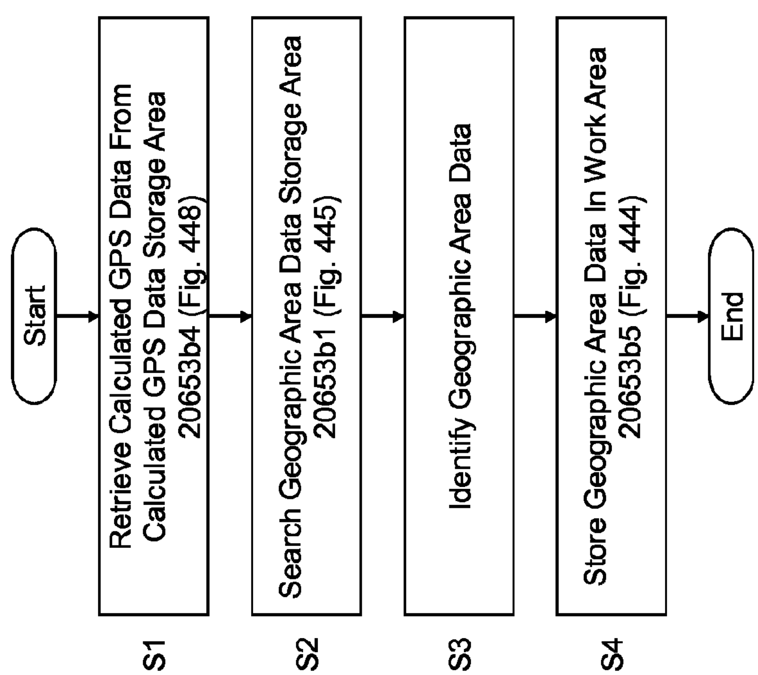

FIG. 454 is a flowchart illustrating an exemplary embodiment of the present invention.

Figure 455:
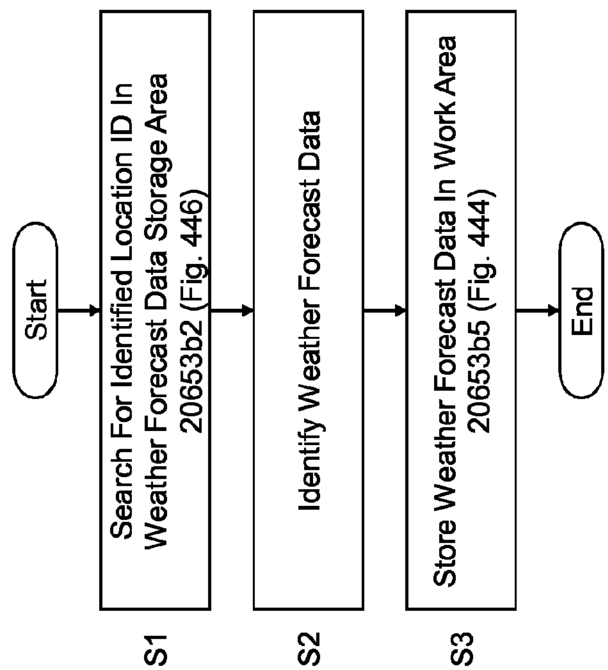

FIG. 455 is a flowchart illustrating an exemplary embodiment of the present invention.

Figure 456:
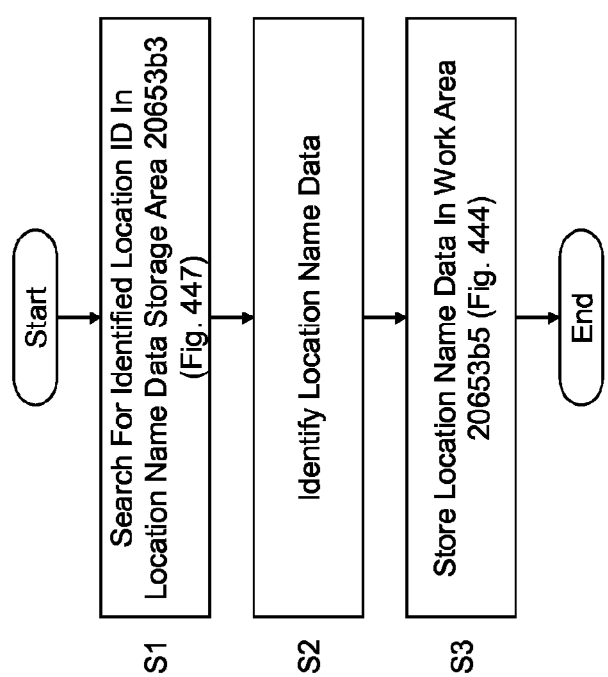

FIG. 456 is a flowchart illustrating an exemplary embodiment of the present invention.

Figure 457:
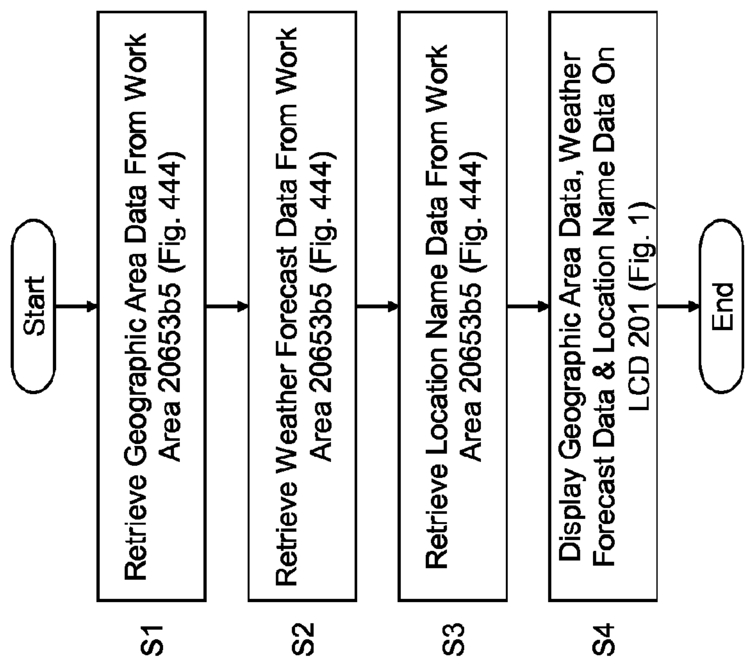

FIG. 457 is a flowchart illustrating an exemplary embodiment of the present invention.

Figure 458:
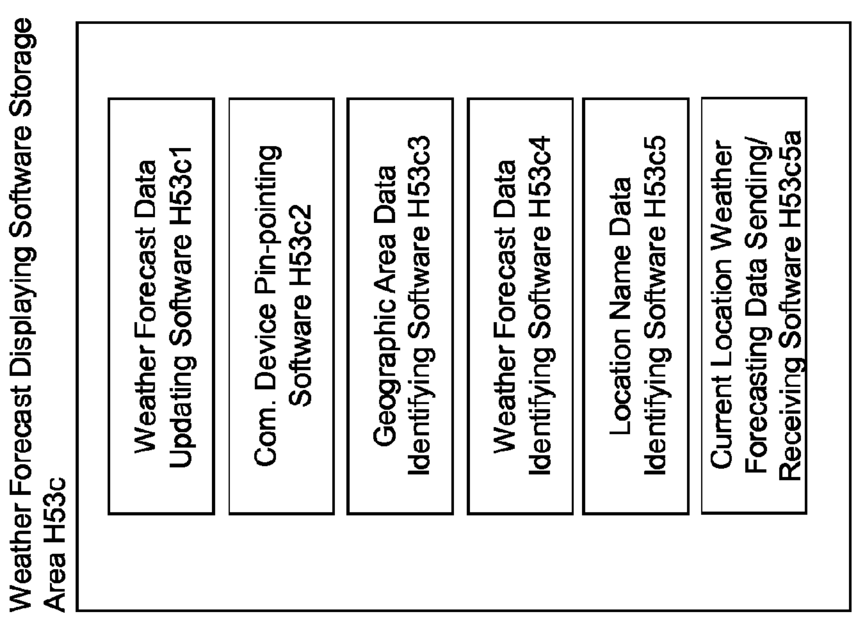

FIG. 458 is a block diagram illustrating an exemplary embodiment of the present invention.

Figure 459:
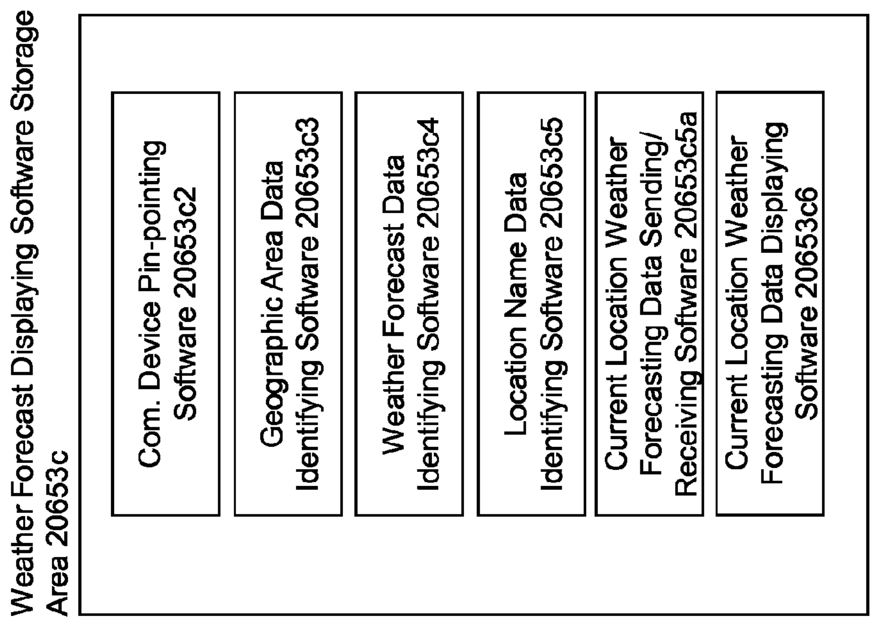

FIG. 459 is a block diagram illustrating an exemplary embodiment of the present invention.

Figure 460:
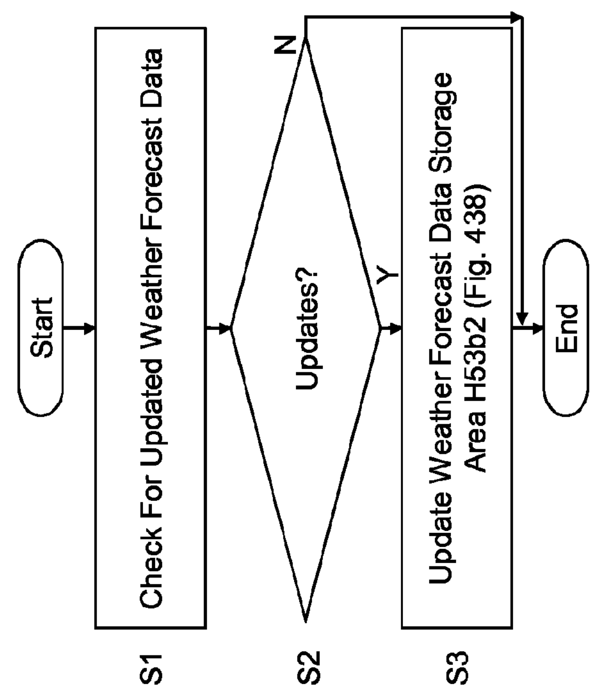

FIG. 460 is a flowchart illustrating an exemplary embodiment of the present invention.

Figure 461:
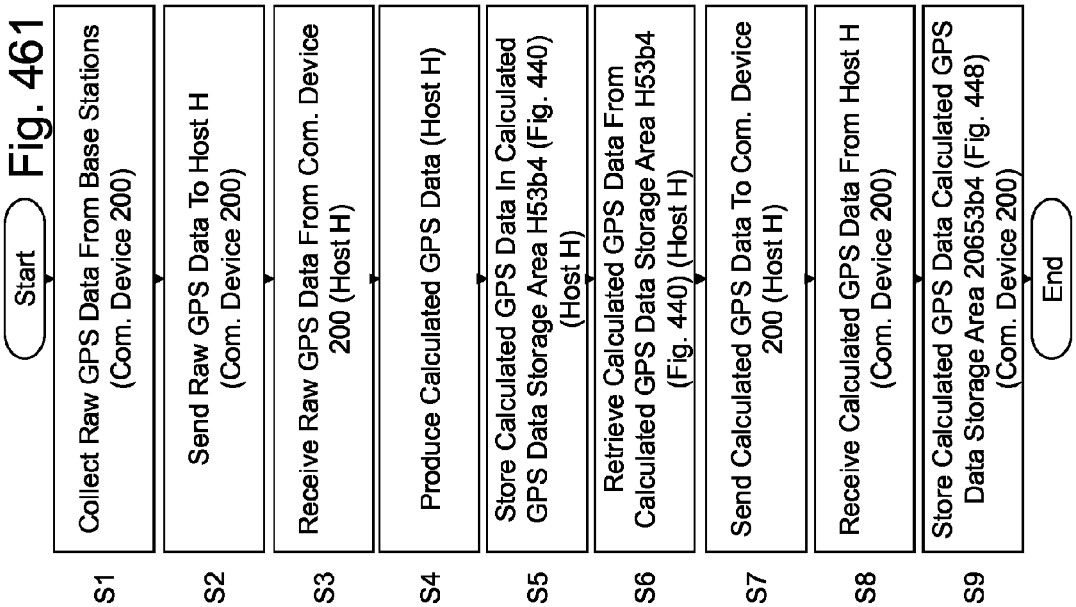

FIG. 461 is a flowchart illustrating an exemplary embodiment of the present invention.

Figure 462:
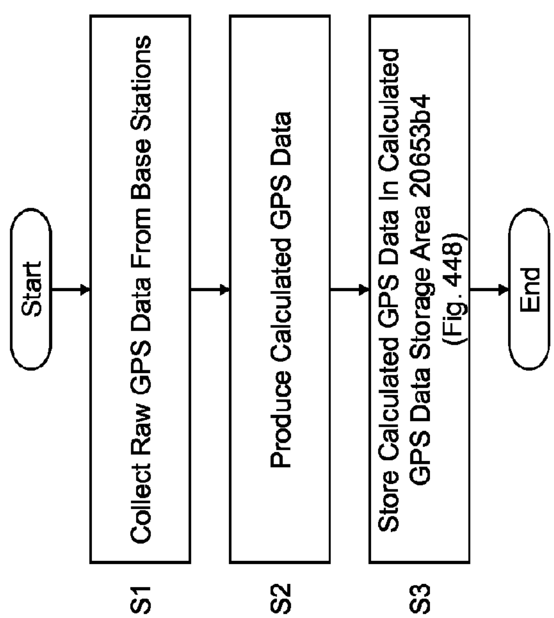

FIG. 462 is a flowchart illustrating an exemplary embodiment of the present invention.

Figure 463:
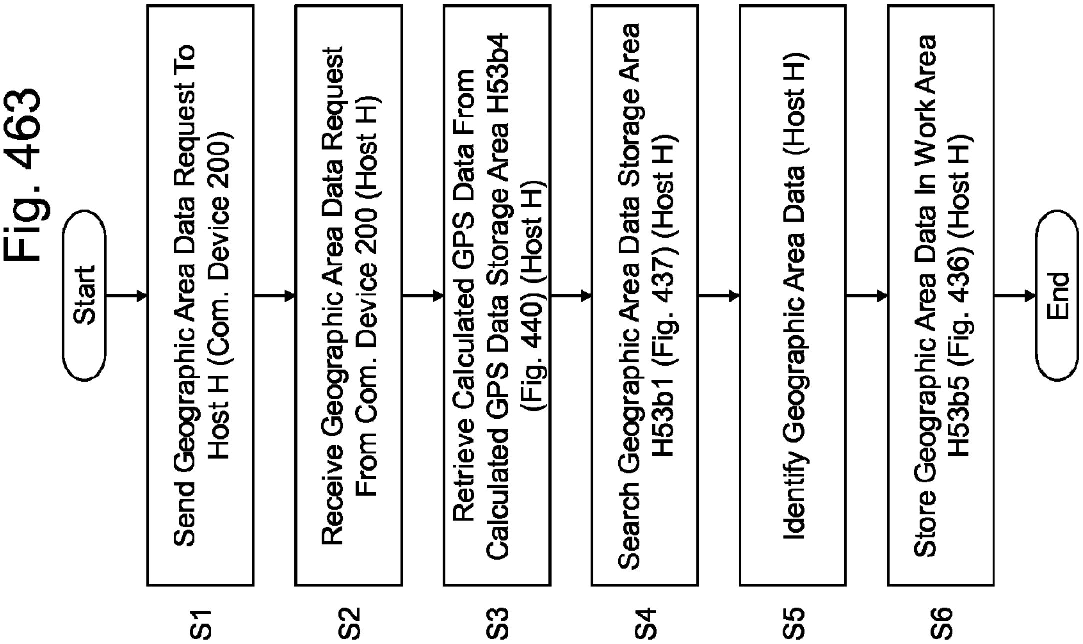

FIG. 463 is a flowchart illustrating an exemplary embodiment of the present invention.

Figure 464:
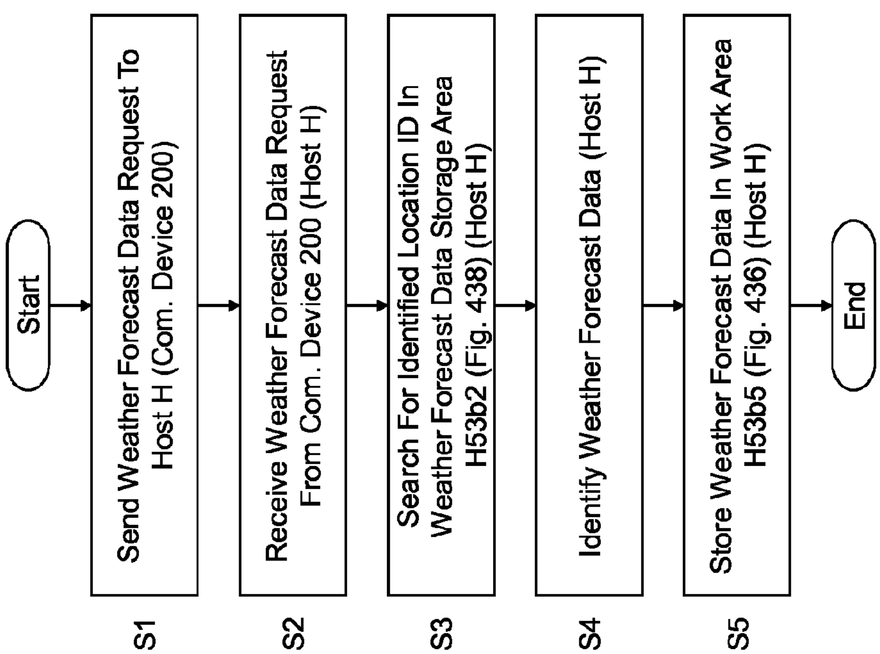

FIG. 464 is a flowchart illustrating an exemplary embodiment of the present invention.

Figure 465:
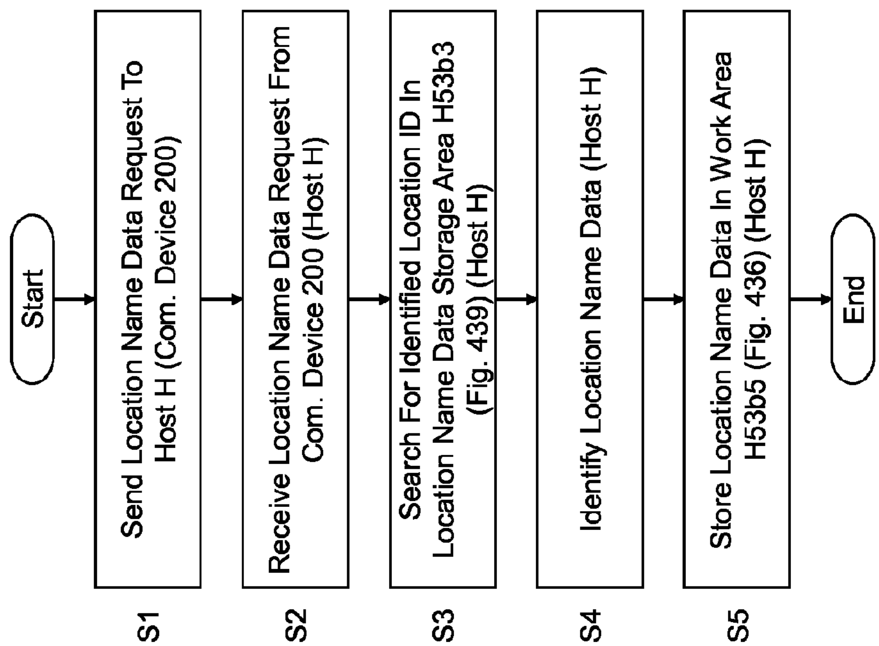

FIG. 465 is a flowchart illustrating an exemplary embodiment of the present invention.

Figure 466:
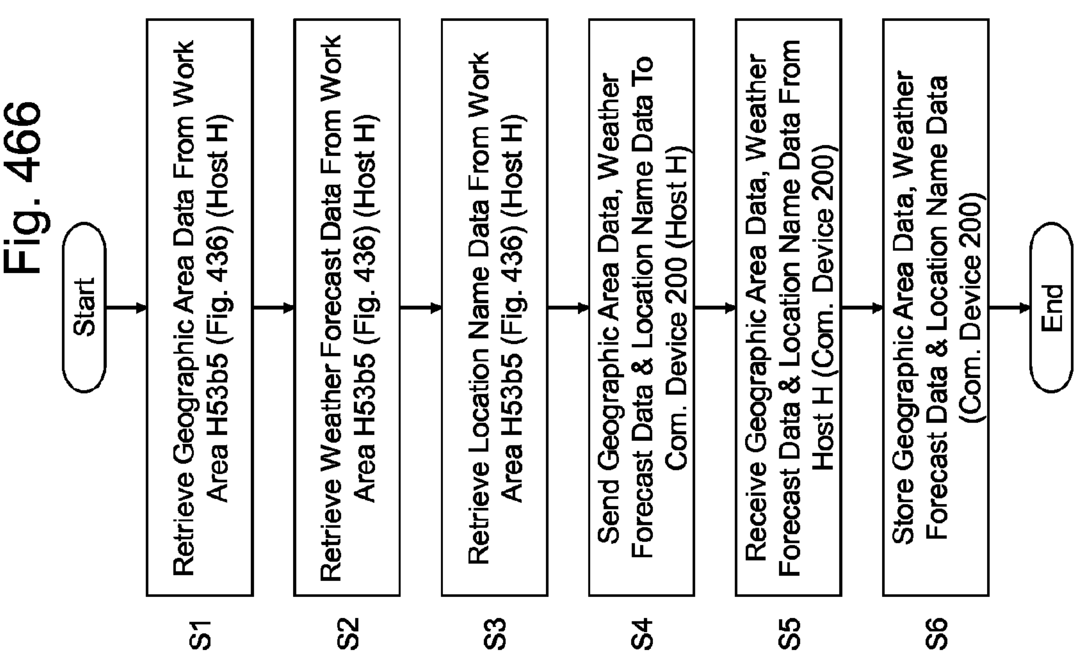

FIG. 466 is a flowchart illustrating an exemplary embodiment of the present invention.

Figure 467:
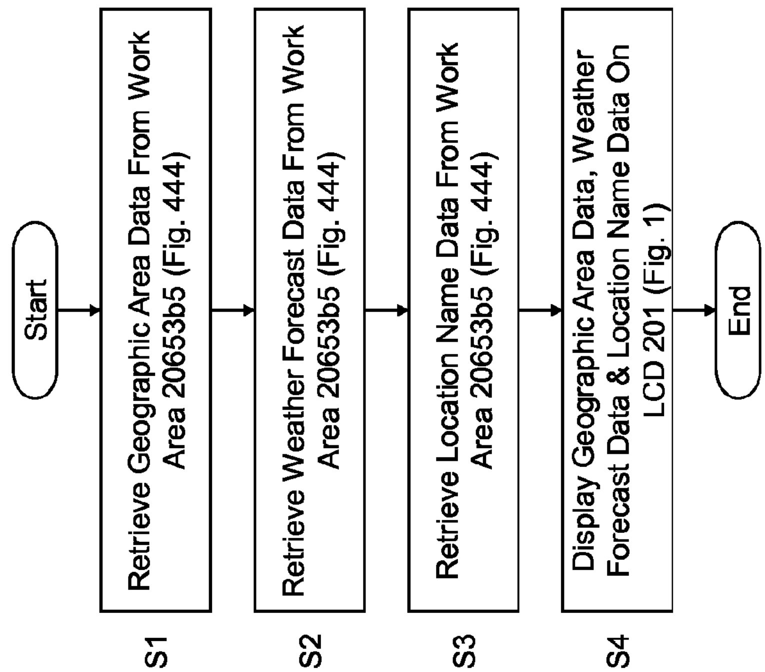

FIG. 467 is a flowchart illustrating an exemplary embodiment of the present invention.

Figure 468:
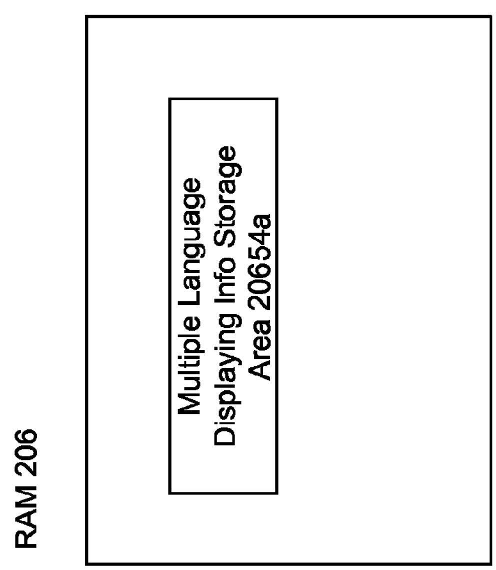

FIG. 468 is a block diagram illustrating an exemplary embodiment of the present invention.

Figure 469:
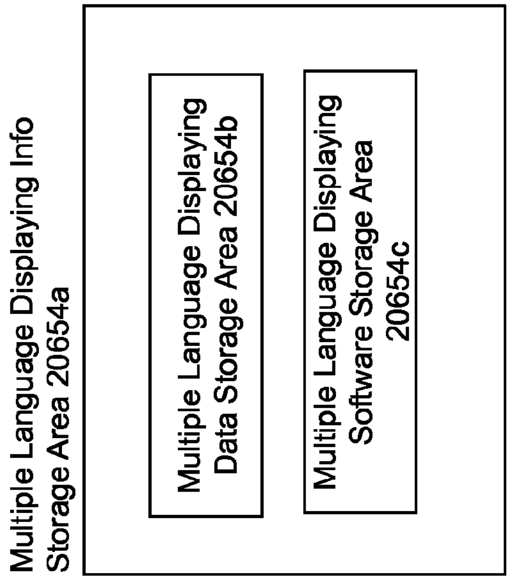

FIG. 469 is a block diagram illustrating an exemplary embodiment of the present invention.

Figure 470:
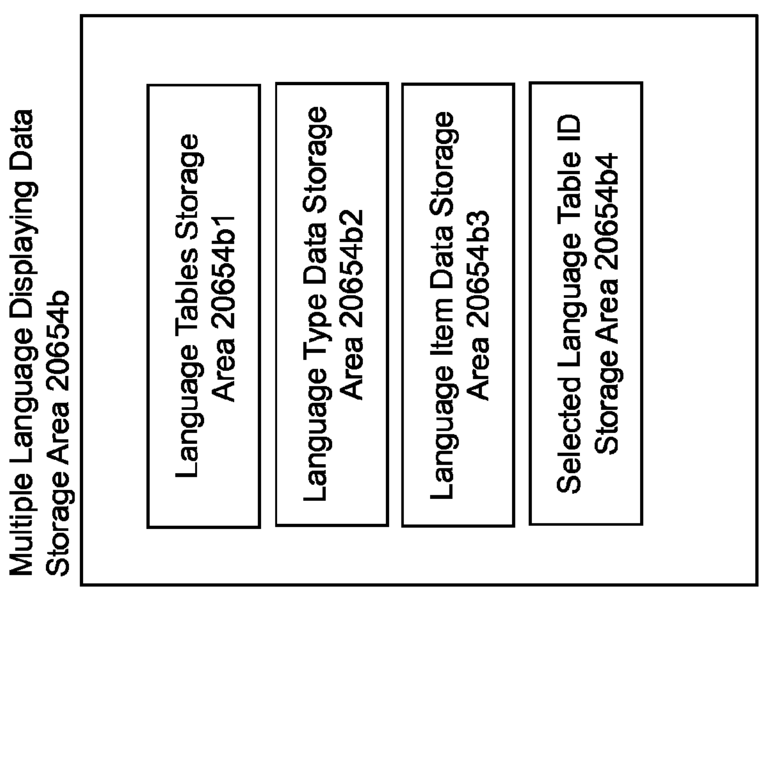

FIG. 470 is a block diagram illustrating an exemplary embodiment of the present invention.

FIG. 471 is a block diagram illustrating an exemplary embodiment of the present invention.

FIG. 472 is a block diagram illustrating an exemplary embodiment of the present invention.

FIG. 473 is a block diagram illustrating an exemplary embodiment of the present invention.

FIG. 474 is a block diagram illustrating an exemplary embodiment of the present invention.

FIG. 475 is a block diagram illustrating an exemplary embodiment of the present invention.

FIG. 476 is a block diagram illustrating an exemplary embodiment of the present invention.

FIG. 477 is a block diagram illustrating an exemplary embodiment of the present invention.

FIG. 478 is a block diagram illustrating an exemplary embodiment of the present invention.

Figure 479:
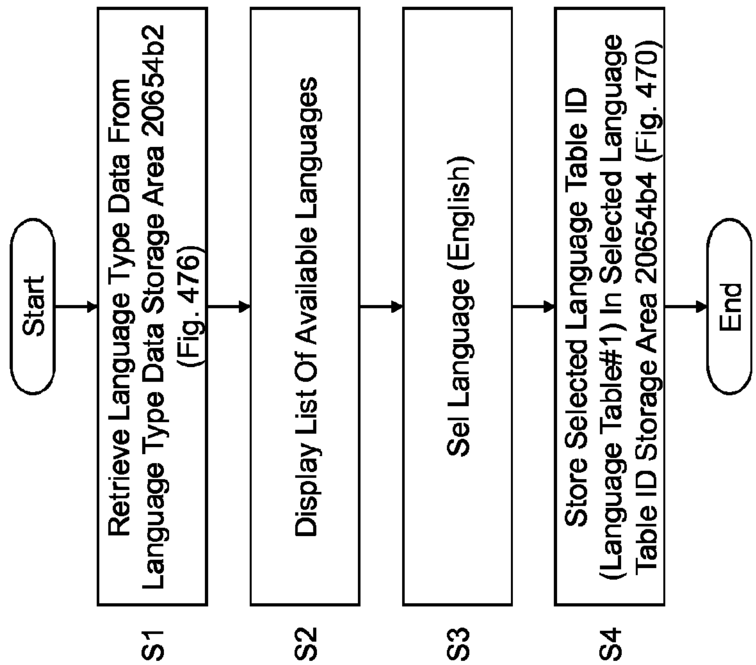

FIG. 479 is a flowchart illustrating an exemplary embodiment of the present invention.

Figure 480:
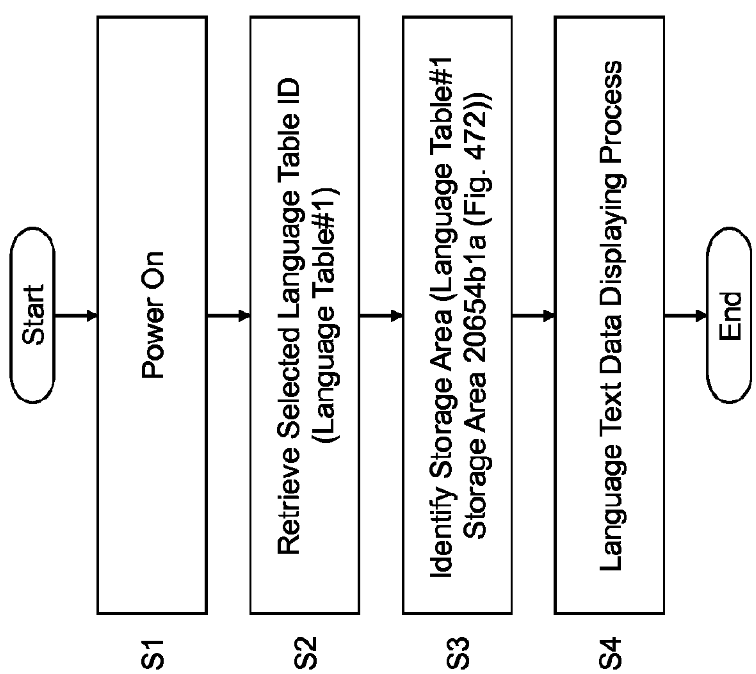

FIG. 480 is a flowchart illustrating an exemplary embodiment of the present invention.

Figure 481:
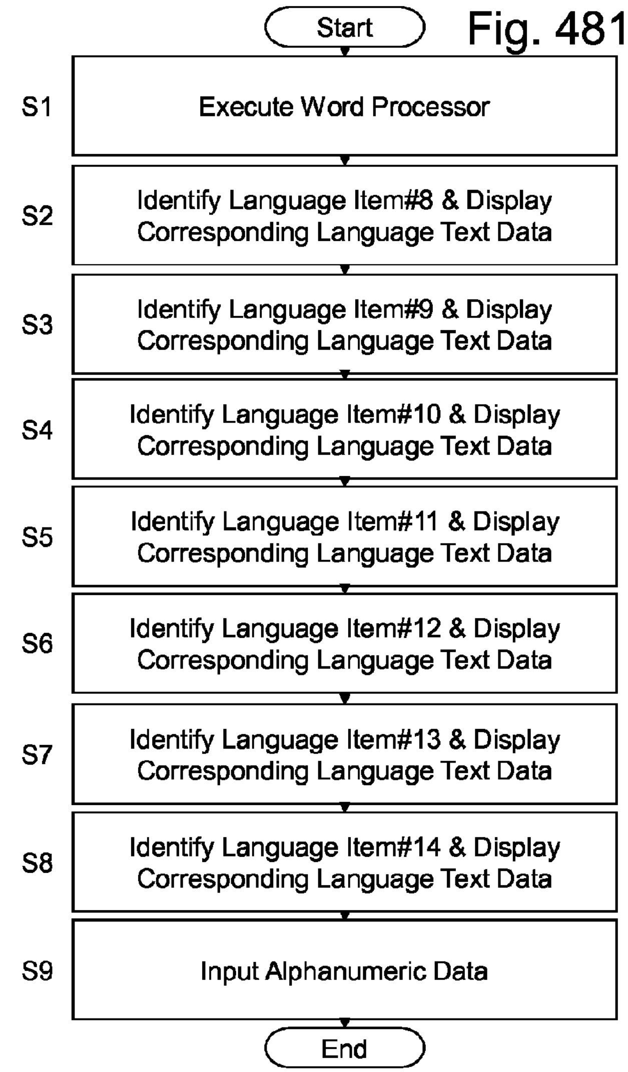

FIG. 481 is a flowchart illustrating an exemplary embodiment of the present invention.

Figure 482:
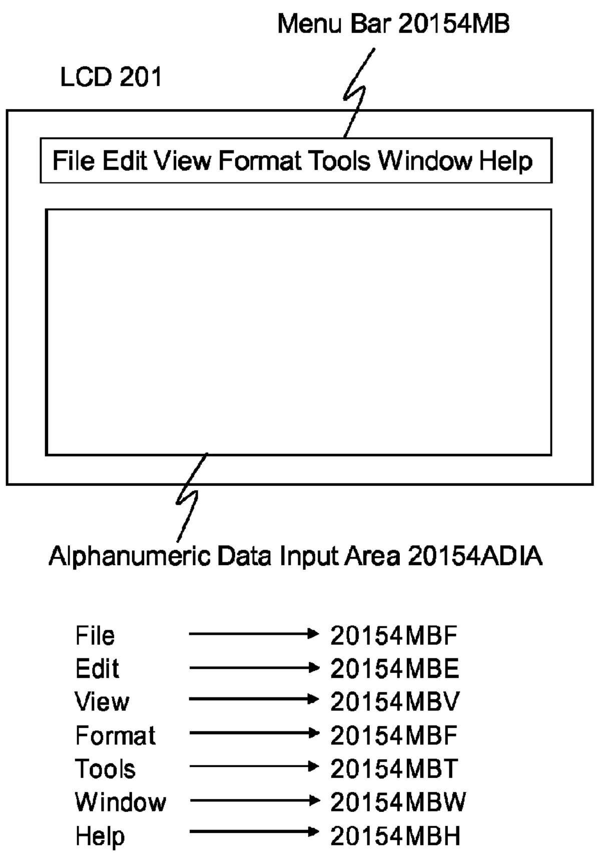

FIG. 482 is a simplified illustration illustrating an exemplary embodiment of the present invention.

Figure 483:
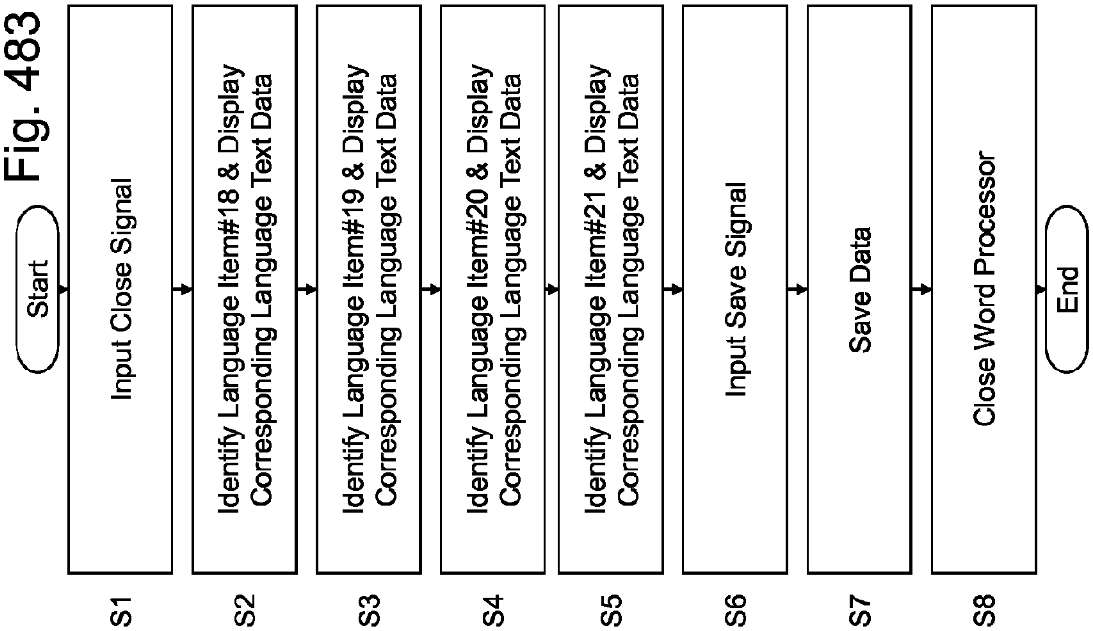

FIG. 483 is a flowchart illustrating an exemplary embodiment of the present invention.

Figure 484:
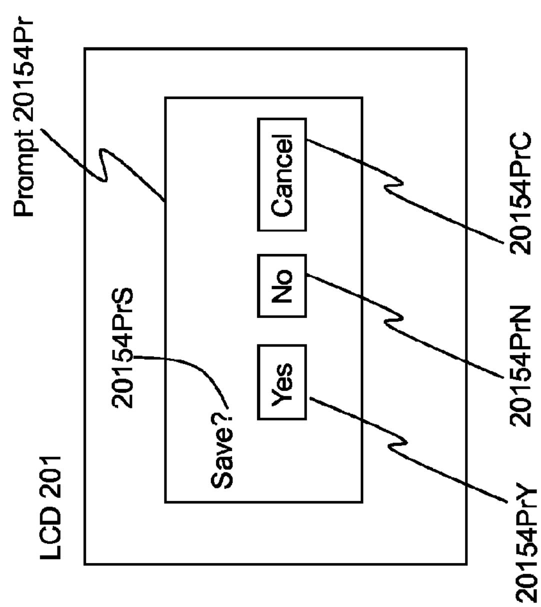

FIG. 484 is a simplified illustration illustrating an exemplary embodiment of the present invention.

Figure 485:
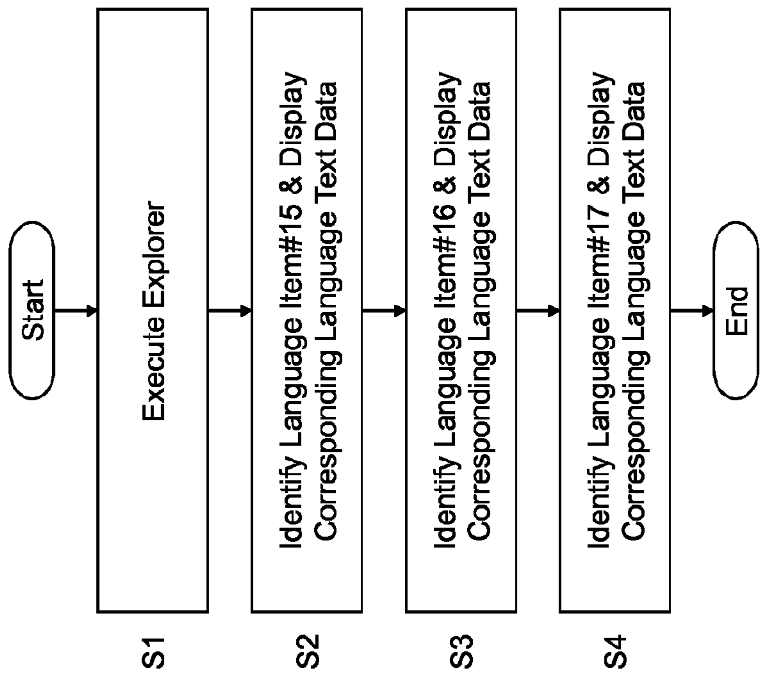

FIG. 485 is a flowchart illustrating an exemplary embodiment of the present invention.

Figure 486:
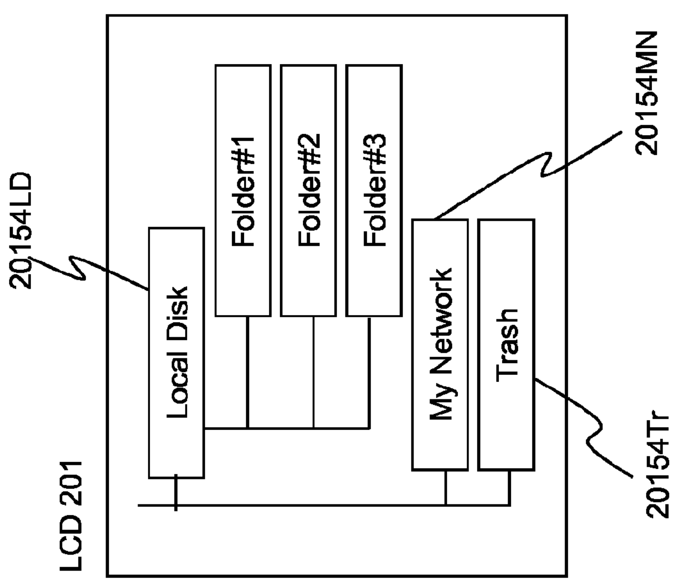

FIG. 486 is a simplified illustration illustrating an exemplary embodiment of the present invention.

Figure 487:
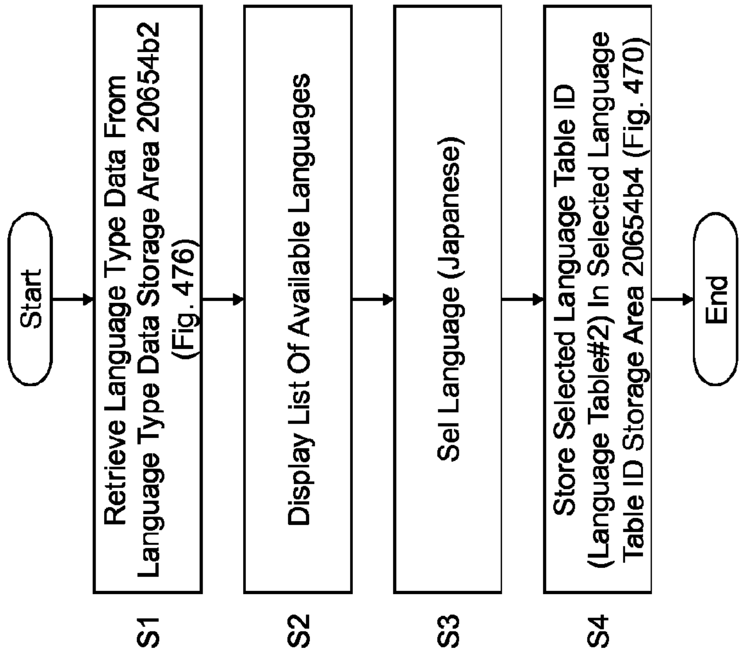

FIG. 487 is a flowchart illustrating an exemplary embodiment of the present invention.

Figure 488:
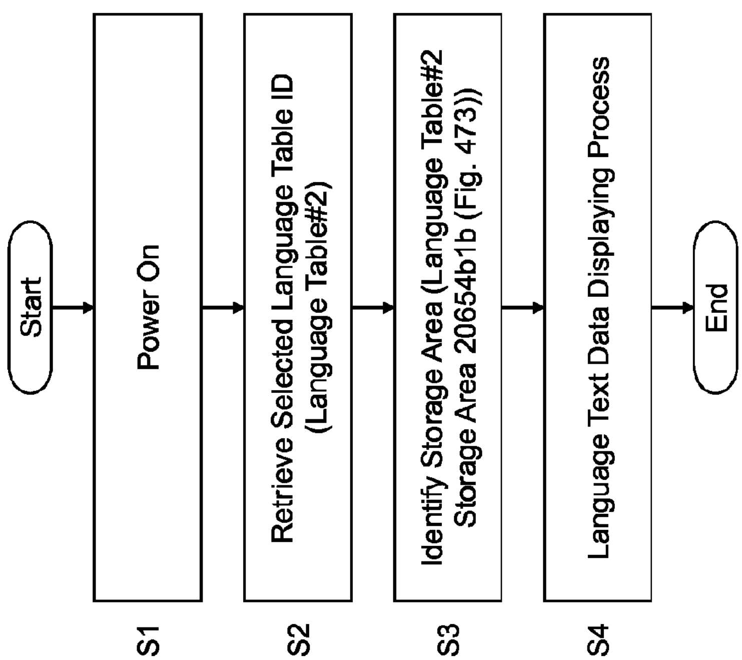

FIG. 488 is a flowchart illustrating an exemplary embodiment of the present invention.

Figure 489:
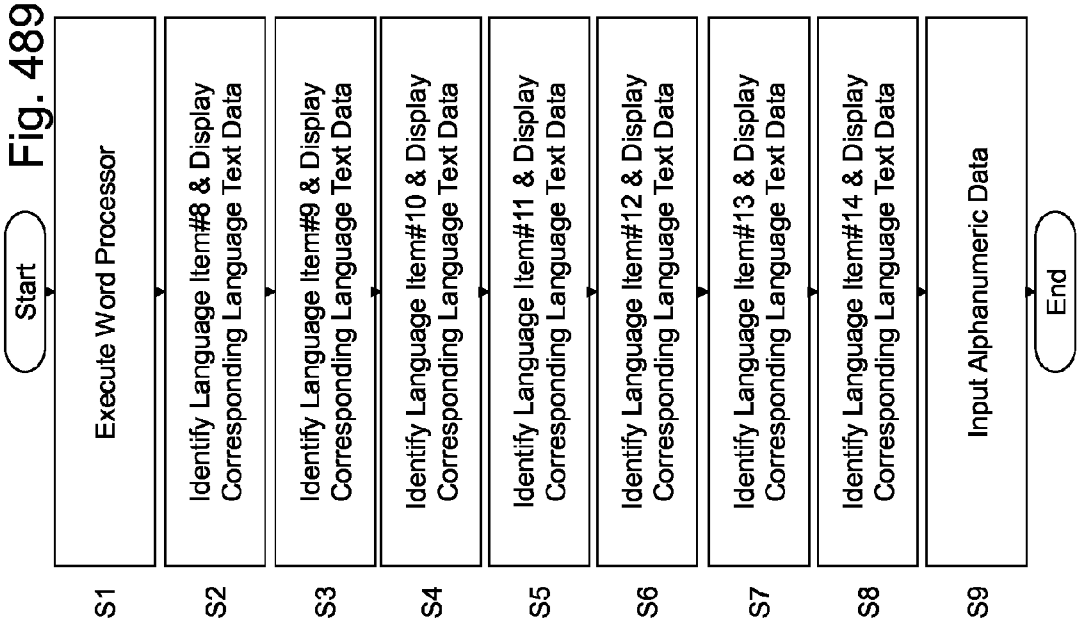

FIG. 489 is a flowchart illustrating an exemplary embodiment of the present invention.

Figure 490:
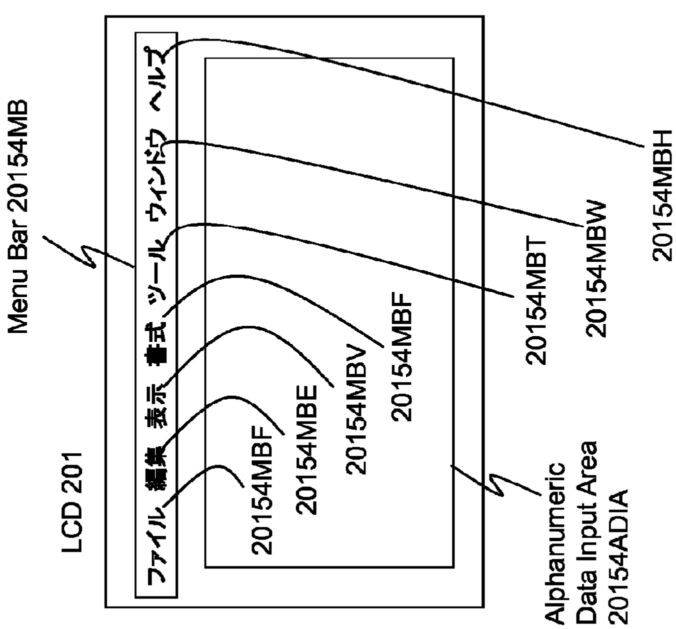

FIG. 490 is a simplified illustration illustrating an exemplary embodiment of the present invention.

Figure 491:
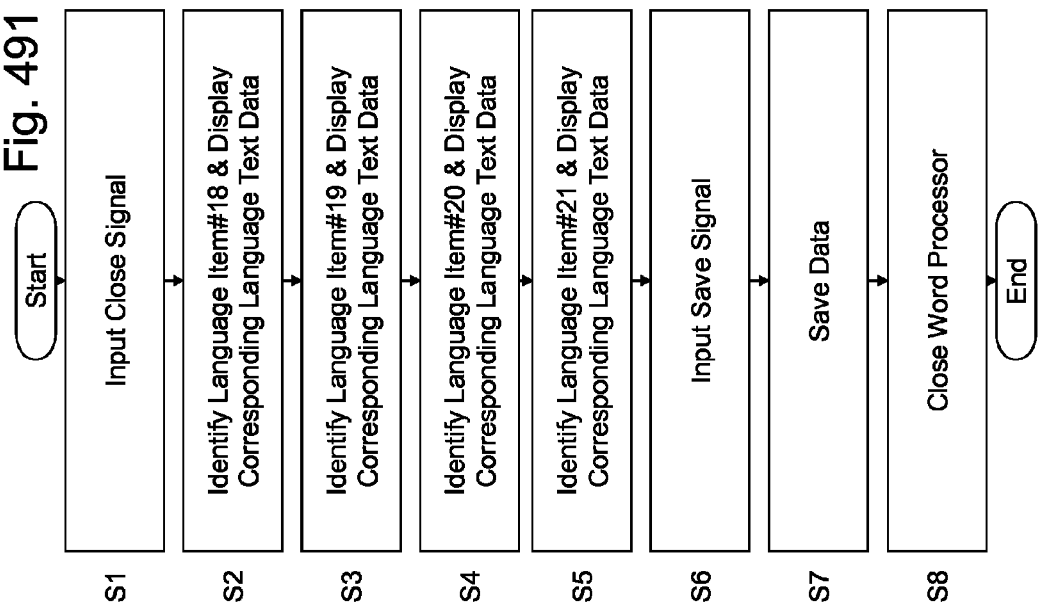

FIG. 491 is a flowchart illustrating an exemplary embodiment of the present invention.

Figure 492:
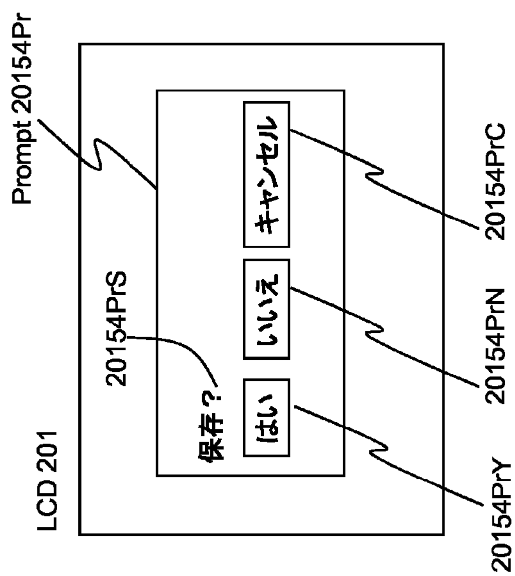

FIG. 492 is a simplified illustration illustrating an exemplary embodiment of the present invention.

Figure 493:
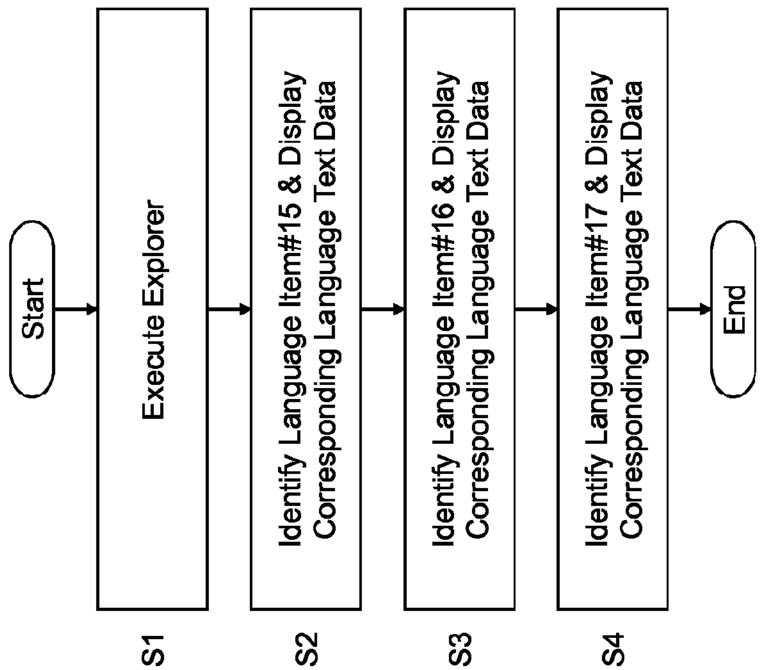

FIG. 493 is a flowchart illustrating an exemplary embodiment of the present invention.

Figure 494:
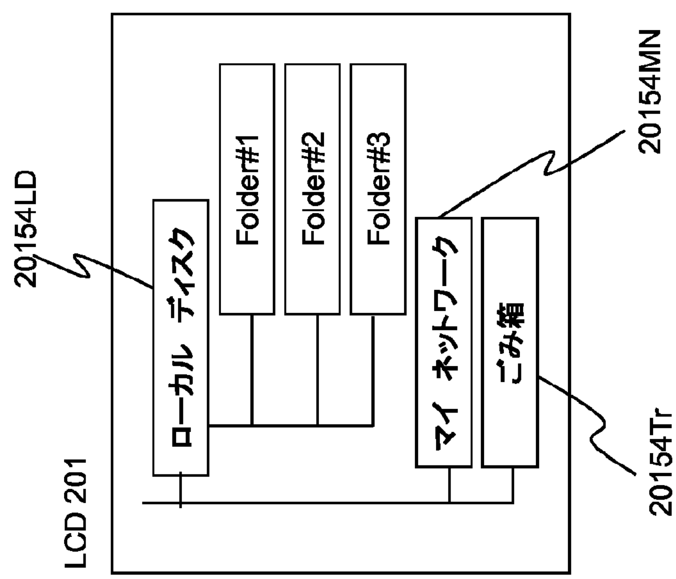

FIG. 494 is a simplified illustration illustrating an exemplary embodiment of the present invention.

Figure 495:
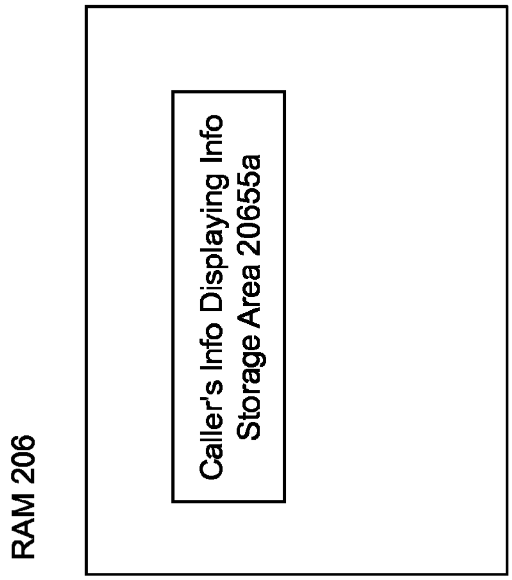

FIG. 495 is a block diagram illustrating an exemplary embodiment of the present invention.

Figure 496:
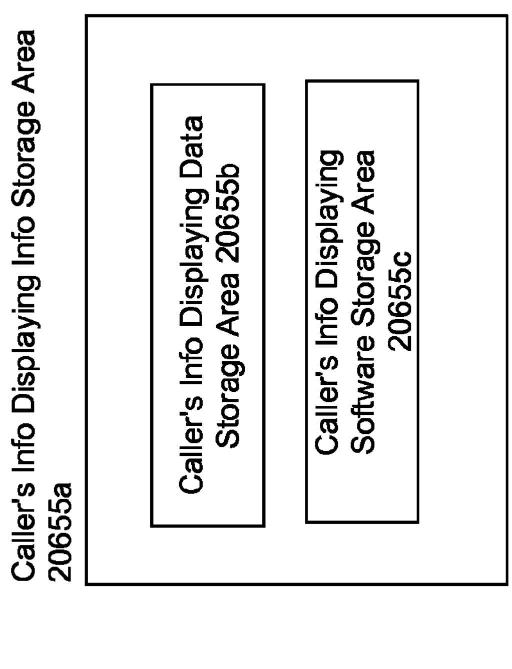

FIG. 496 is a block diagram illustrating an exemplary embodiment of the present invention.

Figure 497:
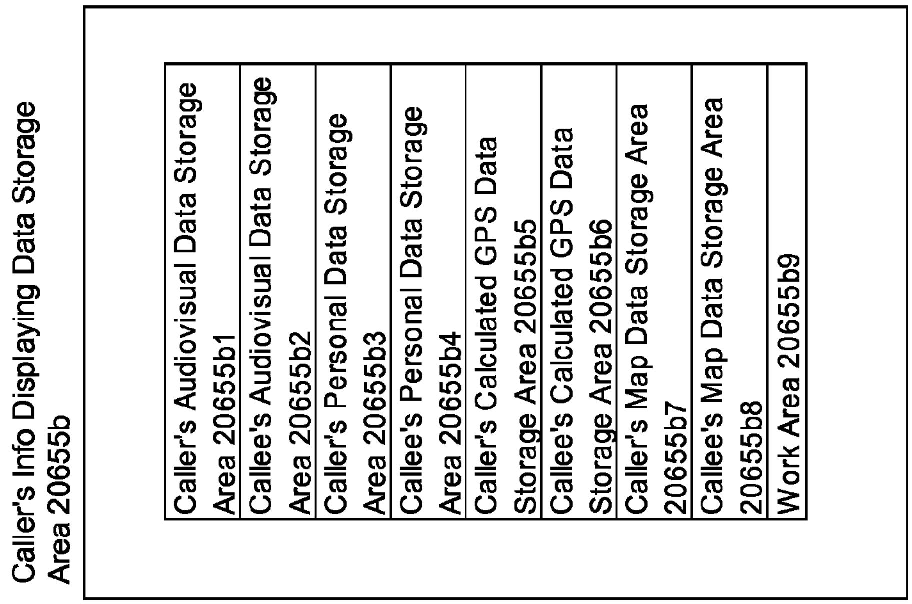

FIG. 497 is a block diagram illustrating an exemplary embodiment of the present invention.

Figure 498:
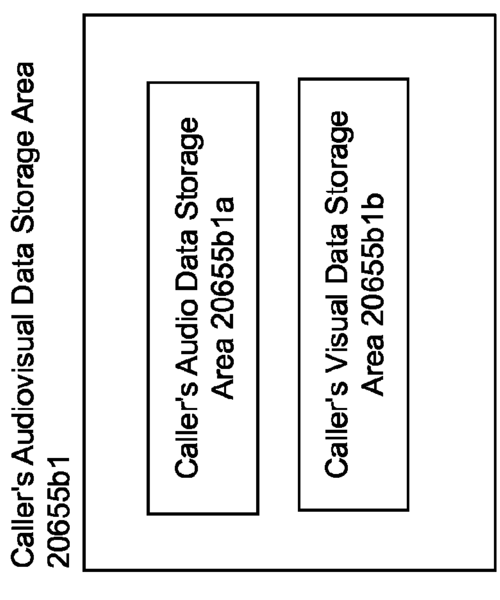

FIG. 498 is a block diagram illustrating an exemplary embodiment of the present invention.

Figures 499, 500:
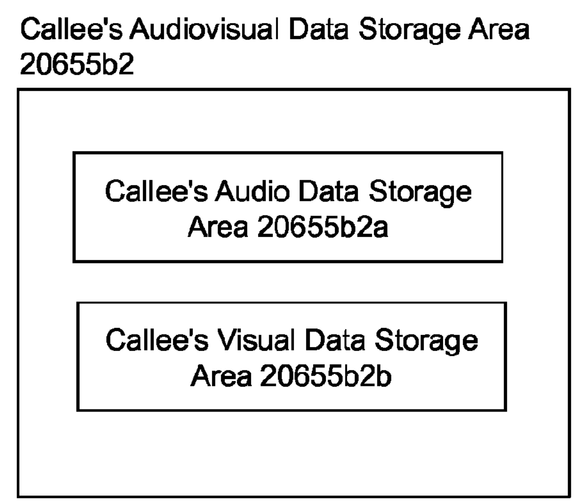

FIG. 499 is a block diagram illustrating an exemplary embodiment of the present invention.

FIG. 500 is a block diagram illustrating an exemplary embodiment of the present invention.

FIG. 501 is a block diagram illustrating an exemplary embodiment of the present invention.

FIG. 502 is a block diagram illustrating an exemplary embodiment of the present invention.

Figure 503:
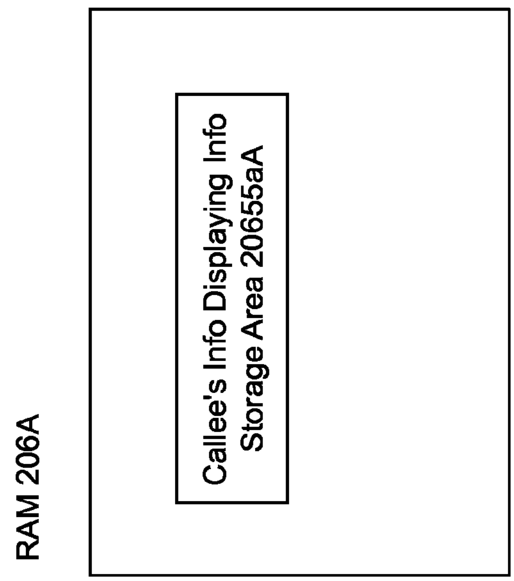

FIG. 503 is a block diagram illustrating an exemplary embodiment of the present invention.

Figure 504:
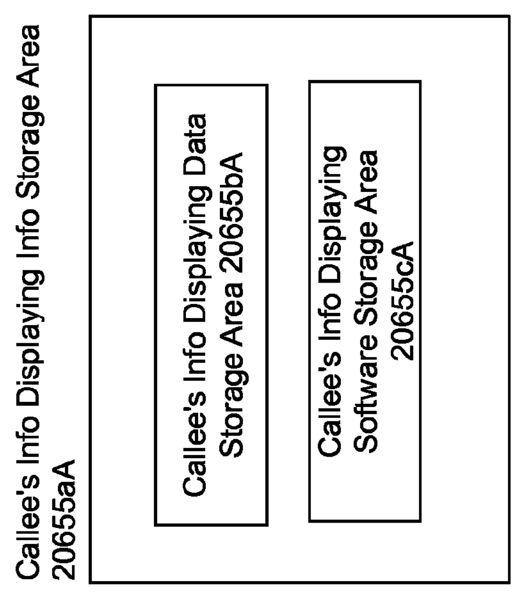

FIG. 504 is a block diagram illustrating an exemplary embodiment of the present invention.

Figure 505:
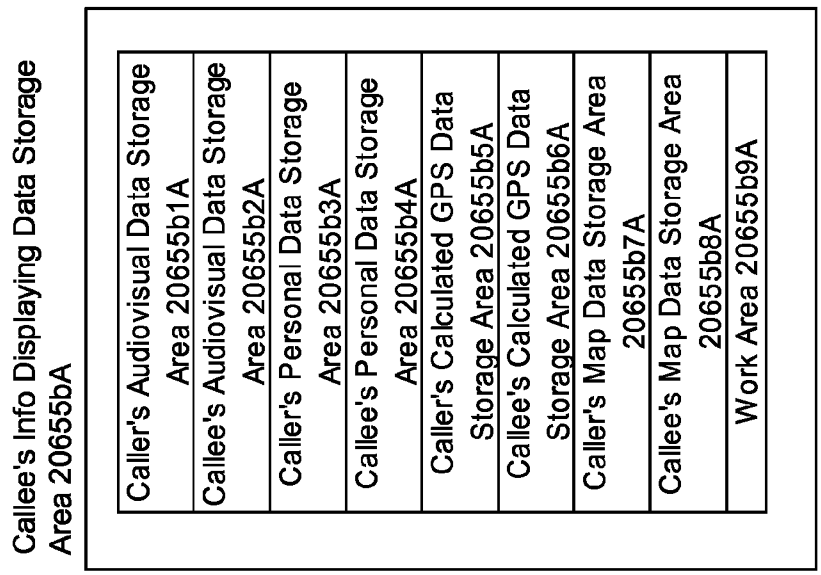

FIG. 505 is a block diagram illustrating an exemplary embodiment of the present invention.

Figure 506:
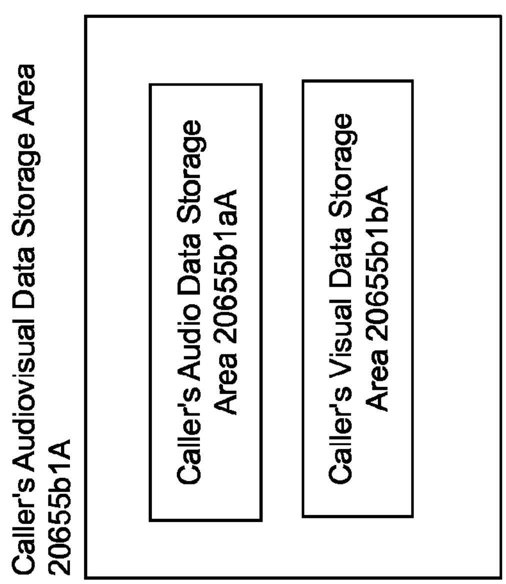

FIG. 506 is a block diagram illustrating an exemplary embodiment of the present invention.

Figure 507:
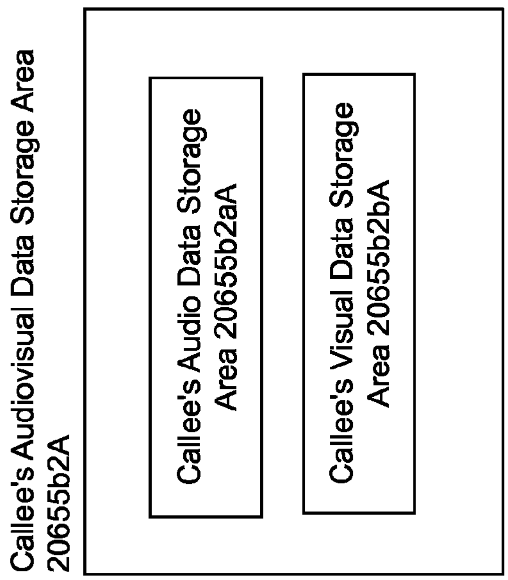

FIG. 507 is a block diagram illustrating an exemplary embodiment of the present invention.

Figure 508:
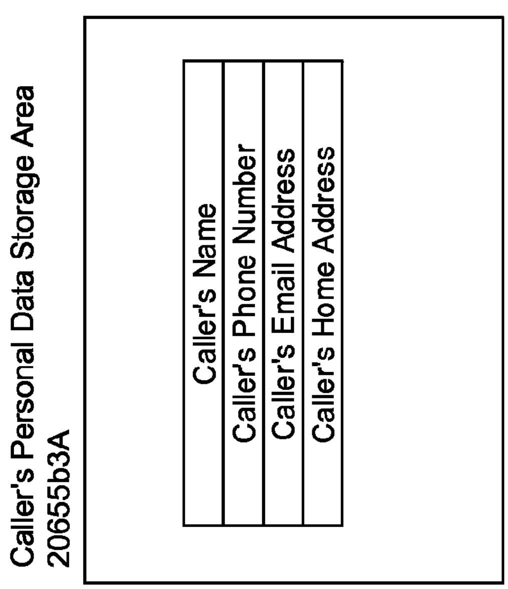

FIG. 508 is a block diagram illustrating an exemplary embodiment of the present invention.

FIG. 509 is a block diagram illustrating an exemplary embodiment of the present invention.

FIG. 510 is a block diagram illustrating an exemplary embodiment of the present invention.

Figure 511:
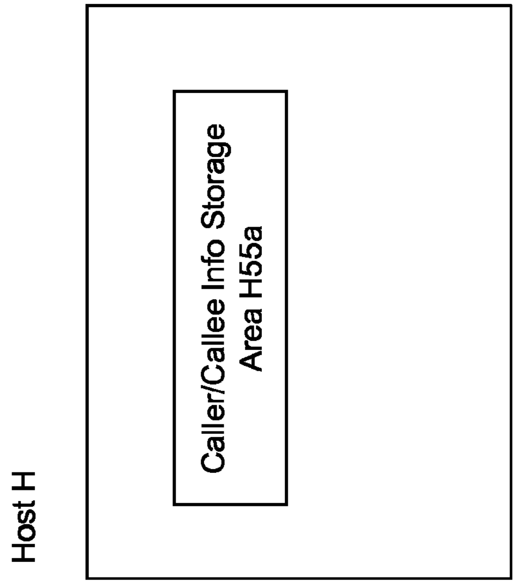

FIG. 511 is a block diagram illustrating an exemplary embodiment of the present invention.

Figure 512:
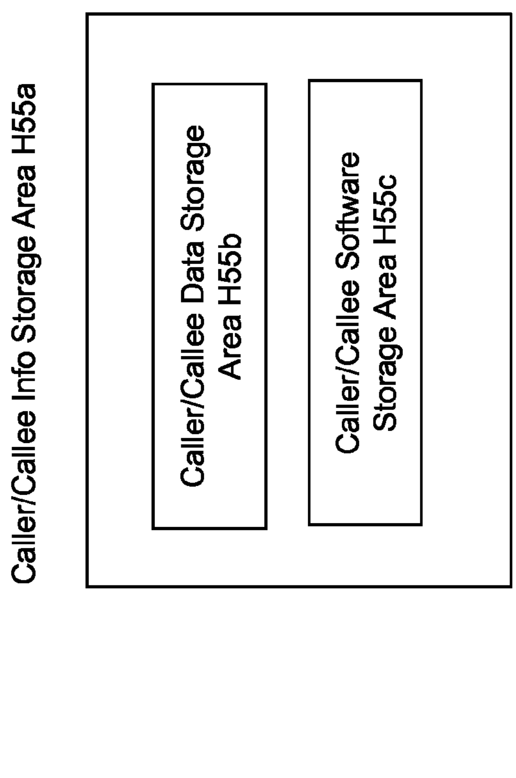

FIG. 512 is a block diagram illustrating an exemplary embodiment of the present invention.

Figure 513:
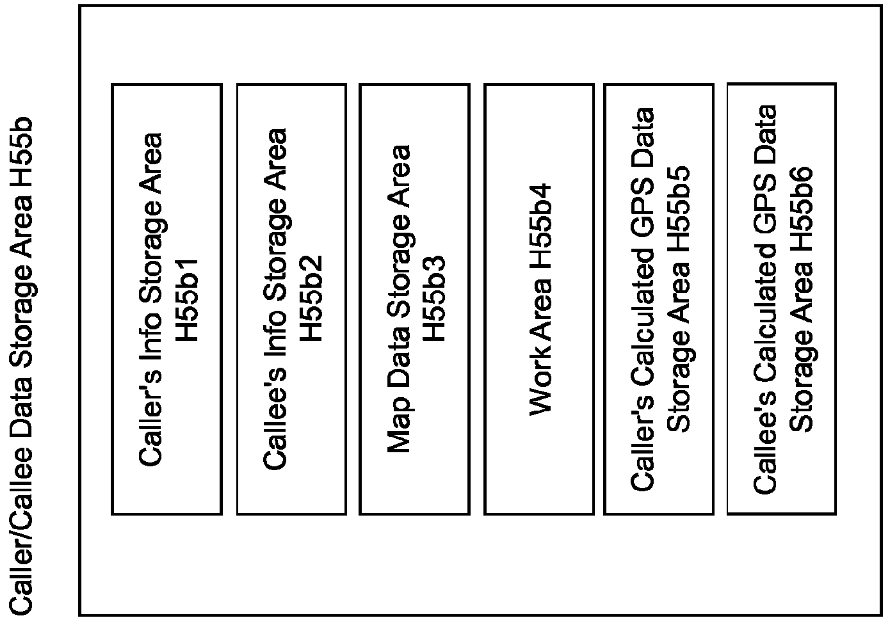

FIG. 513 is a block diagram illustrating an exemplary embodiment of the present invention.

Figure 514:
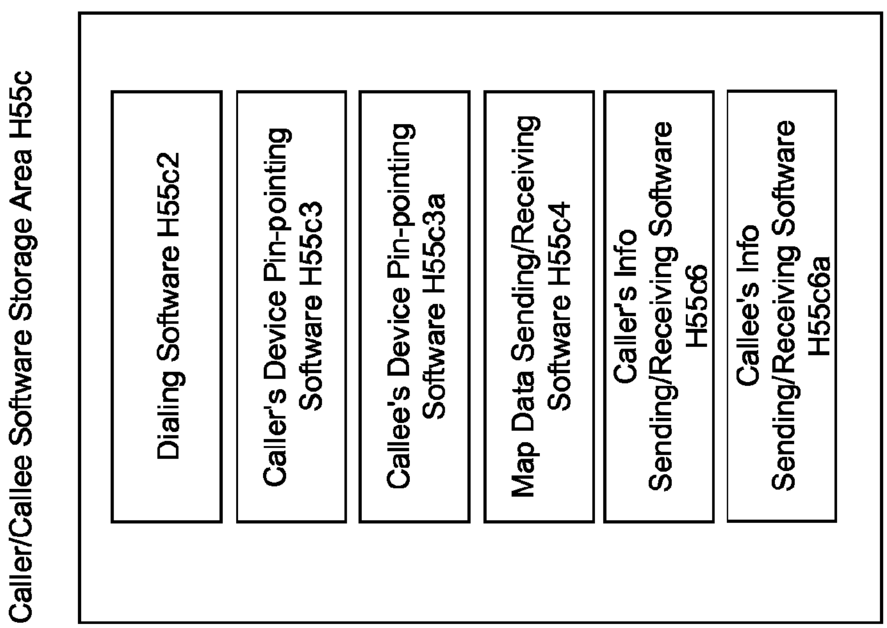

FIG. 514 is a block diagram illustrating an exemplary embodiment of the present invention.

Figure 515:
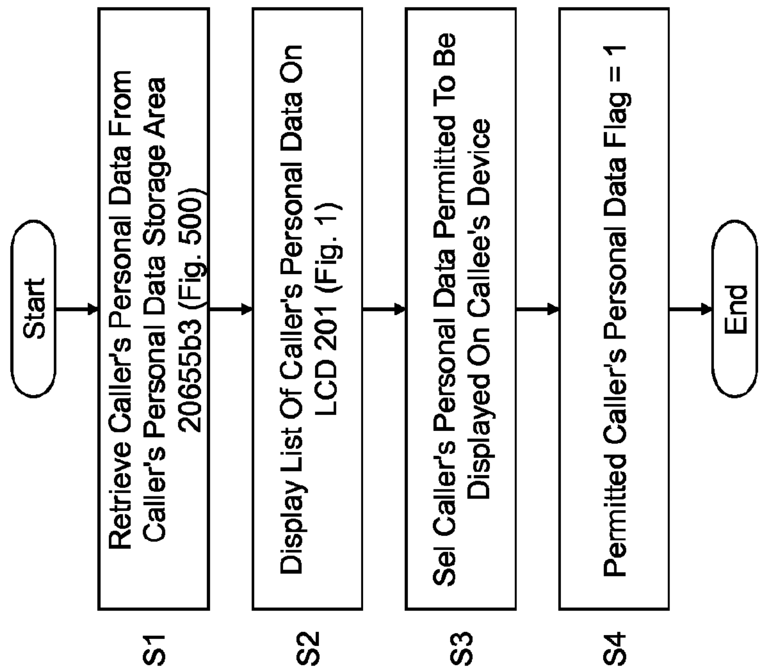

FIG. 515 is a flowchart illustrating an exemplary embodiment of the present invention.

Figure 516:
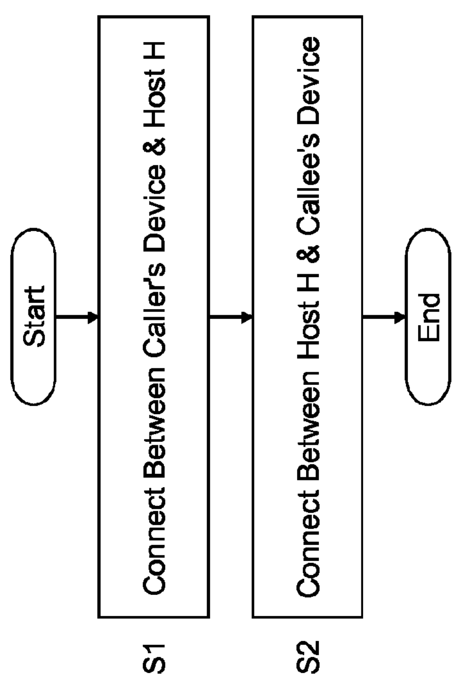

FIG. 516 is a flowchart illustrating an exemplary embodiment of the present invention.

Figure 517:
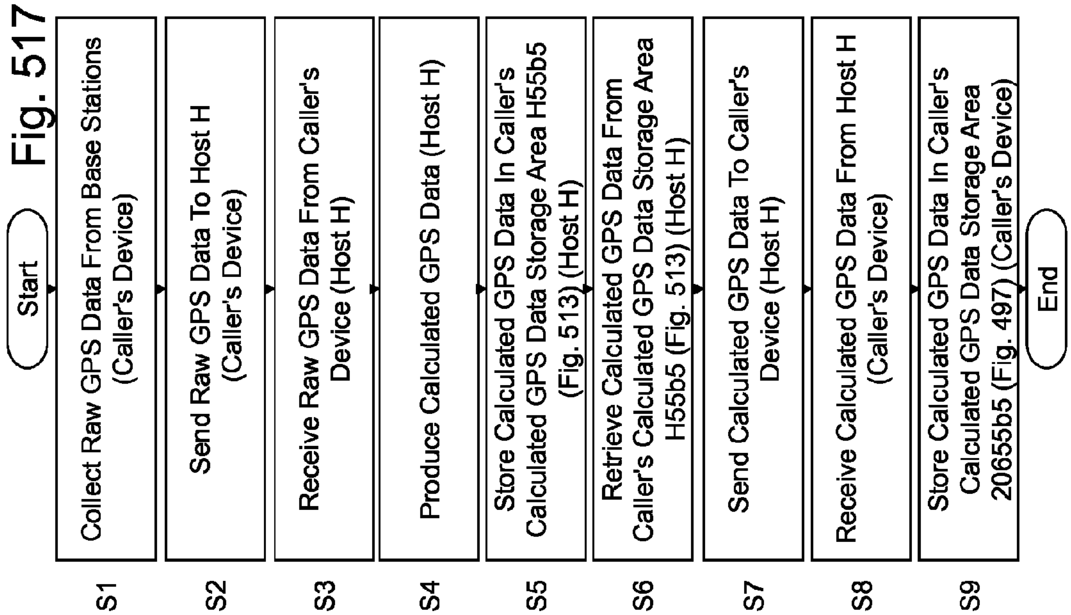

FIG. 517 is a flowchart illustrating an exemplary embodiment of the present invention.

Figure 518:
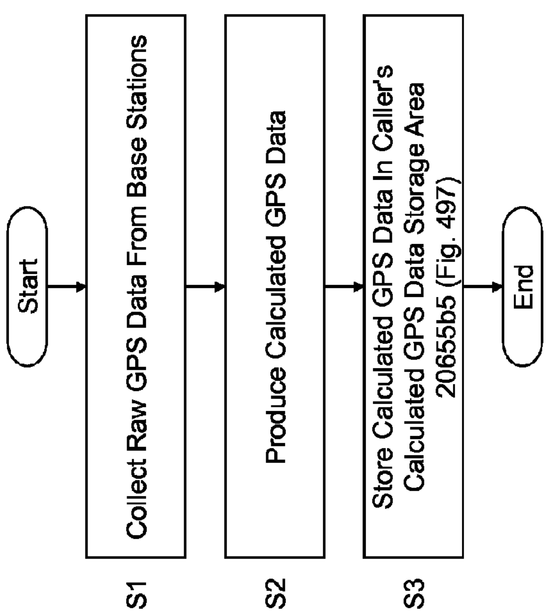

FIG. 518 is a flowchart illustrating an exemplary embodiment of the present invention.

Figure 519:
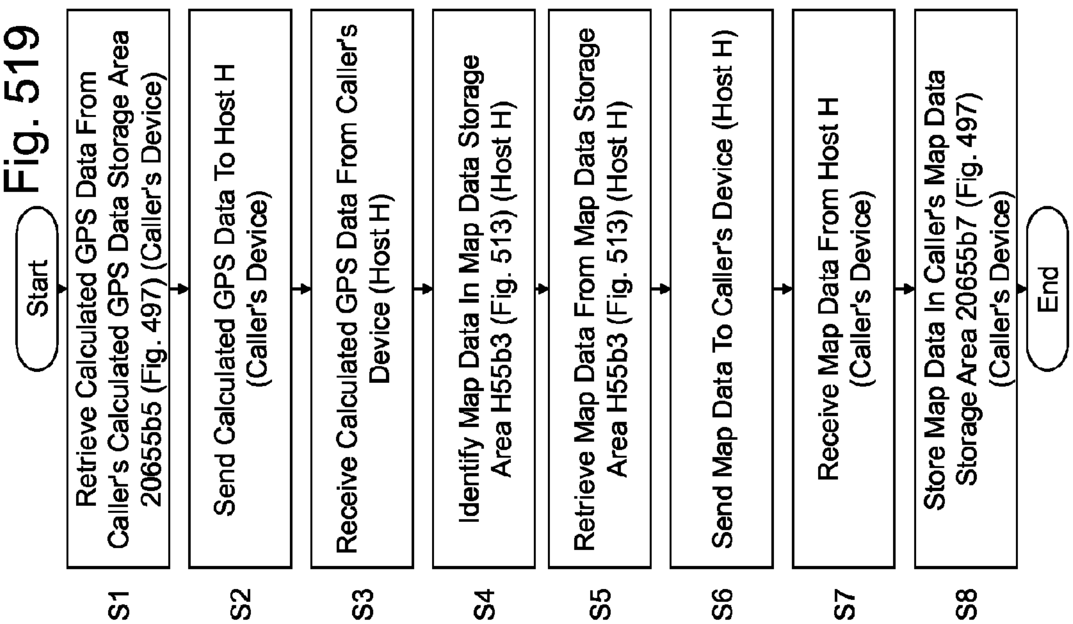

FIG. 519 is a flowchart illustrating an exemplary embodiment of the present invention.

Figure 520:
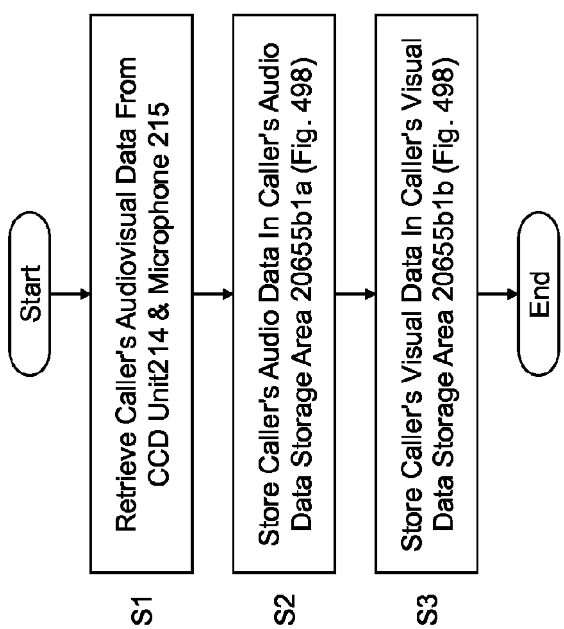

FIG. 520 is a flowchart illustrating an exemplary embodiment of the present invention.

Figure 521:
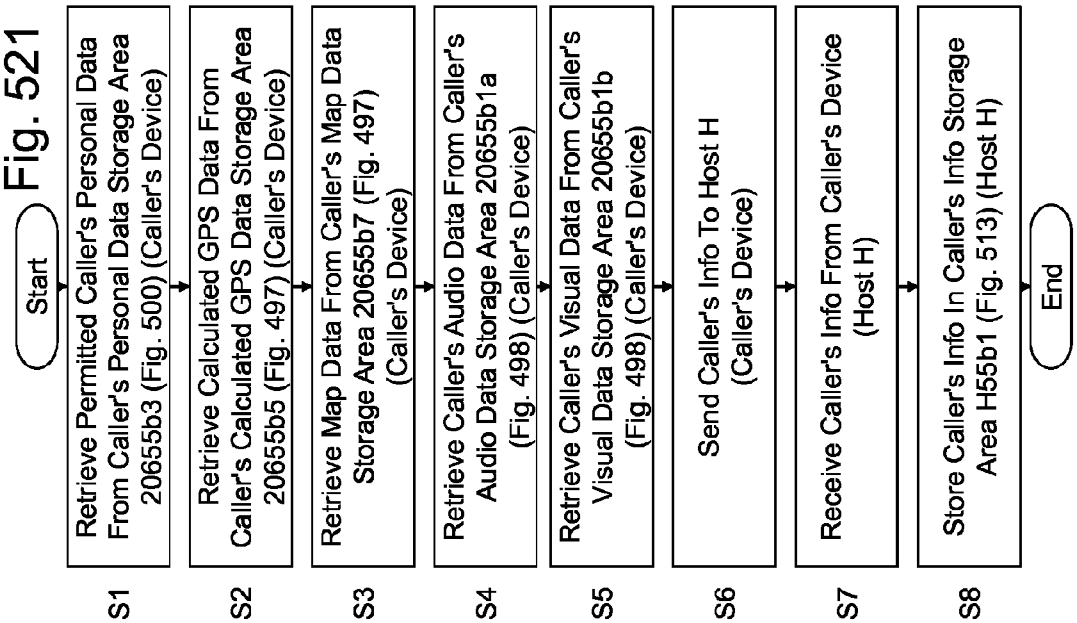

FIG. 521 is a flowchart illustrating an exemplary embodiment of the present invention.

Figure 522:
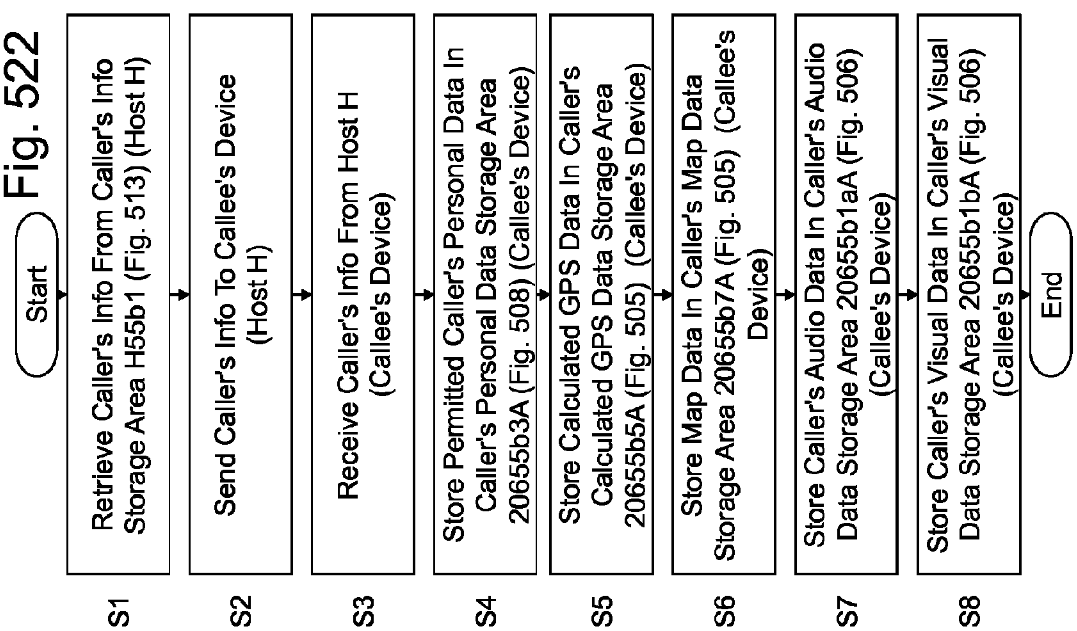

FIG. 522 is a flowchart illustrating an exemplary embodiment of the present invention.

Figure 523:
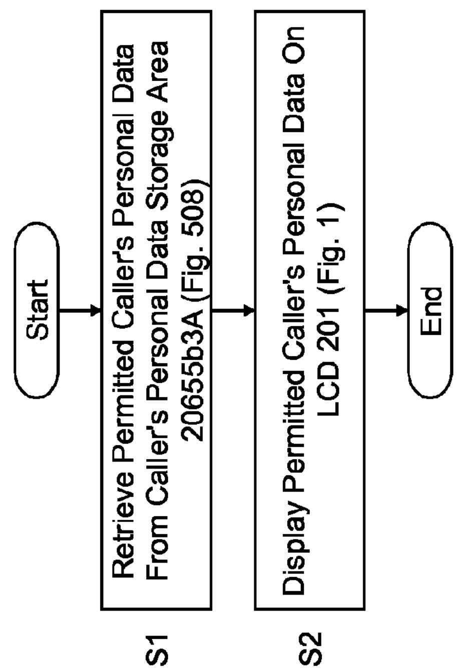

FIG. 523 is a flowchart illustrating an exemplary embodiment of the present invention.

Figure 524:
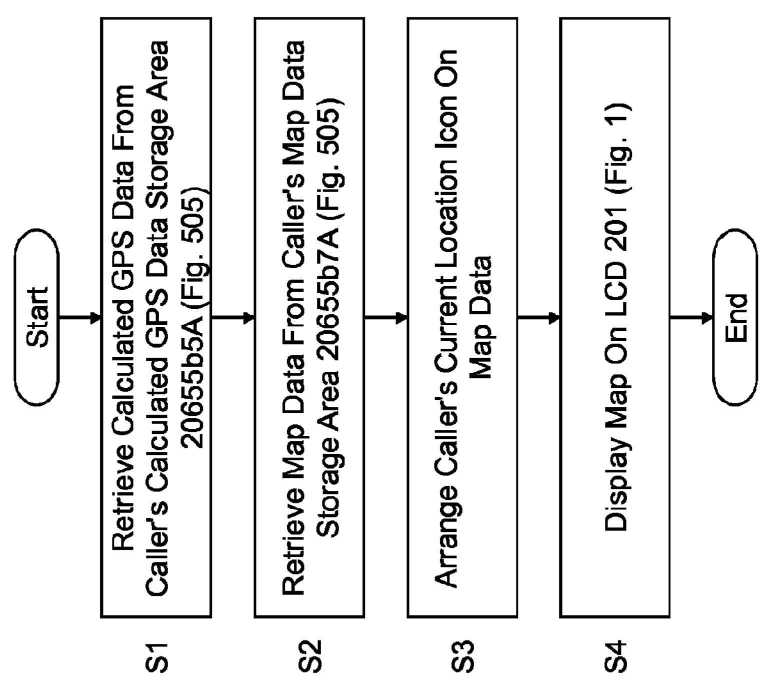

FIG. 524 is a flowchart illustrating an exemplary embodiment of the present invention.

Figure 525:
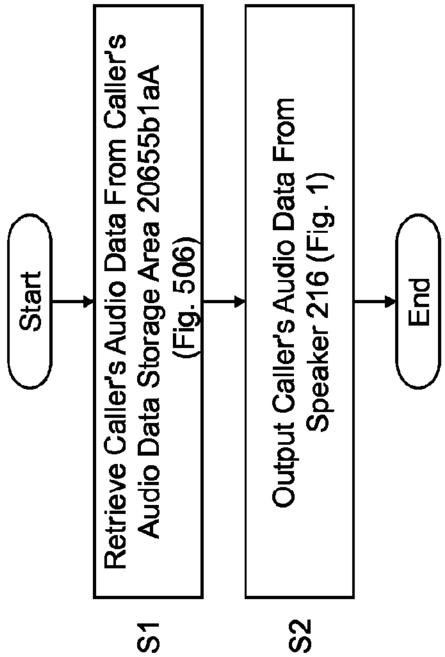

FIG. 525 is a flowchart illustrating an exemplary embodiment of the present invention.

Figure 526:
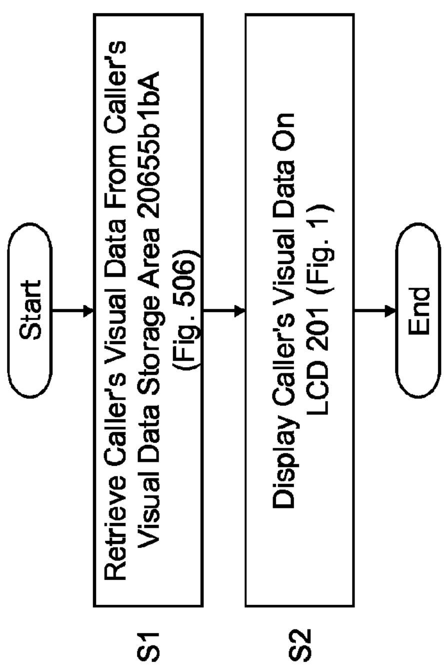

FIG. 526 is a flowchart illustrating an exemplary embodiment of the present invention.

Figure 527:
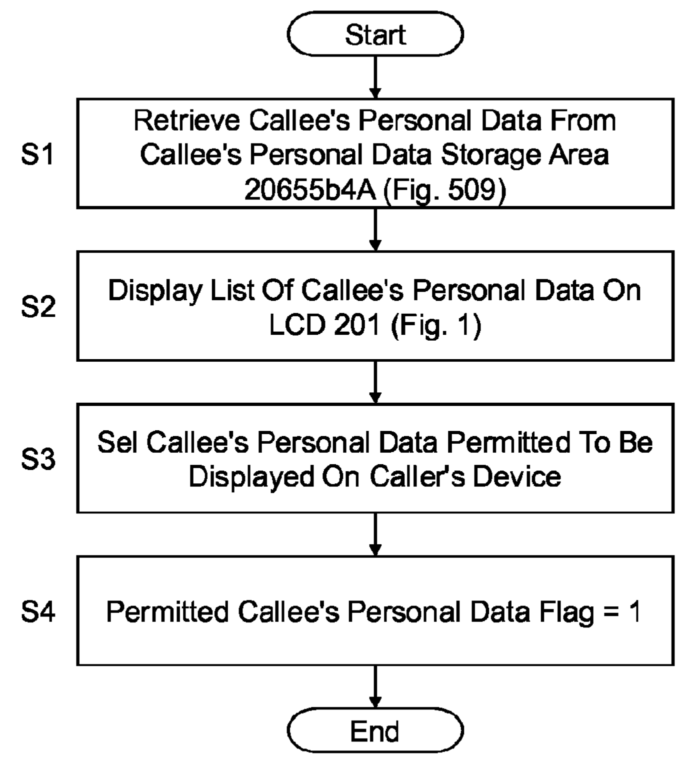

FIG. 527 is a flowchart illustrating an exemplary embodiment of the present invention.

Figure 528:
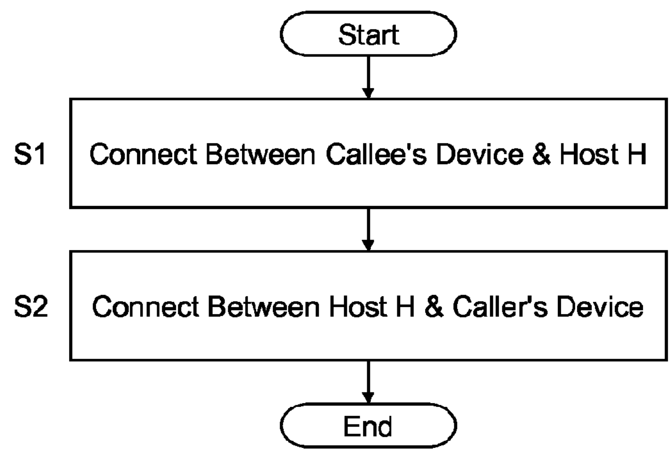

FIG. 528 is a flowchart illustrating an exemplary embodiment of the present invention.

Figure 529:
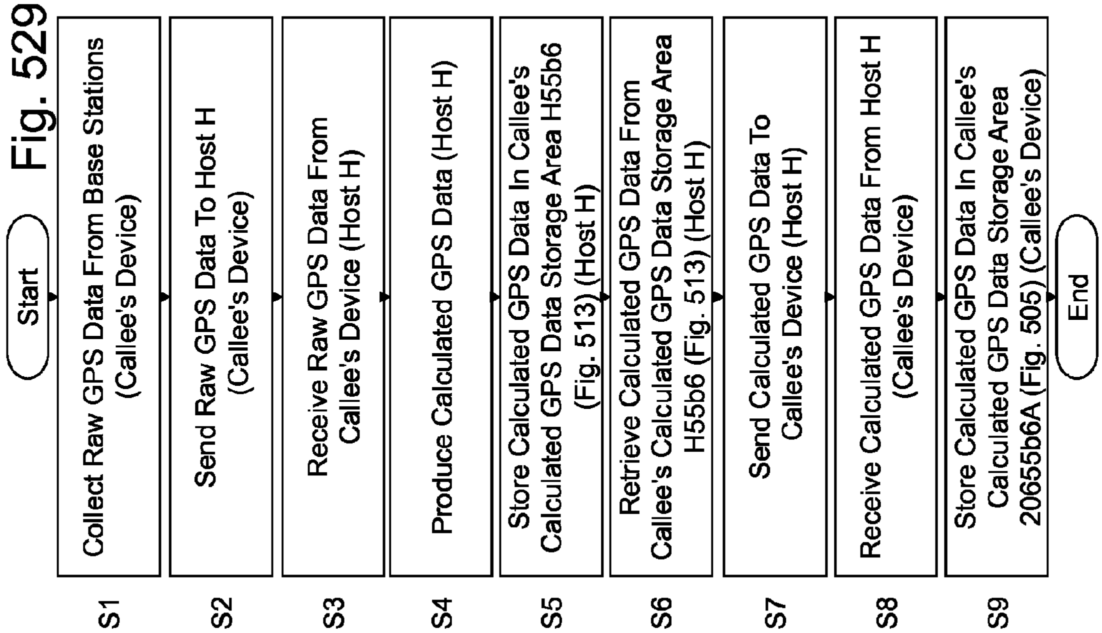

FIG. 529 is a flowchart illustrating an exemplary embodiment of the present invention.

Figure 530:
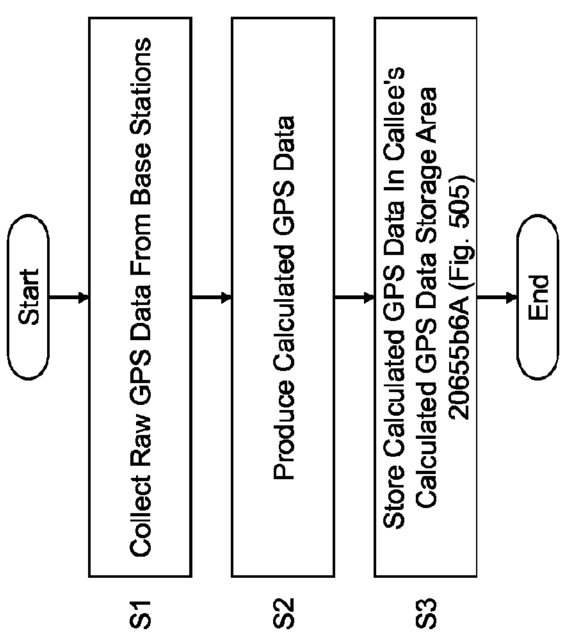

FIG. 530 is a flowchart illustrating an exemplary embodiment of the present invention.

Figure 531:
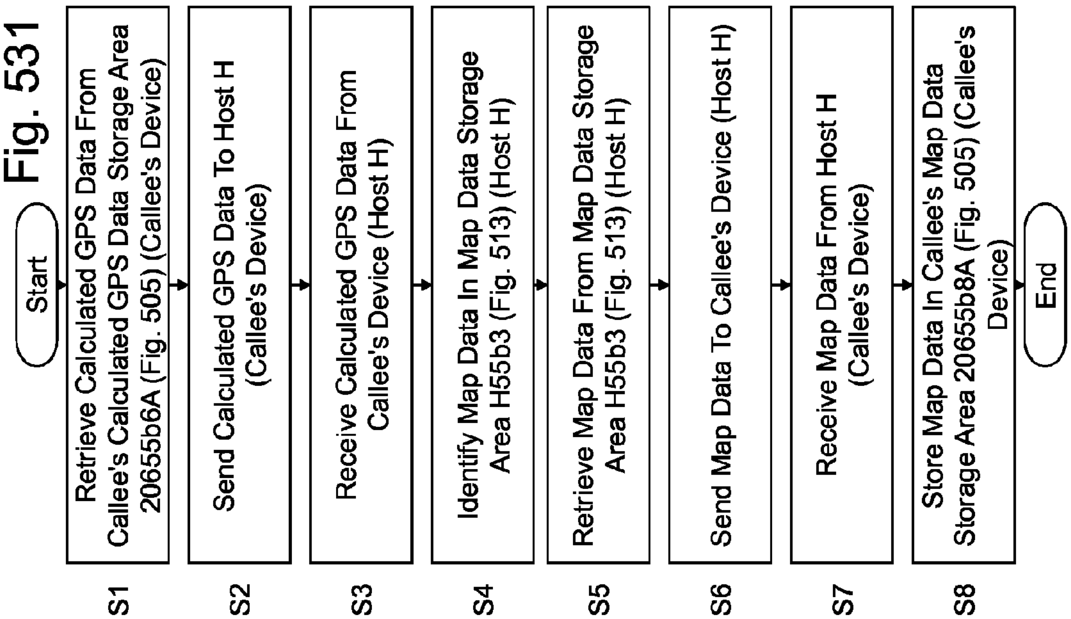

FIG. 531 is a flowchart illustrating an exemplary embodiment of the present invention.

Figure 532:
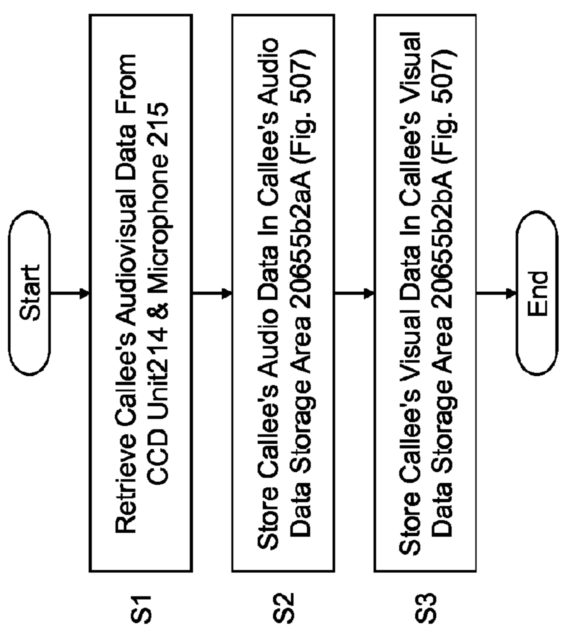

FIG. 532 is a flowchart illustrating an exemplary embodiment of the present invention.

Figure 533:
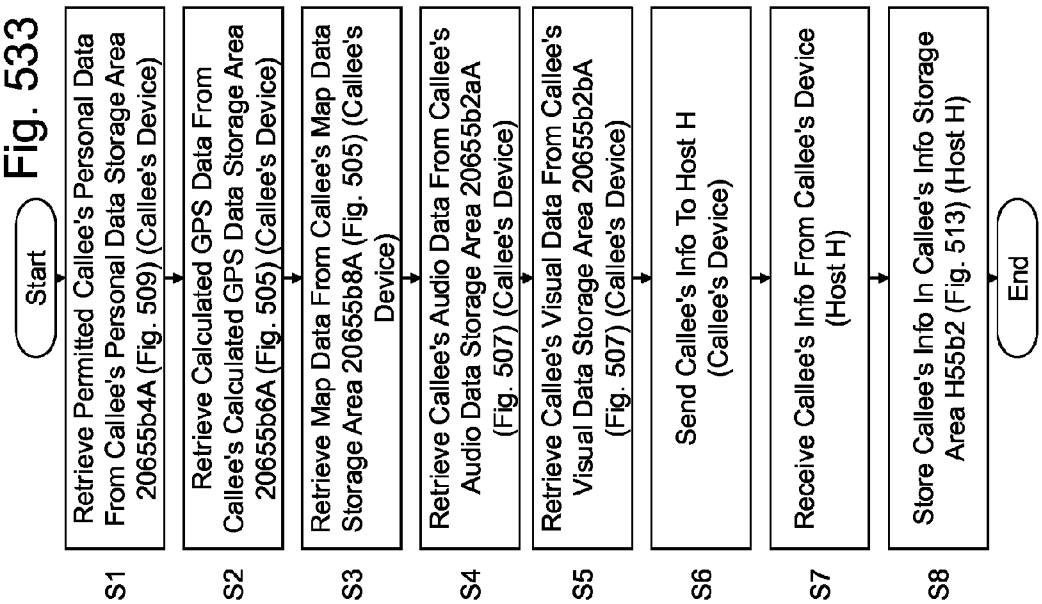

FIG. 533 is a flowchart illustrating an exemplary embodiment of the present invention.

Figure 534:
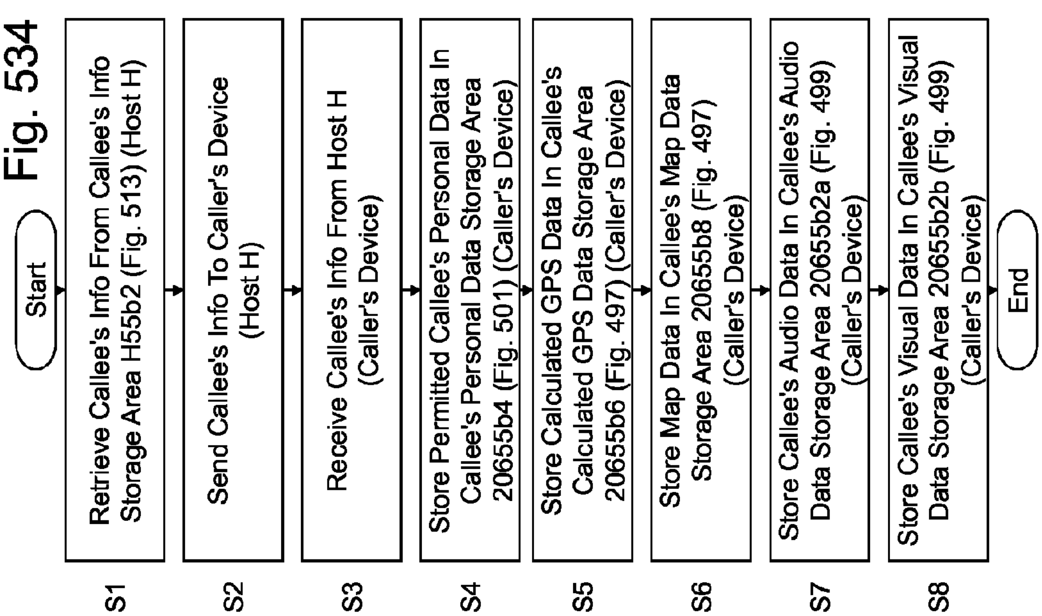

FIG. 534 is a flowchart illustrating an exemplary embodiment of the present invention.

Figure 535:
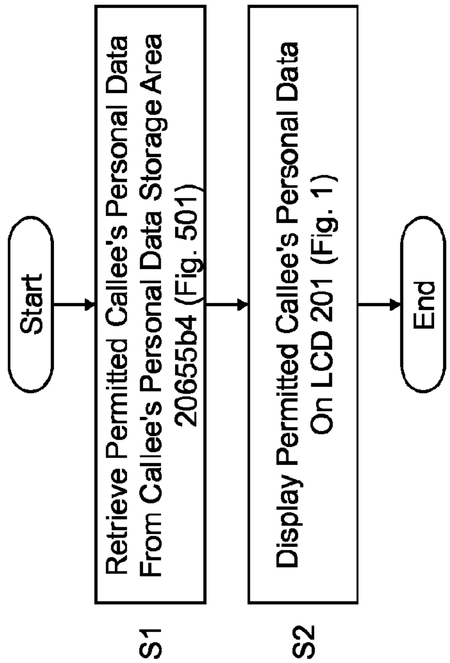

FIG. 535 is a flowchart illustrating an exemplary embodiment of the present invention.

Figure 536:
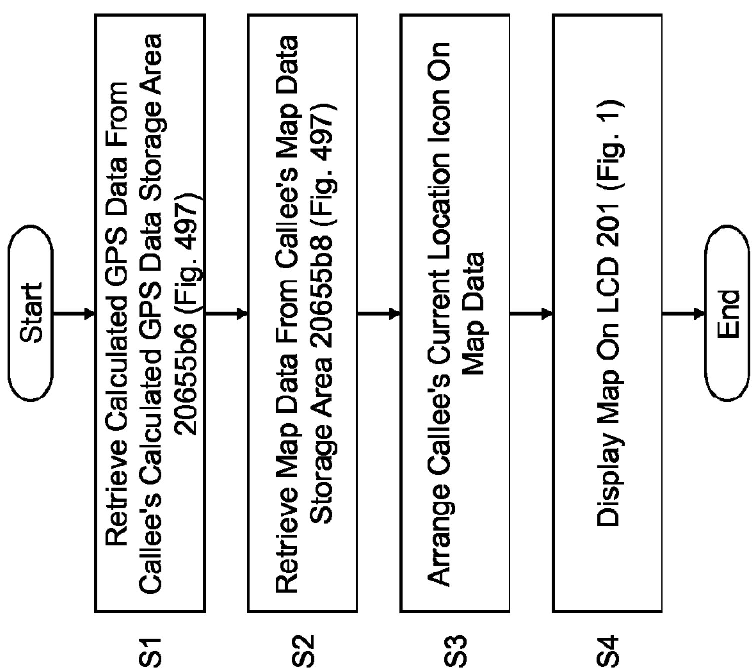

FIG. 536 is a flowchart illustrating an exemplary embodiment of the present invention.

Figure 537:
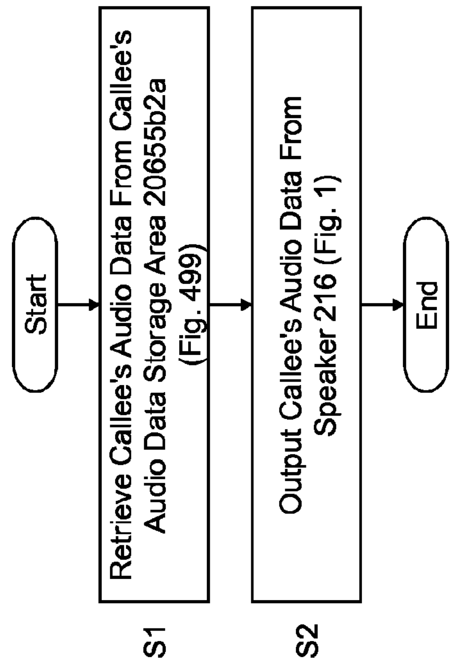

FIG. 537 is a flowchart illustrating an exemplary embodiment of the present invention.

Figure 538:
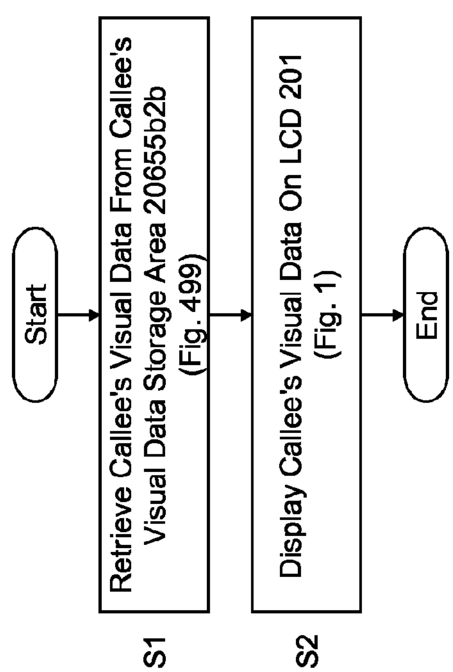

FIG. 538 is a flowchart illustrating an exemplary embodiment of the present invention.

Figure 539:
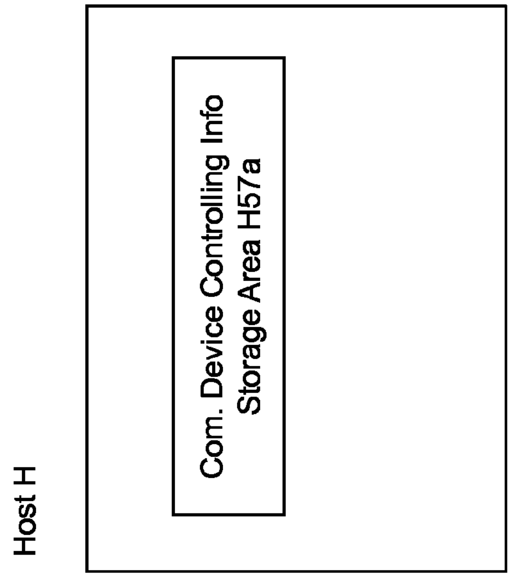

FIG. 539 is a block diagram illustrating an exemplary embodiment of the present invention.

Figure 540:
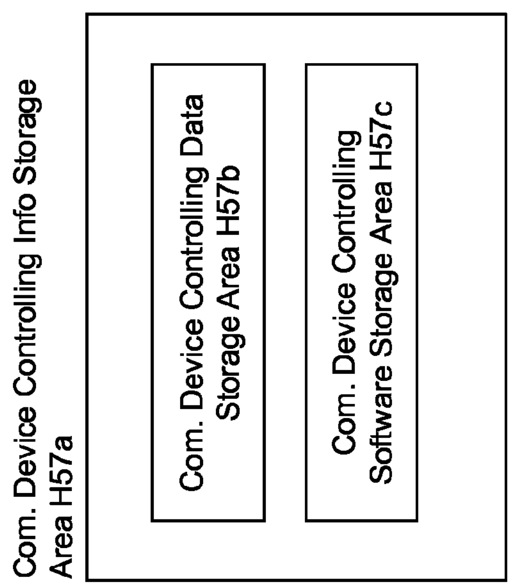

FIG. 540 is a block diagram illustrating an exemplary embodiment of the present invention.

Figures 541, 542:
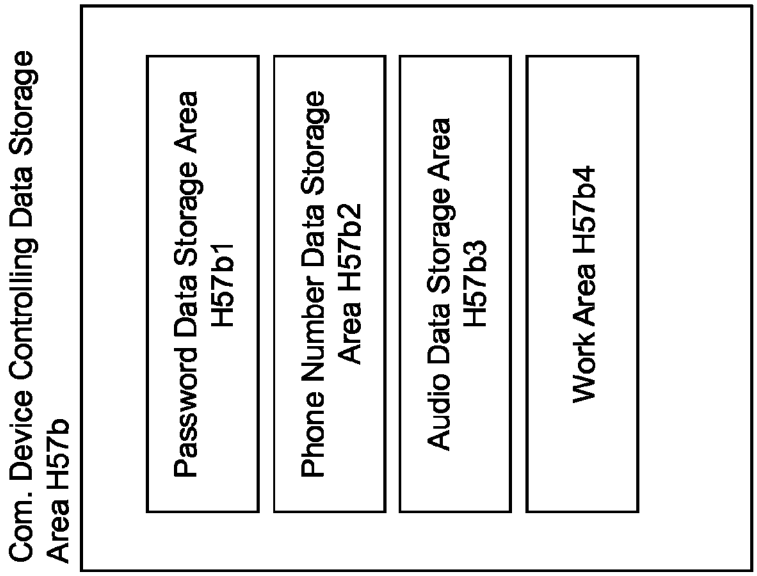

FIG. 541 is a block diagram illustrating an exemplary embodiment of the present invention.

FIG. 542 is a block diagram illustrating an exemplary embodiment of the present invention.

FIG. 543 is a block diagram illustrating an exemplary embodiment of the present invention.

FIG. 544 is a block diagram illustrating an exemplary embodiment of the present invention.

Figure 545:
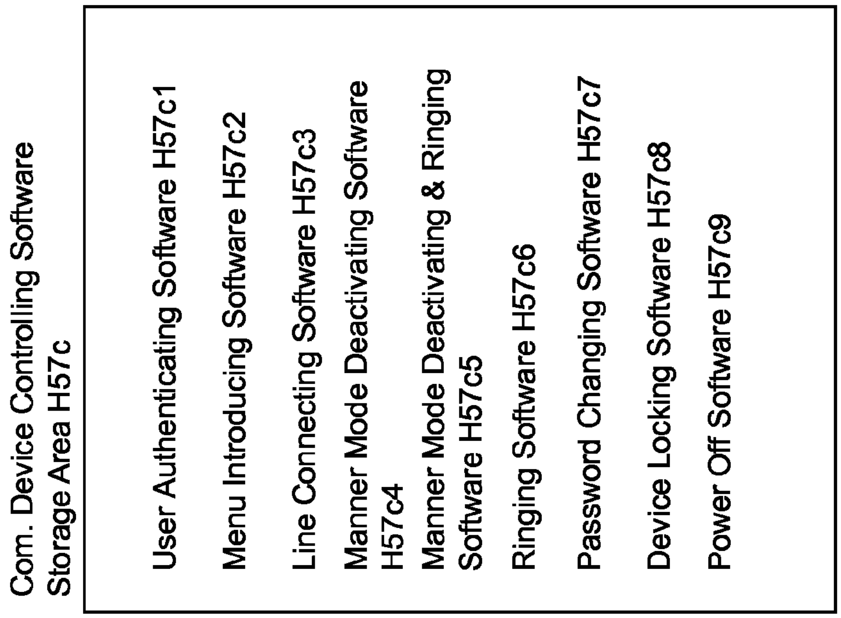

FIG. 545 is a block diagram illustrating an exemplary embodiment of the present invention.

Figure 546:
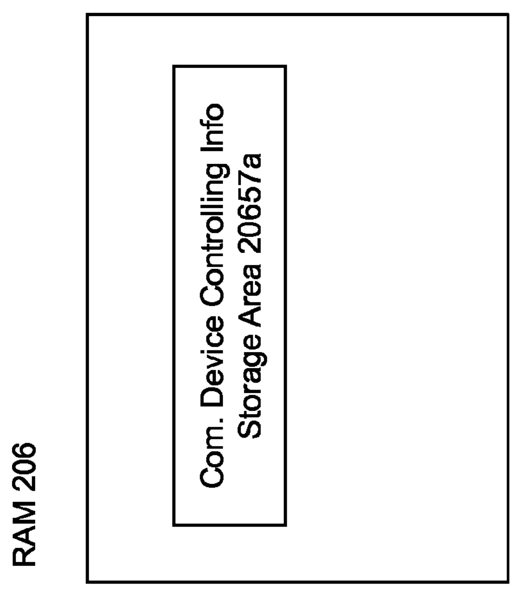

FIG. 546 is a block diagram illustrating an exemplary embodiment of the present invention.

Figure 547:
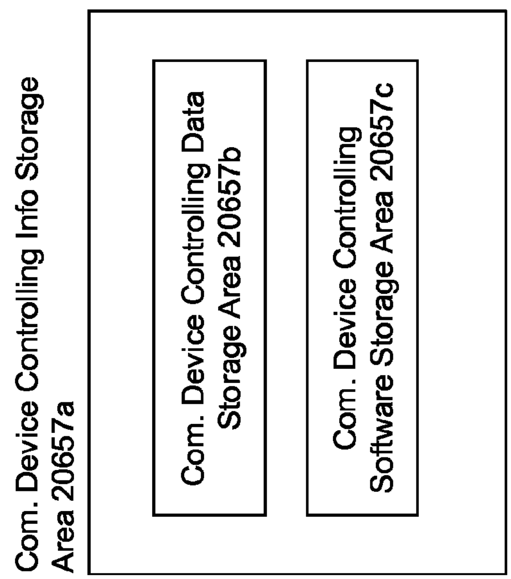

FIG. 547 is a block diagram illustrating an exemplary embodiment of the present invention.

Figure 548:
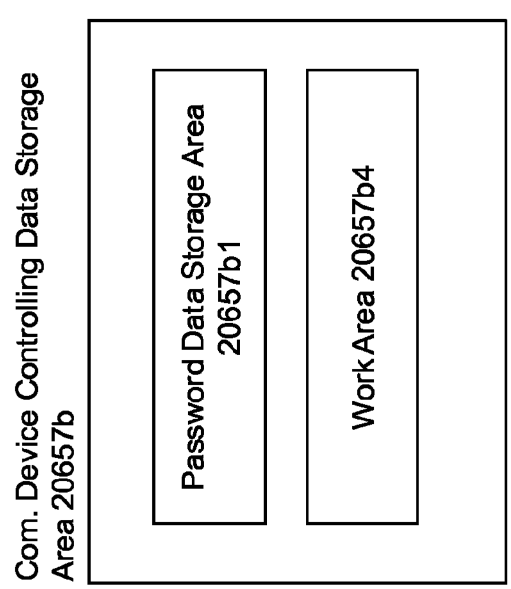

FIG. 548 is a block diagram illustrating an exemplary embodiment of the present invention.

Figure 549:
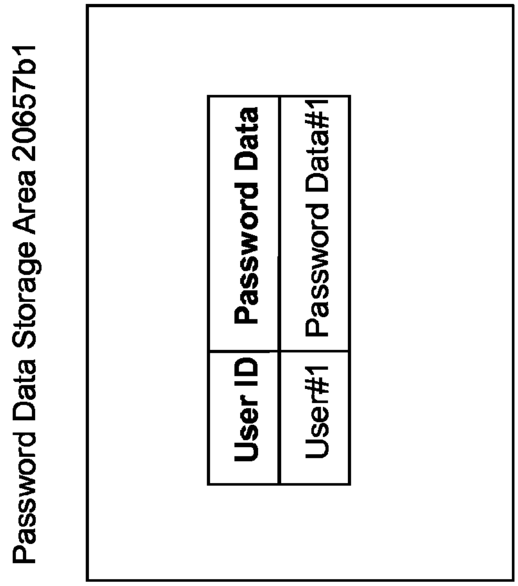

FIG. 549 is a block diagram illustrating an exemplary embodiment of the present invention.

Figure 550:
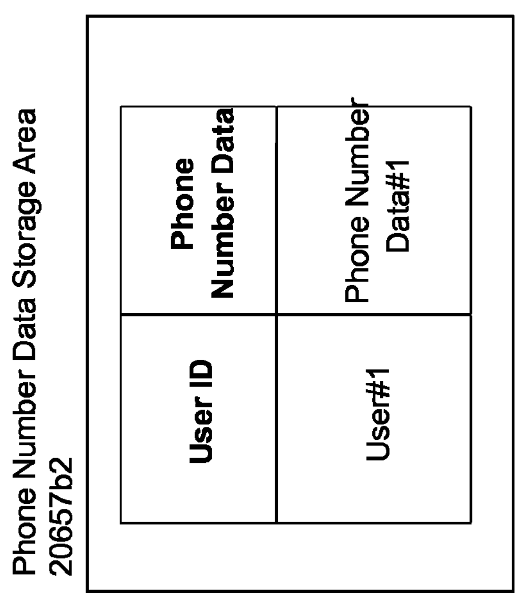

FIG. 550 is a block diagram illustrating an exemplary embodiment of the present invention.

Figure 551:
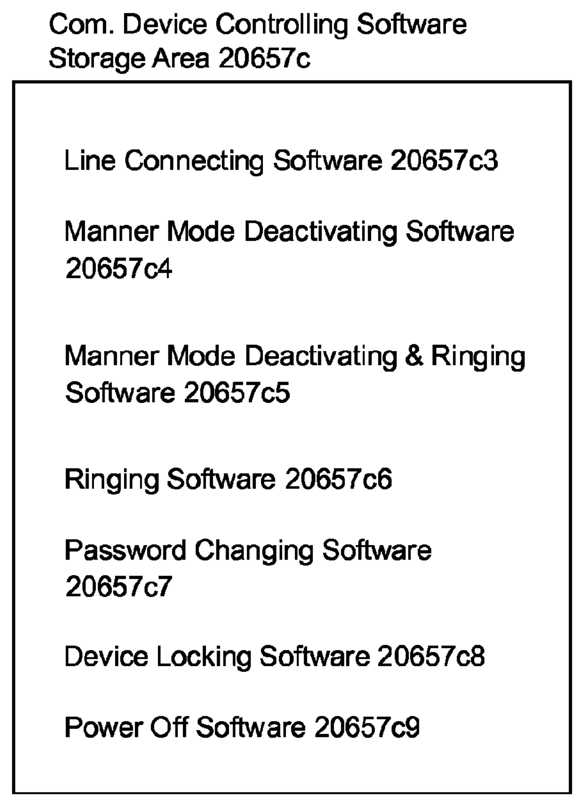

FIG. 551 is a block diagram illustrating an exemplary embodiment of the present invention.

Figure 552:
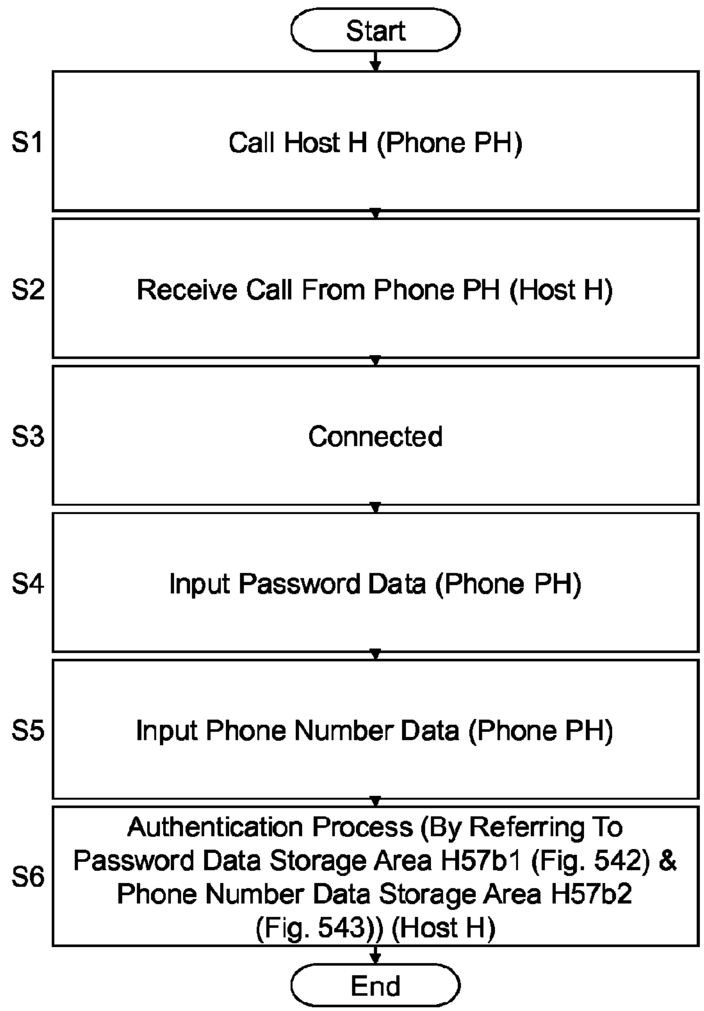

FIG. 552 is a flowchart illustrating an exemplary embodiment of the present invention.

Figure 553:
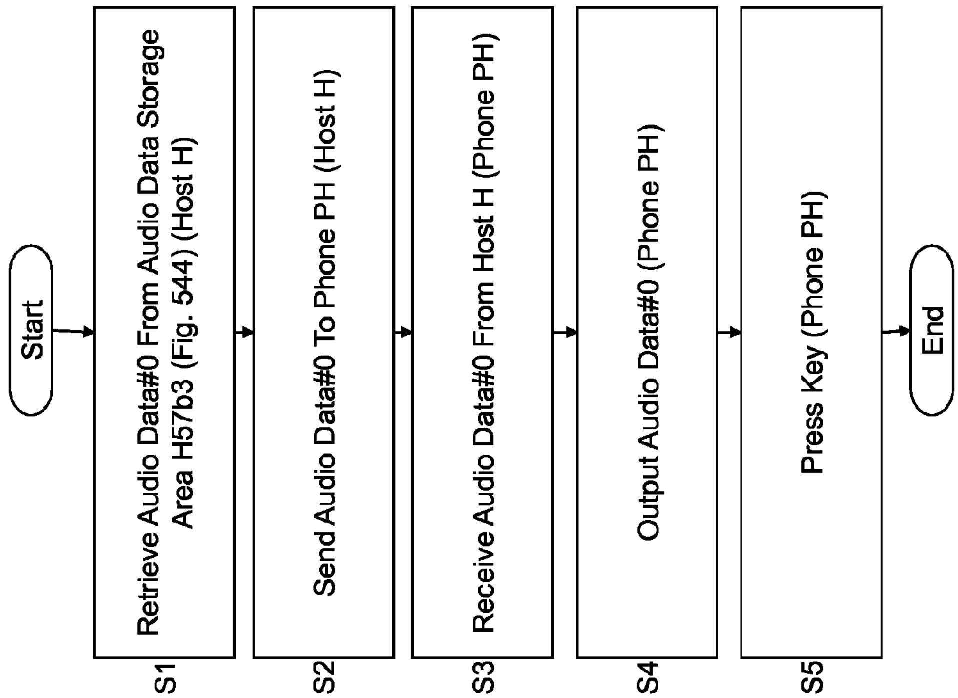

FIG. 553 is a flowchart illustrating an exemplary embodiment of the present invention.

Figure 554:
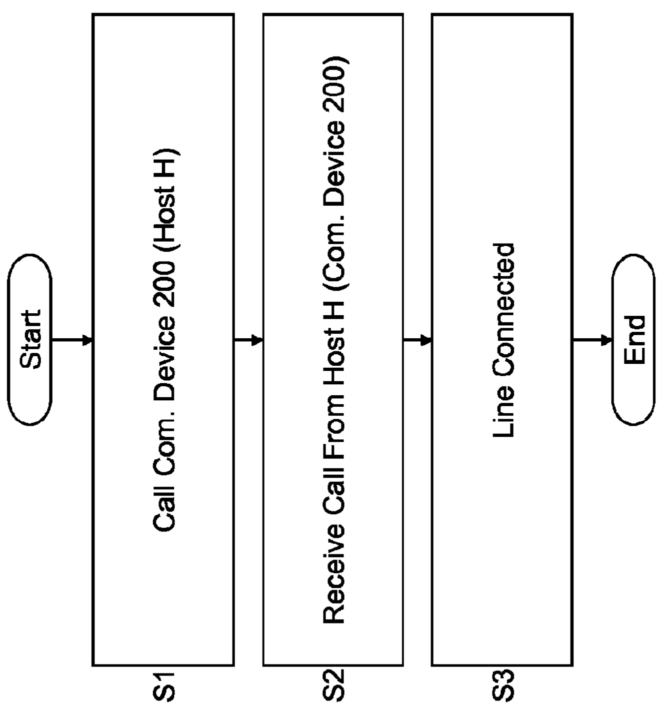

FIG. 554 is a flowchart illustrating an exemplary embodiment of the present invention.

Figure 555:
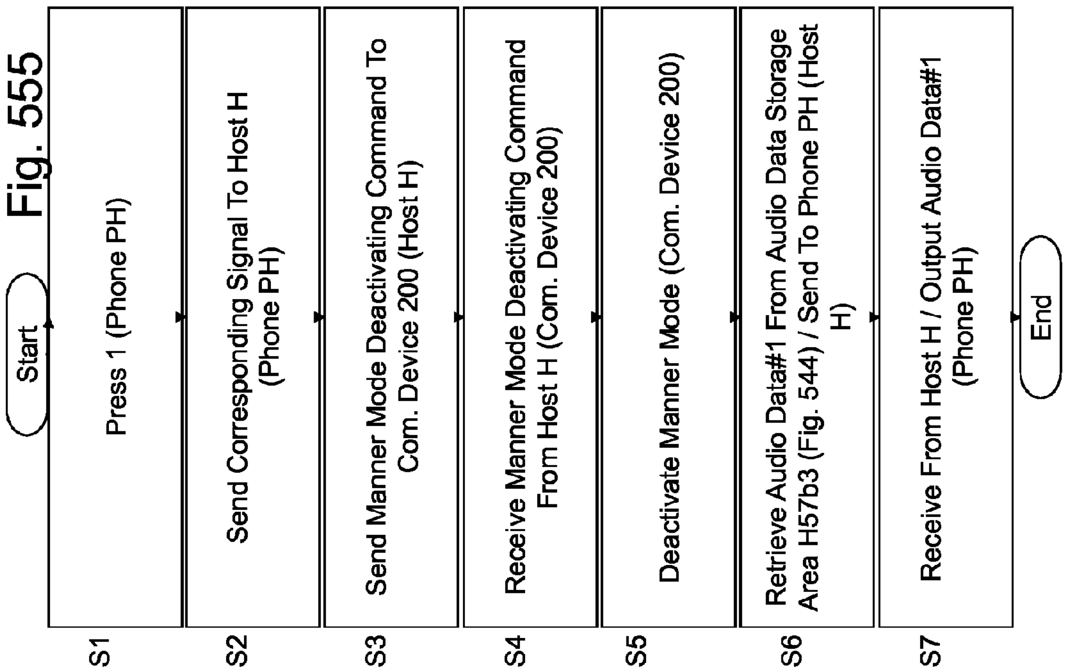

FIG. 555 is a flowchart illustrating an exemplary embodiment of the present invention.

Figure 556:
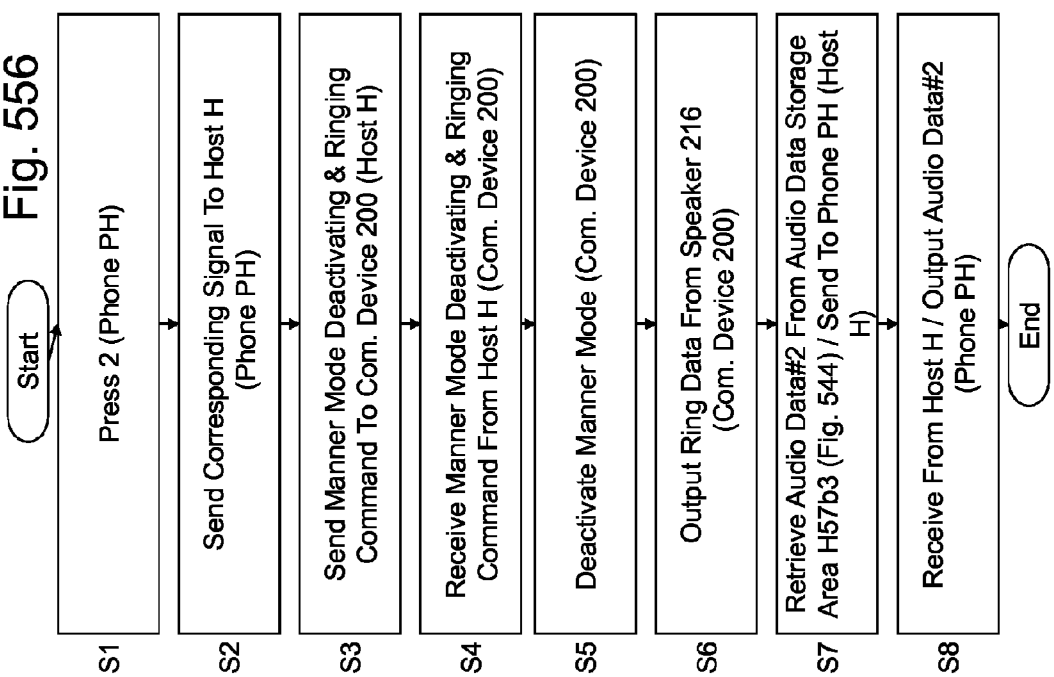

FIG. 556 is a flowchart illustrating an exemplary embodiment of the present invention.

Figure 557:
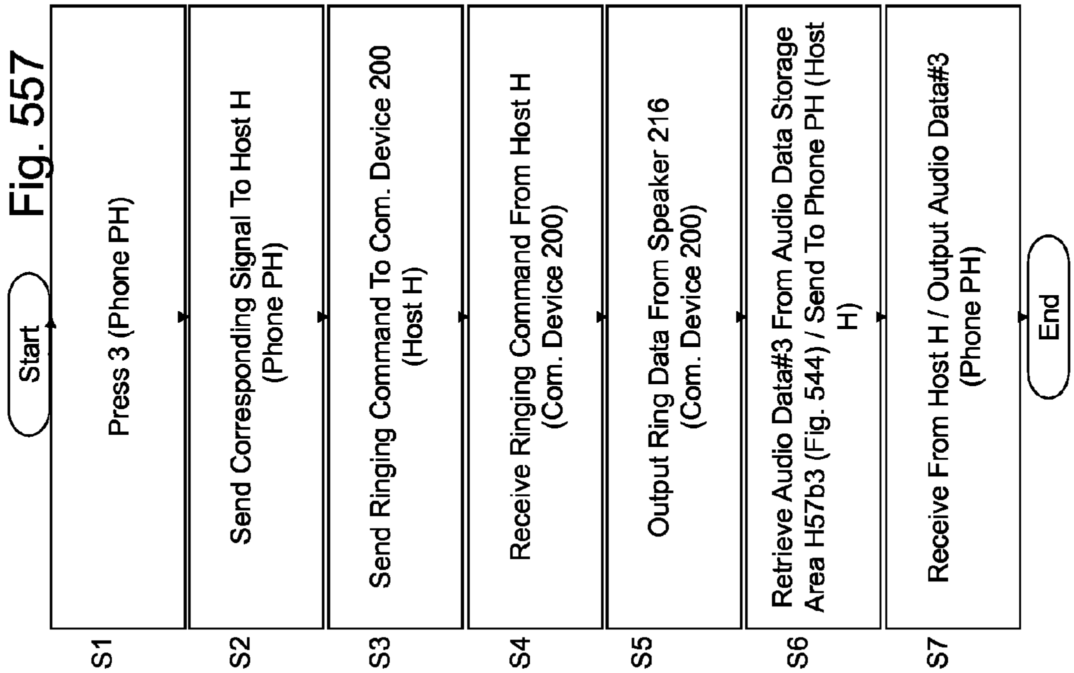

FIG. 557 is a flowchart illustrating an exemplary embodiment of the present invention.

Figure 558:
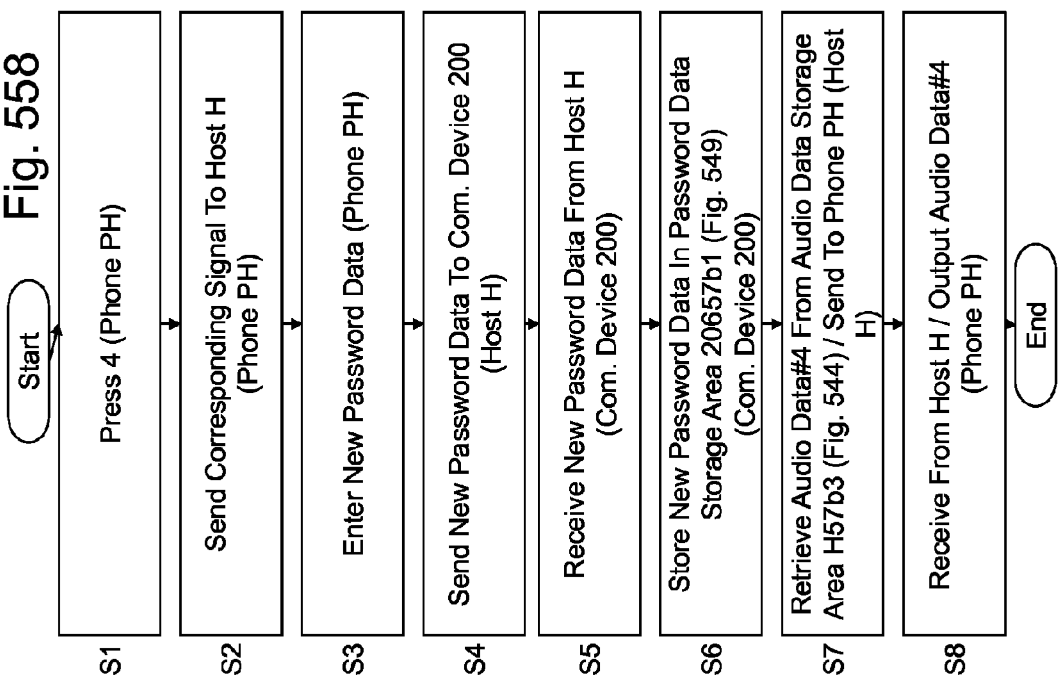

FIG. 558 is a flowchart illustrating an exemplary embodiment of the present invention.

Figure 559:
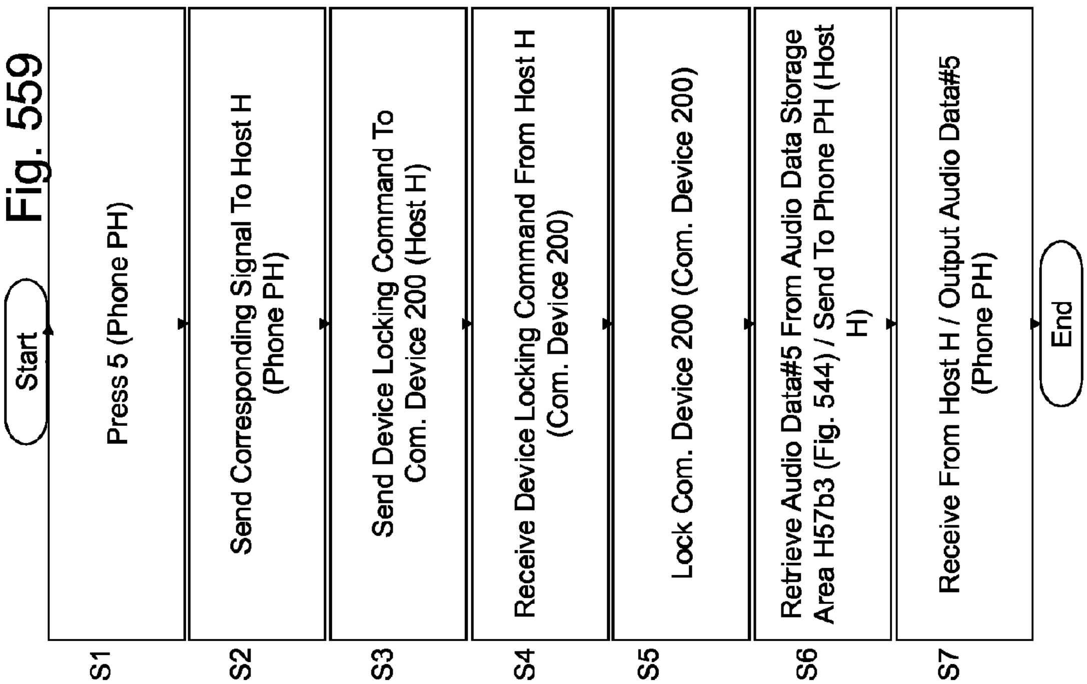

FIG. 559 is a flowchart illustrating an exemplary embodiment of the present invention.

Figure 560:
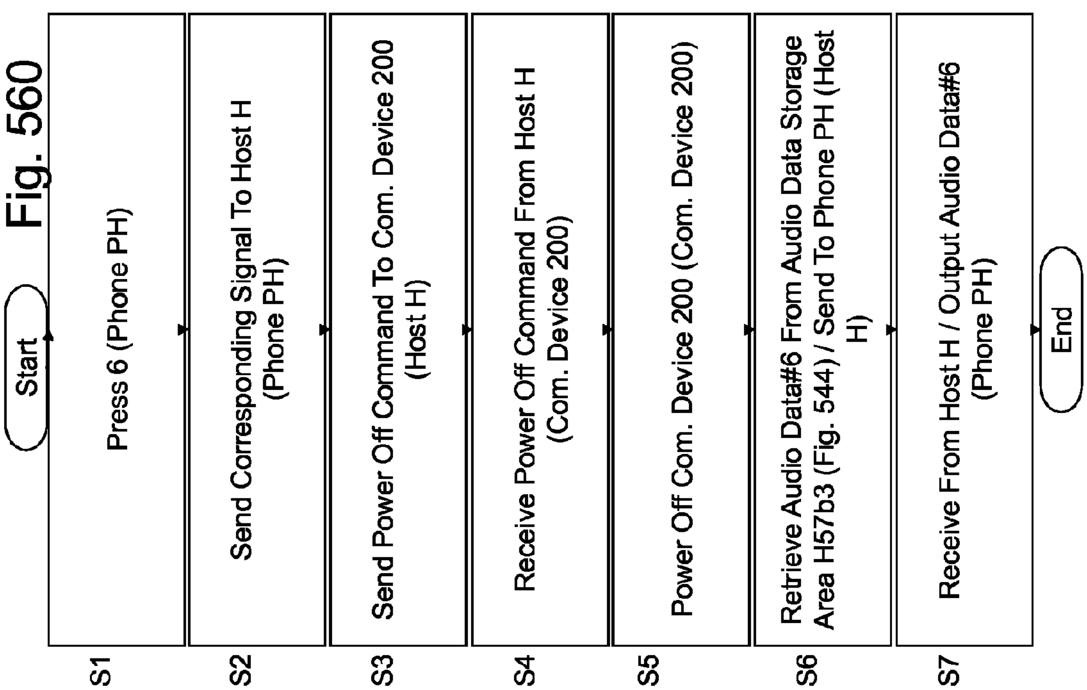

FIG. 560 is a flowchart illustrating an exemplary embodiment of the present invention.

Figure 561:
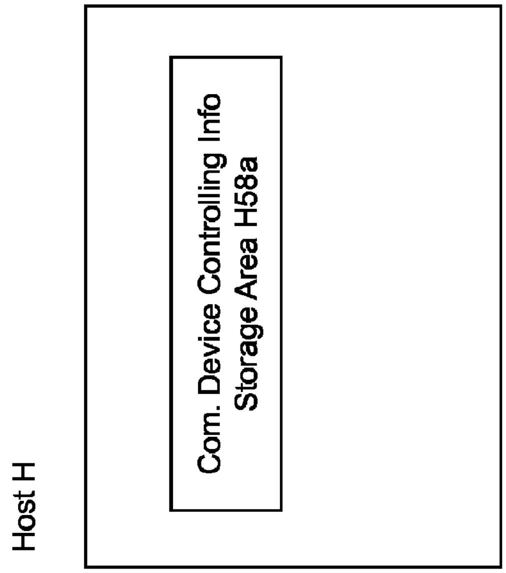

FIG. 561 is a block diagram illustrating an exemplary embodiment of the present invention.

Figure 562:
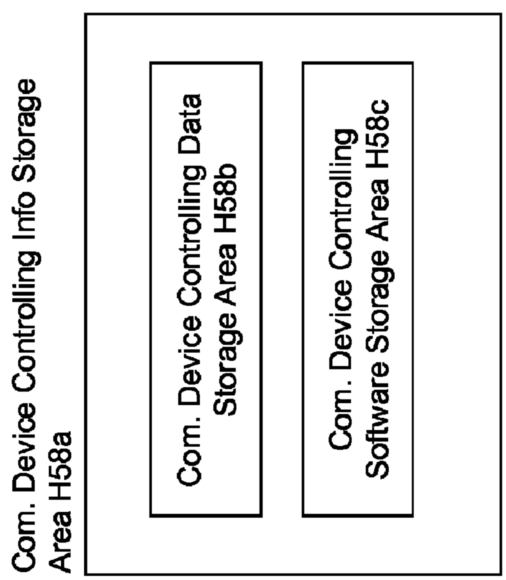

FIG. 562 is a block diagram illustrating an exemplary embodiment of the present invention.

Figures 563, 564:
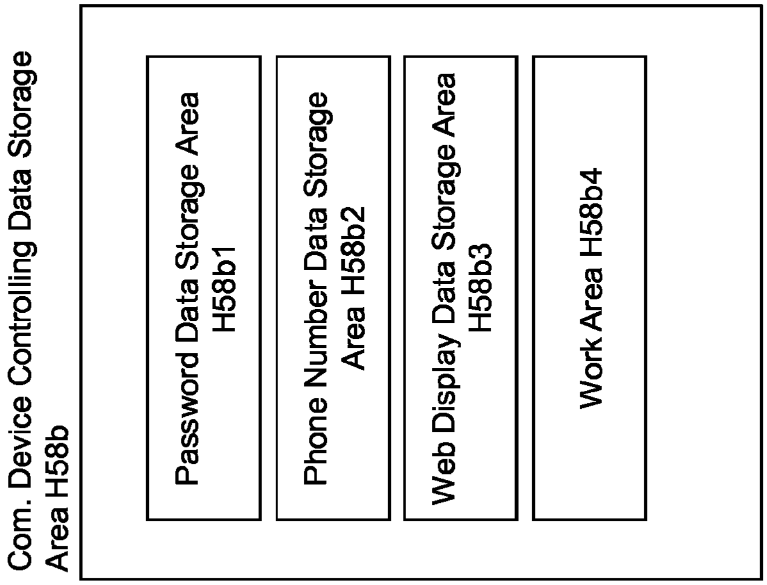

FIG. 563 is a block diagram illustrating an exemplary embodiment of the present invention.

FIG. 564 is a block diagram illustrating an exemplary embodiment of the present invention.

FIG. 565 is a block diagram illustrating an exemplary embodiment of the present invention.

FIG. 566 is a block diagram illustrating an exemplary embodiment of the present invention.

Figure 567:
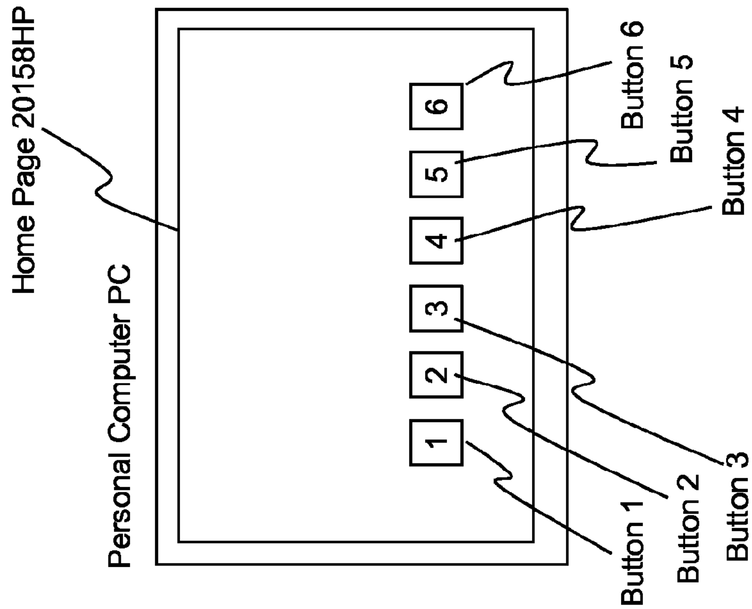

FIG. 567 is a block diagram illustrating an exemplary embodiment of the present invention.

Figure 568:
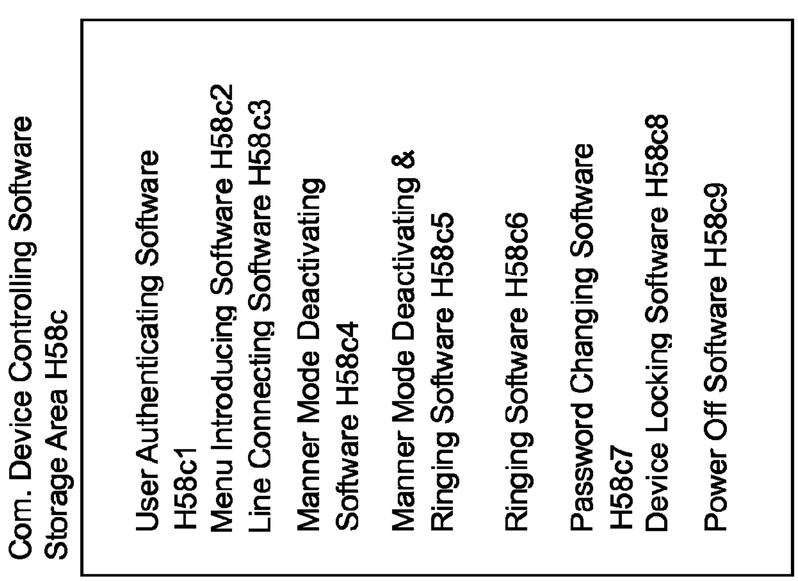

FIG. 568 is a block diagram illustrating an exemplary embodiment of the present invention.

Figure 569:
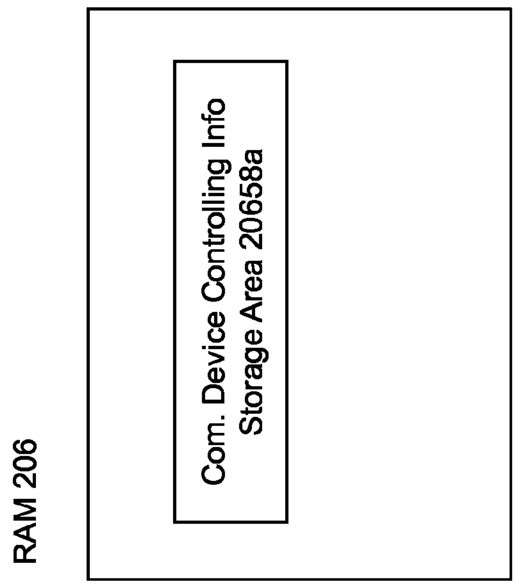

FIG. 569 is a block diagram illustrating an exemplary embodiment of the present invention.

Figure 570:
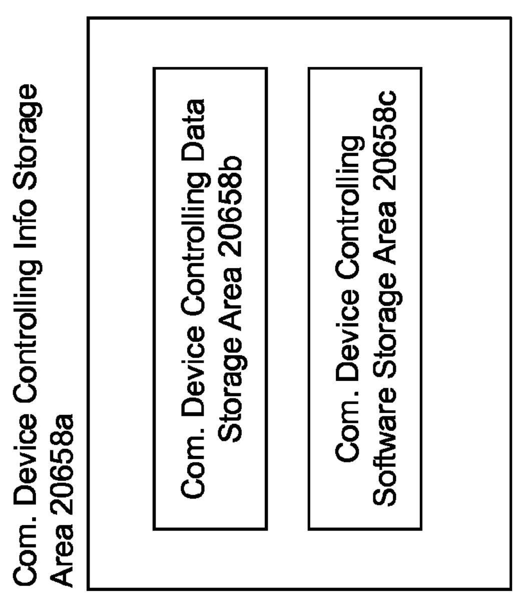

FIG. 570 is a block diagram illustrating an exemplary embodiment of the present invention.

Figure 571:
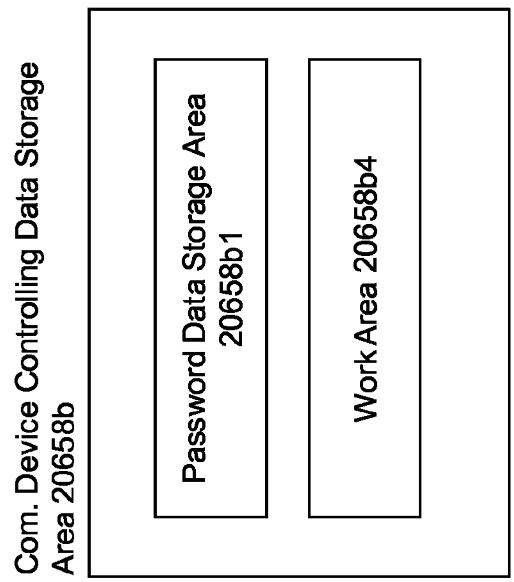

FIG. 571 is a block diagram illustrating an exemplary embodiment of the present invention.

Figure 572:
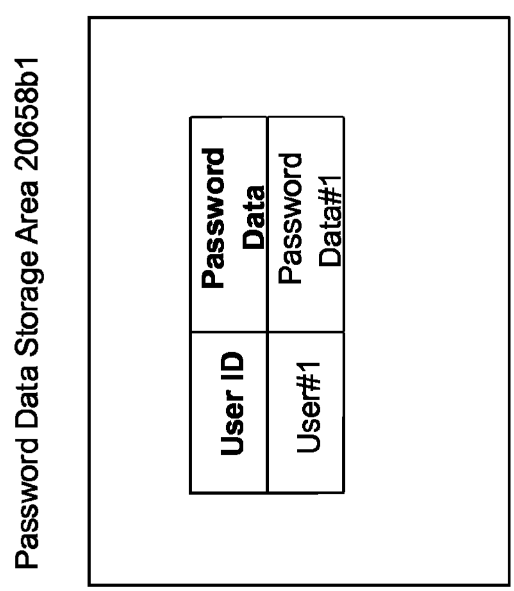

FIG. 572 is a block diagram illustrating an exemplary embodiment of the present invention.

FIG. 573 is a block diagram illustrating an exemplary embodiment of the present invention.

FIG. 574 is a block diagram illustrating an exemplary embodiment of the present invention.

Figure 575:
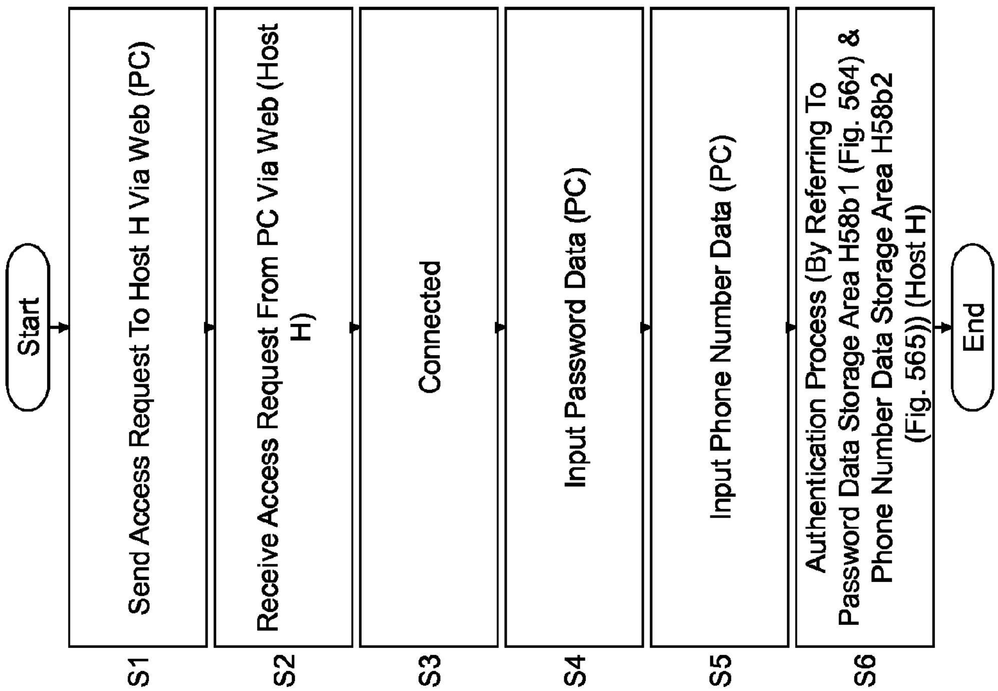

FIG. 575 is a flowchart illustrating an exemplary embodiment of the present invention.

Figure 576:
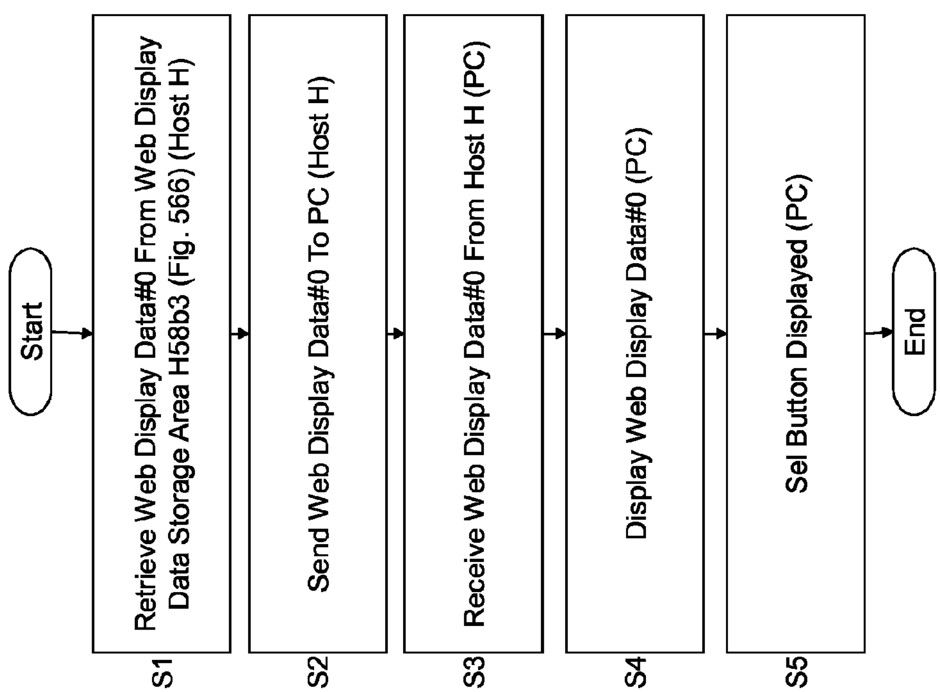

FIG. 576 is a flowchart illustrating an exemplary embodiment of the present invention.

Figure 577:
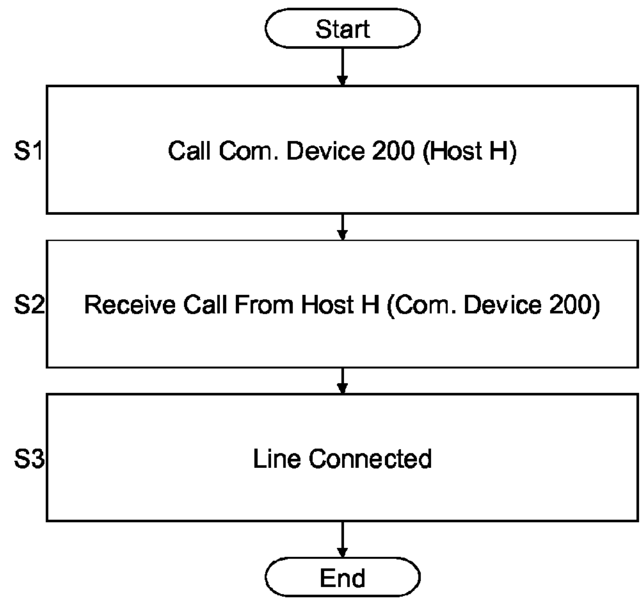

FIG. 577 is a flowchart illustrating an exemplary embodiment of the present invention.

Figure 578:
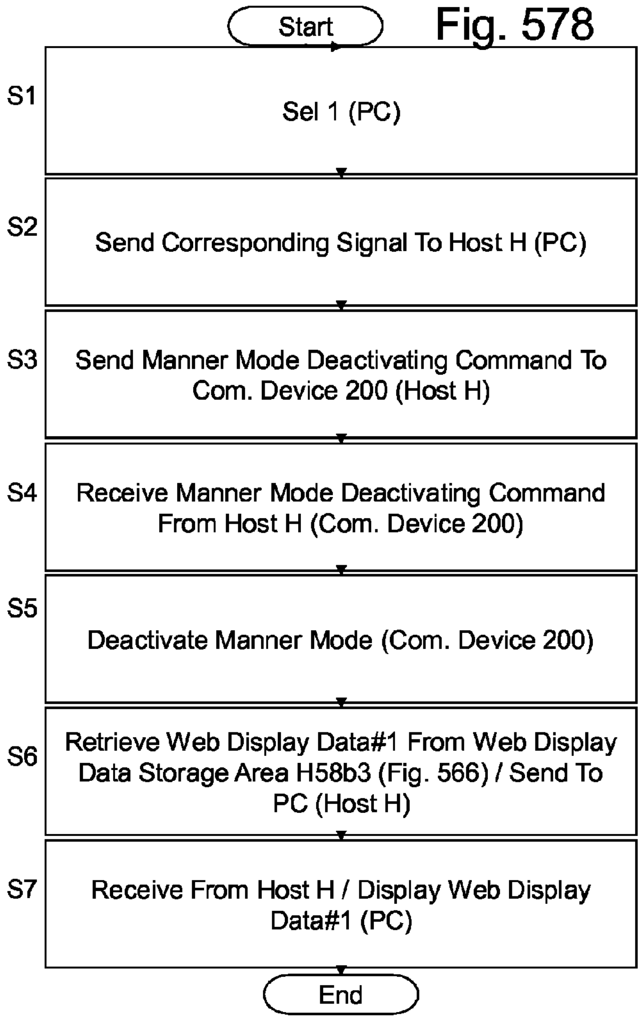

FIG. 578 is a flowchart illustrating an exemplary embodiment of the present invention.

Figure 579:
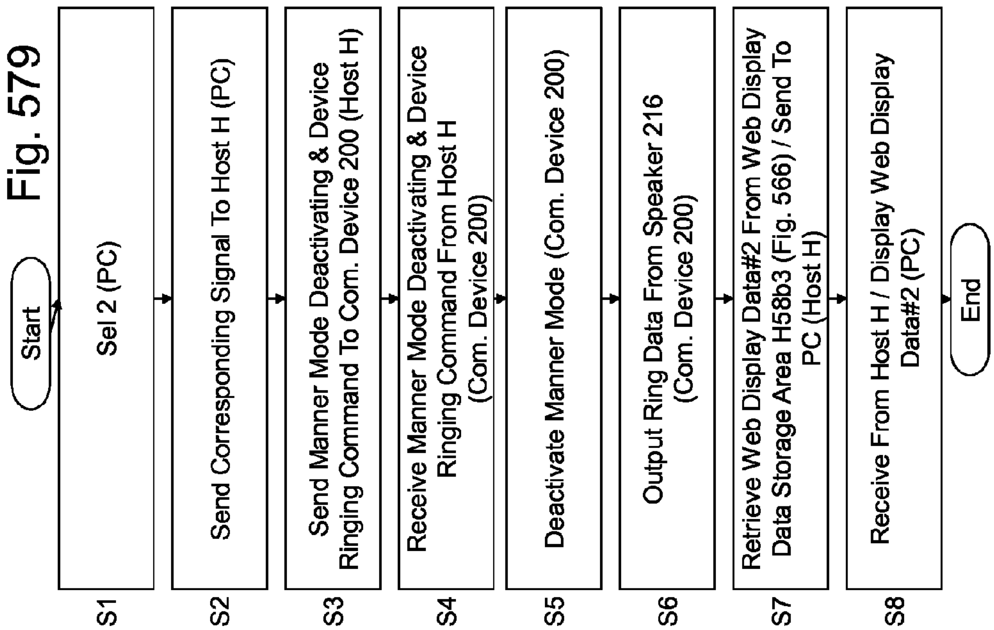

FIG. 579 is a flowchart illustrating an exemplary embodiment of the present invention.

Figure 580:
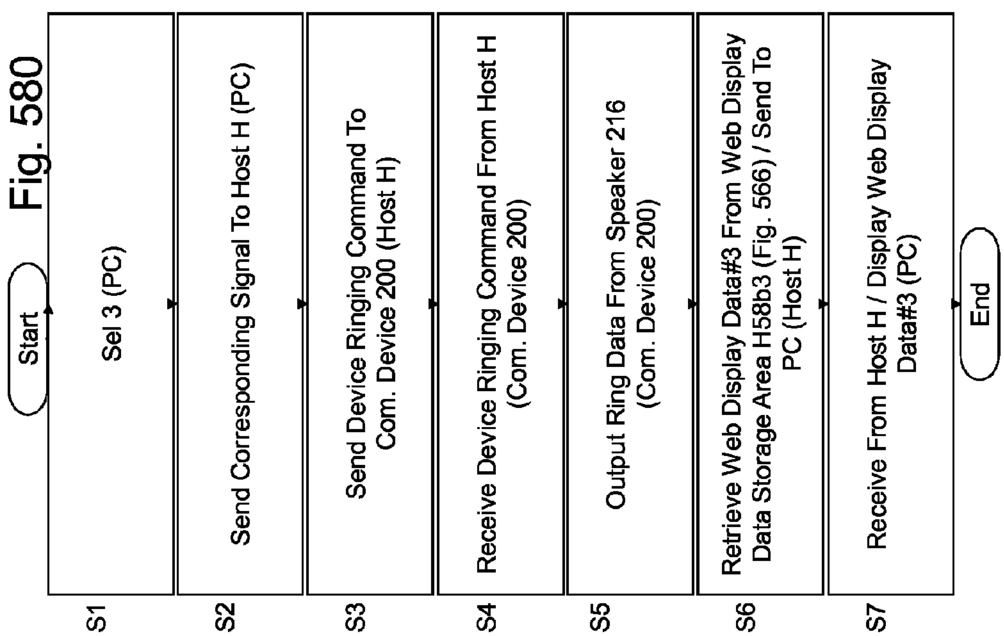

FIG. 580 is a flowchart illustrating an exemplary embodiment of the present invention.

Figure 581:
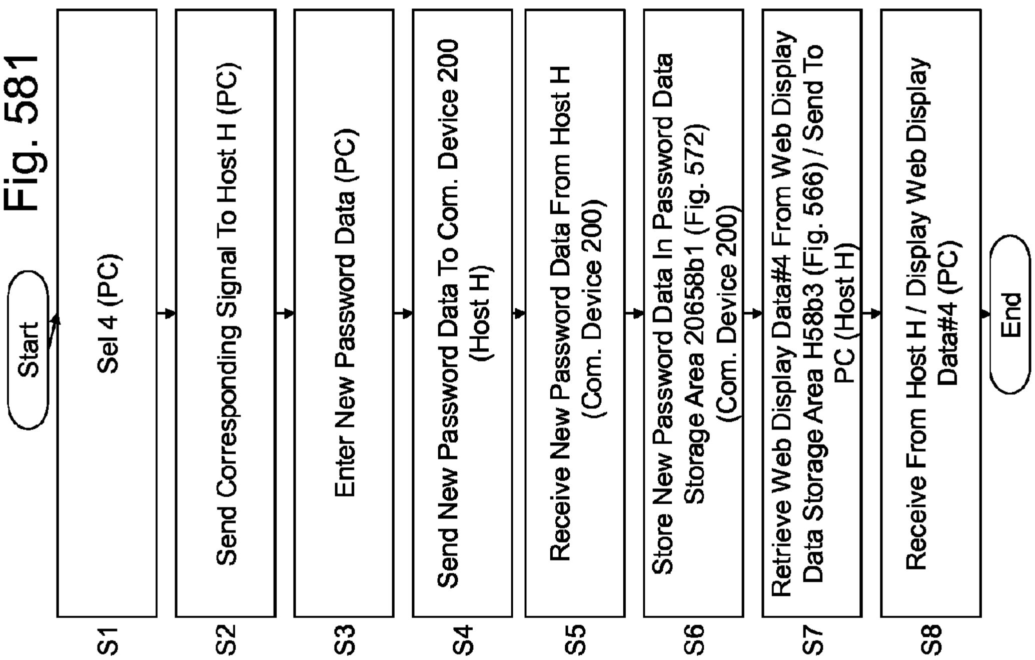

FIG. 581 is a flowchart illustrating an exemplary embodiment of the present invention.

Figure 582:
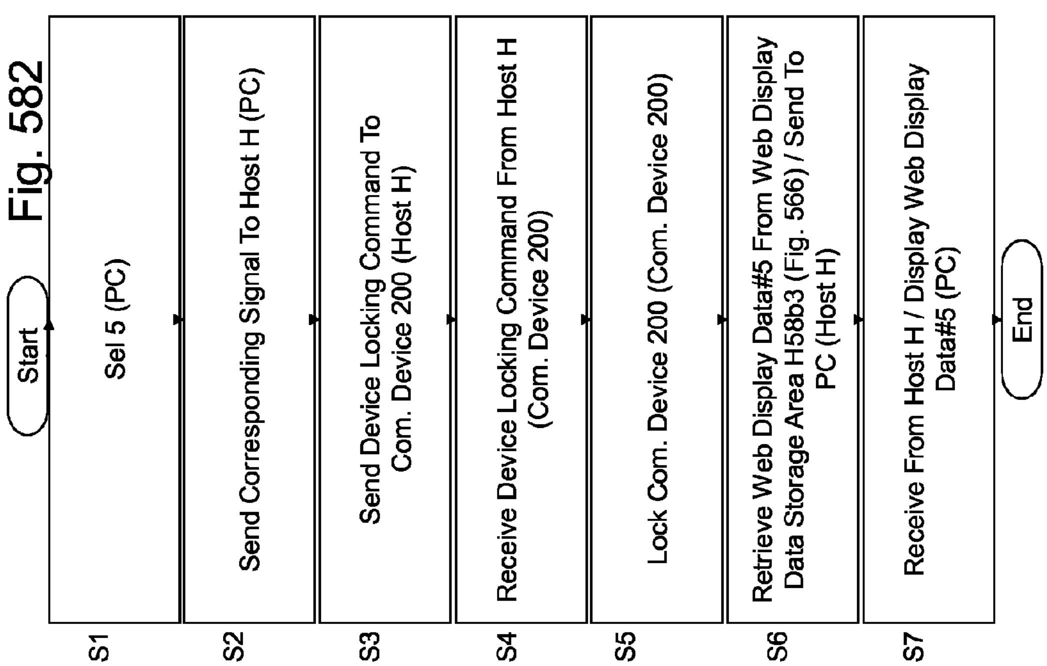

FIG. 582 is a flowchart illustrating an exemplary embodiment of the present invention.

Figure 583:
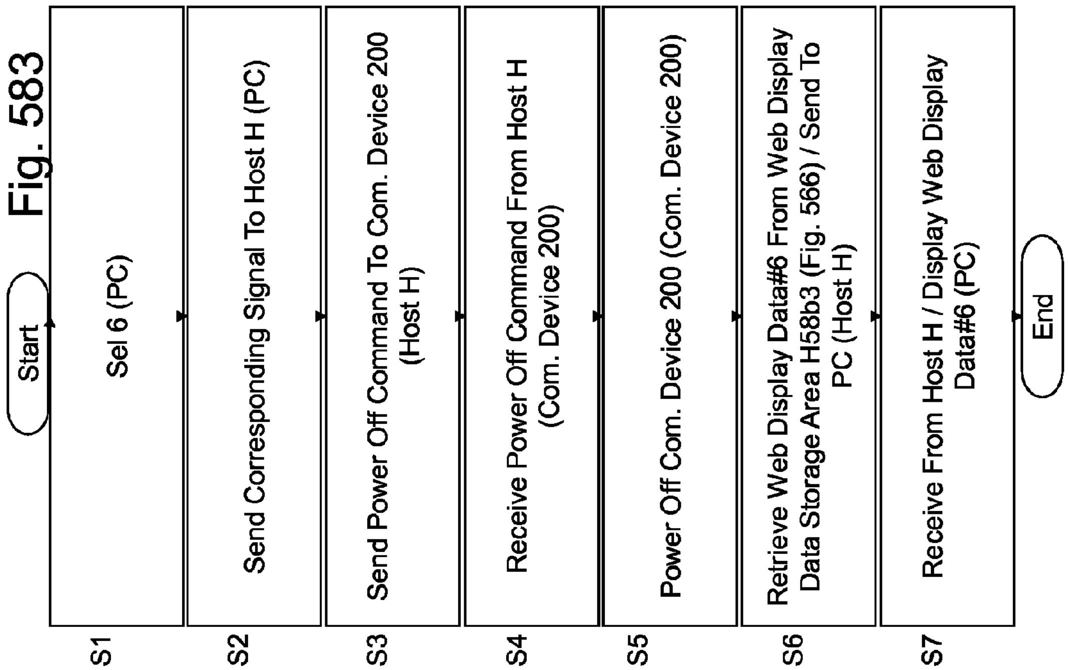

FIG. 583 is a flowchart illustrating an exemplary embodiment of the present invention.

Figure 584:
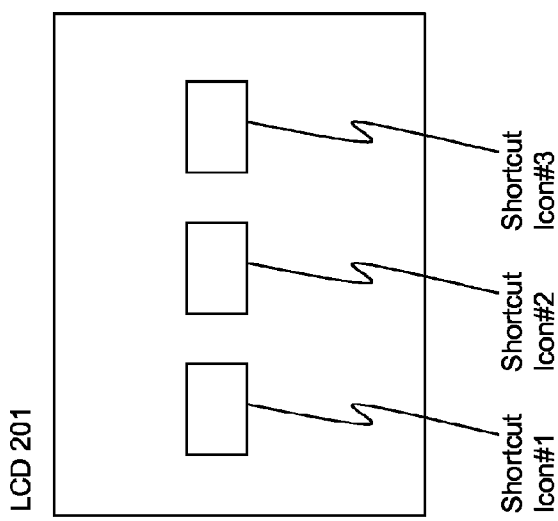

FIG. 584 is a simplified illustration illustrating an exemplary embodiment of the present invention.

Figure 585:
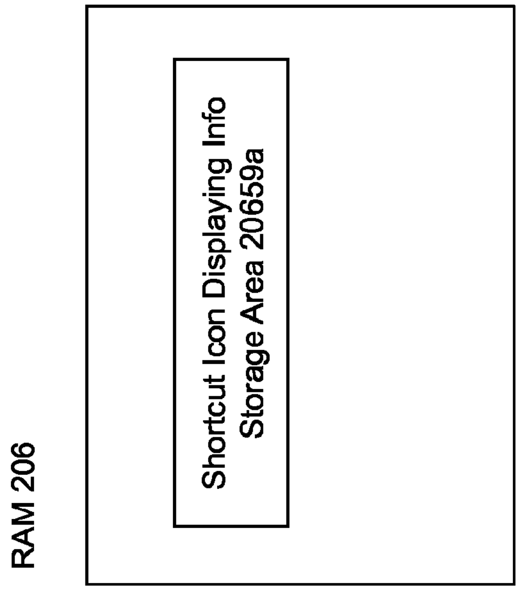

FIG. 585 is a block diagram illustrating an exemplary embodiment of the present invention.

Figure 586:
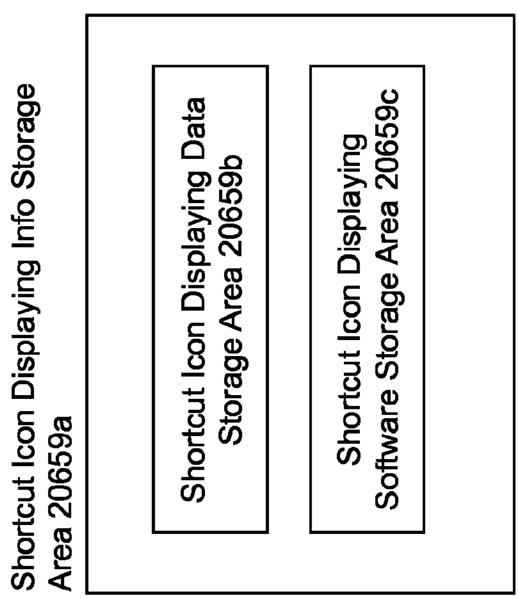

FIG. 586 is a block diagram illustrating an exemplary embodiment of the present invention.

Figures 587, 588:
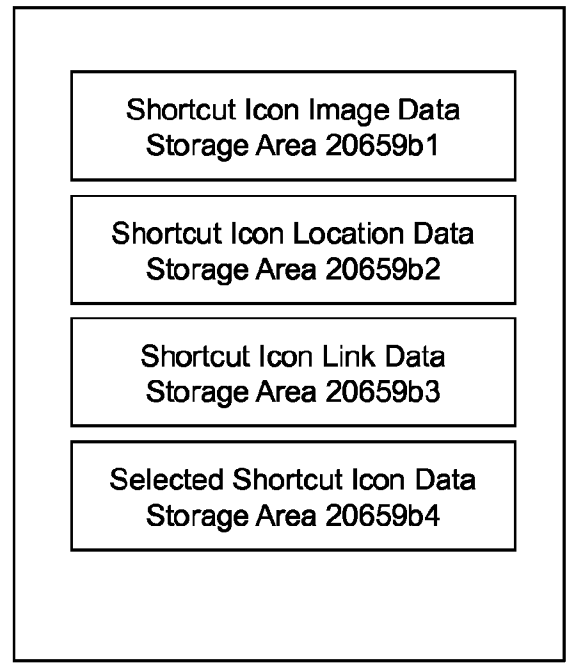

FIG. 587 is a block diagram illustrating an exemplary embodiment of the present invention.

FIG. 588 is a block diagram illustrating an exemplary embodiment of the present invention.

FIG. 589 is a block diagram illustrating an exemplary embodiment of the present invention.

FIG. 590 is a block diagram illustrating an exemplary embodiment of the present invention.

Figure 591:
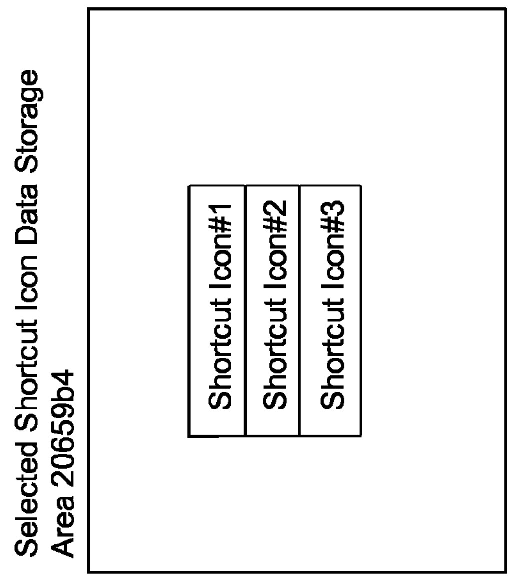

FIG. 591 is a block diagram illustrating an exemplary embodiment of the present invention.

Figure 592:
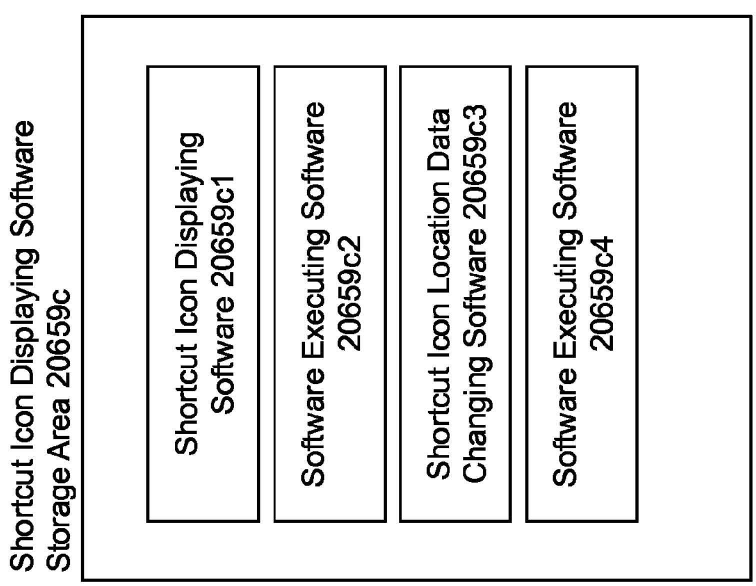

FIG. 592 is a block diagram illustrating an exemplary embodiment of the present invention.

FIG. 593 is a flowchart illustrating an exemplary embodiment of the present invention.

FIG. 594 is a flowchart illustrating an exemplary embodiment of the present invention.

Figure 595:
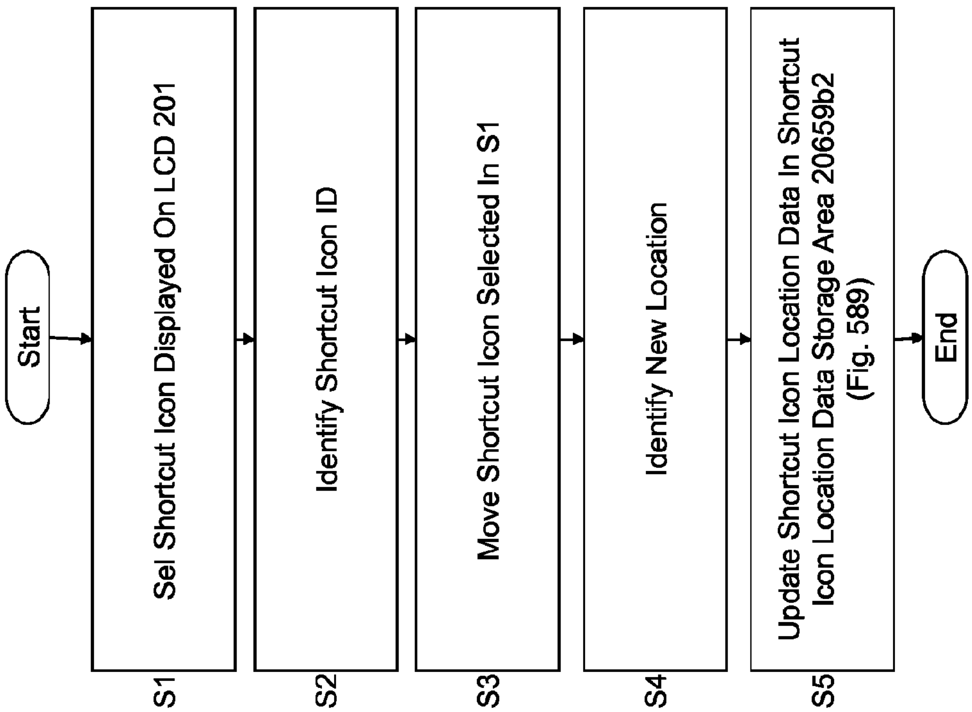

FIG. 595 is a flowchart illustrating an exemplary embodiment of the present invention.

Figure 596:
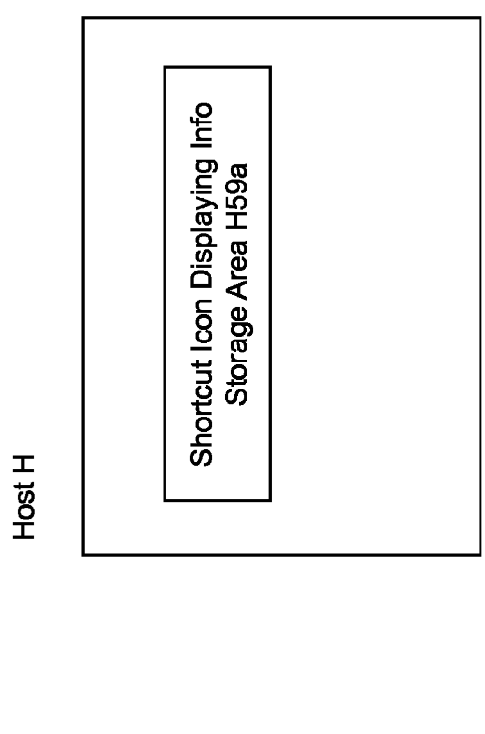

FIG. 596 is a block diagram illustrating an exemplary embodiment of the present invention.

Figure 597:
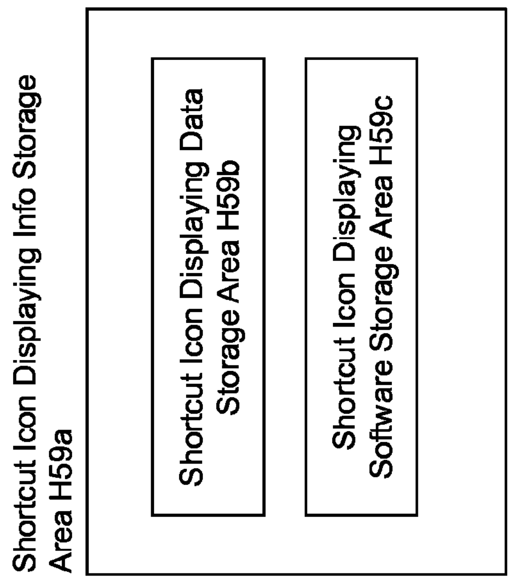

FIG. 597 is a block diagram illustrating an exemplary embodiment of the present invention.

Figure 598:

FIG. 598 is a block diagram illustrating an exemplary embodiment of the present invention.

Figures 599, 600:
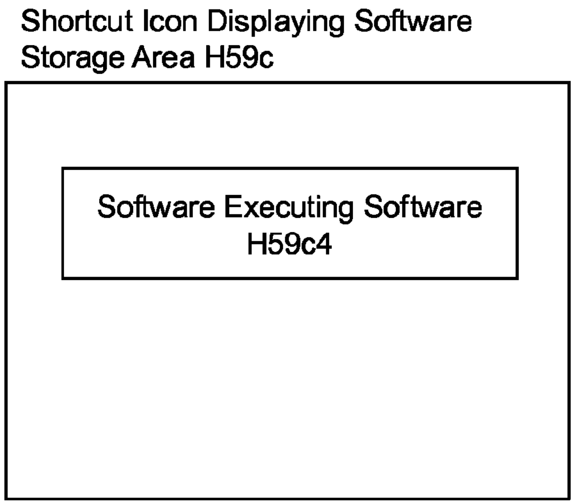

FIG. 599 is a block diagram illustrating an exemplary embodiment of the present invention.

FIG. 600 is a block diagram illustrating an exemplary embodiment of the present invention.

Figure 601:
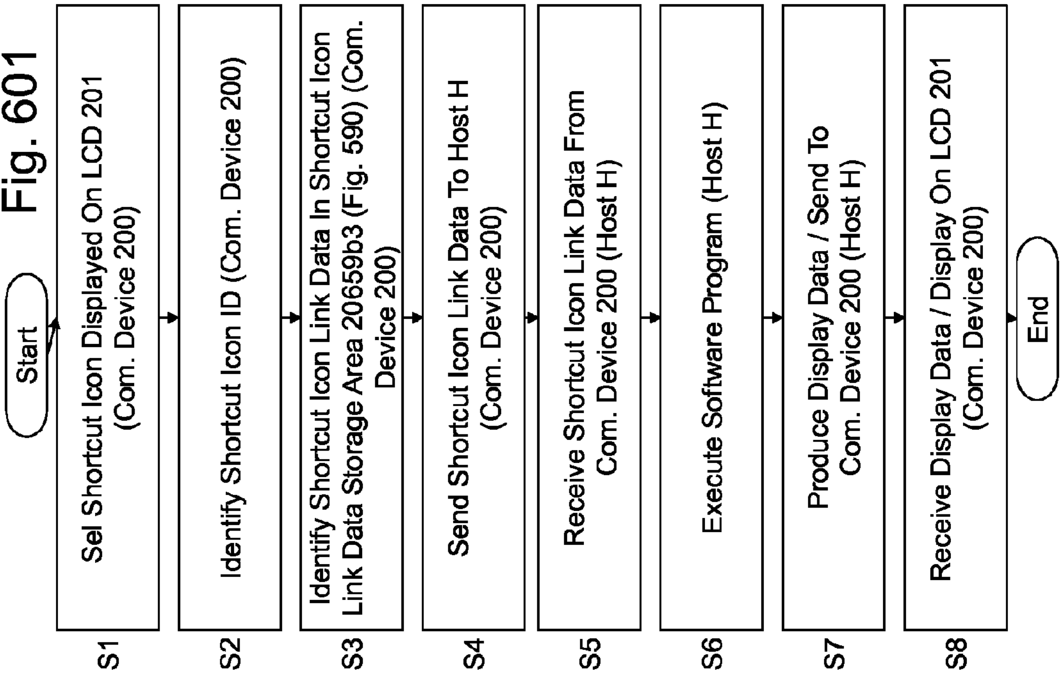

FIG. 601 is a flowchart illustrating an exemplary embodiment of the present invention.

Figure 602:
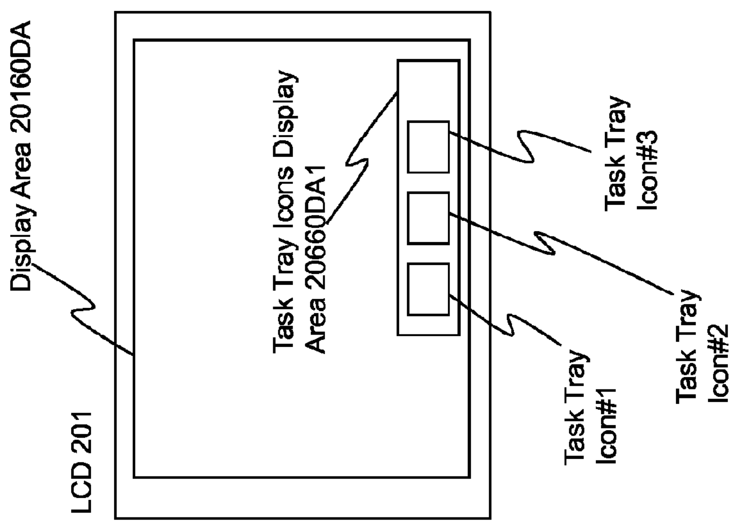

FIG. 602 is a simplified illustration illustrating an exemplary embodiment of the present invention.

Figure 603:
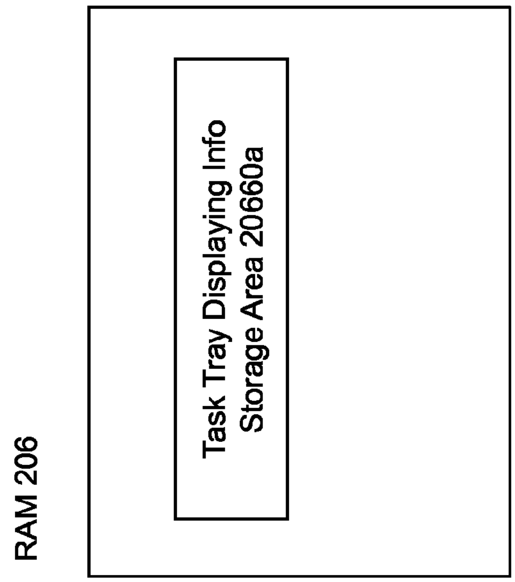

FIG. 603 is a block diagram illustrating an exemplary embodiment of the present invention.

Figure 604:
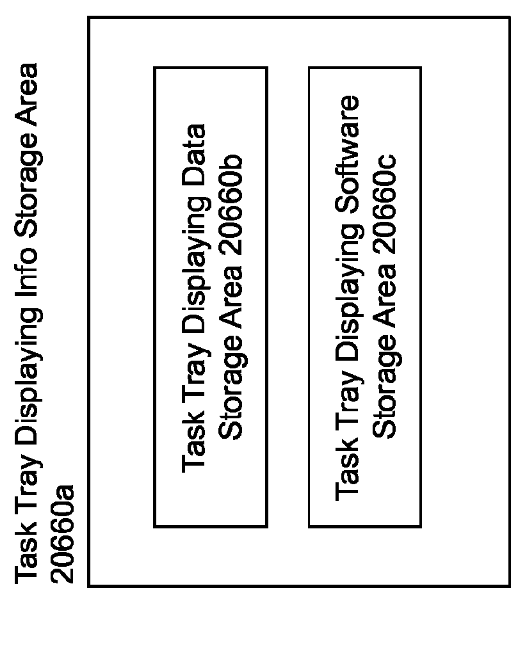

FIG. 604 is a block diagram illustrating an exemplary embodiment of the present invention.

Figures 605, 606:
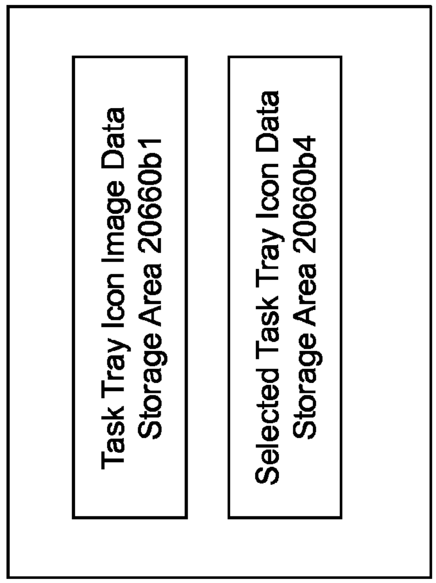

FIG. 605 is a block diagram illustrating an exemplary embodiment of the present invention.

FIG. 606 is a block diagram illustrating an exemplary embodiment of the present invention.

FIG. 607 is a block diagram illustrating an exemplary embodiment of the present invention.

FIG. 608 is a block diagram illustrating an exemplary embodiment of the present invention.

Figure 609:
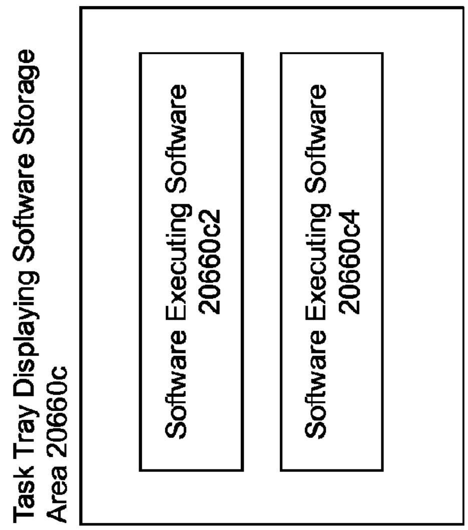

FIG. 609 is a block diagram illustrating an exemplary embodiment of the present invention.

Figure 610:
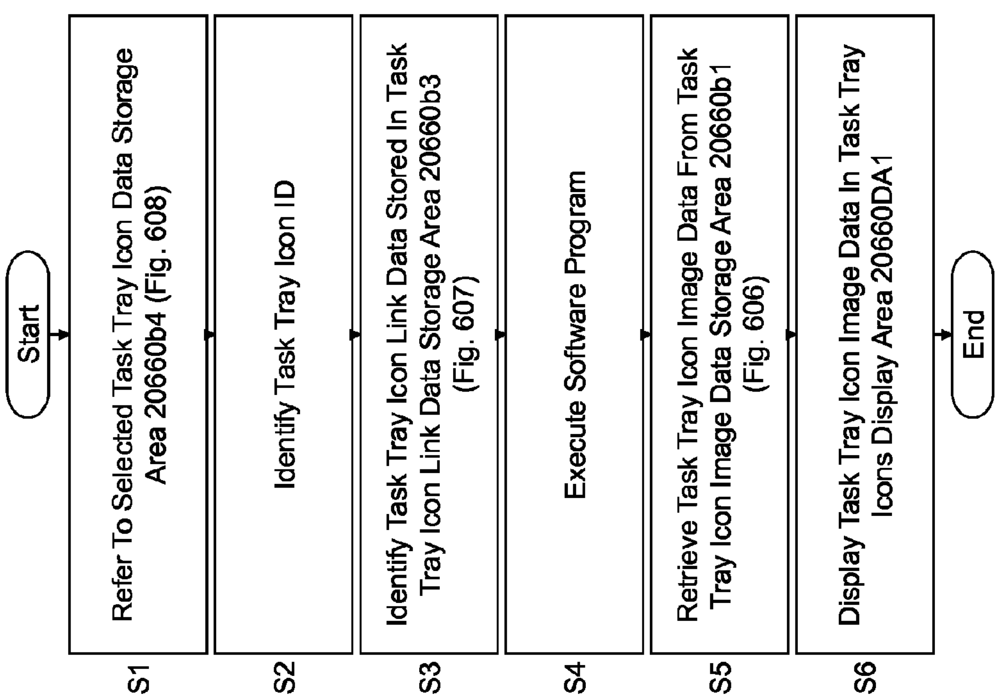

FIG. 610 is a flowchart illustrating an exemplary embodiment of the present invention.

Figure 611:
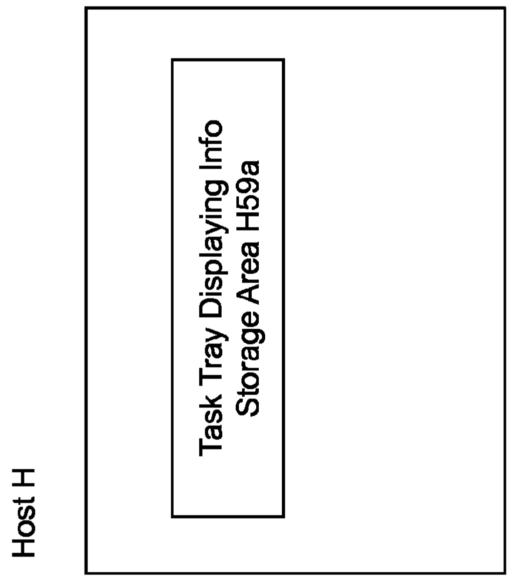

FIG. 611 is a block diagram illustrating an exemplary embodiment of the present invention.

Figure 612:
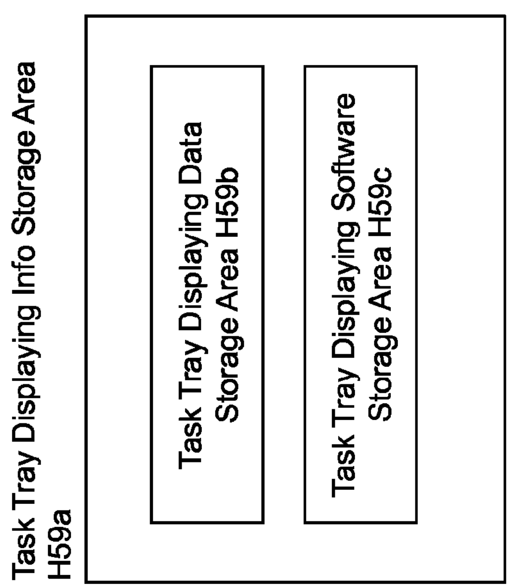

FIG. 612 is a block diagram illustrating an exemplary embodiment of the present invention.

Figures 613, 614:
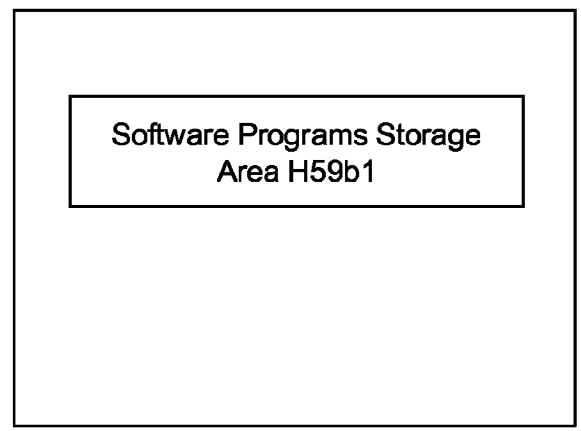

FIG. 613 is a block diagram illustrating an exemplary embodiment of the present invention.

FIG. 614 is a block diagram illustrating an exemplary embodiment of the present invention.

Figure 615:
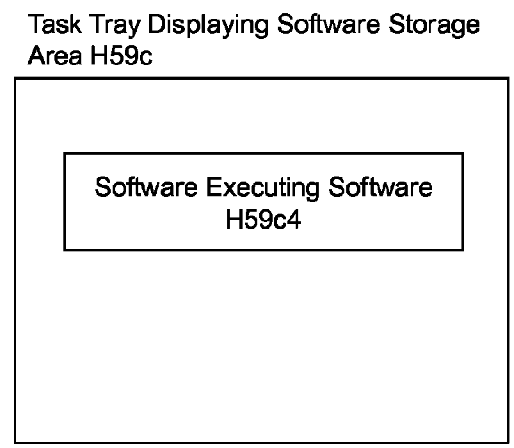

FIG. 615 is a block diagram illustrating an exemplary embodiment of the present invention.

Figure 616:
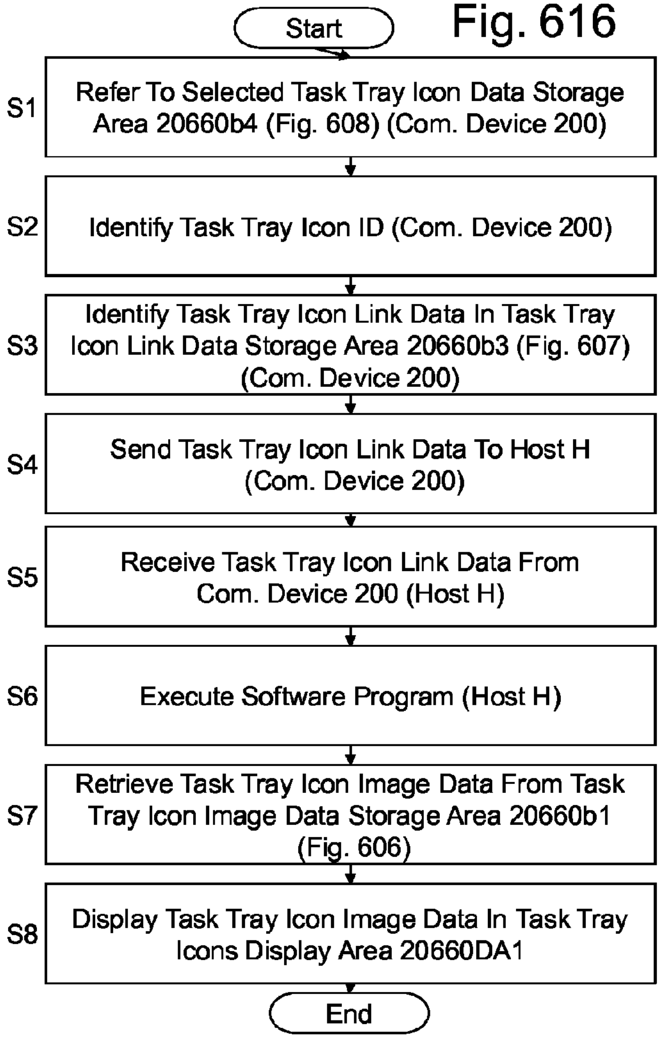

FIG. 616 is a flowchart illustrating an exemplary embodiment of the present invention.

Figure 617:
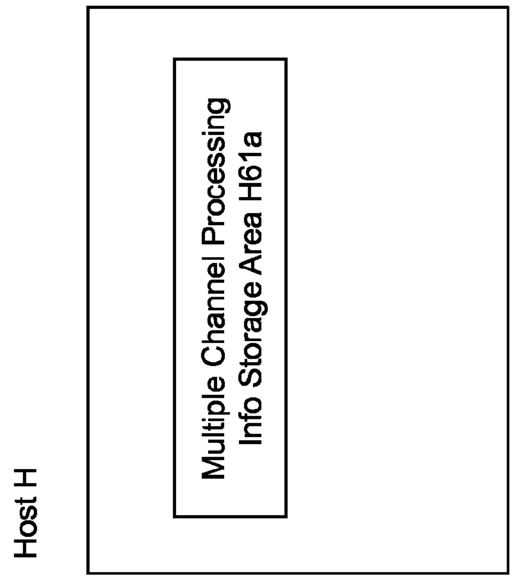

FIG. 617 is a block diagram illustrating an exemplary embodiment of the present invention.

Figure 618:
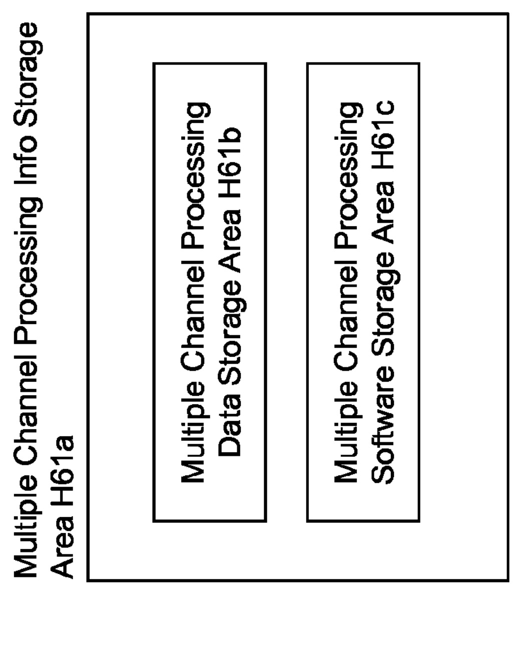

FIG. 618 is a block diagram illustrating an exemplary embodiment of the present invention.

Figure 619:
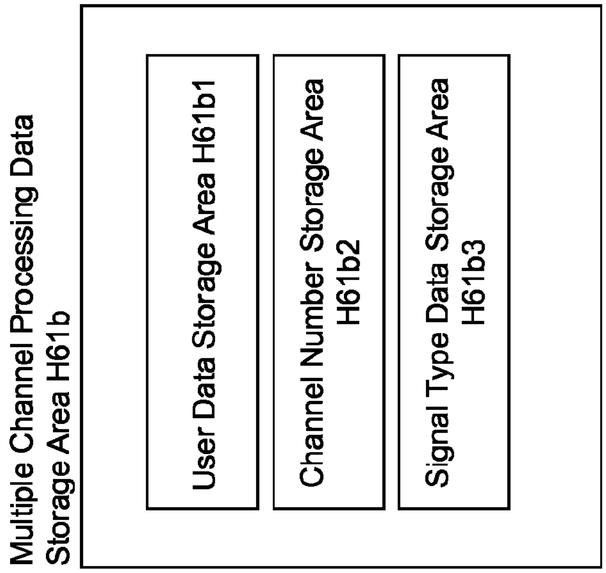

FIG. 619 is a block diagram illustrating an exemplary embodiment of the present invention.

Figure 620:
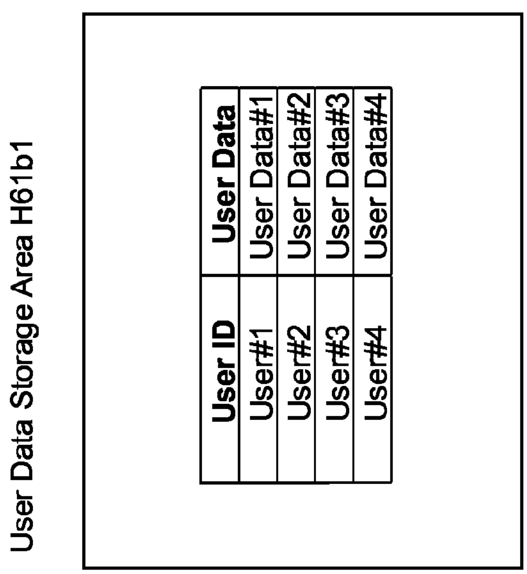

FIG. 620 is a block diagram illustrating an exemplary embodiment of the present invention.

FIG. 621 is a block diagram illustrating an exemplary embodiment of the present invention.

FIG. 622 is a block diagram illustrating an exemplary embodiment of the present invention.

FIG. 623 is a block diagram illustrating an exemplary embodiment of the present invention.

FIG. 624 is a block diagram illustrating an exemplary embodiment of the present invention.

Figure 625:
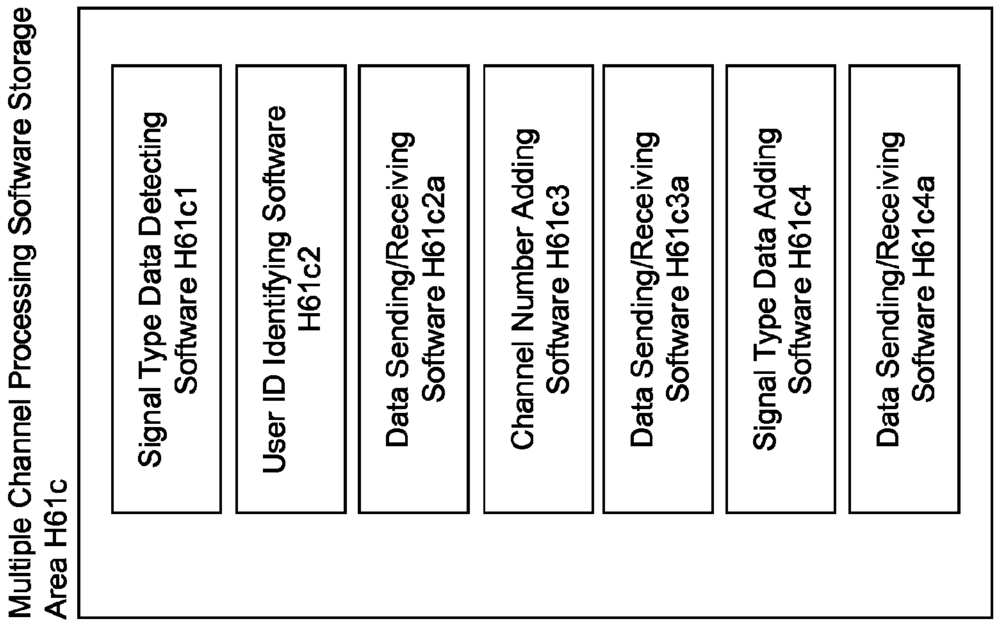

FIG. 625 is a block diagram illustrating an exemplary embodiment of the present invention.

Figure 626:
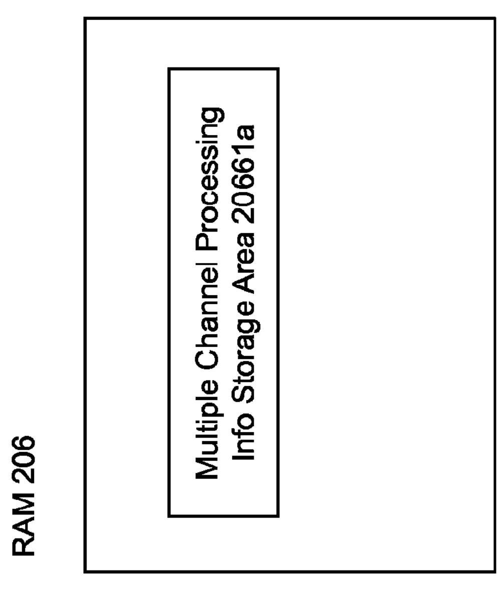

FIG. 626 is a block diagram illustrating an exemplary embodiment of the present invention.

Figure 627:
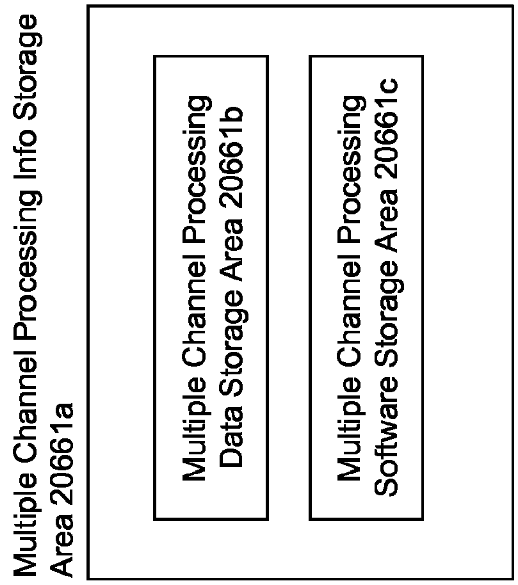

FIG. 627 is a block diagram illustrating an exemplary embodiment of the present invention.

Figure 628:
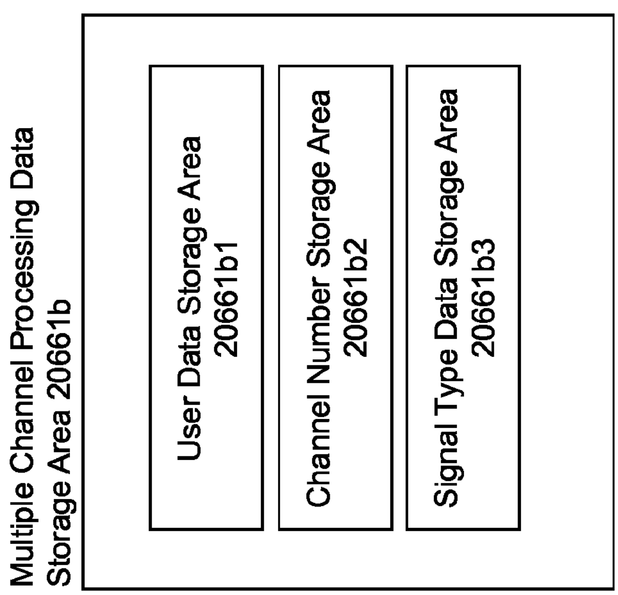

FIG. 628 is a block diagram illustrating an exemplary embodiment of the present invention.

FIG. 629 is a block diagram illustrating an exemplary embodiment of the present invention.

FIG. 630 is a block diagram illustrating an exemplary embodiment of the present invention.

FIG. 631 is a block diagram illustrating an exemplary embodiment of the present invention.

FIG. 632 is a block diagram illustrating an exemplary embodiment of the present invention.

Figures 633, 634:
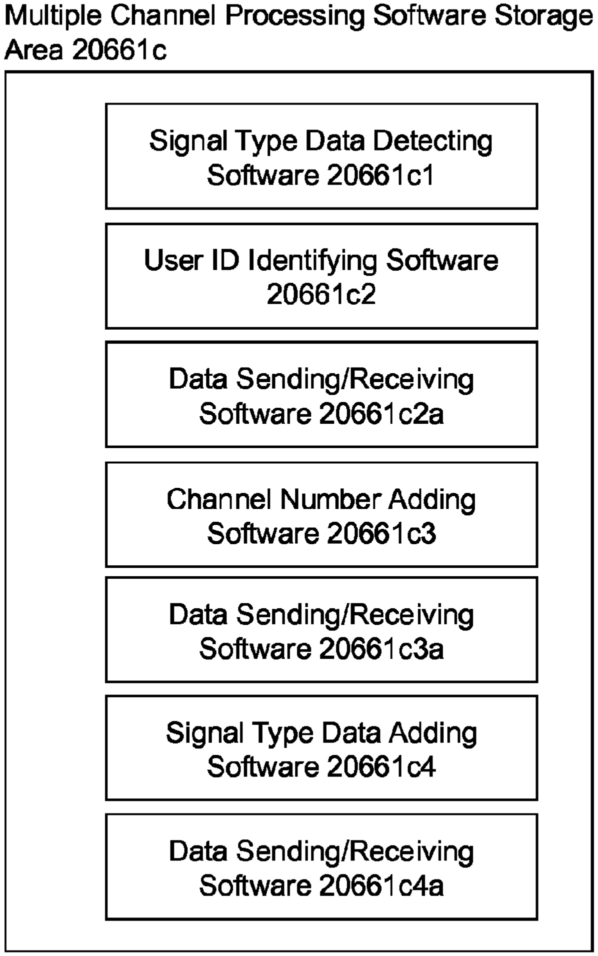

FIG. 633 is a block diagram illustrating an exemplary embodiment of the present invention.

FIG. 634 is a block diagram illustrating an exemplary embodiment of the present invention.

Figure 635:
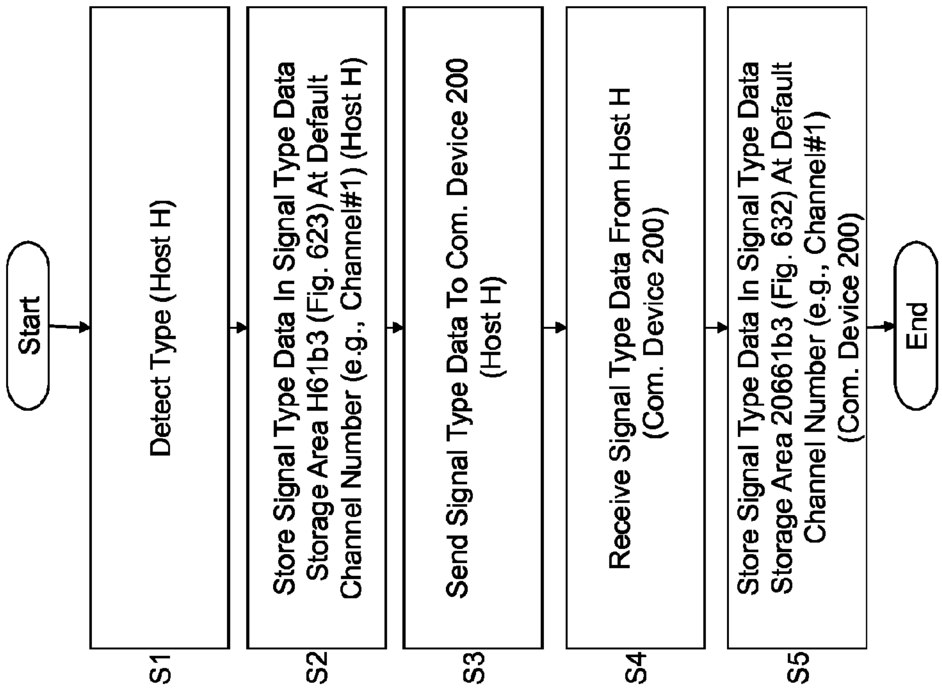

FIG. 635 is a flowchart illustrating an exemplary embodiment of the present invention.

Figure 636:
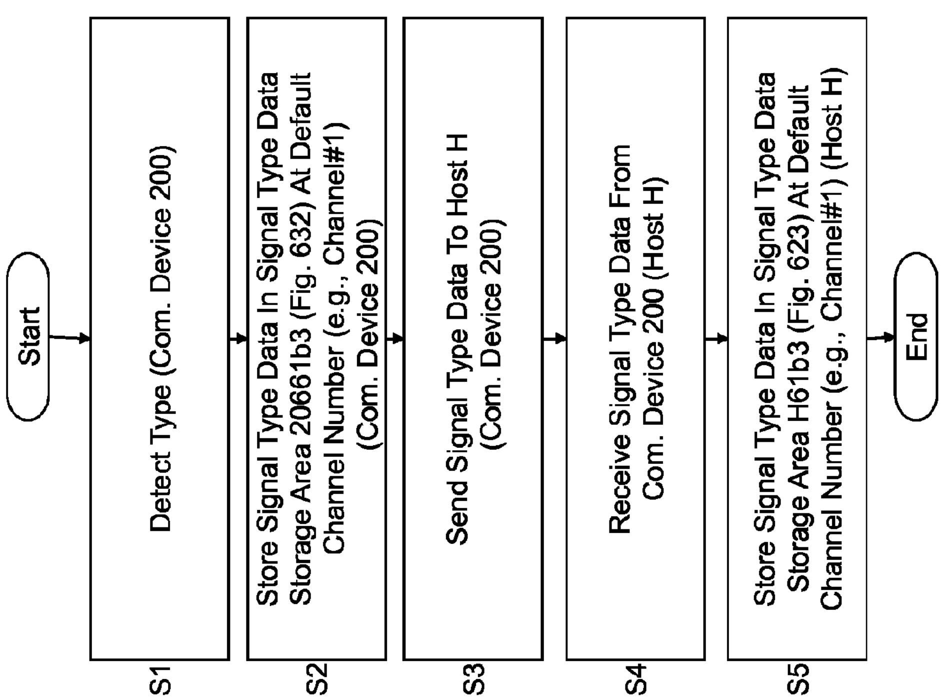

FIG. 636 is a flowchart illustrating an exemplary embodiment of the present invention.

Figure 637:
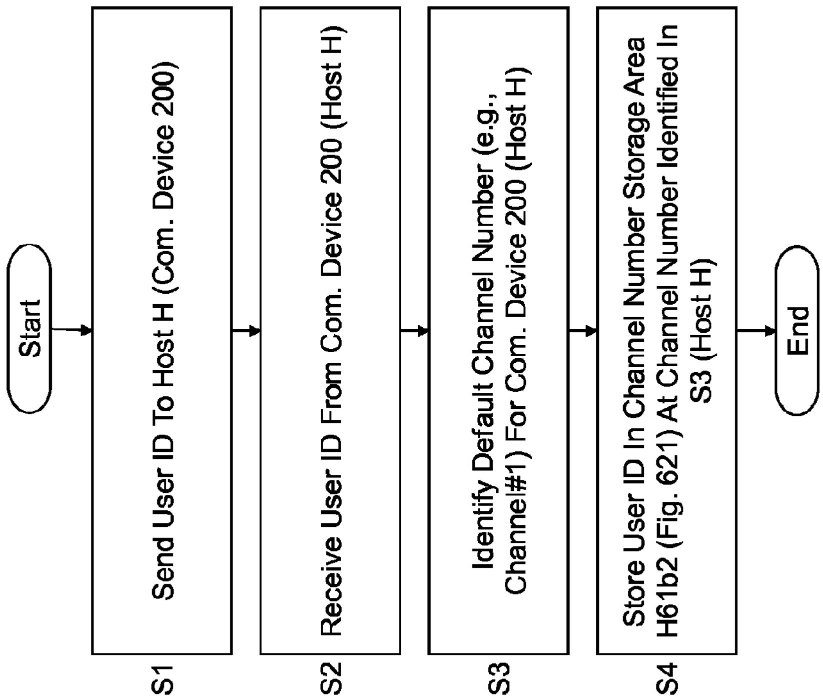

FIG. 637 is a flowchart illustrating an exemplary embodiment of the present invention.

Figure 638:
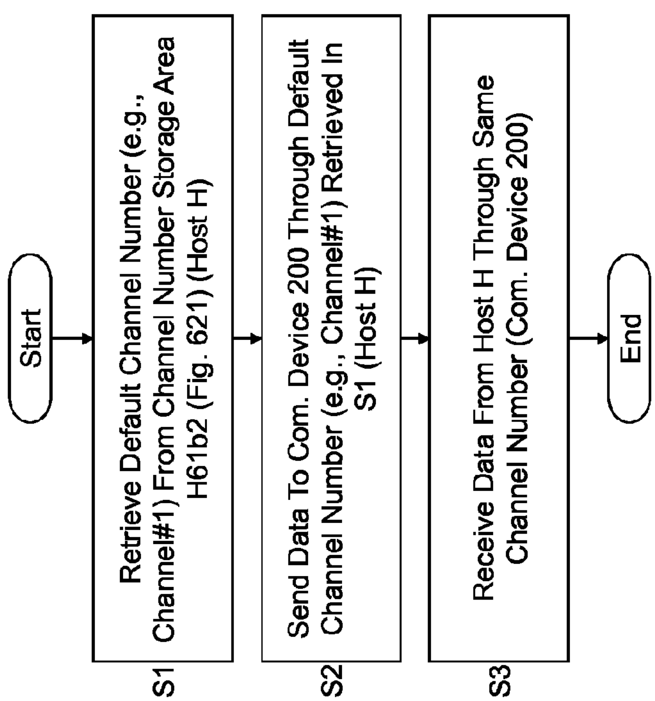

FIG. 638 is a flowchart illustrating an exemplary embodiment of the present invention.

Figure 639:
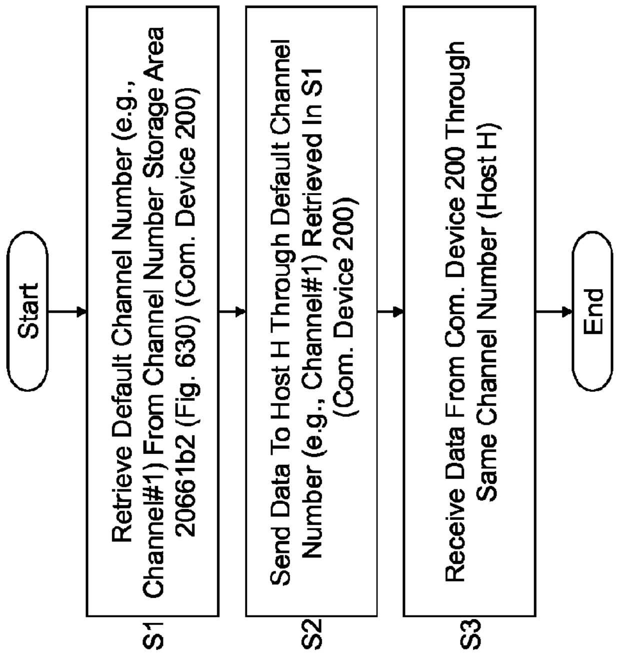

FIG. 639 is a flowchart illustrating an exemplary embodiment of the present invention.

Figure 640:
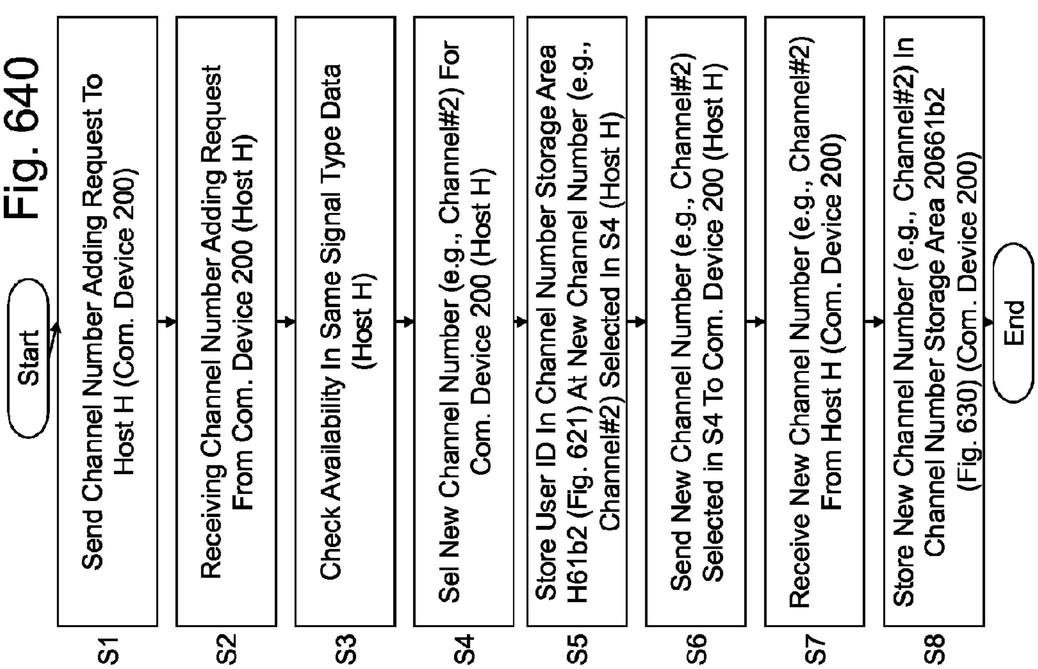

FIG. 640 is a flowchart illustrating an exemplary embodiment of the present invention.

Figure 641:
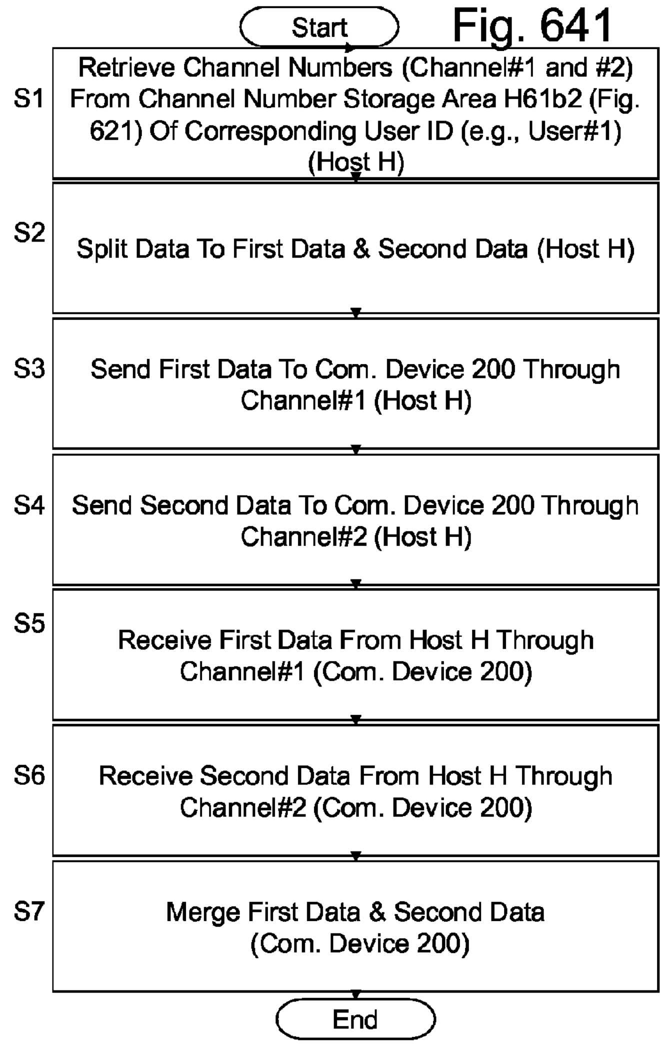

FIG. 641 is a flowchart illustrating an exemplary embodiment of the present invention.

Figure 642:
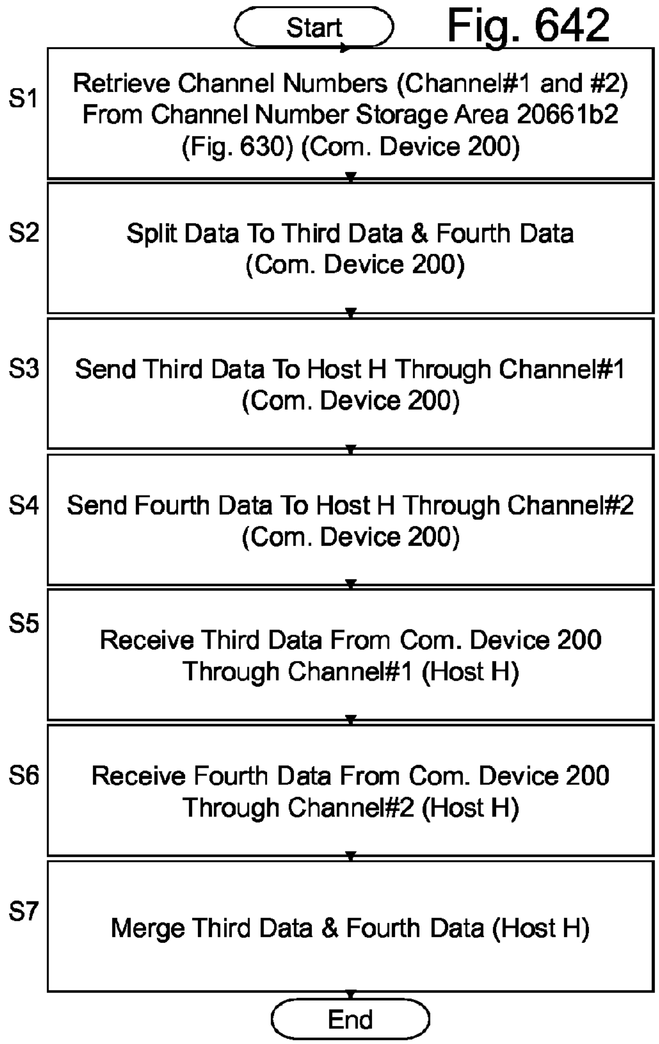

FIG. 642 is a flowchart illustrating an exemplary embodiment of the present invention.

Figure 643:
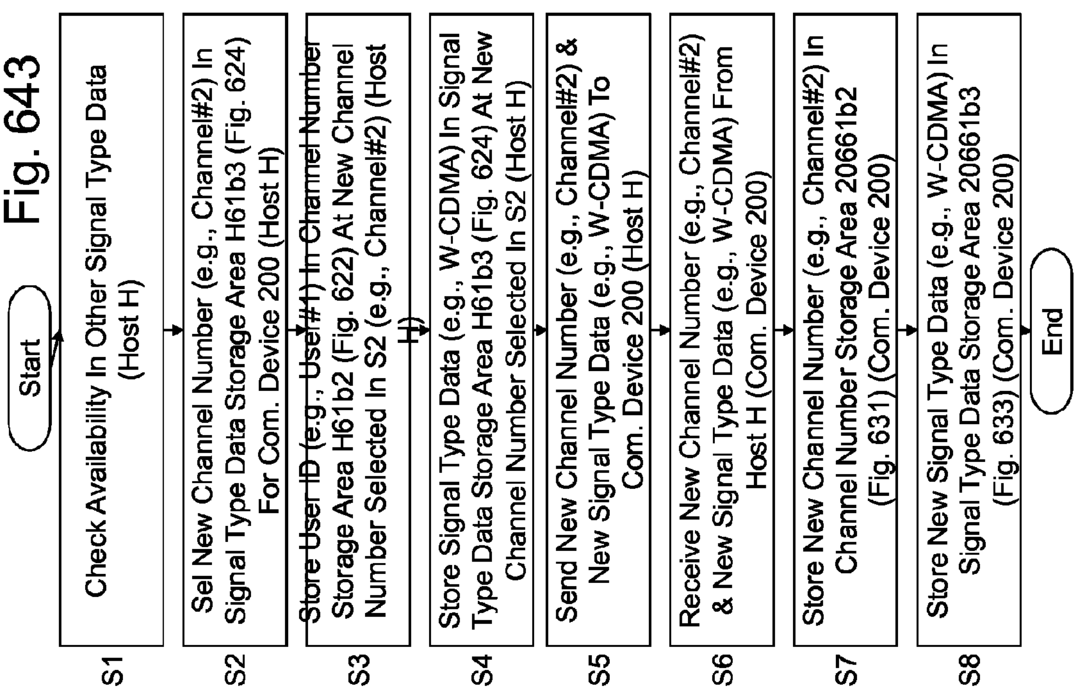

FIG. 643 is a flowchart illustrating an exemplary embodiment of the present invention.

Figure 644:
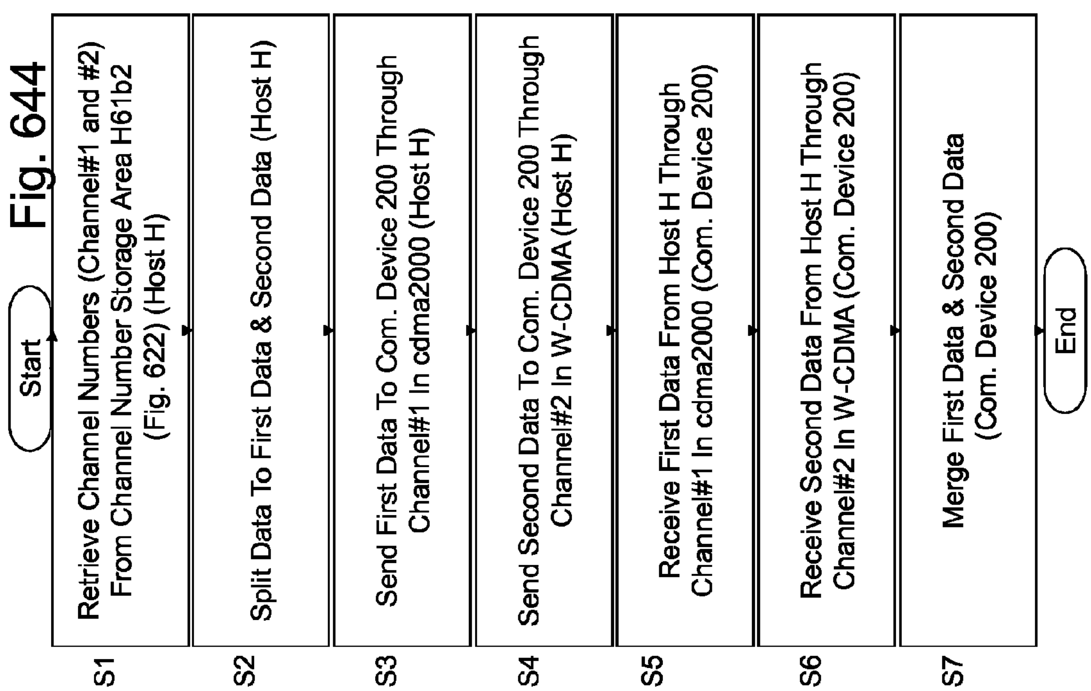

FIG. 644 is a flowchart illustrating an exemplary embodiment of the present invention.

Figure 645:
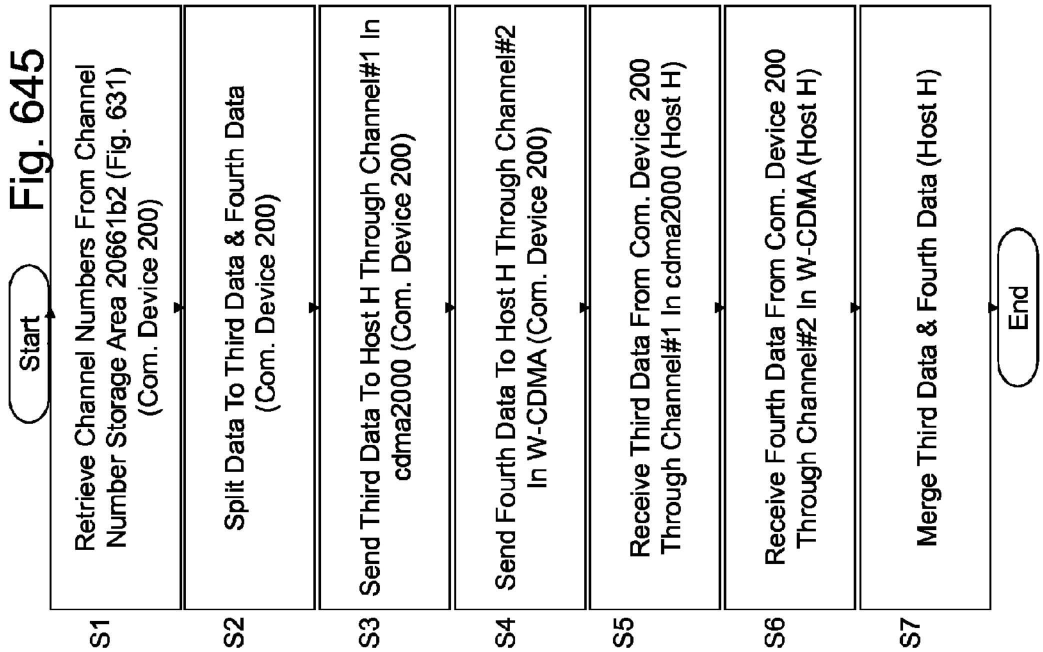

FIG. 645 is a flowchart illustrating an exemplary embodiment of the present invention.

Figure 646:
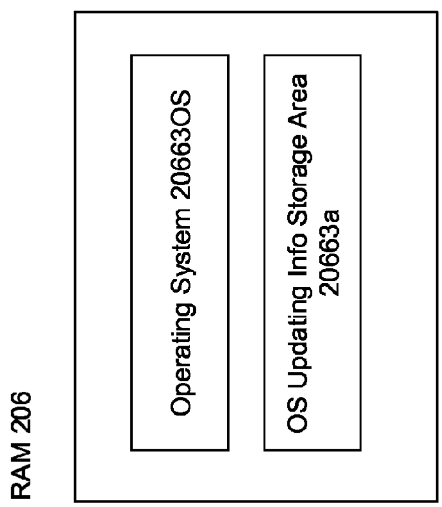

FIG. 646 is a block diagram illustrating an exemplary embodiment of the present invention.

FIG. 647 is a block diagram illustrating an exemplary embodiment of the present invention.

FIG. 648 is a block diagram illustrating an exemplary embodiment of the present invention.

Figure 649:
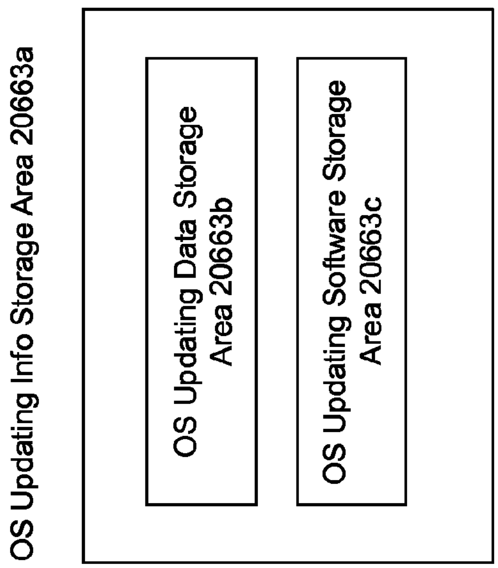

FIG. 649 is a block diagram illustrating an exemplary embodiment of the present invention.

Figure 650:
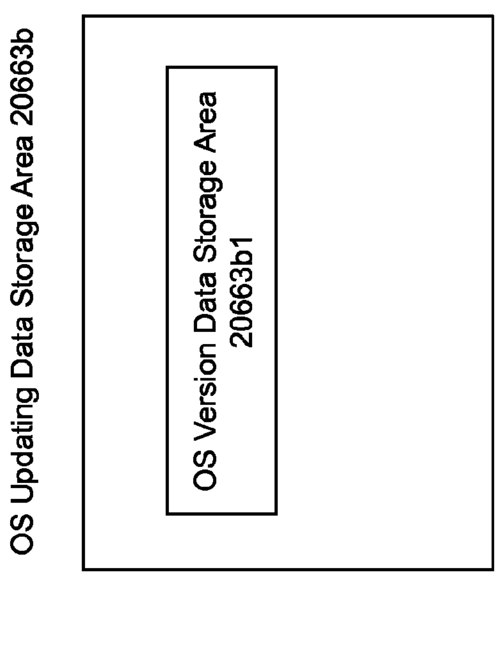

FIG. 650 is a block diagram illustrating an exemplary embodiment of the present invention.

FIG. 651 is a block diagram illustrating an exemplary embodiment of the present invention.

FIG. 652 is a block diagram illustrating an exemplary embodiment of the present invention.

FIG. 653 is a block diagram illustrating an exemplary embodiment of the present invention.

FIG. 654 is a block diagram illustrating an exemplary embodiment of the present invention.

Figure 655:
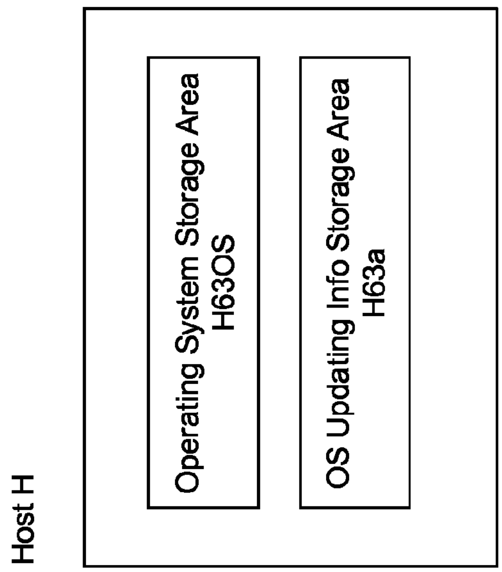

FIG. 655 is a block diagram illustrating an exemplary embodiment of the present invention.

Figure 656:
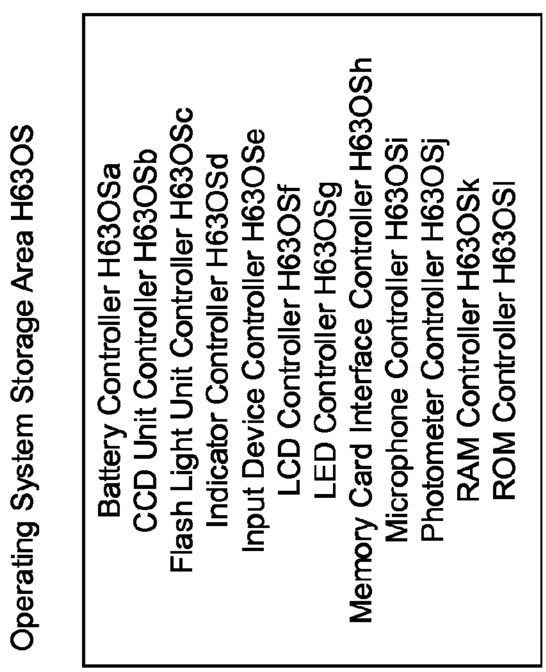

FIG. 656 is a block diagram illustrating an exemplary embodiment of the present invention.

Figure 657:
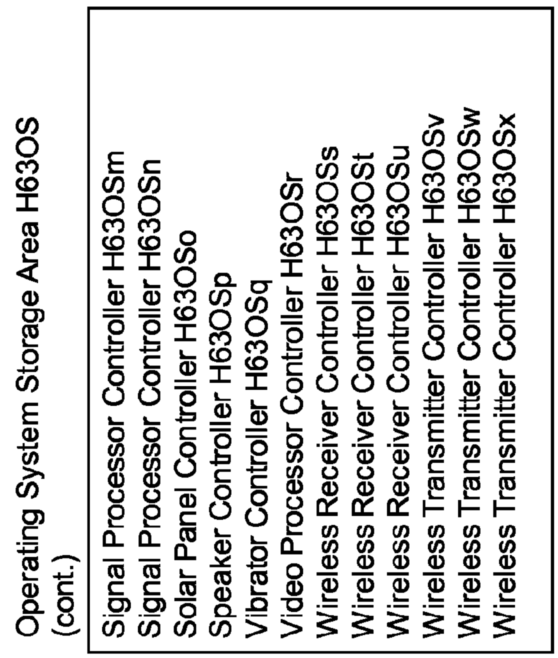

FIG. 657 is a block diagram illustrating an exemplary embodiment of the present invention.

Figure 658:
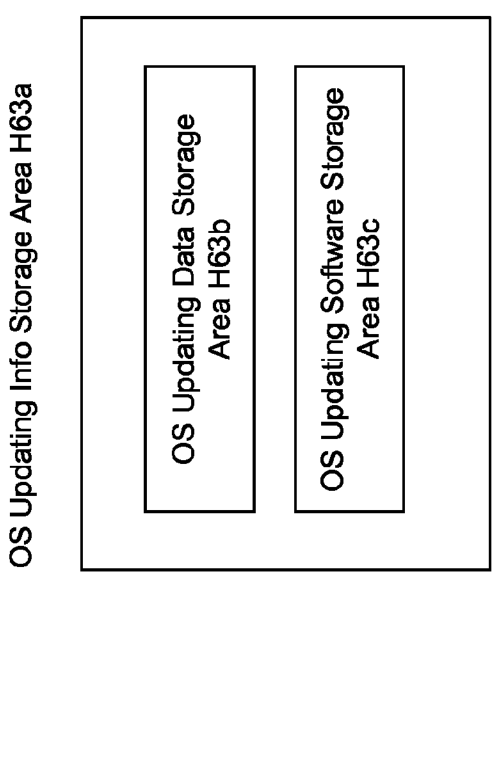

FIG. 658 is a block diagram illustrating an exemplary embodiment of the present invention.

Figure 659:
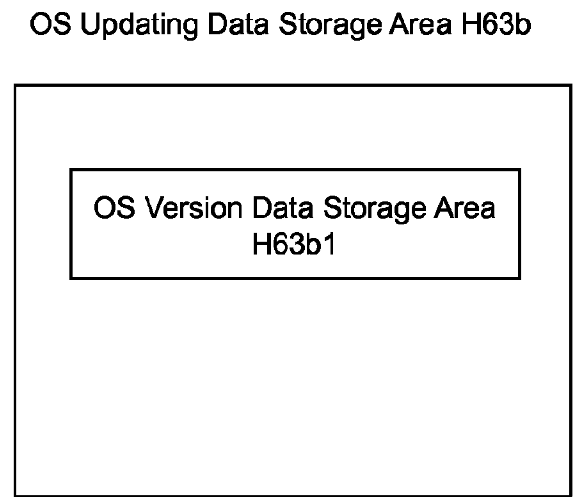

FIG. 659 is a block diagram illustrating an exemplary embodiment of the present invention.

Figure 660:
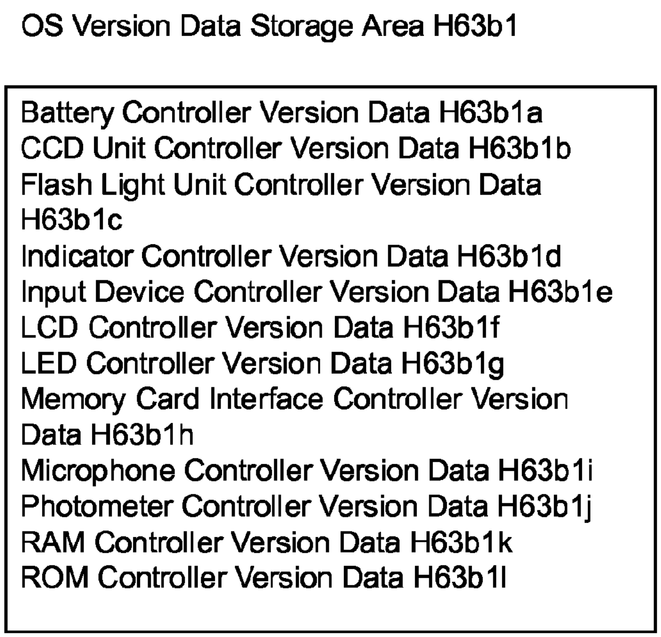

FIG. 660 is a block diagram illustrating an exemplary embodiment of the present invention.

FIG. 661 is a block diagram illustrating an exemplary embodiment of the present invention.

FIG. 662 is a block diagram illustrating an exemplary embodiment of the present invention.

Figure 663:

FIG. 663 is a block diagram illustrating an exemplary embodiment of the present invention.

Figure 664:
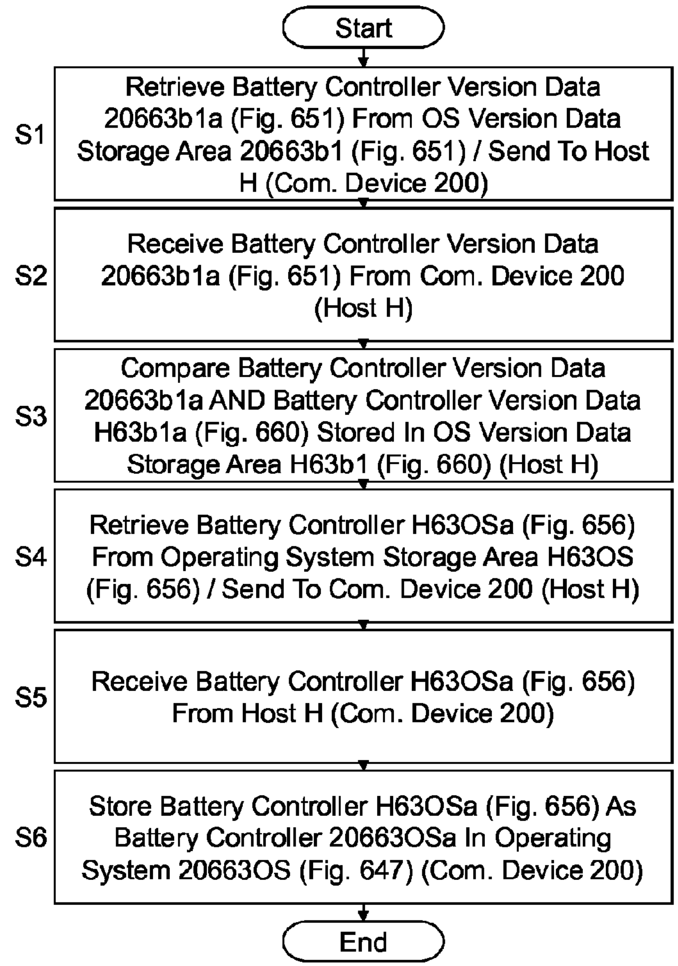

FIG. 664 is a flowchart illustrating an exemplary embodiment of the present invention.

Figure 665:
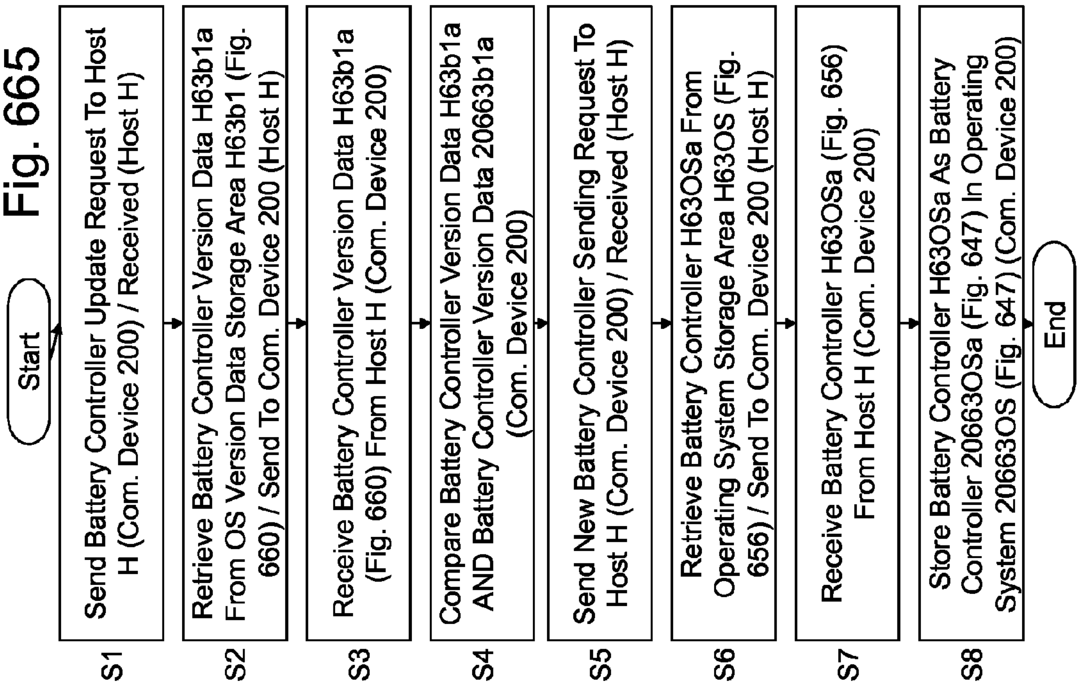

FIG. 665 is a flowchart illustrating an exemplary embodiment of the present invention.

Figure 666:
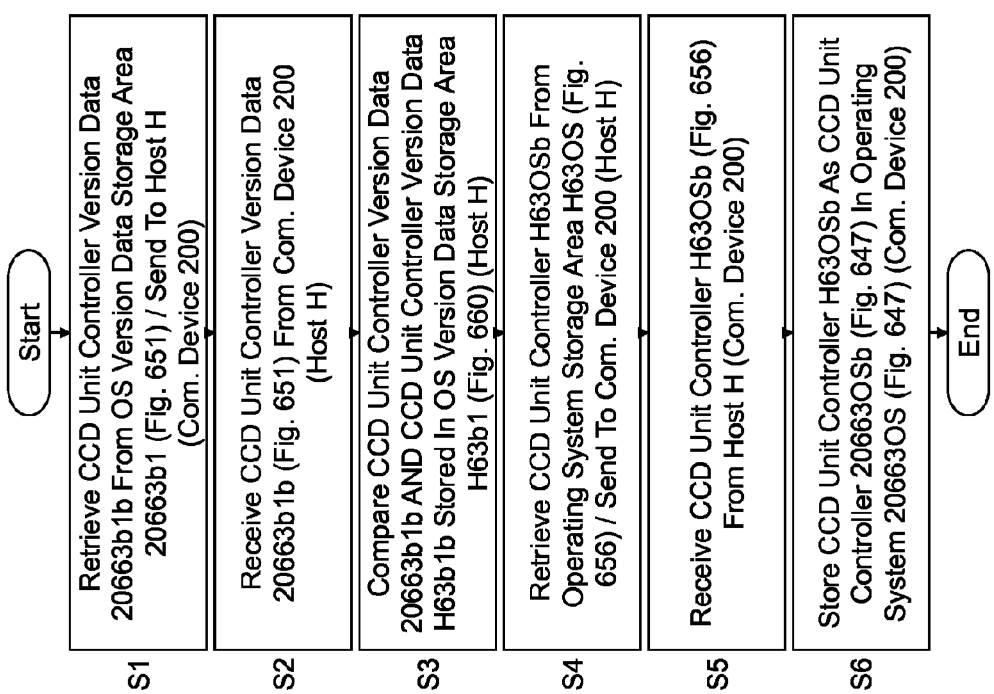

FIG. 666 is a flowchart illustrating an exemplary embodiment of the present invention.

Figure 667:
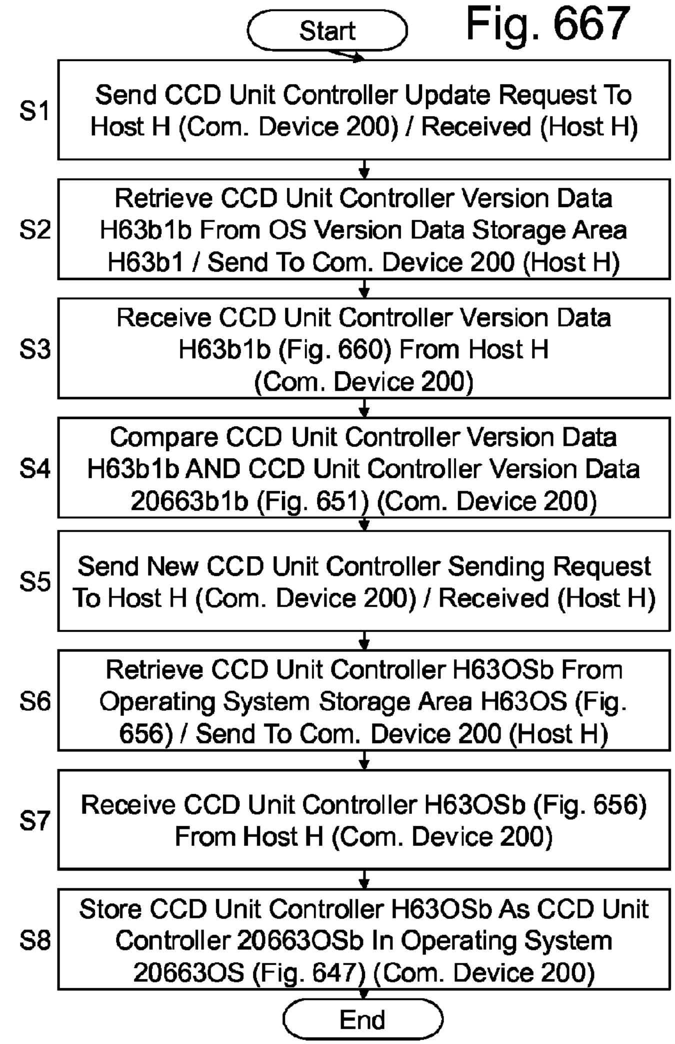

FIG. 667 is a flowchart illustrating an exemplary embodiment of the present invention.

Figure 668:
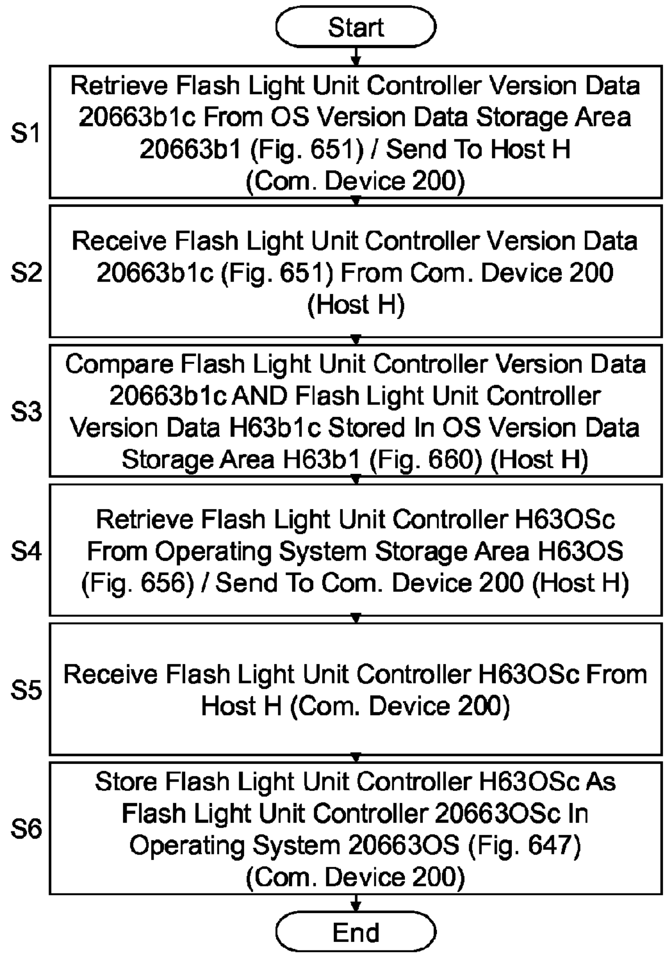

FIG. 668 is a flowchart illustrating an exemplary embodiment of the present invention.

Figure 669:
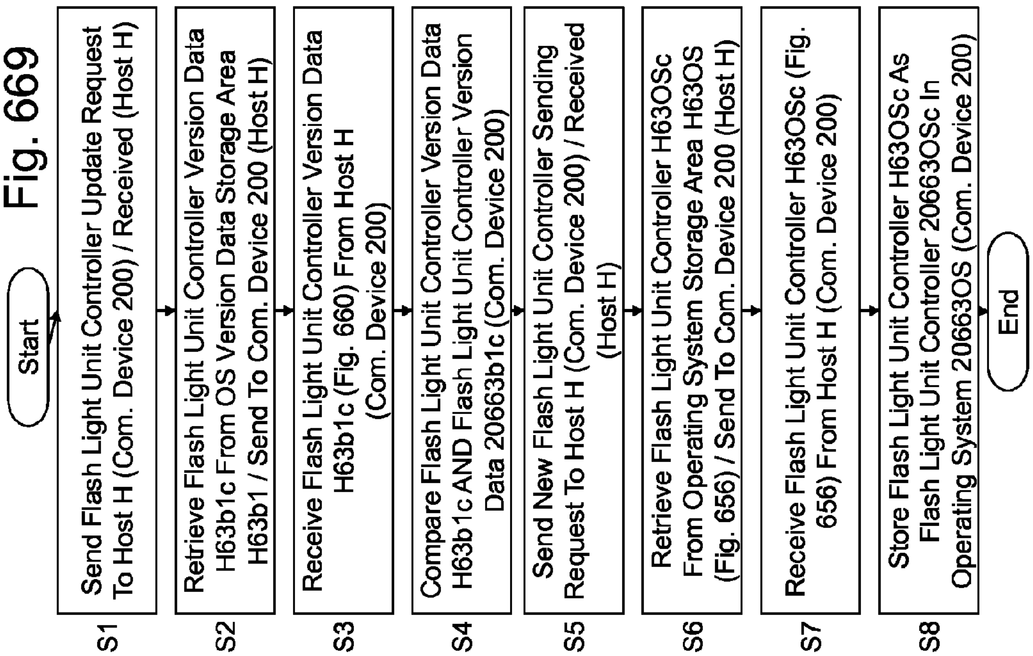

FIG. 669 is a flowchart illustrating an exemplary embodiment of the present invention.

Figure 670:
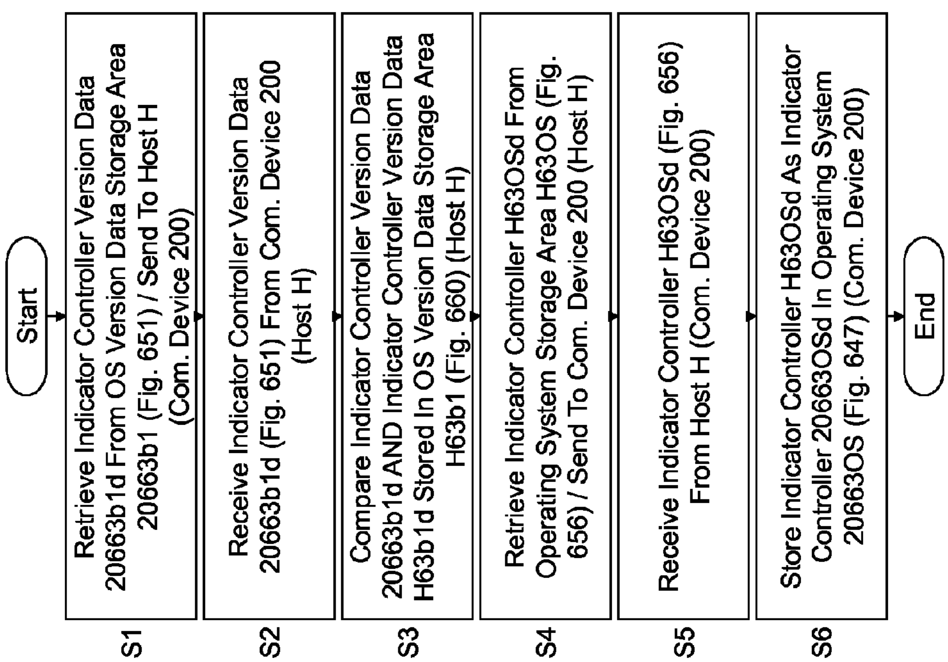

FIG. 670 is a flowchart illustrating an exemplary embodiment of the present invention.

Figure 671:
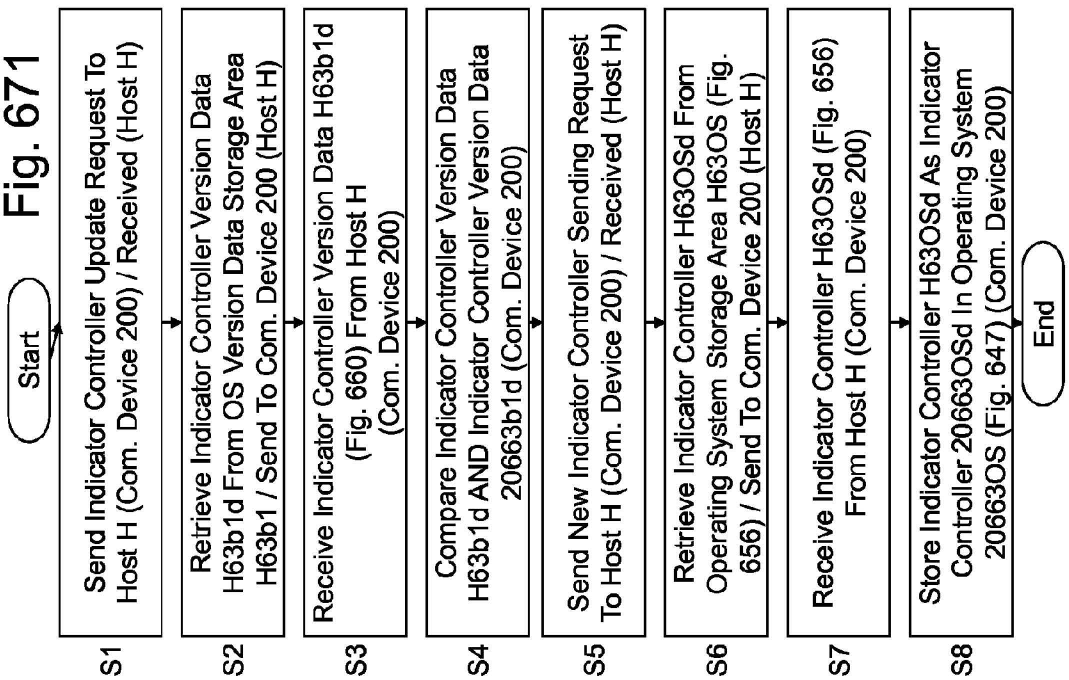

FIG. 671 is a flowchart illustrating an exemplary embodiment of the present invention.

Figure 672:
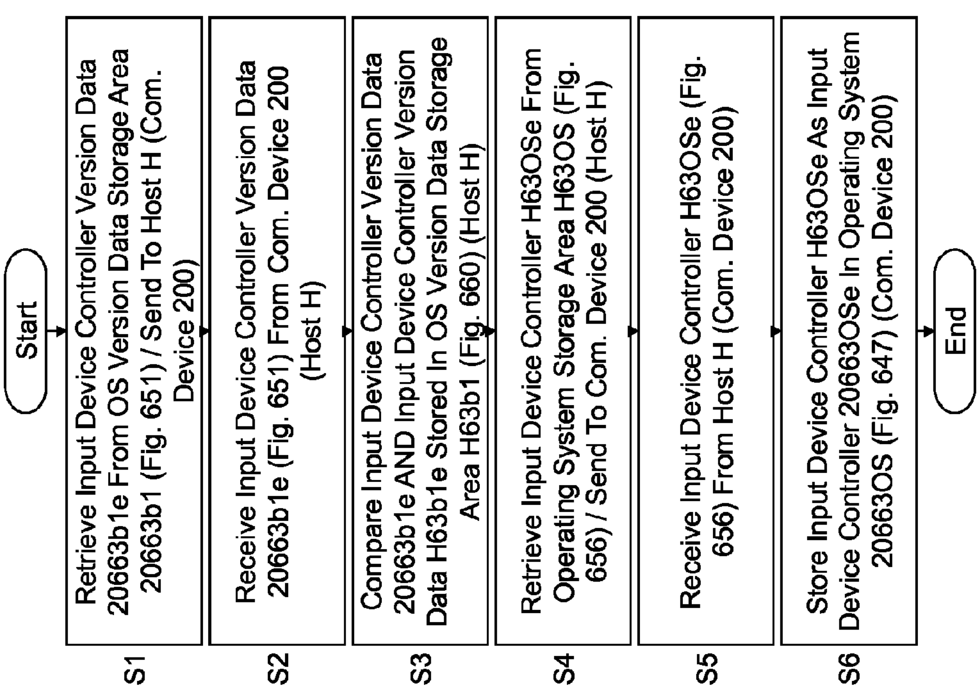

FIG. 672 is a flowchart illustrating an exemplary embodiment of the present invention.

Figure 673:
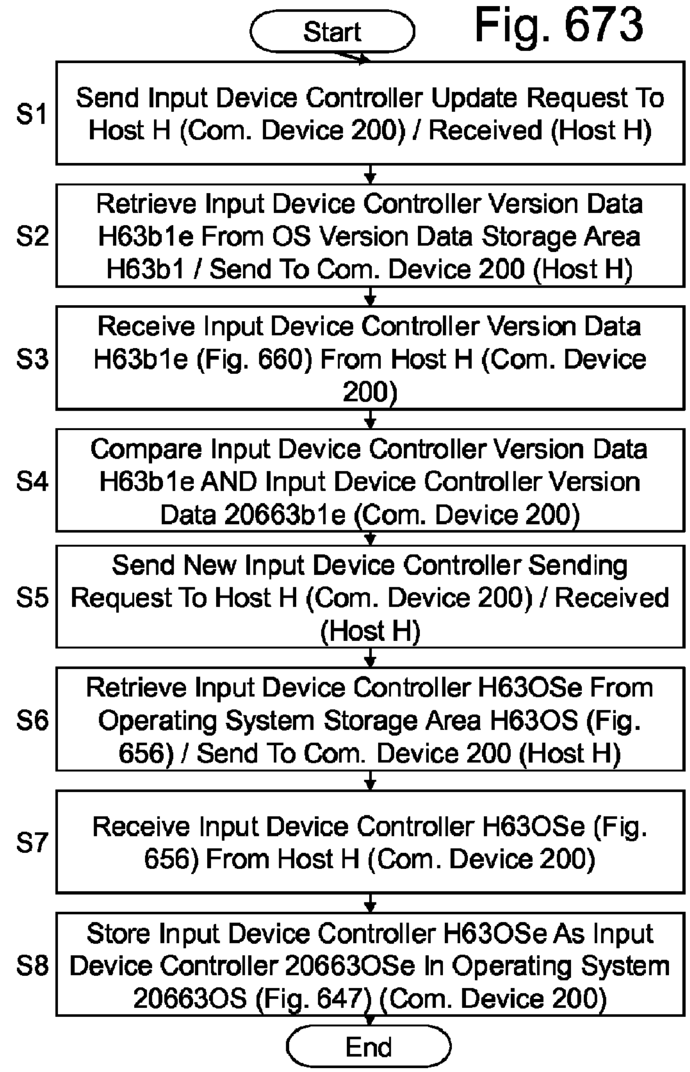

FIG. 673 is a flowchart illustrating an exemplary embodiment of the present invention.

Figure 674:
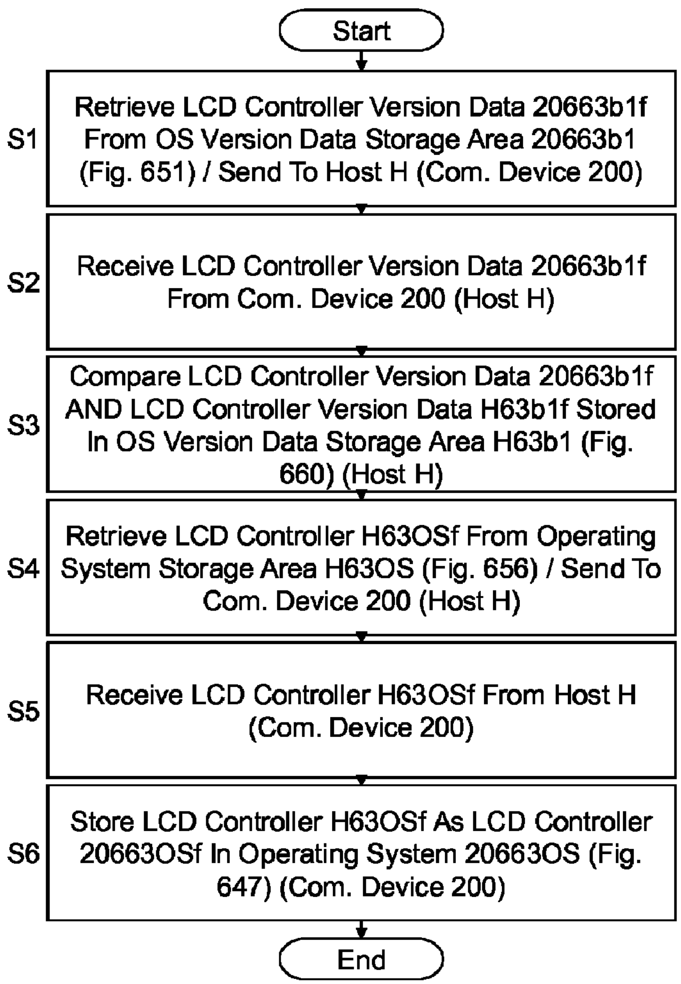

FIG. 674 is a flowchart illustrating an exemplary embodiment of the present invention.

Figure 675:
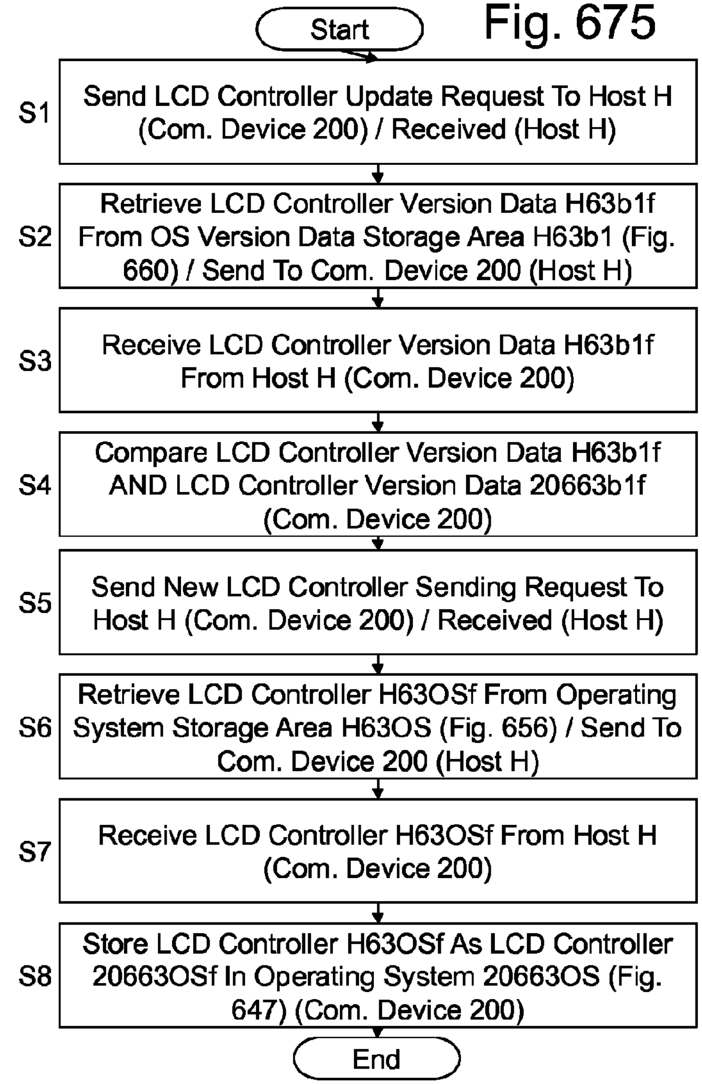

FIG. 675 is a flowchart illustrating an exemplary embodiment of the present invention.

Figure 676:
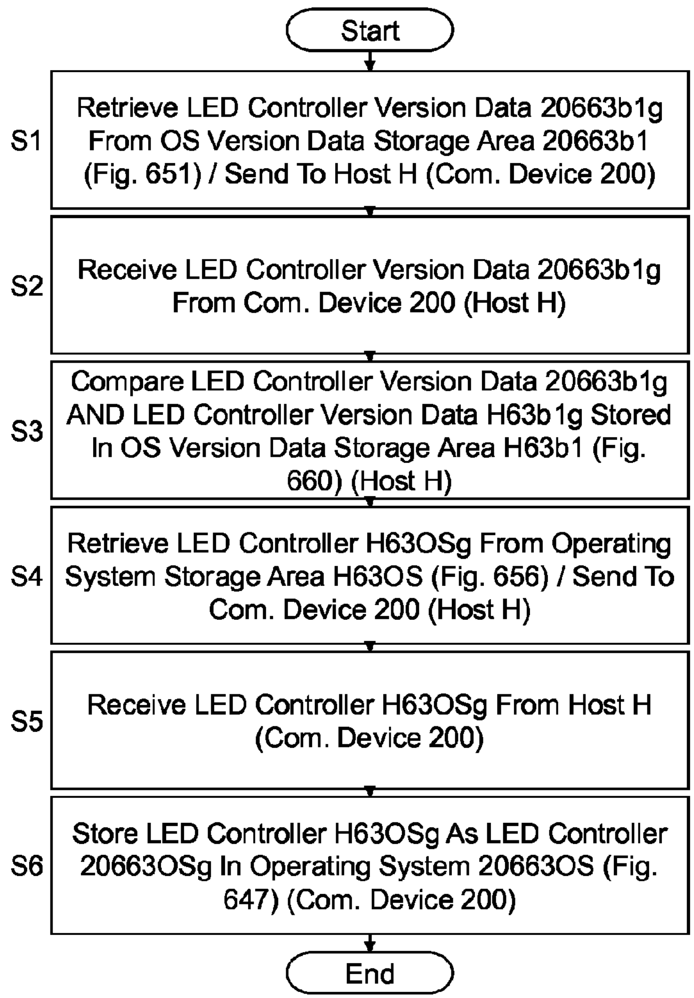

FIG. 676 is a flowchart illustrating an exemplary embodiment of the present invention.

Figure 677:
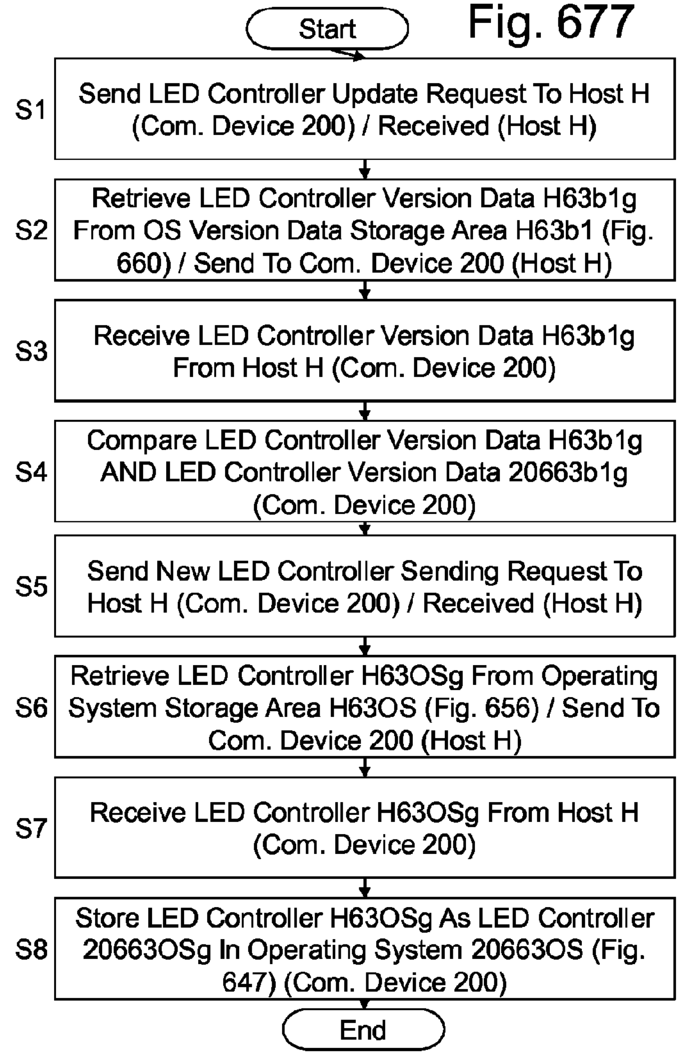

FIG. 677 is a flowchart illustrating an exemplary embodiment of the present invention.

Figure 678:
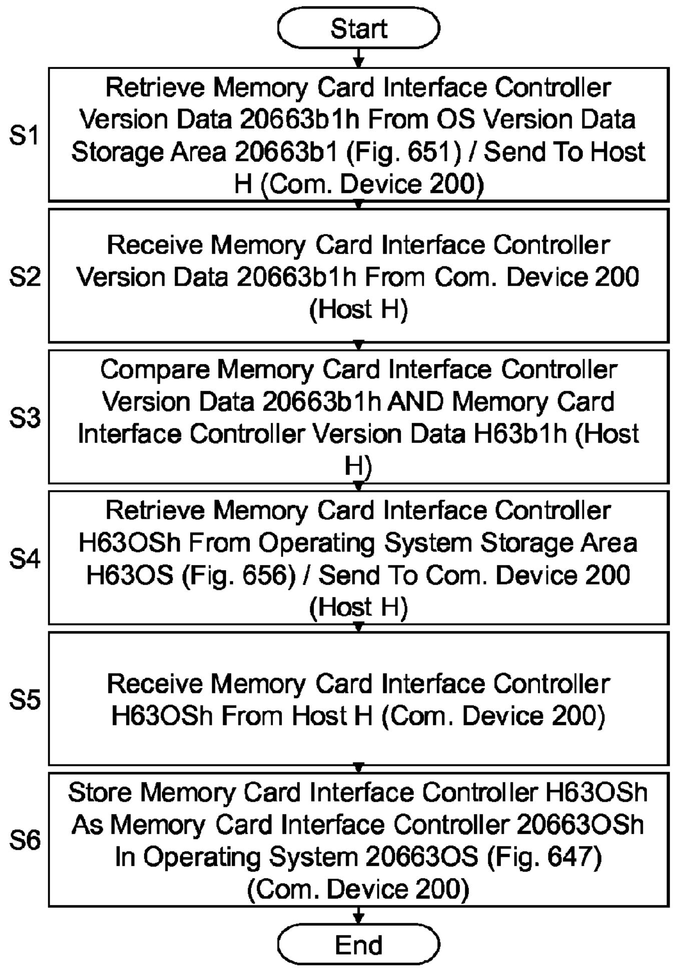

FIG. 678 is a flowchart illustrating an exemplary embodiment of the present invention.

Figure 679:
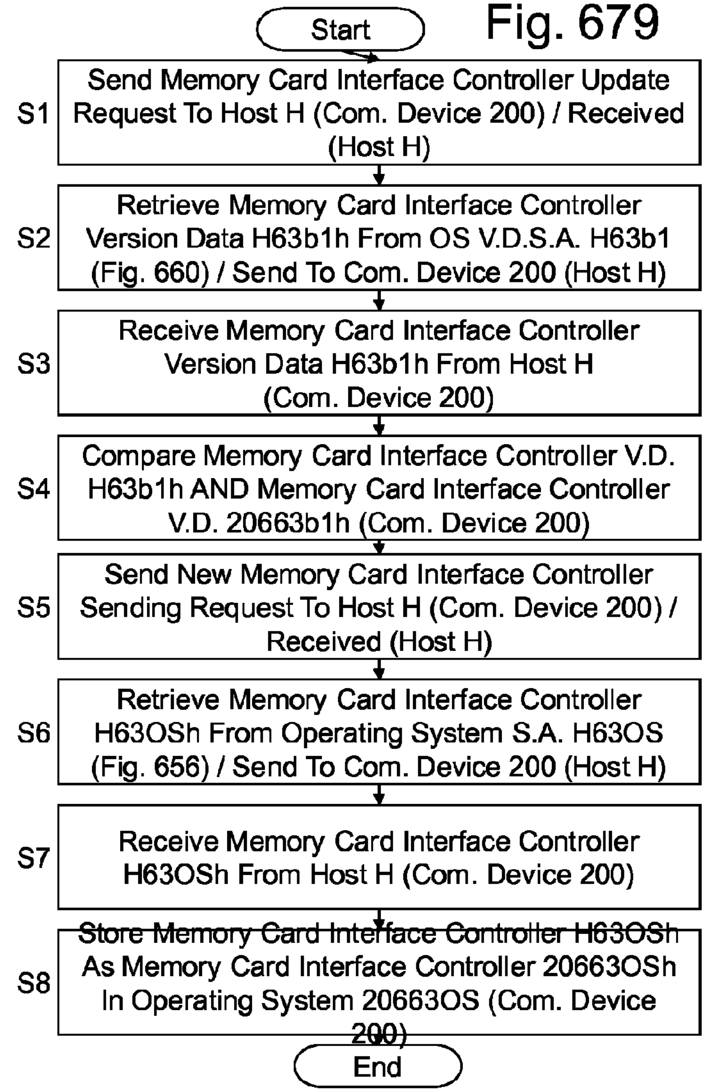

FIG. 679 is a flowchart illustrating an exemplary embodiment of the present invention.

Figure 680:
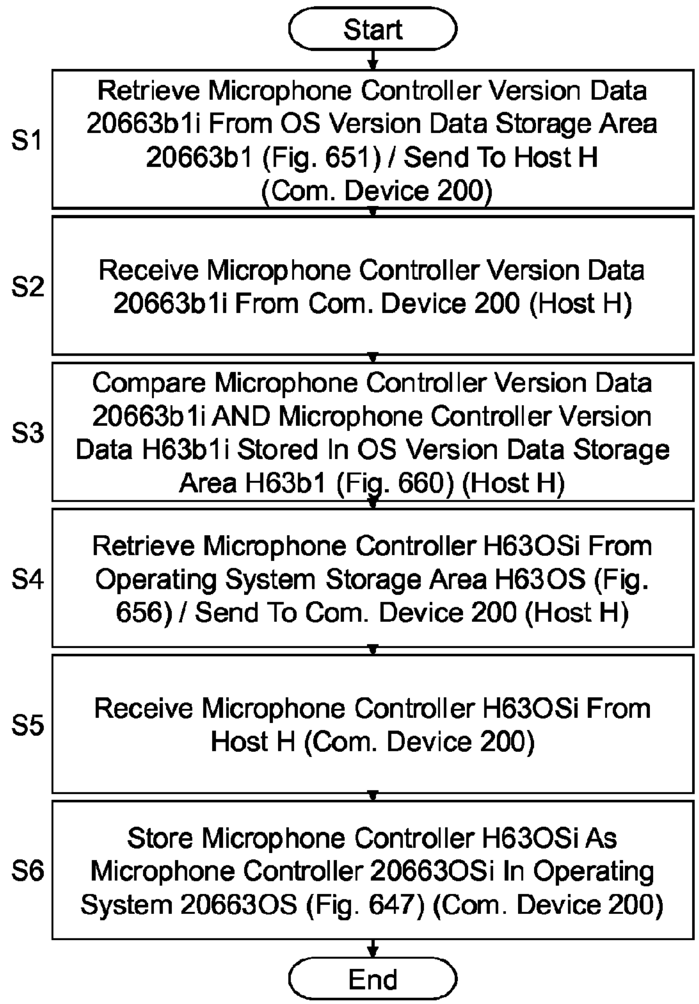

FIG. 680 is a flowchart illustrating an exemplary embodiment of the present invention.

Figure 681:
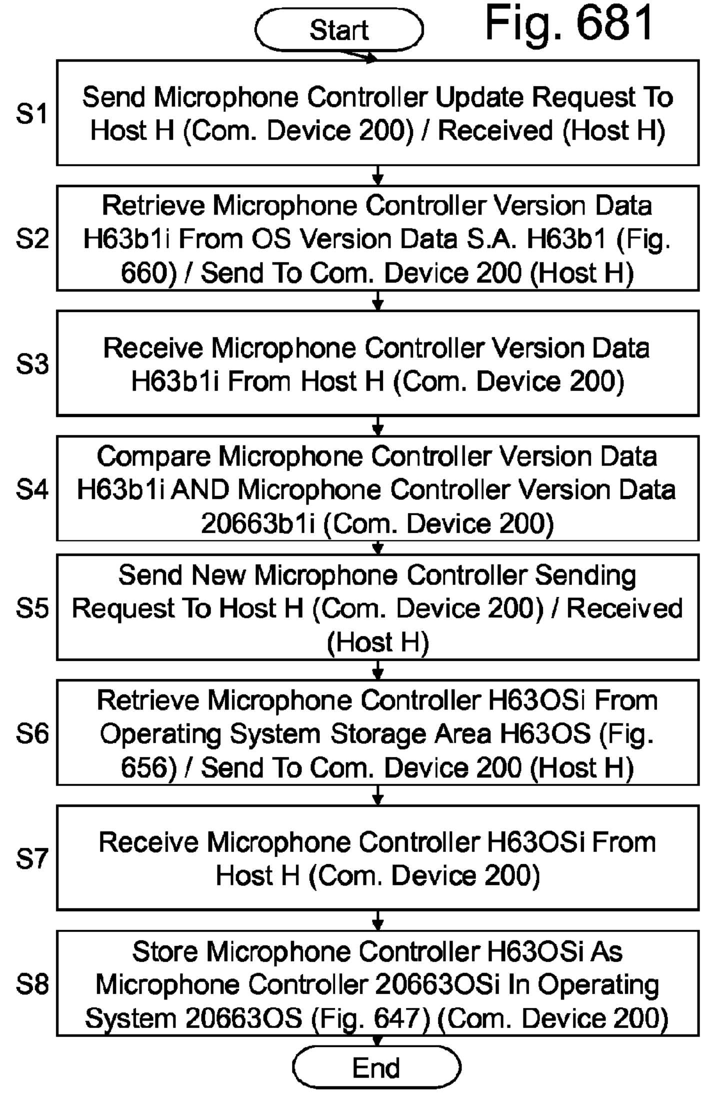

FIG. 681 is a flowchart illustrating an exemplary embodiment of the present invention.

Figure 682:
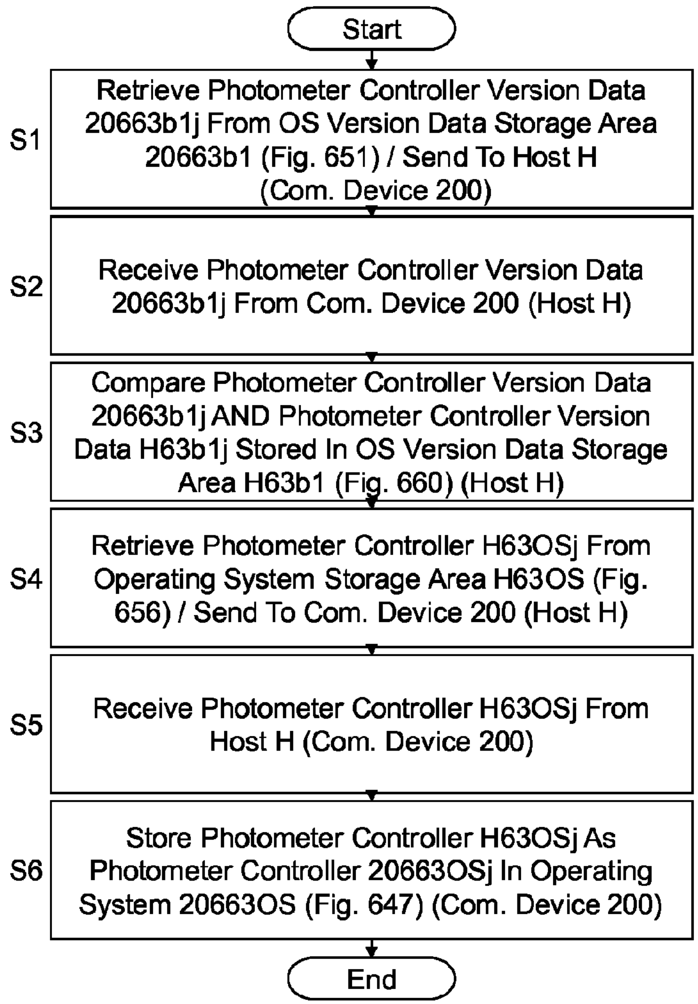

FIG. 682 is a flowchart illustrating an exemplary embodiment of the present invention.

Figure 683:
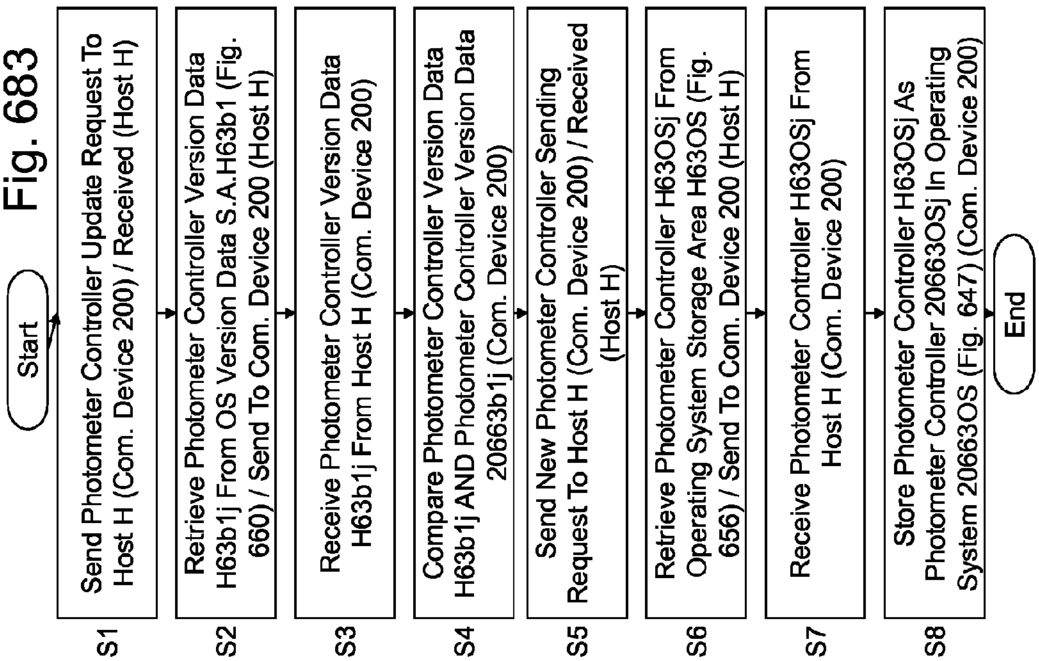

FIG. 683 is a flowchart illustrating an exemplary embodiment of the present invention.

Figure 684:
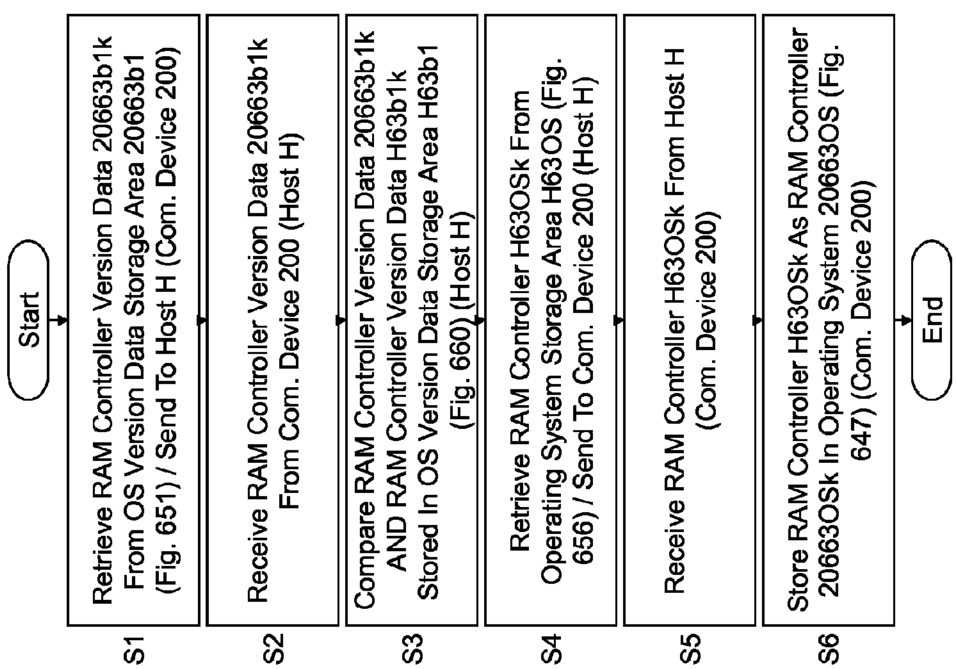

FIG. 684 is a flowchart illustrating an exemplary embodiment of the present invention.

Figure 685:
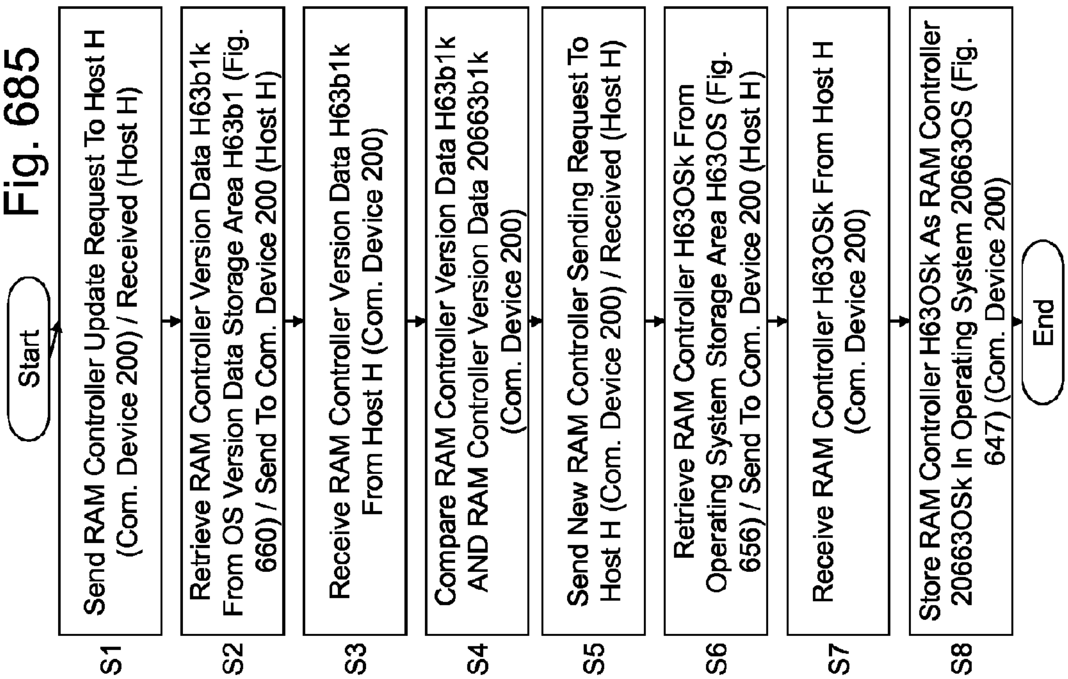

FIG. 685 is a flowchart illustrating an exemplary embodiment of the present invention.

Figure 686:
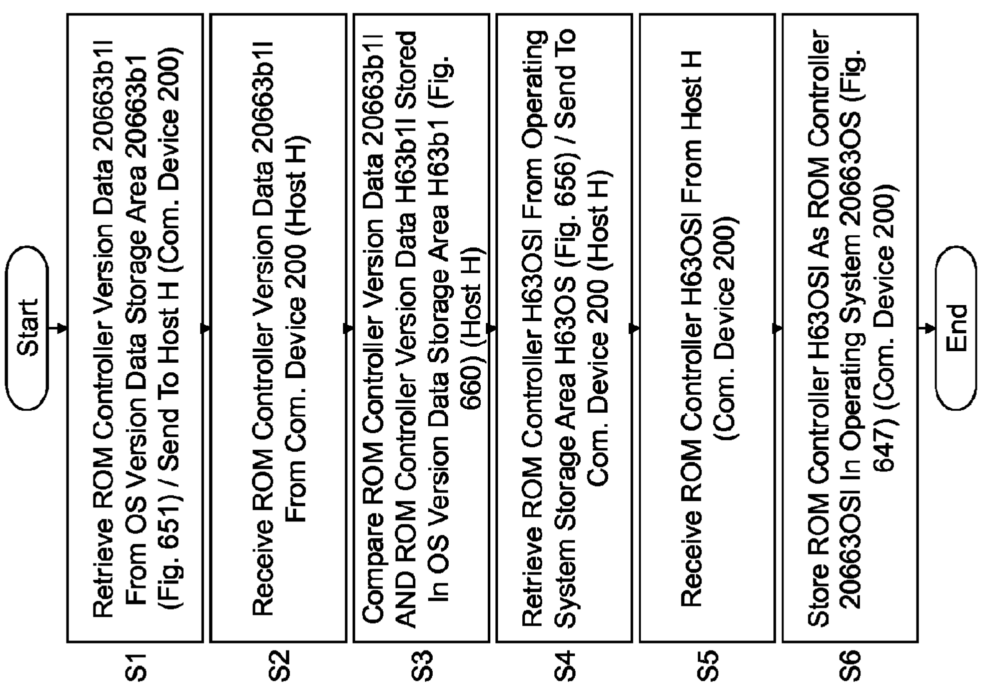

FIG. 686 is a flowchart illustrating an exemplary embodiment of the present invention.

Figure 687:
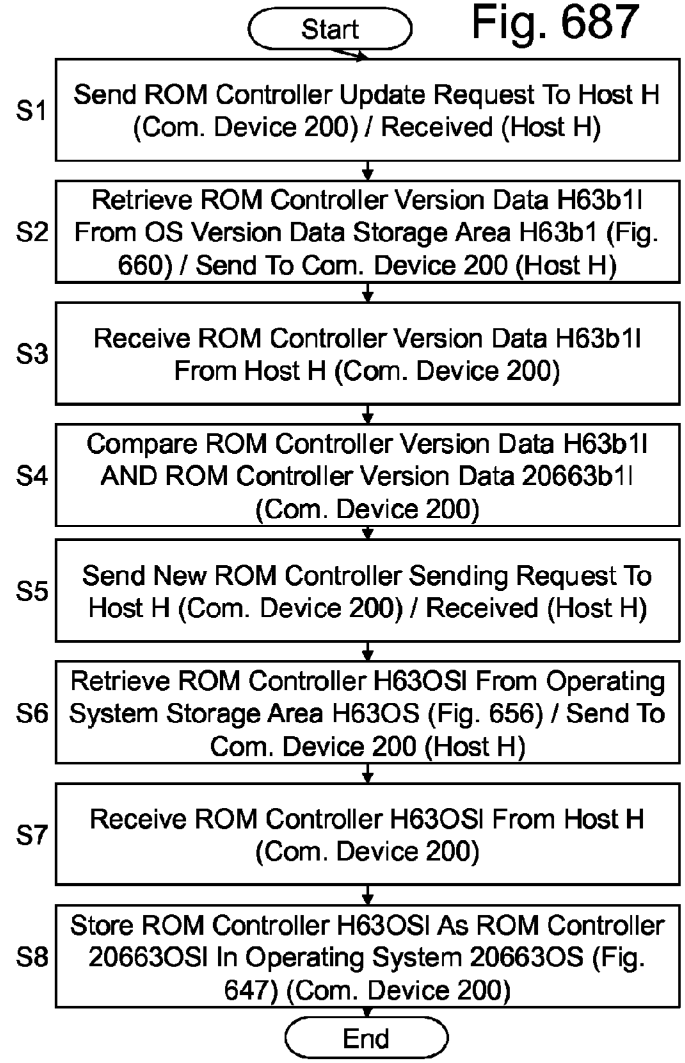

FIG. 687 is a flowchart illustrating an exemplary embodiment of the present invention.

Figure 688:
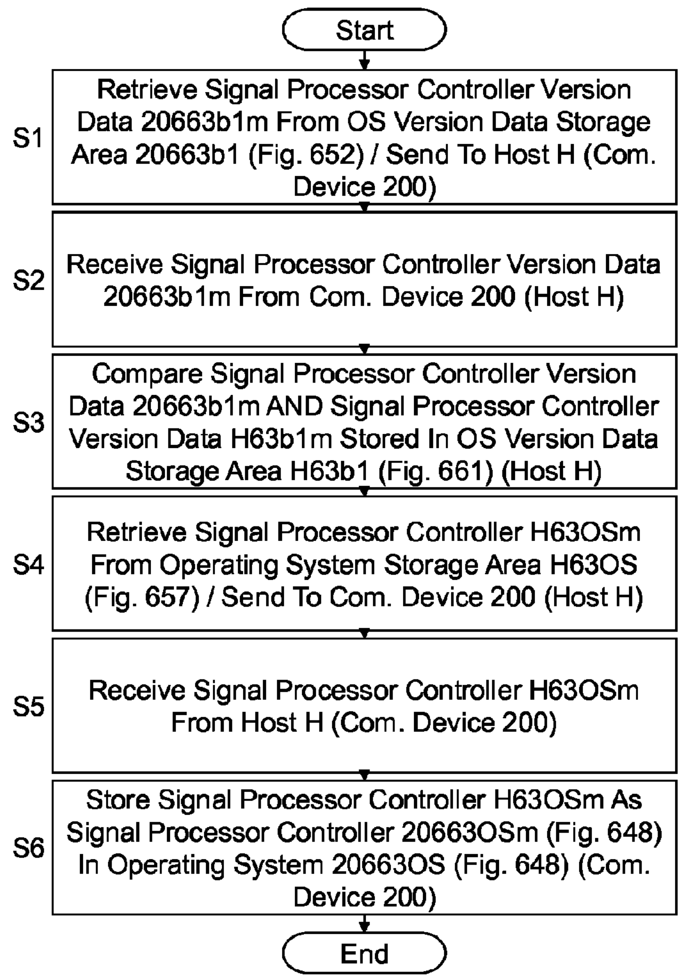

FIG. 688 is a flowchart illustrating an exemplary embodiment of the present invention.

Figure 689:
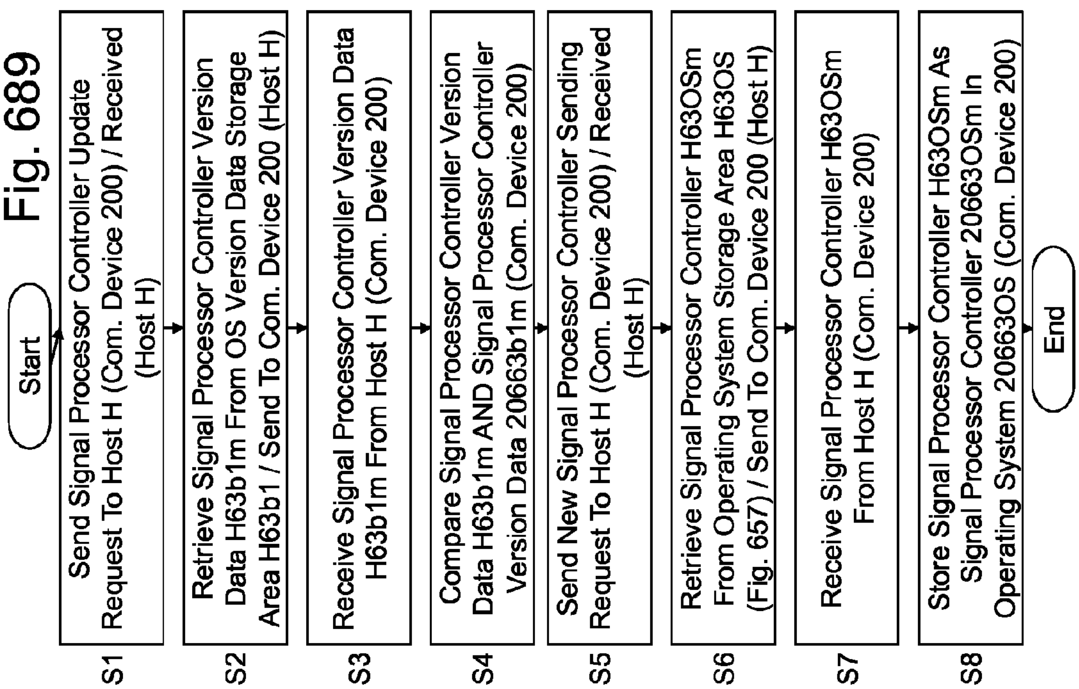

FIG. 689 is a flowchart illustrating an exemplary embodiment of the present invention.

Figure 690:
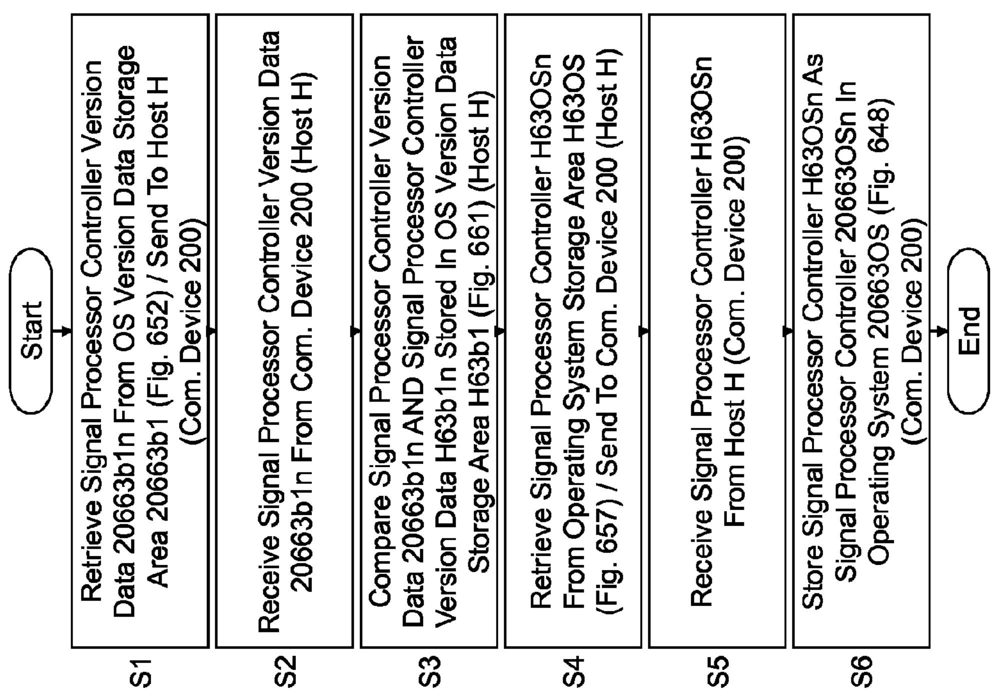

FIG. 690 is a flowchart illustrating an exemplary embodiment of the present invention.

Figure 691:
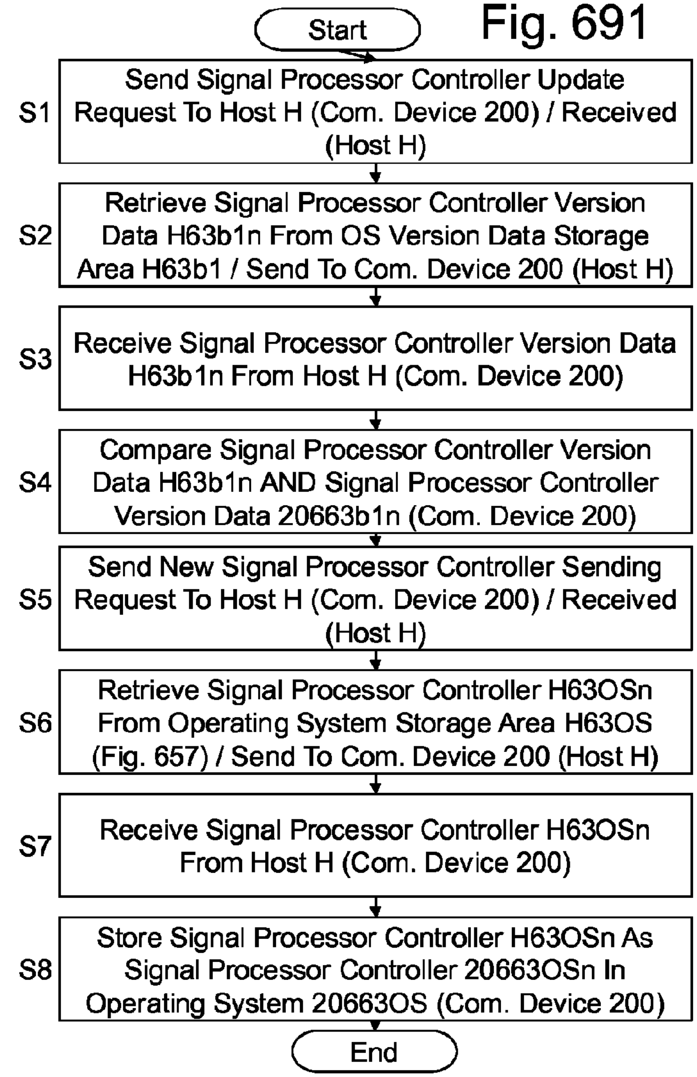

FIG. 691 is a flowchart illustrating an exemplary embodiment of the present invention.

Figure 692:
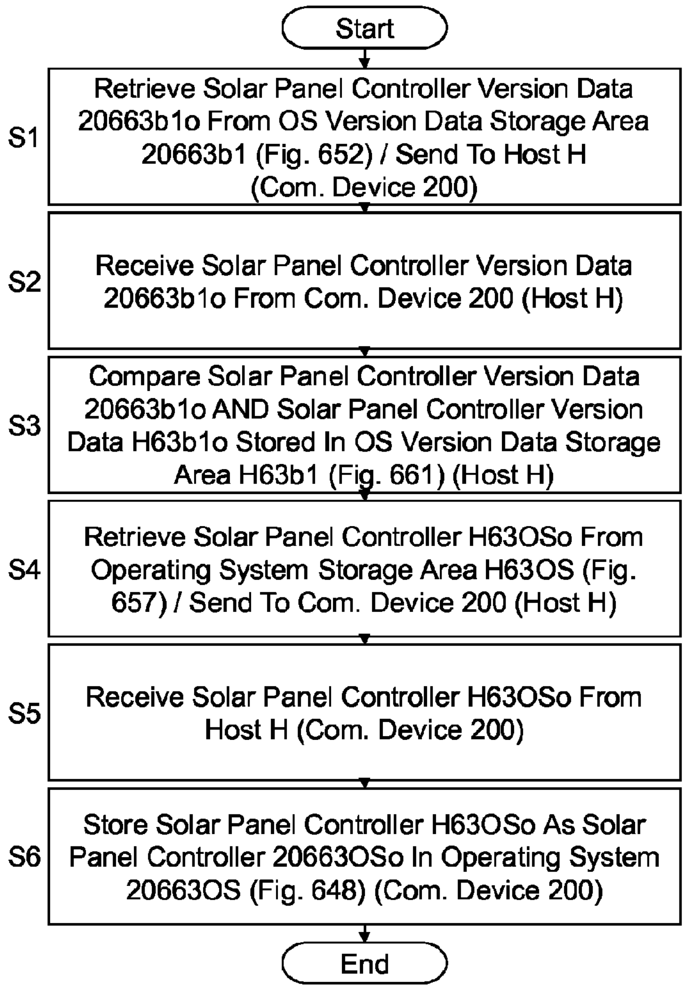

FIG. 692 is a flowchart illustrating an exemplary embodiment of the present invention.

Figure 693:
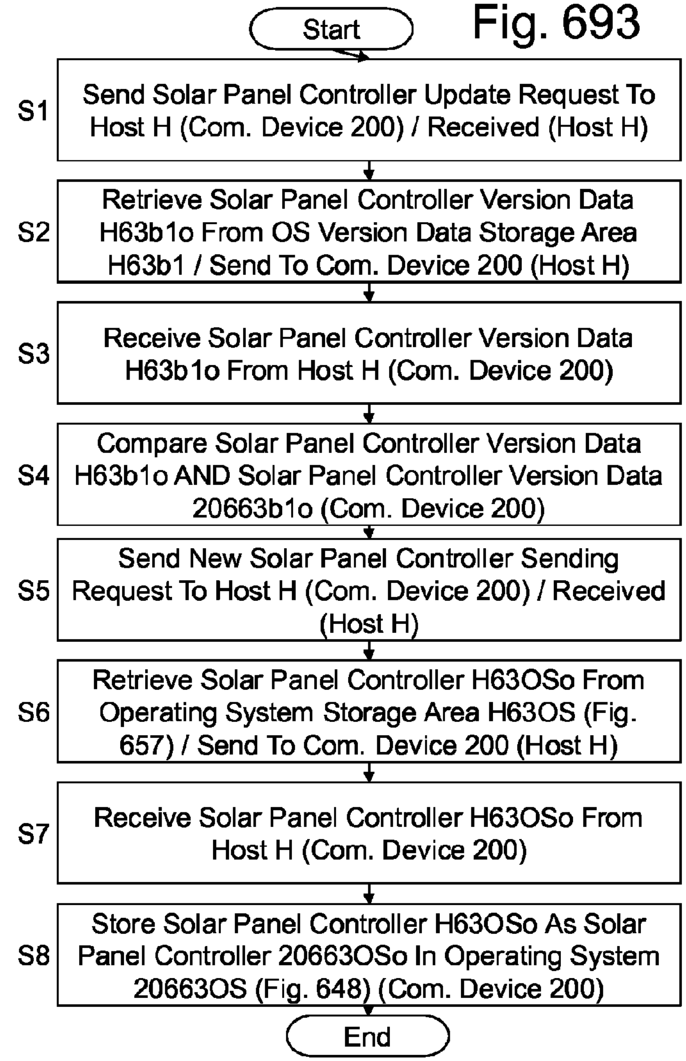

FIG. 693 is a flowchart illustrating an exemplary embodiment of the present invention.

Figure 694:
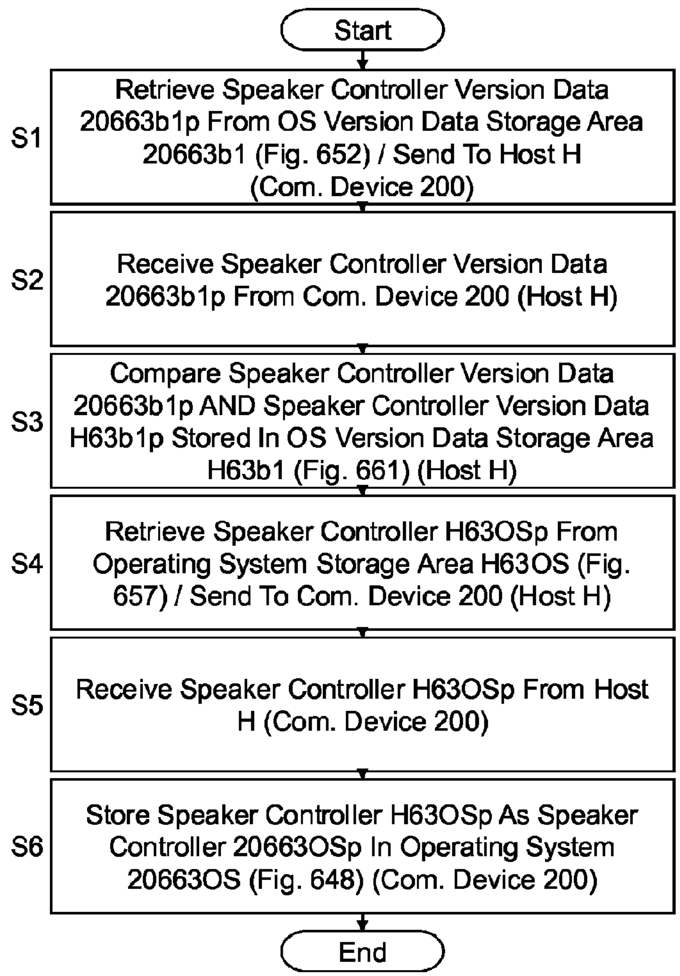

FIG. 694 is a flowchart illustrating an exemplary embodiment of the present invention.

Figure 695:
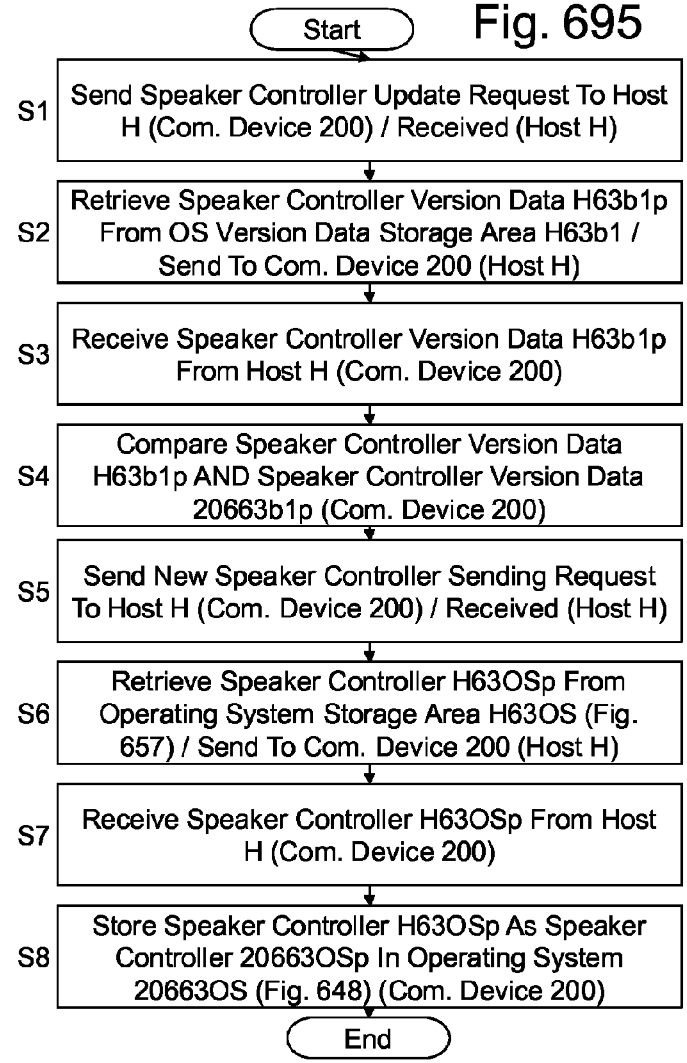

FIG. 695 is a flowchart illustrating an exemplary embodiment of the present invention.

Figure 696:
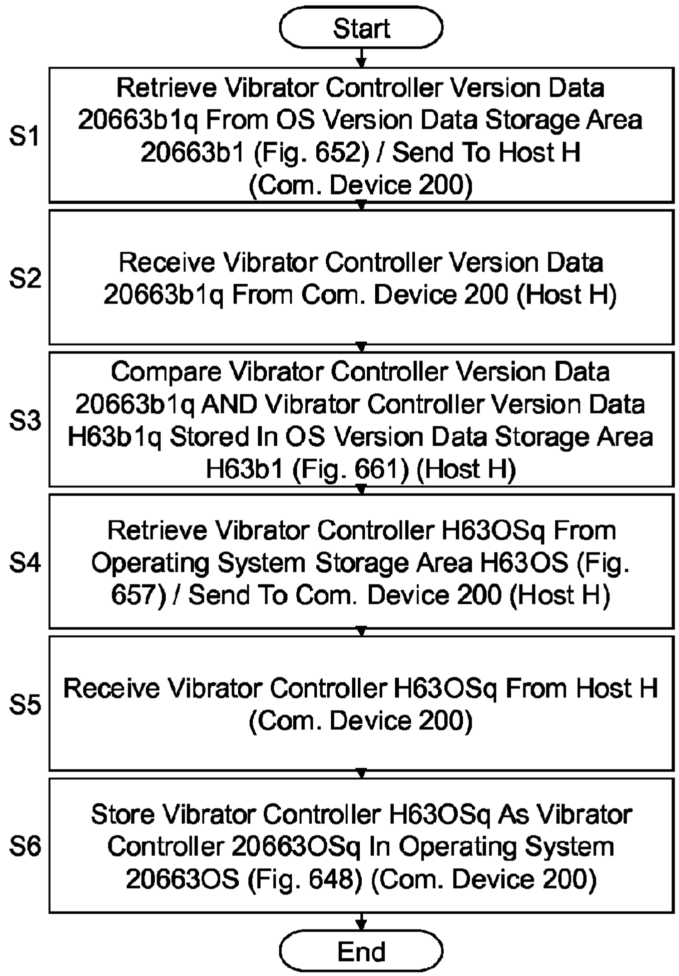

FIG. 696 is a flowchart illustrating an exemplary embodiment of the present invention.

Figure 697:
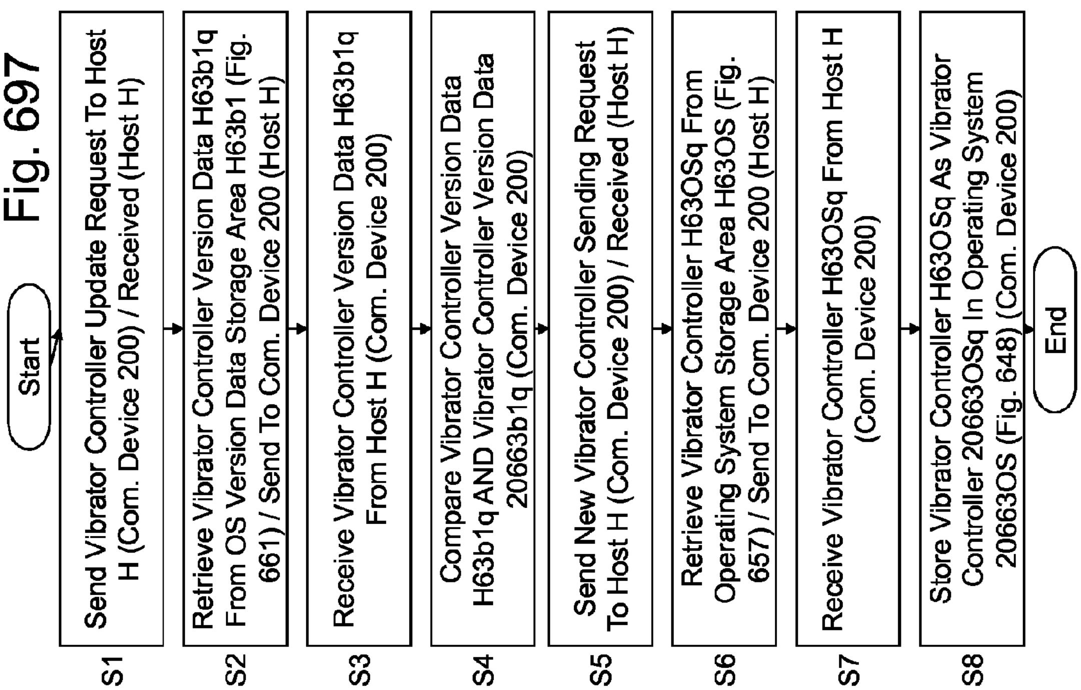

FIG. 697 is a flowchart illustrating an exemplary embodiment of the present invention.

Figure 698:
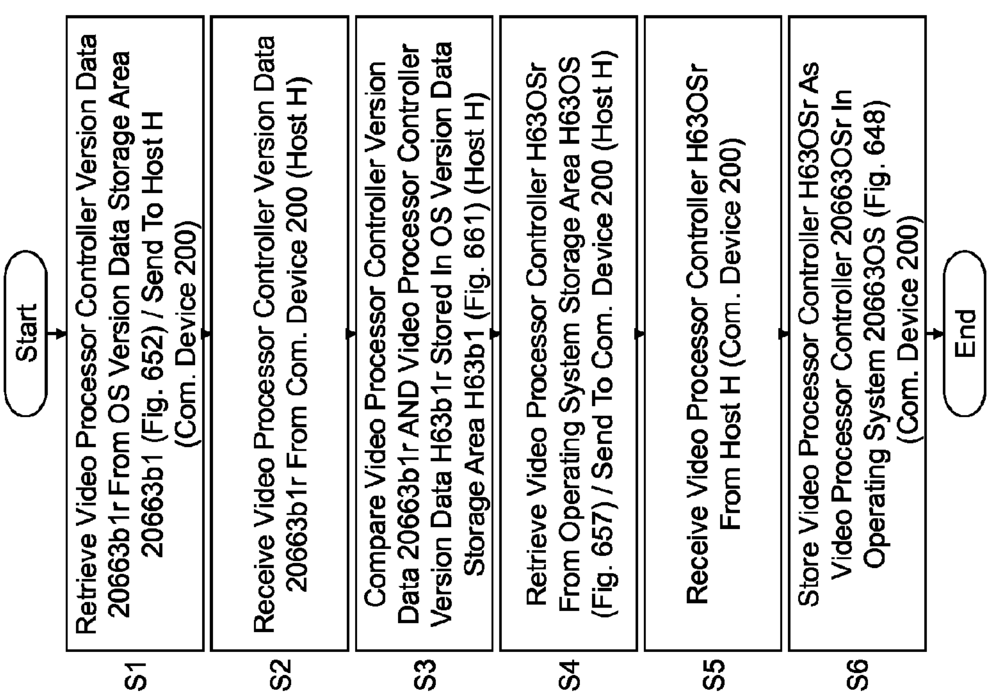

FIG. 698 is a flowchart illustrating an exemplary embodiment of the present invention.

Figure 699:
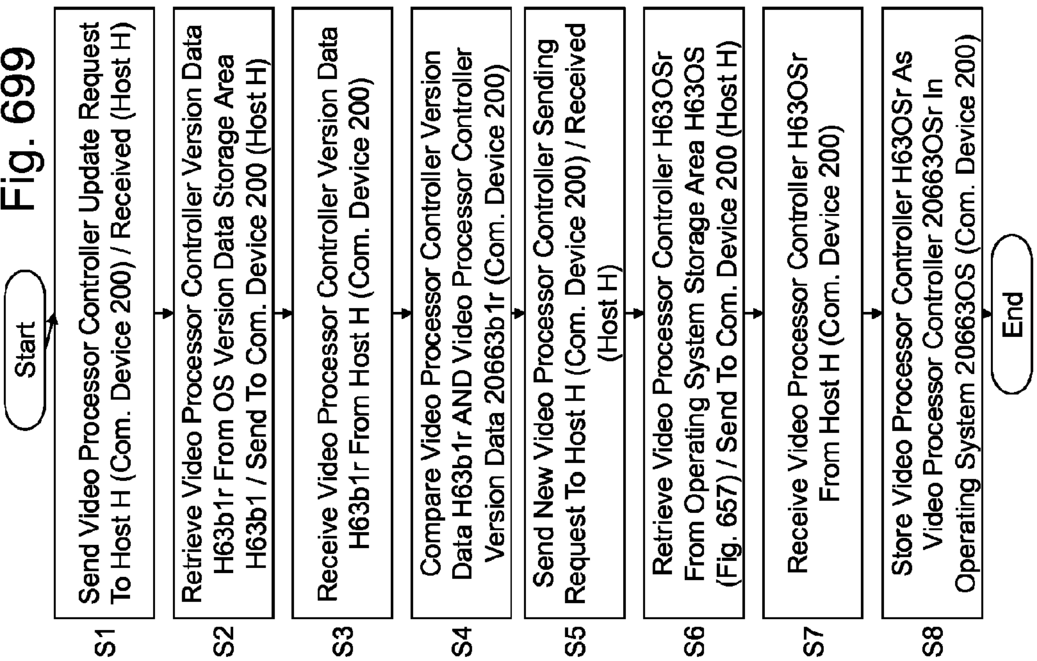

FIG. 699 is a flowchart illustrating an exemplary embodiment of the present invention.

Figure 700:
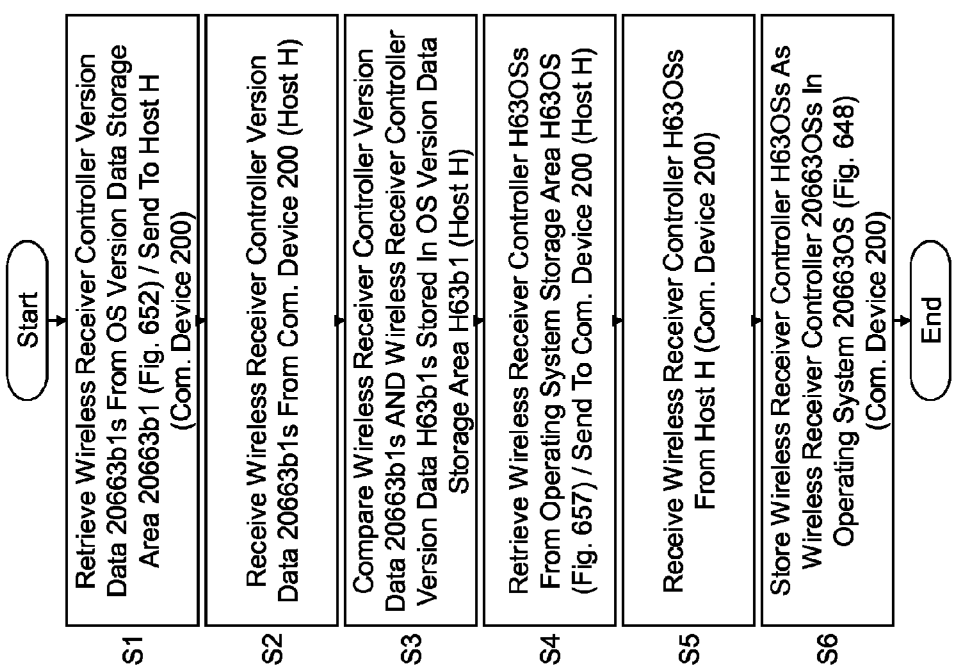

FIG. 700 is a flowchart illustrating an exemplary embodiment of the present invention.

Figure 701:
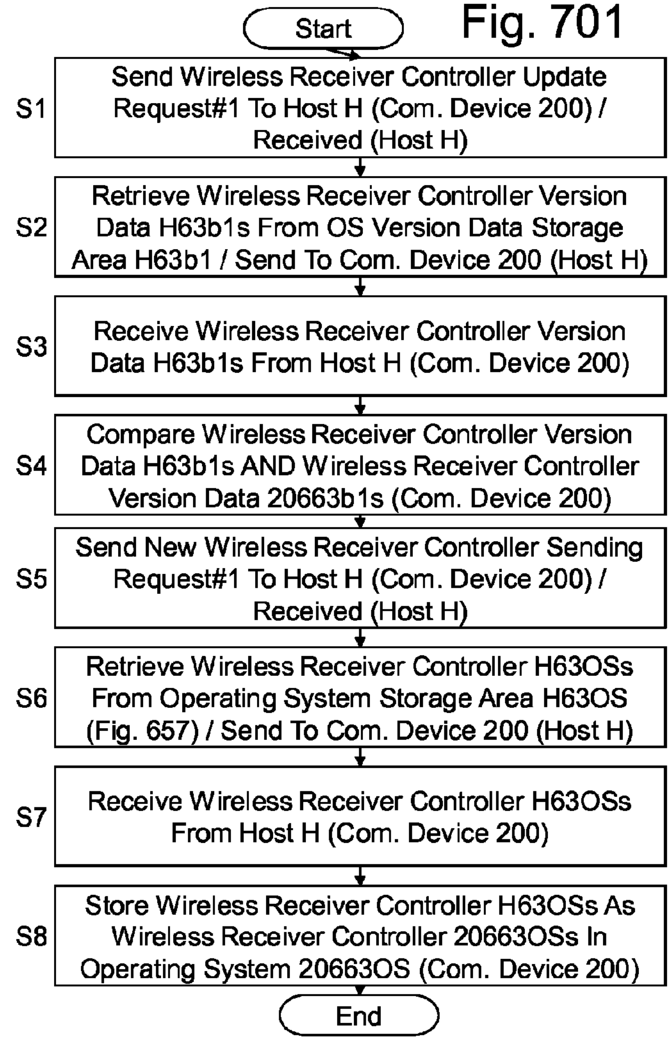

FIG. 701 is a flowchart illustrating an exemplary embodiment of the present invention.

Figure 702:
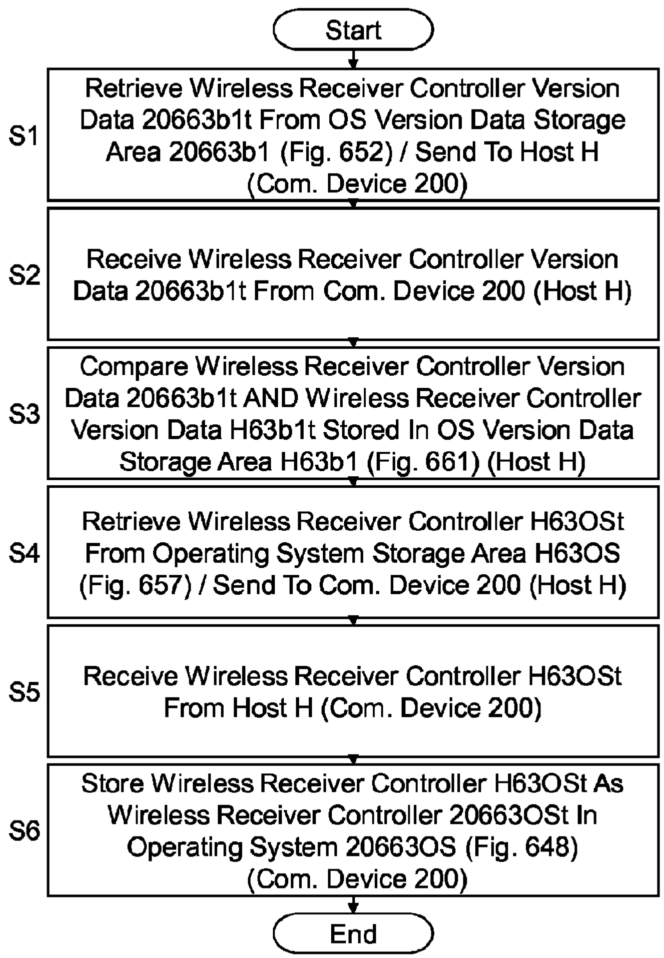

FIG. 702 is a flowchart illustrating an exemplary embodiment of the present invention.

Figure 703:
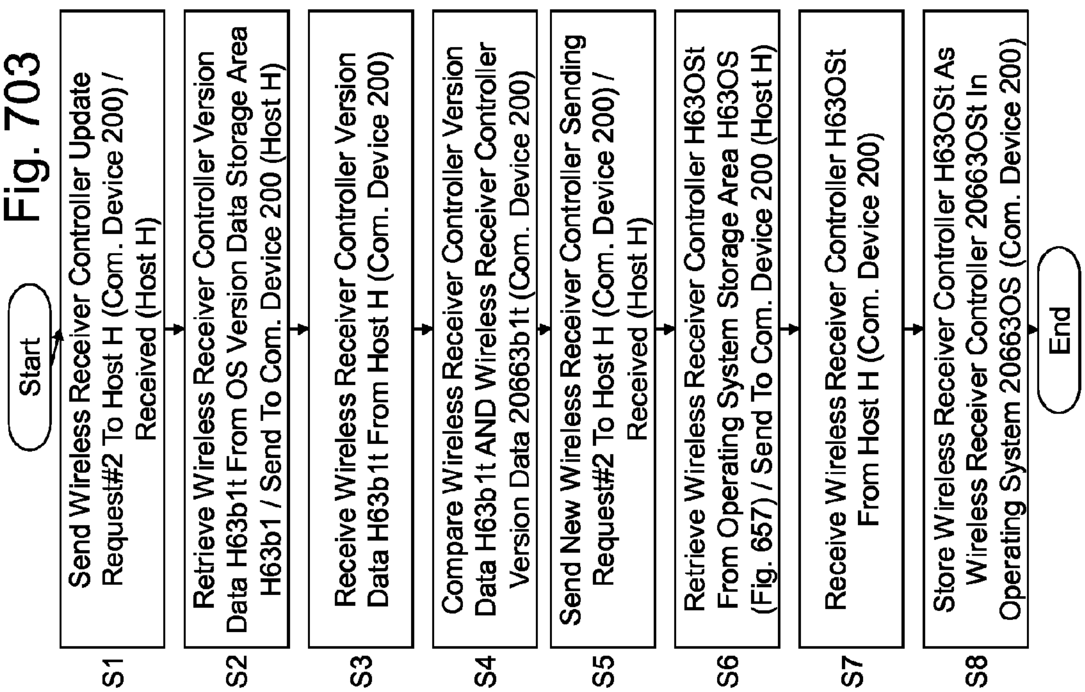

FIG. 703 is a flowchart illustrating an exemplary embodiment of the present invention.

Figure 704:
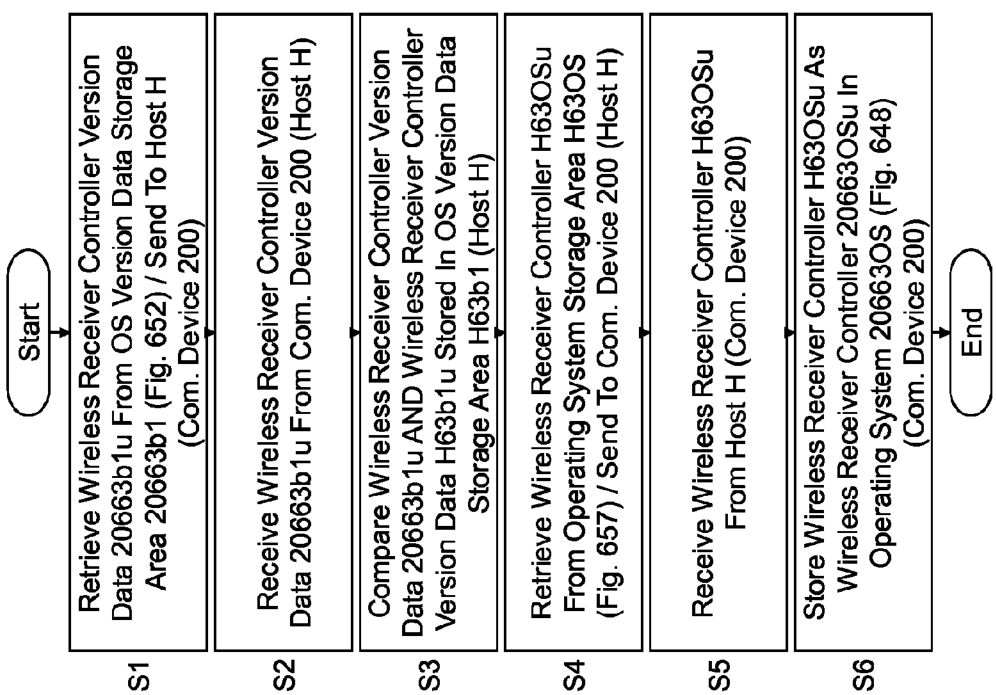

FIG. 704 is a flowchart illustrating an exemplary embodiment of the present invention.

Figure 705:
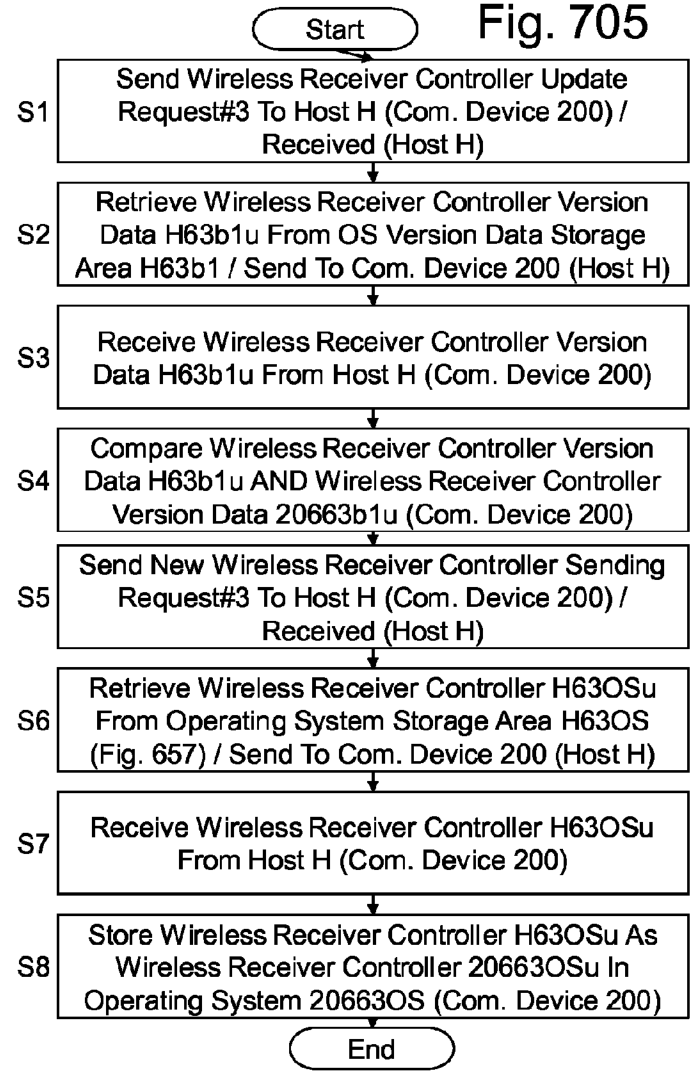

FIG. 705 is a flowchart illustrating an exemplary embodiment of the present invention.

Figure 706:
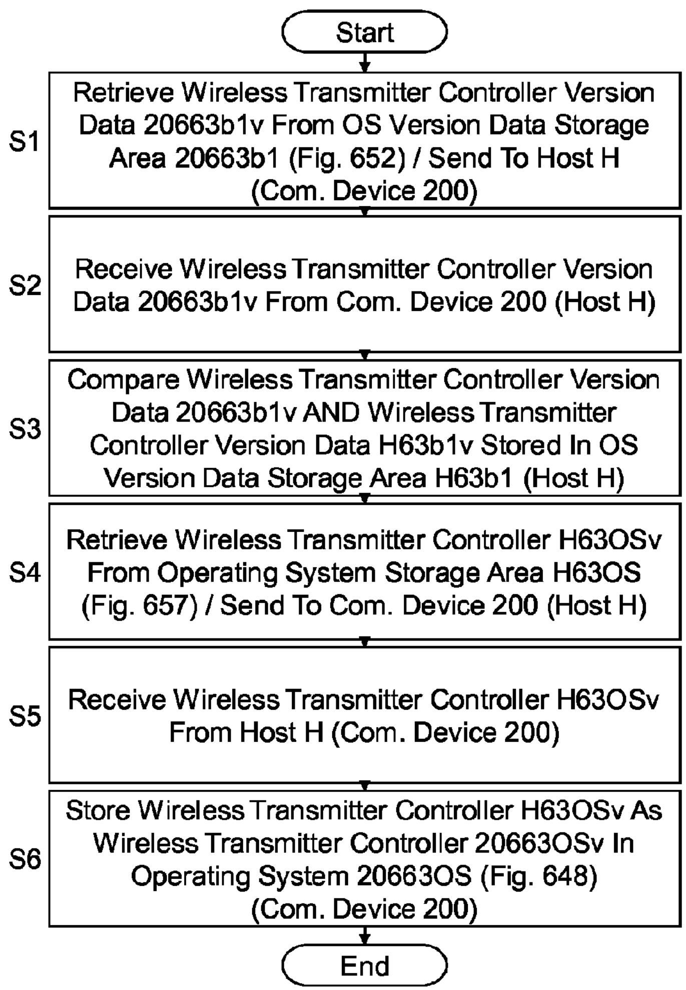

FIG. 706 is a flowchart illustrating an exemplary embodiment of the present invention.

Figure 707:
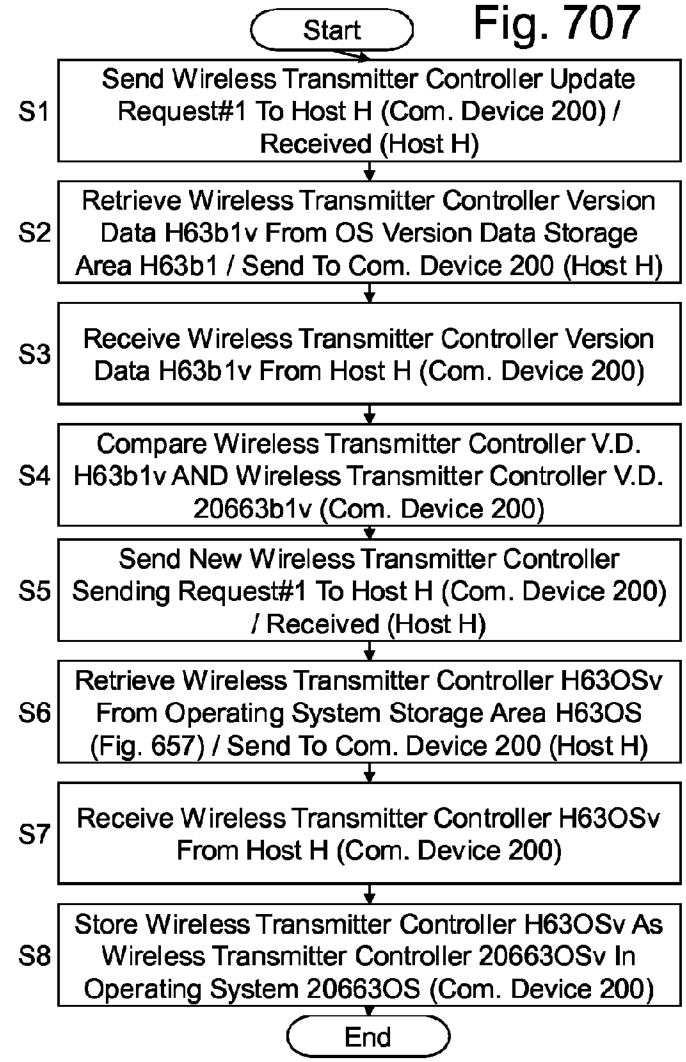

FIG. 707 is a flowchart illustrating an exemplary embodiment of the present invention.

Figure 708:
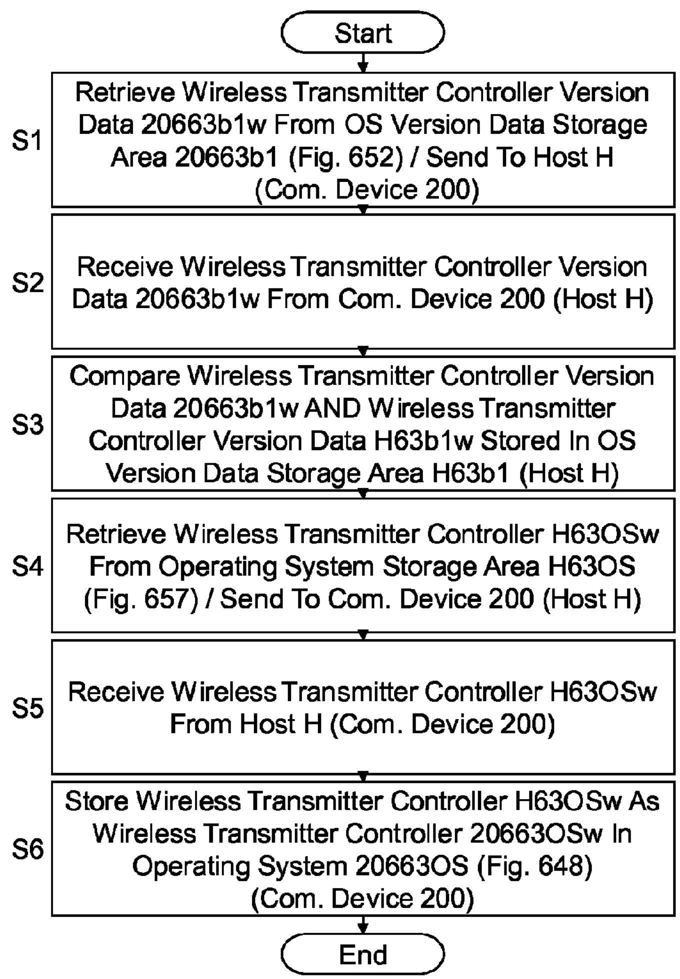

FIG. 708 is a flowchart illustrating an exemplary embodiment of the present invention.

Figure 709:
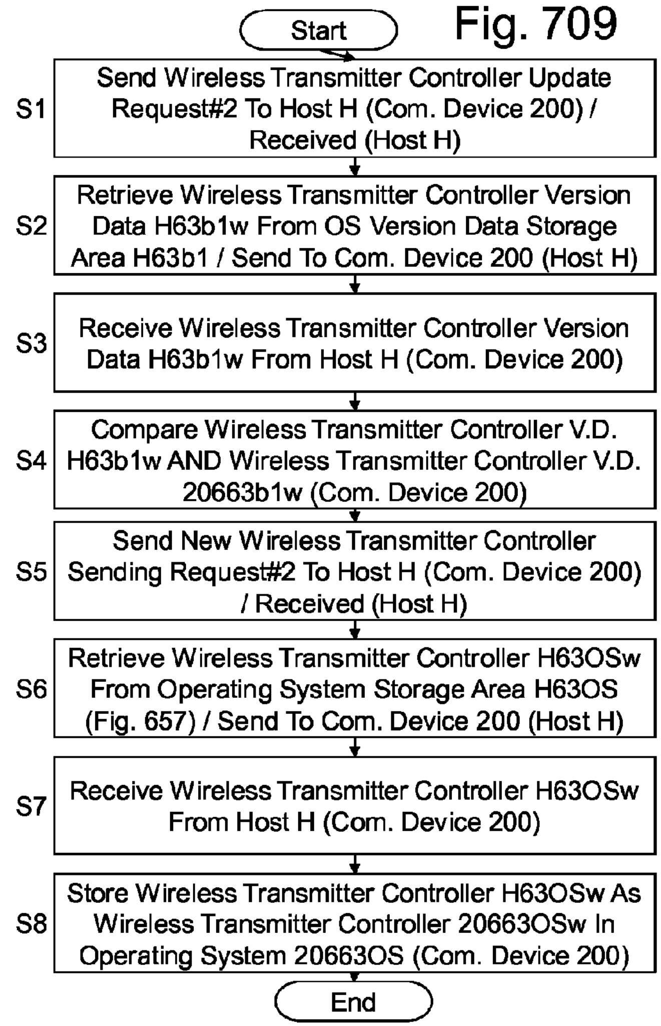

FIG. 709 is a flowchart illustrating an exemplary embodiment of the present invention.

Figure 710:
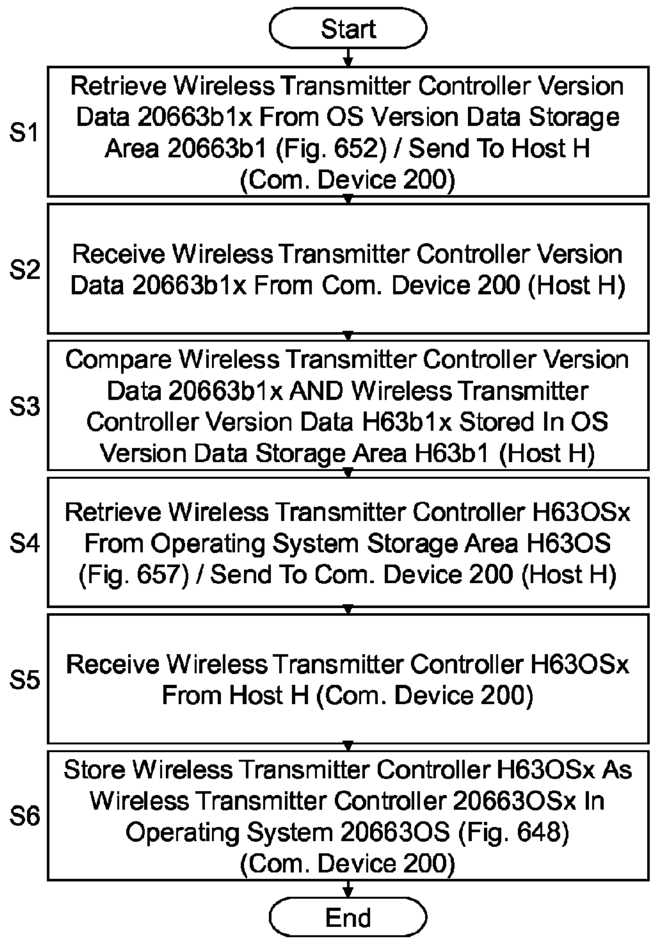

FIG. 710 is a flowchart illustrating an exemplary embodiment of the present invention.

Figure 711:
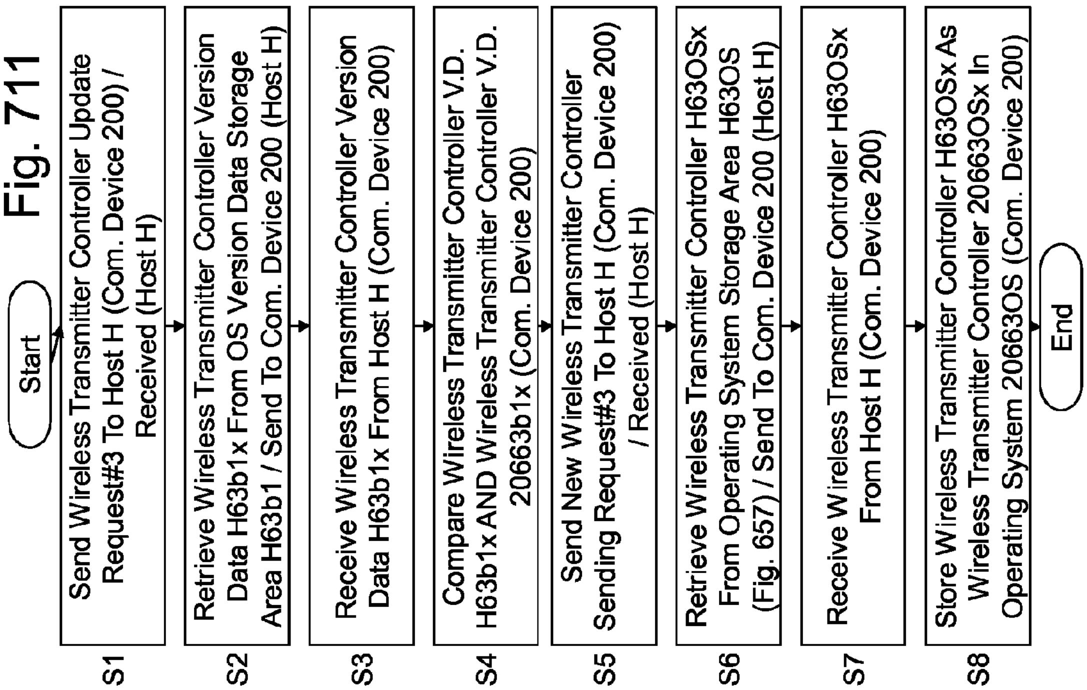

FIG. 711 is a flowchart illustrating an exemplary embodiment of the present invention.

Figure 712:
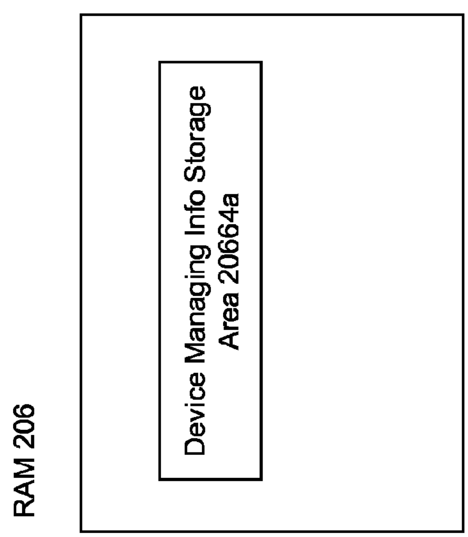

FIG. 712 is a block diagram illustrating an exemplary embodiment of the present invention.

Figure 713:
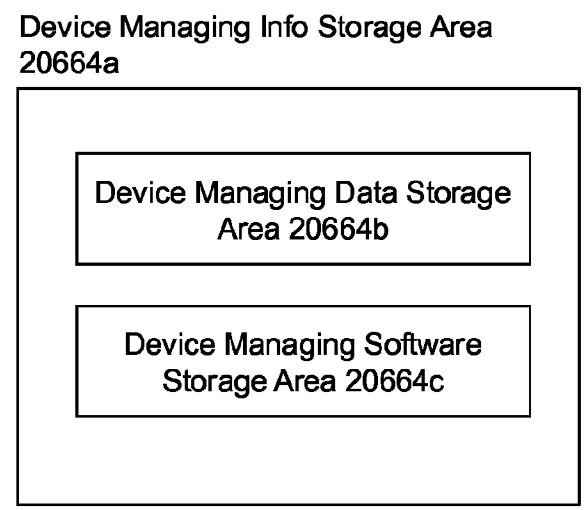

FIG. 713 is a block diagram illustrating an exemplary embodiment of the present invention.

Figure 714:
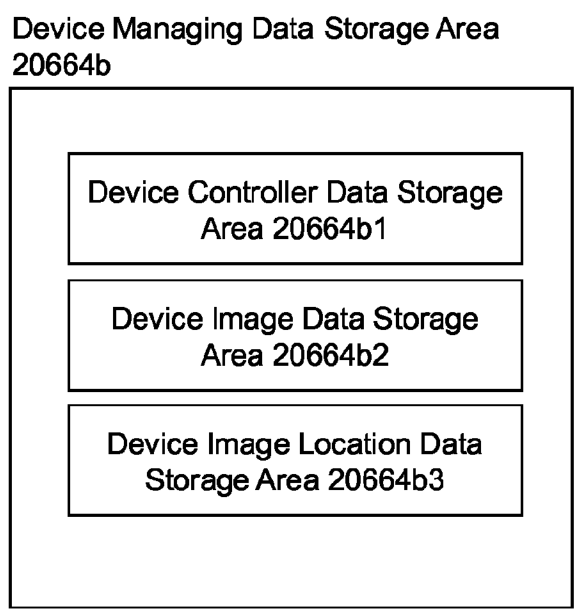

FIG. 714 is a block diagram illustrating an exemplary embodiment of the present invention.

FIG. 715 is a block diagram illustrating an exemplary embodiment of the present invention.

FIG. 716 is a block diagram illustrating an exemplary embodiment of the present invention.

FIG. 717 is a block diagram illustrating an exemplary embodiment of the present invention.

FIG. 718 is a block diagram illustrating an exemplary embodiment of the present invention.

Figure 719:
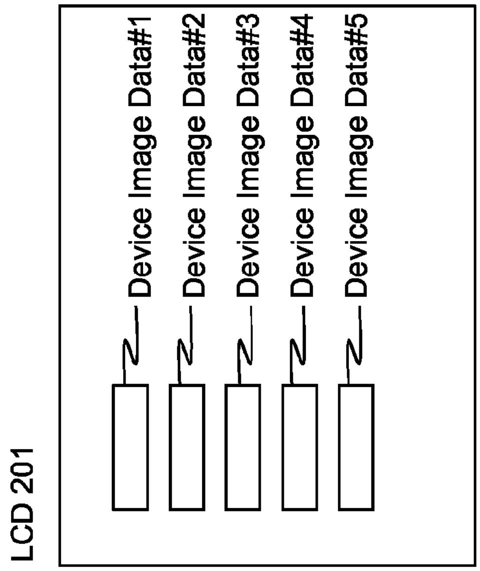

FIG. 719 is a simplified illustration illustrating an exemplary embodiment of the present invention.

Figure 720:
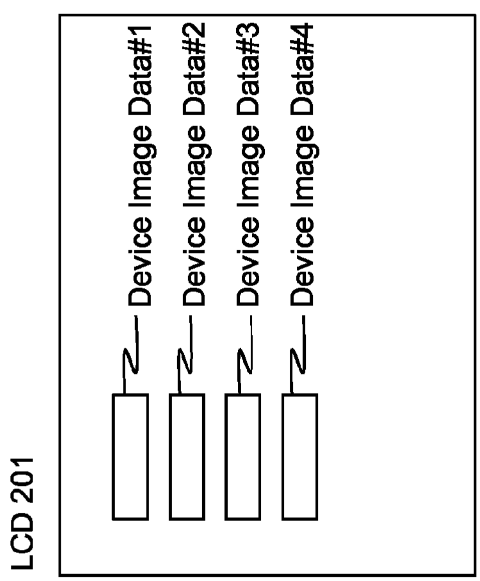

FIG. 720 is a simplified illustration illustrating an exemplary embodiment of the present invention.

Figure 721:
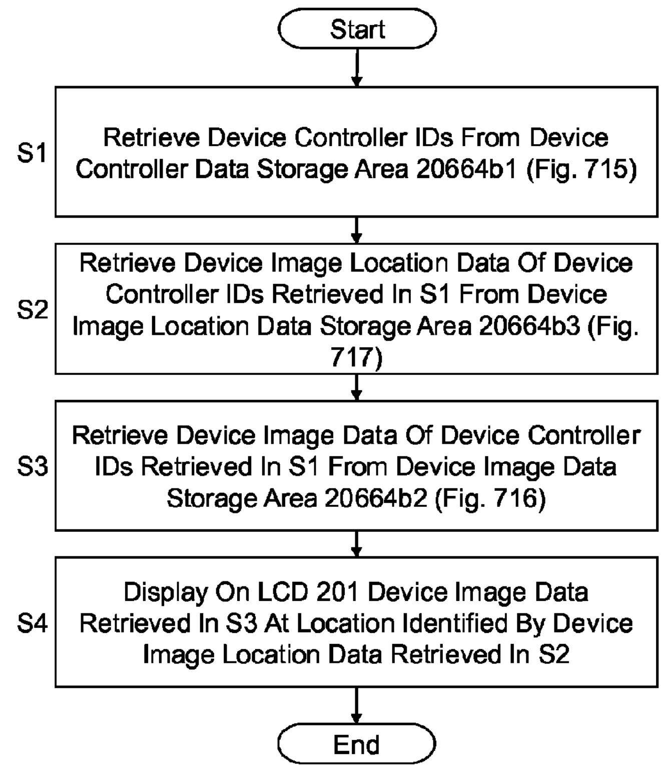

FIG. 721 is a flowchart illustrating an exemplary embodiment of the present invention.

Figure 722:
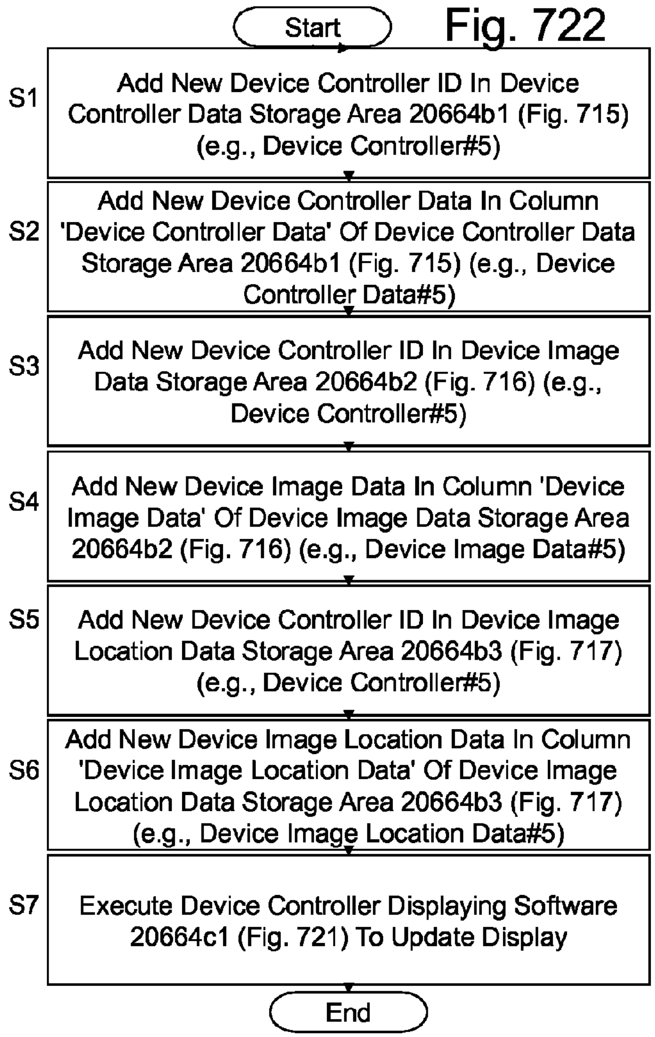

FIG. 722 is a flowchart illustrating an exemplary embodiment of the present invention.

Figure 723:
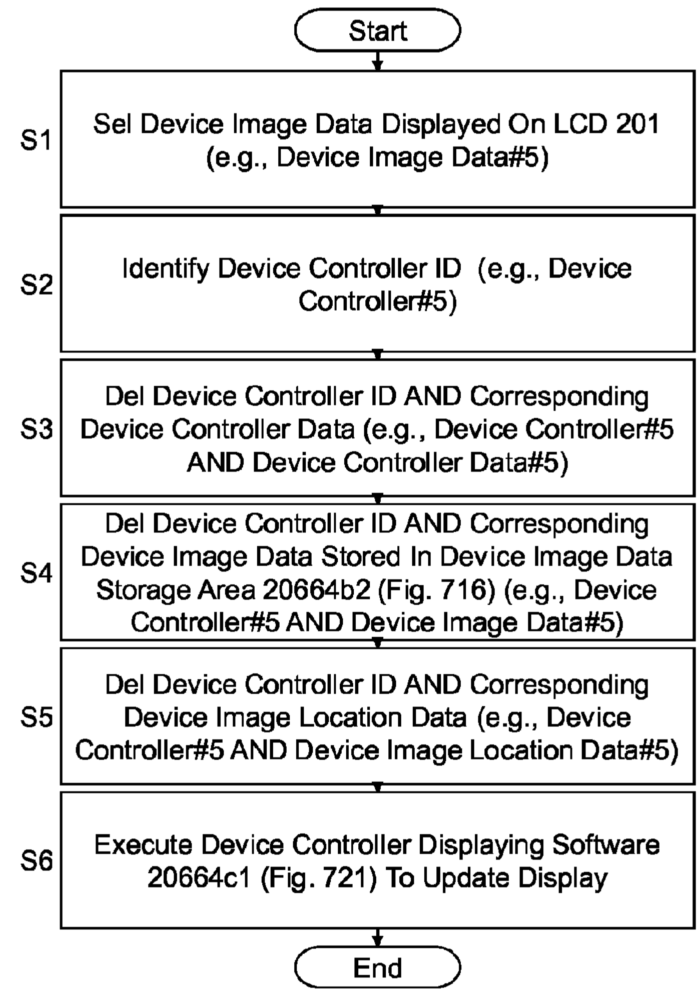

FIG. 723 is a flowchart illustrating an exemplary embodiment of the present invention.

Figure 724:
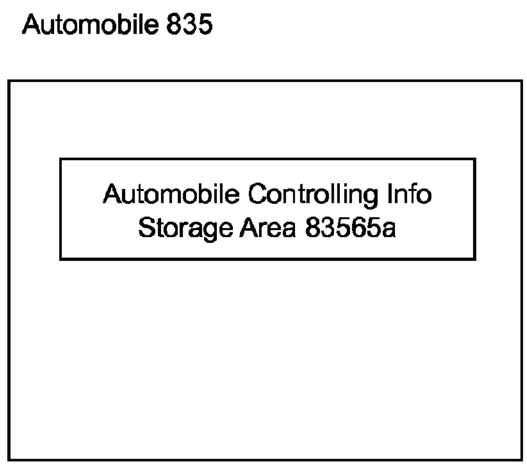

FIG. 724 is a block diagram illustrating an exemplary embodiment of the present invention.

Figure 725:
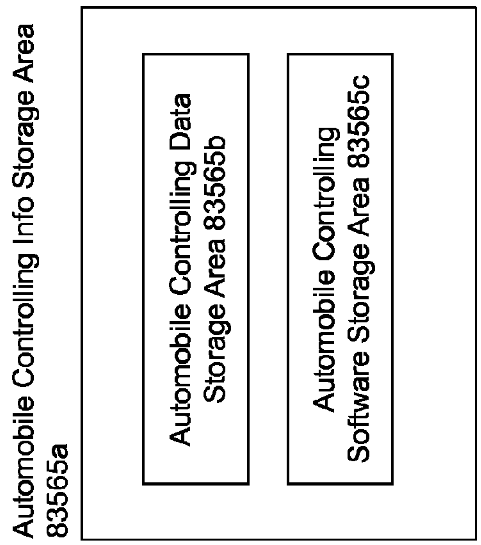

FIG. 725 is a block diagram illustrating an exemplary embodiment of the present invention.

Figure 726:
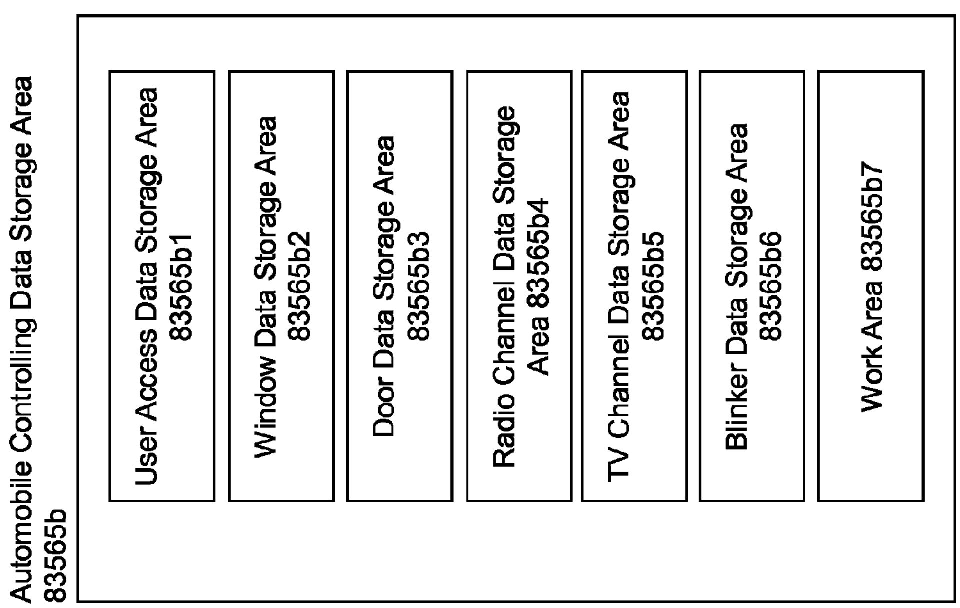

FIG. 726 is a block diagram illustrating an exemplary embodiment of the present invention.

FIG. 727 is a block diagram illustrating an exemplary embodiment of the present invention.

FIG. 728 is a block diagram illustrating an exemplary embodiment of the present invention.

FIG. 729 is a block diagram illustrating an exemplary embodiment of the present invention.

FIG. 730 is a block diagram illustrating an exemplary embodiment of the present invention.

FIG. 731 is a block diagram illustrating an exemplary embodiment of the present invention.

FIG. 732 is a block diagram illustrating an exemplary embodiment of the present invention.

Figure 733:
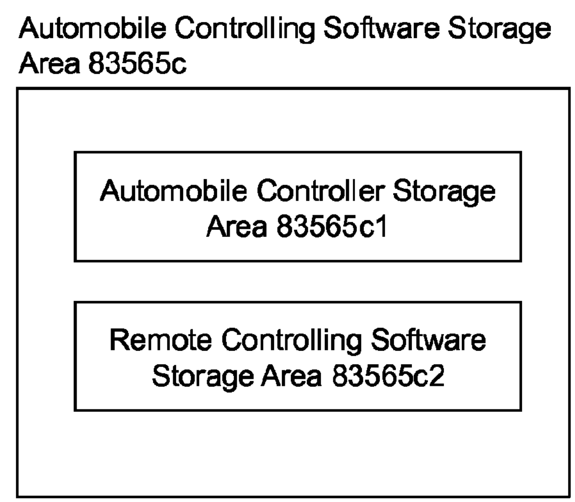

FIG. 733 is a block diagram illustrating an exemplary embodiment of the present invention.

Figure 734:
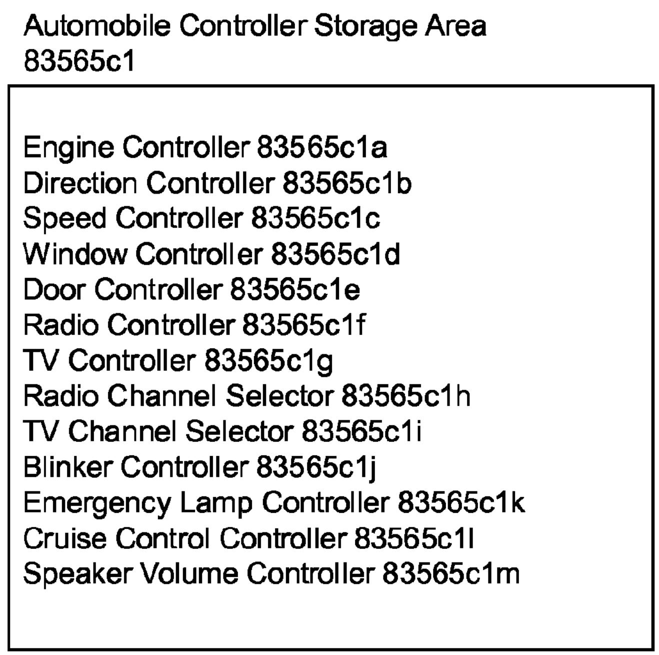

FIG. 734 is a block diagram illustrating an exemplary embodiment of the present invention.

Figure 735:

FIG. 735 is a block diagram illustrating an exemplary embodiment of the present invention.

Figure 736:
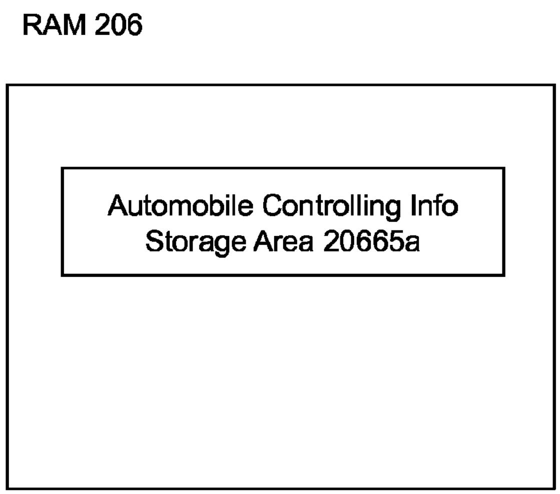

FIG. 736 is a block diagram illustrating an exemplary embodiment of the present invention.

Figure 737:
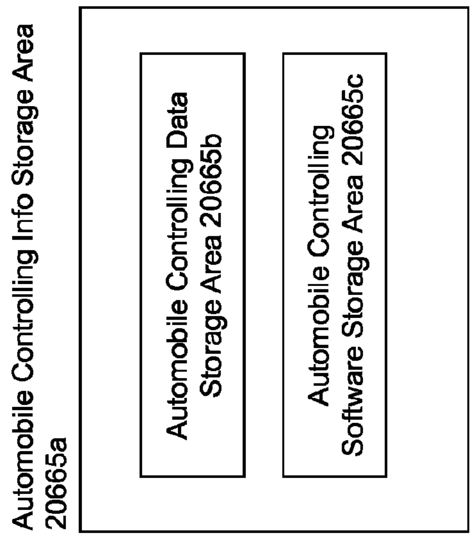

FIG. 737 is a block diagram illustrating an exemplary embodiment of the present invention.

Figure 738:
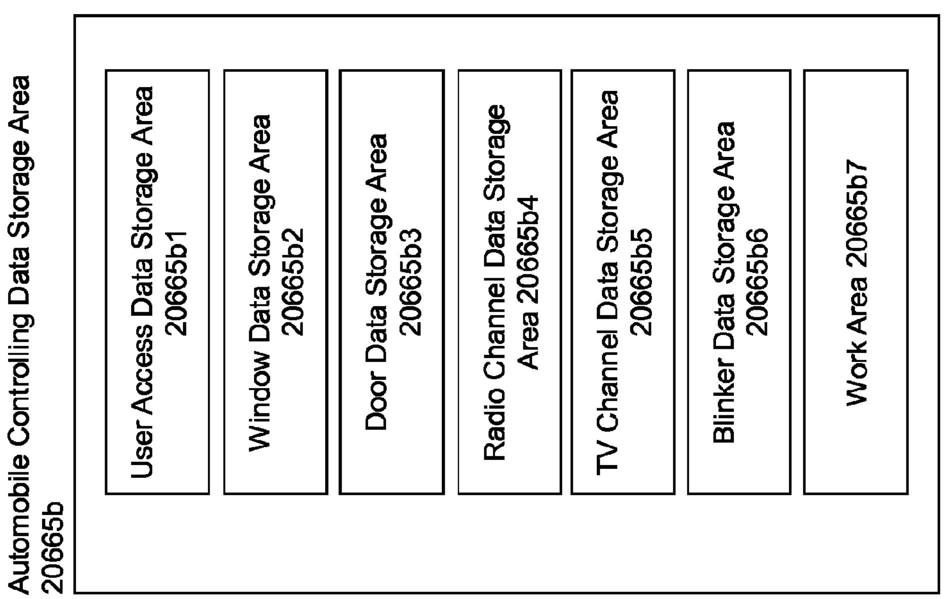

FIG. 738 is a block diagram illustrating an exemplary embodiment of the present invention.

FIG. 739 is a block diagram illustrating an exemplary embodiment of the present invention.

FIG. 740 is a block diagram illustrating an exemplary embodiment of the present invention.

FIG. 741 is a block diagram illustrating an exemplary embodiment of the present invention.

FIG. 742 is a block diagram illustrating an exemplary embodiment of the present invention.

FIG. 743 is a block diagram illustrating an exemplary embodiment of the present invention.

FIG. 744 is a block diagram illustrating an exemplary embodiment of the present invention.

Figure 745:
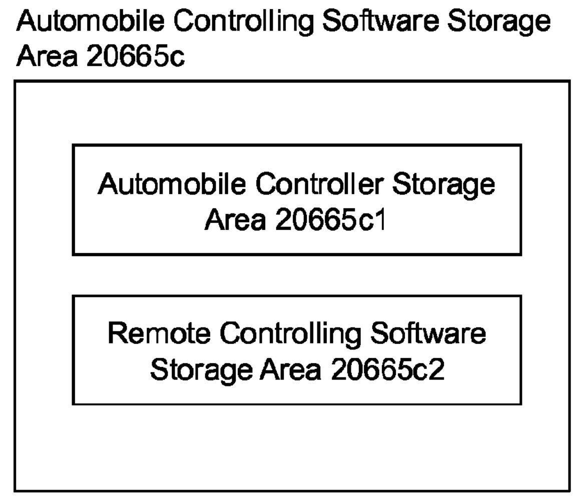

FIG. 745 is a block diagram illustrating an exemplary embodiment of the present invention.

Figure 746:
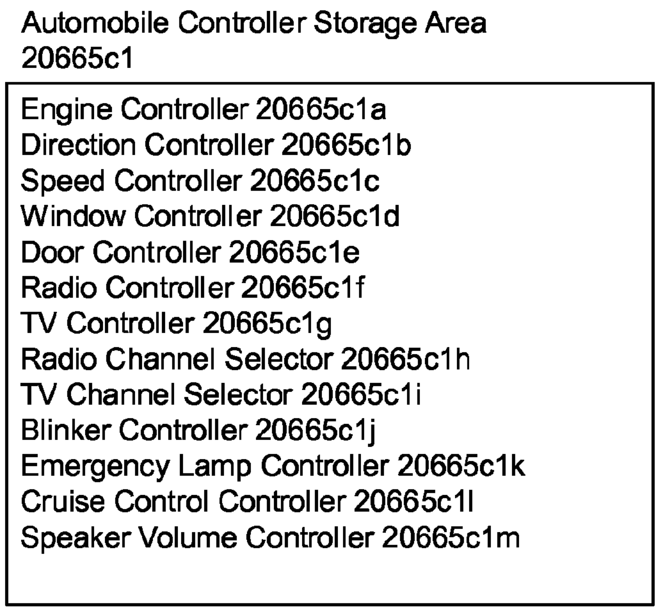

FIG. 746 is a block diagram illustrating an exemplary embodiment of the present invention.

Figure 747:
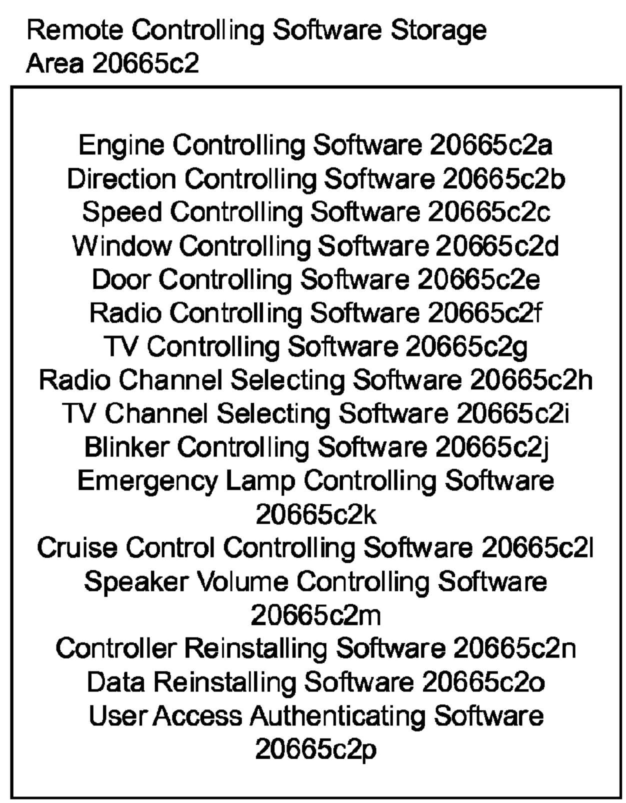

FIG. 747 is a block diagram illustrating an exemplary embodiment of the present invention.

Figure 748:
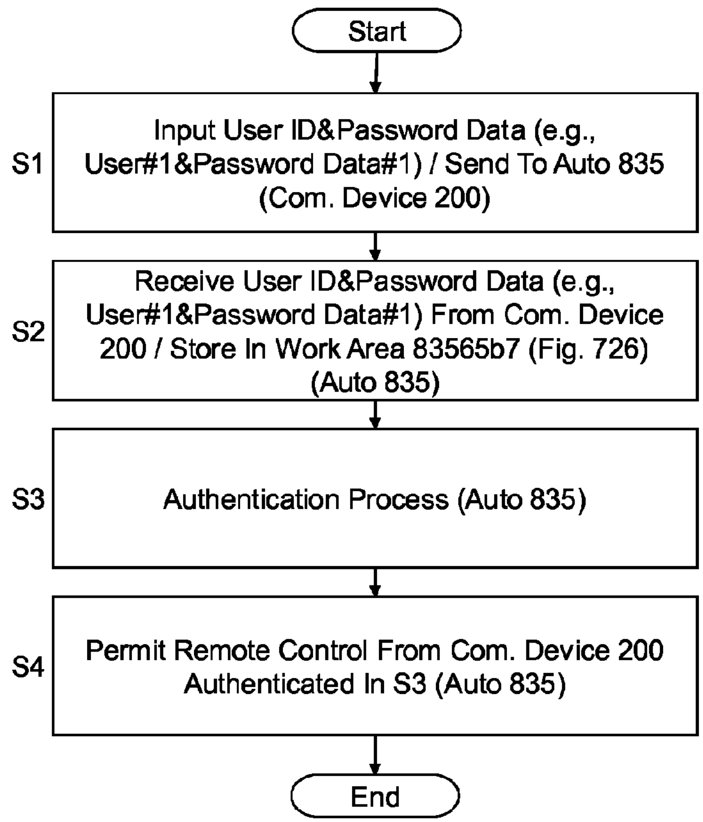

FIG. 748 is a flowchart illustrating an exemplary embodiment of the present invention.

Figure 749:
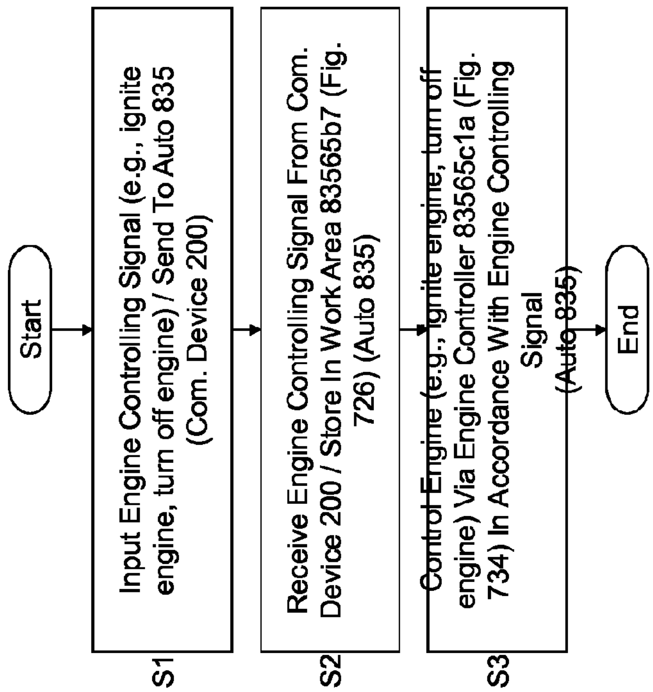

FIG. 749 is a flowchart illustrating an exemplary embodiment of the present invention.

Figure 750:
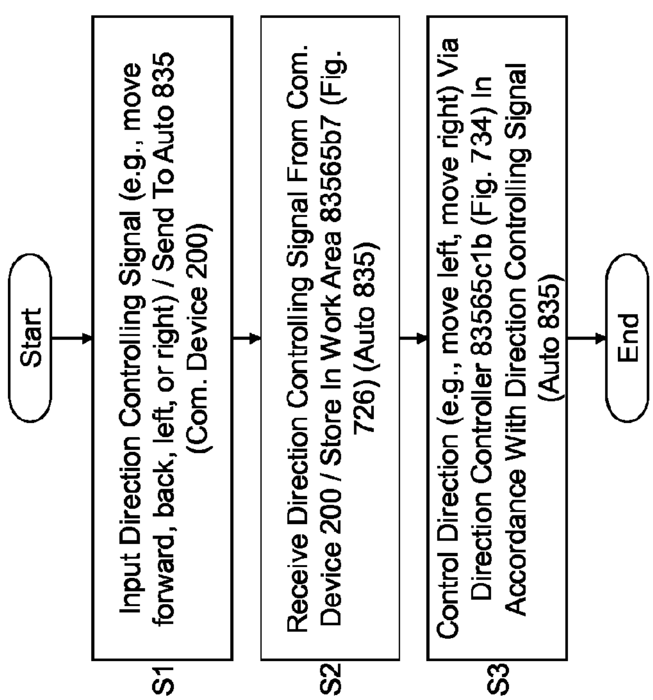

FIG. 750 is a flowchart illustrating an exemplary embodiment of the present invention.

Figure 751:
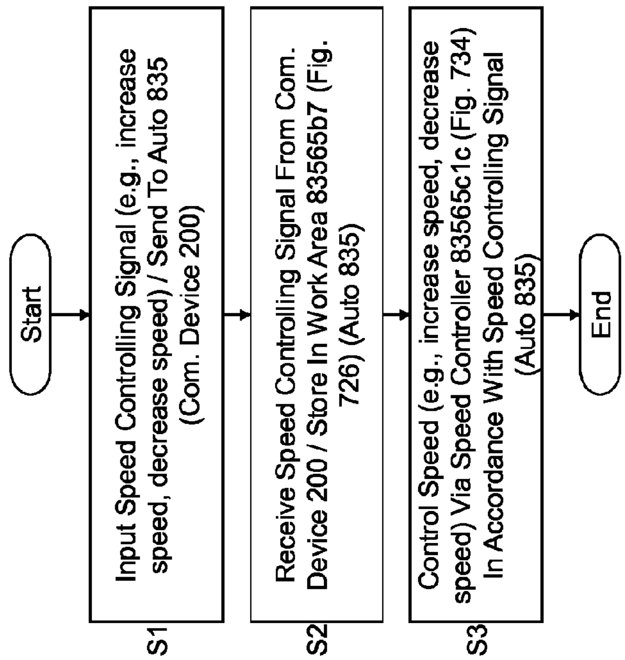

FIG. 751 is a flowchart illustrating an exemplary embodiment of the present invention.

Figure 752:
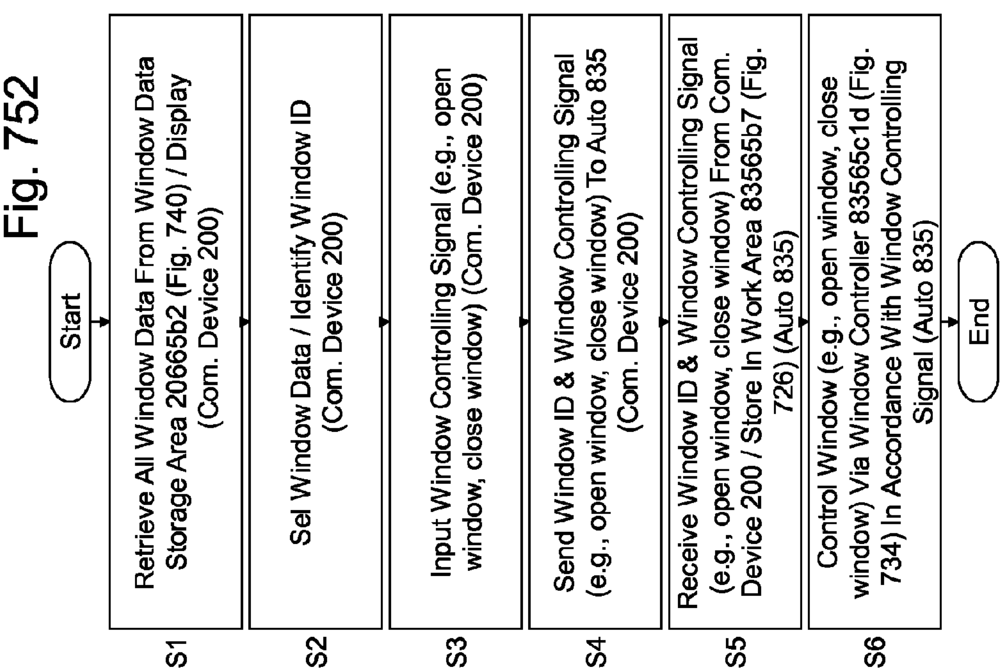

FIG. 752 is a flowchart illustrating an exemplary embodiment of the present invention.

Figure 753:
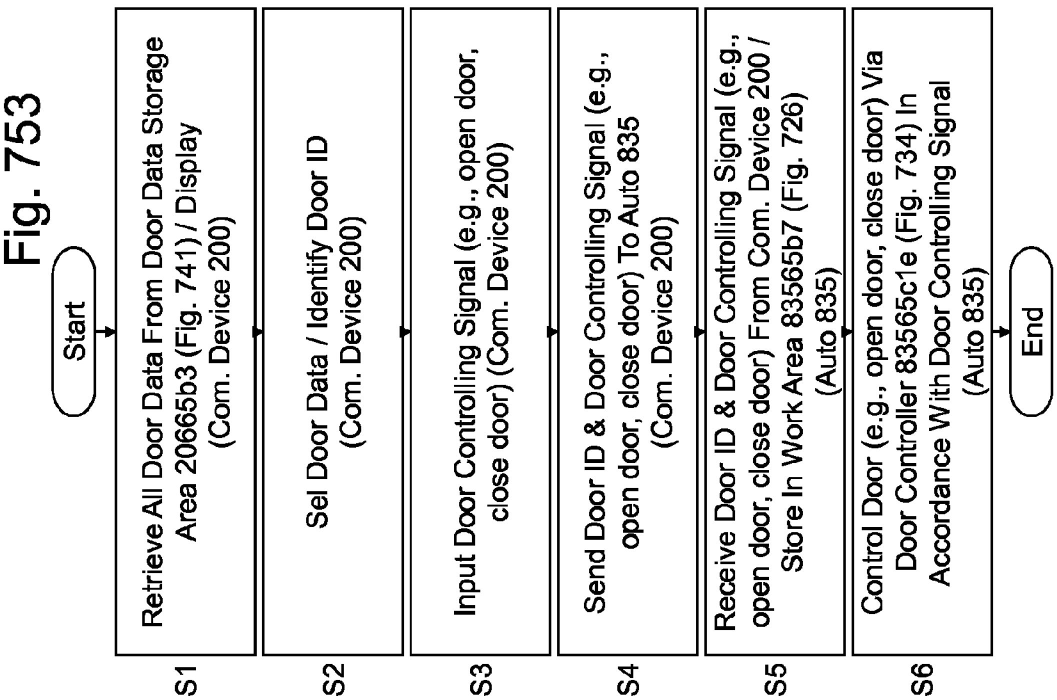

FIG. 753 is a flowchart illustrating an exemplary embodiment of the present invention.

Figure 754:
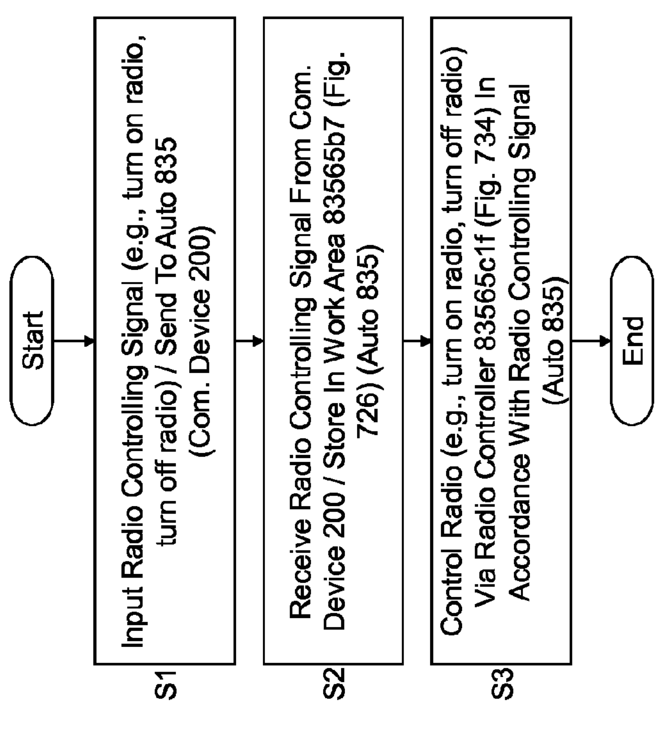

FIG. 754 is a flowchart illustrating an exemplary embodiment of the present invention.

Figure 755:
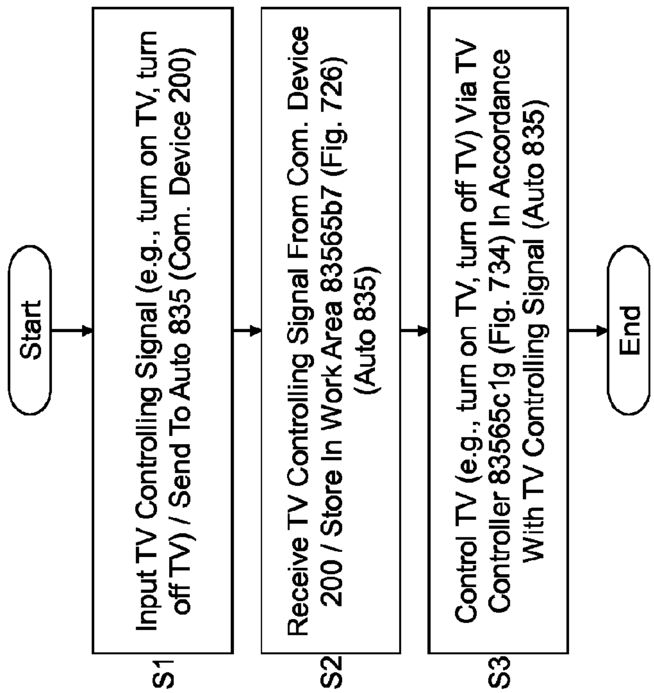

FIG. 755 is a flowchart illustrating an exemplary embodiment of the present invention.

Figure 756:
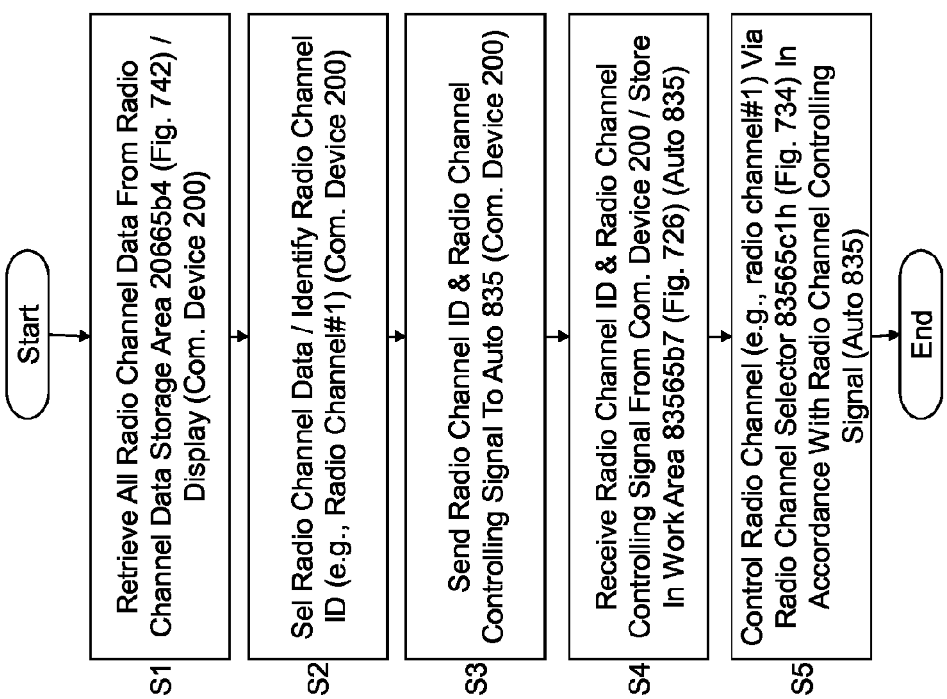

FIG. 756 is a flowchart illustrating an exemplary embodiment of the present invention.

Figure 757:
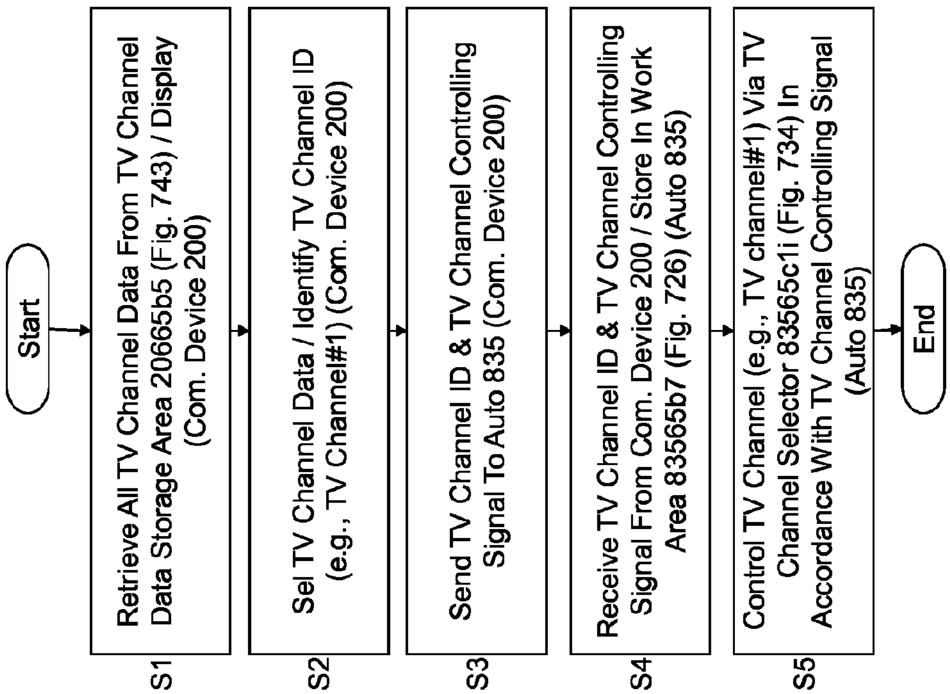

FIG. 757 is a flowchart illustrating an exemplary embodiment of the present invention.

Figure 758:
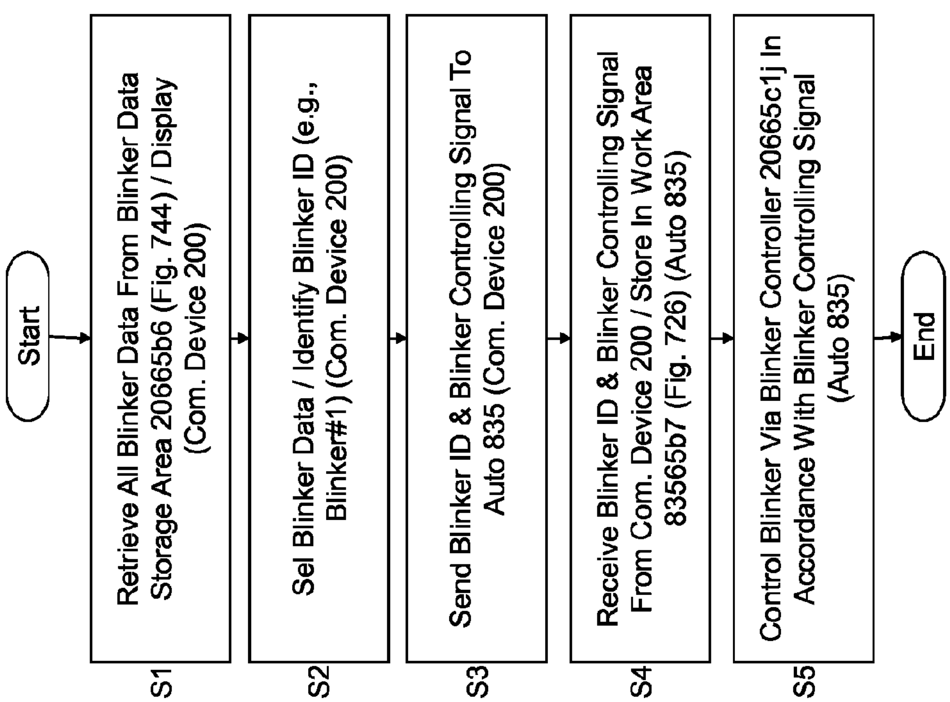

FIG. 758 is a flowchart illustrating an exemplary embodiment of the present invention.

Figure 759:
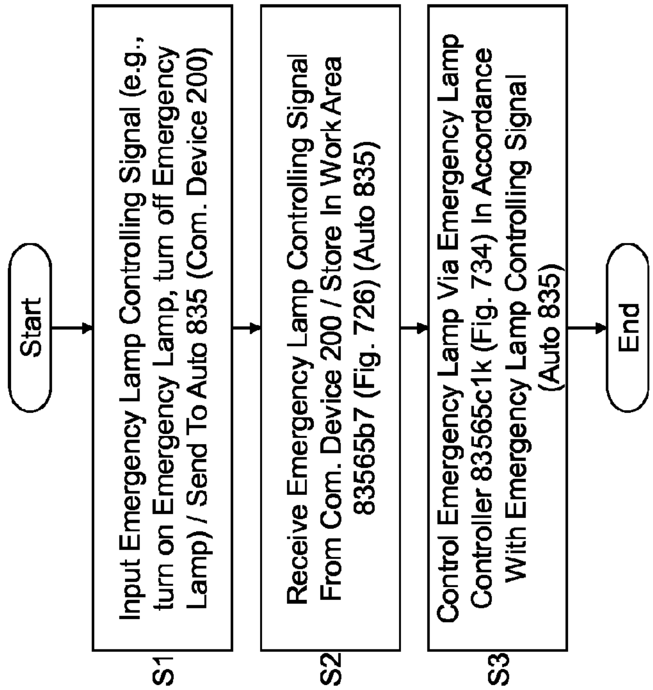

FIG. 759 is a flowchart illustrating an exemplary embodiment of the present invention.

Figure 760:
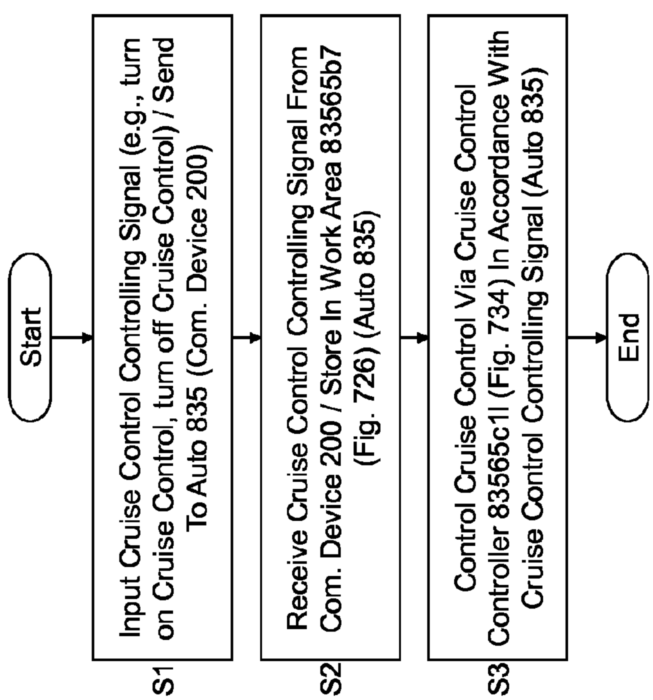

FIG. 760 is a flowchart illustrating an exemplary embodiment of the present invention.

Figure 761:
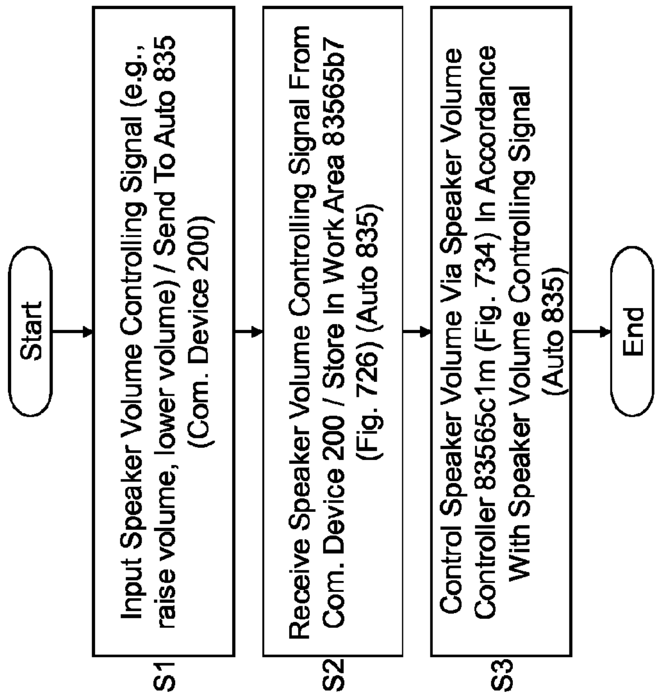

FIG. 761 is a flowchart illustrating an exemplary embodiment of the present invention.

Figure 762:
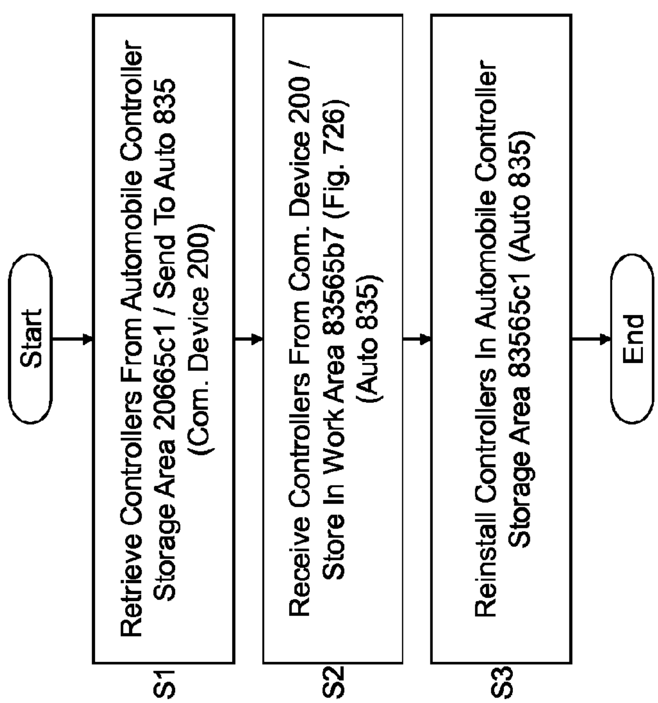

FIG. 762 is a flowchart illustrating an exemplary embodiment of the present invention.

Figure 763:
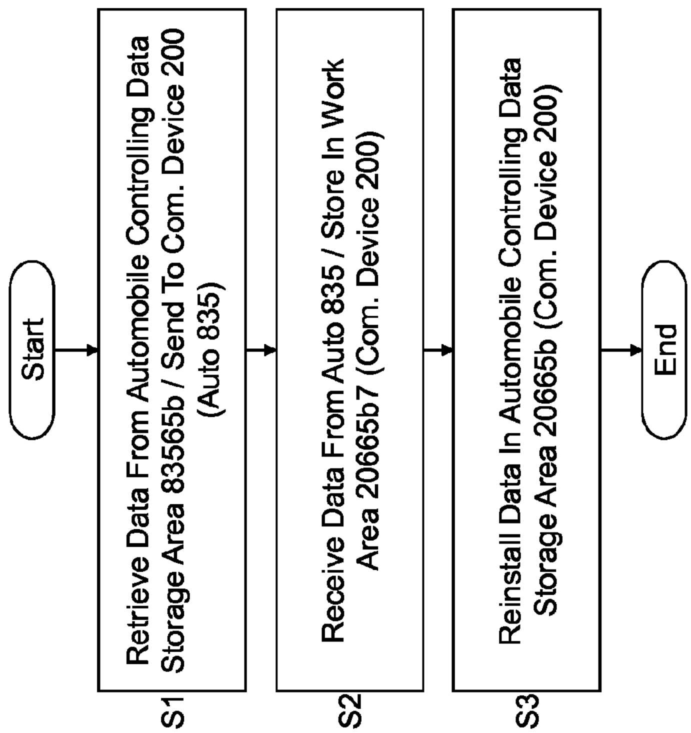

FIG. 763 is a flowchart illustrating an exemplary embodiment of the present invention.

Figure 764:
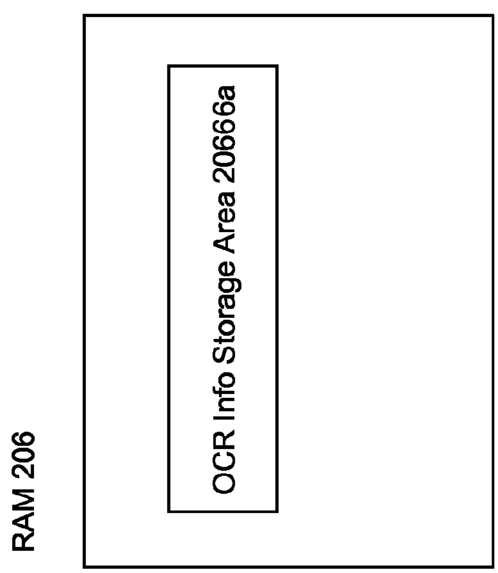

FIG. 764 is a block diagram illustrating an exemplary embodiment of the present invention.

Figure 765:
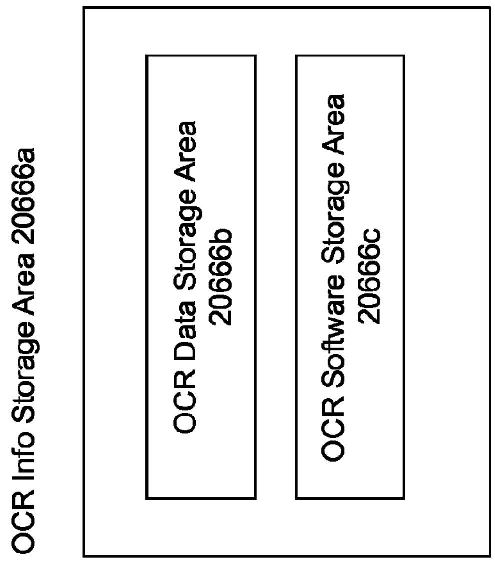

FIG. 765 is a block diagram illustrating an exemplary embodiment of the present invention.

Figure 766:
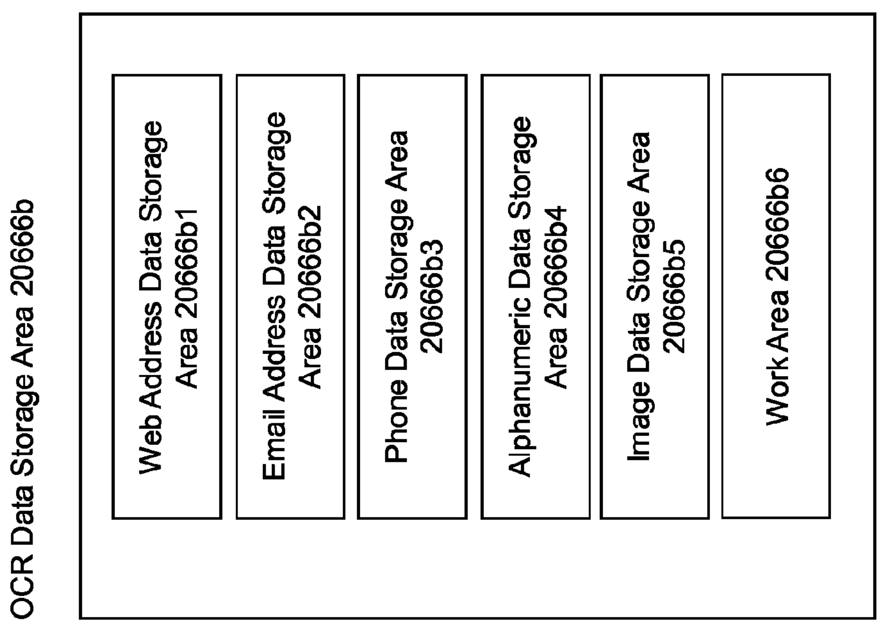

FIG. 766 is a block diagram illustrating an exemplary embodiment of the present invention.

FIG. 767 is a block diagram illustrating an exemplary embodiment of the present invention.

FIG. 768 is a block diagram illustrating an exemplary embodiment of the present invention.

FIG. 769 is a block diagram illustrating an exemplary embodiment of the present invention.

FIG. 770 is a block diagram illustrating an exemplary embodiment of the present invention.

FIG. 771 is a block diagram illustrating an exemplary embodiment of the present invention.

FIG. 772 is a block diagram illustrating an exemplary embodiment of the present invention.

Figures 773, 774:
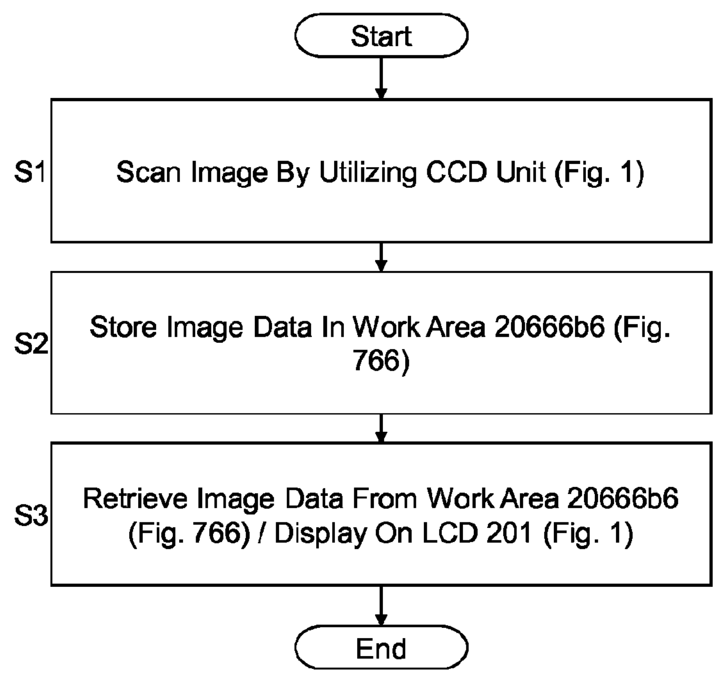

FIG. 773 is a block diagram illustrating an exemplary embodiment of the present invention.

FIG. 774 is a flowchart illustrating an exemplary embodiment of the present invention.

Figure 775:
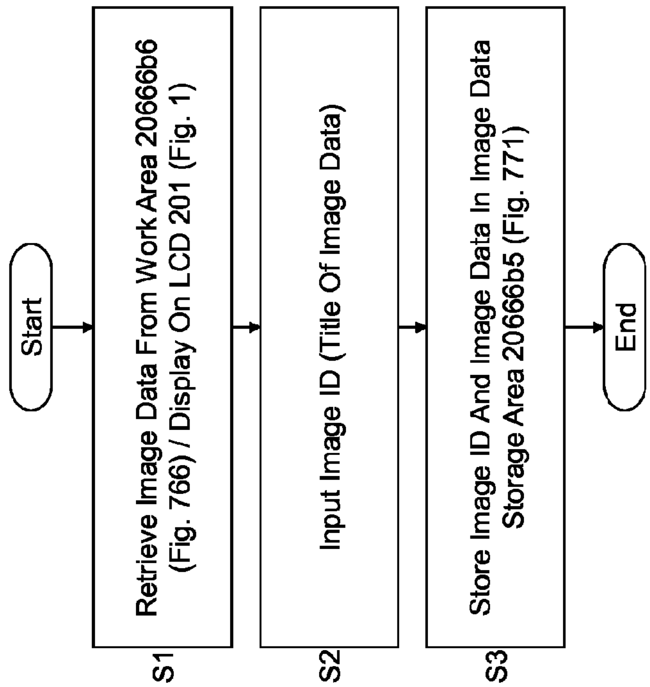

FIG. 775 is a flowchart illustrating an exemplary embodiment of the present invention.

Figure 776:
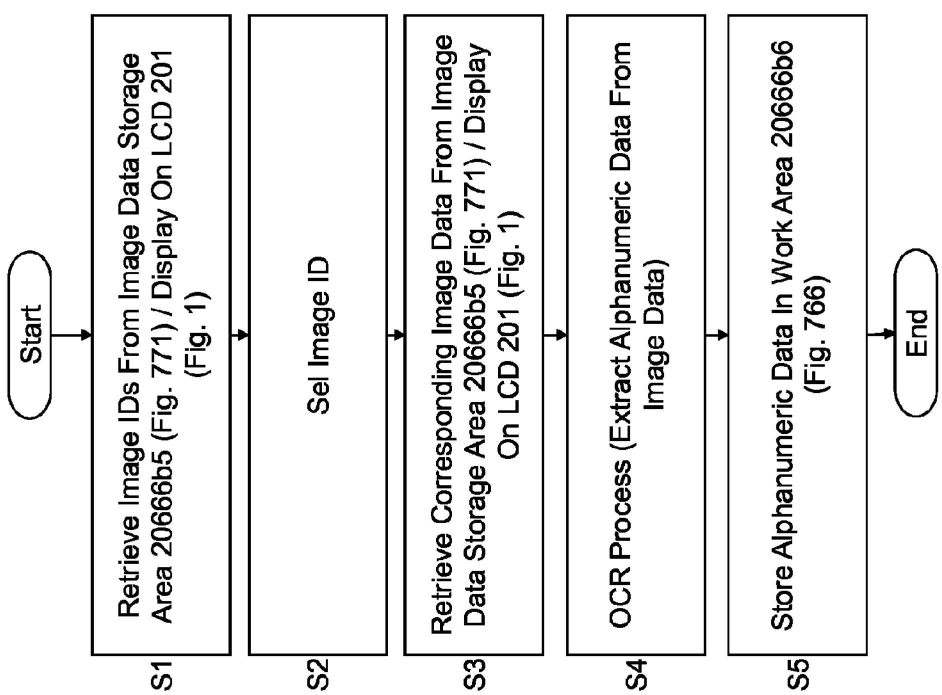

FIG. 776 is a flowchart illustrating an exemplary embodiment of the present invention.

Figure 777:
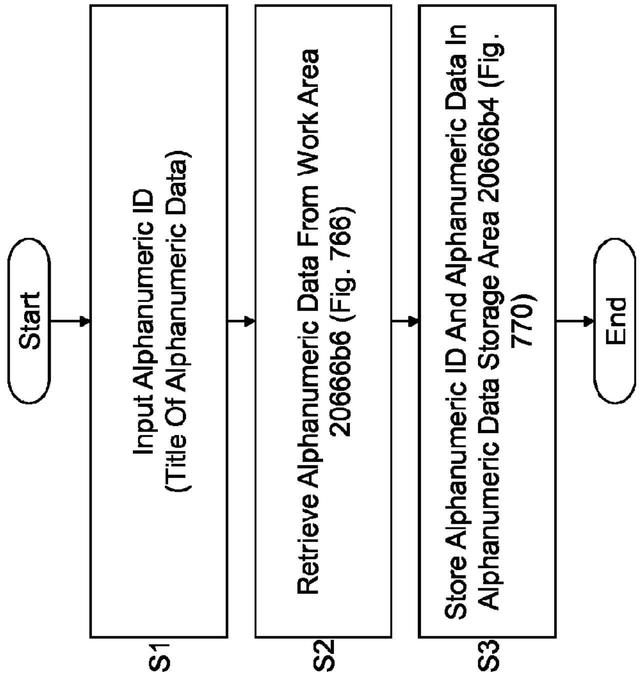

FIG. 777 is a flowchart illustrating an exemplary embodiment of the present invention.

Figure 778:
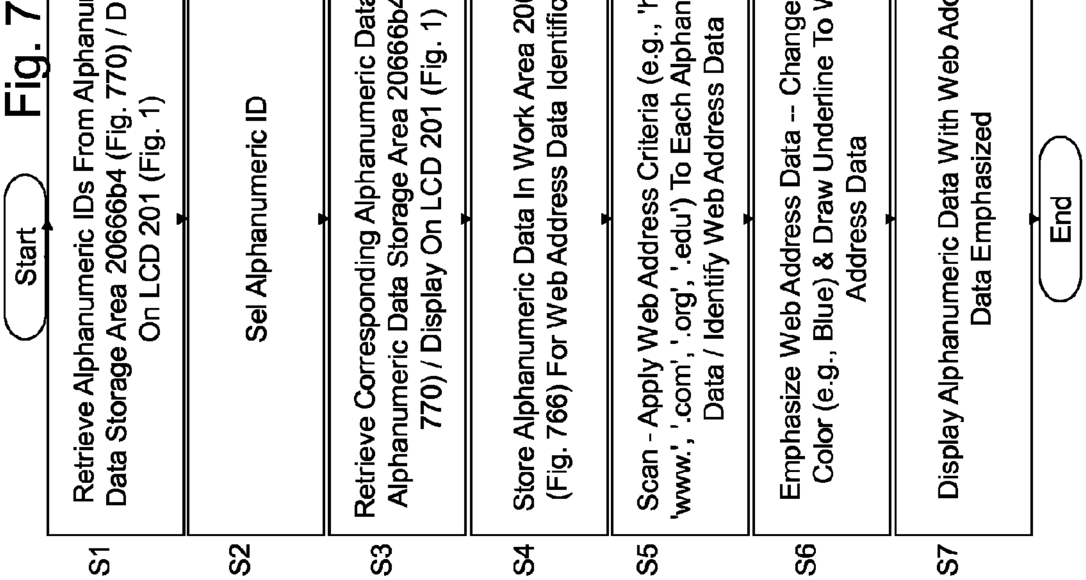

FIG. 778 is a flowchart illustrating an exemplary embodiment of the present invention.

Figure 779:
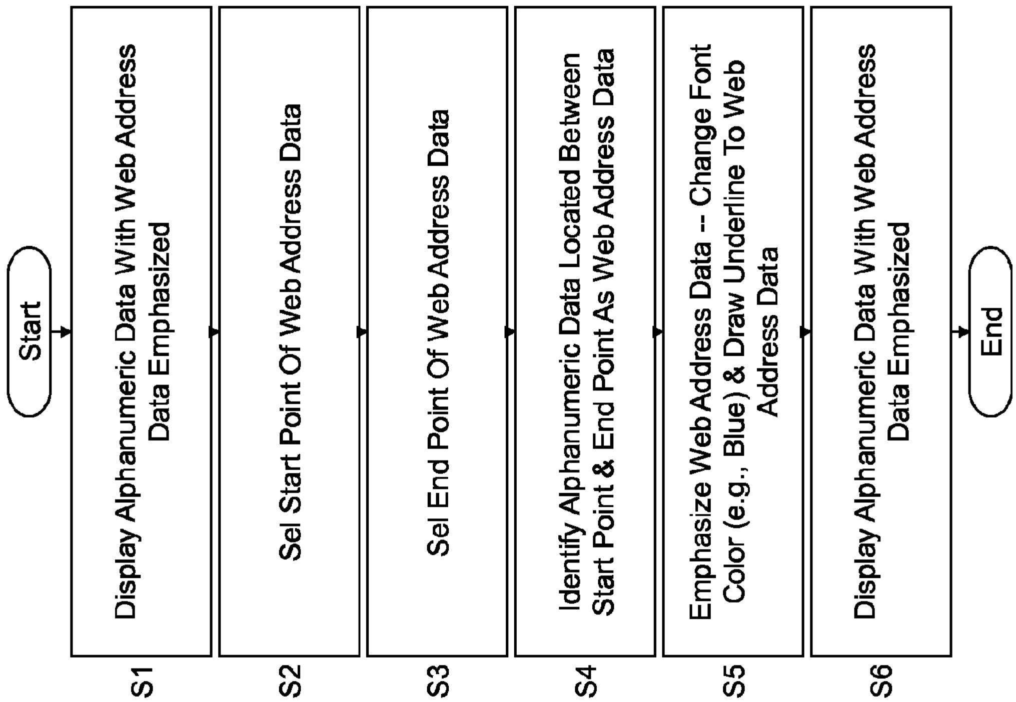

FIG. 779 is a flowchart illustrating an exemplary embodiment of the present invention.

Figure 780:
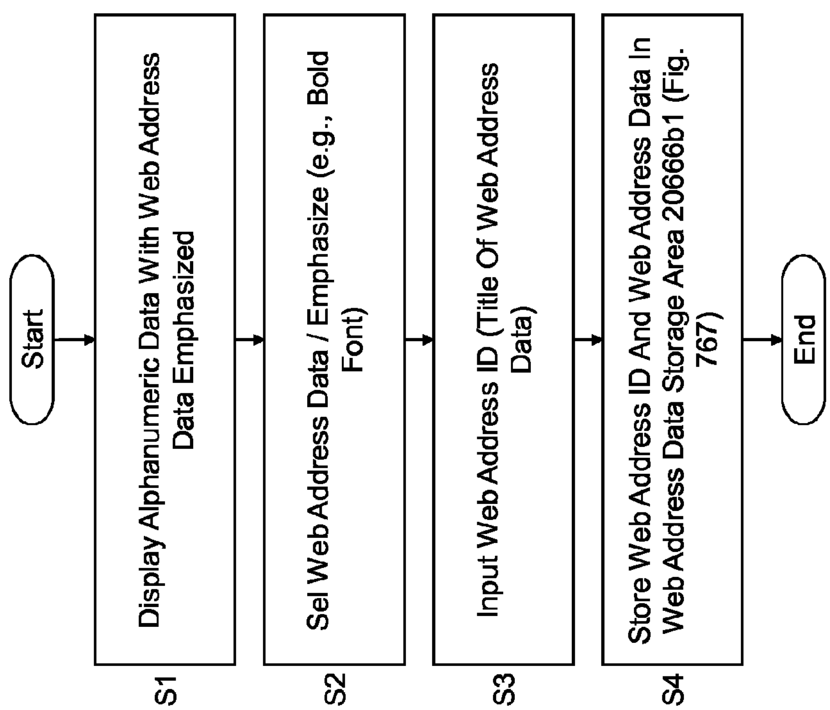

FIG. 780 is a flowchart illustrating an exemplary embodiment of the present invention.

Figure 781:
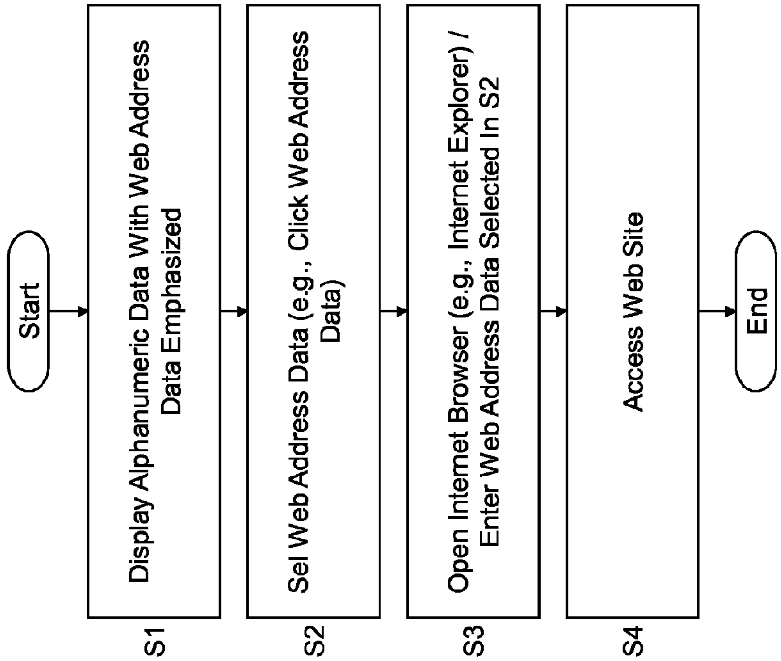

FIG. 781 is a flowchart illustrating an exemplary embodiment of the present invention.

Figure 782:
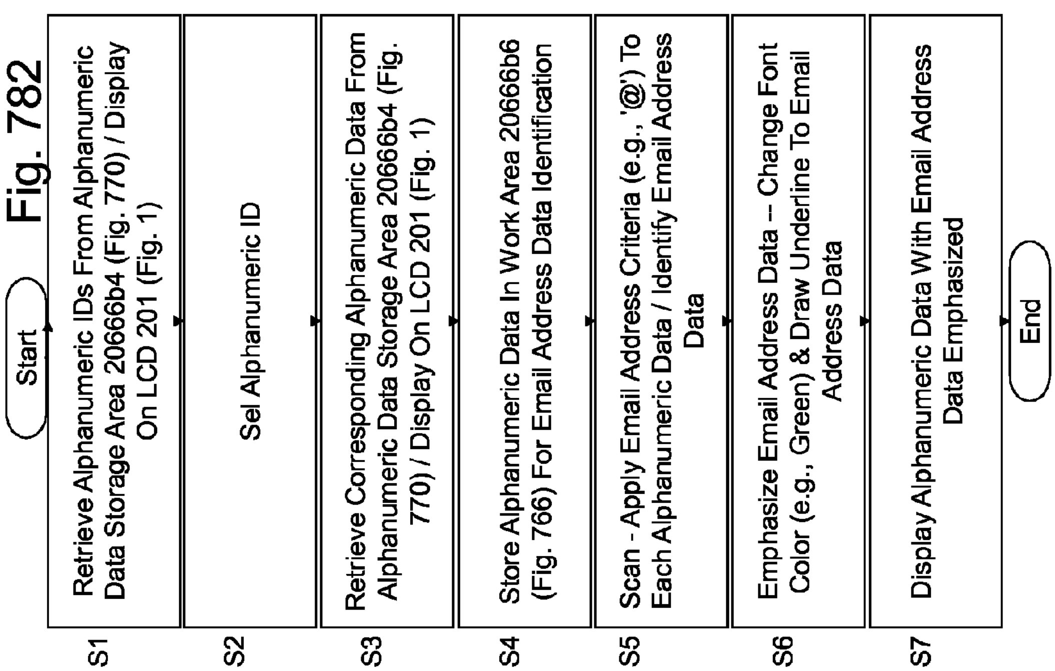

FIG. 782 is a flowchart illustrating an exemplary embodiment of the present invention.

Figure 783:
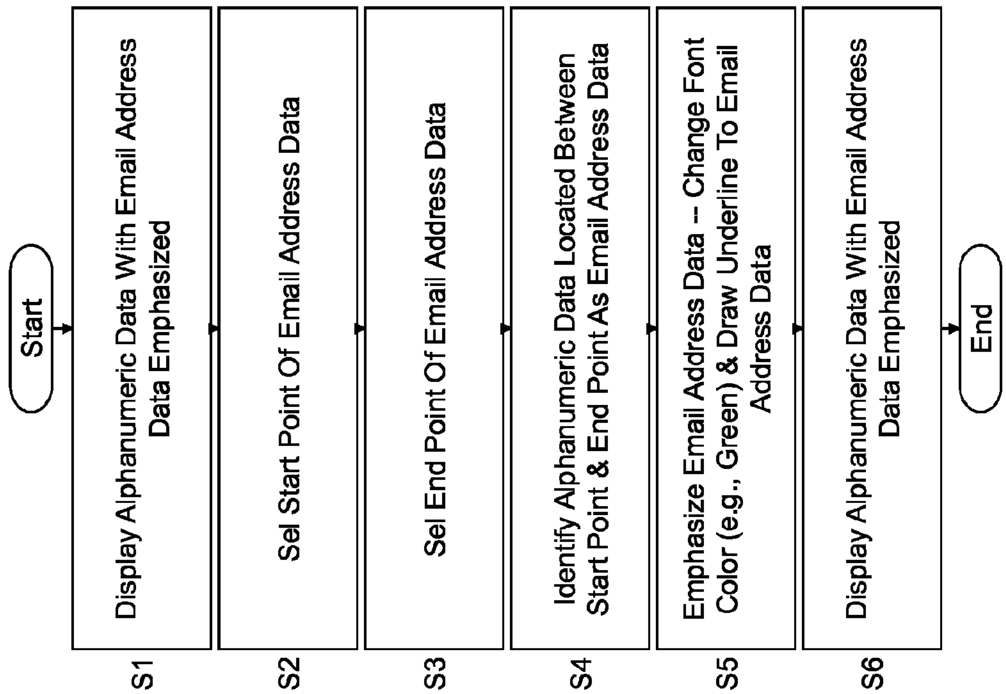

FIG. 783 is a flowchart illustrating an exemplary embodiment of the present invention.

Figure 784:
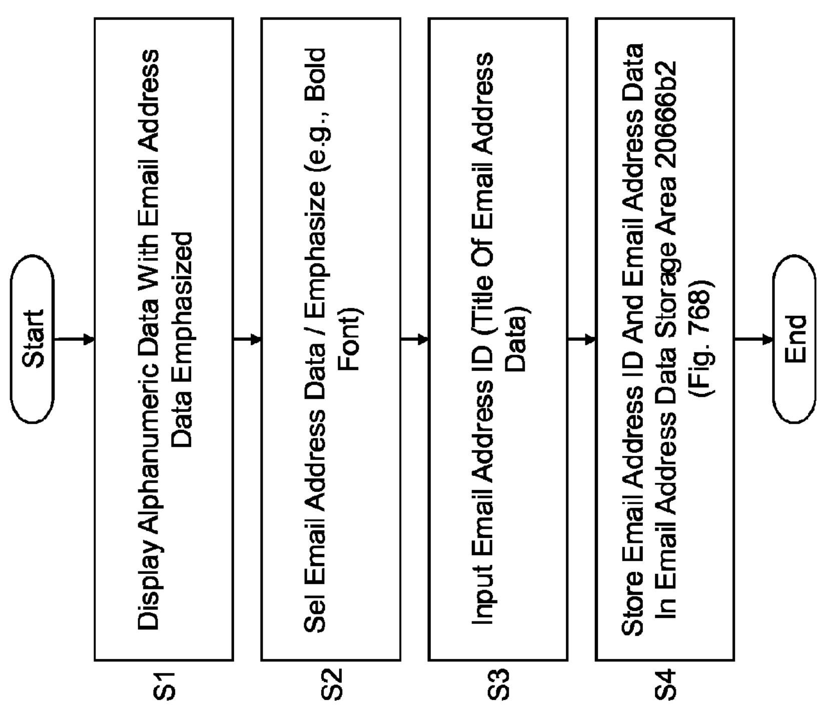

FIG. 784 is a flowchart illustrating an exemplary embodiment of the present invention.

Figure 785:
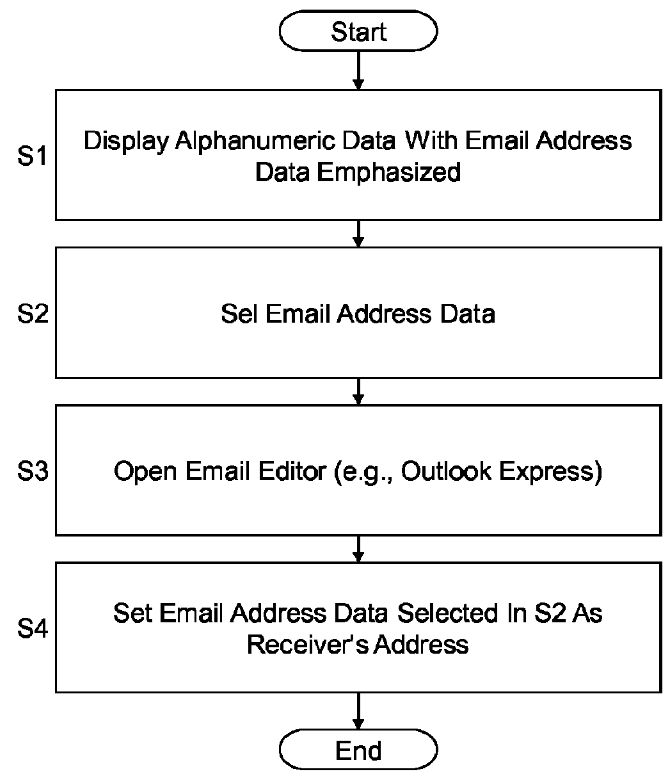

FIG. 785 is a flowchart illustrating an exemplary embodiment of the present invention.

Figure 786:
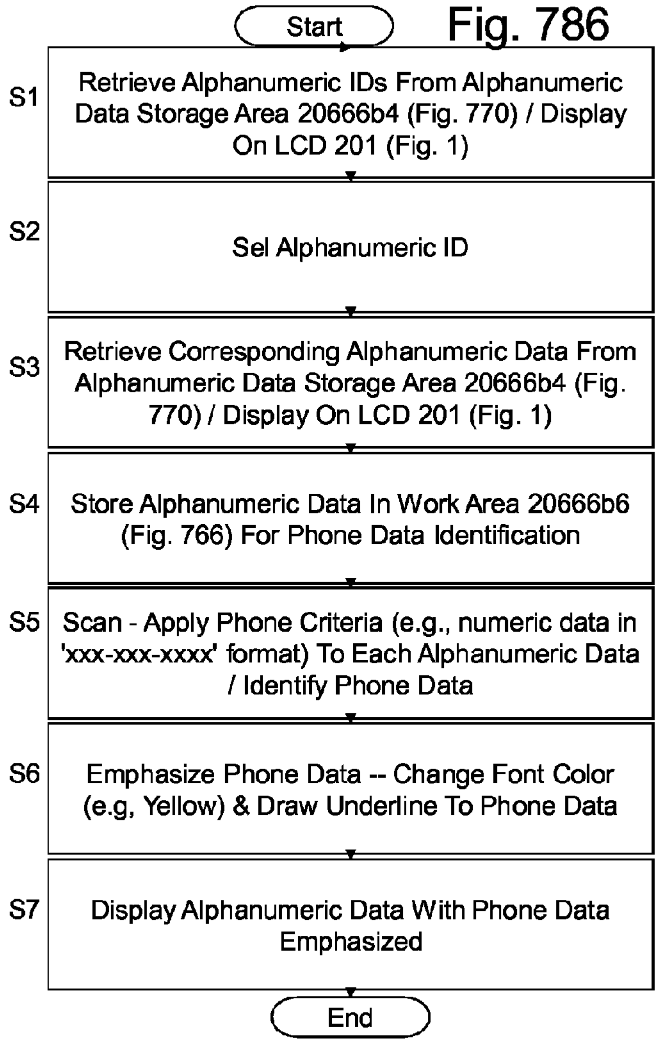

FIG. 786 is a flowchart illustrating an exemplary embodiment of the present invention.

Figure 787:
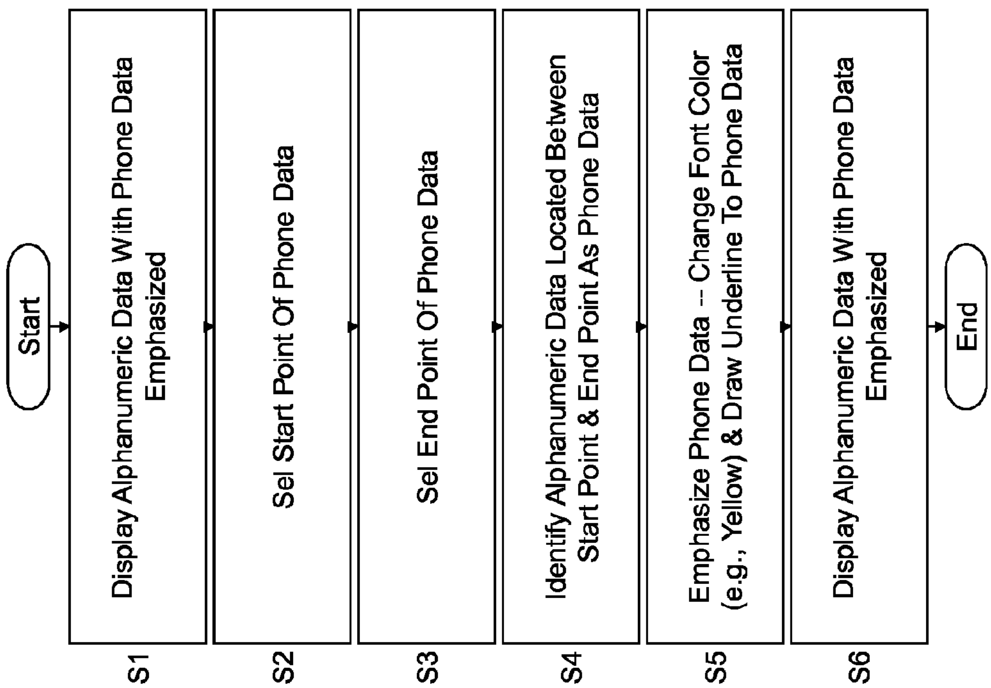

FIG. 787 is a flowchart illustrating an exemplary embodiment of the present invention.

Figure 788:
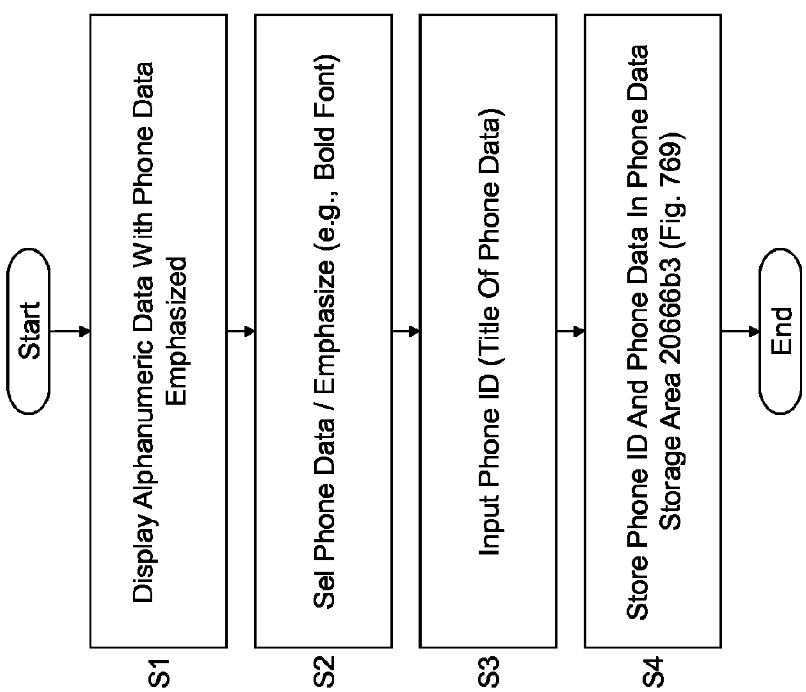

FIG. 788 is a flowchart illustrating an exemplary embodiment of the present invention.

Figure 789:
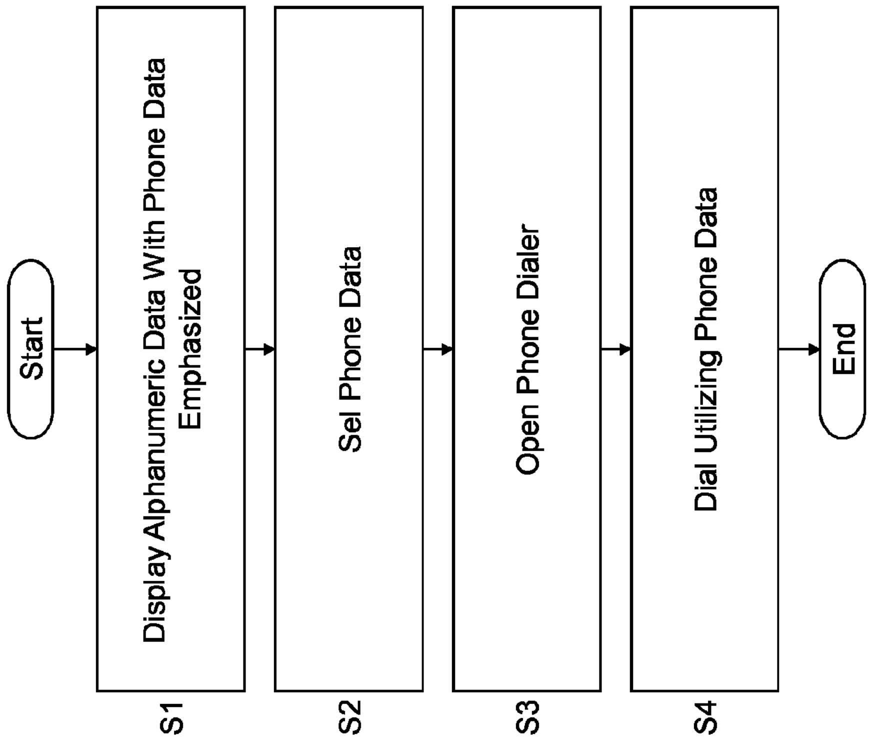

FIG. 789 is a flowchart illustrating an exemplary embodiment of the present invention.

Figure 790:
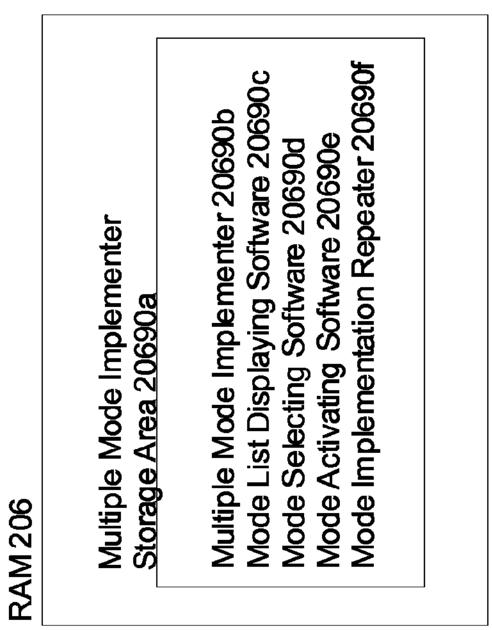

FIG. 790 is a block diagram illustrating an exemplary embodiment of the present invention.

Figure 791:
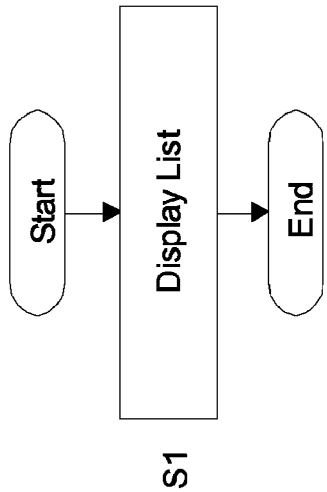

FIG. 791 is a flowchart illustrating an exemplary embodiment of the present invention.

Figure 792:
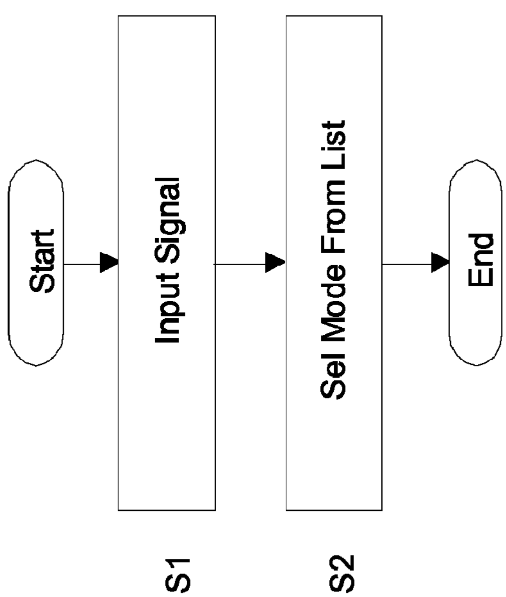

FIG. 792 is a flowchart illustrating an exemplary embodiment of the present invention.

Figure 793:
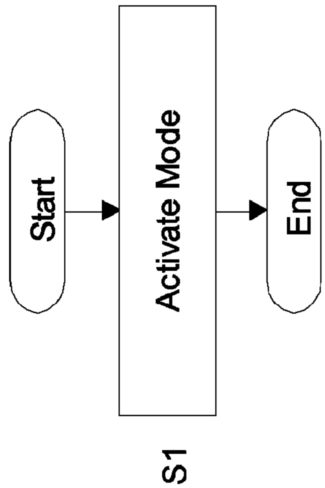

FIG. 793 is a flowchart illustrating an exemplary embodiment of the present invention.

Figure 794:
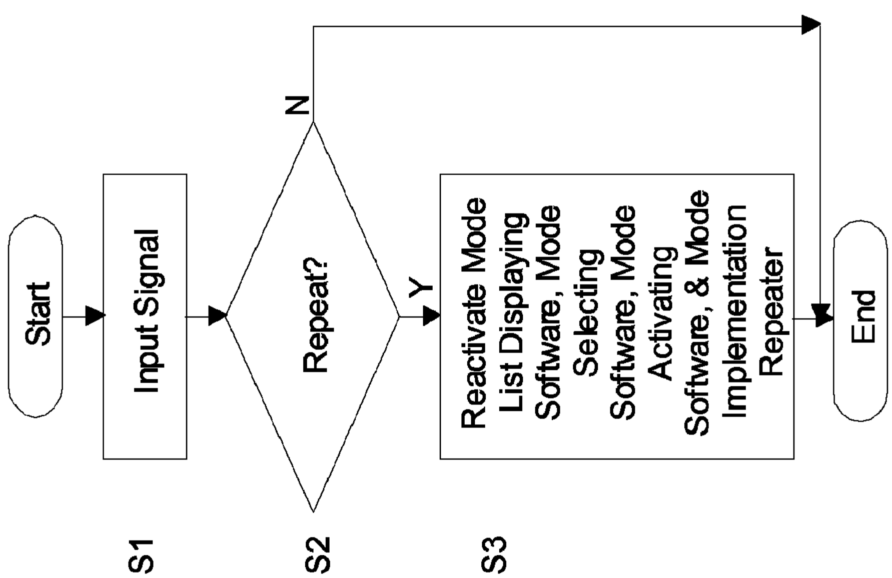

FIG. 794 is a flowchart illustrating an exemplary embodiment of the present invention.

Figure 795:
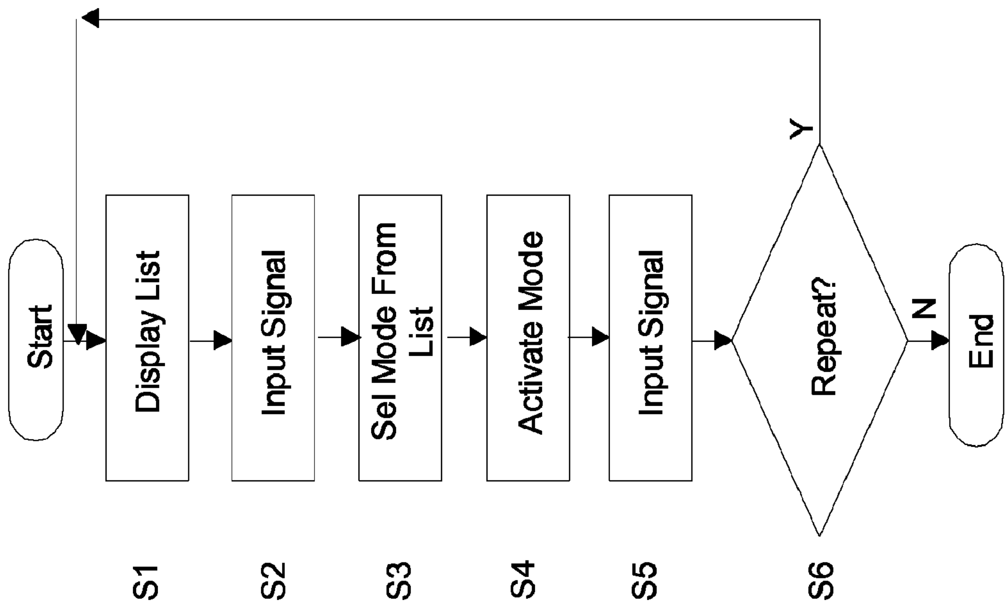

FIG. 795 is a flowchart illustrating an exemplary embodiment of the present invention.

DETAILED DESCRIPTION

The following description is of the best presently contemplated mode of carrying out the present invention. This description is not to be taken in a limiting sense but is made merely for the purpose of describing the general principles of the invention. For example, each description of random access memory in this specification illustrate(s) only one function or mode in order to avoid complexity in its explanation, however, such description does not mean that only one function or mode can be implemented at a time. In other words, more than one function or mode can be implemented simultaneously by way of utilizing the same random access memory. In addition, the figure number is cited after the elements in parenthesis in a manner for example 'RAM 206 (FIG. 1)'. It is done so merely to assist the readers to have a better understanding of this specification, and must not be used to limit the scope of the claims in any manner since the figure numbers cited are not exclusive. There are only few data stored in each storage area described in this specification. This is done so merely to simplify the explanation and, thereby, to enable the reader of this specification to understand the content of each function with less confusion. Therefore, more than few data (hundreds and thousands of data, if necessary) of the same kind, not to mention, are preferred to be stored in each storage area to fully implement each function described herein. The scope of the invention should be determined by referencing the appended claims.

<<Voice Communication Mode>>

Figure 1:
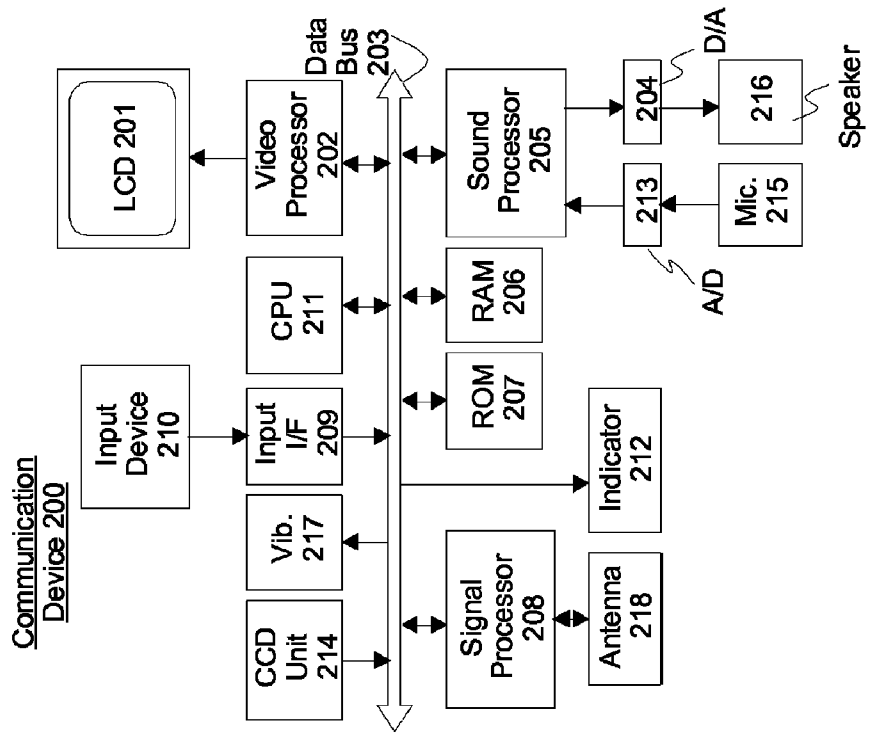
FIG. 1 is a block diagram illustrating an exemplary embodiment of the present invention.

FIG. 1 is a simplified block diagram of the Communication Device 200 utilized in the present invention. Referring to FIG. 1, Communication Device 200 includes CPU 211 which controls and administers the overall function and operation of Communication Device 200. CPU 211 uses RAM 206 to temporarily store data and/or to perform calculation to perform its function, and to implement the present invention, modes, functions, and systems explained hereinafter. Video Processor 202 generates analog and/or digital video signals which are displayed on LCD 201. ROM 207 stores the data and programs which are essential to operate Communication Device 200. Wireless signals are received by Antenna 218 and processed by Signal Processor 208. Input signals are input by Input Device 210, such as a dial pad, a joystick, and/or a keypad, and the signals are transferred via Input Interface 209 and Data Bus 203 to CPU 211. Indicator 212 is an LED lamp which is designed to output different colors (e.g., red, blue, green, etc). Analog audio data is input to Microphone 215. A/D 213 converts the analog audio data into a digital format. Speaker 216 outputs analog audio data which is converted into an analog format from digital format by D/A 204. Sound Processor 205 produces digital audio signals that are transferred to D/A 204 and also processes the digital audio signals transferred from A/D 213. CCD Unit 214 captures video image which is stored in RAM 206 in a digital format. Vibrator 217 vibrates the entire device by the command from CPU 211.

As another embodiment, LCD 201 or LCD 201/Video Processor 202 may be separated from the other elements described in FIG. 1, and be connected in a wireless fashion to be wearable and/or head-mountable.

When Communication Device 200 is in the voice communication mode, the analog audio data input to Microphone 215 is converted to a digital format by A/D 213 and transmitted to another device via Antenna 218 in a wireless fashion after being processed by Signal Processor 208, and the wireless signal representing audio data which is received via Antenna 218 is output from Speaker 216 after being processed by Signal Processor 208 and converted to analog signal by D/A 204. For the avoidance of doubt, the definition of Communication Device 200 in this specification includes so-called 'PDA'. The definition of Communication Device 200 also includes in this specification any device which is mobile and/or portable and which is capable to send and/or receive audio data, text data, image data, video data, and/or other types of data in a wireless fashion via Antenna 218. The definition of Communication Device 200 further includes any micro device embedded or installed into devices and equipments (e.g., VCR, TV, tape recorder, heater, air conditioner, fan, clock, micro wave oven, dish washer, refrigerator, oven, washing machine, dryer, door, window, automobile, motorcycle, and modem) to remotely control these devices and equipments. The size of Communication Device 200 is irrelevant. Communication Device 200 may be installed in houses, buildings, bridges, boats, ships, submarines, airplanes, and spaceships, and finally fixed therein.

Figure 2:
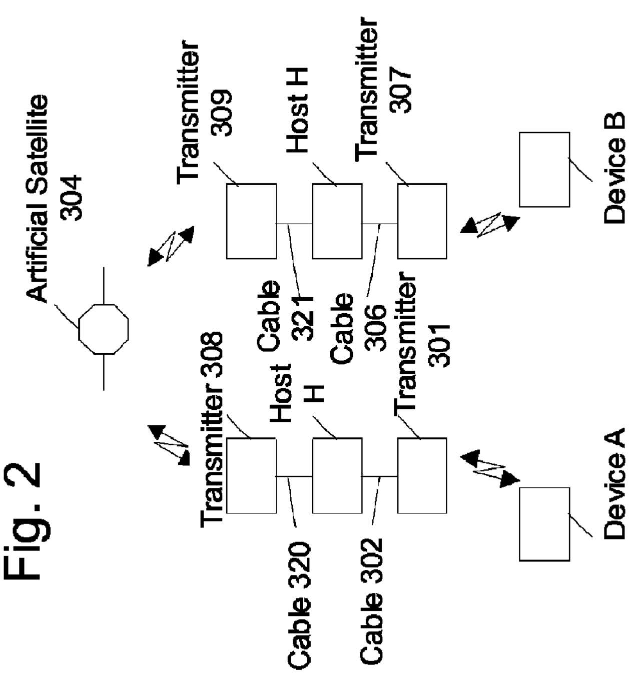
FIG. 2 is a simplified illustration illustrating an exemplary embodiment of the present invention.

FIG. 2 illustrates one of the preferred methods of the communication between two Communication Device 200. In FIG. 2, both Device A and Device B represents Communication Device 200 in FIG. 1. Device A transfers wireless data to Transmitter 301 which Relays the data to Host H via Cable 302. The data is transferred to Transmitter 308 (e.g., a satellite dish) via Cable 320 and then to Artificial Satellite 304. Artificial Satellite 304 transfers the data to Transmitter 309 which transfers the data to Host H via Cable 321. The data is then transferred to Transmitter 307 via Cable 306 and to Device B in a wireless fashion. Device B transfers wireless data to Device A in the same manner.

Figure 3:
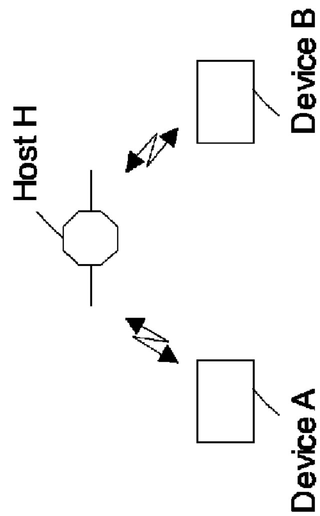
FIG. 3 is a simplified illustration illustrating an exemplary embodiment of the present invention.

FIG. 3 illustrates another preferred method of the communication between two Communication Devices 200. In this example, Device A directly transfers the wireless data to Host H, an artificial satellite, which transfers the data directly to Device B. Device B transfers wireless data to Device A in the same manner.

Figure 4:
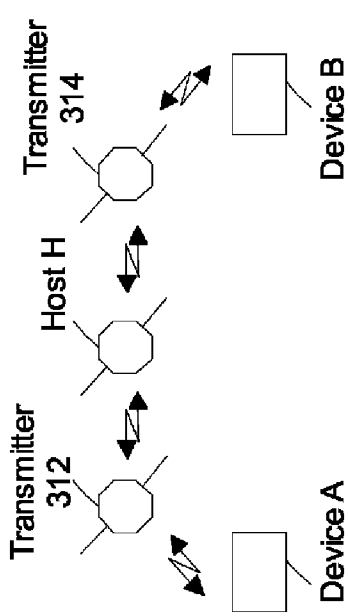
FIG. 4 is a simplified illustration illustrating an exemplary embodiment of the present invention.

FIG. 4 illustrates another preferred method of the communication between two Communication Devices 200. In this example, Device A transfers wireless data to Transmitter 312, an artificial satellite, which Relays the data to Host H, which is also an artificial satellite, in a wireless fashion. The data is transferred to Transmitter 314, an artificial satellite, which Relays the data to Device B in a wireless fashion. Device B transfers wireless data to Device A in the same manner.

<<Voice Recognition System>>

Communication Device 200 (FIG. 1) has the function to operate the device by the user's voice or convert the user's voice into a text format (i.e., the voice recognition). The voice recognition function can be performed in terms of software by using Area 261, the voice recognition working area, of RAM 206 (FIG. 1) which is specifically allocated to perform such function as described in FIG. 5, or can also be performed in terms of hardware circuit where such space is specifically allocated in Area 282 of Sound Processor 205 (FIG. 1) for the voice recognition system as described in FIG. 6.

Figure 5:
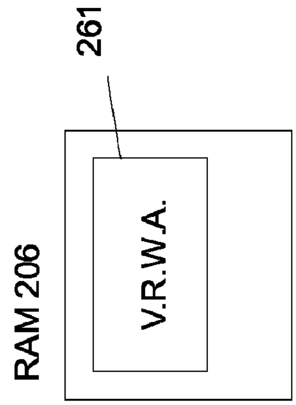
FIG. 5 is a block diagram illustrating an exemplary embodiment of the present invention.
Figure 6:
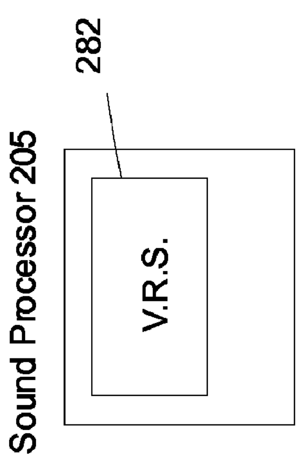
FIG. 6 is a block diagram illustrating an exemplary embodiment of the present invention.
Figure 7:
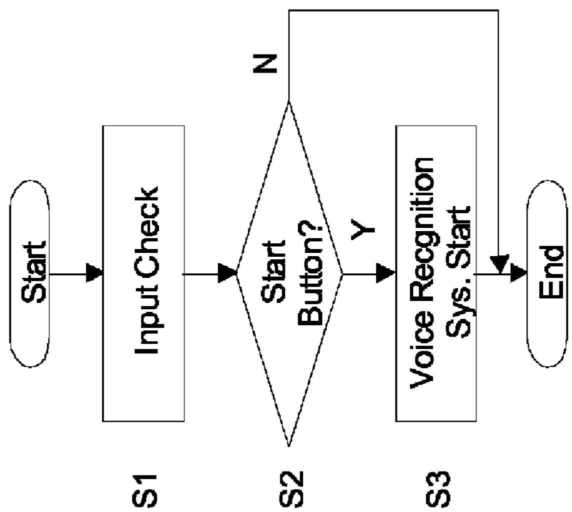
FIG. 7 is a flowchart illustrating an exemplary embodiment of the present invention.

FIG. 7 illustrates how the voice recognition function is activated. CPU 211 (FIG. 1) periodically checks the input status of Input Device 210 (FIG. 1) (S1). If CPU 211 detects a specific signal input from Input Device 210 (S2) the voice recognition system which is described in FIG. 2, FIG. 3, FIG. 4, and/or FIG. 5 is activated. As another embodiment, the voice recognition system can also be activated by entering predetermined phrase, such as 'start voice recognition system' via Microphone 215 (FIG. 1).

<<Voice Recognition—Dialing/Auto-Off During Call Function>>

Figure 8:
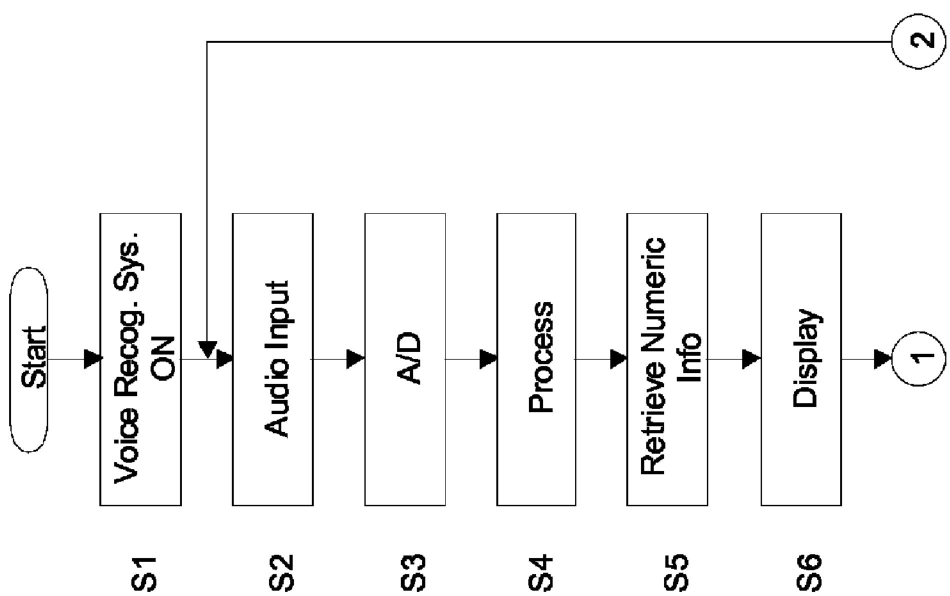
FIG. 8 is a flowchart illustrating an exemplary embodiment of the present invention.
Figure 9:
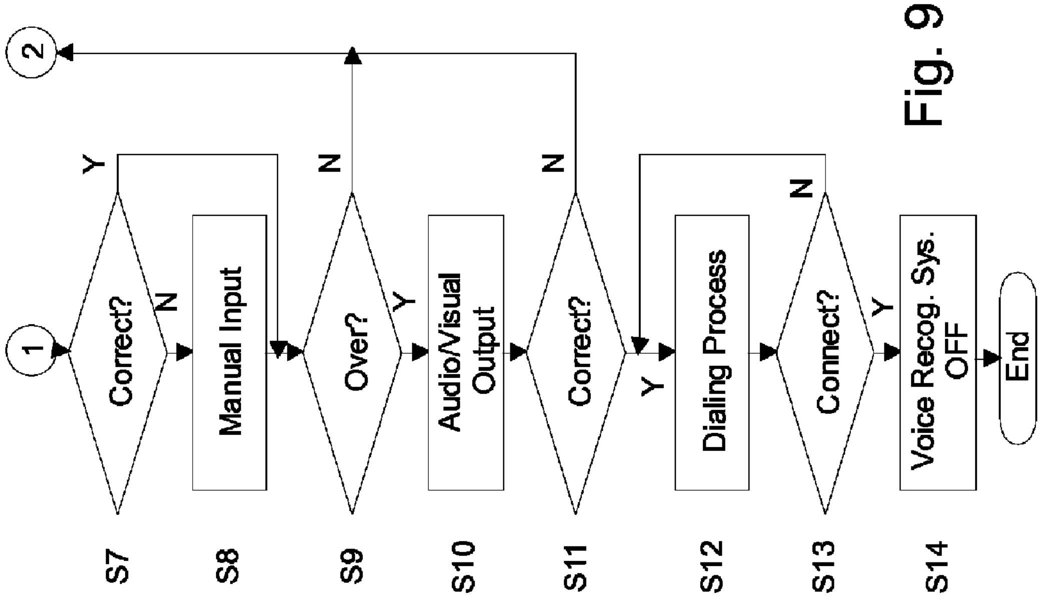
FIG. 9 is a flowchart illustrating an exemplary embodiment of the present invention.

FIG. 8 and FIG. 9 illustrate the operation of the voice recognition in the present invention. Once the voice recognition system is activated (S1) the analog audio data is input from Microphone 215 (FIG. 1) (S2). The analog audio data is converted into digital data by A/D 213 (FIG. 1) (S3). The digital audio data is processed by Sound Processor 205 (FIG. 1) to retrieve the text and numeric information therefrom (S4). Then the numeric information is retrieved (S5) and displayed on LCD 201 (FIG. 1) (S6). If the retrieved numeric information is not correct (S7), the user can input the correct numeric information manually by using Input Device 210 (FIG. 1) (S8). Once the sequence of inputting the numeric information is completed and after the confirmation process is over (S9), the entire numeric information is displayed on LCD 201 and the sound is output from Speaker 216 under control of CPU 211 (S10). If the numeric information is correct (S11), Communication Device 200 (FIG. 1) initiates the dialing process by utilizing the numeric information (S12). The dialing process continues until Communication Device 200 is connected to another device (S13). Once CPU 211 detects that the line is connected it automatically deactivates the voice recognition system (S14).

Figure 10:
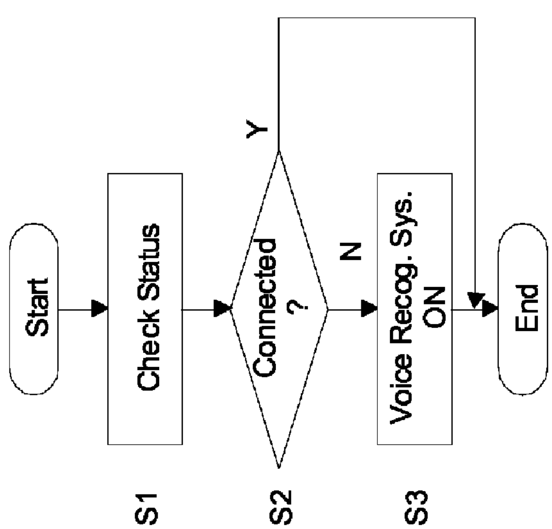
FIG. 10 is a flowchart illustrating an exemplary embodiment of the present invention.

As described in FIG. 10, CPU 211 (FIG. 1) checks the status of Communication Device 200 periodically (S1) and remains the voice recognition system offline during call (S2). If the connection is severed, i.e., user hangs up, then CPU 211 reactivates the voice recognition system (S3).

<<Voice Recognition Tag Function>>

FIG. 11 through FIG. 15 describes the method of inputting the numeric information in a convenient manner.

Figures 13, 14:
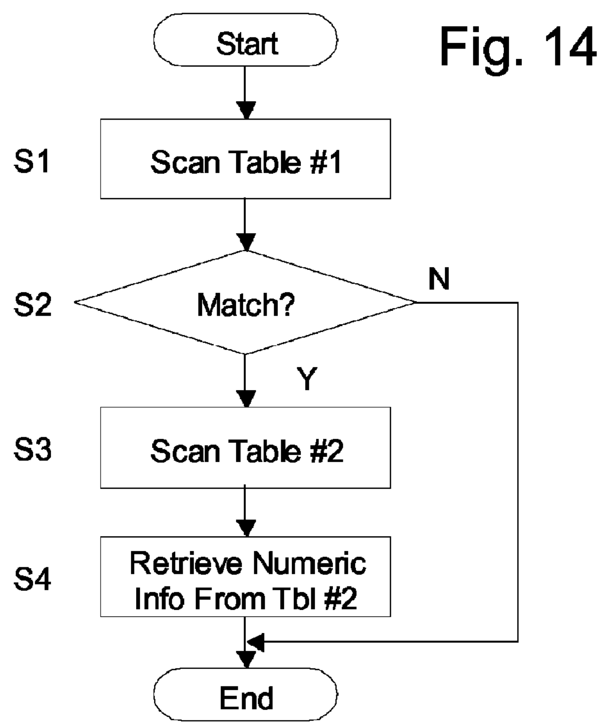
FIG. 13 is a simplified illustration illustrating an exemplary embodiment of the present invention.
FIG. 14 is a flowchart illustrating an exemplary embodiment of the present invention.

As described in FIG. 11, RAM 206 includes Table #1 (FIG. 11) and Table #2 (FIG. 12). In FIG. 11, audio information #1 corresponds to tag 'Scott.' Namely audio information, such as wave data, which represents the sound of 'Scott' (sounds like 'S-ko-t') is registered in Table #1, which corresponds to tag 'Scott'. In the same manner audio information #2 corresponds to tag 'Carol'; audio information #3 corresponds to tag 'Peter'; audio information #4 corresponds to tag 'Amy'; and audio information #5 corresponds to tag 'Brian.' In FIG. 12, tag 'Scott' corresponds to numeric information '(916) 411-2526'; tag 'Carol' corresponds to numeric information '(418) 675-6566'; tag 'Peter' corresponds to numeric information '(220) 890-1567'; tag 'Amy' corresponds to numeric information '(615) 125-3411'; and tag 'Brian' corresponds to numeric information '(042) 645-2097.' FIG. 14 illustrates how CPU 211 (FIG. 1) operates by utilizing both Table #1 and Table #2. Once the audio data is processed as described in S4 of FIG. 8, CPU 211 scans Table #1 (S1). If the retrieved audio data matches with one of the audio information registered in Table #1 (S2), CPU 211 scans Table #2 (S3) and retrieves the corresponding numeric information from Table #2 (S4).

Figure 15:
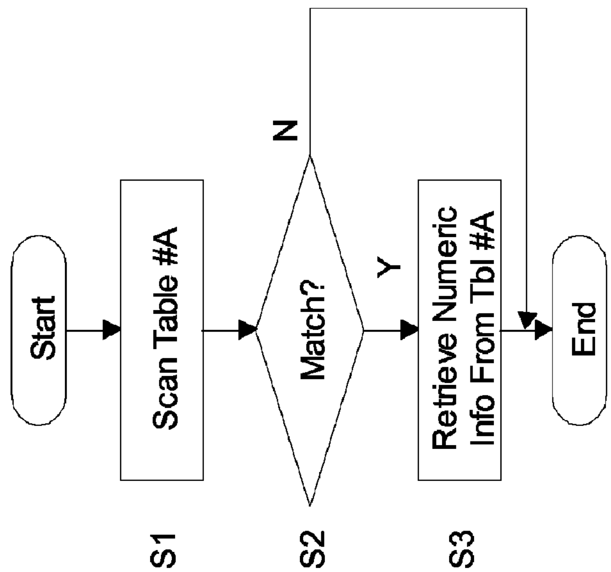
FIG. 15 is a flowchart illustrating an exemplary embodiment of the present invention.

FIG. 13 illustrates another embodiment of the present invention. Here, RAM 206 includes Table #A instead of Table #1 and Table #2 described above. In this embodiment, audio info #1 (i.e., wave data which represents the sound of 'Scot') directly corresponds to numeric information '(916) 411-2526.' In the same manner audio info #2 corresponds to numeric information '(410) 675-6566'; audio info #3 corresponds to numeric information '(220) 890-1567'; audio info #4 corresponds to numeric information '(615) 125-3411'; and audio info #5 corresponds to numeric information '(042) 645-2097.' FIG. 15 illustrates how CPU 211 (FIG. 1) operates by utilizing Table #A. Once the audio data is processed as described in S4 of FIG. 8 and FIG. 9, CPU 211 scans Table #A (S1). If the retrieved audio data matches with one of the audio information registered in Table #A (S2), it retrieves the corresponding numeric information therefrom (S3).

As another embodiment, RAM 206 may contain only Table #2 and tag can be retrieved from the voice recognition system explained in FIG. 5 through FIG. 10. Namely, once the audio data is processed by CPU 211 (FIG. 1) as described in S4 of FIG. 8 and retrieves the text data therefrom and detects one of the tags registered in Table #2 (e.g., 'Scot'), CPU 211 retrieves the corresponding numeric information (e.g., '(916) 411-2526') from the same table.

<<Voice Recognition Noise Filtering Function>>

FIG. 16 through FIG. 19 describes the method of minimizing the undesired effect of the background noise when utilizing the voice recognition system.

Figure 16:
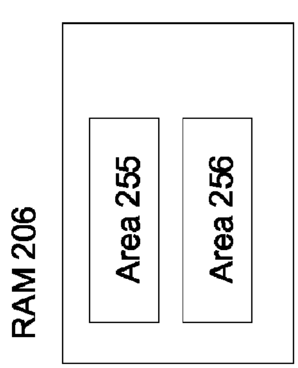
FIG. 16 is a block diagram illustrating an exemplary embodiment of the present invention.

As described in FIG. 16, RAM 206 (FIG. 1) includes Area 255 and Area 256. Sound audio data which represents background noise is stored in Area 255, and sound audio data which represents the beep, ringing sound and other sounds which are emitted from the Communication Device 200 are stored in Area 256.

Figure 17:
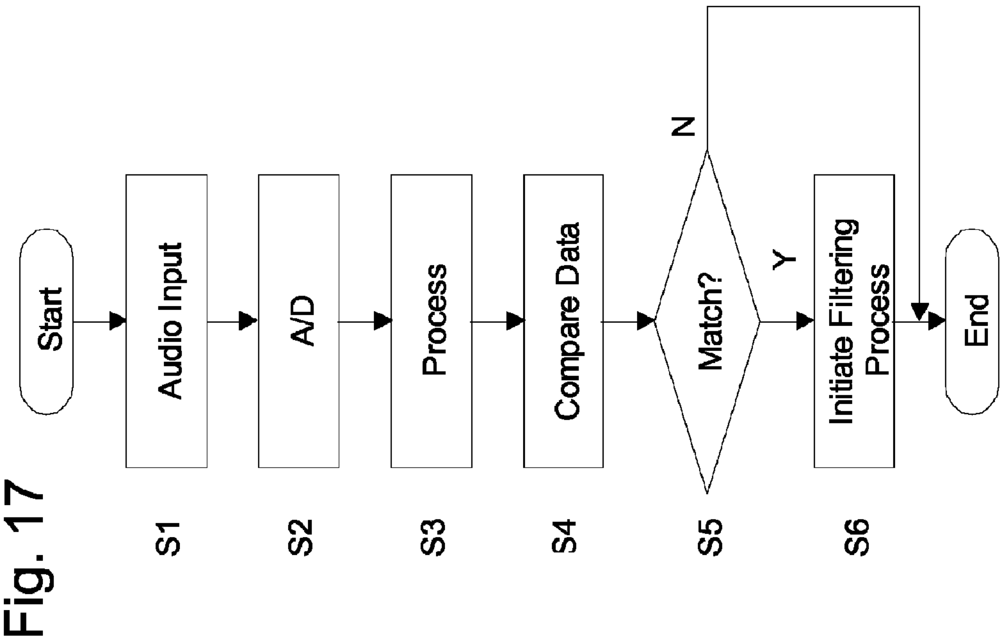
FIG. 17 is a flowchart illustrating an exemplary embodiment of the present invention.

FIG. 17 describes the method to utilize the data stored in Area 255 and Area 256 described in FIG. 16. When the voice recognition system is activated as described in FIG. 7, the analog audio data is input from Microphone 215 (FIG. 1) (S1). The analog audio data is converted into digital data by A/D 213 (FIG. 1) (S2). The digital audio data is processed by Sound Processor 205 (FIG. 1) (S3) and compared to the data stored in Area 255 and Area 256 (S4). Such comparison can be done by either Sound Processor 205 or CPU 211 (FIG. 1). If the digital audio data matches to the data stored in Area 255 and/or Area 256, the filtering process is initiated and the matched portion of the digital audio data is deleted as background noise. Such sequence of process is done before retrieving text and numeric information from the digital audio data.

Figure 18:
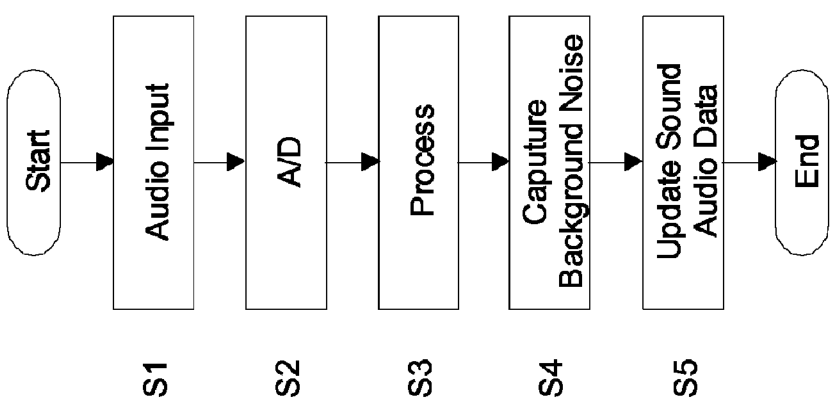
FIG. 18 is a flowchart illustrating an exemplary embodiment of the present invention.

FIG. 18 describes the method of updating Area 255. When the voice recognition system is activated as described in FIG. 7, the analog audio data is input from Microphone 215 (FIG. 1) (S1). The analog audio data is converted into digital data by A/D 213 (FIG. 1) (S2). The digital audio data is processed by Sound Processor 205 (FIG. 1) or CPU 211 (FIG. 1) (S3) and the background noise is captured (S4). CPU 211 (FIG. 1) scans Area 255 and if the captured background noise is not registered in Area 255, it updates the sound audio data stored therein (S5).

Figure 19:
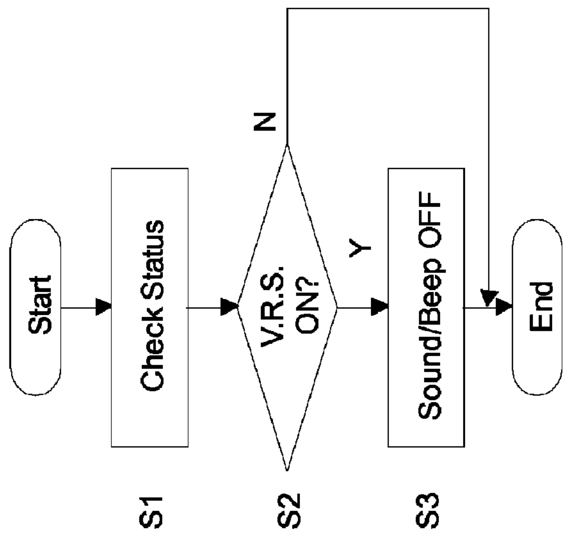
FIG. 19 is a flowchart illustrating an exemplary embodiment of the present invention.

FIG. 19 describes another embodiment of the present invention. CPU 211 (FIG. 1) routinely checks whether the voice recognition system is activated (S1). If the system is activated (S2), the beep, ringing sound, and other sounds which are emitted from Communication Device 200 are automatically turned off in order to minimize the miss recognition process of the voice recognition system (S3).

<<Voice Recognition Auto-Off Function>>

Figure 20:
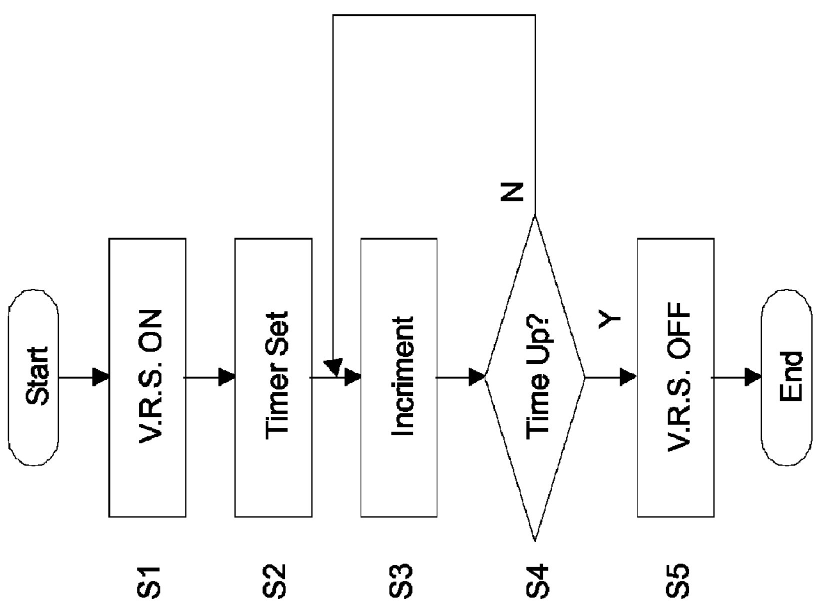
FIG. 20 is a flowchart illustrating an exemplary embodiment of the present invention.

The voice recognition system can be automatically turned off to avoid glitch as described in FIG. 20. When the voice recognition system is activated (S1), CPU 211 (FIG. 1) automatically sets a timer (S2). The value of timer (i.e., the length of time until the system is deactivated) can be set manually by the user. The timer is incremented periodically (S3), and if the incremented time equals to the predetermined value of time as set in S2 (S4), the voice recognition system is automatically deactivated (S5).

<<Voice Recognition Email Function (1)>>

Figure 21:
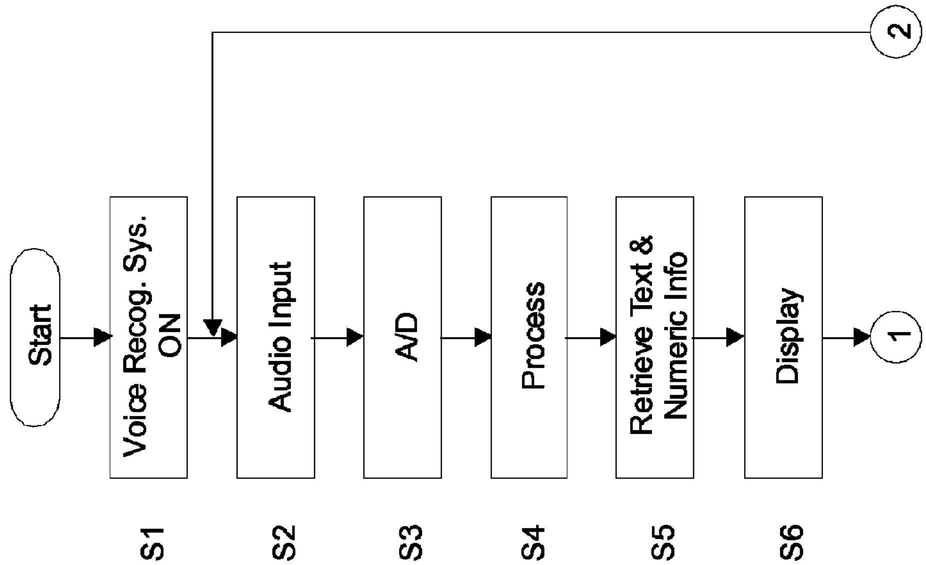
FIG. 21 is a flowchart illustrating an exemplary embodiment of the present invention.
Figure 22:
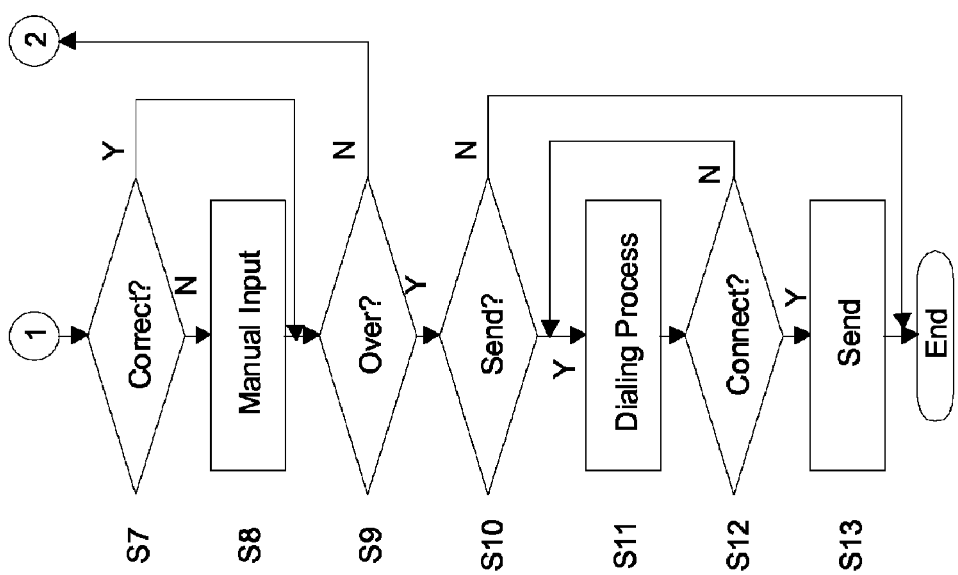
FIG. 22 is a flowchart illustrating an exemplary embodiment of the present invention.

FIG. 21 and FIG. 22 illustrate the first embodiment of the function of typing and sending e-mails by utilizing the voice recognition system. Once the voice recognition system is activated (S1), the analog audio data is input from Microphone 215 (FIG. 1) (S2). The analog audio data is converted into digital data by A/D 213 (FIG. 1) (S3). The digital audio data is processed by Sound Processor 205 (FIG. 1) or CPU 211 (FIG. 1) to retrieve the text and numeric information therefrom (S4). The text and numeric information are retrieved (S5) and are displayed on LCD 201 (FIG. 1) (S6). If the retrieved information is not correct (S7), the user can input the correct text and/or numeric information manually by using the Input Device 210 (FIG. 1) (S8). If inputting the text and numeric information is completed (S9) and CPU 211 detects input signal from Input Device 210 to send the e-mail (S10), the dialing process is initiated (S11). The dialing process is repeated until Communication Device 200 is connected to Host H (S12), and the e-mail is sent to the designated address (S13).

<<Voice Recognition—Speech-to-Text Function>>

Figure 23:
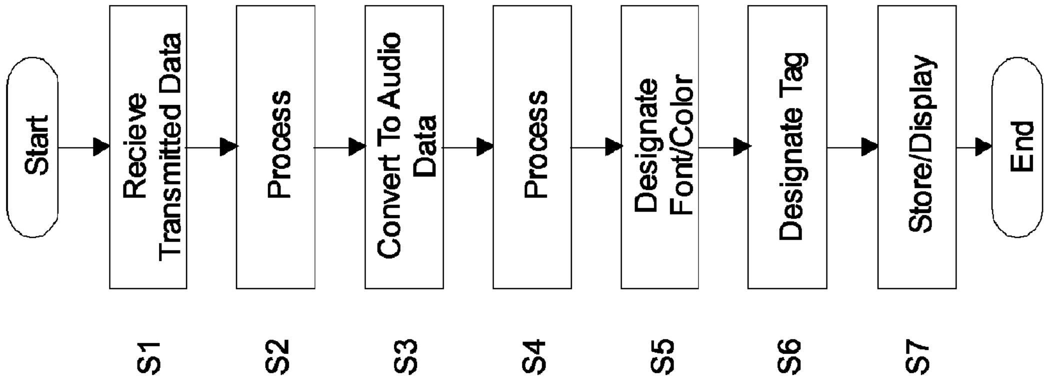
FIG. 23 is a flowchart illustrating an exemplary embodiment of the present invention.

FIG. 23 illustrates the speech-to-text function of Communication Device 200 (FIG. 1).

Once Communication Device 200 receives a transmitted data from another device via Antenna 218 (FIG. 1) (S1), Signal Processor 208 (FIG. 1) processes the data (e.g., wireless signal error check and decompression) (S2), and the transmitted data is converted into digital audio data (S3). Such conversion can be rendered by either CPU 211 (FIG. 1) or Signal Processor 208. The digital audio data is transferred to Sound Processor 205 (FIG. 1) via Data Bus 203 and text and numeric information are retrieved therefrom (S4). CPU 211 designates the predetermined font and color to the text and numeric information (S5) and also designates a tag to such information (S6). After these tasks are completed the tag and the text and numeric information are stored in RAM 206 and displayed on LCD 201 (S7).

Figure 24:
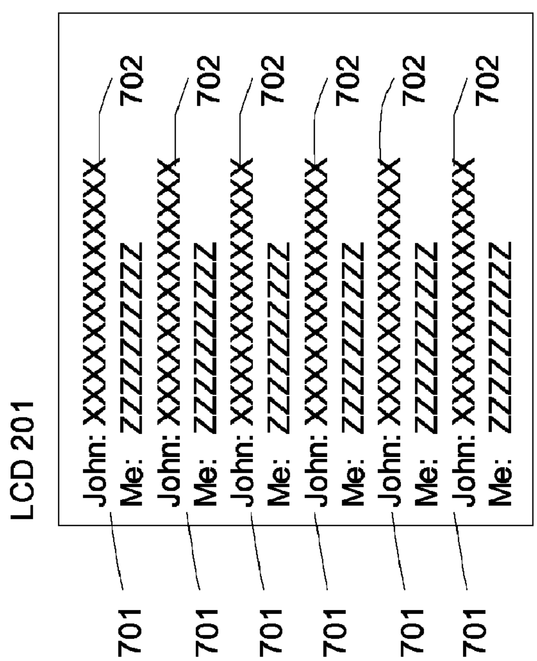
FIG. 24 is a simplified illustration illustrating an exemplary embodiment of the present invention.

FIG. 24 illustrates how the text and numeric information as well as the tag are displayed. On LCD 201 the text and numeric information 702 ('XXXXXXXXX') are displayed with the predetermined font and color as well as with the tag 701 ('John').

<<Positioning System>>

Figure 25:
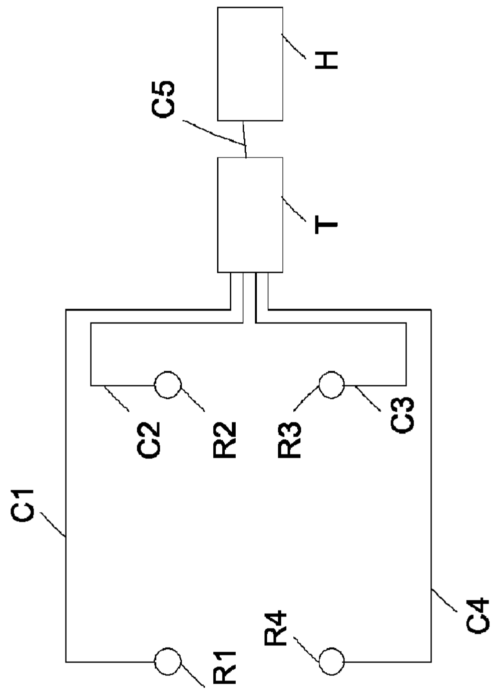
FIG. 25 is a simplified illustration illustrating an exemplary embodiment of the present invention.

FIG. 25 illustrates the simplified block diagram to detect the position of Communication Device 200 (FIG. 1).

Figure 26:
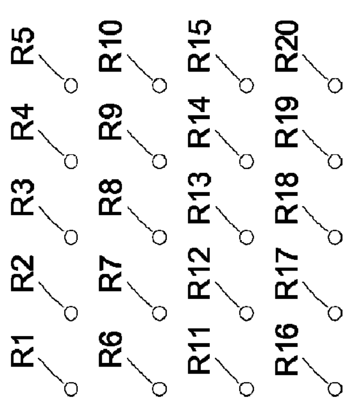
FIG. 26 is a simplified illustration illustrating an exemplary embodiment of the present invention.

In FIG. 25, Relay R1 is connected to Cable C1, Relay R2 is connected to Cable C2, Relay R3 is connected to Cable C3, and Relay R4 is connected to Cable C4. Cables C1, C2, C3, and C4 are connected to Transmitter T, which is connected to Host H by Cable C5. The Relays (R1 through R 20) are located throughout the predetermined area in the pattern illustrated in FIG. 26. The system illustrated in FIG. 25 and FIG. 26 is designed to pinpoint the position of Communication Device 200 by using the method so-called 'global positioning system' or 'GPS.' Such function can be enabled by the technologies primarily introduced in the following inventions and the references cited thereof: U.S. Pat. No. 6,429,814; U.S. Pat. No. 6,427,121; U.S. Pat. No. 6,427,120; U.S. Pat. No. 6,424,826; U.S. Pat. No. 6,415,227; U.S. Pat. No. 6,415,154; U.S. Pat. No. 6,411,811; U.S. Pat. No. 6,392,591; U.S. Pat. No. 6,389,291; U.S. Pat. No. 6,369,751; U.S. Pat. No. 6,347,113; U.S. Pat. No. 6,324,473; U.S. Pat. No. 6,301,545; U.S. Pat. No. 6,297,770; U.S. Pat. No. 6,278,404; U.S. Pat. No. 6,275,771; U.S. Pat. No. 6,272,349; U.S. Pat. No. 6,266,012; U.S. Pat. No. 6,259,401; U.S. Pat. No. 6,243,647; U.S. Pat. No. 6,236,354; U.S. Pat. No. 6,233,094; U.S. Pat. No. 6,232,922; U.S. Pat. No. 6,211,822; U.S. Pat. No. 6,188,351; U.S. Pat. No. 6,182,927; U.S. Pat. No. 6,163,567; U.S. Pat. No. 6,101,430; U.S. Pat. No. 6,084,542; U.S. Pat. No. 5,971,552; U.S. Pat. No. 5,963,167; U.S. Pat. No. 5,944,770; U.S. Pat. No. 5,890,091; U.S. Pat. No. 5,841,399; U.S. Pat. No. 5,808,582; U.S. Pat. No. 5,777,578; U.S. Pat. No. 5,774,831; U.S. Pat. No. 5,764,184; U.S. Pat. No. 5,757,786; U.S. Pat. No. 5,736,961; U.S. Pat. No. 5,736,960; U.S. Pat. No. 5,594,454; U.S. Pat. No. 5,585,800; U.S. Pat. No. 5,554,994; U.S. Pat. No. 5,535,278; U.S. Pat. No. 5,534,875; U.S. Pat. No. 5,519,620; U.S. Pat. No. 5,506,588; U.S. Pat. No. 5,446,465; U.S. Pat. No. 5,434,574; U.S. Pat. No. 5,402,441; U.S. Pat. No. 5,373,531; U.S. Pat. No. 5,349,531; U.S. Pat. No. 5,347,286; U.S. Pat. No. 5,341,301; U.S. Pat. No. 5,339,246; U.S. Pat. No. 5,293,170; U.S. Pat. No. 5,225,842; U.S. Pat. No. 5,223,843; U.S. Pat. No. 5,210,540; U.S. Pat. No. 5,193,064; U.S. Pat. No. 5,187,485; U.S. Pat. No. 5,175,557; U.S. Pat. No. 5,148,452; U.S. Pat. No. 5,134,407; U.S. Pat. No. 4,928,107; U.S. Pat. No. 4,928,106; U.S. Pat. No. 4,785,463; U.S. Pat. No. 4,754,465; U.S. Pat. No. 4,622,557; and U.S. Pat. No. 4,457,006. Relays R1 through R20 are preferably located on ground, however, are also permitted to be installed in artificial satellites as described in the foregoing patents and the references cited thereof in order to cover wider geographical range. The Relays may also be installed in houses, buildings, bridges, boats, ships, submarines, airplanes, and spaceships. In addition, Host H may be carried by houses, buildings, bridges, boats, ships, submarines, airplanes, and spaceships. In stead of utilizing Cables C1 through C5, Relays R1 through R20 (and other relays described in this specification) may be connected to Transmitter T in a wireless fashion, and Transmitter T may be connected to Host H in a wireless fashion.

FIG. 27 through FIG. 32 illustrate how the positioning system is performed. Assuming that Device A, Communication Device 200, seeks to detect the position of Device B, another Communication Device 200, which is located somewhere in the matrix of Relays illustrated in FIG. 26.

Figure 27:
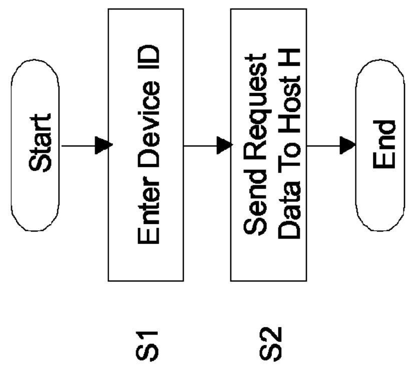
FIG. 27 is a flowchart illustrating an exemplary embodiment of the present invention.

As described in FIG. 27, first of all the device ID of Device B is entered by utilizing Input Device 210 (FIG. 1) or the voice recognition system of Device A installed therein (S1). The device ID may be its corresponding phone number. A request data including the device ID is sent to Host H (FIG. 25) from Device A (S2).

Figure 28:
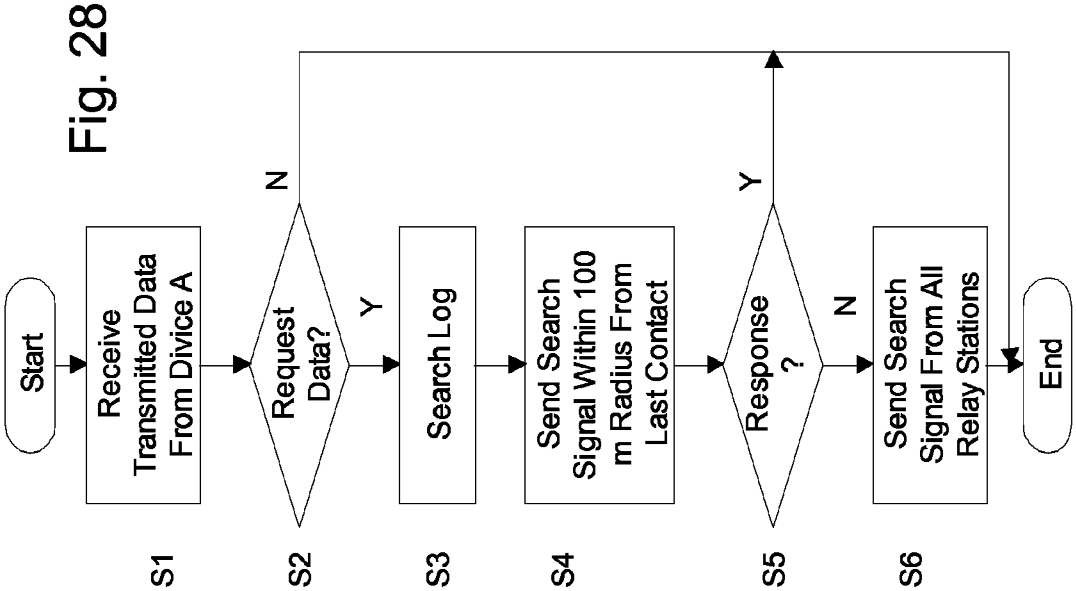
FIG. 28 is a flowchart illustrating an exemplary embodiment of the present invention.

As illustrated in FIG. 28, Host H (FIG. 25) periodically receives data from Device A (S1). If the received data is a request data (S2), Host H, first of all, searches its communication log which records the location of Device B when it last communicated with Host H (S3). Then Host H sends search signal from the Relays described in FIG. 26 which are located within 100-meter radius from the location registered in the communication log. If there is no response from Device B (S5), Host H sends a search signal from all Relays (from R1 to R20 in FIG. 26) (S6).

Figure 29:
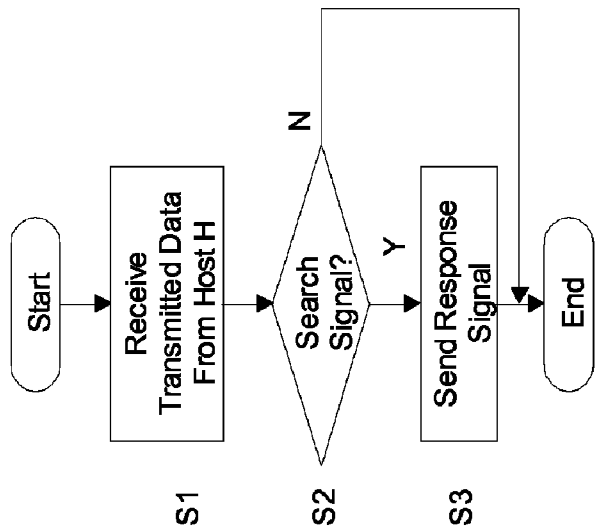
FIG. 29 is a flowchart illustrating an exemplary embodiment of the present invention.

As illustrated in FIG. 29, Device B periodically receives data from Host H (FIG. 25) (S1). If the data received is a search signal (S2), Device B sends a response signal to Host H (S3).

Figure 30:
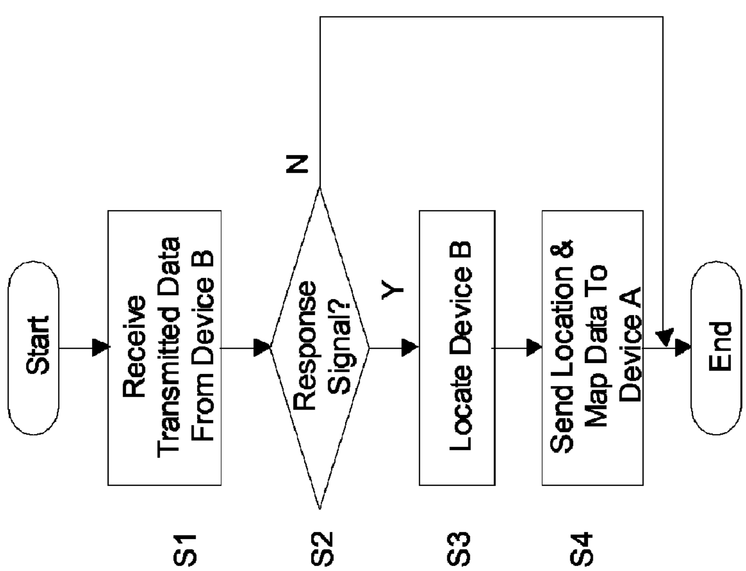
FIG. 30 is a flowchart illustrating an exemplary embodiment of the present invention.

As illustrated in FIG. 30, Host H (FIG. 25) periodically receives data from Device B (S1). If the data received is a response signal (S2), Host H locates the geographic position of Device B by utilizing the method described in FIG. 25 and FIG. 26 (S3), and sends the location data and the relevant map data of the area where Device B is located to Device A (S4).

Figure 31:
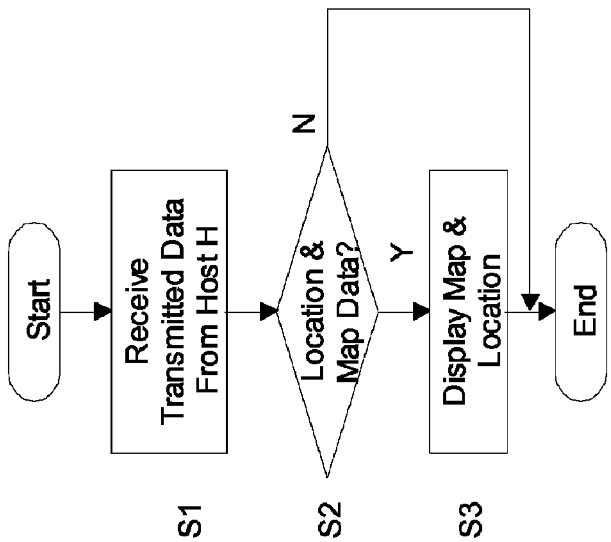
FIG. 31 is a flowchart illustrating an exemplary embodiment of the present invention.

As illustrated in FIG. 31, Device A periodically receives data from Host H (FIG. 25) (S1). If the data received is the location data and the relevant map data mentioned above (S2), Device A displays the map based on the relevant map data and indicates the current location of Device B thereon based on the location data received (S3).

Figure 32:
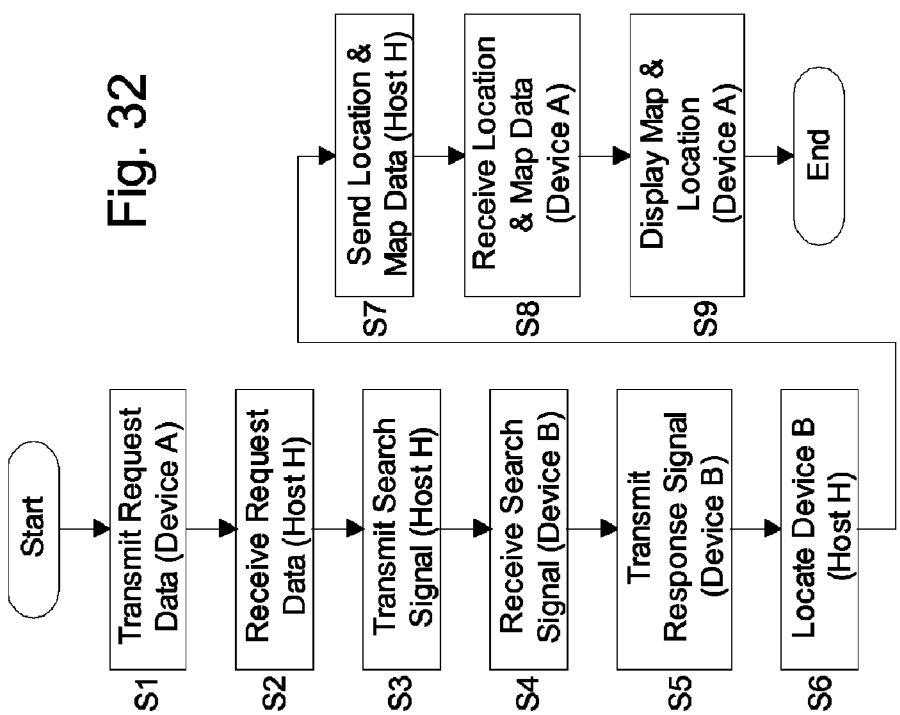
FIG. 32 is a flowchart illustrating an exemplary embodiment of the present invention.

Device A can continuously track down the current location of Device B as illustrated in FIG. 32. First, Device A sends a request data to Host H (FIG. 25) (S1). As soon as Host H receives the request data (S2), it sends a search signal in the manner illustrated in FIG. 28 (S3). As soon as Device B receives the search signal (S4), it sends a response signal to Host H (S5). Based on the response signal, Host H locates the geographic location of Device B with the method described in FIG. 25 and FIG. 26 (S6). Then Host H sends to Device A a renewed location data and a relevant map data of the area where Device B is currently located (S7). As soon as these data are received (S8), Device A displays the map based on the relevant map data and indicates the updated location based on the renewed location data (S9). If Device B is still within the specified area Device A may use the original relevant map data. As another embodiment of the present invention, S1 through S4 may be omitted and make Device B send a response signal continuously to Host H until Host H sends a command signal to Device B to cease sending the response signal.

<<Positioning System—Automatic Silent Mode>>

FIG. 33 through FIG. 46 illustrate the automatic silent mode of Communication Device 200 (FIG. 1).

Figure 33:
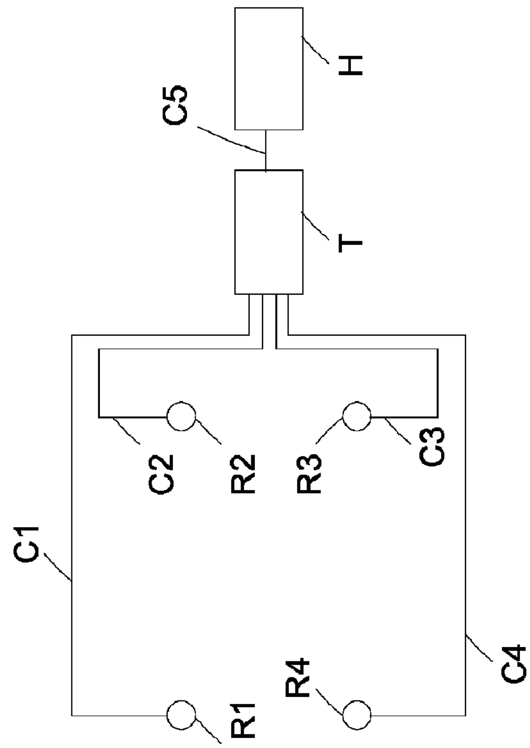
FIG. 33 is a simplified illustration illustrating an exemplary embodiment of the present invention.
Figure 34:
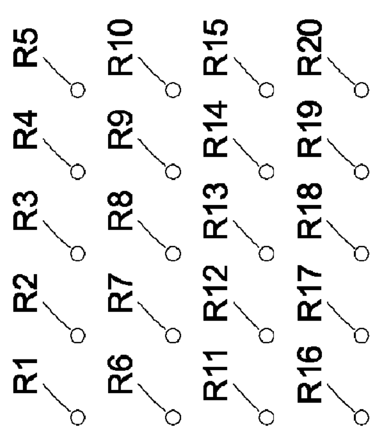
FIG. 34 is a simplified illustration illustrating an exemplary embodiment of the present invention.

In FIG. 33, Relay R1 is connected to Cable C1, Relay R2 is connected to Cable C2, Relay R3 is connected to Cable C3, and Relay R4 is connected to Cable C4. Cables C1, C2, C3, and C4 are connected to Transmitter T, which is connected to Host H by Cable C5. The Relays (R1 through R 20) are located throughout the predetermined area in the pattern illustrated in FIG. 34. The system illustrated in FIG. 33 and FIG. 34 is designed to pinpoint the position of Communication Device 200 by using the method so-called 'global positioning system' or 'GPS.' As stated hereinbefore, such function can be enabled by the technologies primarily introduced in the inventions in the foregoing patents and the references cited thereof. The Relays R1 through R20 are preferably located on ground, however, are also permitted to be installed in artificial satellites as described in the foregoing patents and the references cited thereof in order to cover wider geographical range. In addition, Host H may be carried by an artificial satellite and utilize the formation as described in FIG. 2, FIG. 3, and FIG. 4.

Figure 35:
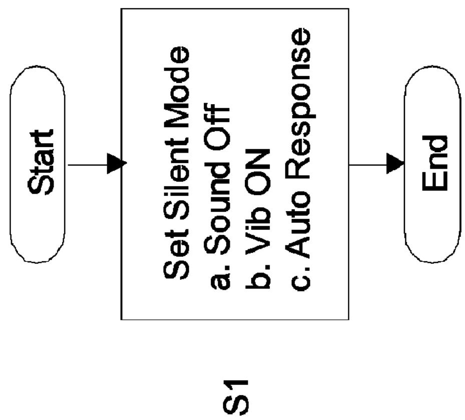
FIG. 35 is a flowchart illustrating an exemplary embodiment of the present invention.

As illustrated in FIG. 35, the user of Communication Device 200 may set the silent mode by Input Device 210 (FIG. 1) or by utilizing the voice recognition system installed therein. When Communication Device 200 is in the silent mode, (a) the ringing sound is turned off, (b) Vibrator 217 (FIG. 1) activates when Communication Device 200 receives call, and/or (c) Communication Device 200 sends an automatic response to the caller device when a call is received (S1). The user may, at his discretion, select any of these predetermined functions of the automatic silent mode.

Figure 36:
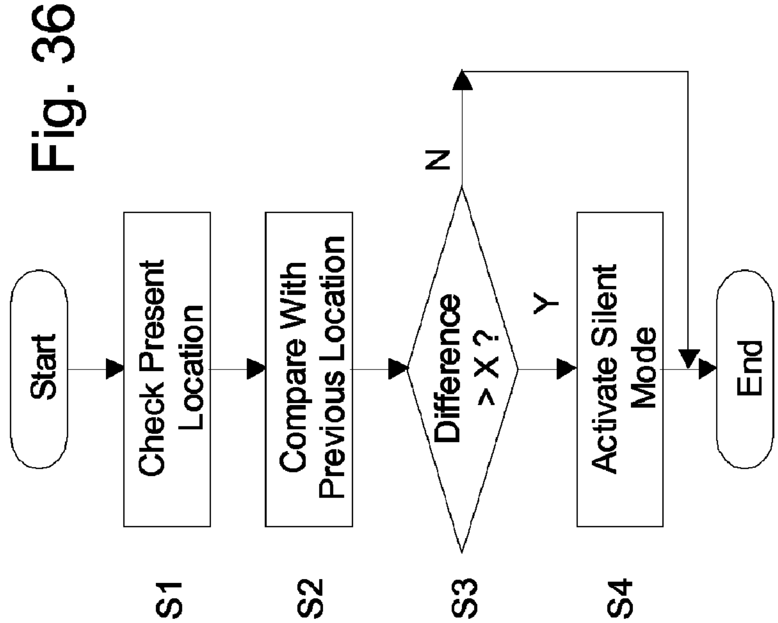
FIG. 36 is a flowchart illustrating an exemplary embodiment of the present invention.

FIG. 36 illustrates how the automatic silent mode is activated. Communication Device 200 periodically checks its present location with the method so-called 'global positioning system' or 'GPS' by using the system illustrated in FIG. 33 and FIG. 34 (S1). Communication Device 200 then compares the present location and the previous location (S2). If the difference of the two values is more than the specified amount X, i.e., when the moving velocity of Communication Device 200 exceeds the predetermined value (S3), the silent mode is activated and (a) the ringing sound is automatically turned off, (b) Vibrator 217 (FIG. 1) activates, and/or (c) Communication Device 200 sends an automatic response to the caller device according to the user's setting (S4). Here, the silent mode is automatically activated because the user of Communication Device 200 is presumed to be on an automobile and is not in a situation to freely answer the phone, or the user is presumed to be riding a train and does not want to disturb other passengers.

Figure 37:
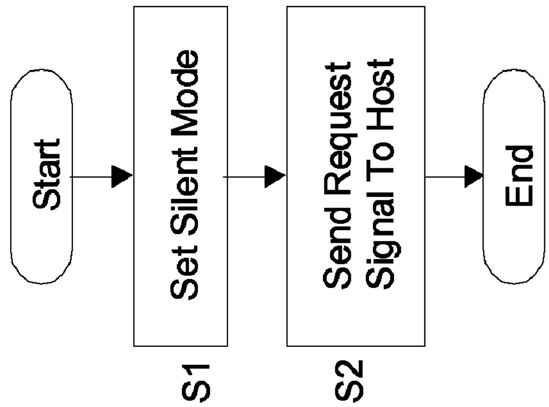
FIG. 37 is a flowchart illustrating an exemplary embodiment of the present invention.

As another embodiment of the present invention, the automatic silent mode may be administered by Host H (FIG. 33). As illustrated in FIG. 37, the silent mode is set in the manner described in FIG. 35 (S1) and Communication Device 200 sends to Host H a request signal indicating that it is in the silent mode (S2).

Figure 38:
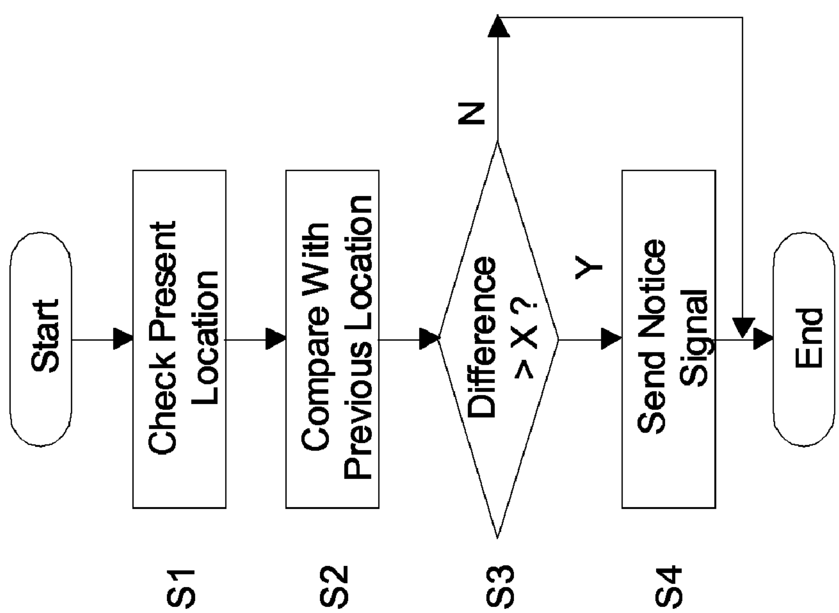
FIG. 38 is a flowchart illustrating an exemplary embodiment of the present invention.

As described in FIG. 38, when Host H (FIG. 33) detects a call to Communication Device 200 after receiving the request signal, it checks the current location of Communication Device 200 (S1) and compares it with the previous location (S2). If the difference of the two values is more than the specified amount X, i.e., when the moving velocity of Communication Device 200 exceeds the predetermined value (S3), Host H sends a notice signal to Communication Device 200 indicating that it has received an incoming call (S4).

Figure 39:
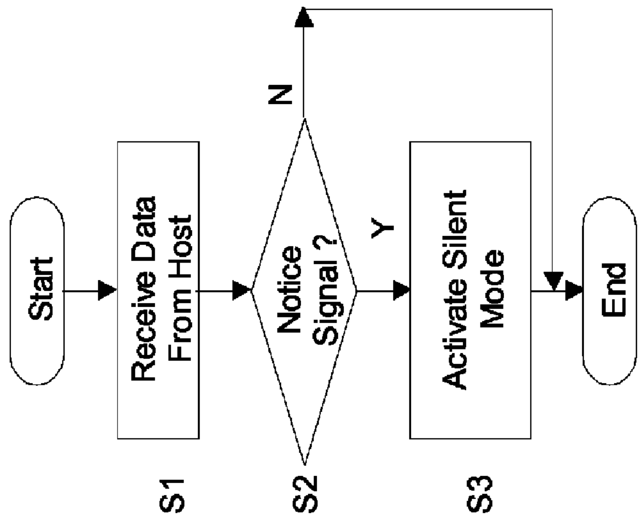
FIG. 39 is a flowchart illustrating an exemplary embodiment of the present invention.

As illustrated in FIG. 39, Communication Device 200 receives data periodically from Host H (FIG. 33) (S1). If the received data is a notice signal (S2), Communication Device 200 activates the silent mode (S3) and (a) the ringing sound is automatically turned off, (b) Vibrator 217 (FIG. 1) activates, and/or (c) Communication Device 200 sends an automatic response to the caller device according to the user's setting. The automatic response may be sent from Host H instead.

Figure 40:
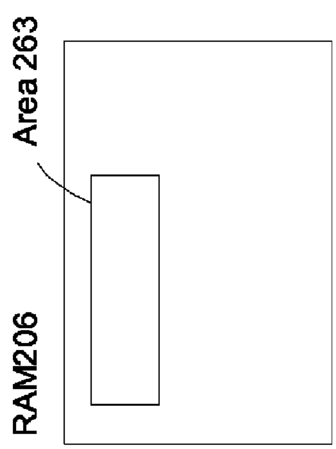
FIG. 40 is a block diagram illustrating an exemplary embodiment of the present invention.
Figure 41:
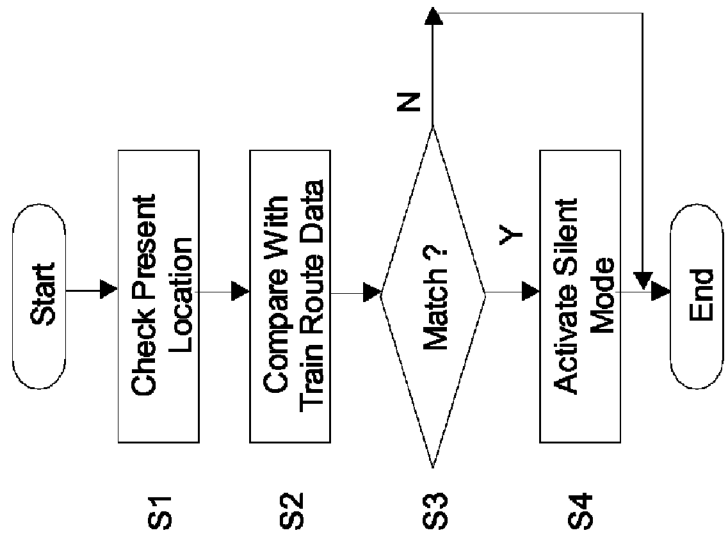
FIG. 41 is a flowchart illustrating an exemplary embodiment of the present invention.

As another embodiment of the present invention, a train route data may be utilized. As illustrated in FIG. 40, a train route data is stored in Area 263 of RAM 206. The train route data contains three-dimensional train route map including the location data of the train route. FIG. 41 illustrates how the train route data is utilized. CPU 211 (FIG. 1) periodically checks the present location of Communication Device 200 by the method described in FIG. 33 and FIG. 34 (S1). Then CPU 211 compares with the train route data stored in Area 263 of RAM 206 (S2). If the present location of Communication Device 200 matches the train route data (i.e., if Communication Device 200 is located on the train route) (S3), the silent mode is activated in the manner described above (S4). The silent mode is activated because the user of Communication Device 200 is presumed to be currently on a train and may not want to disturb the other passengers on the same train.

Figure 42:
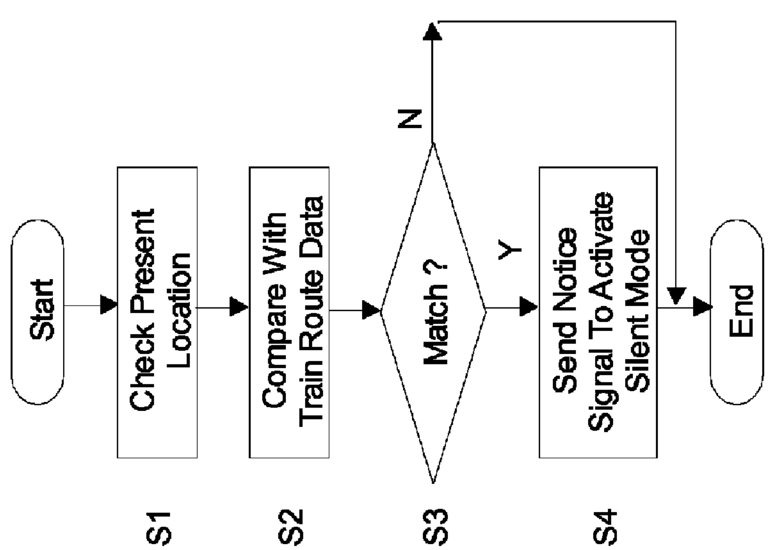
FIG. 42 is a flowchart illustrating an exemplary embodiment of the present invention.

As another embodiment of the present invention, such function can be delegated to Host H (FIG. 33) as described in FIG. 42. Namely, Host H (FIG. 33) periodically checks the present location of Communication Device 200 by the method described in FIG. 33 and FIG. 34 (S1). Then Host H compares the present location with the train route data stored in its own storage (not shown) (S2). If the present location of communication 200 matches the train route data (i.e., if Communication Device 200 is located on the train route) (S3) Host H sends a notice signal to Communication Device 200 thereby activating the silent mode in the manner described above (S4).

Figure 45:
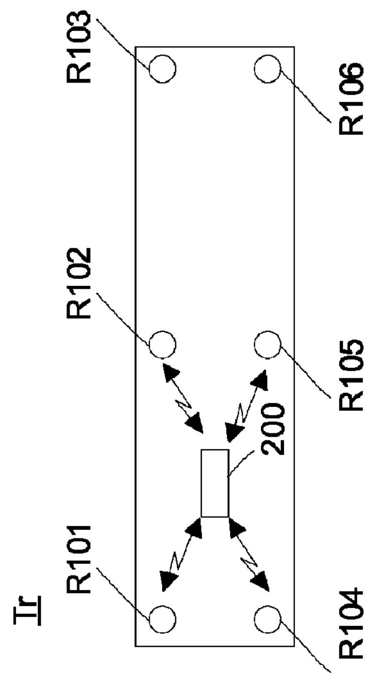
FIG. 45 is a simplified illustration illustrating an exemplary embodiment of the present invention.
Figure 46:
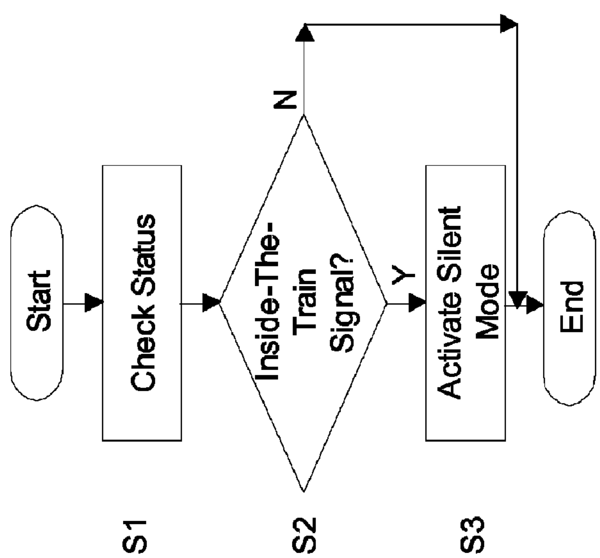
FIG. 46 is a flowchart illustrating an exemplary embodiment of the present invention.

Another embodiment is illustrated in FIG. 45 and FIG. 46. As illustrated in FIG. 45, Relays R 101, R 102, R103, R 104, R 105, R 106, which perform the same function to the Relays described in FIG. 33 and FIG. 34, are installed in Train Tr. The signals from these Relays are sent to Host H illustrated in FIG. 33. Relays R 101 through R 106 emit inside-the-train signals which are emitted only inside Train Tr. FIG. 46 illustrates how Communication Device 200 operates inside Train Tr. Communication Device 200 periodically checks the signal received in Train Tr (S1). If Communication Device 200 determines that the signal received is an inside-the-train signal (S2), it activates the silent mode in the manner described above (S3).

<<Positioning System—Auto Response Mode>>

Figure 43:
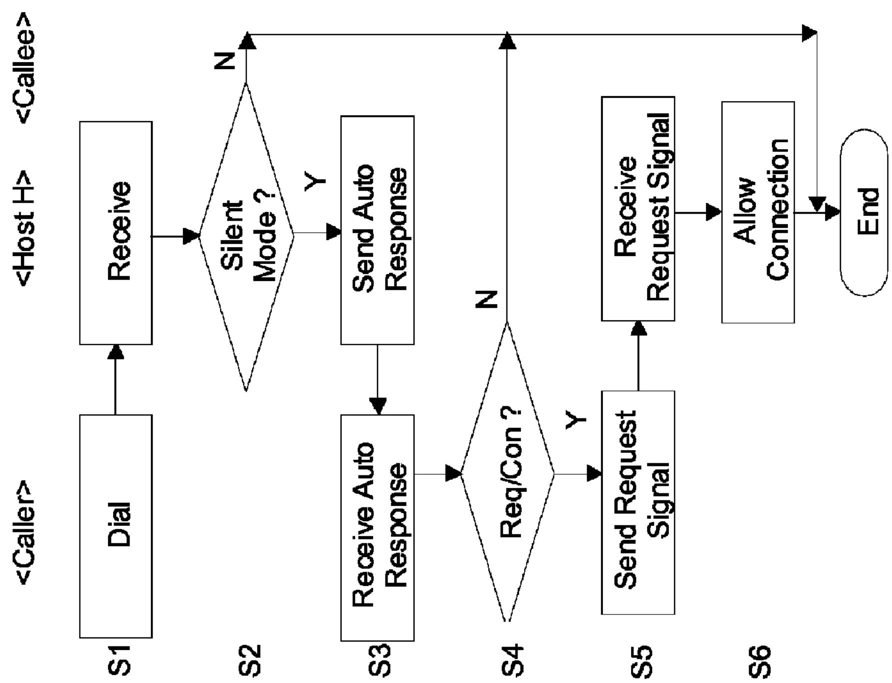
FIG. 43 is a flowchart illustrating an exemplary embodiment of the present invention.
Figure 44:
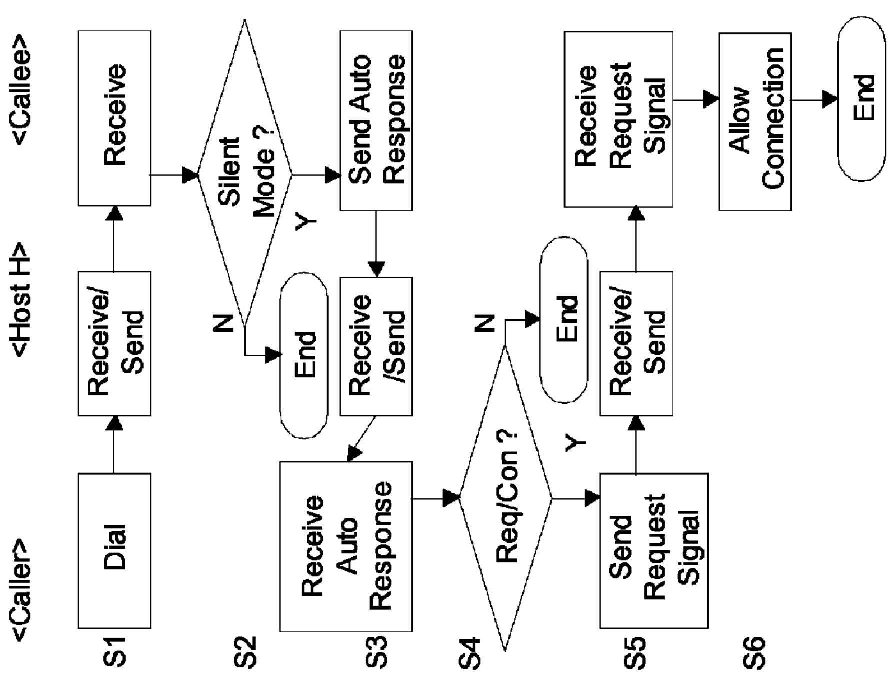
FIG. 44 is a flowchart illustrating an exemplary embodiment of the present invention.

FIG. 43 and FIG. 44 illustrates the method to send an automatic response to a caller device when the silent mode is activated.

Assume that the caller device, a Communication Device 200, intends to call a callee device, another Communication Device 200 via Host H (FIG. 33). As illustrated in FIG. 43, the caller device dials the callee device and the dialing signal is sent to Host H (S1). Host H checks whether the callee device is in the silent mode (S2). If Host H detects that the callee device is in the silent mode, it sends a predetermined auto response which indicates that the callee is probably on a train and may currently not be available, which is received by the caller device (S3). If the user of the caller device still desires to request for connection and certain code is input from Input Device 210 (FIG. 1) or by the voice recognition system (S4), a request signal for connection is sent and received by Host H (S5), and the line is connected between the caller device and the callee device via Host H (S6).

As another embodiment of the present invention, the task of Host H (FIG. 33) which is described in FIG. 43 may be delegated to the callee device as illustrated in FIG. 44. The caller device dials the callee device and the dialing signal is sent to the callee device via Host H (S1). The callee device checks whether it is in the silent mode (S2). If the callee device detects that it is in the silent mode, it sends an predetermined auto response which indicates that the callee is probably on a train and may currently not be available, which is sent to the caller device via Host H (S3). If the user of the caller device still desires to request for connection and certain code is input from Input Device 210 (FIG. 1) or by the voice recognition system (S4), a request signal for connection is sent to the callee device via Host H (S5), and the line is connected between the caller device and the callee device via Host H (S6).

<<Audio/Video Data Capturing System>>

FIG. 47 through FIG. 53 illustrate the audio/video capturing system of Communication Device 200 (FIG. 1).

Assuming that Device A, a Communication Device 200, captures audio/video data and transfers such data to Device B, another Communication Device 200, via a host (not shown). Primarily video data is input from CCD Unit 214 (FIG. 1) and audio data is input from Microphone 215 of (FIG. 1) of Device A.

Figure 47:
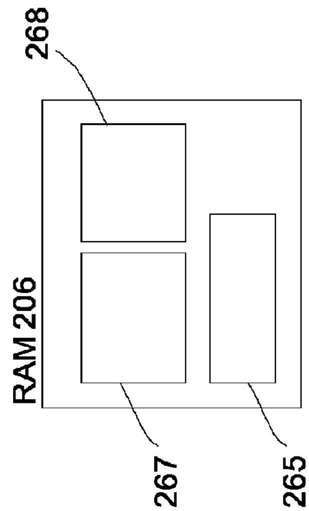
FIG. 47 is a block diagram illustrating an exemplary embodiment of the present invention.

As illustrated in FIG. 47, RAM 206 (FIG. 1) includes Area 267 which stores video data, Area 268 which stores audio data, and Area 265 which is a work area utilized for the process explained hereinafter.

Figure 48:
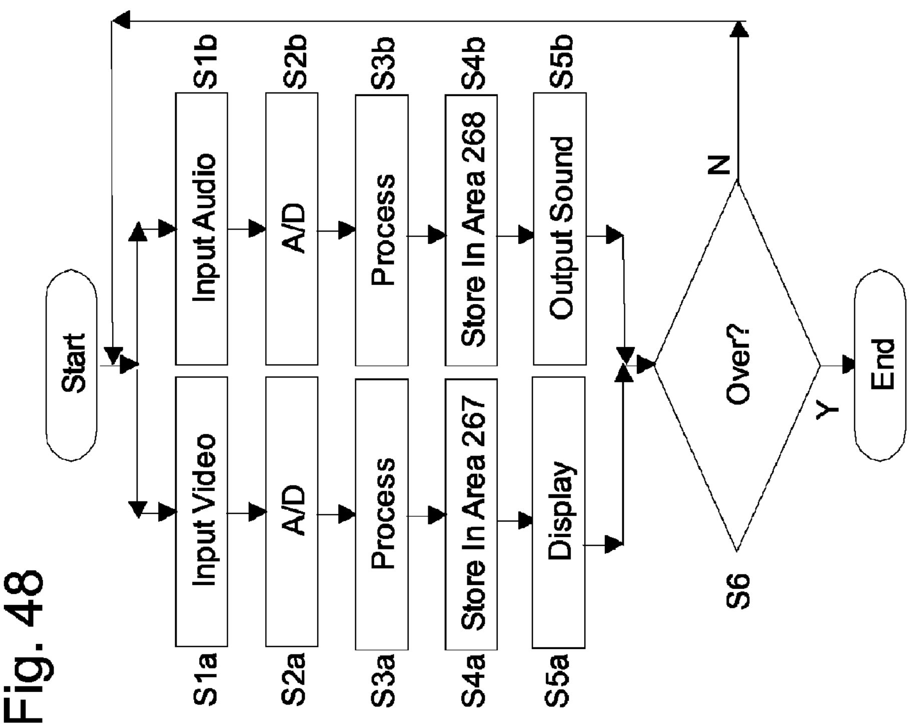
FIG. 48 is a flowchart illustrating an exemplary embodiment of the present invention.

As described in FIG. 48, the video data input from CCD Unit 214 (FIG. 1) (S1*a*) is converted from analog data to digital data (S2*a*) and is processed by Video Processor 202 (FIG. 1) (S3*a*). Area 265 (FIG. 47) is used as work area for such process. The processed video data is stored in Area 267 (FIG. 47) of RAM 206 (S4*a*) and is displayed on LCD 201 (FIG. 1) (S5*a*). As described in the same drawing, the audio data input from Microphone 215 (FIG. 1) (S1*b*) is converted from analog data to digital data by A/D 213 (FIG. 1) (S2*b*) and is processed by Sound Processor 205 (FIG. 1) (S3*b*). Area 265 is used as work area for such process. The processed audio data is stored in Area 268 (FIG. 47) of RAM 206 (S4*b*) and is transferred to Sound Processor 205 and is output from Speaker 216 (FIG. 1) via D/A 204 (FIG. 1) (S5*b*). The sequences of S1*a* through S5*a* and S1*b* through S5*b* are continued until a specific signal indicating to stop such sequence is input from Input Device 210 (FIG. 1) or by the voice recognition system (S6).

Figure 49:
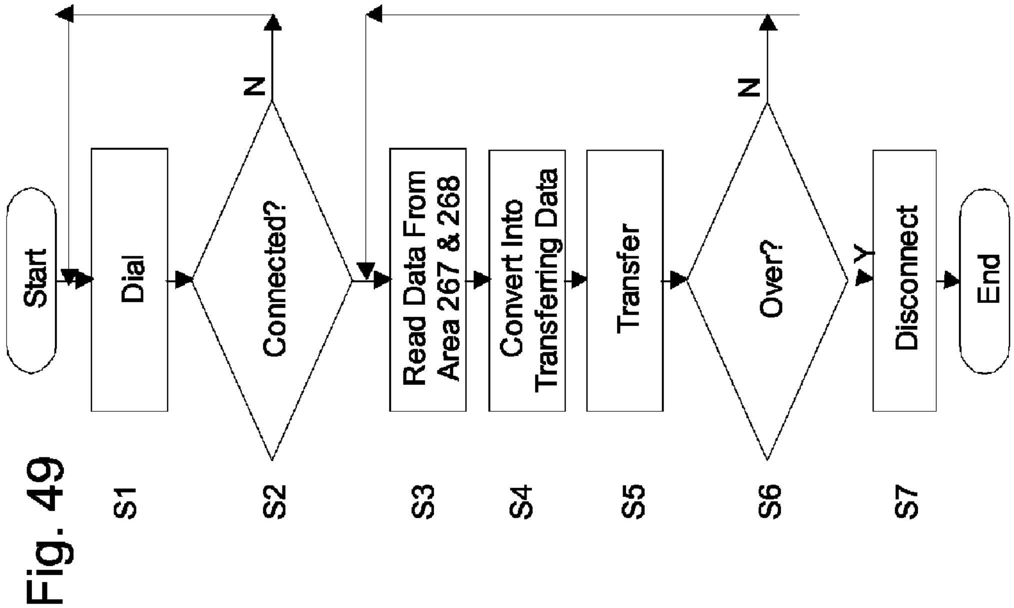
FIG. 49 is a flowchart illustrating an exemplary embodiment of the present invention.

FIG. 49 illustrates the sequence to transfer the video data and the audio data via Antenna 218 (FIG. 1) in a wireless fashion. As described in FIG. 49, CPU 211 (FIG. 1) of Device A initiates a dialing process (S1) until the line is connected to a host (not shown) (S2). As soon as the line is connected, CPU 211 reads the video data and the audio data stored in Area 267 (FIG. 47) and Area 268 (FIG. 47) (S3) and transfer them to Signal Processor 208 (FIG. 1) where the data are converted into a transferring data (S4). The transferring data is transferred from Antenna 218 (FIG. 1) in a wireless fashion (S5). The sequence of S1 through S5 is continued until a specific signal indicating to stop such sequence is input from Input Device 210 (FIG. 1) or via the voice recognition system (S6). The line is disconnected thereafter (S7).

Figure 50:
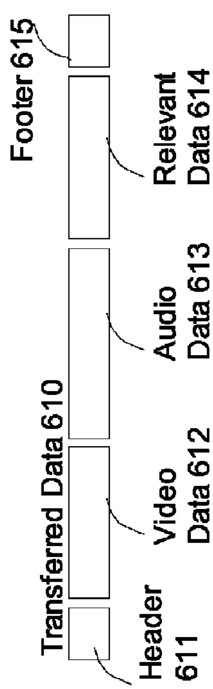
FIG. 50 is a simplified illustration illustrating an exemplary embodiment of the present invention.

FIG. 50 illustrates the basic structure of the transferred data which is transferred from Device A as described in S4 and S5 of FIG. 49. Transferred data 610 is primarily composed of Header 611, video data 612, audio data 613, relevant data 614, and Footer 615. Video data 612 corresponds to the video data stored in Area 267 (FIG. 47) of RAM 206, and audio data 613 corresponds to the audio data stored in Area 268 (FIG. 47) of RAM 206. Relevant Data 614 includes various types of data, such as the identification numbers of Device A (i.e., transferor device) and Device B (i.e., the transferee device), a location data which represents the location of Device A, email data transferred from Device A to Device B, etc. Header 611 and Footer 615 represent the beginning and the end of Transferred Data 610 respectively.

Figure 51:
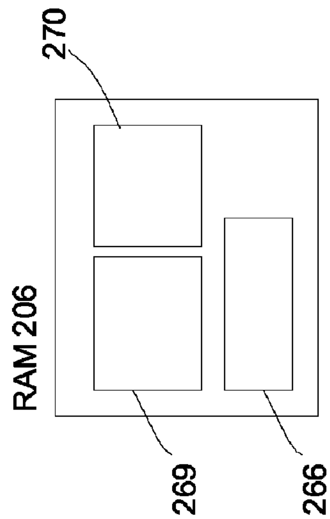
FIG. 51 is a block diagram illustrating an exemplary embodiment of the present invention.

FIG. 51 illustrates the data contained in RAM 206 (FIG. 1) of Device B. As illustrated in FIG. 51, RAM 206 includes Area 269 which stores video data, Area 270 which stores audio data, and Area 266 which is a work area utilized for the process explained hereinafter.

Figure 52:
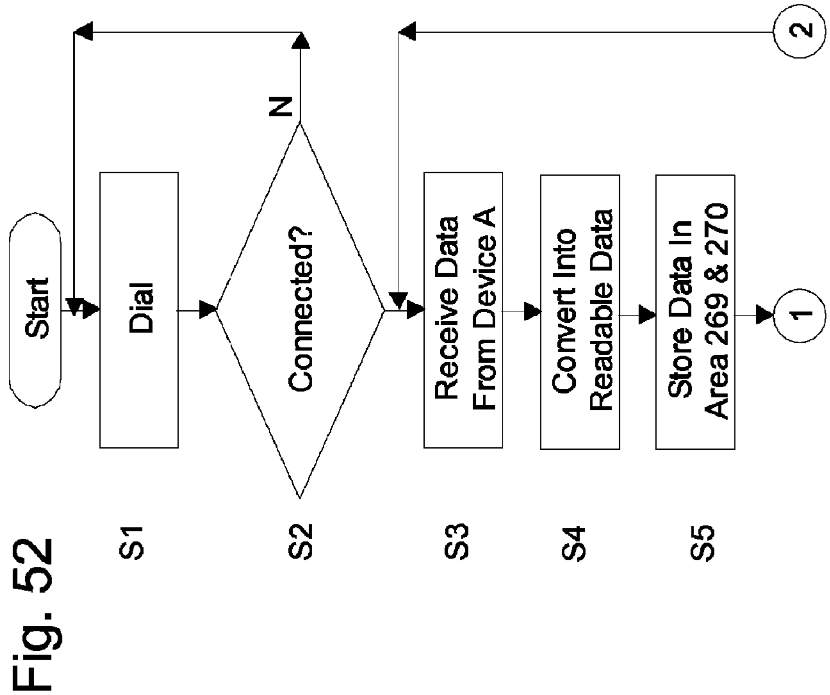
FIG. 52 is a flowchart illustrating an exemplary embodiment of the present invention.
Figure 53:
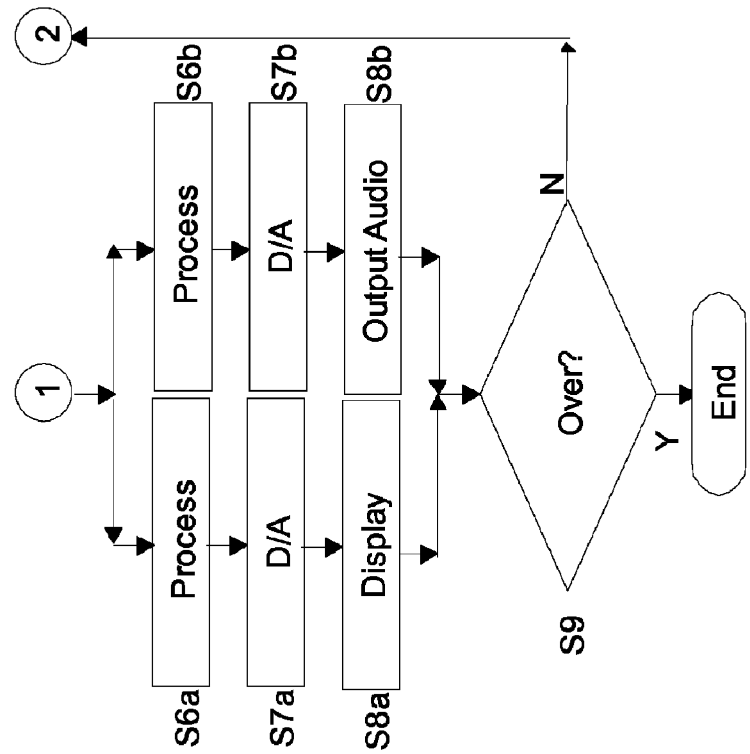
FIG. 53 is a flowchart illustrating an exemplary embodiment of the present invention.

As described in FIG. 52 and FIG. 53, CPU 211 (FIG. 1) of Device B initiates a dialing process (S1) until Device B is connected to a host (not shown) (S2). Transferred Data 610 is received by Antenna 218 (FIG. 1) of Device B (S3) and is converted by Signal Processor 208 (FIG. 1) into data readable by CPU 211 (S4). Video data and audio data are retrieved from Transferred Data 610 and stored into Area 269 (FIG. 51) and Area 270 (FIG. 51) of RAM 206 respectively (S5). The video data stored in Area 269 is processed by Video Processor 202 (FIG. 1) (S6*a*). The processed video data is converted into an analog data (S7*a*) and displayed on LCD 201 (FIG. 1) (S8*a*). S7*a* may not be necessary depending on the type of LCD 201 used. The audio data stored in Area 270 is processed by Sound Processor 205 (FIG. 1) (S6*b*). The processed audio data is converted into analog data by D/A 204 (FIG. 1) (S7*b*) and output from Speaker 216 (FIG. 1) (S8*b*). The sequences of S6*a* through S8*a* and S6*b* through S8*b* are continued until a specific signal indicating to stop such sequence is input from Input Device 210 (FIG. 1) or via the voice recognition system (S9).

<<Caller ID System>>

Figure 55:
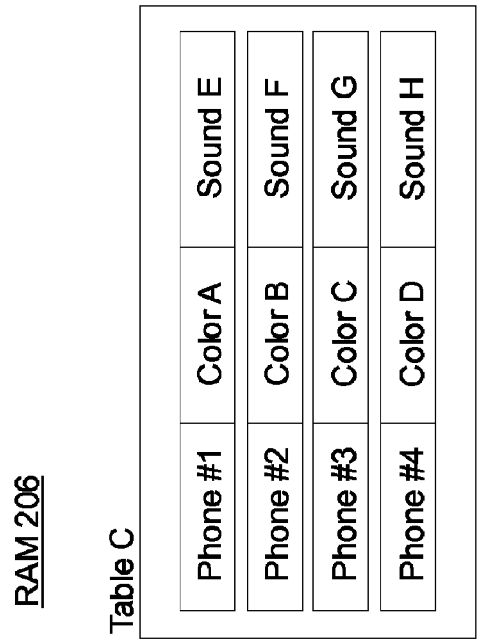
FIG. 55 is a block diagram illustrating an exemplary embodiment of the present invention.
Figure 56:
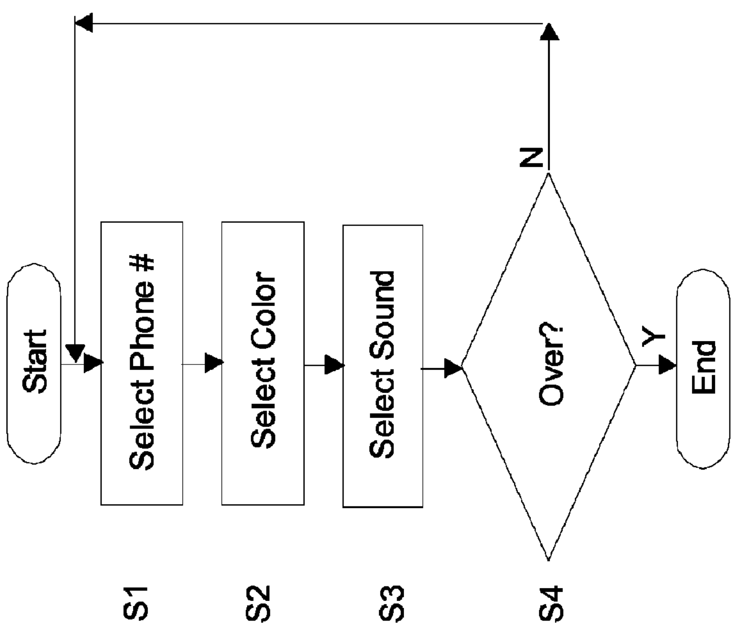
FIG. 56 is a flowchart illustrating an exemplary embodiment of the present invention.
Figure 57:
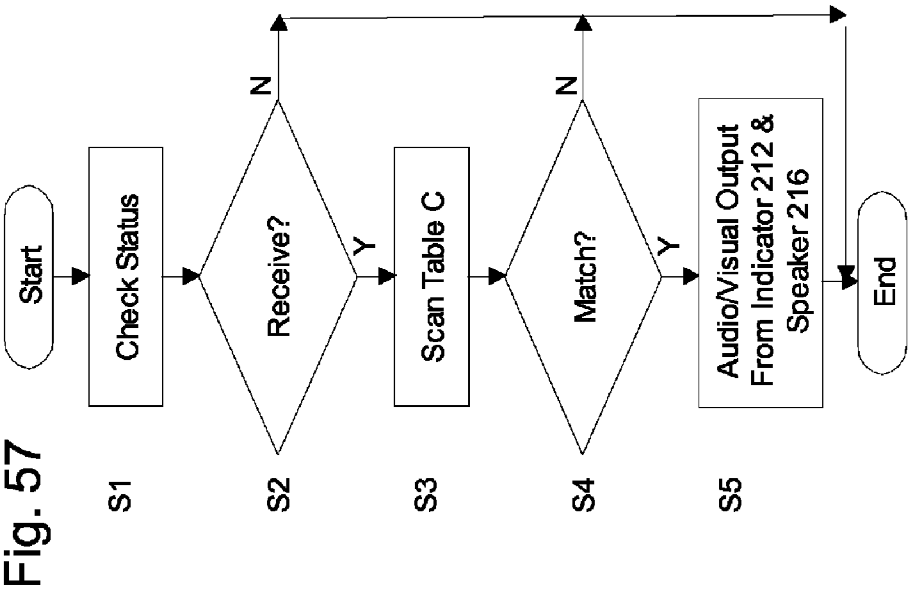
FIG. 57 is a flowchart illustrating an exemplary embodiment of the present invention.

FIG. 55 through FIG. 57 illustrate the caller ID system of Communication Device 200 (FIG. 1).

As illustrated in FIG. 55, RAM 206 includes Table C. As shown in the drawing, each phone number corresponds to a specific color and sound. For example Phone #1 corresponds to Color A and Sound E; Phone #2 corresponds to Color B and Sound F; Phone #3 corresponds to Color C and Sound G; and Phone #4 corresponds to color D and Sound H.

As illustrated in FIG. 56, the user of Communication Device 200 selects or inputs a phone number (S1) and selects a specific color (S2) and a specific sound (S3) designated for that phone number by utilizing Input Device 210 (FIG. 1). Such sequence can be repeated until there is a specific input signal from Input Device 210 ordering to do otherwise (S4).

As illustrated in FIG. 57, CPU 211 (FIG. 1) periodically checks whether it has received a call from other communication devices (S1). If it receives a call (S2), CPU 211 scans Table C (FIG. 55) to see whether the phone number of the caller device is registered in the table (S3). If there is a match (S4), the designated color is output from Indicator 212 (FIG. 1) and the designated sound is output from Speaker 216 (FIG. 1) (S5). For example if the incoming call is from Phone #1, Color A is output from Indicator 212 and Sound E is output from Speaker 216.

<<Stock Purchasing Function>>

FIG. 58 through FIG. 62 illustrate the method of purchasing stocks by utilizing Communication Device 200 (FIG. 1).

Figure 58:
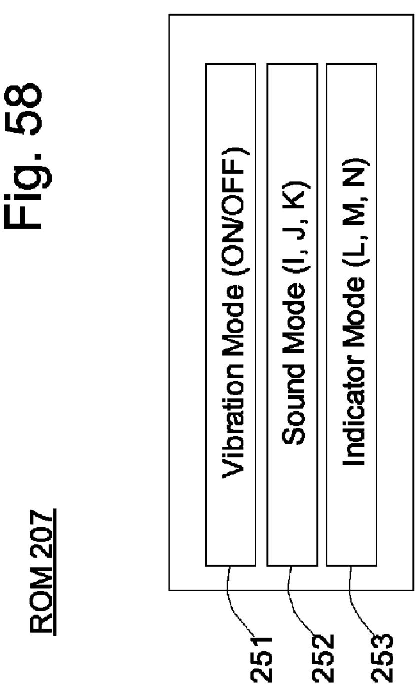
FIG. 58 is a block diagram illustrating an exemplary embodiment of the present invention.

FIG. 58 illustrates the data stored in ROM 207 (FIG. 1) necessary to set the notice mode. Area 251 stores the program regarding the vibration mode (i.e., vibration mode ON/vibration mode OFF); Area 252 stores the program regarding sound which is emitted from Speaker 216 (FIG. 1) and several types of sound data, such as Sound Data I, Sound Data J, and Sound Data K are stored therein; Area 253 stores the program regarding the color emitted from Indicator 212 (FIG. 1) and several types of color data, such as Color Data L, Color Data M, and Color Data N are stored therein.

Figure 59:
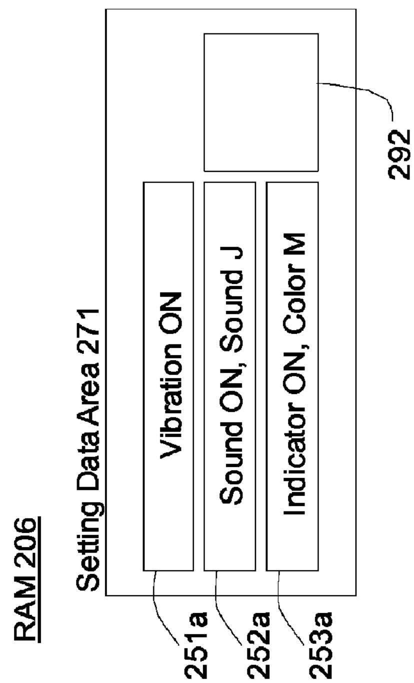
FIG. 59 is a block diagram illustrating an exemplary embodiment of the present invention.

As illustrated in FIG. 59, the notice mode is activated in the manner in compliance with the settings stored in setting data Area 271 of RAM 206 (FIG. 1). In the example illustrated in FIG. 59, when the notice mode is activated, Vibrator 217 (FIG. 1) is turned on in compliance with the data stored in Area 251*a*, Speaker 216 (FIG. 1) is turned on and Sound Data J is emitted therefrom in compliance with the data stored in Area 252*a*, and Indicator 212 (FIG. 1) is turned on and Color M is emitted therefrom in compliance with the data stored in Area 253*a*. Area 292 stores the stock purchase data, i.e., the name of the brand, the amount of limited price, the name of the stock market (such as NASDAQ and/or NYSE) and other relevant information regarding the stock purchase.

Figure 60:
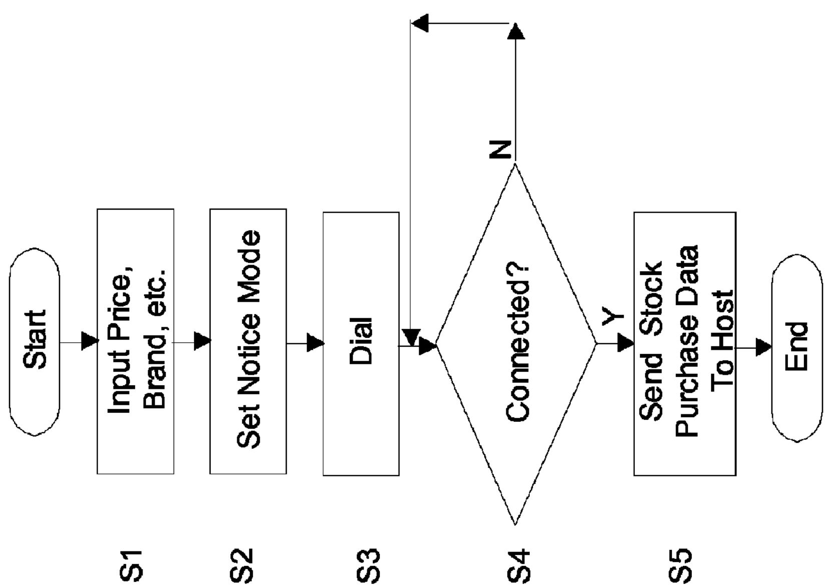
FIG. 60 is a flowchart illustrating an exemplary embodiment of the present invention.

As illustrated in FIG. 60, the user of Communication Device 200 inputs the stock purchase data from Input Device 210 (FIG. 1) or by the voice recognition system, which is stored in Area 292 of RAM 206 (FIG. 59) (S1). By way of inputting specific data from Input Device 210, the property of notice mode (i.e., vibration ON/OFF, sound ON/OFF and the type of sound, indicator ON/OFF, and the type of color) is set and the relevant data are stored in Area 271 (i.e., Areas 251*a*, 252*a*, 253*a*) (FIG. 59) of RAM 206 by the programs stored in Areas 251, 252, 253 of ROM 207 (FIG. 58) (S2). Communication Device 200 initiates a dialing process (S3) until it is connected to Host H (described hereinafter) (S4) and sends the stock purchase data thereto.

Figure 61:
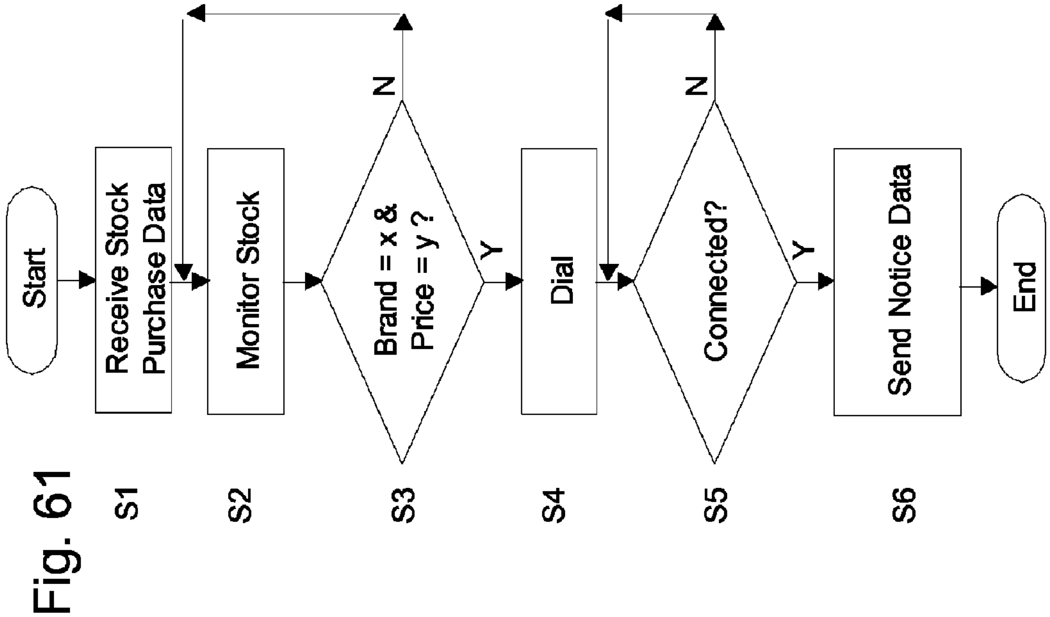
FIG. 61 is a flowchart illustrating an exemplary embodiment of the present invention.

FIG. 61 illustrates the operation of Host H (not shown). As soon as Host H receives the stock purchase data from Communication Device 200 (S1), it initiates to monitor the stock markets which is specified in the stock purchase data (S2). If Host H detects that the price of the certain brand specified in the stock purchase data meets the limited price specified in the stock purchase data, (in the present example if the price of brand x is y) (S3), it initiates a dialing process (S4) until it is connected to Communication Device 200 (S5) and sends a notice data thereto (S6).

Figure 62:
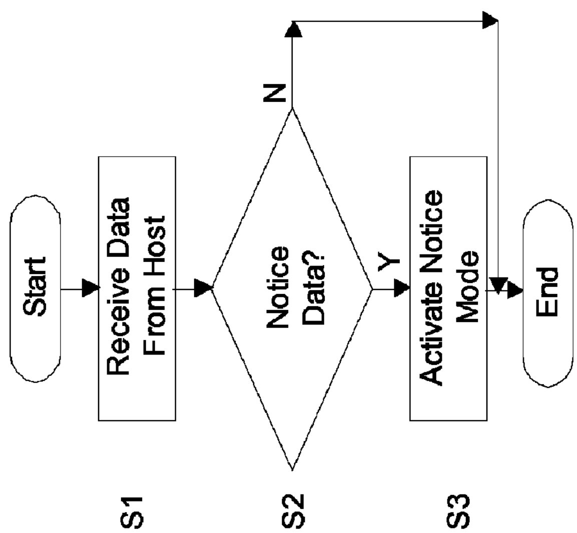
FIG. 62 is a flowchart illustrating an exemplary embodiment of the present invention.

As illustrated in FIG. 62, Communication Device 200 periodically monitors the data received from Host H (not shown) (S1). If the data received is a notice data (S2), the notice mode is activated in the manner in compliance with the settings stored in setting data Area 271 (FIG. 59) of RAM 206 (S3). In the example illustrated in FIG. 59, Vibrator 217 (FIG. 1) is turned on, Sound Data J is emitted from Speaker 216 (FIG. 1), and Indicator 212 (FIG. 1) emits Color M.

<<Call Blocking Function>>

Figure 63:
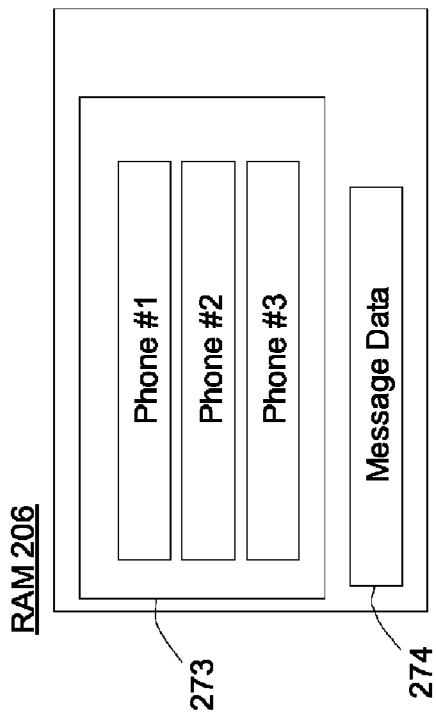
FIG. 63 is a block diagram illustrating an exemplary embodiment of the present invention.
Figure 64:
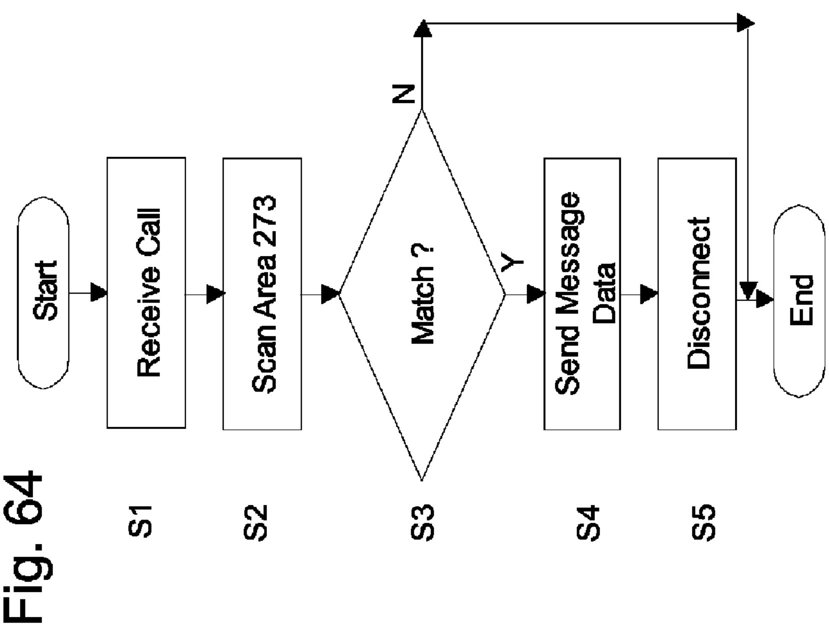
FIG. 64 is a flowchart illustrating an exemplary embodiment of the present invention.
Figure 65:
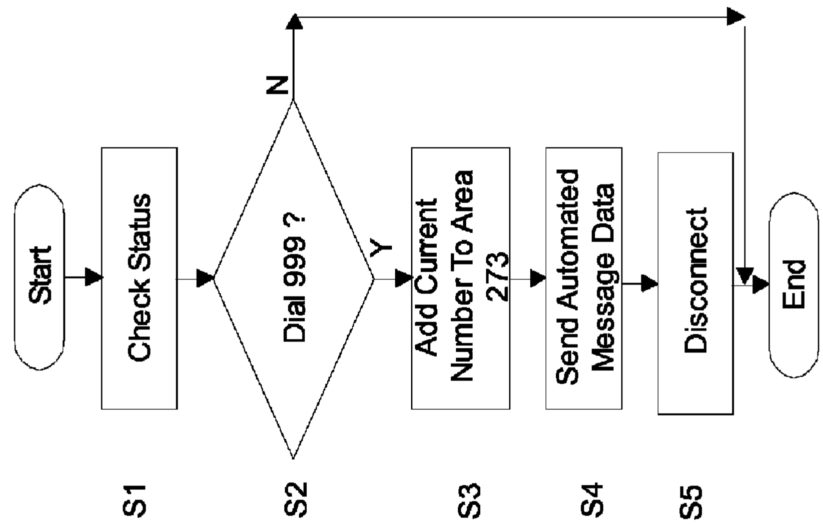
FIG. 65 is a flowchart illustrating an exemplary embodiment of the present invention.

FIG. 63 through FIG. 65 illustrates the so-called 'call blocking' function of Communication Device 200 (FIG. 1).

As illustrated in FIG. 63, RAM 206 (FIG. 1) includes Area 273 and Area 274. Area 273 stores phone numbers that should be blocked. In the example illustrated in FIG. 63, Phone #1, Phone #2, and Phone #3 are blocked. Area 274 stores a message data, preferably a wave data, stating that the phone can not be connected.

FIG. 64 illustrates the operation of Communication Device 200. When Communication Device 200 receives a call (S1), CPU 211 (FIG. 1) scans Area 273 (FIG. 63) of RAM 206 (S2). If the phone number of the incoming call matches one of the phone numbers stored in Area 273 (S3), CPU 211 sends the message data stored in Area 274 (FIG. 63) of RAM 206 to the caller device (S4) and disconnects the line (S5).

FIG. 65 illustrates the method of updating Area 273 (FIG. 63) of RAM 206. Assuming that the phone number of the incoming call does not match any of the phone numbers stored in Area 273 of RAM 206 (see S3 of FIG. 64). In that case, Communication Device 200 is connected to the caller device. However, the user of Communication Device 200 may decide to have such number 'blocked' after all. If that is the case, the user dials '999' while the line is connected. Technically CPU 211 (FIG. 1) periodically checks the signals input from Input Device 210 (FIG. 1) (S1). If the input signal represents a numerical data '999' from Input Device 210 (S2), CPU 211 adds the phone number of the pending call to Area 273 (S3) and sends the message data stored in Area 274 (FIG. 63) of RAM 206 to the caller device (S4). The line is disconnected thereafter (S5).

Figure 66:
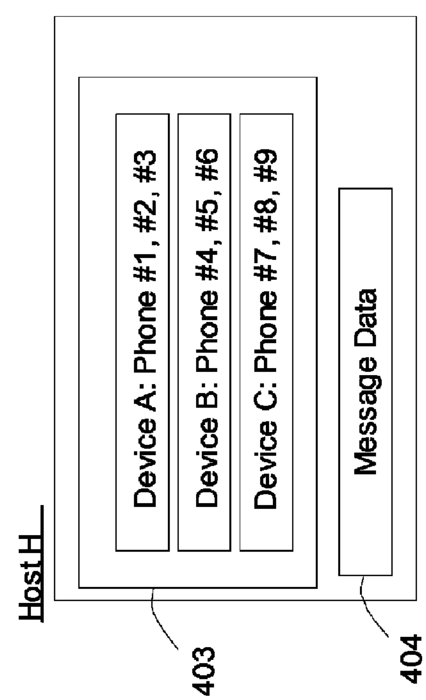
FIG. 66 is a block diagram illustrating an exemplary embodiment of the present invention.
Figure 67:
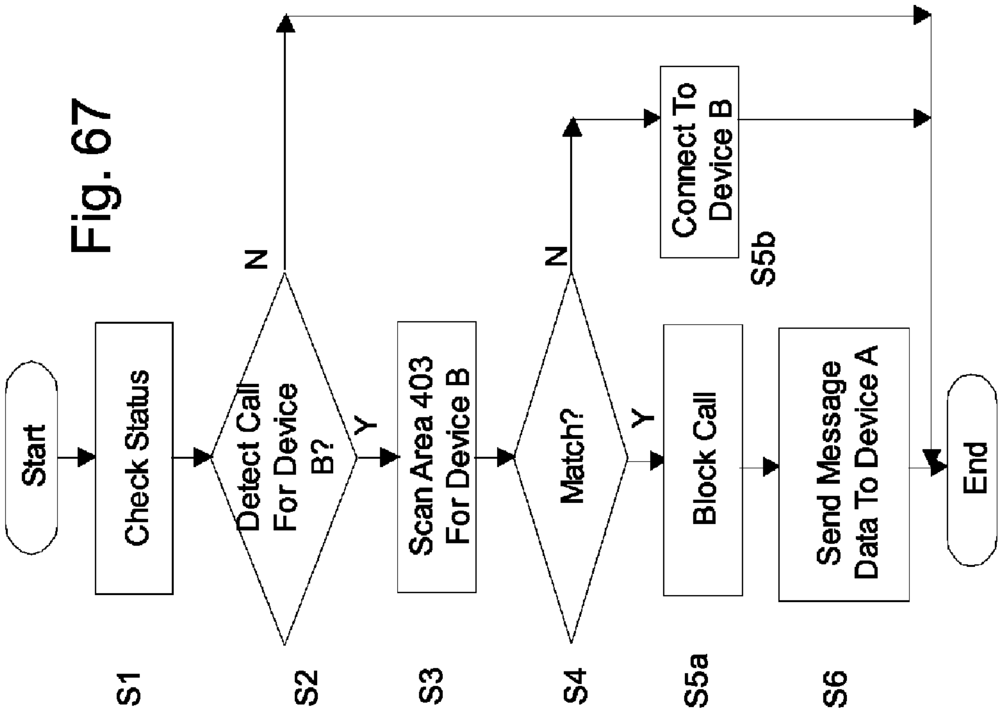
FIG. 67 is a flowchart illustrating an exemplary embodiment of the present invention.
Figure 68:
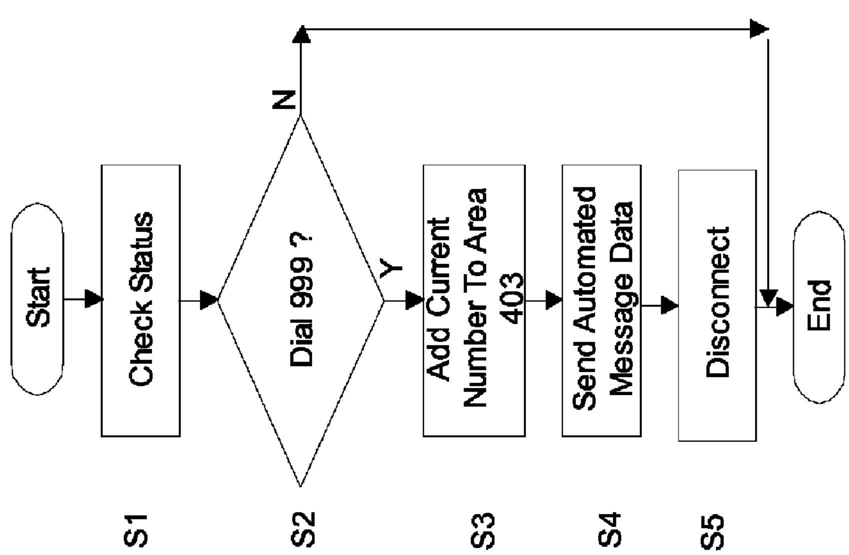
FIG. 68 is a flowchart illustrating an exemplary embodiment of the present invention.

FIG. 66 through FIG. 68 illustrate another embodiment of the present invention.

As illustrated in FIG. 66, Host H (not shown) includes Area 403 and Area 404. Area 403 stores phone numbers that should be blocked to be connected to Communication Device 200. In the example illustrated in FIG. 66, Phone #1, Phone #2, and Phone #3 are blocked for Device A; Phone #4, Phone #5, and Phone #6 are blocked for Device B; and Phone #7, Phone #8, and Phone #9 are blocked for Device C. Area 404 stores a message data stating that the phone can not be connected.

FIG. 67 illustrates the operation of Host H (not shown). Assuming that the caller device is attempting to connect to Device B, Communication Device 200. Host H periodically checks the signals from all Communication Device 200 (S1). If Host H detects a call for Device B (S2), it scans Area 403 (FIG. 66) (S3) and checks whether the phone number of the incoming call matches one of the phone numbers stored therein for Device B (S4). If the phone number of the incoming call does not match any of the phone numbers stored in Area 403, the line is connected to Device B (S5*b*). On the other hand, if the phone number of the incoming call matches one of the phone numbers stored in Area 403, the line is 'blocked,' i.e., not connected to Device B (S5*a*) and Host H sends the massage data stored in Area 404 (FIG. 66) to the caller device (S6).

FIG. 68 illustrates the method of updating Area 403 (FIG. 66) of Host H. Assuming that the phone number of the incoming call does not match any of the phone numbers stored in Area 403 (see S4 of FIG. 67). In that case, Host H allows the connection between the caller device and Communication Device 200, however, the user of Communication Device 200 may decide to have such number 'blocked' after all. If that is the case, the user simply dials '999' while the line is connected. Technically Host H (FIG. 66) periodically checks the signals input from Input Device 210 (FIG. 1) (S1). If the input signal represents '999' from Input Device 210 (FIG. 1) (S2), Host H adds the phone number of the pending call to Area 403 (S3) and sends the message data stored in Area 404 (FIG. 66) to the caller device (S4). The line is disconnected thereafter (S5).

As another embodiment of the method illustrated in FIG. 68, Host H (FIG. 66) may delegate some of its tasks to Communication Device 200 (this embodiment is not shown in drawings). Namely, Communication Device 200 periodically checks the signals input from Input Device 210 (FIG. 1). If the input signal represents a numeric data '999' from Input Device 210, Communication Device 200 sends to Host H a block request signal as well as with the phone number of the pending call. Host H, upon receiving the block request signal from Communication Device 200, adds the phone number of the pending call to Area 403 (FIG. 66) and sends the message data stored in Area 404 (FIG. 66) to the caller device. The line is disconnected thereafter.

<<Online Payment Function>>

FIG. 69 through FIG. 74 illustrate the method of online payment by utilizing Communication Device 200 (FIG. 1).

Figure 69:
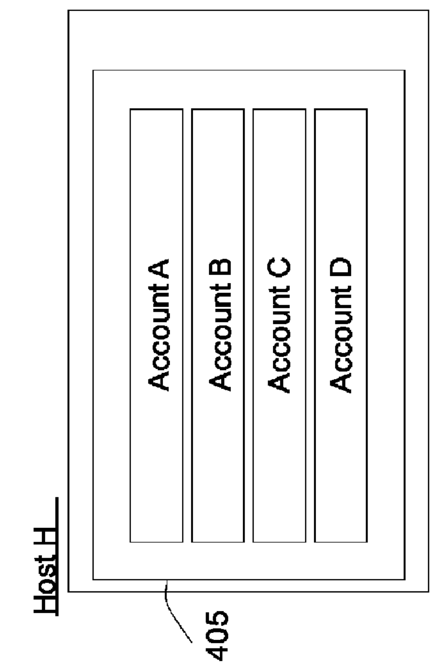
FIG. 69 is a block diagram illustrating an exemplary embodiment of the present invention.

As illustrated in FIG. 69, Host H includes account data storage Area 405. All of the account data of the users of Communication Device 200 who have signed up for the online payment service are stored in Area 405. In the example described in FIG. 69, Account A stores the relevant account data of the user using Device A; Account B stores the relevant account data of the user using Device B; Account C stores the relevant account data of the user using Device C; and Account D stores the relevant account data of the user using device D. Here, Devices A, B, C, and D are Communication Device 200.

Figure 70:
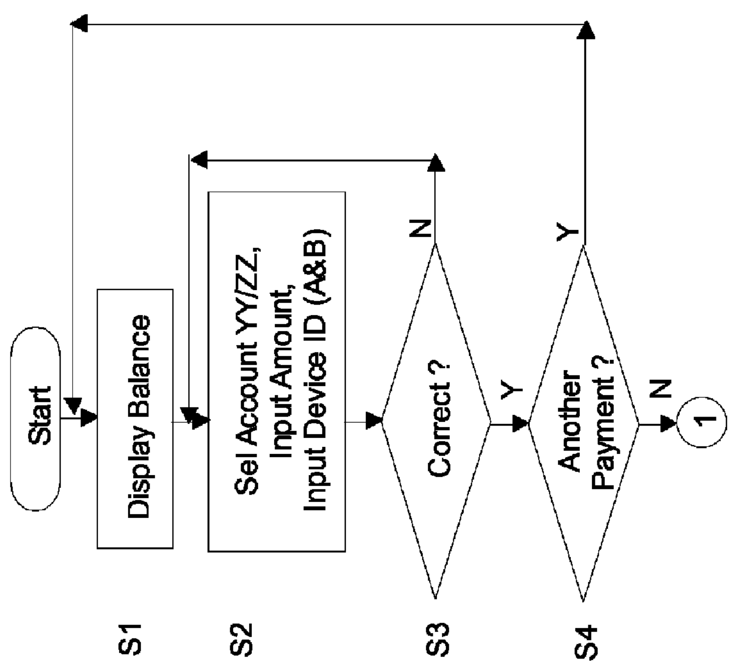
FIG. 70 is a flowchart illustrating an exemplary embodiment of the present invention.
Figure 71:
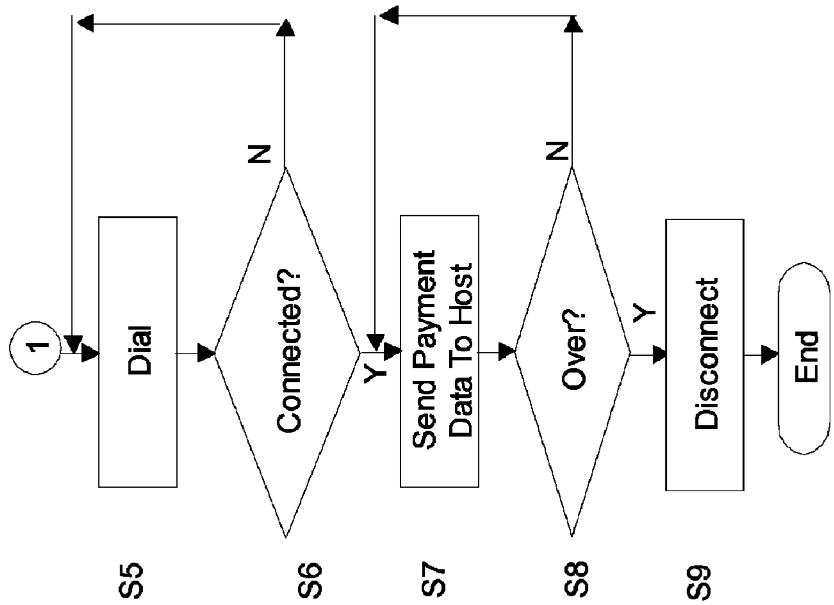
FIG. 71 is a flowchart illustrating an exemplary embodiment of the present invention.

FIG. 70 and FIG. 71 illustrate the operation of the payer device, Communication Device 200. Assuming that Device A is the payer device and Device B is the payee device. Account A explained in FIG. 69 stores the account data of the user of Device A, and Account B explained in the same drawing stores the account data of the user of Device B. As illustrated in FIG. 70, LCD 201 (FIG. 1) of Device A displays the balance of Account A by receiving the relevant data from Host H (FIG. 69) (S1). From the signal input from Input Device 210 (FIG. 1), the payer's account and the payee's account are selected (in the present example, Account A as the payer's account and Account B as the payee's account are selected), and the amount of payment and the device ID (in the present example, Device A as the payer's device and Device B as the payee's device) are input via Input Device 210 (S2). If the data input from Input Device 210 is correct (S3), CPU 211 (FIG. 1) of Device A prompts for other payments. If there are other payments to make, the sequence of S1 through S3 is repeated until all of the payments are made (S4). The dialing process is initiated and repeated thereafter (S5) until the line is connected to Host H (FIG. 69) (S6). Once the line is connected, Device A sends the payment data to Host H (S7). The line is disconnected when all of the payment data including the data produced in S2 are sent to Host H (S8 and S9).

Figure 72:
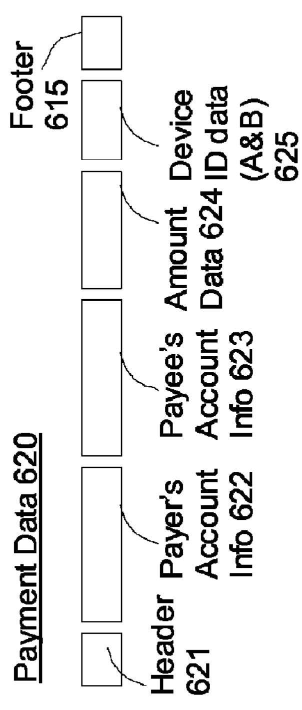
FIG. 72 is a simplified illustration illustrating an exemplary embodiment of the present invention.

FIG. 72 illustrates the payment data described in S7 of FIG. 71. Payment data 620 is composed of Header 621, Payer's Account Information 622, Payee's Account Information 623, amount data 624, device ID data 625, and Footer 615. Payer's Account Information 622 represents the information regarding the payer's account data stored in Host H (FIG. 69) which is, in the present example, Account A. Payee's Account Information 623 represents the information regarding the payee's account data stored in Host H which is, in the present example, Account B. Amount Data 624 represents the amount of monetary value either in the U.S. dollars or in other currencies which is to be transferred from the payer's account to the payee's account. The device ID data represents the data of the payer's device and the payee's device, i.e., in the present example, Device A and Device B.

Figure 73:
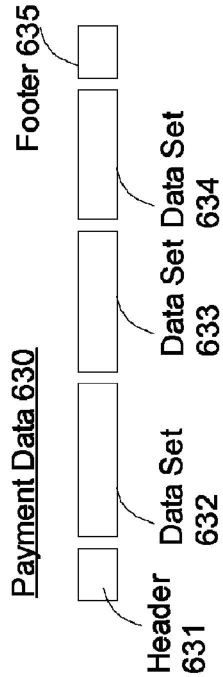
FIG. 73 is a simplified illustration illustrating an exemplary embodiment of the present invention.

FIG. 73 illustrates the basic structure of the payment data described in S7 of FIG. 71 when multiple payments are made, i.e., when more than one payment is made in S4 of FIG. 70. Assuming that three payments are made in S4 of FIG. 70. In that case, Payment Data 630 is composed of Header 631, Footer 635, and three data sets, i.e., Data Set 632, Data Set 633, Data Set 634. Each data set represents the data components described in FIG. 72 excluding Header 621 and Footer 615.

Figure 74:
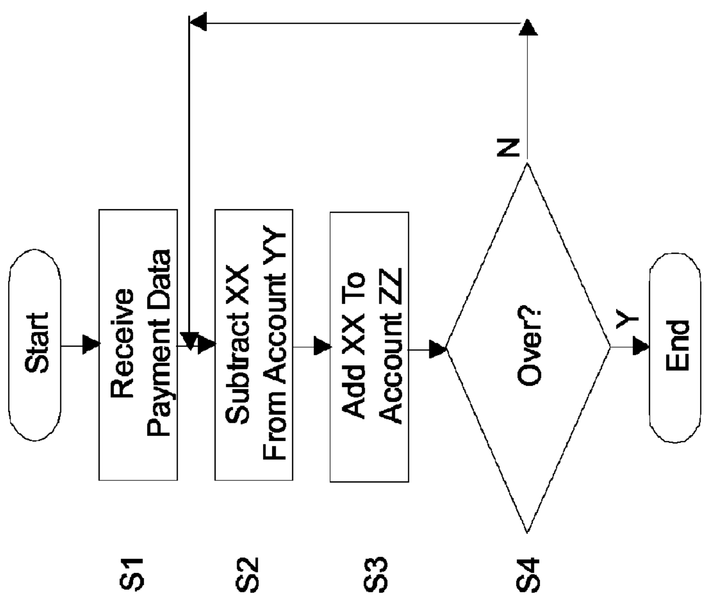
FIG. 74 is a flowchart illustrating an exemplary embodiment of the present invention.

FIG. 74 illustrates the operation of Host H (FIG. 69). After receiving payment data from Device A described in FIG. 72 and FIG. 73, Host H retrieves therefrom the payer's account information (in the present example Account A), the payee's account information (in the present example Account B), the amount data which represents the monetary value, and the device IDs of both the payer's device and the payee's device (in the present example Device A and Device B) (S1). Host H, based on such data, subtracts the monetary value represented by the amount data from the payer's account (in the present example Account A) (S2), and adds the same amount to the payee's account (in the present example Account B) (S3). If there are other payments to make, i.e., if Host H received a payment data which has a structure of the one described in FIG. 73, the sequence of S2 and S3 is repeated as many times as the amount of the data sets are included in such payment data.

<<Navigation System>>

FIG. 75 through FIG. 84 illustrate the navigation system of Communication Device 200 (FIG. 1).

Figure 75:
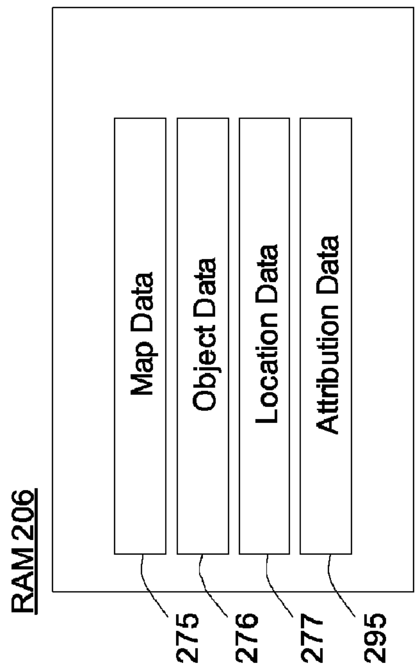
FIG. 75 is a block diagram illustrating an exemplary embodiment of the present invention.

As illustrated in FIG. 75, RAM 206 (FIG. 1) includes Area 275, Area 276, Area 277, and Area 295. Area 275 stores a plurality of map data, two-dimensional (2D) image data, which are designed to be displayed on LCD 201 (FIG. 1). Area 276 stores a plurality of object data, three-dimensional (3D) image data, which are also designed to be displayed on LCD 201. The object data are primarily displayed by a method so-called 'texture mapping' which is explained in details hereinafter. Here, the object data include the three-dimensional data of various types of objects that are displayed on LCD 201, such as bridges, houses, hotels, motels, inns, gas stations, restaurants, streets, traffic lights, street signs, trees, etc. Area 277 stores a plurality of location data, i.e., data representing the locations of the objects stored in Area 276. Area 277 also stores a plurality of data representing the street address of each object stored in Area 276. In addition, Area 277 stores the current position data of Communication Device 200 and the Destination Data which are explained in details hereafter. The map data stored in Area 275 and the location data stored in Area 277 are linked each other. Area 295 stores a plurality of attribution data attributing to the map data stored in Area 275 and location data stored in Area 277, such as road blocks, traffic accidents, and road constructions, and traffic jams. The attribution data stored in Area 295 is updated periodically by receiving an updated data from a host (not shown).

Figure 76:
FIG. 76 is a block diagram illustrating an exemplary embodiment of the present invention.

As illustrated in FIG. 76, Video Processor 202 (FIG. 1) includes texture mapping processor 290. Texture mapping processor 290 produces polygons in a three-dimensional space and 'pastes' textures to each polygon. The concept of such method is described in the following patents and the references cited thereof: U.S. Pat. No. 5,870,101, U.S. Pat. No. 6,157,384, U.S. Pat. No. 5,774,125, U.S. Pat. No. 5,375,206, and/or U.S. Pat. No. 5,925,127.

Figure 77:
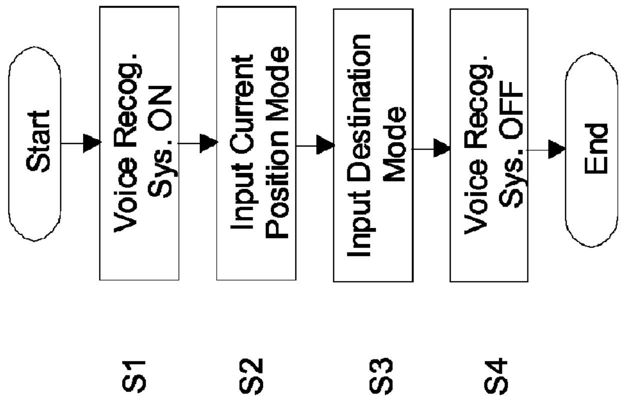
FIG. 77 is a flowchart illustrating an exemplary embodiment of the present invention.

As illustrated in FIG. 77, the voice recognition system is activated when CPU 211 (FIG. 1) detects a specific signal input from Input Device 210 (FIG. 1) (S1). After the voice recognition system is activated, the input current position mode starts and the current position of Communication Device 200 is input by voice recognition system explained in FIG. 5, FIG. 6, FIG. 7, FIG. 16, FIG. 17, FIG. 18, FIG. 19, FIG. 20 and/or FIG. 21 and FIG. 22 (S2). The current position can also be input from Input Device 210. As another embodiment of the present invention, the current position can automatically be detected by the method so-called 'global positioning system' or 'GPS' as illustrated in FIG. 25 through FIG. 32 and input the current data therefrom. After the process of inputting the current data is completed, the input destination mode starts and the destination is input by the voice recognition system explained above or by the Input Device 210 (S3), and the voice recognition system is deactivated after the process of inputting the Destination Data is completed by utilizing such system (S4).

Figure 78:
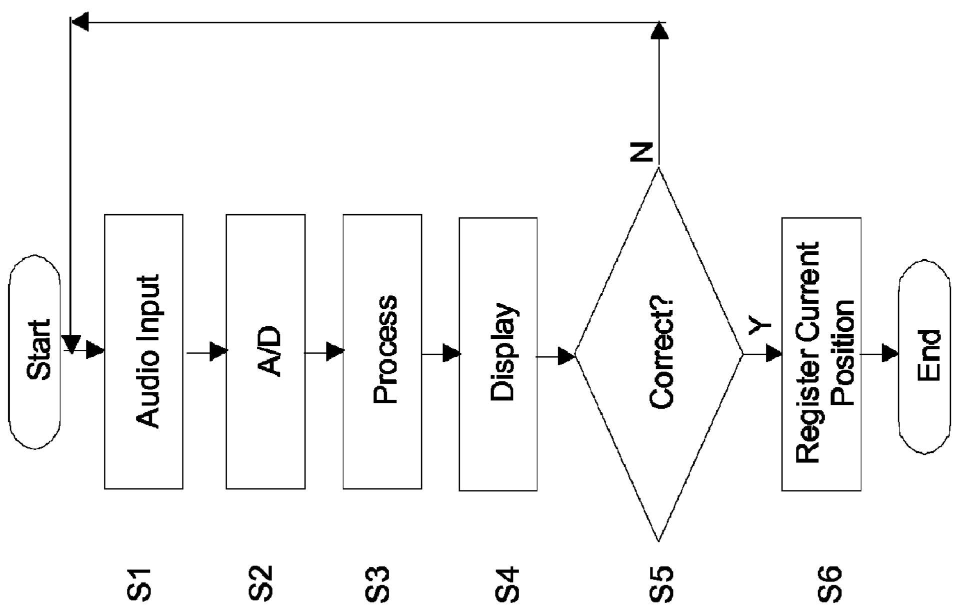
FIG. 78 is a flowchart illustrating an exemplary embodiment of the present invention.

FIG. 78 illustrates the sequence of the input current position mode described in S2 of FIG. 77. When analog audio data is input from Microphone 215 (FIG. 1) (S1), such data is converted into digital audio data by A/D 213 (FIG. 1) (S2). The digital audio data is processed by Sound Processor 205 (FIG. 1) to retrieve text and numeric data therefrom (S3). The retrieved data is displayed on LCD 201 (FIG. 1) (S4). The data can be corrected by repeating the sequence of S1 through S4 until the correct data is displayed (S5). If the correct data is displayed, such data is registered as current position data (S6). As stated above, the current position data can be input manually by Input Device 210 (FIG. 1) and/or can be automatically input by utilizing the method so-called 'global positioning system' or 'GPS' as described hereinbefore.

Figure 79:
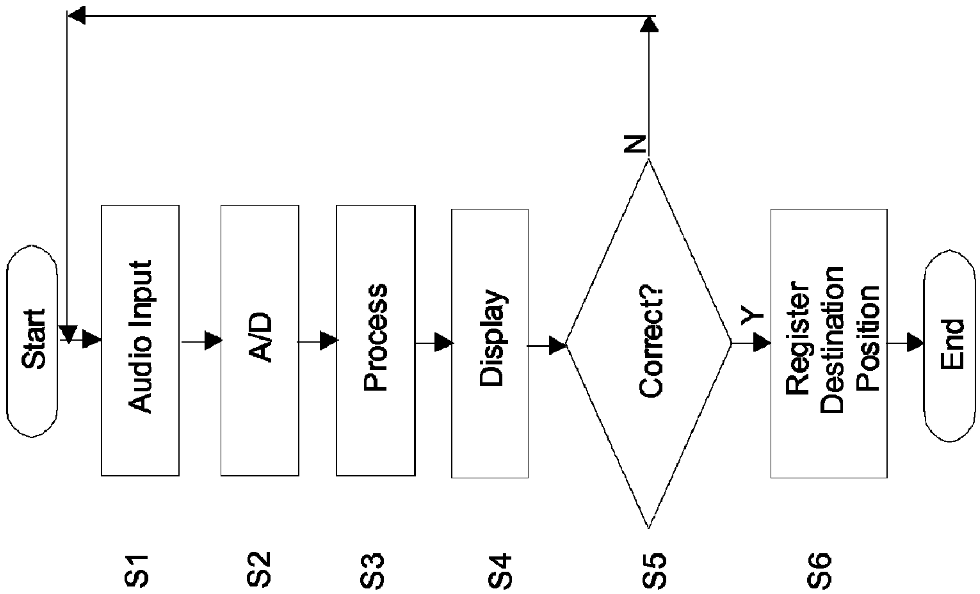
FIG. 79 is a flowchart illustrating an exemplary embodiment of the present invention.

FIG. 79 illustrates the sequence of the input destination mode described in S3 of FIG. 77. When analog audio data is input from Microphone 215 (FIG. 1) (S1), such data is converted into digital audio data by A/D 213 (FIG. 1) (S2). The digital audio data is processed by Sound Processor 205 (FIG. 1) to retrieve text and numeric data therefrom (S3). The retrieved data is displayed on LCD 201 (FIG. 1) (S4). The data can be corrected by repeating the sequence of S1 through S4 until the correct data is displayed on LCD 201 (S5). If the correct data is displayed, such data is registered as Destination Data (S6).

Figure 80:
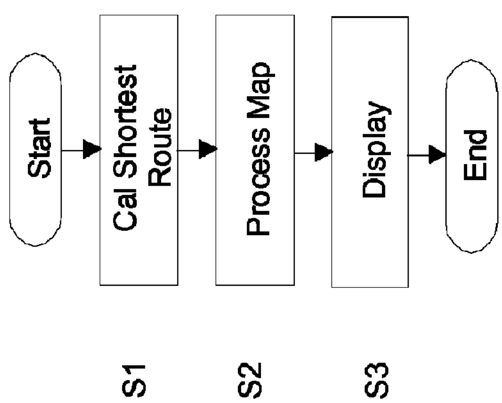
FIG. 80 is a flowchart illustrating an exemplary embodiment of the present invention.

FIG. 80 illustrates the sequence of displaying the shortest route from the current position to the destination. CPU 211 (FIG. 1) retrieves both the current position data and the Destination Data which are input by the method described in FIG. 77 through FIG. 79 from Area 277 (FIG. 75) of RAM 206 (FIG. 1). By utilizing the location data of streets, bridges, traffic lights and other relevant data, CPU 211 calculates the shortest route to the destination (S1). CPU 211 then retrieves the relevant two-dimensional map data which should be displayed on LCD 201 from Area 275 (FIG. 75) of RAM 206 (S2).

As another embodiment of the present invention, by way of utilizing the location data stored in Area 277, CPU 211 may produce a three-dimensional map by composing the three dimensional objects (by method so-called 'texture mapping' as described above) which are stored in Area 276 (FIG. 75) of RAM 206. The two-dimensional map and/or the three dimensional map is displayed on LCD 201 (FIG. 1) (S3).

As another embodiment of the present invention, the attribution data stored in Area 295 (FIG. 75) of RAM 206 may be utilized. Namely if any road block, traffic accident, road construction, and/or traffic jam is included in the shortest route calculated by the method mentioned above, CPU 211 (FIG. 1) calculates the second shortest route to the destination. If the second shortest route still includes road block, traffic accident, road construction, and/or traffic jam, CPU 211 calculates the third shortest route to the destination. CPU 211 calculates repeatedly until the calculated route does not include any road block, traffic accident, road construction, and/or traffic jam. The shortest route to the destination is highlighted by a significant color (such as red) to enable the user of Communication Device 200 to easily recognize such route on LCD 201 (FIG. 1).

As another embodiment of the present invention, an image which is similar to the one which is observed by the user in the real world may be displayed on LCD 201 (FIG. 1) by utilizing the three-dimensional object data. In order to produce such image, CPU 211 (FIG. 1) identifies the present location and retrieves the corresponding location data from Area 277 (FIG. 75) of RAM 206. Then CPU 211 retrieves a plurality of object data which correspond to such location data from Area 276 (FIG. 75) of RAM 206 and displays a plurality of objects on LCD 201 based on such object data in a manner the user of Communication Device 200 may observe from the current location.

Figure 81:
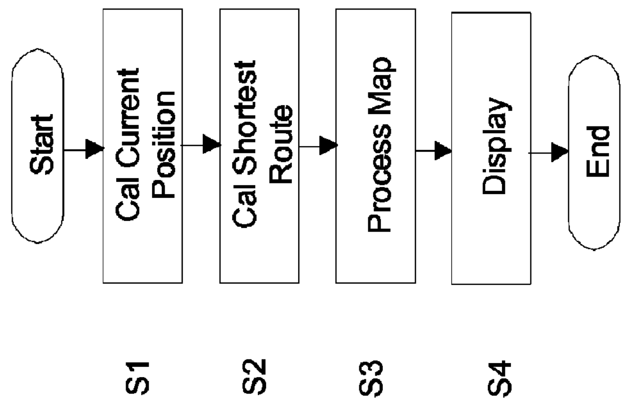
FIG. 81 is a flowchart illustrating an exemplary embodiment of the present invention.

FIG. 81 illustrates the sequence of updating the shortest route to the destination while Communication Device 200 is moving. By way of periodically and automatically inputting the current position by the method so-called 'global positioning system' or 'GPS' as described hereinbefore, the current position is continuously updated (S1). By utilizing the location data of streets and traffic lights and other relevant data, CPU 211 (FIG. 1) recalculates the shortest route to the destination (S2). CPU 211 then retrieves the relevant two-dimensional map data which should be displayed on LCD 201 from Area 275 (FIG. 75) of RAM 206 (S3). Instead, by way of utilizing the location data stored in Area 277 (FIG. 75), CPU 211 may produce a three-dimensional map by composing the three dimensional objects by method so-called 'texture mapping' which are stored in Area 276 (FIG. 75) of RAM 206. The two-dimensional map and/or the three-dimensional map is displayed on LCD 201 (FIG. 1) (S4). The shortest route to the destination is re-highlighted by a significant color (such as red) to enable the user of Communication Device 200 to easily recognize the updated route on LCD 201.

Figure 82:
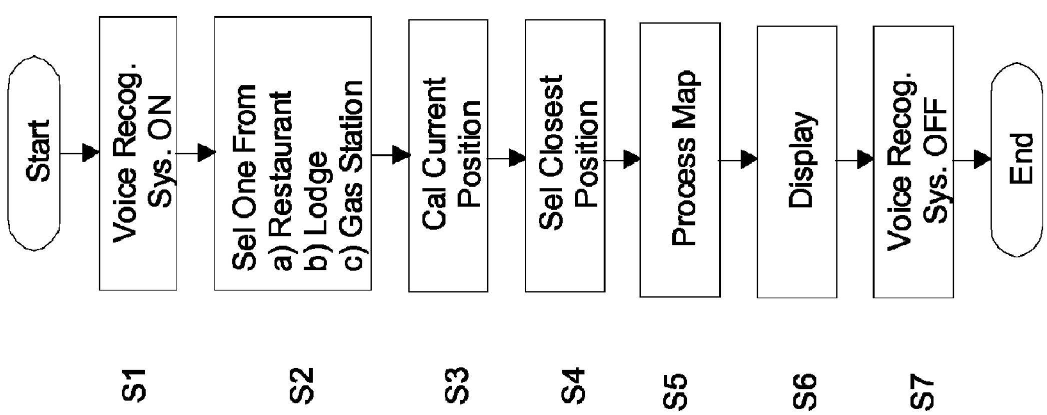
FIG. 82 is a flowchart illustrating an exemplary embodiment of the present invention.

FIG. 82 illustrates the method of finding the shortest location of the desired facility, such as restaurant, hotel, gas station, etc. The voice recognition system is activated in the manner described in FIG. 77 (S1). By way of utilizing the voice recognition system, a certain type of facility is selected from the options displayed on LCD 201 (FIG. 1). The prepared options can be a) restaurant, b) lodge, and c) gas station (S2). Once one of the options is selected, CPU 211 (FIG. 1) calculates and inputs the current position by the method described in FIG. 78 and/or FIG. 81 (S3). From the data selected in S2, CPU 211 scans Area 277 (FIG. 75) of RAM 206 and searches the location of the facilities of the selected category (such as restaurant) which is the closest to the current position (S4). CPU 211 then retrieves the relevant two-dimensional map data which should be displayed on LCD 201 from Area 275 of RAM 206 (FIG. 75) (S5). Instead, by way of utilizing the location data stored in 277 (FIG. 75), CPU 211 may produce a three-dimensional map by composing the three dimensional objects by method so-called 'texture mapping' which are stored in Area 276 (FIG. 75) of RAM 206. The two-dimensional map and/or the three dimensional map is displayed on LCD 201 (FIG. 1) (S6). The shortest route to the destination is re-highlighted by a significant color (such as red) to enable the user of Communication Device 200 to easily recognize the updated route on LCD 201. The voice recognition system is deactivated thereafter (S7).

Figure 83:
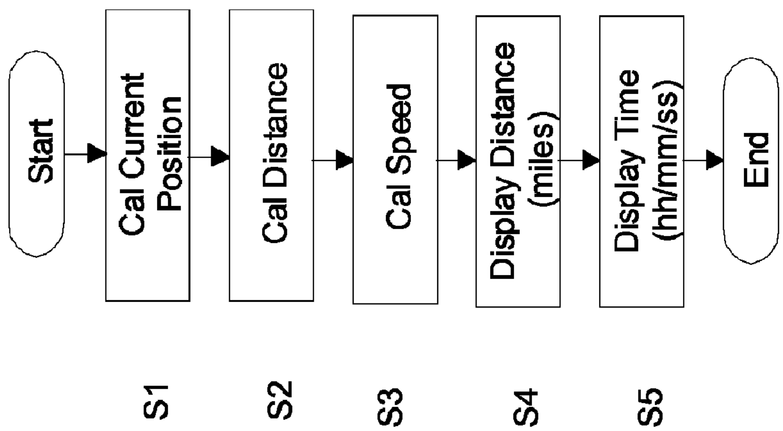
FIG. 83 is a flowchart illustrating an exemplary embodiment of the present invention.

FIG. 83 illustrates the method of displaying the time and distance to the destination. As illustrated in FIG. 83, CPU 211 (FIG. 1) calculates the current position wherein the source data can be input from the method described in FIG. 78 and/or FIG. 81 (S1). The distance is calculated from the method described in FIG. 80 (S2). The speed is calculated from the distance which Communication Device 200 has proceeded within specific period of time (S3). The distance to the destination and the time left are displayed on LCD 201 (FIG. 1) (S4 and S5).

Figure 84:
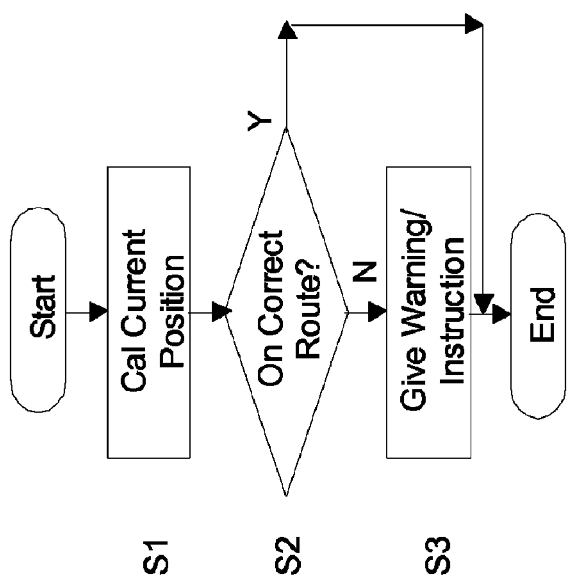
FIG. 84 is a flowchart illustrating an exemplary embodiment of the present invention.

FIG. 84 illustrates the method of warning and giving instructions when the user of Communication Device 200 deviates from the correct route. By way of periodically and automatically inputting the current position by the method so-called 'global positioning system' or 'GPS' as described hereinbefore, the current position is continuously updated (S1). If the current position deviates from the correct route (S2), a warning is given from Speaker 216 (FIG. 1) and/or on LCD 201 (FIG. 1) (S3). The method described in FIG. 84 is repeated for a certain period of time. If the deviation still exists after such period of time has passed, CPU 211 (FIG. 1) initiates the sequence described in FIG. 80 and calculates the shortest route to the destination and display it on LCD 201. The details of such sequence is as same as the one explained in FIG. 80.

Figure 85:
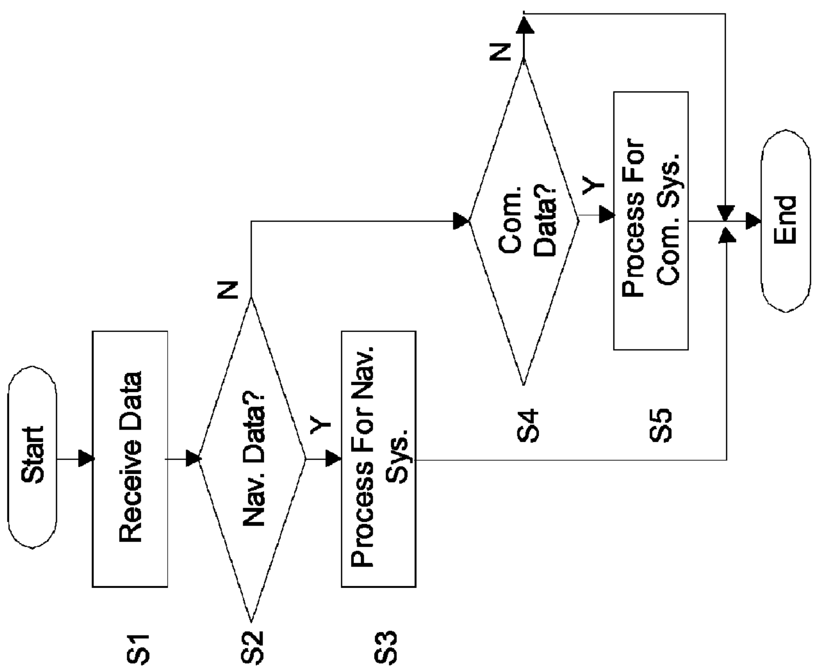
FIG. 85 is a flowchart illustrating an exemplary embodiment of the present invention.

FIG. 85 illustrates the overall operation of Communication Device 200 regarding the navigation system and the communication system. When Communication Device 200 receives data from Antenna 218 (FIG. 1) (S1), CPU 211 (FIG. 1) determines whether the data is navigation data, i.e., data necessary to operate the navigation system (S2). If the data received is a navigation data, the navigation system described in FIG. 77 through FIG. 84 is performed (S3). On the other hand, if the data received is a communication data (S4), the communication system, i.e., the system necessary for wireless communication which is mainly described in FIG. 1 is performed (S5).

<<Remote Controlling System>>

FIG. 86 through FIG. 94 illustrate the remote controlling system utilizing Communication Device 200 (FIG. 1).

Figure 86:
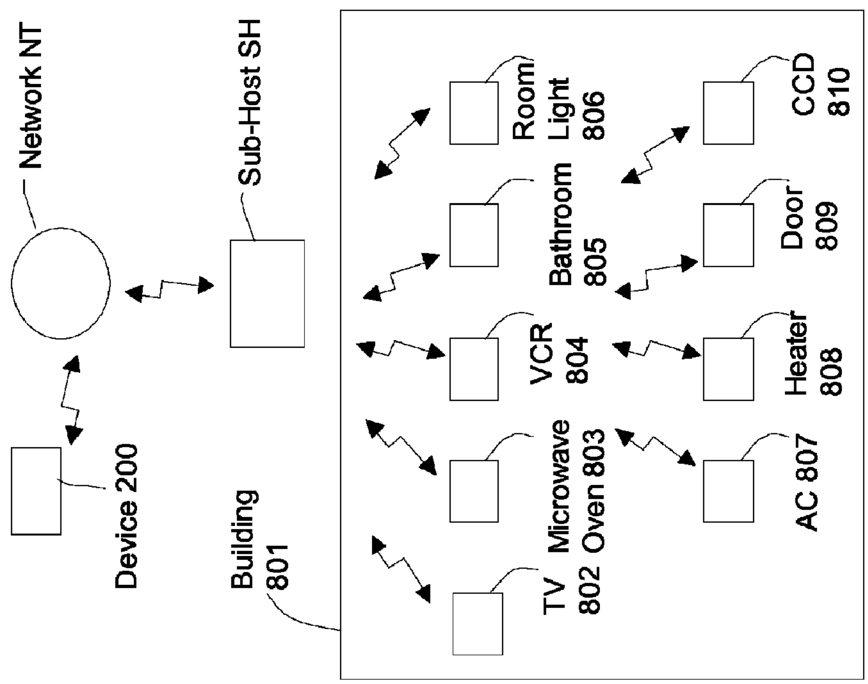
FIG. 86 is a simplified illustration illustrating an exemplary embodiment of the present invention.

As illustrated in FIG. 86, Communication Device 200 is connected to Network NT. Network NT may be the internet or have the same or similar structure described in FIG. 2, FIG. 3 and/or FIG. 4 except 'Device B' is substituted to 'Sub-host SH' in these drawings. Network NT is connected to Sub-host SH in a wireless fashion. Sub-host SH administers various kinds of equipment installed in building 801, such as TV 802, Microwave Oven 803, VCR 804, Bathroom 805, Room Light 806, AC 807, Heater 808, Door 809, and CCD camera 810. Communication Device 200 transfers a control signal to Network NT in a wireless fashion via Antenna 218 (FIG. 1), and Network NT forwards the control signal in a wireless fashion to Sub-host SH, which controls the selected equipment based on the control signal. Communication Device 200 is also capable to connect to Sub-host SH without going through Network NT and transfer directly the control signal to Sub-host SH in a wireless fashion via Antenna 218.

Figure 87:
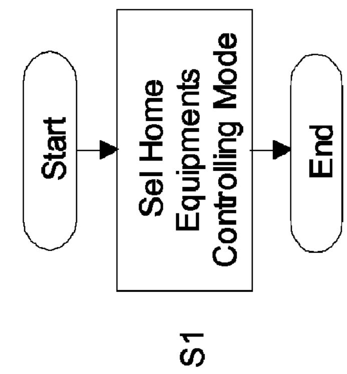
FIG. 87 is a flowchart illustrating an exemplary embodiment of the present invention.

As illustrated in FIG. 87, Communication Device 200 is enabled to perform the remote controlling system when the device is set to the home equipment controlling mode. Once Communication Device 200 is set to the home equipment controlling mode, LCD 201 (FIG. 1) displays all pieces of equipment which are remotely controllable by Communication Device 200. Each equipment can be controllable by the following method.

Figure 88:
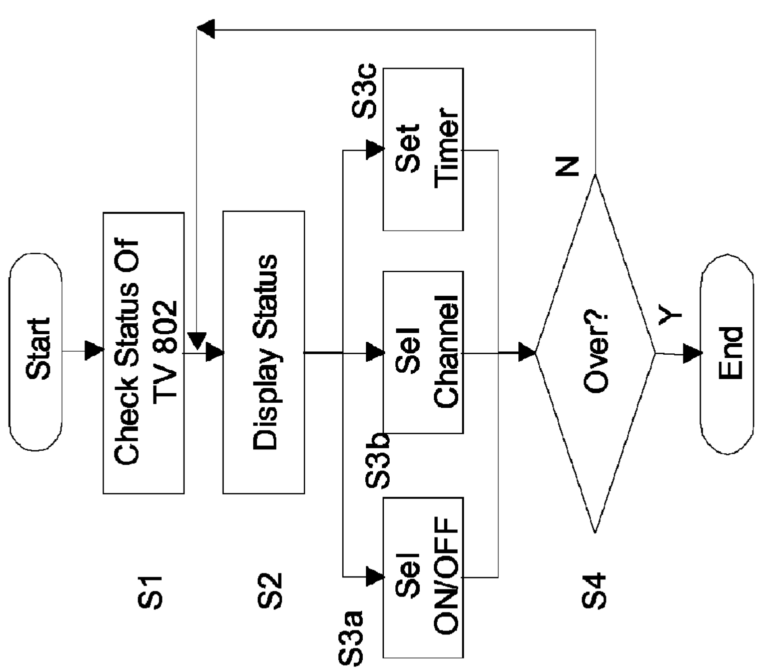
FIG. 88 is a flowchart illustrating an exemplary embodiment of the present invention.

FIG. 88 illustrates the method of remotely controlling TV 802. In order to check the status of TV 802, a specific signal is input from Input Device 210 (FIG. 1) or by the voice recognition system, and Communication Device 200 thereby sends a check request signal to Sub-host SH via Network NT. Sub-host SH, upon receiving the check request signal, checks the status of TV 802, i.e., the status of the power (ON/OFF), the channel, and the timer of TV 802 (S1), and returns the results to Communication Device 200 via Network NT, which are displayed on LCD 201 (FIG. 1) (S2). Based on the control signal produced by Communication Device 200, which is transferred via Network NT, Sub-host SH turns the power on (or off) (S3*a*), selects the channel (S3*b*), and/or sets the timer of TV 802 (S3*c*). The sequence of S2 and S3 can be repeated (S4).

Figure 89:
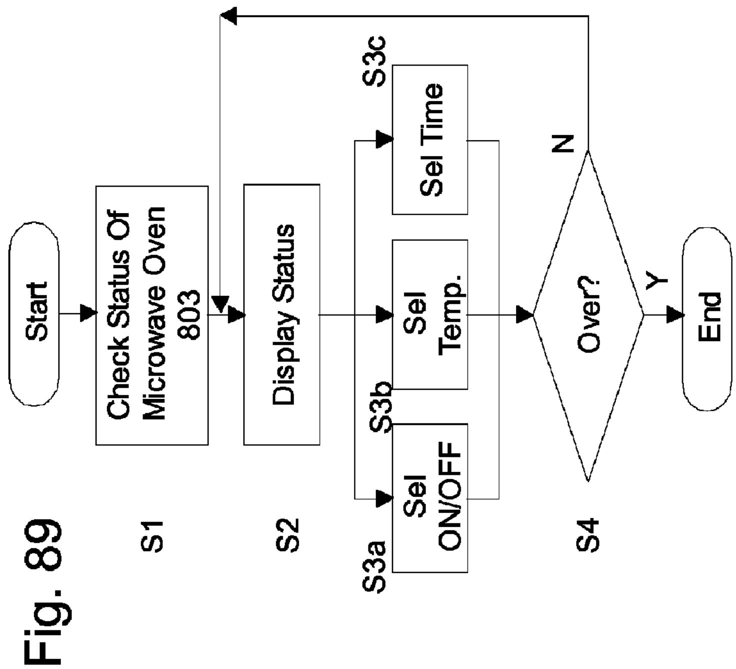
FIG. 89 is a flowchart illustrating an exemplary embodiment of the present invention.

FIG. 89 illustrates the method of remotely controlling Microwave Oven 803. In order to check the status of Microwave Oven 803, a specific signal is input from Input Device 210 (FIG. 1) or by the voice recognition system, and Communication Device 200 thereby sends a check request signal to Sub-host SH via Network NT. Sub-host SH, upon receiving the check request signal, checks the status of Microwave Oven 803, i.e., the status of the power (ON/OFF), the status of temperature, and the timer of Microwave Oven 803 (S1), and returns the results to Communication Device 200 via Network NT, which are displayed on LCD 201 (FIG. 1) (S2). Based on the control signal produced by Communication Device 200, which is transferred via Network NT, Sub-host SH turns the power on (or off) (S3*a*), selects the temperature (S3*b*), and/or sets the timer of Microwave Oven 803 (S3*c*). The sequence of S2 and S3 can be repeated (S4).

Figure 90:
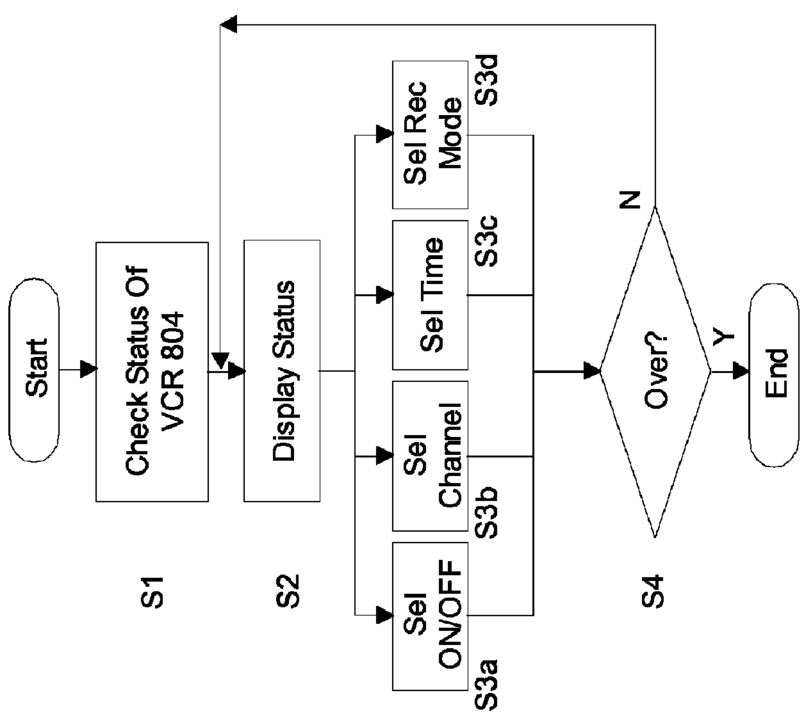
FIG. 90 is a flowchart illustrating an exemplary embodiment of the present invention.

FIG. 90 illustrates the method of remotely controlling VCR 804. In order to check the status of VCR 804, a specific signal is input from Input Device 210 (FIG. 1) or by the voice recognition system, and Communication Device 200 thereby sends a check request signal to Sub-host SH via Network NT. Sub-host SH, upon receiving the check request signal, checks the status of VCR 804, i.e., the status of the power (ON/OFF), the channel, the timer, and the status of the recording mode (e.g., one day, weekdays, or weekly) of VCR 804 (S1), and returns the results to Communication Device 200 via Network NT, which are displayed on LCD 201 (FIG. 1) (S2). Based on the control signal produced by Communication Device 200, which is transferred via Network NT, Sub-host SH turns the power on (or off) (S3*a*), selects the TV channel (S3*b*), sets the timer (S3*c*), and/or selects the recording mode of VCR 804 (S3*d*). The sequence of S2 and S3 can be repeated (S4).

Figure 91:
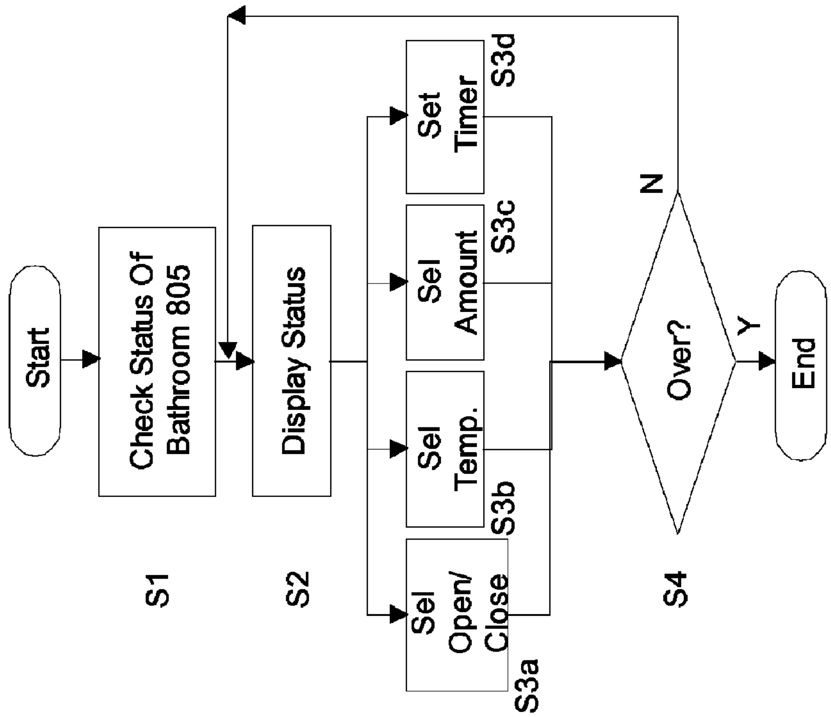
FIG. 91 is a flowchart illustrating an exemplary embodiment of the present invention.

FIG. 91 illustrates the method of remotely controlling Bathroom 805. In order to check the status of Bathroom 805, a specific signal is input from Input Device 210 (FIG. 1) or by the voice recognition system, and Communication Device 200 thereby sends a check request signal to Sub-host SH via Network NT. Sub-host SH, upon receiving the check request signal, checks the status of Bathroom 805, i.e., the status of the bath plug (or the stopper for bathtub) (OPEN/CLOSE), the temperature, the amount of hot water, and the timer of Bathroom 805 (S1), and returns the results to Communication Device 200 via Network NT, which are displayed on LCD 201 (FIG. 1) (S2). Based on the control signal produced by Communication Device 200, which is transferred via Network NT, Sub-host SH opens (or closes) the bath plug (S3*a*), selects the temperature (S3*b*), selects the amount of hot water (S3*c*), and/or sets the timer of Bathroom 805 (S3*d*). The sequence of S2 and S3 can be repeated (S4).

Figure 92:
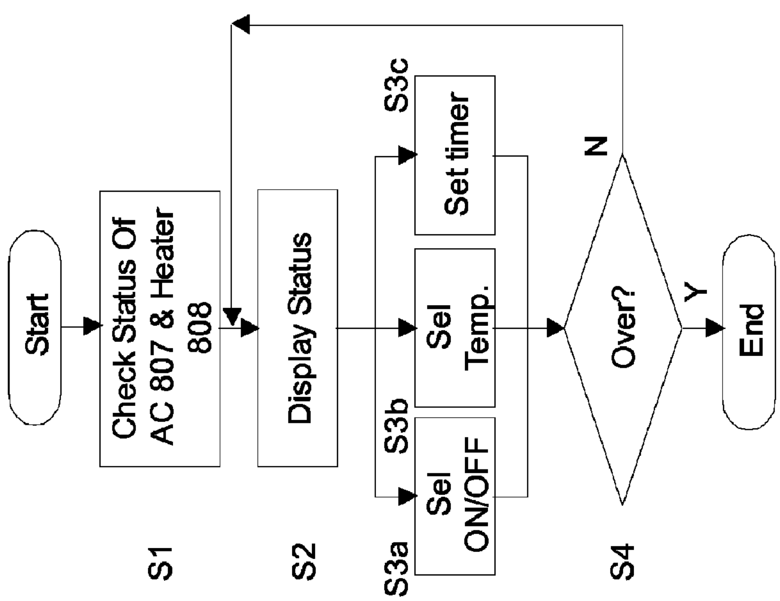
FIG. 92 is a flowchart illustrating an exemplary embodiment of the present invention.

FIG. 92 illustrates the method of remotely controlling AC 807 and Heater 808. In order to check the status of AC 807 and/or Heater 808 a specific signal is input from Input Device 210 (FIG. 1) or by the voice recognition system, and Communication Device 200 thereby sends a check request signal to Sub-host SH via Network NT. Sub-host SH, upon receiving the check request signal, checks the status of AC 807 and/or Heater 808, i.e., the status of the power (ON/OFF), the status of temperature, and the timer of AC 807 and/or Heater 808 (S1), and returns the results to Communication Device 200 via Network NT, which are displayed on LCD 201 (FIG. 1) (S2). Based on the control signal produced by Communication Device 200, which is transferred via Network NT, Sub-host SH turns the power on (or off) (S3*a*), selects the temperature (S3*b*), and/or sets the timer of AC 807 and/or Heater 808 (S3*c*). The sequence of S2 and S3 can be repeated (S4).

Figure 93:
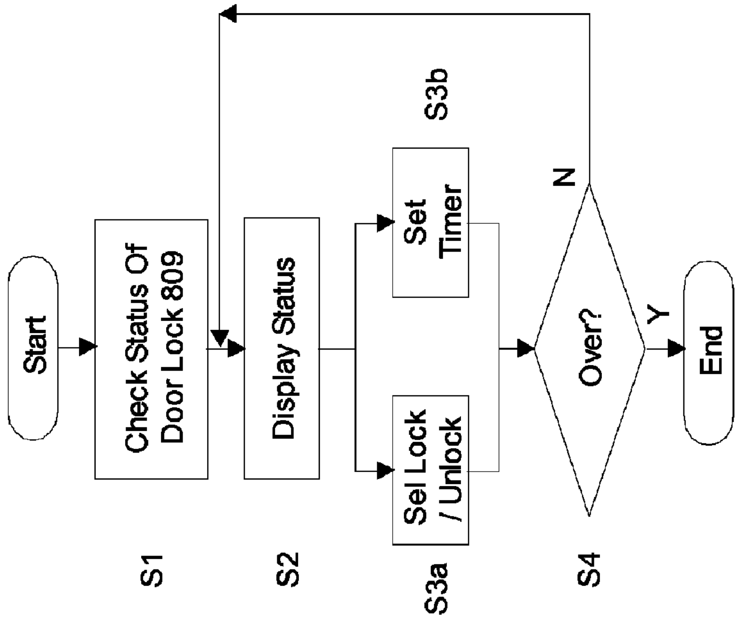
FIG. 93 is a flowchart illustrating an exemplary embodiment of the present invention.

FIG. 93 illustrates the method of remotely controlling Door 809. In order to check the status of Door 809 a specific signal is input from Input Device 210 (FIG. 1) or by the voice recognition system, and Communication Device 200 thereby sends a check request signal to Sub-host SH via Network NT. Sub-host SH, upon receiving the check request signal, checks the status of Door 809, i.e., the status of the door lock (LOCKED/UNLOCKED), and the timer of door lock (S1), and returns the results to Communication Device 200 via Network NT, which are displayed on LCD 201 (FIG. 1) (S2). Based on the control signal produced by Communication Device 200, which is transferred via Network NT, Sub-host SH locks (or unlocks) the door (S3*a*), and/or sets the timer of the door lock (S3*b*). The sequence of S2 and S3 can be repeated (S4).

Figure 94:
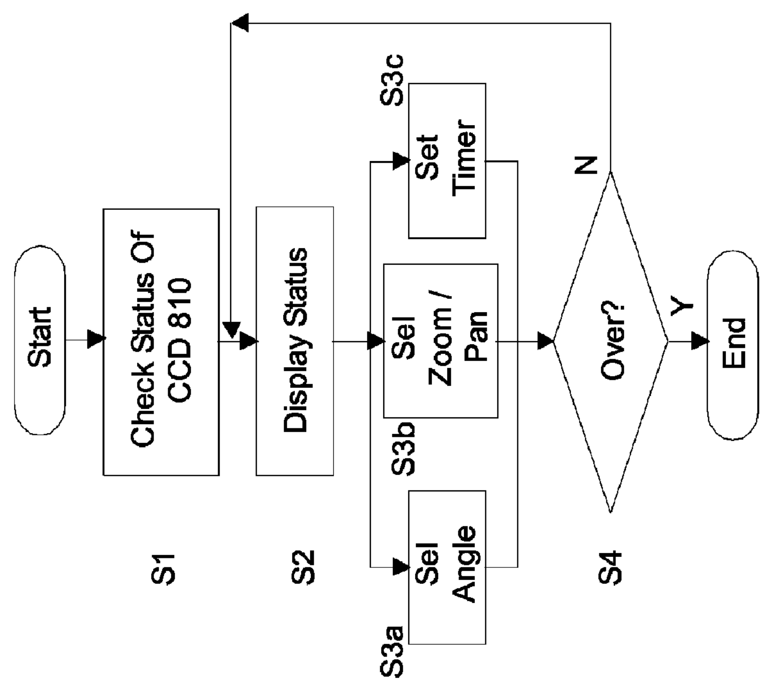
FIG. 94 is a flowchart illustrating an exemplary embodiment of the present invention.

FIG. 94 illustrates the method of CCD Camera 810. In order to check the status of CCD Camera 810 a specific signal is input from Input Device 210 (FIG. 1) or by the voice recognition system, and Communication Device 200 thereby sends a check request signal to Sub-host SH via Network NT. Sub-host SH, upon receiving the check request signal, checks the status of CCD Camera 810, i.e., the status of the camera angle, zoom and pan, and the timer of CCD Camera 810 (S1), and returns the results to Communication Device 200 via Network NT, which are displayed on LCD 201 (FIG. 1) (S2).

Based on the control signal produced by Communication Device 200, which is transferred via Network NT, Sub-host SH selects the camera angle (S3*a*), selects zoom or pan (S3*b*), and/or sets the timer of CCD Camera 810 (S3*c*). The sequence of S2 and S3 can be repeated (S4).

Figure 95:
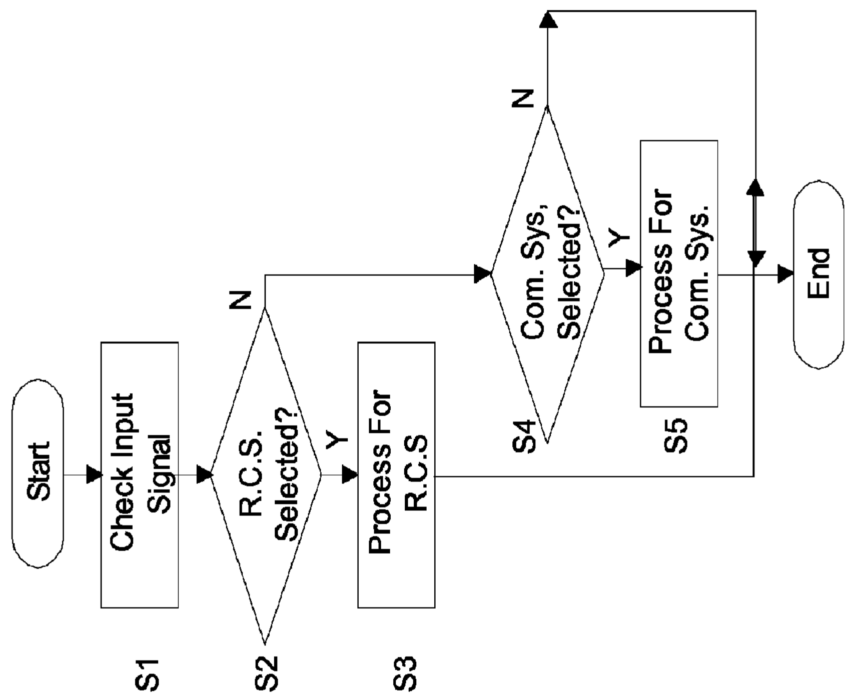
FIG. 95 is a flowchart illustrating an exemplary embodiment of the present invention.

FIG. 95 illustrates the overall operation of Communication Device 200 regarding the remote controlling system and communication system. CPU 211 (FIG. 1) periodically checks the input signal from Input Device 210 (FIG. 1) (S1). If the input signal indicates that the remote controlling system is selected (S2), CPU 211 initiates the process for the remote controlling system (S3). On the other hand, if the input signal indicates that the communication system is selected (S4), CPU 211 initiates the process for the communication system (S5).

Figure 96:
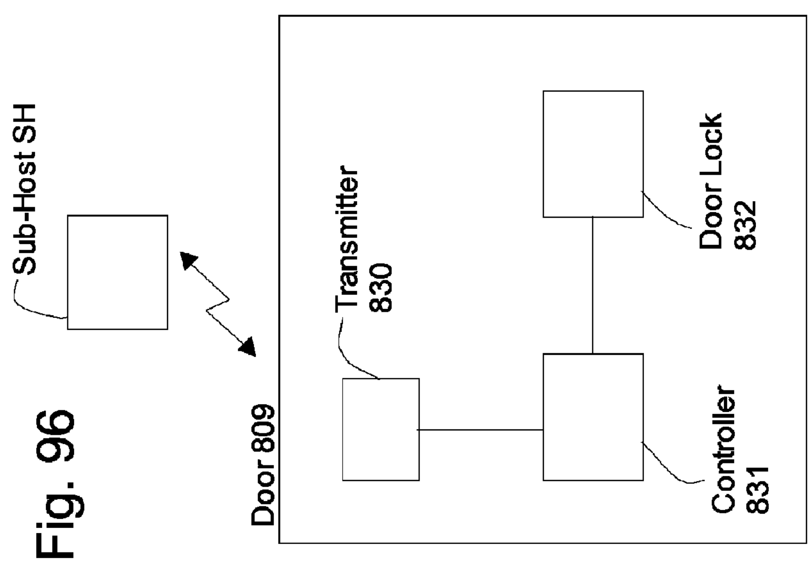
FIG. 96 is a block diagram illustrating an exemplary embodiment of the present invention.

FIG. 96 is a further description of the communication performed between Sub-host SH and Door 809 which is described in FIG. 93. When Sub-host SH receives a check request signal as described in FIG. 93, Sub-host SH sends a check status signal which is received by Controller 831 via Transmitter 830. Controller 831 checks the status of Door Lock 832 and sends back a response signal to Sub-host SH via Transmitter 830 in a wireless fashion indicating that Door Lock 832 is locked or unlocked. Upon receiving the response signal from Controller 832, Sub-host SH sends a result signal to Communication Device 200 in a wireless fashion as described in FIG. 93. When Sub-host SH receives a control signal from Communication Device 200 in a wireless fashion as described in FIG. 93, it sends a door control signal which is received by Controller 831 via Transmitter 830. Controller 831 locks or unlocks Door Lock 832 in conformity with the door control signal. As another embodiment of the present invention, Controller 831 may owe the task of both Sub-host SH and itself and communicate directly with Communication Device 200 via Network NT.

As another embodiment of the present invention each equipment, i.e., TV 802, Microwave Oven 803, VCR 804, Bathroom 805, Room Light 806, AC 807, Heater 808, Door Lock 809, and CCD Camera 810, may carry a computer which directly administers its own equipment and directly communicates with Communication Device 200 via Network NT instead of Sub-host SH administering all pieces of equipment and communicate with Communication Device 200.

The above-mentioned invention is not limited to equipment installed in building 801 (FIG. 86), i.e., it is also applicable to the ones installed in all carriers in general, such as automobiles, airplanes, space shuttles, ships, motor cycles and trains.

<<Auto Emergency Calling System>>

Figure 97:
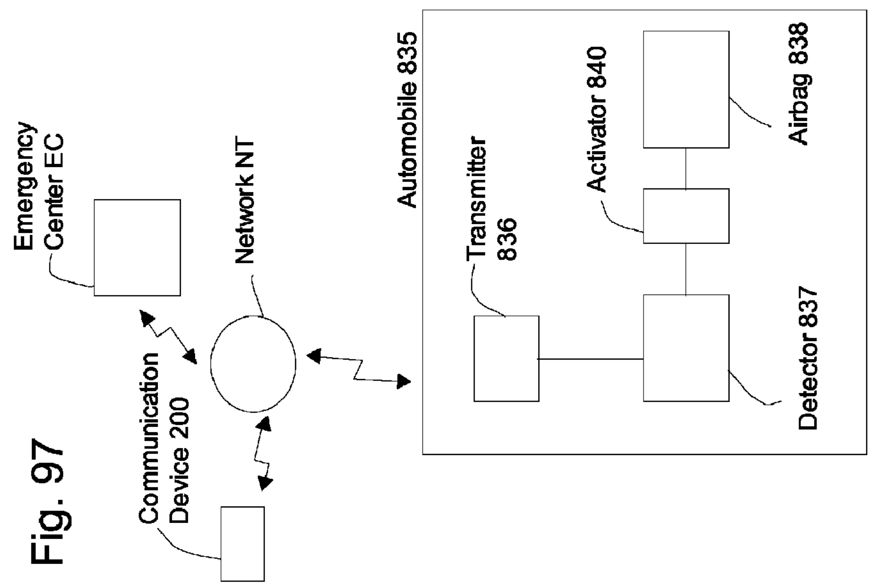
FIG. 97 is a simplified illustration illustrating an exemplary embodiment of the present invention.
Figure 98:
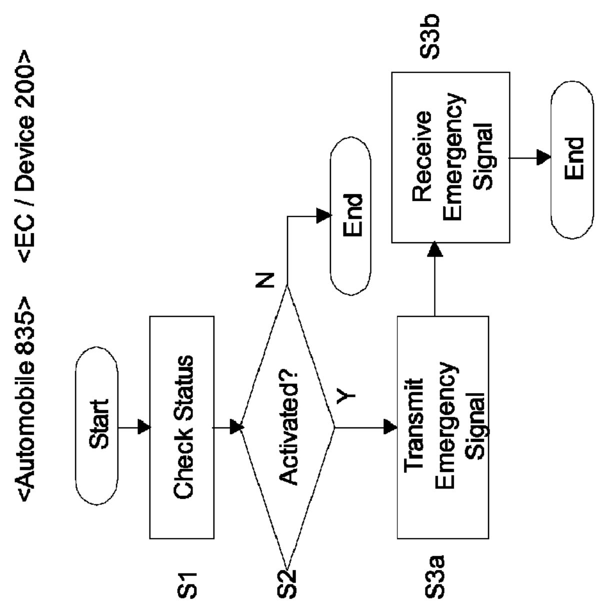
FIG. 98 is a flowchart illustrating an exemplary embodiment of the present invention.

FIG. 97 and FIG. 98 illustrate the automatic emergency calling system utilizing Communication Device 200 (FIG. 1).

FIG. 97 illustrates the overall structure of the automatic emergency calling system. Communication Device 200 is connected to Network NT in a wireless fashion. Network NT may be the Internet or have the same or similar structure described in FIG. 2, and/or FIG. 4. Network NT is connected to Automobile 835 thereby enabling Automobile 835 to communicate with Communication Device 200 in a wireless fashion. Emergency Center EC, a host computer, is also connected to Automobile 835 in a wireless fashion via Network NT. Airbag 838 which prevents persons in Automobile 835 from being physically injured or minimizes such injury in case traffic accidents occur is connected to Activator 840 which activates Airbag 838 when it detects an impact of more than certain level. Detector 837 sends an emergency signal via Transmitter 836 in a wireless fashion when Activator 840 is activated. The activation signal is sent to both Emergency Center EC and Communication Device 200. In lieu of Airbag 838 any equipment may be used so long as such equipment prevents from or minimizes physical injuries of the persons in Automobile 835.

FIG. 98 illustrates the overall process of the automatic emergency calling system. Detector 837 (FIG. 97) periodically checks the status of Activator 840 (FIG. 97) (S1). If the Activator 840 is activated (S2), Detector 837 transmits an emergency signal via Transmitter 836 in a wireless fashion (S3*a*). The emergency signal is transferred via Network NT and received by Emergency Center EC (FIG. 97) and by Communication Device 200 in a wireless fashion (S3*b*).

As another embodiment of the present invention, the power of Detector 837 (FIG. 97) may be usually turned off, and Activator 840 (FIG. 97) may turn on the power of Detector 837 by the activation of Activator 840 thereby enabling Detector 837 to send the emergency signal to both Emergency Center EC (FIG. 97) and to Communication Device 200 as described above.

This invention is also applicable to any carriers including airplanes, space shuttles, ships, motor cycles and trains.

<<Cellular TV Function>>

Figure 99:
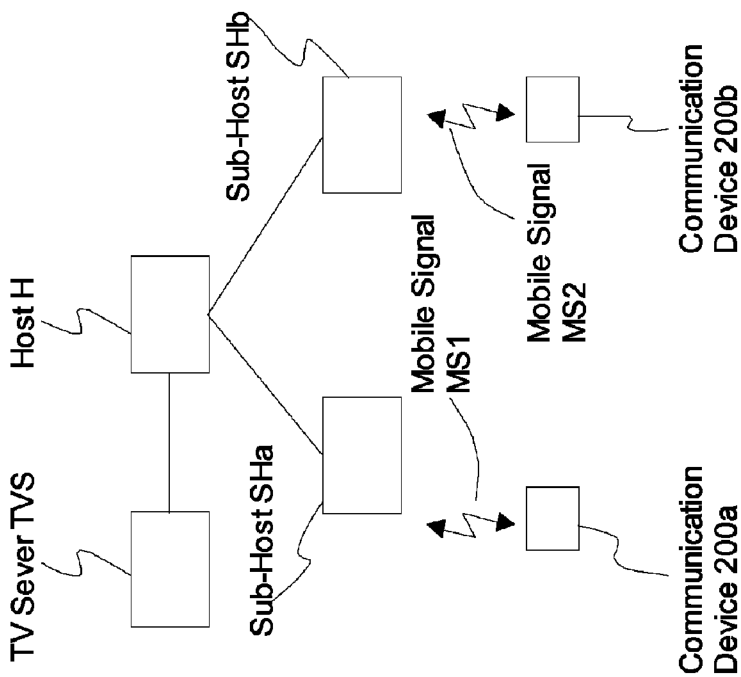
FIG. 99 is a simplified illustration illustrating an exemplary embodiment of the present invention.

FIG. 99 through FIG. 165 illustrate the cellular TV function of the Communication Device 200 (FIG. 1).

As described in FIG. 99, the cellular TV function of the Communication Device 200 (FIG. 1) is exploited by the combination of TV Server TVS, Host H, Sub-host SHa, Sub-host SHb, Communication Device 200*a*, and Communication Device 200*b*. TV Server TVS is electronically linked to Host H, which is also electronically linked to Sub-hosts SHa and SHb. Sub-hosts SHa and SHb are linked to Communication Devices 200*a* and 200*b* in a wireless fashion. TV Server TVS stores a plurality of channel data, which are explained in details in FIG. 101 hereinafter. A plurality of channel data are transferred from TV Server TVS to Host H, which distributes such data to Sub-hosts SHa and SHb. Sub-hosts SHa and SHb transfers the plurality of channel data to Communication Devices 200*a* and 200*b* respectively via Mobile Signal MS1, i.e., a plurality of wireless signal which enables Communication Devices 200*a* and 200*b* to communicate with Sub-hosts SHa and SHb respectively in a wireless fashion, thereby enables to display the channel data on LCD 201 (FIG. 1) installed on each of Communication Devices 200*a* and 200*b*.

Figure 100:
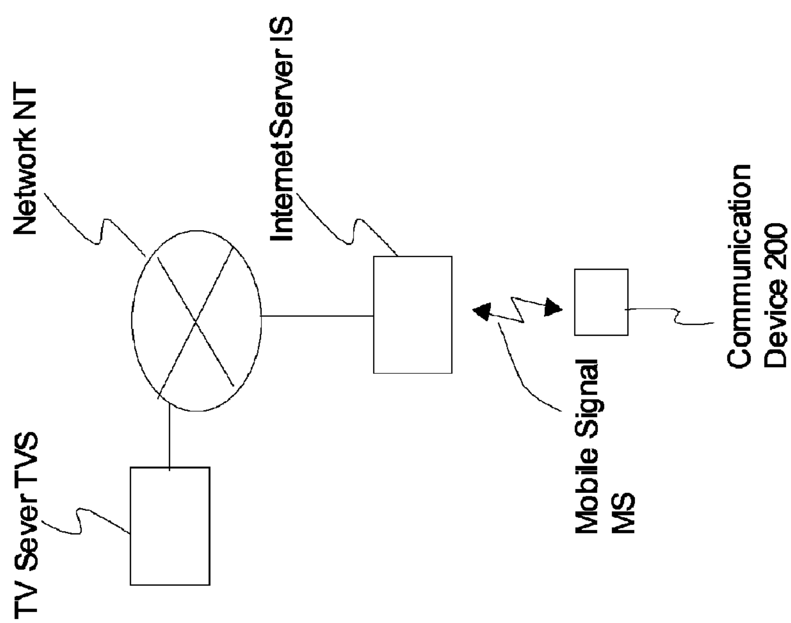
FIG. 100 is a simplified illustration illustrating an exemplary embodiment of the present invention.

FIG. 100 illustrates another embodiment of the cellular TV function of Communication Device 200 (FIG. 1), which utilizes a network. TV Server TVS is electronically linked to Internet Server IS via Network NT, such as the Internet. Internet Server IS is linked to Communication Device 200 in a wireless fashion. A plurality of channel data are distributed from TV Server TVS to Internet Server IS via network NT, which transfers such data to Communication Device 200 via Mobile Signal MS, i.e., a plurality of wireless signal which enables Communication Device 200 to communicate with Internet Server IS in a wireless fashion.

Figure 101:
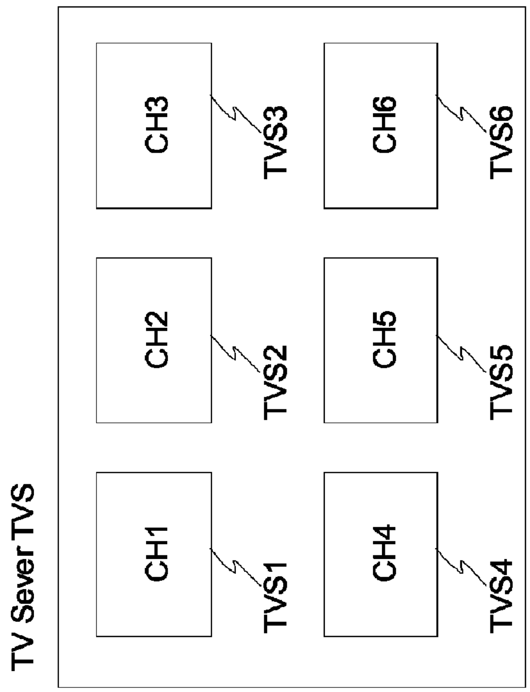
FIG. 101 is a block diagram illustrating an exemplary embodiment of the present invention.

FIG. 101 illustrates the data stored in TV Server TVS (FIG. 99 and FIG. 100). In the example shown in FIG. 101, six kinds of channel data are stored. Namely, the channel data regarding Channel 1 is stored in Area TVS1, the channel data regarding Channel 2 is stored in Area TVS2, the channel data regarding Channel 3 is stored in Area TVS3, the channel data regarding Channel 4 is stored in Area TVS4, the channel data regarding Channel 5 is stored in Area TVS5, and the channel data regarding Channel 6 is stored in Area TVS6. Here, each channel data represents a specific TV program, i.e., each channel data is primarily composed of a series of motion picture data and a series of subtitle data which are designed to be displayed on LCD 201 (FIG. 1) and a series of audio data which are designed to be output from Speaker 216 (FIG. 1).

Figure 102:
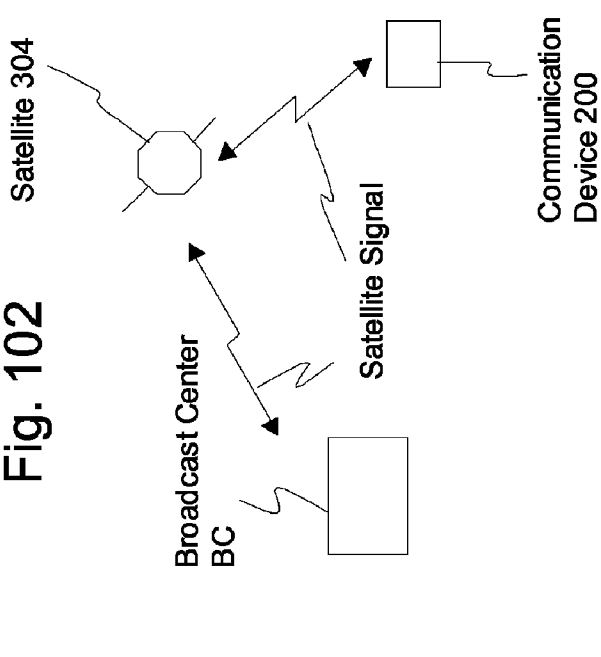
FIG. 102 is a simplified illustration illustrating an exemplary embodiment of the present invention.

Communication Device 200 (FIG. 1) has the capability to display satellite TV programs as illustrated in FIG. 102. Broadcast center BC distributes a plurality of Satellite Signal SS to Satellite 304, which transfers the same series of signals to Communication Device 200, both of which in a wireless fashion. A plurality of Satellite Signal SS include a plurality of channel data.

Figure 103:
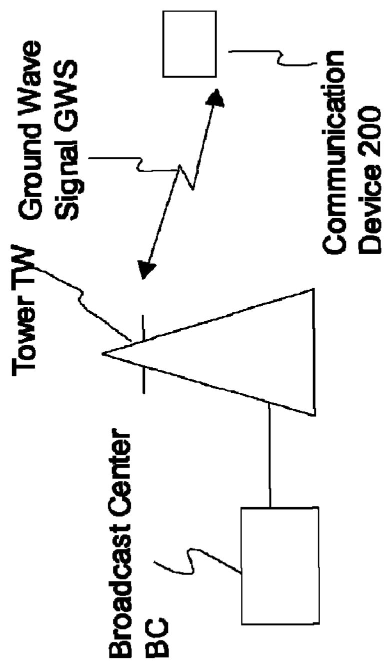
FIG. 103 is a simplified illustration illustrating an exemplary embodiment of the present invention.

Communication Device 200 (FIG. 1) also has the capability to display ground wave TV programs as illustrated in FIG. 103. Broadcast Center BC distributes a plurality of channel data to Tower TW via a fixed cable, which transfers the plurality of channel data via ground wave, i.e., Ground Wave Signal GWS to Communication Device 200.

Figure 104:
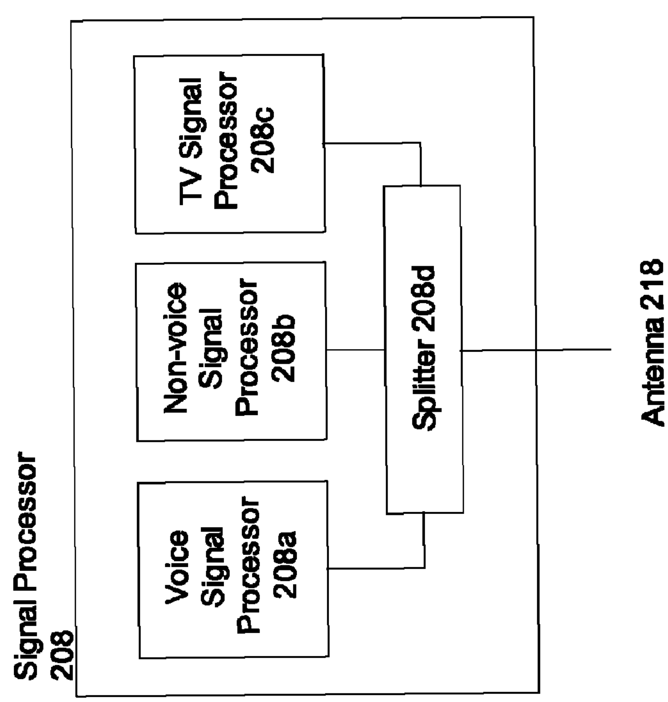
FIG. 104 is a block diagram illustrating an exemplary embodiment of the present invention.

FIG. 104 illustrates the basic structure of Signal Processor 208 (FIG. 1). Signal processor 208 is primarily composed of Voice Signal Processor 208*a*, Non-Voice Signal Processor 208*b*, TV Signal Processor 208*c*, and Splitter 208*d*. Splitter 208*d* distributes a plurality of wireless signals received from Antenna 218 (FIG. 1) to Voice Signal Processor 208*a*, Non-Voice Signal Processor 208*b*, and TV Signal Processor 208*c*. Voice Signal Processor 208*a* processes the voice signal received via Antenna 218 and decodes such signal so as to output the voice signal from Speaker 216 (FIG. 1). Non-Voice Signal Processor 208*b* processes various kinds of non-voice signals, such as, but not limiting to, channel controlling signals, GPS signals, and internet signals, so as to format and decode the received signals to be readable by CPU 211 (FIG. 1). Packet signals, i.e., a series of signals composed of packets, are also processed by Non-Voice Signal Processor 208*b*. Packet signals representing voice signals are also processed by Non-Voice Signal Processor 208*b*. TV Signal Processor 208*c* processes the plurality of wireless signals received in the manners described in FIG. 99, FIG. 100, FIG. 102, and FIG. 103 in order for the channel data included therein to be decoded and thereby be output from LCD 201 (FIG. 1) and Speaker 216 (FIG. 1).

Figure 105:
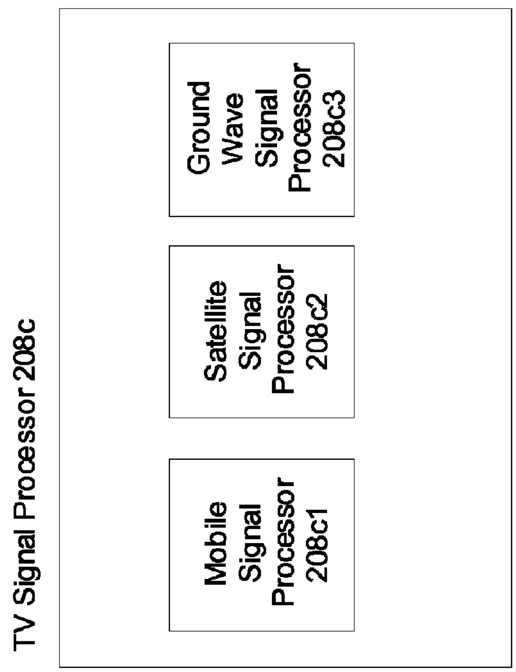
FIG. 105 is a block diagram illustrating an exemplary embodiment of the present invention.

FIG. 105 illustrates the basic structure of TV Signal Processor 208*c* described in FIG. 104. TV Signal Processor 208*c* is primarily composed of Mobile Signal Processor 208*c*1, Satellite Signal Processor 208*c*2, and Ground Wave Signal Processor 208*c*3. Mobile Signal Processor 208*c*1 processes a plurality of mobile signals received in the manners described in FIG. 99 and FIG. 100 in order for the channel data included therein to be decoded and thereby be output from LCD 201 (FIG. 1) and Speaker 216 (FIG. 1). Satellite Signal Processor 208*c*2 processes a plurality of Satellite Signal SS received in the manner described in FIG. 102 in order for the channel data included therein to be decoded and thereby be output from LCD 201 (FIG. 1) and Speaker 216 (FIG. 1). Ground Wave Signal Processor 208*c*3 processes a plurality of Ground Wave Signal GWS received in the manner described in FIG. 103 in order for the channel data included therein to be decoded and thereby be output from LCD 201 (FIG. 1) and Speaker 216 (FIG. 1).

As another embodiment of the present invention, Voice Signal Processor 208*a* (FIG. 110), Non-Voice Signal Processor 208*b* (FIG. 110), and TV Signal Processor 208*c* (FIG. 110) may be integrated and merged into one circuit and eliminate Splitter 208*d* in order to highly integrate Signal Processor 208 (FIG. 1).

Figure 106:
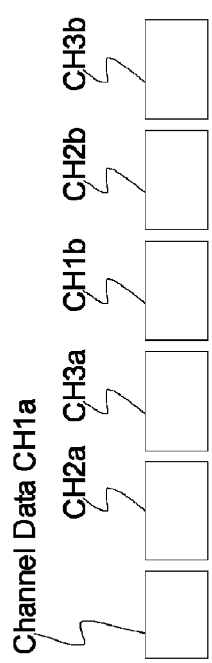
FIG. 106 is a simplified illustration illustrating an exemplary embodiment of the present invention.
Figure 107:
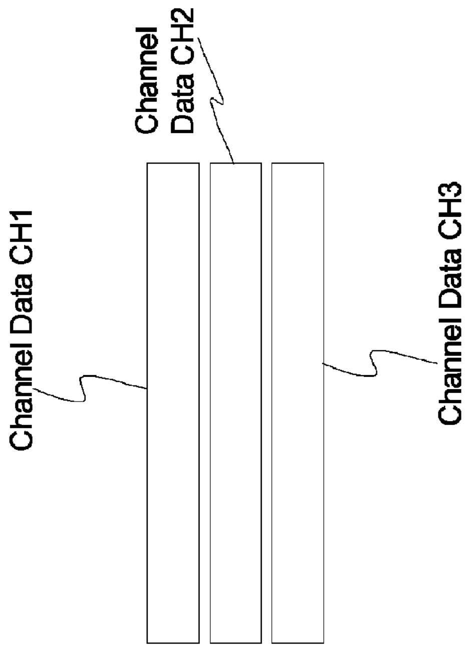
FIG. 107 is a simplified illustration illustrating an exemplary embodiment of the present invention.

FIG. 106 and FIG. 107 illustrate the format of the plurality of channel data transferred described in FIG. 99, FIG. 100, FIG. 102, and FIG. 103. As described in FIG. 106, a plurality of channel data can be distributed in a TDMA format. In the example shown in FIG. 106, Channel Data CH1 is divided into CH1*a* and CH1*b*, Channel Data CH2 is divided into CH2*a* and CH2*b*, and Channel Data CH3 is divided into CH3*a* and CH3*b*, and transferred in the order shown in FIG. 106. Instead of 'chopping' each channel data as described in FIG. 106, Channel Data CH1, CH2, and CH3 can be transferred in different frequencies (FDMA format) or scramble all of them and transfer within a certain width of frequency (CDMA or W-CDMA).

Figure 108:
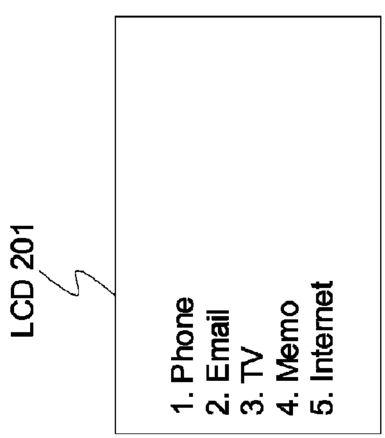
FIG. 108 is a simplified illustration illustrating an exemplary embodiment of the present invention.
Figure 109:
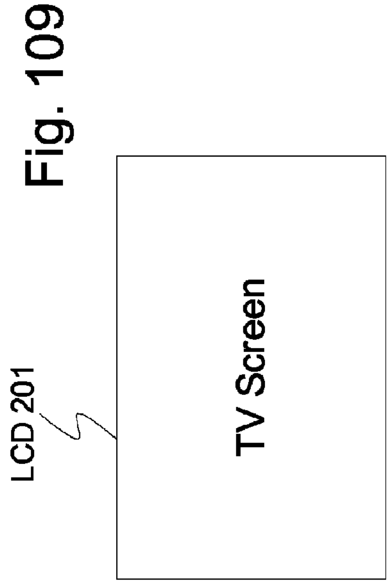
FIG. 109 is a simplified illustration illustrating an exemplary embodiment of the present invention.

FIG. 108 illustrates the menu displayed on LCD 201 (FIG. 1). In the example described in FIG. 108, the user of Communication Device 200 has an option to select one of the functions installed in Communication Device 200. Namely, the user can, by manipulation of Input Device 210 or by the voice recognition system, utilize Communication Device 200 as a cellular phone by selecting '1. Phone', as an email editor and send and/or receive emails by selecting '2. Email', as a TV monitoring device by selecting '3. TV', as a word processor by selecting '4. Memo', and as an Internet accessing device by selecting '5. Internet'. As illustrated in FIG. 109, a TV screen is displayed on LCD 201 by selecting '3. TV'.

Figure 110:
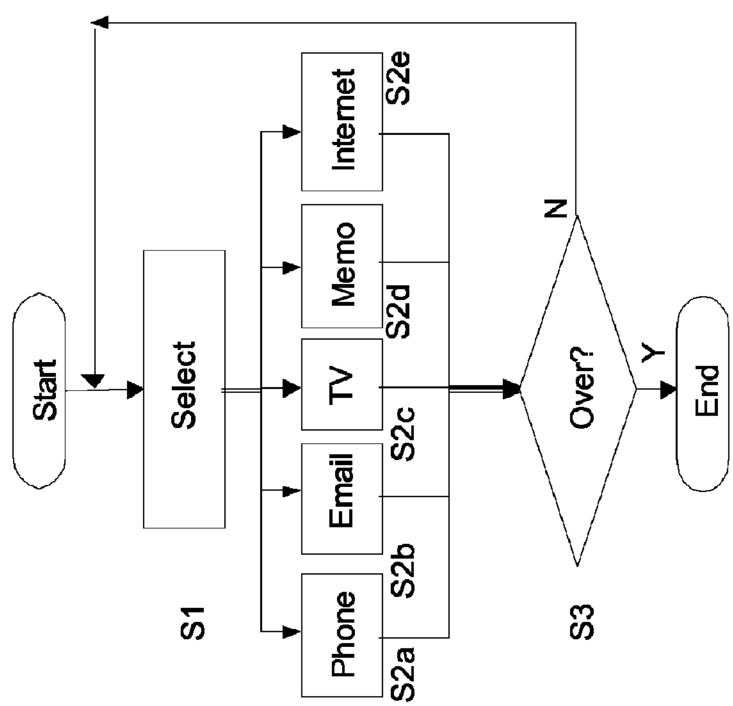
FIG. 110 is a flowchart illustrating an exemplary embodiment of the present invention.

FIG. 110 illustrates the software program which administers the overall function explained in FIG. 108. From the kind of the input signal input from Input Device 210 or by the voice recognition system, the related function assigned to such input signal is activated by CPU 211 (FIG. 1) (S1). For example, a phone function is activated when input signal '1' is input from Input Device 210 (S2*a*), an email function is activated when input signal '2' is input from Input Device 210 (S2*b*), a TV monitoring function is activated when input signal '3' is input from Input Device 210 (S2*c*), a word processing function is activated when input signal '4' is input from Input Device 210 (S2*d*), and an internet function is activated when input signal '5' is input from Input Device 210 (S2*e*). Another function can be selected from the menu described in FIG. 108 via Input Device 210 or by the voice recognition system after selecting one function, and enables to activate one function while the other function is still running (S3). For example, the user can utilize the phone function while watching TV, or access the Internet while utilizing the phone function.

Figure 111:
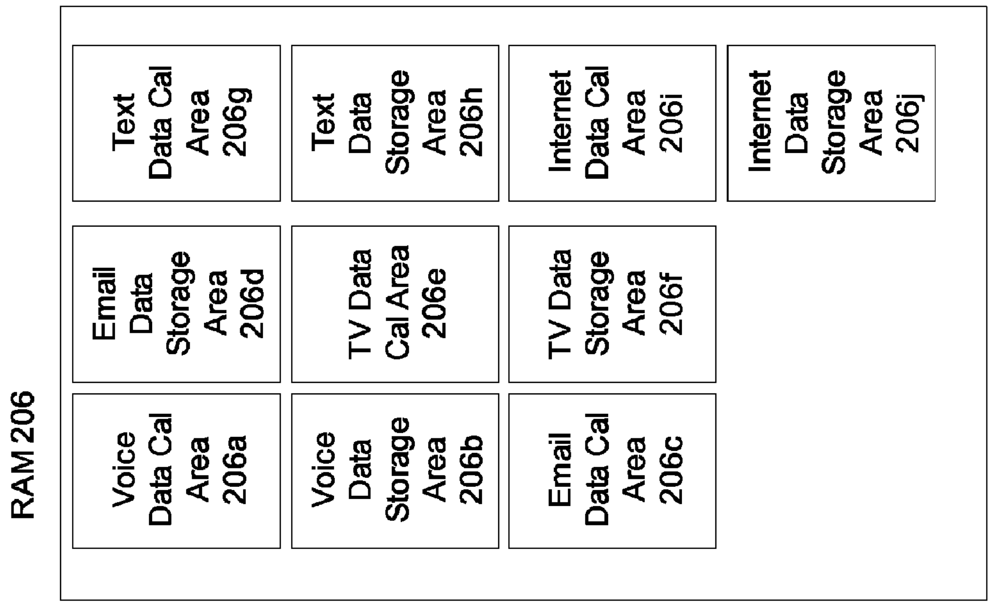
FIG. 111 is a block diagram illustrating an exemplary embodiment of the present invention.

FIG. 111 illustrates the information stored in RAM 206 (FIG. 1) in order to implement the foregoing functions. Voice Data Calculating Area 206*a*208*c*3 stores a software program to implement the phone function as described in S2*a* of FIG. 110, and Voice Data Storage Area 206*b* stores the voice data received from or sending via Voice Signal Processor 208*a* (FIG. 104). Email Data Calculating Area 206*c* stores a software program to implement the email function as described in S2*b* in FIG. 110, and Email Data Storage Area 206*d* stores the email data received from or sending via Non-Voice Signal Processor 208*b* (FIG. 104). TV Data Calculating Area 206*e* stores a software program to implement the cellular TV function as described in S2*c* of FIG. 110, and TV Data Storage Area 206*f* stores the channel data received from TV Signal Processor 208*c*. Text Data Calculating Area 206*g* stores a software program to implement the word processing function as described in S2*d* of FIG. 110, and Text Data Storage Area 206*h* stores a series of text data which are input and/or edited by utilizing Input Device 210 or via voice recognition system. Internet Data Calculating Area 206*i* stores a software program to implement the Internet function as described in S2*e* of FIG. 110, and Internet Data Storage Area 206*j* stores a series of internet data, such as, but not limited to, HTML data, XML data, image data, audio/visual data, and other various types of data received from Non-Voice Signal Processor 208*b*. Some types of voice data, such as the voice data in a form of packet received from or sending via Non-Voice Signal Processor 208*b* may be stored in Voice Data Storage Area 206*b*.

Figure 112:
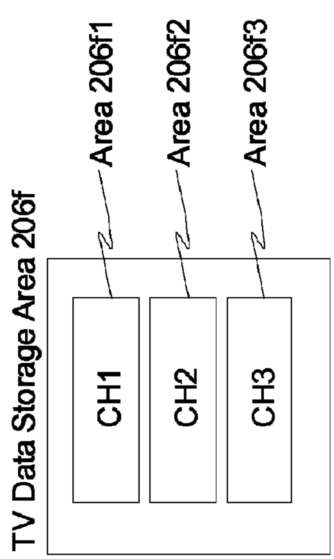
FIG. 112 is a block diagram illustrating an exemplary embodiment of the present invention.

FIG. 112 illustrates the information stored in TV Data Storage Area 206*f* described in FIG. 111. In the example shown in FIG. 112, three types of channel data are stored in TV Data Storage Area 206*f*. Namely, channel data regarding Channel 1 is stored in Area 206*f*1, channel data regarding Channel 2 is stored in Area 206*f*2, and channel data regarding Channel 3 is stored in Area 206*f*3. Here, each channel data is primarily composed of a series of motion picture data and a series of subtitle data which are designed to be displayed on LCD 201 (FIG. 1) and a series of audio data which are designed to be output from Speaker 216 (FIG. 1).

Figure 113:
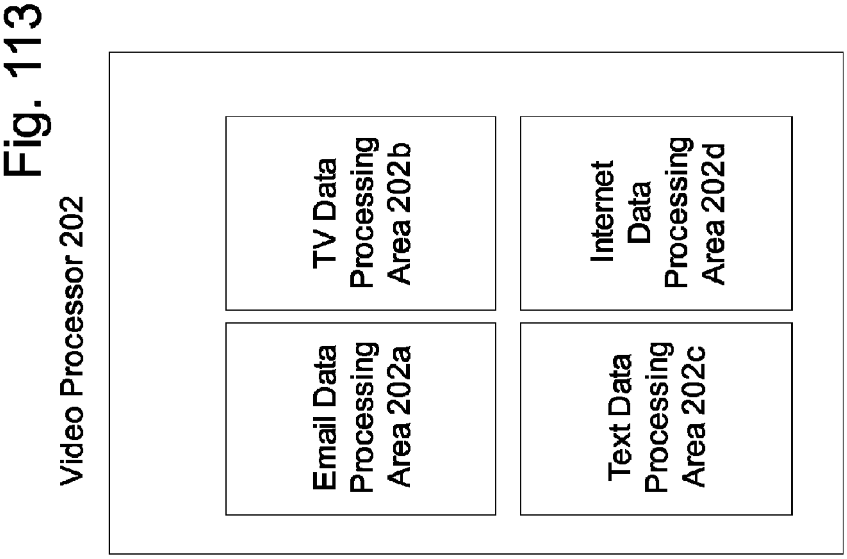
FIG. 113 is a block diagram illustrating an exemplary embodiment of the present invention.

FIG. 113 illustrates the structure of Video Processor 202 described in FIG. 1. Email Data Processing Area 202*a* processes the email data stored in Email Data Storage Area 206*d* (FIG. 111) to be displayed on LCD 201 (FIG. 1). TV Data Processing Area 202*b* processes the channel data stored in TV Data Storage Area 206*f* (FIG. 111) to be displayed on LCD 201 (FIG. 1). Text Data Processing Area 202*c* processes the text data stored in Text Data Storage Area 206*h* (FIG. 111) to be displayed on LCD 201 (FIG. 1). Internet Data Processing Area 202*d* processes the internet data stored in Internet Data Storage Area 206*j* (FIG. 111) to be displayed on LCD 201 (FIG. 1). As another embodiment of the present invention, Email Data Processing Area 202*a*, TV Data Processing Area 202*b*, Text Data Processing Area 202*c*, and Internet Data Processing Area 202*d* may be merged into one circuit and delegate its function to CPU 211 (FIG. 1) in order to highly integrate Video Processor 202.

<<Positioning System—GPS Search Engine>>

FIG. 114 through FIG. 125 illustrate the GPS search engine function, i.e., the method to search a location by a specific criteria and display such location on a map and a direction thereto on LCD 201 (FIG. 1).

Figure 114:
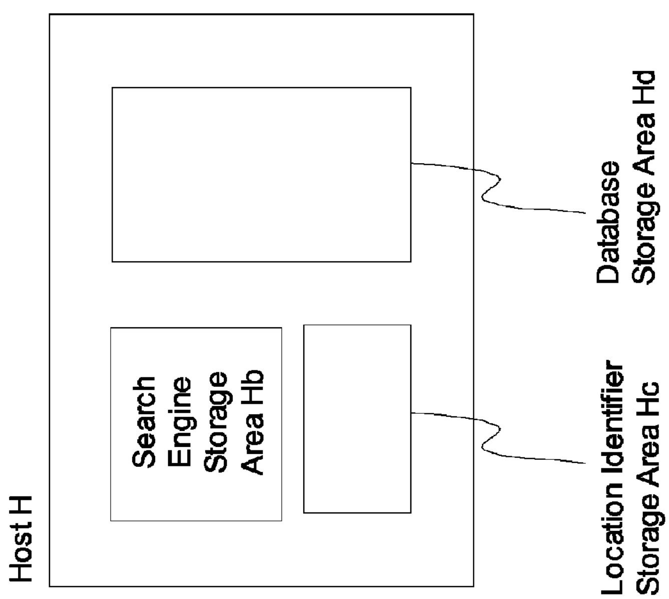
FIG. 114 is a block diagram illustrating an exemplary embodiment of the present invention.

FIG. 114 illustrates the data stored in Host H. As described in FIG. 114, Host H includes Search Engine Storage Area Hb, Location Identifier Storage Area Hc, and Database Storage Area Hd. Here, the software program stored in Search Engine Storage Area Hb is a searching software program to search Database Storage Area Hd with a specific criteria, a data base stored in Database Storage Area Hd is a database which stores a plurality of data and information as described in FIG. 119, and the software program stored in Location Identifier Storage Area Hc is a software program to identify the geographical location of the specific sites, Communication Device 200 and other objects.

Figure 115:
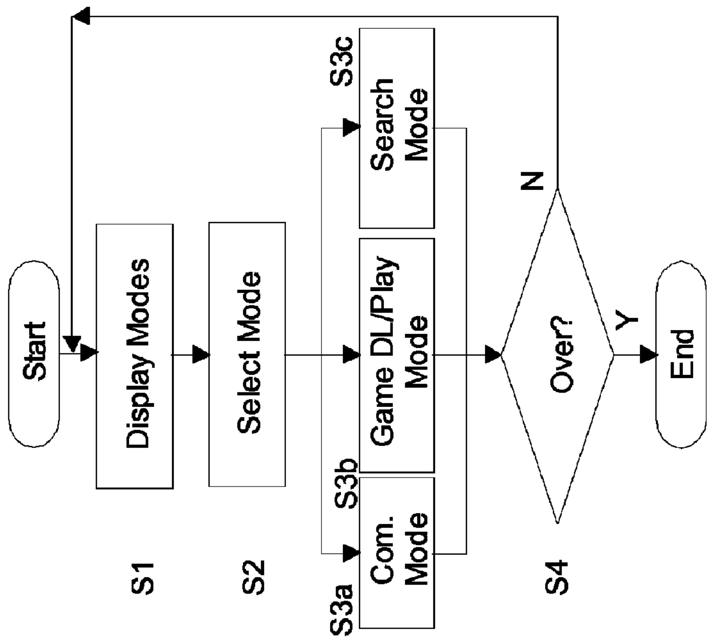
FIG. 115 is a flowchart illustrating an exemplary embodiment of the present invention.

FIG. 115 illustrates the sequence to initiate the present function. First of all, a list of modes is displayed on LCD 201 (FIG. 1) (S1). When an input signal is input by utilizing Input Device 210 (FIG. 1) or via voice recognition system to select a specific mode (S2), the selected mode is activated. In the present example, the communication mode is activated (S3*a*) when the communication mode is selected in the previous step, the game download mode and the game play mode are activated (S3*b*) when the game download mode and the game play mode are selected in the previous step, and the search mode is activated (S3*c*) when the search mode is selected in the previous step. The modes displayed on LCD 201 in S1 which are selectable in S2 and S3 may include all functions and modes explained in this specification. Once the selected mode is activated, another mode can be activated while the first activated mode is still implemented by going through the steps of S1 through S3 for another mode, thereby enabling a plurality of functions and modes being performed simultaneously (S4).

Figure 116:
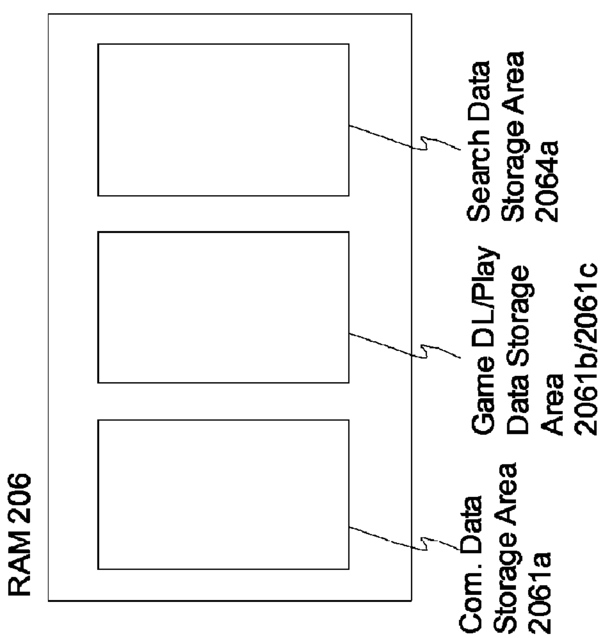
FIG. 116 is a block diagram illustrating an exemplary embodiment of the present invention.

FIG. 116 illustrates the data stored in RAM 206 (FIG. 1). As described in FIG. 116, the data to activate (as described in S3*a* of the previous figure) and to perform the communication mode is stored in Communication Data Storage Area 2061*a*, the data to activate (as described in S3*b* of the previous figure) and to perform the game download mode and the game play mode are stored in Game DL/Play Data Storage Area 2061*b*/2061*c*, and the data to activate (as described in S3*c* of the previous figure) and to perform the search mode is stored in Search Data Storage Area 2064*a*.

Figure 117:
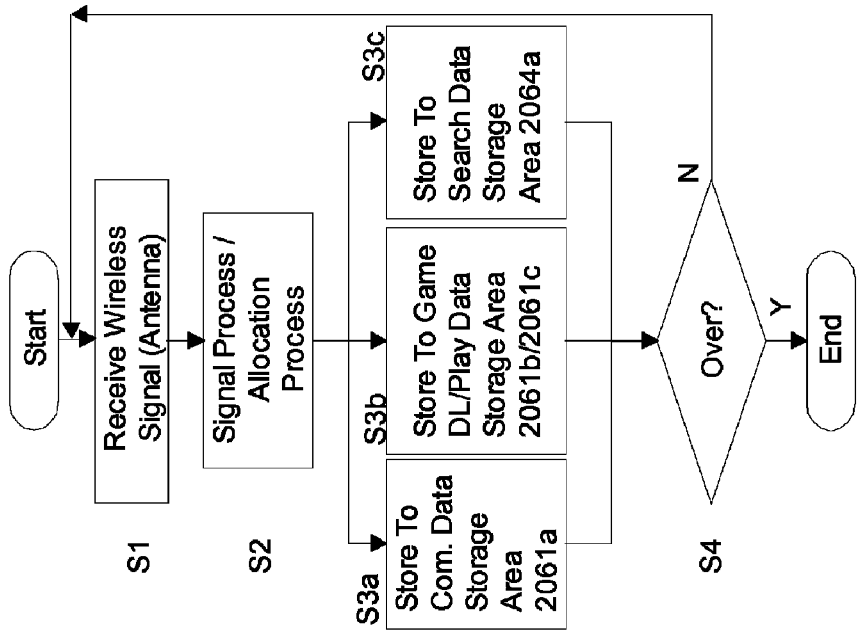
FIG. 117 is a flowchart illustrating an exemplary embodiment of the present invention.

FIG. 117 illustrates the method to store the wireless data to the relevant storage area in RAM 206 (FIG. 1). A wireless signal is received via Antenna 218 (FIG. 1) (S1). The received wireless signal is decompressed and converted into a CPU readable format by Signal Processor 208 (FIG. 1), and CPU 211 (FIG. 1) reads the header or the title of the data to identify its data-type in order to determine the location at which the data is stored (S2). According to the identified data-type, communication data is stored in Communication Storage Area 2061*a* (S3*a*), game DL data and game play data area stored in Game DL/Play Data Storage Area 2061*b*/2061*c* (S3*b*), and search data is stored in Search Data Storage Area 2064*a* (S3*c*). The sequence of S1 through S3 is repeated endlessly in order to enable to receive and store multiple types of data simultaneously. For example, the first portion of search data is processed as described in S3*c* while the first portion of communication data is processed as described in S3*a*, and the second portion of search data is processed as described in S3*c* while the first portion of game DL data is processed as described in S3*b*. The wireless signal received via Antenna 218 may be in TDMA format, FDMA format, and/or CDMA format.

Figure 118:
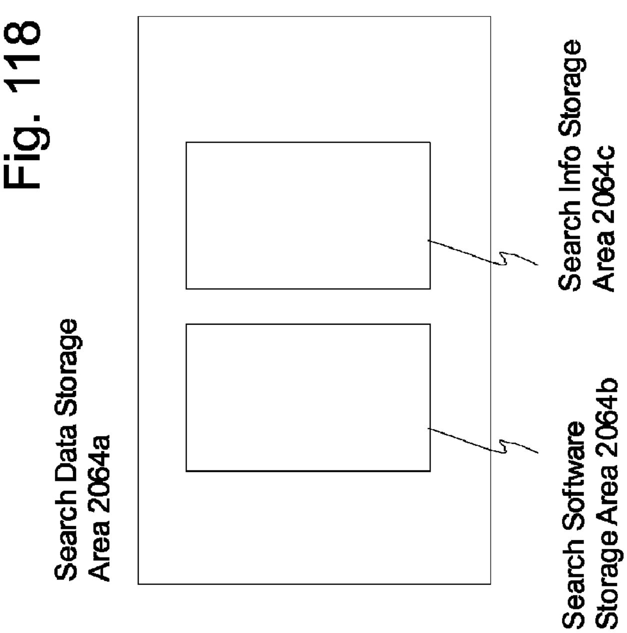
FIG. 118 is a block diagram illustrating an exemplary embodiment of the present invention.

FIG. 118 illustrates the data stored in Search Data Storage Area 2064*a* (FIG. 116). Search Data Storage Area 2064*a* includes Search Software Storage Area 2064*b* and Search Information Storage Area 2064*c*. Search Software Storage Area 2064*b* stores a software program to operate Communication Device 200 in order to implement the search described herein the details of which is explained in FIG. 122 through FIG. 125. Search Information Storage Area 2064*c* stores the data received by the process explained in S3*c* of FIG. 117 such as, search results, communication log with Host H (FIG. 114), and all necessary information to perform the software program stored in Search Software Storage Area 2064*b*.

FIG. 119 illustrates the data stored in Database Storage Area Hd (FIG. 114). Database Storage Area Hd is primarily composed of five categories, i.e., type, keyword, telephone number, geographical location, and attribution information. In the present example explained in FIG. 119, the category 'Type' represents the type of the site and Stores St1 and St2, Restaurants Rt1 and Rt2, Theaters Th1 and Th2, Lodges Lg1 and Lg2, Railway Stations Rst1, Rst2, Rst3, and Rst4, and Gas Stations Gst1 and Gst2 are registered under the category 'Type'. One or more of keywords which represent the character of the site is allocated to each site under the category 'Keyword'. The corresponding telephone number of each site is stored under the category 'Tel'. The location of each site is stored in (x, y, z) format under the category 'Loc'. The attribution information of each site is stored under the category 'Att. Info'. Here, the attribution information of Stores St1 and St2 are the names of the goods sold and the prices thereof, the date of bargain, and the business hours. The attribution information of Restaurants Rt1 and Rt2 are the price of meal provided, and the business hours. The attribution information of theater Th1 and Th2 are the title of movie shown, the business hours, and the price of tickets sold. The attribution information of Lodges Lg1 and Lg2 are the lodging fee, the types of rooms and beds provided, and the cancellation policy. The attribution information of Railway Stations Rst1, Rst2, Rst3, and Rst4 are the time schedule of each train, and ticket price for each destination. The attribution information of Gas Stations Gst1 and Gst2 are the gas price per gallon and the retail hours. The example illustrated in FIG. 119 is a simplified model of this function in order to avoid complexity in its explanation, therefore, the preferable amount of sites registered in Database Storage Area Hd is more than few thousand to retrieve a satisfying result to the user of Communication Device 200. Database Hd also includes 3D Map Storage Area Hd1 to store a plurality of three-dimensional map data of all geographic locations which is designed to be displayed on LCD 201 (FIG. 1) of Communication Device 200. As another embodiment, the data stored in Database Storage Area Hd can be stored in Search Information Storage Area 2064*c* (FIG. 118) of Communication Device 200 instead.

FIG. 120 illustrates the method of activating and deactivating the search mode by utilizing the voice recognition system explained hereinbefore. The voice recognition system is turned on, in the first place (S1), and the search mode is activated by utilizing the voice recognition system (S2). When utilizing search mode is over, it is deactivated by utilizing the voice recognition system, and the system is turned off thereafter (S3).

Figure 121:
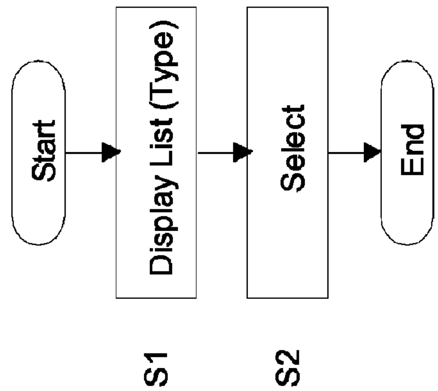

FIG. 121 illustrates the software program stored in Search Software Storage Area 2064*b* (FIG. 118) of Communication Device 200. As described in FIG. 121, a list of five categories, i.e., type, keyword, telephone number, geographical location, and attribution information is displayed on LCD 201 (FIG. 1) (S1). The user of Communication Device 200 selects one of the categories for searching purposes by utilizing the voice recognition system (S2).

Figure 122:
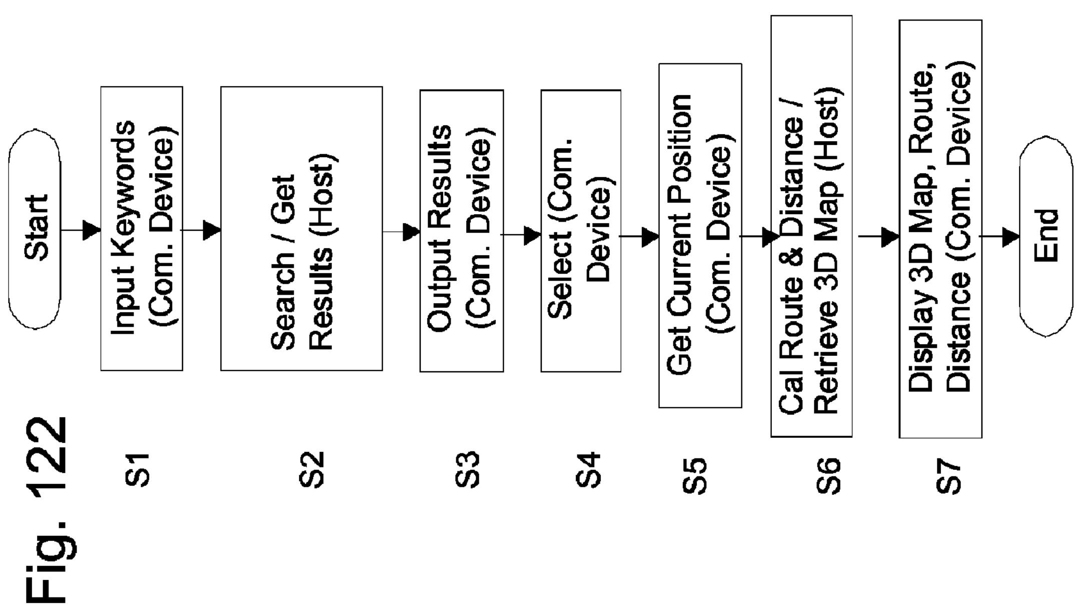

FIG. 122 illustrates the software program stored in Search Software Storage Area 2064*b* (FIG. 118) of Communication Device 200 and the software program stored in Location Identifier Storage Area Hc (FIG. 114) and Search Engine Storage Area Hb (FIG. 114) of Host H (FIG. 114) when, as an example, 'keyword' is selected from the categories displayed on LCD 201 (FIG. 1) as described in FIG. 121. Once the voice recognition system is activated by the process described in FIG. 120, a prompt screen (not shown) is displayed on LCD 201 and keyword is input via Microphone 215 (FIG. 1) (S1). The keyword data is sent to Host H via Antenna 218 (FIG. 1) in a wireless fashion, and the software program stored in Search Engine Storage Area Hb scans the 'Keyword' category and collects the result, i.e., a bundle of proposed sites (S2). The collected result is sent from Host H to Communication Device 200 in a wireless fashion and is displayed on LCD 201 (S3). The user of Communication Device 200, by utilizing the voice recognition system, selects one of the proposed sites as his/her destination (S4). CPU 211 (FIG. 1), under the instruction written in Search Software Storage Area 2064*b*, calculates the current position of Communication Device 200 (S5). The data retrieved in S4 and S5 are sent to Host H in a wireless fashion and the software program stored in Location Identifier Storage Area Hc calculates the distance and the shortest route from the current position of Communication Device 200 to the selected site (i.e., destination) and retrieves a relevant 3D map from 3D Map Storage Area Hd1 (FIG. 119) (S6). Communication Device 200 receives these data from Host H, and LCD 201 displays the current position and the selected site (i.e., destination) and the shortest route thereto on a 3D map, and the distance from the current position to the selected item (i.e., destination) in digits (S7).

Figure 123:
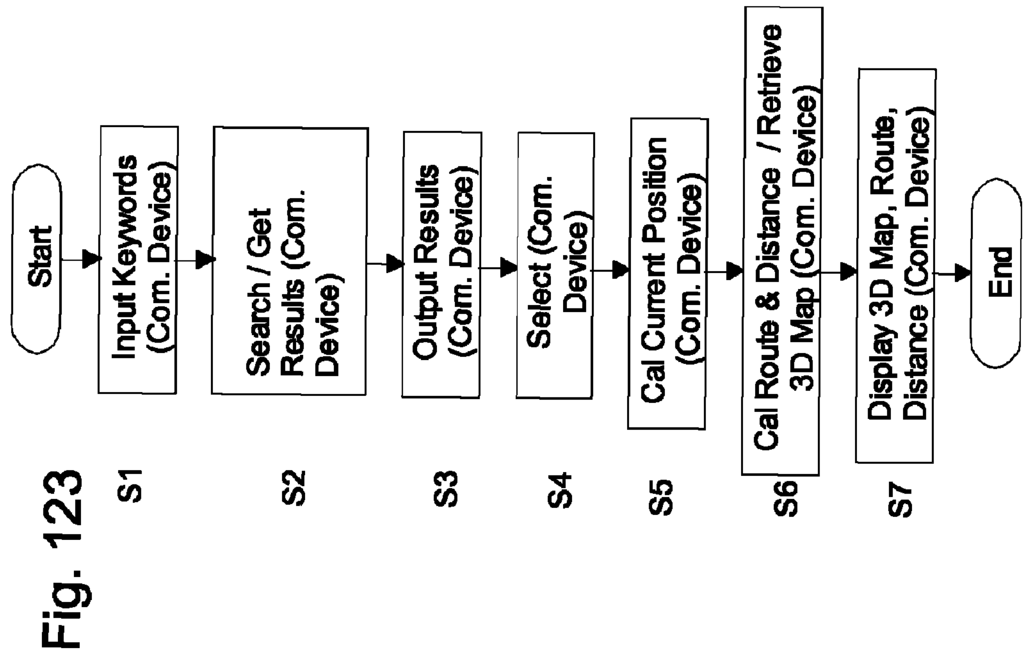

FIG. 123 illustrates an embodiment of the software program stored in Search Software Storage Area 2064*b* (FIG. 118) of Communication Device 200 without relying to Host H (FIG. 114). In this embodiment, the data stored in Database Hd (FIG. 119) of Host H is also stored in Search Information Storage Area 2064*c* (FIG. 118) of Communication Device 200. Once the voice recognition system is activated by the process described in FIG. 120, a prompt screen (not shown) is displayed on LCD 201 (FIG. 1) and keyword is input via Microphone 215 (FIG. 1) (S1). The software program stored in Search Software Storage Area 2064*b* (FIG. 118) scans the 'Keyword' category of the database stored in Search Information Storage Area 2064*c* and collects the result, i.e., a bundle of proposed sites (S2). The collected result is displayed on LCD 201 (S3). The user of Communication Device 200, by utilizing the voice recognition system, selects one of the proposed sites as his/her destination (S4). CPU 211 (FIG. 1), under the instruction written in Search Software Storage Area 2064*b*, calculates the current position of Communication Device 200 (S5). The software program stored in Search Software Storage Area 2064*b* calculates the distance and the shortest route from the current position of Communication Device 200 to the selected site (i.e., destination) and retrieves a relevant 3D map from Search Information Storage Area 2064*c* (S6). LCD 201 displays the current position and the selected site (i.e., destination) and the shortest route thereto on a 3D map, and the distance from the current position to the selected item (i.e., destination) in digits (S7).

Figure 124:
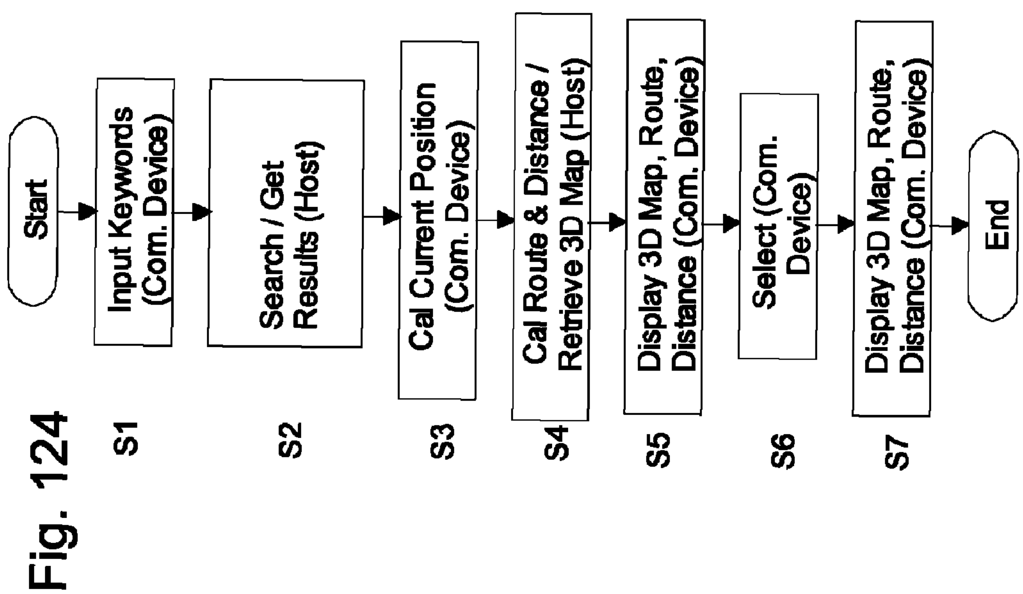

FIG. 124 illustrates another embodiment similar to the one explained in FIG. 122 which utilizes the software program stored in Search Software Storage Area 2064*b* (FIG. 118) of Communication Device 200 and the software program stored in Location Identifier Storage Area Hc (FIG. 114) and Search Engine Storage Area Hb (FIG. 114) of Host H (FIG. 114). Once the voice recognition system is activated by the process described in FIG. 120, a prompt screen (not shown) is displayed on LCD 201 (FIG. 1) and keyword is input via Microphone 215 (FIG. 1) (S1). The keyword data is sent to Host H via Antenna 218 (FIG. 1) in a wireless fashion, and the software program stored in Search Engine Storage Area Hb scans the 'Keyword' category and collects the result, i.e., a bundle of proposed sites (S2). CPU 211 (FIG. 1), under the instruction written in Search Software Storage Area 2064*b*, calculates the current position of Communication Device 200 (S3). The data retrieved in S2 and S3 are sent to Host H in a wireless fashion and the software program stored in Location Identifier Storage Area Hc calculates the distance and the shortest route from the current position of Communication Device 200 to the proposed sites and retrieves a relevant 3D map from 3D Map Storage Area Hd1 (FIG. 119) (S4). Communication Device 200 receives these data from Host H, and LCD 201 displays the current position and the positions of the proposed sites and the shortest route thereto on a 3D map, and the distance from the current position to the selected items (i.e., destinations) in digits (S5). The user of Communication Device 200, by utilizing the voice recognition system, selects one of the proposed sites as the destination (S6). LCD 201 displays the current position and the selected site (i.e., destination) and the shortest route thereto on a 3D map, and the distance from the current position to the final destination (i.e., destinations) in digits (S7).

Figure 125:
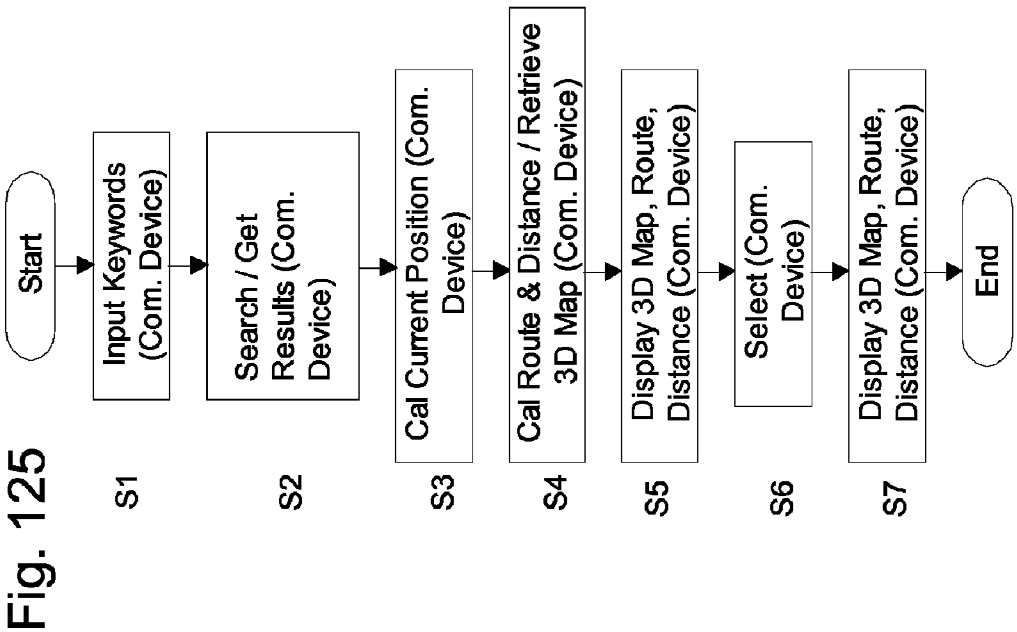

FIG. 125 illustrates another embodiment of the software program stored in Search Software Storage Area 2064*b* (FIG. 118) of Communication Device 200 without relying to Host H (FIG. 114). Once the voice recognition system is activated by the process described in FIG. 120, a prompt screen (not shown) is displayed on LCD 201 (FIG. 1) and keyword is input via Microphone 215 (FIG. 1) (S1). The software program stored in Search Software Storage Area 2064*b* scans the 'Keyword' category and collects the result, i.e., a bundle of proposed sites (S2). CPU 211 (FIG. 1), under the instruction written in Search Software Storage Area 2064*b*, calculates the current position of Communication Device 200 (S3). The software program stored in Search Software Storage Area 2064*b* calculates the distance and the shortest route from the current position of Communication Device 200 to the proposed sites and retrieves a relevant 3D map from Search Information Storage Area 2064*c* (FIG. 118) (S4). LCD 201 displays the current position and the positions of the proposed sites and the shortest route thereto on a 3D map, and the distance from the current position to the selected items (i.e., destinations) in digits (S5). The user of Communication Device 200, by utilizing the voice recognition system, selects one of the proposed sites as the destination (S6). LCD 201 displays the current position and the selected site (i.e., destination) and the shortest route thereto on a 3D map, and the distance from the current position to the selected site (i.e., destinations) in digits (S7).

The sequences illustrated in FIG. 122 through FIG. 125 which describe the database search utilizing keywords can be applied to other types of database search. For example, search by 'Type' will collect all sites pertaining to a certain type (e.g., theater), and search by 'Location' will collect all sites pertaining to a certain geographical area. Search by 'Telephone Number' will collect all sites having a certain phone number (there is only one hit in most cases unless a wild card is utilized), and search by 'Area Code' will collect all sites having a certain area code. These examples can be implemented by rewriting S1 of FIG. 122 through FIG. 125 to 'Input Type', 'Input Location', 'Input Telephone Number', or 'Input Area Code'.

As another embodiment, more than one search terms can be utilized simultaneously, such as 'Input Type and Location' (which collects all sites pertaining to a certain type and to a certain geographical area) and 'Input Area Code and Type' (which collects all sites having a certain area code and pertains to a certain type of site). Theses examples can be implemented by rewriting S1 of FIG. 122 through FIG. 125 to 'Input Type and Location' and 'Input Area Code and Type'.

Figure 126:
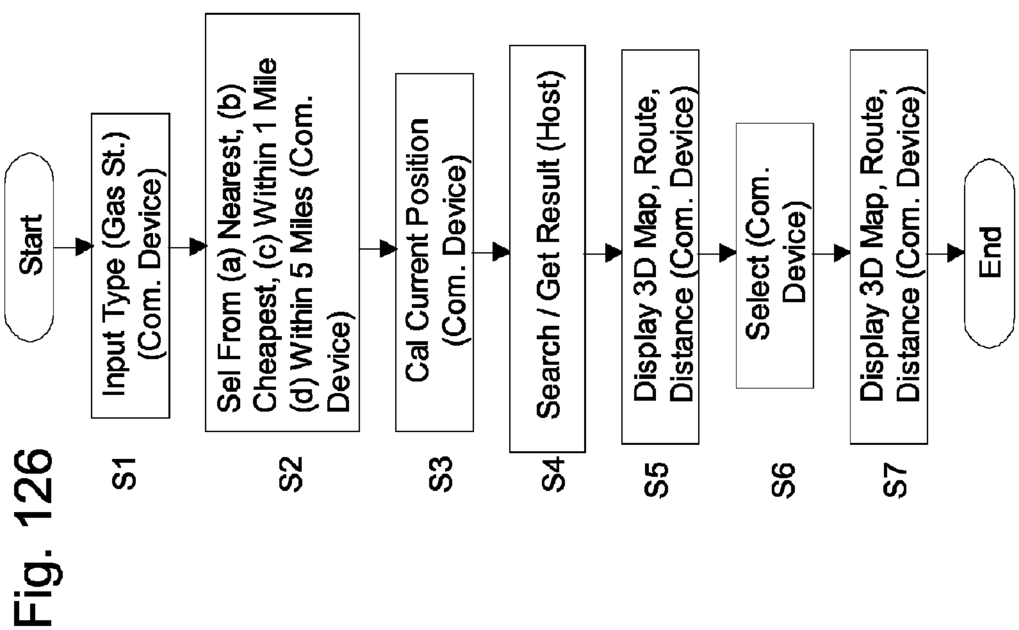
Figure 127:
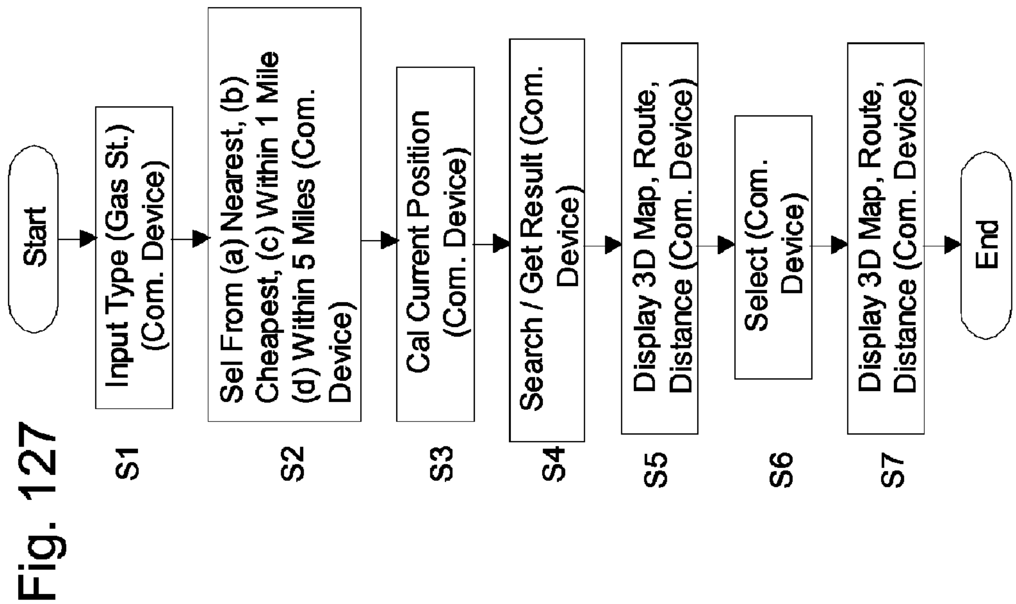

FIG. 126 and FIG. 127 illustrate the steps to find an appropriate gas station while the user of Communication Device 200 is driving an automobile.

FIG. 126 illustrates the steps to find an appropriate gas station by utilizing the software program stored in Search Software Storage Area 2064*b* (FIG. 118) of Communication Device 200 and the software program stored in Location Identifier Storage Area Hc (FIG. 114) and Search Engine Storage Area Hb (FIG. 114) of Host H (FIG. 114). Once the voice recognition system is activated by the process described in FIG. 120, a prompt screen (not shown) is displayed on LCD 201 (FIG. 1) and the 'type' (here, 'gas station') is input or selected via Microphone 215 (FIG. 1) (S1). Next, the user of Communication Device 200 selects the scope of search from (a) nearest gas station, (b) cheapest gas station, (c) gas station within 1 mile, and (d) gas station within 5 miles, all of which are displayed on LCD 201 (S2). The selected data is sent to Host H via Antenna 218 (FIG. 1) in a wireless fashion, and the software program stored in Location Identifier Storage Area Hc calculates the current position of Communication Device 200 (S3). The software program stored in Search Engine Storage Area Hb renders a search and collects the result, i.e., a bundle of proposed gas stations (S4). For example, if (a) nearest gas station is selected in S2, the software program stored in Search Engine Storage Area Hb collects the five nearest gas stations from the current position by examining the geographic location data of each gas station stored in Database Hd. If (b) cheapest gas station is selected in S2, the software program stored in Search Engine Storage Area Hb collects all gas stations within 5 mile radius from the current position by examining the geographic location of each gas station stored in Database Hd, and selects the five cheapest gas stations therefrom by examining the attribution information (i.e., gas price per gallon) of each gas station stored in Database Hd. If (c) gas station within 1 mile is selected in S2, the software program stored in Search Engine Storage Area Hb collects all gas stations within 1 mile radius from the current position by examining the geographic location of each gas station stored in Database Hd. If (d) gas station within 5 miles is selected in S2, the software program stored in Search Engine Storage Area Hb collects all gas stations within 5 mile radius from the current position by examining the geographic location of each gas station stored in Database Hd. Communication Device 200 receives these data from Host H, and LCD 201 displays the current position and the positions of the proposed sites and the shortest route thereto on a 3D map, and the distance from the current position to the selected items (i.e., destinations) in digits (S5). The user of Communication Device 200, by utilizing the voice recognition system, selects one of the proposed sites as the destination (S6). LCD 201 displays the current position and the selected site (i.e., destination) and the shortest route thereto on a 3D map, and the distance from the current position to the final destination (i.e., destinations) in digits (S7).

FIG. 127 illustrates the steps to find an appropriate gas station by utilizing the software program stored in Search Software Storage Area 2064*b* (FIG. 118) of Communication Device 200 without relying to Host H (FIG. 114). Once the voice recognition system is activated by the process described in FIG. 120, a prompt screen (not shown) is displayed on LCD 201 (FIG. 1) and the 'type' (here, 'gas station') is input or selected via Microphone 215 (FIG. 1) (S1). Next, the user of Communication Device 200 selects the scope of search from (a) nearest gas station, (b) cheapest gas station, (c) gas station within 1 mile, and (d) gas station within 5 miles, all of which are displayed on LCD 201 (S2). CPU 211 (FIG. 1), under the instruction written in Search Software Storage Area 2064*b*, calculates the current position of Communication Device 200 (S3). CPU 211 renders a search and collects the result, i.e., a bundle of proposed gas stations (S4). For example, if (a) nearest gas station is selected in S2, the software program stored in Search Engine Storage Area Hb collects the five nearest gas stations from the current position by examining the geographic location data of each gas station stored in Database Hd. If (b) cheapest gas station is selected in S2, the software program stored in Search Engine Storage Area Hb collects all gas stations within 5 mile radius from the current position by examining the geographic location of each gas station stored in Database Hd, and selects the five cheapest gas stations therefrom by examining the attribution information (i.e., gas price per gallon) of each gas station stored in Database Hd. If (c) gas station within 1 mile is selected in S2, the software program stored in Search Engine Storage Area Hb collects all gas stations within 1 mile radius from the current position by examining the geographic location of each gas station stored in Database Hd. If (d) gas station within 5 miles is selected in S2, the software program stored in Search Engine Storage Area Hb collects all gas stations within 5 mile radius from the current position by examining the geographic location of each gas station stored in Database Hd. LCD 201 displays the current position and the positions of the proposed sites and the shortest route thereto on a 3D map, and the distance from the current position to the selected items (i.e., destinations) in digits (S5). The user of Communication Device 200, by utilizing the voice recognition system, selects one of the proposed sites as the destination (S6).

LCD 201 displays the current position and the selected site (i.e., destination) and the shortest route thereto on a 3D map, and the distance from the current position to the final destination (i.e., destinations) in digits (S7).

<<Mobile Ignition Key Function>>

FIG. 128 through FIG. 147 illustrate the mobile ignition key function, i.e., a function to ignite an engine of Automobile 835 with Communication Device 200.

Figure 128:
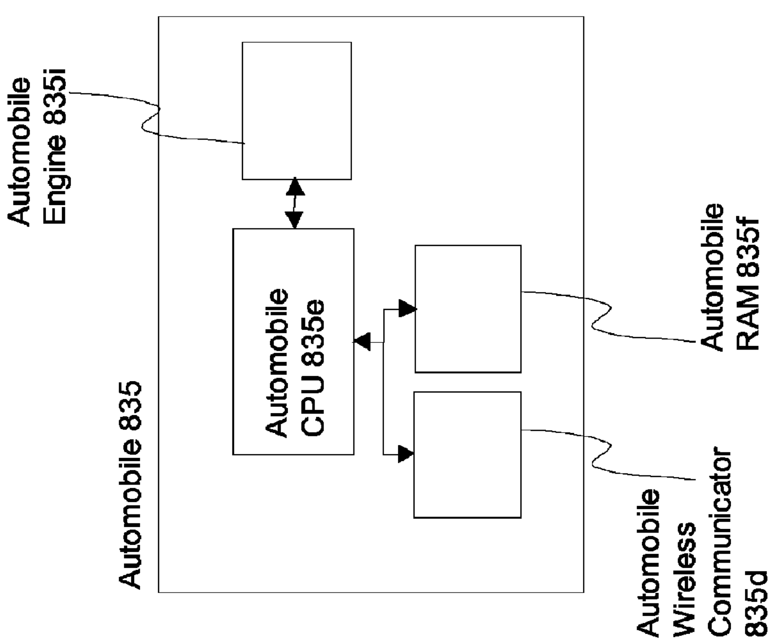

FIG. 128 illustrates the structure of Automobile 835 to implement the mobile ignition key function. Automobile 835 includes Automobile CPU 835*e*, Automobile Wireless Communicator 835*d*, Automobile RAM 835*f*, and Automobile Engine 835*i*. Automobile CPU 835*e* implements the mobile ignition key system by running the software program stored in Automobile RAM 835*f*, Automobile Wireless Communicator 835*d* is capable of sending and receiving wireless signal in order to communicate with Communication Device 200 in a wireless fashion, Automobile RAM 835*f* stores the software program necessary to implement the mobile ignition key system which is explained in details hereinafter, and Automobile Engine 835*i* is an engine which is ignited under the control of Automobile CPU 835*e*.

Figure 129:
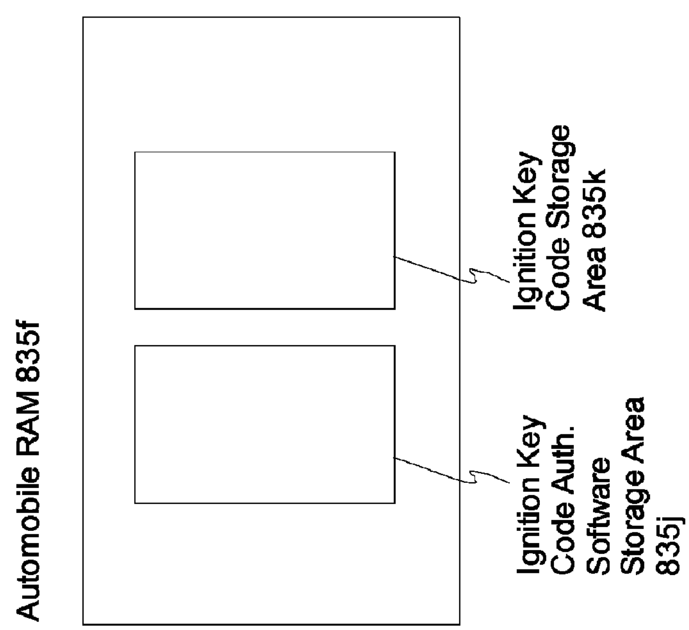

FIG. 129 illustrates the data stored in Automobile RAM 835*f* (FIG. 128). Automobile RAM 835*f* includes Ignition Key Code Authentication Software Storage Area 835*j* and Ignition Key Code Storage Area 835*k*. Ignition Key Code Authentication Software Storage Area 835*j* stores ignition key code authentication software program which is explained in FIG. 130, and Ignition Key Code Storage Area 835*k* stores an ignition key code which is composed of alphanumeric data.

Figure 130:
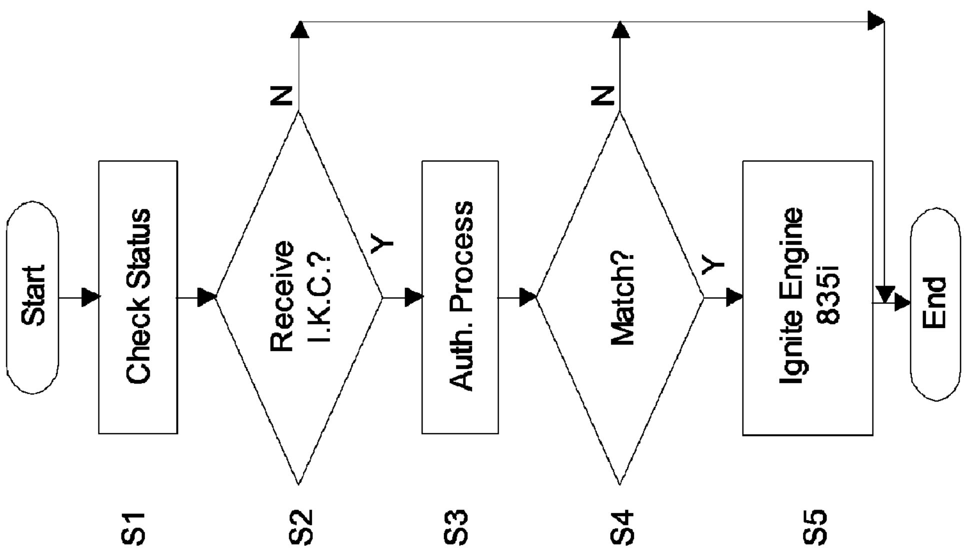

FIG. 130 illustrates the software program stored in Ignition Key Code Authentication Software Storage Area 835*j* (FIG. 129). As described in FIG. 130, Automobile CPU 835*e* (FIG. 128) periodically checks the incoming wireless signal received by Automobile Wireless Communicator 835*d* (FIG. 128) (S1). If the incoming wireless signal includes an ignition key code (S2), Automobile CPU 835*e* retrieves the ignition key code stored in Ignition Key Code Storage Area 835*k* and compares both data (S3). If the received ignition key code matches the ignition key code stored in Ignition Key Code Storage Area 835*k* (S4), Automobile CPU 835*e* instructs Automobile Engine 835*i* to ignite (S5).

FIG. 131 illustrates the software program installed in Communication Device 200 to initiate the present function. First of all, a list of modes is displayed on LCD 201 (FIG. 1) (S1). When an input signal is input by utilizing Input Device 210 (FIG. 1) or via voice recognition system to select a specific mode (S2), the selected mode is activated. In the present example, the communication mode is activated (S3*a*) when the communication mode is selected in the previous step, the game download mode and the game play mode are activated (S3*b*) when the game download mode and the game play mode are selected in the previous step, and the ignition key mode is activated (S3*c*) when the ignition key mode is selected in the previous step. The modes displayed on LCD 201 in S1 which are selectable in S2 and S3 may include all functions and modes explained in this specification. Once the selected mode is activated, another mode can be activated while the first activated mode is still implemented by going through the steps of S1 through S3 for another mode, thereby enabling a plurality of functions and modes being performed simultaneously (S4).

FIG. 132 illustrates the data stored in RAM 206 (FIG. 1). As described in FIG. 132, the data to activate (as described in S3*a* of the previous figure) and to perform the communication mode is stored in Communication Data Storage Area 2061*a*, the data to activate (as described in S3*b* of the previous figure) and to perform the game download mode and the game play mode are stored in Game DL/Play Data Storage Area 2061*b*/2061*c*, and the data to activate (as described in S3*c* of the previous figure) and to perform the ignition key mode is stored in Ignition Key Data Storage Area 2066*a*.

FIG. 133 illustrates the data stored in Ignition Key Data Storage Area 2066*a* (FIG. 132). Ignition key Data Storage Area 2066*a* includes Ignition Key Code Transmitting Software Storage Area 2066*b* and Ignition Key Code Storage Area 2066*c*. Ignition Key Code Transmitting Software Storage Area 2066*b* stores a software program to transmit the ignition key code to Automobile 835 (FIG. 128), which is explained in FIG. 134. Ignition Key Code Storage Area 2066*c* stores an ignition key code which is transmitted to Automobile 835 to ignite Automobile Engine 835*i* (FIG. 128). Ignition Key Code Storage Area 2066*c* also stores user ID and password of the user of Communication Device 200.

FIG. 134 illustrates the software program stored in Ignition Key Code Transmitting Software Storage Area 2066*b* (FIG. 133). Firsts of all, the user of Communication Device 200 inputs an user ID and password (S1). CPU 211 (FIG. 1) retrieves the user ID and password from Ignition Key Code Storage Area 2066*c* (FIG. 133) and compares with the input user ID and password. If both sets of data match (S2), CPU 211 displays the ignition key code on LCD 201 (FIG. 1) stored in Ignition Key Code Storage Area 2066*c* (S3). When a certain signal is input from Input Device 210 (FIG. 1) to grant transmitting the ignition key code (S4), CPU 211 transmits the ignition key code via Antenna 218 (FIG. 1) in a wireless fashion (S5).

FIG. 135 illustrates the method to transmit the ignition key code from Communication Device 200 to Automobile 835 (FIG. 128). As described in FIG. 135, the ignition key code is transmitted from Communication Device 200 to Automobile 835 via Network NT, such as the Internet. The transmissions between Communication Device 200—Network NT and Network NT—Automobile 835 are rendered in a wireless fashion.

FIG. 136 illustrates another method to transmit the ignition key code from Communication Device 200 to Automobile 835 (FIG. 128). In this embodiment, the ignition key code is transmitted directly to Automobile 835 from Communication Device 200. The bluetooth may be utilized to implement this method of transmission.

FIG. 137 through FIG. 139 illustrate the method for Host H to ignite Automobile Engine 835*i* (FIG. 128).

FIG. 137 illustrates the connection between Host H and Automobile 835. As described in FIG. 137, Host H and Automobile 835 are connected via Network NT, such as the Internet. The transmissions between Host H—Network NT and Network NT—Automobile 835 are rendered in a wireless fashion.

FIG. 138 illustrates the data stored in Host H. As described in FIG. 138, Host H includes Customers' Ignition Key Code Transmitting Software Storage Area Hg and Customers' Ignition Key Code Storage Area Hh. The software program stored in Customers' Ignition Key Code Transmitting Software Storage Area Hg, in the first step, selects the ignition key code and then, in the second step, transmits the selected ignition key code to Automobile 835 by the method explained in FIG. 137. The selection of ignition key code may be manually performed by an operator (i.e., human being) by the request of the user of Communication Device 200 (i.e., the owner of Automobile 835). The data stored in Customers' Ignition Key Code Storage Area Hh is explained in FIG. 139.

FIG. 139 illustrates the data stored in Customers' Ignition Key Code Storage Area Hh (FIG. 138). As described in FIG. 139, a plurality of ignition key codes are stored in Customers' Ignition Key Code Storage Area Hh. In the present example, Ignition Key Code IKC1 corresponding to Automobile AM1, Ignition Key Code IKC2 corresponding to Automobile AM2, Ignition Key Code IKC3 corresponding to Automobile AM3, Ignition Key Code IKC4 corresponding to Automobile AM4, Ignition Key Code IKC5 corresponding to Automobile AM5, Ignition Key Code IKC6 corresponding to Automobile AM6, Ignition Key Code IKC7 corresponding to Automobile AM7, Ignition Key Code IKC8 corresponding to Automobile AM8, and Ignition Key Code IKC9 corresponding to Automobile AM9 are stored in Customers' Ignition Key Code Storage Area Hh.

FIG. 140 illustrates a software program, which is stored in Ignition Key Data Storage Area 2066*a* (FIG. 133, however, specific storage area not shown), to change the ignition key code stored in Customers' Ignition Key Code Storage Area Hh (FIG. 139) of Host H (FIG. 137) by the user of Communication Device 200. Firsts of all, the user of Communication Device 200 inputs user ID and password by utilizing Input Device 210 (FIG. 1) or via voice recognition system (S1). CPU 211 (FIG. 1) retrieves the user ID and password from Ignition Key Code Storage Area 2066*c* (FIG. 133) and compares with the input user ID and password. If both sets of data match (S2), CPU 211 displays a list of the ignition key code stored in Ignition Key Code Storage Area 2066*c* assuming that more than one ignition key code is stored therein (S3). After selecting a certain ignition key code by utilizing Input Device 210 or via voice recognition system (S4) and confirmation process (S5) by the user of Communication Device 200 are completed, the user inputs a new ignition key code and retypes the new ignition key code for confirmation (S6). If CPU 211 determines that both ignition key codes are exactly the same (S7), it transmits a change signal including the new ignition key code to Host H in a wireless fashion via Antenna 218 (FIG. 1) (S8).

FIG. 141 illustrates a software program, which is stored in Host H (FIG. 138, however, specific storage area not shown) to change the ignition key code stored in Customers' Ignition Key Code Storage Area Hh (FIG. 138). First of all, Host H periodically checks the incoming wireless signal received (S1). If the received incoming signal is a change signal transmitted from Communication Device 200 (S2), Host H retrieves the user ID and password stored in a specific area of Customers' Ignition Key Code Storage Area Hh (FIG. 138, however, specific storage area not shown) and compares with the user ID and password included in the received change signal. If Host H determines that both data are exactly the same (S3), it changes the ignition key code stored in Customers' Ignition Key Code Storage Area Hh to a new one (S4).

FIG. 142 illustrates another structure of Automobile 835 to implement the mobile ignition key function. Automobile 835 includes Automobile CPU 835*e*, Automobile Wireless Communicator 835*d*, Automobile RAM 835*f*, and Automobile Engine 835*i*. Automobile CPU 835*e* implements the mobile ignition key system by running the software program stored in Automobile RAM 835*f*, Automobile Wireless Communicator 835*d* is capable of sending and receiving wireless signal in order to communicate with Communication Device 200 in a wireless fashion, Automobile RAM 835*f* stores the software program necessary to implement the mobile ignition key system, and Automobile Engine 835*i* is an engine which is ignited under the control of Automobile CPU 835*e*. The new element added to this embodiment compared to the one described in FIG. 128 is Conventional Ignition Key Controller 8351. Conventional Ignition Key Controller 8351 is a device to ignite Automobile Engine 835*i* by way of inserting a tangible ignition key therein. The user of Communication Device 200 is allowed to ignite Automobile Engine 835*i* by utilizing a tangible ignition key in a conventional manner instead of transmitting an ignition key code from Communication Device 200 in this embodiment.

FIG. 143 illustrates another example of the data stored in Ignition Key Code Storage Area 2066*c* (FIG. 133). Ignition Key Code Storage Area 2066*c* is capable of storing a plurality of ignition key codes in this embodiment. In the present example, Ignition Key Code IKCa corresponding to Automobile AMa, Ignition Key Code IKCb corresponding to Automobile AMb, and Ignition Key Code IKCc corresponding to Automobile AMc are stored in Ignition Key Code Storage Area 2066*c*.

FIG. 144 illustrates the software program stored in Ignition Key Code Transmitting Software Storage Area 2066*b* (FIG. 133). The software program illustrated in FIG. 144 is similar to the one illustrated in FIG. 134 except that the present embodiment allows the user of Communication Device 200 to select one ignition key code from a list of ignition key codes to be transmitted to Automobile 835 (FIG. 128). As described in FIG. 144, the user of Communication Device 200, first of all, inputs user ID and password by utilizing Input Device 210 (FIG. 1) or via voice recognition system (S1). CPU 211 (FIG. 1) retrieves the user ID and password from Ignition Key Code Storage Area 2066*c* (FIG. 133) and compares with the input user ID and password. If both sets of data match (S2), CPU 211 displays a list of ignition key code on LCD 201 (FIG. 1) stored in Ignition Key Code Storage Area 2066*c* (S3). The user of Communication Device 200 selects one of the ignition key codes by utilizing Input Device 210 or by the voice recognition system (S4). When a certain signal is input from Input Device 210 (FIG. 1) or via voice recognition system to grant transmitting the ignition key code (S5), CPU 211 transmits the ignition key code via Antenna 218 (FIG. 1) in a wireless fashion (S6).

FIG. 145 illustrates another example of the data stored in Ignition Key Code Storage Area 2066*c* (FIG. 133). Compared to the one illustrated in FIG. 143, Ignition Key Code Storage Area 2066*c* in this embodiment stores a plurality of ignition key codes for automobiles and motorcycles, and also stores key codes for doors of a house. More precisely, Ignition Key Code IKCa corresponding to Automobile AMa, Ignition Key Code IKCb corresponding to Automobile AMb, Ignition Key Code IKCc corresponding to Automobile AMc, Ignition Key Code IKCd corresponding to Automobile AMd, Ignition Key Code IKCe corresponding to Automobile AMe, Ignition Key Code IKCf corresponding to Motorcycle MCa, Ignition Key Code IKCg corresponding to Motorcycle MCb, Ignition Key Code IKCh corresponding to Motorcycle MCc, Key Code KCa corresponding to Entrance Door ED, Key Code KCb corresponding to Back Door BD, and Key Code KCc corresponding to Side Door SD are stored in Ignition Key Code Storage Area 2066*c*.

FIG. 146 illustrates a software program, which is stored in Ignition Key Data Storage Area 2066*a* (FIG. 133, however, specific storage area not shown), to change the ignition key code stored in Ignition Key Code Storage Area 835*k* (FIG. 129) of Automobile 835 (FIG. 128) by the user of Communication Device 200. Firsts of all, the user of Communication Device 200 inputs user ID and password by utilizing Input Device 210 (FIG. 1) or via voice recognition system (S1). CPU 211 (FIG. 1) retrieves the user ID and password from Ignition Key Code Storage Area 2066*c* (FIG. 133) and compares with the input user ID and password. If both sets of data match (S2), CPU 211 displays a list of the ignition key codes stored in Ignition Key Code Storage Area 2066*c* (S3). After selecting a certain ignition key code by utilizing Input Device 210 or via voice recognition system (S4) and confirmation process (S5) by the user of Communication Device 200 are completed, the user inputs a new ignition key code and retypes the new ignition key code for confirmation (S6). If CPU 211 determines that both ignition key codes are exactly the same (S7), it transmits a change signal including the new ignition key code to Automobile 835 in a wireless fashion via Antenna 218 (FIG. 1) (S8).

FIG. 147 illustrates a software program, which is stored in Automobile RAM 835*f* (FIG. 129, however, specific storage area not shown) to change the ignition key code stored in Ignition Key Code Storage Area 835*k* (FIG. 129). First of all, Automobile CPU 835*e* (FIG. 128) periodically checks the incoming wireless signal received by Automobile Wireless Communicator 835*d* (FIG. 128) (S1). If the received incoming signal is a change signal transmitted from Communication Device 200 (S2), Automobile CPU 835*e* retrieves the user ID and password stored in Automobile RAM 835*f* (FIG. 129, however, specific storage area not shown) and compares with the user ID and password included in the received change signal. If Automobile CPU 835*e* determines that both data are exactly the same (S3), it changes the ignition key code stored in automobile RAM 835*k* to a new one (S4).

<<Voice Print Authentication System>>

FIG. 148 through FIG. 159 illustrate the voice print authentication system of Communication Device 200.

FIG. 148 illustrates the software program installed in Communication Device 200 to initiate the present system. First of all, a list of modes is displayed on LCD 201 (FIG. 1) (S1). When an input signal is input by utilizing Input Device 210 (FIG. 1) or via voice recognition system to select a specific mode (S2), the selected mode is activated. In the present example, the communication mode is activated (S3*a*) when the communication mode is selected in the previous step, the game download mode and the game play mode are activated (S3*b*) when the game download mode and the game play mode are selected in the previous step, and the authentication mode is activated (S3*c*) when the authentication mode is selected in the previous step. The modes displayed on LCD 201 in S1 which are selectable in S2 and S3 may include all functions and modes explained in this specification. Once the selected mode is activated, another mode can be activated while the first activated mode is still implemented by going through the steps of S1 through S3 for another mode, thereby enabling a plurality of functions and modes being performed simultaneously (S4).

FIG. 149 illustrates the data stored in RAM 206 (FIG. 1). As described in FIG. 149, the data to activate (as described in S3*a* of the previous figure) and to perform the communication mode is stored in Communication Data Storage Area 2061*a*, the data to activate (as described in S3*b* of the previous figure) and to perform the game download mode and the game play mode are stored in Game DL/Play Data Storage Area 2061*b*/2061*c*, and the data to activate (as described in S3*c* of the previous figure) and to perform the authentication mode is stored in Authentication Data Storage Area 2067*f*.

FIG. 150 illustrates the data stored in Authentication Data Storage Area 2067*f* (FIG. 1). As described in FIG. 150, Authentication Data Storage Area 2067*f* includes Input Voice Data Storage Area 2067*a*, Authentication Software Storage Area 2067*b*, and Voice Print Data Storage Area 2067*c*. Input Voice Data Storage Area 2067*a* stores a voice data input from Microphone 215 (FIG. 1), Authentication Software Storage Area 2067*b* stores software program to implement the present function explained hereinafter, and Voice Print Data Storage Area 2067*c* stores Voice Print Data #1 2067*d* and Voice Print Data #2 2067*e*, as described in FIG. 150, both of which are utilized for comparison by the software program stored in Authentication Software Storage Area 2067*b*.

FIG. 151 illustrates the concept of the voice print authentication software program explained in details hereinafter. First of all, CPU 211 (FIG. 1) compares the voice data stored in Input Voice Data Storage Area 2067*a* (FIG. 150) with one or more of the voice print data stored in Voice Print Data Storage Area 2067*c* (FIG. 150) (S1). If both data area exactly the same (S2), the voice print authentication process is successful and CPU 211 thereby unlocks Communication Device 200 (i.e., authorizes to utilize Communication Device 200) (S3).

FIG. 152 illustrates an embodiment of the voice print authentication software program stored in Authentication Software Storage Area 2067*b* (FIG. 150). As described in FIG. 152, user ID is input via Microphone 215 (FIG. 1), which is stored in Input Voice Data Storage Area 2067*a* (FIG. 150) (S1). CPU 211 (FIG. 1) retrieves Voice Print Data #1 2067*d* from Voice Print Data Storage Area 2067*c* (FIG. 150) (S2). If both data are exactly the same (S3), password is then input via Microphone 215 (FIG. 1), which is also stored in Input Voice Data Storage Area 2067*a* (S4). CPU 211 retrieves Voice Print Data #2 2067*e* from Voice Print Data Storage Area 2067*c* (S5). If both data are exactly the same (S6), the voice print authentication process is successful and CPU 211 thereby unlocks Communication Device 200 (i.e., authorizes to utilize Communication Device 200) (S7).

FIG. 153 illustrates another embodiment of the voice print authentication software program stored in Authentication Software Storage Area 2067*b* (FIG. 150). As described in FIG. 153, user ID and password are input consecutively via Microphone 215 (FIG. 1), which are stored in Input Voice Data Storage Area 2067*a* (FIG. 150) (S1). CPU 211 (FIG. 1) retrieves Voice Print Data #1 2067*d* and Voice Print Data #2 2067*e* from Voice Print Data Storage Area 2067*c* (FIG. 150) (S2). If both sets of data are exactly the same (S3), the voice print authentication process is successful and CPU 211 thereby unlocks Communication Device 200 (i.e., authorizes to utilize Communication Device 200) (S4).

FIG. 154 and FIG. 155 illustrate the method to process with the voice data input from Microphone 215 (FIG. 1) in the authentication mode and the communication mode utilizing the voice recognition system. As described in FIG. 154, when Communication Device 200 is in the authentication mode, CPU 211 (FIG. 1) periodically checks voice data from Microphone 215 (FIG. 1) (S1), and if CPU 211 detects a voice data input (S2), it stores the voice data in Input Voice Data Storage Area 2067*a* (FIG. 150) (S3) in order to proceed with the authentication process explained hereinbefore (S4). As described in FIG. 155, when Communication Device 200 is in the communication mode, CPU 211 periodically checks voice data from Microphone 215 (FIG. 1) (S1) and proceeds with the voice data to implement the voice recognition system as explained hereinbefore (S2).

FIG. 156 and FIG. 157 illustrate the software program to change or renew Voice Print Data #1 2067*d* stored in Voice Print Data Storage Area 2067*c* (FIG. 150). First of all, an authentication code is input via Input Device 210 (FIG. 1) or via Microphone 215 (FIG. 1) by utilizing the voice recognition system (S1). CPU 211 (FIG. 1) then retrieves the authentication code stored in Authentication Data Storage Area 2067*f* (FIG. 150, however specific storage area not shown) and compares both data. If both data are exactly the same (S2), CPU 211 displays a list of voice print data stored in Voice Print Storage Area 2067*c* (FIG. 150), i.e., Voice Print Data #1 2067*d* and Voice Print Data #2 2067*e* (S3), and Voice Print Data #1 2067*d* is selected by Input Device 210 or by the voice recognition system (S4). The old Voice Print Data #1 is input via Microphone 215 and compared with Voice Print Data #1 2067*d* stored in Voice Print Data Storage Area 2067*c* (S5). If both data are exactly the same (S6), a new data is input via Microphone 215, and the same voice data is input again for verification (S7). If both data are exactly the same (S8), the new voice data is stored in Voice Print Data Storage Area 2067*c* as Voice Print Data #1 2067*d* (S9).

FIG. 158 and FIG. 159 illustrate the software program to change or renew Voice Print Data #2 2067*e* stored in Voice Print Data Storage Area 2067*c* (FIG. 150). First of all, an authentication code is input via Input Device 210 (FIG. 1) or via Microphone 215 (FIG. 1) by utilizing the voice recognition system (S1). CPU 211 (FIG. 1) then retrieves the authentication code stored in Authentication Data Storage Area 2067*f* (FIG. 150, however specific storage area not shown) and compares both data. If both data are exactly the same (S2), CPU 211 displays a list of voice print data stored in Voice Print Storage Area 2067*c* (FIG. 150), i.e., Voice Print Data #1 2067*d* and Voice Print Data #2 2067*e* (S3), and Voice Print Data #2 2067*e* is selected by Input Device 210 or by the voice recognition system (S4). The old Voice Print Data #2 is input via Microphone 215 and compared with Voice Print Data #2 2067*e* stored in Voice Print Data Storage Area 2067*c* (S5). If both data are exactly the same (S6), a new data is input via Microphone 215, and the same voice data is input again for verification (S7). If both data are exactly the same (S8), the new voice data is stored in Voice Print Data Storage Area 2067*c* as Voice Print Data #2 2067*e* (S9).

<<Fingerprint Authentication System>>

FIG. 160 through FIG. 169 illustrate the fingerprint authentication system of Communication Device 200 (FIG. 1).

FIG. 160 illustrates the structure of Communication Device 200 to implement the fingerprint authentication system. As described in FIG. 160, communication system 200 includes Fingerprint Scanner FPS and Eye Print Scanner EPS.

FIG. 161 illustrates the data stored in RAM 206 (FIG. 1). As described in FIG. 161, RAM 206 includes Authentication Software Storage Area 2068*a*, Fingerprint Data Storage Area 2068*b*, and Eye Print Data Storage Area 2068*c*. Authentication Software Storage Area 2068*a* stores an authentication software program to implement the fingerprint authentication system of which the details are explained hereinafter, Fingerprint Data Storage Area 2068*b* stores the data regarding the fingerprints of both hands of the user of Communication Device 200 (i.e., L1, L2, L3, L4, L5, R1, R2, R3, R4, and R5), and Eye Print Data Storage Area 2068*c* stores the data regarding eye prints of both eyes of the user of Communication Device 200 (i.e., E1 and E2). Here, L1 represents the fingerprint data regarding the left thumb, L2 represents the fingerprint data regarding the left first finger, L3 represents the fingerprint data regarding the left second finger, L4 represents the fingerprint data regarding the left third finger, L5 represents the fingerprint data regarding the left little finger, R1 represents the fingerprint data regarding the right thumb, R2 represents the fingerprint data regarding the right first finger, R3 represents the fingerprint data regarding the right second finger, R4 represents the fingerprint data regarding the right third finger, and R5 represents the fingerprint data regarding the right little finger. In addition, E1 represents the eye print data regarding the left eye and E2 represents the eye print data regarding the right eye.

FIG. 162 illustrates the concept of the fingerprint authentication software program which is stored in Authentication Software Storage Area 2068*a* (FIG. 161), and the details of which is explained hereinafter. First of all, CPU 211 (FIG. 1) compares the fingerprint data scanned by Fingerprint Scanner FPS (FIG. 160) with one or more of the fingerprint data stored in Fingerprint Data Storage Area 2068*b* (FIG. 161) (S1). If both data area exactly the same (S2), the fingerprint authentication process is successful and CPU 211 thereby unlocks Communication Device 200 (i.e., authorizes to utilize Communication Device 200) (S3).

FIG. 163 illustrates an embodiment of the fingerprint authentication software program stored in Authentication Software Storage Area 2068*a* (FIG. 161). First of all, the user of Communication Device 200 selects one of his/her fingers at his/her discretion and scan the fingerprint by Fingerprint Scanner FPS (FIG. 160) (S1). CPU 211 (FIG. 1) then retrieves all fingerprint data from Fingerprint Data Storage Area 2068*b* (FIG. 161) and compares with the user's fingerprint data. If both data are exactly the same (S2), the user of Communication Device 200 selects another finger (other than the one scanned in S1) at his/her discretion and scan the fingerprint by Fingerprint Scanner FPS (FIG. 160) (S3). CPU 211 (FIG. 1) then retrieves all fingerprint data from Fingerprint Data Storage Area 2068*b* (FIG. 161) excluding the one already utilized in S2 and compare with the user's fingerprint data. If both data are exactly the same (S4), the fingerprint authentication process is successful and CPU 211 thereby unlocks Communication Device 200 (i.e., authorizes to utilize Communication Device 200) (S5).

FIG. 164 illustrates another embodiment of the fingerprint authentication software program stored in Authentication Software Storage Area 2068*a* (FIG. 161). First of all, CPU 211 (FIG. 1) selects the predetermined fingerprint (e.g., the fingerprint of the right first finger) to be scanned and displays on LCD 201 (FIG. 1) (S1). The user of Communication Device 200 then scans the selected fingerprint (e.g., the fingerprint of the right first finger) by Fingerprint Scanner FPS (FIG. 160) (S2). CPU 211 retrieves the predetermined fingerprint data (e.g., R2) from Fingerprint Data Storage Area 2068*b* (FIG. 161) and compares with the users fingerprint data. If both data are exactly the same (S3), CPU 211 selects another predetermined fingerprint (e.g., the fingerprint of the left first finger) to be next scanned and displays on LCD 201 (S4). The user of Communication Device 200 then scans the selected fingerprint (e.g., the fingerprint of the left first finger) by Fingerprint Scanner FPS (S5). CPU 211 then retrieves the predetermined fingerprint data (e.g., L2) from Fingerprint Data Storage Area 2068*b* and compare with the user's fingerprint data. If both data are exactly the same (S6), the fingerprint authentication process is successful and CPU 211 thereby unlocks Communication Device 200 (i.e., authorizes to utilize Communication Device 200) (S7).

FIG. 165 illustrates another embodiment of the fingerprint authentication software program stored in Authentication Software Storage Area 2068*a* (FIG. 161). First of all, CPU 211 (FIG. 1) randomly selects the fingerprint to be scanned and displays on LCD 201 (FIG. 1) (S1). The user of Communication Device 200 then scans the selected fingerprint by Fingerprint Scanner FPS (FIG. 160) (S2). CPU 211 retrieves the fingerprint data selected in S1 from Fingerprint Data Storage Area 2068*b* (FIG. 161) and compares with the user's fingerprint data. If both data are exactly the same (S3), CPU 211 randomly selects the fingerprint to be next scanned and displays on LCD 201 (S4). The user of Communication Device 200 then scans the selected fingerprint by Fingerprint Scanner FPS (S5). CPU 211 then retrieves the fingerprint data selected in S4 from Fingerprint Data Storage Area 2068*b* and compare with the user's fingerprint data. If both data are exactly the same (S6), the fingerprint authentication process is successful and CPU 211 thereby unlocks Communication Device 200 (i.e., authorizes to utilize Communication Device 200) (S7).

FIG. 166 illustrates another embodiment of the fingerprint authentication software program stored in authentication Software Storage Area 2067*a* (FIG. 161). First of all, the user of Communication Device 200 selects two of his/her fingers at his/her discretion and scan the fingerprints by Fingerprint Scanner FPS (FIG. 160) (S1). CPU 211 (FIG. 1) then retrieves all fingerprint data from Fingerprint Data Storage Area 2068*b* (FIG. 161) and compares with the user's fingerprint data. If both sets of data are exactly the same (S2), the fingerprint authentication process is successful and CPU 211 thereby unlocks Communication Device 200 (i.e., authorizes to utilize Communication Device 200) (S3).

FIG. 167 illustrates another embodiment of the fingerprint authentication software program stored in Authentication Software Storage Area 2068*a* (FIG. 161). First of all, CPU 211 (FIG. 1) selects two predetermined fingerprints (e.g., the right first finger and the left first finger) to be scanned and displays on LCD 201 (FIG. 1) (S1). The user of Communication Device 200 then scans the selected fingerprints (e.g., the right first finger and the left first finger) by Fingerprint Scanner FPS (FIG. 160) (S2). CPU 211 retrieves two predetermined fingerprint data (e.g., R2 and L2) from Fingerprint Data Storage Area 2068*b* (FIG. 161) and compares with the user's fingerprint data. If both sets of data are exactly the same (S3), the fingerprint authentication process is successful and CPU 211 thereby unlocks Communication Device 200 (i.e., authorizes to utilize Communication Device 200) (S7).

FIG. 168 illustrates another embodiment of the fingerprint authentication software program stored in Authentication Software Storage Area 2068*a* (FIG. 161). First of all, CPU 211 (FIG. 1) randomly selects two fingerprints to be scanned and displays on LCD 201 (FIG. 1) (S1). The user of Communication Device 200 then scans the selected fingerprints by Fingerprint Scanner FPS (FIG. 160) (S2). CPU 211 retrieves fingerprint data selected in S1 from Fingerprint Data Storage Area 2068*b* (FIG. 161) and compares with the user's fingerprint data. If both sets of data are exactly the same (S3), the fingerprint authentication process is successful and CPU 211 thereby unlocks Communication Device 200 (i.e., authorizes to utilize Communication Device 200) (S7).

FIG. 169 illustrates another embodiment of the fingerprint authentication software program stored in Authentication Software Storage Area 2068*a* (FIG. 161). First of all, the user of Communication Device 200 selects one of his/her fingers at his/her discretion and scan the fingerprint by Fingerprint Scanner FPS (FIG. 160) (S1). CPU 211 (FIG. 1) then retrieves all fingerprint data from Fingerprint Data Storage Area 2068*b* (FIG. 161) and compares with the user's fingerprint data. If both data are exactly the same (S2), the fingerprint authentication process is successful and CPU 211 thereby unlocks Communication Device 200 (i.e., authorizes to utilize Communication Device 200) (S3).

As another embodiment, Fingerprint Scanner FPS explained in FIG. 160 can be composed of two scanners FPS1 and FPS2 (both of which not shown in FIG. 160) in order to scan two fingerprints simultaneously.

<<Auto Time Adjust Function>>

FIG. 170 to FIG. 172 illustrate the automatic time adjust function, i.e., a function which automatically adjusts the clock of Communication Device 200.

FIG. 170 illustrates the data stored in RAM 206 (FIG. 1). As described in FIG. 170, RAM 206 includes Auto Time Adjust Software Storage Area 2069*a*, Current Time Data Storage Area 2069*b*, and Auto Time Data Storage Area 2069*c*. Auto Time Adjust Software Storage Area 2069*a* stores software program to implement the present function which is explained in details hereinafter, Current Time Data Storage Area 2069*b* stores the data which represents the current time, and Auto Time Data Storage Area 2069*c* is a working area assigned for implementing the present function.

FIG. 171 illustrates a software program stored in Auto Time Adjust Software Storage Area 2069*a* (FIG. 170). First of all, Communication Device 200 is connected to Network NT (e.g., the Internet) via Antenna 218 (FIG. 1) (S1). CPU 211 (FIG. 1) then retrieves an atomic clock data from Network NT (S2) and the current time data from Current Time Data Storage Area 2069*b* (FIG. 170), and compares both data. If the difference between both data is not within the predetermined value X (S3), CPU 211 adjusts the current time data (S4). The method to adjust the current data can be either simply overwrite the data stored in Current Time Data Storage Area 2069*b* with the atomic clock data retrieved from Network NT or calculate the difference of the two data and add or subtract the difference to or from the current time data stored in Current Time Data Storage Area 2069*b* by utilizing Auto Time Data Storage Area 2069*c* (FIG. 170) as a working area.

FIG. 172 illustrates another software program stored in Auto Time Adjust Software Storage Area 2069*a* (FIG. 170). When the power of Communication Device 200 is turned on (S1), CPU 211 (FIG. 1) stores a predetermined timer value in Auto Time Data Storage Area 2069*c* (FIG. 170) (S2). The timer value is decremented periodically (S3). When the timer value equals to zero (S4), the automatic timer adjust function is activated (S5) and CPU 211 performs the sequence described in FIG. 171, and the sequence of S2 through S4 is repeated thereafter.

<<Video/Photo Mode>>

Figure 54:
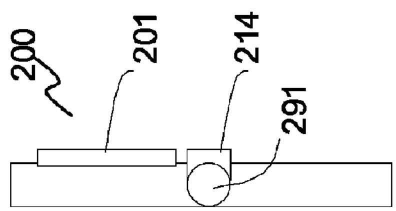
FIG. 54 is a simplified illustration illustrating an exemplary embodiment of the present invention.

FIG. 173 illustrates the details of CCD Unit 214 (FIG. 1). As described in FIG. 173, CCD Unit 214 is mounted on Rotator 291 (FIG. 54) which is rotatably connected to the side of Communication Device 200 as described in FIG. 54. Indicator 212 (FIG. 1) is attached to the surface of CCD Unit 214.

FIG. 174 illustrates the software program installed in Communication Device 200 to initiate the present function. First of all, a list of modes is displayed on LCD 201 (FIG. 1) (S1). When an input signal is input by utilizing Input Device 210 (FIG. 1) or via voice recognition system to select a specific mode (S2), the selected mode is activated. In the present example, the communication mode is activated (S3*a*) when the communication mode is selected in the previous step, the game download mode and the game play mode are activated (S3*b*) when the game download mode and the game play mode are selected in the previous step, and the video/photo mode is activated (S3*c*) when the video/photo mode is selected in the previous step. The modes displayed on LCD 201 in S1 which are selectable in S2 and S3 may include all functions and modes explained in this specification. Once the selected mode is activated, another mode can be activated while the first activated mode is still implemented by going through the steps of S1 through S3 for another mode, thereby enabling a plurality of functions and modes being performed simultaneously (S4).

FIG. 175 illustrates the data stored in RAM 206 (FIG. 1). As described in FIG. 175, the data to activate (as described in S3*a* of the previous figure) and to perform the communication mode is stored in Communication Data Storage Area 2061*a*, the data to activate (as described in S3*b* of the previous figure) and to perform the game download mode and the game play mode are stored in Game DL/Play Data Storage Area 2061*b*/2061*c*, and the data to activate (as described in S3*c* of the previous figure) and to perform the video/photo mode is stored in Video/Photo Data Storage Area 20610*a*.

FIG. 176 illustrates the software programs and data stored in Video/Photo Data Storage Area 20610*a* (FIG. 175). As described in FIG. 176, Video/Photo Data Storage Area 20610*a* includes Video/Photo Software Storage Area 20610*b*, Video Data Storage Area 20610*c*, Audio Data Storage Area 20610*d*, Photo Data Storage Area 20610*e*, Photo Sound Data Storage Area 20610*f*, and Indicator Data Storage Area 20610*g*. Video/Photo Software Storage Area 20610*b* stores the software programs described in FIG. 182 through FIG. 186, FIG. 189, FIG. 190, FIG. 195 through FIG. 197, FIG. 199, and FIG. 201. Video Data Storage Area 20610*c* stores the data described in FIG. 177. Audio Data Storage Area 20610*d* stores the data described in FIG. 178. Photo Data Storage Area 20610*e* stores the data described in FIG. 179. Photo Sound Data Storage Area 20610*f* stores a sound data (preferably a wave data) producing a sound similar to the one when a conventional camera is activated. Indicator Data Storage Area 20610*g* stores the data described in FIG. 180. Video Data Storage Area 20610*c* and Audio Data Storage Area 20610*d* primarily stores the similar data stored in Area 267 and Area 268 of FIG. 47, respectively.

FIG. 177 illustrates the data stored in Video Data Storage Area 20610*c* (FIG. 176). Video Data Storage Area 20610*c* stores a plurality of video data which goes through the process described in FIG. 184 hereinafter. In the present example, six video data, i.e., Video #1, Video #2, Video #3, Video #4, Video #5, and Video #6, are currently stored in Video Data Storage Area 20610*c*. Message Data Storage Area (MS2*a*, MS3*a*) 20610*h* is also included in Video Data Storage Area 20610*c*, which stores the text data of MS2*a* ('REC') and MS3*a* ('STOP') shown in FIG. 194 hereinafter.

FIG. 178 illustrates the data stored in Audio Data Storage Area 20610*d* (FIG. 176). Audio Data Storage Area 20610*d* stores a plurality of audio data which goes through the process described in FIG. 184 hereinafter. In the present example, six audio data, i.e., Audio #1, Audio #2, Audio #3, Audio #4, Audio #5, and Audio #6 are currently stored in Audio Data Storage Area 20610*d*. Each audio data stored in Audio Data Storage Area 20610*d* corresponds to the video data stored in Video Data Storage Area 20610*c* (FIG. 177). Namely, Video #1 corresponds to Audio #1, Video #2 corresponds to Audio #2, Video #3 corresponds to Audio #3, Video #4 corresponds to Audio #4, Video #5 corresponds to Audio #5, and Video #6 corresponds to Audio #6.

FIG. 179 illustrates the data stored in Photo Data Storage Area 20610*e* (FIG. 176). Photo Data Storage Area 20610*e* stores a plurality of photo data which goes through the process described in FIG. 199 hereinafter. In the present example, six photo data, i.e., Photo #1, Photo #2, Photo #3, Photo #4, Photo #5, and Photo #6 are currently stored in Photo Data Storage Area 20610*e*. Message Data Storage Area (MS4*a*) 20610*i* is also included in Photo Data Storage Area 20610*e*, which stores the text data of MS4*a* ('SHOT') shown in FIG. 198 hereinafter.

FIG. 180 illustrates the data stored in Indicator Data Storage Area 20610*g* (FIG. 176). Indicator Data Storage Area 20610*g* stores the data regarding the color of Indicator 212 (FIG. 1 and FIG. 173) when Communication Device 200 is in a video mode or a photo mode. According to the data described in FIG. 180, Indicator 212 emits red light when Communication Device 200 is in the video mode and green light when Communication Device 200 is in the photo mode.

FIG. 181 illustrates another example of the data stored in Indicator Data Storage Area 20610*g* (FIG. 176). According to the data described in FIG. 181, Indicator 212 emits a predetermined color, however, with a different pattern. Namely, the light emitted from Indicator 212 turns on and off when Communication Device 200 is in the video mode, whereas the light remains on when Communication Device 200 is in the photo mode.

FIG. 182 illustrates the software program stored in Video/Photo Software Storage Area 20610*b* (FIG. 176). As described in FIG. 182, CPU 211 (FIG. 1) displays a list of the selectable modes, i.e., the video mode and the photo mode (S1). One of the modes is selected by utilizing Input Device 210 (FIG. 1) or via voice recognition system (S2).

FIG. 183 illustrates the software program stored in Video/Photo Software Storage Area 20610*b* (FIG. 176). When the video mode is selected in S2 in FIG. 182, the video mode is initiated and CPU 211 (FIG. 1) is ready to capture and store the video data in one of the areas of Video Data Storage Area 20610*c* (FIG. 177) (S1). Next, the video process is initiated which is described in details in FIG. 184 (S2*a*) until a specific signal is input by utilizing Input Device 210 (FIG. 1) or via voice recognition system (S3). The indicator process is activated simultaneously which is described in details in FIG. 185 hereinafter (S2*b*).

FIG. 184 illustrates the video process of Communication Device 200, i.e., S2*a* of FIG. 183. As described in FIG. 184, the video data input from CCD Unit 214 (FIG. 1 and FIG. 173) (S1*a*) is converted from analog data to digital data (S2*a*) and is processed by Video Processor 202 (FIG. 1) (S3*a*). The processed video data is stored in Video Data Storage Area 20610*c* (FIG. 177) (S4*a*) and is displayed on LCD 201 (FIG. 1) (S5*a*). As described in the same drawing, the audio data input from Microphone 215 (FIG. 1) (S1*b*) is converted from analog data to digital data by A/D 213 (FIG. 1) (S2*b*) and is processed by Sound Processor 205 (FIG. 1) (S3*b*). The processed audio data is stored in Audio Data Storage Area 20610*d* (FIG. 178) (S4*b*) and is transferred to Sound Processor 205 and is output from Speaker 216 (FIG. 1) via D/A 204 (FIG. 1) (S5*b*). The sequences of S1*a* through S5*a* and S1*b* through S5*b* are continued until a specific signal indicating to stop such sequence is input from Input Device 210 (FIG. 1) or by the voice recognition system (S6).

FIG. 185 illustrates the indicator process of Communication Device 200, i.e., S2*b* of FIG. 183. As described in FIG. 185, CPU 211 (FIG. 1) scans the video mode section of Indicator Data Storage Area 20610*g* (FIG. 180) and retrieves the indicator data therefrom (S1) and activates Indicator 212 (FIG. 1 and FIG. 173) in accordance with the indicator data (S2). In the embodiment explained in FIG. 180, Indicator 212 emits red light while Communication Device 200 is in the video mode and Indicator 212 turns on and off in the embodiment explained in FIG. 181. The sequences of S1 and S2 is continued until a specific signal indicating to stop such sequence is input from Input Device 210 (FIG. 1) or by the voice recognition system (S3).

FIG. 186 illustrates the sequence to transfer the video data and the audio data via Antenna 218 (FIG. 1) in a wireless fashion. As described in FIG. 186, CPU 211 (FIG. 1) initiates a dialing process (S1) until the line is connected to a host (not shown) (S2). As soon as the line is connected, CPU 211 reads the video data and the audio data stored in Video Data Storage Area 20610*c* (FIG. 177) and Audio Data Storage Area 20610*d* (FIG. 178) (S3) and transfers these data to Signal Processor 208 (FIG. 1) where these data are converted into a transferring data (S4). The transferring data is transferred from Antenna 218 (FIG. 1) in a wireless fashion (S5). The sequence of S1 through S5 is continued until a specific signal indicating to stop such sequence is input from Input Device 210 (FIG. 1) or via the voice recognition system (S6). The line is disconnected thereafter (S7).

FIG. 187 illustrates the basic structure of the transferred data which is transferred from Communication Device 200 as described in S4 and S5 of FIG. 186. Transferred Data 610*a* is primarily composed of Header 611*a*, Video Data 612*a*, Audio Data 613*a*, Relevant Data 614*a*, and Footer 615*a*. Video data 612*a* corresponds to the video data stored in Video Data Storage Area 20610*c* (FIG. 177), and Audio Data 613*a* corresponds to the audio data stored in Audio Data Storage Area 20610*d* (FIG. 178). Relevant Data 614*a* includes various types of data, such as the identification numbers of Device A (i.e., the transferor device) and Device B (i.e., the transferee device), a location data which represents the location of Device A, an email data transferred from Device A to Device B, etc. Header 611*a* and Footer 615*a* represent the beginning and the end of Transferred Data 610*a* respectively.

FIG. 188 illustrates the data contained in RAM 206 (FIG. 1) of Device B (i.e., the transferee device). As illustrated in FIG. 188, RAM 206 includes Area 269*a* which stores video data, Area 270*a* which stores audio data, and Area 266*a* which is a work area utilized for the process explained hereinafter.

FIG. 189 and FIG. 190 illustrates the software program stored in Device B. As described in FIG. 189 and FIG. 190, CPU 211 (FIG. 1) of Device B initiates a dialing process (S1) until Device B is connected to a host (not shown) (S2). Transferred Data 610*a* is received by Antenna 218 (FIG. 1) of Device B (S3) and is converted by Signal Processor 208 (FIG. 1) into data readable by CPU 211 (S4). Video data and audio data are retrieved from Transferred Data 610*a* and stored into Area 269*a* (FIG. 188) and Area 270*a* (FIG. 188) of RAM 206 respectively (S5). The video data stored in Area 269*a* is processed by Video Processor 202 (FIG. 1) (S6*a*). The processed video data is converted into an analog data (S7*a*) and displayed on LCD 201 (FIG. 1) (S8*a*). S7*a* may not be necessary depending on the type of LCD 201 used. The audio data stored in Area 270*a* is processed by Sound Processor 205 (FIG. 1) (S6*b*). The processed audio data is converted into analog data by D/A 204 (FIG. 1) (S7*b*) and output from Speaker 216 (FIG. 1) (S8*b*). The sequences of S6*a* through S8*a* and S6*b* through S8*b* are continued until a specific signal indicating to stop such sequence is input by utilizing Input Device 210 (FIG. 1) or via the voice recognition system (S9).

As described in FIG. 191, Message MS1*a* is shown at the upper right corner of LCD 201 (FIG. 1) indicating that a new email has arrived while video/photo mode is implemented.

FIG. 192 illustrates the data stored in Email Data Calculating Area 206*c* (FIG. 111) and Email Data Storage Area 206*d* (FIG. 111) in order to implement the incoming message function. Email Data Calculating Area 206*c* includes Incoming Message Calculating Area 206*k* which stores a software program described in FIG. 193 hereinafter, and Email Data Storage Area 206*d* includes Message Data Storage Area (MS1*a*) 206*ma* which stores the text data of MS1*a* (in the present example, the text data 'Email' as shown in FIG. 191).

FIG. 193 illustrates the software program stored in Incoming Message Calculating Area 206*k* (FIG. 192). First of all, CPU 211 (FIG. 1) checks whether a new incoming message has arrived by scanning Email Data Storage Area 206*d* (FIG. 192) (S1). If a new message has arrived (S2), CPU 211 retrieves the text data (MS1*a*) from Message Data Storage Area (MS1*a*) 206*ma* and displays on LCD 201 (FIG. 1) as described in FIG. 191 for a specified period of time (S3). The software program is executed periodically with a fixed interval.

As described in FIG. 194, Message MS2*a* is shown on LCD 201 (FIG. 1) when the video recording function is implemented, and Message MS3*a* is shown when the implementation of the video recording function has been terminated.

FIG. 195 illustrates the software program stored in Video/Photo Software Storage Area 20610*b* (FIG. 176) to display messages MS2*a* and MS3*a* on LCD 201 (FIG. 1) described in FIG. 194. When a start recording signal has been input by utilizing Input Device 210 (FIG. 1) or via voice recognition system, CPU 211 (FIG. 1) initiates the recording process, i.e., the process described in FIG. 184 hereinbefore (S1). During the recording process, the text data of Message MS2*a* is retrieved from Message Data Storage Area (MS2*a*, MS3*a*) 20610*h* (FIG. 177) and displayed at the upper right corner of LCD 201 (FIG. 1) as described in FIG. 194 indicating that the video recording function is in process (S2). If the stop recording signal is input by utilizing Input Device 210 (FIG. 1) or via voice recognition system indicating to stop the video recording process (S3), CPU 211 stops the video recording process (S4), and retrieves the text data of Message MS3*a* from Message Data Storage Area (MS2*a*, MS3*a*) 20610*h* and displays at the upper right corner of LCD 201 as shown in FIG. 194 for a specified period of time (S5). Since Video Data Storage Area 20610*c* and Audio Data Storage Area 20610*d* are divided into several sectors as stated above, a plurality of software program described in FIG. 195 can be activated to record and store a plurality of video data and the corresponding audio data simultaneously.

FIG. 196 illustrates the software program stored in Video/Photo Software Storage Area 20610*b* (FIG. 176) to playback the recorded video data and the corresponding audio data. First, a video data is selected and playback signal is input by utilizing Input Device 210 (FIG. 1) or via voice recognition system (S1). Once these signals are received, CPU 211 (FIG. 1) initiates the playback process of the recorded video data, i.e., CPU 211 retrieves the selected video data from Video Data Storage Area 20610*c* (FIG. 177) and the corresponding audio data from Audio Data Storage Area 20610*d* (FIG. 178), and Video Processor 202 (FIG. 1) processes the channel data to be displayed on LCD 201 (FIG. 1) (S2). This playback process continues until a stop playback signal is input by utilizing Input Device 210 or via voice recognition system (S3). When a stop playback signal is input by utilizing Input Device 210 or via voice recognition system, CPU 211 stops the foregoing process, and retrieves the text data of Message MS3*a* from Message Data Storage Area (MS2*a*, MS3*a*) 20610*h* (FIG. 177) and displays at the upper right corner of LCD 201 as shown in FIG. 194 for a specified period of time (S4).

FIG. 197 illustrates the software program stored in Video/Photo Software Storage Area 20610*b* (FIG. 176). When the photo mode is selected in S2 in FIG. 182, the photo mode is initiated and CPU 211 (FIG. 1) is ready to capture and store the photo data in one of the areas of Photo Data Storage Area 20610*e* (FIG. 179) (S1). Next, the photo process is initiated which is described in details in FIG. 199 (S2*a*) until a specific signal is input by utilizing Input Device 210 (FIG. 1) or via voice recognition system (S3). The indicator process is activated simultaneously which is described in details in FIG. 201 hereinafter (S2*b*).

As described in FIG. 198, Message MS4*a* is shown on LCD 201 (FIG. 1) when a photo is taken with Communication Device 200.

FIG. 199 illustrates the software program stored in Video/Photo Software Storage Area 20610*b* (FIG. 176) to implement the photo mode. When a start recording signal has been input by utilizing Input Device 210 (FIG. 1) or via voice recognition system (S1), CPU 211 (FIG. 1) initiates the recording process, i.e., retrieves an image data input from CCD Unit 214 (FIG. 1), which is currently displayed on LCD 201 (FIG. 1), and stores in one of the sectors of Photo Data Storage Area 20610*e* (FIG. 179), for example Photo #1 described in FIG. 179 (S2). CPU 211 retrieves the text data of Message MS4*a* from Message Data Storage Area (MS4*a*) 20610*i* (FIG. 179) and displays at the upper right corner of LCD 201 (FIG. 1) as described in FIG. 198 for a specific period of time indicating that a photo data has been taken and stored (S3). Then CPU 211 retrieves the photo data which is just stored in Photo Data Storage Area 20610*e*, and Video Processor 202 (FIG. 1) processes the photo data to be displayed on LCD 201 (FIG. 1) for a specific period of time (S4). Since Photo Data Storage Area 20610*e* is divided into several sectors as stated above, S1 from S4 can be repeated to record and store a plurality of image data.

FIG. 200 illustrates the software program stored in Video/Photo Software Storage Area 20610*b* (FIG. 176) to display the recorded photo data. First, a photo data is selected by utilizing Input Device 210 (FIG. 1) or via voice recognition system (S1). When this signal is received, CPU 211 (FIG. 1) initiates the display process of the recorded photo data, i.e., CPU 211 retrieves the selected photo data from Photo Data Storage Area 20610*e*, for example Photo #1 described in FIG. 179, and Video Processor 202 (FIG. 1) processes the selected photo data to be displayed on LCD 201 (FIG. 1) (S2). The photo data is displayed until a close signal is input by utilizing Input Device 210 or via voice recognition system (S3). When a close signal is input by utilizing Input Device 210 or via voice recognition system, CPU 211 terminates to display the photo data (S4).

FIG. 201 illustrates the software program stored in Video/Photo Software Storage Area 20610*b* (FIG. 176) which implements the indicator process of Communication Device 200, i.e., S2*b* of FIG. 197. As described in FIG. 201, CPU 211 (FIG. 1) scans the photo mode section of Indicator Data Storage Area 20610*g* (FIG. 180) and retrieves an indicator data therefrom (S1) and activate Indicator 212 (FIG. 1 and FIG. 173) in accordance with the indicator data (S2). In the embodiment explained in FIG. 180, Indicator 212 emits green light while Communication Device 200 is in the photo mode and Indicator 212 remains to be on in the embodiment explained in FIG. 181. The sequence of S1 through S2 is continued until a specific signal indicating to stop such sequence is input from Input Device 210 (FIG. 1) or by the voice recognition system (S3).

<<Call Taxi Function>>

FIG. 202 through FIG. 240 illustrate the call taxi function of Communication Device 200, i.e., the function to call taxi by way of utilizing Communication Device 200.

FIG. 202 illustrates the relationship of each element required to implement the present function. As described in FIG. 202, Communication Device 200 is connected to Host H via Network NT, such as the Internet. Host H is connected to a plurality of Taxi Tx in a wireless fashion.

FIG. 203 illustrates the software program installed in Communication Device 200 to initiate the present function. First of all, a list of modes is displayed on LCD 201 (FIG. 1) (S1). When an input signal is input by utilizing Input Device 210 (FIG. 1) or via voice recognition system to select a specific mode (S2), the selected mode is activated. In the present example, the communication mode is activated (S3*a*) when the communication mode is selected in the previous step, the game download mode and the game play mode are activated (S3*b*) when the game download mode and the game play mode are selected in the previous step, and the call taxi function is activated (S3*c*) when the call taxi function is selected in the previous step. The modes displayed on LCD 201 in S1 which are selectable in S2 and S3 may include all functions and modes explained in this specification. Once the selected mode is activated, another mode can be activated while the first activated mode is still implemented by going through the steps of S1 through S3 for another mode, thereby enabling a plurality of functions and modes being performed simultaneously (S4).

FIG. 204 illustrates the data stored in RAM 206 (FIG. 1). As described in FIG. 204, the data to activate (as described in S3*a* of the previous figure) and to perform the communication mode is stored in Communication Data Storage Area 2061*a*, the data to activate (as described in S3*b* of the previous figure) and to perform the game download mode and the game play mode are stored in Game DL/Play Data Storage Area 2061*b*/2061*c*, and the data to activate (as described in S3*c* of the previous figure) and to perform the call taxi function is stored in Call Taxi Information Storage Area 20611*a*.

FIG. 205 and FIG. 206 illustrate the sequence of display shown on LCD 201 (FIG. 1). First of all, a menu screen is shown on LCD 201 (S1) from which the user of Communication Device 200 activates the call taxi function as described in S2 of FIG. 203 by selecting the icon 'Call Taxi Function' displayed on LCD 201 (S2). When the call taxi function is activated, a prompt to identify the pick up location is displayed on LCD 201 (S3*a*). The user of Communication Device 200 may choose the pick up location by selecting one of the two options displayed on LCD 201 as described in S3*a*. The current location of Communication Device 200 is determined as the pick up location if '# Current Location' is selected. If, on the other hand, '# Choose Location' is selected, a 3D map which covers about 3 mile radius from the current position is displayed on LCD 201 from which the pick up location is selected by pinpointing the desired location to be picked up by utilizing Input Device 210 (FIG. 1) or via voice recognition system (S3*b*). Next, the time to pick up is determined by selecting one of the options as described in S4 (FIG. 206). Here, three fixed options are displayed, i.e., '# 5 min later', '# 10 min later', and '# 30 min later'. The pick up time is calculated as the current time plus 5 minutes if the first option is chosen. The pick up time is calculated as the current time plus 10 minutes if the second option is chosen. The pick up time is calculated as the current time plus 30 minutes if the third option is chosen. The pick up time may also be determined by selecting the fourth option ('# ______ min later') and input a desired figure into the blank by Input Device 210 or via voice recognition system. The number of the passengers is determined by selecting one of the four fixed options (#1, #2, #3, #4) or by selecting the fifth option and input a desired figure into the blank by input devise 210 or via voice recognitions system (S5). A prompt to determine the destination is displayed on LCD 201 as the last step (S6). The street address to which the user of Communication Device 200 is intending to go is typed into the blank by Input Device 210 or via voice recognition system. Or as another embodiment, a 3D map may be displayed on LCD 201 and the user may pinpoint the location thereon.

FIG. 207 illustrates the software program stored in Host H (FIG. 202). As described in FIG. 207, Host H includes Host Call Taxi Software Storage Area H11*a* which stores the software program to be downloaded by Communication Device 200 to implement the call taxi function.

FIG. 208 illustrates the sequence of Communication Device 200 to download the software program stored in Host Call Taxi Software Storage Area H11*a* (FIG. 207). As described in FIG. 208, Communication Device 200 connects to Host H (FIG. 202) (S1). Once a connection is established in a wireless fashion via Network NT (FIG. 202), the software program stored in Host Call Taxi Software Storage Area H11*a* is downloaded to Communication Device 200 (S2). The downloaded software program is then decompressed and stored in the area specified in FIG. 209 hereinafter (S3).

FIG. 209 illustrates the software programs and data stored in Call Taxi Information Storage Area 20611*a* (FIG. 204). As described in FIG. 209, Call Taxi Information Storage Area 20611*a* includes Call Taxi Software Storage Area 20611*b* and Call Taxi Data Storage Area 20611*c*. Here, Call Taxi Software Storage Area 20611*b* stores a series of software programs downloaded from Host Call Taxi Software Storage Area H11*a* (FIG. 207) which are explained in details hereinafter, and Call Taxi Data Storage Area 20611*c* stores the data required to execute a series of software programs and to implement the call taxi function which are also explained in details hereinafter.

FIG. 210 illustrates one of the software programs stored in Call Taxi Software Storage Area 20611*b* (FIG. 209) to activate the call taxi function. As described in S1 of FIG. 205, a menu screen is shown on LCD 201 under the control of CPU 211 (FIG. 1) from which the user of Communication Device 200 activates the call taxi function as described in S2 of FIG. 203 (S1). Next, CPU 211 activates the call taxi function when the icon 'Call Taxi Function' displayed on LCD 201 described in S2 of FIG. 205 is selected (S2).

FIG. 211 illustrates one of the software programs stored in Call Taxi Software Storage Area 20611*b* (FIG. 209) which determines a set of key information in order to call a taxi, i.e., the pick up location, the pick up time, the number of passengers, and the destination. As described in FIG. 211, CPU 211 (FIG. 1), first of all, executes the pick up location determination process (S1). Next, CPU 211 executes the pick up time determination process (S2). Thirdly, CPU 211 executes the passenger number determination process (S3). And fourthly, CPU 211 executes the destination determination process (S4). Each process is explained in details hereinafter. Each and every data produced in each step are stored in Call Taxi Data Storage Area 20611*c* (FIG. 209).

FIG. 212 illustrates the software program to execute S1 ('Pick Up Location Determination Process') of FIG. 211. First, CPU 211 (FIG. 1) displays a pick up location prompt (S1) as described in S3*a* of FIG. 205. If '# Current Location' is selected in S3*a* of FIG. 205 (S2), CPU 211 determines that the pick up location is the current geographic location of Communication Device 200 (S4*b*). The current geographic location of Communication Device 200 is calculated by GPS system explained hereinbefore. If '# Choose Location' is selected in S3*a* of FIG. 205 (S2), CPU 211 retrieves a 3D map stored in Call Taxi Data Storage Area 20611*c* (FIG. 209) which covers about 3 mile radius from the current position and displays on LCD 201 (FIG. 1) (S4*a*). The 3D map is downloaded from 3D Map Storage Area H11*e* of Host H (FIG. 202), which is explained in FIG. 219 hereinafter, when the software program stored in Host Call Taxi Software Storage Area H11*a* (FIG. 207) is downloaded to Communication Device 200 as explained in FIG. 208 hereinbefore. Once a pick up location is selected by pinpointing the desired location to be picked up by Input Device 210 (FIG. 1) or via voice recognition system (S5), CPU 211 determines as the selected location to be the pick up location (S6).

FIG. 213 illustrates the software program to execute S2 ('Pick Up Time Determination Process') of FIG. 211. First of all, CPU 211 (FIG. 1) displays the four options on LCD 201 (FIG. 1), i.e., '#5 min later', '#10 min later', '#30 min later', and '# ______ min later' as described in S4 of FIG. 206 (S1). Next, one of the four options is selected by Input Device 210 (FIG. 1) or via voice recognition system (S2). Here, CPU 211 determines the pick up time as the value of the current time plus 5 minutes if the first option is selected. CPU 211 determines the pick up time as the value of the current time plus 10 minutes if the second option is selected. CPU 211 determines the pick up time as the value of the current time plus 30 minutes if the third option is selected. CPU 211 determines the pick up time as the value of the current time plus the figure input into the blank by Input Device 210 (FIG. 1) or via voice recognition system if the fourth option is selected.

FIG. 214 illustrates the software program to execute S3 ('Passenger Number Determination Process') of FIG. 211. First, CPU 211 (FIG. 1) displays the five options ('#1', '#2', '#3', '#4', and '# ______') as described in S5 of FIG. 206. Next, one of the five options is selected by Input Device 210 (FIG. 1) or via voice recognition system (S2). Here, CPU 211 determines that the number of passengers is '1' if the first option is selected. CPU 211 determines that the number of passengers is '2' if the second option is selected. CPU 211 determines that the number of passengers is '3' if the third option is selected. CPU 211 determines that the number of passengers is '4' if the fourth option is selected. CPU 211 determines that the number of passengers is the figure input into the blank if the fifth option is selected.

FIG. 215 illustrates the software program to execute S4 ('Destination Determination Process') of FIG. 211. First, CPU 211 displays a destination prompt with a blank into which the street address of the destination is input (S1). Next, the street address of the destination is input by Input Device 210 (FIG. 1) or via voice recognition system (S2). As another embodiment, a 3D map may be displayed on LCD 201 (FIG. 1) and the user may pinpoint the location thereon by Input Device 210 or via voice recognition system. The method to display a 3D map on LCD 201 is explained hereinbefore. As another embodiment, a list of destinations may be retrieved from RAM 206 (FIG. 1) and be displayed on LCD 201 and one of them may be selected by Input Device 210 or via voice recognition system.

FIG. 216 illustrates one of the software programs stored in Call Taxi Software Storage Area 20611*b* (FIG. 209) to send the data produced in FIG. 211 through FIG. 215 to Host H (FIG. 202). First, Communication Device 200 is connected to Host H via Network NT (FIG. 202) in a wireless fashion (S1). CPU 211 (FIG. 1) then formats the data and sends to Host H via Antenna 218 (FIG. 1) as Taxi Inquiry Data TID which is explained in details in FIG. 217 hereinafter.

FIG. 217 illustrates the format of the Taxi Inquiry Data TID described in S2 of FIG. 216. As described in FIG. 217, the Taxi Inquiry Data TID is composed of Header TID1, Caller ID TID2, Pick Up Location Data TID3, Pick Up Time Data TID4, Passenger Number Data TID5, Destination Data TID6, and Footer TID7. Here, Caller ID TID2 is an identification number of Communication Device 200 (e.g., the phone number designated thereto), Pick Up Location Data TID3 is the geographic location data produced by the software program described in FIG. 212, Pick Up Time Data TID4 is the data produced by the software program described in FIG. 213, Passenger Number Data TID5 is the data produced by the software program described in FIG. 214, Destination Data TID6 is the data produced by the software program produced in FIG. 215. Header TID1 and Footer TID7 represent the beginning and end of Taxi Inquiry Data TID respectively.

FIG. 218 illustrates the response of Host H (FIG. 202) when it receives Taxi Inquiry Data TID (FIG. 217). First, Host H periodically checks the incoming wireless signal (S1). If the incoming wireless signal is Taxi Inquiry Data TID (S2), Host H stores the data to Taxi Inquiry Data Storage Area H11*c* explained in FIG. 219 hereinafter (S3).

FIG. 219 illustrates the data stored in Host H (FIG. 202). As described in FIG. 219, Host H includes Taxi Data Storage Area H11*b*, Taxi Inquiry Data Storage Area H11*c*, Attribution Data Storage Area H11*d*, and 3D Map Storage Area H11*e*. Taxi data Storage Area H11*b* is explained in FIG. 220 hereinafter. Taxi Inquiry Data TID detected by the software program described in FIG. 218 is decompressed and stored into Taxi Inquiry Data Storage Area H11*c*. Attribution data Storage Area H11*d* stores a plurality of attribution data, such as data regarding roadblocks, traffic accidents, and road constructions, and traffic jams. The attribution data stored in Attribution Data Storage Area H1*d* is updated periodically. 3D Map Storage Area H11*e* stores a plurality of 3D maps which represent the sectors administered by Host H.

FIG. 220 illustrates the data stored in Taxi Data Storage Area H11*b*. As described in FIG. 220, taxi data storage area H11*b* is categorized in certain fields, i.e., 'Taxi ID', 'Current Location', 'Status', 'Destination', 'Max Passenger #', 'Company', and 'Rate'. The field 'Taxi ID' represents the identification number of each taxi (e.g., license number). The field 'Current Location' represents the current geographical location of each taxi. The field 'Status' represents the current status of each taxi, i.e., whether vacant or occupied. The field 'Destination' represents the geographical location representing the current destination of each taxi. The field 'Max Passenger #' represents the maximum passenger number which can be carried by each taxi at a time. The 'Company' represents the company name to which each taxi belongs. The 'Rate' represents the rate per mile charged by each taxi. Taking for example described in FIG. 220, 'Taxi #1' is currently at the geographical location of 'x1, y1, z1', and the current status is 'Occupied'. Its destination is 'x9, y9, z9' (namely, 'Taxi #1' is currently on its way to destination 'x9, y9, z9') and the maximum passenger number capable to carry at a time is '4'. The company name to which it belongs is 'A Taxi Corp.' and the rate is '$2/mile'. With regard to 'Taxi #2', it is currently at the geographical location of 'x2, y2, z2', and the current status is 'Occupied'. Its destination is 'x10, y10, z10' (namely, 'Taxi #2' is currently on its way to destination 'x10, y10, z10') and the maximum passenger number capable to carry at a time is '4'. The company name to which it belongs is 'A Taxi Corp.' and the rate is '$2/mile'. With regard to 'Taxi #3', it is currently at the geographical location of 'x3, y3, z3', and the current status is 'Vacant'. Its destination is 'Null' since the current status is 'Vacant', and the maximum passenger number capable to carry at a time is '4'. The company name to which it belongs is 'A Taxi Corp.' and the rate is '$2/mile'. With regard to 'Taxi #4', it is currently at the geographical location of 'x4, y4, z4', and the current status is 'Vacant'. Its destination is 'Null' since the current status is 'Vacant', and the maximum passenger number capable to carry at a time is '4'. The company name to which it belongs is 'A Taxi Corp.' and the rate is '$2/mile'. With regard to 'Taxi #5', it is currently at the geographical location of 'x5, y5, z5', and the current status is 'Occupied'. Its destination is 'x11, y11, z11' (namely, 'Taxi #5' is currently on its way to destination 'x11, y11, z11') and the maximum passenger number capable to carry at a time is '8'. The company name to which it belongs is 'B Taxi Corp.' and the rate is '$3/mile'. With regard to 'Taxi #6', it is currently at the geographical location of 'x6, y6, z6', and the current status is 'Occupied'. Its destination is 'x12, y12, z12' (namely, 'Taxi #6' is currently on its way to destination 'x12, y12, z12') and the maximum passenger number capable to carry at a time is '8'. The company name to which it belongs is 'B Taxi Corp.' and the rate is '$3/mile'. With regard to 'Taxi #7', it is currently at the geographical location of 'x7, y7, z7', and the current status is 'Vacant'. Its destination is 'Null' since the current status is 'Vacant', and the maximum passenger number capable to carry at a time is '4'. The company name to which it belongs is 'B Taxi Corp.' and the rate is '$3/mile'. With regard to 'Taxi #8', it is currently at the geographical location of 'x8, y8, z8', and the current status is 'Vacant'. Its destination is 'Null' since the current status is 'Vacant', and the maximum passenger number capable to carry at a time is '4'. The company name to which it belongs is 'B Taxi Corp.' and the rate is '$3/mile'.

FIG. 221 illustrates the software program stored in Host H (FIG. 202) to select the five candidates from the taxi registered in the field 'Taxi ID' of Taxi Data Storage Area H11*b* (FIG. 219 and FIG. 220). First, Host H retrieves Caller ID TID2, Pick Up Location Data TID3, Pick Up Time Data TID4, Passenger Number Data TID5, and Destination Data TIDE from Taxi Inquiry Data Storage Area H11*c* (FIG. 219 and FIG. 220) (S1). By referring to the retrieved data, Host H scans Taxi Data Storage Area H11*b* and retrieves a plurality of taxis which match with the conditions stated therein (e.g., the requested passenger number to be carried—Passenger Number Data TID5) (S2), and then selects the five taxis therefrom which most match with the conditions (S3). Next, the estimated waiting time is calculated for the five selected taxis of which the details are explained in the next two drawings (S4). Prices of the five selected taxis are estimated by calculating, in the first place, the distance between the pick up location and the destination, and multiplying with the value stored in the field 'Rate' (S5). The best route from the pick up location to the destination is calculated (S6). Here, Host H takes into consideration the attribution data stored in Attribution Data Storage Area H11*d* (FIG. 219 and FIG. 220), such as data regarding road blocks, traffic accidents, road constructions, and traffic jams when calculating the best route. Once the sequence from S1 to S6 is completed, Host H forms and sends to Communication Device 200 via Antenna 218 (FIG. 1) in a wireless fashion Estimated Information Data EID, which is explained in FIG. 224 hereinafter (S7).

FIG. 222 illustrates the method of calculating the estimated waiting times for the five selected taxis described in S4 of FIG. 221 when the taxi is vacant, i.e., the field 'Status' of Taxi Data Storage Area H11*b* is 'Vacant'. When the taxi is vacant, the estimated waiting time is calculated by referring to the distance from the current location to the pick up location (S1). For example, if 'Taxi #3' is selected as one of the selected five taxis in S3 of FIG. 221, the estimated waiting time is calculated by the method explained in FIG. 222.

FIG. 223 illustrates the method of calculating the estimated waiting times for the five selected taxis described in S4 of FIG. 221 when the taxi is occupied, i.e., the field 'Status' of Taxi Data Storage Area H11*b* is 'Occupied'. When the taxi is occupied, first of all, the estimated waiting time of the taxi moving from the current location to the destination is calculated (S1). Next, the estimated waiting time of the taxi moving from the destination to the pick up location is calculated (S2). The two values derived from S1 and S2 are added (S3), and the sum is treated as the estimated waiting time for purposes of the present function. For example, if 'Taxi #1' is selected as one of the selected five taxis in S3 of FIG. 221, the estimated waiting time is calculated by the method explained in FIG. 223.

FIG. 224 illustrates the content of Estimated Information Data EID, i.e., the data sent from Host H (FIG. 202) to Communication Device 200 as explained in S7 of FIG. 221. As described in FIG. 224, Estimated Information Data EID is composed of Header EID1, Caller ID EID2, Host ID EID3, Estimated Waiting Time Data EID4, Estimated Price Data EID5, Estimated Best Route Data EID6, and Footer EID7. Here, Caller ID EID2 is the recipient of Estimated Information Data EID, Host ID EID3 is the sender of Estimated Information Data EID, Estimated Waiting Time Data EID4 is the data calculated in S4 of FIG. 221 for the five selected taxis, Estimated Price Data EID5 is the data calculated in S5 of FIG. 221 for the five selected taxis, Estimated Best Route Data EID6 is the data produced in S6 of FIG. 221. Header EID1 and Footer EID7 represent the beginning and end of Estimated Information Data EID respectively.

FIG. 225 illustrates one of the software programs stored in Call Taxi Software Storage Area 20611*b* (FIG. 209) to display the components of Estimated Information Data EID (FIG. 224). As described in FIG. 225, CPU 211 (FIG. 1) periodically checks the incoming signal (S1). If the incoming signal is Estimated Information Data EID (S2), CPU 211 retrieves data therefrom and displays on LCD 201 (FIG. 1) the estimated waiting times and the estimated prices of the five selected taxis, and the estimated best route data from the pick up location to the destination (S3). One of the five selected taxis is selected (referred as 'Taxi TxS' hereinafter) by Input Device 210 (FIG. 1) or via voice recognition system (S4). The identity of the taxi selected in S4 is sent to Host H (FIG. 202) (S5) as Call Taxi Data CTD, which is explained in FIG. 226 hereinafter.

FIG. 226 illustrates Call Taxi Data CTD sent from Communication Device 200 to Host H (FIG. 202) as explained in S5 of FIG. 225. As described in FIG. 226, Call Taxi Data CTD is composed of Header CTD1, Host ID CTD2, Caller ID CTD3, Taxi ID CTD4, and Footer CTD5. Here, Host ID CTD2 is the recipient of Call Taxi Data CTD, Caller ID CTD3 is the sender of Call Taxi Data CTD, and Taxi ID CTD4 is the identification of Taxi TxS selected in S4 of FIG. 225. Header CTD1 and Footer CTD5 represent the beginning and end of Call Taxi Data CTD respectively.

FIG. 227 illustrates the response by Host H (FIG. 202) when Call Taxi Data CTD (FIG. 226) is received. As described in FIG. 227, Host H periodically checks the incoming signal (S1). If the incoming signal is Call Taxi Data CTD (S2), Host H retrieves the identification of Taxi TxS (i.e., Taxi ID CTD4 in FIG. 226) therefrom, and calculates the approaching route data (S3). The approaching route data is the data for the selected taxi to approach to the pick up location from its current location. Here, Host H takes into consideration the attribution data stored in Attribution Data Storage Area H11*d* (FIG. 219 and FIG. 220), such as road blocks, traffic accidents, and road constructions, and traffic jams when calculating the approaching route data. Next, Host H sends to Taxi TxS the Pick Up Information Data (S4), the Estimated Information Data (S5), and the approaching route data (S6), each of which are explained in FIG. 228, FIG. 229, and FIG. 230 respectively hereinafter. After the foregoing sequence is completed, Host H changes the field 'Status' (FIG. 220) of the selected taxi to 'Occupied' (S7).

FIG. 228 illustrates Pick Up Information Data PUID sent from Host H (FIG. 202) to Taxi TxS. As described in FIG. 228, Pick Up Information Data PUID is composed of Header PUID1, Taxi ID PUID2, Host ID PUID3, Pick Up Location Data PUID4, Pick Up Time Data PUID5, Passenger Number Data PUID6, Destination Data PUID7, Caller ID PUID8, and Footer PUID9. Here, Taxi ID PUID2 is the recipient of Pick Up Information Data PUID, i.e., the identification of Taxi TxS, and Host ID PUID3 is the sender of Pick Up Information Data PUID. Pick up location data PUID4 is the geographic location data produced by the software program described in FIG. 212, which is identical to Pick Up Location Data TID3 in FIG. 217, Pick Up Time Data PUID5 is the data produced by the software program described in FIG. 213, which is identical to Pick Up Time Data TID4 in FIG. 217, Passenger Number Data PUID6 is the data produced by the software program described in FIG. 214, which is identical to Passenger Number Data TID5 in FIG. 217, Destination Data PUID7 is the data produced by the software program produced in FIG. 215, which is identical to Destination Data TIDE in FIG. 217, and Caller ID PUID8 is an identification number of Communication Device 200 (e.g., the phone number designated thereto), which is identical to Caller ID TID2 in FIG. 217. Header PUID1 and Footer PUID9 represent the beginning and end of Pick Up Information Data PUID respectively.

FIG. 229 illustrates Estimated Information Data EIDa sent from Host H (FIG. 202) to Taxi TxS. As described in FIG. 229, Estimated Information Data EIDa is composed of Header EIDa1, Taxi ID EIDa2, Host ID EIDa3, Estimated Waiting Time Data EIDa4, Estimated Price Data EIDa5, Estimated Best Route Data EIDa6, and Footer EIDa7. Here, Taxi ID EIDa2 is the recipient of Estimated Information Data EIDa, Host ID EIDa3 is the sender of Estimated Information Data EIDa, Estimated Waiting Time Data EIDa4 is the data calculated in S4 of FIG. 221 for Taxi TxS, Estimated Price Data EIDa5 is the data calculated in S5 of FIG. 221 for Taxi TxS, and Estimated Best Route Data EIDa6 is the data produced in S6 of FIG. 221, which is identical to Best Route Data EID6 in FIG. 224. Header EIDa1 and Footer EIDa7 represent the beginning and end of Estimated Information Data EID respectively.

FIG. 230 illustrates Approaching Route Data ARD sent from Host H (FIG. 202) to TxS. As described in FIG. 230, Approaching Route Data ARD is composed of Header ARD1, Taxi ID ARD2, Host ID ARD3, Approaching Route Data ARD4, and Footer ARD. Here, Taxi ID ARD2 is the recipient of Approaching Route Data ARD, Host ID ARD3 is the sender of Approaching Route Data ARD, and Approaching Route Data ARD4 is the data produced in S3 of FIG. 227. Header ARD1 and Footer ARD5 represent the beginning and end of Approaching Route Data ARD respectively.

FIG. 231 illustrates a software program stored in Taxi TxS which notifies Host H (FIG. 202) the current location of Taxi TxS. As described in FIG. 231, Taxi TxS periodically checks its current geographical location (S1). Taxi TxS then sends in a wireless fashion to Host H Taxi Current Location Data TCLD which includes the current geographical location of which the details are described in FIG. 232 hereinafter (S2).

FIG. 232 illustrates Taxi Current Location Data TCLD sent from Taxi TxS to Host H (FIG. 202) explained in FIG. 231. As described in FIG. 232, Taxi Current Location Data TCLD is composed of Header TCLD1, Host ID TCLD2, Taxi ID TCLD3, Taxi Current Location Data TCLD4, and Footer TCLD5. Here, Host ID TCLD2 is the recipient of Taxi Current Location Data TCLD, Taxi ID TCLD3 is the sender of Taxi Current Location Data, and Taxi Current Location Data TCLD4 is the data produced in S1 of FIG. 231. Header TCLD1 and Footer TCLD5 represent the beginning and end of Taxi Current Location Data TCLD respectively.

FIG. 233 illustrates the response of Host H (FIG. 202) when receiving Taxi Current Location Data TCLD described in FIG. 232. As described in FIG. 233, Host H periodically checks the incoming signal (S1). If the incoming signal is Taxi Current Location Data TCLD (S2), Host H calculates and thereby updates the estimated waiting time based on the just received Taxi Current Location Data TCLD (S3). Host H then sends to Communication Device 200 Updated Taxi Current Information Data UTCID of which the details area explained in FIG. 234 hereinafter (S4).

FIG. 234 illustrates Updated Taxi Current Information Data UTCID sent in S4 of FIG. 233. As described in FIG. 234, Updated Taxi Current Information Data UTCID is composed of Header UTCID1, Caller ID UTCID2, Host ID UTCID3, Taxi ID UTCID4, Taxi Current Location Data UTCID5, 3D Map UTCID6, Estimated Waiting Time Data UTCID7, and Footer UTCID8. Here, Caller ID UTCID2 is the recipient of Taxi Current Information Data UTCID, Host ID UTCID3 is the sender of Taxi Current Information Data UTCID, Taxi ID UTCID4 is the identification of Taxi TxS, Taxi Current Location Data UTCID5 is the current geographical location of Taxi TxS which is identical to Taxi Current Location Data TCLD4 in FIG. 232, 3D Map UTCID6, a three-dimensional map data, which is retrieved from 3D Map Storage Area H11*e* (FIG. 219 and FIG. 220) and which is designed to be displayed on LCD 201 (FIG. 1) to indicate current geographical location of Taxi TxS and the pick up location, and Estimated Waiting Time Data UTCID7 is the data produced in S3 of FIG. 233. Header UTCID1 and Footer UTCID8 represent the beginning and end of Updated Taxi Current Information Data UTCID respectively.

FIG. 235 illustrates one of the software programs stored in Call Taxi Software Storage Area 20611*b* (FIG. 209) which is executed when Updated Taxi Current Information Data UTCID (FIG. 234) is received. As described in FIG. 235, CPU 211 (FIG. 1) periodically checks the incoming signal (S1). If the incoming signal is Updated Taxi Current Information Data UTCID (S2), CPU 211 retrieves 3D Map UTCID6 therefrom and displays on LCD 201 (FIG. 1) (S3). Next, CPU 211 retrieves Taxi ID UTCID4, Taxi Current Location Data UTCID5, and Estimated Waiting Time Data UTCID7 and displays on LCD 201 (S4) with the current location of Communication Device 200 (S5).

FIG. 236 through FIG. 240 are of the explanations after Taxi TxS has arrived to the pick up location.

FIG. 236 illustrates a software program stored in Taxi TxS which notifies Host H (FIG. 202) the current location of Taxi TxS. As described in FIG. 236, Taxi TxS periodically checks its current geographical location (S1). Taxi TxS then sends to Host H Taxi Current Location Data TCLDa which includes the current geographical location of which the details are described in FIG. 237 hereinafter (S2).

FIG. 237 illustrates Taxi Current Location Data TCLDa sent from Taxi TxS to Host H (FIG. 202) explained in FIG. 236. As described in FIG. 237, Taxi Current Location Data TCLDa is composed of Header TCLDa1, Host ID TCLDa2, Taxi ID TCLDa3, Taxi Current Location Data TCLDa4, and Footer TCLDa5. Here, Host ID TCLDa2 is the recipient of Taxi Current Location Data TCLDa, Taxi ID TCLDa3 is the sender of Taxi Current Location Data, and Taxi Current Location Data TCLDa4 is the data produced in S1 of FIG. 236. Header TCLDa1 and Footer TCLDa5 represent the beginning and end of Taxi Current Location Data TCLDa respectively.

FIG. 238 illustrates the response of Host H (FIG. 202) when receiving Taxi Current Location Data TCLDa described in FIG. 237. As described in FIG. 238, Host H periodically checks the incoming signal (S1). If the incoming signal is Taxi Current Location Data TCLDa (S2), Host H calculates and thereby updates the estimated waiting time based on the just received Taxi Current Location Data TCLDa (S3). Host H then sends to Communication Device 200 updated Estimated Destination Arrival Time Data UEDATD of which the details are explained in FIG. 239 hereinafter.

FIG. 239 illustrates updated Estimated Destination Arrival Time Data UEDATD sent in S4 of FIG. 238. As described in FIG. 239, updated Estimated Destination Arrival Time Data UEDATD is composed of Header UEDATD1, Caller ID UEDATD2, Host ID UEDATD3, Taxi ID UEDATD4, Taxi Current Location Data UEDATD5, 3D Map UEDATD6, Estimated Waiting Time Data UEDATD7, and Footer UEDATD8. Here, Caller ID UEDATD2 is the recipient of updated Estimated Destination Arrival Time Data UEDATD, Host ID UEDATD3 is the sender of updated Estimated Destination Arrival Time Data UEDATD, Taxi ID UEDATD4 is the identification of Taxi TxS, Taxi Current Location Data UEDATD5 is the current geographical location of Taxi TxS, 3D Map UEDATD6 is a three-dimensional map data which is retrieved from 3D Map Storage Area H11*e* (FIG. 219 and FIG. 220) and which is designed to be displayed on LCD 201 (FIG. 1) to indicate current geographical location of Taxi TxS and the pick up location, and Estimated Waiting Time Data UEDATD7 is the data produced in S3 of FIG. 233. Header UEDATD1 and Footer UEDATD8 represent the beginning and end of updated Estimated Destination Arrival Time Data UEDATD respectively.

FIG. 240 illustrates one of the software programs stored in Call Taxi Software Storage Area 20611*b* (FIG. 209) which is executed when updated Estimated Destination Arrival Time Data UEDATD (FIG. 239) is received. As described in FIG. 240, CPU 211 (FIG. 1) periodically checks the incoming signal (S1). If the incoming signal is updated Estimated Destination Arrival Time Data UEDATD (S2), CPU 211 retrieves 3D Map UEDATD6 therefrom and displays on LCD 201 (FIG. 1) (S3). Next, CPU 211 retrieves Taxi ID UEDATD4, Taxi Current Location Data UEDATD5, and Estimated Destination Arrival Time Data UEDATD7 and displays on LCD 201 (S4) with the current location of Communication Device 200 (S5).

<<Address Book Updating Function>>

FIG. 241 through FIG. 258 illustrate the address book updating function of Communication Device 200 which updates the address book stored in Communication Device 200 by a personal computer via network (e.g., the Internet).

FIG. 241 illustrates the basic elements necessary to implement the address book updating function which is explained in details hereinafter. As described in FIG. 241, Personal Computer PC, Host H, and Communication Device 200 are connected to Network NT in a wireless fashion. Here, Personal Computer PC is capable to access Host H via Network NT, and Host H is capable to access Communication Device 200 via Network NT.

FIG. 242 illustrates the software program installed in Communication Device 200 to initiate the present function. First of all, a list of modes is displayed on LCD 201 (FIG. 1) (S1). When an input signal is input by utilizing Input Device 210 (FIG. 1) or via voice recognition system to select a specific mode (S2), the selected mode is activated. In the present example, the communication mode is activated (S3*a*) when the communication mode is selected in the previous step, the game download mode and the game play mode are activated (S3*b*) when the game download mode and the game play mode are selected in the previous step, and the address book updating function is activated (S3*c*) when the address book updating function is selected in the previous step. The modes displayed on LCD 201 in S1 which are selectable in S2 and S3 may include all functions and modes explained in this specification. Once the selected mode is activated, another mode can be activated while the first activated mode is still implemented by going through the steps of S1 through S3 for another mode, thereby enabling a plurality of functions and modes being performed simultaneously (S4).

FIG. 243 illustrates the data stored in RAM 206 (FIG. 1). As described in FIG. 243, the data to activate (as described in S3*a* of the previous figure) and to perform the communication mode is stored in Communication Data Storage Area 2061*a*, the data to activate (as described in S3*b* of the previous figure) and to perform the game download mode and the game play mode are stored in Game DL/Play Data Storage Area 2061*b*/2061*c*, and the data to activate (as described in S3*c* of the previous figure) and to perform the address book updating function is stored in Address Book Information Storage Area 20612*a*.

FIG. 244 illustrates the method to input new address via Personal Computer PC (FIG. 241). Here, Personal Computer PC is an ordinary personal computer which includes a keyboard and a mouse as input devices. As described in FIG. 244, a web page is shown on a display of Personal Computer PC (S1). The user of Personal Computer PC inputs his/her user ID via keyboard to display his/her own user's page (S2). Once his/her user's page is opened (S3), the user of Personal Computer PC selects the address book displayed thereon (S4) to open and display his/her own address book (S5). The user of Personal Computer PC then inputs a new address into the address book via keyboard (S6), and registers it by clicking a confirmation button displayed therein with a mouse (S7). The registered new address is transferred from Personal Computer PC to Host H via Network NT (FIG. 241) together with the user ID input in S2 (FIG. 241).

FIG. 245 illustrates the information stored in the address book explained in FIG. 244. Address book is composed of a plurality of Address Data AD. As described in FIG. 245, Address Data AD is composed of Name, Home Address, Tel, and Email. Here, Name represents the first and last name of a person, Home Address represents the home address where such person resides, Tel represents the telephone number utilized by such person, and Email represents the email address utilized by such person.

FIG. 246 illustrates the data stored in Host H (FIG. 241). As described in FIG. 246, Host H includes Users' Address Book Data Storage Area H12*a* which is explained in details in FIG. 247 hereinafter.

FIG. 247 illustrates the information stored in Users' Address Book Data Storage Area H12*a*. Users' Address Book Data Storage Area H12*a* stores address book data of each user. In the example described in FIG. 247, Users' Address Book Data Storage Area H12*a* stores address book data ABDa of user A, address book data ABDb of user B, address book data ABDc of user C, address book data ABDd of user D, and address book data ABDe of user E. Each of address book data ABDa, address book data ABDb, address book data ABDc, address book data ABDd, and address book data ABDe stores a plurality of Address Data AD explained in FIG. 245.

FIG. 248 illustrates one example of the address book data stored in Users' Address Book Data Storage Area H12*a* (FIG. 247). In the example described in FIG. 248, address book data ABDa of user A (FIG. 247) stores a plurality of address data, i.e., Address Data ADf of user F, Address Data ADg of user G, Address Data ADh of user H, Address Data ADi of user I, and Address Data ADj of user J. Each of Address Data ADf, Address Data ADg, Address Data ADh, Address Data ADi, and Address Data ADj is composed of data explained in FIG. 245.

FIG. 249 illustrates the sequence of updating the address book data stored in Users' Address Book Data Storage Area H12*a* (FIG. 247). As described in FIG. 249, Host H (FIG. 241) retrieves the user ID from the transferred data described in S8 of FIG. 244, and identifies address book data which is updated thereafter (S2).

FIG. 250 illustrates one example of the updated address book data stored in Users' Address Book Data Storage Area H12*a* (FIG. 247). In the example described in FIG. 250, address book data ABDa of user A stored in Users' Address Book Data Storage Area H12*a* (FIG. 247), which originally stored Address Data ADf of user F, Address Data ADg of user G, address data ADh of user H, Address Data ADi of user I, and Address Data ADj of user J, as described in FIG. 248, is updated by adding new Address Data ADk of user K as shown in the present drawing figure.

FIG. 251 illustrates the next process after updating the address book data as described in FIG. 249 and FIG. 250. As described in FIG. 251, Host H (FIG. 241) selects the user ID of address book data ABD which has been just updated (S1). In the example described in FIG. 250, user A of address book data ABDa is selected. Next, Host H is connected to Communication Device 200 of user A via Network NT (FIG. 241) (S2), and transfers the new address data which is Address Data ADk of user K in the example described in FIG. 250 (S3).

FIG. 252 illustrates the data stored in Address Book Information Storage Area 20612*a* (FIG. 243). As described in FIG. 252, Address Book Information Storage Area 20612*a* includes Address Book Software Storage Area 20612*b* and Address Book Data Storage Area 20612*c*. Here, Address Book Software Storage Area 20612*b* stores a software program which is explained in details in FIG. 254, and Address Book Data Storage Area 20612*c* stores the data which is explained in details in FIG. 253 hereinafter.

FIG. 253 illustrates one example of the address book data stored in Address Book Data Storage Area 20612*c* (FIG. 252) before being updated. In the example described in FIG. 253, Address Book Data Storage Area 20612*c* of Communication Device 200 owned by user A stores a plurality of address data, i.e., Address Data ADf of user F, Address Data ADg of user G, Address Data ADh of user H, Address Data ADi of user I, and Address Data ADj of user J. Each of address data ADf, Address Data ADg, Address Data ADh, Address Data ADi, and Address Data ADj is composed of data explained in FIG. 245. Address Book Data Storage Area 20612*c* of Communication Device 200 is periodically synchronized with address book data ABD (FIG. 248) of Host H, thereby both data are identical.

FIG. 254 illustrates the sequence of updating data stored in Address Book Data Storage Area 20612*c* (FIG. 252). As described in FIG. 254, Communication Device 200 is connected to Host H (FIG. 241) by the control of CPU 211 (FIG. 1) (S1) and receives new address data transferred by Host H as described in S3 of FIG. 251 (S2). CPU 211 retrieves new address data therefrom and updates Address Book Data Storage Area 20612*c* accordingly (S3).

FIG. 255 illustrates one example of the updated address book data stored in Address Book Data Storage Area 20612*c* (FIG. 252). In the example described in FIG. 255, address book data ABDa of user A stored in Address Book Data Storage Area 20612*c* (FIG. 253) which originally stored Address Data ADf of user F, Address Data ADg of user G, Address Data ADh of user H, Address Data ADi of user I, and Address Data ADj of user J, as described in FIG. 253, is updated by adding new Address Data ADk of user K as shown in the present drawing figure.

The method to modify one portion of Address Data AD described in FIG. 245 (for example, Home Address and Email) is illustrated in FIG. 256 through FIG. 258. The explanations of FIG. 245 through FIG. 249 and FIG. 251 through FIG. 254 also apply to this embodiment.

FIG. 256 illustrates the method to modify Address Data AD (FIG. 245) via Personal Computer PC (FIG. 241). Here, Personal Computer PC is an ordinary personal computer which includes a keyboard and a mouse as input device. As described in FIG. 256, a web page is shown on a display of Personal Computer PC (S1). The user of Personal Computer PC inputs his/her user ID via keyboard to display his/her own user's page (S2). Once his/her user's page is opened (S3), the user of Personal Computer PC selects the address book displayed thereon (S4) to open and display his/her own address book (S5). The user of Personal Computer PC then modifies one or more of addresses in the address book via keyboard (S6), and registers it by clicking a confirmation button displayed therein with a mouse (S7). The modified address is transferred from Personal Computer PC to Host H via Network NT (FIG. 241) together with the user ID input in S2 (FIG. 241).

FIG. 257 illustrates one example of the updated address book data stored in Users' Address Book Data Storage Area H12*a* (FIG. 247). In the example described in FIG. 257, address book data ABDa of user A stored in Users' Address Book Data Storage Area H12*a* (FIG. 247) originally stored Address Data ADf of user F, Address Data ADg of user G, Address Data ADh of user H, Address Data ADi of user I, and Address Data ADj of user J, as described in FIG. 248, and is updated by modifying Address Data ADj of user J as shown in the present drawing figure.

FIG. 258 illustrates one example of the updated address book data stored in Address Book Data Storage Area 20612*c* (FIG. 252). In the example described in FIG. 258, address book data ABDa of user A stored in Address Book Data Storage Area 20612*c* (FIG. 253) originally stored Address Data ADf of user F, Address Data ADg of user G; Address Data ADh of user H, Address Data ADi of user I, and Address Data ADj of user J, as described in FIG. 253, and is updated by modifying Address Data ADj of user J as shown in the present drawing figure.

<<Batch Address Book Updating Function—with Host>>

FIG. 259 through FIG. 275 illustrate the batch address book updating function which updates all address books of a plurality of Communication Devices 200 in one action.

FIG. 259 illustrates the basic elements necessary to implement the batch address book updating function which is explained in details hereinafter. As described in FIG. 259, Host H and a plurality of Communication Devices 200 (two devices in the example described in FIG. 259) are connected to Network NT in a wireless fashion. Here, a plurality of Communication Devices 200 are capable to access Host H via Network NT, and Host H is capable to access the plurality of Communication Devices 200 via Network NT.

FIG. 260 illustrates the software program installed in Communication Device 200 to initiate the present function. First of all, a list of modes is displayed on LCD 201 (FIG. 1) (S1). When an input signal is input by utilizing Input Device 210 (FIG. 1) or via voice recognition system to select a specific mode (S2), the selected mode is activated. In the present example, the communication mode is activated (S3*a*) when the communication mode is selected in the previous step, the game download mode and the game play mode are activated (S3*b*) when the game download mode and the game play mode are selected in the previous step, and the batch address book updating function is activated (S3*c*) when the batch address book updating function is selected in the previous step. The modes displayed on LCD 201 in S1 which are selectable in S2 and S3 may include all functions and modes explained in this specification. Once the selected mode is activated, another mode can be activated while the first activated mode is still implemented by going through the steps of S1 through S3 for another mode, thereby enabling a plurality of functions and modes being performed simultaneously (S4).

FIG. 261 illustrates the data stored in RAM 206 (FIG. 1). As described in FIG. 261, the data to activate (as described in S3*a* of the previous figure) and to perform the communication mode is stored in Communication Data Storage Area 2061*a*, the data to activate (as described in S3*b* of the previous figure) and to perform the game download mode and the game play mode are stored in Game DL/Play Data Storage Area 2061*b*/2061*c*, and the data to activate (as described in S3*c* of the previous figure) and to perform the batch address book updating function is stored in Address Book Information Storage Area 20613*a*.

FIG. 262 illustrates the data stored in Host H (FIG. 259). As described in FIG. 262, Host H includes Users' Address Book Data Storage Area H13*a* which is explained in details in FIG. 263 hereinafter.

FIG. 263 illustrates the information stored in Users' Address Book Data Storage Area H13*a*. Users' Address Book Data Storage Area H13*a* stores address data of each user. In the example described in FIG. 263, Users' Address Book Data Storage Area H13*a* stores Address Data ADa of user A, Address Data ADb of user B, Address Data ADc of user C, Address Data ADd of user D, and Address Data ADe of user E. Each of Address Data ADa, Address Data ADb, Address Data ADc, Address Data ADd, and Address Data ADe stores a plurality of Address Data AD explained in FIG. 264 hereinafter.

FIG. 264 illustrates the information stored in each of Address Data ADa through ADe explained in FIG. 263. As described in FIG. 264, Address Data AD is composed of Name, Home Address, Tel, and Email. Here, Name represents the first and last name of a person, Home Address represents the home address where such person resides, Tel represents the telephone number utilized by such person, and Email represents the email address utilized by such person.

FIG. 265 illustrates one example of the updated address data stored in Users' Address Book Data Storage Area H13*a* (FIG. 263). In the example described in FIG. 265, Users' Address Book Data Storage Area H13*a* which originally stored Address Data ADa of user A, Address Data ADb of user B, Address Data ADc of user C, Address Data ADd of user D, and Address Data ADe of user E, as described in FIG. 263, is updated by adding new Address Data ADf of user F as shown in the present drawing figure.

FIG. 266 illustrates the next process after updating the address data as described in FIG. 265. As described in FIG. 266, Host H (FIG. 259) is connected to all Communication Devices 200 (two Communication Devices 200 in the example described in FIG. 259) via Network NT (FIG. 259) (S1), and transfers the new address data which is Address Data ADf of user F in the example described in FIG. 265 (S2).

FIG. 267 illustrates the data stored in Address Book Information Storage Area 20613*a* (FIG. 261) of Communication Device 200. As described in FIG. 267, Address Book Information Storage Area 20613*a* includes Address Book Software Storage Area 20613*b* and Address Book Data Storage Area 20613*c*. Here, Address Book Software Storage Area 20613*b* stores a software program which is explained in details in FIG. 270 hereinafter, and Address Book Data Storage Area 20613*c* stores the data which is explained in details in FIG. 268 hereinafter.

FIG. 268 illustrates one example of the address book data stored in Address Book Data Storage Area 20613*c* (FIG. 267) of all Communication Devices 200 before being updated. In the example described in FIG. 268, Address Book Data Storage Area 20613*c* of Communication Device 200 stores a plurality of address data, i.e., Address Data ADa of user A, Address Data ADb of user B, Address Data ADc of user C, Address Data ADd of user D, and Address Data ADe of user E. Each of Address Data ADa, Address Data ADb, Address Data ADc, Address Data ADd, and Address Data ADe is composed of data explained in FIG. 269 hereinafter. Address Book Data Storage Area 20613*c* of all Communication Devices 200 are periodically synchronized with users' address book data storage are H13*a* (FIG. 263) of Host H (FIG. 259), thereby both data are identical.

FIG. 269 illustrates the information stored in each address data explained in FIG. 268. As described in FIG. 269, Address Data AD is composed of Name, Home Address, Tel, and Email. Here, Name represents the first and last name of a person, Home Address represents the home address where such person resides, Tel represents the telephone number utilized by such person, and Email represents the email address utilized by such person.

FIG. 270 illustrates the sequence of updating data stored in Address Book Data Storage Area 20613*c* (FIG. 267). As described in FIG. 270, all Communication Devices 200 are connected to Host H (FIG. 259) by the control of CPU 211 (FIG. 1) (S1), and each Communication Device 200 receives new address data transferred from Host H as described in S3 of FIG. 266 (S2). CPU 211 retrieves new address data therefrom and updates Address Book Data Storage Area 20613*c* accordingly (S3).

FIG. 271 illustrates one example of the updated address book data stored in Address Book Data Storage Area 20613*c* (FIG. 267). In the example described in FIG. 271, Address Book Data Storage Area 20613*c* which originally stored Address Data ADa of user A, Address Data ADb of user B, Address Data ADc of user C, Address Data ADd of user D, and Address Data ADe of user E, as described in FIG. 268, is updated by adding new Address Data ADf of user F as shown in the present drawing figure.

As another embodiment, the entire data stored in Users' Address Book Data Storage Area H13*a* (FIG. 265), including the new address data (Address Data ADf of user F in the example described in FIG. 265), can be sent to each Communication Device 200 and rewrite the entire data stored in Address Book Data Storage Area 20613*c* (FIG. 267) of Communication Device 200 instead of sending only the new address data (Address Data ADf of user F in the example described in FIG. 265).

The method to modify one portion of Address Data AD described in FIG. 269 (for example, Home Address and Email) is illustrated in FIG. 272 through FIG. 275. The explanations of FIG. 259 through FIG. 264 and FIG. 267 through FIG. 269 also apply to this embodiment.

FIG. 272 illustrates one example of the updated address data stored in Users' Address Book Data Storage Area H13*a* (FIG. 263). In the example described in FIG. 272, Users' Address Book Data Storage Area H13*a* which originally stored Address Data ADa of user A, Address Data ADb of user B, Address Data ADc of user C, Address Data ADd of user D, and Address Data ADe of user E, as described in FIG. 263, is updated by modifying Address Data ADe of user E as shown in the present drawing figure.

FIG. 273 illustrates the next process after modifying the address data as described in FIG. 272. As described in FIG. 273, Host H (FIG. 259) is connected to all Communication Device 200 (two Communication Devices 200 in the example described in FIG. 259) via Network NT (FIG. 259) (S1), and transfers the modified address data which is Address Data ADe of user E in the example described in FIG. 272 (S2).

FIG. 274 illustrates the sequence of modifying data stored in Address Book Data Storage Area 20613*c* (FIG. 267) of Communication Device 200. As described in FIG. 274, all Communication Devices 200 are connected to Host H (FIG. 259) by the control of CPU 211 (FIG. 1) (S1), and each Communication Device 200 receives modified address data transferred by Host H (FIG. 259) as described in S2 of FIG. 273 (S2). CPU 211 retrieves modified address data therefrom and updates Address Book Data Storage Area 20613*c* accordingly (S3).

FIG. 275 illustrates one example of the modified address book data stored in Address Book Data Storage Area 20613*c* (FIG. 267). In the example described in FIG. 275, Address Book Data Storage Area 20613*c* which originally stored Address Data ADa of user A, Address Data ADb of user B, Address Data ADc of user C, Address Data ADd of user D, and Address Data ADe of user E, as described in FIG. 268, is updated by modifying Address Data ADe of user E as shown in the present drawing figure.

As another embodiment, the entire data stored in Users' Address Book Data Storage Area H13*a* (FIG. 272), including the modified address data (Address Data ADe of user E in the example described in FIG. 272), can be sent to each Communication Device 200 and rewrite the entire data stored in Address Book Data Storage Area 20613*c* instead of sending only the modified address data (Address Data ADe of user E in the example described in FIG. 272).

<<Batch Address Book Updating Function—Peer-to-Peer Connection>>

The present invention can also be implemented without utilizing Users' Address Book Data Storage Area H13*a* (FIG. 272) of Host H (FIG. 259). The details of this embodiment is explained in details hereinafter. The descriptions of FIG. 260, FIG. 261, FIG. 264, FIG. 267 through FIG. 269, and FIG. 271 also apply to this embodiment.

FIG. 276 illustrates the basic elements necessary to implement the batch address book updating function without utilizing Host H (FIG. 259). As described in FIG. 276, a plurality of Communication Devices 200 (two devices in the example described in FIG. 276) are connected to Network NT in a wireless fashion. Here, a plurality of Communication Devices 200 are capable to access each other via Network NT.

FIG. 277 illustrates the sequence of Communication Device 200 to update Address Data AD (FIG. 269) which is to be reflected and displayed on the rest of Communication Devices 200. First, CPU 211 (FIG. 1) of Communication Device 200 (e.g., owned by user A in FIG. 276) updates Address Book Data Storage Area 20613*c* by including new address data as described in FIG. 271 or by including modified address data as described in FIG. 275 (S1). CPU 211 of Communication Device 200 then connects to the rest of Communication Device 200 (i.e., the device of user B in FIG. 276) via Network NT (FIG. 276) in a wireless fashion (S2), and sends the updated Address Data AD (S3). Address Book Data Storage Area 20613*c* of Communication Device 200 owned by user B is thereby identical to Address Book Data Storage Area 20613*c* of Communication Device 200 owned by user A.

FIG. 278 illustrates the sequence of all Communication Device 200 (i.e., the devices of users A and B in the example described in FIG. 276) to confirm any new address data to be updated. As described in FIG. 278, each Communication Device 200 is periodically connected to the rest of Communication Devices 200 (S1) in order to check whether there are any updated address data (S2). If there are address data to be updated in any of the rest of Communication Devices 200 (S3), each Communication Device 200 retrieves the updated address data from Communication Device 200 which contains thereof (S4). For the avoidance of doubt, 'updated address data' means new address data as described in FIG. 271 and/or modified address data as described in FIG. 275.

<<Batch Scheduler Updating Function—with Host>>

FIG. 279 through FIG. 299 illustrate the batch scheduler updating function which updates all schedulers of a plurality of Communication Devices 200 in one action by utilizing a host.

FIG. 279 illustrates scheduler Sch which is displayed on LCD 201 (FIG. 1) of all Communication Devices 200 implementing the batch scheduler updating function. Referring to FIG. 279, the schedules of Users A, B, and C are displayed on each Communication Device 200 of these users. More precisely, Scheduling Data SchDa1 and SchDa2 of user A, Scheduling Data SchDb1 of user B, and Scheduling Data SchDc1 of user C are displayed on single scheduler Sch.

FIG. 280 illustrates the basic elements necessary to implement the batch scheduler updating function which is explained in details hereinafter. As described in FIG. 280, Host H and a plurality of Communication Devices 200 (three devices for user A, B, and C in the example described in FIG. 280) are connected to Network NT in a wireless fashion. Here, the plurality of Communication Devices 200 are capable to access Host H via Network NT, and Host H is capable to access the plurality of Communication Devices 200 via Network NT.

FIG. 281 illustrates the software program installed in each Communication Device 200 to initiate the present function. First of all, a list of modes is displayed on LCD 201 (FIG. 1) (S1). When an input signal is input by utilizing Input Device 210 (FIG. 1) or via voice recognition system to select a specific mode (S2), the selected mode is activated. In the present example, the communication mode is activated (S3*a*) when the communication mode is selected in the previous step, the game download mode and the game play mode are activated (S3*b*) when the game download mode and the game play mode are selected in the previous step, and the batch scheduler updating function is activated (S3*c*) when the batch scheduler updating function is selected in the previous step. The modes displayed on LCD 201 in S1 which are selectable in S2 and S3 may include all functions and modes explained in this specification. Once the selected mode is activated, another mode can be activated while the first activated mode is still implemented by going through the steps of S1 through S3 for another mode, thereby enabling a plurality of functions and modes being performed simultaneously (S4).

FIG. 282 illustrates the data stored in RAM 206 (FIG. 1). As described in FIG. 282, the data to activate (as described in S3*a* of the previous figure) and to perform the communication mode is stored in Communication Data Storage Area 2061*a*, the data to activate (as described in S3*b* of the previous figure) and to perform the game download mode and the game play mode are stored in Game DL/Play Data Storage Area 2061*b*/2061*c*, and the data to activate (as described in S3*c* of the previous figure) and to perform the batch scheduler updating function is stored in Scheduling Information Storage Area 20614*a*.

FIG. 283 illustrates the data stored in Scheduling Information Storage Area 20614*a* (FIG. 282). As described in FIG. 283, Scheduling Information Storage Area 20614*a* includes Scheduling Software Storage Area 20614*b* and Scheduling Data Storage Area 20614*c*. Here, Scheduling Software Storage Area 20614*b* stores the software programs which are necessary to implement the present function, such as the ones explained in FIG. 292 and FIG. 298 hereinafter, and Scheduling Data Storage Area 20614*c* stores the data which is explained in details in FIG. 284 through FIG. 289 hereinafter.

FIG. 284 illustrates one example of the scheduling data stored in Scheduling Data Storage Area 20614*c* (FIG. 283) of all Communication Devices 200 before being updated. In the example described in FIG. 284, Scheduling Data Storage Area 20614*c* of Communication Device 200 stores a plurality of scheduling data, i.e., Scheduling Data SchDa of user A, Scheduling Data SchDb of user B, and Address Data ADc of user C in the example. Each of Scheduling Data SchDa, Scheduling Data SchDb, and Scheduling Data SchDc is composed of data explained in FIG. 285 through FIG. 289 hereinafter. Scheduling Data Storage Area 20614*c* of each Communication Device 200 is periodically synchronized with other Communication Devices 200 by the method explained hereinafter.

FIG. 285 illustrates the Scheduling Data SchD stored in Scheduling Data Storage Area 20614*c* (FIG. 284). As described in FIG. 285, Scheduling Data SchD includes 'Subject', 'Importance', 'Date', 'Day', 'Starting Time', 'Ending Time', 'Place' and 'Memo'. Here, 'Subject' represents the subject of a specific schedule, 'Importance' represents the importance of the specific schedule, 'Date' represents the date of the specific schedule, 'Day' represents the day of the specific schedule, 'Starting Time' represents the starting time of the specific schedule, 'Ending Time' represents the ending time of the specific schedule, 'Place' represents the place where the specific schedule is performed, and 'Memo' represents a memo, i.e., a series of alphanumeric data input by the user of Communication Device 200.

FIG. 286 through FIG. 289 illustrate the example of the data described in FIG. 285 by referring to FIG. 279.

FIG. 286 illustrates the Scheduling Data SchD (FIG. 285) of user A described in FIG. 279. Referring to FIG. 286 and FIG. 279, the subject of the present schedule is 'Meeting', the importance of the present schedule is 'B Rank', the date which the present schedule takes place is '5/1', the day which the present schedule takes place is 'Mon', the starting time of the present schedule is '8:30 AM', the ending time of the present schedule is '11:30 AM', the place where the present schedule is performed is 'Room B', and the memo which is input by user A is 'Don't forget to bring the project paper.'

FIG. 287 illustrates the Scheduling Data SchD (FIG. 285) of user A described in FIG. 279. Referring to FIG. 287 and FIG. 279, the subject of the present schedule is 'Dinner With Mr. Green', the importance of the present schedule is 'A Rank', the date which the present schedule takes place is '5/4', the day which the present schedule takes place is 'Thur', the starting time of the present schedule is '7:00 PM', the ending time of the present schedule is '8:00 PM', the place where the present schedule is performed is 'Chinese Restaurant Chou', and the memo which is input by user A is 'Don't forget to bring the credit card.'

FIG. 288 illustrates the Scheduling Data SchD (FIG. 285) of user B described in FIG. 279. Referring to FIG. 288 and FIG. 279, the subject of the present schedule is 'Meeting', the importance of the present schedule is 'A Rank', the date which the present schedule takes place is '5/2', the day which the present schedule takes place is 'Tue', the starting time of the present schedule is '2:00 PM', the ending time of the present schedule is '7:00 PM', the place where the present schedule is performed is 'Room B', and the memo which is input by user A is 'Re: cancellation of project B.'

FIG. 289 illustrates the Scheduling Data SchD (FIG. 285) of user C described in FIG. 279. Referring to FIG. 289 and FIG. 279, the subject of the present schedule is 'Meeting', the importance of the present schedule is 'B Rank', the date which the present schedule takes place is '5/1', the day which the present schedule takes place is 'Mon', the starting time of the present schedule is '2:00 PM', the ending time of the present schedule is '7:00 PM', the place where the present schedule is performed is 'Room C', and the memo which is input by user A is 'Consult CPA.'

FIG. 290 illustrates a new schedule, Scheduling Data SchDc2, which is newly input by user C by utilizing Input Device 210 (FIG. 1) or via voice recognition system. The new schedule input by user C is reflected and displayed on the rest of Communication Devices 200 (i.e., the devices of users A and B in the example described in FIG. 280) by the method explained hereinafter.

FIG. 291 illustrates Scheduling Data SchD (FIG. 285) of user C described in FIG. 290. Referring to FIG. 290 and FIG. 291, the subject of the present schedule is 'Lunch With Tom', the importance of the present schedule is 'C Rank', the date which the present schedule takes place is '5/2', the day which the present schedule takes place is 'Tue', the starting time of the present schedule is '12:00 PM', the ending time of the present schedule is '1:00 PM', the place where the present schedule is performed is 'KFC', and the memo which is input by user C is 'Meet in front of KFC.'

FIG. 292 illustrates the sequence of Communication Device 200 to update Scheduling Data SchD (FIG. 285) described in FIG. 290 and FIG. 291 which is to be reflected and displayed on the rest of Communication Devices 200 (i.e., the devices of users A and B in the example described in FIG. 280). First, CPU 211 (FIG. 1) of Communication Device 200 owned by user C updates Scheduling Data Storage Area 20614*c* by including new scheduling data described in FIG. 290 and FIG. 291 (S1). CPU 211 then connects to Host H (FIG. 280) via Network NT (FIG. 280) in a wireless fashion (S2), and sends Scheduling Data SchDc2 (FIG. 290) which represents the data explained in FIG. 291 (S3).

FIG. 293 illustrates the data stored in Host H (FIG. 280). As described in FIG. 293, Host H includes Users' Scheduling Data Storage Area H14*a* which is explained in details in FIG. 294 hereinafter.

FIG. 294 illustrates the information stored in Users' Scheduling Data Storage Area H14*a* (FIG. 293). Users' Scheduling Data Storage Area H14*a* stores Scheduling Data SchD (FIG. 285) of each user. In the example described in FIG. 294, Users' Scheduling Data Storage Area H14*a* stores Scheduling Data SchDa of user A, Scheduling Data SchDb of user B, and Scheduling Data SchDc of user C. Referring to FIG. 286 through FIG. 289, Scheduling Data SchDa stores the data explained in FIG. 286 and FIG. 287, Scheduling Data SchDb stores the data explained in FIG. 288, and Scheduling Data SchDc stores the data explained in FIG. 289.

FIG. 295 illustrates the process to update the data stored in Users' Scheduling Data Storage Area H14*a* (FIG. 294) of Host H (FIG. 280). As described in FIG. 295, Host H is connected to Communication Device 200 owned by user C via Network NT (FIG. 280) in a wireless fashion (S1). Next, Host H receives the updated scheduling data (Scheduling Data SchDc2 described in FIG. 291 in the present example), and updates Users' Scheduling Data Storage Area H14*a* accordingly (S3). After S3 is completed, the data stored in Users' Scheduling Data Storage Area H14*a* is identical to the one described in FIG. 290 which includes Scheduling Data SchDc2 of user C.

FIG. 296 illustrates the process of Host H (FIG. 280) to send the updated scheduling data to the other Communication Devices 200. First, Host H is connected in a wireless fashion via Network NT (FIG. 280) to Communication Devices 200 other than the one owned by user C (i.e., the devices owned by users A and B in the example described in FIG. 280) (S1). Host H then sends the updated scheduling data which was received in S2 of FIG. 295 (Scheduling Data SchDc2 described in FIG. 291 in the present example) (S2).

FIG. 297 illustrates the process of the rest of Communication Devices 200 (i.e., the devices owned by users A and B in the example described in FIG. 280) to update the scheduling data they store. First, Communication Devices 200 (i.e., the devices owned by users A and B in the present example) are connected in a wireless fashion via Network NT (FIG. 280) to Host H (FIG. 280) (S1). Communication devices 200 then receives the updated scheduling data which was sent in S2 of FIG. 296 (Scheduling Data SchDc2 described in FIG. 291 in the present example) (S2). CPU 211 (FIG. 1) of each Communication Device 200 updates its Scheduling Data Storage Area 20614*c* (FIG. 284) by utilizing the data received in S2 (S3).

FIG. 298 illustrates the sequence of Host H (FIG. 280) to confirm any new scheduling data to be updated. As described in FIG. 298, Host H is periodically connected to all Communication Devices 200 (the devices owned by user A, B, and C in the example described in FIG. 280) (S1) in order to check whether there are any updated scheduling data (S2). If scheduling data to be updated is found in one of Communication Devices 200 (e.g., the device owned by user C) (S3), Host H sends to the particular Communication Device 200 (e.g., the device owned by user C) an instruction indicating to send the new scheduling data to Host H (S4).

FIG. 299 illustrates the sequence of the particular Communication Device 200 (e.g., the device owned by user C) which received the instruction explained in S4 of FIG. 298. As described in FIG. 299, the particular Communication Device 200 which received the instruction from Host H (FIG. 280) as explained in S4 of FIG. 298 is connected to Host H (S1). CPU 211 (FIG. 1) of the particular Communication Device 200 then sends the updated scheduling data to Host H in a wireless fashion (S2). The explanations of FIG. 293 through FIG. 297 apply hereinafter.

<<Batch Scheduler Updating Function—Peer-to-Peer Connection>>

The present invention can also be implemented without Users' Scheduling Data Storage Area H14*a* (FIG. 293) of Host H (FIG. 280). The details of this embodiment is explained in details hereinafter. The descriptions of FIG. 279 through FIG. 299 apply unless stated otherwise.

Instead of Communication Device 200 accessing Host H (FIG. 280) as described in FIG. 292, each Communication Device 200 directly contacts the other Communication Devices 200 (without accessing Host H) in this embodiment. This paragraph illustrates the sequence of each Communication Device 200 to update Scheduling Data SchD (FIG. 285) described in FIG. 290 and FIG. 291 which is to be reflected and displayed on the rest of Communication Devices 200 (i.e., the devices of users A and B in the example described in FIG. 279). First, CPU 211 (FIG. 1) of Communication Device 200 owned by user C updates Scheduling Data Storage Area 20614*c* (FIG. 284) by including new scheduling data described in FIG. 290 and FIG. 291 (S1). CPU 211 of Communication Device 200 owned by user C then connects to the rest of Communication Devices 200 (i.e., the devices of users A and B) via Network NT (FIG. 280) in a wireless fashion (S2), and sends Scheduling Data SchDc2 (FIG. 290) which represents the data explained in FIG. 291 (S3).

Instead of Host H (FIG. 280) accessing Communication Devices 200 as described in FIG. 298, each Communication Device 200 directly contacts the other Communication Devices 200 (without accessing Host H) in this embodiment. This paragraph illustrates the sequence of all Communication Devices 200 (i.e., the devices of users A, B, and C in the example described in FIG. 280) to confirm any new scheduling data to be updated. In this embodiment, each Communication Device 200 is periodically connected to the rest of Communication Devices 200 (S1) in order to check whether there are any updated scheduling data (S2). If there are scheduling data to be updated in any of the rest of Communication Devices 200 (S3), each Communication Device 200 retrieves the updated scheduling data therefrom.

The descriptions of FIG. 279 through FIG. 299 are primarily emphasized on adding new scheduling data, however, the present invention is not limited thereto. Namely, the present invention is also applicable to modified scheduling data. For example, user A of Communication Device 200 modifies Scheduling Data SchDa1 described in FIG. 286 (e.g., change the 'Starting Time' from '8:30 AM' to '9:30 AM'). The description of FIG. 292 through FIG. 299 also apply herein.

<<Calculator Function>>

FIG. 300 through FIG. 303 illustrate the calculator function of Communication Device 200. Communication Device 200 can be utilized as a calculator to perform mathematical calculation by implementing the present function.

FIG. 300 illustrates the software program installed in each Communication Device 200 to initiate the present function. First of all, a list of modes is displayed on LCD 201 (FIG. 1) (S1). When an input signal is input by utilizing Input Device 210 (FIG. 1) or via voice recognition system to select a specific mode (S2), the selected mode is activated. In the present example, the communication mode is activated (S3*a*) when the communication mode is selected in the previous step, the game download mode and the game play mode are activated (S3*b*) when the game download mode and the game play mode are selected in the previous step, and the calculator function is activated (S3*c*) when the calculator function is selected in the previous step. The modes displayed on LCD 201 in S1 which are selectable in S2 and S3 may include all functions and modes explained in this specification. Once the selected mode is activated, another mode can be activated while the first activated mode is still implemented by going through the steps of S1 through S3 for another mode, thereby enabling a plurality of functions and modes being performed simultaneously (S4).

FIG. 301 illustrates the data stored in RAM 206 (FIG. 1). As described in FIG. 301, the data to activate (as described in S3*a* of the previous figure) and to perform the communication mode is stored in Communication Data Storage Area 2061*a*, the data to activate (as described in S3*b* of the previous figure) and to perform the game download mode and the game play mode are stored in Game DL/Play Data Storage Area 2061*b*/2061*c*, and the data to activate (as described in S3*c* of the previous figure) and to perform the calculator function is stored in Calculator Information Storage Area 20615*a*.

FIG. 302 illustrates the data stored in Calculator Information Storage Area 20615*a* (FIG. 301). As described in FIG. 302, Calculator Information Storage Area 20615*a* includes Calculator Software Storage Area 20615*b* and Calculator Data Storages Area 20615*c*. Calculator Software Storage Area 20615*b* stores the software programs to implement the present function, such as the one explained in FIG. 303, and Calculator Data Storage Area 20615*c* stores a plurality of data necessary to execute the software programs stored in Calculator Software Storage Area 20615*b* and to implement the present function.

FIG. 303 illustrates the software program stored in Calculator Storage Area 20615*b* (FIG. 302). Referring to FIG. 303, one or more of numeric data are input by utilizing Input Device 210 (FIG. 1) or via voice recognition system as well as the arithmetic operators (e.g., '+', '−', and '×'), which are temporarily stored in Calculator Data Storage Area 20615*c* (S1). By utilizing the data stored in Calculator Data Storage Area 20615*c*, CPU 211 (FIG. 1) performs the calculation by executing the software program stored in Calculator Software Storage Area 20615*b* (FIG. 302) (S2). The result of the calculation is displayed on LCD 201 (FIG. 1) thereafter (S3).

<<Spreadsheet Function>>

FIG. 304 through FIG. 307 illustrate the spreadsheet function of Communication Device 200. Here, the spreadsheet is composed of a plurality of cells which are aligned in matrix. In other words, the spreadsheet is divided into a plurality of rows and columns in which alphanumeric data is capable to be input. Microsoft Excel is the typical example of the spreadsheet.

FIG. 304 illustrates the software program installed in each Communication Device 200 to initiate the present function. First of all, a list of modes is displayed on LCD 201 (FIG. 1) (S1). When an input signal is input by utilizing Input Device 210 (FIG. 1) or via voice recognition system to select a specific mode (S2), the selected mode is activated. In the present example, the communication mode is activated (S3*a*) when the communication mode is selected in the previous step, the game download mode and the game play mode are activated (S3*b*) when the game download mode and the game play mode are selected in the previous step, and the spreadsheet function is activated (S3*c*) when the spreadsheet function is selected in the previous step. The modes displayed on LCD 201 in S1 which are selectable in S2 and S3 may include all functions and modes explained in this specification. Once the selected mode is activated, another mode can be activated while the first activated mode is still implemented by going through the steps of S1 through S3 for another mode, thereby enabling a plurality of functions and modes being performed simultaneously (S4).

FIG. 305 illustrates the data stored in RAM 206 (FIG. 1). As described in FIG. 305, the data to activate (as described in S3*a* of the previous figure) and to perform the communication mode is stored in Communication Data Storage Area 2061*a*, the data to activate (as described in S3*b* of the previous figure) and to perform the game download mode and the game play mode are stored in Game DL/Play Data Storage Area 2061*b*/2061*c*, and the data to activate (as described in S3*c* of the previous figure) and to perform the spreadsheet function is stored in Spreadsheet Information Storage Area 20616*a*.

FIG. 306 illustrates the data stored in Spreadsheet Information Storage Area 20616*a* (FIG. 305). As described in FIG. 306, Spreadsheet Information Storage Area 20616*a* includes Spreadsheet Software Storage Area 20616*b* and Spreadsheet Data Storage Area 20616*c*. Spreadsheet Software Storage Area 20616*b* stores the software programs to implement the present function, such as the one explained in FIG. 307, and Spreadsheet Data Storage Area 20616*c* stores a plurality of data necessary to execute the software programs stored in Spreadsheet Software Storage Area 20616*b* and to implement the present function.

FIG. 307 illustrates the software program stored in Spreadsheet Software Storage Area 20616*b* (FIG. 306). Referring to FIG. 307, a certain cell of a plurality of cells displayed on LCD 201 (FIG. 1) is selected by utilizing Input Device 210 (FIG. 1) or via voice recognition system. The selected cell is highlighted by a certain manner, and CPU 211 (FIG. 1) stores the location of the selected cell in Spreadsheet Data Storage Area 20616*c* (FIG. 306) (S1). One or more of alphanumeric data are input by utilizing Input Device 210 or via voice recognition system into the cell selected in S1, and CPU 211 stores the alphanumeric data in Spreadsheet Data Storage Area 20616*c* (S2). CPU 211 displays the alphanumeric data on LCD 201 thereafter (S3). The sequence of S1 through S3 can be repeated for a numerous amount of times and saved and closed thereafter.

<<Word Processing Function>>

FIG. 308 through FIG. 321 illustrate the word processing function of Communication Device 200. By way of implementing such function, Communication Device 200 can be utilized as a word processor which has the similar functions to Microsoft Words. The word processing function primarily includes the following functions: the bold formatting function, the italic formatting function, the image pasting function, the font formatting function, the spell check function, the underlining function, the page numbering function, and the bullets and numbering function. Here, the bold formatting function makes the selected alphanumeric data bold. The italic formatting function makes the selected alphanumeric data italic. The image pasting function pastes the selected image to a document to the selected location. The font formatting function changes the selected alphanumeric data to the selected font. The spell check function fixes spelling and grammatical errors of the alphanumeric data in the document. The underlining function adds underlines to the selected alphanumeric data. The page numbering function adds page numbers to each page of a document at the selected location. The bullets and numbering function adds the selected type of bullets and numbers to the selected paragraphs.

FIG. 308 illustrates the software program installed in each Communication Device 200 to initiate the present function. First of all, a list of modes is displayed on LCD 201 (FIG. 1) (S1). When an input signal is input by utilizing Input Device 210 (FIG. 1) or via voice recognition system to select a specific mode (S2), the selected mode is activated. In the present example, the communication mode is activated (S3*a*) when the communication mode is selected in the previous step, the game download mode and the game play mode are activated (S3*b*) when the game download mode and the game play mode are selected in the previous step, and the word processing function is activated (S3*c*) when the word processing function is selected in the previous step. The modes displayed on LCD 201 in S1 which are selectable in S2 and S3 may include all functions and modes explained in this specification. Once the selected mode is activated, another mode can be activated while the first activated mode is still implemented by going through the steps of S1 through S3 for another mode, thereby enabling a plurality of functions and modes being performed simultaneously (S4).

FIG. 309 illustrates the data stored in RAM 206 (FIG. 1). As described in FIG. 309, the data to activate (as described in S3*a* of the previous figure) and to perform the communication mode is stored in Communication Data Storage Area 2061*a*, the data to activate (as described in S3*b* of the previous figure) and to perform the game download mode and the game play mode are stored in Game DL/Play Data Storage Area 2061*b*/2061*c*, and the data to activate (as described in S3*c* of the previous figure) and to perform the word processing function is stored in Word Processing Information Storage Area 20617*a*.

FIG. 310 illustrates the data stored in Word Processing Information Storage Area 20617*a* (FIG. 309). As described in FIG. 310, Word Processing Information Storage Area 20617*a* includes Word Processing Software Storage Area 20617*b* and Word Processing Data Storage Area 20617*c*. Word Processing Software Storage Area 20617*b* stores the software programs described in FIG. 311 hereinafter, and Word Processing Data Storage Area 20617*c* stores a plurality of data described in FIG. 312 hereinafter.

FIG. 311 illustrates the software programs stored in Word Processing Software Storage Area 20617*b* (FIG. 310). As described in FIG. 311, Word Processing Software Storage Area 20617*b* stores Alphanumeric Data Input Software 20617*b*1, Bold Formatting Software 20617*b*2, Italic Formatting Software 20617*b*3, Image Pasting Software 20617*b*4, Font Formatting Software 20617*b*5, Spell Check Software 20617*b*6, Underlining Software 20617*b*7, Page Numbering Software 20617*b*8, and Bullets And Numbering Software 20617*b*9. Alphanumeric Data Input Software 20617*b*1 inputs to a document a series of alphanumeric data in accordance to the input signals produced by utilizing Input Device 210 (FIG. 1) or via voice recognition system. Bold Formatting Software 20617*b*2 implements the bold formatting function which makes the selected alphanumeric data bold of which the sequence is described in FIG. 314. Italic Formatting Software 20617*b*3 implements the italic formatting function which makes the selected alphanumeric data italic of which the sequence is described in FIG. 315. Image Pasting Software 20617*b*4 implements the image pasting function which pastes the selected image to a document to the selected location of which the sequence is described in FIG. 316. Font Formatting Software 20617*b*5 implements the font formatting function which changes the selected alphanumeric data to the selected font of which the sequence is described in FIG. 317. Spell Check Software 20617*b*6 implements the spell check function which fixes spelling and grammatical errors of the alphanumeric data in a document of which the sequence is described in FIG. 318. Underlining Software 20617*b*7 implements the underlining function which adds the selected underlines to the selected alphanumeric data of which the sequence is described in FIG. 319. Page Numbering Software 20617*b*8 implements the page numbering function which adds page numbers at the selected location to each page of a document of which the sequence is described in FIG. 320. Bullets And Numbering Software 20617*b*9 implements the bullets and numbering function which adds the selected type of bullets and numbers to the selected paragraphs of which the sequence is described in FIG. 321.

FIG. 312 illustrates the data stored in Word Processing Data Storage Area 20617*c* (FIG. 310). As described in FIG. 312, Word Processing Data Storage Area 20617*c* includes Alphanumeric Data Storage Area 20617*c*1, Bold Formatting Data Storage Area 20617*c*2, Italic Formatting Data Storage Area 20617*c*3, Image Data Storage Area 20617*c*4, Font Formatting Data Storage Area 20617*c*5, Spell Check Data Storage Area 20617*c*6, Underlining Data Storage Area 20617*c*7, Page Numbering Data Storage Area 20617*c*8, and Bullets And Numbering Data Storage Area 20617*c*9. Alphanumeric Data Storage Area 20617*c*1 stores the basic text and numeric data which are not decorated by bold and/or italic (the default font may be courier new). Bold Formatting Data Storage Area 20617*c*2 stores the text and numeric data which are decorated by bold. Italic Formatting Data Storage Area 20617*c*3 stores the text and numeric data which are decorated by italic. Image Data Storage Area 20617*c*4 stores the data representing the location of the image data pasted in a document and the image data itself. Font Formatting Data Storage Area 20617*c*5 stores a plurality of types of fonts, such as arial, century, courier new, tahoma, and times new roman, of all text and numeric data stored in Alphanumeric Data Storage Area **20617*c*1. Spell check Data Storage Area 20617*c*6 stores a plurality of spell check data, i.e., a plurality of correct text and numeric data for purposes of being compared with the alphanumeric data input in a document and a plurality of pattern data for purposes of checking the grammatical errors therein. Underlining Data Storage Area 20617*c*7 stores a plurality of data representing underlines of different types. Page Numbering Data Storage Area 20617*c*8 stores the data representing the location of page numbers to be displayed in a document and the page number of each page of a document. Bullets And Numbering Data Storage Area 20617*c*9** stores a plurality of data representing different types of bullets and numbering and the location which they are added.

FIG. 313 illustrates the sequence of the software program stored in Alphanumeric Data Input Software **20617*b*1. As described in FIG. 313, a plurality of alphanumeric data is input by utilizing Input Device 210 (FIG. 1) or via voice recognition system (S1). The corresponding alphanumeric data is retrieved from Alphanumeric Data Storage Area 20617*c*1 (FIG. 312) (S2), and the document including the alphanumeric data retrieved in S2 is displayed on LCD 201 (FIG. 1) (S3**).

FIG. 314 illustrates the sequence of the software program stored in Bold Formatting Software **20617*b*2. As described in FIG. 314, one or more of alphanumeric data are selected by utilizing Input Device 210 (FIG. 1) or via voice recognition system (S1). Next, a bold formatting signal is input by utilizing Input Device 210 (e.g., selecting a specific icon displayed on LCD 201 (FIG. 1) or selecting a specific item from a pulldown menu) or via voice recognition system (S2). CPU 211 (FIG. 1) then retrieves the bold formatting data from Bold Formatting Data Storage Area 20617*c*2 (FIG. 312) (S3), and replaces the alphanumeric data selected in S1 with the bold formatting data retrieved in S3 (S4). The document with the replaced bold formatting data is displayed on LCD 201 thereafter (S5**).

FIG. 315 illustrates the sequence of the software program stored in Italic Formatting Software **20617*b*3. As described in FIG. 315, one or more of alphanumeric data are selected by utilizing Input Device 210 (FIG. 1) or via voice recognition system (S1). Next, an italic formatting signal is input by utilizing Input Device 210 (e.g., selecting a specific icon displayed on LCD 201 (FIG. 1) or selecting a specific item from a pulldown menu) or via voice recognition system (S2). CPU 211 (FIG. 1) then retrieves the italic formatting data from Italic Formatting Data Storage Area 20617*c*3 (FIG. 312) (S3), and replaces the alphanumeric data selected in S1 with the italic formatting data retrieved in S3 (S4). The document with the replaced italic formatting data is displayed on LCD 201 thereafter (S5**).

FIG. 316 illustrates the sequence of the software program stored in Image Pasting Software **20617*b*4. As described in FIG. 316, the image to be pasted is selected by utilizing Input Device 210 (FIG. 1) or via voice recognition system (S1). Here, the image may be of any type, such as JPEG, GIF, and TIFF. Next the location in a document where the image is to be pasted is selected by utilizing Input Device 210 or via voice recognition system (S2). The data representing the location is stored in Image Pasting Data Storage Area 20617*c*4 (FIG. 312). The image is pasted at the location selected in S2 and the image is stored in Image Pasting Data Storage Area 20617*c*4 (S3). The document with the pasted image is displayed on LCD 201 (FIG. 1) thereafter (S4**).

FIG. 317 illustrates the sequence of the software program stored in Font Formatting Software **20617*b*5. As described in FIG. 317, one or more of alphanumeric data are selected by utilizing Input Device 210 (FIG. 1) or via voice recognition system (S1). Next, a font formatting signal is input by utilizing Input Device 210 (e.g., selecting a specific icon displayed on LCD 201 (FIG. 1) or selecting a specific item from a pulldown menu) or via voice recognition system (S2). CPU 211 (FIG. 1) then retrieves the font formatting data from Italic Formatting Data Storage Area 20617*c*5 (FIG. 312) (S3), and replaces the alphanumeric data selected in S1 with the font formatting data retrieved in S3 (S4). The document with the replaced font formatting data is displayed on LCD 201 thereafter (S5**).

FIG. 318 illustrates the sequence of the software program stored in Spell Check Software **20617*b*6. As described in FIG. 318, CPU 211 (FIG. 1) scans all alphanumeric data in a document (S1). CPU 211 then compares the alphanumeric data with the spell check data stored in Spell Check Data Storage Area 20617*c*6 (FIG. 312), i.e., a plurality of correct text and numeric data for purposes of being compared with the alphanumeric data input in a document and a plurality of pattern data for purposes of checking the grammatical errors therein (S2). CPU 211 corrects the alphanumeric data and/or corrects the grammatical errors (S3), and the document with the corrected alphanumeric data is displayed on LCD 201 (FIG. 1) (S4**).

FIG. 319 illustrates the sequence of the software program stored in Underlining Software **20617*b*7. As described in FIG. 319, one or more of alphanumeric data are selected by utilizing Input Device 210 (FIG. 1) or via voice recognition system (S1). Next, an underlining signal is input by utilizing Input Device 210 (e.g., selecting a specific icon displayed on LCD 201 (FIG. 1) or selecting a specific item from a pulldown menu) or via voice recognition system to select the type of the underline to be added (S2). CPU 211 (FIG. 1) then retrieves the underlining data from Underlining Data Storage Area 20617*c*7 (FIG. 312) (S3), and adds to the alphanumeric data selected in S1 (S4). The document with underlines added to the selected alphanumeric data is displayed on LCD 201 thereafter (S5**).

FIG. 320 illustrates the sequence of the software program stored in Page Numbering Software **20617*b*8. As described in FIG. 320, a page numbering signal is input by utilizing Input Device 210 (FIG. 1) or via voice recognition system (S1). Next, the location to display the page number is selected by utilizing Input Device 210 or via voice recognition system (S2). CPU 211 (FIG. 1) then stores the location of the page number to be displayed in Page Numbering Storage Area 20617*c*8 (FIG. 312), and adds the page number to each page of a document at the selected location (S3). The document with page numbers is displayed on LCD 201 thereafter (S4**).

FIG. 321 illustrates the sequence of the software program stored in Bullets And Numbering Software **20617*b*9. As described in FIG. 321, a paragraph is selected by utilizing input device 210 (FIG. 1) or via voice recognition system (S1). Next, the type of the bullets and/or numbering is selected by utilizing Input Device 210 or via voice recognition system (S2). CPU 211 (FIG. 1) then stores the identification data of the paragraph selected in S1 and the type of the bullets and/or numbering in Bullets And Numbering Data Storage Area 20617*c*9 (FIG. 312), and adds the bullets and/or numbering to the selected paragraph of a document (S3). The document with the bullets and/or numbering is displayed on LCD 201 thereafter (S4**).

<<Start Up Software Function>>

FIG. 322 through FIG. 331 illustrate the start up software program function which enables Communication Device 200 to automatically activate (or start up) the registered software programs when the power is on.

FIG. 322 illustrates the overall sequence of the present function. Referring to FIG. 322, the user of Communication Device 200 presses the power button of Communication Device 200 (S1). Then the predetermined software programs automatically activate (or start up) without having any instructions from the user of Communication Device 200 (S2).

FIG. 323 illustrates the storage area included RAM 206 (FIG. 1). As described in FIG. 323, RAM 206 includes Start Up Information Storage Area 20621a which is described in FIG. 324 hereinafter.

FIG. 324 illustrates the storage areas included in Start Up Information Storage Area 20621a (FIG. 323). As described in FIG. 324, Start Up Information Storage Area 20621a includes Start Up Software Storage Area 20621b and Start Up Data Storage Area 20621c. Start Up Software Storage Area 20621b stores the software programs necessary to implement the present function, such as the ones described in FIG. 325 hereinafter. Start Up Data Storage Area 20621c stores the data necessary to implement the present function, such as the ones described in FIG. 327 hereinafter.

FIG. 325 illustrates the software programs stored in Start Up Software Storage Area 20621b (FIG. 324). As described in FIG. 325, Start Up Software Storage Area 20621b stores Power On Detecting Software 20621b1, Start Up Data Storage Area Scanning Software 20621b2, and Start Up Software Activating Software 20621b3. Power On Detecting Software 20621b1 detects whether the power of Communication Device 200 is on of which the sequence is described in FIG. 328 hereinafter, Start Up Data Storage Area Scanning Software 20621b2 identifies the software programs which are automatically activated of which the sequence is described in FIG. 329 hereinafter, and Start Up Software Activating Software 20621b3 activates the identified software programs identified by Start Up Data Storage Area Scanning Software 20621b2 of which the sequence is described in FIG. 330 hereinafter.

FIG. 326 illustrates the storage area included in Start Up Data Storage Area 20621c (FIG. 324). As described in FIG. 326, Start Up Data Storage Area 20621c includes Start Up Software Index Storage Area 20621c1. Here, Start Up Software Index Storage Area 20621c1 stores the software program indexes, wherein a software program index is an unique information assigned to each software program as an identifier (e.g., title of a software program) of which the details are explained in FIG. 327 hereinafter.

FIG. 327 illustrates the data stored in Start Up Software Index Storage Area 20621c1 (FIG. 326). Referring to FIG. 327, Start Up Software Index Storage Area 20621c1 stores the software program indexes of the software programs which are automatically activated by the present function. Here, the software programs may be any software programs explained in this specification, and the storage areas where these software programs are stored are explained in the relevant drawing figures thereto. Three software program indexes, i.e., Start Up Software Index 20621c1a, Start Up Software Index 20621c1b, and Start Up Software Index 20621c1c, are stored in Start Up Software Index Storage Area 20621c1 in the present example. The software program indexes can be created and store in Start Up Software Index Storage Area 20621c1 manually by utilizing input device 210 (FIG. 1) or via voice recognition system.

FIG. 328 illustrates the sequence of Power On Detecting Software 20621b1 stored in Start Up Software Storage Area 20621b (FIG. 325). As described in FIG. 328, CPU 211 (FIG. 1) checks the status of the power condition of Communication Device 200 (S1). When the user of Communication Device 200 powers on Communication Device 200 by utilizing input device 210 (FIG. 1), such as by pressing a power button (S2), CPU 211 activates Start Up Data Storage Area Scanning Software 20621b2 (FIG. 325) of which the sequence is explained in FIG. 329 hereinafter.

FIG. 329 illustrates the sequence of Start Up Data Storage Area Scanning Software 20621b2 stored in Start Up Software Storage Area 20621b (FIG. 325). As described in FIG. 329, CPU 211 (FIG. 1) scans Start Up Software Index Storage Area 20621c1 (FIG. 327) (S1), and identifies the software programs which are automatically activated (S2). CPU 211 activates Start Up Software Activating Software 20621b3 (FIG. 325) thereafter of which the sequence is explained in FIG. 330 hereinafter (S3).

FIG. 330 illustrates the sequence of Start Up Software Activating Software 20621b3 stored in Start Up Software Storage Area 20621b (FIG. 325). As described in FIG. 330, CPU 211 (FIG. 1) activates the software programs of which the software program indexes are identified in S2 of FIG. 329 hereinbefore (S1).

FIG. 331 illustrates another embodiment wherein the three software programs stored in Start Up Software Storage Area 20621b (FIG. 325) (i.e., Power On Detecting Software 20621b1, Start Up Data Storage Area Scanning Software 20621b2, Start Up Software Activating Software 20621b3) is integrated into one software program stored therein. Referring to FIG. 331, CPU 211 (FIG. 1) checks the status of the power condition of Communication Device 200 (S1). When the user of Communication Device 200 powers on Communication Device 200 by utilizing input device 210 (FIG. 1), such as by pressing a power button (S2), CPU 211 scans Start Up Software Index Storage Area 20621c1 (FIG. 326) (S3), and identifies the software programs which are automatically activated (S4). CPU 211 activates the software programs thereafter of which the software program indexes are identified in S4 (S5).

As another embodiment, the software programs per se (not the software program indexes as described in FIG. 327) may be stored in a specific storage area which are activated by the present function.

As another embodiment, the present function may be implemented at the time the user of Communication Device 200 logs on instead of at the time the Communication Device 200 is powered as described in S2 of FIG. 328.

<<Stereo Audio Data Output Function>>

FIG. 336 through FIG. 347 illustrate the stereo audio data output function which enables Communication Device 200 to output audio data from Speakers 216L and 216R (FIG. 334) in a stereo fashion.

FIG. 336 illustrates the storage area included in Host Data Storage Area H00c (not shown) of Host H. As described in FIG. 336, Host Data Storage Area H00c includes Stereo Audio Information Storage Area H22a. Stereo Audio Information Storage Area H22a stores the software programs and data necessary to implement the present function as described in details hereinafter.

FIG. 337 illustrates the storage areas included in Stereo Audio Information Storage Area H22a (FIG. 336). As described in FIG. 337, Stereo Audio Information Storage Area H22a includes Stereo Audio Software Storage Area H22b and Stereo Audio Data Storage Area H22c. Stereo Audio Software Storage Area H22b stores the software programs necessary to implement the present function, such as the one described in FIG. 340 hereinafter. Stereo Audio Data Storage Area H22*c* stores the data necessary to implement the present function, such as the ones described in FIG. 338 hereinafter.

FIG. 338 illustrates the stereo audio data stored in Stereo Audio Data Storage Area H22*c* (FIG. 337). A plurality of stereo audio data are stored in Stereo Audio Data Storage Area H22*c*. In the example described in FIG. 338, three stereo audio data, i.e., Stereo Audio Data H22*c*1, Stereo Audio Data H22*c*2, and Stereo Audio Data H22*c*3 are stored therein.

FIG. 339 illustrates the components of the stereo audio data stored in Stereo Audio Data Storage Area H22*c* (FIG. 338). FIG. 339 describes the components of Stereo Audio Data H22*c*1 (FIG. 338) as an example. As described in FIG. 339, Stereo Audio Data H22*c*1 includes Left Speaker Audio Data H22*c*1L, Right Speaker Audio Data H22*c*1R, and Stereo Audio Data Output Timing Data H22*c*1T. Left Speaker Audio Data H22*c*1L is an audio data which is designed to be output from Speaker 216L (FIG. 334). Right Speaker Audio Data H22*c*1R is an audio data which is designed to be output from Speaker 216R (FIG. 334). Stereo Audio Data Output Timing Data H22*c*1T is a timing data which is utilized to synchronize the output of both Left Speaker Audio Data H22*c*1L and Right Speaker Audio Data H22*c*1R from Speaker 216R and Speaker 216L respectively.

FIG. 340 illustrates the sequence of the software program stored in Stereo Audio Software Storage Area H22*b* (FIG. 337). Referring to FIG. 340, the software program stored in Stereo Audio Software Storage Area H22*b* extracts one of the stereo audio data stored in Stereo Audio Data Storage Area H22*c* (FIG. 338) and creates Transferred Stereo Audio Data TSAD for purposes of transferring the extracted stereo audio data to Communication Device 200 (S1).

FIG. 341 illustrates the components of Transferred Stereo Audio Data TSAD created by the software program stored in Stereo Audio Software Storage Area H22*b* (FIG. 340). As described in FIG. 341, Transferred Stereo Audio Data TSAD is composed of Header TSAD1, Com Device ID TSAD2, Host ID TSAD3, Transferred Stereo Audio Data TSAD4, and Footer TSAD5. Com Device ID TSAD2 indicates the identification of Communication Device 200, Host ID TSAD3 indicates the identification of Host H, and Transferred Stereo Audio Data TSAD4 is the stereo audio data extracted in the manner described in FIG. 340. Header TSAD1 and Footer TSAD5 indicate the beginning and the end of Transferred Stereo Audio Data TSAD.

FIG. 342 illustrates the storage area included in RAM 206 (FIG. 1) of Communication Device 200. As described in FIG. 342, RAM 206 includes Stereo Audio Information Storage Area 20622*a*. Stereo Audio Information Storage Area 20622*a* stores the software programs and data necessary to implement the present function as described in details hereinafter.

FIG. 343 illustrates the storage areas included in Stereo Audio Information Storage Area 20622*a* (FIG. 342). As described in FIG. 343, Stereo Audio Information Storage Area 20622*a* includes Stereo Audio Software Storage Area 20622*b* and Stereo Audio Data Storage Area 20622*c*. Stereo Audio Software Storage Area 20622*b* stores the software programs necessary to implement the present function, such as the ones described in FIG. 346 and FIG. 347 hereinafter. Stereo Audio Data Storage Area 20622*c* stores the data necessary to implement the present function, such as the ones described in FIG. 344 hereinafter.

FIG. 344 illustrates the stereo audio data stored in Stereo Audio Data Storage Area 20622*c* (FIG. 343). A plurality of stereo audio data are stored in Stereo Audio Data Storage Area 20622*c*. In the example described in FIG. 344, three stereo audio data, i.e., Stereo Audio Data 20622*c*1, Stereo Audio Data 20622*c*2, and Stereo Audio Data 20622*c*3 are stored therein.

FIG. 345 illustrates the components of the stereo audio data stored in Stereo Audio Data Storage Area 20622*c* (FIG. 344). FIG. 345 describes the components of Stereo Audio Data 20622*c*1 (FIG. 344) as an example. As described in FIG. 345, Stereo Audio Data 20622*c*1 includes Left Speaker Audio Data 20622*c*1L, Right Speaker Audio Data 20622*c*1R, and Stereo Audio Data Output Timing Data 20622*c*1T. Left Speaker Audio Data 20622*c*1L is an audio data which is designed to be output from Speaker 216L (FIG. 334). Right Speaker Audio Data 20622*c*1R is an audio data which is designed to be output from Speaker 216R (FIG. 334). Stereo Audio Data Output Timing Data 20622*c*1T is a timing data which is utilized to synchronize the output of both Left Speaker Audio Data 20622*c*1L and Right Speaker Audio Data 20622*c*1R from Speaker 216R and Speaker 216L respectively.

The downloaded stereo audio data are stored in specific area(s) of Stereo Audio Data Storage Area 20622*c* (FIG. 344).

FIG. 346 illustrates the sequence of selecting and preparing to output the stereo audio data from Speakers 216L and 216R (FIG. 334) in a stereo fashion. As described in FIG. 346, a list of stereo audio data is displayed on LCD 201 (FIG. 1) (S1). The user of Communication Device 200 selects one stereo audio data by utilizing Input Device 210 (FIG. 1) or via voice recognition system (S2). Assuming Stereo Audio Data 20622*c*1 is selected (FIG. 344) in S2, CPU 211 (FIG. 1) retrieves Left Speaker Audio Data 20622*c*1L (S3), Right Speaker Audio Data 20622*c*1R (S4), and Stereo Audio Data Output Timing Data 20622*c*1T from Stereo Audio Data Storage Area 20622*c* (FIG. 344) (S5).

FIG. 347 illustrates the sequence of outputting the stereo audio data from Speakers 216L and 216R (FIG. 334) in a stereo fashion. As described in FIG. 347, the user of Communication Device 200 inputs a specific signal to output the stereo audio data by utilizing Input Device 210 (FIG. 1) or via voice recognition system (S1). Assuming Audio Data 20622*c*1 (FIG. 344) is selected in S2 of FIG. 346, CPU 211 outputs Left Speaker Audio Data 20622*c*1L (FIG. 345) and Right Speaker Audio Data 20622*c*1R (FIG. 345) from Speakers 216L and 216R respectively in a stereo fashion in accordance with Stereo Audio Data Output Timing Data 20622*c*1T (FIG. 345) (S2).

<<Business Card Function>>

FIG. 348 through FIG. 357 illustrate the business card function which enables Communication Device 200 ('Device A') to send the business card data to another Communication Device 200 ('Device B').

FIG. 348 illustrates the connection between Device A and Device B. As described in the present drawing, Device A and Device B are directly connected in a wireless fashion. Both devices may send and receive wireless signals via Antenna 218 (FIG. 1) or LED 219 (FIG. 1).

FIG. 349 illustrates the information stored in RAM 206 (FIG. 1) of both Device A and Device B. As described in the present drawing, RAM 206 (FIG. 1) includes Business Card Information Storage Area 20636*a* of which the data and the software programs stored therein are described in FIG. 350.

The data and/or the software programs stored in Business Card Information Storage Area 20636*a*(FIG. 349) may be downloaded from Host H.

FIG. 350 illustrates the storage areas included in Business Card Information Storage Area 20636*a* (FIG. 349). As described in the present drawing, Business Card Data Storage Area 20636*b* includes Business Card Data Storage Area 20636*b* and Business Card Software Storage Area 20636*c*. Business Card Data Storage Area 20636*b* stores the data necessary to implement the present function, such as the ones described in FIG. 351 through FIG. 353. Business Card Software Storage Area 20636*c* stores the software programs necessary to implement the present function, such as the ones described in FIG. 354.

FIG. 351 illustrates the storage areas included in Business Card Data Storage Area 20636*b* (FIG. 350). As described in the present drawing, Business Card Data Storage Area 20636*b* includes User's Business Card Data Storage Area 20636*b*1 and Other Users' Business Card Data Storage Area 20636*b*2. User's Business Card Data Storage Area 20636*b*1 stores data as described in FIG. 352. Other Users' Business Card Data Storage Area 20636*b*2 stores data as described in FIG. 353.

FIG. 352 illustrates the data included in User's Business Card Data Storage Area 20636*b*1 (FIG. 351). As described in the present drawing, User's Business Card Data Storage Area 20636*b*1 includes 'Name', 'Title', 'Department', 'Phone Number', 'Fax Number', 'Email Address', and 'Office Address'. 'Name' is the name of the user of Communication Device 200. 'Title' is the title of the user of Communication Device 200 at work. 'Department' is the department or the division for which the user of Communication Device 200 works. 'Phone Number' is the phone number of the user of Communication Device 200 at work. 'Fax Number' is the fax number of the user of Communication Device 200 at work. 'Email Address' is the email address of the user of Communication Device 200 at work. 'Office Address' is the street address of the office where the user of Communication Device 200 works. User's Business Card Data Storage Area 20636*b*1 of Device A stores 'Name', 'Title', 'Department', 'Phone Number', 'Fax Number', 'Email Address', and 'Office Address' of the user of Device A. User's Business Card Data Storage Area 20636*b*1 of Device B stores 'Name', 'Title', 'Department', 'Phone Number', 'Fax Number', 'Email Address', and 'Office Address' of the user of Device B.

FIG. 353 illustrates the data stored in Other Users' Business Card Data Storage Area 20636*b*2 (FIG. 351). As described in the present drawing, Other Users' Business Card Data Storage Area 20636*b*2 comprises two columns, i.e., 'User ID' and 'Business Card Data'. 'User ID' is the identification of the user of Communication Device 200 which is utilized for identifying Communication Device 200. 'Business Card Data' is the data of which the data structure is as same as the one described in FIG. 352. In the example described in the present drawing, Other Users' Business Card Data Storage Area 20636*b*2 comprises 'User ID' 20636UI1 of which 'Business Card Data' is 20636CD1, 'User ID' 20636UI2 of which 'Business Card Data' is 20636CD2, 'User ID' 20636UI3 of which 'Business Card Data' is 20636CD3, and 'User ID' 20636UI4 of which 'Business Card Data' is 20636CD4. Each of 'Business Card Data' 20636CD1, 20636CD2, 20636CD3, and 20636CD4 includes 'Name', 'Title', 'Department', 'Phone Number', 'Fax Number', 'Email Address', and 'Office Address'. 'Name' is the name of the user of Communication Device 200 in the manner described in FIG. 352. The data stored in Other Users' Business Card Data Storage Area 20636*b*2 of both Device A and Device B are not necessarily identical to each other. For example, Device A may store the data described in the present drawing, and Device B may store the following data: 'User ID' 20636UI5 of which 'Business Card Data' is 20636CD5, 'User ID' 20636UI6 of which 'Business Card Data' is 20636CD6, 'User ID' 20636UI7 of which 'Business Card Data' is 20636CD7, and 'User ID' 20636UI8 of which 'Business Card Data' is 20636CD8.

FIG. 354 illustrates the software programs stored in Business Card Software Storage Area 20636*c* (FIG. 350). As described in the present drawing, Business Card Software Storage Area 20636*c* stores User Card Data Sending Software 20636*c*1 and Other User Card Data Receiving Software 20636*c*2. User Card Data Sending Software 20636*c*1 is a software program described in FIG. 355. Other User Card Data Receiving Software 20636*c*2 is a software program described in FIG. 357.

FIG. 355 illustrates User Card Data Sending Software 20636*c*1 (FIG. 354) of Communication Device 200 (Device A in the present example). Referring to the present drawing, CPU 211 (FIG. 1) of Device A retrieves the user card data from User's Business Card Data Storage Area 20636*b*1 (FIG. 351) (S1). CPU 211 then connects to Device B in the manner described in FIG. 348, and sends Transferring User Card Data 20636TUCD which is described in FIG. 356 to Device B (S2).

FIG. 356 illustrates the data included in Transferring User Card Data 20636TUCD described in S2 of FIG. 355. As described in the present drawing, Transferring User Card Data 20636TUCD includes User ID 20636TUCD1 and User Card Data 20636TUCD2. User ID 20636TUCD1 is the identification of the user of Communication Device 200 which is utilized for identifying Device A. User Card Data 20636TUCD2 is the data retrieved in S1 of FIG. 355.

FIG. 357 illustrates Other User Card Data Receiving Software 20636*c*2 (FIG. 354) of Device B. Referring to the present drawing, CPU 211 (FIG. 1) of Device B receives Transferring User Card Data 20636TUCD (FIG. 356) sent by Device A described in S2 of FIG. 355 (S1). CPU 211 then retrieves User ID 20636TUCD1 and User Card Data 20636TUCD2 therefrom (S2), and stores these data in Other Users' Business Card Data Storage Area 20636*b*2 (FIG. 353) of Device B (S2).

<<Keyword Search Timer Recording Function>>

FIG. 358 through FIG. 433 illustrate the keyword search timer recording function which enables to timer record TV programs which meet a certain criteria set by the user of Communication Device 200. The present function is another embodiment of the timer video recording function described in FIG. 99 through FIG. 165.

FIG. 358 illustrates the storage area included in Host H. As described in the present drawing, Host H includes Keyword Search Timer Recording Information Storage Area H52*a* of which the data and software programs stored therein are described in FIG. 359.

FIG. 359 illustrates the storage areas included in Keyword Search Timer Recording Information Storage Area H52*a* (FIG. 358). As described in the present drawing, Keyword Search Timer Recording Information Storage Area H52*a* includes Keyword Search Timer Recording Data Storage Area H52*b* and Keyword Search Timer Recording Software Storage Area H52*c*. Keyword Search Timer Recording Data Storage Area H52*b* stores the data necessary to implement the present function on the side of Host H, such as the ones described in FIG. 360 through FIG. 368. Keyword Search Timer Recording Software Storage Area H52*c* stores the software programs necessary to implement the present function on the side of Host H, such as the ones described in FIG. 369.

FIG. 360 illustrates the storage areas included in Keyword Search Timer Recording Data Storage Area H52*b* (FIG. 359). As described in the present drawing, Keyword Search Timer Recording Data Storage Area H52*b* includes TV Program Data Storage Area H52*b*1, TV Program Time Frame Data Storage Area H52*b*2, TV Program Channel Data Storage Area H52*b*3, TV Program Actors/Actresses Data Storage Area H52*b*4, TV Program Category Data Storage Area H52*b*5, TV Program Summary Data Storage Area H52*b*6, and Timer Recording TV Program Relating Data Storage Area 20652*b*7. TV Program Data Storage Area H52*b*1 stores the data described in FIG. 361. TV Program Time Frame Data Storage Area H52*b*2 stores the data described in FIG. 362. TV Program Channel Data Storage Area H52*b*3 stores the data described in FIG. 364. TV Program Actors/Actresses Data Storage Area H52*b*4 stores the data described in FIG. 365. TV Program Category Data Storage Area H52*b*5 stores the data described in FIG. 366. TV Program Summary Data Storage Area H52*b*6 stores the data described in FIG. 367. Timer Recording TV Program Relating Data Storage Area **20652*b*7 stores the data described in FIG. 368**.

FIG. 361 illustrates the data stored in TV Program Data Storage Area H52*b*1 (FIG. 359). As described in the present drawing, TV Program Data Storage Area H52*b*1 comprises two columns, i.e., 'TV Program ID' and 'TV Program Data'. Column 'TV Program ID' stores the TV program IDs, and each TV program ID is the identification of the corresponding TV program data stored in column 'TV Program Data'. Column 'TV Program Data' stores the TV program data, and each TV program data comprises audiovisual data representing a TV program designed to be broadcasted and/or displayed on LCD 201 (FIG. 1) of Communication Device 200. The TV program IDs and the TV program data are pre-stored in TV Program Data Storage Area H52*b*1. In the example described in the present drawing, TV Program Data Storage Area H52*b*1 stores the following data: the TV program ID 'TV Program #1' of which the corresponding TV program data is 'TV Program Data #1'; the TV program ID 'TV Program #2' of which the corresponding TV program data is 'TV Program Data #2'; the TV program ID 'TV Program #3' of which the corresponding TV program data is 'TV Program Data #3'; the TV program ID 'TV Program #4' of which the corresponding TV program data is 'TV Program Data #4'; the TV program ID 'TV Program #5' of which the corresponding TV program data is 'TV Program Data #5'; and the TV program ID 'TV Program #6' of which the corresponding TV program data is 'TV Program Data #6'. Here, the TV program data may be of any TV program, such as science fiction, situation comedy, news, and documentary.

FIG. 362 illustrates the data stored in TV Program Time Frame Data Storage Area H52*b*2 (FIG. 359). As described in the present drawing, TV Program Time Frame Data Storage Area H52*b*2 comprises three columns, i.e., 'TV Program ID', 'TV Program Time Frame Data #1', and 'TV Program Time Frame Data #2'. Column 'TV Program ID' stores the TV program IDs, and each TV program ID is the identification of the corresponding TV program time frame data #1 stored in column 'TV Program Time Frame Data #1'. Column 'TV Program Time Frame Data #1' stores the TV program time frame data #1, and each TV program time frame data #1 represents the starting time and the ending time of the TV program represented by the corresponding TV program ID. Column 'TV Program Time Frame Data #2' stores the TV program time frame data #2, and each TV program time frame data #2 represents the starting time and the ending time of the re-run of the TV program represented by the corresponding TV program ID. In the example described in the present drawing, TV Program Time Frame Data Storage Area H52*b*2 stores the following data: the TV program ID 'TV Program #1' wherein the TV program time frame data #1 is '19:00-19:30' and the TV program time frame data #2 is '20:30-21:00'; the TV program ID 'TV Program #2' wherein the TV program time frame data #1 is '19:30-20:30' and the TV program time frame data #2 is 'Null'; the TV program ID 'TV Program #3' wherein the TV program time frame data #1 is '21:30-22:00' and the TV program time frame data #2 is 'Null'; the TV program ID 'TV Program #4' wherein the TV program time frame data #1 is '21:00-22:00' and the TV program time frame data #2 is 'Null'; the TV program ID 'TV Program #5' wherein the TV program time frame data #1 is '19:00-20:00' and the TV program time frame data #2 is '20:30-21:30'; and the TV program ID 'TV Program #6' wherein the TV program time frame data #1 is '20:00-20:30' and the TV program time frame data #2 is 'Null'.

FIG. 363 illustrates another embodiment of the data stored in TV Program Time Frame Data Storage Area H52*b*2 (FIG. 362). As described in the present drawing, TV Program Time Frame Data Storage Area H52*b*2 comprises three columns, i.e., 'TV Program ID', 'TV Program Time Frame Data #1', and 'Re-run Flag'. Column 'TV Program ID' stores the TV program IDs, and each TV program ID is the identification of the corresponding TV program time frame data #1 stored in column 'TV Program Time Frame Data #1'. Column 'TV Program Time Frame Data #1' stores the TV program time frame data #1, and each TV program time frame data #1 represents the starting time and the ending time of the TV program represented by the corresponding TV program ID. Column 'Re-run Flag' stores the re-run flag data, and each re-run flag data represents whether the TV program represented by the corresponding TV program ID is a re-run. The re-run flag data is represented by either '1' or '0' wherein '1' indicates that the corresponding TV program is a re-run, and '0' indicates that the corresponding TV program is not a re-run. In the example described in the present drawing, the following data are stored in TV Program Time Frame Data Storage Area H52*b*2: the TV program ID 'TV Program #1' wherein the TV program time frame data #1 is '19:00-19:30' and the re-run flag data is '0'; the TV program ID 'TV Program #2' wherein the TV program time frame data #1 is '19:30-20:30' and the re-run flag data is '0'; the TV program ID 'TV Program #3' wherein the TV program time frame data #1 is '21:30-22:00' and the re-run flag data is '0'; the TV program ID 'TV Program #4' wherein the TV program time frame data #1 is '21:00-22:00' and the re-run flag data is '0'; the TV program ID 'TV Program #5' wherein the TV program time frame data #1 is '19:00-20:00' and the re-run flag data is '0'; the TV program ID 'TV Program #6' wherein the TV program time frame data #1 is '20:00-20:30' and the re-run flag data is '0'; the TV program ID 'TV Program #1' wherein the TV program time frame data #1 is '20:30-21:00' and the re-run flag data is '1'; and the TV program ID 'TV Program #5' wherein the TV program time frame data #1 is '20:30-21:30' and the re-run flag data is '1'.

FIG. 364 illustrates the data stored in TV Program Channel Data Storage Area H52*b*3 (FIG. 359). As described in the present drawing, TV Program Channel Data Storage Area H52*b*3 comprises two columns, i.e., 'TV Program ID' and 'TV Program Channel Data'. Column 'TV Program ID' stores the TV program IDs which are described hereinbefore. Column 'TV Program Channel Data' stores the TV program channel data, and each TV program channel data represents the channel number of the TV program of the corresponding TV program ID. In the example described in the present drawing, TV Program Channel Data Storage Area H52*b*3 stores the following data: the TV program ID 'TV Program #1' of which the TV program channel data is 'Ch 1'; the TV program ID 'TV Program #2' of which the TV program channel data is 'Ch 1'; the TV program ID 'TV Program #3' of which the TV program channel data is 'Ch 2'; the TV program ID 'TV Program #4' of which the TV program channel data is 'Ch 1'; the TV program ID 'TV Program #5' of which the TV program channel data is 'Ch 2'; and the TV program ID 'TV Program #6' of which the TV program channel data is 'Ch 2'.

FIG. 365 illustrates the data stored in TV Program Actors/Actresses Data Storage Area H52*b*4 (FIG. 359). As described in the present drawing, TV Program Actors/Actresses Data Storage Area H52*b*4 comprises two columns, i.e., 'TV Program ID' and 'Actors/Actresses Data'. Column 'TV Program ID' stores the TV program IDs which are described hereinbefore. Column 'Actors/Actresses Data' stores the actors/actresses data, and each actors/actresses data comprises alphanumeric data representing the names of the actors and/or the actresses who are acting in the TV program represented by the corresponding TV program ID. In the example described in the present drawing, TV Program Actors/Actresses Data Storage Area H52*b*4 stores the following data: the TV program ID 'TV Program #1' of which the actors/actresses data is 'Actor #1, Actress #2'; the TV program ID 'TV Program #2' of which the actors/actresses data is 'Actor #3, Actress #3, Actress #4'; the TV program ID 'TV Program #3' of which the actors/actresses data is 'Actress #5, Actress #6'; the TV program ID 'TV Program #4' of which the actors/actresses data is 'Actor #7, Actor #8'; the TV program ID 'TV Program #5' of which the actors/actresses data is 'Actress #9'; and the TV program ID 'TV Program #6' of which the actors/actresses data is 'Actor #10, Actor #11, Actress #12'. The actors/actresses data may be the name of any existing actor(s) and/or actress(es).

FIG. 366 illustrates the data stored in TV Program Category Data Storage Area H52*b*5 (FIG. 359). As described in the present drawing, TV Program Category Data Storage Area H52*b*5 comprises two columns, i.e., 'TV Program ID' and 'Category Data'. Column 'TV Program ID' stores the TV program IDs which are described hereinbefore. Column 'Category Data' stores the category data, and each category data comprises alphanumeric data representing the category to which each TV program data of the corresponding TV program ID pertains. In the example described in the present drawing, TV Program Category Data Storage Area H52*b*5 stores the following data: the TV program ID 'TV Program #1' and the corresponding category data 'Science Fiction'; the TV program ID 'TV Program #2' and the corresponding category data 'Situation Comedy'; the TV program ID 'TV Program #3' and the corresponding category data News; the TV program ID 'TV Program #4' and the corresponding category data 'Documentary'; the TV program ID 'TV Program #5' and the corresponding category data 'Science Fiction'; and the TV program ID 'TV Program #6' and the corresponding category data 'Situation Comedy'.

FIG. 367 illustrates the data stored in TV Program Summary Data Storage Area H52*b*6 (FIG. 359). As described in the present drawing, TV Program Summary Data Storage Area H52*b*6 comprises two columns, i.e., 'TV Program ID' and 'Summary Data'. Column 'TV Program ID' stores the TV program IDs which are described hereinbefore. Column 'Summary Data' stores the summary data, and each summary data comprises alphanumeric data representing the summary of the TV program of the corresponding TV program ID. In the example described in the present drawing, TV Program Summary Data Storage Area H52*b*6 stores the following data: the TV program ID 'TV Program #1' and the corresponding summary data 'Summary #1'; the TV program ID 'TV Program #2' and the corresponding summary data 'Summary #2'; the TV program ID 'TV Program #3' and the corresponding summary data 'Summary #3'; the TV program ID 'TV Program #4' and the corresponding summary data 'Summary #4'; the TV program ID 'TV Program #5' and the corresponding summary data 'Summary #5'; and the TV program ID 'TV Program #6' and the corresponding summary data 'Summary #6'.

FIG. 368 illustrates the data stored in Timer Recording TV Program Relating Data Storage Area H52*b*7 (FIG. 359). As described in the present drawing, Timer Recording TV Program Relating Data Storage Area H52*b*7 stores the timer recording TV program relating data of each user. The timer recording TV program relating data comprises five columns, i.e., 'TV Program ID', 'TV Program Channel Data', 'TV Program Time Frame Data #1', 'Record Completed Flag Data', and 'TV Program Data'. Column 'TV Program ID' stores the TV program IDs which are described hereinbefore. Column 'TV Program Channel Data' stores the TV program channel data, and each TV program channel data represents the channel number of the TV program of the corresponding TV program ID. Column 'TV Program Time Frame Data #1' stores the TV program time frame data #1, and each TV program time frame data #1 represents the starting time and the ending time of the TV program represented by the corresponding TV program ID. Column 'Record Completed Flag Data' stores the record completed flag data, and each record completed flag data comprises either '1' or '0' wherein '1' indicates that the TV program data of the corresponding TV program ID is recorded and stored in column 'TV Program Data', and '0' indicates that the TV program data of the corresponding TV program ID is not recorded and stored in column 'TV Program Data'. Column 'TV Program Data' stores the TV program data, and each TV program data comprises audiovisual data representing a TV program designed to be broadcasted and/or displayed on LCD 201 (FIG. 1) of Communication Device 200.

FIG. 369 illustrates the software programs stored in Keyword Search Timer Recording Software Storage Area H52*c* (FIG. 359). As described in the present drawing, Keyword Search Timer Recording Software Storage Area H52*c* stores Keyword Search Timer Recording Data Sending Software H52*c*2 and Timer Recording Software H52*c*7. Keyword Search Timer Recording Data Sending Software H52*c*2 is the software program described in FIG. 383. Timer Recording Software H52*c*7 is the software program described in FIG. 389 and FIG. 390.

FIG. 370 illustrates the storage area included in RAM 206 (FIG. 1) of Communication Device 200. As described in the present drawing, RAM 206 includes Keyword Search Timer Recording Information Storage Area 20652*a* of which the data and software programs stored therein are described in FIG. 371.

FIG. 371 illustrates the storage areas included in Keyword Search Timer Recording Information Storage Area 20652*a* (FIG. 370). As described in the present drawing, Keyword Search Timer Recording Information Storage Area 20652*a* includes Keyword Search Timer Recording Data Storage Area 20652*b* and Keyword Search Timer Recording Software Storage Area 20652*c*. Keyword Search Timer Recording Data Storage Area 20652*b* stores the data necessary to implement the present function on the side of Communication Device 200, such as the ones described in FIG. 372 through FIG. 380. Keyword Search Timer Recording Software Storage Area 20652*c* stores the software programs necessary to implement the present function on the side of Communication Device 200, such as the ones described in FIG. 381.

The data and/or the software programs stored in Keyword Search Timer Recording Software Storage Area 20652*c* (FIG. 371) may be downloaded from Host H.

FIG. 372 illustrates the storage areas included in Keyword Search Timer Recording Data Storage Area 20652*b* (FIG. 371). As described in the present drawing, Keyword Search Timer Recording Data Storage Area 20652*b* includes TV Program Time Frame Data Storage Area 20652*b*2, TV Program Channel Data Storage Area 20652*b*3, TV Program Actors/Actresses Data Storage Area 20652*b*4, TV Program Category Data Storage Area 20652*b*5, TV Program Summary Data Storage Area 20652*b*6, and Timer Recording TV Program Relating Data Storage Area 20652*b*7. TV Program Time Frame Data Storage Area 20652*b*2 stores the data described in FIG. 373. TV Program Channel Data Storage Area 20652*b*3 stores the data described in FIG. 375. TV Program Actors/Actresses Data Storage Area 20652*b*4 stores the data described in FIG. 377. TV Program Category Data Storage Area 20652*b*5 stores the data described in FIG. 378. TV Program Summary Data Storage Area 20652*b*6 stores the data described in FIG. 379. Timer Recording TV Program Relating Data Storage Area 20652*b*7 stores the data described in FIG. 380.

FIG. 373 illustrates the data stored in TV Program Time Frame Data Storage Area 20652*b*2 (FIG. 371). As described in the present drawing, TV Program Time Frame Data Storage Area 20652*b*2 comprises three columns, i.e., 'TV Program ID', 'TV Program Time Frame Data #1', and 'TV Program Time Frame Data #2'. Column 'TV Program ID' stores the TV program IDs, and each TV program ID is the identification of the corresponding TV program time frame data #1 stored in column 'TV Program Time Frame Data #1'. Column 'TV Program Time Frame Data #1' stores the TV program time frame data #1, and each TV program time frame data #1 represents the starting time and the ending time of the TV program represented by the corresponding TV program ID. Column 'TV Program Time Frame Data #2' stores the TV program time frame data #2, and each TV program time frame data #2 represents the starting time and the ending time of the re-run of the TV program represented by the corresponding TV program ID. In the example described in the present drawing, TV Program Time Frame Data Storage Area 20652*b*2 stores the following data: the TV program ID 'TV Program #1' wherein the TV program time frame data #1 is '19:00-19:30' and the TV program time frame data #2 is '20:30-21:00'; the TV program ID 'TV Program #2' wherein the TV program time frame data #1 is '19:30-20:30' and the TV program time frame data #2 is 'Null'; the TV program ID 'TV Program #3' wherein the TV program time frame data #1 is '21:30-22:00' and the TV program time frame data #2 is 'Null'; the TV program ID 'TV Program #4' wherein the TV program time frame data #1 is '21:00-22:00' and the TV program time frame data #2 is 'Null'; the TV program ID 'TV Program #5' wherein the TV program time frame data #1 is '19:00-20:00' and the TV program time frame data #2 is '20:30-21:30'; and the TV program ID 'TV Program #6' wherein the TV program time frame data #1 is '20:00-20:30' and the TV program time frame data #2 is 'Null'.

FIG. 374 illustrates another embodiment of the data stored in TV Program Time Frame Data Storage Area 20652*b*2 (FIG. 373). As described in the present drawing, TV Program Time Frame Data Storage Area 20652*b*2 comprises three columns, i.e., 'TV Program ID', 'TV Program Time Frame Data #1', and 'Re-run Flag'. Column 'TV Program ID' stores the TV program IDs, and each TV program ID is the identification of the corresponding TV program time frame data #1 stored in column 'TV Program Time Frame Data #1'. Column 'TV Program Time Frame Data #1' stores the TV program time frame data #1, and each TV program time frame data #1 represents the starting time and the ending time of the TV program represented by the corresponding TV program ID. Column 'Re-run Flag' stores the re-run flag data, and each re-run flag data represents whether the TV program represented by the corresponding TV program ID is a re-run. The re-run flag data is represented by either '1' or '0' wherein '1' indicates that the corresponding TV program is a re-run, and '0' indicates that the corresponding TV program is not a re-run. In the example described in the present drawing, the following data are stored in TV Program Time Frame Data Storage Area 20652*b*2: the TV program ID 'TV Program #1' wherein the TV program time frame data #1 is '19:00-19:30' and the re-run flag data is '0'; the TV program ID 'TV Program #2' wherein the TV program time frame data #1 is '19:30-20:30' and the re-run flag data is '0'; the TV program ID 'TV Program #3' wherein the TV program time frame data #1 is '21:30-22:00' and the re-run flag data is '0'; the TV program ID 'TV Program #4' wherein the TV program time frame data #1 is '21:00-22:00' and the re-run flag data is '0'; the TV program ID 'TV Program #5' wherein the TV program time frame data #1 is '19:00-20:00' and the re-run flag data is '0'; the TV program ID 'TV Program #6' wherein the TV program time frame data #1 is '20:00-20:30' and the re-run flag data is '0'; the TV program ID 'TV Program #1' wherein the TV program time frame data #1 is '20:30-21:00' and the re-run flag data is '1'; and the TV program ID 'TV Program #5' wherein the TV program time frame data #1 is '20:30-21:30' and the re-run flag data is '1'.

FIG. 375 illustrates the data stored in TV Program Channel Data Storage Area 20652*b*3 (FIG. 371). As described in the present drawing, TV Program Channel Data Storage Area 20652*b*3 comprises two columns, i.e., 'TV Program ID' and 'TV Program Channel Data'. Column 'TV Program ID' stores the TV program IDs which are described hereinbefore. Column 'TV Program Channel Data' stores the TV program channel data, and each TV program channel data represents the channel number of the TV program of the corresponding TV program ID. In the example described in the present drawing, TV Program Channel Data Storage Area 20652*b*3 stores the following data: the TV program ID 'TV Program #1' of which the TV program channel data is 'Ch 1'; the TV program ID 'TV Program #2' of which the TV program channel data is 'Ch 1'; the TV program ID 'TV Program #3' of which the TV program channel data is 'Ch 2'; the TV program ID 'TV Program #4' of which the TV program channel data is 'Ch 1'; the TV program ID 'TV Program #5' of which the TV program channel data is 'Ch 2'; and the TV program ID 'TV Program #6' of which the TV program channel data is 'Ch 2'.

FIG. 376 illustrates the TV program listing displayed on LCD 201 (FIG. 1). As described in the present drawing, the TV program listing reflects the data stored in TV Program Time Frame Data Storage Area 20652*b*2 (FIG. 373 and/or FIG. 374) and TV Program Channel Data Storage Area 20652*b*3 (FIG. 375).

FIG. 377 illustrates the data stored in TV Program Actors/Actresses Data Storage Area 20652*b*4 (FIG. 371). As described in the present drawing, TV Program Actors/Actresses Data Storage Area 20652*b*4 comprises two columns, i.e., 'TV Program ID' and 'Actors/Actresses Data'. Column 'TV Program ID' stores the TV program IDs which are described hereinbefore. Column 'Actors/Actresses Data' stores the actors/actresses data, and each actors/actresses data comprises alphanumeric data representing the names of the actors and/or the actresses who are acting in the TV program represented by the corresponding TV program ID. In the example described in the present drawing, TV Program Actors/Actresses Data Storage Area **20652*b*4 stores the following data: the TV program ID 'TV Program #1' of which the actors/actresses data is 'Actor #1, Actress #2'; the TV program ID 'TV Program #2' of which the actors/actresses data is 'Actor #3, Actress #3, Actress #4'; the TV program ID 'TV Program #3' of which the actors/actresses data is 'Actress #5, Actress #6'; the TV program ID 'TV Program #4' of which the actors/actresses data is 'Actor #7, Actor #8'; the TV program ID 'TV Program #5' of which the actors/actresses data is 'Actress #9'; and the TV program ID 'TV Program #6' of which the actors/actresses data is 'Actor #10, Actor #11, Actress #12**'. The actors/actresses data may be the name of any existing actor(s) and/or actress(es).

FIG. 378 illustrates the data stored in TV Program Category Data Storage Area **20652*b*5 (FIG. 371). As described in the present drawing, TV Program Category Data Storage Area 20652*b*5 comprises two columns, i.e., 'TV Program ID' and 'Category Data'. Column 'TV Program ID' stores the TV program IDs which are described hereinbefore. Column 'Category Data' stores the category data, and each category data comprises alphanumeric data representing the category to which each TV program data of the corresponding TV program ID pertains. In the example described in the present drawing, TV Program Category Data Storage Area 20652*b*5 stores the following data: the TV program ID 'TV Program #1' and the corresponding category data 'Science Fiction'; the TV program ID 'TV Program #2' and the corresponding category data 'Situation Comedy'; the TV program ID 'TV Program #3' and the corresponding category data News; the TV program ID 'TV Program #4' and the corresponding category data 'Documentary'; the TV program ID 'TV Program #5' and the corresponding category data 'Science Fiction'; and the TV program ID 'TV Program #6**' and the corresponding category data 'Situation Comedy'.

FIG. 379 illustrates the data stored in TV Program Summary Data Storage Area **20652*b*6 (FIG. 371). As described in the present drawing, TV Program Summary Data Storage Area 20652*b*6 comprises two columns, i.e., 'TV Program ID' and 'Summary Data'. Column 'TV Program ID' stores the TV program IDs which are described hereinbefore. Column 'Summary Data' stores the summary data, and each summary data comprises alphanumeric data representing the summary of the TV program of the corresponding TV program ID. In the example described in the present drawing, TV Program Summary Data Storage Area 20652*b*6 stores the following data: the TV program ID 'TV Program #1' and the corresponding summary data 'Summary #1'; the TV program ID 'TV Program #2' and the corresponding summary data 'Summary #2'; the TV program ID 'TV Program #3' and the corresponding summary data 'Summary #3'; the TV program ID 'TV Program #4' and the corresponding summary data 'Summary #4'; the TV program ID 'TV Program #5' and the corresponding summary data 'Summary #5'; and the TV program ID 'TV Program #6' and the corresponding summary data 'Summary #6**'.

FIG. 380 illustrates the data stored in Timer Recording TV Program Relating Data Storage Area **20652*b*7 (FIG. 371). As described in the present drawing, Timer Recording TV Program Relating Data Storage Area 20652*b*7 stores the timer recording TV program relating data. The timer recording TV program relating data comprises five columns, i.e., 'TV Program ID', 'TV Program Channel Data', 'TV Program Time Frame Data #1', 'Record Completed Flag Data', and 'TV Program Data'. Column 'TV Program ID' stores the TV program IDs which are described hereinbefore. Column 'TV Program Channel Data' stores the TV program channel data, and each TV program channel data represents the channel number of the TV program of the corresponding TV program ID. Column 'TV Program Time Frame Data #1' stores the TV program time frame data #1, and each TV program time frame data #1 represents the starting time and the ending time of the TV program represented by the corresponding TV program ID. Column 'Record Completed Flag Data' stores the record completed flag data, and each record completed flag data comprises either '1' or '0' wherein '1' indicates that the TV program data of the corresponding TV program ID is recorded and stored in column 'TV Program Data', and '0' indicates that the TV program data of the corresponding TV program ID is not recorded and stored in column 'TV Program Data'. Column 'TV Program Data' stores the TV program data, and each TV program data comprises audiovisual data representing a TV program designed to be broadcasted and/or displayed on LCD 201 (FIG. 1) of Communication Device 200. A plurality of timer recording TV program relating data can be stored in Timer Recording TV Program Relating Data Storage Area 20652*b*7**.

FIG. 381 illustrates the software programs stored in Keyword Search Timer Recording Software Storage Area **20652*c* (FIG. 371). As described in the present drawing, Keyword Search Timer Recording Software Storage Area 20652*c* stores Keyword Search Timer Recording Data Request Sending Software 20652*c*1, Keyword Search Timer Recording Data Receiving Software 20652*c*3, Timer Recording Setting By Actors/Actresses Software 20652*c*4, Timer Recording Setting By Category Software 20652*c*5, Re-run Avoiding Process Software 20652*c*6, Timer Recording Software 20652*c*7, Timer Recording Notification Displaying Software 20652*c*8, TV Program Data Selecting Software 20652*c*10, and TV Program Data Replaying Software 20652*c*11. Keyword Search Timer Recording Data Request Sending Software 20652*c*1 is the software program described in FIG. 382. Keyword Search Timer Recording Data Receiving Software 20652*c*3 is the software program described in FIG. 384. Timer Recording Setting By Actors/Actresses Software 20652*c*4 is the software program described in FIG. 385. Timer Recording Setting By Category Software 20652*c*5 is the software program described in FIG. 386. Re-run Avoiding Process Software 20652*c*6 is the software program described in FIG. 387. Timer Recording Software 20652*c*7 is the software program described in FIG. 389 and FIG. 390. Timer Recording Notification Displaying Software 20652*c*8 is the software program described in FIG. 391. TV Program Data Selecting Software 20652*c*10 is the software program described in FIG. 392. TV Program Data Replaying Software 20652*c*11 is the software program described in FIG. 393**.

FIG. 382 illustrates Keyword Search Timer Recording Data Request Sending Software **20652*c*1 stored in Keyword Search Timer Recording Software Storage Area 20652*c* (FIG. 381) of Communication Device 200, which sends the keyword search timer recording data request to Host H. Referring to the present drawing, CPU 211 (FIG. 1) of Communication Device 200 sends the keyword search timer recording data request to Host H (S1). Here, the keyword search timer recording data request is a request signal which requests to send back the keyword search timer recording data stored in Keyword Search Timer Recording Data Storage Area H52*b* (FIG. 360**) of Host H.

FIG. 383 illustrates Keyword Search Timer Recording Data Sending Software H**52*c*2 stored in Keyword Search Timer Recording Software Storage Area H52*c* (FIG. 369) of Host H, which sends the keyword search timer recording data to Communication Device 200. Referring to the present drawing, Host H, upon receiving the keyword search timer recording data request from Communication Device 200 (S1), retrieves the keyword search timer recording data from Keyword Search Timer Recording Data Storage Area H52***b* (FIG. 360), excluding the data stored in TV Program Data Storage Area H52*b*1 (FIG. 361). The data stored in Timer Recording TV Program Relating Data Storage Area H52*b*7 (FIG. 368) are also retrieved, however, only of the ones of the corresponding user ID.

FIG. 384 illustrates Keyword Search Timer Recording Data Receiving Software 20652*c*3 stored in Keyword Search Timer Recording Software Storage Area 20652*c* (FIG. 381) of Communication Device 200, which receives and stores the keyword search timer recording data sent from Host H. Referring to the present drawing, CPU 211 (FIG. 1) of Communication Device 200 receives the keyword search timer recording data from Host H (S1). CPU 211 then stores the data in Keyword Search Timer Recording Data Storage Area 20652*b* (FIG. 372) (S2).

FIG. 385 illustrates Timer Recording Setting By Actors/Actresses Software 20652*c*4 stored in Keyword Search Timer Recording Software Storage Area 20652*c* (FIG. 381) of Communication Device 200, which sets the timer recording by inputting the names of actors and/or actresses. Referring to the present drawing, the actors/actresses' name input area in which the names of actors and/or actresses are to be input is displayed on LCD 201 (FIG. 1) (S1). The names of actors and/or actresses are input to the area by utilizing Input Device 210 (FIG. 1) or via voice recognition system (S2). CPU 211 searches TV Program Actors/Actresses Data Storage Area 20652*b*4 (FIG. 377) (S3), and identifies the TV program IDs of the TV programs having the actors and/or actresses identified in S2 acting therein, as well as implementing the re-run avoiding process (S4). The re-run avoiding process is the process described in FIG. 387 and FIG. 388. CPU 211 identifies the corresponding TV program channel data and the TV program time frame data #1 of each TV program ID by referring to TV Program Channel Data Storage Area 20652*b*3 (FIG. 375) and TV Program Time Frame Data Storage Area 20652*b*2 (FIG. 373 and/or FIG. 374), and stores the TV program IDs, the TV program channel data, and the TV program time frame data #1 (collectively referred to as the 'timer recording setting data' hereinafter) in Timer Recording TV Program Relating Data Storage Area 20652*b*7 (FIG. 380) (S5). The timer recording setting data is displayed on LCD 201 (S6).

FIG. 386 illustrates Timer Recording Setting By Category Software 20652*c*5 stored in Keyword Search Timer Recording Software Storage Area 20652*c* (FIG. 381) of Communication Device 200, which sets the timer recording by inputting the names of the categories. Referring to the present drawing, the category input area in which the names of the categories are to be input is displayed on LCD 201 (FIG. 1) (S1). The names of the categories are input to the area by utilizing Input Device 210 (FIG. 1) or via voice recognition system (S2). CPU 211 searches TV Program Category Data Storage Area 20652*b*5 (FIG. 378) (S3), and identifies the TV program IDs of the TV programs pertaining to the categories identified in S2, as well as implementing the re-run avoiding process (S4). The re-run avoiding process is the process described in FIG. 387 and FIG. 388. CPU 211 identifies the corresponding TV program channel data and the TV program time frame data #1 of each TV program ID by referring to TV Program Channel Data Storage Area 20652*b*3 (FIG. 375) and TV Program Time Frame Data Storage Area 20652*b*2 (FIG. 373 and/or FIG. 374), and stores the TV program IDs, the TV program channel data, and the TV program time frame data #1 (i.e., timer recording setting data) in Timer Recording TV Program Relating Data Storage Area 20652*b*7 (FIG. 380) (S5). The timer recording setting data is displayed on LCD 201 (S6).

FIG. 387 illustrates Re-run Avoiding Process Software 20652*c*6 stored in Keyword Search Timer Recording Software Storage Area 20652*c* (FIG. 381) of Communication Device 200, which avoids selecting the re-runs of the TV programs which are already selected. Referring to the present drawing, CPU 211 (FIG. 1) searches column 'TV Program Time Frame Data #1' of TV Program Time Frame Data Storage Area 20652*b*2 described in FIG. 373 (S1). The re-runs are avoided from being selected by prohibiting to search column 'TV Program Time Frame Data #2'.

FIG. 388 illustrates another embodiment of Re-run Avoiding Process Software 20652*c*6 stored in Keyword Search Timer Recording Software Storage Area 20652*c* (FIG. 381) of Communication Device 200, which avoids selecting the re-runs of the TV programs which are already selected. Referring to the present drawing, CPU 211 (FIG. 1) searches column 'Re-run Flag Data' of TV Program Time Frame Data Storage Area 20652*b*2 described in FIG. 374 (S1). If the re-run flag data is '1' (S2), CPU 211 prohibits the corresponding TV program data to be timer recorded (S3). In the example described in FIG. 374, the TV programs #1 and #5 of which the TV program time frame data #1 are '20:30-21:00' and '20:30-21:30' respectively, are re-runs (i.e., the re-run flag data are registered as '1'). Therefore, the TV program data of which the TV program IDs are TV programs #1 and #5 on-aired on 20:30-21:00 and 20:30-21:30 respectively are refrained from being timer recorded.

FIG. 389 and FIG. 390 illustrate Timer Recording Software H52*c*7 stored in Keyword Search Timer Recording Software Storage Area H52*c* (FIG. 369) of Host H and Timer Recording Software 20652*c*7 stored in Keyword Search Timer Recording Software Storage Area 20652*c* (FIG. 381) of Communication Device 200, which implement the timer recording in accordance to the settings described in FIG. 385 and/or FIG. 386. Referring to the present drawing, CPU 211 (FIG. 1) of Communication Device 200 retrieves the TV program time frame data from Timer Recording TV Program Relating Data Storage Area 20652*b*7 (FIG. 380) (S1). If the time frame data matches with the current time (S2), CPU 211 sends the corresponding TV program data downloading request to Host H (S3). Upon receiving the corresponding TV program data downloading request from Communication Device 200 (S4), Host H retrieves the corresponding TV program data from TV Program Data Storage Area H52*b*1 (FIG. 361) (S5), and sends the data to Communication Device 200 (S6). CPU 211 receives the corresponding TV program data from Host H (S7), and stores the corresponding TV program data in Timer Recording TV Program Relating Data Storage Area 20652*b*7 (FIG. 380) (S8). CPU 211 then registers the corresponding record completed flag data (of Timer Recording TV Program Relating Data Storage Area 20652*b*7 (FIG. 380)) as '1' (S9).

FIG. 391 illustrates Timer Recording Notification Displaying Software 20652*c*8 stored in Keyword Search Timer Recording Software Storage Area 20652*c* (FIG. 381) of Communication Device 200, which displays a notification on LCD 201 (FIG. 1) when a new TV program data is recorded. Referring to the present drawing, CPU 211 of Communication Device 200 periodically checks the status of TV Timer Recording TV Program Relating Data Storage Area 20652*b*7 (FIG. 380) (S1). If a new TV program data stored (S2), CPU 211 displays the timer recording notification on LCD 201 (FIG. 1) which indicates that a new TV program data is recorded (S3).

FIG. 392 illustrates TV Program Data Selecting Software 20652c10 stored in Keyword Search Timer Recording Software Storage Area 20652c (FIG. 381) of Communication Device 200, which selects the TV program data to be replayed. Referring to the present drawing, CPU 211 (FIG. 1) of Communication Device 200 retrieves the timer recording TV program relating data from Timer Recording TV Program Relating Data Storage Area 20652b7 (FIG. 380) (S1), and displays a list of the timer recording TV program relating data on LCD 201 (FIG. 1) (S2). The TV program data to be replayed is selected therefrom by utilizing Input Device 210 (FIG. 1) or via voice recognition system (S3).

FIG. 393 illustrates TV Program Data Replaying Software 20652c11 stored in Keyword Search Timer Recording Software Storage Area 20652c (FIG. 381) of Communication Device 200, which replays the TV program data selected in S3 of FIG. 392. Referring to the present drawing, CPU 211 (FIG. 1) of Communication Device 200 replays the TV program data (S1), and outputs visual data and audio data from LCD 201 (FIG. 1) and Speaker 216 (FIG. 1), respectively (S2). Here, the entire TV program data may be downloaded before being replayed or, as another embodiment, the replay process described in S5 may be initiated as soon as a replayable portion of the TV program data is downloaded. The portion of the TV program data which is replayed may be stored for the next replay, or as another embodiment, be erased from Communication Device 200.

<<Keyword Search Timer Recording Function—Another Embodiment01>>

FIG. 394 through FIG. 408 illustrate another embodiment of the present function wherein the timer recording setting is implemented by Communication Device 200 whereas the timer recording is implemented by Host H.

FIG. 394 illustrates the software programs stored in Keyword Search Timer Recording Software Storage Area H52c (FIG. 359) of Host H. As described in the present drawing, Keyword Search Timer Recording Software Storage Area H52c stores Timer Recording Setting By Actors/Actresses Software H52c4, Timer Recording Setting By Category Software H52c5, Re-run Avoiding Process Software H52b6, Timer Recording Software H52c7, Timer Recording Notification Displaying Software H52c8, Timer Recording TV Program Relating Data Request Sending Software H52c9, and TV Program Data Replaying Software H52c11. Timer Recording Setting By Actors/Actresses Software H52c4 is the software program described in FIG. 396 and FIG. 397. Timer Recording Setting By Category Software H52c5 is the software program described in FIG. 398 and FIG. 399. Re-run Avoiding Process Software H52b6 is the software program described in FIG. 400 and FIG. 401. Timer Recording Software H52c7 is the software program described in FIG. 402. Timer Recording Notification Displaying Software H52c8 is the software program described in FIG. 405. Timer Recording TV Program Relating Data Request Sending Software H52c9 is the software program described in FIG. 406. TV Program Data Replaying Software H52c11 is the software program described in FIG. 408.

FIG. 395 illustrates the software programs stored in Keyword Search Timer Recording Software Storage Area 20652c (FIG. 371) of Communication Device 200. As described in the present drawing, Keyword Search Timer Recording Software Storage Area 20652c stores Timer Recording Setting By Actors/Actresses Software 20652c4, Timer Recording Setting By Category Software 20652c5, Timer Recording Software 20652c7, Timer Recording Notification Displaying Software 20652c8, Timer Recording TV Program Relating Data Request Sending Software 20652c9, TV Program Data Selecting Software 20652c10, and TV Program Data Replaying Software 20652c11. Timer Recording Setting By Actors/Actresses Software 20652c4 is the software program described in FIG. 396 and FIG. 397. Timer Recording Setting By Category Software 20652c5 is the software program described in FIG. 398 and FIG. 399. Timer Recording Software 20652c7 is the software program described in FIG. 403 and FIG. 404. Timer Recording Notification Displaying Software 20652c8 is the software program described in FIG. 405. Timer Recording TV Program Relating Data Request Sending Software 20652c9 is the software program described in FIG. 406. TV Program Data Selecting Software 20652c10 is the software program described in FIG. 407. TV Program Data Replaying Software 20652c11 is the software program described in FIG. 408.

FIG. 396 and FIG. 397 illustrate Timer Recording Setting By Actors/Actresses Software H52c4 stored in Keyword Search Timer Recording Software Storage Area H52c (FIG. 394) of Host H and Timer Recording Setting By Actors/Actresses Software 20652c4 stored in Keyword Search Timer Recording Software Storage Area 20652c (FIG. 395) of Communication Device 200, which set the timer recording by inputting the names of actors and/or actresses. Referring to the present drawing, the actors/actresses' name input area in which the names of actors and/or actresses are to be input is displayed on LCD 201 (FIG. 1) (S1). The names of actors and/or actresses are input to the area by utilizing Input Device 210 (FIG. 1) or via voice recognition system (S2). CPU 211 (FIG. 1) of Communication Device 200 sends the actors' and/or actresses' name data (S3), which is received by Host H (S4). Here, the actors' and/or actresses' name data is the alphanumeric data which represents the actors' and/or actresses' name input in S2. Host H searches TV Program Actors/Actresses Data Storage Area H52b4 (FIG. 365) (S5), and identifies the TV program IDs of the TV programs having the actors and/or actresses identified in S2 acting therein, as well as implementing the re-run avoiding process (S6). The re-run avoiding process is the process described in FIG. 400 and FIG. 401. Host H identifies the corresponding TV program channel data and the TV program time frame data #1 of each TV program ID by referring to TV Program Channel Data Storage Area H52b3 (FIG. 364) and TV Program Time Frame Data Storage Area H52b2 (FIG. 362 and/or FIG. 363), and stores the TV program IDs, the TV program channel data, and the TV program time frame data #1 (i.e., the timer recording setting data) in Timer Recording TV Program Relating Data Storage Area H52b7 (FIG. 368) (S7). Host H then retrieves the foregoing data from Timer Recording TV Program Relating Data Storage Area H52b7 (FIG. 368) (S8), which are sent to Communication Device 200 (S9). Communication Device 200 receives the data (S10), and stores them in Timer Recording TV Program Relating Data Storage Area 20652b7 (FIG. 380) (S11). The data is displayed on LCD 201 (S12).

FIG. 398 and FIG. 399 illustrate Timer Recording Setting By Category Software H52c5 stored in Keyword Search Timer Recording Software Storage Area H52c (FIG. 394) of Host H and Timer Recording Setting By Category Software 20652c5 stored in Keyword Search Timer Recording Software Storage Area 20652c (FIG. 395) of Communication Device 200, which set the timer recording by inputting the names of the categories. Referring to the present drawing, the category input area in which the names of the categories are to be input is displayed on LCD 201 (FIG. 1) (S1). The names of the categories are input to the area by utilizing Input Device 210 (FIG. 1) or via voice recognition system (S2). CPU 211 (FIG. 1) sends the category data to Host H (S3). Here, the category data is the alphanumeric data which represents the category input in S2. Host H receives the category data from Communication Device 200 (S4), and searches TV Program Category Data Storage Area H52*b*5 (FIG. 366) (S5). Host H then identifies the TV program IDs of the TV programs pertaining to the categories identified in S2, as well as implementing the re-run avoiding process (S6). The re-run avoiding process is the process described in FIG. 400 and FIG. 401. Host H identifies the corresponding TV program channel data and the TV program time frame data #1 of each TV program ID by referring to TV Program Channel Data Storage Area H52*b*3 (FIG. 364) and TV Program Time Frame Data Storage Area H52*b*2 (FIG. 362 and/or FIG. 363), and stores the TV program IDs, the TV program channel data, and the TV program time frame data #1 (i.e., the timer recording setting data) in Timer Recording TV Program Relating Data Storage Area H52*b*7 (FIG. 368) (S7). Host H retrieves the data from Timer Recording TV Program Relating Data Storage Area H52*b*7 (FIG. 368) (S8), and sends them to Communication Device 200 (S9). CPU 211 receives the data (S10), and stores them in Timer Recording TV Program Relating Data Storage Area 20652*b*7 (FIG. 380) (S11). The data are displayed on LCD 201 (S12).

FIG. 400 illustrates Re-run Avoiding Process Software H52*b*6 stored in Keyword Search Timer Recording Software Storage Area H52*c* (FIG. 394) of Host H, which avoids selecting the re-runs of the TV programs which are already selected. Referring to the present drawing, Host H searches column 'TV Program Time Frame Data #1' of TV Program Time Frame Data Storage Area H52*b*2 described in FIG. 362 (S1). The re-runs are avoided from being selected by prohibiting to search column 'TV Program Time Frame Data #2'.

FIG. 401 illustrates another embodiment of Re-run Avoiding Process Software H52*b*6 stored in Keyword Search Timer Recording Software Storage Area H52*c* (FIG. 394) of Host H, which avoids selecting the re-runs of the TV programs which are already selected. Referring to the present drawing, Host H searches column 'Re-run Flag Data' of TV Program Time Frame Data Storage Area H52*b*2 described in FIG. 363 (S1). If the re-run flag data is '1' (S2), Host H prohibits the corresponding TV program data to be timer recorded (S3). In the example described in FIG. 363, the TV programs #1 and #5 of which the TV program time frame data #1 are '20:30-21:00' and '20:30-21:30' respectively, are re-runs (i.e., the re-run flag data are registered as '1'). Therefore, the TV program data of which the TV program IDs are TV programs #1 and #5 on-aired on 20:30-21:00 and 20:30-21:30 respectively are refrained from being timer recorded.

FIG. 402 illustrates Timer Recording Software H52*c*7 stored in Keyword Search Timer Recording Software Storage Area H52*c* (FIG. 394) of Host H, which implements the timer recording in accordance to the settings described in FIG. 396 and FIG. 397, and/or FIG. 398 and FIG. 399. Referring to the present drawing, Host H retrieves the TV program time frame data from Timer Recording TV Program Relating Data Storage Area H52*b*7 (FIG. 368) (S1). If the time frame data matches with the current time (S2), Host H stores the corresponding TV program data in Timer Recording TV Program Relating Data Storage Area H52*b*7 (FIG. 368) (S3). Host H then registers the corresponding record completed flag data (of Timer Recording TV Program Relating Data Storage Area H52*b*7 (FIG. 368)) as '1' (S4).

FIG. 403 and FIG. 404 illustrate another embodiment of Timer Recording Software H52*c*7 stored in Keyword Search Timer Recording Software Storage Area H52*c* (FIG. 394) of Host H and Timer Recording Software 20652*c*7 stored in Keyword Search Timer Recording Software Storage Area 20652*c* (FIG. 395) of Communication Device 200, which automatically download the TV program data to Timer Recording TV Program Relating Data Storage Area 20652*b*7 (FIG. 380) of Communication Device 200 instead of storing the data in Host H as described in FIG. 402. Referring to the present drawing, Host H retrieves the TV program time frame data from Timer Recording TV Program Relating Data Storage Area H52*b*7 (FIG. 368) (S1). If the time frame data matches with the current time (S2), Host H sends the corresponding TV program data to Communication Device 200 (S3). Upon receiving the TV program data from Host H (S4), Communication Device 200 stores the TV program data in Timer Recording TV Program Relating Data Storage Area 20652*b*7 (FIG. 380) (S5). Communication Device 200 registers the corresponding record completed flag data (of Timer Recording TV Program Relating Data Storage Area 20652*b*7 (FIG. 380)) as '1' (S6). Host H then registers the corresponding record completed flag data (of Timer Recording TV Program Relating Data Storage Area H52*b*7 (FIG. 368)) as '1' (S7).

FIG. 405 illustrates Timer Recording Notification Displaying Software H52*c*8 stored in Keyword Search Timer Recording Software Storage Area H52*c* (FIG. 394) of Host H and Timer Recording Notification Displaying Software 20652*c*8 stored in Keyword Search Timer Recording Software Storage Area 20652*c* (FIG. 395) of Communication Device 200, which display a notification on LCD 201 (FIG. 1) when a new TV program data is recorded. Referring to the present drawing, Host periodically checks the status of TV Program Data Storage Area H52*b*1 (FIG. 361) (S1). If a new TV program data stored (S2), Host H sends a timer recording notification to Communication Device 200 (S3). Here, the timer recording notification is a data which indicates that a new TV program data is recorded. Upon receiving the timer recording notification from Host H (S4), CPU 211 displays the timer recording notification on LCD 201 (FIG. 1) which indicates that a new TV program data is recorded (S5).

FIG. 406 illustrates Timer Recording TV Program Relating Data Request Sending Software H52*c*9 stored in Keyword Search Timer Recording Software Storage Area H52*c* (FIG. 394) of Host H and Timer Recording TV Program Relating Data Request Sending Software 20652*c*9 stored in Keyword Search Timer Recording Software Storage Area 20652*c* (FIG. 395) of Communication Device 200, which sends and receives a timer recording TV program relating data request. Referring to the present drawing, Communication Device 200 sends the timer recording TV program relating data request (S1), which is received by Host H (S2). Here the timer recording TV program relating data request is a request to Host H for the timer recording TV program relating data to be sent to Communication Device 200. In response to the request, Host H retrieves the timer recording TV program relating data from Timer Recording TV Program Relating Data Storage Area H52*b*7 (FIG. 368) of the corresponding user ID (S3), and sends the data to Communication Device 200 (S4). CPU 211 receives the timer recording TV program relating data from Host H (S5), and stores the data in Timer Recording TV Program Relating Data Storage Area 20652*b*7 (FIG. 380) (S6).

FIG. 407 illustrates TV Program Data Selecting Software 20652*c*10 stored in Keyword Search Timer Recording Software Storage Area 20652*c* (FIG. 395) of Communication Device 200, which selects the TV program data to be replayed. Referring to the present drawing, CPU 211 (FIG. 1)

retrieves the timer recording TV program relating data from Timer Recording TV Program Relating Data Storage Area **20652*b*7 (FIG. 380) (S1), and displays a list of the timer recording TV program relating data on LCD 201 (FIG. 1) (S2). The TV program data to be replayed is selected therefrom by utilizing Input Device 210 (FIG. 1) or via voice recognition system (S3**).

FIG. 408 illustrates TV Program Data Replaying Software H**52*c*11 stored in Keyword Search Timer Recording Software Storage Area H52*c* (FIG. 394) of Host H and TV Program Data Replaying Software 20652*c*11 stored in Keyword Search Timer Recording Software Storage Area 20652*c* (FIG. 395) of Communication Device 200, which replay the TV program data selected in S3 of FIG. 407. Referring to the present drawing, CPU 211 (FIG. 1) sends the TV program ID of the TV program data selected in S3 of FIG. 3952 to Host H (S1). Upon receiving the TV Program ID from Communication Device 200 (S2), Host H sends the corresponding TV program data to Communication Device 200 (S3). Communication Device 200 receives the TV program data from Host H (S4), and replays the TV program data, and outputs video data and audio data from LCD 201 (FIG. 1) and Speaker 216, respectively (S5). Here, the entire TV program data may be downloaded before being replayed or, as another embodiment, the replay process described in S5 may be initiated as soon as a replayable portion of the TV program data is downloaded. The portion of the TV program data which is replayed may be stored for the next replay, or as another embodiment, be erased from Communication Device 200**.

<<Keyword Search Timer Recording Function—Another Embodiment02>>

FIG. 409 and FIG. 410 illustrate another embodiment of the foregoing embodiments of Timer Recording Software H**52*c*7 stored in Keyword Search Timer Recording Software Storage Area H52*c* of Host H and Timer Recording Software 20652*c*7 stored in Keyword Search Timer Recording Software Storage Area 20652*c* of Communication Device 200, in which the timer recording is administered by Communication Device 200 whereas the TV program data is stored in Host H (instead of Communication Device 200). Referring to the present drawing, CPU 211 (FIG. 1) of Communication Device 200 retrieves the TV program time frame data from Timer Recording TV Program Relating Data Storage Area 20652*b*7 (FIG. 380) (S1). If the time frame data matches with the current time (S2), CPU 211 sends the corresponding TV program data recording request to Host H (S3). Here, the corresponding TV program data recording request is a request to record the TV program data which is identified in S2. Upon receiving the corresponding TV program data recording request from Communication Device 200 (S4), Host H retrieves the corresponding TV program data from TV Program Data Storage Area H52*b*1 (FIG. 361) (S5), and stores the data in Timer Recording TV Program Relating Data Storage Area H52*b*7 (FIG. 368) of the corresponding user ID (S6). Host H then registers the corresponding record completed flag data (of Timer Recording TV Program Relating Data Storage Area H52*b*7 (FIG. 368)) as '1' (S7). Host H sends the corresponding TV program data record completed notice (S8), which is received by Communication Device 200 (S9). CPU 211 registers the corresponding record completed flag data (of Timer Recording TV Program Relating Data Storage Area 20652*b*7 (FIG. 380)) as '1' (S10**).

<<Keyword Search Timer Recording Function—Another Embodiment03>>

FIG. 411 through FIG. 419 illustrate another embodiment of the present function storing the TV program data in Personal Computer PC. Here, Personal Computer PC may be any type of personal computer including the ones described in this specification (excluding Host H and Communication Device 200).

FIG. 411 illustrates the storage area included in Personal Computer PC. As described in the present drawing, Personal Computer PC includes Keyword Search Timer Recording Information Storage Area PC**52*a* of which the data and the software programs stored therein are described in FIG. 412**.

FIG. 412 illustrates the storage areas included in Keyword Search Timer Recording Information Storage Area PC**52*a* (FIG. 411). As described in the present drawing, Keyword Search Timer Recording Information Storage Area PC52*a* includes Keyword Search Timer Recording Data Storage Area PC52*b* and Keyword Search Timer Recording Software Storage Area PC52*c*. Keyword Search Timer Recording Data Storage Area PC52*b* stores the data necessary to implement the present function on the side of Personal Computer PC, such as the ones described in FIG. 413 and FIG. 414. Keyword Search Timer Recording Software Storage Area PC52*c* stores the software programs necessary to implement the present function on the side of Personal Computer PC, such as the one described in FIG. 415**.

The data and/or the software programs stored in Keyword Search Timer Recording Software Storage Area PC**52*c* (FIG. 412**) may be downloaded from Host H.

FIG. 413 illustrates the storage area included in Keyword Search Timer Recording Data Storage Area PC**52*b* (FIG. 412). As described in the present drawing, Keyword Search Timer Recording Data Storage Area PC52*b* includes Timer Recording TV Program Relating Data Storage Area PC52*b*7 of which the data stored therein are described in FIG. 414**.

FIG. 414 illustrates the data stored in Timer Recording TV Program Relating Data Storage Area PC**52*b*7. As described in the present drawing, Timer Recording TV Program Relating Data Storage Area PC52*b*7 comprises five columns, i.e., 'TV Program ID', 'TV Program Channel Data', 'TV Program Time Frame Data #1', 'Record Completed Flag Data', and 'TV Program Data'. Column 'TV Program ID' stores the TV program IDs which are described hereinbefore. Column 'TV Program Channel Data' stores the TV program channel data, and each TV program channel data represents the channel number of the TV program of the corresponding TV program ID. Column 'TV Program Time Frame Data #1' stores the TV program time frame data #1, and each TV program time frame data #1 represents the starting time and the ending time of the TV program represented by the corresponding TV program ID. Column 'Record Completed Flag Data' stores the record completed flag data, and each record completed flag data comprises either '1' or '0' wherein '1' indicates that the TV program data of the corresponding TV program ID is recorded and stored in column 'TV Program Data', and '0' indicates that the TV program data of the corresponding TV program ID is not recorded and stored in column 'TV Program Data'. Column 'TV Program Data' stores the TV program data, and each TV program data comprises audiovisual data representing a TV program designed to be broadcasted and/or displayed on LCD 201 (FIG. 1) of Communication Device 200**.

FIG. 415 illustrates the software program stored in Keyword Search Timer Recording Software Storage Area PC**52*c*. As described in the present drawing, Keyword Search Timer Recording Software Storage Area PC52*c* stores Timer Recording Software PC52*c*7. Timer Recording Software PC52*c*7 is the software program described in FIG. 416 and FIG. 417**.

FIG. 416 and FIG. 417 illustrate Timer Recording Software H**52*c*7 stored in Keyword Search Timer Recording Software Storage Area H52***c* of Host H, Timer Recording Software 20652*c*7 stored in Keyword Search Timer Recording Software Storage Area 20652*c* of Communication Device 200, and Timer Recording Software PC52*c*7 stored in Keyword Search Timer Recording Software Storage Area PC52*c* (FIG. 415), in which the timer recording is administered by Communication Device 200 whereas the TV program data is stored in Personal Computer PC (FIG. 411) (instead of Communication Device 200 and/or Host H). Referring to the present drawing, CPU 211 (FIG. 1) of Communication Device 200 retrieves the TV program time frame data from Timer Recording TV Program Relating Data Storage Area 20652*b*7 (FIG. 380) (S1). If the time frame data matches with the current time (S2), CPU 211 sends the corresponding TV program data recording request to Host H (S3). Here, the corresponding TV program data recording request is a request to record the TV program data which is identified in S2. Upon receiving the corresponding TV program data recording request from Communication Device 200 (S4), Host H retrieves the corresponding TV program data from TV Program Data Storage Area H52*b*1 (FIG. 361) (S5), and sends the data to Personal Computer PC (FIG. 411) (S6). Personal Computer PC stores the data in Timer Recording TV Program Relating Data Storage Area PC52*b*7 (FIG. 414) (S7). Host H then registers the corresponding record completed flag data (of Timer Recording TV Program Relating Data Storage Area H52*b*7 (FIG. 368)) as '1' (S8). Personal Computer PC registers the corresponding record completed flag data (of Timer Recording TV Program Relating Data Storage Area PC52*b*7 (FIG. 414)) as '1' (S9). Host H sends the corresponding TV program data record completed notice (S10) and Personal Computer PC sends the corresponding TV program data record completed notice (S11), both of which are received by Communication Device 200 (S12). CPU 211 of Communication Device 200 registers the corresponding record completed flag data (of Timer Recording TV Program Relating Data Storage Area 20652*b*7 (FIG. 380)) as '1' (S13).

FIG. 418 and FIG. 419 illustrate another embodiment, described in FIG. 416 and FIG. 417, of Timer Recording Software H52*c*7 stored in Keyword Search Timer Recording Software Storage Area H52*c* of Host H, Timer Recording Software 20652*c*7 stored in Keyword Search Timer Recording Software Storage Area 20652*c* of Communication Device 200, and Timer Recording Software PC52*c*7 stored in Keyword Search Timer Recording Software Storage Area PC52*c* (FIG. 415) of Personal Computer PC, in which the timer recording is administered by Host H and the TV program data is stored in Personal Computer PC (FIG. 411) (instead of Communication Device 200 and/or Host H). Referring to the present drawing, Host H retrieves the TV program time frame data from Timer Recording TV Program Relating Data Storage Area H52*b*7 (FIG. 368) (S1). If the time frame data matches with the current time (S2), Host H sends the corresponding TV program data to Personal Computer PC (S3). Upon receiving the TV program data from Host H (S4), Personal Computer PC stores the data in Timer Recording TV Program Relating Data Storage Area PC52*b*7 (FIG. 414) (S5). Host H then registers the corresponding record completed flag data (of Timer Recording TV Program Relating Data Storage Area H52*b*7 (FIG. 368)) as '1' (S6). Personal Computer PC registers the corresponding record completed flag data (of Timer Recording TV Program Relating Data Storage Area PC52*b*7 (FIG. 414)) as '1' (S7). Host H sends the corresponding TV program data record completed notice (S8) and Personal Computer PC sends the corresponding TV program data record completed notice (S9), both of which are received by Communication Device 200 (S10). CPU 211 of Communication Device 200 registers the corresponding record completed flag data (of Timer Recording TV Program Relating Data Storage Area 20652*b*7 (FIG. 380)) as '1' (S11).

<<Keyword Search Timer Recording Function—Another Embodiment04>>

FIG. 420 through FIG. 433 illustrate another embodiment of the present function wherein the timer record setting is performed by Communication Device 200, the timer recording is administered by Personal Computer PC, and the TV program data is stored in Personal Computer PC. Here, Personal Computer PC may be any type of personal computer including the ones described in this specification (excluding Host H and Communication Device 200).

FIG. 420 illustrates the software programs stored in Keyword Search Timer Recording Software Storage Area H52*c* (FIG. 369) of Host H. As described in the present drawing, Keyword Search Timer Recording Software Storage Area H52*c* stores Keyword Search Timer Recording Data Sending Software H52*c*2 and Timer Recording Software H52*c*7. Keyword Search Timer Recording Data Sending Software H52*c*2 is the software program described in FIG. 424. Timer Recording Software H52*c*7 is the software program described in FIG. 431.

FIG. 421 illustrates the software programs stored in Keyword Search Timer Recording Software Storage Area 20652*c* (FIG. 381) of Communication Device 200. As described in the present drawing, Keyword Search Timer Recording Software Storage Area 20652*c* stores Keyword Search Timer Recording Data Request Sending Software 20652*c*1, Keyword Search Timer Recording Data Receiving Software 20652*c*3, Timer Recording Setting By Actors/Actresses Software 20652*c*4, Timer Recording Setting By Category Software 20652*c*5, Re-run Avoiding Process Software 20652*c*6, Timer Recording TV Program Relating Data Sending/Receiving Software 20652*c*6*a*, Timer Recording Software 20652*c*7, and Timer Recording Notification Displaying Software 20652*c*8. Keyword Search Timer Recording Data Request Sending Software 20652*c*1 is the software program described in FIG. 423. Keyword Search Timer Recording Data Receiving Software 20652*c*3 is the software program described in FIG. 425. Timer Recording Setting By Actors/Actresses Software 20652*c*4 is the software program described in FIG. 426. Timer Recording Setting By Category Software 20652*c*5 is the software program described in FIG. 427. Re-run Avoiding Process Software 20652*c*6 is the software program described in FIG. 428 and FIG. 429. Timer Recording TV Program Relating Data Sending/Receiving Software 20652*c*6*a* is the software program described in FIG. 430. Timer Recording Software 20652*c*7 is the software program described in FIG. 431. Timer Recording Notification Displaying Software 20652*c*8 is the software program described in FIG. 433.

FIG. 422 illustrates the software programs stored in Keyword Search Timer Recording Software Storage Area PC52*c* (FIG. 412) of Personal Computer PC (FIG. 411). As described in the present drawing, Keyword Search Timer Recording Software Storage Area PC52*c* stores Timer Recording TV Program Relating Data Sending/Receiving Software PC52*c*6*a* and Timer Recording Software PC52*c*7. Timer Recording TV Program Relating Data Sending/Receiving Software PC52*c*6*a* is the software program described in FIG. 430. Timer Recording Software PC52*c*7 is the software program described in FIG. 431.

FIG. 423 illustrates Keyword Search Timer Recording Data Request Sending Software 20652*c*1 stored in Keyword Search Timer Recording Software Storage Area 20652*c*

(FIG. 421) of Communication Device 200, which sends the keyword search timer recording data request to Host H. Referring to the present drawing, CPU 211 (FIG. 1) of Communication Device 200 sends the keyword search timer recording data request to Host H (S1). Here, the keyword search timer recording data request is a request signal which requests to send back the keyword search timer recording data stored in Keyword Search Timer Recording Data Storage Area H52*b* (FIG. 360) of Host H.

FIG. 424 illustrates Keyword Search Timer Recording Data Sending Software H52*c*2 stored in Keyword Search Timer Recording Software Storage Area H52*c* (FIG. 420) of Host H, which sends the keyword search timer recording data to Communication Device 200. Referring to the present drawing, Host H, upon receiving the keyword search timer recording data request from Communication Device 200 (S1), retrieves the keyword search timer recording data from Keyword Search Timer Recording Data Storage Area H52*b* (FIG. 360), excluding the data stored in TV Program Data Storage Area H52*b*1 (FIG. 361). The data stored in Timer Recording TV Program Relating Data Storage Area H52*b*7 (FIG. 368) are also retrieved, however, only of the ones of the corresponding user ID.

FIG. 425 illustrates Keyword Search Timer Recording Data Receiving Software 20652*c*3 stored in Keyword Search Timer Recording Software Storage Area 20652*c* (FIG. 421) of Communication Device 200, which receives and stores the keyword search timer recording data sent from Host H. Referring to the present drawing, CPU 211 (FIG. 1) of Communication Device 200 receives the keyword search timer recording data from Host H (S1). CPU 211 then stores the data in Keyword Search Timer Recording Data Storage Area 20652*b* (FIG. 372) (S2).

FIG. 426 illustrates Timer Recording Setting By Actors/Actresses Software 20652*c*4 stored in Keyword Search Timer Recording Software Storage Area 20652*c* (FIG. 421) of Communication Device 200, which sets the timer recording by inputting the names of actors and/or actresses. Referring to the present drawing, the actors/actresses' name input area in which the names of actors and/or actresses are to be input is displayed on LCD 201 (FIG. 1) (S1). The names of actors and/or actresses are input to the area by utilizing Input Device 210 (FIG. 1) or via voice recognition system (S2). CPU 211 searches TV Program Actors/Actresses Data Storage Area 20652*b*4 (FIG. 377) (S3), and identifies the TV program IDs of the TV programs having the actors and/or actresses identified in S2 acting therein, as well as implementing the re-run avoiding process (S4). The re-run avoiding process is the process described in FIG. 428 and FIG. 429. CPU 211 identifies the corresponding TV program channel data and the TV program time frame data #1 of each TV program ID by referring to TV Program Channel Data Storage Area 20652*b*3 (FIG. 375) and TV Program Time Frame Data Storage Area 20652*b*2 (FIG. 373 and/or FIG. 374), and stores the TV program IDs, the TV program channel data, and the TV program time frame data #1 (collectively referred to as the 'timer recording setting data' hereinafter) in Timer Recording TV Program Relating Data Storage Area 20652*b*7 (FIG. 380) (S5). The timer recording setting data is displayed on LCD 201 (S6).

FIG. 427 illustrates Timer Recording Setting By Category Software 20652*c*5 stored in Keyword Search Timer Recording Software Storage Area 20652*c* (FIG. 421) of Communication Device 200, which sets the timer recording by inputting the names of the categories. Referring to the present drawing, the category input area in which the names of the categories are to be input is displayed on LCD 201 (FIG. 1) (S1). The names of the categories are input to the area by utilizing Input Device 210 (FIG. 1) or via voice recognition system (S2). CPU 211 searches TV Program Category Data Storage Area 20652*b*5 (FIG. 378) (S3), and identifies the TV program IDs of the TV programs pertaining to the categories identified in S2, as well as implementing the re-run avoiding process (S4). The re-run avoiding process is the process described in FIG. 428 and FIG. 429. CPU 211 identifies the corresponding TV program channel data and the TV program time frame data #1 of each TV program ID by referring to TV Program Channel Data Storage Area 20652*b*3 (FIG. 375) and TV Program Time Frame Data Storage Area 20652*b*2 (FIG. 373 and/or FIG. 374), and stores the TV program IDs, the TV program channel data, and the TV program time frame data #1 (i.e., timer recording setting data) in Timer Recording TV Program Relating Data Storage Area 20652*b*7 (FIG. 380) (S5). The timer recording setting data is displayed on LCD 201 (S6).

FIG. 428 illustrates Re-run Avoiding Process Software 20652*c*6 stored in Keyword Search Timer Recording Software Storage Area 20652*c* (FIG. 421) of Communication Device 200, which avoids selecting the re-runs of the TV programs which are already selected. Referring to the present drawing, CPU 211 (FIG. 1) searches column 'TV Program Time Frame Data #1' of TV Program Time Frame Data Storage Area 20652*b*2 described in FIG. 373 (S1). The re-runs are avoided from being selected by prohibiting to search column 'TV Program Time Frame Data #2'.

FIG. 429 illustrates another embodiment of Re-run Avoiding Process Software 20652*c*6 stored in Keyword Search Timer Recording Software Storage Area 20652*c* (FIG. 421) of Communication Device 200, which avoids selecting the re-runs of the TV programs which are already selected. Referring to the present drawing, CPU 211 (FIG. 1) of searches column 'Re-run Flag Data' of TV Program Time Frame Data Storage Area 20652*b*2 described in FIG. 374 (S1). If the re-run flag data is '1' (S2), CPU 211 prohibits the corresponding TV program data to be timer recorded (S3). In the example described in FIG. 374, the TV programs #1 and #5 of which the TV program time frame data #1 are '20:30-21:00' and '20:30-21:30' respectively, are re-runs (i.e., the re-run flag data are registered as '1'). Therefore, the TV program data of which the TV program IDs are TV programs #1 and #5 on-aired on 20:30-21:00 and 20:30-21:30 respectively are refrained from being timer recorded.

FIG. 430 illustrates Timer Recording TV Program Relating Data Sending/Receiving Software 20652*c*6*a* stored in Keyword Search Timer Recording Software Storage Area 20652*c* (FIG. 421) of Communication Device 200 and Timer Recording TV Program Relating Data Sending/Receiving Software PC52*c*6*a* stored in Keyword Search Timer Recording Software Storage Area PC52*c* (FIG. 422) of Personal Computer PC (FIG. 411), which sends and receives the timer recording TV program relating data. Referring to the present drawing, CPU 211 (FIG. 1) of Communication Device 200 retrieves the timer recording TV program relating data from Timer Recording TV Program Relating Data Storage Area 20652*b*7 (FIG. 380) (S1). CPU 211 then sends the timer recording TV program relating data to Personal Computer PC (S2). Upon receiving the timer recording TV program relating data from Communication Device 200 (S3), Personal Computer PC stores the data in Timer Recording TV Program Relating Data Storage Area PC52*b*7 (S4).

FIG. 431 and FIG. 432 illustrate Timer Recording Software H52*c*7 stored in Keyword Search Timer Recording Software Storage Area H52*c* (FIG. 420) of Host H, Timer Recording Software 20652*c*7 stored in Keyword Search Timer Recording Software Storage Area 20652*c* (FIG. 421) of Communication Device 200, and Timer Recording Software PC52*c*7 of Personal Computer PC (FIG. 411), which implement the timer recording in accordance to the settings described in FIG. 385 and/or FIG. 386. Referring to the present drawing, Personal Computer PC retrieves the TV program time frame data from Timer Recording TV Program Relating Data Storage Area PC52*b*7 (FIG. 414) (S1). If the time frame data matches with the current time (S2), Personal Computer PC sends the corresponding TV program data downloading request to Host H (S3). Upon receiving the corresponding TV program data downloading request from Personal Computer PC (S4), Host H retrieves the corresponding TV program data from TV Program Data Storage Area H52*b*1 (FIG. 361) (S5), and sends the data to Personal Computer PC (S6). Personal Computer PC receives the corresponding TV program data from Host H (S7), and stores the corresponding TV program data in Timer Recording TV Program Relating Data Storage Area PC52*b*7 (FIG. 414) (S8). Personal Computer PC then registers the corresponding record completed flag data (of Timer Recording TV Program Relating Data Storage Area PC52*b*7) as '1' (S9). Host H registers the corresponding record completed flag data (of Timer Recording TV Program Relating Data Storage Area H52*b*7 (FIG. 368)) as '1' (S10). Personal Computer PC sends the corresponding record completed flag data (of Timer Recording TV Program Relating Data Storage Area PC52*b*7) (S11), which is received by Communication Device 200 (S12). Communication Device 200 registers the corresponding record completed flag data (of Timer Recording TV Program Relating Data Storage Area 20652*b*7 (FIG. 380)) as '1' (S13).

FIG. 433 illustrates Timer Recording Notification Displaying Software 20652*c*8 stored in Keyword Search Timer Recording Software Storage Area 20652*c* (FIG. 421) of Communication Device 200, which displays a notification on LCD 201 (FIG. 1) when a new TV program data is recorded. Referring to the present drawing, CPU 211 periodically checks the status of TV Timer Recording TV Program Relating Data Storage Area 20652*b*7 (FIG. 380) (S1). If a new TV program data stored (S2), CPU 211 displays the timer recording notification on LCD 201 (FIG. 1) which indicates that a new TV program data is recorded (S3).

For the avoidance of doubt, FIG. 391 through FIG. 393 are also applicable to this embodiment.

<<Weather Forecast Displaying Function>>

FIG. 434 through FIG. 467 illustrate the weather forecast displaying function which displays on LCD 201 (FIG. 1) the weather forecast of the current location of Communication Device 200.

FIG. 434 illustrates the storage area included in Host H. As described in the present drawing, Host H includes Weather Forecast Displaying Information Storage Area H53*a* of which the data and the software programs stored therein are described in FIG. 435.

FIG. 435 illustrates the storage areas included in Weather Forecast Displaying Information Storage Area H53*a* (FIG. 434). As described in the present drawing, Weather Forecast Displaying Information Storage Area H53*a* includes Weather Forecast Displaying Data Storage Area H53*b* and Weather Forecast Displaying Software Storage Area H53*c*. Weather Forecast Displaying Data Storage Area H53*b* stores the data necessary to implement the present function on the side of Host H, such as the ones described in FIG. 437 through FIG. 440. Weather Forecast Displaying Software Storage Area H53*c* stores the software programs necessary to implement the present function on the side of Host H, such as the ones described in FIG. 441.

FIG. 436 illustrates the storage areas included in Weather Forecast Displaying Data Storage Area H53*b* (FIG. 435). As described in the present drawing, Weather Forecast Displaying Data Storage Area H53*b* includes Geographic Area Data Storage Area H53*b*1, Weather Forecast Data Storage Area H53*b*2, Location Name Data Storage Area H53*b*3, Calculated GPS Data Storage Area H53*b*4, and Work Area H53*b*5. Geographic Area Data Storage Area H53*b*1 stores the data described in FIG. 437. Weather Forecast Data Storage Area H53*b*2 stores the data described in FIG. 438. Location Name Data Storage Area H53*b*3 stores the data described in FIG. 439. Calculated GPS Data Storage Area H53*b*4 stores the data described in FIG. 440. Work Area H53*b*5 is utilized as a work area for Host H to perform calculation and store data temporarily.

FIG. 437 illustrates the data stored in Geographic Area Data Storage Area H53*b*1 (FIG. 436). As described in the present drawing, Geographic Area Data Storage Area H53*b*1 comprises two columns, i.e., 'Location ID' and 'Geographic Area Data'. Column 'Location ID' stores the location IDs, and each location ID is an identification of the corresponding geographic area data stored in column 'Geographic Area Data'. Column 'Geographic Area Data' stores the geographic area data, and each geographic area data represents the predetermined geographic area. In the example described in the present drawing, Geographic Area Data Storage Area H53*b*1 stores the following data: the location ID 'Location #1' and the geographic area data 'Geographic Area Data#1'; the location ID 'Location #2' and the geographic area data 'Geographic Area Data#2'; the location ID 'Location #3' and the geographic area data 'Geographic Area Data#3'; and the location ID 'Location #4' and the geographic area data 'Geographic Area Data#4'. Here, 'Geographic Area Data#1' represents the geographic area of Sacramento, Calif.; 'Geographic Area Data#2' represents the geographic area of San Jose, Calif.; 'Geographic Area Data#3' represents the geographic area of San Francisco, Calif.; and 'Geographic Area Data#4' represents the geographic area of San Mateo, Calif.

FIG. 438 illustrates the data stored in Weather Forecast Data Storage Area H53*b*2 (FIG. 436). As described in the present drawing, Weather Forecast Data Storage Area H53*b*2 comprises two columns, i.e., 'Location ID' and 'Weather Forecast Data'. Column 'Location ID' stores the location IDs described hereinbefore. Column 'Weather Forecast Data' stores the weather forecast data, and each weather forecast data represents the weather forecast of the geographic area data corresponding to the location ID stored in Geographic Area Data Storage Area H53*b*1 (FIG. 437). In the example described in the present drawing, Weather Forecast Data Storage Area H53*b*2 stores the following data: the location ID 'Location #1' and the weather forecast data 'Sunny'; the location ID 'Location #2' and the weather forecast data 'Sunny'; the location ID 'Location #3' and the weather forecast data 'Cloudy'; and the location ID 'Location #4' and the weather forecast data 'Cloudy'. By referring to the data stored in Geographic Area Data Storage Area H53*b*1 (FIG. 437), the following is implied: the weather forecast of Sacramento, Calif. (Geographic Area Data#1) is 'Sunny'; the weather forecast of San Jose, Calif. (Geographic Area Data#2) is 'Sunny'; the weather forecast of San Francisco, Calif. (Geographic Area Data#3) is 'Cloudy'; and the weather forecast of San Mateo, Calif. (Geographic Area Data#4) is 'Cloudy'.

FIG. 439 illustrates the data stored in Location Name Data Storage Area H53*b*3 (FIG. 436). As described in the present drawing, Location Name Data Storage Area H53*b*3 comprises two columns, i.e., ‘Location ID’ and ‘Location Name Data’. Column ‘Location ID’ stores the location IDs described hereinbefore. Column ‘Location Name Data’ stores the location name data, and each location data represents the name of the geographic area data stored in Geographic Area Data Storage Area H53*b*1 (FIG. 437) of the corresponding location ID. In the example described in the present drawing, Location Name Data Storage Area H53*b*3 stores the following data: the location ID ‘Location #1’ and the location name data ‘Sacramento, Calif.’ corresponding to the geographic area data ‘Geographic Area Data#1’ stored in Geographic Area Data Storage Area H53*b*1; the location ID ‘Location #2’ and the location name data ‘San Jose, Calif.’ corresponding to the geographic area data ‘Geographic Area Data#2’ stored in Geographic Area Data Storage Area H53*b*1; the location ID ‘Location #3’ and the location name data ‘San Francisco, Calif.’ corresponding to the geographic area data ‘Geographic Area Data#3’ stored in Geographic Area Data Storage Area H53*b*1; and the location ID ‘Location #4’ and the location name data ‘San Mateo, Calif.’ corresponding to the geographic area data ‘Geographic Area Data#4’ stored in Geographic Area Data Storage Area H53*b*1.

FIG. 440 illustrates the data stored in Calculated GPS Data Storage Area H53*b*4 (FIG. 436). As described in the present drawing, Calculated GPS Data Storage Area H53*b*4 comprises two columns, i.e., ‘User ID’ and ‘Calculated GPS Data’. Column ‘User ID’ stores the user IDs, and each user ID represents the identification of Communication Device 200. Column ‘Calculated GPS Data’ stores the calculated GPS data, and each calculated GPS data represents the current geographic location of Communication Device 200 of the corresponding user ID in (x, y, z) format. In the example described in the present drawing, Calculated GPS Data Storage Area H53*b*4 stores the following data: the user ID ‘User #1’ and the calculated GPS data ‘x1, y1, z1’ of the Communication Device 200 of the corresponding user ID; the user ID ‘User #2’ and the calculated GPS data ‘x2, y2, z2’ of the Communication Device 200 of the corresponding user ID; and the user ID ‘User #3’ and the calculated GPS data ‘x3, y3, z3’ of the Communication Device 200 of the corresponding user ID.

FIG. 441 illustrates the software programs stored in Weather Forecast Displaying Software Storage Area H53*c* (FIG. 435). As described in the present drawing, Weather Forecast Displaying Software Storage Area H53*c* stores Weather Forecast Data Updating Software H53*c*1, Weather Forecast Displaying Data Sending/Receiving Software H53*c*1*a*, and Com. Device Pin-pointing Software H53*c*2. Weather Forecast Data Updating Software H53*c*1 is the software program described in FIG. 450. Weather Forecast Displaying Data Sending/Receiving Software H53*c*1*a* is the software program described in FIG. 451. Com. Device Pin-pointing Software H53*c*2 is the software program described in FIG. 452.

FIG. 442 illustrates the storage area included in RAM 206 (FIG. 1) of Communication Device 200. As described in the present drawing, RAM 206 includes Weather Forecast Displaying Information Storage Area **20653*a* of which the data and the software programs stored therein are described in FIG. 443**.

FIG. 443 illustrates the storage areas included in Weather Forecast Displaying Information Storage Area **20653*a* (FIG. 442). As described in the present drawing, Weather Forecast Displaying Information Storage Area 20653*a* includes Weather Forecast Displaying Data Storage Area 20653*b* and Weather Forecast Displaying Software Storage Area 20653*c*. Weather Forecast Displaying Data Storage Area 20653*b* stores the data necessary to implement the present function on the side of Communication Device 200, such as the ones described in FIG. 445 through FIG. 448. Weather Forecast Displaying Software Storage Area 20653*c* stores the software programs necessary to implement the present function on the side of Communication Device 200, such as the ones described in FIG. 449**.

The data and/or the software programs stored in Weather Forecast Displaying Software Storage Area **20653*c* (FIG. 443**) may be downloaded from Host H.

FIG. 444 illustrates the storage areas included in Weather Forecast Displaying Data Storage Area **20653*b* (FIG. 443). As described in the present drawing, Weather Forecast Displaying Data Storage Area 20653*b* includes Geographic Area Data Storage Area 20653*b*1, Weather Forecast Data Storage Area 20653*b*2, Location Name Data Storage Area 20653*b*3, Calculated GPS Data Storage Area 20653*b*4, and Work Area 20653*b*5. Geographic Area Data Storage Area 20653*b*1 stores the data described in FIG. 445. Weather Forecast Data Storage Area 20653*b*2 stores the data described in FIG. 446. Location Name Data Storage Area 20653*b*3 stores the data described in FIG. 447. Calculated GPS Data Storage Area 20653*b*4 stores the data described in FIG. 448. Work Area 20653*b*5 is utilized as a work area for Communication Device 200** to perform calculation and store data temporarily.

FIG. 445 illustrates the data stored in Geographic Area Data Storage Area **20653*b*1 (FIG. 444). As described in the present drawing, Geographic Area Data Storage Area 20653*b*1 comprises two columns, i.e., ‘Location ID’ and ‘Geographic Area Data’. Column ‘Location ID’ stores the location IDs, and each location ID is an identification of the corresponding geographic area data stored in column ‘Geographic Area Data’. Column ‘Geographic Area Data’ stores the geographic area data, and each geographic area data represents the predetermined geographic area. In the example described in the present drawing, Geographic Area Data Storage Area 20653*b*1** stores the following data: the location ID ‘Location #1’ and the geographic area data ‘Geographic Area Data#1’; the location ID ‘Location #2’ and the geographic area data ‘Geographic Area Data#2’; the location ID ‘Location #3’ and the geographic area data ‘Geographic Area Data#3’; and the location ID ‘Location #4’ and the geographic area data ‘Geographic Area Data#4’. Here, ‘Geographic Area Data#1’ represents the geographic area of Sacramento, Calif.; ‘Geographic Area Data#2’ represents the geographic area of San Jose, Calif.; ‘Geographic Area Data#3’ represents the geographic area of San Francisco, Calif.; and ‘Geographic Area Data#4’ represents the geographic area of San Mateo, Calif.

FIG. 446 illustrates the data stored in Weather Forecast Data Storage Area **20653*b*2 (FIG. 444). As described in the present drawing, Weather Forecast Data Storage Area 20653*b*2 comprises two columns, i.e., ‘Location ID’ and ‘Weather Forecast Data’. Column ‘Location ID’ stores the location IDs described hereinbefore. Column ‘Weather Forecast Data’ stores the weather forecast data, and each weather forecast data represents the weather forecast of the geographic area data corresponding to the location ID stored in Geographic Area Data Storage Area 20653*b*1 (FIG. 445). In the example described in the present drawing, Weather Forecast Data Storage Area 20653*b*2 stores the following data: the location ID ‘Location #1’ and the weather forecast data ‘Sunny’; the location ID ‘Location #2’ and the weather forecast data ‘Sunny’; the location ID ‘Location #3’ and the weather forecast data ‘Cloudy’; and the location ID ‘Location #4’ and the weather forecast data ‘Cloudy’. By referring to the data stored in Geographic Area Data Storage Area 20653*b*1 (FIG. 445), the following is implied: the weather forecast of Sacramento, Calif. (Geographic Area Data#1) is 'Sunny'; the weather forecast of San Jose, Calif. (Geographic Area Data#2) is 'Sunny'; the weather forecast of San Francisco, Calif. (Geographic Area Data#3) is 'Cloudy'; and the weather forecast of San Mateo, Calif. (Geographic Area Data#4**) is 'Cloudy'.

FIG. 447 illustrates the data stored in Location Name Data Storage Area **20653*b*3 (FIG. 444). As described in the present drawing, Location Name Data Storage Area 20653*b*3 comprises two columns, i.e., 'Location ID' and 'Location Name Data'. Column 'Location ID' stores the location IDs described hereinbefore. Column 'Location Name Data' stores the location name data, and each location data represents the name of the geographic area data stored in Geographic Area Data Storage Area 20653*b*1 (FIG. 445) of the corresponding location ID. In the example described in the present drawing, Location Name Data Storage Area 20653*b*3 stores the following data: the location ID 'Location #1' and the location name data 'Sacramento, Calif.' corresponding to the geographic area data 'Geographic Area Data#1' stored in Geographic Area Data Storage Area 20653*b*1; the location ID 'Location #2' and the location name data 'San Jose, Calif.' corresponding to the geographic area data 'Geographic Area Data#2' stored in Geographic Area Data Storage Area 20653*b*1; the location ID 'Location #3' and the location name data 'San Francisco, Calif.' corresponding to the geographic area data 'Geographic Area Data#3' stored in Geographic Area Data Storage Area 20653*b*1; and the location ID 'Location #4' and the location name data 'San Mateo, Calif.' corresponding to the geographic area data 'Geographic Area Data#4' stored in Geographic Area Data Storage Area 20653*b*1**.

FIG. 448 illustrates the data stored in Calculated GPS Data Storage Area **20653*b*4 (FIG. 444). As described in the present drawing, Calculated GPS Data Storage Area 20653*b*4 comprises two columns, i.e., 'User ID' and 'Calculated GPS Data'. Column 'User ID' stores the user ID, which represents the identification of Communication Device 200. Column 'Calculated GPS Data' stores the calculated GPS data, which represents the current geographic location of Communication Device 200 of the corresponding user ID in (x, y, z) format. In the example described in the present drawing, Calculated GPS Data Storage Area 20653*b*4 stores the following data: the user ID 'User #1' and the calculated GPS data 'x1, y1, z1' of the Communication Device 200 of 'User #1**'.

FIG. 449 illustrates the software programs stored in Weather Forecast Displaying Software Storage Area **20653*c* (FIG. 443). As described in the present drawing, Weather Forecast Displaying Software Storage Area 20653*c* stores Weather Forecast Data Sending/Receiving Software 20653*c*1*a*, Com. Device Pin-pointing Software 20653*c*2, Geographic Area Data Identifying Software 20653*c*3, Weather Forecast Data Identifying Software 20653*c*4, Location Name Data Identifying Software 20653*c*5, and Current Location Weather Forecasting Data Displaying Software 20653*c*6. Weather Forecast Data Sending/Receiving Software 20653*c*1*a* is the software program described in FIG. 451. Com. Device Pin-pointing Software 20653*c*2 is the software program described in FIG. 452 and FIG. 453. Geographic Area Data Identifying Software 20653*c*3 is the software program described in FIG. 454. Weather Forecast Data Identifying Software 20653*c*4 is the software program described in FIG. 455. Location Name Data Identifying Software 20653*c*5 is the software program described in FIG. 456. Current Location Weather Forecasting Data Displaying Software 20653*c*6 is the software program described in FIG. 457**.

FIG. 450 illustrates Weather Forecast Data Updating Software H**53*c*1 stored in Weather Forecast Displaying Software Storage Area H53*c* (FIG. 441) of Host H, which periodically updates the weather forecast data stored in Weather Forecast Data Storage Area H53*b*2 (FIG. 438). Referring to the present drawing, Host H periodically checks for the updated weather forecast data (S1). If any updated weather forecast data is received from another host computer (S2), Host H updates Weather Forecast Data Storage Area H53*b*2 (FIG. 438) accordingly (S3**).

FIG. 451 illustrates Weather Forecast Displaying Data Sending/Receiving Software H**53*c*1*a* stored in Weather Forecast Displaying Software Storage Area H53*c* (FIG. 441) of Host H and Weather Forecast Data Sending/Receiving Software 20653*c*1*a* stored in Weather Forecast Displaying Software Storage Area 20653*c* (FIG. 449) of Communication Device 200, which sends and receives the weather forecast displaying data. Referring to the present drawing, CPU 211 (FIG. 1) of Communication Device 200 sends the weather forecast displaying data request to Host H (S1). Here, the weather forecast displaying data request is a request to send the weather forecast displaying data to Communication Device 200. Upon receiving the weather forecast displaying data request from Communication Device 200 (S2), Host H retrieves the weather forecast displaying data from Weather Forecast Displaying Data Storage Area H53*b* (FIG. 436) (Host H) (S3), and sends the data to Communication Device 200 (S4). Upon receiving the weather forecast displaying data from Host H (S5), CPU 211 stores the weather forecast displaying data in Weather Forecast Displaying Data Storage Area 20653*b* (FIG. 444) (S6**).

FIG. 452 illustrates Com. Device Pin-pointing Software H**53*c*2 stored in Weather Forecast Displaying Software Storage Area H53*c* (FIG. 441) of Host H and Com. Device Pin-pointing Software 20653*c*2 stored in Weather Forecast Displaying Software Storage Area 20653*c* (FIG. 449) of Communication Device 200, which identifies the current geographic location of Communication Device 200. Referring to the present drawing, CPU 211 (FIG. 1) of Communication Device 200 collects the GPS raw data from the near base stations (S1). CPU 211 sends the raw GPS data to Host H (S2). Upon receiving the raw GPS data (S3), Host H produces the calculated GPS data by referring to the raw GPS data (S4). Host H stores the calculated GPS data in Calculated GPS Data Storage Area H53*b*4 (FIG. 440) (S5). Host H then retrieves the calculated GPS data from Calculated GPS Data Storage Area H53*b*4 (FIG. 440) (S6), and sends the data to Communication Device 200 (S7). Upon receiving the calculated GPS data from Host H (S8), CPU 211 stores the data in Calculated GPS Data Storage Area 20653*b*4 (FIG. 448) (S9**). Here, the GPS raw data are the primitive data utilized to produce the calculated GPS data, and the calculated GPS data are the data representing the location in (x, y, z) format.

FIG. 453 illustrates another embodiment of the sequence described in FIG. 452 in which the entire process is performed solely by Com. Device Pin-pointing Software **20653*c*2 stored in Weather Forecast Displaying Software Storage Area 20653*c* (FIG. 449) of Communication Device 200. Referring to the present drawing, CPU 211 (FIG. 1) of Communication Device 200 collects the raw GPS data from the near base stations (S1). CPU 211 then produces the calculated GPS data by referring to the raw GPS data (S2), and stores the calculated GPS data in Calculated GPS Data Storage Area 20653*b*4 (FIG. 448) (S3**).

FIG. 454 illustrates Geographic Area Data Identifying Software 20653*c*3 stored in Weather Forecast Displaying Software Storage Area 20653*c* (FIG. 449) of Communication Device 200, which identifies the geographic area data to identify the geographic area in which Communication Device 200 is located. Referring to the present drawing, CPU 211 (FIG. 1) of Communication Device 200 retrieves the calculated GPS data from Calculated GPS Data Storage Area 20653*b*4 (FIG. 448) (S1). CPU 211 then searches Geographic Area Data Storage Area 20653*b*1 (FIG. 445) (S2) to identify the geographic area data in which the calculated GPS data is located (S3). CPU 211 stores the geographic area data identified in S3 in Work Area 20653*b*5 (FIG. 444) (S4).

FIG. 455 illustrates Weather Forecast Data Identifying Software 20653*c*4 stored in Weather Forecast Displaying Software Storage Area 20653*c* (FIG. 449) of Communication Device 200, which identifies the weather forecast data of the geographic area in which Communication Device 200 is located. Referring to the present drawing, CPU 211 (FIG. 1) of Communication Device 200 searches Weather Forecast Data Storage Area 20653*b*2 (FIG. 446) for the location ID corresponding to the geographic area data identified in S3 of FIG. 454 (S1). CPU 211 identifies the weather forecast data (S2), and stores the weather forecast data in Work Area 20653*b*5 (FIG. 444) (S3).

FIG. 456 illustrates Location Name Data Identifying Software 20653*c*5 stored in Weather Forecast Displaying Software Storage Area 20653*c* (FIG. 449) of Communication Device 200, which identifies the location name of the geographic area in which Communication Device 200 is located. Referring to the present drawing, CPU 211 (FIG. 1) of Communication Device 200 searches Location Name Data Storage Area 20653*b*3 (FIG. 447) for the location ID corresponding to the geographic area data identified in S3 of FIG. 454 (S1). CPU 211 identifies the location name data (S2), and stores the location name data in Work Area 20653*b*5 (FIG. 444) (S3).

FIG. 457 illustrates Current Location Weather Forecasting Data Displaying Software 20653*c*6 stored in Weather Forecast Displaying Software Storage Area 20653*c* (FIG. 449) of Communication Device 200, which displays the current location weather forecasting data. Referring to the present drawing, CPU 211 (FIG. 1) of Communication Device 200 retrieves the geographic area data from Work Area 20653*b*5 (FIG. 444) (S1). CPU 211 then retrieves the weather forecast data from Work Area 20653*b*5 (FIG. 444) (S2). CPU 211 further retrieves the location name data from Work Area 20653*b*5 (FIG. 444) (S3). The data retrieved in S1 through S3 (collectively defined as the 'current location weather forecasting data') are displayed on LCD 201 (FIG. 1) (S4).

<<Weather Forecast Displaying Function—Another Embodiment01>>

FIG. 458 through FIG. 467 illustrate another embodiment of the present function wherein Host H implements the major task in performing the present function.

FIG. 458 illustrates the software programs stored in Weather Forecast Displaying Software Storage Area H53*c* (FIG. 435). As described in the present drawing, Weather Forecast Displaying Software Storage Area H53*c* stores Weather Forecast Data Updating Software H53*c*1, Com. Device Pin-pointing Software H53*c*2, Geographic Area Data Identifying Software H53*c*3, Weather Forecast Data Identifying Software H53*c*4, Location Name Data Identifying Software H53*c*5, and Current Location Weather Forecasting Data Sending/Receiving Software H53*c*5*a*. Weather Forecast Data Updating Software H53*c*1 is the software program described in FIG. 460. Com. Device Pin-pointing Software H53*c*2 is the software program described in FIG. 461. Geographic Area Data Identifying Software H53*c*3 is the software program described in FIG. 463. Weather Forecast Data Identifying Software H53*c*4 is the software program described in FIG. 464. Location Name Data Identifying Software H53*c*5 is the software program described in FIG. 465. Current Location Weather Forecasting Data Sending/Receiving Software H53*c*5*a* is the software program described in FIG. 466.

FIG. 459 illustrates the software programs stored in Weather Forecast Displaying Software Storage Area 20653*c* (FIG. 443). As described in the present drawing, Weather Forecast Displaying Software Storage Area 20653*c* stores Com. Device Pin-pointing Software 20653*c*2, Geographic Area Data Identifying Software 20653*c*3, Weather Forecast Data Identifying Software 20653*c*4, Location Name Data Identifying Software 20653*c*5, Current Location Weather Forecasting Data Sending/Receiving Software 20653*c*5*a*, and Current Location Weather Forecasting Data Displaying Software 20653*c*6. Com. Device Pin-pointing Software 20653*c*2 is the software program described in FIG. 461 and FIG. 462. Geographic Area Data Identifying Software 20653*c*3 is the software program described in FIG. 463. Weather Forecast Data Identifying Software 20653*c*4 is the software program described in FIG. 464. Location Name Data Identifying Software 20653*c*5 is the software program described in FIG. 465. Current Location Weather Forecasting Data Sending/Receiving Software 20653*c*5*a* is the software program described in FIG. 466. Current Location Weather Forecasting Data Displaying Software 20653*c*6 is the software program described in FIG. 467.

FIG. 460 illustrates Weather Forecast Data Updating Software H53*c*1 stored in Weather Forecast Displaying Software Storage Area H53*c* (FIG. 458) of Host H, which periodically updates the weather forecast data stored in Weather Forecast Data Storage Area H53*b*2 (FIG. 438). Referring to the present drawing, Host H periodically checks for the updated weather forecast data (S1). If any updated weather forecast data is received from another host computer (S2), Host H updates Weather Forecast Data Storage Area H53*b*2 (FIG. 438) accordingly (S3).

FIG. 461 illustrates Com. Device Pin-pointing Software H53*c*2 stored in Weather Forecast Displaying Software Storage Area H53*c* (FIG. 458) of Host H and Com. Device Pin-pointing Software 20653*c*2 stored in Weather Forecast Displaying Software Storage Area 20653*c* (FIG. 459) of Communication Device 200, which identifies the current geographic location of Communication Device 200. Referring to the present drawing, CPU 211 (FIG. 1) of Communication Device 200 collects the GPS raw data from the near base stations (S1). CPU 211 sends the raw GPS data to Host H (S2). Upon receiving the raw GPS data (S3), Host H produces the calculated GPS data by referring to the raw GPS data (S4). Host H stores the calculated GPS data in Calculated GPS Data Storage Area H53*b*4 (FIG. 440) (S5). Host H then retrieves the calculated GPS data from Calculated GPS Data Storage Area H53*b*4 (FIG. 440) (S6), and sends the data to Communication Device 200 (S7). Upon receiving the calculated GPS data from Host H (S8), CPU 211 stores the data in Calculated GPS Data Storage Area 20653*b*4 (FIG. 448) (S9). Here, the GPS raw data are the primitive data utilized to produce the calculated GPS data, and the calculated GPS data are the data representing the location in (x, y, z) format.

FIG. 462 illustrates another embodiment of the sequence described in FIG. 461 in which the entire process is performed solely by Com. Device Pin-pointing Software 20653*c*2 stored in Weather Forecast Displaying Software Storage Area 20653*c* (FIG. 459) of Communication Device 200. Referring to the present drawing, CPU 211 (FIG. 1) of Communication Device 200 collects the raw GPS data from the near base stations (S1). CPU 211 then produces the calculated GPS data by referring to the raw GPS data (S2), and stores the calculated GPS data in Calculated GPS Data Storage Area 20653*b*4 (FIG. 448) (S3).

FIG. 463 illustrates Geographic Area Data Identifying Software H53*c*3 stored in Weather Forecast Displaying Software Storage Area H53*c* (FIG. 458) of Host H and Geographic Area Data Identifying Software 20653*c*3 stored in Weather Forecast Displaying Software Storage Area 20653*c* (FIG. 459) of Communication Device 200, which identifies the geographic area data to identify the geographic area in which Communication Device 200 is located. Referring to the present drawing, CPU 211 (FIG. 1) of Communication Device 200 sends a geographic area data request to Host H (S1). Here, the geographic area data request is a request to send the geographic area data to Communication Device 200. Upon receiving the geographic area data request from Communication Device 200 (S2), Host H retrieves the calculated GPS data from Calculated GPS Data Storage Area H53*b*4 (FIG. 440) (S3), and searches Geographic Area Data Storage Area H53*b*1 (FIG. 437) to identify the geographic area data in which the calculated GPS data is located (S4). Host H identifies the geographic area data (S5), and stores the data in Work Area H53*b*5 (FIG. 436) (S6).

FIG. 464 illustrates Weather Forecast Data Identifying Software H53*c*4 stored in Weather Forecast Displaying Software Storage Area H53*c* (FIG. 458) of Host H and Weather Forecast Data Identifying Software 20653*c*4 stored in Weather Forecast Displaying Software Storage Area 20653*c* (FIG. 459) of Communication Device 200, which identifies the weather forecast data of the geographic area in which Communication Device 200 is located. Referring to the present drawing, CPU 211 (FIG. 1) of Communication Device 200 sends a weather forecast data request to Host H (S1). Here, the weather forecast data request is a request to send the weather forecast data to Communication Device 200. Upon receiving the weather forecast data request from Communication Device 200 (S2), Host H searches Weather Forecast Data Storage Area H53*b*2 (FIG. 438) for the location ID corresponding to the geographic area data identified in S5 of FIG. 463 (S3). Host H identifies the weather forecast data corresponding to the location ID (S4). Host H then stores the weather forecast data in Work Area H53*b*5 (FIG. 436) (S5).

FIG. 465 illustrates Location Name Data Identifying Software H53*c*5 stored in Weather Forecast Displaying Software Storage Area H53*c* (FIG. 458) of Host H and Location Name Data Identifying Software 20653*c*5 stored in Weather Forecast Displaying Software Storage Area 20653*c* (FIG. 459) of Communication Device 200, which identifies the location name of the geographic area in which Communication Device 200 is located. Referring to the present drawing, CPU 211 (FIG. 1) of Communication Device 200 sends a location name data request to Host H (S1). Here, the location name data request is a request to send the location name data to Communication Device 200. Upon receiving the location name data request from Communication Device 200 (S2), Host H searches Location Name Data Storage Area H53*b*3 (FIG. 439) for the location ID corresponding to the geographic area data identified in S5 of FIG. 463 (S3). Host H identifies the location name data corresponding to the location ID (S4). Host H then stores the location name data in Work Area H53*b*5 (FIG. 436) (S5).

FIG. 466 illustrates Current Location Weather Forecasting Data Sending/Receiving Software H53*c*5*a* stored in Weather Forecast Displaying Software Storage Area H53*c* (FIG. 458) of Host H and Current Location Weather Forecasting Data Sending/Receiving Software 20653*c*5*a* stored in Weather Forecast Displaying Software Storage Area 20653*c* (FIG. 459) of Communication Device 200, which sends and receives the current location weather forecasting data. Referring to the present drawing, Host H retrieves the geographic area data from Work Area H53*b*5 (FIG. 436) (S1). Host H retrieves the weather forecast data from Work Area H53*b*5 (FIG. 436) (S2). Host H then retrieves the location name data from Work Area H53*b*5 (FIG. 436) (S3). Host H sends the data retrieved in S1 through S3 (collectively defined as the 'current location weather forecasting data') to Communication Device 200 (S4). Upon receiving the data sent in S4 (S5), Communication Device 200 stores the data in Work Area 20653*b*5 (FIG. 444) (S6).

FIG. 467 illustrates Current Location Weather Forecasting Data Displaying Software 20653*c*6 stored in Weather Forecast Displaying Software Storage Area 20653*c* (FIG. 459) of Communication Device 200, which displays the current location weather forecasting data on LCD 201 (FIG. 1). Referring to the present drawing, CPU 211 (FIG. 1) of Communication Device 200 retrieves the geographic area data from Work Area 20653*b*5 (FIG. 444) (S1). CPU 211 then retrieves the weather forecast data from Work Area 20653*b*5 (FIG. 444) (S2). CPU 211 further retrieves the location name data from Work Area 20653*b*5 (FIG. 444) (S3). The data retrieved in S1 through S3 are displayed on LCD 201 (FIG. 1) (S4).

<<Multiple Language Displaying Function>>

FIG. 468 through FIG. 494 illustrate the multiple language displaying function wherein a language is selected from a plurality of languages, such as English, Japanese, French, and German, which is utilized to operate Communication Device 200.

FIG. 468 illustrates the storage area included in RAM 206 (FIG. 1). As described in the present drawing, RAM 206 includes Multiple Language Displaying Info Storage Area 20654*a* of which the data and the software programs stored therein are described in FIG. 469.

The data and/or the software programs stored in Multiple Language Displaying Info Storage Area 20654*a* (FIG. 468) may be downloaded from Host H.

FIG. 469 illustrates the storage areas included in Multiple Language Displaying Info Storage Area 20654*a* (FIG. 468). As described in the present drawing, Multiple Language Displaying Info Storage Area 20654*a* includes Multiple Language Displaying Data Storage Area 20654*b* and Multiple Language Displaying Software Storage Area 20654*c*. Multiple Language Displaying Data Storage Area 20654*b* stores the data necessary to implement the present function, such as the ones described in FIG. 470 through FIG. 477. Multiple Language Displaying Software Storage Area 20654*c* stores the software programs necessary to implement the present function, such as the ones described in FIG. 478.

FIG. 470 illustrates the storage areas included in Multiple Language Displaying Data Storage Area 20654*b* (FIG. 469). As described in the present drawing, Multiple Language Displaying Data Storage Area 20654*b* includes Language Tables Storage Area 20654*b*1, Language Type Data Storage Area 20654*b*2, Language Item Data Storage Area 20654*b*3, and Selected Language Table ID Storage Area 20654*b*4. Language Tables Storage Area 20654*b*1 stores the data described in FIG. 471. Language Type Data Storage Area 20654*b*2 stores the data described in FIG. 476. Language Item Data Storage Area 20654*b*3 stores the data described in FIG. 477. Selected Language Table ID Storage Area 20654*b*4 stores the language table ID selected in S4*s* of FIG. 479 and FIG. 487.

FIG. 471 illustrates the storage areas included in Language Tables Storage Area **20654*b*1 (FIG. 470). As described in the present drawing, Language Tables Storage Area 20654*b*1 includes Language Table#1 Storage Area 20654*b*1*a*, Language Table#2 Storage Area 20654*b*1*b*, Language Table#3 Storage Area 20654*b*1*c*, and Language Table#4 Storage Area 20654*b*1*d*. Language Table#1 Storage Area 20654*b*1*a* stores the data described in FIG. 472. Language Table#2 Storage Area 20654*b*1*b* stores the data described in FIG. 473. Language Table#3 Storage Area 20654*b*1*c* stores the data described in FIG. 474. Language Table#4 Storage Area 20654*b*1*d* stores the data described in FIG. 475**.

FIG. 472 illustrates the data stored in Language Table#1 Storage Area **20654*b*1*a* (FIG. 471). As described in the present drawing, Language Table#1 Storage Area 20654*b*1*a*** comprises two columns, i.e., 'Language Item ID' and 'Language Text Data'. Column 'Language Item ID' stores the language item IDs, and each language item ID represents the identification of the corresponding language text data.

Column 'Language Text Data' stores the language text data, and each language text data represents the English text data displayed on LCD 201 (FIG. 1). In the example described in the present drawing, Language Table#1 Storage Area **20654*b*1*a* stores the following data: the language item ID 'Language Item#1' and the corresponding language text data 'Open file'; the language item ID 'Language Item#2' and the corresponding language text data 'Close file'; the language item ID 'Language Item#3' and the corresponding language text data 'Delete'; the language item ID 'Language Item#4' and the corresponding language text data 'Copy'; the language item ID 'Language Item#5' and the corresponding language text data 'Cut'; the language item ID 'Language Item#6' and the corresponding language text data 'Paste'; the language item ID 'Language Item#7' and the corresponding language text data 'Insert'; the language item ID 'Language Item#8' and the corresponding language text data 'File'; the language item ID 'Language Item#9' and the corresponding language text data 'Edit'; the language item ID 'Language Item#10' and the corresponding language text data 'View'; the language item ID 'Language Item#11' and the corresponding language text data 'Format'; the language item ID 'Language Item#12' and the corresponding language text data 'Tools'; the language item ID 'Language Item#13' and the corresponding language text data 'Window'; the language item ID 'Language Item#14' and the corresponding language text data 'Help'; the language item ID 'Language Item#15' and the corresponding language text data 'My Network'; the language item ID 'Language Item#16' and the corresponding language text data 'Trash'; the language item ID 'Language Item#17' and the corresponding language text data 'Local Disk'; the language item ID 'Language Item#18' and the corresponding language text data 'Save'; the language item ID 'Language Item#19' and the corresponding language text data 'Yes'; the language item ID 'Language Item#20' and the corresponding language text data 'No'; and the language item ID 'Language Item#21**' and the corresponding language text data 'Cancel'.

FIG. 473 illustrates the data stored in Language Table#1 Storage Area **20654*b*1*b* (FIG. 471). As described in the present drawing, Language Table#1 Storage Area 20654*b*1*b* comprises two columns, i.e., 'Language Item ID' and 'Language Text Data'. Column 'Language Item ID' stores the language item IDs, and each language item ID represents the identification of the corresponding language text data. Column 'Language Text Data' stores the language text data, and each language text data represents the Japanese text data displayed on LCD 201 (FIG. 1). In the example described in the present drawing, Language Table#1 Storage Area 20654*b*1*b* stores the following data: the language item ID 'Language Item#1' and the corresponding language text data meaning 'Open file' in Japanese; the language item ID 'Language Item#2' and the corresponding language text data meaning 'Close file' in Japanese; the language item ID 'Language Item#3' and the corresponding language text data meaning 'Delete' in Japanese; the language item ID 'Language Item#4' and the corresponding language text data meaning 'Copy' in Japanese; the language item ID 'Language Item#5' and the corresponding language text data meaning 'Cut' in Japanese; the language item ID 'Language Item#6' and the corresponding language text data meaning 'Paste' in Japanese; the language item ID 'Language Item#7' and the corresponding language text data meaning 'Insert' in Japanese; the language item ID 'Language Item#8' and the corresponding language text data meaning 'File' in Japanese; the language item ID 'Language Item#9' and the corresponding language text data meaning 'Edit' in Japanese; the language item ID 'Language Item#10' and the corresponding language text data meaning 'View' in Japanese; the language item ID 'Language Item#11' and the corresponding language text data meaning 'Format' in Japanese; the language item ID 'Language Item#12' and the corresponding language text data meaning 'Tools' in Japanese; the language item ID 'Language Item#13' and the corresponding language text data meaning 'Window' in Japanese; the language item ID 'Language Item#14' and the corresponding language text data meaning 'Help' in Japanese; the language item ID 'Language Item#15' and the corresponding language text data meaning 'My Network' in Japanese; the language item ID 'Language Item#16' and the corresponding language text data meaning 'Trash' in Japanese; the language item ID 'Language Item#17' and the corresponding language text data meaning 'Local Disk' in Japanese; the language item ID 'Language Item#18' and the corresponding language text data meaning 'Save' in Japanese; the language item ID 'Language Item#19' and the corresponding language text data meaning 'Yes' in Japanese; the language item ID 'Language Item#20' and the corresponding language text data meaning 'No' in Japanese; and the language item ID 'Language Item#21**' and the corresponding language text data meaning 'Cancel' in Japanese.

FIG. 474 illustrates the data stored in Language Table#1 Storage Area **20654*b*1*c* (FIG. 471). As described in the present drawing, Language Table#1 Storage Area 20654*b*1*c* comprises two columns, i.e., 'Language Item ID' and 'Language Text Data'. Column 'Language Item ID' stores the language item IDs, and each language item ID represents the identification of the corresponding language text data. Column 'Language Text Data' stores the language text data, and each language text data represents the French text data displayed on LCD 201 (FIG. 1). In the example described in the present drawing, Language Table#1 Storage Area 20654*b*1*c* stores the following data: the language item ID 'Language Item#1' and the corresponding language text data 'French#1' meaning 'Open file' in French; the language item ID 'Language Item#2' and the corresponding language text data 'French#2' meaning 'Close file' in French; the language item ID 'Language Item#3' and the corresponding language text data 'French#3' meaning 'Delete' in French; the language item ID 'Language Item#4' and the corresponding language text data 'French#4' meaning 'Copy' in French; the language item ID 'Language Item#5' and the corresponding language text data 'French#5' meaning 'Cut' in French; the language item ID 'Language Item#6' and the corresponding language text data 'French#6' meaning 'Paste' in French; the language item ID 'Language Item#7' and the corresponding language text data 'French#7' meaning 'Insert' in French; the language item ID 'Language Item#8' and the corresponding language text data 'French#8' meaning 'File' in French; the language item ID 'Language Item#9' and the corresponding language text data 'French#9' meaning 'Edit' in French; the language item ID 'Language Item#10' and the corresponding language text data 'French#10' meaning 'View' in French; the language item ID 'Language Item#11' and the corresponding language text data 'French#11' meaning 'Format' in French; the language item ID 'Language Item#12' and the corresponding language text data 'French#12' meaning 'Tools' in French; the language item ID 'Language Item#13' and the corresponding language text data 'French#13' meaning 'Window' in French; the language item ID 'Language Item#14' and the corresponding language text data 'French#14' meaning 'Help' in French; the language item ID 'Language Item#15' and the corresponding language text data 'French#15' meaning 'My Network' in French; the language item ID 'Language Item#16' and the corresponding language text data 'French#16' meaning 'Trash' in French; the language item ID 'Language Item#17' and the corresponding language text data 'French#17' meaning 'Local Disk' in French; the language item ID 'Language Item#18' and the corresponding language text data 'French#18' meaning 'Save' in French; the language item ID 'Language Item#19' and the corresponding language text data 'French#19' meaning 'Yes' in French; the language item ID 'Language Item#20' and the corresponding language text data 'French#20' meaning 'No' in French; and the language item ID 'Language Item#21' and the corresponding language text data 'French#21**' meaning 'Cancel' in French.

FIG. 475 illustrates the data stored in Language Table#1 Storage Area 20654*b*1*d* (FIG. 471). As described in the present drawing, Language Table#1 Storage Area 20654*b*1*d* comprises two columns, i.e., 'Language Item ID' and 'Language Text Data'. Column 'Language Item ID' stores the language item IDs, and each language item ID represents the identification of the corresponding language text data. Column 'Language Text Data' stores the language text data, and each language text data represents the German text data displayed on LCD 201 (FIG. 1). In the example described in the present drawing, Language Table#1 Storage Area 20654*b*1*d* stores the following data: the language item ID 'Language Item#1' and the corresponding language text data 'German#1' meaning 'Open file' in German; the language item ID 'Language Item#2' and the corresponding language text data 'German#2' meaning 'Close file' in German; the language item ID 'Language Item#3' and the corresponding language text data 'German#3' meaning 'Delete' in German; the language item ID 'Language Item#4' and the corresponding language text data 'German#4' meaning 'Copy' in German; the language item ID 'Language Item#5' and the corresponding language text data 'German#5' meaning 'Cut' in German; the language item ID 'Language Item#6' and the corresponding language text data 'German#6' meaning 'Paste' in German; the language item ID 'Language Item#7' and the corresponding language text data 'German#7' meaning 'Insert' in German; the language item ID 'Language Item#8' and the corresponding language text data 'German#8' meaning 'File' in German; the language item ID 'Language Item#9' and the corresponding language text data 'German#9' meaning 'Edit' in German; the language item ID 'Language Item#10' and the corresponding language text data 'German#10' meaning 'View' in German; the language item ID 'Language Item#11' and the corresponding language text data 'German#11' meaning 'Format' in German; the language item ID 'Language Item#12' and the corresponding language text data 'German#12' meaning 'Tools' in German; the language item ID 'Language Item#13' and the corresponding language text data 'German#13' meaning 'Window' in German; the language item ID 'Language Item#14' and the corresponding language text data 'German#14' meaning 'Help' in German; the language item ID 'Language Item#15' and the corresponding language text data 'German#15' meaning 'My Network' in German; the language item ID 'Language Item#16' and the corresponding language text data 'German#16' meaning 'Trash' in German; the language item ID 'Language Item#17' and the corresponding language text data 'German#17' meaning 'Local Disk' in German; the language item ID 'Language Item#18' and the corresponding language text data 'German#18' meaning 'Save' in German; the language item ID 'Language Item#19' and the corresponding language text data 'German#19' meaning 'Yes' in German; the language item ID 'Language Item#20' and the corresponding language text data 'German#20' meaning 'No' in German; and the language item ID 'Language Item#21' and the corresponding language text data 'German#21' meaning 'Cancel' in German.

FIG. 476 illustrates data stored in Language Type Data Storage Area 20654*b*2 (FIG. 470). As described in the present drawing, Language Type Data Storage Area 20654*b*2 comprises two columns, i.e., 'Language Table ID' and 'Language Type Data'. Column 'Language Table ID' stores the language table ID, and each language table ID represents the identification of the storage areas included in Language Tables Storage Area 20654*b*1 (FIG. 471). Column 'Language Type Data' stores the language type data, and each language type data represents the type of the language utilized in the language table of the corresponding language table ID. In the example described in the present drawing, Language Type Data Storage Area 20654*b*2 stores the following data: the language table ID 'Language Table#1' and the corresponding language type data 'English'; the language table ID 'Language Table#2' and the corresponding language type data 'Japanese'; the language table ID 'Language Table#3' and the corresponding language type data 'French'; and the language table ID 'Language Table#4' and the corresponding language type data 'German'. Here, the language table ID 'Language Table#1' is an identification of Language Table#1 Storage Area 20654*b*1*a* (FIG. 472); the language table ID 'Language Table#2' is an identification of Language Table#2 Storage Area 20654*b*1*b* (FIG. 473); the language table ID 'Language Table#3' is an identification of Language Table#3 Storage Area 20654*b*1*c* (FIG. 474); and the language table ID 'Language Table#4' is an identification of Language Table#4 Storage Area 20654*b*1*d* (FIG. 475).

FIG. 477 illustrates the data stored in Language Item Data Storage Area 20654*b*3 (FIG. 470). As described in the present drawing, Language Item Data Storage Area 20654*b*3 comprises two columns, i.e., 'Language Item ID' and 'Language Item Data'. Column 'Language Item ID' stores the language item IDs, and each language item ID represents the identification of the corresponding language item data. Column 'Language Item Data' stores the language item data, and each language item data represents the content and/or the meaning of the language text data displayed on LCD 201 (FIG. 1). In the example described in the present drawing, Language Item Data Storage Area 20654*b*3 stores the following data: the language item ID 'Language Item#1' and the corresponding language item data 'Open file'; the language item ID 'Language Item#2' and the corresponding language item data 'Close file'; the language item ID 'Language Item#3' and the corresponding language item data 'Delete'; the language item ID 'Language Item#4' and the corresponding language item data 'Copy'; the language item ID 'Language Item#5' and the corresponding language item data 'Cut'; the language item ID 'Language Item#6' and the corresponding language item data 'Paste'; the language item ID 'Language Item#7' and the corresponding language item data 'Insert'; the language item ID 'Language Item#8' and the corresponding language item data 'File'; the language item ID 'Language Item#9' and the corresponding language item data 'Edit'; the language item ID 'Language Item#10' and the corresponding language item data 'View'; the language item ID 'Language Item#11' and the corresponding language item data 'Format'; the language item ID 'Language Item#12' and the corresponding language item data 'Tools'; the language item ID 'Language Item#13' and the corresponding language item data 'Window'; the language item ID 'Language Item#14' and the corresponding language item data 'Help'; the language item ID 'Language Item#15' and the corresponding language item data 'My Network'; the language item ID 'Language Item#16' and the corresponding language item data 'Trash'; the language item ID 'Language Item#17' and the corresponding language item data 'Local Disk'; the language item ID 'Language Item#18' and the corresponding language item data 'Save'; the language item ID 'Language Item#19' and the corresponding language item data 'Yes'; the language item ID 'Language Item#20' and the corresponding language item data No; and the language item ID 'Language Item#21' and the corresponding language item data 'Cancel'. Primarily, the data stored in column 'Language Item Data' are same as the ones stored in column 'Language Text Data' of Language Table#1 Storage Area 20654*b*1*a* (FIG. 472).

FIG. 478 illustrates the software program stored in Multiple Language Displaying Software Storage Area 20654*c* (FIG. 469). As described in the present drawing, Multiple Language Displaying Software Storage Area 20654*c* stores Language Selecting Software 20654*c*1, Selected Language Displaying Software 20654*c*2, Language Text Data Displaying Software For Word Processor 20654*c*3*a*, Language Text Data Displaying Software For Word Processor 20654*c*3*b*, and Language Text Data Displaying Software For Explorer 20654*c*4. Language Selecting Software 20654*c*1 is the software program described in FIG. 479 and FIG. 487. Selected Language Displaying Software 20654*c*2 is the software program described in FIG. 480 and FIG. 488. Language Text Data Displaying Software For Word Processor 20654*c*3*a* is the software program described in FIG. 481 and FIG. 489. Language Text Data Displaying Software For Word Processor 20654*c*3*b* is the software program described in FIG. 483 and FIG. 491. Language Text Data Displaying Software For Explorer 20654*c*4 is the software program described in FIG. 485 and FIG. 493.

<<Multiple Language Displaying Function—Utilizing English>>

FIG. 479 illustrates Language Selecting Software 20654*c*1 stored in Multiple Language Displaying Software Storage Area 20654*c* (FIG. 478) which selects the language utilized to operate Communication Device 200 from a plurality of languages. Referring to the present drawing, CPU 211 (FIG. 1) of Communication Device 200 retrieves the language type data from Language Type Data Storage Area 20654*b*2 (FIG. 476) (S1), and Displays a list of available languages on LCD 201 (FIG. 1) (S2). In the present example, the following languages are displayed on LCD 201: English, Japanese, French, and German A certain language is selected therefrom by utilizing Input Device 210 (FIG. 1) or via voice recognition system (S3). Assume that 'English' is selected in S3. CPU 211 then identifies the language table ID corresponding to the language type data in Language Type Data Storage Area 20654*b*2 (FIG. 476), and stores the language table ID (Language Table#1) in Selected Language Table ID Storage Area 20654*b*4 (FIG. 470) (S4).

FIG. 480 illustrates Selected Language Displaying Software 20654*c*2 stored in Multiple Language Displaying Software Storage Area 20654*c* (FIG. 478) which displays and operates with the language selected in S3 of FIG. 479 (i.e., English). Referring to the present drawing, when Communication Device 200 is powered on (S1), CPU 211 (FIG. 1) of Communication Device 200 retrieves the selected language table ID (Language Table#1) from Selected Language Table ID Storage Area 20654*b*4 (FIG. 470) (S2). CPU 211 then identifies the storage area corresponding to the language table ID selected in S2 (Language Table#1 Storage Area 20654*b*1*a* (FIG. 472)) in Language Tables Storage Area 20654*b*1 (FIG. 471) (S3). Language text data displaying process is initiated thereafter of which the details are described hereinafter (S4).

FIG. 481 illustrates Language Text Data Displaying Software For Word Processor 20654*c*3*a* stored in Multiple Language Displaying Software Storage Area 20654*c* (FIG. 478) which displays the language text data at the time a word processor, such as MS Word and WordPerfect is executed. Referring to the present drawing, CPU 211 (FIG. 1) of Communication Device 200 executes a word processor in response to the signal input by the user of Communication Device 200 indicating to activate and execute the word processor (S1). In the process of displaying the word processor on LCD 201 (FIG. 1), the following steps of S2 through S8 are implemented. Namely, CPU 211 identifies the language item ID 'Language Item#8' in Language Table#1 Storage Area 20654*b*1*a* (FIG. 472) and displays the corresponding language text data 'File' at the predetermined location in the word processor (S2). CPU 211 identifies the language item ID 'Language Item#9' in Language Table#1 Storage Area 20654*b*1*a* (FIG. 472) and displays the corresponding language text data 'Edit' at the predetermined location in the word processor (S3). CPU 211 identifies the language item ID 'Language Item#10' in Language Table#1 Storage Area 20654*b*1*a* (FIG. 472) and displays the corresponding language text data 'View' at the predetermined location in the word processor (S4). CPU 211 identifies the language item ID 'Language Item#11' in Language Table#1 Storage Area 20654*b*1*a* (FIG. 472) and displays the corresponding language text data 'Format' at the predetermined location in the word processor (S5). CPU 211 identifies the language item ID 'Language Item#12' in Language Table#1 Storage Area 20654*b*1*a* (FIG. 472) and displays the corresponding language text data 'Tools' at the predetermined location in the word processor (S6). CPU 211 identifies the language item ID 'Language Item#13' in Language Table#1 Storage Area 20654*b*1*a* (FIG. 472) and displays the corresponding language text data 'Window' at the predetermined location in the word processor (S7). CPU 211 identifies the language item ID 'Language Item#14' in Language Table#1 Storage Area 20654*b*1*a* (FIG. 472) and displays the corresponding language text data 'Help' at the predetermined location in the word processor (S8). Alphanumeric data is input to the word processor by utilizing Input Device 210 (FIG. 1) or via voice recognition system thereafter (S9).

FIG. 482 illustrates the data displayed on LCD 201 (FIG. 1) of Communication Device 200 at the time Language Text Data Displaying Software For Word Processor 20654*c*3*a* (FIG. 481) is implemented. As described in the present drawing, the word processor described in FIG. 481 is primarily composed of Menu Bar 20154MB and Alphanumeric Data Input Area 20154ADIA wherein the language text data described in S2 through S8 of FIG. 481 are displayed on Menu Bar 20154MB and alphanumeric data are input in Alphanumeric Data Input Area 20154ADIA. In the example described in the present drawing, 20154MBF is the language text data processed in S2 of the previous drawing; 20154MBE is the language text data processed in S3 of the previous drawing; 20154MBV is the language text data processed in S4 of the previous drawing; 20154MBF is the language text data processed in S5 of the previous drawing; 20154MBT is the language text data processed in S6 of the previous drawing; 20154MBW is the language text data processed in S7 of the previous drawing; and 20154MBH is the language text data processed in S8 of the previous drawing.

FIG. 483 illustrates Language Text Data Displaying Software For Word Processor 20654c3b stored in Multiple Language Displaying Software Storage Area 20654c (FIG. 478) which displays a prompt on LCD 201 (FIG. 1) at the time a word processor is closed. Referring to the present drawing, CPU 211 (FIG. 1) of Communication Device 200 initiates the closing process of the word processor in response to the signal input by the user of Communication Device 200 indicating to close the word processor (S1). In the process of closing the word processor, the following steps of S2 through S5 are implemented. Namely, CPU 211 identifies the language item ID 'Language Item#18' in Language Table#1 Storage Area 20654b1a (FIG. 472) and displays the corresponding language text data 'Save' at the predetermined location in the word processor (S2). CPU 211 identifies the language item ID 'Language Item#19' in Language Table#1 Storage Area 20654b1a (FIG. 472) and displays the corresponding language text data 'Yes' at the predetermined location in the word processor (S3). CPU 211 identifies the language item ID 'Language Item#20' in Language Table#1 Storage Area 20654b1a (FIG. 472) and displays the corresponding language text data 'No' at the predetermined location in the word processor (S4). CPU 211 identifies the language item ID 'Language Item#21' in Language Table#1 Storage Area 20654b1a (FIG. 472) and displays the corresponding language text data 'Cancel' at the predetermined location in the word processor (S5). The save signal indicating to save the alphanumeric data input in S9 of FIG. 481 is input by utilizing Input Device 210 (FIG. 1) or via voice recognition system, assuming that the user of Communication Device 200 intends to save the data (S6), and the data are saved in a predetermined location in RAM 206 (FIG. 1) (S7). The word processor is closed thereafter (S8).

FIG. 484 illustrates the data displayed on LCD 201 (FIG. 1) of Communication Device 200 at the time Language Text Data Displaying Software For Word Processor 20654c3b (FIG. 483) is implemented. As described in the present drawing, Prompt 20154Pr is displayed on LCD 201 (FIG. 1) at the time Language Text Data Displaying Software For Word Processor 20654c3a (FIG. 481) is closed. As described in the present drawing, Prompt 20154Pr is primarily composed of 20154PrS, 20154PrY, 20154PrN, and 20154PrC. In the example described in the present drawing, 20154PrS is the language text data processed in S2 of the previous drawing; 20154PrY is the language text data processed in S3 of the previous drawing; 20154PrN is the language text data processed in S4 of the previous drawing; and 20154PrC is the language text data processed in S5 of the previous drawing.

FIG. 485 illustrates Language Text Data Displaying Software For Explorer 20654c4 stored in Multiple Language Displaying Software Storage Area 20654c (FIG. 478) which displays the language text data at the time a Windows Explorer like software program which displays folders and/or directories and the structures thereof is executed. Referring to the present drawing, CPU 211 (FIG. 1) of Communication Device 200 executes Windows Explorer like software program in response to the signal input by the user of Communication Device 200 indicating to activate and execute the software program (S1). In the process of displaying the Windows Explorer like software program on LCD 201 (FIG. 1), the steps of S2 through S4 are implemented. Namely, CPU 211 identifies the language item ID 'Language Item#15' in Language Table#1 Storage Area 20654b1a (FIG. 472) and displays the corresponding language text data 'My Network' at the predetermined location in the Windows Explorer like software program (S2). CPU 211 identifies the language item ID 'Language Item#16' in Language Table#1 Storage Area 20654b1a (FIG. 472) and displays the corresponding language text data 'Trash' at the predetermined location in the Windows Explorer like software program (S3). CPU 211 identifies the language item ID 'Language Item#17' in Language Table#1 Storage Area 20654b1a (FIG. 472) and displays the corresponding language text data 'Local Disk' at the predetermined location in the Windows Explorer like software program (S4).

FIG. 486 illustrates the data displayed on LCD 201 (FIG. 1) of Communication Device 200 at the time Language Text Data Displaying Software For Explorer 20654c4 (FIG. 485) is executed. As described in the present drawing, 20154LD, 20154MN, and 20154Tr are displayed on LCD 201 (FIG. 1) at the time Language Text Data Displaying Software For Explorer 20654c4 is executed. As described in the present drawing, 20154LD is the language text data processed in S4 of the previous drawing; 20154MN is the language text data processed in S2 of the previous drawing; and 20154Tr is the language text data processed in S3 of the previous drawing.

<<Multiple Language Displaying Function—Utilizing Japanese>>

FIG. 487 illustrates Language Selecting Software 20654c1 stored in Multiple Language Displaying Software Storage Area 20654c (FIG. 478) which selects the language utilized to operate Communication Device 200 from a plurality of languages. Referring to the present drawing, CPU 211 (FIG. 1) of Communication Device 200 retrieves the language type data from Language Type Data Storage Area 20654b2 (FIG. 476) (S1), and Displays a list of available languages on LCD 201 (FIG. 1) (S2). In the present example, the following languages are displayed on LCD 201: English, Japanese, French, and German A certain language is selected therefrom by utilizing Input Device 210 (FIG. 1) or via voice recognition system (S3). Assume that 'Japanese' is selected in S3. CPU 211 then identifies the language table ID corresponding to the language type data in Language Type Data Storage Area 20654b2 (FIG. 476), and stores the language table ID (Language Table#2) in Selected Language Table ID Storage Area 20654b4 (FIG. 470) (S4).

FIG. 488 illustrates Selected Language Displaying Software 20654c2 stored in Multiple Language Displaying Software Storage Area 20654c (FIG. 478) which displays and operates with the language selected in S3 of FIG. 487 (i.e., Japanese). Referring to the present drawing, when Communication Device 200 is powered on (S1), CPU 211 (FIG. 1) of Communication Device 200 retrieves the selected language table ID (Language Table#2) from Selected Language Table ID Storage Area 20654b4 (FIG. 470) (S2). CPU 211 then identifies the storage area corresponding to the language table ID selected in S2 (Language Table#2 Storage Area 20654b1b (FIG. 473)) in Language Tables Storage Area 20654b1 (FIG. 471) (S3). Language text data displaying process is initiated thereafter of which the details are described hereinafter (S4).

FIG. 489 illustrates Language Text Data Displaying Software For Word Processor 20654c3a stored in Multiple Language Displaying Software Storage Area 20654*c* (FIG. 478) which displays the language text data at the time a word processor, such as MS Word and WordPerfect is executed. Referring to the present drawing, CPU 211 (FIG. 1) of Communication Device 200 executes a word processor in response to the signal input by the user of Communication Device 200 indicating to activate and execute the word processor (S1). In the process of displaying the word processor on LCD 201 (FIG. 1), the following steps of S2 through S8 are implemented. Namely, CPU 211 identifies the language item ID 'Language Item#8' in Language Table#2 Storage Area 20654*b*1*b* (FIG. 473) and displays the corresponding language text data indicating 'File' in Japanese at the predetermined location in the word processor (S2). CPU 211 identifies the language item ID 'Language Item#9' in Language Table#2 Storage Area 20654*b*1*b* (FIG. 473) and displays the corresponding language text data indicating 'Edit' in Japanese at the predetermined location in the word processor (S3). CPU 211 identifies the language item ID 'Language Item#10' in Language Table#2 Storage Area 20654*b*1*b* (FIG. 473) and displays the corresponding language text data indicating 'View' in Japanese at the predetermined location in the word processor (S4). CPU 211 identifies the language item ID 'Language Item#11' in Language Table#2 Storage Area 20654*b*1*b* (FIG. 473) and displays the corresponding language text data indicating 'Format' in Japanese at the predetermined location in the word processor (S5). CPU 211 identifies the language item ID 'Language Item#12' in Language Table#2 Storage Area 20654*b*1*b* (FIG. 473) and displays the corresponding language text data indicating 'Tools' in Japanese at the predetermined location in the word processor (S6). CPU 211 identifies the language item ID 'Language Item#13' in Language Table#2 Storage Area 20654*b*1*b* (FIG. 473) and displays the corresponding language text data indicating 'Window' in Japanese at the predetermined location in the word processor (S7). CPU 211 identifies the language item ID 'Language Item#14' in Language Table#2 Storage Area 20654*b*1*b* (FIG. 473) and displays the corresponding language text data indicating 'Help' in Japanese at the predetermined location in the word processor (S8). Alphanumeric data is input to the word processor by utilizing Input Device 210 (FIG. 1) or via voice recognition system thereafter (S9).

FIG. 490 illustrates the data displayed on LCD 201 (FIG. 1) of Communication Device 200 at the time Language Text Data Displaying Software For Word Processor 20654*c*3*a* (FIG. 489) is implemented. As described in the present drawing, the word processor described in FIG. 489 is primarily composed of Menu Bar 20154MB and Alphanumeric Data Input Area 20154ADIA wherein the language text data described in S2 through S8 of FIG. 489 are displayed on Menu Bar 20154MB and alphanumeric data are input in Alphanumeric Data Input Area 20154ADIA. In the example described in the present drawing, 20154MBF is the language text data processed in S2 of the previous drawing; 20154MBE is the language text data processed in S3 of the previous drawing; 20154 MBV is the language text data processed in S4 of the previous drawing; 20154MBF is the language text data processed in S5 of the previous drawing; 20154MBT is the language text data processed in S6 of the previous drawing; 20154MBW is the language text data processed in S7 of the previous drawing; and 20154MBH is the language text data processed in S8 of the previous drawing.

FIG. 491 illustrates Language Text Data Displaying Software For Word Processor 20654*c*3*b* stored in Multiple Language Displaying Software Storage Area 20654*c* (FIG. 478) which displays a prompt on LCD 201 (FIG. 1) at the time a word processor is closed. Referring to the present drawing, CPU 211 (FIG. 1) of Communication Device 200 initiates the closing process of the word processor in response to the signal input by the user of Communication Device 200 indicating to close the word processor (S1). In the process of closing the word processor, the following steps of S2 through S5 are implemented. Namely, CPU 211 identifies the language item ID 'Language Item#18' in Language Table#2 Storage Area 20654*b*1*b* (FIG. 473) and displays the corresponding language text data indicating 'Save' in Japanese at the predetermined location in the word processor (S2). CPU 211 identifies the language item ID 'Language Item#19' in Language Table#2 Storage Area 20654*b*1*b* (FIG. 473) and displays the corresponding language text data indicating 'Yes' in Japanese at the predetermined location in the word processor (S3). CPU 211 identifies the language item ID 'Language Item#20' in Language Table#2 Storage Area 20654*b*1*b* (FIG. 473) and displays the corresponding language text data indicating 'No' in Japanese at the predetermined location in the word processor (S4). CPU 211 identifies the language item ID 'Language Item#21' in Language Table#2 Storage Area 20654*b*1*b* (FIG. 473) and displays the corresponding language text data indicating 'Cancel' in Japanese at the predetermined location in the word processor (S5). The save signal indicating to save the alphanumeric data input in S9 of FIG. 489 is input by utilizing Input Device 210 (FIG. 1) or via voice recognition system, assuming that the user of Communication Device 200 intends to save the data (S6), and the data are saved in a predetermined location in RAM 206 (FIG. 1) (S7). The word processor is closed thereafter (S8).

FIG. 492 illustrates the data displayed on LCD 201 (FIG. 1) of Communication Device 200 at the time Language Text Data Displaying Software For Word Processor 20654*c*3*b* (FIG. 491) is implemented. As described in the present drawing, Prompt 20154Pr is displayed on LCD 201 (FIG. 1) at the time Language Text Data Displaying Software For Word Processor 20654*c*3*a* (FIG. 489) is closed. As described in the present drawing, Prompt 20154Pr is primarily composed of 20154PrS, 20154PrY, 20154PrN, and 20154PrC. In the example described in the present drawing, 20154PrS is the language text data processed in S2 of the previous drawing; 20154PrY is the language text data processed in S3 of the previous drawing; 20154PrN is the language text data processed in S4 of the previous drawing; and 20154PrC is the language text data processed in S5 of the previous drawing.

FIG. 493 illustrates Language Text Data Displaying Software For Explorer 20654*c*4 stored in Multiple Language Displaying Software Storage Area 20654*c* (FIG. 478) which displays the language text data at the time a Windows Explorer like software program which displays folders and/or directories and the structures thereof is executed. Referring to the present drawing, CPU 211 (FIG. 1) of Communication Device 200 executes Windows Explorer like software program in response to the signal input by the user of Communication Device 200 indicating to activate and execute the software program (S1). In the process of displaying the Windows Explorer like software program on LCD 201 (FIG. 1), the following steps of S2 through S4 are implemented. Namely, CPU 211 identifies the language item ID 'Language Item#15' in Language Table#2 Storage Area 20654*b*1*b* (FIG. 473) and displays the corresponding language text data indicating 'My Network' in Japanese at the predetermined location in the Windows Explorer like software program (S2). CPU 211 identifies the language item ID 'Language Item#16' in Language Table#2 Storage Area 20654*b*1*b* (FIG. 473) and displays the corresponding language text data indicating 'Trash' in Japanese at the predetermined location in the Windows Explorer like software program (S3). CPU 211 identifies the language item ID ‘Language Item#17’ in Language Table#2 Storage Area **20654*b*1*b* (FIG. 473) and displays the corresponding language text data indicating ‘Local Disk’ in Japanese at the predetermined location in the Windows Explorer like software program (S4**).

FIG. 494 illustrates the data displayed on LCD 201 (FIG. 1) of Communication Device 200 at the time Language Text Data Displaying Software For Explorer **20654*c*4 (FIG. 493) is executed. As described in the present drawing, 20154LD, 20154MN, and 20154Tr are displayed on LCD 201 (FIG. 1) at the time Language Text Data Displaying Software For Explorer 20654*c*4 is executed. As described in the present drawing, 20154LD is the language text data processed in S4 of the previous drawing; 20154MN is the language text data processed in S2 of the previous drawing; and 20154Tr is the language text data processed in S3** of the previous drawing.

<<Caller’s Information Displaying Function>>

FIG. 495 through FIG. 538 illustrate the Caller’s Information displaying function which displays the Information regarding the caller (e.g., name, phone number, email address, and home address, etc.) on LCD 201 (FIG. 1) when Communication Device 200 is utilized as a ‘TV phone’.

FIG. 495 through FIG. 502 illustrate the data and software programs stored in RAM 206 (FIG. 1) of Caller’s Device, a Communication Device 200, utilized by the caller.

FIG. 503 through FIG. 510 illustrate the data and software programs stored in RAM 206 (FIG. 1) of Callee’s Device, a Communication Device 200, utilized by the callee.

FIG. 511 through FIG. 514 illustrate the data and software programs stored in Host H.

FIG. 495 illustrates the storage area included in RAM 206 (FIG. 1) of Caller’s Device. As described in the present drawing, RAM 206 of Caller’s Device includes Caller’s Information Displaying Information Storage Area **20655*a* of which the data and the software programs stored therein are described in FIG. 496**.

FIG. 496 illustrates the storage areas included in Caller’s Information Displaying Information Storage Area **20655*a* (FIG. 495). As described in the present drawing, Caller’s Information Displaying Information Storage Area 20655*a* includes Caller’s Information Displaying Data Storage Area 20655*b* and Caller’s Information Displaying Software Storage Area 20655*c*. Caller’s Information Displaying Data Storage Area 20655*b* stores the data necessary to implement the present function on the side of Caller’s Device, such as the ones described in FIG. 497 through FIG. 501. Caller’s Information Displaying Software Storage Area 20655*c* stores the software programs necessary to implement the present function on the side of Caller’s Device, such as the ones described in FIG. 502**.

FIG. 497 illustrates the storage areas included in Caller’s Information Displaying Data Storage Area **20655*b*. As described in the present drawing, Caller’s Information Displaying Data Storage Area 20655*b* includes Caller’s Audiovisual Data Storage Area 20655*b*1, Callee’s Audiovisual Data Storage Area 20655*b*2, Caller’s Personal Data Storage Area 20655*b*3, Callee’s Personal Data Storage Area 20655*b*4, Caller’s Calculated GPS Data Storage Area 20655*b*5, Callee’s Calculated GPS Data Storage Area 20655*b*6, Caller’s Map Data Storage Area 20655*b*7, Callee’s Map Data Storage Area 20655*b*8, and Work Area 20655*b*9. Caller’s Audiovisual Data Storage Area 20655*b*1 stores the data described in FIG. 498. Callee’s Audiovisual Data Storage Area 20655*b*2 stores the data described in FIG. 499. Caller’s Personal Data Storage Area 20655*b*3 stores the data described in FIG. 500. Callee’s Personal Data Storage Area 20655*b*4 stores the data described in FIG. 501. Caller’s Calculated GPS Data Storage Area 20655*b*5 stores the caller’s calculated GPS data which represents the current geographic location of Caller’s Device in (x, y, z) format. Callee’s Calculated GPS Data Storage Area 20655*b*6 stores the callee’s calculated GPS data which represents the current geographic location of Callee’s Device in (x, y, z) format. Caller’s Map Data Storage Area 20655*b*7 stores the map data representing the surrounding area of the location indicated by the caller’s calculated GPS data. Callee’s Map Data Storage Area 20655*b*8 stores the map data representing the surrounding area of the location indicated by the callee’s calculated GPS data. Work Area 20655*b*9** is a storage area utilized to perform calculation and to temporarily store data.

FIG. 498 illustrates the storage areas included in Caller’s Audiovisual Data Storage Area **20655*b*1 (FIG. 497). As described in the present drawing, Caller’s Audiovisual Data Storage Area 20655*b*1 includes Caller’s Audio Data Storage Area 20655*b*1*a* and Caller’s Visual Data Storage Area 20655*b*1*b*. Caller’s Audio Data Storage Area 20655*b*1*a* stores the caller’s audio data which represents the audio data input via Microphone 215 (FIG. 1) of Caller’s Device. Caller’s Visual Data Storage Area 20655*b*1*b* stores the caller’s visual data which represents the visual data input via CCD Unit 214 (FIG. 1**) of Caller’s Device.

FIG. 499 illustrates the storage areas included in Callee’s Audiovisual Data Storage Area **20655*b*2 (FIG. 497). As described in the present drawing, Callee’s Audiovisual Data Storage Area 20655*b*2 includes Callee’s Audio Data Storage Area 20655*b*2*a* and Callee’s Visual Data Storage Area 20655*b*2*b*. Callee’s Audio Data Storage Area 20655*b*2*a* stores the callee’s audio data which represents the audio data sent from Callee’s Device. Callee’s Visual Data Storage Area 20655*b*2*b*** stores the callee’s visual data which represents the visual data sent from Callee’s Device.

FIG. 500 illustrates the data stored in Caller’s Personal Data Storage Area **20655*b*3 (FIG. 497). As described in the present drawing, Caller’s Personal Data Storage Area 20655*b*3 comprises two columns, i.e., ‘Caller’s Personal Data’ and ‘Permitted Caller’s Personal Data Flag’. Column ‘Caller’s Personal Data’ stores the caller’s personal data which represent the personal data of the caller. Column ‘Permitted Caller’s Personal Data Flag’ stores the permitted caller’s personal data flag and each permitted caller’s personal data flag represents whether the corresponding caller’s personal data is permitted to be displayed on Callee’s Device. The permitted caller’s personal data flag is represented by either ‘1’ or ‘0’ wherein ‘1’ indicates that the corresponding caller’s personal data is permitted to be displayed on Callee’s Device, and ‘0’ indicates that the corresponding caller’s personal data is not permitted to be displayed on Callee’s Device. In the example described in the present drawing, Caller’s Personal Data Storage Area 20655*b*3** stores the following data: the caller’s name and the corresponding permitted caller’s personal data flag ‘1’; the caller’s phone number and the corresponding permitted caller’s personal data flag ‘1’; the caller’s email address and the corresponding permitted caller’s personal data flag ‘1’; the caller’s home address and the corresponding permitted caller’s personal data flag ‘1’; the caller’s business address and the corresponding permitted caller’s personal data flag ‘0’; the caller’s title and the corresponding permitted caller’s personal data flag ‘0’; the caller’s hobby and the corresponding permitted caller’s personal data flag ‘0’; the caller’s blood type and the corresponding permitted caller’s personal data flag ‘0’; the caller’s gender and the corresponding permitted caller’s personal data flag ‘0’; the caller’s age and the corresponding permitted caller’s personal data flag '0'; and caller's date of birth and the corresponding permitted caller's personal data flag '0'.

FIG. 501 illustrates the data stored in Callee's Personal Data Storage Area 20655*b*4 (FIG. 497). As described in the present drawing, Callee's Personal Data Storage Area 20655*b*4 stores the callee's personal data which represent the personal data of the callee which are displayed on LCD 201 (FIG. 1) of Caller's Device. In the example described in the present drawing, Callee's Personal Data Storage Area 20655*b*4 stores the callee's name and phone number.

FIG. 502 illustrates the software programs stored in Caller's Information Displaying Software Storage Area 20655*c* (FIG. 496). As described in the present drawing, Caller's Information Displaying Software Storage Area 20655*c* stores Permitted Caller's Personal Data Selecting Software 20655*c*1, Dialing Software 20655*c*2, Caller's Device Pin-pointing Software 20655*c*3, Map Data Sending/Receiving Software 20655*c*4, Caller's Audiovisual Data Collecting Software 20655*c*5, Caller's Information Sending/Receiving Software 20655*c*6, Callee's Information Sending/Receiving Software 20655*c*6*a*, Permitted Callee's Personal Data Displaying Software 20655*c*7, Map Displaying Software 20655*c*8, Callee's Audio Data Outputting Software 20655*c*9, and Callee's Visual Data Displaying Software 20655*c*10. Permitted Caller's Personal Data Selecting Software 20655*c*1 is the software program described in FIG. 515. Dialing Software 20655*c*2 is the software program described in FIG. 516. Caller's Device Pin-pointing Software 20655*c*3 is the software program described in FIG. 517 and FIG. 518. Map Data Sending/Receiving Software 20655*c*4 is the software program described in FIG. 519. Caller's Audiovisual Data Collecting Software 20655*c*5 is the software program described in FIG. 520. Caller's Information Sending/Receiving Software 20655*c*6 is the software program described in FIG. 521. Callee's Information Sending/Receiving Software 20655*c*6*a* is the software program described in FIG. 534. Permitted Callee's Personal Data Displaying Software 20655*c*7 is the software program described in FIG. 535. Map Displaying Software 20655*c*8 is the software program described in FIG. 536. Callee's Audio Data Outputting Software 20655*c*9 is the software program described in FIG. 537. Callee's Visual Data Displaying Software 20655*c*10 is the software program described in FIG. 538.

FIG. 503 illustrates the storage area included in RAM 206A (FIG. 1) of Callee's Device. As described in the present drawing, RAM 206A of Callee's Device includes Callee's Information Displaying Information Storage Area 20655*a*A of which the data and the software programs stored therein are described in FIG. 504.

FIG. 504 illustrates the storage areas included in Callee's Information Displaying Information Storage Area 20655*a*A (FIG. 503). As described in the present drawing, Callee's Information Displaying Information Storage Area 20655*a*A includes Callee's Information Displaying Data Storage Area 20655*b*A and Callee's Information Displaying Software Storage Area 20655*c*A. Callee's Information Displaying Data Storage Area 20655*b*A stores the data necessary to implement the present function on the side of Callee's Device, such as the ones described in FIG. 505 through FIG. 509. Callee's Information Displaying Software Storage Area 20655*c*A stores the software programs necessary to implement the present function on the side of Callee's Device, such as the ones described in FIG. 510.

FIG. 505 illustrates the storage areas included in Callee's Information Displaying Data Storage Area 20655*b*A. As described in the present drawing, Callee's Information Displaying Data Storage Area 20655*b*A includes Caller's Audiovisual Data Storage Area 20655*b*1A, Callee's Audiovisual Data Storage Area 20655*b*2A, Caller's Personal Data Storage Area 20655*b*3A, Callee's Personal Data Storage Area 20655*b*4A, Caller's Calculated GPS Data Storage Area 20655*b*5A, Callee's Calculated GPS Data Storage Area 20655*b*6A, Caller's Map Data Storage Area 20655*b*7A, Callee's Map Data Storage Area 20655*b*8A, and Work Area 20655*b*9A. Caller's Audiovisual Data Storage Area 20655*b*1A stores the data described in FIG. 506. Callee's Audiovisual Data Storage Area 20655*b*2A stores the data described in FIG. 507. Caller's Personal Data Storage Area 20655*b*3A stores the data described in FIG. 508. Callee's Personal Data Storage Area 20655*b*4A stores the data described in FIG. 509. Caller's Calculated GPS Data Storage Area 20655*b*5A stores the caller's calculated GPS data which represents the current geographic location of Caller's Device in (x, y, z) format. Callee's Calculated GPS Data Storage Area 20655*b*6A stores the callee's calculated GPS data which represents the current geographic location of Callee's Device in (x, y, z) format. Caller's Map Data Storage Area 20655*b*7A stores the map data representing the surrounding area of the location indicated by the caller's calculated GPS data. Callee's Map Data Storage Area 20655*b*8A stores the map data representing the surrounding area of the location indicated by the callee's calculated GPS data. Work Area 20655*b*9A is a storage area utilized to perform calculation and to temporarily store data.

FIG. 506 illustrates the storage areas included in Caller's Audiovisual Data Storage Area 20655*b*1A (FIG. 505). As described in the present drawing, Caller's Audiovisual Data Storage Area 20655*b*1A includes Caller's Audio Data Storage Area 20655*b*1*a*A and Caller's Visual Data Storage Area 20655*b*1*b*A. Caller's Audio Data Storage Area 20655*b*1*a*A stores the caller's audio data which represents the audio data sent from Caller's Device in a wireless fashion. Caller's Visual Data Storage Area 20655*b*1*b*A stores the caller's visual data which represents the visual data input sent from Caller's Device in a wireless fashion.

FIG. 507 illustrates the storage areas included in Callee's Audiovisual Data Storage Area 20655*b*2A (FIG. 505). As described in the present drawing, Callee's Audiovisual Data Storage Area 20655*b*2A includes Callee's Audio Data Storage Area 20655*b*2*a*A and Callee's Visual Data Storage Area 20655*b*2*b*A. Callee's Audio Data Storage Area 20655*b*2*a*A stores the callee's audio data which represents the audio data input via Microphone 215 (FIG. 1) of Callee's Device. Callee's Visual Data Storage Area 20655*b*2*b*A stores the callee's visual data which represents the visual data input via CCD Unit 214 (FIG. 1) of Callee's Device.

FIG. 508 illustrates the data stored in Caller's Personal Data Storage Area 20655*b*3A (FIG. 505). As described in the present drawing, Caller's Personal Data Storage Area 20655*b*3A stores the caller's personal data which represent the personal data of the caller which are displayed on LCD 201 (FIG. 1) of Caller's Device. In the example described in the present drawing, Caller's Personal Data Storage Area 20655*b*3A stores the caller's name, phone number, email address, and home address.

FIG. 509 illustrates the data stored in Callee's Personal Data Storage Area 20655*b*4A (FIG. 505). As described in the present drawing, Callee's Personal Data Storage Area 20655*b*4A comprises two columns, i.e., 'Callee's Personal Data' and 'Permitted Callee's Personal Data Flag'. Column 'Callee's Personal Data' stores the callee's personal data which represent the personal data of the callee. Column 'Permitted Callee's Personal Data Flag' stores the permitted callee's personal data flag and each permitted callee's personal data flag represents whether the corresponding callee's personal data is permitted to be displayed on Caller's Device. The permitted callee's personal data flag is represented by either '1' or '0' wherein '1' indicates that the corresponding callee's personal data is permitted to be displayed on Caller's Device, and '0' indicates that the corresponding callee's personal data is not permitted to be displayed on Caller's Device. In the example described in the present drawing, Callee's Personal Data Storage Area **20655*b*4**A stores the following data: callee's name and the corresponding permitted callee's personal data flag '1'; the callee's phone number and the corresponding permitted callee's personal data flag '1'; the callee's email address and the corresponding permitted caller's personal data flag '0'; the callee's home address and the corresponding permitted callee's personal data flag '0'; the callee's business address and the corresponding permitted callee's personal data flag '0'; the callee's title and the corresponding permitted callee's personal data flag '0'; the callee's hobby and the corresponding permitted callee's personal data flag '0'; the callee's blood type and the corresponding permitted callee's personal data flag '0'; the callee's gender and the corresponding permitted callee's personal data flag '0'; the callee's age and the corresponding permitted callee's personal data flag '0'; and callee's date of birth and the corresponding permitted callee's personal data flag '0'.

FIG. 510 illustrates the software programs stored in Callee's Information Displaying Software Storage Area **20655*c*A (FIG. 504). As described in the present drawing, Callee's Information Displaying Software Storage Area 20655*c*A stores Permitted Callee's Personal Data Selecting Software 20655*c*1A, Dialing Software 20655*c*2A, Callee's Device Pin-pointing Software 20655*c*3A, Map Data Sending/Receiving Software 20655*c*4A, Callee's Audiovisual Data Collecting Software 20655*c*5A, Callee's Information Sending/Receiving Software 20655*c*6A, Caller's Information Sending/Receiving Software 20655*c*6*a*A, Permitted Caller's Personal Data Displaying Software 20655*c*7A, Map Displaying Software 20655*c*8A, Caller's Audio Data Outputting Software 20655*c*9A, and Caller's Visual Data Displaying Software 20655*c*10A. Permitted Callee's Personal Data Selecting Software 20655*c*1A is the software program described in FIG. 527. Dialing Software 20655*c*2A is the software program described in FIG. 528. Callee's Device Pin-pointing Software 20655*c*3A is the software program described in FIG. 529 and FIG. 530. Map Data Sending/Receiving Software 20655*c*4A is the software program described in FIG. 531. Callee's Audiovisual Data Collecting Software 20655*c*5A is the software program described in FIG. 532. Callee's Information Sending/Receiving Software 20655*c*6A is the software program described in FIG. 533. Caller's Information Sending/Receiving Software 20655*c*6*a*A is the software program described in FIG. 522. Permitted Caller's Personal Data Displaying Software 20655*c*7A is the software program described in FIG. 523. Map Displaying Software 20655*c*8A is the software program described in FIG. 524. Caller's Audio Data Outputting Software 20655*c*9A is the software program described in FIG. 525. Caller's Visual Data Displaying Software 20655*c*10A is the software program described in FIG. 526**.

FIG. 511 illustrates the storage area included in Host H. As described in the present drawing, Host H includes Caller/Callee Information Storage Area H**55*a* of which the data and the software programs stored therein are described in FIG. 512**.

FIG. 512 illustrates the storage areas included in Caller/Callee Information Storage Area H**55*a*. As described in the present drawing, Caller/Callee Information Storage Area H55*a* includes Caller/Callee Data Storage Area H55*b* and Caller/Callee Software Storage Area H55*c*. Caller/Callee Data Storage Area H55*b* stores the data necessary to implement the present function on the side of Host H, such as the ones described in FIG. 513. Caller/Callee Software Storage Area H55*c* stores the software programs necessary to implement the present function on the side of Host H, such as the ones described in FIG. 514**.

FIG. 513 illustrates the storage areas included in Caller/Callee Data Storage Area H**55*b*. As described in the present drawing, Caller/Callee Data Storage Area H55*b* includes Caller's Information Storage Area H55*b*1, Callee's Information Storage Area H55*b*2, Map Data Storage Area H55*b*3, Work Area h55*b*4, Caller's Calculated GPS Data Storage Area H55*b*5, and Callee's Calculated GPS Data Storage Area H55*b*6. Caller's Information Storage Area H55*b*1 stores the Caller's Information received Caller's Device. Callee's Information Storage Area H55*b*2 stores the Callee's Information received Callee's Device. Map Data Storage Area H55*b*3 stores the map data received from Caller's Device and Callee's Device. Work Area H55*b*4 is a storage area utilized to perform calculation and to temporarily store data. Caller's Calculated GPS Data Storage Area H55*b*5 stores the caller's calculated GPS data. Callee's Calculated GPS Data Storage Area H55*b*6** stores the callee's calculated GPS data.

FIG. 514 illustrates the software programs stored in Caller/Callee Software Storage Area H**55*c* (FIG. 514). As described in the present drawing, Caller/Callee Software Storage Area H55*c* stores Dialing Software H55*c*2, Caller's Device Pin-pointing Software H55*c*3, Callee's Device Pin-pointing Software H55*c*3*a*, Map Data Sending/Receiving Software H55*c*4, Caller's Information Sending/Receiving Software H55*c*6, and Callee's Information Sending/Receiving Software H55*c*6*a*. Dialing Software H55*c*2 is the software program described in FIG. 516 and FIG. 528. Caller's Device Pin-pointing Software H55*c*3 is the software program described in FIG. 517. Callee's Device Pin-pointing Software H55*c*3*a* is the software program described in FIG. 529. Map Data Sending/Receiving Software H55*c*4 is the software program described in FIG. 519 and FIG. 531. Caller's Information Sending/Receiving Software H55*c*6 is the software program described in FIG. 521. Callee's Information Sending/Receiving Software H55*c*6*a* is the software program described in FIG. 533 and FIG. 534**.

FIG. 515 through FIG. 526 primarily illustrate the sequence to output the Caller's Information (which is defined hereinafter) from Callee's Device.

FIG. 515 illustrates Permitted Caller's Personal Data Selecting Software **20655*c*1 stored in Caller's Information Displaying Software Storage Area 20655*c* (FIG. 502) of Caller's Device, which selects the permitted caller's personal data to be displayed on LCD 201 (FIG. 1) of Callee's Device. Referring to the present drawing, CPU 211 (FIG. 1) of Caller's Device retrieves all of the caller's personal data from Caller's Personal Data Storage Area 20655*b*3 (FIG. 500) (S1). CPU 211 then displays a list of caller's personal data on LCD 201 (FIG. 1) (S2). The caller selects, by utilizing Input Device 210 (FIG. 1) or via voice recognition system, the caller's personal data permitted to be displayed on Callee's Device (S3). The permitted caller's personal data flag of the data selected in S3 is registered as '1' (S4**).

FIG. 516 illustrates Dialing Software H**55*c*2 stored in Caller/Callee Software Storage Area H55*c* (FIG. 514) of Host H, Dialing Software 20655*c*2 stored in Caller's Information Displaying Software Storage Area 20655*c* (FIG. 502) of Caller's Device, and Dialing Software 20655*c*2**A stored in Callee's Information Displaying Software Storage Area

20655*c*A (FIG. 510) of Callee's Device, which enables to connect between Caller's Device and Callee's Device via Host H in a wireless fashion. Referring to the present drawing, a connection is established between Caller's Device and Host H (S1). Next, a connection is established between Host H and Callee's Device (S2). As a result, Caller's Device and Callee's Device are able to exchange audiovisual data, text data, and various types of data with each other. The connection is maintained until Caller's Device, Host H, or Callee's Device terminates the connection.

FIG. 517 illustrates Caller's Device Pin-pointing Software H55*c*3 (FIG. 514) stored in Caller/Callee Software Storage Area H55*c* (FIG. 514) of Host H and Caller's Device Pin-pointing Software 20655*c*3 stored in Caller's Information Displaying Software Storage Area 20655*c* (FIG. 502) of Caller's Device, which identifies the current geographic location of Caller's Device. Referring to the present drawing, CPU 211 (FIG. 1) of Caller's Device collects the GPS raw data from the near base stations (S1). CPU 211 sends the raw GPS data to Host H (S2). Upon receiving the raw GPS data (S3), Host H produces the caller's calculated GPS data by referring to the raw GPS data (S4). Host H stores the caller's calculated GPS data in Caller's Calculated GPS Data Storage Area H55*b*5 (FIG. 513) (S5). Host H then retrieves the caller's calculated GPS data from Caller's Calculated GPS Data Storage Area H55*b*5 (FIG. 513) (S6), and sends the data to Caller's Device (S7). Upon receiving the caller's calculated GPS data from Host H (S8), CPU 211 stores the data in Caller's Calculated GPS Data Storage Area 20655*b*5 (FIG. 497) (S9). Here, the GPS raw data are the primitive data utilized to produce the caller's calculated GPS data, and the caller's calculated GPS data is the data representing the location of Caller's Device in (x, y, z) format. The sequence described in the present drawing is repeated periodically.

FIG. 518 illustrates another embodiment of the sequence described in FIG. 517 in which the entire process is performed solely by Caller's Device Pin-pointing Software 20655*c*3 stored in Caller's Information Displaying Software Storage Area 20655*c* (FIG. 502) of Caller's Device. Referring to the present drawing, CPU 211 (FIG. 1) of Caller's Device collects the raw GPS data from the near base stations (S1). CPU 211 then produces the caller's calculated GPS data by referring to the raw GPS data (S2), and stores the caller's calculated GPS data in Caller's Calculated GPS Data Storage Area 20655*b*5 (FIG. 497) (S3). The sequence described in the present drawing is repeated periodically.

FIG. 519 illustrates Map Data Sending/Receiving Software H55*c*4 stored in Caller/Callee Software Storage Area H55*c* (FIG. 514) of Host H and Map Data Sending/Receiving Software 20655*c*4 stored in Caller's Information Displaying Software Storage Area 20655*c* (FIG. 502) of Caller's Device, which sends and receives the map data. Referring to the present drawing, CPU 211 (FIG. 1) of Caller's Device retrieves the caller's calculated GPS data from Caller's Calculated GPS Data Storage Area 20655*b*5 (FIG. 497) (S1), and sends the data to Host H (S2). Upon receiving the calculated GPS data from Caller's Device (S3), Host H identifies the map data in Map Data Storage Area H55*b*3 (FIG. 513) (S4). Here, the map data represents the surrounding area of the location indicated by the caller's calculated GPS data. Host H retrieves the map data from Map Data Storage Area H55*b*3 (FIG. 513) (S5), and sends the data to Caller's Device (S6). Upon receiving the map data from Host H (S7), Caller's Device stores the data in Caller's Map Data Storage Area 20655*b*7 (FIG. 497) (S8). The sequence described in the present drawing is repeated periodically.

FIG. 520 illustrates Caller's Audiovisual Data Collecting Software 20655*c*5 stored in Caller's Information Displaying Software Storage Area 20655*c* (FIG. 502) of Caller's Device, which collects the audiovisual data of the caller to be sent to Callee's Device via Antenna 218 (FIG. 1) thereof. CPU 211 (FIG. 1) of Caller's Device retrieves the caller's audiovisual data from CCD Unit 214 and Microphone 215 (S1). CPU 211 then stores the caller's audio data in Caller's Audio Data Storage Area 20655*b*1*a* (FIG. 498) (S2), and the caller's visual data in Caller's Visual Data Storage Area 20655*b*1*b* (FIG. 498) (S3). The sequence described in the present drawing is repeated periodically.

FIG. 521 illustrates Caller's Information Sending/Receiving Software H55*c*6 stored in Caller/Callee Software Storage Area H55*c* (FIG. 514) of Host H and Caller's Information Sending/Receiving Software 20655*c*6 stored in Caller's Information Displaying Software Storage Area 20655*c* (FIG. 502) of Caller's Device, which sends and receives the Caller's Information (which is defined hereinafter) between Caller's Device and Host H. Referring to the present drawing, CPU 211 (FIG. 1) of Caller's Device retrieves the permitted caller's personal data from Caller's Personal Data Storage Area 20655*b*3 (FIG. 500) (S1). CPU 211 retrieves the caller's calculated GPS data from Caller's Calculated GPS Data Storage Area 20655*b*5 (FIG. 497) (S2). CPU 211 retrieves the map data from Caller's Map Data Storage Area 20655*b*7 (FIG. 497) (S3). CPU 211 retrieves the caller's audio data from Caller's Audio Data Storage Area 20655*b*1*a* (FIG. 498) (S4). CPU 211 retrieves the caller's visual data from Caller's Visual Data Storage Area 20655*b*1*b* (FIG. 498) (S5). CPU 211 then sends the data retrieved in S1 through S5 (collectively defined as the 'Caller's Information' hereinafter) to Host H (S6). Upon receiving the Caller's Information from Caller's Device (S7), Host H stores the Caller's Information in Caller's Information Storage Area H55*b*1 (FIG. 513) (S8). The sequence described in the present drawing is repeated periodically.

FIG. 522 illustrates Caller's Information Sending/Receiving Software H55*c*6 stored in Caller/Callee Software Storage Area H55*c* (FIG. 514) of Host H and Caller's Information Sending/Receiving Software 20655*c*6*a*A (FIG. 510) stored in Caller's Information Displaying Software Storage Area 20655*c* (FIG. 502) of Caller's Device, which sends and receives the Caller's Information between Host H and Callee's Device. Referring to the present drawing, Host H retrieves the Caller's Information from Caller's Information Storage Area H55*b*1 (FIG. 513) (S1), and sends the Caller's Information to Callee's Device (S2). CPU 211 (FIG. 1) of Callee's Device receives the Caller's Information from Host H (S3). CPU 211 stores the permitted caller's personal data in Caller's Personal Data Storage Area 20655*b*3A (FIG. 508) (S4). CPU 211 stores the caller's calculated GPS data in Caller's Calculated GPS Data Storage Area 20655*b*5A (FIG. 505) (S5). CPU 211 stores the map data in Caller's Map Data Storage Area 20655*b*7A (FIG. 505) (S6). CPU 211 stores the caller's audio data in Caller's Audio Data Storage Area 20655*b*1*a*A (FIG. 506) (S7). CPU 211 stores the caller's visual data in Caller's Visual Data Storage Area 20655*b*1*b*A (FIG. 506) (S8). The sequence described in the present drawing is repeated periodically.

FIG. 523 illustrates Permitted Caller's Personal Data Displaying Software 20655*c*7A stored in Callee's Information Displaying Software Storage Area 20655*c*A (FIG. 510) of Callee's Device, which displays the permitted caller's personal data on LCD 201 (FIG. 1) of Callee's Device. Referring to the present drawing, CPU 211 (FIG. 1) of Callee's Device retrieves the permitted caller's personal data from Caller's Personal Data Storage Area 20655$b$3A (FIG. 508) (S1). CPU 211 then displays the permitted caller's personal data on LCD 201 (FIG. 1) (S2). The sequence described in the present drawing is repeated periodically.

FIG. 524 illustrates Map Displaying Software 20655$c$8A stored in Callee's Information Displaying Software Storage Area 20655$c$A (FIG. 510) of Callee's Device, which displays the map representing the surrounding area of the location indicated by the caller's calculated GPS data. Referring to the present drawing, CPU 211 (FIG. 1) of Callee's Device retrieves the caller's calculated GPS data from Caller's Calculated GPS Data Storage Area 20655$b$5A (FIG. 505) (S1). CPU 211 then retrieves the map data from Caller's Map Data Storage Area 20655$b$7A (FIG. 505) (S2), and arranges on the map data the caller's current location icon in accordance with the caller's calculated GPS data (S3). Here, the caller's current location icon is an icon which represents the location of Caller's Device in the map data. The map with the caller's current location icon is displayed on LCD 201 (FIG. 1) (S4). The sequence described in the present drawing is repeated periodically.

FIG. 525 illustrates Caller's Audio Data Outputting Software 20655$c$9A stored in Caller's Information Displaying Software Storage Area 20655$c$ (FIG. 502) of Caller's Device, which outputs the caller's audio data from Speaker 216 (FIG. 1) of Callee's Device. Referring to the present drawing, CPU 211 (FIG. 1) of Callee's Device retrieves the caller's audio data from Caller's Audio Data Storage Area 20655$b$1$a$A (FIG. 506) (S1). CPU 211 then outputs the caller's audio data from Speaker 216 (FIG. 1) (S2). The sequence described in the present drawing is repeated periodically.

FIG. 526 illustrates Caller's Visual Data Displaying Software 20655$c$10A stored in Callee's Information Displaying Software Storage Area 20655$c$A (FIG. 510) of Callee's Device, which displays the caller's visual data on LCD 201 (FIG. 1) of Callee's Device. Referring to the present drawing, CPU 211 (FIG. 1) of Callee's Device retrieves the caller's visual data from Caller's Visual Data Storage Area 20655$b$1$b$A (FIG. 506) (S1). CPU 211 then displays the caller's visual data on LCD 201 (FIG. 1) (S2). The sequence described in the present drawing is repeated periodically.

FIG. 527 through FIG. 538 primarily illustrate the sequence to output the Callee's Information (which is defined hereinafter) from Caller's Device.

FIG. 527 illustrates Permitted Callee's Personal Data Selecting Software 20655$c$1A stored in Callee's Information Displaying Software Storage Area 20655$c$A (FIG. 510) of Callee's Device, which selects the permitted callee's personal data to be displayed on LCD 201 (FIG. 1) of Caller's Device. Referring to the present drawing, CPU 211 (FIG. 1) of Callee's Device retrieves all of the callee's personal data from Callee's Personal Data Storage Area 20655$b$4A (FIG. 509) (S1). CPU 211 then displays a list of callee's personal data on LCD 201 (FIG. 1) (S2). The callee selects, by utilizing Input Device 210 (FIG. 1) or via voice recognition system, the callee's personal data permitted to be displayed on Caller's Device (S3). The permitted callee's personal data flag of the data selected in S3 is registered as '1' (S4).

FIG. 528 illustrates Dialing Software H55$c$2 stored in Caller/Callee Software Storage Area H55$c$ (FIG. 514) of Host H, Dialing Software 20655$c$2A stored in Callee's Information Displaying Software Storage Area 20655$c$A (FIG. 510) of Callee's Device, and Dialing Software 20655$c$2 stored in Caller's Information Displaying Software Storage Area 20655$c$ (FIG. 502) of Caller's Device, which enables to connect between Callee's Device and Caller's Device via Host H in a wireless fashion. Referring to the present drawing, a connection is established between Callee's Device and Host H (S1). Next, a connection is established between Host H and Caller's Device (S2). As a result, Callee's Device and Caller's Device are able to exchange audiovisual data, text data, and various types of data with each other. The sequence described in the present drawing is not necessarily implemented if the connection between Caller's Device and Callee's Device is established as described in FIG. 516. The sequence described in the present drawing may be implemented if the connection is accidentally terminated by Callee's Device and the connection process is initiated by Callee's Device.

FIG. 529 illustrates Callee's Device Pin-pointing Software H55$c$3$a$ stored in Caller/Callee Software Storage Area H55$c$ (FIG. 514) of Host H and Callee's Device Pin-pointing Software 20655$c$3A stored in Callee's Information Displaying Software Storage Area 20655$c$A of Callee's Device, which identifies the current geographic location of Callee's Device. Referring to the present drawing, CPU 211 (FIG. 1) of Callee's Device collects the GPS raw data from the near base stations (S1). CPU 211 sends the raw GPS data to Host H (S2). Upon receiving the raw GPS data (S3), Host H produces the callee's calculated GPS data by referring to the raw GPS data (S4). Host H stores the callee's calculated GPS data in Callee's Calculated GPS Data Storage Area H55$b$6 (FIG. 513) (S5). Host H then retrieves the callee's calculated GPS data from Callee's Calculated GPS Data Storage Area H55$b$6 (FIG. 513) (S6), and sends the data to Callee's Device (S7). Upon receiving the callee's calculated GPS data from Host H (S8), CPU 211 stores the data in Callee's Calculated GPS Data Storage Area 20655$b$6A (FIG. 505) (S9). Here, the GPS raw data are the primitive data utilized to produce the callee's calculated GPS data, and the callee's calculated GPS data is the data representing the location of Callee's Device in (x, y, z) format. The sequence described in the present drawing is repeated periodically.

FIG. 530 illustrates another embodiment of the sequence described in FIG. 529 in which the entire process is performed solely by Callee's Device Pin-pointing Software 20655$c$3A stored in Callee's Information Displaying Software Storage Area 20655$c$A (FIG. 510) of Callee's Device. Referring to the present drawing, CPU 211 (FIG. 1) of Callee's Device collects the raw GPS data from the near base stations (S1). CPU 211 then produces the callee's calculated GPS data by referring to the raw GPS data (S2), and stores the callee's calculated GPS data in Callee's Calculated GPS Data Storage Area 20655$b$6A (FIG. 505) (S3). The sequence described in the present drawing is repeated periodically.

FIG. 531 illustrates Map Data Sending/Receiving Software H55$c$4 stored in Caller/Callee Software Storage Area H55$c$ (FIG. 514) of Host H and Map Data Sending/Receiving Software 20655$c$4A stored in Callee's Information Displaying Software Storage Area 20655$c$A (FIG. 510) of Callee's Device, which sends and receives the map data. Referring to the present drawing, CPU 211 (FIG. 1) of Callee's Device retrieves the callee's calculated GPS data from Callee's Calculated GPS Data Storage Area 20655$b$6A (FIG. 505) (S1), and sends the data to Host H (S2). Upon receiving the calculated GPS data from Callee's Device (S3), Host H identifies the map data in Map Data Storage Area H55$b$3 (FIG. 513) (S4). Here, the map data represents the surrounding area of the location indicated by the callee's calculated GPS data. Host H retrieves the map data from Map Data Storage Area H55$b$3 (FIG. 513) (S5), and sends the data to Callee's Device (S6). Upon receiving the map data from Host H (S7), Callee's Device stores the data in Callee's Map Data Storage Area 20655$b$8A (FIG. 505) (S8). The sequence described in the present drawing is repeated periodically.

FIG. 532 illustrates Callee's Audiovisual Data Collecting Software 20655*c*5A stored in Callee's Information Displaying Software Storage Area 20655*c*A (FIG. 510) of Callee's Device, which collects the audiovisual data of the callee to be sent to Caller's Device via Antenna 218 (FIG. 1) thereof. CPU 211 (FIG. 1) of Callee's Device retrieves the callee's audiovisual data from CCD Unit 214 and Microphone 215 (S1). CPU 211 then stores the callee's audio data in Callee's Audio Data Storage Area 20655*b*2*a*A (FIG. 507) (S2), and the callee's visual data in Callee's Visual Data Storage Area 20655*b*2*b*A (FIG. 507) (S3). The sequence described in the present drawing is repeated periodically.

FIG. 533 illustrates Callee's Information Sending/Receiving Software H55*c*6*a* (FIG. 514) stored in Caller/Callee Software Storage Area H55*c* (FIG. 514) of Host H and Callee's Information Sending/Receiving Software 20655*c*6A (FIG. 510) stored in Callee's Information Displaying Software Storage Area 20655*c*A of Callee's Device, which sends and receives the Callee's Information (which is defined hereinafter) between Callee's Device and Host H. Referring to the present drawing, CPU 211 (FIG. 1) of Callee's Device retrieves the permitted callee's personal data from Callee's Personal Data Storage Area 20655*b*4A (FIG. 509) (S1). CPU 211 retrieves the callee's calculated GPS data from Callee's Calculated GPS Data Storage Area 20655*b*6A (FIG. 505) (S2). CPU 211 retrieves the map data from Callee's Map Data Storage Area 20655*b*8A (FIG. 505) (S3). CPU 211 retrieves the callee's audio data from Callee's Audio Data Storage Area 20655*b*2*a*A (FIG. 507) (S4). CPU 211 retrieves the callee's visual data from Callee's Visual Data Storage Area 20655*b*2*b*A (FIG. 507) (S5). CPU 211 then sends the data retrieved in S1 through S5 (collectively defined as the 'Callee's Information' hereinafter) to Host H (S6). Upon receiving the Callee's Information from Callee's Device (S7), Host H stores the Callee's Information in Callee's Information Storage Area H55*b*2 (FIG. 513) (S8). The sequence described in the present drawing is repeated periodically.

FIG. 534 illustrates Callee's Information Sending/Receiving Software H55*c*6*a* stored in Caller/Callee Software Storage Area H55*c* (FIG. 514) of Host H and Callee's Information Sending/Receiving Software 20655*c*6*a* stored in Caller's Information Displaying Software Storage Area 20655*c* (FIG. 502) of Caller's Device, which sends and receives the Callee's Information between Host H and Caller's Device. Referring to the present drawing, Host H retrieves the Callee's Information from Callee's Information Storage Area H55*b*2 (FIG. 513) (S1), and sends the Callee's Information to Caller's Device (S2). CPU 211 (FIG. 1) of Caller's Device receives the Callee's Information from Host H (S3). CPU 211 stores the permitted callee's personal data in Callee's Personal Data Storage Area 20655*b*4 (FIG. 501) (S4). CPU 211 stores the callee's calculated GPS data in Callee's Calculated GPS Data Storage Area 20655*b*6 (FIG. 497) (S5). CPU 211 stores the map data in Callee's Map Data Storage Area 20655*b*8 (FIG. 497) (S6). CPU 211 stores the callee's audio data in Callee's Audio Data Storage Area 20655*b*2*a* (FIG. 499) (S7). CPU 211 stores the callee's visual data in Callee's Visual Data Storage Area 20655*b*2*b* (FIG. 499) (S8). The sequence described in the present drawing is repeated periodically.

FIG. 535 illustrates Permitted Callee's Personal Data Displaying Software 20655*c*7 stored in Caller's Information Displaying Software Storage Area 20655*c* (FIG. 502) of Caller's Device, which displays the permitted callee's personal data on LCD 201 (FIG. 1) of Caller's Device. Referring to the present drawing, CPU 211 (FIG. 1) of Caller's Device retrieves the permitted callee's personal data from Callee's Personal Data Storage Area 20655*b*4 (FIG. 501) (S1). CPU 211 then displays the permitted callee's personal data on LCD 201 (FIG. 1) (S2). The sequence described in the present drawing is repeated periodically.

FIG. 536 illustrates Map Displaying Software 20655*c*8 stored in Caller's Information Displaying Software Storage Area 20655*c* (FIG. 502) of Caller's Device, which displays the map representing the surrounding area of the location indicated by the callee's calculated GPS data. Referring to the present drawing, CPU 211 (FIG. 1) of Caller's Device retrieves the callee's calculated GPS data from Callee's Calculated GPS Data Storage Area 20655*b*6 (FIG. 497) (S1). CPU 211 then retrieves the map data from Callee's Map Data Storage Area 20655*b*8 (FIG. 497) (S2), and arranges on the map data the callee's current location icon in accordance with the callee's calculated GPS data (S3). Here, the callee's current location icon is an icon which represents the location of Callee's Device in the map data. The map with the callee's current location icon is displayed on LCD 201 (FIG. 1) (S4). The sequence described in the present drawing is repeated periodically.

FIG. 537 illustrates Callee's Audio Data Outputting Software 20655*c*9 stored in Caller's Information Displaying Software Storage Area 20655*c* (FIG. 502) of Caller's Device, which outputs the callee's audio data from Speaker 216 (FIG. 1) of Caller's Device. Referring to the present drawing, CPU 211 (FIG. 1) of Caller's Device retrieves the callee's audio data from Callee's Audio Data Storage Area 20655*b*2*a* (FIG. 499) (S1). CPU 211 then outputs the caller's audio data from Speaker 216 (FIG. 1) (S2). The sequence described in the present drawing is repeated periodically.

FIG. 538 illustrates Callee's Visual Data Displaying Software 20655*c*10 stored in Caller's Information Displaying Software Storage Area 20655*c* (FIG. 502) of Caller's Device, which displays the callee's visual data on LCD 201 (FIG. 1) of Caller's Device. Referring to the present drawing, CPU 211 (FIG. 1) of Caller's Device retrieves the callee's visual data from Callee's Visual Data Storage Area 20655*b*2*b* (FIG. 499) (S1). CPU 211 then displays the callee's visual data on LCD 201 (FIG. 1) (S2). The sequence described in the present drawing is repeated periodically.

<<Communication Device Remote Controlling Function (by Phone)>>

FIG. 539 through FIG. 560 illustrate the communication device remote controlling function (by phone) which enables the user of Communication Device 200 to remotely control Communication Device 200 via conventional telephone Phone PH (not shown in the drawings).

FIG. 539 illustrates the storage areas included in Host H. As described in the present drawing, Host H includes Communication Device Controlling Information Storage Area H57*a* of which the data and the software programs stored therein are described in FIG. 540.

FIG. 540 illustrates the storage areas included in Communication Device Controlling Information Storage Area H57*a* (FIG. 539). As described in the present drawing, Communication Device Controlling Information Storage Area H57*a* includes Communication Device Controlling Data Storage Area H57*b* and Communication Device Controlling Software Storage Area H57*c*. Communication Device Controlling Data Storage Area H57*b* stores the data necessary to implement the present function on the side of Host H, such as the ones described in FIG. 541 through FIG. 544. Communication Device Controlling Software Storage Area H57*c* stores the software programs necessary to implement the present function on the side of Host H, such as the ones described in FIG. 545.

FIG. 541 illustrates the storage areas included in Communication Device Controlling Data Storage Area H57*b* (FIG. 540). As described in the present drawing, Communication Device Controlling Data Storage Area H57*b* includes Password Data Storage Area H57*b*1, Phone Number Data Storage Area H57*b*2, Audio Data Storage Area H57*b*3, and Work Area H57*b*4. Password Data Storage Area H57*b*1 stores the data described in FIG. 542. Phone Number Data Storage Area H57*b*2 stores the data described in FIG. 543. Audio Data Storage Area H57*b*3 stores the data described in FIG. 544. Work Area H57*b*4 is utilized as a work area to perform calculation and to temporarily store data.

FIG. 542 illustrates the data stored in Password Data Storage Area H57*b*1 (FIG. 541). As described in the present drawing, Password Data Storage Area H57*b*1 comprises two columns, i.e., 'User ID' and 'Password Data'. Column 'User ID' stores the user IDs, and each user ID represents the identification of the user of Communication Device 200. Column 'Password Data' stores the password data, and each password data represents the password set by the user of the corresponding user ID. Here, each password data is composed of alphanumeric data. In the example described in the present drawing, Password Data Storage Area H57*b*1 stores the following data: the user ID 'User#1' and the corresponding password data 'Password Data#1'; the user ID 'User#2' and the corresponding password data 'Password Data#2'; the user ID 'User#3' and the corresponding password data 'Password Data#3'; the user ID 'User#4' and the corresponding password data 'Password Data#4'; and the user ID 'User#5' and the corresponding password data 'Password Data#5'.

FIG. 543 illustrates the data stored in Phone Number Data Storage Area H57*b*2 (FIG. 541). As described in the present drawing, Phone Number Data Storage Area H57*b*2 comprises two columns, i.e., 'User ID' and 'Phone Number Data'. Column 'User ID' stores the user IDs, and each user ID represents the identification of the user of Communication Device 200. Column 'Phone Number Data' stores the phone number data, and each phone number data represents the phone number of the user of the corresponding user ID. Here, each phone number data is composed of numeric data. In the example described in the present drawing, Phone Number Data Storage Area H57*b*2 stores the following data: the user ID 'User#1' and the corresponding phone number data 'Phone Number Data#1'; the user ID 'User#2' and the corresponding phone number data 'Phone Number Data#2'; the user ID 'User#3' and the corresponding phone number data 'Phone Number Data#3'; the user ID 'User#4' and the corresponding phone number data 'Phone Number Data#4'; and the user ID 'User#5' and the corresponding phone number data 'Phone Number Data#5'.

FIG. 544 illustrates the data stored in Audio Data Storage Area H57*b*3 (FIG. 541). As described in the present drawing, Audio Data Storage Area H57*b*3 comprises two columns, i.e., 'Audio ID' and 'Audio Data'. Column 'Audio ID' stores the audio IDs, and each audio ID represents the identification of the audio data stored in column 'Audio Data'. Column 'Audio Data' stores the audio data, and each audio data represents a message output from a conventional telephone Phone PH. In the example described in the present drawing, Audio Data Storage Area H57*b*3 stores the following data: the audio ID 'Audio#0' and the corresponding audio data 'Audio Data#0'; the audio ID 'Audio#1' and the corresponding audio data 'Audio Data#1'; the audio ID 'Audio#2' and the corresponding audio data 'Audio Data#2'; the audio ID 'Audio#3' and the corresponding audio data 'Audio Data#3'; the audio ID 'Audio#4' and the corresponding audio data 'Audio Data#4'; the audio ID 'Audio#5' and the corresponding audio data 'Audio Data#5'; and the audio ID 'Audio#6' and the corresponding audio data 'Audio Data#6'. 'Audio Data#0' represents the message: 'To deactivate manner mode, press 1. To deactivate manner mode and ring your mobile phone, press 2. To ring your mobile phone, press 3. To change password of your mobile phone, press 4. To lock your mobile phone, press 5. To power off your mobile phone, press 6.' 'Audio Data#1' represents the message: 'The manner mode has been deactivated.' Audio Data#2' represents the message: 'The manner mode has been deactivated and your mobile phone has been rung.' Audio Data#3' represents the message: 'Your mobile phone has been rung.' Audio Data#4' represents the message: 'The password of your mobile phone has been changed.' Audio Data#5' represents the message: 'Your mobile phone has been changed.' Audio Data#6' represents the message: 'Your mobile phone has been power-offed.' The foregoing audio data may be recorded in either male's voice or female's voice.

FIG. 545 illustrates the software programs stored in Communication Device Controlling Software Storage Area H57*c* (FIG. 540). As described in the present drawing, Communication Device Controlling Software Storage Area H57*c* stores User Authenticating Software H57*c*1, Menu Introducing Software H57*c*2, Line Connecting Software H57*c*3, Manner Mode Deactivating Software H57*c*4, Manner Mode Deactivating & Ringing Software H57*c*5, Ringing Software H57*c*6, Password Changing Software H57*c*7, Device Locking Software H57*c*8, and Power Off Software H57*c*9. User Authenticating Software H57*c*1 is the software program described in FIG. 552. Menu Introducing Software H57*c*2 is the software program described in FIG. 553. Line Connecting Software H57*c*3 is the software program described in FIG. 554. Manner Mode Deactivating Software H57*c*4 is the software program described in FIG. 555. Manner Mode Deactivating & Ringing Software H57*c*5 is the software program described in FIG. 556. Ringing Software H57*c*6 is the software program described in FIG. 557. Password Changing Software H57*c*7 is the software program described in FIG. 558. Device Locking Software H57*c*8 is the software program described in FIG. 559. Power Off Software H57*c*9 is the software program described in FIG. 560.

FIG. 546 illustrates the storage area included in RAM 206 (FIG. 1). As described in the present drawing, RAM 206 includes Communication Device Controlling Information Storage Area 20657*a* of which the data and the software programs stored therein are described in FIG. 547.

FIG. 547 illustrates the storage areas included in Communication Device Controlling Information Storage Area 20657*a* (FIG. 546). As described in the present drawing, Communication Device Controlling Information Storage Area 20657*a* includes Communication Device Controlling Data Storage Area 20657*b* and Communication Device Controlling Software Storage Area 20657*c*. Communication Device Controlling Data Storage Area 20657*b* stores the data necessary to implement the present function on the side of Communication Device 200, such as the ones described in FIG. 548 through FIG. 550. Communication Device Controlling Software Storage Area 20657*c* stores the software programs necessary to implement the present function on the side of Communication Device 200, such as the ones described in FIG. 551.

The data and/or the software programs stored in Communication Device Controlling Information Storage Area 20657*a* (FIG. 547) may be downloaded from Host H.

FIG. 548 illustrates the storage areas included in Communication Device Controlling Data Storage Area 20657*b* (FIG. 547). As described in the present drawing, Communication Device Controlling Data Storage Area **20657*b* includes Password Data Storage Area 20657*b*1 and Work Area 20657*b*4. Password Data Storage Area 20657*b*1 stores the data described in FIG. 549. Work Area 20657*b*4** is utilized as a work area to perform calculation and to temporarily store data.

FIG. 549 illustrates the data stored in Password Data Storage Area **20657*b*1 (FIG. 548). As described in the present drawing, Password Data Storage Area 20657*b*1 comprises two columns, i.e., 'User ID' and 'Password Data'. Column 'User ID' stores the user ID which represents the identification of the user of Communication Device 200. Column 'Password Data' stores the password data set by the user of Communication Device 200. Here, the password data is composed of alphanumeric data. Assuming that the user ID of Communication Device 200 is 'User#1'. In the example described in the present drawing, Password Data Storage Area H57*b*1 stores the following data: the user ID 'User#1' and the corresponding password data 'Password Data#1**'.

FIG. 550 illustrates the data stored in Phone Number Data Storage Area **20657*b*2 (FIG. 548). As described in the present drawing, Phone Number Data Storage Area 20657*b*2 comprises two columns, i.e., 'User ID' and 'Phone Number Data'. Column 'User ID' stores the user ID of the user of Communication Device 200. Column 'Phone Number Data' stores the phone number data which represents the phone number of Communication Device 200. Here, the phone number data is composed of numeric data. In the example described in the present drawing, Phone Number Data Storage Area H57*b*2 stores the following data: the user ID 'User#1' and the corresponding phone number data 'Phone Number Data#1**'.

FIG. 551 illustrates the software programs stored in Communication Device Controlling Software Storage Area **20657*c* (FIG. 547). As described in the present drawing, Communication Device Controlling Software Storage Area 20657*c* stores Line Connecting Software 20657*c*3, Manner Mode Deactivating Software 20657*c*4, Manner Mode Deactivating & Ringing Software 20657*c*5, Ringing Software 20657*c*6, Password Changing Software 20657*c*7, Device Locking Software 20657*c*8, and Power Off Software 20657*c*9. Line Connecting Software 20657*c*3 is the software program described in FIG. 554. Manner Mode Deactivating Software 20657*c*4 is the software program described in FIG. 555. Manner Mode Deactivating & Ringing Software 20657*c*5 is the software program described in FIG. 556. Ringing Software 20657*c*6 is the software program described in FIG. 557. Password Changing Software 20657*c*7 is the software program described in FIG. 558. Device Locking Software 20657*c*8 is the software program described in FIG. 559. Power Off Software 20657*c*9 is the software program described in FIG. 560**.

FIG. 552 through FIG. 560 illustrate the software programs which enables the user of Communication Device 200 to remotely control Communication Device 200 via conventional telephone Phone PH.

FIG. 552 illustrates User Authenticating Software H**57*c*1 (FIG. 545) stored in Communication Device Controlling Software Storage Area H57*c* of Host H, which authenticates the user of Communication Device 200 to implement the present function via Phone PH. As described in the present drawing, Phone PH calls Host H by dialing the predetermined phone number of Host H (S1). Upon receiving the call from Phone PH (S2) and the line is connected therebetween (S3), the user, by utilizing Phone PH, inputs both his/her password data (S4) and the phone number data of Communication Device 200 (S5). Host H initiates the authentication process by referring to Password Data Storage Area H57*b*1 (FIG. 542) and Phone Number Data Storage Area H57*b*2 (FIG. 543)) (S6). The authentication process is completed (and the sequences described hereafter are enabled thereafter) if the password data and the phone number data described in S4 and S5 match with the data stored in Password Data Storage Area H57*b*1 and Phone Number Data Storage Area H57*b*2**.

FIG. 553 illustrates Menu Introducing Software H**57*c*2 (FIG. 545) stored in Communication Device Controlling Software Storage Area H57*c* of Host H, which introduces the menu via Phone PH. As described in the present drawing, Host H retrieves Audio Data#0 from Audio Data Storage Area H57*b*3 (FIG. 544) (S1), and sends the data to Phone PH (S2). Upon receiving Audio Data#0 from Host H (S3), Phone PH outputs Audio Data#0 from its speaker (S4). The user presses one of the keys of '1' through '6' wherein the sequences implemented thereafter are described in FIG. 554 through FIG. 560 (S5**).

FIG. 554 illustrates Line Connecting Software H**57*c*3 (FIG. 545) stored in Communication Device Controlling Software Storage Area H57*c* of Host H and Line Connecting Software 20657*c*3 (FIG. 551) stored in Communication Device Controlling Software Storage Area 20657*c* of Communication Device 200, which connect line between Host H and Communication Device 200. As described in the present drawing, Host H calls Communication Device 200 by retrieving the corresponding phone number data from Phone Number Data Storage Area H57*b*2 (FIG. 543) (S1). Upon Communication Device 200 receiving the call from Host H (S2), the line is connected therebetween (S3). For the avoidance of doubt, the line is connected between Host H and Communication Device 200** merely to implement the present function, and a voice communication between human beings is not enabled thereafter.

FIG. 555 illustrates Manner Mode Deactivating Software H**57*c*4 (FIG. 545) stored in Communication Device Controlling Software Storage Area H57*c* of Host H and Manner Mode Deactivating Software 20657*c*4 (FIG. 551) stored in Communication Device Controlling Software Storage Area 20657*c* of Communication Device 200, which deactivate the manner mode of Communication Device 200. Here, Communication Device 200 activates Vibrator 217 (FIG. 1) when Communication Device 200 is in the manner mode and outputs a ringing sound from Speaker 216 (FIG. 1) when Communication Device 200 is not in the manner mode, upon receiving an incoming call. Assume that the user presses key '1' of Phone PH (S1). In response, Phone PH sends the corresponding signal to Host H (S2). Host H, upon receiving the signal described in S2, sends a manner mode deactivating command to Communication Device 200 (S3). Upon receiving the manner mode deactivating command from Host H (S4), Communication Device 200 deactivates the manner mode (S5). Host H retrieves Audio Data#1 from Audio Data Storage Area H57*b*3 (FIG. 544) and sends the data to Phone PH (S6). Upon receiving Audio Data#1 from Host H, Phone PH outputs the data from its speaker (S7). Normally the purpose to output the ringing sound from Speaker 216 is to give a notification to the user that Communication Device 200 has received an incoming call, and a voice communication is enabled thereafter upon answering the call. In contrast, the purpose to output the ringing sound from Speaker 216 by executing Manner Mode Deactivating & Ringing Software H57*c*5 and Manner Mode Deactivating & Ringing Software 20657*c*5 is merely to let the user to identify the location of Communication Device 200**. Therefore, a voice communication between human beings is not enabled thereafter.

FIG. 556 illustrates Manner Mode Deactivating & Ringing Software H**57*c*5 (FIG. 545) stored in Communication Device Controlling Software Storage Area H57***c* of Host H and Manner Mode Deactivating & Ringing Software 20657*c*5 (FIG. 551) stored in Communication Device Controlling Software Storage Area 20657*c* of Communication Device 200, which deactivate the manner mode of Communication Device 200 and outputs a ringing sound thereafter. Assume that the user presses key '2' of Phone PH (S1). In response, Phone PH sends the corresponding signal to Host H (S2). Host H, upon receiving the signal described in S2, sends a manner mode deactivating & device ringing command to Communication Device 200 (S3). Upon receiving the manner mode deactivating & device ringing command from Host H (S4), Communication Device 200 deactivates the manner mode (S5) and outputs a ring data from Speaker 216 (S6). Host H retrieves Audio Data#2 from Audio Data Storage Area H57*b*3 (FIG. 544) and sends the data to Phone PH (S7). Upon receiving Audio Data#2 from Host H, Phone PH outputs the data from its speaker (S8). Normally the purpose to output the ringing sound from Speaker 216 is to give a notification to the user that Communication Device 200 has received an incoming call, and a voice communication is enabled thereafter upon answering the call. In contrast, the purpose to output the ringing sound from Speaker 216 by executing Manner Mode Deactivating & Ringing Software H57*c*5 and Manner Mode Deactivating & Ringing Software 20657*c*5 is merely to let the user to identify the location of Communication Device 200. Therefore, a voice communication between human beings is not enabled thereafter by implementing the present function.

FIG. 557 illustrates Ringing Software H57*c*6 (FIG. 545) stored in Communication Device Controlling Software Storage Area H57*c* of Host H and Ringing Software 20657*c*6 (FIG. 551) stored in Communication Device Controlling Software Storage Area 20657*c* of Communication Device 200, which output a ringing sound from Speaker 216 (FIG. 1). Assume that the user presses key '3' of Phone PH (S1). In response, Phone PH sends the corresponding signal to Host H (S2). Host H, upon receiving the signal described in S2, sends a device ringing command to Communication Device 200 (S3). Upon receiving the device ringing command from Host H (S4), Communication Device 200 outputs a ring data from Speaker 216 (S5). Host H retrieves Audio Data#3 from Audio Data Storage Area H57*b*3 (FIG. 544) and sends the data to Phone PH (S6). Upon receiving Audio Data#3 from Host H, Phone PH outputs the data from its speaker (S7). Normally the purpose to output the ringing sound from Speaker 216 is to give a notification to the user that Communication Device 200 has received an incoming call, and a voice communication is enabled thereafter upon answering the call. In contrast, the purpose to output the ringing sound from Speaker 216 by executing Ringing Software H57*c*6 and Ringing Software 20657*c*6 is merely to let the user to identify the location of Communication Device 200. Therefore, a voice communication between human beings is not enabled thereafter by implementing the present function.

FIG. 558 illustrates Password Changing Software H57*c*7 (FIG. 545) stored in Communication Device Controlling Software Storage Area H57*c* of Host H and Password Changing Software 20657*c*7 (FIG. 551) stored in Communication Device Controlling Software Storage Area 20657*c* of Communication Device 200, which change the password necessary to operate Communication Device 200. Assume that the user presses key '4' of Phone PH (S1). In response, Phone PH sends the corresponding signal to Host H (S2). The user then enters a new password data by utilizing Phone PH (S3), which is sent to Communication Device 200 by Host H (S4). Upon receiving the new password data from Host H (S5), Communication Device 200 stores the new password data in Password Data Storage Area 20657*b*1 (FIG. 549) and the old password data is erased (S6). Host H retrieves Audio Data#4 from Audio Data Storage Area H57*b*3 (FIG. 544) and sends the data to Phone PH (S7). Upon receiving Audio Data#4 from Host H, Phone PH outputs the data from its speaker (S8).

FIG. 559 illustrates Device Locking Software H57*c*8 (FIG. 545) stored in Communication Device Controlling Software Storage Area H57*c* of Host H and Device Locking Software 20657*c*8 (FIG. 551) stored in Communication Device Controlling Software Storage Area 20657*c* of Communication Device 200, which lock Communication Device 200, i.e., nullify any input signal input via Input Device 210 (FIG. 1). Assume that the user presses key '5' of Phone PH (S1). In response, Phone PH sends the corresponding signal to Host H (S2). Host H, upon receiving the signal described in S2, sends a device locking command to Communication Device 200 (S3). Upon receiving the device locking command from Host H (S4), Communication Device 200 is locked thereafter, i.e., any input via Input Device 210 is nullified unless a password data matching to the one stored in Password Data Storage Area 20657*b*1 (FIG. 549) is entered (S5). Host H retrieves Audio Data#5 from Audio Data Storage Area H57*b*3 (FIG. 544) and sends the data to Phone PH (S6). Upon receiving Audio Data#5 from Host H, Phone PH outputs the data from its speaker (S7).

FIG. 560 illustrates Power Off Software H57*c*9 (FIG. 545) stored in Communication Device Controlling Software Storage Area H57*c* of Host H and Power Off Software 20657*c*9 (FIG. 551) stored in Communication Device Controlling Software Storage Area 20657*c* of Communication Device 200, which turn off the power of Communication Device 200. Assume that the user presses key '6' of Phone PH (S1). In response, Phone PH sends the corresponding signal to Host H (S2). Host H, upon receiving the signal described in S2, sends a power off command to Communication Device 200 (S3). Upon receiving the power off command from Host H (S4), Communication Device 200 turns off the power of itself (S5). Host H retrieves Audio Data#6 from Audio Data Storage Area H57*b*3 (FIG. 544) and sends the data to Phone PH (S6). Upon receiving Audio Data#6 from Host H, Phone PH outputs the data from its speaker (S7).

<<Communication Device Remote Controlling Function (by Web)>>

FIG. 561 through FIG. 583 illustrate the communication device remote controlling function (by web) which enables the user of Communication Device 200 to remotely control Communication Device 200 by an ordinary personal computer (Personal Computer PC) via the Internet, i.e., by accessing a certain web site. Here, Personal Computer PC may be any type of personal computer, including a desktop computer, lap top computer, and PDA.

FIG. 561 illustrates the storage areas included in Host H. As described in the present drawing, Host H includes Communication Device Controlling Information Storage Area H58*a* of which the data and the software programs stored therein are described in FIG. 562.

FIG. 562 illustrates the storage areas included in Communication Device Controlling Information Storage Area H58*a* (FIG. 561). As described in the present drawing, Communication Device Controlling Information Storage Area H58*a* includes Communication Device Controlling Data Storage Area H58*b* and Communication Device Controlling Software Storage Area H58*c*. Communication Device Controlling Data Storage Area H58*b* stores the data necessary to implement the present function on the side of Host H, such as the ones described in FIG. 563 through FIG. 566. Communication Device Controlling Software Storage Area H58*c* stores the software programs necessary to implement the present function on the side of Host H, such as the ones described in FIG. 568.

FIG. 563 illustrates the storage areas included in Communication Device Controlling Data Storage Area H58*b* (FIG. 562). As described in the present drawing, Communication Device Controlling Data Storage Area H58*b* includes Password Data Storage Area H58*b*1, Phone Number Data Storage Area H58*b*2, Web Display Data Storage Area H58*b*3, and Work Area H58*b*4. Password Data Storage Area H58*b*1 stores the data described in FIG. 564. Phone Number Data Storage Area H58*b*2 stores the data described in FIG. 565. Web Display Data Storage Area H58*b*3 stores the data described in FIG. 566. Work Area H58*b*4 is utilized as a work area to perform calculation and to temporarily store data.

FIG. 564 illustrates the data stored in Password Data Storage Area H58*b*1 (FIG. 563). As described in the present drawing, Password Data Storage Area H58*b*1 comprises two columns, i.e., 'User ID' and 'Password Data'. Column 'User ID' stores the user IDs, and each user ID represents the identification of the user of Communication Device 200. Column 'Password Data' stores the password data, and each password data represents the password set by the user of the corresponding user ID. Here, each password data is composed of alphanumeric data. In the example described in the present drawing, Password Data Storage Area H58*b*1 stores the following data: the user ID 'User#1' and the corresponding password data 'Password Data#1'; the user ID 'User#2' and the corresponding password data 'Password Data#2'; the user ID 'User#3' and the corresponding password data 'Password Data#3'; the user ID 'User#4' and the corresponding password data 'Password Data#4'; and the user ID 'User#5' and the corresponding password data 'Password Data#5'.

FIG. 565 illustrates the data stored in Phone Number Data Storage Area H58*b*2 (FIG. 563). As described in the present drawing, Phone Number Data Storage Area H58*b*2 comprises two columns, i.e., 'User ID' and 'Phone Number Data'. Column 'User ID' stores the user IDs, and each user ID represents the identification of the user of Communication Device 200. Column 'Phone Number Data' stores the phone number data, and each phone number data represents the phone number of the user of the corresponding user ID. Here, each phone number data is composed of numeric data. In the example described in the present drawing, Phone Number Data Storage Area H58*b*2 stores the following data: the user ID 'User#1' and the corresponding phone number data 'Phone Number Data#1'; the user ID 'User#2' and the corresponding phone number data 'Phone Number Data#2'; the user ID 'User#3' and the corresponding phone number data 'Phone Number Data#3'; the user ID 'User#4' and the corresponding phone number data 'Phone Number Data#4'; and the user ID 'User#5' and the corresponding phone number data 'Phone Number Data#5'.

FIG. 566 illustrates the data stored in Web Display Data Storage Area H58*b*3 (FIG. 563). As described in the present drawing, Web Display Data Storage Area H58*b*3 comprises two columns, i.e., 'Web Display ID' and 'Web Display Data'. Column 'Web Display ID' stores the web display IDs, and each web display ID represents the identification of the web display data stored in column 'Web Display Data'. Column 'Web Display Data' stores the web display data, and each web display data represents a message displayed on Personal Computer PC. In the example described in the present drawing, Web Display Data Storage Area H58*b*3 stores the following data: the web display ID 'Web Display#0' and the corresponding web display data 'Web Display Data#0'; the web display ID 'Web Display#1' and the corresponding web display data 'Web Display Data#1'; the web display ID 'Web Display#2' and the corresponding web display data 'Web Display Data#2'; the web display ID 'Web Display#3' and the corresponding web display data 'Web Display Data#3'; the web display ID 'Web Display#4' and the corresponding web display data 'Web Display Data#4'; the web display ID 'Web Display#5' and the corresponding web display data 'Web Display Data#5'; and the web display ID 'Web Display#6' and the corresponding web display data 'Web Display Data#6'. 'Web Display Data#0' represents the message: 'To deactivate manner mode, press 1. To deactivate manner mode and ring your mobile phone, press 2. To ring your mobile phone, press 3. To change password of your mobile phone, press 4. To lock your mobile phone, press 5. To power off your mobile phone, press 6.' 'Web Display Data#1' represents the message: 'The manner mode has been deactivated.' 'Web Display Data#2' represents the message: 'The manner mode has been deactivated and your mobile phone has been rung.' 'Web Display Data#3' represents the message: 'Your mobile phone has been rung.' 'Web Display Data#4' represents the message: 'The password of your mobile phone has been changed.' 'Web Display Data#5' represents the message: 'Your mobile phone has been changed.' 'Web Display Data#6' represents the message: 'Your mobile phone has been power-offed.' FIG. 567 illustrates the display of Personal Computer PC. Referring to the present drawing, Home Page 20158HP, i.e., a home page to implement the present function is displayed on Personal Computer PC. Home Page 20158HP is primarily composed of Web Display Data#0 (FIG. 566) and six buttons, i.e., Buttons 1 through 6. Following the instruction described in Web Display Data#0, the user may select one of the buttons to implement the desired function as described hereinafter.

FIG. 568 illustrates the software programs stored in Communication Device Controlling Software Storage Area H58*c* (FIG. 562). As described in the present drawing, Communication Device Controlling Software Storage Area H58*c* stores User Authenticating Software H58*c*1, Menu Introducing Software H58*c*2, Line Connecting Software H58*c*3, Manner Mode Deactivating Software H58*c*4, Manner Mode Deactivating & Ringing Software H58*c*5, Ringing Software H58*c*6, Password Changing Software H58*c*7, Device Locking Software H58*c*8, and Power Off Software H58*c*9. User Authenticating Software H58*c*1 is the software program described in FIG. 575. Menu Introducing Software H58*c*2 is the software program described in FIG. 576. Line Connecting Software H58*c*3 is the software program described in FIG. 577. Manner Mode Deactivating Software H58*c*4 is the software program described in FIG. 578. Manner Mode Deactivating & Ringing Software H58*c*5 is the software program described in FIG. 579. Ringing Software H58*c*6 is the software program described in FIG. 580. Password Changing Software H58*c*7 is the software program described in FIG. 581. Device Locking Software H58*c*8 is the software program described in FIG. 582. Power Off Software H58*c*9 is the software program described in FIG. 583.

FIG. 569 illustrates the storage area included in RAM 206 (FIG. 1). As described in the present drawing, RAM 206 includes Communication Device Controlling Information Storage Area 20658*a* of which the data and the software programs stored therein are described in FIG. 570.

FIG. 570 illustrates the storage areas included in Communication Device Controlling Information Storage Area 20658*a* (FIG. 569). As described in the present drawing, Communication Device Controlling Information Storage Area 20658*a* includes Communication Device Controlling Data Storage Area 20658*b* and Communication Device Controlling Software Storage Area 20658*c*. Communication Device Controlling Data Storage Area 20658*b* stores the data necessary to implement the present function on the side of Communication Device 200, such as the ones described in FIG. 571 through FIG. 573. Communication Device Controlling Software Storage Area 20658*c* stores the software programs necessary to implement the present function on the side of Communication Device 200, such as the ones described in FIG. 574.

The data and/or the software programs stored in Communication Device Controlling Information Storage Area 20658*a* (FIG. 570) may be downloaded from Host H.

FIG. 571 illustrates the storage areas included in Communication Device Controlling Data Storage Area 20658*b* (FIG. 570). As described in the present drawing, Communication Device Controlling Data Storage Area 20658*b* includes Password Data Storage Area 20658*b*1 and Work Area 20658*b*4. Password Data Storage Area 20658*b*1 stores the data described in FIG. 572. Work Area 20658*b*4 is utilized as a work area to perform calculation and to temporarily store data.

FIG. 572 illustrates the data stored in Password Data Storage Area 20658*b*1 (FIG. 571). As described in the present drawing, Password Data Storage Area 20658*b*1 comprises two columns, i.e., 'User ID' and 'Password Data'. Column 'User ID' stores the user ID which represents the identification of the user of Communication Device 200. Column 'Password Data' stores the password data set by the user of Communication Device 200. Here, the password data is composed of alphanumeric data. Assuming that the user ID of Communication Device 200 is 'User#1'. In the example described in the present drawing, Password Data Storage Area H58*b*1 stores the following data: the user ID 'User#1' and the corresponding password data 'Password Data#1'.

FIG. 573 illustrates the data stored in Phone Number Data Storage Area 20658*b*2 (FIG. 571). As described in the present drawing, Phone Number Data Storage Area 20658*b*2 comprises two columns, i.e., 'User ID' and 'Phone Number Data'. Column 'User ID' stores the user ID of the user of Communication Device 200. Column 'Phone Number Data' stores the phone number data which represents the phone number of Communication Device 200. Here, the phone number data is composed of numeric data. In the example described in the present drawing, Phone Number Data Storage Area H58*b*2 stores the following data: the user ID 'User#1' and the corresponding phone number data 'Phone Number Data#1'.

FIG. 574 illustrates the software programs stored in Communication Device Controlling Software Storage Area 20658*c* (FIG. 570). As described in the present drawing, Communication Device Controlling Software Storage Area 20658*c* stores Line Connecting Software 20658*c*3, Manner Mode Deactivating Software 20658*c*4, Manner Mode Deactivating & Ringing Software 20658*c*5, Ringing Software 20658*c*6, Password Changing Software 20658*c*7, Device Locking Software 20658*c*8, and Power Off Software 20658*c*9. Line Connecting Software 20658*c*3 is the software program described in FIG. 577. Manner Mode Deactivating Software 20658*c*4 is the software program described in FIG. 578. Manner Mode Deactivating & Ringing Software 20658*c*5 is the software program described in FIG. 579. Ringing Software 20658*c*6 is the software program described in FIG. 580. Password Changing Software 20658*c*7 is the software program described in FIG. 581. Device Locking Software 20658*c*8 is the software program described in FIG. 582. Power Off Software 20658*c*9 is the software program described in FIG. 583.

FIG. 575 through FIG. 583 illustrate the software programs which enables the user of Communication Device 200 to remotely control Communication Device 200 by Personal Computer PC.

FIG. 575 illustrates User Authenticating Software H58*c*1 (FIG. 568) stored in Communication Device Controlling Software Storage Area H58*c* of Host H, which authenticates the user of Communication Device 200 to implement the present function via Personal Computer PC. As described in the present drawing, Personal Computer PC sends an access request to Host H via the Internet (S1). Upon receiving the request from Personal Computer PC (S2) and the line is connected therebetween (S3), the user, by utilizing Personal Computer PC, inputs both his/her password data (S4) and the phone number data of Communication Device 200 (S5). Host H initiates the authentication process by referring to Password Data Storage Area H58*b*1 (FIG. 564) and Phone Number Data Storage Area H58*b*2 (FIG. 565)) (S6). The authentication process is completed (and the sequences described hereafter are enabled thereafter) if the password data and the phone number data described in S4 and S5 match with the data stored in Password Data Storage Area H58*b*1 and Phone Number Data Storage Area H58*b*2.

FIG. 576 illustrates Menu Introducing Software H58*c*2 (FIG. 568) stored in Communication Device Controlling Software Storage Area H58*c* of Host H, which introduces the menu on Personal Computer PC. As described in the present drawing, Host H retrieves Web Display Data#0 from Web Display Data Storage Area H58*b*3 (FIG. 566) (S1), and sends the data to Personal Computer PC (S2). Upon receiving Web Display Data#0 from Host H (S3), Personal Computer PC displays Web Display Data#0 on its display (S4). The user selects from one of the buttons of '1' through '6' wherein the sequences implemented thereafter are described in FIG. 577 through FIG. 583 (S5).

FIG. 577 illustrates Line Connecting Software H58*c*3 (FIG. 568) stored in Communication Device Controlling Software Storage Area H58*c* of Host H and Line Connecting Software 20658*c*3 (FIG. 574) stored in Communication Device Controlling Software Storage Area 20658*c* of Communication Device 200, which connect line between Host H and Communication Device 200. As described in the present drawing, Host H calls Communication Device 200 by retrieving the corresponding phone number data from Phone Number Data Storage Area H58*b*2 (FIG. 565) (S1). Upon Communication Device 200 receiving the call from Host H (S2), the line is connected therebetween (S3). For the avoidance of doubt, the line is connected between Host H and Communication Device 200 merely to implement the present function, and a voice communication between human beings is not enabled thereafter.

FIG. 578 illustrates Manner Mode Deactivating Software H58*c*4 (FIG. 568) stored in Communication Device Controlling Software Storage Area H58*c* of Host H and Manner Mode Deactivating Software 20658*c*4 (FIG. 574) stored in Communication Device Controlling Software Storage Area 20658*c* of Communication Device 200, which deactivate the manner mode of Communication Device 200. Here, Communication Device 200 activates Vibrator 217 (FIG. 1) when Communication Device 200 is in the manner mode and outputs a ringing sound from Speaker 216 (FIG. 1) when Communication Device 200 is not in the manner mode, upon receiving an incoming call. Assume that the user selects button '1' displayed on Personal Computer PC (S1). In response, Personal Computer PC sends the corresponding signal to Host H via the Internet (S2). Host H, upon receiving the signal described in S2, sends a manner mode deactivating command to Communication Device 200 (S3). Upon receiving the manner mode deactivating command from Host H (S4), Communication Device 200 deactivates the manner mode (S5). Host H retrieves Web Display Data#1 from Web Display Data Storage Area H58*b*3 (FIG. 566) and sends the data to Personal Computer PC (S6). Upon receiving Web Display Data#1 from Host H, Personal Computer PC displays the data (S7). Normally the purpose to output the ringing sound from Speaker 216 is to give a notification to the user that Communication Device 200 has received an incoming call, and a voice communication is enabled thereafter upon answering the call. In contrast, the purpose to output the ringing sound from Speaker 216 by executing Manner Mode Deactivating & Ringing Software H58*c*5 and Manner Mode Deactivating & Ringing Software 20658*c*5 is merely to let the user to identify the location of Communication Device 200. Therefore, a voice communication between human beings is not enabled thereafter.

FIG. 579 illustrates Manner Mode Deactivating & Ringing Software H58*c*5 (FIG. 568) stored in Communication Device Controlling Software Storage Area H58*c* of Host H and Manner Mode Deactivating & Ringing Software 20658*c*5 (FIG. 574) stored in Communication Device Controlling Software Storage Area 20658*c* of Communication Device 200, which deactivate the manner mode of Communication Device 200 and outputs a ringing sound thereafter. Assume that the user selects button '2' displayed on Personal Computer PC (S1). In response, Personal Computer PC sends the corresponding signal to Host H via the Internet (S2). Host H, upon receiving the signal described in S2, sends a manner mode deactivating & device ringing command to Communication Device 200 (S3). Upon receiving the manner mode deactivating & device ringing command from Host H (S4), Communication Device 200 deactivates the manner mode (S5) and outputs a ring data from Speaker 216 (S6). Host H retrieves Web Display Data#2 from Web Display Data Storage Area H58*b*3 (FIG. 566) and sends the data to Personal Computer PC (S7). Upon receiving Web Display Data#2 from Host H, Personal Computer PC displays the data (S8). Normally the purpose to output the ringing sound from Speaker 216 is to give a notification to the user that Communication Device 200 has received an incoming call, and a voice communication is enabled thereafter upon answering the call. In contrast, the purpose to output the ringing sound from Speaker 216 by executing Manner Mode Deactivating & Ringing Software H58*c*5 and Manner Mode Deactivating & Ringing Software 20658*c*5 is merely to let the user to identify the location of Communication Device 200. Therefore, a voice communication between human beings is not enabled thereafter by implementing the present function.

FIG. 580 illustrates Ringing Software H58*c*6 (FIG. 568) stored in Communication Device Controlling Software Storage Area H58*c* of Host H and Ringing Software 20658*c*6 (FIG. 574) stored in Communication Device Controlling Software Storage Area 20658*c* of Communication Device 200, which output a ringing sound from Speaker 216 (FIG. 1). Assume that the user selects button '3' displayed on Personal Computer PC (S1). In response, Personal Computer PC sends the corresponding signal to Host H via the Internet (S2). Host H, upon receiving the signal described in S2, sends a device ringing command to Communication Device 200 (S3). Upon receiving the device ringing command from Host H (S4), Communication Device 200 outputs a ring data from Speaker 216 (S5). Host H retrieves Web Display Data#3 from Web Display Data Storage Area H58*b*3 (FIG. 566) and sends the data to Personal Computer PC (S6). Upon receiving Web Display Data#3 from Host H, Personal Computer PC displays the data (S7). Normally the purpose to output the ringing sound from Speaker 216 is to give a notification to the user that Communication Device 200 has received an incoming call, and a voice communication is enabled thereafter upon answering the call. In contrast, the purpose to output the ringing sound from Speaker 216 by executing Ringing Software H58*c*6 and Ringing Software 20658*c*6 is merely to let the user to identify the location of Communication Device 200. Therefore, a voice communication between human beings is not enabled thereafter by implementing the present function.

FIG. 581 illustrates Password Changing Software H58*c*7 (FIG. 568) stored in Communication Device Controlling Software Storage Area H58*c* of Host H and Password Changing Software 20658*c*7 (FIG. 574) stored in Communication Device Controlling Software Storage Area 20658*c* of Communication Device 200, which change the password necessary to operate Communication Device 200. Assume that the user selects button '4' displayed on Personal Computer PC (S1). In response, Personal Computer PC sends the corresponding signal to Host H via the Internet (S2). The user then enters a new password data by utilizing Personal Computer PC (S3), which is sent to Communication Device 200 by Host H (S4). Upon receiving the new password data from Host H (S5), Communication Device 200 stores the new password data in Password Data Storage Area 20658*b*1 (FIG. 572) and the old password data is erased (S6). Host H retrieves Web Display Data#4 from Web Display Data Storage Area H58*b*3 (FIG. 566) and sends the data to Personal Computer PC (S7). Upon receiving Web Display Data#4 from Host H, Personal Computer PC displays the data (S8).

FIG. 582 illustrates Device Locking Software H58*c*8 (FIG. 568) stored in Communication Device Controlling Software Storage Area H58*c* of Host H and Device Locking Software 20658*c*8 (FIG. 574) stored in Communication Device Controlling Software Storage Area 20658*c* of Communication Device 200, which lock Communication Device 200, i.e., nullify any input signal input via Input Device 210 (FIG. 1). Assume that the user selects button '5' displayed on Personal Computer PC (S1). In response, Personal Computer PC sends the corresponding signal to Host H via the Internet (S2). Host H, upon receiving the signal described in S2, sends a device locking command to Communication Device 200 (S3). Upon receiving the device locking command from Host H (S4), Communication Device 200 is locked thereafter, i.e., any input via Input Device 210 is nullified unless a password data matching to the one stored in Password Data Storage Area 20658*b*1 (FIG. 572) is entered (S5). Host H retrieves Web Display Data#5 from Web Display Data Storage Area H58*b*3 (FIG. 566) and sends the data to Personal Computer PC (S6). Upon receiving Web Display Data#5 from Host H, Personal Computer PC displays the data (S7).

FIG. 583 illustrates Power Off Software H58*c*9 (FIG. 568) stored in Communication Device Controlling Software Storage Area H58*c* of Host H and Power Off Software 20658*c*9 (FIG. 574) stored in Communication Device Controlling Software Storage Area 20658*c* of Communication Device 200, which turn off the power of Communication Device 200. Assume that the user selects button '6' displayed on Personal Computer PC (S1). In response, Personal Computer PC sends the corresponding signal to Host H via the Internet (S2). Host H, upon receiving the signal described in S2, sends a power off command to Communication Device 200 (S3). Upon receiving the power off command from Host H (S4), Communication Device 200 turns off the power of itself (S5). Host H retrieves Web Display Data#6 from Web Display Data Storage Area H58*b*3 (FIG. 566) and sends the data to Personal Computer PC (S6). Upon receiving Web Display Data#6 from Host H, Personal Computer PC displays the data (S7).

<<Shortcut Icon Displaying Function>>

FIG. 584 through FIG. 601 illustrate the shortcut icon displaying function which displays one or more of shortcut icons on LCD 201 (FIG. 1) of Communication Device 200. The user of Communication Device 200 can execute the software programs in a convenient manner by selecting (e.g., clicking or double clicking) the shortcut icons. The foregoing software programs may be any software programs described in this specification.

FIG. 584 illustrates the shortcut icons displayed on LCD 201 (FIG. 1) of Communication Device 200 by implementing the present function. Referring to the present drawing, three shortcut icons are displayed on LCD 201 (FIG. 1), i.e., Shortcut Icon#1, Shortcut Icon#2, and Shortcut Icon#3. The user of Communication Device 200 can execute the software programs by selecting (e.g., clicking or double clicking) one of the shortcut icons. For example, assume that Shortcut Icon#1 represents MS Word 97. By selecting (e.g., clicking or double clicking) Shortcut Icon#1, the user can execute MS Word 97 installed in Communication Device 200 or Host H. Three shortcut icons are illustrated in the present drawing, however, only for purposes of simplifying the explanation of the present function. Therefore, as many shortcut icons equivalent to the number of the software programs described in this specification may be displayed on LCD 201, and the corresponding software programs may be executed by implementing the present function.

FIG. 585 illustrates the storage area included in RAM 206 (FIG. 1). As described in the present drawing, RAM 206 includes Shortcut Icon Displaying Information Storage Area 20659*a* of which the data and the software programs stored therein are described in FIG. 586.

FIG. 586 illustrates the storage areas included in Shortcut Icon Displaying Information Storage Area 20659*a* (FIG. 585). As described in the present drawing, Shortcut Icon Displaying Information Storage Area 20659*a* includes Shortcut Icon Displaying Data Storage Area 20659*b* and Shortcut Icon Displaying Software Storage Area 20659*c*. Shortcut Icon Displaying Data Storage Area 20659*b* stores the data necessary to implement the present function, such as the ones described in FIG. 587. Shortcut Icon Displaying Software Storage Area 20659*c* stores the software programs necessary to implement the present function, such as the ones described in FIG. 592.

The data and/or the software programs stored in Shortcut Icon Displaying Software Storage Area 20659*c* (FIG. 586) may be downloaded from Host H.

FIG. 587 illustrates the storage areas included in Shortcut Icon Displaying Data Storage Area 20659*b* (FIG. 586). As described in the present drawing, Shortcut Icon Displaying Data Storage Area 20659*b* includes Shortcut Icon Image Data Storage Area 20659*b*1, Shortcut Icon Location Data Storage Area 20659*b*2, Shortcut Icon Link Data Storage Area 20659*b*3, and Selected Shortcut Icon Data Storage Area 20659*b*4. Shortcut Icon Image Data Storage Area 20659*b*1 stores the data described in FIG. 588. Shortcut Icon Location Data Storage Area 20659*b*2 stores the data described in FIG. 589. Shortcut Icon Link Data Storage Area 20659*b*3 stores the data described in FIG. 590. Selected Shortcut Icon Data Storage Area 20659*b*4 stores the data described in FIG. 591.

FIG. 588 illustrates the data stored in Shortcut Icon Image Data Storage Area 20659*b*1 (FIG. 587). As described in the present drawing, Shortcut Icon Image Data Storage Area 20659*b*1 comprises two columns, i.e., 'Shortcut Icon ID' and 'Shortcut Icon Image Data'. Column 'Shortcut Icon ID' stores the shortcut icon IDs, and each shortcut icon ID is the identification of the corresponding shortcut icon image data stored in column 'Shortcut Icon Image Data'. Column 'Shortcut Icon Image Data' stores the shortcut icon image data, and each shortcut icon image data is the image data of the shortcut icon displayed on LCD 201 (FIG. 1) as described in FIG. 584. In the example described in the present drawing, Shortcut Icon Image Data Storage Area 20659*b*1 stores the following data: the shortcut icon ID 'Shortcut Icon#1' and the corresponding shortcut icon image data 'Shortcut Icon Image Data#1'; the shortcut icon ID 'Shortcut Icon#2' and the corresponding shortcut icon image data 'Shortcut Icon Image Data#2'; the shortcut icon ID 'Shortcut Icon#3' and the corresponding shortcut icon image data 'Shortcut Icon Image Data#3'; and the shortcut icon ID 'Shortcut Icon#4' and the corresponding shortcut icon image data 'Shortcut Icon Image Data#4'.

FIG. 589 illustrates the data stored in Shortcut Icon Location Data Storage Area 20659*b*2 (FIG. 587). As described in the present drawing, Shortcut Icon Location Data Storage Area 20659*b*2 comprises two columns, i.e., 'Shortcut Icon ID' and 'Shortcut Icon Location Data'. Column 'Shortcut Icon ID' stores the shortcut icon IDs described hereinbefore. Column 'Shortcut Icon Location Data' stores the shortcut icon location data, and each shortcut icon location data indicates the location displayed on LCD 201 (FIG. 1) in (x,y) format of the shortcut icon image data of the corresponding shortcut icon ID. In the example described in the present drawing, Shortcut Icon Location Data Storage Area 20659*b*2 stores the following data: the shortcut icon ID 'Shortcut Icon#1' and the corresponding shortcut icon location data 'Shortcut Icon Location Data#1'; the shortcut icon ID 'Shortcut Icon#2' and the corresponding shortcut icon location data 'Shortcut Icon Location Data#2'; the shortcut icon ID 'Shortcut Icon#3' and the corresponding shortcut icon location data 'Shortcut Icon Location Data#3'; and the shortcut icon ID 'Shortcut Icon#4' and the corresponding shortcut icon location data 'Shortcut Icon Location Data#4'.

FIG. 590 illustrates the data stored in Shortcut Icon Link Data Storage Area 20659*b*3 (FIG. 587). As described in the present drawing, Shortcut Icon Link Data Storage Area 20659*b*3 comprises two columns, i.e., 'Shortcut Icon ID' and 'Shortcut Icon Link Data'. Column 'Shortcut Icon ID' stores the shortcut icon IDs described hereinbefore. Column 'Shortcut Icon Link Data' stores the shortcut icon link data, and each shortcut icon link data represents the location in Communication Device 200 of the software program stored therein represented by the shortcut icon of the corresponding shortcut icon ID. In the example described in the present drawing, Shortcut Icon Link Data Storage Area 20659*b*3 stores the following data: the shortcut icon ID 'Shortcut Icon#1' and the corresponding shortcut icon link data 'Shortcut Icon Link Data#1'; the shortcut icon ID 'Shortcut Icon#2' and the corresponding shortcut icon link data 'Shortcut Icon Link Data#2'; the shortcut icon ID 'Shortcut Icon#3' and the corresponding shortcut icon link data 'Shortcut Icon Link Data#3'; and the shortcut icon ID 'Shortcut Icon#4' and the corresponding shortcut icon link data 'Shortcut Icon Link Data#4'. The foregoing software program may be any software program described in this specification.

FIG. 591 illustrates the data stored in Selected Shortcut Icon Data Storage Area 20659*b*4 (FIG. 587). As described in the present drawing, Selected Shortcut Icon Data Storage Area 20659*b*4 stores one or more of shortcut icon IDs. Only the shortcut icon image data of the shortcut icon IDs stored in Selected Shortcut Icon Data Storage Area 20659*b*4 are displayed on LCD 201 (FIG. 1). In the example described in the present drawing, Selected Shortcut Icon Data Storage Area **20659*b*4 stores the following data: the shortcut icon IDs 'Shortcut Icon#1', 'Shortcut Icon#2', and 'Shortcut Icon#3', which means that only the shortcut icon image data corresponding to 'Shortcut Icon#1', 'Shortcut Icon#2', and 'Shortcut Icon#3' are displayed on LCD 201**.

FIG. 592 illustrates the software programs stored in Shortcut Icon Displaying Software Storage Area **20659*c* (FIG. 586). As described in the present drawing, Shortcut Icon Displaying Software Storage Area 20659*c* stores Shortcut Icon Displaying Software 20659*c*1, Software Executing Software 20659*c*2, Shortcut Icon Location Data Changing Software 20659*c*3, and Software Executing Software 20659*c*4. Shortcut Icon Displaying Software 20659*c*1 is the software program described in FIG. 593. Software Executing Software 20659*c*2 is the software program described in FIG. 594. Shortcut Icon Location Data Changing Software 20659*c*3 is the software program described in FIG. 595. Software Executing Software 20659*c*4 is the software program described in FIG. 601**.

FIG. 593 illustrates Shortcut Icon Displaying Software **20659*c*1 stored in Shortcut Icon Displaying Software Storage Area 20659*c* of Communication Device 200, which displays the shortcut icon image data displayed on LCD 201 (FIG. 1) of Communication Device 200. Referring to the present drawing, CPU 211 (FIG. 1) refers to the shortcut icon IDs stored in Selected Shortcut Icon Data Storage Area 20659*b*4 (FIG. 591) to identify the shortcut icon image data to be displayed on LCD 201 (FIG. 1) (S1). CPU 211 then retrieves the shortcut icon image data of the corresponding shortcut icon IDs identified in S1 from Shortcut Icon Image Data Storage Area 20659*b*1 (FIG. 588) (S2). CPU 211 further retrieves the shortcut icon location data of the corresponding shortcut icon IDs identified in S1 from Shortcut Icon Location Data Storage Area 20659*b*2 (FIG. 589) (S3). CPU 211 displays on LCD 201 (FIG. 1) the shortcut icon image data thereafter (S4**).

FIG. 594 illustrates Software Executing Software **20659*c*2 stored in Shortcut Icon Displaying Software Storage Area 20659*c* of Communication Device 200, which executes the corresponding software program upon selecting the shortcut icon image data displayed on LCD 201 (FIG. 1) of Communication Device 200. Referring to the present drawing, the user of Communication Device 200 selects the shortcut icon image data displayed on LCD 201 by utilizing Input Device 210 (FIG. 1) or via voice recognition system (S1). CPU 211 (FIG. 1) then identifies the shortcut icon ID of the shortcut icon image data selected in S1 (S2). CPU 211 identifies the shortcut icon link data stored in Shortcut Icon Link Data Storage Area 20659*b*3 (FIG. 590) from the shortcut icon ID identified in S2 (S3), and executes the corresponding software program (S4**).

FIG. 595 illustrates Shortcut Icon Location Data Changing Software **20659*c*3 stored in Shortcut Icon Displaying Software Storage Area 20659*c* of Communication Device 200, which enables the user of Communication Device 200 to change the location of the shortcut icon image data displayed on LCD 201 (FIG. 1). Referring to the present drawing, the user of Communication Device 200 selects the shortcut icon image data displayed on LCD 201 (S1). CPU 211 (FIG. 1) then identifies the shortcut icon ID of the shortcut icon image data selected in S1 (S2). The user moves the shortcut icon selected in S1 by utilizing Input Device 210 (FIG. 1) or via voice recognition system (S3). CPU 211 then identifies the new location thereof (S4), and updates the shortcut icon location data stored in Shortcut Icon Location Data Storage Area 20659*b*2 (FIG. 589) (S5**).

<<Shortcut Icon Displaying Function—Executing Software in Host H>>

FIG. 596 through FIG. 601 illustrate the implementation of the present invention wherein the user of Communication Device 200 executes the software programs stored in Host H by selecting the shortcut icons displayed on LCD 201 (FIG. 1).

FIG. 596 illustrates the storage areas included in Host H. As described in the present drawing, Host H includes Shortcut Icon Displaying Information Storage Area H**59*a* of which the data and the software programs stored therein are described in FIG. 597**.

FIG. 597 illustrates the storage areas included in Shortcut Icon Displaying Information Storage Area H**59*a* (FIG. 596). As described in the present drawing, Shortcut Icon Displaying Information Storage Area H59*a* includes Shortcut Icon Displaying Data Storage Area H59*b* and Shortcut Icon Displaying Software Storage Area H59*c*. Shortcut Icon Displaying Data Storage Area H59*b* stores the data necessary to implement the present function on the side of Host H, such as the ones described in FIG. 598 and FIG. 599. Shortcut Icon Displaying Software Storage Area H59*c* stores the software programs necessary to implement the present function on the side of Host H, such as the ones described in FIG. 600**.

FIG. 598 illustrates the storage area included in Shortcut Icon Displaying Data Storage Area H**59*b* (FIG. 597). As described in the present drawing, Shortcut Icon Displaying Data Storage Area H59*b* includes Software Programs Storage Area H59*b*1. Software Programs Storage Area H59*b*1 stores the data described in FIG. 599**.

FIG. 599 illustrates the data stored in Software Programs Storage Area H**59*b*1 (FIG. 598). As described in the present drawing, Software Programs Storage Area H59*b*1 comprises two columns, i.e., 'Software ID' and 'Software Program'. Column 'Software ID' stores the software IDs, and each software ID is an identification of the software program stored in column 'Software Program'. Column 'Software Program' stores the software programs. In the example described in the present drawing, Software Programs Storage Area H59*b*1 stores the following data: software ID 'Software#3' and the corresponding software program 'Software Program#3'; software ID 'Software#4' and the corresponding software program 'Software Program#4'; software ID 'Software#5' and the corresponding software program 'Software Program#5'; and software ID 'Software#6' and the corresponding software program 'Software Program#6'. Here, the software programs may be any software programs which are stored in Host H described in this specification. As another embodiment, the software programs may be any software programs stored in RAM 206 (FIG. 1) of Communication Device 200** described in this specification.

FIG. 600 illustrates the software program stored in Shortcut Icon Displaying Software Storage Area H**59*c* (FIG. 597). As described in the present drawing, Shortcut Icon Displaying Software Storage Area H59*c* stores Software Executing Software H59*c*4. Software Executing Software H59*c*4 is the software program described in FIG. 601**.

FIG. 601 illustrates Software Executing Software H**59*c*4 stored in Shortcut Icon Displaying Software Storage Area H59*c* (FIG. 600) of Host H and Software Executing Software 20659*c*4 stored in Shortcut Icon Displaying Software Storage Area 20659*c* (FIG. 592) of Communication Device 200, which execute the corresponding software program upon selecting the shortcut icon image data displayed on LCD 201 (FIG. 1) of Communication Device 200. Referring to the present drawing, the user of Communication Device 200 selects the shortcut icon image data displayed on LCD 201 by utilizing Input Device 210 (FIG. 1) or via voice recognition system (S1). CPU 211 (FIG. 1) then identifies the shortcut icon ID of the shortcut icon image data selected in S1 (S2). CPU 211 identifies the shortcut icon link data stored in Shortcut Icon Link Data Storage Area 20659*b*3 (FIG. 590) from the shortcut icon ID identified in S2 (S3), which is sent to Host H (S4). Upon receiving the shortcut icon link data from Communication Device 200 (S5), Host H executes the corresponding software program (S6) and produces the relevant display data, which are send to Communication Device 200 (S7). Upon receiving the relevant display data from Host H, Communication Device 200 displays the data on LCD 201 (S8**).

<<Task Tray Icon Displaying Function>>

FIG. 602 through FIG. 616 illustrate the task tray icon displaying function which displays one or more of task tray icons on LCD 201 (FIG. 1) of Communication Device 200. The user of Communication Device 200 can identify the software programs executed in background in a convenient manner. The foregoing software programs may be any software programs described in this specification.

FIG. 602 illustrates the task tray icons displayed on LCD 201 (FIG. 1) of Communication Device 200 by implementing the present function. Referring to the present drawing, Display Area 20160DA includes Task Tray Icons Display Area 20660DA1 which is displayed at the lower right portion of LCD 201. Three task tray icons are displayed Task Tray Icons Display Area 20660DA1, i.e., Task Tray Icon#1, Task Tray Icon#2, and Task Tray Icon#3, by which the user of Communication Device 200 can identify the software programs executed in background in a convenient manner, i.e., by observing Task Tray Icons Display Area 20660DA1. Three task tray icons are illustrated in the present drawing, however, only for purposes of simplifying the explanation of the present function. Therefore, as many task tray icons equivalent to the number of the software programs described in this specification may be displayed in Task Tray Icons Display Area 20660DA1, and the corresponding software programs executed in background by implementing the present function.

FIG. 603 illustrates the storage area included in RAM 206 (FIG. 1). As described in the present drawing, RAM 206 includes Task Tray Icon Displaying Information Storage Area **20660*a* of which the data and the software programs stored therein are described in FIG. 604**.

FIG. 604 illustrates the storage areas included in Task Tray Icon Displaying Information Storage Area **20660*a* (FIG. 603). As described in the present drawing, Task Tray Icon Displaying Information Storage Area 20660*a* includes Task Tray Icon Displaying Data Storage Area 20660*b* and Task Tray Icon Displaying Software Storage Area 20660*c*. Task Tray Icon Displaying Data Storage Area 20660*b* stores the data necessary to implement the present function, such as the ones described in FIG. 605. Task Tray Icon Displaying Software Storage Area 20660*c* stores the software programs necessary to implement the present function, such as the ones described in FIG. 609**.

FIG. 605 illustrates the storage areas included in Task Tray Icon Displaying Data Storage Area **20660*b* (FIG. 604). As described in the present drawing, Task Tray Icon Displaying Data Storage Area 20660*b* includes Task Tray Icon Image Data Storage Area 20660*b*1, Task Tray Icon Link Data Storage Area 20660*b*3, and Selected Task Tray Icon Data Storage Area 20660*b*4. Task Tray Icon Image Data Storage Area 20660*b*1 stores the data described in FIG. 606. Task Tray Icon Link Data Storage Area 20660*b*3 stores the data described in FIG. 607. Selected Task Tray Icon Data Storage Area 20660*b*4 stores the data described in FIG. 608**.

FIG. 606 illustrates the data stored in Task Tray Icon Image Data Storage Area **20660*b*1 (FIG. 605). As described in the present drawing, Task Tray Icon Image Data Storage Area 20660*b*1 comprises two columns, i.e., 'Task Tray Icon ID' and 'Task Tray Icon Image Data'. Column 'Task Tray Icon ID' stores the task tray icon IDs, and each task tray icon ID is the identification of the corresponding task tray icon image data stored in column 'Task Tray Icon Image Data'. Column 'Task Tray Icon Image Data' stores the task tray icon image data, and each task tray icon image data is the image data of the task tray icon displayed on LCD 201 (FIG. 1) as described in FIG. 602. In the example described in the present drawing, Task Tray Icon Image Data Storage Area 20660*b*1 stores the following data: the task tray icon ID 'Task Tray Icon#1' and the corresponding task tray icon image data 'Task Tray Icon Image Data#1'; the task tray icon ID 'Task Tray Icon#2' and the corresponding task tray icon image data 'Task Tray Icon Image Data#2'; the task tray icon ID 'Task Tray Icon#3' and the corresponding task tray icon image data 'Task Tray Icon Image Data#3'; and the task tray icon ID 'Task Tray Icon#4' and the corresponding task tray icon image data 'Task Tray Icon Image Data#4**'.

FIG. 607 illustrates the data stored in Task Tray Icon Link Data Storage Area **20660*b*3 (FIG. 605). As described in the present drawing, Task Tray Icon Link Data Storage Area 20660*b*3 comprises two columns, i.e., 'Task Tray Icon ID' and 'Task Tray Icon Link Data'. Column 'Task Tray Icon ID' stores the task tray icon IDs described hereinbefore. Column 'Task Tray Icon Link Data' stores the task tray icon link data, and each task tray icon link data represents the location in Communication Device 200 of the software program stored therein represented by the task tray icon of the corresponding task tray icon ID. In the example described in the present drawing, Task Tray Icon Link Data Storage Area 20660*b*3 stores the following data: the task tray icon ID 'Task Tray Icon#1' and the corresponding task tray icon link data 'Task Tray Icon Link Data#1'; the task tray icon ID 'Task Tray Icon#2' and the corresponding task tray icon link data 'Task Tray Icon Link Data#2'; the task tray icon ID 'Task Tray Icon#3' and the corresponding task tray icon link data 'Task Tray Icon Link Data#3'; and the task tray icon ID 'Task Tray Icon#4' and the corresponding task tray icon link data 'Task Tray Icon Link Data#4**'. The foregoing software programs may be of any software programs described in this specification.

FIG. 608 illustrates the data stored in Selected Task Tray Icon Data Storage Area **20660*b*4 (FIG. 605). As described in the present drawing, Selected Task Tray Icon Data Storage Area 20660*b*4 stores one or more of task tray icon IDs. Only the task tray icon image data of the task tray icon IDs stored in Selected Task Tray Icon Data Storage Area 20660*b*4 are displayed in Task Tray Icons Display Area 20660DA1 (FIG. 602). In the example described in the present drawing, Selected Task Tray Icon Data Storage Area 20660*b*4 stores the following data: the task tray icon IDs 'Task Tray Icon#1', 'Task Tray Icon#2', and 'Task Tray Icon#3', which means that only the task tray icon image data corresponding to 'Task Tray Icon#1', 'Task Tray Icon#2', and 'Task Tray Icon#3' are displayed in Task Tray Icons Display Area 20660DA1**.

FIG. 609 illustrates the software programs stored in Task Tray Icon Displaying Software Storage Area **20660*c* (FIG. 604). As described in the present drawing, Task Tray Icon Displaying Software Storage Area 20660*c* stores Software Executing Software 20660*c*2 and Software Executing Software 20660*c*4. Software Executing Software 20660*c*2 is the software program described in FIG. 610. Software Executing Software 20660*c*4 is the software program described in FIG. 616**.

FIG. 610 illustrates Software Executing Software 20660*c*2 stored in Task Tray Icon Displaying Software Storage Area 20660*c* of Communication Device 200, which executes the corresponding software program in background and displays the corresponding task tray icon image data on LCD 201 (FIG. 1) of Communication Device 200. Referring to the present drawing, CPU 211 (FIG. 1) refers to Selected Task Tray Icon Data Storage Area 20660*b*4 (FIG. 608) (S1) to identify the task tray IDs stored therein (S2). CPU 211 identifies the task tray icon link data stored in Task Tray Icon Link Data Storage Area 20660*b*3 (FIG. 607) of the corresponding task tray icon IDs identified in S2 (S3), and executes the corresponding software program (S4). CPU 211 then retrieves the task tray icon image data of the corresponding task tray icon IDs identified in S2 from Task Tray Icon Image Data Storage Area 20660*b*1 (FIG. 606) (S5). CPU 211 displays the task tray icon image data in Task Tray Icons Display Area 20660DA1 (FIG. 602) thereafter (S6).

<<Task Tray Icon Displaying Function—Executing Software in Host H>>

FIG. 611 through FIG. 616 illustrate the implementation of the present invention wherein the software programs stored in Host H are executed.

FIG. 611 illustrates the storage areas included in Host H. As described in the present drawing, Host H includes Task Tray Icon Displaying Information Storage Area H60*a* of which the data and the software programs stored therein are described in FIG. 612.

FIG. 612 illustrates the storage areas included in Task Tray Icon Displaying Information Storage Area H60*a* (FIG. 611). As described in the present drawing, Task Tray Icon Displaying Information Storage Area H60*a* includes Task Tray Icon Displaying Data Storage Area H60*b* and Task Tray Icon Displaying Software Storage Area H60*c*. Task Tray Icon Displaying Data Storage Area H60*b* stores the data necessary to implement the present function on the side of Host H, such as the ones described in FIG. 613 and FIG. 614. Task Tray Icon Displaying Software Storage Area H60*c* stores the software programs necessary to implement the present function on the side of Host H, such as the ones described in FIG. 615.

FIG. 613 illustrates the storage area included in Task Tray Icon Displaying Data Storage Area H60*b* (FIG. 612). As described in the present drawing, Task Tray Icon Displaying Data Storage Area H60*b* includes Software Programs Storage Area H60*b*1. Software Programs Storage Area H60*b*1 stores the data described in FIG. 614.

FIG. 614 illustrates the data stored in Software Programs Storage Area H60*b*1 (FIG. 613). As described in the present drawing, Software Programs Storage Area H60*b*1 comprises two columns, i.e., 'Software ID' and 'Software Program'. Column 'Software ID' stores the software IDs, and each software ID is an identification of the software program stored in column 'Software Program'. Column 'Software Program' stores the software programs. In the example described in the present drawing, Software Programs Storage Area H60*b*1 stores the following data: software ID 'Software#3' and the corresponding software program 'Software Program#3'; software ID 'Software#4' and the corresponding software program 'Software Program#4'; software ID 'Software#5' and the corresponding software program 'Software Program#5'; and software ID 'Software#6' and the corresponding software program 'Software Program#6'. Here, the software programs may be any software programs which are stored in Host H described in this specification. As another embodiment, the software programs may be any software programs stored in RAM 206 (FIG. 1) of Communication Device 200 described in this specification.

FIG. 615 illustrates the software program stored in Task Tray Icon Displaying Software Storage Area H60*c* (FIG. 612). As described in the present drawing, Task Tray Icon Displaying Software Storage Area H60*c* stores Software Executing Software H60*c*4. Software Executing Software H60*c*4 is the software program described in FIG. 616.

FIG. 616 illustrates Software Executing Software H60*c*4 stored in Task Tray Icon Displaying Software Storage Area H60*c* (FIG. 615) of Host H and Software Executing Software 20660*c*4 stored in Task Tray Icon Displaying Software Storage Area 20660*c* (FIG. 609) of Communication Device 200, which execute the corresponding software program in background and displays the corresponding task tray icon image data on LCD 201 (FIG. 1) of Communication Device 200. Referring to the present drawing, CPU 211 (FIG. 1) of Communication Device 200 refers to Selected Task Tray Icon Data Storage Area 20660*b*4 (FIG. 608) (S1) to identify the task tray IDs stored therein (S2). CPU 211 identifies the task tray icon link data stored in Task Tray Icon Link Data Storage Area 20660*b*3 (FIG. 607) of the corresponding task tray icon IDs identified in S2 (S3), which is sent to Host H (S4). Upon receiving the task tray icon link data from Communication Device 200 (S5), Host H executes the corresponding software program (S6). CPU 211 then retrieves the task tray icon image data of the corresponding task tray icon IDs identified in S2 from Task Tray Icon Image Data Storage Area 20660*b*1 (FIG. 606) (S7). CPU 211 displays the task tray icon image data in Task Tray Icons Display Area 20660DA1 (FIG. 602) thereafter (S6).

<<Multiple Channel Processing Function>>

FIG. 617 through FIG. 645 illustrates the multiple channel processing function which enables Communication Device 200 to send and receive a large amount of data in a short period of time by increasing the upload and download speed.

FIG. 617 illustrates the storage area included in Host H. As described in the present drawing, Host H includes Multiple Channel Processing Information Storage Area H61*a* of which the data and the software programs stored therein are described in FIG. 618. Here, Host H is a base station which communicates with Communication Device 200 in a wireless fashion.

FIG. 618 illustrates the storage areas included in Multiple Channel Processing Information Storage Area H61*a* (FIG. 617). As described in the present drawing, Multiple Channel Processing Information Storage Area H61*a* includes Multiple Channel Processing Data Storage Area H61*b* and Multiple Channel Processing Software Storage Area H61*c*. Multiple Channel Processing Data Storage Area H61*b* stores the data necessary to implement the present function on the side of Host H, such as the ones described in FIG. 619 through FIG. 624. Multiple Channel Processing Software Storage Area H61*c* stores the software programs necessary to implement the present function on the side of Host H, such as the ones described in FIG. 625.

FIG. 619 illustrates the storage areas included in Multiple Channel Processing Data Storage Area H61*b* (FIG. 618). As described in the present drawing, Multiple Channel Processing Data Storage Area H61*b* includes User Data Storage Area H61*b*1, Channel Number Storage Area H61*b*2, and Signal Type Data Storage Area H61*b*3. User Data Storage Area H61*b*1 stores the data described in FIG. 620. Channel Number Storage Area H61*b*2 stores the data described in FIG. 621 and FIG. 622. Signal Type Data Storage Area H61*b*3 stores the data described in FIG. 623 and FIG. 624.

FIG. 620 illustrates the data stored in User Data Storage Area H61*b*1 (FIG. 619). As described in the present drawing, User Data Storage Area H61*b*1 comprises two columns, i.e., 'User ID' and 'User Data'. Column 'User ID' stores the user IDs, and each user ID in an identification of the user of Communication Device 200. Column 'User Data' stores the user data, and each user data represents the personal data of the user of the corresponding user ID, such as name, home address, office address, phone number, email address, fax number, age, sex, credit card number of the user of the corresponding user ID. In the example described in the present drawing, User Data Storage Area H61*b*1 stores the following data: the user ID 'User#1' and the corresponding user data 'User Data#1'; the user ID 'User#2' and the corresponding user data 'User Data#2'; the user ID 'User#3' and the corresponding user data 'User Data#3'; and the user ID 'User#4' and the corresponding user data 'User Data#4'.

FIG. 621 illustrates the data stored in Channel Number Storage Area H61*b*2 (FIG. 619). As described in the present drawing, Channel Number Storage Area H61*b*2 comprises two columns, i.e., 'Channel ID' and 'User ID'. Column 'Channel ID' stores the channel IDs, and each channel ID is an identification of the channel which is assigned to each Communication Device 200 and through which Host H and Communication Device 200 send and receive data. Normally one channel ID is assigned to one user ID. Column 'User ID' stores the user IDs described hereinbefore. In the example described in the present drawing, Channel Number Storage Area H61*b*2 stores the following data: the channel ID 'Channel#1' and the user ID 'User#1'; the channel ID 'Channel#2' with no corresponding user ID stored; the channel ID 'Channel#3' and the user ID 'User#3'; and the channel ID 'Channel#4' and the user ID 'User#4'. Here, the foregoing data indicates that, to communicate with Host H, the channel ID 'Channel#1' is utilized by Communication Device 200 represented by the user ID 'User#1'; the channel ID 'Channel#2' is not utilized by any Communication Device 200 (i.e., vacant); the channel ID 'Channel#3' is utilized by Communication Device 200 represented by the user ID 'User#3'; and the channel ID 'Channel#4' is utilized by Communication Device 200 represented by the user ID 'User#4'.

FIG. 622 illustrates another example of the data stored in Channel Number Storage Area H61*b*2 (FIG. 621). As described in the present drawing, Channel Number Storage Area H61*b*2 comprises two columns, i.e., 'Channel ID' and 'User ID'. Column 'Channel ID' stores the channel IDs described hereinbefore. Column 'User ID' stores the user IDs described hereinbefore. In the example described in the present drawing, Channel Number Storage Area H61*b*2 stores the following data: the channel ID 'Channel#1' and the user ID 'User#1'; the channel ID 'Channel#2' and the user ID 'User#1'; the channel ID 'Channel#3' and the user ID 'User#3'; and the channel ID 'Channel#4' and the user ID 'User#4'. Here, the foregoing data indicates that, to communicate with Host H, the channel ID 'Channel#1' is utilized by Communication Device 200 represented by the user ID 'User#1'; the channel ID 'Channel#2' is also utilized by Communication Device 200 represented by the user ID 'User#1'; the channel ID 'Channel#3' is utilized by Communication Device 200 represented by the user ID 'User#3'; and the channel ID 'Channel#4' is utilized by Communication Device 200 represented by the user ID 'User#4'. In sum, the foregoing data indicates that two channel IDs, i.e., 'Channel#1' and 'Channel#2' are utilized by one Communication Device 200 represented by the user ID 'User#1'.

FIG. 623 illustrates the data stored in Signal Type Data Storage Area H61*b*3 (FIG. 619). As described in the present drawing, Signal Type Data Storage Area H61*b*3 comprises two columns, i.e., 'Channel ID' and 'Signal Type Data'. Column 'Channel ID' stores the channel IDs described hereinbefore. Column 'Signal Type Data' stores the signal type data, and each signal type data indicates the type of signal utilized for the channel represented by the corresponding channel ID. In the example described in the present drawing, Signal Type Data Storage Area H61*b*3 stores the following data: the channel ID 'Channel#1' and the corresponding signal type data 'cdma2000'; the channel ID 'Channel#2' and the corresponding signal type data 'cdma2000'; the channel ID 'Channel#3' and the corresponding signal type data 'W-CDMA'; and the channel ID 'Channel#4' and the corresponding signal type data 'cdma2000'. The foregoing data indicates that the channel identified by the channel ID 'Channel#1' is assigned to the signal type data 'cdma2000'; the channel identified by the channel ID 'Channel#2' is assigned to the signal type data 'cdma2000'; the channel identified by the channel ID 'Channel#3' is assigned to the signal type data 'W-CDMA'; and the channel identified by the channel ID 'Channel#4' is assigned to the signal type data 'cdma2000'. Assuming that Communication Device 200 represented by the user ID 'User#1' utilizes the channels represented by the channel ID 'Channel#1' and 'Channel#2' as described in FIG. 622. In the example described in the present drawing, Communication Device 200 represented by the user ID 'User#1' utilizes the signal type data 'cdma2000' for the channels represented by the channel ID 'Channel#1' and 'Channel#2' for communicating with Host H.

FIG. 624 illustrates another example of the data stored in Signal Type Data Storage Area H61*b*3 (FIG. 619). As described in the present drawing, Signal Type Data Storage Area H61*b*3 comprises two columns, i.e., 'Channel ID' and 'Signal Type Data'. Column 'Channel ID' stores the channel IDs described hereinbefore. Column 'Signal Type Data' stores the signal type data, and each signal type data indicates the type of signal utilized for the channel represented by the corresponding channel ID. In the example described in the present drawing, Signal Type Data Storage Area H61*b*3 stores the following data: the channel ID 'Channel#1' and the corresponding signal type data 'cdma2000'; the channel ID 'Channel#2' and the corresponding signal type data 'W-CDMA'; the channel ID 'Channel#3' and the corresponding signal type data 'W-CDMA'; and the channel ID 'Channel#4' and the corresponding signal type data 'cdma2000'. The foregoing data indicates that the channel identified by the channel ID 'Channel#1' is assigned to the signal type data 'cdma2000'; the channel identified by the channel ID 'Channel#2' is assigned to the signal type data 'W-CDMA'; the channel identified by the channel ID 'Channel#3' is assigned to the signal type data 'W-CDMA'; and the channel identified by the channel ID 'Channel#4' is assigned to the signal type data 'cdma2000'. Assuming that Communication Device 200 represented by the user ID 'User#1' utilizes the channels represented by the channel ID 'Channel#1' and 'Channel#2' as described in FIG. 622. In the example described in the present drawing, Communication Device 200 represented by the user ID 'User#1' utilizes the signal type data in a hybrid manner for communicating with Host H, i.e., the signal type data 'cdma2000' for 'Channel#1' and the signal type data 'W-CDMA' for 'Channel#2'.

FIG. 625 illustrates the software programs stored in Multiple Channel Processing Software Storage Area H61*c* (FIG. 618). As described in the present drawing, Multiple Channel Processing Software Storage Area H61*c* stores Signal Type Data Detecting Software H61*c*1, User ID Identifying Software H61*c*2, Data Sending/Receiving Software H61*c*2*a*, Channel Number Adding Software H61*c*3, Data Sending/Receiving Software H61*c*3*a*, Signal Type Data Adding Software H61*c*4, and Data Sending/Receiving Software H61*c*4*a*. Signal Type Data Detecting Software H61*c*1 is the software program described in FIG. 635 and FIG. 636. User ID Identifying Software H61*c*2 is the software program described in FIG. 637. Data Sending/Receiving Software H61*c*2*a* is the software program described in FIG. 638 and FIG. 639. Channel Number Adding Software H61*c*3 is the software program described in FIG. 640. Data Sending/Receiving Software H61*c*3*a* is the software program described in FIG. 641 and FIG. 642. Signal Type Data Adding Software H61*c*4 is the software program described in FIG. 643. Data Sending/Receiving Software H61*c*4*a* is the software program described in FIG. 644 and FIG. 645.

FIG. 626 illustrates the storage area included in RAM 206 (FIG. 1) of Communication Device 200. As described in the present drawing, RAM 206 includes Multiple Channel Processing Information Storage Area 20661*a* of which the data and the software programs stored therein are described in FIG. 627.

FIG. 627 illustrates the storage areas included in Multiple Channel Processing Information Storage Area 20661*a* (FIG. 626). As described in the present drawing, Multiple Channel Processing Information Storage Area 20661*a* includes Multiple Channel Processing Data Storage Area 20661*b* and Multiple Channel Processing Software Storage Area 20661*c*. Multiple Channel Processing Data Storage Area 20661*b* stores the data necessary to implement the present function on the side of Communication Device 200, such as the ones described in FIG. 629 through FIG. 633. Multiple Channel Processing Software Storage Area 20661*c* stores the software programs necessary to implement the present function on the side of Communication Device 200, such as the ones described in FIG. 634.

The data and/or the software programs stored in Multiple Channel Processing Software Storage Area 20661*c* (FIG. 627) may be downloaded from Host H.

FIG. 628 illustrates the storage areas included in Multiple Channel Processing Data Storage Area 20661*b* (FIG. 627). As described in the present drawing, Multiple Channel Processing Data Storage Area 20661*b* includes User Data Storage Area 20661*b*1, Channel Number Storage Area 20661*b*2, and Signal Type Data Storage Area 20661*b*3. User Data Storage Area 20661*b*1 stores the data described in FIG. 629. Channel Number Storage Area 20661*b*2 stores the data described in FIG. 630 and FIG. 631. Signal Type Data Storage Area 20661*b*3 stores the data described in FIG. 632 and FIG. 633.

FIG. 629 illustrates the data stored in User Data Storage Area 20661*b*1 (FIG. 628). As described in the present drawing, User Data Storage Area 20661*b*1 comprises two columns, i.e., 'User ID' and 'User Data'. Column 'User ID' stores the user ID which is an identification of Communication Device 200. Column 'User Data' stores the user data represents the personal data of the user of Communication Device 200, such as name, home address, office address, phone number, email address, fax number, age, sex, credit card number of the user. In the example described in the present drawing, User Data Storage Area 20661*b*1 stores the following data: the user ID 'User#1' and the corresponding user data 'User Data#1'.

FIG. 630 illustrates the data stored in Channel Number Storage Area 20661*b*2 (FIG. 628). As described in the present drawing, Channel Number Storage Area 20661*b*2 comprises two columns, i.e., 'Channel ID' and 'User ID'. Column 'Channel ID' stores the channel ID which is an identification of the channel through which Host H and Communication Device 200 send and receive data. Column 'User ID' stores the user ID described hereinbefore. In the example described in the present drawing, Channel Number Storage Area 20661*b*2 stores the following data: the channel ID 'Channel#1' and the corresponding user ID 'User#1'. The foregoing data indicates that, to communicate with Host H, the channel ID 'Channel#1' is utilized by Communication Device 200 represented by the user ID 'User#1'.

FIG. 631 illustrates another example of the data stored in Channel Number Storage Area 20661*b*2 (FIG. 628). As described in the present drawing, Channel Number Storage Area 20661*b*2 comprises two columns, i.e., 'Channel ID' and 'User ID'. Column 'Channel ID' stores the channel IDs, and each channel ID is an identification of the channel through which Host H and Communication Device 200 send and receive data. Column 'User ID' stores the user ID described hereinbefore. In the example described in the present drawing, Channel Number Storage Area 20661*b*2 stores the following data: the channel ID 'Channel#1' and the corresponding user ID 'User#1'; and the channel ID 'Channel#2' and the corresponding user ID 'User#2'. The foregoing data indicates that, to communicate with Host H, the channel IDs of 'Channel#1' and 'Channel#2' are utilized by Communication Device 200 represented by the user ID 'User#1'.

FIG. 632 illustrates the data stored in Signal Type Data Storage Area 20661*b*3 (FIG. 628). As described in the present drawing, Signal Type Data Storage Area 20661*b*3 comprises two columns, i.e., 'Channel ID' and 'Signal Type Data'. Column 'Channel ID' stores the channel IDs described hereinbefore. Column 'Signal Type Data' stores the signal type data, and each signal type data indicates the type of signal utilized for the channel represented by the corresponding channel ID. In the example described in the present drawing, Signal Type Data Storage Area 20661*b*3 stores the following data: the channel ID 'Channel#1' and the corresponding signal type data 'cdma2000'; and the channel ID 'Channel#2' and the corresponding signal type data 'cdma2000'. The foregoing data indicates that the channel identified by the channel ID 'Channel#1' is assigned to the signal type data 'cdma2000'; and the channel identified by the channel ID 'Channel#2' is assigned to the signal type data 'cdma2000'. In the example described in the present drawing, Communication Device 200 represented by the user ID 'User#1' utilizes the signal type data 'cdma2000' for the channels represented by the channel ID 'Channel#1' and 'Channel#2' for communicating with Host H.

FIG. 633 illustrates another example of the data stored in Signal Type Data Storage Area 20661*b*3 (FIG. 628). As described in the present drawing, Signal Type Data Storage Area 20661*b*3 comprises two columns, i.e., 'Channel ID' and 'Signal Type Data'. Column 'Channel ID' stores the channel IDs described hereinbefore. Column 'Signal Type Data' stores the signal type data, and each signal type data indicates the type of signal utilized for the channel represented by the corresponding channel ID. In the example described in the present drawing, Signal Type Data Storage Area 20661*b*3 stores the following data: the channel ID 'Channel#1' and the corresponding signal type data 'cdma2000'; and the channel ID 'Channel#2' and the corresponding signal type data 'W-CDMA'. The foregoing data indicates that the channel identified by the channel ID 'Channel#1' is assigned to the signal type data 'cdma2000'; and the channel identified by the channel ID 'Channel#2' is assigned to the signal type data 'W-CDMA'. In the example described in the present drawing, Communication Device 200 represented by the user ID 'User#1' utilizes the signal type data in a hybrid manner for communicating with Host H, i.e., the signal type data 'cdma2000' for 'Channel#1' and the signal type data 'W-CDMA' for 'Channel#2'.

FIG. 634 illustrates the software programs stored in Multiple Channel Processing Software Storage Area 20661*c* (FIG. 627). As described in the present drawing, Multiple Channel Processing Software Storage Area 20661*c* stores Signal Type Data Detecting Software 20661*c*1, User ID Identifying Software 20661*c*2, Data Sending/Receiving Software 20661*c*2*a*, Channel Number Adding Software 20661*c*3, Data Sending/Receiving Software 20661*c*3*a*, Signal Type Data Adding Software 20661*c*4, and Data Sending/Receiving Software 20661*c*4*a*. Signal Type Data Detecting Software 20661*c*1 is the software program described in FIG. 635 and FIG. 636. User ID Identifying Software 20661*c*2 is the software program described in FIG. 637. Data Sending/Receiving Software 20661*c*2*a* is the software program described in FIG. 638 and FIG. 639. Channel Number Adding Software 20661*c*3 is the software program described in FIG. 640. Data Sending/Receiving Software 20661*c*3*a* is the software program described in FIG. 641 and FIG. 642. Signal Type Data Adding Software 20661*c*4 is the software program described in FIG. 643. Data Sending/Receiving Software 20661*c*4*a* is the software program described in FIG. 644 and FIG. 645.

FIG. 635 illustrates Signal Type Data Detecting Software H61*c*1 (FIG. 625) of Host H and Signal Type Data Detecting Software 20661*c*1 (FIG. 634) of Communication Device 200, which detect the signal type utilized for the communication between Host H and Communication Device 200 from any signal type categorized as 2G, 3G, and 4G. The detection of the signal type is implemented by Host H in the present embodiment. As described in the present drawing, Host H detects the signal type (S1), and stores the signal type data in Signal Type Data Storage Area H61*b*3 (FIG. 623) at the default channel number (in the present example, Channel#1) (S2). Host H then sends the signal type data to Communication Device 200 (S3). Upon receiving the signal type data from Host H (S4), Communication Device 200 stores the signal type data in Signal Type Data Storage Area 20661*b*3 (FIG. 632) at the default channel number (in the present example, Channel#1) (S5).

FIG. 636 illustrates another embodiment of Signal Type Data Detecting Software H61*c*1 (FIG. 625) of Host H and Signal Type Data Detecting Software 20661*c*1 (FIG. 634) of Communication Device 200, which detect the signal type utilized for the communication between Host H and Communication Device 200 from any signal type categorized as 2G; 3G; and 4G. The detection of the signal type is implemented by Communication Device 200 in the present embodiment. As described in the present drawing, CPU 211 (FIG. 1) of Communication Device 200 detects the signal type (S1), and stores the signal type data in Signal Type Data Storage Area 20661*b*3 (FIG. 632) at the default channel number (in the present example, Channel#1) (S2). CPU 211 then sends the signal type data to Host H (S3). Upon receiving the signal type data from Communication Device 200 (S4), Host H stores the signal type data in Signal Type Data Storage Area H61*b*3 (FIG. 623) at the default channel number (in the present example, Channel#1) (S5).

FIG. 637 illustrates User ID Identifying Software H61*c*2 (FIG. 625) of Host H and User ID Identifying Software 20661*c*2 (FIG. 634) of Communication Device 200, which identify the user ID of the corresponding Communication Device 200. As described in the present drawing, Communication Device 200 sends the user ID to Host H (S1). Upon receiving the User ID from Communication Device 200 (S2), Host H identifies the default channel number (in the present example, Channel#1) for Communication Device 200 (S3), and stores the User ID in Channel Number Storage Area H61*b*2 (FIG. 621) at the channel number identified in S3 (S4).

FIG. 638 illustrates Data Sending/Receiving Software H61*c*2*a* (FIG. 625) of Host H and Data Sending/Receiving Software 20661*c*2*a* (FIG. 634) of Communication Device 200 by which Host H sends data to Communication Device 200. As described in the present drawing, Host H retrieves the default channel number (in the present example, Channel#1) from Channel Number Storage Area H61*b*2 (FIG. 621) (S1), and sends data (e.g., audiovisual data and alphanumeric data) to Communication Device 200 through the default channel number (in the present example, Channel#1) retrieved in S1 (S2). Communication Device 200 receives the data (e.g., audiovisual data and alphanumeric data) from Host H through the same channel number (S3).

FIG. 639 illustrates another embodiment of Data Sending/Receiving Software H61*c*2*a* (FIG. 625) of Host H and Data Sending/Receiving Software 20661*c*2*a* (FIG. 634) of Communication Device 200 by which Communication Device 200 sends data (e.g., audiovisual data and alphanumeric data) to Host H. As described in the present drawing, Communication Device 200 retrieves the default channel number (in the present example, Channel#1) from Channel Number Storage Area 20661*b*2 (FIG. 630) (S1), and sends data (e.g., audiovisual data and alphanumeric data) to Host H through the default channel number (in the present example, Channel#1) retrieved in S1 (S2). Host H receives the data (e.g., audiovisual data and alphanumeric data) from Communication Device 200 through the same channel number (S3).

FIG. 640 illustrates Channel Number Adding Software H61*c*3 (FIG. 625) of Host H and Channel Number Adding Software 20661*c*3 (FIG. 634) of Communication Device 200, which add another channel to increase the download and/or upload speed of Communication Device 200. As described in the present drawing, Communication Device 200 sends a channel number adding request to Host H (S1). Upon receiving the channel number adding request from Communication Device 200 (S2), Host H checks the availability in the same signal type data (S3). Assuming that vacancy is found in the same signal type data, Host H selects a new channel number (in the present example, Channel#2) from the available channel numbers for Communication Device 200 (S4). Host H stores the user ID of Communication Device 200 in Channel Number Storage Area H61*b*2 (FIG. 621) at new channel number (in the present example, Channel#2) selected in S4 (S5). Host H then sends the new channel number (in the present example, Channel#2) selected in S4 to Communication Device 200 (S6). Upon receiving the new channel number (in the present example, Channel#2) from Host H (S7), Communication Device 200 stores the new channel number (in the present example, Channel#2) in Channel Number Storage Area 20661*b*2 (FIG. 630) (S8). As another embodiment, instead of Host H adding a new channel number by receiving a channel number adding request from Communication Device 200, Host H may do so in its own initiative.

FIG. 641 illustrates Data Sending/Receiving Software H61*c*3*a* (FIG. 625) of Host H and Data Sending/Receiving Software 20661*c*3*a* (FIG. 634) of Communication Device 200 by which Host H sends data to Communication Device 200 by increasing the download speed. As described in the present drawing, Host H retrieves the channel numbers (in the present example, Channel#1 and #2) from Channel Number Storage Area H61*b*2 (FIG. 621) of the corresponding user ID (in the present example, User#1) (S1). Host H splits the data (e.g., audiovisual data and alphanumeric data) to be sent to Communication Device 200 to the First Data and the Second Data (S2). Host H sends the First Data to Communication Device 200 through Channel#1 (S3), and sends the Second Data to Communication Device 200 through Channel#2 (S4). Communication Device 200 receives the First Data from Host H through Channel#1 (S5), and receives the Second Data from Host H through Channel#2 (S6). Communication Device 200 merges the First Data and the Second Data thereafter (S7).

FIG. 642 illustrates Data Sending/Receiving Software H61*c*3*a* (FIG. 625) of Host H and Data Sending/Receiving Software 20661*c*3*a* (FIG. 634) of Communication Device 200 by which Communication Device 200 sends data to Host H by increasing the upload speed. As described in the present drawing, Communication Device 200 retrieves the channel numbers (in the present example, Channels #1 and #2) from Channel Number Storage Area 20661*b*2 (FIG. 630) (S1). Communication Device 200 splits the data (e.g., audiovisual data and alphanumeric data) to be sent to Host H to the Third Data and the Fourth Data (S2). Communication Device 200 sends the Third Data to Host H through Channel#1 (S3), and sends the Fourth Data to Host H through Channel#2 (S4). Host H receives the Third Data from Communication Device 200 through Channel#1 (S5), and receives the Fourth Data from Communication Device 200 through Channel#2 (S6). Host H merges the Third Data and the Fourth Data thereafter (S7).

FIG. 643 illustrates Signal Type Data Adding Software H61*c*4 (FIG. 625) of Host H and Signal Type Data Adding Software 20661*c*4 (FIG. 634) of Communication Device 200, which add new channel in different signal type if no available channel is found in the same signal type in S3 of FIG. 640. As described in the present drawing, Host H checks the availability in other signal type data (S1). Assuming that an available new channel is found in W-CDMA. Host H selects a new channel number (in the present example, Channel#2) In Signal Type Data Storage Area H61*b*3 (FIG. 624) for Communication Device 200 (S2). Host H stores the user ID (in the present example, User#1) in Channel Number Storage Area H61*b*2 (FIG. 622) at new channel number selected in S2 (in the present example, Channel#2) (S3). Host H stores the signal type data (in the present example, W-CDMA) in Signal Type Data Storage Area H61*b*3 (FIG. 624) at new channel number selected in S2 (in the present example, Channel#2) (S4). Host H sends the new channel number (in the present example, Channel#2) and the new signal type data (in the present example, W-CDMA) to Communication Device 200 (S5). Communication Device 200 receives the new channel number (in the present example, Channel#2) and the new signal type data (in the present example, W-CDMA) from Host H (S6). Communication Device 200 stores the new channel number (in the present example, Channel#2) in Channel Number Storage Area 20661*b*2 (FIG. 631) (S7). Communication Device 200 (in the present example, W-CDMA) in Signal Type Data Storage Area 20661*b*3 (FIG. 633) (S8).

FIG. 644 illustrates Data Sending/Receiving Software H61*c*4*a* (FIG. 625) of Host H and Data Sending/Receiving Software 20661*c*4*a* (FIG. 634) of Communication Device 200 by which Host H sends data to Communication Device 200 by increasing the download speed. As described in the present drawing, Host H retrieves the channel numbers (in the present example, Channel#1 and #2) from Channel Number Storage Area H61*b*2 (FIG. 622) of the corresponding user ID (in the present example, User#1) (S1). Host H splits the data (e.g., audiovisual data and alphanumeric data) to be sent to Communication Device 200 to the First Data and the Second Data (S2). Host H sends the First Data to Communication Device 200 through Channel#1 in cdma2000 (S3), and sends the Second Data to Communication Device 200 through Channel#2 in W-CDMA (S4). Communication Device 200 receives the First Data from Host H through Channel#1 in cdma2000 (S5), and receives the Second Data from Host H through Channel#2 in W-CDMA (S6). Communication Device 200 merges the First Data and the Second Data thereafter (S7).

FIG. 645 illustrates Data Sending/Receiving Software H61*c*4*a* (FIG. 625) of Host H and Data Sending/Receiving Software 20661*c*4*a* (FIG. 634) of Communication Device 200 by which Communication Device 200 sends data to Host H by increasing the upload speed. As described in the present drawing, Communication Device 200 retrieves the channel numbers (in the present example, Channel#1 and #2) from Channel Number Storage Area 20661*b*2 (FIG. 631) (S1). Communication Device 200 splits the data (e.g., audiovisual data and alphanumeric data) to be sent to Host H to the Third Data and the Fourth Data (S2). Communication Device 200 sends the Third Data to Host H through Channel#1 in cdma2000 (S3), and sends the Fourth Data to Host H through Channel#2 in W-CDMA (S4). Host H receives the Third Data from Communication Device 200 through Channel#1 in cdma2000 (S5), and receives the Fourth Data from Communication Device 200 through Channel#2 in W-CDMA (S6). Host H merges the Third Data and the Fourth Data thereafter (S7).

As another embodiment, the present function may be utilized for processing other sets of combination of the signals, such as the 2G signal and the 3G signal. In order to implement this embodiment, the term 'cdma2000' is substituted by '2G' and the term 'W-CDMA' is substituted by '3G' in the explanation set out hereinbefore for purposes of implementing the present embodiment. Here, the 2G signal may be of any type of signal categorized as 2G, including, but not limited to cdmaOne, GSM, and D-AMPS; the 3G signal may be of any type of signal categorized as 3G, including, but not limited to cdma2000, W-CDMA, and TDS-CDMA.

As another embodiment, the present function may be utilized for processing other sets of combination of the signals, such as the 3G signal and the 4G signal. In order to implement this embodiment, the term 'cdma2000' is substituted by '3G' and the term 'W-CDMA' is substituted by '4G' in the explanation set out hereinbefore for purposes of implementing the present embodiment. Here, the 3G signal may be of any type of signal categorized as 3G, including, but not limited to cdma2000, W-CDMA, and TDS-CDMA, and the 4G signal may be of any type of signal categorized as 4G.

As another embodiment, the present function may be utilized for processing the first type of 4G signal and the second type of 4G signal. In order to implement this embodiment, the term 'cdma2000' is substituted by 'the first type of 4G signal' and the term 'W-CDMA' is substituted by 'the second type of 4G signal' for purposes of implementing the present embodiment. Here, the first type of 4G signal and the second type of 4G signal may be of any type of signal categorized as 4G.

As another embodiment, the present function may be utilized for processing the 2G signal and the 3G signal. In order to implement this embodiment, the term 'cdma2000' is substituted by 'the 2G signal' and the term 'W-CDMA' is substituted by 'the 3G signal' for purposes of implementing the present embodiment. Here, the 2G signal may be of any type of signal categorized as 2G, including, but not limited to cdmaOne, GSM, and D-AMPS, and the 3G signal may be of any type of signal categorized as 3G, including, but not limited to cdma2000, W-CDMA, and TDS-CDMA.

As another embodiment, the present function may be utilized for processing the first type of 2G signal and the second type of 2G signal. In order to implement this embodiment, the term 'cdma2000' is substituted by 'the first type of 2G signal' and the term 'W-CDMA' is substituted by 'the second type of 2G signal' for purposes of implementing the present embodiment. Here, the first type of 2G signal and the second type of 2G signal may be of any type of signal categorized as 2G, including, but not limited to cdmaOne, GSM, and D-AMPS.

In sum, the present function described hereinbefore may be utilized for processing any combination of any type of signals.

For the avoidance of doubt, the multiple signal processing function may be utilized while implementing the present function.

For the avoidance of doubt, all software programs described hereinbefore to implement the present function may be executed solely by CPU 211 (FIG. 1) or by Signal Processor 208 (FIG. 1), or by both CPU 211 and Signal Processor 208.

<<OS Updating Function>>

FIG. 646 through FIG. 711 illustrate the OS updating function which updates the operating system of Communication Device 200 in a wireless fashion. In other words, Communication Device 200 downloads the portion of the operating system of the latest version from Host H via Antenna 218 (FIG. 1).

FIG. 646 illustrates the storage areas included in RAM 206 (FIG. 1). As described in the present drawing, RAM 206 includes Operating System 20663OS of which the data stored therein are described in FIG. 647 and FIG. 648, and OS Updating Information Storage Area 20663*a* of which the data and the software programs stored therein are described in FIG. 649.

FIG. 647 and FIG. 648 illustrate the data stored in Operating System 20663OS (FIG. 646). As described in the present drawing, Operating System 20663OS includes Battery Controller 20663OSa, CCD Unit Controller 20663OSb, Flash Light Unit Controller 20663OSc, Indicator Controller 20663OSd, Input Device Controller 20663OSe, LCD Controller 20663OSf, LED Controller 20663OSg, Memory Card Interface Controller 20663OSh, Microphone Controller 20663OSi, Photometer Controller 20663OSj, RAM Controller 20663OSk, ROM Controller 20663OSl, Signal Processor Controller 20663OSm, Signal Processor Controller 20663OSn, Solar Panel Controller 20663OSo, Speaker Controller 20663OSp, Vibrator Controller 20663OSq, Video Processor Controller 20663OSr, Wireless Receiver Controller 20663OSs, Wireless Receiver Controller 20663OSt, Wireless Receiver Controller 20663OSu, Wireless Transmitter Controller 20663OSv, Wireless Transmitter Controller 20663OSw, and Wireless Transmitter Controller 20663OSx. Battery Controller 20663OSa is a controller which controls Battery 230 (FIG. 332 through FIG. 335). CCD Unit Controller 20663OSb is a controller which controls CCD Unit 214 (FIG. 332 through FIG. 335). Flash Light Unit Controller 20663OSc is a controller which controls Flash Light Unit 220 (FIG. 332 through FIG. 335). Indicator Controller 20663OSd is a controller which controls Indicator 212 (FIG. 332 through FIG. 335). Input Device Controller 20663OSe is a controller which controls Input Device 210 (FIG. 332 through FIG. 335). LCD Controller 20663OSf is a controller which controls LCD 201 (FIG. 332 through FIG. 335). LED Controller 20663OSg is a controller which controls LED 219 (FIG. 332 through FIG. 335). Memory Card Interface Controller 20663OSh is a controller which controls Memory Card Interface 221 (FIG. 332 through FIG. 335). Microphone Controller 20663OSi is a controller which controls Microphone 215 (FIG. 332 through FIG. 335). Photometer Controller 20663OSj is a controller which controls Photometer 232 (FIG. 332 through FIG. 335). RAM Controller 20663OSk is a controller which controls RAM 206 (FIG. 332 through FIG. 335). ROM Controller 20663OSl is a controller which controls ROM 207 (FIG. 332 through FIG. 335). Signal Processor Controller 20663OSm is a controller which controls Signal Processor 205 (FIG. 332 through FIG. 335). Signal Processor Controller 20663OSn is a controller which controls Signal Processor 208 (FIG. 332 through FIG. 335). Solar Panel Controller 20663OSo is a controller which controls Solar Panel 229 (FIG. 332 through FIG. 335). Speaker Controller 20663OSp is a controller which controls Speaker 216L (FIG. 332 through FIG. 335). Vibrator Controller 20663OSq is a controller which controls Vibrator 217 (FIG. 332 through FIG. 335). Video Processor Controller 20663OSr is a controller which controls Video Processor 202 (FIG. 332 through FIG. 335). Wireless Receiver Controller 20663OSs is a controller which controls Wireless Receiver 224 (FIG. 332 through FIG. 335). Wireless Receiver Controller 20663OSt is a controller which controls Wireless Receiver 225 (FIG. 332 through FIG. 335). Wireless Receiver Controller 20663OSu is a controller which controls Wireless Receiver 226 (FIG. 332 through FIG. 335). Wireless Transmitter Controller 20663OSv is a controller which controls Wireless Transmitter 222 (FIG. 332 through FIG. 335). Wireless Transmitter Controller 20663OSw is a controller which controls Wireless Transmitter 223 (FIG. 332 through FIG. 335). Wireless Transmitter Controller 20663OSx is a controller which controls Wireless Transmitter 227 (FIG. 332 through FIG. 335). For the avoidance of doubt, the data stored in Operating System 20663OS are illustrative, and other types of data, which are updated by implementing the present function, are also stored therein, such as DLLs, drivers, security implementing program.

FIG. 649 illustrates the storage areas included in OS Updating Information Storage Area 20663*a* (FIG. 646). As described in the present drawing, OS Updating Information Storage Area 20663*a* includes OS Updating Data Storage Area 20663*b* and OS Updating Software Storage Area 20663*c*. OS Updating Data Storage Area 20663*b* stores the data necessary to implement the present function on the side of Communication Device 200, such as the ones described in FIG. 650. OS Updating Software Storage Area 20663*c* stores the software programs necessary to implement the present function on the side of Communication Device 200, such as the ones described in FIG. 653 and FIG. 654.

The data and/or the software programs stored in OS Updating Software Storage Area 20663*c* (FIG. 649) may be downloaded from Host H.

FIG. 650 illustrates the storage area included in OS Updating Data Storage Area 20663*b* (FIG. 649). As described in the present drawing, OS Updating Data Storage Area 20663*b* includes OS Version Data Storage Area 20663*b*1. OS Version Data Storage Area 20663*b*1 stores the data described in FIG. 651 and FIG. 652.

FIG. 651 and FIG. 652 illustrate the data stored in OS Version Data Storage Area 20663*b*1 (FIG. 650). As described in the present drawing, OS Version Data Storage Area 20663*b*1 includes Battery Controller Version Data 20663*b*1*a*, CCD Unit Controller Version Data 20663*b*1*b*, Flash Light Unit Controller Version Data 20663*b*1*c*, Indicator Controller Version Data 20663*b*1*d*, Input Device Controller Version Data 20663*b*1*e*, LCD Controller Version Data 20663*b*1*f*, LED Controller Version Data 20663*b*1*g*, Memory Card Interface Controller Version Data 20663*b*1*h*, Microphone Controller Version Data **20663*b*1*i*, Photometer Controller Version Data 20663*b*1*j*, RAM Controller Version Data 20663*b*1*k*, ROM Controller Version Data 20663*b*1*l*, Signal Processor Controller Version Data 20663*b*1*m*, Signal Processor Controller Version Data 20663*b*1*n*, Solar Panel Controller Version Data 20663*b*1*o*, Speaker Controller Version Data 20663*b*1*p*, Vibrator Controller Version Data 20663*b*1*q*, Video Processor Controller Version Data 20663*b*1*r*, Wireless Receiver Controller Version Data 20663*b*1*s*, Wireless Receiver Controller Version Data 20663*b*1*t*, Wireless Receiver Controller Version Data 20663*b*1*u*, Wireless Transmitter Controller Version Data 20663*b*1*v*, Wireless Transmitter Controller Version Data 20663*b*1*w*, and Wireless Transmitter Controller Version Data 20663*b*1*x*. Battery Controller Version Data 20663*b*1*a* is the version data representing the current version of Battery Controller 20663OSa (FIG. 647). CCD Unit Controller Version Data 20663*b*1*b* is the version data representing the current version of CCD Unit Controller 20663OSb (FIG. 647). Flash Light Unit Controller Version Data 20663*b*1*c* is the version data representing the current version of Flash Light Unit Controller 20663OSc (FIG. 647). Indicator Controller Version Data 20663*b*1*d* is the version data representing the current version of Indicator Controller 20663OSd (FIG. 647). Input Device Controller Version Data 20663*b*1*e* is the version data representing the current version of Input Device Controller 20663OSe (FIG. 647). LCD Controller Version Data 20663*b*1*f* is the version data representing the current version of LCD Controller 20663OSf (FIG. 647). LED Controller Version Data 20663*b*1*g* is the version data representing the current version of LED Controller 20663OSg (FIG. 647). Memory Card Interface Controller Version Data 20663*b*1*h* is the version data representing the current version of Memory Card Interface Controller 20663OSh (FIG. 647). Microphone Controller Version Data 20663*b*1*i* is the version data representing the current version of Microphone Controller 20663OSi (FIG. 647). Photometer Controller Version Data 20663*b*1*j* is the version data representing the current version of Photometer Controller 20663OSj (FIG. 647). RAM Controller Version Data 20663*b*1*k* is the version data representing the current version of RAM Controller 20663OSk (FIG. 647). ROM Controller Version Data 20663*b*1*l* is the version data representing the current version of ROM Controller 20663OSl (FIG. 647). Signal Processor Controller Version Data 20663*b*1*m* is the version data representing the current version of Signal Processor Controller 20663OSm (FIG. 648). Signal Processor Controller Version Data 20663*b*1*n* is the version data representing the current version of Signal Processor Controller 20663OSn (FIG. 648). Solar Panel Controller Version Data 20663*b*1*o* is the version data representing the current version of Solar Panel Controller 20663OSo (FIG. 648). Speaker Controller Version Data 20663*b*1*p* is the version data representing the current version of Speaker Controller 20663OSp (FIG. 648). Vibrator Controller Version Data 20663*b*1*q* is the version data representing the current version of Vibrator Controller 20663OSq (FIG. 648). Video Processor Controller Version Data 20663*b*1*r* is the version data representing the current version of Video Processor Controller 20663OSr (FIG. 648). Wireless Receiver Controller Version Data 20663*b*1*s* is the version data representing the current version of Wireless Receiver Controller 20663OSs (FIG. 648). Wireless Receiver Controller Version Data 20663*b*1*t* is the version data representing the current version of Wireless Receiver Controller 20663OSt (FIG. 648). Wireless Receiver Controller Version Data 20663*b*1*u* is the version data representing the current version of Wireless Receiver Controller 20663OSu (FIG. 648). Wireless Transmitter Controller Version Data 20663*b*1*v* is the version data representing the current version of Wireless Transmitter Controller 20663OSv (FIG. 648). Wireless Transmitter Controller Version Data 20663*b*1*w* is the version data representing the current version of Wireless Transmitter Controller 20663OSw (FIG. 648). Wireless Transmitter Controller Version Data 20663*b*1*x* is the version data representing the current version of Wireless Transmitter Controller 20663OSx (FIG. 648**). Here, the version data is composed of numeric data, such as '1', '2', and '3', wherein '1' represents version '1.0', '2' represents version '2.0', and '3' represents version '3.0'.

FIG. 653 and FIG. 654 illustrate the software programs stored in OS Updating Software Storage Area **20663*c* (FIG. 649). As described in the present drawing, OS Updating Software Storage Area 20663*c* stores Battery Controller Updating Software 20663*c*1*a*, CCD Unit Controller Updating Software 20663*c*1*b*, Flash Light Unit Controller Updating Software 20663*c*1*c*, Indicator Controller Updating Software 20663*c*1*d*, Input Device Controller Updating Software 20663*c*1*e*, LCD Controller Updating Software 20663*c*1*f*, LED Controller Updating Software 20663*c*1*g*, Memory Card Interface Controller Updating Software 20663*c*1*h*, Microphone Controller Updating Software 20663*c*1*i*, Photometer Controller Updating Software 20663*c*1*j*, RAM Controller Updating Software 20663*c*1*k*, ROM Controller Updating Software 20663*c*1*l*, Signal Processor Controller Updating Software 20663*c*1*m*, Signal Processor Controller Updating Software 20663*c*1*n*, Solar Panel Controller Updating Software 20663*c*1*o*, Speaker Controller Updating Software 20663*c*1*p*, Vibrator Controller Updating Software 20663*c*1*q*, Video Processor Controller Updating Software 20663*c*1*r*, Wireless Receiver Controller Updating Software 20663*c*1*s*, Wireless Receiver Controller Updating Software 20663*c*1*t*, Wireless Receiver Controller Updating Software 20663*c*1*u*, Wireless Transmitter Controller Updating Software 20663*c*1*v*, Wireless Transmitter Controller Updating Software 20663*c*1*w*, and Wireless Transmitter Controller Updating Software 20663*c*1*x*. Battery Controller Updating Software 20663*c*1*a* is the software program described in FIG. 664 and FIG. 665. CCD Unit Controller Updating Software 20663*c*1*b* is the software program described in FIG. 666 and FIG. 667. Flash Light Unit Controller Updating Software 20663*c*1*c* is the software program described in FIG. 668 and FIG. 669. Indicator Controller Updating Software 20663*c*1*d* is the software program described in FIG. 670 and FIG. 671. Input Device Controller Updating Software 20663*c*1*e* is the software program described in FIG. 672 and FIG. 673. LCD Controller Updating Software 20663*c*1*f* is the software program described in FIG. 674 and FIG. 675. LED Controller Updating Software 20663*c*1*g* is the software program described in FIG. 676 and FIG. 677. Memory Card Interface Controller Updating Software 20663*c*1*h* is the software program described in FIG. 678 and FIG. 679. Microphone Controller Updating Software 20663*c*1*i* is the software program described in FIG. 680 and FIG. 681. Photometer Controller Updating Software 20663*c*1*j* is the software program described in FIG. 682 and FIG. 683. RAM Controller Updating Software 20663*c*1*k* is the software program described in FIG. 684 and FIG. 685. ROM Controller Updating Software 20663*c*1*l* is the software program described in FIG. 686 and FIG. 687. Signal Processor Controller Updating Software 20663*c*1*m* is the software program described in FIG. 688 and FIG. 689. Signal Processor Controller Updating Software 20663*c*1*n* is the software program described in FIG. 690 and FIG. 691. Solar Panel Controller Updating Software 20663*c*1*o* is the software program described in FIG. 692 and FIG. 693. Speaker Controller Updating Software 20663*c*1*p* is the software program described in FIG. 694 and FIG. 695. Vibrator Controller Updating Software 20663*c*1***q* is the software program described in FIG. 696 and FIG. 697. Video Processor Controller Updating Software 20663*c*1*r* is the software program described in FIG. 698 and FIG. 699. Wireless Receiver Controller Updating Software 20663*c*1*s* is the software program described in FIG. 700 and FIG. 701. Wireless Receiver Controller Updating Software 20663*c*1*t* is the software program described in FIG. 702 and FIG. 703. Wireless Receiver Controller Updating Software 20663*c*1*u* is the software program described in FIG. 704 and FIG. 705. Wireless Transmitter Controller Updating Software 20663*c*1*v* is the software program described in FIG. 706 and FIG. 707. Wireless Transmitter Controller Updating Software 20663*c*1*w* is the software program described in FIG. 708 and FIG. 709. Wireless Transmitter Controller Updating Software 20663*c*1*x* is the software program described in FIG. 710 and FIG. 711.

FIG. 655 illustrates the storage areas included in Host H. As described in the present drawing, Host H includes Operating System H63OS of which the data stored therein are described in FIG. 656 and FIG. 657, and OS Updating Information Storage Area H63*a* of which the data and the software programs stored therein are described in FIG. 658.

FIG. 656 and FIG. 657 illustrate the data stored in Operating System H63OS (FIG. 655). As described in the present drawing, Operating System H63OS includes Battery Controller H63OSa, CCD Unit Controller H63OSb, Flash Light Unit Controller H63OSc, Indicator Controller H63OSd, Input Device Controller H63OSe, LCD Controller H63OSf, LED Controller H63OSg, Memory Card Interface Controller H63OSh, Microphone Controller H63OSi, Photometer Controller H63OSj, RAM Controller H63OSk, ROM Controller H63OSl, Signal Processor Controller H63OSm, Signal Processor Controller H63OSn, Solar Panel Controller H63OSo, Speaker Controller H63OSp, Vibrator Controller H63OSq, Video Processor Controller H63OSr, Wireless Receiver Controller H63OSs, Wireless Receiver Controller H63OSt, Wireless Receiver Controller H63OSu, Wireless Transmitter Controller H63OSv, Wireless Transmitter Controller H63OSw, and Wireless Transmitter Controller H63OSx. Battery Controller H63OSa is the controller of the latest version which controls Battery 230 (FIG. 332 through FIG. 335). CCD Unit Controller H63OSb is the controller of the latest version which controls CCD Unit 214 (FIG. 332 through FIG. 335). Flash Light Unit Controller H63OSc is the controller of the latest version which controls Flash Light Unit 220 (FIG. 332 through FIG. 335). Indicator Controller H63OSd is the controller of the latest version which controls Indicator 212 (FIG. 332 through FIG. 335). Input Device Controller H63OSe is the controller of the latest version which controls Input Device 210 (FIG. 332 through FIG. 335). LCD Controller H63OSf is the controller of the latest version which controls LCD 201 (FIG. 332 through FIG. 335). LED Controller H63OSg is the controller of the latest version which controls LED 219 (FIG. 332 through FIG. 335). Memory Card Interface Controller H63OSh is the controller of the latest version which controls Memory Card Interface 221 (FIG. 332 through FIG. 335). Microphone Controller H63OSi is the controller of the latest version which controls Microphone 215 (FIG. 332 through FIG. 335). Photometer Controller H63OSj is the controller of the latest version which controls Photometer 232 (FIG. 332 through FIG. 335). RAM Controller H63OSk is the controller of the latest version which controls Host H (FIG. 332 through FIG. 335). ROM Controller H63OSl is the controller of the latest version which controls ROM 207 (FIG. 332 through FIG. 335). Signal Processor Controller H63OSm is the controller of the latest version which controls Signal Processor 205 (FIG. 332 through FIG. 335). Signal Processor Controller H63OSn is the controller of the latest version which controls Signal Processor 208 (FIG. 332 through FIG. 335). Solar Panel Controller H63OSo is the controller of the latest version which controls Solar Panel 229 (FIG. 332 through FIG. 335). Speaker Controller H63OSp is the controller of the latest version which controls Speaker 216L (FIG. 332 through FIG. 335). Vibrator Controller H63OSq is the controller of the latest version which controls Vibrator 217 (FIG. 332 through FIG. 335). Video Processor Controller H63OSr is the controller of the latest version which controls Video Processor 202 (FIG. 332 through FIG. 335). Wireless Receiver Controller H63OSs is the controller of the latest version which controls Wireless Receiver 224 (FIG. 332 through FIG. 335). Wireless Receiver Controller H63OSt is the controller of the latest version which controls Wireless Receiver 225 (FIG. 332 through FIG. 335). Wireless Receiver Controller H63OSu is the controller of the latest version which controls Wireless Receiver 226 (FIG. 332 through FIG. 335). Wireless Transmitter Controller H63OSv is the controller of the latest version which controls Wireless Transmitter 222 (FIG. 332 through FIG. 335). Wireless Transmitter Controller H63OSw is the controller of the latest version which controls Wireless Transmitter 223 (FIG. 332 through FIG. 335). Wireless Transmitter Controller H63OSx is the controller of the latest version which controls Wireless Transmitter 227 (FIG. 332 through FIG. 335). The data stored in Operating System Storage Area H63OS are updated periodically. For the avoidance of doubt, the data stored in Operating System H63OS are illustrative, and other types of data, which are utilized to update Operating System H63OS of Communication Device 200 by implementing the present function, are also stored therein, such as DLLs, drivers, security implementing program. The data stored in Operating System H63OS are updated periodically thereby the data are always of the latest version.

FIG. 658 illustrates the storage areas included in OS Updating Information Storage Area H63*a* (FIG. 655). As described in the present drawing, OS Updating Information Storage Area H63*a* includes OS Updating Data Storage Area H63*b* and OS Updating Software Storage Area H63*c*. OS Updating Data Storage Area H63*b* stores the data necessary to implement the present function on the side of Host H, such as the ones described in FIG. 659. OS Updating Software Storage Area H63*c* stores the software programs necessary to implement the present function on the side of Host H, such as the ones described in FIG. 662 and FIG. 663.

FIG. 659 illustrates the storage area included in OS Updating Data Storage Area H63*b* (FIG. 658). As described in the present drawing, OS Updating Data Storage Area H63*b* includes OS Version Data Storage Area H63*b*1. OS Version Data Storage Area H63*b*1 stores the data described in FIG. 660 and FIG. 661.

FIG. 660 and FIG. 661 illustrate the data stored in OS Version Data Storage Area H63*b*1 (FIG. 659). As described in the present drawing, OS Version Data Storage Area H63*b*1 includes Battery Controller Version Data H63*b*1*a*, CCD Unit Controller Version Data H63*b*1*b*, Flash Light Unit Controller Version Data H63*b*1*c*, Indicator Controller Version Data H63*b*1*d*, Input Device Controller Version Data H63*b*1*e*, LCD Controller Version Data H63*b*1*f*, LED Controller Version Data H63*b*1*g*, Memory Card Interface Controller Version Data H63*b*1*h*, Microphone Controller Version Data H63*b*1*i*, Photometer Controller Version Data H63*b*1*j*, RAM Controller Version Data H63*b*1*k*, ROM Controller Version Data H63*b*1*l*, Signal Processor Controller Version Data H63*b*1*m*, Signal Processor Controller Version Data H63*b*1*n*, Solar Panel Controller Version Data H63*b*1*o*, Speaker Controller Version Data H63*b*1*p*, Vibrator Controller Version Data H63*b*1*q*, Video Processor Controller Version Data H63*b*1*r*, Wireless Receiver Controller Version Data H63*b*1*s*, Wireless Receiver Controller Version Data H63*b*1*t*, Wireless Receiver Controller Version Data H63*b*1*u*, Wireless Transmitter Controller Version Data H63*b*1*v*, Wireless Transmitter Controller Version Data H63*b*1*w*, and Wireless Transmitter Controller Version Data H63*b*1*x*. Battery Controller Version Data H63*b*1*a* is the version data representing the latest version of Battery Controller H63OSa (FIG. 656). CCD Unit Controller Version Data H63*b*1*b* is the version data representing the latest version of CCD Unit Controller H63OSb (FIG. 656). Flash Light Unit Controller Version Data H63*b*1*c* is the version data representing the latest version of Flash Light Unit Controller H63OSc (FIG. 656). Indicator Controller Version Data H63*b*1*d* is the version data representing the latest version of Indicator Controller H63OSd (FIG. 656). Input Device Controller Version Data H63*b*1*e* is the version data representing the latest version of Input Device Controller H63OSe (FIG. 656). LCD Controller Version Data H63*b*1*f* is the version data representing the latest version of LCD Controller H63OSf (FIG. 656). LED Controller Version Data H63*b*1*g* is the version data representing the latest version of LED Controller H63OSg (FIG. 656). Memory Card Interface Controller Version Data H63*b*1*h* is the version data representing the latest version of Memory Card Interface Controller H63OSh (FIG. 656). Microphone Controller Version Data H63*b*1*i* is the version data representing the latest version of Microphone Controller H63OSi (FIG. 656). Photometer Controller Version Data H63*b*1*j* is the version data representing the latest version of Photometer Controller H63OSj (FIG. 656). RAM Controller Version Data H63*b*1*k* is the version data representing the latest version of RAM Controller H63OSk (FIG. 656). ROM Controller Version Data H63*b*1*l* is the version data representing the latest version of ROM Controller H63OSl (FIG. 656). Signal Processor Controller Version Data H63*b*1*m* is the version data representing the latest version of Signal Processor Controller H63OSm (FIG. 657). Signal Processor Controller Version Data H63*b*1*n* is the version data representing the latest version of Signal Processor Controller H63OSn (FIG. 657). Solar Panel Controller Version Data H63*b*1*o* is the version data representing the latest version of Solar Panel Controller H63OSo (FIG. 657). Speaker Controller Version Data H63*b*1*p* is the version data representing the latest version of Speaker Controller H63OSp (FIG. 657). Vibrator Controller Version Data H63*b*1*q* is the version data representing the latest version of Vibrator Controller H63OSq (FIG. 657). Video Processor Controller Version Data H63*b*1*r* is the version data representing the latest version of Video Processor Controller H63OSr (FIG. 657). Wireless Receiver Controller Version Data H63*b*1*s* is the version data representing the latest version of Wireless Receiver Controller H63OSs (FIG. 657). Wireless Receiver Controller Version Data H63*b*1*t* is the version data representing the latest version of Wireless Receiver Controller H63OSt (FIG. 657). Wireless Receiver Controller Version Data H63*b*1*u* is the version data representing the latest version of Wireless Receiver Controller H63OSu (FIG. 657). Wireless Transmitter Controller Version Data H63*b*1*v* is the version data representing the latest version of Wireless Transmitter Controller H63OSv (FIG. 657). Wireless Transmitter Controller Version Data H63*b*1*w* is the version data representing the latest version of Wireless Transmitter Controller H63OSw (FIG. 657). Wireless Transmitter Controller Version Data H63*b*1*x* is the version data representing the latest version of Wireless Transmitter Controller H63OSx (FIG. 657). Here, the version data is composed of numeric data, such as '1', '2', and '3', wherein '1' represents version '1.0', '2' represents version '2.0', and '3' represents version '3.0'. The data stored in OS Version Data Storage Area H63*b*1 are updated periodically.

FIG. 662 and FIG. 663 illustrate the software programs stored in OS Updating Software Storage Area H63*c* (FIG. 658). As described in the present drawing, OS Updating Software Storage Area H63*c* stores Battery Controller Updating Software H63*c*1*a*, CCD Unit Controller Updating Software H63*c*1*b*, Flash Light Unit Controller Updating Software H63*c*1*c*, Indicator Controller Updating Software H63*c*1*d*, Input Device Controller Updating Software H63*c*1*e*, LCD Controller Updating Software H63*c*1*f*, LED Controller Updating Software H63*c*1*g*, Memory Card Interface Controller Updating Software H63*c*1*h*, Microphone Controller Updating Software H63*c*1*i*, Photometer Controller Updating Software H63*c*1*j*, RAM Controller Updating Software H63*c*1*k*, ROM Controller Updating Software H63*c*1*l*, Signal Processor Controller Updating Software H63*c*1*m*, Signal Processor Controller Updating Software H63*c*1*n*, Solar Panel Controller Updating Software H63*c*1*o*, Speaker Controller Updating Software H63*c*1*p*, Vibrator Controller Updating Software H63*c*1*q*, Video Processor Controller Updating Software H63*c*1*r*, Wireless Receiver Controller Updating Software H63*c*1*s*, Wireless Receiver Controller Updating Software H63*c*1*t*, Wireless Receiver Controller Updating Software H63*c*1*u*, Wireless Transmitter Controller Updating Software H63*c*1*v*, Wireless Transmitter Controller Updating Software H63*c*1*w*, and Wireless Transmitter Controller Updating Software. Battery Controller Updating Software H63*c*1*a* is the software program described in FIG. 664 and FIG. 665. CCD Unit Controller Updating Software H63*c*1*b* is the software program described in FIG. 666 and FIG. 667. Flash Light Unit Controller Updating Software H63*c*1*c* is the software program described in FIG. 668 and FIG. 669. Indicator Controller Updating Software H63*c*1*d* is the software program described in FIG. 670 and FIG. 671. Input Device Controller Updating Software H63*c*1*e* is the software program described in FIG. 672 and FIG. 673. LCD Controller Updating Software H63*c*1*f* is the software program described in FIG. 674 and FIG. 675. LED Controller Updating Software H63*c*1*g* is the software program described in FIG. 676 and FIG. 677. Memory Card Interface Controller Updating Software H63*c*1*h* is the software program described in FIG. 678 and FIG. 679. Microphone Controller Updating Software H63*c*1*i* is the software program described in FIG. 680 and FIG. 681. Photometer Controller Updating Software H63*c*1*j* is the software program described in FIG. 682 and FIG. 683. RAM Controller Updating Software H63*c*1*k* is the software program described in FIG. 684 and FIG. 685. ROM Controller Updating Software H63*c*1*l* is the software program described in FIG. 686 and FIG. 687. Signal Processor Controller Updating Software H63*c*1*m* is the software program described in FIG. 688 and FIG. 689. Signal Processor Controller Updating Software H63*c*1*n* is the software program described in FIG. 690 and FIG. 691. Solar Panel Controller Updating Software H63*c*1*o* is the software program described in FIG. 692 and FIG. 693. Speaker Controller Updating Software H63*c*1*p* is the software program described in FIG. 694 and FIG. 695. Vibrator Controller Updating Software H63*c*1*q* is the software program described in FIG. 696 and FIG. 697. Video Processor Controller Updating Software H63*c*1*r* is the software program described in FIG. 698 and FIG. 699. Wireless Receiver Controller Updating Software H63*c*1*s* is the software program described in FIG. 700 and FIG. 701. Wireless Receiver Controller Updating Software H63*c*1*t* is the software program described in FIG. 702 and FIG. 703. Wireless Receiver Controller Updating Software H63*c*1*u* is the software program described in FIG. 704 and FIG. 705. Wireless Transmitter Controller Updating Software H63*c*1*v* is the software program described in FIG. 706 and FIG. 707. Wireless Transmitter Controller Updating Software H63*c*1*w* is the software program described in FIG. 708 and FIG. 709. Wireless Transmitter Controller Updating Software H63*c*1*x* is the software program described in FIG. 710 and FIG. 711. The foregoing software programs are automatically implemented periodically or implemented manually by utilizing Input Device 210 (FIG. 1) or via voice recognition system.

FIG. 664 illustrates Battery Controller Updating Software H63*c*1*a* (FIG. 662) of Host H and Battery Controller Updating Software 20663*c*1*a* (FIG. 653) of Communication Device 200, which update Battery Controller 20663OSa stored in Operating System 20663OS (FIG. 647) of Communication Device 200. As described in the present drawing, CPU 211 (FIG. 1) of Communication Device 200 retrieves Battery Controller Version Data 20663*b*1*a* from OS Version Data Storage Area 20663*b*1 (FIG. 651) and sends the data to Host H (S1). Upon receiving Battery Controller Version Data 20663*b*1*a* (FIG. 651) from Communication Device 200 (S2), Host H compares Battery Controller Version Data 20663*b*1*a* (FIG. 651) with Battery Controller Version Data H63*b*1*a* stored in OS Version Data Storage Area H63*b*1 (FIG. 660) of Host H (S3). Assuming that Host H detects in S3 that Battery Controller Version Data 20663*b*1*a* of Communication Device 200 is of an old version. Host H retrieves Battery Controller H63OSa, which is of the latest version, from Operating System Storage Area H63OS (FIG. 656), and sends the controller to Communication Device 200 (S4). Upon receiving Battery Controller H63OSa from Host H (S5), CPU 211 stores Battery Controller H63OSa as Battery Controller 20663OSa in Operating System 20663OS (FIG. 647) (S6). The old version of Battery Controller 20663OSa (FIG. 647) is deleted.

FIG. 665 illustrates another embodiment of Battery Controller Updating Software H63*c*1*a* (FIG. 662) of Host H and Battery Controller Updating Software 20663*c*1*a* (FIG. 653) of Communication Device 200, which update Battery Controller 20663OSa stored in Operating System 20663OS (FIG. 647) of Communication Device 200. As described in the present drawing, CPU 211 (FIG. 1) of Communication Device 200 sends a Battery Controller Update Request, which is received by Host H (S1). Here, the Battery Controller Update Request is a request to send Battery Controller Version Data H63*b*1*a* (FIG. 660) stored in Host H to Communication Device 200. In response to the request, Host H retrieves Battery Controller Version Data H63*b*1*a* from OS Version Data Storage Area H63*b*1 (FIG. 660), and sends the data to Communication Device 200 (S2). Upon receiving Battery Controller Version Data H63*b*1*a* from Host H (S3), CPU 211 compares Battery Controller Version Data H63*b*1*a* with Battery Controller Version Data 20663*b*1*a* stored in OS Version Data Storage Area 20663*b*1 (FIG. 651) of Communication Device 200 (S4). Assuming that CPU211 detects in S4 that Battery Controller Version Data 20663*b*1*a* of Communication Device 200 is of an old version. CPU 211 sends a New Battery Controller Sending Request, which is received by Host H (S5). Here, the New Battery Controller Sending Request is a request to send Battery Controller H63OSa (FIG. 656) stored in Host H to Communication Device 200. Host H retrieves Battery Controller H63OSa (FIG. 656), which is of the latest version, from Operating System Storage Area H63OS (FIG. 656), and sends the controller to Communication Device 200 (S6). Upon receiving Battery Controller H63OSa from Host H (S7), CPU 211 stores Battery Controller H63OSa as Battery Controller 20663OSa in Operating System 20663OS (FIG. 647) (S8). The old version of Battery Controller 20663OSa (FIG. 647) is deleted.

FIG. 666 illustrates CCD Unit Controller Updating Software H63*c*1*b* (FIG. 662) of Host H and CCD Unit Controller Updating Software 20663*c*1*b* (FIG. 653) of Communication Device 200, which update CCD Unit Controller 20663OSb stored in Operating System 20663OS (FIG. 647) of Communication Device 200. As described in the present drawing, CPU 211 (FIG. 1) of Communication Device 200 retrieves CCD Unit Controller Version Data 20663*b*1*b* from OS Version Data Storage Area 20663*b*1 (FIG. 651) and sends the data to Host H (S1). Upon receiving CCD Unit Controller Version Data 20663*b*1*b* (FIG. 651) from Communication Device 200 (S2), Host H compares CCD Unit Controller Version Data 20663*b*1*b* (FIG. 651) with CCD Unit Controller Version Data H63*b*1*b* stored in OS Version Data Storage Area H63*b*1 (FIG. 660) of Host H (S3). Assuming that Host H detects in S3 that CCD Unit Controller Version Data 20663*b*1*b* of Communication Device 200 is of an old version. Host H retrieves CCD Unit Controller H63OSb, which is of the latest version, from Operating System Storage Area H63OS (FIG. 656), and sends the controller to Communication Device 200 (S4). Upon receiving CCD Unit Controller H63OSb from Host H (S5), CPU 211 stores CCD Unit Controller H63OSb as CCD Unit Controller 20663OSb in Operating System 20663OS (FIG. 647) (S6). The old version of CCD Unit Controller 20663OSb (FIG. 647) is deleted.

FIG. 667 illustrates another embodiment of CCD Unit Controller Updating Software H63*c*1*b* (FIG. 662) of Host H and CCD Unit Controller Updating Software 20663*c*1*b* (FIG. 653) of Communication Device 200, which update CCD Unit Controller 20663OSb stored in Operating System 20663OS (FIG. 647) of Communication Device 200. As described in the present drawing, CPU 211 (FIG. 1) of Communication Device 200 sends a CCD Unit Controller Update Request, which is received by Host H (S1). Here, the CCD Unit Controller Update Request is a request to send CCD Unit Controller Version Data H63*b*1*b* (FIG. 660) stored in Host H to Communication Device 200. In response to the request, Host H retrieves CCD Unit Controller Version Data H63*b*1*b* from OS Version Data Storage Area H63*b*1 (FIG. 660), and sends the data to Communication Device 200 (S2). Upon receiving CCD Unit Controller Version Data H63*b*1*b* from Host H (S3), CPU 211 compares CCD Unit Controller Version Data H63*b*1*b* with CCD Unit Controller Version Data 20663*b*1*b* stored in OS Version Data Storage Area 20663*b*1 (FIG. 651) of Communication Device 200 (S4). Assuming that CPU211 detects in S4 that CCD Unit Controller Version Data 20663*b*1*b* of Communication Device 200 is of an old version. CPU 211 sends a New CCD Unit Controller Sending Request, which is received by Host H (S5). Here, the New CCD Unit Controller Sending Request is a request to send CCD Unit Controller H63OSb (FIG. 656) stored in Host H to Communication Device 200. Host H retrieves CCD Unit Controller H63OSb (FIG. 656), which is of the latest version, from Operating System Storage Area H63OS (FIG. 656), and sends the controller to Communication Device 200 (S6). Upon receiving CCD Unit Controller H63OSb from Host H (S7), CPU 211 stores CCD Unit Controller H63OSb as CCD Unit Controller 20663OSb in Operating System 20663OS (FIG. 647) (S8). The old version of CCD Unit Controller 20663OSb (FIG. 647) is deleted.

FIG. 668 illustrates Flash Light Unit Controller Updating Software H63*c*1*c* (FIG. 662) of Host H and Flash Light Unit Controller Updating Software **20663*c*1*c* (FIG. 653) of Communication Device 200, which update Flash Light Unit Controller 20663OSc stored in Operating System 20663OS (FIG. 647) of Communication Device 200. As described in the present drawing, CPU 211 (FIG. 1) of Communication Device 200 retrieves Flash Light Unit Controller Version Data 20663*b*1*c* from OS Version Data Storage Area 20663*b*1 (FIG. 651) and sends the data to Host H (S1). Upon receiving Flash Light Unit Controller Version Data 20663*b*1*c* (FIG. 651) from Communication Device 200 (S2), Host H compares Flash Light Unit Controller Version Data 20663*b*1*c* (FIG. 651) with Flash Light Unit Controller Version Data H63*b*1*c* stored in OS Version Data Storage Area H63*b*1 (FIG. 660) of Host H (S3). Assuming that Host H detects in S3 that Flash Light Unit Controller Version Data 20663*b*1*c* of Communication Device 200 is of an old version. Host H retrieves Flash Light Unit Controller H63OSc, which is of the latest version, from Operating System Storage Area H63OS (FIG. 656), and sends the controller to Communication Device 200 (S4). Upon receiving Flash Light Unit Controller H63OSc from Host H (S5), CPU 211 stores Flash Light Unit Controller H63OSc as Flash Light Unit Controller 20663OSc in Operating System 20663OS (FIG. 647) (S6). The old version of Flash Light Unit Controller 20663OSc (FIG. 647**) is deleted.

FIG. 669 illustrates another embodiment of Flash Light Unit Controller Updating Software H**63*c*1*c* (FIG. 662) of Host H and Flash Light Unit Controller Updating Software 20663*c*1*c* (FIG. 653) of Communication Device 200, which update Flash Light Unit Controller 20663OSc stored in Operating System 20663OS (FIG. 647) of Communication Device 200. As described in the present drawing, CPU 211 (FIG. 1) of Communication Device 200 sends a Flash Light Unit Controller Update Request, which is received by Host H (S1). Here, the Flash Light Unit Controller Update Request is a request to send Flash Light Unit Controller Version Data H63*b*1*c* (FIG. 660) stored in Host H to Communication Device 200. In response to the request, Host H retrieves Flash Light Unit Controller Version Data H63*b*1*c* from OS Version Data Storage Area H63*b*1 (FIG. 660), and sends the data to Communication Device 200 (S2). Upon receiving Flash Light Unit Controller Version Data H63*b*1*c* from Host H (S3), CPU 211 compares Flash Light Unit Controller Version Data H63*b*1*c* with Flash Light Unit Controller Version Data 20663*b*1*c* stored in OS Version Data Storage Area 20663*b*1 (FIG. 651) of Communication Device 200 (S4). Assuming that CPU211 detects in S4 that Flash Light Unit Controller Version Data 20663*b*1*c* of Communication Device 200 is of an old version. CPU 211 sends a New Flash Light Unit Controller Sending Request, which is received by Host H (S5). Here, the New Flash Light Unit Controller Sending Request is a request to send Flash Light Unit Controller H63OSc (FIG. 656) stored in Host H to Communication Device 200. Host H retrieves Flash Light Unit Controller H63OSc (FIG. 656), which is of the latest version, from Operating System Storage Area H63OS (FIG. 656), and sends the controller to Communication Device 200 (S6). Upon receiving Flash Light Unit Controller H63OSc from Host H (S7), CPU 211 stores Flash Light Unit Controller H63OSc as Flash Light Unit Controller 20663OSc in Operating System 20663OS (FIG. 647) (S8). The old version of Flash Light Unit Controller 20663OSc (FIG. 647**) is deleted.

FIG. 670 illustrates Indicator Controller Updating Software H**63*c*1*d* (FIG. 662) of Host H and Indicator Controller Updating Software 20663*c*1*d* (FIG. 653) of Communication Device 200, which update Indicator Controller 20663OSd stored in Operating System 20663OS (FIG. 647) of Communication Device 200. As described in the present drawing, CPU 211 (FIG. 1) of Communication Device 200 retrieves Indicator Controller Version Data 20663*b*1*d* from OS Version Data Storage Area 20663*b*1 (FIG. 651) and sends the data to Host H (S1). Upon receiving Indicator Controller Version Data 20663*b*1*d* (FIG. 651) from Communication Device 200 (S2), Host H compares Indicator Controller Version Data 20663*b*1*d* (FIG. 651) with Indicator Controller Version Data H63*b*1*d* stored in OS Version Data Storage Area H63*b*1 (FIG. 660) of Host H (S3). Assuming that Host H detects in S3 that Indicator Controller Version Data 20663*b*1*d* of Communication Device 200 is of an old version. Host H retrieves Indicator Controller H63OSd, which is of the latest version, from Operating System Storage Area H63OS (FIG. 656), and sends the controller to Communication Device 200 (S4). Upon receiving Indicator Controller H63OSd from Host H (S5), CPU 211 stores Indicator Controller H63OSd as Indicator Controller 20663OSd in Operating System 20663OS (FIG. 647) (S6). The old version of Indicator Controller 20663OSd (FIG. 647**) is deleted.

FIG. 671 illustrates another embodiment of Indicator Controller Updating Software H**63*c*1*d* (FIG. 662) of Host H and Indicator Controller Updating Software 20663*c*1*d* (FIG. 653) of Communication Device 200, which update Indicator Controller 20663OSd stored in Operating System 20663OS (FIG. 647) of Communication Device 200. As described in the present drawing, CPU 211 (FIG. 1) of Communication Device 200 sends a Indicator Controller Update Request, which is received by Host H (S1). Here, the Indicator Controller Update Request is a request to send Indicator Controller Version Data H63*b*1*d* (FIG. 660) stored in Host H to Communication Device 200. In response to the request, Host H retrieves Indicator Controller Version Data H63*b*1*d* from OS Version Data Storage Area H63*b*1 (FIG. 660), and sends the data to Communication Device 200 (S2). Upon receiving Indicator Controller Version Data H63*b*1*d* from Host H (S3), CPU 211 compares Indicator Controller Version Data H63*b*1*d* with Indicator Controller Version Data 20663*b*1*d* stored in OS Version Data Storage Area 20663*b*1 (FIG. 651) of Communication Device 200 (S4). Assuming that CPU211 detects in S4 that Indicator Controller Version Data 20663*b*1*d* of Communication Device 200 is of an old version. CPU 211 sends a New Indicator Controller Sending Request, which is received by Host H (S5). Here, the New Indicator Controller Sending Request is a request to send Indicator Controller H63OSd (FIG. 656) stored in Host H to Communication Device 200. Host H retrieves Indicator Controller H63OSd (FIG. 656), which is of the latest version, from Operating System Storage Area H63OS (FIG. 656), and sends the controller to Communication Device 200 (S6). Upon receiving Indicator Controller H63OSd from Host H (S7), CPU 211 stores Indicator Controller H63OSd as Indicator Controller 20663OSd in Operating System 20663OS (FIG. 647) (S8). The old version of Indicator Controller 20663OSd (FIG. 647**) is deleted.

FIG. 672 illustrates Input Device Controller Updating Software H**63*c*1*e* (FIG. 662) of Host H and Input Device Controller Updating Software 20663*c*1*e* (FIG. 653) of Communication Device 200, which update Input Device Controller 20663OSe stored in Operating System 20663OS (FIG. 647) of Communication Device 200. As described in the present drawing, CPU 211 (FIG. 1) of Communication Device 200 retrieves Input Device Controller Version Data 20663*b*1*e* from OS Version Data Storage Area 20663*b*1 (FIG. 651) and sends the data to Host H (S1). Upon receiving Input Device Controller Version Data 20663*b*1*e* (FIG. 651) from Communication Device 200 (S2), Host H compares Input Device Controller Version Data 20663*b*1*e* (FIG. 651) with Input Device Controller Version Data H63*b*1*e* stored in OS Version Data Storage Area H63*b*1 (FIG. 660) of Host H (S3). Assuming that Host H detects in S3 that Input Device Controller Version Data 20663*b*1*e* of Communication Device 200 is of an old version. Host H retrieves Input Device Controller H63OSe, which is of the latest version, from Operating System Storage Area H63OS (FIG. 656), and sends the controller to Communication Device 200 (S4). Upon receiving Input Device Controller H63OSe from Host H (S5), CPU 211 stores Input Device Controller H63OSe as Input Device Controller 20663OSe in Operating System 20663OS (FIG. 647) (S6). The old version of Input Device Controller 20663OSe (FIG. 647**) is deleted.

FIG. 673 illustrates another embodiment of Input Device Controller Updating Software H**63*c*1*e* (FIG. 662) of Host H and Input Device Controller Updating Software 20663*c*1*e* (FIG. 653) of Communication Device 200, which update Input Device Controller 20663OSe stored in Operating System 20663OS (FIG. 647) of Communication Device 200. As described in the present drawing, CPU 211 (FIG. 1) of Communication Device 200 sends a Input Device Controller Update Request, which is received by Host H (S1). Here, the Input Device Controller Update Request is a request to send Input Device Controller Version Data H63*b*1*e* (FIG. 660) stored in Host H to Communication Device 200. In response to the request, Host H retrieves Input Device Controller Version Data H63*b*1*e* from OS Version Data Storage Area H63*b*1 (FIG. 660), and sends the data to Communication Device 200 (S2). Upon receiving Input Device Controller Version Data H63*b*1*e* from Host H (S3), CPU 211 compares Input Device Controller Version Data H63*b*1*e* with Input Device Controller Version Data 20663*b*1*e* stored in OS Version Data Storage Area 20663*b*1 (FIG. 651) of Communication Device 200 (S4). Assuming that CPU211 detects in S4 that Input Device Controller Version Data 20663*b*1*e* of Communication Device 200 is of an old version. CPU 211 sends a New Input Device Controller Sending Request, which is received by Host H (S5). Here, the New Input Device Controller Sending Request is a request to send Input Device Controller H63OSe (FIG. 656) stored in Host H to Communication Device 200. Host H retrieves Input Device Controller H63OSe (FIG. 656), which is of the latest version, from Operating System Storage Area H63OS (FIG. 656), and sends the controller to Communication Device 200 (S6). Upon receiving Input Device Controller H63OSe from Host H (S7), CPU 211 stores Input Device Controller H63OSe as Input Device Controller 20663OSe in Operating System 20663OS (FIG. 647) (S8). The old version of Input Device Controller 20663OSe (FIG. 647**) is deleted.

FIG. 674 illustrates LCD Controller Updating Software H**63*c*1*f* (FIG. 662) of Host H and LCD Controller Updating Software 20663*c*1*f* (FIG. 653) of Communication Device 200, which update LCD Controller 20663OSf stored in Operating System 20663OS (FIG. 647) of Communication Device 200. As described in the present drawing, CPU 211 (FIG. 1) of Communication Device 200 retrieves LCD Controller Version Data 20663*b*1*f* from OS Version Data Storage Area 20663*b*1 (FIG. 651) and sends the data to Host H (S1). Upon receiving LCD Controller Version Data 20663*b*1*f* (FIG. 651) from Communication Device 200 (S2), Host H compares LCD Controller Version Data 20663*b*1*f* (FIG. 651) with LCD Controller Version Data H63*b*1*f* stored in OS Version Data Storage Area H63*b*1 (FIG. 660) of Host H (S3). Assuming that Host H detects in S3 that LCD Controller Version Data 20663*b*1*f* of Communication Device 200 is of an old version. Host H retrieves LCD Controller H63OSf, which is of the latest version, from Operating System Storage Area H63OS (FIG. 656), and sends the controller to Communication Device 200 (S4). Upon receiving LCD Controller H63OSf from Host H (S5), CPU 211 stores LCD Controller H63OSf as LCD Controller 20663OSf in Operating System 20663OS (FIG. 647) (S6). The old version of LCD Controller 20663OSf (FIG. 647**) is deleted.

FIG. 675 illustrates another embodiment of LCD Controller Updating Software H**63*c*1*f* (FIG. 662) of Host H and LCD Controller Updating Software 20663*c*1*f* (FIG. 653) of Communication Device 200, which update LCD Controller 20663OSf stored in Operating System 20663OS (FIG. 647) of Communication Device 200. As described in the present drawing, CPU 211 (FIG. 1) of Communication Device 200 sends a LCD Controller Update Request, which is received by Host H (S1). Here, the LCD Controller Update Request is a request to send LCD Controller Version Data H63*b*1*f* (FIG. 660) stored in Host H to Communication Device 200. In response to the request, Host H retrieves LCD Controller Version Data H63*b*1*f* from OS Version Data Storage Area H63*b*1 (FIG. 660), and sends the data to Communication Device 200 (S2). Upon receiving LCD Controller Version Data H63*b*1*f* from Host H (S3), CPU 211 compares LCD Controller Version Data H63*b*1*f* with LCD Controller Version Data 20663*b*1*f* stored in OS Version Data Storage Area 20663*b*1 (FIG. 651) of Communication Device 200 (S4). Assuming that CPU211 detects in S4 that LCD Controller Version Data 20663*b*1*f* of Communication Device 200 is of an old version. CPU 211 sends a New LCD Controller Sending Request, which is received by Host H (S5). Here, the New LCD Controller Sending Request is a request to send LCD Controller H63OSf (FIG. 656) stored in Host H to Communication Device 200. Host H retrieves LCD Controller H63OSf (FIG. 656), which is of the latest version, from Operating System Storage Area H63OS (FIG. 656), and sends the controller to Communication Device 200 (S6). Upon receiving LCD Controller H63OSf from Host H (S7), CPU 211 stores LCD Controller H63OSf as LCD Controller 20663OSf in Operating System 20663OS (FIG. 647) (S8). The old version of LCD Controller 20663OSf (FIG. 647**) is deleted.

FIG. 676 illustrates LED Controller Updating Software H**63*c*1*g* (FIG. 662) of Host H and LED Controller Updating Software 20663*c*1*g* (FIG. 653) of Communication Device 200, which update LED Controller 20663OSg stored in Operating System 20663OS (FIG. 647) of Communication Device 200. As described in the present drawing, CPU 211 (FIG. 1) of Communication Device 200 retrieves LED Controller Version Data 20663*b*1*g* from OS Version Data Storage Area 20663*b*1 (FIG. 651) and sends the data to Host H (S1). Upon receiving LED Controller Version Data 20663*b*1*g* (FIG. 651) from Communication Device 200 (S2), Host H compares LED Controller Version Data 20663*b*1*g* (FIG. 651) with LED Controller Version Data H63*b*1*g* stored in OS Version Data Storage Area H63*b*1 (FIG. 660) of Host H (S3). Assuming that Host H detects in S3 that LED Controller Version Data 20663*b*1*g* of Communication Device 200 is of an old version. Host H retrieves LED Controller H63OSg, which is of the latest version, from Operating System Storage Area H63OS (FIG. 656), and sends the controller to Communication Device 200 (S4). Upon receiving LED Controller H63OSg from Host H (S5), CPU 211 stores LED Controller H63OSg as LED Controller 20663OSg in Operating System 20663OS (FIG. 647) (S6). The old version of LED Controller 20663OSg (FIG. 647**) is deleted.

FIG. 677 illustrates another embodiment of LED Controller Updating Software H**63*c*1*g* (FIG. 662) of Host H and LED Controller Updating Software 20663*c*1*g* (FIG. 653) of Communication Device 200, which update LED Controller 20663OSg stored in Operating System 20663OS (FIG. 647) of Communication Device 200. As described in the present drawing, CPU 211 (FIG. 1) of Communication Device 200 sends a LED Controller Update Request, which is received by Host H (S1). Here, the LED Controller Update Request is a request to send LED Controller Version Data H63*b*1*g* (FIG. 660) stored in Host H to Communication Device 200. In response to the request, Host H retrieves LED Controller Version Data H63*b*1*g* from OS Version Data Storage Area H63*b*1 (FIG. 660), and sends the data to Communication Device 200 (S2). Upon receiving LED Controller Version Data H63*b*1*g* from Host H (S3), CPU 211 compares LED Controller Version Data H63*b*1*g* with LED Controller Version Data 20663*b*1*g* stored in OS Version Data Storage Area 20663*b*1 (FIG. 651) of Communication Device 200 (S4). Assuming that CPU211 detects in S4 that LED Controller Version Data 20663*b*1*g* of Communication Device 200 is of an old version. CPU 211 sends a New LED Controller Sending Request, which is received by Host H (S5). Here, the New LED Controller Sending Request is a request to send LED Controller H63OSg (FIG. 656) stored in Host H to Communication Device 200. Host H retrieves LED Controller H63OSg (FIG. 656), which is of the latest version, from Operating System Storage Area H63OS (FIG. 656), and sends the controller to Communication Device 200 (S6). Upon receiving LED Controller H63OSg from Host H (S7), CPU 211 stores LED Controller H63OSg as LED Controller 20663OSg in Operating System 20663OS (FIG. 647) (S8). The old version of LED Controller 20663OSg (FIG. 647**) is deleted.

FIG. 678 illustrates Memory Card Interface Controller Updating Software H**63*c*1*h* (FIG. 662) of Host H and Memory Card Interface Controller Updating Software 20663*c*1*h* (FIG. 653) of Communication Device 200, which update Memory Card Interface Controller 20663OSh stored in Operating System 20663OS (FIG. 647) of Communication Device 200. As described in the present drawing, CPU 211 (FIG. 1) of Communication Device 200 retrieves Memory Card Interface Controller Version Data 20663*b*1*h* from OS Version Data Storage Area 20663*b*1 (FIG. 651) and sends the data to Host H (S1). Upon receiving Memory Card Interface Controller Version Data 20663*b*1*h* (FIG. 651) from Communication Device 200 (S2), Host H compares Memory Card Interface Controller Version Data 20663*b*1*h* (FIG. 651) with Memory Card Interface Controller Version Data H63*b*1*h* stored in OS Version Data Storage Area H63*b*1 (FIG. 660) of Host H (S3). Assuming that Host H detects in S3 that Memory Card Interface Controller Version Data 20663*b*1*h* of Communication Device 200 is of an old version. Host H retrieves Memory Card Interface Controller H63OSh, which is of the latest version, from Operating System Storage Area H63OS (FIG. 656), and sends the controller to Communication Device 200 (S4). Upon receiving Memory Card Interface Controller H63OSh from Host H (S5), CPU 211 stores Memory Card Interface Controller H63OSh as Memory Card Interface Controller 20663OSh in Operating System 20663OS (FIG. 647) (S6). The old version of Memory Card Interface Controller 20663OSh (FIG. 647**) is deleted.

FIG. 679 illustrates another embodiment of Memory Card Interface Controller Updating Software H**63*c*1*h* (FIG. 662) of Host H and Memory Card Interface Controller Updating Software 20663*c*1*h* (FIG. 653) of Communication Device 200, which update Memory Card Interface Controller 20663OSh stored in Operating System 20663OS (FIG. 647) of Communication Device 200. As described in the present drawing, CPU 211 (FIG. 1) of Communication Device 200 sends a Memory Card Interface Controller Update Request, which is received by Host H (S1). Here, the Memory Card Interface Controller Update Request is a request to send Memory Card Interface Controller Version Data H63*b*1*h* (FIG. 660) stored in Host H to Communication Device 200. In response to the request, Host H retrieves Memory Card Interface Controller Version Data H63*b*1*h* from OS Version Data Storage Area H63*b*1 (FIG. 660), and sends the data to Communication Device 200 (S2). Upon receiving Memory Card Interface Controller Version Data H63*b*1*h* from Host H (S3), CPU 211 compares Memory Card Interface Controller Version Data H63*b*1*h* with Memory Card Interface Controller Version Data 20663*b*1*h* stored in OS Version Data Storage Area 20663*b*1 (FIG. 651) of Communication Device 200 (S4). Assuming that CPU211 detects in S4 that Memory Card Interface Controller Version Data 20663*b*1*h* of Communication Device 200 is of an old version. CPU 211 sends a New Memory Card Interface Controller Sending Request, which is received by Host H (S5). Here, the New Memory Card Interface Controller Sending Request is a request to send Memory Card Interface Controller H63OSh (FIG. 656) stored in Host H to Communication Device 200. Host H retrieves Memory Card Interface Controller H63OSh (FIG. 656), which is of the latest version, from Operating System Storage Area H63OS (FIG. 656), and sends the controller to Communication Device 200 (S6). Upon receiving Memory Card Interface Controller H63OSh from Host H (S7), CPU 211 stores Memory Card Interface Controller H63OSh as Memory Card Interface Controller 20663OSh in Operating System 20663OS (FIG. 647) (S8). The old version of Memory Card Interface Controller 20663OSh (FIG. 647**) is deleted.

FIG. 680 illustrates Microphone Controller Updating Software H**63*c*1*i* (FIG. 662) of Host H and Microphone Controller Updating Software 20663*c*1*i* (FIG. 653) of Communication Device 200, which update Microphone Controller 20663OSi stored in Operating System 20663OS (FIG. 647) of Communication Device 200. As described in the present drawing, CPU 211 (FIG. 1) of Communication Device 200 retrieves Microphone Controller Version Data 20663*b*1*i* from OS Version Data Storage Area 20663*b*1 (FIG. 651) and sends the data to Host H (S1). Upon receiving Microphone Controller Version Data 20663*b*1*i* (FIG. 651) from Communication Device 200 (S2), Host H compares Microphone Controller Version Data 20663*b*1*i* (FIG. 651) with Microphone Controller Version Data H63*b*1*i* stored in OS Version Data Storage Area H63*b*1 (FIG. 660) of Host H (S3). Assuming that Host H detects in S3 that Microphone Controller Version Data 20663*b*1*i* of Communication Device 200 is of an old version. Host H retrieves Microphone Controller H63OSi, which is of the latest version, from Operating System Storage Area H63OS (FIG. 656), and sends the controller to Communication Device 200 (S4). Upon receiving Microphone Controller H63OSi from Host H (S5), CPU 211 stores Microphone Controller H63OSi as Microphone Controller 20663OSi in Operating System 20663OS (FIG. 647) (S6). The old version of Microphone Controller 20663OSi (FIG. 647**) is deleted.

FIG. 681 illustrates another embodiment of Microphone Controller Updating Software H**63*c*1*i* (FIG. 662) of Host H and Microphone Controller Updating Software 20663*c*1*i* (FIG. 653) of Communication Device 200, which update Microphone Controller 20663OSi stored in Operating System 20663OS (FIG. 647) of Communication Device 200. As described in the present drawing, CPU 211 (FIG. 1) of Communication Device 200 sends a Microphone Controller Update Request, which is received by Host H (S1**). Here, the Microphone Controller Update Request is a request to send Microphone Controller Version Data H63*b*1*i* (FIG. 660) stored in Host H to Communication Device 200. In response to the request, Host H retrieves Microphone Controller Version Data H63*b*1*i* from OS Version Data Storage Area H63*b*1 (FIG. 660), and sends the data to Communication Device 200 (S2). Upon receiving Microphone Controller Version Data H63*b*1*i* from Host H (S3), CPU 211 compares Microphone Controller Version Data H63*b*1*i* with Microphone Controller Version Data **20663*b*1*i* stored in OS Version Data Storage Area 20663*b*1 (FIG. 651) of Communication Device 200 (S4). Assuming that CPU211 detects in S4 that Microphone Controller Version Data 20663*b*1*i* of Communication Device 200 is of an old version. CPU 211 sends a New Microphone Controller Sending Request, which is received by Host H (S5). Here, the New Microphone Controller Sending Request is a request to send Microphone Controller H63OSi (FIG. 656) stored in Host H to Communication Device 200. Host H retrieves Microphone Controller H63OSi (FIG. 656), which is of the latest version, from Operating System Storage Area H63OS (FIG. 656), and sends the controller to Communication Device 200 (S6). Upon receiving Microphone Controller H63OSi from Host H (S7), CPU 211 stores Microphone Controller H63OSi as Microphone Controller 20663OSi in Operating System 20663OS (FIG. 647) (S8). The old version of Microphone Controller 20663OSi (FIG. 647**) is deleted.

FIG. 682 illustrates Photometer Controller Updating Software H63*c*1*j* (FIG. 662) of Host H and Photometer Controller Updating Software **20663*c*1*j* (FIG. 653) of Communication Device 200, which update Photometer Controller 20663OSj stored in Operating System 20663OS (FIG. 647) of Communication Device 200. As described in the present drawing, CPU 211 (FIG. 1) of Communication Device 200 retrieves Photometer Controller Version Data 20663*b*1*j* from OS Version Data Storage Area 20663*b*1 (FIG. 651) and sends the data to Host H (S1). Upon receiving Photometer Controller Version Data 20663*b*1*j* (FIG. 651) from Communication Device 200 (S2), Host H compares Photometer Controller Version Data 20663*b*1*j* (FIG. 651**) with Photometer Controller Version Data H63*b*1*j* stored in OS Version Data Storage Area H63*b*1 (FIG. 660) of Host H (S3). Assuming that Host H detects in S3 that Photometer Controller Version Data **20663*b*1*j* of Communication Device 200 is of an old version. Host H retrieves Photometer Controller H63OSj, which is of the latest version, from Operating System Storage Area H63OS (FIG. 656), and sends the controller to Communication Device 200 (S4). Upon receiving Photometer Controller H63OSj from Host H (S5), CPU 211 stores Photometer Controller H63OSj as Photometer Controller 20663OSj in Operating System 20663OS (FIG. 647) (S6). The old version of Photometer Controller 20663OSj (FIG. 647**) is deleted.

FIG. 683 illustrates another embodiment of Photometer Controller Updating Software H63*c*1*j* (FIG. 662) of Host H and Photometer Controller Updating Software **20663*c*1*j* (FIG. 653) of Communication Device 200, which update Photometer Controller 20663OSj stored in Operating System 20663OS (FIG. 647) of Communication Device 200. As described in the present drawing, CPU 211 (FIG. 1) of Communication Device 200** sends a Photometer Controller Update Request, which is received by Host H (S1). Here, the Photometer Controller Update Request is a request to send Photometer Controller Version Data H63*b*1*j* (FIG. 660) stored in Host H to Communication Device 200. In response to the request, Host H retrieves Photometer Controller Version Data H63*b*1*j* from OS Version Data Storage Area H63*b*1 (FIG. 660), and sends the data to Communication Device 200 (S2). Upon receiving Photometer Controller Version Data H63*b*1*j* from Host H (S3), CPU 211 compares Photometer Controller Version Data H63*b*1*j* with Photometer Controller Version Data **20663*b*1*j* stored in OS Version Data Storage Area 20663*b*1 (FIG. 651) of Communication Device 200 (S4). Assuming that CPU211 detects in S4 that Photometer Controller Version Data 20663*b*1*j* of Communication Device 200 is of an old version. CPU 211 sends a New Photometer Controller Sending Request, which is received by Host H (S5). Here, the New Photometer Controller Sending Request is a request to send Photometer Controller H63OSj (FIG. 656) stored in Host H to Communication Device 200. Host H retrieves Photometer Controller H63OSj (FIG. 656), which is of the latest version, from Operating System Storage Area H63OS (FIG. 656), and sends the controller to Communication Device 200 (S6). Upon receiving Photometer Controller H63OSj from Host H (S7), CPU 211 stores Photometer Controller H63OSj as Photometer Controller 20663OSj in Operating System 20663OS (FIG. 647) (S8). The old version of Photometer Controller 20663OSj (FIG. 647**) is deleted.

FIG. 684 illustrates RAM Controller Updating Software H63*c*1*k* (FIG. 662) of Host H and RAM Controller Updating Software **20663*c*1*k* (FIG. 653) of Communication Device 200, which update RAM Controller 20663OSk stored in Operating System 20663OS (FIG. 647) of Communication Device 200. As described in the present drawing, CPU 211 (FIG. 1) of Communication Device 200 retrieves RAM Controller Version Data 20663*b*1*k* from OS Version Data Storage Area 20663*b*1 (FIG. 651) and sends the data to Host H (S1). Upon receiving RAM Controller Version Data 20663*b*1*k* (FIG. 651) from Communication Device 200 (S2), Host H compares RAM Controller Version Data 20663*b*1*k* (FIG. 651**) with RAM Controller Version Data H63*b*1*k* stored in OS Version Data Storage Area H63*b*1 (FIG. 660) of Host H (S3). Assuming that Host H detects in S3 that RAM Controller Version Data **20663*b*1*k* of Communication Device 200 is of an old version. Host H retrieves RAM Controller H63OSk, which is of the latest version, from Operating System Storage Area H63OS (FIG. 656), and sends the controller to Communication Device 200 (S4). Upon receiving RAM Controller H63OSk from Host H (S5), CPU 211 stores RAM Controller H63OSk as RAM Controller 20663OSk in Operating System 20663OS (FIG. 647) (S6). The old version of RAM Controller 20663OSk (FIG. 647**) is deleted.

FIG. 685 illustrates another embodiment of RAM Controller Updating Software H63*c*1*k* (FIG. 662) of Host H and RAM Controller Updating Software **20663*c*1*k* (FIG. 653) of Communication Device 200, which update RAM Controller 20663OSk stored in Operating System 20663OS (FIG. 647) of Communication Device 200. As described in the present drawing, CPU 211 (FIG. 1) of Communication Device 200** sends a RAM Controller Update Request, which is received by Host H (S1). Here, the RAM Controller Update Request is a request to send RAM Controller Version Data H63*b*1*k* (FIG. 660) stored in Host H to Communication Device 200. In response to the request, Host H retrieves RAM Controller Version Data H63*b*1*k* from OS Version Data Storage Area H63*b*1 (FIG. 660), and sends the data to Communication Device 200 (S2). Upon receiving RAM Controller Version Data H63*b*1*k* from Host H (S3), CPU 211 compares RAM Controller Version Data H63*b*1*k* with RAM Controller Version Data **20663*b*1*k* stored in OS Version Data Storage Area 20663*b*1 (FIG. 651) of Communication Device 200 (S4). Assuming that CPU211 detects in S4 that RAM Controller Version Data 20663*b*1*k* of Communication Device 200 is of an old version. CPU 211 sends a New RAM Controller Sending Request, which is received by Host H (S5). Here, the New RAM Controller Sending Request is a request to send RAM Controller H63OSk (FIG. 656) stored in Host H to Communication Device 200. Host H retrieves RAM Controller H63OSk (FIG. 656), which is of the latest version, from Operating System Storage Area H63OS (FIG. 656), and sends the controller to Communication Device 200 (S6). Upon receiving RAM Controller H63OSk from Host H (S7), CPU 211 stores RAM Controller H63OSk as RAM Controller 20663OSk in Operating System 20663OS (FIG. 647) (S8). The old version of RAM Controller 20663OSk (FIG. 647**) is deleted.

FIG. 686 illustrates ROM Controller Updating Software H63*c*1*l* (FIG. 662) of Host H and ROM Controller Updating Software 20663*c*1*l* (FIG. 653) of Communication Device 200, which update ROM Controller 20663OSl stored in Operating System 20663OS (FIG. 647) of Communication Device 200. As described in the present drawing, CPU 211 (FIG. 1) of Communication Device 200 retrieves ROM Controller Version Data 20663*b*1*l* from OS Version Data Storage Area 20663*b*1 (FIG. 651) and sends the data to Host H (S1). Upon receiving ROM Controller Version Data 20663*b*1*l* (FIG. 651) from Communication Device 200 (S2), Host H compares ROM Controller Version Data 20663*b*1*l* (FIG. 651) with ROM Controller Version Data H63*b*1*l* stored in OS Version Data Storage Area H63*b*1 (FIG. 660) of Host H (S3). Assuming that Host H detects in S3 that ROM Controller Version Data 20663*b*1*l* of Communication Device 200 is of an old version. Host H retrieves ROM Controller H63OSl, which is of the latest version, from Operating System Storage Area H63OS (FIG. 656), and sends the controller to Communication Device 200 (S4). Upon receiving ROM Controller H63OSl from Host H (S5), CPU 211 stores ROM Controller H63OSl as ROM Controller 20663OSl in Operating System 20663OS (FIG. 647) (S6). The old version of ROM Controller 20663OSl (FIG. 647) is deleted.

FIG. 687 illustrates another embodiment of ROM Controller Updating Software H63*c*1*l* (FIG. 662) of Host H and ROM Controller Updating Software 20663*c*1*l* (FIG. 653) of Communication Device 200, which update ROM Controller 20663OSl stored in Operating System 20663OS (FIG. 647) of Communication Device 200. As described in the present drawing, CPU 211 (FIG. 1) of Communication Device 200 sends a ROM Controller Update Request, which is received by Host H (S1). Here, the ROM Controller Update Request is a request to send ROM Controller Version Data H63*b*1*l* (FIG. 660) stored in Host H to Communication Device 200. In response to the request, Host H retrieves ROM Controller Version Data H63*b*1*l* from OS Version Data Storage Area H63*b*1 (FIG. 660), and sends the data to Communication Device 200 (S2). Upon receiving ROM Controller Version Data H63*b*1*l* from Host H (S3), CPU 211 compares ROM Controller Version Data H63*b*1*l* with ROM Controller Version Data 20663*b*1*l* stored in OS Version Data Storage Area 20663*b*1 (FIG. 651) of Communication Device 200 (S4). Assuming that CPU211 detects in S4 that ROM Controller Version Data 20663*b*1*l* of Communication Device 200 is of an old version. CPU 211 sends a New ROM Controller Sending Request, which is received by Host H (S5). Here, the New ROM Controller Sending Request is a request to send ROM Controller H63OSl (FIG. 656) stored in Host H to Communication Device 200. Host H retrieves ROM Controller H63OSl (FIG. 656), which is of the latest version, from Operating System Storage Area H63OS (FIG. 656), and sends the controller to Communication Device 200 (S6). Upon receiving ROM Controller H63OSl from Host H (S7), CPU 211 stores ROM Controller H63OSl as ROM Controller 20663OSl in Operating System 20663OS (FIG. 647) (S8). The old version of ROM Controller 20663OSl (FIG. 647) is deleted.

FIG. 688 illustrates Signal Processor Controller Updating Software H63*c*1*m* (FIG. 663) of Host H and Signal Processor Controller Updating Software 20663*c*1*m* (FIG. 654) of Communication Device 200, which update Signal Processor Controller 20663OSm stored in Operating System 20663OS (FIG. 648) of Communication Device 200. As described in the present drawing, CPU 211 (FIG. 1) of Communication Device 200 retrieves Signal Processor Controller Version Data 20663*b*1*m* from OS Version Data Storage Area 20663*b*1 (FIG. 652) and sends the data to Host H (S1). Upon receiving Signal Processor Controller Version Data 20663*b*1*m* (FIG. 652) from Communication Device 200 (S2), Host H compares Signal Processor Controller Version Data 20663*b*1*m* (FIG. 652) with Signal Processor Controller Version Data H63*b*1*m* stored in OS Version Data Storage Area H63*b*1 (FIG. 661) of Host H (S3). Assuming that Host H detects in S3 that Signal Processor Controller Version Data 20663*b*1*m* of Communication Device 200 is of an old version. Host H retrieves Signal Processor Controller H63OSm, which is of the latest version, from Operating System Storage Area H63OS (FIG. 657), and sends the controller to Communication Device 200 (S4). Upon receiving Signal Processor Controller H63OSm from Host H (S5), CPU 211 stores Signal Processor Controller H63OSm as Signal Processor Controller 20663OSm in Operating System 20663OS (FIG. 648) (S6). The old version of Signal Processor Controller 20663OSm (FIG. 648) is deleted.

FIG. 689 illustrates another embodiment of Signal Processor Controller Updating Software H63*c*1*m* (FIG. 663) of Host H and Signal Processor Controller Updating Software 20663*c*1*m* (FIG. 654) of Communication Device 200, which update Signal Processor Controller 20663OSm stored in Operating System 20663OS (FIG. 648) of Communication Device 200. As described in the present drawing, CPU 211 (FIG. 1) of Communication Device 200 sends a Signal Processor Controller Update Request, which is received by Host H (S1). Here, the Signal Processor Controller Update Request is a request to send Signal Processor Controller Version Data H63*b*1*m* (FIG. 661) stored in Host H to Communication Device 200. In response to the request, Host H retrieves Signal Processor Controller Version Data H63*b*1*m* from OS Version Data Storage Area H63*b*1 (FIG. 661), and sends the data to Communication Device 200 (S2). Upon receiving Signal Processor Controller Version Data H63*b*1*m* from Host H (S3), CPU 211 compares Signal Processor Controller Version Data H63*b*1*m* with Signal Processor Controller Version Data 20663*b*1*m* stored in OS Version Data Storage Area 20663*b*1 (FIG. 652) of Communication Device 200 (S4). Assuming that CPU211 detects in S4 that Signal Processor Controller Version Data 20663*b*1*m* of Communication Device 200 is of an old version. CPU 211 sends a New Signal Processor Controller Sending Request, which is received by Host H (S5). Here, the New Signal Processor Controller Sending Request is a request to send Signal Processor Controller H63OSm (FIG. 657) stored in Host H to Communication Device 200. Host H retrieves Signal Processor Controller H63OSm (FIG. 657), which is of the latest version, from Operating System Storage Area H63OS (FIG. 657), and sends the controller to Communication Device 200 (S6). Upon receiving Signal Processor Controller H63OSm from Host H (S7), CPU 211 stores Signal Processor Controller H63OSm as Signal Processor Controller 20663OSm in Operating System 20663OS (FIG. 648) (S8). The old version of Signal Processor Controller 20663OSm (FIG. 648) is deleted.

FIG. 690 illustrates Signal Processor Controller Updating Software H63*c*1*n* (FIG. 663) of Host H and Signal Processor Controller Updating Software 20663*c*1*n* (FIG. 654) of Communication Device 200, which update Signal Processor Controller 20663OSn stored in Operating System 20663OS (FIG. 648) of Communication Device 200. As described in the present drawing, CPU 211 (FIG. 1) of Communication Device 200 retrieves Signal Processor Controller Version Data **20663*b*1*n* from OS Version Data Storage Area 20663*b*1 (FIG. 652) and sends the data to Host H (S1). Upon receiving Signal Processor Controller Version Data 20663*b*1*n* (FIG. 652) from Communication Device 200 (S2), Host H compares Signal Processor Controller Version Data 20663*b*1*n* (FIG. 652) with Signal Processor Controller Version Data H63*b*1*n* stored in OS Version Data Storage Area H63*b*1 (FIG. 661) of Host H (S3). Assuming that Host H detects in S3 that Signal Processor Controller Version Data 20663*b*1*n* of Communication Device 200 is of an old version. Host H retrieves Signal Processor Controller H63OSn, which is of the latest version, from Operating System Storage Area H63OS (FIG. 657), and sends the controller to Communication Device 200 (S4). Upon receiving Signal Processor Controller H63OSn from Host H (S5), CPU 211 stores Signal Processor Controller H63OSn as Signal Processor Controller 20663OSn in Operating System 20663OS (FIG. 648) (S6). The old version of Signal Processor Controller 20663OSn (FIG. 648**) is deleted.

FIG. 691 illustrates another embodiment of Signal Processor Controller Updating Software H**63*c*1*n* (FIG. 663) of Host H and Signal Processor Controller Updating Software 20663*c*1*n* (FIG. 654) of Communication Device 200, which update Signal Processor Controller 20663OSn stored in Operating System 20663OS (FIG. 648) of Communication Device 200. As described in the present drawing, CPU 211 (FIG. 1) of Communication Device 200 sends a Signal Processor Controller Update Request, which is received by Host H (S1). Here, the Signal Processor Controller Update Request is a request to send Signal Processor Controller Version Data H63*b*1*n* (FIG. 661) stored in Host H to Communication Device 200. In response to the request, Host H retrieves Signal Processor Controller Version Data H63*b*1*n* from OS Version Data Storage Area H63*b*1 (FIG. 661), and sends the data to Communication Device 200 (S2). Upon receiving Signal Processor Controller Version Data H63*b*1*n* from Host H (S3), CPU 211 compares Signal Processor Controller Version Data H63*b*1*n* with Signal Processor Controller Version Data 20663*b*1*n* stored in OS Version Data Storage Area 20663*b*1 (FIG. 652) of Communication Device 200 (S4). Assuming that CPU211 detects in S4 that Signal Processor Controller Version Data 20663*b*1*n* of Communication Device 200 is of an old version. CPU 211 sends a New Signal Processor Controller Sending Request, which is received by Host H (S5). Here, the New Signal Processor Controller Sending Request is a request to send Signal Processor Controller H63OSn (FIG. 657) stored in Host H to Communication Device 200. Host H retrieves Signal Processor Controller H63OSn (FIG. 657), which is of the latest version, from Operating System Storage Area H63OS (FIG. 657), and sends the controller to Communication Device 200 (S6). Upon receiving Signal Processor Controller H63OSn from Host H (S7), CPU 211 stores Signal Processor Controller H63OSn as Signal Processor Controller 20663OSn in Operating System 20663OS (FIG. 648) (S8). The old version of Signal Processor Controller 20663OSn (FIG. 648**) is deleted.

FIG. 692 illustrates Solar Panel Controller Updating Software H**63*c*1*o* (FIG. 663) of Host H and Solar Panel Controller Updating Software 20663*c*10 (FIG. 654) of Communication Device 200, which update Solar Panel Controller 20663OSo stored in Operating System 20663OS (FIG. 648) of Communication Device 200. As described in the present drawing, CPU 211 (FIG. 1) of Communication Device 200 retrieves Solar Panel Controller Version Data 20663*b*1*o* from OS Version Data Storage Area 20663*b*1 (FIG. 652) and sends the data to Host H (S1). Upon receiving Solar Panel Controller Version Data 20663*b*1*o* (FIG. 652) from Communication Device 200 (S2), Host H compares Solar Panel Controller Version Data 20663*b*1*o* (FIG. 652) with Solar Panel Controller Version Data H63*b*1*o* stored in OS Version Data Storage Area H63*b*1 (FIG. 661) of Host H (S3). Assuming that Host H detects in S3 that Solar Panel Controller Version Data 20663*b*1*o* of Communication Device 200 is of an old version. Host H retrieves Solar Panel Controller H63OSo, which is of the latest version, from Operating System Storage Area H63OS (FIG. 657), and sends the controller to Communication Device 200 (S4). Upon receiving Solar Panel Controller H63OSo from Host H (S5), CPU 211 stores Solar Panel Controller H63OSo as Solar Panel Controller 20663OSo in Operating System 20663OS (FIG. 648) (S6). The old version of Solar Panel Controller 20663OSo (FIG. 648**) is deleted.

FIG. 693 illustrates another embodiment of Solar Panel Controller Updating Software H**63*c*1*o* (FIG. 663) of Host H and Solar Panel Controller Updating Software 20663*c*1*o* (FIG. 654) of Communication Device 200, which update Solar Panel Controller 20663OSo stored in Operating System 20663OS (FIG. 648) of Communication Device 200. As described in the present drawing, CPU 211 (FIG. 1) of Communication Device 200 sends a Solar Panel Controller Update Request, which is received by Host H (S1). Here, the Solar Panel Controller Update Request is a request to send Solar Panel Controller Version Data H63*b*1*o* (FIG. 661) stored in Host H to Communication Device 200. In response to the request, Host H retrieves Solar Panel Controller Version Data H63*b*1*o* from OS Version Data Storage Area H63*b*1 (FIG. 661), and sends the data to Communication Device 200 (S2). Upon receiving Solar Panel Controller Version Data H63*b*1*o* from Host H (S3), CPU 211 compares Solar Panel Controller Version Data H63*b*1*o* with Solar Panel Controller Version Data 20663*b*1*o* stored in OS Version Data Storage Area 20663*b*1 (FIG. 652) of Communication Device 200 (S4). Assuming that CPU211 detects in S4 that Solar Panel Controller Version Data 20663*b*1*o* of Communication Device 200 is of an old version. CPU 211 sends a New Solar Panel Controller Sending Request, which is received by Host H (S5). Here, the New Solar Panel Controller Sending Request is a request to send Solar Panel Controller H63OSo (FIG. 657) stored in Host H to Communication Device 200. Host H retrieves Solar Panel Controller H63OSo (FIG. 657), which is of the latest version, from Operating System Storage Area H63OS (FIG. 657), and sends the controller to Communication Device 200 (S6). Upon receiving Solar Panel Controller H63OSo from Host H (S7), CPU 211 stores Solar Panel Controller H63OSo as Solar Panel Controller 20663OSo in Operating System 20663OS (FIG. 648) (S8). The old version of Solar Panel Controller 20663OSo (FIG. 648**) is deleted.

FIG. 694 illustrates Speaker Controller Updating Software H**63*c*1*p* (FIG. 663) of Host H and Speaker Controller Updating Software 20663*c*1*p* (FIG. 654) of Communication Device 200, which update Speaker Controller 20663OSp stored in Operating System 20663OS (FIG. 648) of Communication Device 200. As described in the present drawing, CPU 211 (FIG. 1) of Communication Device 200 retrieves Speaker Controller Version Data 20663*b*1*p* from OS Version Data Storage Area 20663*b*1 (FIG. 652) and sends the data to Host H (S1). Upon receiving Speaker Controller Version Data 20663*b*1*p* (FIG. 652) from Communication Device 200 (S2), Host H compares Speaker Controller Version Data 20663*b*1*p* (FIG. 652) with Speaker Controller Version Data H63*b*1*p*** stored in OS Version Data Storage Area H63*b*1 (FIG. 661) of Host H (S3). Assuming that Host H detects in S3 that Speaker Controller Version Data **20663*b*1*p* of Communication Device 200 is of an old version. Host H retrieves Speaker Controller H63OSp, which is of the latest version, from Operating System Storage Area H63OS (FIG. 657), and sends the controller to Communication Device 200 (S4). Upon receiving Speaker Controller H63OSp from Host H (S5), CPU 211 stores Speaker Controller H63OSp as Speaker Controller 20663OSp in Operating System 20663OS (FIG. 648) (S6). The old version of Speaker Controller 20663OSp (FIG. 648**) is deleted.

FIG. 695 illustrates another embodiment of Speaker Controller Updating Software H**63*c*1*p* (FIG. 663) of Host H and Speaker Controller Updating Software 20663*c*1*p* (FIG. 654) of Communication Device 200, which update Speaker Controller 20663OSp stored in Operating System 20663OS (FIG. 648) of Communication Device 200. As described in the present drawing, CPU 211 (FIG. 1) of Communication Device 200 sends a Speaker Controller Update Request, which is received by Host H (S1). Here, the Speaker Controller Update Request is a request to send Speaker Controller Version Data H63*b*1*p* (FIG. 661) stored in Host H to Communication Device 200. In response to the request, Host H retrieves Speaker Controller Version Data H63*b*1*p* from OS Version Data Storage Area H63*b*1 (FIG. 661), and sends the data to Communication Device 200 (S2). Upon receiving Speaker Controller Version Data H63*b*1*p* from Host H (S3), CPU 211 compares Speaker Controller Version Data H63*b*1*p* with Speaker Controller Version Data 20663*b*1*p* stored in OS Version Data Storage Area 20663*b*1 (FIG. 652) of Communication Device 200 (S4). Assuming that CPU211 detects in S4 that Speaker Controller Version Data 20663*b*1*p* of Communication Device 200 is of an old version. CPU 211 sends a New Speaker Controller Sending Request, which is received by Host H (S5). Here, the New Speaker Controller Sending Request is a request to send Speaker Controller H63OSp (FIG. 657) stored in Host H to Communication Device 200. Host H retrieves Speaker Controller H63OSp (FIG. 657), which is of the latest version, from Operating System Storage Area H63OS (FIG. 657), and sends the controller to Communication Device 200 (S6). Upon receiving Speaker Controller H63OSp from Host H (S7), CPU 211 stores Speaker Controller H63OSp as Speaker Controller 20663OSp in Operating System 20663OS (FIG. 648) (S8). The old version of Speaker Controller 20663OSp (FIG. 648**) is deleted.

FIG. 696 illustrates Vibrator Controller Updating Software H**63*c*1*q* (FIG. 663) of Host H and Vibrator Controller Updating Software 20663*c*1*q* (FIG. 654) of Communication Device 200, which update Vibrator Controller 20663OSq stored in Operating System 20663OS (FIG. 648) of Communication Device 200. As described in the present drawing, CPU 211 (FIG. 1) of Communication Device 200 retrieves Vibrator Controller Version Data 20663*b*1*q* from OS Version Data Storage Area 20663*b*1 (FIG. 652) and sends the data to Host H (S1). Upon receiving Vibrator Controller Version Data 20663*b*1*q* (FIG. 652) from Communication Device 200 (S2), Host H compares Vibrator Controller Version Data 20663*b*1*q* (FIG. 652) with Vibrator Controller Version Data H63*b*1*q* stored in OS Version Data Storage Area H63*b*1 (FIG. 661) of Host H (S3). Assuming that Host H detects in S3 that Vibrator Controller Version Data 20663*b*1*q* of Communication Device 200 is of an old version. Host H retrieves Vibrator Controller H63OSq, which is of the latest version, from Operating System Storage Area H63OS (FIG. 657), and sends the controller to Communication Device 200 (S4). Upon receiving Vibrator Controller H63OSq from Host H (S5), CPU 211 stores Vibrator Controller H63OSq as Vibrator Controller 20663OSq in Operating System 20663OS (FIG. 648) (S6). The old version of Vibrator Controller 20663OSq (FIG. 648**) is deleted.

FIG. 697 illustrates another embodiment of Vibrator Controller Updating Software H**63*c*1*q* (FIG. 663) of Host H and Vibrator Controller Updating Software 20663*c*1*q* (FIG. 654) of Communication Device 200, which update Vibrator Controller 20663OSq stored in Operating System 20663OS (FIG. 648) of Communication Device 200. As described in the present drawing, CPU 211 (FIG. 1) of Communication Device 200 sends a Vibrator Controller Update Request, which is received by Host H (S1). Here, the Vibrator Controller Update Request is a request to send Vibrator Controller Version Data H63*b*1*q* (FIG. 661) stored in Host H to Communication Device 200. In response to the request, Host H retrieves Vibrator Controller Version Data H63*b*1*q* from OS Version Data Storage Area H63*b*1 (FIG. 661), and sends the data to Communication Device 200 (S2). Upon receiving Vibrator Controller Version Data H63*b*1*q* from Host H (S3), CPU 211 compares Vibrator Controller Version Data H63*b*1*q* with Vibrator Controller Version Data 20663*b*1*q* stored in OS Version Data Storage Area 20663*b*1 (FIG. 652) of Communication Device 200 (S4). Assuming that CPU211 detects in S4 that Vibrator Controller Version Data 20663*b*1*q* of Communication Device 200 is of an old version. CPU 211 sends a New Vibrator Controller Sending Request, which is received by Host H (S5). Here, the New Vibrator Controller Sending Request is a request to send Vibrator Controller H63OSq (FIG. 657) stored in Host H to Communication Device 200. Host H retrieves Vibrator Controller H63OSq (FIG. 657), which is of the latest version, from Operating System Storage Area H63OS (FIG. 657), and sends the controller to Communication Device 200 (S6). Upon receiving Vibrator Controller H63OSq from Host H (S7), CPU 211 stores Vibrator Controller H63OSq as Vibrator Controller 20663OSq in Operating System 20663OS (FIG. 648) (S8). The old version of Vibrator Controller 20663OSq (FIG. 648**) is deleted.

FIG. 698 illustrates Video Processor Controller Updating Software H**63*c*1*r* (FIG. 663) of Host H and Video Processor Controller Updating Software 20663*c*1*r* (FIG. 654) of Communication Device 200, which update Video Processor Controller 20663OSr stored in Operating System 20663OS (FIG. 648) of Communication Device 200. As described in the present drawing, CPU 211 (FIG. 1) of Communication Device 200 retrieves Video Processor Controller Version Data 20663*b*1*r* from OS Version Data Storage Area 20663*b*1 (FIG. 652) and sends the data to Host H (S1). Upon receiving Video Processor Controller Version Data 20663*b*1*r* (FIG. 652) from Communication Device 200 (S2), Host H compares Video Processor Controller Version Data 20663*b*1*r* (FIG. 652) with Video Processor Controller Version Data H63*b*1*r* stored in OS Version Data Storage Area H63*b*1 (FIG. 661) of Host H (S3). Assuming that Host H detects in S3 that Video Processor Controller Version Data 20663*b*1*r* of Communication Device 200 is of an old version. Host H retrieves Video Processor Controller H63OSr, which is of the latest version, from Operating System Storage Area H63OS (FIG. 657), and sends the controller to Communication Device 200 (S4). Upon receiving Video Processor Controller H63OSr from Host H (S5), CPU 211 stores Video Processor Controller H63OSr as Video Processor Controller 20663OSr in Operating System 20663OS (FIG. 648) (S6). The old version of Video Processor Controller 20663OSr (FIG. 648**) is deleted.

FIG. 699 illustrates another embodiment of Video Processor Controller Updating Software H**63*c*1*r* (FIG. 663) of Host H and Video Processor Controller Updating Software 20663*c*1*r* (FIG. 654) of Communication Device 200, which update Video Processor Controller 20663OSr stored in Operating System 20663OS (FIG. 648) of Communication Device 200. As described in the present drawing, CPU 211 (FIG. 1) of Communication Device 200 sends a Video Processor Controller Update Request, which is received by Host H (S1). Here, the Video Processor Controller Update Request is a request to send Video Processor Controller Version Data H63*b*1***r* (FIG. 661) stored in Host H to Communication Device 200. In response to the request, Host H retrieves Video Processor Controller Version Data H63*b*1*r* from OS Version Data Storage Area H63*b*1 (FIG. 661), and sends the data to Communication Device 200 (S2). Upon receiving Video Processor Controller Version Data H63*b*1*r* from Host H (S3), CPU 211 compares Video Processor Controller Version Data H63*b*1*r* with Video Processor Controller Version Data 20663*b*1*r* stored in OS Version Data Storage Area 20663*b*1 (FIG. 652) of Communication Device 200 (S4). Assuming that CPU211 detects in S4 that Video Processor Controller Version Data 20663*b*1*r* of Communication Device 200 is of an old version. CPU 211 sends a New Video Processor Controller Sending Request, which is received by Host H (S5). Here, the New Video Processor Controller Sending Request is a request to send Video Processor Controller H63OSr (FIG. 657) stored in Host H to Communication Device 200. Host H retrieves Video Processor Controller H63OSr (FIG. 657), which is of the latest version, from Operating System Storage Area H63OS (FIG. 657), and sends the controller to Communication Device 200 (S6). Upon receiving Video Processor Controller H63OSr from Host H (S7), CPU 211 stores Video Processor Controller H63OSr as Video Processor Controller 20663OSr in Operating System 20663OS (FIG. 648) (S8). The old version of Video Processor Controller 20663OSr (FIG. 648) is deleted.

FIG. 700 illustrates Wireless Receiver Controller Updating Software H63*c*1*s* (FIG. 663) of Host H and Wireless Receiver Controller Updating Software 20663*c*1*s* (FIG. 654) of Communication Device 200, which update Wireless Receiver Controller 20663OSs stored in Operating System 20663OS (FIG. 648) of Communication Device 200. As described in the present drawing, CPU 211 (FIG. 1) of Communication Device 200 retrieves Wireless Receiver Controller Version Data 20663*b*1*s* from OS Version Data Storage Area 20663*b*1 (FIG. 652) and sends the data to Host H (S1). Upon receiving Wireless Receiver Controller Version Data 20663*b*1*s* (FIG. 652) from Communication Device 200 (S2), Host H compares Wireless Receiver Controller Version Data 20663*b*1*s* (FIG. 652) with Wireless Receiver Controller Version Data H63*b*1*s* stored in OS Version Data Storage Area H63*b*1 (FIG. 661) of Host H (S3). Assuming that Host H detects in S3 that Wireless Receiver Controller Version Data 20663*b*1*s* of Communication Device 200 is of an old version. Host H retrieves Wireless Receiver Controller H63OSs, which is of the latest version, from Operating System Storage Area H63OS (FIG. 657), and sends the controller to Communication Device 200 (S4). Upon receiving Wireless Receiver Controller H63OSs from Host H (S5), CPU 211 stores Wireless Receiver Controller H63OSs as Wireless Receiver Controller 20663OSs in Operating System 20663OS (FIG. 648) (S6). The old version of Wireless Receiver Controller 20663OSs (FIG. 648) is deleted.

FIG. 701 illustrates another embodiment of Wireless Receiver Controller Updating Software H63*c*1*s* (FIG. 663) of Host H and Wireless Receiver Controller Updating Software 20663*c*1*s* (FIG. 654) of Communication Device 200, which update Wireless Receiver Controller 20663OSs stored in Operating System 20663OS (FIG. 648) of Communication Device 200. As described in the present drawing, CPU 211 (FIG. 1) of Communication Device 200 sends a Wireless Receiver Controller Update Request#1, which is received by Host H (S1). Here, the Wireless Receiver Controller Update Request#1 is a request to send Wireless Receiver Controller Version Data H63*b*1*s* (FIG. 661) stored in Host H to Communication Device 200. In response to the request, Host H retrieves Wireless Receiver Controller Version Data H63*b*1*s* from OS Version Data Storage Area H63*b*1 (FIG. 661), and sends the data to Communication Device 200 (S2). Upon receiving Wireless Receiver Controller Version Data H63*b*1*s* from Host H (S3), CPU 211 compares Wireless Receiver Controller Version Data H63*b*1*s* with Wireless Receiver Controller Version Data 20663*b*1*s* stored in OS Version Data Storage Area 20663*b*1 (FIG. 652) of Communication Device 200 (S4). Assuming that CPU211 detects in S4 that Wireless Receiver Controller Version Data 20663*b*1*s* of Communication Device 200 is of an old version. CPU 211 sends a New Wireless Receiver Controller Sending Request#1, which is received by Host H (S5). Here, the New Wireless Receiver Controller Sending Request#1 is a request to send Wireless Receiver Controller H63OSs (FIG. 657) stored in Host H to Communication Device 200. Host H retrieves Wireless Receiver Controller H63OSs (FIG. 657), which is of the latest version, from Operating System Storage Area H63OS (FIG. 657), and sends the controller to Communication Device 200 (S6). Upon receiving Wireless Receiver Controller H63OSs from Host H (S7), CPU 211 stores Wireless Receiver Controller H63OSs as Wireless Receiver Controller 20663OSs in Operating System 20663OS (FIG. 648) (S8). The old version of Wireless Receiver Controller 20663OSs (FIG. 648) is deleted.

FIG. 702 illustrates Wireless Receiver Controller Updating Software H63*c*1*t* (FIG. 663) of Host H and Wireless Receiver Controller Updating Software 20663*c*1*t* (FIG. 654) of Communication Device 200, which update Wireless Receiver Controller 20663OSt stored in Operating System 20663OS (FIG. 648) of Communication Device 200. As described in the present drawing, CPU 211 (FIG. 1) of Communication Device 200 retrieves Wireless Receiver Controller Version Data 20663*b*1*t* from OS Version Data Storage Area 20663*b*1 (FIG. 652) and sends the data to Host H (S1). Upon receiving Wireless Receiver Controller Version Data 20663*b*1*t* (FIG. 652) from Communication Device 200 (S2), Host H compares Wireless Receiver Controller Version Data 20663*b*1*t* (FIG. 652) with Wireless Receiver Controller Version Data H63*b*1*t* stored in OS Version Data Storage Area H63*b*1 (FIG. 661) of Host H (S3). Assuming that Host H detects in S3 that Wireless Receiver Controller Version Data 20663*b*1*t* of Communication Device 200 is of an old version. Host H retrieves Wireless Receiver Controller H63OSt, which is of the latest version, from Operating System Storage Area H63OS (FIG. 657), and sends the controller to Communication Device 200 (S4). Upon receiving Wireless Receiver Controller H63OSt from Host H (S5), CPU 211 stores Wireless Receiver Controller H63OSt as Wireless Receiver Controller 20663OSt in Operating System 20663OS (FIG. 648) (S6). The old version of Wireless Receiver Controller 20663OSt (FIG. 648) is deleted.

FIG. 703 illustrates another embodiment of Wireless Receiver Controller Updating Software H63*c*1*t* (FIG. 663) of Host H and Wireless Receiver Controller Updating Software 20663*c*1*t* (FIG. 654) of Communication Device 200, which update Wireless Receiver Controller 20663OSt stored in Operating System 20663OS (FIG. 648) of Communication Device 200. As described in the present drawing, CPU 211 (FIG. 1) of Communication Device 200 sends a Wireless Receiver Controller Update Request#2, which is received by Host H (S1). Here, the Wireless Receiver Controller Update Request#2 is a request to send Wireless Receiver Controller Version Data H63*b*1*t* (FIG. 661) stored in Host H to Communication Device 200. In response to the request, Host H retrieves Wireless Receiver Controller Version Data H63*b*1*t* from OS Version Data Storage Area H63*b*1 (FIG. 661), and sends the data to Communication Device 200 (S2). Upon receiving Wireless Receiver Controller Version Data H63*b*1*t* from Host H (S3), CPU 211 compares Wireless Receiver Controller Version Data H63*b*1*t* with Wireless Receiver Controller Version Data 20663*b*1*t* stored in OS Version Data Storage Area 20663*b*1 (FIG. 652) of Communication Device 200 (S4). Assuming that CPU211 detects in S4 that Wireless Receiver Controller Version Data 20663*b*1*t* of Communication Device 200 is of an old version. CPU 211 sends a New Wireless Receiver Controller Sending Request#2, which is received by Host H (S5). Here, the New Wireless Receiver Controller Sending Request#2 is a request to send Wireless Receiver Controller H63OSt (FIG. 657) stored in Host H to Communication Device 200. Host H retrieves Wireless Receiver Controller H63OSt (FIG. 657), which is of the latest version, from Operating System Storage Area H63OS (FIG. 657), and sends the controller to Communication Device 200 (S6). Upon receiving Wireless Receiver Controller H63OSt from Host H (S7), CPU 211 stores Wireless Receiver Controller H63OSt as Wireless Receiver Controller 20663OSt in Operating System 20663OS (FIG. 648) (S8). The old version of Wireless Receiver Controller 20663OSt (FIG. 648) is deleted.

FIG. 704 illustrates Wireless Receiver Controller Updating Software H63*c*1*u* (FIG. 663) of Host H and Wireless Receiver Controller Updating Software 20663*c*1*u* (FIG. 654) of Communication Device 200, which update Wireless Receiver Controller 20663OSu stored in Operating System 20663OS (FIG. 648) of Communication Device 200. As described in the present drawing, CPU 211 (FIG. 1) of Communication Device 200 retrieves Wireless Receiver Controller Version Data 20663*b*1*u* from OS Version Data Storage Area 20663*b*1 (FIG. 652) and sends the data to Host H (S1). Upon receiving Wireless Receiver Controller Version Data 20663*b*1*u* (FIG. 652) from Communication Device 200 (S2), Host H compares Wireless Receiver Controller Version Data 20663*b*1*u* (FIG. 652) with Wireless Receiver Controller Version Data H63*b*1*u* stored in OS Version Data Storage Area H63*b*1 (FIG. 661) of Host H (S3). Assuming that Host H detects in S3 that Wireless Receiver Controller Version Data 20663*b*1*u* of Communication Device 200 is of an old version. Host H retrieves Wireless Receiver Controller H63OSu, which is of the latest version, from Operating System Storage Area H63OS (FIG. 657), and sends the controller to Communication Device 200 (S4). Upon receiving Wireless Receiver Controller H63OSu from Host H (S5), CPU 211 stores Wireless Receiver Controller H63OSu as Wireless Receiver Controller 20663OSu in Operating System 20663OS (FIG. 648) (S6). The old version of Wireless Receiver Controller 20663OSu (FIG. 648) is deleted.

FIG. 705 illustrates another embodiment of Wireless Receiver Controller Updating Software H63*c*1*u* (FIG. 663) of Host H and Wireless Receiver Controller Updating Software 20663*c*1*u* (FIG. 654) of Communication Device 200, which update Wireless Receiver Controller 20663OSu stored in Operating System 20663OS (FIG. 648) of Communication Device 200. As described in the present drawing, CPU 211 (FIG. 1) of Communication Device 200 sends a Wireless Receiver Controller Update Request#3, which is received by Host H (S1). Here, the Wireless Receiver Controller Update Request#3 is a request to send Wireless Receiver Controller Version Data H63*b*1*u* (FIG. 661) stored in Host H to Communication Device 200. In response to the request, Host H retrieves Wireless Receiver Controller Version Data H63*b*1*u* from OS Version Data Storage Area H63*b*1 (FIG. 661), and sends the data to Communication Device 200 (S2). Upon receiving Wireless Receiver Controller Version Data H63*b*1*u* from Host H (S3), CPU 211 compares Wireless Receiver Controller Version Data H63*b*1*u* with Wireless Receiver Controller Version Data 20663*b*1*u* stored in OS Version Data Storage Area 20663*b*1 (FIG. 652) of Communication Device 200 (S4). Assuming that CPU211 detects in S4 that Wireless Receiver Controller Version Data 20663*b*1*u* of Communication Device 200 is of an old version. CPU 211 sends a New Wireless Receiver Controller Sending Request#3, which is received by Host H (S5). Here, the New Wireless Receiver Controller Sending Request#3 is a request to send Wireless Receiver Controller H63OSu (FIG. 657) stored in Host H to Communication Device 200. Host H retrieves Wireless Receiver Controller H63OSu (FIG. 657), which is of the latest version, from Operating System Storage Area H63OS (FIG. 657), and sends the controller to Communication Device 200 (S6). Upon receiving Wireless Receiver Controller H63OSu from Host H (S7), CPU 211 stores Wireless Receiver Controller H63OSu as Wireless Receiver Controller 20663OSu in Operating System 20663OS (FIG. 648) (S8). The old version of Wireless Receiver Controller 20663OSu (FIG. 648) is deleted.

FIG. 706 illustrates Wireless Transmitter Controller Updating Software H63*c*1*v* (FIG. 663) of Host H and Wireless Transmitter Controller Updating Software 20663*c*1*v* (FIG. 654) of Communication Device 200, which update Wireless Transmitter Controller 20663OSv stored in Operating System 20663OS (FIG. 648) of Communication Device 200. As described in the present drawing, CPU 211 (FIG. 1) of Communication Device 200 retrieves Wireless Transmitter Controller Version Data 20663*b*1*v* from OS Version Data Storage Area 20663*b*1 (FIG. 652) and sends the data to Host H (S1). Upon receiving Wireless Transmitter Controller Version Data 20663*b*1*v* (FIG. 652) from Communication Device 200 (S2), Host H compares Wireless Transmitter Controller Version Data 20663*b*1*v* (FIG. 652) with Wireless Transmitter Controller Version Data H63*b*1*v* stored in OS Version Data Storage Area H63*b*1 (FIG. 661) of Host H (S3). Assuming that Host H detects in S3 that Wireless Transmitter Controller Version Data 20663*b*1*v* of Communication Device 200 is of an old version. Host H retrieves Wireless Transmitter Controller H63OSv, which is of the latest version, from Operating System Storage Area H63OS (FIG. 657), and sends the controller to Communication Device 200 (S4). Upon receiving Wireless Transmitter Controller H63OSv from Host H (S5), CPU 211 stores Wireless Transmitter Controller H63OSv as Wireless Transmitter Controller 20663OSv in Operating System 20663OS (FIG. 648) (S6). The old version of Wireless Transmitter Controller 20663OSv (FIG. 648) is deleted.

FIG. 707 illustrates another embodiment of Wireless Transmitter Controller Updating Software H63*c*1*v* (FIG. 663) of Host H and Wireless Transmitter Controller Updating Software 20663*c*1*v* (FIG. 654) of Communication Device 200, which update Wireless Transmitter Controller 20663OSv stored in Operating System 20663OS (FIG. 648) of Communication Device 200. As described in the present drawing, CPU 211 (FIG. 1) of Communication Device 200 sends a Wireless Transmitter Controller Update Request#1, which is received by Host H (S1). Here, the Wireless Transmitter Controller Update Request#1 is a request to send Wireless Transmitter Controller Version Data H63*b*1*v* (FIG. 661) stored in Host H to Communication Device 200. In response to the request, Host H retrieves Wireless Transmitter Controller Version Data H63*b*1*v* from OS Version Data Storage Area H63*b*1 (FIG. 661), and sends the data to Communication Device 200 (S2). Upon receiving Wireless Transmitter Controller Version Data H63*b*1*v* from Host H (S3), CPU 211 compares Wireless Transmitter Controller Version Data H63*b*1*v* with Wireless Transmitter Controller Version Data 20663*b*1*v* stored in OS Version Data Storage Area 20663*b*1 (FIG. 652) of Communication Device 200 (S4). Assuming that CPU211 detects in S4 that Wireless Transmitter Controller Version Data 20663*b*1*v* of Communication Device 200 is of an old version. CPU 211 sends a New Wireless Transmitter Controller Sending Request#1, which is received by Host H (S5). Here, the New Wireless Transmitter Controller Sending Request#1 is a request to send Wireless Transmitter Controller H63OSv (FIG. 657) stored in Host H to Communication Device 200. Host H retrieves Wireless Transmitter Controller H63OSv (FIG. 657), which is of the latest version, from Operating System Storage Area H63OS (FIG. 657), and sends the controller to Communication Device 200 (S6). Upon receiving Wireless Transmitter Controller H63OSv from Host H (S7), CPU 211 stores Wireless Transmitter Controller H63OSv as Wireless Transmitter Controller 20663OSv in Operating System 20663OS (FIG. 648) (S8). The old version of Wireless Transmitter Controller 20663OSv (FIG. 648) is deleted.

FIG. 708 illustrates Wireless Transmitter Controller Updating Software H63*c*1*w* (FIG. 663) of Host H and Wireless Transmitter Controller Updating Software 20663*c*1*w* (FIG. 654) of Communication Device 200, which update Wireless Transmitter Controller 20663OSw stored in Operating System 20663OS (FIG. 648) of Communication Device 200. As described in the present drawing, CPU 211 (FIG. 1) of Communication Device 200 retrieves Wireless Transmitter Controller Version Data 20663*b*1*w* from OS Version Data Storage Area 20663*b*1 (FIG. 652) and sends the data to Host H (S1). Upon receiving Wireless Transmitter Controller Version Data 20663*b*1*w* (FIG. 652) from Communication Device 200 (S2), Host H compares Wireless Transmitter Controller Version Data 20663*b*1*w* (FIG. 652) with Wireless Transmitter Controller Version Data H63*b*1*w* stored in OS Version Data Storage Area H63*b*1 (FIG. 661) of Host H (S3). Assuming that Host H detects in S3 that Wireless Transmitter Controller Version Data 20663*b*1*w* of Communication Device 200 is of an old version. Host H retrieves Wireless Transmitter Controller H63OSw, which is of the latest version, from Operating System Storage Area H63OS (FIG. 657), and sends the controller to Communication Device 200 (S4). Upon receiving Wireless Transmitter Controller H63OSw from Host H (S5), CPU 211 stores Wireless Transmitter Controller H63OSw as Wireless Transmitter Controller 20663OSw in Operating System 20663OS (FIG. 648) (S6). The old version of Wireless Transmitter Controller 20663OSw (FIG. 648) is deleted.

FIG. 709 illustrates another embodiment of Wireless Transmitter Controller Updating Software H63*c*1*w* (FIG. 663) of Host H and Wireless Transmitter Controller Updating Software 20663*c*1*w* (FIG. 654) of Communication Device 200, which update Wireless Transmitter Controller 20663OSw stored in Operating System 20663OS (FIG. 648) of Communication Device 200. As described in the present drawing, CPU 211 (FIG. 1) of Communication Device 200 sends a Wireless Transmitter Controller Update Request#2, which is received by Host H (S1). Here, the Wireless Transmitter Controller Update Request#2 is a request to send Wireless Transmitter Controller Version Data H63*b*1*w* (FIG. 661) stored in Host H to Communication Device 200. In response to the request, Host H retrieves Wireless Transmitter Controller Version Data H63*b*1*w* from OS Version Data Storage Area H63*b*1 (FIG. 661), and sends the data to Communication Device 200 (S2). Upon receiving Wireless Transmitter Controller Version Data H63*b*1*w* from Host H (S3), CPU 211 compares Wireless Transmitter Controller Version Data H63*b*1*w* with Wireless Transmitter Controller Version Data 20663*b*1*w* stored in OS Version Data Storage Area 20663*b*1 (FIG. 652) of Communication Device 200 (S4). Assuming that CPU211 detects in S4 that Wireless Transmitter Controller Version Data 20663*b*1*w* of Communication Device 200 is of an old version. CPU 211 sends a New Wireless Transmitter Controller Sending Request#2, which is received by Host H (S5). Here, the New Wireless Transmitter Controller Sending Request#2 is a request to send Wireless Transmitter Controller H63OSw (FIG. 657) stored in Host H to Communication Device 200. Host H retrieves Wireless Transmitter Controller H63OSw (FIG. 657), which is of the latest version, from Operating System Storage Area H63OS (FIG. 657), and sends the controller to Communication Device 200 (S6). Upon receiving Wireless Transmitter Controller H63OSw from Host H (S7), CPU 211 stores Wireless Transmitter Controller H63OSw as Wireless Transmitter Controller 20663OSw in Operating System 20663OS (FIG. 648) (S8). The old version of Wireless Transmitter Controller 20663OSw (FIG. 648) is deleted.

FIG. 710 illustrates Wireless Transmitter Controller Updating Software H63*c*1*x* (FIG. 663) of Host H and Wireless Transmitter Controller Updating Software 20663*c*1*x* (FIG. 654) of Communication Device 200, which update Wireless Transmitter Controller 20663OSx stored in Operating System 20663OS (FIG. 648) of Communication Device 200. As described in the present drawing, CPU 211 (FIG. 1) of Communication Device 200 retrieves Wireless Transmitter Controller Version Data 20663*b*1*x* from OS Version Data Storage Area 20663*b*1 (FIG. 652) and sends the data to Host H (S1). Upon receiving Wireless Transmitter Controller Version Data 20663*b*1*x* (FIG. 652) from Communication Device 200 (S2), Host H compares Wireless Transmitter Controller Version Data 20663*b*1*x* (FIG. 652) with Wireless Transmitter Controller Version Data H63*b*1*x* stored in OS Version Data Storage Area H63*b*1 (FIG. 661) of Host H (S3). Assuming that Host H detects in S3 that Wireless Transmitter Controller Version Data 20663*b*1*x* of Communication Device 200 is of an old version. Host H retrieves Wireless Transmitter Controller H63OSx, which is of the latest version, from Operating System Storage Area H63OS (FIG. 657), and sends the controller to Communication Device 200 (S4). Upon receiving Wireless Transmitter Controller H63OSx from Host H (S5), CPU 211 stores Wireless Transmitter Controller H63OSx as Wireless Transmitter Controller 20663OSx in Operating System 20663OS (FIG. 648) (S6). The old version of Wireless Transmitter Controller 20663OSx (FIG. 648) is deleted.

FIG. 711 illustrates another embodiment of Wireless Transmitter Controller Updating Software H63*c*1*x* (FIG. 663) of Host H and Wireless Transmitter Controller Updating Software 20663*c*1*x* (FIG. 654) of Communication Device 200, which update Wireless Transmitter Controller 20663OSx stored in Operating System 20663OS (FIG. 648) of Communication Device 200. As described in the present drawing, CPU 211 (FIG. 1) of Communication Device 200 sends a Wireless Transmitter Controller Update Request#3, which is received by Host H (S1). Here, the Wireless Transmitter Controller Update Request#3 is a request to send Wireless Transmitter Controller Version Data H63*b*1*x* (FIG. 661) stored in Host H to Communication Device 200. In response to the request, Host H retrieves Wireless Transmitter Controller Version Data H63*b*1*x* from OS Version Data Storage Area H63*b*1 (FIG. 661), and sends the data to Communication Device 200 (S2). Upon receiving Wireless Transmitter Controller Version Data H63*b*1*x* from Host H (S3), CPU 211 compares Wireless Transmitter Controller Version Data H63*b*1*x* with Wireless Transmitter Controller Version Data 20663*b*1*x* stored in OS Version Data Storage Area 20663*b*1 (FIG. 652) of Communication Device 200 (S4). Assuming that CPU211 detects in S4 that Wireless Transmitter Controller Version Data 20663*b*1*x* of Communication Device 200 is of an old version. CPU 211 sends a New Wireless Transmitter Controller Sending Request#3, which is received by Host H (S5). Here, the New Wireless Transmitter Controller Sending Request#3 is a request to send Wireless Transmitter Controller H63OSx (FIG. 657) stored in Host H to Communication Device 200. Host H retrieves Wireless Transmitter Controller H63OSx (FIG. 657), which is of the latest version, from Operating System Storage Area H63OS (FIG. 657), and sends the controller to Communication Device 200 (S6). Upon receiving Wireless Transmitter Controller H63OSx from Host H (S7), CPU 211 stores Wireless Transmitter Controller H63OSx as Wireless Transmitter Controller 20663OSx in Operating System 20663OS (FIG. 648) (S8). The old version of Wireless Transmitter Controller 20663OSx (FIG. 648) is deleted.

As another embodiment, each and all data and software programs described in this specification stored in Communication Device 200 may be updated in the manner described hereinbefore.

For the avoidance of doubt, the present function may be utilized to repair the operating system of Communication Device 200, i.e., Operating System 20663OS (FIG. 647 and FIG. 648) in the form of downloading updates.

<<Device Managing Function>>

FIG. 712 through FIG. 723 illustrate the device managing function which enables the user of Communication Device 200 to manage, such as to add and delete device controllers attached to or installed in Communication Device 200.

FIG. 712 illustrates the storage area included in RAM 206 (FIG. 1). As described in the present drawing, RAM 206 includes Device Managing Information Storage Area 20664*a* of which the data and the software programs stored therein are described in FIG. 713.

FIG. 713 illustrates the storage areas included in Device Managing Information Storage Area 20664*a* (FIG. 712). As described in the present drawing, Device Managing Information Storage Area 20664*a* includes Device Managing Data Storage Area 20664*b* and Device Managing Software Storage Area 20664*c*. Device Managing Data Storage Area 20664*b* stores the data necessary to implement the present function, such as the ones described in FIG. 714 through FIG. 717. Device Managing Software Storage Area 20664*c* stores the software programs necessary to implement the present function, such as the ones described in FIG. 718.

FIG. 714 illustrates the storage areas included in Device Managing Data Storage Area 20664*b* (FIG. 713). As described in the present drawing, Device Managing Data Storage Area 20664*b* includes Device Controller Data Storage Area 20664*b*1, Device Image Data Storage Area 20664*b*2, and Device Image Location Data Storage Area 20664*b*3. Device Controller Data Storage Area 20664*b*1 stores the data described in FIG. 715. Device Image Data Storage Area 20664*b*2 stores the data described in FIG. 716. Device Image Location Data Storage Area 20664*b*3 stores the data described in FIG. 717.

FIG. 715 illustrates the data stored in Device Controller Data Storage Area 20664*b*1 (FIG. 714). As described in the present drawing, Device Controller Data Storage Area 20664*b*1 comprises two columns, i.e., 'Device Controller ID' and 'Device Controller Data'. Column 'Device Controller ID' stores the device controller IDs, and each device controller ID is an identification of the corresponding device controller data stored in column 'Device Controller Data'. Column 'Device Controller Data' stores the device controller data, and each device controller data is a controller which controls the corresponding device attached to or installed in Communication Device 200. In the example described in the present drawing, Device Controller Data Storage Area 20664*b*1 stores the following data: the device controller ID 'Device Controller#1' and the corresponding device controller data 'Device Controller Data#1'; the device controller ID 'Device Controller#2' and the corresponding device controller data 'Device Controller Data#2'; the device controller ID 'Device Controller#3' and the corresponding device controller data 'Device Controller Data#3'; the device controller ID 'Device Controller#4' and the corresponding device controller data 'Device Controller Data#4'; and the device controller ID 'Device Controller#5' and the corresponding device controller data 'Device Controller Data#5'. Here, the device control data may be of any controller which controls the corresponding device attached to or installed in Communication Device 200. Therefore, the device control data stored in Device Controller Data Storage Area 20664*b*1 may include the controllers described in FIG. 647 and FIG. 648, i.e., Battery Controller 2066305*a*, CCD Unit Controller 20663OSb, Flash Light Unit Controller 20663OSc, Indicator Controller 20663OSd, Input Device Controller 20663OSe, LCD Controller 20663OSf, LED Controller 20663OSg, Memory Card Interface Controller 20663OSh, Microphone Controller 20663OSi, Photometer Controller 20663OSj, RAM Controller 20663OSk, ROM Controller 20663OSl, Signal Processor Controller 20663OSm, Signal Processor Controller 20663OSn, Solar Panel Controller 20663OSo, Speaker Controller 20663OSp, Vibrator Controller 20663OSq, Video Processor Controller 20663OSr, Wireless Receiver Controller 20663OSs, Wireless Receiver Controller 20663OSt, Wireless Receiver Controller 20663OSu, Wireless Transmitter Controller 20663OSv, Wireless Transmitter Controller 20663OSw, and Wireless Transmitter Controller 20663OSx.

FIG. 716 illustrates the data stored in Device Image Data Storage Area 20664*b*2 (FIG. 714). As described in the present drawing, Device Image Data Storage Area 20664*b*2 comprises two columns, i.e., 'Device Controller ID' and 'Device Image Data'. Column 'Device Controller ID' stores the device controller IDs described hereinbefore. Column 'Device Image Data' stores the device image data, and each device image data is an image data designed to be displayed on LCD 201 (FIG. 1) which is unique to the device control data of the corresponding device control ID. In the example described in the present drawing, Device Image Data Storage Area 20664*b*2 stores the following data: the device controller ID 'Device Controller#1' and the corresponding device image data 'Device Image Data#1'; the device controller ID 'Device Controller#2' and the corresponding device image data 'Device Image Data#2'; the device controller ID 'Device Controller#3' and the corresponding device image data 'Device Image Data#3'; the device controller ID 'Device Controller#4' and the corresponding device image data 'Device Image Data#4'; and the device controller ID 'Device Controller#5' and the corresponding device image data 'Device Image Data#5'.

FIG. 717 illustrates the data stored in Device Image Location Data Storage Area 20664*b*3 (FIG. 714). As described in the present drawing, Device Image Location Data Storage Area **20664*b*3 comprises two columns, i.e., 'Device Controller ID' and 'Device Image Location Data'. Column 'Device Controller ID' stores the device controller IDs described hereinbefore. Column 'Device Image Location Data' stores the device image location data, and each device image location data represents the location data in (x,y) format at which the device image data of the corresponding device controller ID is displayed on LCD 201 (FIG. 1). In the example described in the present drawing, Device Image Location Data Storage Area 20664*b*3 stores the following data: the device controller ID 'Device Controller#1' and the corresponding device image location data 'Device Image Location Data#1'; the device controller ID 'Device Controller#2' and the corresponding device image location data 'Device Image Location Data#2'; the device controller ID 'Device Controller#3' and the corresponding device image location data 'Device Image Location Data#3'; the device controller ID 'Device Controller#4' and the corresponding device image location data 'Device Image Location Data#4'; and the device controller ID 'Device Controller#5' and the corresponding device image location data 'Device Image Location Data#5**'.

FIG. 718 illustrates the software programs stored in Device Managing Software Storage Area **20664*c* (FIG. 713). As described in the present drawing, Device Managing Software Storage Area 20664*c* stores Device Controller Displaying Software 20664*c*1, Device Controller Adding Software 20664*c*2, and Device Controller Deleting Software 20664*c*3. Device Controller Displaying Software 20664*c*1 is the software program described in FIG. 721. Device Controller Adding Software 20664*c*2 is the software program described in FIG. 722. Device Controller Deleting Software 20664*c*3 is the software program described in FIG. 723**.

FIG. 719 illustrates the device image data displayed on LCD 201 (FIG. 1). As described in the present drawing, five device image data, i.e., Device Image Data#1 through #5 are displayed on LCD 201, each of which at the predetermined location.

FIG. 720 illustrates the device image data displayed on LCD 201 (FIG. 1). As described in the present drawing, four device image data, i.e., Device Image Data#1 through #4 are displayed on LCD 201, each of which at the predetermined location.

FIG. 721 illustrates Device Controller Displaying Software **20664*c*1 (FIG. 718), which displays the device image data on LCD 201 (FIG. 1) of Communication Device 200. The foregoing software program may be initiated either automatically by CPU 211 (FIG. 1) or manually by the user of Communication Device 200. Referring to the present drawing, CPU 211 (FIG. 1) retrieves the device controller IDs from Device Controller Data Storage Area 20664*b*1 (FIG. 715) (S1). CPU 211 Retrieves the device image location data of the corresponding device controller IDs retrieved in S1 from Device Image Location Data Storage Area 20664*b*3 (FIG. 717) (S2). CPU 211 retrieves the device image data of the corresponding device controller IDs retrieved in S1 from Device Image Data Storage Area 20664*b*2 (FIG. 716) (S3). CPU 211 then displays on LCD 201 the device image data retrieved in S3 at the location identified by device image location data retrieved in S2 as described in FIG. 719 (S4**).

FIG. 722 illustrates Device Controller Adding Software **20664*c*2 (FIG. 718), which adds a new device controller data to Communication Device 200. Assume that Device Controller Data#1 through #4 are currently stored in Device Controller Data Storage Area 20664*b*1 (FIG. 715) and a new Device Controller Data#5 is about to be stored therein by executing Device Controller Adding Software 20664*c*2. The foregoing software program may be initiated either automatically by CPU 211 (FIG. 1) or manually by the user of Communication Device 200. Referring to the present drawing, CPU 211 (FIG. 1) adds a new device controller ID (for example, Device Controller#5) in Device Controller Data Storage Area 20664*b*1 (FIG. 715) (S1). CPU 211 adds a new device controller data (for example, Device Controller Data#5) in column 'Device Controller Data' of Device Controller Data Storage Area 20664*b*1 (FIG. 715) at the corresponding device controller ID created in S1 (S2). Here, the new device controller data to be added may be identified by either automatically by CPU 211 (FIG. 1) or manually by the user of Communication Device 200. CPU 211 adds the new device controller ID described in S1 (for example, Device Controller#5) in Device Image Data Storage Area 20664*b*2 (FIG. 716) (S3). CPU 211 adds a new device image data (for example, Device Image Data#5) unique to the corresponding device controller data in column 'Device Image Data' of Device Image Data Storage Area 20664*b*2 (FIG. 716) at the corresponding device controller ID created In S3 (S4). CPU 211 adds the new device controller ID described in S1 (for example, Device Controller#5) in Device Image Location Data Storage Area 20664*b*3 (FIG. 717) (S5). CPU 211 adds the new device image location data (for example, Device Image Location Data#5) in column 'Device Image Location Data' of Device Image Location Data Storage Area 20664*b*3 (FIG. 717) at the corresponding device controller ID created in S5 (S6). CPU 211 then executes Device Controller Displaying Software 20664*c*1 (FIG. 721) to update the display (S7). The device image data (including Device Image Data#5) are displayed on LCD 201 in the manner described in FIG. 719** thereafter.

FIG. 723 illustrates Device Controller Deleting Software **20664*c*3 (FIG. 718), which deletes a device control data from Communication Device 200. Assume that Device Controller Data#1 through #5 are currently stored in Device Controller Data Storage Area 20664*b*1 (FIG. 715) and Device Controller Data#5 is about to be deleted therefrom by executing Device Controller Deleting Software 20664*c*3. The foregoing software program may be initiated either automatically by CPU 211 (FIG. 1) or manually by the user of Communication Device 200. Referring to the present drawing, the user of Communication Device 200, by utilizing Input Device 210 (FIG. 1) or via voice recognition system, selects a device image data (for example, Device Image Data#5) from the ones displayed on LCD 201. CPU 211 identifies the device controller ID (for example, Device Controller#5) of the corresponding device image data (for example Device Image Data#5) (S2). CPU 211 deletes the device controller ID (for example, Device Controller#5) identified in S2 and the corresponding device controller data (for example, Device Controller Data#5) stored in Device Controller Data Storage Area 20664*b*1 (FIG. 715) (S3). CPU 211 deletes the device controller ID (for example, Device Controller#5) and the corresponding device image data (for example, Device Image Data#5) stored in Device Image Data Storage Area 20664*b*2 (FIG. 716) (S4). CPU 211 deletes the device controller ID (for example, Device Controller#5) and the corresponding device image location data (for example, Device Image Location Data#5) stored in Device Image Location Data Storage Area 20664*b*3 (FIG. 717) (S5). CPU 211 then executes Device Controller Displaying Software 20664*c*1 (FIG. 721) to update the display (S6). The device image data (excluding Device Image Data#5) are displayed on LCD 201 in the manner described in FIG. 720** thereafter.

<<Automobile Controlling Function>>

FIG. 724 through FIG. 763 illustrate the automobile controlling function which enables Communication Device 200 to remotely control an automobile in a wireless fashion via Antenna 218 (FIG. 1).

FIG. 724 illustrates the storage area included in Automobile 835, i.e., an automobile or a car. As described in the present drawing, Automobile 835 includes Automobile Controlling Information Storage Area 83565*a* of which the data and the software programs stored therein are described in FIG. 725.

The data and/or the software programs stored in Automobile Controlling Information Storage Area 83565*a* (FIG. 724) may be downloaded from Host H.

FIG. 725 illustrates the storage areas included in Automobile Controlling Information Storage Area 83565*a* (FIG. 724). As described in the present drawing, Automobile Controlling Information Storage Area 83565*a* includes Automobile Controlling Data Storage Area 83565*b* and Automobile Controlling Software Storage Area 83565*c*. Automobile Controlling Data Storage Area 83565*b* stores the data necessary to implement the present function on the side of Automobile 835 (FIG. 724), such as the ones described in FIG. 726 through FIG. 732. Automobile Controlling Software Storage Area 83565*c* stores the software programs necessary to implement the present function on the side of Automobile 835, such as the ones described in FIG. 733.

FIG. 726 illustrates the storage areas included in Automobile Controlling Data Storage Area 83565*b* (FIG. 725). As described in the present drawing, Automobile Controlling Data Storage Area 83565*b* includes User Access Data Storage Area 83565*b*1, Window Data Storage Area 83565*b*2, Door Data Storage Area 83565*b*3, Radio Channel Data Storage Area 83565*b*4, TV Channel Data Storage Area 83565*b*5, Blinker Data Storage Area 83565*b*6, and Work Area 83565*b*7. User Access Data Storage Area 83565*b*1 stores the data described in FIG. 727. Window Data Storage Area 83565*b*2 stores the data described in FIG. 728. Door Data Storage Area 83565*b*3 stores the data described in FIG. 729. Radio Channel Data Storage Area 83565*b*4 stores the data described in FIG. 730. TV Channel Data Storage Area 83565*b*5 stores the data described in FIG. 731. Blinker Data Storage Area 83565*b*6 stores the data described in FIG. 732. Work Area 83565*b*7 is utilized as a work area to perform calculation and temporarily store data. The data stored in Automobile Controlling Data Storage Area 83565*b* excluding the ones stored in User Access Data Storage Area 83565*b*1 and Work Area 83565*b*7 are primarily utilized for reinstallation, i.e., to reinstall the data to Communication Device 200 as described hereinafter in case the data stored in Communication Device 200 are corrupted or lost.

FIG. 727 illustrates the data stored in User Access Data Storage Area 83565*b*1 (FIG. 726). As described in the present drawing, User Access Data Storage Area 83565*b*1 comprises two columns, i.e., 'User ID' and 'Password Data'. Column 'User ID' stores the user IDs, and each user ID is an identification of the user of Communication Device 200 authorized to implement the present function. Column 'Password Data' stores the password data, and each password data represents the password set by the user of the corresponding user ID. The password data is composed of alphanumeric data. In the example described in the present drawing, User Access Data Storage Area 83565*b*1 stores the following data: the user ID 'User#1' and the corresponding password data 'Password Data#1'; the user ID 'User#2' and the corresponding password data 'Password Data#2'; the user ID 'User#3' and the corresponding password data 'Password Data#3'; and the user ID 'User#4' and the corresponding password data 'Password Data#4'. According to the present example, the users represented by User#1 through #4 are authorized to implement the present function.

FIG. 728 illustrates the data stored in Window Data Storage Area 83565*b*2 (FIG. 726). As described in the present drawing, Window Data Storage Area 83565*b*2 comprises two columns, i.e., 'Window ID' and 'Window Data'. Column 'Window ID' stores the window IDs, and each window ID is an identification of the window (not shown) of Automobile 835 (FIG. 724). Column 'Window Data' stores the window data, and each window data is the image data designed to be displayed on LCD 201 (FIG. 1) which represents the position of the window (not shown) of the corresponding window ID. In the example described in the present drawing, Window Data Storage Area 83565*b*2 stores the following data: the window ID 'Window#1' and the corresponding window data 'Window Data#1'; the window ID 'Window#2' and the corresponding window data 'Window Data#2'; the window ID 'Window#3' and the corresponding window data 'Window Data#3'; and the window ID 'Window#4' and the corresponding window data 'Window Data#4'. Four windows of Automobile 835 which are represented by the window IDs, 'Window#1' through 'Window#4', are remotely controllable by implementing the present function.

FIG. 729 illustrates the data stored in Door Data Storage Area 83565*b*3 (FIG. 726). As described in the present drawing, Door Data Storage Area 83565*b*3 comprises two columns, i.e., 'Door ID' and 'Door Data'. Column 'Door ID' stores the door IDs, and each door ID is an identification of the door (not shown) of Automobile 835 (FIG. 724). Column 'Door Data' stores the door data, and each door data is the image data designed to be displayed on LCD 201 (FIG. 1) which represents the position of the door (not shown) of the corresponding door ID. In the example described in the present drawing, Door Data Storage Area 83565*b*3 stores the following data: the door ID 'Door#1' and the corresponding door data 'Door Data#1'; the door ID 'Door#2' and the corresponding door data 'Door Data#2'; the door ID 'Door#3' and the corresponding door data 'Door Data#3'; and the door ID 'Door#4' and the corresponding door data 'Door Data#4'. Four doors of Automobile 835 which are represented by the door IDs, 'Door#1' through 'Door#4', are remotely controllable by implementing the present function.

FIG. 730 illustrates the data stored in Radio Channel Data Storage Area 83565*b*4 (FIG. 726). As described in the present drawing, Radio Channel Data Storage Area 83565*b*4 comprises two columns, i.e., 'Radio Channel ID' and 'Radio Channel Data'. Column 'Radio Channel ID' stores the radio channel IDs, and each radio channel ID is an identification of the radio channel (not shown) playable by the radio (not shown) installed in Automobile 835 (FIG. 724). Column 'Radio Channel Data' stores the radio channel data, and each radio channel data is the image data designed to be displayed on LCD 201 (FIG. 1) which represents the radio channel (not shown) of the corresponding radio channel ID. In the example described in the present drawing, Radio Channel Data Storage Area 83565*b*4 stores the following data: the radio channel ID 'Radio Channel#1' and the corresponding radio channel data 'Radio Channel Data#1'; the radio channel ID 'Radio Channel#2' and the corresponding radio channel data 'Radio Channel Data#2'; the radio channel ID 'Radio Channel#3' and the corresponding radio channel data 'Radio Channel Data#3'; and the radio channel ID 'Radio Channel#4' and the corresponding radio channel data 'Radio Channel Data#4'. Four radio channels which are represented by the radio channel IDs, 'Radio Channel#1' through 'Radio Channel#4', are remotely controllable by implementing the present invention.

FIG. 731 illustrates the data stored in TV Channel Data Storage Area **83565*b*5 (FIG. 726). As described in the present drawing, TV Channel Data Storage Area 83565*b*5 comprises two columns, i.e., 'TV Channel ID' and 'TV Channel Data'. Column 'TV Channel ID' stores the TV channel IDs, and each TV channel ID is an identification of the TV channel (not shown) playable by the TV (not shown) installed in Automobile 835 (FIG. 724). Column 'TV Channel Data' stores the TV channel data, and each TV channel data is the image data designed to be displayed on LCD 201 (FIG. 1) which represents the TV channel (not shown) of the corresponding TV channel ID. In the example described in the present drawing, TV Channel Data Storage Area 83565*b*5 stores the following data: the TV channel ID 'TV Channel#1' and the corresponding TV channel data 'TV Channel Data#1'; the TV channel ID 'TV Channel#2' and the corresponding TV channel data 'TV Channel Data#2'; the TV channel ID 'TV Channel#3' and the corresponding TV channel data 'TV Channel Data#3'; and the TV channel ID 'TV Channel#4' and the corresponding TV channel data 'TV Channel Data#4'. Four TV channels which are represented by the TV channel IDs, 'TV Channel#1' through 'TV Channel#4**', are remotely controllable by implementing the present invention.

FIG. 732 illustrates the data stored in Blinker Data Storage Area **83565*b*6 (FIG. 726). As described in the present drawing, Blinker Data Storage Area 83565*b*6 comprises two columns, i.e., 'Blinker ID' and 'Blinker Data'. Column 'Blinker ID' stores the blinker IDs, and each blinker ID is an identification of the blinker (not shown) of Automobile 835 (FIG. 724). Column 'Blinker Data' stores the blinker data, and each blinker data is the image data designed to be displayed on LCD 201 (FIG. 1) which represents the blinker (not shown) of the corresponding blinker ID. In the example described in the present drawing, Blinker Data Storage Area 83565*b*6 stores the following data: the blinker ID 'Blinker#1' and the corresponding blinker data 'Blinker Data#1'; and the blinker ID 'Blinker#2' and the corresponding blinker data 'Blinker Data#2'. Two blinkers which are represented by the blinker IDs, 'Blinker#1' and 'Blinker#2', are remotely controllable by implementing the present invention. Here, the blinker (not shown) represented by 'Blinker#1' is the right blinker and the blinker (not shown) represented by 'Blinker#2**' is the left blinker.

FIG. 733 illustrates the storage areas included in Automobile Controlling Software Storage Area **83565*c* (FIG. 725). As described in the present drawing, Automobile Controlling Software Storage Area 83565*c* includes Automobile Controller Storage Area 83565*c*1 and Remote Controlling Software Storage Area 83565*c*2. Automobile Controller Storage Area 83565*c*1 stores the controllers described in FIG. 734. Remote Controlling Software Storage Area 83565*c*2 stores the software programs described in FIG. 735**.

FIG. 734 illustrates the controllers stored in Automobile Controller Storage Area **83565*c*1 (FIG. 733). As described in the present drawing, Automobile Controller Storage Area 83565*c*1 stores Engine Controller 83565*c*1*a*, Direction Controller 83565*c*1*b*, Speed Controller 83565*c*1*c*, Window Controller 83565*c*1*d*, Door Controller 83565*c*1*e*, Radio Controller 83565*c*1*f*, TV Controller 83565*c*1*g*, Radio Channel Selector 83565*c*1*h*, TV Channel Selector 83565*c*1*i*, Blinker Controller 83565*c*1*j*, Emergency Lamp Controller 83565*c*1*k*, Cruise Control Controller 83565*c*1*l*, and Speaker Volume Controller 83565*c*1*m*. Engine Controller 83565*c*1*a* is the controller which controls the engine (not shown) of Automobile 835 (FIG. 724). Direction Controller 83565*c*1*b* is the controller which controls the steering wheel (not shown) of Automobile 835. Speed Controller 83565*c*1*c* is the controller which controls the accelerator (not shown) of Automobile 835. Window Controller 83565*c*1*d* is the controller which controls the windows (not shown) of Automobile 835. Door Controller 83565*c*1*e* is the controller which controls the doors (not shown) of Automobile 835. Radio Controller 83565*c*1*f* is the controller which controls the radio (not shown) of Automobile 835. TV Controller 83565*c*1*g* is the controller which controls the TV (not shown) of Automobile 835. Radio Channel Selector 83565*c*1*h* is the controller which controls the radio channels (not shown) of the radio (not shown) installed in Automobile 835. TV Channel Selector 83565*c*1*i* is the controller which controls the radio channels (not shown) of the radio (not shown) installed in Automobile 835. Blinker Controller 83565*c*1*j* is the controller which controls the blinkers (not shown) of Automobile 835. Emergency Lamp Controller 83565*c*1*k* is the controller which controls the emergency lamp (not shown) of Automobile 835. Cruise Control Controller 83565*c*1*l* is the controller which controls the cruise control (not shown) of Automobile 835. Speaker Volume Controller 83565*c*1*m* is the controller which controls the speaker (not shown) of Automobile 835**. As another embodiment, the foregoing controllers may be in the form of hardware instead of software.

FIG. 735 illustrates the software programs stored in Remote Controlling Software Storage Area **83565*c*2 (FIG. 733). As described in the present drawing, Remote Controlling Software Storage Area 83565*c*2 stores Engine Controlling Software 83565*c*2*a*, Direction Controlling Software 83565*c*2*b*, Speed Controlling Software 83565*c*2*c*, Window Controlling Software 83565*c*2*d*, Door Controlling Software 83565*c*2*e*, Radio Controlling Software 83565*c*2*f*, TV Controlling Software 83565*c*2*g*, Radio Channel Selecting Software 83565*c*2*h*, TV Channel Selecting Software 83565*c*2*i*, Blinker Controlling Software 83565*c*2*j*, Emergency Lamp Controlling Software 83565*c*2*k*, Cruise Control Controlling Software 83565*c*2*l*, Speaker Volume Controlling Software 83565*c*2*m*, Controller Reinstalling Software 83565*c*2*n*, Data Reinstalling Software 83565*c*2*o*, and User Access Authenticating Software 83565*c*2*p*. Engine Controlling Software 83565*c*2*a* is the software program described in FIG. 749. Direction Controlling Software 83565*c*2*b* is the software program described in FIG. 750. Speed Controlling Software 83565*c*2*c* is the software program described in FIG. 751. Window Controlling Software 83565*c*2*d* is the software program described in FIG. 752. Door Controlling Software 83565*c*2*e* is the software program described in FIG. 753. Radio Controlling Software 83565*c*2*f* is the software program described in FIG. 754. TV Controlling Software 83565*c*2*g* is the software program described in FIG. 755. Radio Channel Selecting Software 83565*c*2*h* is the software program described in FIG. 756. TV Channel Selecting Software 83565*c*2*i* is the software program described in FIG. 757. Blinker Controlling Software 83565*c*2*j* is the software program described in FIG. 758. Emergency Lamp Controlling Software 83565*c*2*k* is the software program described in FIG. 759. Cruise Control Controlling Software 83565*c*2*l* is the software program described in FIG. 760. Speaker Volume Controlling Software 83565*c*2*m* is the software program described in FIG. 761. Controller Reinstalling Software 83565*c*2*n* is the software program described in FIG. 762. Data Reinstalling Software 83565*c*2*o* is the software program described in FIG. 763. User Access Authenticating Software 83565*c*2*p* is the software program described in FIG. 748. The controllers stored in Automobile Controller Storage Area 83565*c*1 primarily functions as directly controlling Automobile 835 in the manner described in FIG. 734, and the software programs stored in Remote Controlling Software Storage Area 83565*c*2 controls the controllers stored in Automobile Controller Storage Area 83565*c*1, by cooperating with the software programs stored in Remote Controlling Software Storage Area 20665*c*2 (FIG. 747) of Communication Device 200, in a wireless fashion via Antenna 218 (FIG. 1**).

FIG. 736 illustrates the storage area included in RAM 206 (FIG. 1) of Communication Device 200. As described in the present drawing, RAM 206 includes Automobile Controlling Information Storage Area 20665*a* of which the data and the software programs stored therein are described in FIG. 737.

The data and/or the software programs stored in Automobile Controlling Information Storage Area 20665*a* (FIG. 736) may be downloaded from Host H.

FIG. 737 illustrates the storage areas included in Automobile Controlling Information Storage Area 20665*a* (FIG. 736). As described in the present drawing, Automobile Controlling Information Storage Area 20665*a* includes Automobile Controlling Data Storage Area 20665*b* and Automobile Controlling Software Storage Area 20665*c*. Automobile Controlling Data Storage Area 20665*b* stores the data necessary to implement the present function on the side of Communication Device 200, such as the ones described in FIG. 738 through FIG. 744. Automobile Controlling Software Storage Area 20665*c* stores the software programs necessary to implement the present function on the side of Communication Device 200, such as the ones described in FIG. 745.

FIG. 738 illustrates the storage areas included in Automobile Controlling Data Storage Area 20665*b* (FIG. 737). As described in the present drawing, Automobile Controlling Data Storage Area 20665*b* includes User Access Data Storage Area 20665*b*1, Window Data Storage Area 20665*b*2, Door Data Storage Area 20665*b*3, Radio Channel Data Storage Area 20665*b*4, TV Channel Data Storage Area 20665*b*5, Blinker Data Storage Area 20665*b*6, and Work Area 20665*b*7. User Access Data Storage Area 20665*b*1 stores the data described in FIG. 739. Window Data Storage Area 20665*b*2 stores the data described in FIG. 740. Door Data Storage Area 20665*b*3 stores the data described in FIG. 741. Radio Channel Data Storage Area 20665*b*4 stores the data described in FIG. 742. TV Channel Data Storage Area 20665*b*5 stores the data described in FIG. 743. Blinker Data Storage Area 20665*b*6 stores the data described in FIG. 744. Work Area 20665*b*7 is utilized as a work area to perform calculation and temporarily store data.

FIG. 739 illustrates the data stored in User Access Data Storage Area 20665*b*1 (FIG. 738). As described in the present drawing, User Access Data Storage Area 20665*b*1 comprises two columns, i.e., 'User ID' and 'Password Data'. Column 'User ID' stores the user ID which is an identification of the user of Communication Device 200. Column 'Password Data' stores the password data which represents the password set by the user of Communication Device 200. The password data is composed of alphanumeric data. In the example described in the present drawing, User Access Data Storage Area 20665*b*1 stores the following data: the user ID 'User#1' and the corresponding password data 'Password Data#1'.

FIG. 740 illustrates the data stored in Window Data Storage Area 20665*b*2 (FIG. 738). As described in the present drawing, Window Data Storage Area 20665*b*2 comprises two columns, i.e., 'Window ID' and 'Window Data'. Column 'Window ID' stores the window IDs, and each window ID is an identification of the window (not shown) of Automobile 835 (FIG. 724). Column 'Window Data' stores the window data, and each window data is the image data designed to be displayed on LCD 201 (FIG. 1) which represents the position of the window (not shown) of the corresponding window ID. In the example described in the present drawing, Window Data Storage Area 20665*b*2 stores the following data: the window ID 'Window#1' and the corresponding window data 'Window Data#1'; the window ID 'Window#2' and the corresponding window data 'Window Data#2'; the window ID 'Window#3' and the corresponding window data 'Window Data#3'; and the window ID 'Window#4' and the corresponding window data 'Window Data#4'. Four windows of Automobile 835 which are represented by the window IDs, 'Window#1' through 'Window#4', are remotely controllable by implementing the present function.

FIG. 741 illustrates the data stored in Door Data Storage Area 20665*b*3 (FIG. 738). As described in the present drawing, Door Data Storage Area 20665*b*3 comprises two columns, i.e., 'Door ID' and 'Door Data'. Column 'Door Data' stores the door data, and each door data is the image data designed to be displayed on LCD 201 (FIG. 1) which represents the position of the door (not shown) of the corresponding door ID. In the example described in the present drawing, Door Data Storage Area 20665*b*3 stores the following data: the door ID 'Door#1' and the corresponding door data 'Door Data#1'; the door ID 'Door#2' and the corresponding door data 'Door Data#2'; the door ID 'Door#3' and the corresponding door data 'Door Data#3'; and the door ID 'Door#4' and the corresponding door data 'Door Data#4'. Four doors of Automobile 835 (FIG. 724) which are represented by the door IDs, 'Door#1' through 'Door#4', are remotely controllable by implementing the present function.

FIG. 742 illustrates the data stored in Radio Channel Data Storage Area 20665*b*4 (FIG. 738). As described in the present drawing, Radio Channel Data Storage Area 20665*b*4 comprises two columns, i.e., 'Radio Channel ID' and 'Radio Channel Data'. Column 'Radio Channel ID' stores the radio channel IDs, and each radio channel ID is an identification of the radio channel (not shown) playable by the radio (not shown) installed in Automobile 835 (FIG. 724). Column 'Radio Channel Data' stores the radio channel data, and each radio channel data is the image data designed to be displayed on LCD 201 (FIG. 1) which represents the radio channel (not shown) of the corresponding radio channel ID. In the example described in the present drawing, Radio Channel Data Storage Area 20665*b*4 stores the following data: the radio channel ID 'Radio Channel#1' and the corresponding radio channel data 'Radio Channel Data#1'; the radio channel ID 'Radio Channel#2' and the corresponding radio channel data 'Radio Channel Data#2'; the radio channel ID 'Radio Channel#3' and the corresponding radio channel data 'Radio Channel Data#3'; and the radio channel ID 'Radio Channel#4' and the corresponding radio channel data 'Radio Channel Data#4'. Four radio channels which are represented by the radio channel IDs, 'Radio Channel#1' through 'Radio Channel#4', are remotely controllable by implementing the present invention.

FIG. 743 illustrates the data stored in TV Channel Data Storage Area 20665*b*5 (FIG. 738). As described in the present drawing, TV Channel Data Storage Area 20665*b*5 comprises two columns, i.e., 'TV Channel ID' and 'TV Channel Data'. Column 'TV Channel ID' stores the TV channel IDs, and each TV channel ID is an identification of the TV channel (not shown) playable by the TV (not shown) installed in Automobile 835 (FIG. 724). Column 'TV Channel Data' stores the TV channel data, and each TV channel data is the image data designed to be displayed on LCD 201 (FIG. 1) which represents the TV channel (not shown) of the corresponding TV channel ID. In the example described in the present drawing, TV Channel Data Storage Area 20665*b*5 stores the following data: the TV channel ID 'TV Channel#1' and the corresponding TV channel data 'TV Channel Data#1'; the TV channel ID 'TV Channel#2' and the corresponding TV channel data 'TV Channel Data#2'; the TV channel ID 'TV Channel#3' and the corresponding TV channel data 'TV Channel Data#3'; and the TV channel ID 'TV Channel#4' and the corresponding TV channel data 'TV Channel Data#4'. Four TV channels which are represented by the TV channel IDs, 'TV Channel#1' through 'TV Channel#4', are remotely controllable by implementing the present invention.

FIG. 744 illustrates the data stored in Blinker Data Storage Area **20665*b*6 (FIG. 738). As described in the present drawing, Blinker Data Storage Area 20665*b*6 comprises two columns, i.e., 'Blinker ID' and 'Blinker Data'. Column 'Blinker ID' stores the blinker IDs, and each blinker ID is an identification of the blinker (not shown) of Automobile 835 (FIG. 724). Column 'Blinker Data' stores the blinker data, and each blinker data is the image data designed to be displayed on LCD 201 (FIG. 1) which represents the blinker (not shown) of the corresponding blinker ID. In the example described in the present drawing, Blinker Data Storage Area 20665*b*6 stores the following data: the blinker ID 'Blinker#1' and the corresponding blinker data 'Blinker Data#1'; and the blinker ID 'Blinker#2' and the corresponding blinker data 'Blinker Data#2'. Two blinkers which are represented by the blinker IDs, 'Blinker#1' and 'Blinker#2', are remotely controllable by implementing the present invention. Here, the blinker (not shown) represented by 'Blinker#1' is the right blinker and the blinker (not shown) represented by 'Blinker#2**' is the left blinker.

FIG. 745 illustrates the storage areas included in Automobile Controlling Software Storage Area **20665*c* (FIG. 737). As described in the present drawing, Automobile Controlling Software Storage Area 20665*c* includes Automobile Controller Storage Area 20665*c*1 and Remote Controlling Software Storage Area 20665*c*2. Automobile Controller Storage Area 20665*c*1 stores the controllers described in FIG. 746. Remote Controlling Software Storage Area 20665*c*2 stores the software programs described in FIG. 747**.

FIG. 746 illustrates the controllers stored in Automobile Controller Storage Area **20665*c*1 (FIG. 745). As described in the present drawing, Automobile Controller Storage Area 20665*c*1 stores Engine Controller 20665*c*1*a*, Direction Controller 20665*c*1*b*, Speed Controller 20665*c*1*c*, Window Controller 20665*c*1*d*, Door Controller 20665*c*1*e*, Radio Controller 20665*c*1*f*, TV Controller 20665*c*1*g*, Radio Channel Selector 20665*c*1*h*, TV Channel Selector 20665*c*1*i*, Blinker Controller 20665*c*1*j*, Emergency Lamp Controller 20665*c*1*k*, Cruise Control Controller 20665*c*1*l*, and Speaker Volume Controller 20665*c*1*m*. Engine Controller 20665*c*1*a* is the controller which controls the engine (not shown) of Automobile 206. Direction Controller 20665*c*1*b* is the controller which controls the steering wheel (not shown) of Automobile 206. Speed Controller 20665*c*1*c* is the controller which controls the accelerator (not shown) of Automobile 206. Window Controller 20665*c*1*d* is the controller which controls the windows (not shown) of Automobile 206. Door Controller 20665*c*1*e* is the controller which controls the doors (not shown) of Automobile 206. Radio Controller 20665*c*1*f* is the controller which controls the radio (not shown) of Automobile 206. TV Controller 20665*c*1*g* is the controller which controls the TV (not shown) of Automobile 206. Radio Channel Selector 20665*c*1*h* is the controller which controls the radio channels (not shown) of the radio (not shown) installed in Automobile 206. TV Channel Selector 20665*c*1*i* is the controller which controls the radio channels (not shown) of the radio (not shown) installed in Automobile 206. Blinker Controller 20665*c*1*j* is the controller which controls the blinkers (not shown) of Automobile 206. Emergency Lamp Controller 20665*c*1*k* is the controller which controls the emergency lamp (not shown) of Automobile 206. Cruise Control Controller 20665*c*1*l* is the controller which controls the cruise control (not shown) of Automobile 206. Speaker Volume Controller 20665*c*1*m* is the controller which controls the speaker (not shown) of Automobile 206. As another embodiment, the foregoing controllers may be in the form of hardware instead of software. The data stored in Automobile Controller Storage Area 20665*c*1 are primarily utilized for reinstallation, i.e., to reinstall the data to Automobile 835 (FIG. 724) as described hereinafter in case the data stored in Automobile 835** are corrupted or lost.

FIG. 747 illustrates the software programs stored in Remote Controlling Software Storage Area **20665*c*2 (FIG. 737). As described in the present drawing, Remote Controlling Software Storage Area 20665*c*2 stores Engine Controlling Software 20665*c*2*a*, Direction Controlling Software 20665*c*2*b*, Speed Controlling Software 20665*c*2*c*, Window Controlling Software 20665*c*2*d*, Door Controlling Software 20665*c*2*e*, Radio Controlling Software 20665*c*2*f*, TV Controlling Software 20665*c*2*g*, Radio Channel Selecting Software 20665*c*2*h*, TV Channel Selecting Software 20665*c*2*i*, Blinker Controlling Software 20665*c*2*j*, Emergency Lamp Controlling Software 20665*c*2*k*, Cruise Control Controlling Software 20665*c*2*l*, Speaker Volume Controlling Software 20665*c*2*m*, Controller Reinstalling Software 20665*c*2*n*, Data Reinstalling Software 20665*c*2*o*, and User Access Authenticating Software 20665*c*2*p*. Engine Controlling Software 20665*c*2*a* is the software program described in FIG. 749. Direction Controlling Software 20665*c*2*b* is the software program described in FIG. 750. Speed Controlling Software 20665*c*2*c* is the software program described in FIG. 751. Window Controlling Software 20665*c*2*d* is the software program described in FIG. 752. Door Controlling Software 20665*c*2*e* is the software program described in FIG. 753. Radio Controlling Software 20665*c*2*f* is the software program described in FIG. 754. TV Controlling Software 20665*c*2*g* is the software program described in FIG. 755. Radio Channel Selecting Software 20665*c*2*h* is the software program described in FIG. 756. TV Channel Selecting Software 20665*c*2*i* is the software program described in FIG. 757. Blinker Controlling Software 20665*c*2*j* is the software program described in FIG. 758. Emergency Lamp Controlling Software 20665*c*2*k* is the software program described in FIG. 759. Cruise Control Controlling Software 20665*c*2*l* is the software program described in FIG. 760. Speaker Volume Controlling Software 20665*c*2*m* is the software program described in FIG. 761. Controller Reinstalling Software 20665*c*2*n* is the software program described in FIG. 762. Data Reinstalling Software 20665*c*2*o* is the software program described in FIG. 763. User Access Authenticating Software 20665*c*2*p* is the software program described in FIG. 748. The controllers stored in Automobile Controller Storage Area 83565*c*1 primarily functions as directly controlling Automobile 835 in the manner described in FIG. 734, and the software programs stored in Remote Controlling Software Storage Area 83565*c*2 (FIG. 747) controls the controllers stored in Automobile Controller Storage Area 83565*c*1 (FIG. 734), by cooperating with the software programs stored in Remote Controlling Software Storage Area 83565*c*2 (FIG. 735) of Automobile 835, in a wireless fashion via Antenna 218 (FIG. 1**).

FIG. 748 illustrates User Access Authenticating Software **83565*c*2*p* (FIG. 735) of Automobile 835 (FIG. 724) and User Access Authenticating Software 20665*c*2*p* (FIG. 747) of Communication Device 200, which determine whether Communication Device 200 in question is authorized to remotely control Automobile 835 by implementing the present function. As described in the present drawing, the user of Communication Device 200 inputs the user ID and the password data by utilizing Input Device 210 (FIG. 1) or via voice recognition system. The user ID and the password data are temporarily stored in User Access Data Storage Area 20665*b*1 (FIG. 739) from which the two data are sent to Automobile 835 (S1). Assume that the user input 'User#1' as the user ID and 'Password Data#1' as the password data. Upon receiving the user ID and the password data (in the present example, User#1 and Password Data#1) from Communication Device 200, Automobile 835 stores the two data in Work Area 83565*b*7 (FIG. 726) (S2). Automobile 835 then initiates the authentication process to determine whether Communication Device 200 in question is authorized to remotely control Automobile 835 by referring to the data stored in User Access Data Storage Area 83565*b*1 (FIG. 727) (S3). Assume that the authenticity of Communication Device 200 in question is cleared. Automobile 835 permits Communication Device 200 in question to remotely control Automobile 835 in the manner described hereinafter (S4**).

FIG. 749 illustrates Engine Controlling Software **83565*c*2*a* (FIG. 735) of Automobile 835 (FIG. 724) and Engine Controlling Software 20665*c*2*a* (FIG. 747) of Communication Device 200, which ignite or turn off the engine (not shown) of Automobile 835. As described in the present drawing, the user of Communication Device 200 inputs an engine controlling signal by utilizing Input Device 210 (FIG. 1) or via voice recognition system. The signal is sent to Automobile 835 (S1). Here, the engine controlling signal indicates either to ignite the engine or turn off the engine. Upon receiving the engine controlling signal from Communication Device 200, Automobile 835 stores the signal in Work Area 83565*b*7 (FIG. 726) (S2). Automobile 835 controls the engine (not shown) via Engine Controller 83565*c*1*a* (FIG. 734) in accordance with the engine controlling signal (S3**).

FIG. 750 illustrates Direction Controlling Software **83565*c*2*b* (FIG. 735) of Automobile 835 (FIG. 724) and Direction Controlling Software 20665*c*2*b* (FIG. 747) of Communication Device 200, which control the direction of Automobile 835. As described in the present drawing, the user of Communication Device 200 inputs a direction controlling signal by utilizing Input Device 210 (FIG. 1) or via voice recognition system. The signal is sent to Automobile 835 (S1). Here, the direction controlling signal indicates either to move forward, back, left, or right Automobile 835. Upon receiving the direction controlling signal from Communication Device 200, Automobile 835 stores the signal in Work Area 83565*b*7 (FIG. 726) (S2). Automobile 835 controls the direction via Direction Controller 83565*c*1*b* (FIG. 734) in accordance with the direction controlling signal (S3**).

FIG. 751 illustrates Speed Controlling Software **83565*c*2*c* (FIG. 735) of Automobile 835 (FIG. 724) and Speed Controlling Software 20665*c*2*c* (FIG. 747) of Communication Device 200, which control the speed of Automobile 835. As described in the present drawing, the user of Communication Device 200 inputs a speed controlling signal by utilizing Input Device 210 (FIG. 1) or via voice recognition system. The signal is sent to Automobile 835 (S1). Here, the speed controlling signal indicates either to increase speed or decrease speed of Automobile 835. Upon receiving the speed controlling signal from Communication Device 200, Automobile 835 stores the signal in Work Area 83565*b*7 (FIG. 726) (S2). Automobile 835 controls the speed via Speed Controller 83565*c*1*c* (FIG. 734) In accordance the with speed controlling signal (S3**).

FIG. 752 illustrates Window Controlling Software **83565*c*2*d* (FIG. 735) of Automobile 835 (FIG. 724) and Window Controlling Software 20665*c*2*d* (FIG. 747) of Communication Device 200, which control the window (not shown) of Automobile 835. As described in the present drawing, CPU 211 (FIG. 1) of Communication Device 200 retrieves all window data from Window Data Storage Area 20665*b*2 (FIG. 740) and displays the data on LCD 201 (FIG. 1) (S1). The user of Communication Device 200 selects one of the window data (for example, Window Data#1), and CPU 211 identifies the corresponding window ID (for example, Window#1) by referring to Window Data Storage Area 20665*b*2 (FIG. 740) (S2). The user further inputs a window controlling signal by utilizing Input Device 210 (FIG. 1) or via voice recognition system (S3). Here, the window controlling signal indicates either to open the window or to close the window. CPU 211 sends the window ID and the window controlling signal to Automobile 835 (S4). Upon receiving the window ID and the window controlling signal from Communication Device 200, Automobile 835 stores both data in Work Area 83565*b*7 (FIG. 726) (S5). Automobile 835 controls the window identified by the window ID via Window Controller 83565*c*1*d* (FIG. 734) in accordance with the window controlling signal (S6**).

FIG. 753 illustrates Door Controlling Software **83565*c*2*e* (FIG. 735) of Automobile 835 (FIG. 724) and Door Controlling Software 20665*c*2*e* (FIG. 747) of Communication Device 200, which control the door (not shown) of Automobile 835. As described in the present drawing, CPU 211 (FIG. 1) of Communication Device 200 retrieves all door data from Door Data Storage Area 20665*b*3 (FIG. 741) and displays the data on LCD 201 (FIG. 1) (S1). The user of Communication Device 200 selects one of the door data (for example, Door Data#1), and CPU 211 identifies the corresponding door ID (for example, Door#1) by referring to Door Data Storage Area 20665*b*3 (FIG. 741) (S2). The user further inputs a door controlling signal by utilizing Input Device 210 (FIG. 1) or via voice recognition system. Here, the door controlling signal indicates either to open the door or to close the door (S3). CPU 211 sends the door ID and the door controlling signal to Automobile 835 (S4). Upon receiving the door ID and the door controlling signal from Communication Device 200, Automobile 835 stores both data in Work Area 83565*b*7 (FIG. 726) (S5). Automobile 835 controls the door identified by the door ID via Door Controller 83565*c*1*e* (FIG. 734) in accordance with the door controlling signal (S6**).

FIG. 754 illustrates Radio Controlling Software **83565*c*2*f* (FIG. 735) of Automobile 835 (FIG. 724) and Radio Controlling Software 20665*c*2*f* (FIG. 747) of Communication Device 200, which turn on or turn off the radio (not shown) installed in Automobile 835. As described in the present drawing, the user of Communication Device 200 inputs a radio controlling signal, and CPU 211 sends the signal to Automobile 835 (S1). Here, the radio controlling signal indicates either to turn on the radio or to turn off the radio. Upon receiving the radio controlling signal from Communication Device 200, Automobile 835 stores the signal in Work Area 83565*b*7 (FIG. 726) (S2). Automobile 835 controls the radio via Radio Controller 83565*c*1*f* (FIG. 734) in accordance with the radio controlling signal (S3**).

FIG. 755 illustrates TV Controlling Software **83565*c*2*g* (FIG. 735) of Automobile 835 (FIG. 724) and TV Controlling Software 20665*c*2*g* (FIG. 747) of Communication Device 200, which turn on or turn off the TV (not shown) installed in Automobile 835. As described in the present drawing, the user of Communication Device 200 inputs a TV controlling signal, and CPU 211 (FIG. 1) sends the signal to Automobile 835 (S1). Here, the TV controlling signal indicates either to turn on the TV or to turn off the TV. Upon receiving the TV controlling signal from Communication Device 200, Automobile 835 stores the signal in Work Area 83565*b*7 (FIG. 726) (S2). Automobile 835 controls the TV via TV Controller 83565*c*1*g* (FIG. 734) in accordance with the TV controlling signal (S3**).

FIG. 756 illustrates Radio Channel Selecting Software **83565*c*2*h* (FIG. 735) of Automobile 835 (FIG. 724) and Radio Channel Selecting Software 20665*c*2*h* (FIG. 747) of Communication Device 200, which select the channel of the radio (not shown) installed in Automobile 835. As described in the present drawing, CPU 211 (FIG. 1) of Communication Device 200 retrieves all radio channel data from Radio Channel Data Storage Area 20665*b*4 (FIG. 742) and Displays the data on LCD 201 (FIG. 1) (S1). The user of Communication Device 200 selects one of the radio channel data (for example, Radio Channel Data#1), and CPU 211 identifies the corresponding radio channel ID (for example, Radio Channel#1) by referring to Radio Channel Data Storage Area 20665*b*4 (FIG. 742) (S2). CPU 211 sends the radio channel ID and the radio channel controlling signal to Automobile 835 (S3). Here, the radio channel controlling signal indicates to change the radio channel to the one identified by the radio channel ID. Upon receiving the radio channel ID and the radio channel controlling signal from Communication Device 200, Automobile 835 stores both data in Work Area 83565*b*7 (FIG. 726) (S4). Automobile 835 controls the radio channel of the radio via Radio Channel Selector 83565*c*1*h* (FIG. 734) in accordance with the Radio Channel Controlling Signal (S5**).

FIG. 757 illustrates TV Channel Selecting Software **83565*c*2*i* (FIG. 735) of Automobile 835 (FIG. 724) and TV Channel Selecting Software 20665*c*2*i* (FIG. 747) of Communication Device 200, which select the channel of the TV (not shown) installed in Automobile 835. As described in the present drawing, CPU 211 (FIG. 1) of Communication Device 200 retrieves all TV channel data from TV Channel Data Storage Area 20665*b*5 (FIG. 743) and displays the data on LCD 201 (FIG. 1) (S1). The user of Communication Device 200 selects one of the TV channel data, and CPU 211 identifies the corresponding TV channel ID (for example, TV Channel#1) by referring to TV Channel Data Storage Area 20665*b*5 (FIG. 743) (S2). CPU 211 sends the TV channel ID and the TV channel controlling signal to Automobile 835 (S3). Here, the TV channel controlling signal indicates to change the TV channel to the one identified by the TV channel ID. Upon receiving the TV channel ID and the TV channel controlling signal from Communication Device 200, Automobile 835 stores both data in Work Area 83565*b*7 (FIG. 726) (S4). Automobile 835 controls the TV Channel via TV Channel Selector 83565*c*1*i* (FIG. 734) in accordance with the TV channel controlling signal (S5**).

FIG. 758 illustrates Blinker Controlling Software **83565*c*2*j* (FIG. 735) of Automobile 835 (FIG. 724) and Blinker Controlling Software 20665*c*2*j* (FIG. 747) of Communication Device 200, which turn on or turn off the blinker (not shown) of Automobile 835. As described in the present drawing, CPU 211 (FIG. 1) of Communication Device 200 retrieves all blinker data from Blinker Data Storage Area 20665*b*6 (FIG. 744) and displays the data on LCD 201 (FIG. 1) (S1). The user of Communication Device 200 selects one of the blinker data, and CPU 211 identifies the corresponding blinker ID (for example Blinker#1) by referring to Blinker Data Storage Area 20665*b*6 (FIG. 744) (S2). CPU 211 sends the blinker ID and the blinker controlling signal to Automobile 835 (S3). Here, the blinker controlling signal indicates either to turn on or turn off the blinker identified by the blinker ID. Upon receiving the blinker ID and the blinker controlling signal from Communication Device 200, Automobile 835 stores both data in Work Area 83565*b*7 (FIG. 726) (S4). Automobile 835 controls the blinker via Blinker Controller 20665*c*1*j* in accordance with the blinker controlling signal (S5**).

FIG. 759 illustrates Emergency Lamp Controlling Software **83565*c*2*k* (FIG. 735) of Automobile 835 (FIG. 724) and Emergency Lamp Controlling Software 20665*c*2*k* (FIG. 747) of Communication Device 200, which turn on or turn off the emergency lamp (not shown) installed in Automobile 835. As described in the present drawing, the user of Communication Device 200 inputs an emergency lamp controlling signal, and CPU 211 (FIG. 1) sends the signal to Automobile 835 (S1). Here, the emergency lamp controlling signal indicates either to turn on the emergency lamp or to turn off the emergency lamp. Upon receiving the emergency lamp controlling signal from Communication Device 200, Automobile 835 stores the signal in Work Area 83565*b*7 (FIG. 726) (S2). Automobile 835 controls the emergency lamp via Emergency Lamp Controller 83565*c*1*k* (FIG. 734) in accordance with the emergency lamp controlling signal (S3**).

FIG. 760 illustrates Cruise Control Controlling Software **83565*c*2*l* (FIG. 735) of Automobile 835 (FIG. 724) and Cruise Control Controlling Software 20665*c*2*l* (FIG. 747) of Communication Device 200, which turn on or turn off the cruise control (not shown) of Automobile 835. As described in the present drawing, the user of Communication Device 200 inputs a cruise control controlling signal, and CPU 211 (FIG. 1) sends the signal to Automobile 835 (S1). Here, the cruise control controlling signal indicates either to turn on the cruise control or turn off the cruise control. Upon receiving the cruise control controlling signal from Communication Device 200, Automobile 835 stores the signal in Work Area 83565*b*7 (FIG. 726) (S2). Automobile 835 controls the cruise control via Cruise Control Controller 83565*c*1*l* (FIG. 734) in accordance with the cruise control controlling signal (S3**).

FIG. 761 illustrates Speaker Volume Controlling Software **83565*c*2*m* (FIG. 735) of Automobile 835 (FIG. 724) and Speaker Volume Controlling Software 20665*c*2*m* (FIG. 747) of Communication Device 200, which raise or lower the volume of the speaker (not shown) of Automobile 835. As described in the present drawing, the user of Communication Device 200 inputs a speaker volume controlling signal, and CPU 211 (FIG. 1) sends the signal to Automobile 835 (S1). Here, the speaker volume controlling signal indicates either to raise the volume or lower the volume of the speaker. Upon receiving the speaker volume controlling signal from Communication Device 200, Automobile 835 stores the signal in Work Area 83565*b*7 (FIG. 726) (S2). Automobile 835 controls the speaker volume of the speaker via Speaker Volume Controller 83565*c*1*m* (FIG. 734) in accordance with the speaker volume controlling signal (S3**).

FIG. 762 illustrates Controller Reinstalling Software **83565*c*2*n* (FIG. 735) of Automobile 835 (FIG. 724) and Controller Reinstalling Software 20665*c*2*n* (FIG. 747) of Communication Device 200, which reinstalls the controllers to Automobile Controller Storage Area 83565*c*1. As described in the present drawing, CPU 211 (FIG. 1) of Communication Device 200 retrieves all controllers from Automobile Controller Storage Area 20665*c*1, and sends the controllers to Automobile 835 (S1). Upon receiving the controllers from Communication Device 200, Automobile 835 stores the controllers in Work Area 83565*b*7 (FIG. 726**)

(S2). Automobile 835 then reinstalls the controllers in Automobile Controller Storage Area **83565*c*1** (S3).

FIG. 763 illustrates Data Reinstalling Software **83565*c*2*o* (FIG. 735) of Automobile 835 (FIG. 724) and Data Reinstalling Software 20665*c*2*o* (FIG. 747) of Communication Device 200, which reinstall the data to Automobile Controlling Data Storage Area 20665*b*. As described in the present drawing, Automobile 835 retrieves all data from Automobile Controlling Data Storage Area 83565*b*, and sends the data to Communication Device 200 (S1). Upon receiving the data from Automobile 835, CPU 211 (FIG. 1) of Communication Device 200 stores the data in Work Area 20665*b*7 (S2). CPU 211 then reinstalls the data in Automobile Controlling Data Storage Area 20665*b*** (S3).

For the avoidance of doubt, Automobile 835 (FIG. 724) is not limited to an automobile or a car; the present function may be implemented with any type of carrier or vehicle, such as airplane, space ship, artificial satellite, space station, train, and motor cycle.

<<OCR Function>>

FIG. 764 illustrates the storage area included in RAM 206 (FIG. 1). As described in the present drawing, RAM 206 includes OCR Information Storage Area **20666*a* of which the data and the software programs stored therein are described in FIG. 765**.

The data and/or the software programs stored in OCR Information Storage Area **20666*a* (FIG. 764**) may be downloaded from Host H.

FIG. 765 illustrates the storage areas included in OCR Information Storage Area **20666*a* (FIG. 764). As described in the present drawing, OCR Information Storage Area 20666*a* includes OCR Data Storage Area 20666*b* and OCR Software Storage Area 20666*c*. OCR Data Storage Area 20666*b* stores the data necessary to implement the present function, such as the ones described in FIG. 766 through FIG. 771. OCR Software Storage Area 20666*c* stores the software programs necessary to implement the present function, such as the ones described in FIG. 772 and FIG. 773**.

FIG. 766 illustrates the storage areas included in OCR Data Storage Area **20666*b* (FIG. 765). As described in the present drawing, OCR Data Storage Area 20666*b* includes Web Address Data Storage Area 20666*b*1, Email Address Data Storage Area 20666*b*2, Phone Data Storage Area 20666*b*3, Alphanumeric Data Storage Area 20666*b*4, Image Data Storage Area 20666*b*5, and Work Area 20666*b*6. Web Address Data Storage Area 20666*b*1 stores the data described in FIG. 767. Email Address Data Storage Area 20666*b*2 stores the data described in FIG. 768. Phone Data Storage Area 20666*b*3 stores the data described in FIG. 769. Alphanumeric Data Storage Area 20666*b*4 stores the data described in FIG. 770. Image Data Storage Area 20666*b*5 stores the data described in FIG. 771. Work Area 20666*b*6** is utilized as a work area to perform calculation and temporarily store data.

FIG. 767 illustrates the data stored in Web Address Data Storage Area **20666*b*1 (FIG. 766). As described in the present drawing, Web Address Data Storage Area 20666*b*1 comprises two columns, i.e., 'Web Address ID' and 'Web Address Data'. Column 'Web Address ID' stores the web address IDs, and each web address ID is the title of the corresponding web address data stored in column 'Web Address Data' utilized for identification purposes. Column 'Web Address Data' stores the web address data, and each web address data represents a web address composed of alphanumeric data of which the first portion thereof is 'http://'. In the example described in the present drawing, Web Address Data Storage Area 20666*b*1 stores the following data: the web address ID 'Web Address#1' and the corresponding web address data 'Web Address Data#1'; the web address ID 'Web Address#2' and the corresponding web address data 'Web Address Data#2'; the web address ID 'Web Address#3' and the corresponding web address data 'Web Address Data#3'; and the web address ID 'Web Address#4' and the corresponding web address data 'Web Address Data#4**'.

FIG. 768 illustrates the data stored in Email Address Data Storage Area **20666*b*2 (FIG. 766). As described in the present drawing, Email Address Data Storage Area 20666*b*2 comprises two columns, i.e., 'Email Address ID' and 'Email Address Data'. Column 'Email Address ID' stores the email address IDs, and each email address ID is the title of the corresponding email address data stored in column 'Email Address Data' utilized for identification purposes. Column 'Email Address Data' stores the email address data, and each email address data represents an email address composed of alphanumeric data which includes '@' mark therein. In the example described in the present drawing, Email Address Data Storage Area 20666*b*2 stores the following data: the email address ID 'Email Address#1' and the corresponding email address data 'Email Address Data#1'; the email address ID 'Email Address#2' and the corresponding email address data 'Email Address Data#2'; the email address ID 'Email Address#3' and the corresponding email address data 'Email Address Data#3'; and the email address ID 'Email Address#4' and the corresponding email address data 'Email Address Data#4**'.

FIG. 769 illustrates the data stored in Phone Data Storage Area **20666*b*3 (FIG. 766). As described in the present drawing, Phone Data Storage Area 20666*b*3 comprises two columns, i.e., 'Phone ID' and 'Phone Data'. Column 'Phone ID' stores the phone IDs, and each phone ID is the title of the corresponding phone data stored in column 'Phone Data' utilized for identification purposes. Column 'Phone Data' stores the phone data, and each phone data represents a phone number composed of numeric figure of which the format is 'xxx-xxx-xxxx'. In the example described in the present drawing, Phone Data Storage Area 20666*b*3 stores the following data: the phone ID 'Phone#1' and the corresponding phone data 'Phone Data#1'; the phone ID 'Phone#2' and the corresponding phone data 'Phone Data#2'; the phone ID 'Phone#3' and the corresponding phone data 'Phone Data#3'; and the phone ID 'Phone#4' and the corresponding phone data 'Phone Data#4**'.

FIG. 770 illustrates the data stored in Alphanumeric Data Storage Area **20666*b*4 (FIG. 766). As described in the present drawing, Alphanumeric Data Storage Area 20666*b*4 comprises two columns, i.e., 'Alphanumeric ID' and 'Alphanumeric Data'. Column 'Alphanumeric ID' stores alphanumeric IDs, and each alphanumeric ID is the title of the corresponding alphanumeric data stored in column 'Alphanumeric Data' utilized for identification purposes. Column 'Alphanumeric Data' stores the alphanumeric data, and each alphanumeric data represents alphanumeric figure primarily composed of numbers, texts, words, and letters. In the example described in the present drawing, Alphanumeric Data Storage Area 20666*b*4 stores the following data: the alphanumeric ID 'Alphanumeric#1' and the corresponding alphanumeric data 'Alphanumeric Data#1'; the alphanumeric ID 'Alphanumeric#2' and the corresponding alphanumeric data 'Alphanumeric Data#2'; the alphanumeric ID 'Alphanumeric#3' and the corresponding alphanumeric data 'Alphanumeric Data#3'; and the alphanumeric ID 'Alphanumeric#4' and the corresponding alphanumeric data 'Alphanumeric Data#4**'.

FIG. 771 illustrates the data stored in Image Data Storage Area **20666*b*5 (FIG. 766). As described in the present drawing, Image Data Storage Area 20666*b*5 comprises two columns, i.e., 'Image ID' and 'Image Data'. Column 'Image ID' stores the image IDs, and each image ID is the title of the corresponding image data stored in column 'Image Data' utilized for identification purposes. Column 'Image Data' stores the image data, and each image data is a data composed of image such as the image input via CCD Unit 214 (FIG. 1). In the example described in the present drawing, Image Data Storage Area 20666*b*5 stores the following data: the Image ID 'Image#1' and the corresponding Image Data 'Image Data#1'; the Image ID 'Image#2' and the corresponding Image Data 'Image Data#2'; the Image ID 'Image#3' and the corresponding Image Data 'Image Data#3'; and the Image ID 'Image#4' and the corresponding Image Data 'Image Data#4**'.

FIG. 772 and FIG. 773 illustrate the software programs stored in OCR Software Storage Area **20666*c* (FIG. 765). As described in the present drawing, OCR Software Storage Area 20666*c* stores Image Data Scanning Software 20666*c*1, Image Data Storing Software 20666*c*2, OCR Software 20666*c*3, Alphanumeric Data Storing Software 20666*c*4, Web Address Data Identifying Software 20666*c*5*a*, Web Address Data Correcting Software 20666*c*5*b*, Web Address Data Storing Software 20666*c*5*c*, Address Accessing Software 20666*c*5*d*, Email Address Data Identifying Software 20666*c*6*a*, Email Address Data Correcting Software 20666*c*6*b*, Email Address Data Storing Software 20666*c*6*c*, Email Editing Software 20666*c*6*d*, Phone Data Identifying Software 20666*c*7*a*, Phone Data Correcting Software 20666*c*7*b*, Phone Data Storing Software 20666*c*7*c*, and Dialing Software 20666*c*7*d*. Image Data Scanning Software 20666*c*1 is the software program described in FIG. 774. Image Data Storing Software 20666*c*2 is the software program described in FIG. 775. OCR Software 20666*c*3 is the software program described in FIG. 776. Alphanumeric Data Storing Software 20666*c*4 is the software program described in FIG. 777. Web Address Data Identifying Software 20666*c*5*a* is the software program described in FIG. 778. Web Address Data Correcting Software 20666*c*5*b* is the software program described in FIG. 779. Web Address Data Storing Software 20666*c*5*c* is the software program described in FIG. 780. Web Address Accessing Software 20666*c*5*d* is the software program described in FIG. 781. Email Address Data Identifying Software 20666*c*6*a* is the software program described in FIG. 782. Email Address Data Correcting Software 20666*c*6*b* is the software program described in FIG. 783. Email Address Data Storing Software 20666*c*6*c* is the software program described in FIG. 784. Email Editing Software 20666*c*6*d* is the software program described in FIG. 785. Phone Data Identifying Software 20666*c*7*a* is the software program described in FIG. 786. Phone Data Correcting Software 20666*c*7*b* is the software program described in FIG. 787. Phone Data Storing Software 20666*c*7*c* is the software program described in FIG. 788. Dialing Software 20666*c*7*d* is the software program described in FIG. 789**.

FIG. 774 illustrates Image Data Scanning Software **20666*c*1 (FIG. 772) of Communication Device 200, which scans an image by utilizing CCD Unit (FIG. 1). Referring to the present drawing, CPU 211 (FIG. 1) scans an image by utilizing CCD Unit (FIG. 1) (S1), and stores the extracted image data in Work Area 20666*b*6 (FIG. 766) (S2). CPU 211 then retrieves the image data from Work Area 20666*b*6 (FIG. 766) and displays the data on LCD 201 (FIG. 1) (S3**).

FIG. 775 illustrates Image Data Storing Software **20666*c*2 (FIG. 772) of Communication Device 200, which stores the image data scanned by CCD Unit (FIG. 1). Referring to the present drawing, CPU 211 (FIG. 1) retrieves the image data from Work Area 20666*b*6 (FIG. 766) and displays the data On LCD 201 (FIG. 1) (S1). The user of Communication Device 200 inputs an image ID, i.e., a title of the image data by utilizing Input Device 210 (FIG. 1) or via voice recognition system (S2). CPU 211 then stores the image ID and the image data in Image Data Storage Area 20666*b*5 (FIG. 771) (S3**).

FIG. 776 illustrates OCR Software **20666*c*3 (FIG. 772) of Communication Device 200, which extracts alphanumeric data from image data by utilizing the method so-called 'optical character recognition' or 'OCR'. Referring to the present drawing, CPU 211 (FIG. 1) retrieves the image IDs from Image Data Storage Area 20666*b*5 (FIG. 771) and displays the data on LCD 201 (FIG. 1) (S1). The user of Communication Device 200 selects one of the image IDs by utilizing Input Device 210 (FIG. 1) or via voice recognition system (S2). CPU 211 then retrieves the image data of the image ID selected in S2 from Image Data Storage Area 20666*b*5 (FIG. 771) and displays the image data on LCD 201 (FIG. 1) (S3). CPU 211 executes the OCR process, i.e., extracts alphanumeric data from the image data (S4), and stores the extracted alphanumeric data in Work Area 20666*b*6 (FIG. 766) (S5**).

FIG. 777 illustrates Alphanumeric Data Storing Software **20666*c*4 (FIG. 772) of Communication Device 200, which stores the extracted alphanumeric data in Alphanumeric Data Storage Area 20666*b*4 (FIG. 770). Referring to the present drawing, the user of Communication Device 200 inputs an alphanumeric ID (i.e., the title of the alphanumeric data) (S1). CPU 211 (FIG. 1) then retrieves the alphanumeric data from Work Area 20666*b*6 (FIG. 766) (S2), and stores the data in Alphanumeric Data Storage Area 20666*b*4 (FIG. 770) with the Alphanumeric ID (S3**).

FIG. 778 illustrates Web Address Data Identifying Software **20666*c*5*a* (FIG. 772) of Communication Device 200, which identifies the web address data among the Alphanumeric Data. Referring to the present drawing, CPU 211 (FIG. 1) retrieves the alphanumeric IDs from Alphanumeric Data Storage Area 20666*b*4 (FIG. 770) and displays the alphanumeric IDs on LCD 201 (FIG. 1) (S1). The user of Communication Device 200 selects one of the Alphanumeric IDs by utilizing Input Device 210 (FIG. 1) or via voice recognition system (S2). CPU 211 retrieves the corresponding alphanumeric data from Alphanumeric Data Storage Area 20666*b*4 (FIG. 770) and displays the data on LCD 201 (FIG. 1) (S3). CPU 211 stores the alphanumeric data retrieved in S3 in Work Area 20666*b*6 (FIG. 766) for the web address data identification explained in the next step (S4). CPU 211 scans the alphanumeric data, i.e., applies the web address criteria (for example, 'http://', 'www.', '.com', '.org', '.edu') to each alphanumeric data, and identifies the web address data included therein (S5). CPU 211 emphasizes the identified web address data by changing the font color (for example, blue) and drawing underlines to the identified web address data (S6). CPU 211 displays the alphanumeric data with the identified web address data emphasized on LCD 201 (FIG. 1) thereafter (S7**).

FIG. 779 illustrates Web Address Data Correcting Software **20666*c*5*b* (FIG. 772) of Communication Device 200, which corrects the misidentified web address data by manually selecting the start point and the end point of the web address data. For example, if the web address data is misidentified as 'www.yahoo' and leaves out the remaining '.com', the user of Communication Device 200 may manually correct the web address data by selecting the start point and the end point of 'www.yahoo.com'. Referring to the present drawing, CPU 211 (FIG. 1) displays the alphanumeric data with web address data emphasized (S1). The user of Communication Device 200 selects the start point of the web address data (S2) and the end point of the web address data by utilizing Input Device 210 (FIG. 1) or via voice recognition system (S3). CPU 211 then identifies the alphanumeric data located between the start point and the end point as web address data (S4), and emphasizes the web address data by changing the font color (for example, blue) and drawing underlines thereto (S5). The alphanumeric data with the web address data emphasized are displayed on LCD 201 (FIG. 1) thereafter (S6**).

FIG. 780 illustrates Web Address Data Storing Software **20666*c*5*c* (FIG. 772) of Communication Device 200, which stores the web address data in Web Address Data Storage Area 20666*b*1 (FIG. 767). Referring to the present drawing, CPU 211 (FIG. 1) displays the alphanumeric data with web address data emphasized (S1). The user of Communication Device 200 selects one of the web address data by utilizing Input Device 210 (FIG. 1) or via voice recognition system, and CPU 211 emphasizes the data (for example, change to bold font) (S2). The user then inputs the web address ID (the title of the web address data) (S3). CPU 211 stores the web address ID and the web address data in Web Address Data Storage Area 20666*b*1 (FIG. 767) (S4**).

FIG. 781 illustrates Web Address Accessing Software **20666*c*5*d* (FIG. 772) of Communication Device 200, which accesses the web site represented by the web address data. Referring to the present drawing, CPU 211 (FIG. 1) displays the alphanumeric data with web address data emphasized (S1). The user of Communication Device 200 selects one of the web address data by utilizing Input Device 210 (FIG. 1) or via voice recognition system (for example, click one of the web address data) (S2). CPU 211 then opens an internet browser (for example, the Internet Explorer) and enters the web address data selected in S2 therein (S3). CPU 211 accesses the web site thereafter (S4**).

FIG. 782 illustrates Email Address Data Identifying Software **20666*c*6*a* (FIG. 773) of Communication Device 200, which identifies the email address data among the alphanumeric data. Referring to the present drawing, CPU 211 (FIG. 1) retrieves the alphanumeric IDs from Alphanumeric Data Storage Area 20666*b*4 (FIG. 770) and displays the alphanumeric IDs on LCD 201 (FIG. 1) (S1). The user of Communication Device 200 selects one of the alphanumeric IDs by utilizing Input Device 210 (FIG. 1) or via voice recognition system (S2). CPU 211 retrieves the corresponding alphanumeric data from Alphanumeric Data Storage Area 20666*b*4 (FIG. 770) and displays the data on LCD 201 (FIG. 1) (S3). CPU 211 stores the alphanumeric data retrieved in S3 in Work Area 20666*b*6 (FIG. 766) for the email address data identification explained in the next step (S4). CPU 211 scans the alphanumeric data, i.e., applies the email address criteria (for example, '@') to each alphanumeric data, and identifies the email address data included therein (S5). CPU 211 emphasizes the identified email address data by changing the font color (for example, green) and drawing underlines to the identified email address data (S6). CPU 211 displays the alphanumeric data with the identified email address data emphasized on LCD 201 (FIG. 1) thereafter (S7**).

FIG. 783 illustrates Email Address Data Correcting Software **20666*c*6*b* (FIG. 773) of Communication Device 200, which corrects the misidentified email address data by manually selecting the start point and the end point of the email address data. For example, if the email address data is misidentified as 'iwaofujisaki@yahoo' and leaves out the remaining '.com', the user of Communication Device 200 may manually correct the email address data by selecting the start point and the end point of 'iwaofujisaki@yahoo.com'. Referring to the present drawing, CPU 211 (FIG. 1) displays the alphanumeric data with email address data emphasized (S1). The user of Communication Device 200 selects the start point of the email address data (S2) and the end point of the email address data by utilizing Input Device 210 (FIG. 1) or via voice recognition system (S3). CPU 211 then identifies the alphanumeric data located between the start point and the end point as email address data (S4), and emphasizes the email address data by changing the font color (for example, green) and drawing underlines thereto (S5). The alphanumeric data with the email address data emphasized are displayed on LCD 201 (FIG. 1) thereafter (S6**).

FIG. 784 illustrates Email Address Data Storing Software **20666*c*6*c* (FIG. 773) of Communication Device 200, which stores the email address data to Email Address Data Storage Area 20666*b*2 (FIG. 768). Referring to the present drawing, CPU 211 (FIG. 1) displays the alphanumeric data with the email address data emphasized (S1). The user of Communication Device 200 selects one of the email address data, and CPU 211 emphasizes the data (for example, change to bold font) (S2). The user then inputs the email address ID (the title of the email address data) by utilizing Input Device 210 (FIG. 1) or via voice recognition system (S3). CPU 211 stores the email address ID and the email address data in Email Address Data Storage Area 20666*b*2 (FIG. 768) (S4**).

FIG. 785 illustrates Email Editing Software **20666*c*6*d* (FIG. 773) of Communication Device 200, which opens an email editor (for example, the Outlook Express) wherein the email address data is set as the receiver's address. Referring to the present drawing, CPU 211 (FIG. 1) displays the alphanumeric data with the email address data emphasized (S1). The user of Communication Device 200 selects one of the email address data (for example, click one of the email address data) by utilizing Input Device 210 (FIG. 1) or via voice recognition system (S2). CPU 211 then opens an email editor (for example, the Outlook Express) (S3), and sets the email address data selected in S2 as the receiver's address (S4**).

FIG. 786 illustrates Phone Data Identifying Software **20666*c*7*a* (FIG. 773) of Communication Device 200, which identifies the phone data among the alphanumeric data. Referring to the present drawing, CPU 211 (FIG. 1) retrieves the alphanumeric IDs from Alphanumeric Data Storage Area 20666*b*4 (FIG. 770) and displays the alphanumeric IDs on LCD 201 (FIG. 1) (S1). The user of Communication Device 200 selects one of the alphanumeric IDs (S2). CPU 211 retrieves the corresponding alphanumeric data from Alphanumeric Data Storage Area 20666*b*4 (FIG. 770) and displays the data on LCD 201 (FIG. 1) (S3). CPU 211 stores the alphanumeric data retrieved in S3 in Work Area 20666*b*6 (FIG. 766) for the phone data identification explained in the next step (S4). CPU 211 scans the alphanumeric data, i.e., applies the phone criteria (for example, numeric data with 'xxx-xxx-xxxx' format) to each alphanumeric data, and identifies the phone data included therein (S5). CPU 211 emphasizes the identified phone data by changing the font color (for example, yellow) and drawing underlines to the identified phone data (S6). CPU 211 displays the alphanumeric data with the identified phone data emphasized on LCD 201 (FIG. 1) thereafter (S7**).

FIG. 787 illustrates Phone Data Correcting Software **20666*c*7*b* (FIG. 773) of Communication Device 200, which corrects the misidentified phone data by manually selecting the start point and the end point of the phone data. For example, if the phone data is misidentified as '916-455-' and leaves out the remaining '1293', the user of Communication Device 200 may manually correct the phone data by selecting the start point and the end point of '916-455-1293'. Referring to the present drawing, CPU 211 (FIG. 1) displays the alphanumeric data with phone data emphasized (S1). The user of Communication Device 200 selects the start point of the phone data (S2) and the end point of the phone data by utilizing Input Device 210 (FIG. 1) or via voice recognition system (S3). CPU 211 then identifies the alphanumeric data located between the start point and the end point as phone data (S4), and emphasizes the phone data by changing the font color (for example, yellow) and drawing underlines thereto (S5). The alphanumeric data with the phone data emphasized are displayed on LCD 201 (FIG. 1) thereafter (S6**).

FIG. 788 illustrates Phone Data Storing Software **20666*c*7*c* (FIG. 773) of Communication Device 200, which stores the phone data to Phone Data Storage Area 20666*b*3 (FIG. 769). Referring to the present drawing, CPU 211 (FIG. 1) displays the alphanumeric data with the phone data emphasized (S1). The user of Communication Device 200 selects one of the phone data, and CPU 211 emphasizes the data (for example, change to bold font) (S2). The user then inputs the phone ID (the title of the phone data) (S3). CPU 211 stores the phone ID and the phone data in Phone Data Storage Area 20666*b*3 (FIG. 769) (S4**).

FIG. 789 illustrates Dialing Software **20666*c*7*d* (FIG. 773) of Communication Device 200, which opens a phone dialer and initiates a dialing process by utilizing the phone data. Referring to the present drawing, CPU 211 (FIG. 1) displays the alphanumeric data with the phone data emphasized (S1). The user of Communication Device 200 selects one of the phone data by utilizing Input Device 210 (FIG. 1) or via voice recognition system (for example, click one of the phone data) (S2). CPU 211 then opens a phone dialer (S3), and inputs the phone data selected in S2 (S4**). A dialing process is initiated thereafter.

<<Multiple Mode Implementing Function>>

FIG. 790 through FIG. 795 illustrate the multiple mode implementing function of Communication Device 200 which enables to activate and implement a plurality of modes, functions, and/or systems described in this specification simultaneously. For the avoidance of doubt, other modes, functions, and systems not explained above can also be activated and implemented by the present function.

FIG. 790 illustrates the software programs stored in RAM 206 (FIG. 1) to implement the multiple mode implementing function (FIG. 1). As described in FIG. 790, RAM 206 includes Multiple Mode Implementer Storage Area **20690*a*. Multiple Mode Implementer Storage Area 20690*a* stores Multiple Mode Implementer 20690*b*, Mode List Displaying Software 20690*c*, Mode Selecting Software 20690*d*, Mode Activating Software 20690*e*, and Mode Implemention Repeater 20690*f*, all of which are software programs. Multiple Mode Implementer 20690*b* administers the overall implementation of the present function. One of the major tasks of Multiple Mode Implementer 20690*b* is to administer and control the timing and sequence of Mode List Displaying Software 20690*c*, Mode Selecting Software 20690*d*, Mode Activating Software 20690*e*, and Mode Implemention Repeater 20690*f*. For example, Multiple Mode Implementer 20690*b* executes them in the following order: Mode List Displaying Software 20690*c*, Mode Selecting Software 20690*d*, Mode Activating Software 20690*e*, and Mode Implemention Repeater 20690*f*. Mode List Displaying Software 20690*c* displays on LCD 201 (FIG. 1) a list of a certain amount or all modes, functions, and/or systems explained in this specification of which the sequence is explained in FIG. 791. Mode Selecting Software 20690*d* selects a certain amount or all modes, functions, and/or systems explained in this specification of which the sequence is explained in FIG. 792. Mode Activating Software 20690*e* activates a certain amount or all modes, functions, and/or systems selected by the Mode Selecting Software 20690*d* of which the sequence is explained in FIG. 793. Mode Implemention Repeater 20690*f* executes Multiple Mode Implementer 20690*b* which reactivates Mode List Displaying Software 20690*c*, Mode Selecting Software 20690*d*, Mode Activating Software 20690*e* of which the sequence is explained in FIG. 794**.

FIG. 791 illustrates the sequence of Mode List Displaying Software **20690*c* (FIG. 790). Referring to FIG. 791, CPU 211 (FIG. 1), under the command of Mode List Displaying Software 20690*c*, displays a list of a certain amount or all modes, functions, and/or systems described in this specification on LCD 201 (FIG. 1**).

FIG. 792 illustrates the sequence of Mode Selecting Software **20690*d* (FIG. 790). Referring to FIG. 792, the user of Communication Device 200 inputs an input signal by utilizing Input Device 210 (FIG. 1) or via voice recognition system identifying one of the modes, functions, and/or systems displayed on LCD 201 (FIG. 1) (S1), and CPU 211 (FIG. 1), under the command of Mode Selecting Software 20690*d*, interpretes the input signal and selects the corresponding mode, function, or system (S2**).

FIG. 793 illustrates the sequence of Mode Activating Software **20690*e* (FIG. 790). Referring to FIG. 793, CPU 211 (FIG. 1), under the command of Mode Activating Software 20690*e*, activates the mode, function, or, system selected in S2 of FIG. 792. CPU 211** thereafter implements the activated mode, function, or system as described in the relevant drawings in this specification.

FIG. 794 illustrates the sequence of Mode Implemention Repeater **20690*f* (FIG. 790). Referring to FIG. 794, the user of Communication Device 200 inputs an input signal by utilizing Input Device 210 (FIG. 1) or via voice recognition system (S1). Once the activation of the selected mode, function, or system described in FIG. 793 hereinbefore is completed, and if the input signal indicates to repeat the process to activate another mode, function, or system (S2), CPU 211 (FIG. 1), under the command of Mode Implemention Repeater 20690*f*, executes Multiple Mode Implementer 20690*b* (FIG. 790), which reactivates Mode List Displaying Software 20690*c* (FIG. 790), Mode Selecting Software 20690*d* (FIG. 790), and Mode Activating Software 20690*e* (FIG. 790) to activate the second mode, function, or system while the first mode, function, or system is implemented by utilizing the method of so-called 'time sharing' (S3). Mode List Displaying Software 20690*c*, Mode Selecting Software 20690*d*, and Mode Activating Software 20690*e* can be repeatedly executed until all modes, function, and systems displayed on LCD 201 (FIG. 1) are selected and activated. The activation of modes, functions, and/or systems is not repeated if the input signal explained in S2** so indicates.

As another embodiment, Multiple Mode Implementer **20690*b*, Mode List Displaying Software 20690*c*, Mode Selecting Software 20690*d*, Mode Activating Software 20690*e*, and Mode Implemention Repeater 20690*f* described in FIG. 790 may be integrated into one software program, Multiple Mode Implementer 20690*b*, as described in FIG. 795. Referring to FIG. 795, CPU 211 (FIG. 1), first of all, displays a list of a certain amount or all modes, functions, and/or systems described in this specification on LCD 201 (FIG. 1) (S1). Next, the user of Communication Device 200 inputs an input signal by utilizing Input Device 210 (FIG. 1) or via voice recognition system identifying one of the modes, functions, and/or systems displayed on LCD 201 (S2), and CPU 211 interpretes the input signal and selects the corresponding mode, function, or system (S3). CPU 211 activates the mode, function, or system selected in S3, and thereafter implements the activated mode, function, or system as described in the relevant drawings in this specification (S4). Once the activation of the selected mode, function, or system described in S4 is completed, the user of Communication Device 200 inputs an input signal by utilizing Input Device 210 or via voice recognition system (S5). If the input signal indicates to repeat the process to activate another mode, function, or system (S6), CPU 211 repeats the steps S1 through S4 to activate the second mode, function, or system while the first mode, function, or system is implemented by utilizing the method so-called 'time sharing'. The steps of S1 though S4 can be repeatedly executed until all modes, function, and systems displayed on LCD 201 are selected and activated. The activation of modes, functions, and/or systems is not repeated if the input signal explained in S5 so indicates. As another embodiment, before or at the time one software program is activated, CPU 211 may, either automatically or manually, terminate the other software programs already activated in order to save the limited space of RAM 206**, thereby allowing only one software program implemented at a time. For the avoidance of doubt, the meaning of each term 'mode(s)', 'function(s)', and 'system(s)' is equivalent to the others in this specification. Namely, the meaning of 'mode(s)' includes and is equivalent to that of 'function(s)' and 'system(s)', the meaning of 'function(s)' includes and is equivalent to that of 'mode(s)' and 'system(s)', and the meaning of 'system(s)' includes and is equivalent to that of 'mode(s)' and 'function(s)'. Therefore, even only mode(s) is expressly utilized in this specification, it impliedly includes function(s) and/or system(s) by its definition.

<<Incorporation by Reference>>

The following paragraphs and drawings described in U.S. Ser. No. 10/710,600, filed 2004, Jul. 23, are incorporated to this application by reference: the preamble described in paragraph [1806] (no drawings); Communication Device 200 (Voice Communication Mode) described in paragraphs [1807] through [1812] (FIGS. 1 through 2*c*); Voice Recognition System described in paragraphs [1813] through [1845] (FIGS. 3 through 19); Positioning System described in paragraphs [1846] through [1877] (FIGS. 20*a* through 32*e*); Auto Backup System described in paragraphs [1878] through [1887] (FIGS. 33 through 37); Signal Amplifier described in paragraphs [1888] through [1893] (FIG. 38); Audio/Video Data Capturing System described in paragraphs [1894] through [1906] (FIGS. 39 through 44*b*); Digital Mirror Function (1) described in paragraphs [1907] through [1915] (FIGS. 44*c* through 44*e*); Caller ID System described in paragraphs [1916] through [1923] (FIGS. 45 through 47); Stock Purchasing Function described in paragraphs [1924] through [1933] (FIGS. 48 through 52); Timer Email Function described in paragraphs [1934] through [1940] (FIGS. 53*a* and 53*b*); Call Blocking Function described in paragraphs [1941] through [1954] (FIGS. 54 through 59); Online Payment Function described in paragraphs [1955] through [1964] (FIGS. 60 through 64); Navigation System described in paragraphs [1965] through [1987] (FIGS. 65 through 74*a*); Remote Controlling System described in paragraphs [1988] through [2006] (FIGS. 75 through 85); Auto Emergency Calling System described in paragraphs [2007] through [2015] (FIGS. 86 and 87); Cellular TV Function described in paragraphs [2016] through [2100] (FIGS. 88 through 135); 3D Video Game Function described in paragraphs [2101] through [2113] (FIGS. 136 through 144); Digital Mirror Function (2) described in paragraphs [2114] through [2123] (FIGS. 145 through 155); Voice Recognition Sys—E-mail (2) described in paragraphs [2124] through [2132] (FIGS. 156 through 160); Positioning System—GPS Search Engine described in paragraphs [2133] through [2175] (FIGS. 161 through 182); Mobile Ignition Key Function described in paragraphs [2176] through [2198] (FIGS. 183 through 201); Voice Print Authentication System described in paragraphs [2199] through [2209] (FIGS. 202 through 211); Fingerprint Authentication System described in paragraphs [2210] through [2222] (FIGS. 212 through 221); Auto Time Adjust Function described in paragraphs [2223] through [2227] (FIGS. 222 through 224); Video/Photo Mode described in paragraphs [2228] through [2256] (FIGS. 225 through 242); Call Taxi Function described in paragraphs [2257] through [2297] (FIGS. 243 through 269); Shooting Video Game Function described in paragraphs [2298] through [2314] (FIGS. 270 through 283); Driving Video Game Function described in paragraphs [2315] through [2328] (FIGS. 284 through 294); Address Book Updating Function described in paragraphs [2329] through [2349] (FIGS. 295 through 312); Batch Address Book Updating Function—With Host described in paragraphs [2350] through [2371] (FIGS. 313 through 329); Batch Address Book Updating Function—Peer-To-Peer Connection described in paragraphs [2372] through [2376] (FIGS. 329*a* through 329*c*); Batch Scheduler Updating Function—With Host described in paragraphs [2377] through [2400] (FIGS. 330 through 350); Batch Scheduler Updating Function—Peer-To-Peer Connection described in paragraphs [2401] through [2405] (FIGS. 351 and 352); Calculator Function described in paragraphs [2406] through [2411] (FIGS. 353 through 356); Spreadsheet Function described in paragraphs [2412] through [2419] (FIGS. 357 through 360); Word Processing Function described in paragraphs [2420] through [2435] (FIGS. 361 through 373); TV Remote Controller Function described in paragraphs [2436] through [2458] (FIGS. 374 through 394); CD/PC Inter-communicating Function described in paragraphs [2459] through [2483] (FIGS. 413 through 427); PDWR Sound Selecting Function described in paragraphs [2484] through [2520] (FIGS. 428 through 456); Start Up Software Function described in paragraphs [2521] through [2537] (FIGS. 457 through 466); Another Embodiment Of Communication Device 200 described in paragraphs [2538] through [2542] (FIGS. 467*a* through 467*d*); Stereo Audio Data Output Function described in paragraphs [2543] through [2562] (FIGS. 468 through 479); Stereo Visual Data Output Function described in paragraphs [2563] through [2582] (FIGS. 480 through 491); Multiple Signal Processing Function described in paragraphs [2583] through [2655] (FIGS. 492 through 529); Positioning System—Pin-pointing Function described in paragraphs [2656] through [2689] (FIGS. 530 through 553); Artificial Satellite Host described in paragraphs [2690] through [2708] (FIGS. 554 through 567); CCD Bar Code Reader Function described in paragraphs [2709] through [2730] (FIGS. 568 through 579); Online Renting Function described in paragraphs [2731] through [2808] (FIGS. 580 through 633); SOS Calling Function described in paragraphs [2809] through [2829] (FIGS. 634 through 645); Input Device described in paragraphs [2830] through [2835] (FIGS. 646 through 650); PC Remote Controlling Function described in paragraphs [2836] through [2871] (FIGS. 651 through 670); PC Remote Downloading Function described in paragraphs [2872] through [2921] (FIGS. 671 through 701); Audiovisual Playback Function described in paragraphs [2922] through [2947] (FIGS. 702 through 716); Audio Playback Function described in paragraphs [2948] through [2972] (FIGS. 717 through 731); Ticket Purchasing Function described in paragraphs [2973] through [3002] (FIGS. 732 through 753); Remote Data Erasing Function described in paragraphs [3003] through [3032] (FIGS. 754 through 774); Business Card Function described in paragraphs [3033] through [3049] (FIGS. 775 through 783); Game Vibrating Function described in paragraphs [3050] through [3060] (FIGS. 784 through 786); Part-time Job Finding Function described in paragraphs [3061] through [3081] (FIGS. 787 through 801); Parking Lot Finding Function described in paragraphs [3082] through [3121] (FIGS. 802 through 832); Parts Upgradable Communication Device described in paragraphs [3122] through [3147] (FIGS. 833*a* through 833*x*); On Demand TV Function described in paragraphs [3148] through [3178] (FIGS. 834 through 855); Inter-communicating TV Function described in paragraphs [3179] through [3213] (FIGS. 856 through 882); Display Controlling Function described in paragraphs [3214] through [3231] (FIGS. 883 through 894); Multiple Party Communicating Function described in paragraphs [3232] through [3265] (FIGS. 894*a* through 917); Display Brightness Controlling Function described in paragraphs [3266] through [3275] (FIGS. 918 through 923); Multiple Party Pin-pointing Function described in paragraphs [3276] through [3323] (FIGS. 924 through 9500; Digital Camera Function described in paragraphs [3324] through [3351] (FIGS. 951 through 968); Phone Number Linking Function described in paragraphs [3352] through [3375] (FIGS. 968*a* through 983); Multiple Window Displaying Function described in paragraphs [3376] through [3394] (FIGS. 984 through 995); Mouse Pointer Displaying Function described in paragraphs [3395] through [3432] (FIGS. 996 through 1021); House Item Pin-pointing Function described in paragraphs [3433] through [3592] (FIGS. 1022 through 1152); Membership Administrating Function described in paragraphs [3593] through [3635] (FIGS. 1153 through 1188); Keyword Search Timer Recording Function described in paragraphs [3636] through [3727] (FIGS. 1189 through 1254); Weather Forecast Displaying Function described in paragraphs [3728] through [3769] (FIGS. 1255 through 1288); Multiple Language Displaying Function described in paragraphs [3770] through [3827] (FIGS. 1289 through 1331); Caller's Information Displaying Function described in paragraphs [3828] through [3880] (FIGS. 1332 through 1375); Communication Device Remote Controlling Function (By Phone) described in paragraphs [3881] through [3921] (FIGS. 1394 through 1415); Communication Device Remote Controlling Function (By Web) described in paragraphs [3922] through [3962] (FIGS. 1416 through 1437); Shortcut Icon Displaying Function described in paragraphs [3963] through [3990] (FIGS. 1438 through 1455); Task Tray Icon Displaying Function described in paragraphs [3991] through [4013] (FIGS. 1456 through 1470); Multiple Channel Processing Function described in paragraphs [4014] through [4061] (FIGS. 1471 through 1498); Solar Battery Charging Function described in paragraphs [4062] through [4075] (FIGS. 1499 through 1509); OS Updating Function described in paragraphs [4076] through [4143] (FIGS. 1510 through 1575); Device Managing Function described in paragraphs [4144] through [4161] (FIGS. 1576 through 1587); Automobile Controlling Function described in paragraphs [4162] through [4210] (FIGS. 1588 through 1627); OCR Function described in paragraphs [4211] through [4246] (FIGS. 1628 through 1652); Multiple Mode Implementing Function described in paragraphs [4248] through [4255] (FIGS. 395 through 400); Multiple Software Download Function described in paragraphs [4256] through [4265] (FIGS. 401 through 407); Selected Software Distributing Function described in paragraphs [4266] through [4285] (FIGS. 1376 through 1393*d*); Multiple Software Download And Mode Implementation Function described in paragraphs [4286] through [4293] (FIGS. 408 through 412); and the last sentence described in paragraph [4295] (no drawings).

<<Other Functions>>

Communication Device 200 is capable to implement the following functions, modes, and systems: a voice communication function which transfers a 1st voice data input from the microphone via the wireless communication system and outputs a 2nd voice data received via the wireless communication system from the speaker; a voice recognition system which retrieves alphanumeric information from the user's voice input via the microphone; a voice recognition system which retrieves alphanumeric information from the user's voice input via the microphone, and a voice recognition refraining system which refrains from implementing the voice recognition system while a voice communication is implemented by the communication device; a tag function and a phone number data storage area, the phone number data storage area includes a plurality of phone numbers, a voice tag is linked to each of the plurality of phone number, when a voice tag is detected in the voice data retrieved via the microphone, the corresponding phone number is retrieved from the phone number data storage area; a voice recognition noise filtering mode, wherein a background noise is identified, a filtered voice data is produced by removing the background noise from the voice data input via the microphone, and the communication device is operated by the filtered voice data; a sound/beep auto off function wherein the communication device refrains from outputting a sound data stored in a sound data storage area while a voice recognition system is implemented; a voice recognition system auto off implementor, wherein the voice recognition system auto off implementor identifies the lapsed time since a voice recognition system is activated and deactivates the voice recognition system after a certain period of time has lapsed; a voice recognition email function which produces a voice produced email which is an email produced by alphanumeric information retrieved from the user's voice input via the microphone, and the voice produced email is stored in the data storage area; a voice communication text converting function, wherein a 1st voice data which indicates the voice data of the caller and a 2nd voice data which indicates the voice data of the callee are retrieved, and the 1st voice data and the 2nd voice data are converted to a 1st text data and a 2nd text data respectively, which are displayed on the display; a target device location indicating function, wherein a target device location data identifying request is transferred to a host computing system in a wireless fashion, a map data and a target device location data is received from the host computing system in a wireless fashion, and the map data with the location corresponding to the target device location data indicated thereon is displayed on the display; an auto backup function, wherein the data identified by the user is automatically retrieved from a data storage area and transferred to another computing system in a wireless fashion periodically for purposes of storing a backup data therein; an audio/video data capturing system which stores an audiovisual data retrieved via the microphone and a camera installed in the communication device in the data storage area, retrieves the audiovisual data from the data storage area, and sends the audiovisual data to another device in a wireless fashion; a digital mirror function which displays an inverted visual data of the visual data input via a camera of the communication device on the display; a caller ID function which retrieves a predetermined color data and/or sound data which is specific to the caller of the incoming call received by the communication device from the data storage area and outputs the predetermined color data and/or sound data from the communication device; a stock purchase function which outputs a notice signal from the communication device when the communication device receives a notice data wherein the notice data is produced by a computing system and sent to the communication device when a stock price of a predetermined stock brand meets a predetermined criteria; a timer email function which sends an email data stored in the data storage area to a predetermined email address at the time indicated by an email data sending time data stored in the data storage area; a call blocking function which blocks the incoming call if the identification thereof is included in a call blocking list; an online payment function which sends a payment data indicating a certain amount of currency to a certain computing system in a wireless fashion in order for the certain computing system to deduct the amount indicated by the payment data from a certain account stored in the certain computing system; a navigation system which produces a map indicating the shortest route from a first location to a second location by referring to an attribution data; a remote controlling system which sends a 1st remote control signal in a wireless fashion by which a 1st device is controlled via a network, a 2nd remote control signal in a wireless fashion by which a 2nd device is controlled via a network, and a 3rd remote control signal in a wireless fashion by which a 3rd device is controlled via a network; an auto emergency calling system wherein the communication device transfers an emergency signal to a certain computing system when an impact of a certain level is detected in a predetermined automobile; a cellular TV function which receives a TV data, which is a series of digital data indicating a TV program, via the wireless communication system in a wireless fashion and outputs the TV data from the communication device; a 3D video game function which retrieves a 3D video game object, which is controllable by a video game object controlling command input via the input device, from the data storage area and display the 3D video game object on the display; a GPS search engine function, wherein a specific criteria is selected by the input device and one or more of geographic locations corresponding to the specific criteria are indicated on the display; a mobile ignition key function which sends a mobile ignition key signal via the wireless communication system in a wireless fashion in order to ignite an engine of an automobile; a voice print authentication system which implements authentication process by utilizing voice data of the user of the communication device; a fingerprint authentication system which implements authentication process by utilizing fingerprint data of the user of the communication device; an auto time adjusting function which automatically adjusts the clock of the communication device by referring to a wireless signal received by the wireless communication system; a video/photo function which implements a video mode and a photo mode, wherein the video/photo function displays moving image data under the video mode and the video/photo function displays still image data under the photo mode on the display; a taxi calling function, wherein a 1st location which indicates the geographic location of the communication device is identified, a 2nd location which indicates the geographic location of the taxi closest to the 1st location is identified, and the 1st location and the 2nd location are indicated on the display; a 3D shooting video game function, wherein the input device utilized for purposes of implementing a voice communication mode is configured as an input means for performing a 3D shooting video game, a user controlled 3D game object which is the three-dimensional game object controlled by the user and a CPU controlled 3D game object which is the three-dimensional game object controlled by the CPU of the communication device are displayed on the display, the CPU controlled 3D game object is programmed to attack the user controlled 3D game object, and a user fired bullet object which indicates a bullet fired by the user controlled 3D game object is displayed on the display when a bullet firing command is input via the input device; a 3D driving video game function, wherein the input device utilized for purposes of implementing a voice communication mode is configured as an input means for performing a 3D driving video game, a user controlled 3D automobile which is the three-dimensional game object indicating an automobile controlled by the user and a CPU controlled 3D automobile which is the three-dimensional game object indicating another automobile controlled by the CPU of the communication device are displayed on the display, the CPU controlled 3D automobile is programmed to compete with the user controlled 3D automobile, and the user controlled 3D automobile is controlled by a user controlled 3D automobile controlling command input via the input device; an address book updating function which updates the address book stored in the communication device by personal computer via network; a batch address book updating function which updates all address books of a plurality of devices including the communication device in one action; a batch scheduler updating function which updates all schedulers of a plurality of devices including the communication device in one action; a calculating function which implements mathematical calculation by utilizing digits input via the input device; a spreadsheet function which displays a spreadsheet on the display, wherein the spreadsheet includes a plurality of cells which are aligned in a matrix fashion; a word processing function which implements a bold formatting function, an italic formatting function, and/or a font formatting function, wherein the bold formatting function changes alphanumeric data to bold, the italic formatting function changes alphanumeric data to italic, and the font formatting function changes alphanumeric data to a selected font; a TV remote controlling function wherein a TV control signal is transferred via the wireless communication system, the TV control signal is a wireless signal to control a TV tuner; a CD/PC inter-communicating function which retrieves the data stored in a data storage area and transfers the data directly to another computer by utilizing infra-red signal in a wireless fashion; a pre-dialing/dialing/waiting sound selecting function, wherein a selected pre-dialing sound which is one of the plurality of pre-dialing sound is registered, a selected dialing sound which is one of the plurality of dialing sound is registered, and a selected waiting sound which is one of the plurality of waiting sound is registered by the user of the communication device, and during the process of implementing a voice communication mode, the selected pre-dialing sound is output from the speaker before a dialing process is initiated, the selected dialing sound is output from the speaker during the dialing process is initiated, and the selected waiting sound is output from the speaker after the dialing process is completed; a startup software function, wherein a startup software identification data storage area stores a startup software identification data which is an identification of a certain software program selected by the user, when the power of the communication device is turned on, the startup software function retrieves the startup software identification data from the startup software identification data storage area and activates the certain software program; the display includes a 1st display and a 2nd display which display visual data in a stereo fashion, the microphone includes a 1st microphone and a 2nd microphone which input audio data in a stereo fashion, and the communication device further comprises a vibrator which vibrates the communication device, an infra-red transmitting device which transmits infra-red signals, a flash light unit which emits strobe light, a removable memory which stores a plurality of digital data and removable from the communication device, and a photometer which a sensor to detect light intensity; a stereo audio data output function which enables the communication device to output audio data in a stereo fashion; a stereo visual data output function, wherein a left visual data storage area stores a left visual data, a right visual data storage area stores a right visual data, stereo visual data output function retrieves the left visual data from the left visual data storage area and displays on a left display and retrieves the right visual data from the right visual data storage area and displays on a right display; a multiple signal processing function, wherein the communication implements wireless communication under a 1st mode and a 2nd mode, the wireless communication is implemented by utilizing cdma2000 signal under the 1st mode, and the wireless communication is implemented by utilizing W-CDMA signal under the 2nd mode; a pin-pointing function, wherein a plurality of in-door access points are installed in an artificial structure, a target device location data which indicates the current geographic location of another device is identified by the geographical relation between the plurality of in-door access points and the another device, and the target device location data is indicated on the display; a CCD bar code reader function, wherein a bar code data storage area stores a plurality of bar code data, each of the plurality of bar code data corresponds to a specific alphanumeric data, the CCD bar code reader function identifies the bar code data corresponding to a bar code retrieved via a camera and identifies and displays the alphanumeric data corresponding to the identified bar code data; an online renting function which enables the user of communication device to download from another computing system and rent digital information for a certain period of time; an SOS calling function, wherein when a specific call is made from the communication device, the SOS calling function retrieves a current geographic location data from a current geographic location data storage area and retrieves a personal information data from a personal information data storage area and transfers the current geographic location data and the personal information data to a specific device in a wireless fashion; a PC remote controlling function, wherein an image data is produced by a personal computer, the image data is displayed on the personal computer, the image data is transferred to the communication device, the image data is received via the wireless communication system in a wireless fashion and stored in a data storage area, the image data is retrieved from the data storage area and displayed on the display, a remote control signal input via the input device is transferred to the personal computer via the wireless communication system in a wireless fashion, and the personal computer is controlled in accordance with the remote control signal; a PC remote downloading function, wherein the communication device sends a data transferring instruction signal to a 1st computer via the wireless communication system in a wireless fashion, wherein the data transferring instruction signal indicates an instruction to the 1st computer to transfer a specific data stored therein to a 2nd computer; an audiovisual playback function, wherein an audiovisual data storage area stores a plurality of audiovisual data, an audiovisual data is selected from the audiovisual data storage area, the audiovisual playback function replays the audiovisual data if a replaying command is input via the input device, the audiovisual playback function pauses to replay the audiovisual data if a replay pausing command is input via the input device, the audiovisual playback function resumes to replay the audiovisual data if a replay resuming command is input via the input device, the audiovisual playback function terminates to replay the audiovisual data if a replay terminating command is input via the input device, the audiovisual playback function fast-forwards to replay the audiovisual data if a replay fast-forwarding command is input via the input device, and the audiovisual playback function fast-rewinds to replay the audiovisual data if a replay fast-rewinding command is input via the input device; an audio playback function which enables the communication device to playback audio data selected by the user of the communication device; a ticket purchasing function which enables the communication device to purchase tickets in a wireless fashion; a remote data erasing function, wherein a data storage area stores a plurality of data, the remote data erasing function deletes a portion or all data stored in the data storage area in accordance with a data erasing command received from another computer via the wireless communication system in a wireless fashion, the data erasing command identifies the data to be erased selected by the user; a business card function which retrieves a 1st business card data indicating the name, title, phone number, email address, and office address of the user of the communication device from the data storage area and sends via the wireless communication system in a wireless fashion and receives a 2nd business card data indicating the name, title, phone number, email address, and office address of the user of another device via the wireless communication system in a wireless fashion and stores the 2nd business card data in the data storage area; a game vibrating function which activates a vibrator of the communication device when a 1st game object contacts a 2nd game object displayed on the display; a part-timer finding function which enables the user of the communication device to find a part-time job in a specified manner by utilizing the communication device; a parking lot finding function which enables the communication device to display the closest parking lot with vacant spaces on the display with the best route thereto; an on demand TV function which enables the communication device to display TV program on the display in accordance with the user's demand; an inter-communicating TV function which enables the communication device to send answer data to host computing system at which the answer data from a plurality of communication devices including the communication device are counted and the counting data is produced; a display controlling function which enables the communication device to control the brightness and/or the contrast of the display per file opened or software program executed; a multiple party communicating function which enables the user of the communication device to voice communicate with more than one person via the communication device; a display brightness controlling function which controls the brightness of the display in accordance with the brightness detected by a photometer of the surrounding area of the user of the communication device; a multiple party pin-pointing function which enables the communication device to display the current locations of a plurality of devices in artificial structure; a digital camera function, wherein a photo quality identifying command is input via the input device, when a photo taking command is input via the input device, a photo data retrieved via a camera is stored in a photo data storage area with the quality indicated by the photo quality identifying command; a phone number linking function which displays a phone number link and dials a phone number indicated by the phone number link when the phone number link is selected; a multiple window displaying function which displays a plurality of windows simultaneously on the display; a mouse pointer displaying function which displays on the display a mouse pointer which is capable to be manipulated by the user of the communication device; a house item pin-pointing function which enables the user of the communication device to find the location of the house items for which the user is looking in a house, wherein the house items are the tangible objects placed in a house which are movable by human being; a membership administrating function in which host computing system allows only the users of the communication device who have paid the monthly fee to access host computing system to implement a certain function; a keyword search timer recording function which enables to timer record TV programs which meet a certain criteria set by the user of the communication device; a weather forecast displaying function which displays on the display the weather forecast of the current location of the communication device; a multiple language displaying function, wherein a selected language is selected from a plurality of languages, and the selected language is utilized to operate the communication device; and a caller's information displaying function which displays personal information regarding caller on the display when the communication device receives a phone call.

The invention claimed is:

1. A method for a communication device comprising a microphone, a speaker, an input device, a display, a camera, and a wireless communicating system, said method comprising:

a function implementing step in which a specific function or system is implemented;

wherein said communication device implements a voice communicating function, a OS updating function, a voice recognition system, a tag function, a voice recognition noise filtering function, a sound/beep auto off function, a voice recognition system auto off function, a voice recognition email function, a voice communication text converting function, a target device location indicating function, an audio/video data capturing system, a caller ID function, a call blocking function, a navigation system, an auto emergency calling system, a cellular TV function, a GPS search engine function, a mobile ignition key function, a word processing function, a start up software function, and a stereo audio data output function;

voice communication is implemented by utilizing said microphone and said speaker when said voice communicating function is implemented in said step;

an operating system of said communication device is updated in a wireless fashion via said communicating system when said OS updating function is implemented;

alphanumeric information is retrieved from the user's voice input via said microphone when said voice recognition system is implemented in said step;

a voice tag is linked to a phone number and when said voice tag is detected in the voice data retrieved via said microphone, said phone number is dialed, when said tag function is implemented in said step;

a background noise is identified, a filtered voice data is produced by removing said background noise from the voice data input via said microphone, and said communication device is operated by said filtered voice data, when said voice recognition noise filtering function is implemented in said step;

said communication device refrains from outputting sound data while said voice recognition system is implemented, when said sound/beep auto off function is implemented in said step;

said communication device identifies the lapsed time since said voice recognition system is activated and deactivates said voice recognition system after a certain period of time has lapsed when said voice recognition system auto off function is implemented in said step;

an email is authored by the alphanumeric information retrieved from the user's voice input via said microphone when said voice recognition email function is implemented in said step;

a 1st voice data which indicates the voice data of the caller and a 2nd voice data which indicates the voice data of the callee are retrieved, and said 1st voice data and said 2nd voice data are converted to a 1st text data and a 2nd text data respectively, which are displayed on said display when said voice communication text converting function is implemented in said step;

a target device location data identifying request is transferred to a host computing system in a wireless fashion, a map data and a target device location data is received from said host computing system in a wireless fashion, and said map data with the location corresponding to said target device location data indicated thereon is displayed on said display when said target device location indicating function is implemented in said step;

an audiovisual data is retrieved via said microphone and said camera and said audiovisual data is sent to another device in a wireless fashion when said audio/video data capturing system is implemented in said step;

a predetermined color data and/or sound data which is/are specific to the caller of the incoming call received by said communication device is retrieved and the color and/or sound corresponding to said predetermined color data and/or sound data is/are output from said communication device when said caller ID function is implemented in said step;

an incoming call is blocked if the identification thereof is included in a call blocking list when said call blocking function is implemented in said step;

a map indicating the route from a first location to a second location is produced when said navigation system is implemented in said step;

said communication device transfers an emergency signal to certain computing system or device when an impact of a certain level is detected in a predetermined automobile when said auto emergency calling system is implemented in said step;

a TV data, which is a series of digital data indicating a TV program, is received via said wireless communication system in a wireless fashion and said TV program is output from said communication device when said cellular TV function is implemented in said step;

when a specific criteria is identified, one or more of geographic locations corresponding to said specific criteria are indicated on said display when said GPS search engine function is implemented in said step;

a mobile ignition key signal is sent via said wireless communication system in a wireless fashion in order to ignite an engine, which is the device of an automobile which creates propulsion, when said mobile ignition key function is implemented in said step;

text displayed on said display is changed to bold and/or italic when said word processing function is implemented in said step;

a certain software program identified by the user is configured to be executed when the power of said communication device is turned on when said start up software function is implemented in said step; and audio data is output from said communication device in a stereo fashion when said stereo audio data output function is implemented in said step.

2. A communication device comprising:

a microphone;

a speaker;

an input device;

a display;

a camera;

a wireless communicating system;

a voice communicating implementor, wherein voice communication is implemented by utilizing said microphone and said speaker;

a OS updating implementor, wherein an operating system of said communication device is updated in a wireless fashion via said communicating system;

a voice recognition system, wherein alphanumeric information is retrieved from the user's voice input via said microphone;

a tag implementor, wherein a voice tag is linked to a phone number and when said voice tag is detected in the voice data retrieved via said microphone, said phone number is dialed;

a voice recognition noise filtering implementor, wherein a background noise is identified, a filtered voice data is produced by removing said background noise from the voice data input via said microphone, and said communication device is operated by said filtered voice data;

a sound/beep auto off implementor, wherein said communication device refrains from outputting sound data while said voice recognition system is implemented;

a voice recognition system auto off implementor, wherein said communication device identifies the lapsed time since said voice recognition system is activated and deactivates said voice recognition system after a certain period of time has lapsed;

a voice recognition email implementor, wherein an email is authored by the alphanumeric information retrieved from the user's voice input via said microphone;

a voice communication text converting implementor, wherein a 1st voice data which indicates the voice data of the caller and a 2nd voice data which indicates the voice data of the callee are retrieved, and said 1st voice data and said 2nd voice data are converted to a 1st text data and a 2nd text data respectively, which are displayed on said display;

a target device location indicating implementor, wherein a target device location data identifying request is transferred to a host computing system in a wireless fashion, a map data and a target device location data is received from said host computing system in a wireless fashion, and said map data with the location corresponding to said target device location data indicated thereon is displayed on said display;

an audio/video data capturing system, wherein an audiovisual data is retrieved via said microphone and said camera and said audiovisual data is sent to another device in a wireless fashion;

a caller ID implementor, wherein a predetermined color data and/or sound data which is/are specific to the caller of the incoming call received by said communication device is retrieved and the color and/or sound corresponding to said predetermined color data and/or sound data is/are output from said communication device;

a call blocking implementor, wherein an incoming call is blocked if the identification thereof is included in a call blocking list;

a navigation system, wherein a map indicating the route from a first location to a second location is produced;

an auto emergency calling system, wherein said communication device transfers an emergency signal to certain computing system or device when an impact of a certain level is detected in a predetermined automobile;

a cellular TV implementor, wherein a TV data, which is a series of digital data indicating a TV program, is received via said wireless communication system in a wireless fashion and said TV program is output from said communication device;

a GPS search engine implementor, wherein when a specific criteria is identified, one or more of geographic locations corresponding to said specific criteria are indicated on said display;

a mobile ignition key implementor, wherein a mobile ignition key signal is sent via said wireless communication system in a wireless fashion in order to ignite an engine which is the device of an automobile which creates propulsion;

a word processing implementor which changes the text displayed on said display to bold and/or italic;

a start up software implementor, wherein a certain software program identified by the user is configured to be executed when the power of said communication device is turned on; and a stereo audio data output implementor which outputs audio data from said communication device in a stereo fashion.

3. A system which includes:

a communication device comprising a microphone, a speaker, an input device, a display, a camera, and a wireless communicating system;

a voice communicating implementor, wherein voice communication is implemented by utilizing said microphone and said speaker;

a OS updating implementor, wherein an operating system of said communication device is updated in a wireless fashion via said communicating system;

a voice recognition system, wherein alphanumeric information is retrieved from the user's voice input via said microphone;

a tag implementor, wherein a voice tag is linked to a phone number and when said voice tag is detected in the voice data retrieved via said microphone, said phone number is dialed;

a voice recognition noise filtering implementor, wherein a background noise is identified, a filtered voice data is produced by removing said background noise from the voice data input via said microphone, and said communication device is operated by said filtered voice data;

a sound/beep auto off implementor, wherein said communication device refrains from outputting sound data while said voice recognition system is implemented;

a voice recognition system auto off implementor, wherein said communication device identifies the lapsed time since said voice recognition system is activated and deactivates said voice recognition system after a certain period of time has lapsed;

a voice recognition email implementor, wherein an email is authored by the alphanumeric information retrieved from the user's voice input via said microphone;

a voice communication text converting implementor, wherein a 1st voice data which indicates the voice data of the caller and a 2nd voice data which indicates the voice data of the callee are retrieved, and said 1st voice data and said 2nd voice data are converted to a 1st text data and a 2nd text data respectively, which are displayed on said display;

a target device location indicating implementor, wherein a target device location data identifying request is transferred to a host computing system in a wireless fashion, a map data and a target device location data is received from said host computing system in a wireless fashion, and said map data with the location corresponding to said target device location data indicated thereon is displayed on said display;

an audio/video data capturing system, wherein an audiovisual data is retrieved via said microphone and said camera and said audiovisual data is sent to another device in a wireless fashion;

a caller ID implementor, wherein a predetermined color data and/or sound data which is/are specific to the caller of the incoming call received by said communication device is retrieved and the color and/or sound corresponding to said predetermined color data and/or sound data is/are output from said communication device;

a call blocking implementor, wherein an incoming call is blocked if the identification thereof is included in a call blocking list;

a navigation system, wherein a map indicating the route from a first location to a second location is produced;

an auto emergency calling system, wherein said communication device transfers an emergency signal to certain computing system or device when an impact of a certain level is detected in a predetermined automobile;

a cellular TV implementor, wherein a TV data, which is a series of digital data indicating a TV program, is received via said wireless communication system in a wireless fashion and said TV program is output from said communication device;

a GPS search engine implementor, wherein when a specific criteria is identified, one or more of geographic locations corresponding to said specific criteria are indicated on said display;

a mobile ignition key implementor, wherein a mobile ignition key signal is sent via said wireless communication system in a wireless fashion in order to ignite an engine which is the device of an automobile which creates propulsion;

a word processing implementor which changes the text displayed on said display to bold and/or italic;

a start up software implementor, wherein a certain software program identified by the user is configured to be executed when the power of said communication device is turned on; and a stereo audio data output implementor which outputs audio data from said communication device in a stereo fashion.

* * * * *